US007663502B2

(12) United States Patent
Breed

(10) Patent No.: US 7,663,502 B2
(45) Date of Patent: Feb. 16, 2010

(54) ASSET SYSTEM CONTROL ARRANGEMENT AND METHOD

(75) Inventor: David S. Breed, Boonton Township, NJ (US)

(73) Assignee: Intelligent Technologies International, Inc., Denville, NJ (US)

( * ) Notice: Subject to any disclaimer, the term of this patent is extended or adjusted under 35 U.S.C. 154(b) by 766 days.

(21) Appl. No.: 10/940,881

(22) Filed: Sep. 13, 2004

(65) Prior Publication Data

US 2005/0046584 A1 Mar. 3, 2005

Related U.S. Application Data

(63) Continuation-in-part of application No. 10/191,692, filed on Jul. 9, 2002, now Pat. No. 6,875,976, which is (Continued)

(60) Provisional application No. 60/136,613, filed on May 27, 1999, provisional application No. 60/269,415, filed on Feb. 16, 2001, provisional application No. 60/291,511, filed on May 16, 2001, provisional application No. 60/304,013, filed on Jul. 9, 2001, provisional application No. 60/231,378, filed on Sep. 8, 2000, provisional application No. 60/387,792, filed on Jun. 11, 2002, provisional application No. 60/114,507, filed on Dec. 31, 1998, provisional application No. 60/592,838, filed on Jul. 30, 2004, provisional application No. 60/534,926, filed on Jan. 8, 2004, provisional application No. 60/292,386, filed on May 21, 2001.

(51) Int. Cl.
*G08C 19/00* (2006.01)

(52) U.S. Cl. ............................ 340/825.72; 340/825.69; 340/825.22; 340/5.61; 340/5.64; 340/5.7; 340/825.37; 340/7.29

(58) Field of Classification Search ............ 340/825.72, 340/825.69, 825.22, 5.61, 5.64, 5.7, 825.37
See application file for complete search history.

(56) References Cited

U.S. PATENT DOCUMENTS 3,971,028 A * 7/1976 Funk ..................... 340/825.69

(Continued)

*Primary Examiner*—Vernal U Brown
(74) *Attorney, Agent, or Firm*—Brian Roffe

(57) ABSTRACT

System and method for wirelessly controlling systems in an asset, such as a house or trailer, in which a movable device, such as a PDA, cellular telephone or vehicle, includes a transmitter arranged to transmit signals, and a control unit is arranged on or in connection with the asset and includes a receiver which communicates with the transmitter and a processor coupled to the receiver and which generates different command signals based on signals generated by the transmitter and received by the receiver. Each system is arranged on or in connection with the asset and coupled to the control unit and is responsive to command signals from the processor to perform a function relating to or affecting the asset.

24 Claims, 218 Drawing Sheets

Related U.S. Application Data a continuation-in-part of application No. 10/152,160, filed on May 21, 2002, now abandoned, application No. 10/940,881, which is a continuation-in-part of application No. 10/931,288, filed on Aug. 31, 2004, now Pat. No. 7,164,117, which is a continuation-in-part of application No. 10/303,364, filed on Nov. 25, 2002, now Pat. No. 6,784,379, application No. 10/940,881, which is a continuation-in-part of application No. 10/174,803, filed on Jun. 19, 2002, now Pat. No. 6,957,451, which is a continuation-in-part of application No. 09/500,346, filed on Feb. 8, 2000, now Pat. No. 6,442,504, which is a continuation-in-part of application No. 09/128,490, filed on Aug. 4, 1998, now Pat. No. 6,078,854, which is a continuation-in-part of application No. 08/474,783, filed on Jun. 7, 1995, now Pat. No. 5,822,707, which is a continuation-in-part of application No. 08/970,822, filed on Nov. 14, 1997, now Pat. No. 6,081,757, said application No. 10/174,803 is a continuation-in-part of application No. 09/849,558, filed on May 4, 2001, now Pat. No. 6,653,577, which is a continuation-in-part of application No. 09/193,209, filed on Nov. 17, 1998, now Pat. No. 6,242,701, which is a continuation-in-part of application No. 09/128,490, filed on Aug. 4, 1998, now Pat. No. 6,078,854, which is a continuation-in-part of application No. 08/474,783, filed on Jun. 7, 1995, now Pat. No. 5,822,707, and a continuation-in-part of application No. 08/970,822, filed on Nov. 14, 1997, now Pat. No. 6,081,757, said application No. 10/174,803 is a continuation-in-part of application No. 09/849,559, filed on May 4, 2001, now Pat. No. 6,689,962, which is a continuation-in-part of application No. 09/193,209, filed on Nov. 17, 1998, now Pat. No. 6,242,701, which is a continuation-in-part of application No. 09/128,490, filed on Aug. 4, 1998, now Pat. No. 6,078,854, which is a continuation-in-part of application No. 08/474,783, filed on Jun. 7, 1995, now Pat. No. 5,822,707, and a continuation-in-part of application No. 08/970,822, filed on Nov. 14, 1997, now Pat. No. 6,081,757, said application No. 10/174,803 is a continuation-in-part of application No. 09/901,879, filed on Jul. 9, 2001, now Pat. No. 6,555,766, which is a continuation of application No. 09/849,559, filed on May 4, 2001, now Pat. No. 6,689,962, which is a continuation-in-part of application No. 09/193,209, filed on Nov. 17, 1998, now Pat. No. 6,242,701, which is a continuation-in-part of application No. 09/128,490, filed on Aug. 4, 1998, now Pat. No. 6,078,854, which is a continuation-in-part of application No. 08/474,783, filed on Jun. 7, 1995, now Pat. No. 5,822,707, and a continuation-in-part of application No. 08/970,822, filed on Nov. 14, 1997, now Pat. No. 6,081,757, said application No. 10/174,803 is a continuation-in-part of application No. 09/753,186, filed on Jan. 2, 2001, now Pat. No. 6,484,080, and a continuation-in-part of application No. 09/767,020, filed on Jan. 23, 2001, now Pat. No. 6,533,316, and a continuation-in-part of application No. 09/770,974, filed on Jan. 26, 2001, now Pat. No. 6,648,367, application No. 10/940,881, which is a continuation-in-part of application No. 10/341,554, filed on Jan. 13, 2003, now Pat. No. 6,856,876, which is a continuation-in-part of application No. 09/827,961, filed on Apr. 6, 2001, now Pat. No. 6,517,107, which is a continuation of application No. 09/328,566, filed on Jun. 9, 1999, now Pat. No. 6,279,946, application No. 10/940,881, which is a continuation-in-part of application No. 10/234,067, filed on Sep. 3, 2002, now Pat. No. 6,869,100, which is a continuation-in-part of application No. 09/778,137, filed on Feb. 7, 2001, now Pat. No. 6,513,830, which is a continuation of application No. 08/905,877, filed on Aug. 4, 1997, now Pat. No. 6,186,537, which is a continuation of application No. 08/505,036, filed on Jul. 21, 1995, now Pat. No. 5,653,462, which is a continuation of application No. 08/040,978, filed on Mar. 31, 1993, now abandoned, which is a continuation-in-part of application No. 07/878,571, filed on May 5, 1992, now abandoned, application No. 10/940,881, which is a continuation-in-part of application No. 09/639,303, filed on Aug. 16, 2000, now Pat. No. 6,910,711, which is a continuation of application No. 08/905,877, filed on Aug. 4, 1997, now Pat. No. 6,186,537, which is a continuation of application No. 08/505,036, filed on Jul. 21, 1995, now Pat. No. 5,653,462, which is a continuation of application No. 08/040,978, filed on Mar. 31, 1993, now abandoned, which is a continuation-in-part of application No. 07/878,517, filed on May 5, 1992, now Pat. No. 5,270,883, said application No. 09/639,303 is a continuation-in-part of application No. 09/409,625, filed on Oct. 1, 1999, now Pat. No. 6,270,116, and a continuation-in-part of application No. 09/448,338, filed on Nov. 23, 1999, now Pat. No. 6,168,198, and a continuation-in-part of application No. 09/448,337, filed on Nov. 23, 1999, now Pat. No. 6,283,503, and a continuation-in-part of application No. 10/356,202, filed on Jan. 31, 2003, now Pat. No. 6,793,242, and a continuation-in-part of application No. 10/227,780, filed on Aug. 26, 2002, now Pat. No. 6,950,022, which is a continuation of application No. 09/838,920, filed on Apr. 20, 2001, now Pat. No. 6,778,672, which is a continuation-in-part of application No. 09/563,556, filed on May 3, 2000, now Pat. No. 6,474,683, which is a continuation-in-part of application No. 09/437,535, filed on Nov. 10, 1999, now Pat. No. 6,712,387, which is a continuation-in-part of application No. 09/047,703, filed on Mar. 25, 1998, now Pat. No. 6,039,139, which is a continuation-in-part of application No. 08/640,068, filed on Apr. 30, 1996, now Pat. No. 5,829,782, which is a continuation of application No. 08/239,978, filed on May 9, 1994, now abandoned, which is a continuation-in-part of application No. 08/040,978, filed on Mar. 31, 1993, now abandoned, which is a continuation-in-part of application No. 07/878,571, filed on May 5, 1992, now abandoned, said application No. 09/047,703 is a continuation-in-part of application No. 08/905,876, filed on Aug. 4, 1997, now Pat. No. 5,848,802, which is a continuation of application No. 08/505,036, filed on Jul. 21, 1995, now Pat. No. 5,653,462, which is a continuation of application No. 08/040,978, filed on Mar. 31, 1993, now abandoned, which is a continuation-in-part of application No. 07/878,571, filed on May 5, 1992, now abandoned, application No. 10/940,881, which is a continuation-in-part of application No. 10/613,453, filed on Jul. 3, 2003, now Pat. No. 6,850,824, which is a continuation of application No. 10/188,673, filed on Jul. 3, 2002, now Pat. No. 6,738,697, and a continuation-in-part of application No. 10/174,709, filed on Jun. 19, 2002, now Pat. No. 6,735,506, and a continuation-in-part of application No. 09/753,186, filed on Jan. 2, 2001, now Pat. No. 6,484,080, which is a continuation-in-part of application No. 09/137,918, filed on Aug. 20, 1998, now Pat. No. 6,175,787, which is a continuation-in-part of application No. 08/476,077, filed on Jun. 7, 1995, now Pat. No. 5,809,437, said application No. 10/188,673 is a continuation-in-part of application No. 10/079,065, filed on Feb. 19, 2002, now Pat. No. 6,662,642, which is a continuation-in-part of application No. 09/765,558, filed on Jan. 19, 2001, now Pat. No. 6,748,797, said application No. 10/079,065 application No. 10/940,881, is a continuation-in-part of application No. 10/058,706, filed on Jan. 28, 2002, now Pat. No. 7,467,809, which is a continuation-in-part of application No. 09/891,432, filed on Jun. 26, 2001, now Pat. No. 6,513,833, which is a continuation-in-part of application No. 09/838,920, filed on Apr. 20, 2001, now Pat. No. 6,778,672, which is a continuation-in-part of application No. 09/563,556, filed on May 3, 2000, now Pat. No. 6,474,683, which is a continuation-in-part of application No. 09/437,535, filed on Nov. 10, 1999, now Pat. No. 6,712,387, which is a continuation-in-part of application No. 09/047,703, filed on Mar. 25, 1998, now Pat. No. 6,039,139, which is a continuation-in-part of application No. 08/640,068, filed on Apr. 30, 1996, now Pat. No. 5,829,782, which is a continuation of application No. 08/239,978, filed on May 9, 1994, now abandoned, which is a continuation-in-part of application No. 08/040,978, filed on Mar. 31, 1993, now abandoned, which is a continuation-in-part of application No. 07/878,571, filed on May 5, 1992, now abandoned, said application No. 09/047,703 is a continuation-in-part of application No. 08/905,876, filed on Aug. 4, 1997, now Pat. No. 5,848,802, which is a continuation of application No. 08/505,036, filed on Jul. 21, 1995, now Pat. No. 5,653,462, which is a continuation of application No. 08/040,978, filed on Mar. 31, 1993, now abandoned, which is a continuation-in-part of application No. 07/878,571, filed on May 5, 1992, now abandoned, said application No. 10/058,706 is a continuation-in-part of application No. 09/639,299, filed on Aug. 15, 2000, now Pat. No. 6,422,595, which is a continuation-in-part of application No. 08/905,877, filed on Aug. 4, 1997, now Pat. No. 6,186,537, which is a continuation of application No. 08/505,036, filed on Jul. 21, 1995, now Pat. No. 5,653,462, which is a continuation of application No. 08/040,978, filed on Mar. 31, 1993, now abandoned, which is a continuation-in-part of application No. 07/878,571, filed on May 5, 1992, now abandoned, said application No. 09/639,299 is a continuation-in-part of application No. 09/409,625, filed on Oct. 1, 1999, now Pat. No. 6,270,116, which is a continuation-in-part of application No. 08/905,877, filed on Aug. 4, 1997, now Pat. No. 6,186,537, which is a continuation of application No. 08/505,036, filed on Jul. 21, 1995, now Pat. No. 5,653,462, which is a continuation of application No. 08/040,978, filed on Mar. 31, 1993, now abandoned, which is a continuation-in-part of application No. 07/878,571, filed on May 5, 1992, now abandoned, said application No. 09/639,299 is a continuation-in-part of application No. 09/448,337, filed on Nov. 23, 1999, now Pat. No. 6,283,503, which is a continuation-in-part of application No. 08/905,877, filed on Aug. 4, 1997, now Pat. No. 6,186,537, which is a continuation of application No. 08/505,036, filed on Jul. 21, 1995, now Pat. No. 5,653,462, which is a continuation of application No. 08/040,978, filed on Mar. 31, 1993, now abandoned, which is a continuation-in-part of application No. 07/878,517, filed on May 5, 1992, now Pat. No. 5,270,883, said application No. 09/639,299 is a continuation-in-part of application No. 09/448,338, filed on Nov. 23, 1999, now Pat. No. 6,168,198, which is a continuation-in-part of application No. 08/905,877, filed on Aug. 4, 1997, now Pat. No. 6,186,537, which is a continuation of application No. 08/505,036, filed on Jul. 21, 1995, now Pat. No. 5,653,462, which is a continuation of application No. 08/040,978, filed on Mar. 31, 1993, now abandoned, which is a continuation-in-part of application No. 07/878,571, filed on May 5, 1992, now abandoned, said application No. 10/058,706 is a continuation-in-part of application No. 09/543,678, filed on Apr. 7, 2000, now Pat. No. 6,412,813, which is a continuation-in-part of application No. 09/047,704, filed on Mar. 25, 1998, now Pat. No. 6,116,639, which is a continuation-in-part of application No. 08/640,068, filed on Apr. 30, 1996, now Pat. No. 5,829,782, which is a continuation of application No. 08/239,978, filed on May 9, 1994, now abandoned, which is a continuation-in-part of application No. 08/040,978, filed on Mar. 31, 1993, now abandoned, which is a continuation-in-part of application No. 07/878,571, filed on May 5, 1992, now abandoned, said application No. 09/047,704 is a continuation-in-part of application No. 08/905,876, filed on Aug. 4, 1997, now Pat. No. 5,848,802, which is a continuation of application No. 08/505,036, filed on Jul. 21, 1995, now Pat. No. 5,653,462, which is a continuation of application No. 08/040,978, filed on Mar. 31, 1993, now abandoned, application No. 10/940,881, which is a continuation-in-part of application No. 10/114,533, filed on Apr. 2, 2002, now Pat. No. 6,942,248, which is a continuation-in-part of application No. 10/058,706, filed on Jan. 28, 2002, now Pat. No. 7,467,809, application No. 10/940,881, which is a continuation-in-part of application No. 10/805,903, filed on Mar. 22, 2004, now Pat. No. 7,050,897, which is a continuation-in-part of application No. 10/174,709, filed on Jun. 19, 2002, now Pat. No. 6,735,506, which is a continuation-in-part of application No. 09/753,186, filed on Jan. 2, 2001, now Pat. No. 6,484,080, which is a continuation-in-part of application No. 09/137,918, filed on Aug. 20, 1998, now Pat. No. 6,175,787, and a continuation-in-part of application No. 08/476,077, filed on Jun. 7, 1995, now Pat. No. 5,809,437, said application No. 10/174,709 is a continuation-in-part of application No. 10/079,065, filed on Feb. 19, 2002, now Pat. No. 6,662,642, and a continuation-in-part of application No. 09/765,558, filed on Jan. 19, 2001, now Pat. No. 6,748,797, said application No. 10/174,709 is a continuation-in-part of application No. 10/114,533, filed on Apr. 2, 2002, now Pat. No. 6,942,248, said application No. 10/805,903 is a continuation-in-part of application No. 10/188,673, filed on Jul. 3, 2002, now Pat. No. 6,738,697, which is a continuation-in-part of application No. 09/753,186, filed on Jan. 2, 2001, now Pat. No. 6,484,080, which is a continuation-in-part of application No. 09/137,918, filed on Aug. 20, 1998, now Pat. No. 6,175,787, which is a continuation-in-part of application No. 08/476,077, filed on Jun. 7, 1995, now Pat. No. 5,809,437, said application No. 10/188,673 is a continuation-in-part of application No. 10/079,065, filed on Feb. 19, 2002, now Pat. No. 6,662,642, and a continuation-in-part of application No. 09/765,558, filed on Jan. 19, 2001, now Pat. No. 6,748,797, said application No. 10/805,903 is a continuation-in-part of application No. 10/174,709, filed on Jun. 19, 2002, now Pat. No. 6,735,506, application No. 10/940,881, which is a continuation-in-part of application No. 10/457,238, filed on Jun. 9, 2003, now Pat. No. 6,919,803, application No. 10/940,881, which is a continuation-in-part of application No. 10/116,808, filed on Apr. 5, 2002, now Pat. No. 6,856,873, which is a continuation-in-part of application No. 09/838,919, filed on Apr. 20, 2001, now Pat. No. 6,442,465, which is a continuation-in-part of application No. 09/765,559, filed on Jan. 19, 2001, now Pat. No. 6,553,296, which is a continuation-in-part of application No. 09/476,255, filed on Dec. 30, 1999, now Pat. No. 6,324,453, said application No. 09/476,255 , said application No. 09/838,919 is a continuation-in-part of application No. 09/389,947, filed on Sep. 3, 1999, now Pat. No. 6,393,133, which is a continuation-in-part of application No. 09/200,614, filed on Nov. 30, 1998, now Pat. No. 6,141,432, which is a continuation of application No. 08/474,786, filed on Jun. 7, 1995, now Pat. No. 5,845,000, said application No. 10/116,808 is a continuation-in-part of application No. 09/925,043, filed on Aug. 8, 2001, now Pat. No. 6,507,779, which is a continuation-in-part of application No. 09/765,559, filed on Jan. 19, 2001, now Pat. No. 6,553,296, which is a continuation-in-part of application No. 09/389,947, filed on Sep. 3, 1999, now Pat. No. 6,393,133, application No. 10/940,881, which is a continuation-in-part of application No. 10/061,016, filed on Jan. 30, 2002, now Pat. No. 6,833,516, which is a continuation-in-part of application No. 09/901,879, filed on Jul. 9, 2001, now Pat. No. 6,555,766, which is a continuation of application No. 09/849,559, filed on May 4, 2001, now Pat. No. 6,689,962, which is a continuation-in-part of application No. 09/193,209, filed on Nov. 17, 1998, now Pat. No. 6,242,701, which is a continuation-in-part of application No. 09/128,490, filed on Aug. 4, 1998, now Pat. No. 6,078,854, which is a continuation-in-part of application No. 08/474,783, filed on Jun. 7, 1995, now Pat. No. 5,822,707, and a continuation-in-part of application No. 08/970,822, filed on Nov. 14, 1997, now Pat. No. 6,081,757, application No. 10/940,881, which is a continuation-in-part of application No. 10/227,781, filed on Aug. 26, 2002, now Pat. No. 6,792,342, which is a continuation-in-part of application No. 10/061,016, filed on Jan. 30, 2002, now Pat. No. 6,833,516, and a continuation-in-part of application No. 09/500,346, filed on Feb. 8, 2000, now Pat. No. 6,442,504, application No. 10/940,881, which is a continuation-in-part of application No. 10/151,615, filed on May 20, 2002, now Pat. No. 6,820,897, which is a continuation-in-part of application No. 09/891,432, filed on Jun. 26, 2001, now Pat. No. 6,513,833, and a continuation-in-part of application No. 09/543,678, filed on Apr. 7, 2000, now Pat. No. 6,412,813, application No. 10/940,881, which is a continuation-in-part of application No. 10/365,129, filed on Feb. 12, 2003, now Pat. No. 7,134,687, which is a continuation-in-part of application No. 10/114,533, filed on Apr. 2, 2002, now Pat. No. 6,942,248, application No. 10/940,881, which is a continuation-in-part of application No. 10/413,426, filed on Apr. 14, 2003, now Pat. No. 7,415,126, and a continuation-in-part of application No. 10/234,436, filed on Sep. 3, 2002, now Pat. No. 6,757,602, and a continuation-in-part of application No. 10/227,781, filed on Aug. 26, 2002, now Pat. No. 6,792,342, and a continuation-in-part of application No. 10/151,615, filed on May 20, 2002, now Pat. No. 6,820,897, and a continuation-in-part of application No. 10/116,808, filed on Apr. 5, 2002, now Pat. No. 6,856,873, and a continuation-in-part of application No. 10/114,533, filed on Apr. 2, 2002, now Pat. No. 6,942,248, and a continuation-in-part of application No. 10/061,016, filed on Jan. 30, 2002, now Pat. No. 6,833,516, and a continuation-in-part of application No. 10/058,706, filed on Jan. 28, 2002, now Pat. No. 7,467,809, and a continuation-in-part of application No. 09/901,879, filed on Jul. 9, 2001, now Pat. No. 6,555,766, which is a continuation-in-part of application No. 09/853,118, filed on May 10, 2001, now Pat. No. 6,445,988, and a continuation-in-part of application No. 09/849,559, filed on May 4, 2001, now Pat. No. 6,689,962, and a continuation-in-part of application No. 09/838,920, filed on Apr. 20, 2001, now Pat. No. 6,778,672, and a continuation-in-part of application No. 09/765,559, filed on Jan. 19, 2001, now Pat. No. 6,553,296, which is a continuation-in-part of application No. 09/474,147, filed on Dec. 29, 1999, now Pat. No. 6,397,136, which is a continuation-in-part of application No. 09/437,535, filed on Nov. 10, 1999, now Pat. No. 6,712,387, which is a continuation-in-part of application No. 09/382,406, filed on Aug. 24, 1999, now Pat. No. 6,529,809, which is a continuation-in-part of application No. 08/919,823, filed on Aug. 28, 1997, now Pat. No. 5,943,295, which is a continuation-in-part of application No. 08/798,029, filed on Feb. 6, 1997, now abandoned, said application No. 09/382,406 , said application No. 10/413,426 is a continuation-in-part of application No. 10/302,105, filed on Nov. 22, 2002, now Pat. No. 6,772,057, which is a continuation-in-part of application No. 10/116,808, filed on Apr. 5, 2002, now Pat. No. 6,856,873, said application No. 10/413,426 is a continuation-in-part of application No. 10/365,129, filed on Feb. 12, 2003, now Pat. No. 7,134,687.

(Continued)

(56) References Cited

U.S. PATENT DOCUMENTS

| | | | | | |
|---|---|---|---|---|---|
| 4,315,249 | A | * | 2/1982 | Apple et al. | 340/825.52 |
| 4,750,197 | A | | 6/1988 | Denekamp et al. | |
| 4,802,114 | A | * | 1/1989 | Sogame | 703/23 |
| 4,912,463 | A | * | 3/1990 | Li | 340/825.69 |
| 5,086,385 | A | * | 2/1992 | Launey et al. | 700/83 |
| 5,278,547 | A | * | 1/1994 | Suman et al. | 340/5.22 |
| 5,619,190 | A | * | 4/1997 | Duckworth et al. | 340/5.25 |
| 5,646,608 | A | * | 7/1997 | Shintani | 340/825.52 |
| 5,699,055 | A | | 12/1997 | Dykema et al. | |
| 5,815,086 | A | | 9/1998 | Ivie et al. | |
| 5,903,226 | A | | 5/1999 | Suman et al. | |
| 5,917,433 | A | | 6/1999 | Keillor et al. | |
| 5,969,595 | A | | 10/1999 | Schipper et al. | |

6,005,508 A 12/1999 Tsui
6,069,570 A 5/2000 Herring
6,236,911 B1 5/2001 Kruger
6,308,083 B2 10/2001 King
6,429,810 B1 8/2002 De Roche
6,437,702 B1 8/2002 Ragland et al.
6,437,836 B1 * 8/2002 Huang et al. ................ 348/734
6,542,076 B1 * 4/2003 Joao .......................... 307/10.2
6,556,813 B2 4/2003 Tsui
6,681,110 B1 1/2004 Croockham et al.
6,812,829 B1 * 11/2004 Flick ..................... 340/426.13
6,826,514 B1 * 11/2004 Antico et al. ............... 702/188
6,914,893 B2 * 7/2005 Petite ......................... 370/338
2004/0110472 A1 6/2004 Witkowski et al.

* cited by examiner

Subject Classification

| Class | Instances | Weight Category | State |
|---|---|---|---|
| ES | Empty Seat | <10 lb | Empty |
| FFA | Normally Seated Adult | > 05 lb | Enable |
| FFC | Normally Seated Child | <10,105> lb | Enable |
| FFC | Normally Positioned Forward Facing Child Seat | <10,45> lb | Enable |
| OOP | Out-of-position Adult | >105 lb | Disable |
| OOP | Out-of-position Child | <105 lb | Disable |
| OOP | Out-of-position Forward Facing Child Seat | <10,45> lb | Disable |
| RFS | Rearward Facing Child Seat | <10,45> lb | Disable |
| RFS | Rearward Facing Infant Seat | <10,45> lb | Disable |

FIG. 76

Categorization of Human Subjects

| | Weight Range kg (lb) | Height Range m (in | | |
|---|---|---|---|---|
| **Child** | | <0.95,1 .1 5> (<3'1",3'9">) | <1.10,1.30> (<3'7",4'3">) | <1.25,1.45> (<4'1",4'9">) |
| | <11,25>(<24,55>) | C11 | C12 | C13 |
| | <22,36> (<48,79>) | C21 | C22 | C23 |
| | <33,47> (<73,103>) | C31 | C32 | C33 |
| **Adult** | | <1 .45, 1 .65> (<49,555') | <1 .60,1 .80> (<53,51 1 '5') | <1 .75, 1 .95> (<59,655') |
| | <45,70>('<99,154>) | A11 | A12 | A13 |
| | <65,90> (<143,198>) | A21 | A22 | A23 |
| | <85,110>(<187,242>) | A31 | A32 | A33 |

All Human Subjects are to wear light clothes (typically slacks and T-shirt) on entry.
Other types of clothing to be provided by ATI

Child Surrogates

| | | | | |
|---|---|---|---|---|
| **Doll** | | Baby=0.50m (approx. 20") | Infant=0.75m (approx. 30") | Child=1.20m (approx. 48") |

FIG. 77

Rearward Facing Infant Seats

| Designation | Child Seat | Attributes |
|---|---|---|
| Training | Arriva | base, hood |
| Independent | Assura565 | hood |
| Training | Baby-Safe | - |
| Training | Century 590 | base, hood |
| Training | Evenflo Discovery | base, Tbar |
| Training | Evenflo Joyride (new) | hood |
| Independent | Evenflo Joyride (old) | - |
| Training | GerryGuard | base |
| Validation | Kolcraft Travelabout | base, Tbar |
| Training | Rock-n-Ride | - |
| Training | TLC | - |

FIG. 78

Rearward Facing Child Seat

| Designation | Child Seat | Attributes |
|---|---|---|
| Training | Century1000 | - |
| Validation | Century 2000 STE | - |
| Training | CenturyOvation | - |
| Training | Century Smartmove 5T | table |
| Training | Champion | table |
| Training | Fisher Price Child Seat | table |
| Training | Touriva | - |
| Training | Ultara | table |
| Training | Vario Exclusive | table |

FIG. 79

Forward Facing Child and Booster Seats

| Designation | Child Seat | Attributes |
|---|---|---|
| Training | Centuryl000 | - |
| Validation | Century 2000 STE | - |
| Training | CenturyOvation | - |
| Validation | Century Smartmove 5T | table |
| Training | Champion | table |
| Validation | Fisher Price Booster | - |
| Training | Fisher Price Child Seat | table |
| Training | Gerry Booster | table |
| Training | Touriva | - |
| Training | Ultara | table |
| Training | Vario Exclusiv | table |

FIG. 80

Vehicle Configuration Series

| Con fig | Seat Track (+/1 .05") | | | | | | | | | | Seatback Recline (+/- 2°) | | | | | | | | | | Windows | | | | | | | | | |
|---|---|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 | 6 | 7 | 8 | 9 | 10 | 1 | 2 | 3 | 4 | 5 | 6 | 7 | 8 | 9 | 10 |
| A | 0 | 0 | 2 | 2 | 2 | 4 | 4 | 6 | 6 | 6 | 0 | 18 | 4 | 12 | 20 | 2 | 20 | 0 | 8 | 16 | D | D | U | U | D | D | U | U | D | D |
| B | 1 | 1 | 3 | 3 | 3 | 5 | 5 | 7 | 7 | 7 | 2 | 20 | 0 | 8 | 16 | 0 | 18 | 4 | 12 | 20 | U | U | D | D | U | U | D | D | U | U |
| C | 0 | 0 | 2 | 2 | 4 | 4 | 4 | 6 | 6 | 6 | 5 | 15 | 4 | 16 | 0 | 15 | 20 | 2 | 10 | 18 | U | U | D | D | U | U | D | D | U | U |
| D | 1 | 1 | 3 | 3 | 5 | 5 | 5 | 7 | 7 | 7 | 4 | 16 | 5 | 15 | 2 | 10 | 18 | 0 | 15 | 20 | D | D | U | U | D | D | U | U | D | D |
| E | 0 | 0 | 0 | 2 | 2 | 2 | 4 | 4 | 6 | 6 | 0 | 8 | 16 | 4 | 12 | 20 | 2 | 20 | 0 | 18 | D | D | U | U | D | D | U | U | D | D |
| F | 1 | 1 | 1 | 3 | 3 | 3 | 5 | 5 | 7 | 7 | 4 | 12 | 20 | 0 | 8 | 16 | 0 | 18 | 2 | 20 | U | U | D | D | U | U | D | D | U | U |
| G | 0 | 0 | 2 | 2 | 2 | 4 | 4 | 4 | 6 | 6 | 4 | 16 | 2 | 20 | 2 | 10 | 18 | 0 | 15 | 20 | U | U | D | D | U | U | D | D | U | U |
| H | 1 | 1 | 3 | 3 | 3 | 5 | 5 | 5 | 7 | 7 | 2 | 20 | 4 | 16 | 0 | 15 | 20 | 2 | 10 | 18 | D | D | U | U | D | D | U | U | D | D |

FIG. 81A

Vehicle Configuration Series

| Con fig | Visor | | | | | | | | | | Convertible Top | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 | 6 | 7 | 8 | 9 | 10 |
| A | U | D | U | D | S | U | D | U | D | S | U | U | U | U | U | D | D | D | D | D |
| B | D | U | D | U | S | D | U | D | U | S | D | D | D | D | D | U | U | U | U | U |
| C | U | D | S | U | D | U | D | S | U | D | D | D | D | D | D | U | U | U | U | U |
| D | D | U | S | D | U | D | U | S | D | U | U | U | U | U | U | D | D | D | D | D |
| E | D | U | D | S | D | U | D | S | U | D | U | U | U | U | U | D | D | D | D | D |
| F | U | D | U | S | D | U | D | S | U | D | D | D | D | D | D | U | U | U | U | U |
| G | U | S | D | U | D | U | D | U | S | D | D | D | D | D | D | U | U | U | U | U |
| H | D | S | U | D | U | D | U | D | S | U | U | U | U | U | U | D | D | D | D | D |

FIG. 81B

Sequence for Child Seat Training Data Collection:

Start object in center of the seat. Trainer has both hands on the steering wheel;

With a smooth motion, push the object fully outboard, then pull it fully inboard, then push it to center position, then put hands back on the steering wheel;

With a smooth motion, rotate the object 45 degrees outboard, the rotate 45 degrees inboard, then rotate back to center, then put hands back on the steering wheel;

Sequence for Out-of-Position Forward Facing Child Seat Training Data Collection

Start with object in the center line, leaning onto the Instrument Panel;

With a smooth motion, push the object fully outboard, then pull it fully inboard, then push it to the center;

Repeat this sequence with a 1 50 mm (6") gap between the object and the Instrument Panel; Apply small (+/- 10°) rotations.

Repeat this sequence with a 300 mm (12") gap between the object and the Instrument Panel; Apply small (+/- 10°) rotations.

FIG. 81C

Sequence for Human Subject Training Data Collection:

Lean forward and outboard such that head and/or shoulders touch the Fire line;
Gently traverse inboard while carefully following the Fire line until the center of the vehicle is reached;
Lean halfway back towards the seatback and traverse outboard up against the side window. Rotate torso while doing so;
Lean back into the seat and traverse inboard towards the center. Rotate torso while doing so;
Sit back in the seat; "operate" radio controls, glove box, window, or seat controls; assume a brace posture;
Do *not* cross the Fire line with head and/or shoulders at any time.

Sequence for Out-of-Position Human Subject Training Data Collection:

Lean forward and outboard such that head and/or shoulders touch the Instrument Panel;
Gently traverse inboard towards the center console;
Move back 150 mm (6") and gently traverse back to the most outboard position;
Move back 300 mm (12") and gently traverse back to the center console;
"Operate" radio controls and glovebox while head and/or shoulders remain in front of the Fire line.

FIG. 81D

Network Training Set Collection Matrix (Vehicle E)
Rev 1.1

| # | Class | Subject/Object | Attributes | Actions | Config. | Belt | Conditions |
|---|---|---|---|---|---|---|---|
| 1 | ES | None | None | Motions of track and recline | (A) | N.A. | Ambient |
| 2 | FFA | A22 | Medium Clothes, Magazine | Motions in safe seating area | B | Yes | Ambient |
| 3 | OOP | A22 | Medium Clothes | Motions in NFZ | C | No | Ambient |
| 4 | FFC | Century 1000 | Infant Doll | Motions in safe seating area | D | No | Ambient |
| 5 | RFS | Century 1000 | Baby Doll | Motions in entire seating area | E | No | Ambient |
| 6 | ES | None | Beaded Cover | Motions of track and recline | (F) | N.A. | Ambient |
| 7 | FFA | A11 | Medium Clothes | Motions in safe seating area | G | Yes | Ambient |
| 8 | OOP | Touriva | Infant Doll, Blanket | Motions in NFZ | H | No | Ambient |
| 9 | FFC | Touriva | Infant Doll, Blanket | Motions in safe seating area | A | No | Ambient |
| 10 | RFS | Century 590 | Baby Doll, Hood | Motions in entire seating area | B | No | Ambient |
| 11 | ES | None | Fabric Cover | Motions of track and recline | (C) | N.A. | Ambient |
| 12 | FFA | A33 | Medium Clothes, Newspaper | Motions in safe seating area | D | No | Ambient |
| 13 | OOP | A33 | Medium Clothes | Motions in NFZ | E | Yes | Ambient |
| 14 | FFC | C22 | Medium Clothes | Motions in safe seating area | F | No | Ambient |
| 15 | RFS | Touriva | Baby Doll, Blanket | Motions in entire seating area | G | No | Ambient |
| 16 | ES | None | Blanket | Motions of track and recline | (H) | N.A. | Ambient |
| 17 | FFA | A21 | Heavy Clothes | Motions in safe seating area | A | No | Ambient |
| 18 | OOP | C11 | Heavy Clothes | Motions in NFZ (standing) | B | No | Ambient |
| 19 | FFC | C11 | Heavy Clothes | Motions in safe seating area | C | No | Ambient |

FIG. 82A

| | | | | | | | |
|---|---|---|---|---|---|---|---|
| 20 | RFS | TLC | Baby Doll | Motions in entire seating area | D | No | Ambient |
| 21 | ES | None | None | Motions of track and recline | (E) | N.A. | Solar Heat |
| 22 | FFA | A12 | Light Clothes, Magazine | Motions in safe seating area | F | Yes | Solar Heat |
| 23 | OOP | A12 | Light Clothes | Motions in NFZ | G | No | Solar Heat |
| 24 | FFC | Champion | Infant Doll | Motions in safe seating area | H | No | Solar Heat |
| 25 | RFS | Champion | Baby Doll | Motions in entire seating area | A | No | Solar Heat |
| 26 | ES | None | Beaded Cover | Motions of track and recline | (B) | N.A. | Solar Heat |
| 27 | FFA | A23 | Light Clothes | Motions in safe seating area | C | Yes | Solar Heat |
| 28 | OOP | Vario Exclusive | Child Doll | Motions in NFZ | D | No | Solar Heat |
| 29 | FFC | Vario Exclusive | Child Doll, Blanket | Motions in safe seating area | E | No | Solar Heat |
| 30 | RFS | Joyride (new) | Baby Doll | Motions in entire seating area | F | No | Solar Heat |
| 31 | ES | None | Fabric Cover | Motions of track and recline | (G) | N.A. | Solar Heat |
| 32 | FFA | A32 | Light Clothes, Newspaper | Motions in safe seating area | H | No | Solar Heat |
| 33 | OOP | A32 | Light Clothes | Motions in NFZ | A | Yes | Solar Heat |
| 34 | FFC | C33 | Light Clothes | Motions in safe seating area | B | No | Solar Heat |
| 35 | RFS | Ultara | Baby Doll, Blanket | Motions in entire seating area | C | No | Solar Heat |
| 36 | ES | None | Blanket | Motions of track and recline | (D) | N.A. | Solar Heat |
| 37 | FFA | A22 | Medium Clothes | Motions in safe seating area | E | No | Solar Heat |
| 38 | OOP | C21 | Medium Clothes | Motions in NFZ | F | No | Solar Heat |
| 39 | FFC | C21 | Medium Clothes | Motions in safe seating area | G | No | Solar Heat |
| 40 | RFS | Arriva | Baby Doll, Hood | Motions in entire seating area | H | No | Solar Heat |
| 41 | ES | None | Handbag | Motions of track and recline | (H) | N.A. | Ambient |
| 42 | FFA | A11 | Heavy Clothes, Magazine | Motions in safe seating area | G | Yes | Ambient |

FIG. 82B

| | | | | | | | |
|---|---|---|---|---|---|---|---|
| 43 | OOP | A11 | Heavy Clothes | Motions in NFZ | F | No | Ambient |
| 44 | FFC | Gerry Booster | Infant Doll | Motions in safe seating area | E | No | Ambient |
| 45 | RFS | Fisher Price CS | Baby Doll | Motions in entire seating area | D | No | Ambient |
| 46 | ES | None | Beaded Cover, Handbag | Motions of track and recline | (C) | N.A. | Ambient |
| 47 | FFA | A33 | Heavy Clothes | Motions in safe seating area | B | Yes | Ambient |
| 48 | OOP | Ultara | Inflant Doll, Blanket | Motions in NFZ | A | No | Ambient |
| 49 | FFC | Ultara | Inflant Doll, Blanket | Motions in safe seating area | H | No | Ambient |
| 50 | RFS | Baby Safe | Baby Doll, Handle up | Motions in entire seating area | G | No | Ambient |
| 51 | ES | None | Fabric Cover, Handbag | Motions of track and recline | (F) | N.A. | Ambient |
| 52 | FFA | A21 | Heavy Clothes, Newspaper | Motions in safe seating area | E | No | Ambient |
| 53 | OOP | A21 | Heavy Clothes | Motions in NFZ | D | Yes | Ambient |
| 54 | FFC | C12 | Heavy Clothes | Motions in safe seating area | C | No | Ambient |
| 55 | RFS | Vario Exclusive | Baby Doll, Blanket | Motions in entire seating area | B | No | Ambient |
| 56 | ES | None | Blanket, Handbag | Motions of track and recline | (A) | N.A. | Ambient |
| 57 | FFA | A12 | Rain Clothes | Motions in safe seating area | H | No | Ambient |
| 58 | OOP | C23 | Rain Clothes | Motions in NFZ | G | No | Ambient |
| 59 | FFC | C23 | Rain Clothes | Motions in safe seating area | F | No | Ambient |
| 60 | RFS | Rock'n'Ride | Baby Doll | Motions in entire seating area | E | No | Ambient |
| 61 | ES | None | None | Motions of track and recline | (D) | N.A. | Air Conditioner |
| 62 | FFA | A23 | Light Clothes, Magazine | Motions in safe seating area | C | Yes | Air Conditioner |

FIG. 82C

| | | | | | | | |
|---|---|---|---|---|---|---|---|
| 63 | OOP | A23 | Light Clothes | Motions in NFZ | B | No | Air Conditioner |
| 64 | FFC | Century Ovation | Inflant Doll | Motions in safe seating area | A | No | Air Conditioner |
| 65 | RFS | Century Ovation | Baby Doll | Motions in entire seating area | H | No | Air Conditioner |
| 66 | ES | None | Beaded Cover | Motions of track and recline | (G) | N.A. | Air Conditioner |
| 67 | FFA | A32 | Light Clothes | Motions in safe seating area | F | Yes | Air Conditioner |
| 68 | OOP | Fisher Price CS | Child Doll | Motions in NFZ | E | No | Air Conditioner |
| 69 | FFC | Fisher Price CS | Child Doll, Blanket | Motions in safe seating area | D | No | Air Conditioner |
| 70 | RFS | Gerry Guard | Baby Doll | Motions in entire seating area | C | No | Air Conditioner |
| 71 | ES | None | Fabric Cover | Motions of track and recline | (B) | N.A. | Air Conditioner |
| 72 | FFA | A22 | Light Clothes, Newspaper | Motions in safe seating area | A | No | Air Conditioner |
| 73 | OOP | A22 | Light Clothes | Motions in NFZ | H | Yes | Air Conditioner |
| 74 | FFC | C32 | Light Clothes | Motions in safe seating area | G | No | Air Conditioner |
| 75 | RFS | Smartmove 5T | Baby Doll, Blanket | Motions in entire seating area | F | No | Air Conditioner |
| 76 | ES | None | Blanket | Motions of track and recline | (E) | N.A. | Air Conditioner |
| 77 | FFA | A11 | Medium Clothes | Motions in safe seating area | D | No | Air Conditioner |
| 78 | OOP | C22 | Medium Clothes | Motions in NFZ | C | No | Air Conditioner |
| 79 | FFC | C22 | Medium Clothes | Motions in safe seating area | B | No | Air Conditioner |
| 80 | RFS | Discovery | Baby Doll, Handle up | Motions in entire seating area | A | No | Air Conditioner |
| 81 | ES | None | Pizza Box | Motions of track and recline | (B) | N.A. | Ambient |
| 82 | FFA | A33 | Rain Clothes, Magazine | Motions in safe seating area | A | Yes | Ambient |
| 83 | OOP | A33 | Rain Clothes | Motions in NFZ | D | Yes | Ambient |
| 84 | FFC | Champion | Infant Doll | Motions in safe seating area | C | No | Ambient |

FIG. 82D

| | | | | | | | |
|---|---|---|---|---|---|---|---|
| 85 | RFS | Champion | Baby Doll | Motions in entire seating area | F | No | Ambient |
| 86 | ES | None | Beaded Cover, Pizza Box | Motions of track and recline | (E) | N.A. | Ambient |
| 87 | FFA | A21 | Rain Clothes | Motions in safe seating area | H | Yes | Ambient |
| 88 | OOP | Vario Exclusive | Child Doll, Blanket | Motions in NFZ | G | No | Ambient |
| 89 | FFC | Vario Exclusive | Child Doll, Blanket | Motions in safe seating area | B | No | Ambient |
| 90 | RFS | Joyride (new) | Baby Doll, Hood | Motions in entire seating area | A | No | Ambient |
| 91 | ES | None | Fabric Cover, Pizza Box | Motions of track and recline | (D) | N.A. | Ambient |
| 92 | FFA | A12 | Rain Clothes, Newspaper | Motions in safe seating area | C | No | Ambient |
| 93 | OOP | A12 | Rain Clothes | Motions in NFZ | F | No | Ambient |
| 94 | FFC | C23 | Rain Clothes | Motions in safe seating area | E | No | Ambient |
| 95 | RFS | Ultara | Baby Doll, Blanket | Motions in entire seating area | H | No | Ambient |
| 96 | ES | None | Blanket, Pizza Box | Motions of track and recline | (G) | N.A. | Ambient |
| 97 | FFA | A23 | Light Clothes | Motions in safe seating area | B | No | Ambient |
| 98 | OOP | C32 | Light Clothes | Motions in NFZ | A | No | Ambient |
| 99 | FFC | C32 | Light Clothes | Motions in safe seating area | D | No | Ambient |
| 100 | RFS | Arriva | Baby Doll, Hood | Motions in entire seating area | C | No | Ambient |
| 101 | ES | None | None | Motions of track and recline | (F) | N.A. | Car Heat |
| 102 | FFA | A32 | Light Clothes, Magazine | Motions in safe seating area | E | Yes | Car Heat |
| 103 | OOP | A32 | Light Clothes | Motions in NFZ | H | Yes | Car Heat |
| 104 | FFC | Century 1000 | Infant Doll | Motions in safe seating area | G | No | Car Heat |
| 105 | RFS | Century 1000 | Baby Doll | Motions in entire seating area | B | No | Car Heat |
| 106 | ES | None | Beaded Cover | Motions of track and recline | (A) | N.A. | Car Heat |

FIG. 82E

| | | | | | | | |
|---|---|---|---|---|---|---|---|
| 107 | FFA | A22 | Rain Clothes | Motions in safe seating area | D | Yes | Car Heat |
| 108 | OOP | Vario Exclusive | Inflant Doll | Motions in NFZ | C | No | Car Heat |
| 109 | FFC | Touriva | Inflant Doll, Blanket | Motions in safe seating area | F | No | Car Heat |
| 110 | RFS | Century 590 | Baby Doll | Motions in entire seating area | E | No | Car Heat |
| 111 | ES | None | Fabric Cover | Motions of track and recline | (H) | N.A. | Car Heat |
| 112 | FFA | A11 | Light Clothes, Newspaper | Motions in safe seating area | G | No | Car Heat |
| 113 | OOP | A11 | Light Clothes | Motions in NFZ | B | No | Car Heat |
| 114 | FFC | C32 | Light Clothes | Motions in safe seating area | A | No | Car Heat |
| 115 | RFS | Touriva | Baby Doll, Blanket | Motions in entire seating area | D | No | Car Heat |
| 116 | ES | None | Blanket | Motions of track and recline | (C) | N.A. | Car Heat |
| 117 | FFA | A33 | Heavy Clothes | Motions in safe seating area | F | No | Car Heat |
| 118 | OOP | C22 | Heaby Clothes | Motions in NFZ | E | No | Car Heat |
| 119 | FFC | C22 | Heavy Clothes | Motions in safe seating area | H | No | Car Heat |
| 120 | RFS | TLC | Baby Doll | Motions in entire seating area | G | No | Car Heat |
| 121 | ES | None | Attaché Case (flat) | Motions of track and recline | (G) | N.A. | Ambient |
| 122 | FFA | A21 | Heavy Clothes, Magazine | Motions in safe seating area | H | Yes | Ambient |
| 123 | OOP | A21 | Heavy Clothes | Motions in NFZ | E | Yes | Ambient |
| 124 | FFC | Century Ovation | Infant Doll | Motions in safe seating area | F | No | Ambient |
| 125 | RFS | Century Ovation | Baby Doll | Motions in entire seating area | C | No | Ambient |
| 126 | ES | None | Beaded Cover, Attaché Case | Motions of track and recline | (D) | N.A. | Ambient |
| 127 | FFA | A12 | Rain Clothes | Motions in safe seating area | A | Yes | Ambient |
| 128 | OOP | Fisher Price CS | Inflant Doll, Blanket | Motions in NFZ | B | No | Ambient |

FIG. 82F

| | | | | | | | |
|---|---|---|---|---|---|---|---|
| 129 | FFC | Fisher Price CS | Inflant Doll | Motions in safe seating area | G | No | Ambient |
| 130 | RFS | Gerry Guard | Baby Doll, Handle up | Motions in entire seating area | H | No | Ambient |
| 131 | ES | None | Fabric Cover, Attaché Case | Motions of track and recline | (E) | N.A. | Ambient |
| 132 | FFA | A23 | Heavy Clothes, Newspaper | Motions in safe seating area | F | No | Ambient |
| 133 | OOP | A23 | Heavy Clothes | Motions in NFZ | C | No | Ambient |
| 134 | FFC | C11 | Heavy Clothes | Motions in safe seating area | D | No | Ambient |
| 135 | RFS | Smartmove 5T | Baby Doll, Blanket | Motions in entire seating area | A | No | Ambient |
| 136 | ES | None | Blanket, Attaché Case | Motions of track and recline | (B) | N.A. | Ambient |
| 137 | FFA | A32 | Rain Clothes | Motions in safe seating area | G | No | Ambient |
| 138 | OOP | C33 | Rain Clothes | Motions in NFZ | H | No | Ambient |
| 139 | FFC | C33 | Rain Clothes | Motions in safe seating area | E | No | Ambient |
| 140 | RFS | Discovery | Baby Doll, Handle up | Motions in entire seating area | F | No | Ambient |
| 141 | ES | None | Hand Bag | Motions of track and recline | (C) | N.A. | Solar Heat |
| 142 | FFA | A22 | Medium Clothes, Magazine | Motions in safe seating area | D | Yes | Solar Heat |
| 143 | OOP | A22 | Heavy Clothes | Motions in NFZ | A | Yes | Solar Heat |
| 144 | FFC | Gerry Booster | Child Doll | Motions in safe seating area | B | No | Solar Heat |
| 145 | RFS | Fisher Price CS | Baby Doll | Motions in entire seating area | G | No | Solar Heat |
| 146 | ES | None | Beaded Cover, Hand Bag | Motions of track and recline | (H) | N.A. | Solar Heat |

FIG. 82G

| | | | | | | | |
|---|---|---|---|---|---|---|---|
| 147 | FFA | A11 | Medium Clothes | Motions in safe seating area | E | Yes | Solar Heat |
| 148 | OOP | Vario Exclusive | Inflant Doll | Motions in NFZ | F | No | Solar Heat |
| 149 | FFC | Ultara | Inflant Doll, Blanket | Motions in safe seating area | C | No | Solar Heat |
| 150 | RFS | Baby Safe | Baby Doll | Motions in entire seating area | D | No | Solar Heat |
| 151 | ES | None | Fabric Cover, Hand Bag | Motions of track and recline | (A) | N.A. | Solar Heat |
| 152 | FFA | A33 | Medium Clothes, Newspaper | Motions in safe seating area | B | No | Solar Heat |
| 153 | OOP | A33 | Medium Clothes | Motions in NFZ | G | No | Solar Heat |
| 154 | FFC | C33 | Medium Clothes | Motions in safe seating area | H | No | Solar Heat |
| 155 | RFS | Vario Exclusive | Baby Doll, Blanket | Motions in entire seating area | E | No | Solar Heat |
| 156 | ES | None | Blanket, Hand Bag | Motions of track and recline | (F) | N.A. | Solar Heat |
| 157 | FFA | A21 | Light Clothes | Motions in safe seating area | C | No | Solar Heat |
| 158 | OOP | C21 | Light Clothes | Motions in NFZ | D | No | Solar Heat |
| 159 | FFC | C21 | Light Clothes | Motions in safe seating area | A | No | Solar Heat |
| 160 | RFS | Rock'n'Ride | Baby Doll | Motions in entire seating area | B | No | Solar Heat |

FIG. 82H

Network Independent Test Set Collection Matrix (Vehicle E)

Rev 1.1 ( Under Construction )

| # | Class | Subject/ Object | Attributes | Actions | Config. | Belt | Conditions |
|---|---|---|---|---|---|---|---|
| 1 | ES | | | Motions of track and recline | (A) | N.A. | Ambient |
| 2 | FFA | | | Motions in safe seating area | B | Yes | Ambient |
| 3 | OOP | | | Motions in NFZ | C | No | Ambient |
| 4 | FFC | | | Motions in safe seating area | D | No | Ambient |
| 5 | RFS | | | Motions in entire seating area | E | No | Ambient |
| 6 | ES | | | Motions of track and recline | (F) | N.A. | Ambient |
| 7 | FFA | | | Motions in safe seating area | G | Yes | Ambient |
| 8 | OOP | | | Motions in NFZ | H | No | Ambient |
| 9 | FFC | | | Motions in safe seating area | A | No | Ambient |
| 10 | RFS | | | Motions in entire seating area | B | No | Ambient |
| 11 | ES | | | Motions of track and recline | (C) | N.A. | Ambient |
| 12 | FFA | | | Motions in safe seating area | D | No | Ambient |
| 13 | OOP | | | Motions in NFZ | E | Yes | Ambient |
| 14 | FFC | | | Motions in safe seating area | F | No | Ambient |
| 15 | RFS | | | Motions in entire seating area | G | No | Ambient |
| 16 | ES | | | Motions of track and recline | (H) | N.A. | Ambient |
| 17 | FFA | | | Motions in safe seating area | A | No | Ambient |
| 18 | OOP | | | Motions in NFZ (standing) | B | No | Ambient |
| 19 | FFC | | | Motions in safe seating area | C | No | Ambient |
| 20 | RFS | | | Motions in entire seating area | D | No | Ambient |

FIG. 83

CHARACTERISTICS OF THE DATA SETS

| DATA SET | CONFIGURATIONS | SETUPS | VECTORS |
|---|---|---|---|
| TRAINING | 130 | 1300 | 650,000 |
| INDEPENDENT TEST | 130 | 1300 | 195,000 |
| VALIDATION | 100 | 100 | 15,000 |

FIG. 84

DISTRIBUTION OF MAIN TRAINING SUBJECTS

| OCCUPANCY | REPRESENTATION |
| --- | --- |
| EMPTY SEAT | 10 % |
| HUMAN OCCUPANT | 32 % |
| CHILD SEAT | 58 % |

FIG. 85

CHILD SEAT DISTRIBUTION

| CHILD SEAT CONFIGURATION | REPRESENTATION |
|---|---|
| FORWARD FACING CHILD SEAT | 40 % |
| FORWARD FACING CHILD SEAT OUT - OF-POSITION | 4 % |
| REARWARD FACING CHILD SEAT | 27 % |
| REARWARD FACING INFANT SEAT | 29 % |

FIG. 86

DISTRIBUTION OF ENVIRONMENTAL CONDITIONS

| ENVIRONMENTAL CONDITION | REPRESENTATION |
|---|---|
| AMBIENT | 56 % |
| STATIC HEAT (SOLAR LAMP) | 25 % |
| DYNAMIC HEAT (CAR HEAT) | 13 % |
| DYNAMIC COOLING (CAR A C) | 6 % |

FIG. 87

VALIDATION DATA DISTRIBUTION

| OCCUPANCY | REPRESENTATION |
| --- | --- |
| EMPTY SEAT | 8 % |
| HUMAN OCCUPANT | 39 % |
| CHILD SEAT | 53 % |

FIG. 88

HUMAN SUBJECT DISTRIBUTION

| HUMAN OCCUPANT | REPRESENTATION | NORMALLY SEATED | OUT-OF-POSITION |
|---|---|---|---|
| CHILD AGE 3 | 15 % | 50 % | 50 % |
| CHILD AGE 6 | 15 % | 50 % | 50 % |
| ADULT 5 TH PERCENTILE FEMALE | 23 % | 67 % | 33 % |
| ADULT 50 TH PERCENTILE MALE | 23 % | 67 % | 33 % |
| ADULT 95 TH PERCENTILE MALE | 23 % | 67 % | 33 % |

FIG. 89

CHILD SEAT DISTRIBUTION

| CHILD SEAT CONFIGURATION | REPRESENTATION |
|---|---|
| FORWARD FACING CHILD SEAT | 11 % |
| FORWARD FACING BOOSTER SEAT | 11 % |
| REARWARD FACING CHILD SEAT | 38 % |
| REARWARD FACING INFANT SEAT | 40 % |

FIG. 90

DISTRIBUTION OF ENVIRONMENTAL CONDITIONS

| ENVIRONMENTAL CONDITION | REPRESENTATION |
|---|---|
| AMBIENT | 63 % |
| STATIC HEAT (SOLAR LAMP) | 13 % |
| DYNAMIC HEAT (CAR HEAT) | 12 % |
| DYNAMIC COOLING (CAR AIR CONDITIONER) | 12 % |

FIG. 91

TRANSDUCER VOLUME

| TRANSDUCER | STARTING POINT | | | END POINT | | |
|---|---|---|---|---|---|---|
| | SAMPLE | TIME (MS) | DISTANCE (MM) | SAMPLE | TIME (MS) | DISTANCE (MM) |
| A | 5 | 0.83 | 142 | 29 | 4.84 | 822 |
| B | 3 | 0.50 | 85 | 35 | 5.84 | 992 |
| C | 7 | 1.17 | 198 | 34 | 5.67 | 964 |
| H | 2 | 0.33 | 57 | 32 | 5.34 | 907 |

FIG. 92

BASELINE NETWORK PERFORMANCE

| | |
|---|---|
| SELF TEST SUCCESS RATE | 95.3 % |
| INDEPENDENT TEST SUCCESS RATE | 94.5 % |
| VALIDATION TEST SUCCESS RATE | 92.7 % |

FIG. 93

PERFORMANCE PER OCCUPANCY SUBSET

| OCCUPANCY | INDEPENDENT TEST |
|---|---|
| EMPTY SEAT | 96.1 % |
| NORMALLY SEATED ADULT | 92.1 % |
| REARWARD FACING<br>CHILD/INFANT SEAT | 94.1 % |
| FORWARD FACING CHILD SEAT | 96.9 % |
| OUT-OF-POSITION HUMAN/FFCS | 93.0 % |

FIG. 94

PERFORMANCE PER ENVIRONMENTAL CONDITIONS SUBSET

| ENVIRONMENTAL CONDITION | INDEPENDENT TEST |
|---|---|
| AMBIENT | 95.4 % |
| LONG TERM HEAT (LAMP HEAT) | 95.2 % |
| SORT TERM HEATING/COOLING (HVAC) | 93.5 % |

FIG. 95

NORMALIZATION STUDY RESULTS

| NORMALIZATION METHOD | SELF TEST | INDEPENDENT TEST | VALIDATION TEST |
|---|---|---|---|
| A. WHOLE VECTOR (BASE) | 95.3 % | 94.5 % | 92.7 % |
| B. PER CHANNEL | 94.9 % | 93.8 % | 90.3 % |
| C. FIXED RANGE [0,4095] | 95.6 % | 90.3 % | 88.3 % |

FIG. 97

LOW THRESHOLD FILTER STUDY RESULTS

| THRESHOLD LEVEL | SELF TEST | INDEPENDENT TEST | VALIDATION TEST |
|---|---|---|---|
| NONE (BASE) | 95.3 % | 94.5 % | 92.7 % |
| 5% OF 4095 | 95.3 % | 94.4 % | 91.9 % |
| 10% OF 4095 | 95.3 % | 94.3 % | 92.5 % |
| 20% OF 4095 | 95.1 % | 94.2 % | 86.4 % |

FIG. 98

(1) The original image.
(2) Result from contrast enhancement.
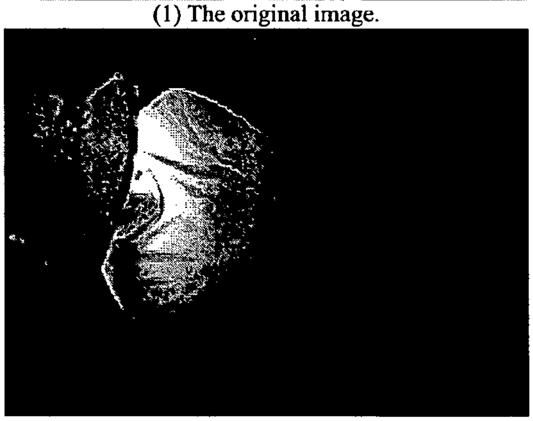
(3) Result from pixel transfer filter.
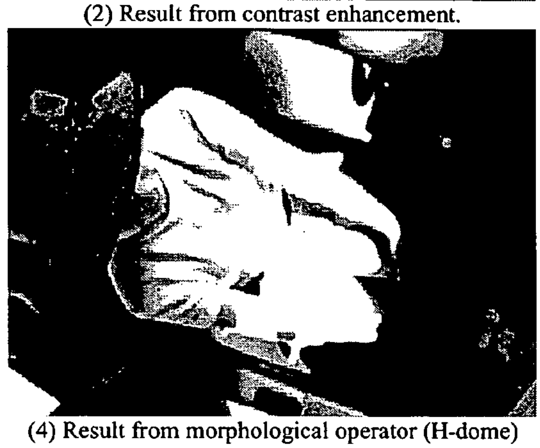
(4) Result from morphological operator (H-dome) followed by contrast enhancement.
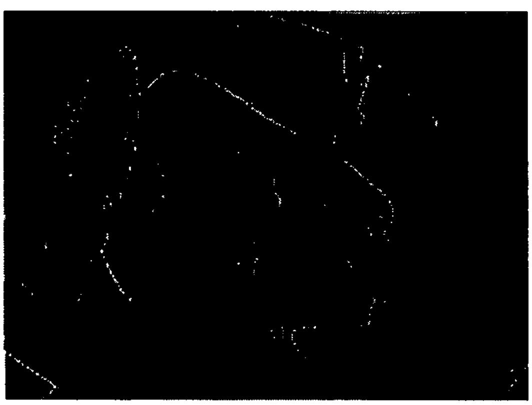
(5) Result from 3×3 Laplacian filter.
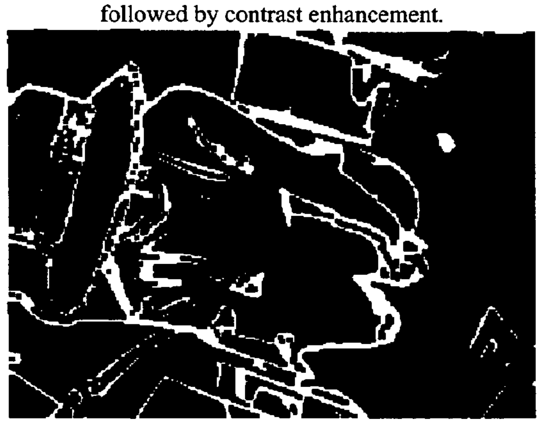
(6) Result from 3×3 Gaussian filter followed by max Kirsch filter, binarization, and morphological erosion.
FIG. 99

(1) 0°-edges.
(2) 180°-edges.
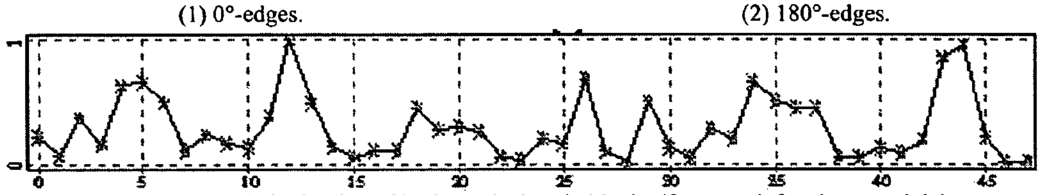
(3) Normalized distribution of horizontal edges in blocks (from top-left to bottom-right).
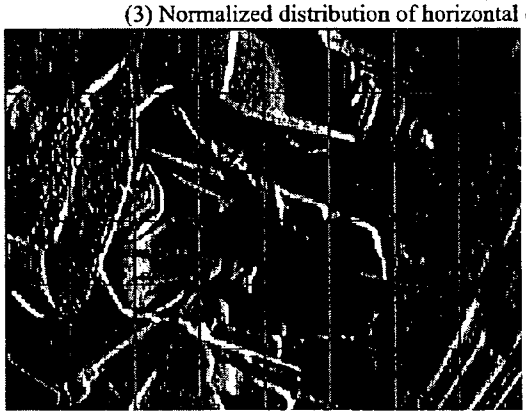
(4) 90°-edges.
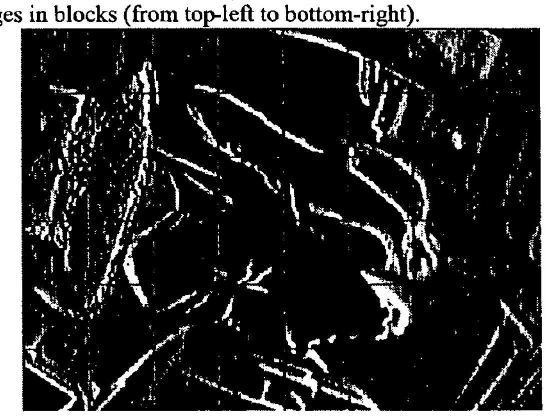
(5) 270°-edges.
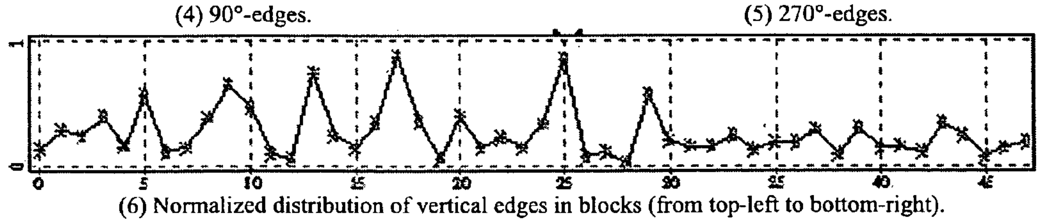
(6) Normalized distribution of vertical edges in blocks (from top-left to bottom-right).
FIG. 101

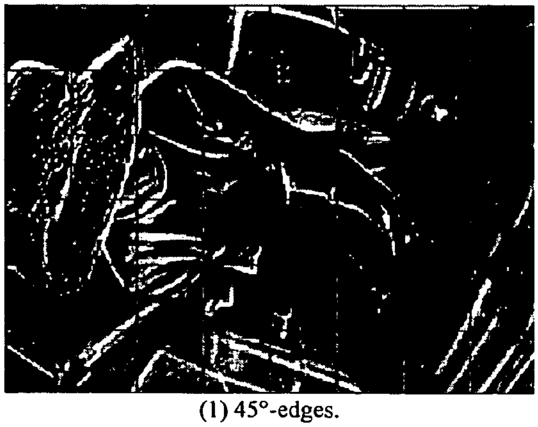
(1) 45°-edges.
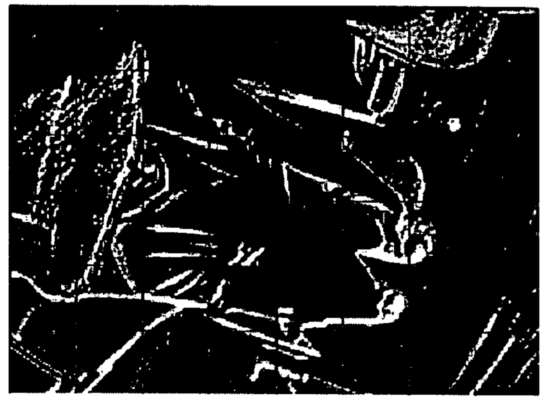
(2) 225°-edges.
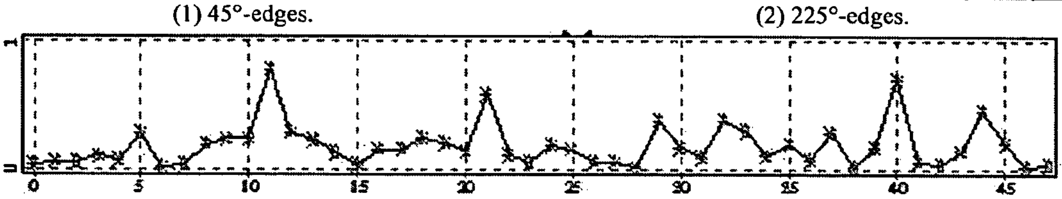
(3) Normalized distribution of 45°/225°-edges in blocks (from top-left to bottom-right).
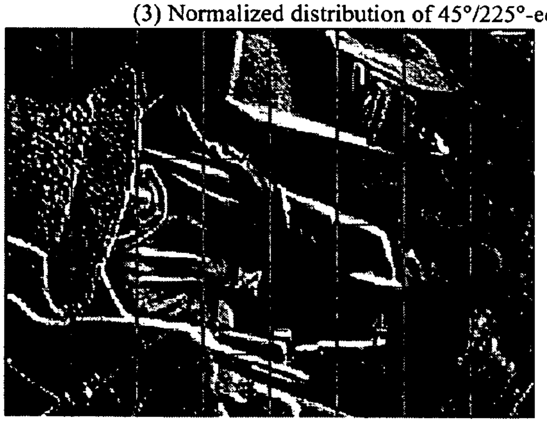
(4) 135°-edges.
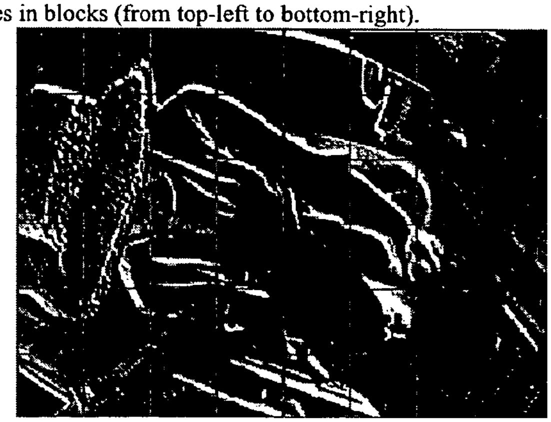
(5) 315°-edges.
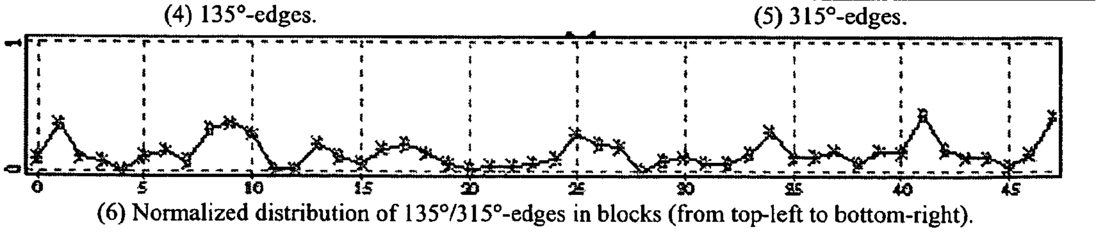
(6) Normalized distribution of 135°/315°-edges in blocks (from top-left to bottom-right).
FIG. 102

| Vehicle Configuration | Occupant | Child Restraint | Lighting Condition |
|---|---|---|---|
| ▪Seat track position<br>▪Seatback recline position<br>▪Other interior fixture configurations (such console, glove box, seatbelt, etc.) | ▪Height<br>▪Weight<br>▪Clothing<br>▪Hair and facial hair<br>▪Skin tone<br>▪Seating position<br>▪Personal objects | ▪NHTSA FMVSS208 approved 11 rear-facing child restraints, 7 forward-facing child restraints, and 4 booster seats. | ▪Nighttime condition<br>▪Sunlight at different time of the day and/or different vehicle orientation<br>▪Dome light<br>▪Door light<br>▪Headlight from other vehicle |

FIG. 104

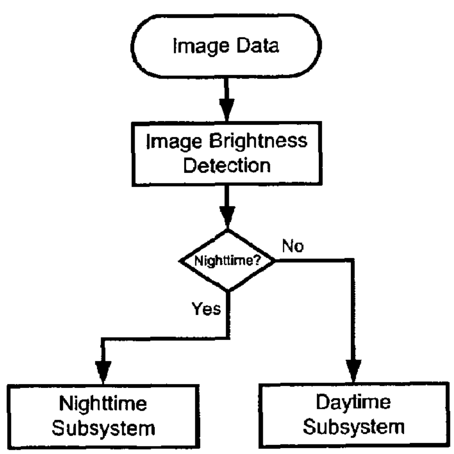

FIG. 105

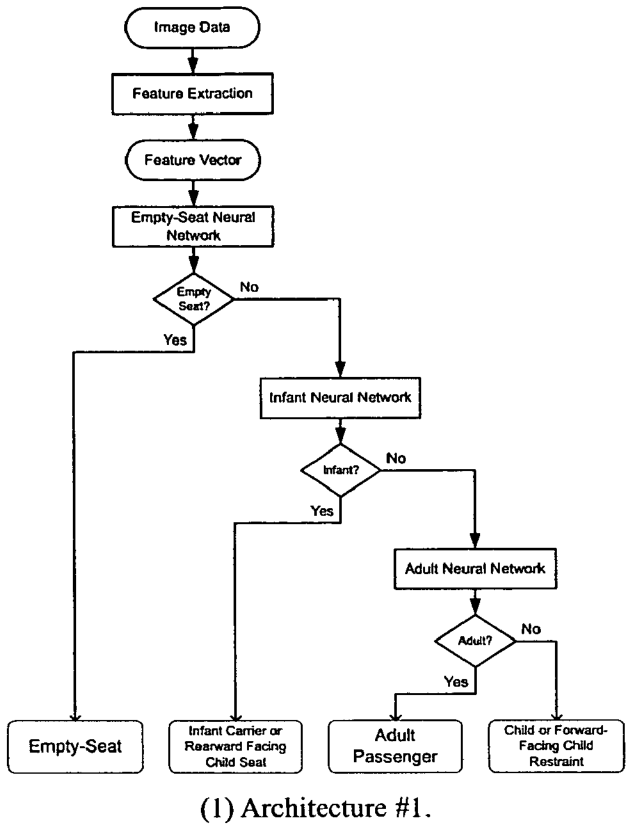
(1) Architecture #1.
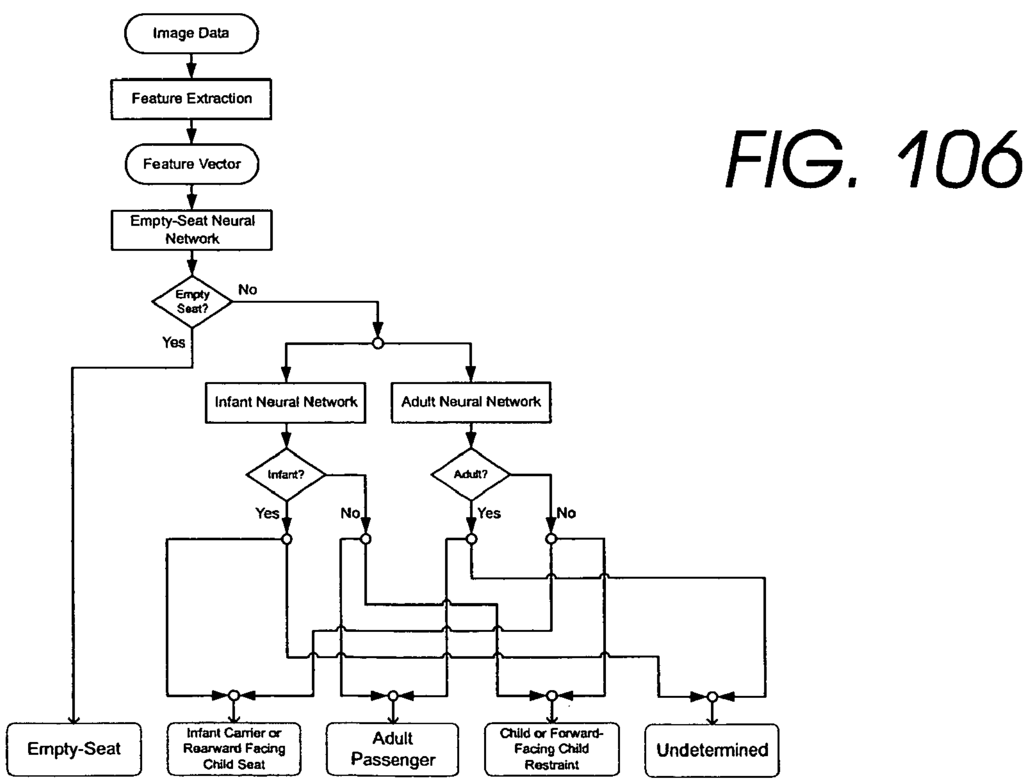
(2) Architecture #2.
FIG. 106

- Generic digital filter
- Kalman filter
- Median filter
- ATI's post-decision filter

| | |
|---|---|
| **Empty-Seat State** | The system starts from Empty-Seat State, and returns to Empty-Seat State every time when the incoming classification becomes empty-seat. |
| **Transition State** | The system is allowed to change classification freely in Transition State. |
| **Revoking State** | Classification change is more restricted in Revoking State. The system is allowed to change classification only if the new classification lasts longer than the old one. |
| **Classified State** | In classified State, classification change is either prohibited, or allowed only after the new classification has lasted for a very very long time. |

FIG. 110

| | |
|---|---|
| **Path #1** | The system moves from Empty-Seat State to Transition State if the incoming classification is not empty-seat. The system moves from Transition State to Empty-Seat State if the incoming classification becomes empty-seat. |
| **Path #2** | The system moves from Transition State to Revoking State if the incoming classification lasts more than certain amount of time ($T_1$) without toggling. |
| **Path #3** | The system moves from Revoking State to Empty-Seat State if the incoming classification becomes empty-seat. |
| **Path #4** | The system moves from Revoking State to Classified State if the incoming classification lasts more than certain amount of time ($T_2$) without toggling. Usually $T_2 >> T_1$. |
| **Path #5** | The system moves from Classified State to Empty-Seat State if the incoming classification becomes empty-seat. |

FIG. 111

| Adult | Child and Forward-Facing Child Restraint | Infant Carrier and Rearward-Facing Child Seat | Empty Seat |
|---|---|---|---|
| 37.24% | 21.60% | 35.43% | 5.73% |

FIG. 112

| | | Empty-Seat Network | Infant Network | Adult Network |
|---|---|---|---|---|
| Network Name | | R174ES05 | R174RS01 | R174AD02 |
| Network Structure | | 300x3x1 | 300x10x7x1 | 300x15x10x1 |
| Success Rate | Adult | 99.97% | 98.85% | 97.80% |
| | Child & FFCS | 98.50% | 99.47% | 98.57% |
| | Infant Carrier & RFCS | 100% | 99.43% | 98.93% |
| | Empty Seat | 99.98% | 100% ‡ | 99.60% |

FIG. 113

| | | Classified As | | | | |
|---|---|---|---|---|---|---|
| | | Adult | Child & FFCS | Infant Carrier & RFCS | Empty Seat | Undetermined |
| Targ et Class | Adult | **96.97%** | 1.86% | 0.33% | 0.03% | 0.81% |
| | Child & FFCS | 1.43% | **96.55%** | 0.52% | 1.50% | 0% |
| | Infant Carrier & RFCS | 0.17% | 0.40% | **98.53%** | 0% | 0.90% |
| | Empty Seat | 0.02% | 0% | 0% | **99.98%** | 0% |

FIG. 114

| Adult | Child and Forward-Facing Child Restraint | Infant Carrier and Rearward-Facing Child Seat | Empty Seat |
|---|---|---|---|
| 33.33% | 13.33% | 33.33% | 20.00% |

FIG. 115

| | | Empty-Seat Network | Adult Network |
|---|---|---|---|
| Network Name | | R172ES01 | R172CS03 |
| Network Structure | | 340×7×5×1 | 340×20×15×1 |
| Success Rate | Empty Seat | 99.32% | — |
| | Adult | 99.09% | 98.20% |
| | Child & Child Restraint | 99.44% | 99.27% |

FIG. 116

| | | Classified As | | |
|---|---|---|---|---|
| | | Empty Seat | Adult | Child & Child Restraint |
| Target Class | Empty Seat | **99.32%** | 0.67% | 0.01% |
| | Adult | 0.91% | **97.74%** | 1.35% |
| | Child & Child Restraint | 0.56% | 0.69% | **98.75%** |

FIG. 117

Prior Art

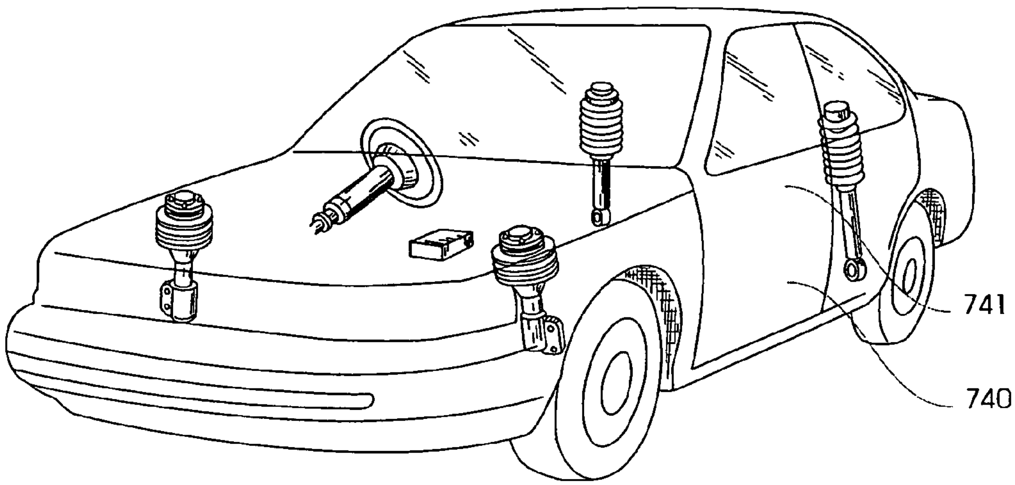
FIG. 158
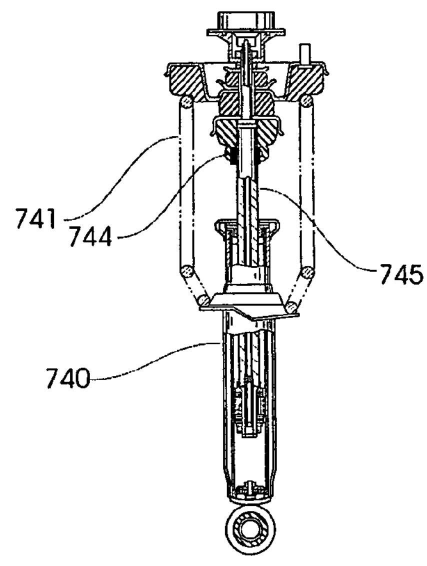
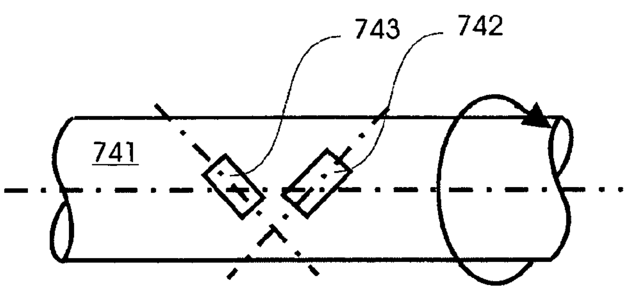
FIG. 158B
FIG. 158A

Prior Art

I=+5, A=X, B=X G0=R3/R2

I=0, A=0, B=0 G1=R8*R3/((R8+R3)*R2)

I=0, A=+5, B=0 G2=R5*R3/((R5+R3)*R2)

I=0, A=0, B=+5 G3=R7*R3/((R7+R3)*R2)

I=0, A=+5, B=+5 G4=R6*R3/((R6+R3)*R2)

STANDARD 40 kHz ULTRASONIC TRANSDUCER WITH DAMPING

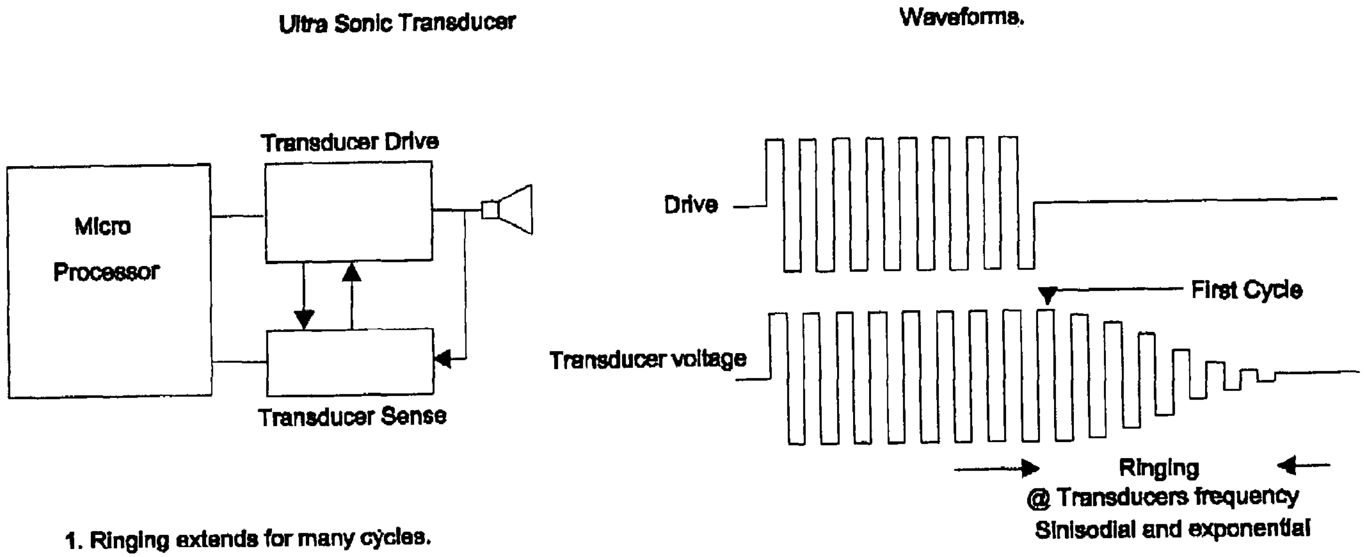

1. Ringing extends for many cycles.
2. Received echo is smaller than the Ringing.
   Limits the minimum range.
3. At the end of the normal drive the phase of the drive
   is reversed and the amplitude at fundamental frequency
   is decreased exponentially the ringing will be stopped quicker.
4. This allows the transducer to be used for both sending
   and receiveing with a short minimum range.
5. The microprocessor controls this process

*FIG 182*

ASSET SYSTEM CONTROL ARRANGEMENT AND METHOD

CROSS REFERENCE TO RELATED APPLICATIONS

This application claims priority under 35 U.S.C. §119(e) of U.S. provisional patent application Ser. Nos. 60/592,838 filed Jul. 30, 2004, 60/534,926 filed Jan. 8, 2004 and 60/502,565 filed Sep. 12, 2003, and is:

1. a continuation-in-part of U.S. patent application Ser. No. 10/191,692 filed Jul. 9, 2002 which is a continuation-in-part of U.S. patent application Ser. No. 10/152,160 filed May 21, 2002 which claims priority under 35 U.S.C. §119 (e) of U.S. provisional patent application Ser. No. 60/292,386 filed May 21, 2001;
2. a continuation-in-part of U.S. patent application Ser. No. 10/931,288 which is a continuation-in-part of U.S. patent application Ser. No. 10/303,364 filed Nov. 25, 2002, now U.S. Pat. No. 6,784,379;
3. a continuation-in-part of U.S. patent application Ser. No. 10/174,803 filed Jun. 19, 2002 which is a continuation-in-part of:
   a) U.S. patent application Ser. No. 09/500,346 filed Feb. 8, 2000, now U.S. Pat. No. 6,442,504, which is a continuation-in-part of U.S. patent application Ser. No. 09/128,490, now U.S. Pat. No. 6,078,854, which is a continuation-in-part of:
      1) U.S. patent application Ser. No. 08/474,783 filed Jun. 7, 1995, now U.S. Pat. No. 5,822,707, and
      2) U.S. patent application Ser. No. 08/970,822 filed Nov. 14, 1997, now U.S. Pat. No. 6,081,757;
   b) U.S. patent application Ser. No. 09/849,558 filed May 4, 2001, now U.S. Pat. No. 6,653,577, which is a continuation-in-part of U.S. patent application Ser. No. 09/193,209 filed Nov. 17, 1998, now U.S. Pat. No. 6,242,701, which is a continuation-in-part of U.S. patent application Ser. No. 09/128,490 filed Aug. 4, 1998, now U.S. Pat. No. 6,078,854, which is a continuation-in-part of:
      1) U.S. patent application Ser. No. 08/474,783 filed Jun. 7, 1995, now U.S. Pat. No. 5,822,707, and
      2) U.S. patent application Ser. No. 08/970,822 filed Nov. 14, 1997, now U.S. Pat. No. 6,081,757;
   c) U.S. patent application Ser. No. 09/849,559 filed May 4, 2001, now U.S. Pat. No. 6,689,962, which is a continuation-in-part of U.S. patent application Ser. No. 09/193,209 filed Nov. 17, 1998, now U.S. Pat. No. 6,242,701, which is a continuation-in-part of U.S. patent application Ser. No. 09/128,490 filed Aug. 4, 1998, now U.S. Pat. No. 6,078,854, which is a continuation-in-part of:
      1) U.S. patent application Ser. No. 08/474,783 filed Jun. 7, 1995, now U.S. Pat. No. 5,822,707, and
      2) U.S. patent application Ser. No. 08/970,822 filed Nov. 14, 1997, now U.S. Pat. No. 6,081,757;
   d) U.S. patent application Ser. No. 09/901,879 filed Jul. 9, 2001, now U.S. Pat. No. 6,555,766, which is a continuation of U.S. patent application Ser. No. 09/849,559 filed May 4, 2001 which is a continuation-in-part of U.S. patent application Ser. No. 09/193,209 filed Nov. 17, 1998, now U.S. Pat. No. 6,242,701, which is a continuation-in-part of U.S. patent application Ser. No. 09/128,490 filed Aug. 4, 1998, now U.S. Pat. No. 6,078,854, which is a continuation-in-part of:
      1) U.S. patent application Ser. No. 08/474,783 filed Jun. 7, 1995, now U.S. Pat. No. 5,822,707, and
      2) U.S. patent application Ser. No. 08/970,822 filed Nov. 14, 1997, now U.S. Pat. No. 6,081,757;

e) U.S. patent application Ser. No. 09/753,186 filed Jan. 2, 2001, now U.S. Pat. No. 6,484,080;
   f) U.S. patent application Ser. No. 09/767,020 filed Jan. 23, 2001, now U.S. Pat. No. 6,533,316; and
   g) U.S. patent application Ser. No. 09/770,974 filed Jan. 26, 2001, now U.S. Pat. No. 6,648,367;
4. a continuation-in-part of U.S. patent application Ser. No. 10/341,554 filed Jan. 13, 2003 which is a continuation-in-part of U.S. patent application Ser. No. 09/827,961 filed Apr. 6, 2001, now U.S. Pat. No. 6,517,107, which is a continuation of U.S. patent application Ser. No. 09/328,566 filed Jun. 9, 1999, now U.S. Pat. No. 6,279,946, which claims priority under 35 U.S.C. §119(e) of U.S. provisional patent application Ser. No. 60/088,386 filed Jun. 9, 1998;
5. a continuation-in-part of U.S. patent application Ser. No. 10/234,067 filed Sep. 3, 2002 which is a continuation-in-part of U.S. patent application Ser. No. 09/778,137, now U.S. Pat. No. 6,513,830, which is a continuation of U.S. patent application Ser. No. 08/905,877 filed Aug. 4, 1997, now U.S. Pat. No. 6,186,537, which is a continuation of U.S. patent application Ser. No. 08/505,036 filed Jul. 21, 1995, now U.S. Pat. No. 5,653,462, which is a continuation of U.S. patent application Ser. No. 08/040,978 filed Mar. 31, 1993, now abandoned, which is a continuation-in-part of U.S. patent application Ser. No. 07/878,571 filed May 5, 1992, now abandoned;
6. a continuation-in-part of U.S. patent application Ser. No. 09/639,303 filed Aug. 16, 2000, which is:
   a) a continuation of U.S. patent application Ser. No. 08/905,877 filed Aug. 4, 1997, now U.S. Pat. No. 6,186,537, which is a continuation of U.S. patent application Ser. No. 08/505,036 filed Jul. 21, 1995, now U.S. Pat. No. 5,653,462, which is a continuation of U.S. patent application Ser. No. 08/040,978 filed Mar. 31, 1993, now abandoned, which is a continuation-in-part of U.S. patent application Ser. No. 07/878,571 filed May 5, 1992, now abandoned;
   b) a continuation-in-part of U.S. patent application Ser. No. 09/409,625 filed Oct. 1, 1999, now U.S. Pat. No. 6,270,116;
   c) a continuation-in-part of U.S. patent application Ser. No. 09/448,337 filed Nov. 23, 1999, now U.S. Pat. No. 6,283,503; and
   d) a continuation-in-part of U.S. patent application Ser. No. 09/448,338 filed Nov. 23, 1999, now U.S. Pat. No. 6,168,198;
7. a continuation-in-part of U.S. patent application Ser. No. 10/356,202 filed Jan. 31, 2003; now U.S. Pat. No. 6,793,242;
8. a continuation-in-part of U.S. patent application Ser. No. 10/227,780 filed Aug. 26, 2002, which is a continuation-in-part of U.S. patent application Ser. No. 09/838,920 filed Apr. 20, 2001, now U.S. Pat. No. 6,778,672, which is a continuation-in-part of U.S. patent application Ser. No. 09/563,556 filed May 3, 2000, now U.S. Pat. No. 6,474,683, which is a continuation-in-part of U.S. patent application Ser. No. 09/437,535 filed Nov. 10, 1999, now U.S. Pat. No. 6,712,387, which is a continuation-in-part of U.S. patent application Ser. No. 09/047,703 filed Mar. 25, 1998, now U.S. Pat. No. 6,039,139, which is:
   a) a continuation-in-part of U.S. patent application Ser. No. 08/640,068 filed Apr. 30, 1996, now U.S. Pat. No. 5,829,782, which is a continuation application of U.S. patent application Ser. No. 08/239,978 filed May 9, 1994, now abandoned, which is a continuation-in-part of U.S. patent application Ser. No. 08/040,978 filed Mar. 31, 1993, now abandoned, which is a continuation-in-part of U.S. patent application Ser. No. 07/878,571 filed May 5, 1992, now abandoned; and b) a continuation-in-part of U.S. patent application Ser. No. 08/905,876 filed Aug. 4, 1997, now U.S. Pat. No. 5,848,802, which is a continuation of U.S. patent application Ser. No. 08/505,036 filed Jul. 21, 1995, now U.S. Pat. No. 5,653,462, which is a continuation of U.S. patent application Ser. No. 08/040,978 filed Mar. 31, 1993, now abandoned, which is a continuation-in-part of U.S. patent application Ser. No. 07/878,571 filed May 5, 1992, now abandoned; and 9. a continuation-in-part of U.S. patent application Ser. No. 10/613,453 filed Jul. 3, 2003 which is a continuation of U.S. patent application Ser. No. 10/188,673 filed Jul. 3, 2002, now U.S. Pat. No. 6,738,697, which is:

a) a continuation-in-part of U.S. patent application Ser. No. 10/174,709 filed Jun. 19, 2002, now U.S. Pat. No. 6,735,506;

b) a continuation-in-part of U.S. patent application Ser. No. 09/753,186 filed Jan. 2, 2001, now U.S. Pat. No. 6,484,080, which is a continuation-in-part of U.S. patent application Ser. No. 09/137,918 filed Aug. 20, 1998, now U.S. Pat. No. 6,175,787, which is a continuation-in-part of U.S. patent application Ser. No. 08/476,077 filed Jun. 7, 1995, now U.S. Pat. No. 5,809,437; and c) a continuation-in-part of U.S. patent application Ser. No. 10/079,065 filed Feb. 19, 2002, now U.S. Pat. No. 6,662,642, which:

1) is a continuation-in-part of U.S. patent application Ser. No. 09/765,558 filed Jan. 19, 2001, now U.S. Pat. No. 6,748,797, which claims priority under 35 U.S.C. §119(e) of U.S. provisional patent application Ser. No. 60/231,378 filed Sep. 8, 2000; and 2) claims priority under 35 U.S.C. §119(e) of U.S. provisional patent application Ser. No. 60/269,415 filed Feb. 16, 2001, U.S. provisional patent application Ser. No. 60/291,511 filed May 16, 2001 and U.S. provisional patent application Ser. No. 60/304,013 filed Jul. 9, 2001;

10. a continuation-in-part of U.S. patent application Ser. No. 10/058,706 filed Jan. 28, 2002 which is:

a. a continuation-in-part of U.S. patent application Ser. No. 09/891,432 filed Jun. 26, 2001, now U.S. Pat. No. 6,513,833, which is a continuation-in-part of U.S. patent application Ser. No. 09/838,920 filed Apr. 20, 2001, now U.S. Pat. No. 6,778,672, which is a continuation-in-part of U.S. patent application Ser. No. 09/563,556 filed May 3, 2000, now U.S. Pat. No. 6,474,683, which is a continuation-in-part of U.S. patent application Ser. No. 09/437,535 filed Nov. 10, 1999 which is a continuation-in-part of U.S. patent application Ser. No. 09/047,703 filed Mar. 25, 1998, now U.S. Pat. No. 6,039,139, which is:

1) a continuation-in-part of U.S. patent application Ser. No. 08/640,068 filed Apr. 30, 1996, now U.S. Pat. No. 5,829,782, which is a continuation of U.S. patent application Ser. No. 08/239,978 filed May 9, 1994, now abandoned, which is a continuation-in-part of U.S. patent application Ser. No. 08/040,978 filed Mar. 31, 1993, now abandoned, which is a continuation-in-part of U.S. patent application Ser. No. 07/878,571 filed May 5, 1992, now abandoned; and 2) a continuation-in-part of U.S. patent application Ser. No. 08/905,876 filed Aug. 4, 1997, now U.S. Pat. No. 5,848,802, which is a continuation of U.S. patent application Ser. No. 08/505,036 filed Jul. 21, 1995, now U.S. Pat. No. 5,653,462, which is a continuation of the 08/040,978 application which is a continuation-in-part of the 07/878,571 application;

b. a continuation-in-part of U.S. patent application Ser. No. 09/639,299 filed Aug. 15, 2000, now U.S. Pat. No. 6,422,595, which is:

1) a continuation-in-part of U.S. patent application Ser. No. 08/905,877 filed Aug. 4, 1997, now U.S. Pat. No. 6,186,537; which is a continuation of U.S. patent application Ser. No. 08/505,036 filed Jul. 21, 1995, now U.S. Pat. No. 5,653,462; which is a continuation of U.S. patent application Ser. No. 08/040,978 filed Mar. 31, 1993, now abandoned; which is a continuation-in-part of U.S. patent application Ser. No. 07/878,571 filed May 5, 1992, now abandoned;

2) a continuation-in-part of U.S. patent application Ser. No. 09/409,625 filed Oct. 1, 1999, now U.S. Pat. No. 6,270,116, which is a continuation-in-part of U.S. patent application Ser. No. 08/905,877 filed Aug. 4, 1997, now U.S. Pat. No. 6,186,537; which is a continuation of U.S. patent application Ser. No. 08/505,036 filed Jul. 21, 1995, now U.S. Pat. No. 5,653,462; which is a continuation of U.S. patent application Ser. No. 08/040,978 filed Mar. 31, 1993, now abandoned; which is a continuation-in-part of U.S. patent application Ser. No. 07/878,571 filed May 5, 1992, now abandoned;

3) a continuation-in-part of U.S. patent application Ser. No. 09/448,337 filed Nov. 23, 1999, now U.S. Pat. No. 6,283,503, which is a continuation-in-part of U.S. patent application Ser. No. 08/905,877 filed Aug. 4, 1997, now U.S. Pat. No. 6,186,537; which is a continuation of U.S. patent application Ser. No. 08/505,036 filed Jul. 21, 1995, now U.S. Pat. No. 5,653,462; which is a continuation of U.S. patent application Ser. No. 08/040,978 filed Mar. 31, 1993, now abandoned; which is a continuation-in-part of U.S. patent application Ser. No. 07/878,571 filed May 5, 1992, now abandoned; and 4) a continuation-in-part of U.S. patent application Ser. No. 09/448,338 filed Nov. 23, 1999, now U.S. Pat. No. 6,168,198, which is a continuation-in-part of U.S. patent application Ser. No. 08/905,877 filed Aug. 4, 1997, now U.S. Pat. No. 6,186,537; which is a continuation of U.S. patent application Ser. No. 08/505,036 filed Jul. 21, 1995, now U.S. Pat. No. 5,653,462; which is a continuation of U.S. patent application Ser. No. 08/040,978 filed Mar. 31, 1993, now abandoned; which is a continuation-in-part of U.S. patent application Ser. No. 07/878,571 filed May 5, 1992, now abandoned; and c. a continuation-in-part of U.S. patent application Ser. No. 09/543,678 filed Apr. 7, 2000, now U.S. Pat. No. 6,412,813, which is a continuation-in-part of U.S. patent application Ser. No. 09/047,704 filed Mar. 25, 1998, now U.S. Pat. No. 6,116,638, which is:

1) a continuation-in-part of U.S. patent application Ser. No. 08/640,068 filed Apr. 30, 1996, now U.S. Pat. No. 5,829,782, which is a continuation of U.S. patent application Ser. No. 08/239,978 filed May 9, 1994, now abandoned, which is a continuation-in-part of U.S. patent application Ser. No. 08/040,978 filed Mar. 31, 1993, now abandoned, which is a continuation-in-part of U.S. patent application Ser. No. 07/878,571 filed May 5, 1992, now abandoned; and 2) a continuation-in-part of U.S. patent application Ser. No. 08/905,876 filed Aug. 4, 1997, now U.S. Pat. No. 5,848,802, which is a continuation of U.S. patent application Ser. No. 08/505,036 filed Jul. 21, 1995, now U.S. Pat. No. 5,653,462, which is a continuation of the 08/040,978 application which is a continuation-in-part of the 07/878,571 application; and 11. a continuation-in-part of U.S. patent application Ser. No. 10/114,533 filed Apr. 2, 2002 which is a continuation-in-part of: of U.S. patent application Ser. No. 10/058,706 filed Jan. 28, 2002, the history of which is set forth above;

12. a continuation-in-part of U.S. patent application Ser. No. 10/805,903 filed Mar. 22, 2004 which is a continuation-in-part of:
   A. U.S. patent application Ser. No. 10/174,709, filed Jun. 19, 2002, now U.S. Pat. No. 6,735,506, which is:
      1. a continuation-in-part of U.S. patent application Ser. No. 09/753,186 filed Jan. 2, 2001, now U.S. Pat. No. 6,484,080, which is a continuation-in-part of U.S. patent application Ser. No. 09/137,918 filed Aug. 20, 1998, now U.S. Pat. No. 6,175,787, which is a continuation-in-part of U.S. patent application Ser. No. 08/476,077 filed Jun. 7, 1995, now U.S. Pat. No. 5,809,437;
      2. a continuation-in-part of U.S. patent application Ser. No. 10/079,065 filed Feb. 19, 2002, now U.S. Pat. No. 6,662,642, which:
         a. claims priority under 35 U.S.C. §119(e) of U.S. provisional patent application Ser. No. 60/269,415 filed Feb. 16, 2001, U.S. provisional patent application Ser. No. 60/291,511 filed May 16, 2001 and U.S. provisional patent application Ser. No. 60/304,013 filed Jul. 9, 2001; and
         b. is a continuation-in-part of U.S. patent application Ser. No. 09/765,558 filed Jan. 19, 2001, now U.S. Pat. No. 6,748,797, which claims priority under 35 U.S.C. §119(e) of U.S. provisional patent application Ser. No. 60/231,378 filed Sep. 8, 2000;
      3. a continuation-in-part of U.S. patent application Ser. No. 10/114,533 filed Apr. 2, 2002, the history of which is set forth above;
   B. a continuation-in-part of U.S. patent application Ser. No. 10/188,673, filed Jul. 3, 2002, now U.S. Pat. No. 6,738,697, which is:
      1. a continuation-in-part of U.S. patent application Ser. No. 09/753,186 filed Jan. 2, 2001, now U.S. Pat. No. 6,484,080, which is a continuation-in-part of U.S. patent application Ser. No. 09/137,918 filed Aug. 20, 1998, now U.S. Pat. No. 6,175,787, which is a continuation-in-part of U.S. patent application Ser. No. 08/476,077 filed Jun. 7, 1995, now U.S. Pat. No. 5,809,437;
      2. a continuation-in-part of U.S. patent application Ser. No. 10/079,065 filed Feb. 19, 2002, now U.S. Pat. No. 6,662,642, which:
         a. Claims priority under 35 U.S.C. §119(e) of U.S. provisional patent application Ser. No. 60/269,415 filed Feb. 16, 2001, U.S. provisional patent application Ser. No. 60/291,511 filed May 16, 2001 and U.S. provisional patent application Ser. No. 60/304,013 filed Jul. 9, 2001; and
         b. is a continuation-in-part of U.S. patent application Ser. No. 09/765,558 filed Jan. 19, 2001, now U.S. Pat. No. 6,748,797, which claims priority under 35 U.S.C. §119(e) of U.S. provisional patent application Ser. No. 60/231,378 filed Sep. 8, 2000; and
   C. a continuation-in-part of U.S. patent application Ser. No. 10/174,709 filed Jun. 19, 2002, now U.S. Pat. No. 6,735,506.

13. a continuation-in-part of U.S. patent application Ser. No. 10/457,238 filed Jun. 9, 2003 which claims priority under 35 U.S.C. §119(e) of U.S. provisional patent application Ser. No. 60/387,792 filed Jun. 11, 2002;

14. a continuation-in-part of U.S. patent application Ser. No. 10/116,808 filed Apr. 5, 2002 which is:
   a. a continuation-in-part of U.S. patent application Ser. No. 09/838,919 filed Apr. 20, 2001, now U.S. Pat. No. 6,442,465, which is:
      1) a continuation-in-part of U.S. patent application Ser. No. 09/765,559 filed Jan. 19, 2001, now U.S. Pat. No. 6,553,296, which is a continuation-in-part of U.S. patent application Ser. No. 09/476,255 filed Dec. 30, 1999, now U.S. Pat. No. 6,324,453, which claims priority under 35 U.S.C. §119(e) of U.S. provisional patent application Ser. No. 60/114,507 filed Dec. 31, 1998; and
      2) a continuation-in-part of U.S. patent application Ser. No. 09/389,947 filed Sep. 3, 1999, now U.S. Pat. No. 6,393,133, which is a continuation-in-part of U.S. patent application Ser. No. 09/200,614, filed Nov. 30, 1998, now U.S. Pat. No. 6,141,432, which is a continuation of U.S. patent application Ser. No. 08/474,786 filed Jun. 7, 1995, now U.S. Pat. No. 5,845,000;
   b. a continuation-in-part of U.S. patent application Ser. No. 09/925,043 filed Aug. 8, 2001, now U.S. Pat. No. 6,507,779, which is a continuation-in-part of U.S. patent application Ser. No. 09/765,559 filed Jan. 19, 2001, now U.S. Pat. No. 6,553,296, and a continuation-in-part of U.S. patent application Ser. No. 09/389,947 filed Sep. 3, 1999, now U.S. Pat. No. 6,393,133;

15. a continuation-in-part of U.S. patent application Ser. No. 10/061,016 filed Jan. 30, 2002 which is a continuation-in-part of U.S. patent application Ser. No. 09/901,879 filed Jul. 9, 2001, now U.S. Pat. No. 6,555,766, which is a continuation of U.S. patent application Ser. No. 09/849,559 filed May 4, 2001, now U.S. Pat. No. 6,689,962, which is a continuation-in-part of U.S. patent application Ser. No. 09/193,209 filed Nov. 17, 1998, now U.S. Pat. No. 6,242,701, which is a continuation-in-part of U.S. patent application Ser. No. 09/128,490 filed Aug. 4, 1998, now U.S. Pat. No. 6,078,854, which is a continuation-in-part of: 1) U.S. patent application Ser. No. 08/474,783 filed Jun. 7, 1995, now U.S. Pat. Nos. 5,822,707; and 2) U.S. patent application Ser. No. 08/970,822 filed Nov. 14, 1997, now U.S. Pat. No. 6,081,757;

16. a continuation-in-part of U.S. patent application Ser. No. 10/227,781 filed Aug. 26, 2002, now U.S. Pat. No. 6,792,342, which is:
   a. a continuation-in-part of U.S. patent application Ser. No. 10/061,016 filed Jan. 30, 2002, the history of which is set forth above; and
   b. a continuation-in-part of U.S. patent application Ser. No. 09/500,346 filed Feb. 8, 2000, now U.S. Pat. No. 6,442,504; and 17. a continuation-in-part of U.S. patent application Ser. No. 10/151,615 filed May 20, 2002, now U.S. Pat. No. 6,280,897, which is:
   a. a continuation-in-part of U.S. patent application Ser. No. 09/891,432, now U.S. Pat. No. 6,513,833, the history of which is set forth above;
   b. a continuation-in-part of U.S. patent application Ser. No. 09/639,299 filed Aug. 15, 2000, now U.S. Pat. No. 6,422,595, the history of which is set forth above; and
   c. a continuation-in-part of U.S. patent application Ser. No. 09/543,678 filed Apr. 7, 2000, now U.S. Pat. No. 6,412,813, the history of which is set forth above;

18. a continuation-in-part of U.S. patent application Ser. No. 10/365,129 filed Feb. 12, 2003, which is a continuation-in-part of U.S. patent application Ser. No. 10/114,533 filed Apr. 2, 2002, the history of which is set forth above; and
19. a continuation-in-part of U.S. patent application Ser. No. 10/413,426 filed Apr. 14, 2003 which is:
    a. a continuation-in-part of U.S. patent application Ser. No. 09/437,535 filed Nov. 10, 1999 now U.S. Pat. No. 6,712,387, the history of which is set forth above;
    b. a continuation-in-part of U.S. patent application Ser. No. 09/765,559 filed Jan. 19, 2001, now U.S. Pat. No. 6,553,296, the history of which is set forth above;
    c. a continuation-in-part of U.S. patent application Ser. No. 09/838,920 filed Apr. 20, 2001, now U.S. Pat. No. 6,778,672, the history of which is set forth above;
    d. a continuation-in-part of U.S. patent application Ser. No. 09/849,559 filed May 4, 2001, now U.S. Pat. No. 6,689,962, the history of which is set forth above;
    e. a continuation-in-part of U.S. patent application Ser. No. 09/901,879 filed Jul. 9, 2001, now U.S. Pat. No. 6,555,766, the history of which is set forth above;
    f. a continuation-in-part of U.S. patent application Ser. No. 10/058,706 filed Jan. 28, 2002, the history of which is set forth above;
    g. a continuation-in-part of U.S. patent application Ser. No. 10/061,016 filed Jan. 30, 2002, the history of which is set forth above; and
    h. a continuation-in-part of U.S. patent application Ser. No. 10/114,533 filed Apr. 2, 2002, the history of which is set forth above;
    i. a continuation-in-part of U.S. patent application Ser. No. 10/116,808 filed Apr. 5, 2002, the history of which is set forth above;
    j. a continuation-in-part of U.S. patent application Ser. No. 10/151,615 filed May 20, 2002, now U.S. Pat. No. 6,820,897, the history of which is set forth above;
    k. a continuation-in-part of U.S. patent application Ser. No. 10/227,781 filed Aug. 26, 2002, now U.S. Pat. No. 6,792,342, the history of which is set forth above;
    l. a continuation-in-part of U.S. patent application Ser. No. 10/234,436 filed Sep. 3, 2002, now U.S. Pat. No. 6,757,602, which is:
        1. a continuation-in-part of U.S. patent application Ser. No. 09/853,118 filed May 10, 2001, now U.S. Pat. No. 6,445,988, which is a continuation-in-part of U.S. patent application Ser. No. 09/474,147 filed Dec. 29, 1999, now U.S. Pat. No. 6,397,136, which is a continuation-in-part of U.S. patent application Ser. No. 09/382,406 filed Aug. 24, 1999, now U.S. Pat. No. 6,529,809, which:
            a. is a continuation-in-part of U.S. patent application Ser. No. 08/919,823, now U.S. Pat. No. 5,943,295, which is a continuation-in-part of U.S. patent application Ser. No. 08/798,029 filed Feb. 6, 1997, now abandoned; and
            b. claims priority under 35 U.S.C. §119(e) of U.S. provisional patent application Ser. No. 60/136,613 filed May 27, 1999;
    m. a continuation-in-part of U.S. patent application Ser. No. 10/302,105 filed Nov. 22, 2002, now U.S. Pat. No. 6,772,057, which is a continuation-in-part of U.S. patent application Ser. No. 10/116,808 filed Apr. 5, 2002, the history of which is set forth above; and
    n. a continuation-in-part of U.S. patent application Ser. No. 10/365,129 filed Feb. 12, 2003, the history of which is set forth above.

All of the above-referenced applications are incorporated by reference herein.

FIELD OF THE INVENTION

The present invention relates to an arrangement and method for controlling systems in an asset such as a vehicle, house and cargo trailer.

The present invention also relates to occupant sensing in general and more particular to sensing characteristics or the classification of an occupant of a vehicle for the purpose of controlling a vehicular system, subsystem or component based on the sensed characteristics or classification.

The present invention also relates to an apparatus and method for measuring the seat weight including the weight of an occupying item of the vehicle seat and, more specifically, to a seat weight measuring apparatus having advantages including that the production cost and the assembling cost of such apparatus is lower than existing apparatus.

The present invention also relates to systems for remotely monitoring transportation assets and other movable and/or stationary items which have very low power requirements. In particular, the present invention relates to a system for attachment to shipping containers and other transportation assets which enables remote monitoring of the location, contents, properties and/or interior or exterior environment of shipping containers or other assets and transportation assets and, since it has a low power requirement, lasts for years without needing maintenance.

The present invention also relates to a tracking method and system for tracking shipping containers and other transportation assets and enabling recording of the travels of the shipping container or transportation asset.

The present invention also relates to methods and apparatus for diagnosing components in a vehicle and transmitting data relating to the diagnosis of the components in the vehicle and other information relating to the operating conditions of the vehicle to one or more remote locations distant from the vehicle, e.g., via a telematics link.

The present invention also relates to systems and method for diagnosing the state or condition of a vehicle, e.g., whether the vehicle is about to rollover or is experiencing a crash, and whether the vehicle has a component which is operating abnormally and could possibly fail resulting in a crash or severe handicap for the operator, and transmitting data relating to the diagnosis of the components in the vehicle and optionally other information relating to the operating conditions of the vehicle to one or more remote locations, e.g., via a telematics link.

The present invention further relates to methods and apparatus for diagnosing components in a vehicle and determining the status of occupants in a vehicle and transmitting data relating to the diagnosis of the components in the vehicle, and optionally other information relating to the operating conditions of the vehicle, and data relating to the occupants to one or more remote facilities such as a repair facility and an emergency response station.

The present invention relates to apparatus for obtaining information about an occupying item of a seat, in particular, a seat in an automotive vehicle.

The present invention also relates to apparatus and methods for adjusting a vehicle component, system or subsystem in which the occupancy of a seat, also referred to as the "seated state" herein, is evaluated using at least a weight measuring apparatus and the component, system or subsystem may then be adjusted based on the evaluated occupancy thereof. The vehicle component, system or subsystem, hereinafter referred to simply as a component, may be any adjustable component of the vehicle including, but not limited to, the bottom portion and backrest of the seat, the rear view and side mirrors, the brake, clutch and accelerator pedals, the steering wheel, the steering column, a seat armrest, a cup holder, the mounting unit for a cellular telephone or another communications or computing device and the visors. Further, the component may be a system such an as airbag system, the deployment or suppression of which is controlled based on the seated-state of the seat. The component may also be an adjustable portion of a system the operation of which might be advantageously adjusted based on the seated-state of the seat, such as a device for regulating the inflation or deflation of an airbag that is associated with an airbag system.

The present invention also relates to apparatus and method for automatically adjusting a vehicle component to a selected or optimum position for an occupant of a seat based on at least two measured morphological characteristics of the occupant, one of which is the weight of the occupant. Other morphological characteristics include the height of the occupant, the length of the occupant's arms, the length of the occupant's legs, the occupant's head diameter, facial features and the inclination of the occupant's back relative to the seat bottom. Other morphological characteristics are also envisioned for use in the invention including iris pattern properties from an iris scan, voice print and finger and hand prints.

The present invention relates to apparatus and methods for adjusting a steering wheel in a vehicle and more particularly, to apparatus and methods for adjusting a steering wheel based on the morphology of the driver, i.e., the driver's physical characteristics or dimensions.

The present invention also relates to apparatus and methods for adjusting a steering wheel in which the occupancy of a seat, also referred to as the "seated state" herein, is evaluated using at least a weight measuring apparatus and the steering wheel may then be adjusted based on the evaluated occupancy thereof.

The present invention also relates to apparatus and method for automatically adjusting a steering wheel to a selected or optimum position for a driver based on one or more measured morphological characteristics of the driver. Possible morphological characteristics include the height of the driver, the length of the driver's arms, the length of the driver's legs and the inclination of the driver's back relative to the seat bottom.

At least one of the inventions disclosed herein also relates a system and method for monitoring the presence of an obstacle in an aperture, specifically, an aperture in a vehicle, for the purpose of halting closure of the aperture when an obstacle is detected in the path of the closing member.

The present invention also relates to the field of sensing, detecting, monitoring and identifying various objects, and parts thereof, which are located within the passenger compartment of a motor vehicle. In particular, the present invention provides improvements to ultrasonic transducers, and electromagnetic transducers and systems of such transducers, which improve the speed and/or accuracy and tend to reduce the cost and complexity of systems and which are efficient and highly reliable for detecting a particular object such as a rear facing child seat (RFCS) situated in the passenger compartment in a location where it may interact with a deploying airbag, or for detecting an out-of-position occupant. This permits the selective suppression of airbag deployment when the deployment may result in greater injury to the occupant than the crash forces. In the alternative, it permits the tailoring of the airbag deployment to the particular occupant and in consideration of the position of the occupant. This is accomplished in part through (i) the use of a tubular mounting structure for the transducers; (ii) the use of electronic reduction or suppression of transducer ringing; (iii) the use of mechanical damping of the transducer cone, all three of which permits the use of a single transducer for both sending and receiving; (iv) the use of multiple frequencies thereby permitting the simultaneous transmission of all transducers thereby reducing the time and increasing the accuracy of dynamic occupant position measurements; (v) the use of shaped horns, grills and reflectors for the output of the transducers to precisely control the beam pattern and thereby minimizing false echoes; (vi) the use of a logarithmic compression amplifier to minimize the effects of thermal gradients in the vehicle; (vii) the use of a method of temperature compensation based on the change in transducer properties with temperature; and/or (viii) the use of a dual level network, one level for categorization and the second for occupant position sensing, to improve the accuracy of categorization and the speed of position measurement for dynamic out-of-position. The foregoing can be used individually or in combination with one another.

The present invention additionally relates generally to methods and arrangements for determining that there is a life form, i.e., a human being, in a vehicle and the location of the life form, i.e., in which seat the life form is situated.

More specifically, the present invention relates to methods and arrangement for obtaining information about occupancy of a vehicle and utilizing this information for some other purpose, e.g., to control various vehicular systems to benefit the occupants.

Even more specifically, the present invention relates to methods and arrangements for obtaining information about occupancy of a vehicle, in particular after a crash involving the vehicle, and conveying this information to response personnel to optimize their response to the crash and/or enable proper assistance to be rendered to the occupants after the crash.

The present invention also relates to methods and apparatus for controlling an occupant restraint system in a vehicle based in part on the diagnosed state of the vehicle in an attempt to minimize injury to an occupant.

The present invention also relates to methods and apparatus for disabling an airbag system in a motor vehicle if the seating position is unoccupied or an occupant is out-of-position, i.e., closer to the airbag door than a predetermined distance.

BACKGROUND OF THE INVENTION

All of the patents, patent applications, technical papers and other references referenced below are incorporated herein by reference in their entirety unless stated otherwise.

Crash sensors for determining that a vehicle is in a crash of sufficient magnitude as to require the deployment of an inflatable restraint system, or airbag, are either mounted in a portion of the front of the vehicle which has crushed by the time that sensor triggering is required, the crush zone, or elsewhere such as the passenger compartment, the non-crush zone. Regardless of where sensors are mounted, there will always be crashes where the sensor triggers late and the occupant has moved to a position near to the airbag deployment cover. In such cases, the occupant may be seriously injured or even killed by the deployment of the airbag. At least one of the inventions disclosed herein is largely concerned with preventing such injuries and deaths by preventing late airbag deployments.

In a Society of Automotive Engineers (SAE) paper by Mertz, Driscoll, Lenox, Nyquist and Weber titled "Response of Animals Exposed to Deployment of Various Passenger Inflatable Restraint System Concepts for a Variety of Collision Severities and Animal Positions" SAE 826074, 1982, the authors show that an occupant can be killed or seriously injured by the airbag deployment if he or she is located out of position near or against the airbag when deployment is initiated. These conclusions were again reached in a more recent paper by Lau, Horsch, Viano and Andrzejak titled "Mechanism of Injury From Air Bag Deployment Loads", published in *Accident Analysis & Prevention*, Vol. 25, No. 1, 1993, Pergamon Press, New York, where the authors conclude that "Even an inflator with inadequate gas output to protect a properly seated occupant had sufficient energy to induce severe injuries in a surrogate in contact with the inflating module." These papers highlight the importance of preventing deployment of an airbag when an occupant is out of position and in close proximity to the airbag module.

The Ball-in-Tube crush zone sensor, such as disclosed in U.S. Pat. Nos. 4,974,350; 4,198,864; 4,284,863; 4,329,549; 4,573,706 and 4,900,880 to D. S. Breed, has achieved the widest use while other technologies, including magnetically damped sensors as disclosed in U.S. Pat. No. 4,933,515 to Behr et al and crush switch sensors such as disclosed in U.S. Pat. No. 4,995,639 to D. S. Breed, are now becoming available. Other sensors based on spring-mass technologies are also being used in the crush zone. Crush zone mounted sensors, in order to function properly, must be located in the crush zone at the required trigger time during a crash or they can trigger late. One example of this was disclosed in a Society of Automotive Engineers (SAE) paper by D. S. Breed and V. Castelli titled "Trends in Sensing Frontal Impacts", SAE 890750, 1989, and further in U.S. Pat. No. 4,900,880. In impacts with soft objects, the crush of a vehicle can be significantly less than for impacts with barriers, for example. In such cases, even at moderate velocity changes where an airbag might be of help in mitigating injuries, the crush zone mounted sensor might not actually be in the crush zone at the time that sensor triggering is required for timely airbag deployment, and as a result can trigger late when the occupant is already resting against the airbag module.

There is a trend underway toward the implementation of Single Point Sensors (SPS) which are typically located in the passenger compartment. In theory, these sensors use sophisticated computer algorithms to determine that a particular crash is sufficiently severe as to require the deployment of an airbag. In another SAE paper by Breed, Sanders and Castelli titled "A Critique of Single Point Sensing", SAE 920124, 1992, the authors demonstrate that there is insufficient information in the non-crush zone of the vehicle to permit a decision to be made to deploy an airbag in time for many crashes. Thus, sensors mounted in the passenger compartment or other non-crush zone locations, will also trigger the deployment of the airbag late on many crashes.

A crash sensor is necessarily a predictive device. In order to inflate the airbag in time, the inflation must be started before the full severity of the crash has developed. All predictive devices are subject to error, so that sometimes the airbag will be inflated when it is not needed and at other times it will not be inflated when it could have prevented injury. The accuracy of any predictive device can improve significantly when a longer time is available to gather and process the data. One purpose of the occupant position sensor is to make possible this additional time in those cases where the occupant is farther from the airbag module when the crash begins and/or where, due to seat belt use or otherwise, the occupant is moving toward the airbag module more slowly. In these cases the decision on whether to deploy the airbag can be deferred and a more precise determination made of whether the airbag is needed and the characteristics of such deployment The discussions of timely airbag deployment above are all based on the seating position of the average male (the so called 50% male) relative to the airbag or steering wheel. For the 50% male, the sensor triggering requirement is typically calculated based on an allowable motion of the occupant of 5 inches before the airbag is fully inflated. Airbags typically require about 30 milliseconds of time to achieve full inflation and, therefore, the sensor must trigger inflation of the airbag 30 milliseconds before the occupant has moved forward 5 inches. The 50% male, however, is actually the 70% person and therefore about 70% of the population sit on average closer to the airbag than the 50% male and thus are exposed to a greater risk of interacting with the deploying airbag. A recent informal survey, for example, found that although the average male driver sits about 12 inches from the steering wheel, about 2% of the population of drivers sit closer than 6 inches from the steering wheel and 10% sit closer than 9 inches. Also, about 1% of drivers sit at about 24 inches and about 16% at least 18 inches from the steering wheel. None of the sensor systems now on the market take account of this variation in occupant seating position and yet this can have a critical effect on the sensor required maximum triggering time.

For example, if a fully inflated airbag is about 7 inches thick, measured from front to back, then any driver who is seated closer than 7 inches will necessarily interact with the deploying airbag and the airbag probably should not be deployed at all. For a recently analyzed 30 mph barrier crash of a mid-sized car, the sensor required triggering time, in order to allow the airbag to inflate fully before the driver becomes closer than 7 inches from the steering wheel, results in a maximum sensing time of 8 milliseconds for an occupant initially positioned 9 inches from the airbag, 25 milliseconds at 12 inches, 45 milliseconds at 18 inches and 57 milliseconds for the occupant who is initially positioned at 24 inches from the airbag. Thus for the same crash, the sensor required triggering time varies from a no trigger to 57 milliseconds, depending on the initial position of the occupant. A single sensor triggering time criterion that fails to take this into account, therefore, will cause injuries to small people or deny the protection of the airbag to larger people. A very significant improvement to the performance of an airbag system will necessarily result from taking the occupant position into account as described herein.

A further complication results from the fact that a greater number of occupants are now wearing seatbelts which tends to prevent many of these occupants from getting too close to the airbag. Thus, just knowing the initial position of the occupant is insufficient and either the position must be continuously monitored or the seatbelt use must be known. Also, the occupant may have fallen asleep or be unconscious prior to the crash and be resting against the steering wheel. Some sensor systems have been proposed that double integrate the acceleration pulse in the passenger compartment and determine the displacement of the occupant based on the calculated displacement of an unrestrained occupant seated at the mid seating position. This sensor system then prevents the deployment of the airbag if, by this calculation, the occupant is too close to the airbag. This calculation can be greatly in error for the different seating positions discussed above and also for the seat-belted occupant, and thus an occupant who wears a seatbelt could be denied the added protection of the airbag in a severe crash.

As the number of vehicles which are equipped with airbags is now rapidly increasing, the incidence of late deployments is also increasing. It has been estimated that out of approximately 400 airbag related complaints to the National Highway Traffic Safety Administration (NHTSA) through 1991, for example, about 5% to 10% involved burns and injuries which were due to late airbag deployments. There are also at least three known fatalities where a late airbag deployment is suspected as the cause.

Automobiles equipped with airbags are well known in the prior art. In such airbag systems, the car crash is sensed and the airbags rapidly inflated thereby insuring the safety of an occupation in a car crash. Many lives have now been saved by such airbag systems. However, depending on the seated state of an occupant, there are cases where his or her life cannot be saved even by present airbag systems. For example, when a passenger is seated on the front passenger seat in a position other than a forward facing, normal state, e.g., when the passenger is out of position and near the deployment door of the airbag, there will be cases when the occupant will be seriously injured or even killed by the deployment of the airbag.

Also, sometimes a child seat is placed on the passenger seat in a rear facing position and there are cases where a child sitting in such a seat has been seriously injured or killed by the deployment of the airbag.

Furthermore, in the case of a vacant seat, there is no need to deploy an airbag and indeed deploying the airbag is undesirable due to a high replacement cost and possible release of toxic gases into the passenger compartment. Nevertheless, most airbag systems will deploy the airbag in a vehicle crash even if the seat is unoccupied.

Thus, whereas thousands of lives have been saved by airbags, a large number of people have also been injured, some seriously, by the deploying airbag, and over 100 people have now been killed. Thus, significant improvements need to be made to airbag systems. As discussed in detail in U.S. Pat. No. 5,653,462, for a variety of reasons vehicle occupants may be too close to the airbag before it deploys and can be seriously injured or killed as a result of the deployment thereof. Also, a child in a rear facing child seat that is placed on the right front passenger seat is in danger of being seriously injured if the passenger airbag deploys. For these reasons and, as first publicly disclosed in Breed, D. S. "How Airbags Work" presented at the International Conference on Seatbelts and Airbags in 1993 in Canada, occupant position sensing and rear facing child seat detection systems are required in order to minimize the damages caused by deploying front and side airbags. It also may be required in order to minimize the damage caused by the deployment of other types of occupant protection and/or restraint devices that might be installed in the vehicle.

For these reasons, there has been proposed an occupant sensor system also known as a seated-state detecting unit such as disclosed in the following U.S. patents assigned to the current assignee of the present application: Breed et al. U.S. Pat. Nos. 5,563,462, 5,829,782, 5,822,707, 5,694,320, 5,748,473, 6,078,854, 6,081,757 and 6,242,701 and Varga et al. U.S. Pat. No. 5,943,295. Typically, in some of these designs three or four sensors or sets of sensors are installed at three or four points in a vehicle for transmitting ultrasonic or electromagnetic waves toward the passenger or driver's seat and receiving the reflected waves. Using appropriate hardware and software, the approximate configuration of the occupancy of either the passenger or driver seat can be determined thereby identifying and categorizing the occupancy of the relevant seat. Of particular interest, the Breed et al. patents mention that the presence of a child in a rear facing child seat placed on the right front passenger seat may be detected as this has become an industry-wide concern to prevent deployment of an occupant restraint device in these situations. The U.S. automobile industry is continually searching for an easy, economical solution, which will prevent the deployment of the passenger side airbag if a rear facing child seat is present.

These systems will solve the out-of-position occupant and the rear facing child seat problems related to current airbag systems and prevent unneeded and unwanted airbag deployments when a front seat is unoccupied. Some of the airbag systems will also protect rear seat occupants in vehicle crashes and all occupants in side impacts.

However, there is a continual need to improve the systems which detect the presence of occupants, determine if they are out-of-position and to identify the presence of a rear facing child seat in the rear seat as well as the front seat. Future automobiles are expected to have eight or more airbags as protection is sought for rear seat occupants and from side impacts. In addition to eliminating the disturbance and possible harm of unnecessary airbag deployments, the cost of replacing these airbags will be excessive if they all deploy in an accident needlessly. The improvements described below minimize this cost by not deploying an airbag for a seat, which is not occupied by a human being. An occupying item of a seat may be a living occupant such as a human being or dog, another living organism such as a plant, or an inanimate object such as a box or bag of groceries.

The need for an occupant out-of-position sensor has also been observed by others and several methods have been described in certain U.S. patents for determining the position of an occupant of a motor vehicle. However, none of these prior art systems are believed to be capable of solving the many problems associated with occupant sensors and no prior art has been found that describe the methods of adapting such sensors to a particular vehicle model to obtain high system accuracy prior to the disclosure thereof by the current assignee. Also, none of these prior art systems employ operative and effective pattern recognition technologies that are believed to be essential to accurate occupant sensing. Each of these prior are systems will be discussed below.

In 1984, the National Highway Traffic Safety Administration (NHTSA) of the U.S. Department of Transportation issued a requirement for frontal crash protection of automobile occupants known as FMVSS-208. This regulation mandated "passive occupant restraints" for all passenger cars by 1992. A further modification to FMVSS-208 required both driver and passenger side airbags on all passenger cars and light trucks by 1998. FMVSS-208 was later modified to require all vehicles to have occupant sensors. The demand for airbags is constantly accelerating in both Europe and Japan and all vehicles produced in these areas and eventually worldwide will likely be, if not already, equipped with airbags as standard equipment and eventually with occupant sensors.

A device to monitor the vehicle interior and identify its contents is needed to solve these and many other problems. For example, once a Vehicle Interior Identification and Monitoring System (VIMS) for identifying and monitoring the contents of a vehicle is in place, many other products become possible as discussed below.

Inflators now exist which will adjust the amount of gas flowing to the airbag to account for the size and position of the occupant and for the severity of the accident. The VIMS discussed in U.S. Pat. No. 5,829,782 can control such inflators based on the presence and position of vehicle occupants or of a rear facing child seat. The inventions here are improvements on that VIMS system and some use an advanced optical system comprising one or more CCD or CMOS arrays plus a source of illumination preferably combined with a trained neural network pattern recognition system.

In the early 1990's, the current assignee (ATI) developed a scanning laser radar optical occupant sensor that had the capability of creating a three-dimensional image of the contents of the passenger compartment. After proving feasibility, this effort was temporarily put aside due to the high cost of the system components and the current assignee then developed an ultrasonic-based occupant sensor that was commercialized and is now in production on some Jaguar models. The current assignee has long believed that optical systems would eventually become the technology of choice when the cost of optical components came down. This has now occurred and for the past several years, ATI has been developing a variety of optical occupant sensors.

The current assignee's first camera optical occupant sensing system was an adult zone-classification system that detected the position of the adult passenger. Based on the distance from the airbag, the passenger compartment was divided into three zones, namely safe-seating zone, at-risk zone, and keep-out zone. This system was implemented in a vehicle under a cooperative development program with NHTSA. This proof-of-concept was developed to handle low-light conditions only. It used three analog CMOS cameras and three near-infrared LED clusters. It also required a desktop computer with three image acquisition boards. The locations of the camera/LED modules were: the A-pillar, the instrument panel (IP), and near the overhead console. The system was trained to handle camera blockage situations, so that the system still functioned well even when two cameras were blocked. The processing speed of the system was close to 50 fps giving it the capability of tracking an occupant during pre-crash braking situations—that is a dynamic system.

The second camera optical system was an occupant classification system that separated adult occupants from all other situations (i.e., child, child restraint and empty seat). This system was implemented using the same hardware as the first camera optical system. It was also developed to handle low-light conditions only. The results of this proof-of-concept were also very promising.

Since the above systems functioned well even when two cameras were blocked, it was decided to develop a stand alone system that is FMVSS208-compliant, and price competitive with weight-based systems but with superior performance. Thus, a third camera optical system (for occupant classification) was developed. Unlike the earlier systems, this system used one digital CMOS camera and two high-power near-infrared LEDs. The camera/LED module was installed near the overhead console and the image data was processed using a laptop computer. This system was developed to divide the occupancy state into four classes: 1) adult; 2) child, booster seat and forward facing child seat; 3) infant carrier and rearward facing child seat; and 4) empty seat. This system included two subsystems: a nighttime subsystem for handling low-light conditions, and a daytime subsystem for handling ambient-light conditions. Although the performance of this system proved to be superior to the earlier systems, it exhibited some weakness mainly due to a non-ideal aiming direction of the camera.

Finally, a fourth camera optical system was implemented using near production intent hardware using, for example, an ECU (Electronic Control Unit) to replace the laptop computer. In this system, the remaining problems of earlier systems were overcome. The hardware in this system is not unique so the focus below will be on algorithms and software which represent the innovative heart of the system.

1. Prior Art Occupant Sensors

The need for an occupant position sensor has been observed by others and several methods have been disclosed in U.S. patents for determining the position and velocity of an occupant of a motor vehicle. Each of these systems, however, has significant limitations. In White et al. (U.S. Pat. No. 5,071,160), a single acoustic sensor is described and, as illustrated, is disadvantageously mounted lower than the steering wheel. White et al. correctly perceive that such a sensor could be defeated, and the airbag falsely deployed (indicating that the system of White et al. deploys the airbag on occupant motion rather then suppressing it), by an occupant adjusting the control knobs on the radio and thus they suggest the use of a plurality of such sensors. White et al. does not disclose where such sensors would be mounted, other than on the instrument panel below the steering wheel, or how they would be combined to uniquely monitor particular locations in the passenger compartment and to identify the object(s) occupying those locations. The adaptation process to vehicles is not described nor is a combination of pattern recognition algorithms, nor any pattern recognition algorithm.

White et al. also describe the use of error correction circuitry, without defining or illustrating the circuitry, to differentiate between the velocity of one of the occupant's hands, as in the case where he/she is adjusting a knob on the radio, and the remainder of the occupant. Three ultrasonic sensors of the type disclosed by White et al. might, in some cases, accomplish this differentiation if two of them indicate that the occupant was not moving while the third indicates that he or she is moving. Such a combination, however, would not differentiate between an occupant with both hands and arms in the path of the ultrasonic transmitter at such a location that they are blocking a substantial view of the occupant's head or chest. Since the sizes and driving positions of occupants are extremely varied, trained pattern recognition systems, such as neural networks and combinations thereof, are required when a clear view of the occupant, unimpeded by his/her extremities, cannot be guaranteed. White et al. do not suggest the use of such neural networks.

Mattes et al. (U.S. Pat. No. 5,118,134) describe a variety of methods of measuring the change in position of an occupant including ultrasonic, active or passive infrared and microwave radar sensors, and an electric eye. The sensors measure the change in position of an occupant during a crash and use that information to access the severity of the crash and thereby decide whether or not to deploy the airbag. They are thus using the occupant motion as a crash sensor. No mention is made of determining the out-of-position status of the occupant or of any of the other features of occupant monitoring as disclosed in one or more of the current assignee's above-referenced patents and patent applications. Nowhere does Mattes et al. discuss how to use active or passive infrared to determine the position of the occupant. As pointed out in one or more of the current assignee's above-referenced patents and patent applications, direct occupant position measurement based on passive infrared is probably not possible with a single detector and, until very recently, was very difficult and expensive with active infrared requiring the modulation of an expensive GaAs infrared laser. Since there is no mention of these problems, the method of use contemplated by Mattes et al. must be similar to the electric eye concept where position is measured indirectly as the occupant passes by a plurality of longitudinally spaced-apart sensors.

The object of an occupant out-of-position sensor is to determine the location of the head and/or chest of the vehicle occupant in the passenger compartment relative to the occupant protection apparatus, such as an airbag, since it is the impact of either the head or chest with the deploying airbag that can result in serious injuries. Both White et al. and Mattes et al. disclose only lower mounting locations of their sensors that are mounted in front of the occupant such as on the dashboard/instrument panel or below the steering wheel. Both such mounting locations are particularly prone to detection errors due to positioning of the occupant's hands, arms and legs. This would require at least three, and preferably more, such sensors and detectors and an appropriate logic circuitry, or pattern recognition system, which ignores readings from some sensors if such readings are inconsistent with others for the case, for example, where the driver's arms are the closest objects to two of the sensors. The determination of the proper transducer mounting locations, aiming and field angles and pattern recognition system architectures for a particular vehicle model are not disclosed in either White et al. or Mattes et al. and are part of the vehicle model adaptation process described herein.

Fujita et al., in U.S. Pat. No. 5,074,583, describe another method of determining the position of the occupant but do not use this information to control and suppress deployment of an airbag if the occupant is out-of-position, or if a rear facing child seat is present. In fact, the closer that the occupant gets to the airbag, the faster the inflation rate of the airbag is according to the Fujita et al. patent, which thereby increases the possibility of injuring the occupant. Fujita et al. do not measure the occupant directly but instead determine his or her position indirectly from measurements of the seat position and the vertical size of the occupant relative to the seat. This occupant height is determined using an ultrasonic displacement sensor mounted directly above the occupant's head.

It is important to note that in all cases in the above-cited prior art, except those assigned to the current assignee of the instant invention, no mention is made of the method of determining transducer location, deriving the algorithms or other system parameters that allow the system to accurately identify and locate an object in the vehicle. In contrast, in one implementation of the instant invention, the return wave echo pattern corresponding to the entire portion of the passenger compartment volume of interest is analyzed from one or more transducers and sometimes combined with the output from other transducers, providing distance information to many points on the items occupying the passenger compartment.

Other patents describing occupant sensor systems include U.S. Pat. No. 5,482,314 (Corrado et al.) and U.S. Pat. No. 5,890,085 (Corrado et al.). These patents, which were filed after the initial filings of the inventions herein and thus not necessarily prior art, describe a system for sensing the presence, position and type of an occupant in a seat of a vehicle for use in enabling or disabling a related airbag activator. A preferred implementation of the system includes two or more different but located together sensors which provide information about the occupant and this information is fused or combined in a microprocessor circuit to produce an output signal to the airbag controller. According to Corrado et al., the fusion process produces a decision as to whether to enable or disable the airbag with a higher reliability than a single phenomena sensor or non-fused multiple sensors. By fusing the information from the sensors to make a determination as to the deployment of the airbag, each sensor has only a partial effect on the ultimate deployment determination. The sensor fusion process is a crude pattern recognition process based on deriving the fusion "rules" by a trial and error process rather than by training.

The sensor fusion method of Corrado et al. requires that information from the sensors be combined prior to processing by an algorithm in the microprocessor. This combination can unnecessarily complicate the processing of the data from the sensors and other data processing methods can provide better results. For example, as discussed more fully below, it has been found to be advantageous to use a more efficient pattern recognition algorithm such as a combination of neural networks or fuzzy logic algorithms that are arranged to receive a separate stream of data from each sensor, without that data being combined with data from the other sensors (as in done in Corrado et al.) prior to analysis by the pattern recognition algorithms. In this regard, it is important to appreciate that sensor fusion is a form of pattern recognition but is not a neural network and that significant and fundamental differences exist between sensor fusion and neural networks. Thus, some embodiments of the invention described below differ from that of Corrado et al. because they include a microprocessor which is arranged to accept only a separate stream of data from each sensor such that the stream of data from the sensors are not combined with one another. Further, the microprocessor processes each separate stream of data independent of the processing of the other streams of data, that is, without the use of any fusion matrix as in Corrado et al.

1.1 Ultrasonics

The use of ultrasound for occupant sensing has many advantages and some drawbacks. It is economical in that ultrasonic transducers cost less than $1 in large quantities and the electronic circuits are relatively simple and inexpensive to manufacture. However, the speed of sound limits the rate at which the position of the occupant can be updated to approximately 7 milliseconds, which though sufficient for most cases, is marginal if the position of the occupant is to be tracked during a vehicle crash. Secondly, ultrasound waves are diffracted by changes in air density that can occur when the heater or air conditioner is operated or when there is a high-speed flow of air past the transducer. Thirdly, the resolution of ultrasound is limited by its wavelength and by the transducers, which are high Q tuned devices. Typically, this resolution is on the order of about 2 to 3 inches. Finally, the fields from ultrasonic transducers are difficult to control so that reflections from unwanted objects or surfaces add noise to the data.

Ultrasonics can be used in several configurations for monitoring the interior of a passenger compartment of an automobile as described in the current assignee's above-referenced patents and patent applications and in particular in USRE37260 (a reissue of U.S. Pat. No. 5,943,295). Using the teachings here, the optimum number and location of the ultrasonic and/or optical transducers can be determined as part of the adaptation process for a particular vehicle model.

In the cases of inventions disclosed here, as discussed in more detail below, regardless of the number of transducers used, a trained pattern recognition system is preferably used to identify and classify, and in some cases to locate, the illuminated object and its constituent parts.

The ultrasonic system is the least expensive and potentially provides less information than the optical or radar systems due to the delays resulting from the speed of sound and due to the wave length which is considerably longer than the optical (including infrared) systems. The wavelength limits the detail that can be seen by the system. Additionally, ultrasonic waves are sometimes strongly affected by thermal gradients within the vehicle such as caused by flowing air from the heater or air conditioner or as caused by the sun heating the top of the vehicle resulting in the upper part of the passenger compartment having a higher temperature than the lower part. Thermal gradients cause density changes in the air, which diffract the ultrasonic signal sending in a direction away from an object or the transducer. Although this effect has been reported in the literature, no solution has been proposed prior to the present invention.

In spite of these limitations, ultrasonics can provide sufficient timely information to permit the position and velocity of an occupant to be accurately known and, when used with an appropriate pattern recognition system, it is capable of positively determining the presence of a rear facing child seat. One pattern recognition system that has been successfully used to identify a rear facing child seat employs neural networks and is similar to that described in papers by Gorman et al.

However, in the aforementioned literature using ultrasonics, the pattern of reflected ultrasonic waves from an adult occupant who may be out of position is sometimes similar to the pattern of reflected waves from a rear facing child seat. Also, it is sometimes difficult to discriminate the wave pattern of a normally seated child with the seat in a rear facing position from an empty seat with the seat in a more forward position. In other cases, the reflected wave pattern from a thin slouching adult with raised knees can be similar to that from a rear facing child seat. In still other cases, the reflected pattern from a passenger seat that is in a forward position can be similar to the reflected wave pattern from a seat containing a forward facing child seat or a child sitting on the passenger seat. In each of these cases, the prior art ultrasonic systems can suppress the deployment of an airbag when deployment is desired or, alternately, can enable deployment when deployment is not desired.

If the discrimination between these cases can be improved, then the reliability of the seated-state detecting unit can be improved and more people saved from death or serious injury. In addition, the unnecessary deployment of an airbag can be prevented.

Recently issued U.S. Pat. No. 6,411,202 (Gal et al.) describes a safety system for a vehicle including at least one sensor that receives waves from a region in an interior portion of the vehicle, which thereby defines a protected volume at least partially in front of the vehicle airbag. A processor is responsive to signals from the sensor for determining geometric data of objects in the protected volume. The teachings of this patent, which is based on ultrasonics, are arguably fully disclosed in the prior patents of the current assignee referenced above.

Significant improvements were made to the art in the current assignee's USRE37260 which describes the method of placement of the transducers to increase the reliability of detecting and discriminating out-of-position occupants, empty seats, and rear facing child-seats. In order to detect occupants that are very close to the transducer in that invention, separate transducers are used for sending and receiving the ultrasonic waves. Also, although that system is capable of detecting out-of-position occupants for most real world cases, in situations where the crash sensor fails to trigger or triggers very late in a high speed crash, the system based on alternately transmitting and receiving from each location can require as much as 50 milliseconds to determine the location of an occupant which can be too slow. The use of one or two transducers for ranging during the crash, giving 10 or 20 millisecond response time, works in most cases but can be defeated if the selected transducer is blocked by a newspaper, for example. Finally, the wide beam patterns of the transducers used in that system sometimes results in false decisions when an occupant of the rear seat is leaning forward, for example, and the system interprets that as an in-position, forward facing person even though in fact, it may be a rear facing child seat.

Regardless of the number of transducers used, a trained pattern recognition system, as defined herein, can be used to identify and classify, and in some cases to locate, the illuminated object and its constituent parts. The invention herein is partially directed toward improving the invention of USRE37260 by decreasing the sensing time, reducing the cost, improving the system response to objects which are close to the transducer mounting, and improving the ability of the system to compensate for thermal gradients and variations in the speed of sound.

1.2 Optics

Optics can be used in several configurations for monitoring the interior of a passenger compartment or exterior environment of an automobile. In one known method, a laser optical system uses a GaAs infrared laser beam to momentarily illuminate an object, occupant or child seat, in the manner as described and illustrated in FIG. 8 of U.S. Pat. No. 5,829,782. The receiver can be a charge-coupled device or CCD or a CMOS imager to receive the reflected light. The laser can either be used in a scanning mode, or, through the use of a lens, a cone of light can be created which covers a large portion of the object. In these configurations, the light can be accurately controlled to only illuminate particular positions of interest within or around the vehicle. In the scanning mode, the receiver need only comprise a single or a few active elements while in the case of the cone of light, an array of active elements is needed. The laser system has one additional significant advantage in that the distance to the illuminated object can be determined as disclosed in the commonly owned '462 patent as also described below. When a single receiving element is used, a PIN or avalanche diode is preferred.

In a simpler case, light generated by a non-coherent light emitting diode (LED) device is used to illuminate the desired area. In this case, the area covered is not as accurately controlled and a larger CCD or CMOS array is required. Recently, the cost of CCD and CMOS arrays has dropped substantially with the result that this configuration may now be the most cost-effective system for monitoring the passenger compartment as long as the distance from the transmitter to the objects is not needed. If this distance is required, then the laser system, a stereographic system, a focusing system, a combined ultrasonic and optic system, or a multiple CCD or CMOS array system as described herein is required. Alternately, a modulation system such as used with the laser distance system can be used with a CCD or CMOS camera and distance determined on a pixel by pixel basis.

The optical systems described herein are also applicable for many other sensing applications both inside and outside of the vehicle compartment such as for sensing crashes before they occur as described in U.S. Pat. No. 5,829,782, for a smart headlight adjustment system and for a blind spot monitor (also disclosed in U.S. patent application Ser. No. 09/851,362).

1.3 Ultrasonics and Optics

The laser systems described above are expensive due to the requirement that they be modulated at a high frequency if the distance from the airbag to the occupant, for example, is to be measured. Alternately, modulation of another light source, such as an LED, can be done and the distance measurement accomplished using a CCD or CMOS array on a pixel by pixel basis, as discussed below.

Both laser and non-laser optical systems in general are good at determining the location of objects within the two-dimensional plane of the image and a pulsed laser radar system in the scanning mode can determine the distance of each part of the image from the receiver by measuring the time of flight such as through range gating techniques. Distance can also be determined by using modulated electromagnetic radiation and measuring the phase difference between the transmitted and received waves. It is also possible to determine distance with a non-laser system by focusing, or stereographically if two spaced-apart receivers are used and, in some cases, the mere location in the field of view can be used to estimate the position relative to the airbag, for example. Finally, a recently developed pulsed quantum well diode laser also provides inexpensive distance measurements as discussed in U.S. Pat. No. 6,324,453.

Acoustic systems are additionally quite effective at distance measurements since the relatively low speed of sound permits simple electronic circuits to be designed and minimal microprocessor capability is required. If a coordinate system is used where the z-axis is from the transducer to the occupant, acoustics are good at measuring z dimensions while simple optical systems using a single CCD or CMOS arrays are good at measuring x and y dimensions. The combination of acoustics and optics, therefore, permits all three measurements to be made from one location with low cost components as discussed in commonly assigned U.S. Pat. Nos. 5,845,000 and 5,835,613, One example of a system using these ideas is an optical system which floods the passenger seat with infrared light coupled with a lens and a receiver array, e.g., CCD or CMOS array, which receives and displays the reflected light and an analog to digital converter (ADC) which digitizes the output of the CCD or CMOS and feeds it to an Artificial Neural Network (ANN) or other pattern recognition system for analysis. This system uses an ultrasonic transmitter and receiver for measuring the distances to the objects located in the passenger seat. The receiving transducer feeds its data into an ADC and from there, the converted data is directed into the ANN. The same ANN can be used for both systems thereby providing full three-dimensional data for the ANN to analyze. This system, using low cost components, will permit accurate identification and distance measurements not possible by either system acting alone. If a phased array system is added to the acoustic part of the system, the optical part can determine the location of the driver's ears, for example, and the phased array can direct a narrow beam to the location and determine the distance to the occupant's ears.

2. Adaptation

The adaptation of an occupant sensor system to a vehicle is the subject of a great deal of research and its own extensive body of knowledge as will be disclosed below. There is not believed to be any significant prior art in the field with the possible exception of the descriptions of sensor fusion methods in the Corrado et al. patents discussed above.

3. Mounting Locations for and Quantity of Transducers

There is little in the literature discussed herein concerning the mounting of cameras or other imagers or transducers in the vehicle other than in the current assignee's patents referenced above. Where camera mounting is mentioned, the general locations chosen are the instrument panel, roof or headliner, A-Pillar or rear view mirror assembly. Virtually no discussion is provided as to the methodology for choosing a particular location except in the current assignee's patents.

3.1 Single Camera, Dual Camera with Single Light Source

Farmer et al. (U.S. Pat. No. 6,005,958) describes a method and system for detecting the type and position of a vehicle occupant utilizing a single camera unit. The single camera unit is positioned at the driver or passenger side A-pillar in order to generate data of the front seating area of the vehicle. The type and position of the occupant is used to optimize the efficiency and safety in controlling deployment of an occupant protection device such as an air bag.

A single camera is, naturally, the least expensive solution but suffers from the problem that there is no easy method of obtaining three-dimensional information about people or objects in the passenger compartment. A second camera can be added, but to locate the same objects or features in the two images by conventional methods is computationally intensive unless the two cameras are close together. If they are close together, however, then the accuracy of the three dimensional information is compromised. Also, if they are not close together, then the tendency is to add separate illumination for each camera. An alternate solution is to use two cameras located at different positions in the passenger compartment and a single lighting source. This source can be located adjacent to one camera to minimize the installation sites. Since the LED illumination is now more expensive than the imager, the cost of the second camera does not add significantly to the system cost. The correlation of features can then be done using pattern recognition systems such as neural networks.

Two cameras also provide a significant protection from blockage and one or more additional cameras, with additional illumination, can be added to provide almost complete blockage protection.

3.2 Location of the Transducers

The only prior art for occupant sensor location for airbag control is White et al. and Mattes et al. discussed above. Both place their sensors below or on the instrument panel. The first disclosure of the use of cameras for occupant sensing is believed to appear in the current assignee's above-referenced patents. The first disclosure of the location of a camera anywhere and especially above the instrument panel such as on the A-pillar, roof or rear view mirror assembly also is believed to appear in the current assignee's above-referenced patents.

Corrado U.S. Pat. No. 6,318,697 discloses the placement of a camera onto a special type of rear view mirror. DeLine U.S. Pat. No. 6,124,886 also discloses the placement of a video camera on a rear view mirror for sending pictures using visible light over a cell phone. The general concept of placement of such a transducer on a mirror, among other places, is believed to have been first disclosed in commonly assigned USRE037736 which also first discloses the use of an IR camera and IR illumination that is either co-located or located separately from the camera.

3.3 Color Cameras—Multispectral Imaging

The accurate detection, categorization and eventually recognition of an object in the passenger compartment are aided by using all available information. Initial camera-based systems are monochromic and use active and, in some cases, passive infrared. As microprocessors become more powerful and sensor systems improve, there will be a movement to broaden the observed spectrum to the visual spectrum and then further into the mid and far infrared parts of the spectrum. There is no known literature on this at this time except that provided by the current assignee below and in prior patents.

3.4 High Dynamic Range Cameras

The prior art of high dynamic range cameras centers around the work of the Fraunhofer-Inst. of Microelectronic Circuits & Systems in Duisburg, Germany and the Jet Propulsion Laboratory, licensed to Photobit, and is reflected in several patents including U.S. Pat. Nos. 5,471,515, 5,608,204, 5,635,753, 5,892,541, 6,175,383, 6,215,428, 6,388,242, and 6,388,243. The current assignee is believed to be the first to recognize and apply this technology for occupant sensing as well as monitoring the environment surrounding the vehicle and thus there is not believed to be any prior art for this application of the technology.

Related to this is the work done at Columbia University by Professor Nayar as disclosed in PCT patent application WO0079784 assigned to Columbia University, which is also applicable to monitoring the interior and exterior of the vehicle. An excellent technical paper also describes this technique: Nayar, S. K. and Mitsunaga, T. "High Dynamic Range Imaging: Spatially Varying Pixel Exposures" Proceedings of IEEE Conference on Computer Vision and Pattern Recognition, South Carolina, June 2000. Again, there does not appear to be any prior art that predates the disclosure of this application of the technology by the current assignee.

A paper entitled "A 256×256 CMOS Brightness Adaptive Imaging Array with Column-Parallel Digital Output" by C. Sodini et al., 1988 IEEE International Conference on Intelligent Vehicles, describes a CMOS image sensor for intelligent transportation system applications such as adaptive cruise control and traffic monitoring. Among the purported novelties is the use of a technique for increasing the dynamic range in a CMOS imager by a factor of approximately 20, which technique is based on a previously described technique for CCD imagers.

Waxman et al. U.S. Pat. No. 5,909,244 discloses a novel high dynamic range camera that can be used in low light situations with a frame rate >25 frames per second for monitoring either the interior or exterior of a vehicle. It is suggested that this camera can be used for automotive navigation but no mention is made of its use for safety monitoring. Similarly, Savoye et al. U.S. Pat. No. 5,880,777 disclose a high dynamic range imaging system similar to that described in the '244 patent that could be employed in the inventions disclosed herein.

There are numerous technical papers of high dynamic range cameras and some recent ones discuss automotive applications, after the concept was first discussed in the current assignee's patents and patent applications. One recent example is T. Lulé, H. Keller, M. Wagner, M. Böhm, C. D. Hamann, L. Humm, U. Efron, "100.000 Pixel 120 dB Imager for Automotive Vision", presented in the Proceedings of the Conference on Advanced Microsystems for Automotive Applications (AMAA), Berlin, 18./19. March 1999. This paper discusses the desirability of a high dynamic range camera and points out that an integration-based method is preferable to a logarithmic system in that greater contrast is potentially obtained. This brings up the question as to what dynamic range is really needed. The current assignee has considered desiring a high dynamic range camera but after more careful consideration, it is really the dynamic range within a given image that is important and that is usually substantially below 120 db, and in fact, a standard 70+db camera is fine for most purposes.

As long as the shutter or an iris can be controlled to chose where the dynamic range starts, then, for night imaging a source of illumination is generally used and for imaging in daylight, the shutter time or iris can be substantially controlled to provide an adequate image. For those few cases where there is a very bright sunlight entering the vehicle's window but the interior is otherwise in shade, multiple exposures can provide the desired contrast as taught by Nayar and discussed above. This is not to say that a high dynamic range camera is inherently bad, just to illustrate that there are many technologies that can be used to accomplish the same goal.

3.5 Fisheye Lens, Pan and Zoom

There is significant prior art on the use of a fisheye or similar high viewing angle lens and a non-moving pan, tilt, rotation and zoom cameras; however, there appears to be no prior art on the application of these technologies to sensing inside or outside of the vehicle prior to the disclosure by the current assignee. One significant patent is U.S. Pat. No. 5,185,667 to Zimmermann. For some applications, the use of a fisheye type lens can significantly reduce the number of imaging devices that are required to monitor the interior or exterior of a vehicle. An important point is that whereas for human viewing, the images are usually mathematically corrected to provide a recognizable view, when a pattern recognition system such as a neural network is used, it is frequently not necessary to perform this correction, thus simplifying the analysis.

Recently, a paper has been published that describes the fisheye camera system disclosed years ago by the current assignee: V. Ramesh, M. Greiffenhagen, S. Boverie, A. Giratt, "Real-Time Surveillance and Monitoring for Automotive Applications", SAE 2000-01-0347.

4. 3D Cameras 4.1 Stereo

European Patent Application No. EP0885782A1 describes a purportedly novel motor vehicle control system including a pair of cameras which operatively produce first and second images of a passenger area. A distance processor determines the distances that a plurality of features in the first and second images are from the cameras based on the amount that each feature is shifted between the first and second images. An analyzer processes the determined distances and determines the size of an object on the seat. Additional analysis of the distance also may determine movement of the object and the rate of movement. The distance information also can be used to recognize predefined patterns in the images and thus identify objects. An air bag controller utilizes the determined object characteristics in controlling deployment of the air bag.

Simoncelli in U.S. Pat. No. 5,703,677 discloses an apparatus and method using a single lens and single camera with a pair of masks to obtain three-dimensional information about a scene.

A paper entitled "Sensing Automobile Occupant Position with Optical Triangulation" by W. Chappelle, Sensors, December 1995, describes the use of optical triangulation techniques for determining the presence and position of people or rear-facing infant seats in the passenger compartment of a vehicle in order to guarantee the safe deployment of an air bag. The paper describes a system called the "Takata Safety Shield" which purportedly makes high-speed distance measurements from the point of air bag deployment using a modulated infrared beam projected from an LED source. Two detectors are provided, each consisting of an imaging lens and a position-sensing detector.

A paper entitled "An Interior Compartment Protection System based on Motion Detection Using CMOS Imagers" by S. B. Park et al., 1998 IEEE International Conference on Intelligent Vehicles, describes a purportedly novel image processing system based on a CMOS image sensor installed at the car roof for interior compartment monitoring including theft prevention and object recognition. One disclosed camera system is based on a CMOS image sensor and a near infrared (NIR) light emitting diode (LED) array.

Krumm (U.S. Pat. No. 5,983,147) describes a system for determining the occupancy of a passenger compartment including a pair of cameras mounted so as to obtain binocular stereo images of the same location in the passenger compartment. A representation of the output from the cameras is compared to stored representations of known occupants and occupancy situations to determine which stored representation the output from the cameras most closely approximates. The stored representations include that of the presence or absence of a person or an infant seat in the front passenger seat.

The use of stereo systems for occupant sensing was first described by the current assignee in RE37736, U.S. Pat. Nos. 5,845,000, 5,835,613, 6,186,537, and 5,848,802 among others.

4.2 Distance by Focusing

A mechanical focusing system, such as used on some camera systems, can determine the initial position of an occupant but is currently too slow to monitor his/her position during a crash or even during pre-crash braking. Although the example of an occupant is used here as an example, the same or similar principles apply to objects exterior to the vehicle. This is a result of the mechanical motions required to operate the lens focusing system, however, methods do exist that do not require mechanical motions. By itself, it cannot determine the presence of a rear facing child seat or of an occupant but when used with a charge-coupled or CMOS device plus some infrared illumination for vision at night, and an appropriate pattern recognition system, this becomes possible. Similarly, the use of three-dimensional cameras based on modulated waves or range-gated pulsed light methods combined with pattern recognition systems are now possible based on the teachings of the inventions disclosed herein and the commonly assigned patents and patent applications referenced above.

U.S. Pat. No. 6,198,998 to Farmer discloses a single IR camera mounted on the A-Pillar where a side view of the contents of the passenger compartment can be obtained. A sort of three-dimensional view is obtained by using a narrow depth of focus lens and a de-blurring filter. IR is used to illuminate the volume and the use of a pattern on the LED to create a sort of structured light is also disclosed. Pattern recognition by correlation is also discussed.

U.S. Pat. No. 6,229,134 to Nayar et al. is an excellent example of the determination of the three-dimensional shape of an object using active blurring and focusing methods. The use of structured light is also disclosed in this patent. The method uses illumination of the scene with a pattern and two images of the scene are sensed with different imaging parameters.

A distance measuring system based on focusing is described in U.S. Pat. Nos. 5,193,124 and 5,231,443 (Subbarao) that can either be used with a mechanical focusing system or with two cameras, the latter of which would be fast enough to allow tracking of an occupant during pre-crash braking and perhaps even during a crash depending on the field of view that is analyzed. Although the Subbarao patents provide a good discussion of the camera focusing art, it is a more complicated system than is needed for practicing the instant inventions. In fact, a neural network can also be trained to perform the distance determination based on the two images taken with different camera settings or from two adjacent CCD's and lens having different properties as the cameras disclosed in Subbarao making this technique practical for the purposes herein. Distance can also be determined by the system disclosed in U.S. Pat. No. 5,003,166 (Girod) by spreading or defocusing a pattern of structured light projected onto the object of interest. Distance can also be measured by using time of flight measurements of the electromagnetic waves or by multiple CCD or CMOS arrays as is a principle teaching of at least one of the inventions disclosed herein.

Dowski, Jr. in U.S. Pat. No. 5,227,890 provides an automatic focusing system for video cameras which can be used to determine distance and thus enable the creation of a three-dimensional image.

A good description of a camera focusing system is found in G. Zorpette, "Focusing in a flash", Scientific American, August 2000.

In each of these cases, regardless of the distance measurement system used, a trained pattern recognition system, as defined above, can be used to identify and classify, and in some cases to locate, the illuminated object and its constituent parts.

4.3 Ranging

Cameras can be used for obtaining three dimensional images by modulation of the illumination as described in U.S. Pat. No. 5,162,861. The use of a ranging device for occupant sensing is believed to have been first disclosed by the current assignee in the patents mentioned herein. More recent attempts include the PMD camera as disclosed in PCT application WO09810255 and similar concepts disclosed in U.S. Pat. Nos. 6,057,909 and 6,100,517.

A paper by Rudolf Schwarte, et al. entitled "New Powerful Sensory Tool in Automotive Safety Systems Based on PMD-Technology", Eds. S. Krueger, W. Gessner, Proceedings of the AMAA 2000 Advanced Microsystems for Automotive Applications 2000, Springer Verlag; Berlin, Heidelberg, New York, ISBN 3-540-67087-4, describes an implementation of the teachings of the instant invention wherein a modulated light source is used in conjunction with phase determination circuitry to locate the distance to objects in the image on a pixel by pixel basis. This camera is an active pixel camera the use of which for internal and external vehicle monitoring is also a teaching of at least one of the inventions disclosed herein. The novel feature of the PMD camera is that the pixels are designed to provide a distance measuring capability within each pixel itself. This then is a novel application of the active pixel and distance measuring teachings of the instant invention.

The paper "Camera Records Color and Depth", Laser Focus World, Vol. 36, No. 7, July 2000, describes another method of using modulated light to measure distance.

"Seeing distances-a fast time-of-flight 3D camera", Sensor Review, Vol. 20, No. 3, 2000, presents a time-of-flight camera that also can be used for internal and external monitoring. Similarly, see "Electro-optical correlation arrangement for fast 3D cameras: properties and facilities of the electro-optical mixer device", SPIE Vol. 3100, 1997 pp. 254-60. A significant improvement to the PMD technology and to all distance by modulation technologies is to modulate with a code, which can be random or pseudo random, that permits accurate distance measurements over a long range using correlation or other technology. There is a question as to whether there is a need to individually modulate each pixel with the sent signal since the same effect can be achieved using a known Pockel or Kerr cell that covers the entire imager, which should be simpler.

The instant invention as described in the above-referenced commonly assigned patents and patent applications, teaches the use of modulating the light used to illuminate an object and to determine the distance to that object based on the phase difference between the reflected radiation and the transmitted radiation. The illumination can be modulated at a single frequency when short distances such as within the passenger compartment are to be measured. Typically, the modulation wavelength would be selected such that one wave would have a length of approximately one meter or less. This would provide resolution of 1 cm or less.

For larger vehicles, a longer wavelength would be desirable. For measuring longer distances, the illumination can be modulated at more than one frequency to eliminate cycle ambiguity if there is more than one cycle between the source of illumination and the illuminated object. This technique is particularly desirable when monitoring objects exterior to the vehicle to permit accurate measurements of devices that are hundreds of meters from the vehicle as well as those that are a few meters away. Naturally, there are other modulation methods that eliminate the cycle ambiguity such as modulation with a code that is used with a correlation function to determine the phase shift or time delay. This code can be a pseudo random number in order to permit the unambiguous monitoring of the vehicle exterior in the presence of other vehicles with the same system. This is sometimes known as noise radar, noise modulation (either of optical or radar signals), ultra wideband (UWB) or the techniques used in Micropower impulse radar (MIR). Another key advantage is to permit the separation of signals from multiple vehicles.

Although a simple frequency modulation scheme has been disclosed so far, it is also possible to use other coding techniques including the coding of the illumination with one of a variety of correlation patterns including a pseudo-random code. Similarly, although frequency and code domain systems have been described, time domain systems are also applicable wherein a pulse of light is emitted and the time of flight measured. Additionally, in the frequency domain case, a chirp can be emitted and the reflected light compared in frequency with the chirp to determine the distance to the object by frequency difference. Although each of these techniques is known to those skilled in the art, they have previously heretofore not been applied for monitoring objects within or outside of a vehicle.

4.4 Pockel or Kerr Cells for Determining Range

The technology for modulating a light valve or electronic shutter has been known for many years and is sometimes referred to as a Kerr cell or a Pockel cell. These devices are capable of being modulated at up to 10 billion cycles per second. For determining the distance to an occupant or his or her features, modulations between 100 and 500 MHz are needed. The higher the modulation frequency, the more accurate the distance to the object can be determined. However, if more than one wavelength, or better one-quarter wavelength, exists between the camera and the object, then ambiguities result. On the other hand, once a longer wavelength has ascertained the approximate location of the feature, then more accurate determinations can be made by increasing the modulation frequency since the ambiguity will now have been removed. In practice, only a single frequency is used of about 300 MHz. This gives a wavelength of 1 meter, which can allow cm level distance determinations.

In one preferred embodiment of at least one of the inventions disclosed herein, an infrared LED is modulated at a frequency between 100 and 500 MHz and the returning light passes through a light valve such that amount of light that impinges on the CMOS array pixels is determined by a phase difference between the light valve and the reflected light. By modulating a light valve for one frame and leaving the light valve transparent for a subsequent frame, the range to every point in the camera field of view can be determined based on the relative brightness of the corresponding pixels.

Once the range to all of the pixels in the camera view has been determined, range-gating becomes a simple mathematical exercise and permits objects in the image to be easily separated for feature extraction processing. In this manner, many objects in the passenger compartment can be separated and identified independently.

Noise, pseudo noise or code modulation techniques can be used in place of the frequency modulation discussed above. This can be in the form of frequency, amplitude or pulse modulation.

No prior art is believed to exist on this concept.

4.5 Thin Film on ASIC (TFA)

Thin film on ASIC technology, as described in Lake, D. W. “TFA Technology: The Coming Revolution in Photography”, Advanced Imaging Magazine, April, 2002 (WWW.ADVANCEDIMAGINGMAG.COM) shows promise of being the next generation of imager for automotive applications. The anticipated specifications for this technology, as reported in the Lake article, are:

| | |
|---|---|
| Dynamic Range | 120 db |
| Sensitivity | 0.01 lux |
| Anti-blooming | 1,000,000:1 |
| Pixel Density | 3,200,000 |
| Pixel Size | 3.5 um |
| Frame Rate | 30 fps |
| DC Voltage | 1.8 v |
| Compression | 500 to 1 |

All of these specifications, except for the frame rate, are attractive for occupant sensing. It is believed that the frame rate can be improved with subsequent generations of the technology or more than one imager can be used. Some advantages of this technology for occupant sensing include the possibility of obtaining a three-dimensional image by varying the pixel in time in relation to a modulated illumination in a simpler manner than proposed with the PMD imager or with a Pockel or Kerr cell. The ability to build the entire package on one chip will reduce the cost of this imager compared with two or more chips required by current technology.

Other technical papers on TFA include: (I) M. Böhm “Imagers Using Amorphous Silicon Thin Film on ASIC (TFA) Technology”, Journal of Non-Crystalline Solids, 266-269, pp. 1145-1151, 2000; (2) A. Eckhardt, F. Blecher, B. Schneider, J. Sterzel, S. Benthien, H. Keller, T. Lulé, P. Rieve, M. Sommer, K. Seibel, F. Mütze, M. Böhm, “Image Sensors in TFA (Thin Film on ASIC) Technology with Analog Image Pre-Processing”, H. Reichl, E: Obermeier (eds.), Proc. Micro System Technologies 98, Potsdam, Germany, pp. 165-170, 1998.; (3) T. Lulé, B. Schneider, M. Böhm, “Design and Fabrication of a High Dynamic Range Image Sensor in TFA Technology”, invited paper for IEEE Journal of Solid-State Circuits, Special Issue on 1998 Symposium on VLSI Circuits, 1999. (4) M. Böhm, F. Blecher, A. Eckhardt, B. Schneider, S. Benthien, H. Keller, T. Lulé, P. Rieve, M. Sommer, R. C. Lind, L. Humm, M. Daniels, N. Wu, H. Yen, “High Dynamic Range Image Sensors in Thin Film on ASIC—Technology for Automotive Applications”, D. E. Ricken, W. Gessner (eds.), Advanced Microsystems for Automotive Applications, Springer-Verlag, Berlin, pp. 157-172, 1998. (5) M. Böhm, F. Blecher, A. Eckhardt, K. Seibel, B. Schneider, J. Sterzel, S. Benthien, H. Keller, T. Lulé, P. Rieve, M. Sommer, B. Van Uffel, F Librecht, R. C. Lind, L. Humm, U. Efron, E. Rtoh, “Image Sensors in TFA Technology—Status and Future Trends”, Mat. Res. Soc. Symp. Proc., vol. 507, pp. 327-338, 1998.

5. Glare Control

U.S. Pat. Nos. 5,298,732 and 5,714,751 to Chen concentrate on locating the eyes of the driver so as to position a light filter between a light source such as the sun or the lights of an oncoming vehicle, and the driver’s eyes. This patent will be discussed in more detail below. U.S. Pat. No. 5,305,012 to Faris also describes a system for reducing the glare from the headlights of an oncoming vehicle and it is discussed in more detail below.

5.1 Windshield

Using an advanced occupant sensor, as explained below, the position of the driver's eyes can be accurately determined and portions of the windshield, or of a special visor, can be selectively darkened to eliminate the glare from the sun or oncoming vehicle headlights. This system can use electrochromic glass, a liquid crystal device, Xerox Gyricon, Research Frontiers SPD, semiconducting and metallic (organic) polymer displays, spatial light monitors, electronic "Venetian blinds", electronic polarizers or other appropriate technology, and, in some cases, detectors to detect the direction of the offending light source. In addition to eliminating the glare, the standard sun visor can now also be eliminated. Alternately, the glare filter can be placed in another device such as a transparent sun visor that is placed between the driver's eyes and the windshield.

There is no known prior art that places a filter in the windshield. All known designs use an auxiliary system such as a liquid crystal panel that acts like a light valve on a pixel by pixel basis.

A description of SPD can be found at SmartGlass.com and in "New 'Smart' glass darkens, lightens in a flash", Automotive News, Aug. 21, 1998.

5.2 Glare in Rear View Mirrors

There is no known prior art that places a pixel-addressable filter in a rear view mirror to selectively block glare or for any other purpose.

5.3 Visor for Glare Control and HUD

The prior art related to visors for glare control and heads-up displays includes U.S. Pat. Nos. 4,874,938, 5,298,732, 5,305,012 and 5,714,751 which are discussed elsewhere herein.

6. Weight Measurement and Biometrics

Prior art systems are now being used to identify the vehicle occupant based on a coded key or other object carried by the occupant. This requires special sensors within the vehicle to recognize the coded object. Also, the system only works if the particular person for whom the vehicle was programmed uses the coded object. If a son or daughter, for example, who is using their mother's key, uses the vehicle, then the wrong seat, mirror, radio station etc. adjustments are made. Also, these systems preserve the choice of seat position without any regard for the correctness of the seat position. With the problems associated with the 4-way seats, it is unlikely that the occupant ever properly adjusts the seat. Therefore, the error in seat position will be repeated every time the occupant uses the vehicle.

These coded systems are a crude attempt to identify the occupant. An improvement can be made if morphological (or biological) characteristics of the occupant can be measured as described herein. Such measurements can be made of the height and weight, for example, and used not only to adjust a vehicular component to a proper position but also to remember that position, as fine tuned by the occupant, for re-positioning the component the next time the occupant occupies the seat. No prior art is believed to exist on this aspect of the invention. Additional biometrics includes physical and behavioral responses of the eyes, hands, face and voice. Iris and retinal scans are discussed in the literature but the shape of the eyes or hands, structure of the face or hands, how a person blinks or squints, the shape of the hands, how he or she grasps the steering wheel, the electrical conductivity or dielectric constant, blood vessel pattern in the hands, fingers, face or elsewhere, the temperature and temperature differences of different areas of the body, the natural effluent or odor of the person are among the many biometric variables that can be measures to identify an authorized user of a vehicle, for example.

As discussed more fully below, in a preferred implementation, once at least one and preferably two of the morphological characteristics of a driver are determined, for example by measuring his or her height and weight, the component such as the seat can be adjusted and other features or components can be incorporated into the system including, for example, the automatic adjustment of the rear view and/or side mirrors based on seat position and occupant height.

In addition, a determination of an out-of-position occupant can be made and based thereon, airbag deployment suppressed if the occupant is more likely to be injured by the airbag than by the accident without the protection of the airbag. Furthermore, the characteristics of the airbag, including the amount of gas produced by the inflator and the size of the airbag exit orifices, can be adjusted to provide better protection for small lightweight occupants as well as large, heavy people. Even the direction of the airbag deployment can, in some cases, be controlled. The prior art is limited to airbag suppression as disclosed in Mattes (U.S. Pat. No. 5,118,134) and White (U.S. Pat. No. 5,071,160) discussed above.

Still other features or components can now be adjusted based on the measured occupant morphology as well as the fact that the occupant can now be identified. Some of these features or components include the adjustment of seat armrest, cup holder, steering wheel (angle and telescoping), pedals, phone location and for that matter, the adjustment of all things in the vehicle which a person must reach or interact with. Some items that depend on personal preferences can also be automatically adjusted including the radio station, temperature, ride and others.

6.1 Strain Gage Weight Sensors

Previously, various methods have been proposed for measuring the weight of an occupying item of a vehicular seat. The methods include pads, sheets or films that have placed in the seat cushion which attempt to measure the pressure distribution of the occupying item. Prior to its first disclosure in Breed et al. (U.S. Pat. No. 5,822,707), systems for measuring occupant weight based on the strain in the seat structure had not been considered. Prior art weight measurement systems have been notoriously inaccurate. Thus, a more accurate weight measuring system is desirable. The strain measurement systems described herein, substantially eliminate the inaccuracy problems of prior art systems and permit an accurate determination of the weight of the occupying item of the vehicle seat. Additionally, as disclosed herein, in many cases, sufficient information can be obtained for the control of a vehicle component without the necessity of determining the entire weight of the occupant. For example, the force that the occupant exerts on one of the three support members may be sufficient.

A recent U.S. patent application, Publication No. 2003/0168895, is interesting in that it is the first example of the use of time and the opening and closing of a vehicle door to help in the post-processing decision making for distinguishing a child restraint system (CRS) from an adult. This system is based on a load cell (strain gage) weight measuring system.

Automotive vehicles are equipped with seat belts and air bags as equipment for ensuring the safety of the passenger. In recent years, an effort has been underway to enhance the performance of the seat belt and/or the air bag by controlling these devices in accordance with the weight or the posture of the passenger. For example, the quantity of gas used to deploy the air bag or the speed of deployment could be controlled. Further, the amount of pretension of the seat belt could be adjusted in accordance with the weight and posture of the passenger. To this end, it is necessary to know the weight of the passenger sitting on the seat by some technique. The position of the center of gravity of the passenger sitting on the seat could also be referenced in order to estimate the posture of the passenger.

As an example of a technique to determine the weight or the center of gravity of the passenger of this type, a method of measuring the seat weight including the passenger's weight by disposing the load sensors (load cells) at the front, rear, left and right corners under the seat and summing vertical loads applied to the load cells has been disclosed in the assignee's numerous patents and patent applications on occupant sensing.

Since a seat weight measuring apparatus of this type is intended for use in general automotive vehicles, the cost of the apparatus must be as low as possible. In addition, the wiring and assembly also must be easy. Keeping such considerations in mind, the object of the present invention is to provide a seat weight measuring apparatus having such advantages that the production cost and the assembling cost may be reduced. To provide new and improved vehicular seats in which the weight applied by an occupying item to the seat is measured based on capacitance between conductive and/or metallic members underlying the seat cushion.

A further object of an invention herein is to provide new and improved adjustment apparatus and methods that evaluate the occupancy of the seat and adjust the location and/or orientation relative to the occupant and/or operation of a part of the component or the component in its entirety based on the evaluated occupancy of the seat and on a measurement of the occupant's weight or a measurement of a force exerted by the occupant on the seat.

6.2 Bladder Weight Sensors

Similarly to strain gage weight sensors, the first disclosure of weight sensors based of the pressure in a bladder in or under the seat cushion is believed to have been made in Breed et al. (U.S. Pat. No. 5,822,707) filed Jun. 7, 1995 by the current assignee.

A bladder is disclosed in W009830411, which claims the benefit of a U.S. provisional application filed on Jan. 7, 1998 showing two bladders. This patent application is assigned to Automotive Systems Laboratory and is part of a series of bladder based weight sensor patents and applications all of which were filed significantly after the current assignee's bladder weight sensor patent applications, the earliest filing date being in 1997.

Also U.S. Pat. No. 4,957,286 illustrates a single chamber bladder sensor for an exercise bicycle which measures the weight of a person as he or she in exercising but is not used in a vehicle nor is it used for controlling a safety device or any other component. EP0345806 illustrates a bladder in an automobile seat for the purpose of adjusting the shape of the seat. Although a pressure switch is provided, no attempt is made to measure the weight of the occupant and there is no mention of using the weight to control a vehicle component. IEE of Luxemburg and others have marketed seat sensors that measure the pattern on the object contacting the seat surface but none of these sensors purport to measure the weight of an occupying item of the seat.

6.3 Dynamic Weight Sensing

There does not appear to be any prior art regarding the use of the motion of the vehicle and its contents to dynamically measure the weight of an occupying item.

6.4 Combined Spatial and Weight Sensors

The combination of a weight sensor with a spatial sensor, such as the wave or electric field sensors discussed herein, permits the most accurate determination of the airbag requirements when the crash sensor output is also considered. There is not believed to be any prior art of such a combination. A recent patent, which is not considered prior art, that discloses a similar concept is U.S. Pat. No. 6,609,055.

6.5 Face Recognition (Face and iris IR Scans)

Ishikawa et al. (U.S. Pat. No. 4,625,329) describes an image analyzer (M5 in FIG. 1) for analyzing the position of driver based on the position of the driver's face, including an infrared light source which illuminates the driver's face and an image detector which receives light from the driver's face, determines the position of facial feature, e.g., the eyes in three dimensions, and thus determines the position of the driver's face in three dimensions. A pattern recognition process is used to determine the position of the facial features and entails converting the pixels forming the image to either black or white based on intensity and conducting an analysis based on the white area in order to find the largest contiguous white area and the center point thereof. Based on the location of the center point of the largest contiguous white area, the driver's height is derived and a heads-up display is adjusted so information is within driver's field of view. The pattern recognition process can be applied to detect the eyes, mouth, or nose of the driver based on the differentiation between the white and black areas. Ishikawa does not attempt to recognize the driver or to determine the location of the driver relative to an airbag or any other vehicle component.

Ando (U.S. Pat. No. 5,008,946) describes a system which recognizes an image and specifically ascertains the position of the pupils and mouth of the occupant to enable movement of the pupils and mouth to control electrical devices installed in the automobile. The system includes a camera which takes a picture of the occupant and applies algorithms based on pattern recognition techniques to analyze the picture, converted into an electrical signal, to determine the position of certain portions of the image, namely the pupils and mouth. Ando also does not attempt to recognize the driver.

Puma (U.S. Pat. No. 5,729,619) describes apparatus and methods for determining the identity of a vehicle operator and whether he or she is intoxicated or falling asleep. Puma uses an iris scan as the identification method and thus requires the driver to place his eyes in a particular position relative to the camera. Intoxication is determined by monitoring the spectral emission from the driver's eyes and drowsiness is determined by monitoring a variety of behaviors of the driver. The identification of the driver by any means is believed to have been first disclosed in the current assignee's patents referenced above as was identifying the impairment of the driver whether by alcohol, drugs or drowsiness through monitoring driver behavior and using pattern recognition. Puma uses pattern recognition but not neural networks although correlation analysis is implied as also taught in the current assignee's prior patents.

Other patents on eye tracking include Moran et al. (U.S. Pat. No. 4,847,486) and Hutchinson (U.S. Pat. No. 4,950,069). In Moran et al., a scanner is used to project a beam onto the eyes of the person and the reflection from the retina through the cornea is monitored to measure the time that the person's eyes are closed. In Hutchinson, the eye of a computer operator is illuminated with light from an infrared LED and the reflected light causes bright eye effect which outlines the pupil brighter than the rest of the eye and also causes an even brighter reflection from the cornea. By observing this reflection in the camera's field of view, the direction in which the eye is pointing can be determined. In this manner, the motion of the eye can control operation of the computer. Similarly, such apparatus can be used to control various functions within the vehicle such as the telephone, radio, and heating and air conditioning.

U.S. Pat. No. 5,867,587 to Aboutalib et al. also describes a drowsy driver detection unit based on the frequency of eye blinks where an eye blink is determined by correlation analysis with averaged previous states of the eye. U.S. Pat. No. 6,082,858 to Grace describes the use of two frequencies of light to monitor the eyes, one that is totally absorbed by the eye (950 nm) and another that is not and where both are equally reflected by the rest of the face. Thus, subtraction leaves only the eyes. An alternative, not disclosed by Aboutalib et al. or Grace, is to use natural light or a broad frequency spectrum and a filter to filter out all frequencies except 950 nm and then to proportion the intensities. U.S. Pat. No. 6,097,295 to Griesinger also attempts to determine the alertness of the driver by monitoring the pupil size and the eye shutting frequency. U.S. Pat. No. 6,091,334 uses measurements of saccade frequency, saccade speed, and blinking measurements to determine drowsiness. No attempt is made in any of these patents to locate the driver in the vehicle.

There are numerous technical papers on eye location and tracking developed for uses other than automotive including: (1) "Eye Tracking in Advanced Interface Design", Robert J. K. Jacob, Human-Computer Interaction Lab, Naval Research Laboratory, Washington, D.C.; (2) F. Smeraldi, O. Carmona, J. Bigün, "Saccadic search with Gabor features applied to eye detection and real-time head tracking", Image and Vision Computing 18 (2000) 323-329, Elsevier; (3) Y. Wang, B. Yuan, "Human Eyes Location Using Wavelet and Neural Networks", Proceedings of ICSP2000, IEEE; and (4) S. A. Sirohey, A. Rosenfeld, "Eye detection in a face image using linear and nonlinear filters", Pattern Recognition 34 (2001) 1367-1391, Pergamon.

There are also numerous technical papers on human face recognition including: (1) "Pattern Recognition with Fast Feature Extractions", M. G. Nakhodkin, Y. S. Musatenko, and V. N. Kurashov, Optical Memory and Neural Networks, Vol. 6, No. 3, 1997; and (2) C. Beumier, M. Acheroy "Automatic 3D Face Recognition", Image and Vision Computing, 18 (2000) 315-321, Elsevier.

Since the direction of gaze of the eyes is quite precise and relatively easily measured, it can be used to control many functions in the vehicle such as the telephone, lights, windows, HVAC, navigation and route guidance system, and telematics among others. Many of these functions can be combined with a heads-up display and the eye gaze can replace the mouse in selecting many functions and among many choices. It can also be combined with an accurate mapping system to display on a convenient display the writing on a sign that might be hard to read such as a street sign. It can even display the street name when a sign is not present. A gaze at a building can elicit a response providing the address of the building or some information about the building which can be provided either orally or visually. Looking at the speedometer can elicit a response as the local speed limit and looking at the fuel gage can elicit the location of the nearest gas station. None of these functions appear in the prior art discussed above.

Other papers on finding the eyes of a subject are: Wang, Y., Yuan, B., "Human Eye Location Using Wavelet and Neural Network", Proceedings of the IEEE Internal Conference on Signal Processing 2000, p 1233-1236, and Sirohey, S. A., Rosenfeld, A., "Eye detection in a face using linear and nonlinear filters", Pattern Recognition 34 (2001) p 1367-1391, Elsevier Science Ltd. The Sirohey et al. article in particular, in addition to a review of the prior art, provides an excellent methodology for eye location determination. The technique makes use of face color to aid in face and eye location.

In all of the above references on eye tracking, natural or visible illumination is used. In a vehicle infrared illumination will be used so as to not distract the occupant. The eyes of a person are particularly noticeable under infrared illumination as discussed in Richards, A., *Alien Vision*, p. 6-9, 2001, SPIE Press, Bellingham, Wash. The use of infrared radiation to aid in location of the occupant's eyes either by itself of along with natural or artificial radiation is a preferred implementation of the teachings of at least one of the inventions disclosed herein. This is illustrated in FIG. 53. In Aguilar, M., Fay, D. A., Ross, W. D., Waxman, M., Ireland, D. B., and Racamato, J. P., "Real-time fusion of low-light CCD and uncooled IR imagery for color night vision" SPIE Conference on Enhanced and Synthetic Vision 1998, Orlando, Fla. SPIE Vol. 3364 p. 124-133, the authors illustrate how to fuse images from different imagers together to form an enhanced image. They use thermal IR and enhanced visual to display a night vision image. The teachings of this reference, as well as those cross-references therein all of which are included herein by reference, can also be applied to improve the ability of a neural network or other pattern recognition system to locate the eyes and head, as well as other parts, of a vehicle occupant. In this case, there is no need to superimpose the two images as the neural network can accept separate inputs from each type imager. Thus, thermal IR imagers and enhanced visual imagers can be used in practicing at least one of the inventions disclosed herein as well as the other technologies mentioned above. In this manner, the eyes or other parts of the occupant can be found at night without additional sources of illumination.

6.6 Heartbeat and Health State

Although the concept of measuring the heartbeat of a vehicle occupant is believed to have originated with the current assignee, Bader in U.S. Pat. No. 6,195,008 uses a comparison of the heartbeat with stored data to determine the age of the occupant. Other uses of heartbeat measurement include determining the presence of an occupant on a particular seat, the determination of the total number of vehicle occupants, the presence of an occupant in a vehicle for security purposes, for example, and the presence of an occupant in the trunk etc.

6.7 Other Inputs

Many other inputs can be applied to the interior or exterior monitoring systems of the inventions disclosed herein. For interior monitoring, these can include, among others, the position of the seat and seatback, vehicle velocity, brake pressure, steering wheel position and motion, exterior temperature and humidity, seat weight sensors, accelerometers and gyroscopes, engine behavior sensors, tire monitors and chemical (oxygen, carbon dioxide, alcohol, etc.) sensors. For external monitoring, these can include, among others, temperature and humidity, weather forecasting information, traffic information, hazard warnings, speed limit information, time of day, lighting and visibility conditions and road condition information.

7. Illumination 7.1 Infrared Light

In a passive infrared system, as described in Corrado referenced above, for example, a detector receives infrared radiation from an object in its field of view, in this case the vehicle occupant, and determines the presence and temperature of the occupant based on the infrared radiation. The occupant sensor system can then respond to the temperature of the occupant, which can either be a child in a rear facing child seat or a normally seated occupant, to control some other system. This technology could provide input data to a pattern recognition system but it has limitations related to temperature.

The sensing of the child could pose a problem if the child is covered with blankets, depending on the IR frequency used. It also might not be possible to differentiate between a rear facing child seat and a forward facing child seat. In all cases, the technology can fail to detect the occupant if the ambient temperature reaches body temperature as it does in hot climates. Nevertheless, for use in the control of the vehicle climate, for example, a passive infrared system that permits an accurate measurement of each occupant's temperature is useful. Prior art systems are mostly limited to single pixel devices. Use of an IR imager removes many of the problems listed above and is believed to be novel to the inventions disclosed herein.

In a laser optical system, an infrared laser beam is used to momentarily illuminate an object, occupant or child seat in the manner as described, and illustrated in FIG. 8, of Breed et al. (U.S. Pat. No. 5,653,462). In some cases, a CCD or a CMOS device is used to receive the reflected light. In other cases, when a scanning laser is used, a pin or avalanche diode or other photo detector can be used. The laser can either be used in a scanning mode, or, through the use of a lens, a cone of light, swept line of light, or a pattern or structured light can be created which covers a large portion of the object. Additionally, one or more LEDs can be used as a light source. Also, triangulation can be used in conjunction with an offset scanning laser to determine the range of the illuminated spot from the light detector. Various focusing systems also can have applicability in some implementations to measure the distance to an occupant. In most cases, a pattern recognition system, as defined herein, is used to identify, ascertain the identity of and classify, and can be used to locate, and determine the position of, the illuminated object and/or its constituent parts.

Optical systems generally provide the most information about the object and at a rapid data rate. Their main drawback is cost which is usually above that of ultrasonic or passive infrared systems. As the cost of lasers and imagers has now come down, this system is now competitive. Depending on the implementation of the system, there may be some concern for the safety of the occupant if a laser light can enter the occupant's eyes. This is minimized if the laser operates in the infrared spectrum particularly at the "eye-safe" frequencies.

Another important feature is that the brightness of the point of light from the laser, if it is in the infrared part of the spectrum and if a filter is used on the receiving detector, can overpower the reflected sun's rays with the result that the same classification algorithms can be made to work both at night and under bright sunlight in a convertible. An alternative approach is to use different algorithms for different lighting conditions.

Although active and passive infrared light has been disclosed in the prior art, the use of a scanning laser, modulated light, filters, trainable pattern recognition etc. is believed to have been first disclosed by the current assignee in the above-referenced patents.

7.2 Structured Light

U.S. Pat. No. 5,003,166 provides an excellent treatise on the use of structured light for range mapping of objects in general. It does not apply this technique for automotive applications and in particular for occupant sensing or monitoring inside or outside of a vehicle. The use of structured light in the automotive environment and particularly for sensing occupants is believed to have been first disclosed by the current assignee in the above-referenced patents.

U.S. Pat. No. 6,049,757 to Nakajima et al. describes structured light in the form of bright spots that illuminate the face of the driver to determine the inclination of the face and to issue a warning if the inclination is indicative of a dangerous situation. In the current assignee's patents, structured light is disclosed to obtain a determination of the location of an occupant and/or his or her parts. This includes the position of any part of the occupant including the occupant's face and thus the invention of this patent is believed to be anticipated by the current assignee's patents referenced above.

U.S. Pat. No. 6,298,311 to Griffin et al. repeats much of the teachings of the early patents of the current assignee. A plurality of IR beams are modulated and directed in the vicinity of the passenger seat and used through a photosensitive receiver to detect the presence and location of an object in the passenger seat, although the particular pattern recognition system is not disclosed. The pattern of IR beams used in this patent is a form of structured light.

Structured light is also discussed in numerous technical papers for other purposes than vehicle interior or exterior monitoring including: (1) "3D Shape Recovery and Registration Based on the Projection of Non-Coherent Structured Light" by Roberto Rodella and Giovanna Sansoni, INFM and Dept. of Electronics for the Automation, University of Brescia, Via Branze 38, I-25123 Brescia—Italy; (2) "A Low-Cost Range Finder using a Visually Located, Structured Light Source", R. B. Fisher, A. P. Ashbrook, C. Robertson, N. Werghi, Division of Informatics, Edinburgh University, 5 Forrest Hill, Edinburgh EH1 2QL; (3) F. Lerasle, J. Lequellec, M Devy, "Relaxation vs. Maximal Cliques Search for Projected Beams Labeling in a Structured Light Sensor", Proceedings of the International Conference on Pattern Recognition, 2000 IEEE; and (4) D. Caspi, N. Kiryati, and J. Shamir, "Range Imaging With Adaptive Color Structured Light", IEEE Transactions on Pattern Analysis and Machine Intelligence, Vol. 20, No. 5, May 1998.

Recently, a paper has been published that describes a structured light camera system disclosed years ago by the current assignee: V. Ramesh, M. Greiffenhagen, S. Boverie, A. Giratt, "Real-Time Surveillance and Monitoring for Automotive Applications", SAE 2000-01-0347.

7.3 Color and Natural Light

A number of systems have been disclosed that use illumination as the basis for occupant detection. The problem with artificial illumination is that it will not always overpower the sun and thus in a convertible on a bright sunny day, for example, the artificial light can be undetectable unless it is a point. If one or more points of light are not the illumination of choice, then the system must also be able to operate under natural light. The inventions herein accomplish the feat of accurate identification and tracking of an occupant under all lighting conditions by using artificial illumination at night and natural light when it is available. This requires that the pattern recognition system be modular with different modules used for different situations as discussed in more detail below. There is no known prior art for using natural radiation for occupant sensing systems.

When natural illumination is used, a great deal of useful information can be obtained if various parts of the electromagnetic spectrum are used. The ability to locate the face and facial features is enhanced if color is used, for example. Once again, there is no known prior art for the use of color, for example. All known systems that use electromagnetic radiation are monochromatic.

7.4 Radar

The radar portion of the electromagnetic spectrum can also be used for occupant detection as first disclosed by the current assignee in the above-referenced patents. Radar systems have similar properties to the laser system discussed above except the ability to focus the beam, which is limited in radar by the frequency chosen and the antenna size. It is also much more difficult to achieve a scanning system for the same reasons. The wavelength of a particular radar system can limit the ability of the pattern recognition system to detect object features smaller than a certain size. Once again, however, there is some concern about the health effects of radar on children and other occupants. This concern is expressed in various reports available from the United States Food and Drug Administration, Division of Devices.

When the occupying item is human, in some instances the information about the occupying item can be the occupant's position, size and/or weight. Each of these properties can have an effect on the control criteria of the component. One system for determining a deployment force of an air bag system in described in U.S. Pat. No. 6,199,904 (Dosdall). This system provides a reflective surface in the vehicle seat that reflects microwaves transmitted from a microwave emitter. The position, size and weight of a human occupant are said to be determined by calibrating the microwaves detected by a detector after the microwaves have been reflected from the reflective surface and pass through the occupant. Although some features disclosed in the '904 patent are not disclosed in the current assignee's above-referenced patents, the use of radar in general for occupant sensing is disclosed in those patents.

7.5 Frequency or Spectrum Considerations

As discussed above, it is desirable to obtain information about an occupying item in a vehicle in order to control a component in the vehicle based on the characteristics of the occupying item. For example, if it were known that the occupying item is inanimate, an airbag deployment system would generally be controlled to suppress deployment of any airbags designed to protect passengers seated at the location of the inanimate object.

Particular parts of the electromagnetic spectrum interact with animal bodies in a manner differently from inanimate objects and allow the positive identification that there is an animal in the passenger compartment, or in the vicinity of the vehicle. The choice of frequencies for both active and passive observation of people is discussed in detail in Richards, A. *Alien Vision, Exploring the Electromagnetic Spectrum with Imaging Technology,* 2001, SPIE Press Bellingham, Wash. In particular, in the near IR range (~850 nm), the eyes of a person at night are easily seen when illuminated. In the near UV range (~360 nm), distinctive skin patterns are observable that can be used for identification. In the SWIR range (1100-2500 nm), the person can be easily separated from the background.

The MWIR range (2.5-7 Microns) in the passive case clearly shows people against a cooler background except when the ambient temperature is high and then everything radiates or reflects energy in that range. However, windows are not transparent to MWIR and thus energy emitted from outside the vehicle does not interfere with the energy emitted from the occupants as long as the windows are closed. This range is particularly useful at night when it is unlikely that the vehicle interior will be emitting significant amounts of energy in this range.

In the LWIR range (7-15 Microns), people are even more clearly seen against a dark background that is cooler than the person. Finally, millimeter wave radar can be used for occupant sensing as discussed elsewhere. It is important to note that an occupant sensing system can use radiation in more than one of these ranges depending on what is appropriate for the situation. For example, when the sun is bright, then visual imaging can be very effective and when the sun has set, various ranges of infrared become useful. Thus, an occupant sensing system can be a combination of these subsystems. Once again, there is not believed to be any prior art on the use of these imaging techniques for occupant sensing other than that of the current assignee.

Finally, terahertz-based devices are now being developed which show promise for vehicle interrogation and monitoring systems. Terahertz is a higher frequency than mm wave but longer than LWIR. Typically, terahertz waves are in the 1 mm to 100 Microns or less. Devices under development will permit a laser like device for generation and an array device for sensing. Life forms will respond in a particular fashion to terahertz radiation as discussed in the book Alien Vision referenced above.

8. Field Sensors

Capacitive reflective occupant sensing computes distance by detecting dielectric constant of water within the operating range of the sensor, and can distinguish a human from an inanimate object in the seat. Another capacitive sensor uses a comparison to the dielectric constant of air. A human who is 80 times more conductive than air will register as being in a seat and the distance recognized. Objects not so conductive will not register. A non-registering object is interpreted as an unoccupied seat. This unoccupied seat message could be used to prevent the airbag from deploying. Force sensing resistors located in the seats can also be used to detect the presence of an occupant. Occupant sensors deactivate airbags if a seat registers as unoccupied or if the occupant is detected too close to the airbag.

The use of a capacitive sensor in a vehicle to generate an output signal indicative of the presence of an object is described in U.S. Pat. No. 6,020,812 to Thompson et al. The presence of the object affects the reflected electric field causing a change in an output signal. The sensor is mounted on the steering wheel assembly for driver position detection or on the instrument panel near the passenger air bag module for passenger position detection. Thompson et al. also describes the use of a second capacitive sensor which generates an electric field which may or may not overlap the electric field generated by the first capacitive sensor. The positioning of the second capacitive sensor determines whether its electric field overlaps. The second capacitive sensor is used to determine whether the occupant is in a normal seating position and based on this determination, affects the decision to activate a safety restraint.

The distance measuring device such as disclosed herein can also be a capacitive proximity sensor or a capacitance sensor. One possible capacitance sensor called a capaciflector is described in U.S. Pat. No. 5,166,679. The capaciflector senses closeness or distance between the sensor and an object based on the capacitive coupling between the sensor and the object. One problem of the system using such a sensor mounted on the steering wheel, for example, is that a driver may have inadvertently placed his hand over the sensor, thus defeating the operation of the device. A second confirming transmitter/receiver is therefore desirable to be placed at some other convenient position such as on the roof or headliner of the passenger compartment as shown in several implementations described below.

Electric and magnetic phenomena can be employed in other ways to sense the presence of an occupant and in particular the fields themselves can be used to determine the dielectric properties, such as the loss tangent or dielectric constant, of occupying items in the passenger compartment. However, it is difficult if not impossible to measure these properties using static fields and thus a varying field is used which once again causes electromagnetic waves. Thus, the use of quasi-static low-frequency fields is really a limiting case of the use of waves as described in detail above. Electromagnetic waves are significantly affected at low frequencies, for example, by the dielectric properties of the material. Such capacitive or electric field sensors, for example are described in U.S. patents by Kithil et al. U.S. Pat. Nos. 5,366,241, 5,602,734, 5,691,693, 5,802,479, 5,844,486 and 6,014,602; by Jinno et al. U.S. Pat. No. 5,948,031; by Saito U.S. Pat. No. 6,325,413; by Kleinberg et al. U.S. Pat. No. 9,770,997; and SAE technical papers 982292 and 971051.

Additionally, as discussed in more detail below, the sensing of the change in the characteristics of the near field that surrounds an antenna is an effective and economical method of determining the presence of water or a water-containing life form in the vicinity of the antenna and thus a measure of occupant presence. Measurement of the near field parameters can also yield a specific pattern of an occupant and thus provide a possibility to discriminate a human being from other objects. The use of electric field and capacitance sensors and their equivalence to the occupant sensors described herein requires a special discussion.

Electric and magnetic field sensors and wave sensors are essentially the same from the point of view of sensing the presence of an occupant in a vehicle. In both cases, a time varying electric and/or magnetic field is disturbed or modified by the presence of the occupant. At high frequencies in the visual, infrared and high frequency radio wave region, the sensor is usually based on the reflection of electromagnetic energy. As the frequency drops and more of the energy passes through the occupant, the absorption of the wave energy is measured and at still lower frequencies, the occupant's dielectric properties modify the time varying field produced in the occupied space by the plates of a capacitor. In this latter case, the sensor senses the change in charge distribution on the capacitor plates by measuring, for example, the current wave magnitude or phase in the electric circuit that drives the capacitor.

In all cases, the presence of the occupant reflects, absorbs or modifies the waves or variations in the electric or magnetic fields in the space occupied by the occupant. Thus, for the purposes of at least one of the inventions disclosed herein, capacitance and inductance, electric field and magnetic field sensors are equivalent and will be considered as wave sensors. What follows is a discussion comparing the similarities and differences between two types of wave sensors, electromagnetic beam sensors and capacitive sensors as exemplified by Kithil in U.S. Pat. No. 5,602,734.

An electromagnetic field disturbed or emitted by a passenger in the case of an electromagnetic beam sensor, for example, and the electric field sensor of Kithil, for example, are in many ways similar and equivalent for the purposes of at least one of the inventions disclosed herein. The electromagnetic beam sensor is an actual electromagnetic wave sensor by definition, which exploits for sensing a coupled pair of continuously changing electric and magnetic fields, an electromagnetic wave affected or generated by a passenger. The electric field here is not a static, potential one. It is essentially a dynamic, vortex electric field coupled with a changing magnetic field, that is, an electromagnetic wave. It cannot be produced by a steady distribution of electric charges. It is initially produced by moving electric charges in a transmitter, even if this transmitter is a passenger body for the case of a passive infrared sensor.

In the Kithil sensor, a static electric field is declared as an initial material agent coupling a passenger and a sensor (see column 5, lines 5-7): "The proximity sensors 12 each function by creating an electrostatic field between oscillator input loop 54 and detector output loop 56, which is affected by presence of a person near by, as a result of capacitive coupling, . . . ". It is a potential, non-vortex electric field. It is not necessarily coupled with any magnetic field. It is the electric field of a capacitor. It can be produced with a steady distribution of electric charges. Thus, it is not an electromagnetic wave by definition but if the sensor is driven by a varying current, then it produces a varying electric field in the space between the plates of the capacitor which necessarily and simultaneously originates an electromagnetic wave. In the strict sense, a varying electric field between the plates of a capacitor is different from an electromagnetic wave that is detached from the device that produces it. For the purposes herein, however, both are varying electric fields and both interact with matter where the interaction is a function of the dielectric constant of the matter and therefore they can be considered in some cases as equivalents.

Kithil declares that he uses a static electric field in his capacitance sensor. Thus, from the consideration above, one can conclude that Kithil's sensor cannot be treated as a wave sensor because there are no actual electromagnetic waves but only a static electric field of the capacitor in the sensor system. However, this is not the case. The Kithil system could not operate with a true static electric field because a steady system does not carry any information. Therefore, Kithil is forced to use an oscillator, causing an alternating current in the capacitor and a time varying electric field, or equivalent wave, in the space between the capacitor plates, and a detector to reveal an informative change of the sensor capacitance caused by the presence of an occupant (see FIG. 7 and its description). In this case, his system becomes a wave sensor in the sense that it starts generating actual electromagnetic waves according to the definition above. That is, Kithil's sensor can be treated as a wave sensor regardless of the degree to which the electromagnetic field that it creates has developed, a beam or a spread shape.

As described in the Kithil patents, the capacitor sensor is a parametric system where the capacitance of the sensor is controlled by influence of the passenger body. This influence is transferred by means of the varying electromagnetic field (i.e., the material agent necessarily originating the wave process) coupling the capacitor electrodes and the body. It is important to note that the same influence takes also place with a true static electric field caused by an unmovable charge distribution, that is in the absence of any wave phenomenon. This would be a situation if there were no oscillator in Kithil's system. However, such a system is not workable and thus Kithil reverts to a dynamic system using electromagnetic waves.

Thus, although Kithil declares the coupling is due to a static electric field, such a situation is not realized in his system because an alternating electromagnetic field ("wave") exists in the system due to the oscillator. Thus, his sensor is actually a wave sensor, that is, it is sensitive to a change of a wave field in the vehicle compartment. This change is measured by measuring the change of its capacitance. The capacitance of the sensor system is determined by the configuration of its electrodes, one of which is a human body, that is, the passenger, and the part which controls the electrode configuration and hence a sensor parameter, the capacitance.

The physics definition of "wave" from Webster's Encyclopedic Unabridged Dictionary is: "11. Physics. A progressive disturbance propagated from point to point in a medium or space without progress or advance of the points themselves, . . . " In a capacitor, the time that it takes for the disturbance (a change in voltage) to propagate through space, the dielectric and to the opposite plate is generally small and neglected but it is not zero. In space, this velocity of propagation is the speed of light. As the frequency driving the capacitor increases and the distance separating the plates increases, this transmission time as a percentage of the period of oscillation can become significant. Nevertheless, an observer between the plates will see the rise and fall of the electric field much like a person standing in the water of an ocean. The presence of a dielectric body between the plates causes the waves to get bigger as more electrons flow to and from the plates of the capacitor. Thus, an occupant affects the magnitude of these waves which is sensed by the capacitor circuit. Thus, the electromagnetic field is a material agent that carries information about a passenger's position in both Kithil's and a beam type electromagnetic wave sensor.

The following definitions are from the Encyclopedia Britannica:

"Electromagnetic Field"

"A property of space caused by the motion of an electric charge. A stationary charge will produce only an electric field in the surrounding space. If the charge is moving, a magnetic field is also produced. An electric field can be produced also by a changing magnetic field. The mutual interaction of electric and magnetic fields produces an electromagnetic field, which is considered as having its own existence in space apart from the charges or currents (a stream of moving charges) with which it may be related . . . " (Copyright 1994-1998 Encyclopedia Britannica).

"Displacement Current"

" . . . in electromagnetism, a phenomenon analogous to an ordinary electric current, posited to explain magnetic fields that are produced by changing electric fields. Ordinary electric currents, called conduction currents, whether steady or varying, produce an accompanying magnetic field in the vicinity of the current. [ . . . ]

"As electric charges do not flow through the insulation from one plate of a capacitor to the other, there is no conduction current; instead, a displacement current is said to be present to account for the continuity of the magnetic effects. In fact, the calculated size of the displacement current between the plates of a capacitor being charged and discharged in an alternating-current circuit is equal to the size of the conduction current in the wires leading to and from the capacitor. Displacement currents play a central role in the propagation of electromagnetic radiation, such as light and radio waves, through empty space. A traveling, varying magnetic field is everywhere associated with a periodically changing electric field that may be conceived in terms of a displacement current. Maxwell's insight on displacement current, therefore, made it possible to understand electromagnetic waves as being propagated through space completely detached from electric currents in conductors." Copyright 1994-1998 Encyclopedia Britannica.

"Electromagnetic Radiation"

" . . . energy that is propagated through free space or through a material medium in the form of electromagnetic waves, such as radio waves, visible light, and gamma rays. The term also refers to the emission and transmission of such radiant energy. [ . . . ]

"It has been established that time-varying electric fields can induce magnetic fields and that time-varying magnetic fields can in like manner induce electric fields. Because such electric and magnetic fields generate each other, they occur jointly, and together they propagate as electromagnetic waves. An electromagnetic wave is a transverse wave in that the electric field and the magnetic field at any point and time in the wave are perpendicular to each other as well as to the direction of propagation. [ . . . ]

"Electromagnetic radiation has properties in common with other forms of waves such as reflection, refraction, diffraction, and interference. [ . . . ]" Copyright 1994-1998 Encyclopedia Britannica The main part of the Kithil "circuit means" is an oscillator, which is as necessary in the system as the capacitor itself to make the capacitive coupling effect be detectable. An oscillator by nature creates waves. The system can operate as a sensor only if an alternating current flows through the sensor capacitor, which, in fact, is a detector from which an informative signal is acquired. Then, this current (or, more exactly, the integral of the current over time—charge) is measured and the result is a measure of the sensor capacitance value. The latter in turn depends on the passenger presence that affects the magnitude of the waves that travel between the plates of the capacitor making the Kithil sensor a wave sensor by the definition herein.

An additional relevant definition is:

(Telecom Glossary, atis.org/tg2k/_capacitive_coupling-.html)

"capacitive coupling: The transfer of energy from one circuit to another by means of the mutual capacitance between the circuits. (188) Note 1: The coupling may be deliberate or inadvertent. Note 2: Capacitive coupling favors transfer of the higher frequency components of a signal, whereas inductive coupling favors lower frequency components, and conductive coupling favors neither higher nor lower frequency components."

Another similarity between one embodiment of the sensor of at least one of the inventions disclosed herein and the Kithil sensor is the use of a voltage-controlled oscillator (VCO).

9. Telematics

One key invention disclosed here and in the current assignee's above-referenced patents is that once an occupancy has been categorized one of the many ways that the information can be used is to transmit all or some of it to a remote location, e.g., via a telematics link. This link can be a cell phone, Wi-F Wi-Mobile or other Internet connection or a satellite (LEO or geo-stationary). The recipient of the information can be a governmental authority, a company or an EMS organization.

9.1 Transmission of Occupancy Information

For example, vehicles can be provided with a standard cellular phone as well as the Global Positioning System (GPS), an automobile navigation or location system with an optional connection to a manned assistance facility, which is now available on a number of vehicle models. In the event of an accident, the phone may automatically call 911 for emergency assistance and report the exact position of the vehicle. If the vehicle also has a system as described herein for monitoring each seat location, the number and perhaps the condition of the occupants could also be reported. In that way, the emergency service (EMS) would know what equipment and how many ambulances to send to the accident site. Moreover, a communication channel can be opened between the vehicle and a monitoring facility/emergency response facility or personnel to enable directions to be provided to the occupant(s) of the vehicle to assist in any necessary first aid prior to arrival of the emergency assistance personnel.

One existing service is OnStar® provided by General Motors that automatically notifies an OnStarg operator in the event that the airbags deploy. By adding the teachings of the inventions herein, the service can also provide a description on the number and category of occupants, their condition and the output of other relevant information including a picture of a particular seat before and after the accident if desired. There is not believed to be any prior art for these added services.

9.2 Low Cost Automatic Crash Notification 9.3 Cell Phone Improvements 9.4 Children Trapped in a Vehicle 9.5 Telematics with Non-Automotive Vehicles 10. Display 10.1 Heads-up Display (HUD)

Heads-up displays are normally projected onto the windshield. In a few cases, they can appear on a visor that is placed in front of the driver or vehicle passenger. The use of the term heads-up display or HUD herein will generally encompass both systems as well as other equivalent systems such as an OLED display.

Various manufacturers have attempted to provide information to a driver through the use of a heads-up display. In some cases, the display is limited to information that would otherwise appear on the instrument panel. In more sophisticated cases, there is an attempt to display information about the environment that would be useful to the driver. Night vision cameras can record that there is a person or an object ahead on the road that the vehicle might run into if the driver is not aware of its presence. Present day systems of this type provide a display at the bottom of the windshield of the scene sensed by the night vision camera. No attempt is made to superimpose this onto the windshield such that the driver would see it at the location that he would normally see it if the object were illuminated. This confuses the driver and in one study the driver actually performed worse than he would have in the absence of the night vision information.

The ability to find the eyes of the driver, as taught here, permits the placement of the night vision image exactly where the driver expects to see it. An enhancement is to categorize and identify the objects that should be brought to the attention of the driver and then place an icon at the proper place in the driver's field of view. There is no known prior art of these inventions. There is of course much prior art on night vision. See for example, M. Aguilar, D. A. Fay, W. D. Ross, A. M. Waxman, D. B. Ireland, J. P. Racamato, "Real-time fusion of low-light CCD and uncooled IR imagery for color night vision", SPIE Vol. 3364 (1998).

The University of Minnesota attempts to show the driver of a snow plow where the snow covered road edges are on a LCD display that is placed in front of the windshield. Needless to say this also can confuse the driver and a preferable approach, as disclosed herein, is to place the edge markings on the windshield as they would appear if the driver could see the road. This again requires knowledge of the location of the eyes of the driver which is not present in the Minnesota system.

Many other applications of display technology come to mind including aids to a lost driver from the route guidance system. An arrow, lane markings or even a pseudo-colored lane can be properly placed in his field of view when he should make a turn, for example or direct the driver to the closest McDonalds or gas station. For the passenger, objects of interest along with short descriptions (written or oral) can be highlighted on the HUD if the locations of the eyes of the passenger are known. In fact, all of the windows of the vehicle can become semi-transparent computer screens and be used as a virtual reality or augmented reality system guiding the driver and providing information about the environment that is generated by accurate maps, sensors and inter-vehicle communication and vehicle-to-infrastructure communication. This becomes easier with the development of organic displays that comprise a thin film that can be manufactured as part of the window or appear as part of a transparent visor. Again, there is not believed to be any prior art on these features.

10.2 Adjust HUD Based on Driver Seating Position

A simpler system that can be implemented without an occupant sensor is to base the location of the HUD display on the expected location of the eyes of the driver that can be calculated from other sensor information such as the position of the rear view mirror, seat position and weight of the occupant. Once an approximate location for the display is determined, a knob of another system can be provided to permit the driver to fine tune that location.

There is not believed to be any prior art for this concept. Some relevant patents are U.S. Pat. No. 5,668,907 and W00235276.

10.3 HUD on Rear Window

In some cases, it might be desirable to project the HUD onto the rear window or in some cases even the side windows. For the rear window, the position of the mirror and the occupant's eyes would be useful in determining where to place the image. The position of the eyes of the driver or passenger would be useful for a HUD display on the side windows. Finally, for an entertainment system, the positions of the eyes of a passenger can allow the display of three-dimensional images onto any in-vehicle display. In this regard, see for example U.S. Pat. No. 6,291,906.

10.4 Plastic Electronics

Heads-up displays previously have been based on projection systems. With the development of plastic electronics, the possibility now exists to eliminate the projection system and to create the image directly on the windshield. Relevant patents for this technology include U.S. Pat. Nos. 5,661,553, 5,796,454, 5,889,566, and 5,933,203. A relevant paper is "Polymer Material Promises an Inexpensive and Thin Full-Color Light-Emitting Plastic Display", Electronic Design Magazine, Jan. 9, 1996. This display material can be used in conjunction with SPD, for example, to turn the vehicle windows into a multicolored display. Also see "Bright Future for Displays", MIT Technology Review, pp 82-3, April 2001.

11. Pattern Recognition

Many of the teachings of the inventions herein are based on pattern recognition technologies as taught in numerous textbooks and technical papers. For example, an important part of the diagnostic teachings of at least one of the inventions disclosed herein is the manner in which the diagnostic module determines a normal pattern from an abnormal pattern and the manner in which it decides what data to use from the vast amount of data available. This is accomplished using pattern recognition technologies, such as artificial neural networks, combination neural networks, support vector machines, cellular neural networks etc.

The present invention relating to occupant sensing can use sophisticated pattern recognition capabilities such as fuzzy logic systems, neural networks, neural-fuzzy systems or other pattern recognition computer-based algorithms with the occupant position measurement system disclosed in the above referenced patents and/or patent applications.

The pattern recognition techniques used can be applied to the preprocessed data acquired by various transducers or to the raw data itself depending on the application. For example, as reported in the current assignee's patent publications, there is frequently information in the frequencies present in the data and thus a Fourier transform of the data can be inputted into the pattern recognition algorithm. In optical correlation methods, for example, a very fast identification of an object can be obtained using the frequency domain rather than the time domain. Similarly, when analyzing the output of weight sensors, the transient response is usually more accurate that the static response, as taught in the current assignee's patents and patent applications, and this transient response can be analyzed in the frequency domain or in the time domain. An example of the use of a simple frequency analysis is presented in U.S. Pat. No. 6,005,485 to Kursawe.

Pattern recognition technology is important to the development of smart airbags that the occupant identification and position determination systems described in the above-referenced patents and patent applications and to the methods described herein for adapting those systems to a particular vehicle model and for solving particular subsystem problems discussed in this section. To complete the development of smart airbags, an anticipatory crash detecting system such as disclosed in U.S. Pat. No. 6,343,810 is also desirable. Prior to the implementation of anticipatory crash sensing, the use of a neural network smart crash sensor, which identifies the type of crash and thus its severity based on the early part of the crash acceleration signature, should be developed and thereafter implemented.

U.S. Pat. No. 5,684,701 describes a crash sensor based on neural networks. This crash sensor, as with all other crash sensors, determines whether or not the crash is of sufficient severity to require deployment of the airbag and, if so, initiates the deployment. A smart airbag crash sensor based on neural networks can also be designed to identify the crash and categorize it with regard to severity, thus permitting the airbag deployment to be matched not only to the characteristics and position of the occupant but also to the severity and timing of the crash itself as described in more detail in US RE37260 (a reissue of U.S. Pat. No. 5,943,295).

The applications for this technology are numerous as described in the current assignee's patents and patent applications listed herein. They include, among others: (i) the monitoring of the occupant for safety purposes to prevent airbag deployment induced injuries, (ii) the locating of the eyes of the occupant (driver) to permit automatic adjustment of the rear view mirror(s), (iii) the location of the seat to place the occupant's eyes at the proper position to eliminate the parallax in a heads-up display in night vision systems, (iv) the location of the ears of the occupant for optimum adjustment of the entertainment system, (v) the identification of the occupant for security or other reasons, (vi) the determination of obstructions in the path of a closing door or window, (vii) the determination of the position of the occupant's shoulder so that the seat belt anchorage point can be adjusted for the best protection of the occupant, (viii) the determination of the position of the rear of the occupants head so that the headrest or other system can be adjusted to minimize whiplash injuries in rear impacts, (ix) anticipatory crash sensing, (x) blind spot detection, (xi) smart headlight dimmers, (xii) sunlight and headlight glare reduction and many others. In fact, over forty products alone have been identified based on the ability to identify and monitor objects and parts thereof in the passenger compartment of an automobile or truck. In addition, there are many other applications of the apparatus and methods described herein for monitoring the environment exterior to the vehicle.

Unless specifically stated otherwise below, there is no known prior art for any of the applications listed in this section.

11.1 Neural Networks

The theory of neural networks including many examples can be found in several books on the subject including. See references 16 through 33. An example of such a pattern recognition system using neural networks using sonar is discussed in two papers by Gorman, R. P. and Sejnowski, T. J. "Analysis of Hidden Units in a Layered Network Trained to Classify Sonar Targets", Neural Networks, Vol. 1. pp. 75-89, 1988, and "Learned Classification of Sonar Targets Using a Massively Parallel Network", IEEE Transactions on Acoustics, Speech, and Signal Processing, Vol. 36, No. 7, July 1988. A more recent example using cellular neural networks is: M. Milanove, U. Büker, "Object recognition in image sequences with cellular neural networks", Neurocomputing 31 (2000) 124-141, Elsevier. Another recent example using support vector machines, a form of neural network, is: E. Destefanis, E. Kienzle, L. Canali, "Occupant Detection Using Support Vector Machines With a Polynomial Kernel Function", SPIE Vol. 4192 (2000).

Japanese Patent No. 3-42337 (A) to Ueno describes a device for detecting the driving condition of a vehicle driver comprising a light emitter for irradiating the face of the driver and a means for picking up the image of the driver and storing it for later analysis. Means are provided for locating the eyes of the driver and then the irises of the eyes and then determining if the driver is looking to the side or sleeping. Ueno determines the state of the eyes of the occupant rather than determining the location of the eyes relative to the other parts of the vehicle passenger compartment. Such a system can be defeated if the driver is wearing glasses, particularly sunglasses, or another optical device which obstructs a clear view of his/her eyes. Pattern recognition technologies such as neural networks are not used. The method of finding the eyes is described but not a method of adapting the system to a particular vehicle model.

U.S. Pat. No. 5,008,946 to Ando uses a complicated set of rules to isolate the eyes and mouth of a driver and uses this information to permit the driver to control the radio, for example, or other systems within the vehicle by moving his eyes and/or mouth. Ando uses visible light and illuminates only the head of the driver. He also makes no use of trainable pattern recognition systems such as neural networks, nor is there any attempt to identify the contents neither of the vehicle nor of their location relative to the vehicle passenger compartment. Rather, Ando is limited to control of vehicle devices by responding to motion of the driver's mouth and eyes. As with Ueno, a method of finding the eyes is described but not a method of adapting the system to a particular vehicle model.

U.S. Pat. Nos. 5,298,732 and 5,714,751 to Chen also concentrate on locating the eyes of the driver so as to position a light filter in the form of a continuously repositioning small sun visor or liquid crystal shade between a light source, such as the sun or the lights of an oncoming vehicle, and the driver's eyes. Chen does not explain in detail how the eyes are located but does supply a calibration system whereby the driver can adjust the filter so that it is at the proper position relative to his or her eyes as long as the eyes remain at the particular position. Chen references the use of automatic equipment for determining the location of the eyes but does not describe how this equipment works. In any event, in Chen, there is no mention of illumination of the occupant, monitoring the position of the occupant, other than the eyes, determining the position of the eyes relative to the passenger compartment, or identifying any other object in the vehicle other than the driver's eyes. Also, there is no mention of the use of a trainable pattern recognition system. A method for finding the eyes is described but not a method of adapting the system to a particular vehicle model.

U.S. Pat. No. 5,305,012 to Faris also describes a system for reducing the glare from the headlights of an oncoming vehicle. Faris locates the eyes of the occupant by using two spaced-apart infrared cameras using passive infrared radiation from the eyes of the driver. Again, Faris is only interested in locating the driver's eyes relative to the sun or oncoming headlights and does not identify or monitor the occupant or locate the occupant, a rear facing child seat or any other object for that matter, relative to the passenger compartment or the airbag. Also, Faris does not use trainable pattern recognition techniques such as neural networks. Faris, in fact, does not even say how the eyes of the occupant are located but refers the reader to a book entitled Robot Vision (1991) by Berthold Horn, published by MIT Press, Cambridge, Mass. A review of this book did not appear to provide the answer to this question. Also, Faris uses the passive infrared radiation rather than illuminating the occupant with ultrasonic or electromagnetic radiation as in some implementations of the instant invention. A method for finding the eyes of the occupant is described but not a method of adapting the system to a particular vehicle model.

The use of neural networks, or neural fuzzy systems, and in particular combination neural networks, as the pattern recognition technology and the methods of adapting this to a particular vehicle, such as the training methods, is important to some of the inventions herein since it makes the monitoring system robust, reliable and accurate. The resulting algorithm created by the neural network program is usually short with a limited number of lines of code written in the C or C++ computer language as opposed to typically a very large algorithm when the techniques of the above patents to Ando, Chen and Faris are implemented. As a result, the resulting systems are easy to implement at a low cost, making them practical for automotive applications. The cost of the ultrasonic transducers, for example, is expected to be less than about $1 in quantities of one million per year and the cost of the CCD and CMOS arrays, which have been prohibitively expensive until recently, currently are estimated to cost less than about $5 each in similar quantities also rendering their use practical. Similarly, the implementation of the techniques of the above-referenced patents requires expensive microprocessors while the implementation with neural networks and similar trainable pattern recognition technologies permits the use of low cost microprocessors typically costing less than about $10 in large quantities.

The present invention is best implemented using sophisticated software that develops trainable pattern recognition algorithms such as neural networks and combination neural networks. Usually, the data is preprocessed, as discussed below, using various feature extraction techniques and the results post-processed to improve system accuracy. Examples of feature extraction techniques can be found in U.S. Pat. No. 4,906,940 entitled "Process and Apparatus for the Automatic Detection and Extraction of Features in Images and Displays" to Green et al. Examples of other more advanced and efficient pattern recognition techniques can be found in U.S. Pat. No. 5,390,136 entitled "Artificial Neuron and Method of Using Same" and U.S. Pat. No. 5,517,667 entitled "Neural Network That Does Not Require Repetitive Training" to S. T. Wang. Other examples include U.S. Pat. No. 5,235,339 (Morrison et al.), U.S. Pat. No. 5,214,744 (Schweizer et al), U.S. Pat. No. 5,181,254 (Schweizer et al), and U.S. Pat. No. 4,881,270 (Knecht et al). Neural networks as used herein include all types of neural networks including modular neural networks, cellular neural networks and support vector machines and all combinations as described in detail in U.S. Pat. No. 6,445,988 and referred to therein as "combination neural networks"

11.2 Combination Neural Networks

A "combination neural network" as used herein will generally apply to any combination of two or more neural networks that are either connected together or that analyze all or a portion of the input data. A combination neural network can be used to divide up tasks in solving a particular occupant problem. For example, one neural network can be used to identify an object occupying a passenger compartment of an automobile and a second neural network can be used to determine the position of the object or its location with respect to the airbag, for example, within the passenger compartment. In another case, one neural network can be used merely to determine whether the data is similar to data upon which a main neural network has been trained or whether there is something significantly different about this data and therefore that the data should not be analyzed. Combination neural networks can sometimes be implemented as cellular neural networks.

Consider a comparative analysis performed by neural networks to that performed by the human mind. Once the human mind has identified that the object observed is a tree, the mind does not try to determine whether it is a black bear or a grizzly. Further observation on the tree might center on whether it is a pine tree, an oak tree etc. Thus, the human mind appears to operate in some manner like a hierarchy of neural networks. Similarly, neural networks for analyzing the occupancy of the vehicle can be structured such that higher order networks are used to determine, for example, whether there is an occupying item of any kind present. Another neural network could follow, knowing that there is information on the item, with attempts to categorize the item into child seats and human adults etc., i.e., determine the type of item.

Once it has decided that a child seat is present, then another neural network can be used to determine whether the child seat is rear facing or forward facing. Once the decision has been made that the child seat is facing rearward, the position of the child seat relative to the airbag, for example, can be handled by still another neural network. The overall accuracy of the system can be substantially improved by breaking the pattern recognition process down into a larger number of smaller pattern recognition problems. Combination neural networks can now be applied to solving many other pattern recognition problems in and outside of a vehicle including vehicle diagnostics, collision avoidance, anticipatory sensing etc.

In some cases, the accuracy of the pattern recognition process can be improved if the system uses data from its own recent decisions. Thus, for example, if the neural network system had determined that a forward facing adult was present, then that information can be used as input into another neural network, biasing any results toward the forward facing human compared to a rear facing child seat, for example. Similarly, for the case when an occupant is being tracked in his or her forward motion during a crash, for example, the location of the occupant at the previous calculation time step can be valuable information to determining the location of the occupant from the current data. There is a limited distance an occupant can move in 10 milliseconds, for example. In this latter example, feedback of the decision of the neural network tracking algorithm becomes important input into the same algorithm for the calculation of the position of the occupant at the next time step.

What has been described above is generally referred to as modular neural networks with and without feedback. Actually, the feedback does not have to be from the output to the input of the same neural network. The feedback from a downstream neural network could be input to an upstream neural network, for example.

The neural networks can be combined in other ways, for example in a voting situation. Sometimes the data upon which the system is trained is sufficiently complex or imprecise that different views of the data will give different results. For example, a subset of transducers may be used to train one neural network and another subset to train a second neural network etc. The decision can then be based on a voting of the parallel neural networks, sometimes known as an ensemble neural network. In the past, neural networks have usually only been used in the form of a single neural network algorithm for identifying the occupancy state of an automobile. At least one of the inventions disclosed herein is primarily advancing the state of the art and using combination neural networks wherein two or more neural networks are combined to arrive at a decision.

The applications for this technology are numerous as described in the patents and patent applications listed above. However, the main focus of some of the instant inventions is the process and resulting apparatus of adapting the system in the patents and patent applications referenced above and using combination neural networks for the detection of the presence of an occupied child seat in the rear facing position or an out-of-position occupant and the detection of an occupant in a normal seating position. The system is designed so that in the former two cases, deployment of the occupant protection apparatus (airbag) may be controlled and possibly suppressed, and in the latter case, it will be controlled and enabled.

One preferred implementation of a first generation occupant sensing system, which is adapted to various vehicle models using the teachings presented herein, is an ultrasonic occupant position sensor, as described below and in the current assignee's above-referenced patents. This system uses a Combination Artificial Neural Network (CANN) to recognize patterns that it has been trained to identify as either airbag enable or airbag disable conditions. The pattern can be obtained from four ultrasonic transducers that cover the front passenger seating area. This pattern consists of the ultrasonic echoes bouncing off of the objects in the passenger seat area. The signal from each of the four transducers includes the electrical representation of the return echoes, which is processed by the electronics. The electronic processing can comprise amplification, logarithmic compression, rectification, and demodulation (band pass filtering), followed by discretization (sampling) and digitization of the signal. The only software processing required, before this signal can be fed into the combination artificial neural network, is normalization (i.e., mapping the input to a fixed range such as numbers between 0 and 1). Although this is a fair amount of processing, the resulting signal is still considered "raw", because all information is treated equally.

A further important application of CANN is where optical sensors such as cameras are used to monitor the inside or outside of a vehicle in the presence of varying illumination conditions. At night, artificial illumination usually in the form of infrared radiation is frequently added to the scene. For example, when monitoring the interior of a vehicle, one or more infrared LEDs are frequently used to illuminate the occupant and a pattern recognition system is trained under such lighting conditions. In bright daylight, however, unless the infrared illumination is either very bright or in the form of a scanning laser with a narrow beam, the reflections of the sun off of an object can overwhelm the infrared. However, in daylight there is no need for artificial illumination but the patterns of reflected radiation differ significantly from the infrared case. Thus, a separate pattern recognition algorithm is frequently trained to handle this case. Furthermore, depending on the lighting conditions, more than two algorithms can be trained to handle different cases. If CANN is used for this case, the initial algorithm can determine the category of illumination that is present and direct further processing to a particular neural network that has been trained under similar conditions. Another example would be the monitoring of objects in the vicinity of the vehicle. There is no known prior art on the use on neural networks, pattern recognition algorithms or, in particular, CANN for systems that monitor either the interior or the exterior of a vehicle.

11.3 Interpretation of Other Occupant States—Inattention, Drowsiness, Sleep

Another example of an invention herein involves the monitoring of the driver's behavior over time that can be used to warn a driver if he or she is falling asleep, or to stop the vehicle if the driver loses the capacity to control it.

A paper entitled "Intelligent System for Video Monitoring of Vehicle Cockpit" by S. Boverie et al., SAE Technical Paper Series No. 980613, Feb. 23-26, 1998, describes the installation of an optical/retina sensor in the vehicle and several uses of this sensor. Possible uses are said to include observation of the driver's face (eyelid movement) and the driver's attitude to allow analysis of the driver's vigilance level and warn him/her about critical situations and observation of the front passenger seat to allow the determination of the presence of somebody or something located on the seat and to value the volumetric occupancy of the passenger for the purpose of optimizing the operating conditions for airbags.

11.4 Combining Occupant Monitoring and Car Monitoring

As discussed above and in the current assignee's above-referenced patents and in particular in U.S. Pat. No. 6,532,408, the vehicle and the occupant can be simultaneously monitored in order to optimize the deployment of the restraint system, for example, using pattern recognition techniques such as CANN. Similarly, the position of the head of an occupant can be monitored while at the same time, the likelihood of a side impact or a rollover can be monitored by a variety of other sensor systems such as an IMU, gyroscopes, radar, laser radar, ultrasound, cameras etc. and deployment of the side curtain airbag initiated if the occupant's head is getting too close to the side window. There are of course many other examples where the simultaneous monitoring of two environments can be combined, preferably using pattern recognition, to cause an action that would not be warranted by an analysis of only one environment. There is no known prior art, except the current assignee's, of monitoring more than one environment to render a decision that would not have been made based on the monitoring of a single environment and particularly through the use of pattern recognition, trained pattern recognition, neural networks or combination neural networks in the automotive field.

CANN, as well as the other pattern recognition systems discussed herein, can be implemented in either software or in hardware through the use of cellular neural networks, support vector machines, ASIC, systems on a chip, or FPGAs depending on the particular application and the quantity of units to be made. In particular, for many applications where the volume is large but not huge, a rapid and relatively low cost implementation could be to use a field programmable gate array (FPGA). This technology lends itself well to the implementation of multiple connected networks such as some implementations of CANN.

11.5 Continuous Tracking

During the process of adapting an occupant monitoring system to a vehicle, the actual position of the occupant can be an important input during the training phase of a trainable pattern recognition system. Thus, for example, it might be desirable to associate a particular pattern of data from one or more cameras to the measured location of the occupant relative to the airbag. It is frequently desirable to positively measure the location of the occupant with another system while data collection is taking place. Systems for performing this measurement function include string potentiometers attached to the head or chest of the occupant, for example, inertial sensors such as an IMU attached to the occupant, laser optical systems using any part of the spectrum such as the far, mid or near infrared, visible and ultraviolet, radar, laser radar, stereo or focusing cameras, RF emitters attached to the occupant, or any other such measurement system. There is no known prior art for continuous tracking systems to be used in data collection when adapting a system for monitoring the interior or exterior of a vehicle.

11.6 Preprocessing

There are many preprocessing techniques that are and can be used to prepare the data for input into a pattern recognition or other analysis system in an interior or exterior monitoring system. The simplest systems involve subtracting one image from another to determine motion of the object of interest and to subtract out the unchanging background, removing some data that is known not to contain any useful information such as the early and late portions of an ultrasonic reflected signal, scaling, smoothing of filtering the data etc. More sophisticated preprocessing algorithms involve applying a Fourier transform, combining data from several sources using "sensor fusion" techniques, finding edges of objects and their orientation and elimination of non-edge data, finding areas having the same color or pattern and identifying such areas, image segmentation and many others. Very little preprocessing prior art exists other than that of the current assignee. The prior art is limited to the preprocessing techniques of Ando, Chen and Faris for eye detection and the sensor fusion techniques of Corrado, all discussed above.

11.7 Post Processing

In some cases, after the system has made a decision that there is an out-of-position adult occupying the passenger seat, for example, it is useful to compare that decision with another recent decision to see it they are consistent. If a previous decision made 10 milliseconds ago indicates that the adult was safely in position, and then thermal gradients or some other anomaly perhaps corrupted the data and thus the decision, then the new decision should be ignored unless subsequently confirmed. Post processing can involve a number of techniques including averaging the decisions with a 5 decision moving average, applying other more sophisticated filters, applying limits to the decision and/or to the change from the previous decision, comparing data point by data point in the input data that lead to the changed decision and correcting data points that appear to be in error etc. A goal of post-processing is to apply a reasonableness test to the decision and thus to improve the accuracy of the decision or eliminate erroneous decisions. There appears to be no known prior art for post-processing in the automotive monitoring field other than that of the current assignee.

12. Optical Correlators

Optical methods for data correlation analysis are utilized in systems for military purpose such as target tracking, missile self-guidance, aerospace reconnaissance data processing etc. Advantages of these methods are the possibility of parallel processing of the elements of images being recognized providing high speed recognition and the ability to use advanced optical processors created by means of integrated optics technologies.

Some prior art includes the following technical papers:

1. I. Mirkin, L. Singher "Adaptive Scale Invariant Filters", SPIE Vol. 3159, 1997
2. B. Javidi "Non-linear Joint Transform Correlators", University of Conn.
3. A. Awwal, H. Michel "Single Step Joint Fourier Transform Correlator", SPIE Vol. 3073, 1997
4. M. O'Callaghan, D. Ward, S. Perimuter, L. Ji, C. Walker "A highly integrated single-chip optical correlator" SPIE Vol. 3466, 1998

These papers describe the use of optical methods and tools (optical correlators and spectral analyzers) for image recognition. Paper (1) discusses the use of an optical correlation technique for transforming an initial image to a form invariant to displacements of the respective object in the view. The very recognition of the object is done using a sectoring mask that is built by training with a genetic algorithm similar to methods of neural network training. The system discussed in the paper (2) includes an optical correlator that performs projection of the spectra of the target and the sample images onto a CCD matrix which functions as a detector. The consistent spectrum image at its output is used to detect the maximum of the correlation function by the median filtration method. Papers (3), (4) discuss some designs of optical correlators.

The following should be noted in connection with the discussion on the use of optical correlators for a vehicle compartment occupant position sensing task:

1) Making use of optical correlators to detect and classify objects in presence of noise is efficient when the amount of possible alternatives of the object's shape and position is comparatively small with respect to the number of elements in the scene. This is apparent from the character of demonstration samples in papers (1), (2) where there were only a few sample scenes and their respective scale factors involved.
2) The effectiveness of making use of optical correlation methods in systems of military purpose can be explained by a comparatively small number of classes of military objects to be recognized and a low probability of catching several objects of this kind with a single view.
3) In their principles of operation and capabilities, optical correlators are similar to neural associative memories.

In the task of occupant's position sensing in a car compartment, for example, the description of the sample object is represented by a training set that can include hundreds of thousands of various images. This situation is fundamentally different from those discussed in the mentioned papers. Therefore, the direct use of the optical correlation methods appears to be difficult and expensive.

Nevertheless, making use of the correlation centering technique in order to reduce the image description's redundancy can be a valuable technique. This task could involve a contour extraction technique that does not require excessive computational effort but may have limited capabilities as to the reduction of redundancy. The correlation centering can demand significantly more computational resources, but the spectra obtained in this way will be invariant to objects' displacements and, possibly, will maintain the classification features needed by the neural network for the purpose of recognition.

Once again, no prior art is believed to exist on the application of optical correlation techniques to the monitoring of either the interior or the exterior of the vehicle other than that of the current assignee.

13. Vehicle Diagnostics and Prognostics

Communications between a vehicle and a remote assistance facility are also important for the purpose of diagnosing problems with the vehicle and forecasting problems with the vehicle, called prognostics. Motor vehicles contain complex mechanical systems that are monitored and regulated by computer systems such as electronic control units (ECUs) and the like. Such ECUs monitor various components of the vehicle including engine performance, carburetion, speed/acceleration control, transmission, exhaust gas recirculation (EGR), braking systems, etc. However, vehicles perform such monitoring typically only for the vehicle driver and without communication of any impending results, problems and/or vehicle malfunction to a remote site for trouble-shooting, diagnosis or tracking for data mining. They also do not inform the driver about future problems.

In the past, systems that provide for remote monitoring did not provide for automated analysis and communication of problems or potential problems and recommendations to the driver. As a result, the vehicle driver or user is often left stranded, or irreparable damage occurs to the vehicle as a result of neglect or driving the vehicle without the user knowing the vehicle is malfunctioning until it is too late, such as low oil level and a malfunctioning warning light, fan belt about to fail, failing radiator hose etc.

In this regard, U.S. Pat. No. 5,400,018 (Scholl et al.) describes a system for relaying raw sensor output from an off road work site relating to the status of a vehicle to a remote location over a communications data link. The information consists of fault codes generated by sensors and electronic control modules indicating that a failure has occurred rather than forecasting a failure. The vehicle does not include a system for performing diagnosis. Rather, the raw sensor data is processed at an off-vehicle location in order to arrive at a diagnosis of the vehicle's operating condition. Bi-directional communications are described in that a request for additional information can be sent to the vehicle from the remote location with the vehicle responding and providing the requested information but no such communication takes place with the vehicle operator and not with an operator of a vehicle traveling on a road. Also, Scholl et al. does not teach the diagnostics of the problem or potential problem on the vehicle itself nor does it teach the automatic diagnostics or any prognostics. In Scholl et al., the determination of the problem occurs at the remote site by human technicians.

U.S. Pat. No. 5,754,965 (Hagenbuch) describes an apparatus for diagnosing the state of health of a vehicle and providing the operator of the vehicle with a substantially real-time indication of the efficiency of the vehicle in performing as assigned task with respect to a predetermined goal. A processor in the vehicle monitors sensors that provide information regarding the state of health of the vehicle and the amount of work the vehicle has done. The processor records information that describes events leading up to the occurrence of an anomaly for later analysis. The sensors are also used to prompt the operator to operate the vehicle at optimum efficiency.

U.S. Pat. No. 5,955,642 (Slifkin et al.) describes a method for monitoring events in vehicles in which electrical outputs representative of events in the vehicle are produced, the characteristics of one event are compared with the characteristics of other events accumulated over a given period of time and departures or variations of a given extent from the other characteristics are determined as an indication of a significant event. A warning is sent in response to the indication, including the position of the vehicle as determined by a global positioning system on the vehicle. For example, for use with a railroad car, a microprocessor responds to outputs of an accelerometer by comparing acceleration characteristics of one impact with accumulated acceleration characteristics of other impacts and determines departures of a given magnitude from the other characteristics as a failure indication which gives rise of a warning.

Every automobile driver fears that his or her vehicle will breakdown at some unfortunate time, e.g., when he or she is traveling at night, during rush hour, or on a long trip away from home. To help alleviate that fear, certain luxury automobile manufacturers provide roadside service in the event of a breakdown. Nevertheless, unless the vehicle is equipped with OnStar® or an equivalent service, the vehicle driver must still be able to get to a telephone to call for service. It is also a fact that many people purchase a new automobile out of fear of a breakdown with their current vehicle. At least one of the inventions disclosed herein is concerned with preventing breakdowns and with minimizing maintenance costs by predicting component failure that would lead to such a breakdown before it occurs.

When a vehicle component begins to fail, the repair cost is frequently minimal if the impending failure of the component is caught early, but increases as the repair is delayed. Sometimes if a component in need of repair is not caught in a timely manner, the component, and particularly the impending failure thereof, can cause other components of the vehicle to deteriorate. One example is where the water pump fails gradually until the vehicle overheats and blows a head gasket. It is desirable, therefore, to determine that a vehicle component is about to fail as early as possible so as to minimize the probability of a breakdown and the resulting repair costs.

There are various gages on an automobile which alert the driver to various vehicle problems. For example, if the oil pressure drops below some predetermined level, the driver is warned to stop his vehicle immediately. Similarly, if the coolant temperature exceeds some predetermined value, the driver is also warned to take immediate corrective action. In these cases, the warning often comes too late as most vehicle gages alert the driver after he or she can conveniently solve the problem. Thus, what is needed is a component failure warning system that alerts the driver to the impending failure of a component sufficiently in advance of the time when the problem gets to a catastrophic point.

Some astute drivers can sense changes in the performance of their vehicle and correctly diagnose that a problem with a component is about to occur. Other drivers can sense that their vehicle is performing differently but they don't know why or when a component will fail or how serious that failure will be, or possibly even what specific component is the cause of the difference in performance. An invention disclosed herein will, in most cases, solve this problem by predicting component failures in time to permit maintenance and thus prevent vehicle breakdowns.

Presently, automobile sensors in use are based on specific predetermined or set levels, such as the coolant temperature or oil pressure, whereby an increase above the set level or a decrease below the set level will activate the sensor, rather than being based on changes in this level over time. The rate at which coolant heats up, for example, can be an important clue that some component in the cooling system is about to fail. There are no systems currently on automobiles to monitor the numerous vehicle components over time and to compare component performance with normal performance. Nowhere in the vehicle is the vibration signal of a normally operating front wheel stored, for example, or for that matter, any normal signal from any other vehicle component. Additionally, there is no system currently existing on a vehicle to look for erratic behavior of a vehicle component and to warn the driver or the dealer that a component is misbehaving and is therefore likely to fail in the very near future.

Sometimes, when a component fails, a catastrophic accident results. In the Firestone tire case, for example, over 100 people were killed when a tire of a Ford Explorer blew out which caused the Ford Explorer to rollover. Similarly, other component failures can lead to loss of control of the vehicle and a subsequent accident. It is thus very important to accurately forecast that such an event will take place but furthermore, for those cases where the event takes place suddenly without warning, it is also important to diagnose the state of the entire vehicle, which in some cases can lead to automatic corrective action to prevent unstable vehicle motion or rollovers resulting in an accident. Finally, an accurate diagnostic system for the entire vehicle can determine much more accurately the severity of an automobile crash once it has begun by knowing where the accident is taking place on the vehicle (e.g., the part of or location on the vehicle which is being impacted by an object) and what is colliding with the vehicle based on a knowledge of the force deflection characteristics of the vehicle at that location. Therefore, in addition to a component diagnostic, the teachings of at least one of the inventions disclosed herein also provide a diagnostic system for the entire vehicle prior to and during accidents. In particular, at least one of the inventions disclosed herein is concerned with the simultaneous monitoring of multiple sensors on the vehicle so that the best possible determination of the state of the vehicle can be determined. Current crash sensors operate independently or at most one sensor may influence the threshold at which another sensor triggers a deployable restraint. In the teachings of at least one of the inventions disclosed herein, two or more sensors, frequently accelerometers, are monitored simultaneously and the combination of the outputs of these multiple sensors are combined continuously in making the crash severity analysis.

Marko et al. (U.S. Pat. No. 5,041,976) is directed to a diagnostic system using pattern recognition for electronic automotive control systems and particularly for diagnosing faults in the engine of a motor vehicle after they have occurred. For example, Marko et al. is interested in determining cylinder specific faults after the cylinder is operating abnormally. More specifically, Marko et al. is directed to detecting a fault in a vehicular electromechanical system indirectly, i.e., by means of the measurement of parameters of sensors which are affected by that system, and after that fault has already manifested itself in the system. In order to form the fault detecting system, the parameters from these sensors are input to a pattern recognition system for training thereof. Then known faults are introduced and the parameters from the sensors are inputted into the pattern recognition system with an indicia of the known fault. Thus, during subsequent operation, the pattern recognition system can determine the fault of the electromechanical system based on the parameters of the sensors, assuming that the fault was "trained" into the pattern recognition system and has already occurred.

When the electromechanical system is an engine, the parameters input into the pattern recognition system for training thereof, and used for fault detection during operation, all relate to the engine. (If the electromechanical system is other than the engine, then the parameters input into the pattern recognition system would relate to that system.) In other words, each parameter will be affected by the operation of the engine and depend thereon and changes in the operation of the engine will alter the parameter, e.g., the manifold absolute pressure is an indication of the airflow into the engine. In this case, the signal from the manifold absolute pressure sensor may be indicative of a fault in the intake of air into the engine, e.g., the engine is drawing in too much or too little air, and is thus affected by the operation of the engine. Similarly, the mass air flow is the airflow into the engine and is an alternative to the manifold absolute pressure. It is thus a parameter that is directly associated with, related to and dependent on the engine. The exhaust gas oxygen sensor is also affected by the operation of the engine, and thus directly associated therewith, since during normal operation, the mixture of the exhaust gas is neither rich or lean whereas during abnormal engine operation, the sensor will detect an abrupt change indicative of the mixture being too rich or too lean.

Thus, the system of Marko et al. is based on the measurement of sensors which affect or are affected by, i.e., are directly associated with, the operation of the electromechanical system for which faults are to be detected. However, the system of Marko et al. does not detect faults in the sensors that are conducting the measurements, e.g., a fault in the exhaust gas oxygen sensor, or faults that are only developing but have not yet manifested themselves or faults in other systems. Rather, the sensors are used to detect a fault in the system after it has occurred.

Asami et al. (U.S. Pat. No. 4,817,418) is directed to a failure diagnosis system for a vehicle including a failure display means for displaying failure information to a driver. This system only reports failures after they have occurred and does not predict them.

Tiernan et al. (U.S. Pat. No. 5,313,407) is directed, inter alia, to a system for providing an exhaust active noise control system, i.e., an electronic muffler system, including an input microphone which senses exhaust noise at a first location in an exhaust duct. An engine has exhaust manifolds feeding exhaust air to the exhaust duct. The exhaust noise sensed by the microphone is processed to obtain an output from an output speaker arranged downstream of the input microphone in the exhaust path in order to cancel the noise in the exhaust duct.

Haramaty et al. (U.S. Pat. No. 5,406,502) describes a system that monitors a machine in a factory and notifies maintenance personnel remote from the machine (not the machine operator) that maintenance should be scheduled at a time when the machine is not in use. Haramaty et al. does not expressly relate to vehicular applications.

NASA Technical Support Package MFS-26529 "Engine Monitoring Based on Normalized Vibration Spectra", describes a technique for diagnosing engine health using a neural network based system.

A paper "Using acoustic emission signals for monitoring of production processes" by H. K. Tonshoff et al. also provides a good description of how acoustic signals can be used to predict the state of machine tools.

Based on the monitoring of vehicular components, systems and subsystems as well as to the measurement of physical and chemical characteristics relating to the vehicle or its components, systems and subsystems, it becomes possible to control and/or affect one or more vehicular system.

An important component or system which is monitored is the tires as failure of one or more of the tires can often lead to a fatal accident. Indeed, tire monitoring is extremely important since NHTSA (National Highway Traffic Safety Administration) has recently linked 148 deaths and more than 525 injuries in the United States to separations, blowouts and other tread problems in Firestone's ATX, ATX II and Wilderness AT tires, 5 million of which were recalled in 2000. Many of the tires were standard equipment on the Ford Explorer. Ford recommends that the Firestone tires on the Explorer sport utility vehicle be inflated to 26 psi, while Firestone recommends 30 psi. It is surprising that a tire can go from a safe condition to an unsafe condition based on an under inflation of 4 psi.

Recent studies in the United States conducted by the Society of Automotive Engineers show that low tire pressure causes about 260,000 accidents annually. Another finding is that about 75% of tire failures each year are preceded by slow air leaks or inadequate tire inflation. Nissan, for example, warns that incorrect tire pressures can compromise the stability and overall handling of a vehicle and can contribute to an accident. Additionally, most non-crash auto fatalities occur while drivers are changing flat tires. Thus, tire failures are clearly a serious automobile safety problem that requires a solution.

About 16% of all car accidents are a result of incorrect tire pressure. Thus, effective pressure and wear monitoring is extremely important. Motor Trend magazine stated that one of the most overlooked maintenance areas on a car is tire pressure. An estimated 40 to 80 percent of all vehicles on the road are operating with under-inflated tires. When under-inflated, a tire tends to flex its sidewall more, increasing its rolling resistance which decreases fuel economy. The extra flex also creates excessive heat in the tire that can shorten its service life.

The Society of Automotive Engineers reports that about 87 percent of all flat tires have a history of under-inflation. About 85% of pressure-loss incidents are slow punctures caused either by small-diameter objects trapped in the tire or by larger diameter nails. The leak will be minor as long as the nail is trapped. If the nail comes out, pressure can decrease rapidly. Incidents of sudden pressure loss are potentially the most dangerous for drivers and account for about 15% of all cases.

A properly inflated tire loses approximately 1 psi per month. A defective time can lose pressure at a more rapid rate. About 35 percent of the recalled Bridgestone tires had improper repairs.

Research from a variety of sources suggests that under-inflation can be significant to both fuel economy and tire life. Industry experts have determined that tires under-inflated by a mere 10% wear out about 15% faster. An average driver with an average set of tires can drive an extra 5,000 to 7,000 miles before buying new tires by keeping the tire properly inflated.

The American Automobile Association has determined that under inflated tires cut a vehicle's fuel economy by as much as 2% per psi below the recommended level. If each of a car's tires is supposed to have a pressure of 30 psi and instead has a pressure of 25 psi, the car's fuel efficiency drops by about 10%. Depending on the vehicle and miles driven, that could cost from $100 to $500 a year.

The ability to control a vehicle is strongly influenced by tire pressure. When the tire pressure is kept at proper levels, optimum vehicle braking, steering, handling and stability are accomplished. Low tire pressure can also lead to damage to both the tires and wheels.

A Michelin study revealed that the average driver doesn't recognize a low tire until it is 14 psi too low. One of the reasons is that today's radial tire is hard to judge visually because the sidewall flexes even when properly inflated.

Despite all the recent press about keeping tires properly inflated, new research shows that most drivers do not know the correct inflation pressure. In a recent survey, only 45 percent of respondents knew where to look to find the correct pressure, even though 78 percent thought they knew. Twenty-seven percent incorrectly believed the sidewall of the tire carries the correct information and did not know that the sidewall only indicates the maximum pressure for the tire, not the optimum pressure for the vehicle. In another survey, about 60% of the respondents reported that they check tire pressure but only before going on a long trip. The National Highway Traffic Safety Administration estimates that at least one out of every five tires is not properly inflated.

The problem is exacerbated with the new run-flat tires where a driver may not be aware that a tire is flat until it is destroyed. Run-flat tires can be operated at air pressures below normal for a limited distance and at a restricted speed (125 miles at a maximum of 55 mph). The driver must therefore be warned of changes in the condition of the tires so that she can adapt her driving to the changed conditions.

One solution to this problem is to continuously monitor the pressure and perhaps the temperature in the tire. Pressure loss can be automatically detected in two ways: by directly measuring air pressure within the tire or by indirect tire rotation methods. Various indirect methods are based on the number of revolutions each tire makes over an extended period of time through the ABS system, and others are based on monitoring the frequency changes in the sound emitted by the tire. In the direct detection case, a sensor is mounted into each wheel or tire assembly, each with its own identity. An on-board computer collects the signals, processes and displays the data and triggers a warning signal in the case of pressure loss.

Under-inflation isn't the only cause of sudden tire failure. A variety of mechanical problems including a bad wheel bearing or a "dragging" brake can cause the tire to heat up and fail. In addition, as may have been a contributing factor in the Firestone case, substandard materials can lead to intra-tire friction and a buildup of heat. The use of re-capped truck tires is another example of heat caused failure as a result by intra-tire friction. An overheated tire can fail suddenly without warning.

As discussed in more detail below, tire monitors, such as those disclosed below, permit the driver to check the vehicle tire pressures from inside the vehicle, or even from a remote location.

The Transportation Recall Enhancement, Accountability, and Documentation Act. (H.R. 5164, or Public Law No. 106-414) known as the TREAD Act, was signed by President Clinton on Nov. 1, 2000. Section 12, TIRE PRESSURE WARNING, states that: "Not later than one year after the date of enactment of this Act, the Secretary of Transportation, acting through the National Highway Traffic Safety Administration, shall complete a rulemaking for a regulation to require a warning system in a motor vehicle to indicate to the operator when a tire is significantly under-inflated. Such requirement shall become effective not later than 2 years after the date of the completion of such rulemaking." Thus, it is expected that a rule requiring continuous tire monitoring will take effect for the 2004 model year.

This law will dominate the first generation of such systems as automobile manufacturers move to satisfy the requirement. In subsequent years, more sophisticated systems that in addition to pressure will monitor temperature, tire footprint, wear, vibration, etc. Although the Act requires that the tire pressure be monitored, it is believed by the inventors that other parameters are as important as the tire pressure or even more important than the tire pressure as described in more detail below.

Consumers are also in favor of tire monitors. Johnson Controls' market research showed that about 80 percent of consumers believe a low tire pressure warning system is an important or extremely important vehicle feature. Thus, as with other safety products such as airbags, competition to meet customer demands will soon drive this market.

Although, as with most other safety products, the initial introductions will be in the United States, speed limits in the United States and Canada are sufficiently low that tire pressure is not as critical an issue as in Europe, for example, where the drivers often drive much faster.

The advent of microelectromechanical (MEMS) pressure sensors, especially those based on surface acoustical wave (SAW) technology, has now made the wireless and powerless monitoring of tire pressure feasible. This is the basis of the tire pressure monitors described below. According to a Frost and Sullivan report on the U.S. Micromechanical Systems (MEMS) market (June 1997): "A MEMS tire pressure sensor represents one of the most profound opportunities for MEMS in the automotive sector."

There are many wireless tire temperature and pressure monitoring systems disclosed in the prior art patents such as for example, U.S. Pat. Nos. 4,295,102, 4,296,347, 4,317,372, 4,534,223, 5,289,160, 5,612,671, 5,661,651, 5,853,020 and 5,987,980 and International Publication No. WO 01/07271 (A1), all of which are illustrative of the state of the art of tire monitoring.

Devices for measuring the pressure and/or temperature within a vehicle tire directly can be categorized as those containing electronic circuits and a power supply within the tire, those which contain electronic circuits and derive the power to operate these circuits either inductively, from a generator or through radio frequency radiation, and those that do not contain electronic circuits and receive their operating power only from received radio frequency radiation. For the reasons discussed above, the discussion herein is mainly concerned with the latter category. This category contains devices that operate on the principles of surface acoustic waves (SAW) and the disclosure below is concerned primarily with such SAW devices.

International Publication No. WO 01/07271 describes a tire pressure sensor that replaces the valve and valve stem in a tire.

U.S. Pat. No. 5,231,827 contains a good description and background of the tire-monitoring problem. The device disclosed, however, contains a battery and electronics and is not a SAW device. Similarly, the device described in U.S. Pat. No. 5,285,189 contains a battery as do the devices described in U.S. Pat. Nos. 5,335,540 and 5,559,484. U.S. Pat. No. 5,945,908 applies to a stationary tire monitoring system and does not use SAW devices.

One of the first significant SAW sensor patents is U.S. Pat. No. 4,534,223. This patent describes the use of SAW devices for measuring pressure and also a variety of methods for temperature compensation but does not mention wireless transmission.

U.S. Pat. No. 5,987,980 describes a tire valve assembly using a SAW pressure transducer in conjunction with a sealed cavity. This patent does disclose wireless transmission. The assembly includes a power supply and thus this also distinguishes it from a preferred system of at least one of the inventions disclosed herein. It is not a SAW system and thus the antenna for interrogating the device in this design must be within one meter, which is closer than needed for a preferred device of at least one of the inventions disclosed herein.

U.S. Pat. No. 5,698,786 relates to the sensors and is primarily concerned with the design of electronic circuits in an interrogator. U.S. Pat. No. 5,700,952 also describes circuitry for use in the interrogator to be used with SAW devices. In neither of these patents is the concept of using a SAW device in a wireless tire pressure monitoring system described. These patents also do not describe including an identification code with the temperature and/or pressure measurements in the sensors and devices.

U.S. Pat. No. 5,804,729 describes circuitry for use with an interrogator in order to obtain more precise measurements of the changes in the delay caused by the physical or chemical property being measured by the SAW device. Similar comments apply to U.S. Pat. No. 5,831,167. Other related prior art includes U.S. Pat. No. 4,895,017.

Other patents disclose the placement of an electronic device in the sidewall or opposite the tread of a tire but they do not disclose either an accelerometer or a surface acoustic wave device. In most cases, the disclosed system has a battery and electronic circuits.

One method of measuring pressure that is applicable to at least one of the inventions disclosed herein is disclosed in V. V. Varadan, Y. R. Roh and V. K. Varadan "Local/Global SAW Sensors for Turbulence", IEEE 1989 Ultrasonics Symposium p. 591-594 makes use of a Polyvinylidene fluoride (PVDF) piezoelectric film to measure pressure. Mention is made in this article that other piezoelectric materials can also be used. Experimental results are given where the height of a column of oil is measured based on the pressure measured by the piezoelectric film used as a SAW device. In particular, the speed of the surface acoustic wave is determined by the pressure exerted by the oil on the SAW device. For the purposes of the instant invention, air pressure can also be measured in a similar manner by first placing a thin layer of a rubber material onto the surface of the SAW device which serves as a coupling agent from the air pressure to the SAW surface. In this manner, the absolute pressure of a tire, for example, can be measured without the need for a diaphragm and reference pressure greatly simplifying the pressure measurement. Other examples of the use of PVDF film as a pressure transducer can be found in U.S. Pat. Nos. 4,577,510 and 5,341,687, although they are not used as SAW devices.

The following U.S. patents provide relevant information to at least one of the inventions disclosed herein, and to the extent necessary: U.S. Pat. Nos. 4,361,026, 4,620,191, 4,703,327, 4,724,443, 4,725,841, 4,734,698, 5,691,698, 5,841,214, 6,060,815, 6,107,910, 6,114,971 and 6,144,332.

In recent years, SAW devices have been used as sensors in a broad variety of applications. Compared with sensors utilizing alternative technologies, SAW sensors possess outstanding properties, such as high sensitivity, high resolution, and ease of manufacturing by microelectronic technologies. However, the most attractive feature of SAW sensors is that they can be interrogated wirelessly.

U.S. Pat. Nos. 5,641,902, 5,819,779 and 4,103,549 illustrate a valve cap pressure sensor where a visual output is provided. Other related prior art includes U.S. Pat. No. 4,545,246.

14. Other Products, Outputs, Features 14.1 Inflator Control

Inflators now exist which will adjust the amount of gas flowing to or from the airbag to account for the size and position of the occupant and for the severity of the accident. The vehicle identification and monitoring system (VIMS) discussed in U.S. Pat. No. 5,829,782, and USRE37260 (a reissue of U.S. Pat. No. 5,943,295) among others, can control such inflators based on the presence and position of vehicle occupants or of a rear facing child seat. Some of the inventions herein are concerned with the process of adapting the vehicle interior monitoring systems to a particular vehicle model and achieving a high system accuracy and reliability as discussed in greater detail below. The automatic adjustment of the deployment rate of the airbag based on occupant identification and position and on crash severity has been termed "smart airbags" and is discussed in great detail in U.S. Pat. No. 6,532,408.

14.2 Seat, Seatbelt, Steering Wheel and Pedal Adjustment and Resonators

The adjustment of an automobile seat occupied by a driver of the vehicle is now accomplished by the use of either electrical switches and motors or by mechanical levers. As a result, the driver's seat is rarely placed at the proper driving position which is defined as the seat location which places the eyes of the driver in the so-called "eye ellipse" and permits him or her to comfortably reach the pedals and steering wheel. The "eye ellipse" is the optimum eye position relative to the windshield and rear view mirror of the vehicle.

There are a variety of reasons why the eye ellipse, which is actually an ellipsoid, is rarely achieved by the actions of the driver. One reason is the poor design of most seat adjustment systems particularly the so-called "4-way-seat". It is known that there are three degrees of freedom of a seat bottom, namely vertical, longitudinal, and rotation about the lateral or pitch axis. The 4-way-seat provides four motions to control the seat: (1) raising or lowering the front of the seat, (2) raising or lowering the back of the seat, (3) raising or lowering the entire seat, (4) moving the seat fore and aft. Such a seat adjustment system causes confusion since there are four control motions for three degrees of freedom. As a result, vehicle occupants are easily frustrated by such events as when the control to raise the seat is exercised, the seat not only is raised but is also rotated. Occupants thus find it difficult to place the seat in the optimum location using this system and frequently give up trying leaving the seat in an improper driving position. This problem could be solved by the addition of a microprocessor and the elimination of one switch.

Many vehicles today are equipped with a lumbar support system that is almost never used by most occupants. One reason is that the lumbar support cannot be preset since the shape of the lumbar for different occupants differs significantly, for example a tall person has significantly different lumbar support requirements than a short person. Without knowledge of the size of the occupant, the lumbar support cannot be automatically adjusted.

As discussed in the current assignee's above-referenced '320 patent, in approximately 95% of the cases where an occupant suffers a whiplash injury, the headrest is not properly located to protect him or her in a rear impact collision. Thus, many people are needlessly injured. Also, the stiffness and damping characteristics of a seat are fixed and no attempt is made in any production vehicle to adjust the stiffness and damping of the seat in relation to either the size or weight of an occupant or to the environmental conditions such as road roughness. All of these adjustments, if they are to be done automatically, require knowledge of the morphology of the seat occupant. The inventions disclosed herein provide that knowledge. Other than that of the current assignee, there is no known prior art for the automatic adjustment of the seat based on the driver's morphology. U.S. Pat. No. 4,797,824 to Sugiyama uses visible colored light to locate the eyes of the driver with the assistance of the driver. Once the eye position is determined, the headrest and the seat are adjusted for optimum protection.

U.S. Pat. No. 4,698,571 to Mizuta et al. shows a system for automatically adjusting parts of the vehicle to a predetermined optimum setting for the driver. Buttons are provided with each button controlling a directional movement of the parts of the vehicle, e.g., the seat or rear view mirror. By depressing the button, movement of the part is thus effected. No mention is made of adjusting the steering wheel or enabling adjustment of vehicle parts automatically without manual intervention by the driver.

U.S. Pat. No. 4,811,226 to Shinohara describes an angle adjusting apparatus for adjusting parts of the vehicle in which a seat adjustment switch is provided to enable movement of the seat upon depression of the switch. No mention is made of adjusting the steering wheel or enabling adjustment of vehicle parts automatically without manual intervention by the driver.

14.3 Side Impacts

Side impact airbag systems began appearing on 1995 vehicles. The danger of deployment-induced injuries will exist for side impact airbags as they now do for frontal impact airbags. A child with his head against the airbag is such an example. The system of at least one of the inventions disclosed herein will minimize such injuries. This fact has been also realized, subsequent to its disclosure by the current assignee, by NEC and such a system now appears on Honda vehicles. There is no other known prior art.

14.4 Children and Animals Left Alone

It is a problem in vehicles that children, infants and pets are sometimes left alone, either intentionally or inadvertently, and the temperature in the vehicle rises or falls. The child, infant or pet then suffocates in view of the lack of oxygen in the vehicle or freezes. This problem can be solved by the inventions disclosed herein since the existence of the occupant can be determined as well as the temperature, and even oxygen content if desired, and preventative measures automatically taken. Similarly, children and pets die every year from suffocation after being locked in a vehicle trunk. The sensing of a life form in the trunk is discussed below.

14.5 Vehicle Theft

Another problem relates to the theft of vehicles. With an interior monitoring system, or a variety of other sensors as disclosed herein, connected with a telematics device, the vehicle owner could be notified if someone attempts to steal the vehicle while the owner is away.

14.6 Security, Intruder Protection

There have been incidents when a thief waits in a vehicle until the driver of the vehicle enters the vehicle and then forces the driver to provide the keys and exit the vehicle. Using the inventions herein, a driver can be made aware that the vehicle is occupied before he or she enters and thus he or she can leave and summon help. Motion of an occupant in the vehicle who does not enter the key into the ignition can also be sensed and the vehicle ignition, for example, can be disabled. In more sophisticated cases, the driver can be identified and operation of the vehicle enabled. This would eliminate the need even for a key.

14.7 Entertainment System Control

Once an occupant sensor is operational, the vehicle entertainment system can be improved if the number, size and location of occupants and other objects are known. However, prior to the inventions disclosed herein engineers have not thought to determine the number, size and/or location of the occupants and use such determination in combination with the entertainment system. Indeed, this information can be provided by the vehicle interior monitoring system disclosed herein to thereby improve a vehicle's entertainment system. Once one considers monitoring the space in the passenger compartment, an alternate method of characterizing the sonic environment comes to mind which is to send and receive a test sound to see what frequencies are reflected, absorbed or excite resonances and then adjust the spectral output of the entertainment system accordingly.

As the internal monitoring system improves to where such things as the exact location of the occupants' ears and eyes can be determined, even more significant improvements to the entertainment system become possible through the use of noise canceling sound. It is even possible to beam sound directly to the ears of an occupant using hypersonic-sound if the ear location is known. This permits different occupants to enjoy different programming at the same time.

14.8 HVAC

Similarly to the entertainment system, the heating, ventilation and air conditioning system (HVAC) could be improved if the number, attributes and location of vehicle occupants were known. This can be used to provide a climate control system tailored to each occupant, for example, or the system can be turned off for certain seat locations if there are no occupants present at those locations.

U.S. Pat. No. 5,878,809 to Heinle, describes an air-conditioning system for a vehicle interior comprising a processor, seat occupation sensor devices, and solar intensity sensor devices. Based on seat occupation and solar intensity data, the processor provides the air-conditioning control of individual air-conditioning outlets and window-darkening devices which are placed near each seat in the vehicle. A residual air-conditioning function device maintains air conditioning operation after vehicle ignition switch-off, which allows specific climate conditions to be maintained after vehicle ignition switch-off for a certain period of time provided at least one seat is occupied. The advantage of this design is the allowance for occupation of certain seats in the vehicle. The drawbacks include the lack of some important sensors of vehicle interior and environment condition (such as temperature or air humidity). It is not possible to set climate conditions individually at locations of each passenger seat.

U.S. Pat. No. 6,454,178 to Fusco, et al. describes an adaptive controller for an automotive HVAC system which controls air temperature and flow at each of locations that conform to passenger seats based on individual settings manually set by passengers at their seats. If the passenger corrects manual settings for his location, this information will be remembered, allowing for climate conditions taking place at other locations and further, will be used to automatically tune the air temperature and flow at the locations allowing for climate conditions at other locations. The device does not use any sensors of the interior vehicle conditions or the exterior environment, nor any seat occupation sensing.

14.9 Obstruction Sensing

In some cases, the position of a particular part of the occupant is of interest such as his or her hand or arm and whether it is in the path of a closing window or sliding door so that the motion of the window or door needs to be stopped. Most anti-trap systems, as they are called, are based on the current flow in a motor. When the window, for example, is obstructed, the current flow in the window motor increases. Such systems are prone to errors caused by dirt or ice in the window track, for example. Prior art on window obstruction sensing is essentially limited to the Prospect Corporation anti-trap system described in U.S. Pat. Nos. 5,054,686 and 6,157,024. Anti-trap systems are discussed in detail in the current assignee's pending U.S. patent application Ser. No. 10/152,160 filed May 21, 2002, incorporated by reference herein.

Closures for apertures such as vehicle windows, sunroofs and sliding doors, and soon swinging doors, are now commonly motor-driven. As a further convenience to an operator or passenger of a vehicle, such power windows are frequently provided with control features for the automatic closing and opening of an aperture following a simple, short command from the operator or passenger. For instance, a driver's side window may be commanded to rise from any lowered position to a completely closed position simply by momentarily elevating a portion of a window control switch, then releasing the switch. This is sometimes referred to as an "express close" feature. This feature is commonly provided in conjunction with vehicle sunroofs. Auto manufacturers may also provide these features in conjunction with power doors, hatches or the like. Such automated aperture closing features may also be utilized in various other home or industrial settings.

Other convenience features now being offered for use on vehicles include environmental venting modes, in which vehicle windows are automatically lowered or opened a prescribed distance once a control system determines a certain temperature threshold, internal or external, has been met or exceeded. In addition, a precipitation detection system may be provided for sensing the advent of precipitation and for automatically closing a sunroof, windows or an automatic door. These specific examples pertain to vehicles, though other instances of automatic aperture adjustment are known to one skilled in the art.

In addition to providing added convenience, however, such features introduce a previously unencountered safety hazard. Body parts or inanimate objects may be present within an aperture when a command is given to automatically close the aperture. For example, an automatic window closing feature may be activated due to rain while a pet in the vehicle has its head outside a window. A further example includes a child who has placed his or her head through a window or sunroof and then he or she accidentally initiates an express close operation.

In order to avoid tragic and damaging accidents involving obstacles entrapped by a power window, some vehicles are now provided with systems which detect a condition where a window has been commanded to express close, but which has not completed the operation after a given period of time. As an example, a system may monitor the time it takes for a window to reach a closed state. If a time threshold is exceeded, the window is automatically lowered. Another system monitors the current drain attributed to the motor driving the window. If it exceeds a threshold at an inappropriate time during the closing operation, the window is again lowered.

The problem with such safety systems is that an obstacle must first be entrapped and subject to the closing force of the window or other closure for a discrete period of time before the safety mechanism lowers the window. Limbs may be bruised and fragile objects may be broken by such systems. In addition, if a mechanical failure in the window driving system occurs or if a fuse is blown, the obstacle may remain entrapped.

To address these shortcomings, a system has been proposed which monitors the environment adjacent to or within an aperture, and which may be used as an obstacle detection system, among other applications. This system may be used in conjunction with a power window to prevent activation of an express close mode, to stop such a mode once in progress, or to exit an express close mode and automatically reverse the window motion. The system comprises an emitter positioned in proximity to the aperture to emit a field of radiation adjacent the aperture. A detector is also provided which normally receives radiation reflected from one or more surfaces proximate the aperture. When an obstacle enters the radiation field, it alters the amount of reflected radiation received at the detector. This alteration, if sufficient to meet or exceed a threshold value, can be used to prevent, stop or reverse an express close mode, to activate a warning annunciator, or to initiate some other action.

The economics of producing such a system dictate that it is not feasible to produce a system custom-tailored for the environment of every vehicle in which it is installed. This is also true if the system is installed for some other non-vehicle application. Therefore, depending upon the reflecting characteristics of the environment proximate the aperture, the system detector will provide varying degrees of sensitivity. In one embodiment where the detector registers a high degree of reflectivity from the environment and is triggered by an obstacle which decreases the reflected radiation, it is desirable that the environmental reflectance be maximized. In contrast, in an embodiment where the detector senses a minimum of reflected radiation normally and is triggered by a higher degree of reflectance from an obstacle, it is desired to minimize environmentally reflected radiation. In vehicle applications, radiation reflectance is likely to vary between vehicle manufacturers, between vehicle models and model years, and between individual vehicles, due to the physical orientation of surfaces adjacent an aperture and the materials comprising such surfaces.

Additionally, reflecting surfaces adjacent the aperture tend to alter over time. For vehicles, such alteration may be across manufacturers, models, model years and individual vehicles. Thus, a monitoring system initially optimized for a particular environment may not be optimized for the useful life of the system. In the worst case, environmental changes are sufficient to cause reflected energy to register in the system as an obstacle when no obstacle is present.

U.S. Pat. No. 6,157,024 (Chapdelaine et al.) describes a monitoring system for use in detecting the presence of an obstacle in or proximate to an aperture. Materials are applied to one or more reflecting surfaces adjacent the aperture, enabling the improvement of the signal-to-noise ratio in the system without requiring tuning of the system for the particular environment. The choice of specific materials depends upon the type of radiation used for aperture monitoring and whether an obstacle is detected as an increase or decrease in reflected radiation. A calibration LED within the monitoring system enables predictable performance over a range of temperatures. The monitoring system is also provided with the capacity to adjust to variations in the background-reflected radiation, either automatically by monitoring trends in system performance or by external command. The latter case includes the use of a further element for communicating to the monitoring system directly or indirectly.

The device of Chapdelaine et al. suffers from the problem that its performance depends on the known and calibrated reflectivity of the reflecting edge surface of the aperture. These are special materials that are applied to such reflective surfaces. The reflection properties of such surfaces can change over the life of the vehicle and although some effort is made to compensate for this change, if the properties of such surfaces change, the system can fail. Thus, a system that does not depend on the reflective properties of the aperture edges would not require the application of special materials to such surfaces and would also remove this failure mode. A calibration LED is used in the Chapdelaine et al. device that is also a source of additional failure modes and thus the elimination of this device will improve the reliability of the system.

Winner et al. (U.S. Pat. No. 6,031,600) describes a method for determining the presence and distance of an object within a resolution cell. A comparison is made of the phase difference between a reflected electromagnetic wave signal ($S_e$) and an electronically generated reference signal ($S_s$) whose phase relationship is independent of distance. The measured value is compared to predetermined stored values for which distances are known. To generate signal $S_s$, the output signal of a clock generator is conveyed through an output stage 37, an LED 38, a fiber optic cable 39, a photodiode 40 and a preamplifier 41 (see FIG. 2). Winner et al. does not disclose a measuring system which measures a reference phase change between emitted and received waves when an object is known not to be present in the aperture. Rather, Winner et al. artificially generates the reference signal so that variations in the wave path and properties of the air in the wave path are not reflected in the artificially generated signal and can result in an inaccurate comparisons of the reference signal to the reflected wave signal. Moreover, Winner et al. does not determine a reference phase change and an operative phase change using the same measuring technique, e.g., by directing illuminating electromagnetic waves toward at least a portion of a frame defining the aperture, modulating the illuminating electromagnetic waves, receiving electromagnetic waves reflected from the illuminated portion of the frame and measuring a phase change between the modulated electromagnetic waves and the received electromagnetic waves. Rather, the reference signal is artificially generated.

14.10 Rear Impacts

The largest use of hospital beds in the United States is by automobile accident victims. The largest use of these hospital beds is for victims of rear impacts. The rear impact is the most expensive accident in America. The inventions herein teach a method of determining the position of the rear of the occupants head so that the headrest can be adjusted to minimize whiplash injuries in rear impacts.

Approximately 100,000 rear impacts per year result in whiplash injuries to the vehicle occupants. Most of these injuries could be prevented if the headrest were properly positioned behind the head of the occupant and if it had the correct contour to properly support the head and neck of the occupant. Whiplash injuries are the most expensive automobile accident injury even though these injuries are usually are not life-threatening and are usually classified as minor.

A good discussion of the causes of whiplash injuries in motor vehicle accidents can be found in Dellanno et al, U.S. Pat. Nos. 5,181,763 and 5,290,091, and Dellanno patents U.S. Pat. Nos. 5,580,124, 5,769,489 and 5,961,182, as well as many other technical papers. These patents discuss a novel automatic adjustable headrest to minimize such injuries. However, these patents assume that the headrest is properly positioned relative to the head of the occupant. A survey has shown that as many as 95% of automobiles do not have the headrest properly positioned. These patents also assume that all occupants have approximately the same contour of the neck and head. Observations of humans, on the other hand, show that significant differences occur where the back of some people's heads is almost in the same plane as that of their neck and shoulders, while other people have substantially the opposite case, that is, their neck extends significantly forward of their head back and shoulders.

One proposed attempt at solving the problem where the headrest is not properly positioned uses a conventional crash sensor which senses the crash after impact and a headrest composed of two portions, a fixed portion and a movable portion. During a rear impact, a sensor senses the crash and pyrotechnically deploys a portion of the headrest toward the occupant. This system has the following potential problems:

1) An occupant can get a whiplash injury in fairly low velocity rear impacts; thus, either the system will not protect occupants in such accidents or there will be a large number of low velocity deployments with the resulting significant repair expense.
2) If the portion of the headrest which is propelled toward the occupant has significant mass, that is if it is other than an airbag type device, there is a risk that it will injure the occupant. This is especially true if the system has no method of sensing and adjusting for the position of the occupant.
3) If the system does not also have a system which pre-positions the headrest to the proximity of the occupant's head, it will also not be effective when the occupant's head has moved forward due to pre-crash braking, for example, or for different-sized occupants.

A variation of this approach uses an airbag positioned in the headrest which is activated by a rear impact crash sensor. This system suffers the same problems as the pyrotechnically deployed headrest portion. Unless the headrest is pre-positioned, there is a risk for the out-of-position occupant.

U.S. Pat. No. 5,833,312 to Lenz describes several methods for protecting an occupant from whiplash injuries using the motion of the occupant loading the seat back to stretch a canvas or deploy an airbag using fluid contained within a bag inside the seat back. In the latter case, the airbag deploys out of the top of the seat back and between the occupant's head and the headrest. The system is based on the proposed fact that: "[F]irstly the lower part of the body reacts and is pressed, by a heavy force, against the lower part of the seat back, thereafter the upper part of the body trunk is pressed back, and finally the back of the head and the head is thrown back against the upper part of the seat back . . . " (Col. 2 lines 47-53). Actually this does not appear to be what occurs. Instead, the vehicle, and thus the seat that is attached to it, begins to decelerate while the occupant continues at its pre-crash velocity. Those parts of the occupant that are in contact with the seat experience a force from the seat and begin to slow down while other parts, the head for example, continue moving at the pre-crash velocity. In other words, all parts of the body are "thrown back" at the same time. That is, they all have the same relative velocity relative to the seat until acted on by the seat itself. Although there will be some mechanical advantage due to the fact that the area in contact with the occupant's back will generally be greater than the area needed to support his or her head, there generally will not be sufficient motion of the back to pump sufficient gas into the airbag to cause it to be projected in between the headrest and the head that is not rapidly moving toward the headrest. In some cases, the occupant's head is very close to the headrest and in others it is far away. For all cases except when the occupant's head is very far away, there is insufficient time for motion of the occupant's back to pump air and inflate the airbag and position it between the head and the headrest. Thus, not only will the occupant impact the headrest and receive whiplash injuries, but it will also receive an additional impact from the deploying airbag.

Lenz also suggests that for those cases where additional deployment speed is required, the output from a crash sensor could be used in conjunction with a pyrotechnic element. Since he does not mention anticipatory crash sensor, which were not believed to be available at the time of the filing of the Lenz patent application, it must be assumed that a conventional crash sensor is contemplated. As discussed herein, this is either too slow or unreliable since if it is set so sensitive that it will work for low speed impacts where many whiplash injuries occur, there will be many deployments and the resulting high repair costs. For higher speed crashes, the deployment time will be too slow based on the close position of the occupant to the airbag. Thus, if a crash sensor is used, it must be an anticipatory crash sensor as disclosed herein.

14.11 Combined with SDM and Other Systems

The above applications illustrate the wide range of opportunities, which become available if the identity and location of various objects and occupants, and some of their parts, within the vehicle are known. Once the system is operational, it would be logical for the system to also incorporate the airbag electronic sensor and diagnostics system (SDM) since it needs to interface with SDM anyway and since they could share a power supply, some circuitry and computer capabilities, which will result in a significant cost saving to the auto manufacturer. For the same reasons, it would be logical for a monitoring system to include the side impact sensor and diagnostic system. As the monitoring system improves to where such things as the exact location of the occupants' ears and eyes can be determined, even more significant improvements to the entertainment system become possible through the use of noise canceling sound, and the rear view mirror can be automatically adjusted for the driver's eye location. Another example involves the monitoring of the driver's behavior over time, which can be used to warn a driver if he or she is falling asleep, or to stop the vehicle if the driver loses the capacity to control it.

14.13 Monitoring of other Vehicles such as Cargo Containers, Truck Trailers and Railroad Cars The following is from "Occupational Health & Safety" Publication date: 2003-08-01": "Each year, $12.5 trillion of merchandise is traded worldwide, using more than 200 million intermodal containers. Ninety percent of these shipments are between seaports. Unsecured freight represents a global security threat, both in terms of potentially lost merchandise value and the crippling of the global trading economy. Additionally, containerized freight provides a means of directly transporting harmful biological, chemical, and radioactive materials into both the United States and its allies. A Brookings Institute study estimated the Gross Domestic Product impact of a shipment, via container, of weapons of mass destruction at a major port " . . . would cause extended shutdown in deliveries, physical destruction and lost production in contaminated areas; massive loss of life; and medical treatment of survivors. Potential cost: up to $1 trillion."

The technology disclosed herein can be used to minimize this threat. Electronic seals now exist that provide assurance the container has not been opened once it has been sealed. This is not a complete solution as it is still possible to introduce hazardous cargo into the container prior to sealing or the container could be violated during transit and the seal reinstalled. Better protection of course comes from monitoring the contents of the container with radiation, chemical, and other sensors as described below coupled with an appropriate telematics system.

Many issues are now arising that render a low power remote asset monitoring system desirable. Some of these issues developed from the terrorist threat to the United States since Sep. 11, 2001, and the concern of anti-terrorist personnel with the relatively free and unmonitored transportation of massive amounts of material throughout the United States by trains, trucks, and ships. A system that permits monitoring of the contents of these shipping containers could substantially reduce this terrorist threat.

The FBI has recently stated that cargo crime is conservatively estimated at about $12 billion per year. It is the fastest growing crime problem in the United States. Other areas of criminal activity involve shipments imported into the United States that are used to conceal illegal goods including weapons, illegal immigrants, narcotics, and products that violate trademarks and patents. The recent concern on the potential use of cargo containers as weapons of mass destruction is also causing great pressure to improve information, inspection, tracking and monitoring technologies. Furthermore, the movement of hazardous cargo and the potential for sabotage is also causing increased concern among law enforcement agencies and resulting in increasing demands for security for such hazardous cargo shipments.

A low cost low power monitoring system of cargo containers and their contents could substantially solve these problems.

Cargo security is defined as the safe and reliable intermodal movement of goods from the shipper to the eventual destination with no loss due to theft or damage. Cargo security is concerned with the key assets that move the cargo including containers, trailers, chassis, tractors, vessels and rail cars as well as the cargo itself. Modern manufacturing methods requiring just-in-time delivery further place a premium on cargo security.

The recent increase in cargo theft and the concern for homeland security are thus placing new demands on cargo security and because of the large number of carriers and storage locations, inexpensive systems are needed to continuously monitor the status of cargo from the time that it leaves the shipper until it reaches its final destination. Technological advancements such as the global positioning system (GPS), and improved communication systems, including wireless telecommunications via satellites, and the Internet have created a situation where such an inexpensive system is now possible.

To partially respond to these concerns, projects are underway to remotely monitor the geographic location of shipping containers as well as the tractors and chassis, boats, planes and railroad cars that move these containers or cargo in general. The ability exists now for communicating limited amounts of information from shipping containers directly to central computers and the Internet using satellites and other telematics communication devices.

In some prior art systems, cargo containers are sealed with electronic cargo seals, the integrity of which can be remotely monitored. Knowledge of the container's location as well as the seal integrity are vital pieces of information that can contribute to solving the problems mentioned above. However, this is not sufficient and the addition of various sensors and remote monitoring of these sensors is now not only possible but necessary.

Emerging technology now permits the monitoring of some safety and status information on the chassis such as tire pressures, brake system status, lights, geographical location, generator performance, and container security and this information can now be telecommunicated to a remote location. At least one of the inventions disclosed herein is concerned with these additional improvements to the remote reporting system.

Additionally, biometric information can be used to validate drivers of vehicles containing hazardous cargo to minimize terrorist activities involving these materials. This data needs to be available remotely especially if there is a sudden change in drivers. Similarly, any deviation from the authorized route can now be detected and this also needs to be remotely reported. Much of the above-mentioned prior art activity is in bits and pieces, that is, it is available on the vehicle and sometimes to the dispatching station while the vehicle is on the premises. It now needs to be available to a central monitoring location at all times. Homeland security issues arising out the components that make up the cargo transportation system including tractors, trailers, chassis, containers and railroad cars, will only be eliminated when the contents of all such elements are known, monitored, and thus the misappropriation of such assets eliminated. The shipping system or process that takes place in the United States should guarantee that all shipping containers contain only the appropriate contents and are always on the proper route from their source to their destination and on schedule. At least one of the inventions disclosed herein is concerned with achieving this 100 percent system primarily through low power remote monitoring of the assets that make up the shipping system.

The system that is described herein for monitoring shipping assets and the contents of shipping containers can also be used for a variety of other asset monitoring problems including the monitoring of unattended boats, cabins, summer homes, private airplanes, sheds, warehouses, storage facilities and other remote unattended facilities. With additional sensors, the quality of the environment, the integrity of structures, the presence of unwanted contaminants etc. can also now be monitored and reported on an exception basis through a low power, essentially maintenance-free monitoring and reporting system in accordance with the invention as described herein.

15. Definitions

Preferred embodiments of the invention are described below and unless specifically noted, it is the applicants' intention that the words and phrases in the specification and claims be given the ordinary and accustomed meaning to those of ordinary skill in the applicable art(s). If the applicants intend any other meaning, they will specifically state they are applying a special meaning to a word or phrase.

Likewise, applicants' use of the word "function" here is not intended to indicate that the applicants seek to invoke the special provisions of 35 U.S.C. §112, sixth paragraph, to define their invention. To the contrary, if applicants wish to invoke the provisions of 35 U.S.C. §112, sixth paragraph, to define their invention, they will specifically set forth in the claims the phrases "means for" or "step for" and a function, without also reciting in that phrase any structure, material or act in support of the function. Moreover, even if applicants invoke the provisions of 35 U.S.C. §112, sixth paragraph, to define their invention, it is the applicants' intention that their inventions not be limited to the specific structure, material or acts that are described in the preferred embodiments herein. Rather, if applicants claim their inventions by specifically invoking the provisions of 35 U.S.C. §112, sixth paragraph, it is nonetheless their intention to cover and include any and all structure, materials or acts that perform the claimed function, along with any and all known or later developed equivalent structures, materials or acts for performing the claimed function.

"Pattern recognition" as used herein will generally mean any system which processes a signal that is generated by an object (e.g., representative of a pattern of returned or received impulses, waves or other physical property specific to and/or characteristic of and/or representative of that object) or is modified by interacting with an object, in order to determine to which one of a set of classes that the object belongs. Such a system might determine only that the object is or is not a member of one specified class, or it might attempt to assign the object to one of a larger set of specified classes, or find that it is not a member of any of the classes in the set. The signals processed are generally a series of electrical signals coming from transducers that are sensitive to acoustic (ultrasonic) or electromagnetic radiation (e.g., visible light, infrared radiation, capacitance or electric and/or magnetic fields), although other sources of information are frequently included. Pattern recognition systems generally involve the creation of a set of rules that permit the pattern to be recognized. These rules can be created by fuzzy logic systems, statistical correlations, or through sensor fusion methodologies as well as by trained pattern recognition systems such as neural networks, combination neural networks, cellular neural networks or support vector machines.

A trainable or a trained pattern recognition system as used herein generally means a pattern recognition system that is taught to recognize various patterns constituted within the signals by subjecting the system to a variety of examples. The most successful such system is the neural network used either singly or as a combination of neural networks. Thus, to generate the pattern recognition algorithm, test data is first obtained which constitutes a plurality of sets of returned waves, or wave patterns, or other information radiated or obtained from an object (or from the space in which the object will be situated in the passenger compartment, i.e., the space above the seat) and an indication of the identify of that object. A number of different objects are tested to obtain the unique patterns from each object. As such, the algorithm is generated, and stored in a computer processor, and which can later be applied to provide the identity of an object based on the wave pattern being received during use by a receiver connected to the processor and other information. For the purposes here, the identity of an object sometimes applies to not only the object itself but also to its location and/or orientation in the passenger compartment. For example, a rear facing child seat is a different object than a forward facing child seat and an out-of-position adult can be a different object than a normally seated adult. Not all pattern recognition systems are trained systems and not all trained systems are neural networks. Other pattern recognition systems are based on fuzzy logic, sensor fusion, Kalman filters, correlation as well as linear and non-linear regression. Still other pattern recognition systems are hybrids of more than one system such as neural-fuzzy systems.

The use of pattern recognition, or more particularly how it is used, is important to many embodiments of the instant invention. In the above-cited prior art, except that assigned to the current assignee, pattern recognition which is based on training, as exemplified through the use of neural networks, is not mentioned for use in monitoring the interior passenger compartment or exterior environments of the vehicle in all of the aspects of the invention disclosed herein. Thus, the methods used to adapt such systems to a vehicle are also not mentioned.

A pattern recognition algorithm will thus generally mean an algorithm applying or obtained using any type of pattern recognition system, e.g., a neural network, sensor fusion, fuzzy logic, etc.

To "identify" as used herein will generally mean to determine that the object belongs to a particular set or class. The class may be one containing, for example, all rear facing child seats, one containing all human occupants, or all human occupants not sitting in a rear facing child seat, or all humans in a certain height or weight range depending on the purpose of the system. In the case where a particular person is to be recognized, the set or class will contain only a single element, i.e., the person to be recognized.

To "ascertain the identity of" as used herein with reference to an object will generally mean to determine the type or nature of the object (obtain information as to what the object is), i.e., that the object is an adult, an occupied rear facing child seat, an occupied front facing child seat, an unoccupied rear facing child seat, an unoccupied front facing child seat, a child, a dog, a bag of groceries, a car, a truck, a tree, a pedestrian, a deer etc.

An "object" in a vehicle or an "occupying item" of a seat may be a living occupant such as a human or a dog, another living organism such as a plant, or an inanimate object such as a box or bag of groceries or an empty child seat.

A "rear seat" of a vehicle as used herein will generally mean any seat behind the front seat on which a driver sits. Thus, in minivans or other large vehicles where there are more than two rows of seats, each row of seats behind the driver is considered a rear seat and thus there may be more than one "rear seat" in such vehicles. The space behind the front seat includes any number of such rear seats as well as any trunk spaces or other rear areas such as are present in station wagons.

An "optical image" will generally mean any type of image obtained using electromagnetic radiation including X-ray, ultraviolet, visual, infrared, terahertz and radar radiation.

In the description herein on anticipatory sensing, the term "approaching" when used in connection with the mention of an object or vehicle approaching another will usually mean the relative motion of the object toward the vehicle having the anticipatory sensor system. Thus, in a side impact with a tree, the tree will be considered as approaching the side of the vehicle and impacting the vehicle. In other words, the coordinate system used in general will be a coordinate system residing in the target vehicle. The "target" vehicle is the vehicle that is being impacted. This convention permits a general description to cover all of the cases such as where (i) a moving vehicle impacts into the side of a stationary vehicle, (ii) where both vehicles are moving when they impact, or (iii) where a vehicle is moving sideways into a stationary vehicle, tree or wall.

"Vehicle" as used herein includes any container that is movable either under its own power or using power from another vehicle. It includes, but is not limited to, automobiles, trucks, railroad cars, ships, airplanes, trailers, shipping containers, barges, etc. The term "container" will frequently be used interchangeably with vehicle however a container will generally mean that part of a vehicle that separate from and in some cases may exist separately and away from the source of motive power. Thus, a shipping container may exist in a shipping yard and a trailer may be parked in a parking lot without the tractor. The passenger compartment or a trunk of an automobile, on the other hand, are compartments of a container that generally only exists attaches to the vehicle chassis that also has an associated engine for moving the vehicle. Note, a container can have one or a plurality of compartments.

"Out-of-position" as used for an occupant will generally mean that the occupant, either the driver or a passenger, is sufficiently close to an occupant protection apparatus (airbag) prior to deployment that he or she is likely to be more seriously injured by the deployment event itself than by the accident. It may also mean that the occupant is not positioned appropriately in order to attain the beneficial, restraining effects of the deployment of the airbag. As for the occupant being too close to the airbag, this typically occurs when the occupant's head or chest is closer than some distance, such as about 5 inches, from the deployment door of the airbag module. The actual distance where airbag deployment should be suppressed depends on the design of the airbag module and is typically farther for the passenger airbag than for the driver airbag.

"Dynamic out-of-position" refers to the situation where a vehicle occupant, either driver or passenger, is in position at a point in time prior to an accident but becomes out-of-position, (that is, too close to the airbag module so that he or she could be injured or killed by the deployment of the airbag) prior to the deployment of the airbag due to pre-crash braking or other action which causes the vehicle to decelerate prior to a crash.

"Transducer" or "transceiver" as used herein will generally mean the combination of a transmitter and a receiver. In come cases, the same device will serve both as the transmitter and receiver while in others two separate devices adjacent to each other will be used. In some cases, a transmitter is not used and in such cases transducer will mean only a receiver. Transducers include, for example, capacitive, inductive, ultrasonic, electromagnetic (antenna, CCD, CMOS arrays), electric field, weight measuring or sensing devices. In some cases, a transducer will be a single pixel either acting alone, in a linear or an array of some other appropriate shape. In some cases, a transducer may comprise two parts such as the plates of a capacitor or the antennas of an electric field sensor. Sometimes, one antenna or plate will communicate with several other antennas or plates and thus for the purposes herein, a transducer will be broadly defined to refer, in most cases, to any one of the plates of a capacitor or antennas of a field sensor and in some other cases, a pair of such plates or antennas will comprise a transducer as determined by the context in which the term is used.

"Thermal instability" or "thermal gradients" refers to the situation where a change in air density causes a change in the path of ultrasonic waves from what the path would be in the absence of the density change. This density change ordinarily occurs due to a change in the temperature of a portion of the air through which the ultrasonic waves travel. The high speed flow of air (wind) through the passenger compartment can cause a similar effect. Thermal instability is generally caused by the sun beating down on the top of a closed vehicle ("long-term thermal instability") of through the operation of the heater or air conditioner ("short-term thermal instability"). Of course, other heat sources can cause a similar effect and thus the term as used herein is not limited to the examples provided.

"Adaptation" as used here will generally represent the method by which a particular occupant or object sensing system is designed and arranged for a particular vehicle model. It includes such things as the process by which the number, kind and location of various transducers are determined. For pattern recognition systems, it includes the process by which the pattern recognition system is designed and then taught or made to recognize the desired patterns. In this connection, it will usually include (1) the method of training when training is used, (2) the makeup of the databases used, testing and validating the particular system, or, in the case of a neural network, the particular network architecture chosen, (3) the process by which environmental influences are incorporated into the system, and (4) any process for determining the pre-processing of the data or the post processing of the results of the pattern recognition system. The above list is illustrative and not exhaustive. Basically, adaptation includes all of the steps that are undertaken to adapt transducers and other sources of information to a particular vehicle to create the system that accurately identifies and/or determines the location of an occupant or other object in a vehicle.

For the purposes herein, a "neural network" is defined to include all such learning systems including cellular neural networks, support vector machines and other kernel-based learning systems and methods, cellular automata and all other pattern recognition methods and systems that learn. A "combination neural network" as used herein will generally apply to any combination of two or more neural networks as most broadly defined that are either connected together or that analyze all or a portion of the input data. "Neural network" can also be defined as a system wherein the data to be processed is separated into discrete values which are then operated on and combined in at least a two-stage process and where the operation performed on the data at each stage is in general different for each of the discrete values and where the operation performed is at least determined through a training process. The operation performed is typically a multiplication by a particular coefficient or weight and by different operation, therefore is meant in this example, that a different weight is used for each discrete value.

A "morphological characteristic" will generally mean any measurable property of a human such as height, weight, leg or arm length, head diameter, skin color or pattern, blood vessel pattern, voice pattern, finger prints, iris patterns, etc.

A "wave sensor" or "wave transducer" is generally any device which senses either ultrasonic or electromagnetic waves. An electromagnetic wave sensor, for example, includes devices that sense any portion of the electromagnetic spectrum from ultraviolet down to a few hertz. The most commonly used kinds of electromagnetic wave sensors include CCD and CMOS arrays for sensing visible and/or infrared waves, millimeter wave and microwave radar, and capacitive or electric and/or magnetic field monitoring sensors that rely on the dielectric constant of the object occupying a space but also rely on the time variation of the field, expressed by waves as defined below, to determine a change in state.

A "CCD" will be generally defined to include all devices, including CMOS arrays, APS arrays, focal plane arrays, QWIP arrays or equivalent, artificial retinas and particularly HDRC arrays, which are capable of converting light frequencies, including infrared, visible and ultraviolet, into electrical signals. The particular CCD array used for many of the applications disclosed herein is implemented on a single chip that is less than two centimeters on a side. Data from the CCD array is digitized and sent serially to an electronic circuit containing a microprocessor for analysis of the digitized data. In order to minimize the amount of data that needs to be stored, initial processing of the image data takes place as it is being received from the CCD array, as discussed in more detail elsewhere herein. In some cases, some image processing can take place on the chip such as described in the Kage et al. artificial retina article referenced above.

The "windshield header" as used herein generally includes the space above the front windshield including the first few inches of the roof.

A "sensor" as used herein can be a single receiver or the combination of two transducers (a transmitter and a receiver) or one transducer which can both transmit and receive.

The "headliner" is the trim which provides the interior surface to the roof of the vehicle and the A-pillar is the roof-supporting member which is on either side of the windshield and on which the front doors are hinged.

An "occupant protection apparatus" is any device, apparatus, system or component which is actuatable or deployable or includes a component which is actuatable or deployable for the purpose of attempting to reduce injury to the occupant in the event of a crash, rollover or other potential injurious event involving a vehicle As used herein, a diagnosis of the "state of the vehicle" generally means a diagnosis of the condition of the vehicle with respect to its stability and proper running and operating condition. Thus, the state of the vehicle could be normal when the vehicle is operating properly on a highway or abnormal when, for example, the vehicle is experiencing excessive angular inclination (e.g., two wheels are off the ground and the vehicle is about to rollover), the vehicle is experiencing a crash, the vehicle is skidding, and other similar situations. A diagnosis of the state of the vehicle could also be an indication that one of the parts of the vehicle, e.g., a component, system or subsystem, is operating abnormally.

As used herein, an "occupant restraint device" generally includes any type of device which is deployable in the event of a crash involving the vehicle for the purpose of protecting an occupant from the effects of the crash and/or minimizing the potential injury to the occupant. Occupant restraint devices thus include frontal airbags, side airbags, seatbelt tensioners, knee bolsters, side curtain airbags, externally deployable airbags and the like.

As used herein, a "part" of the vehicle generally includes any component, sensor, system or subsystem of the vehicle such as the steering system, braking system, throttle system, navigation system, airbag system, seatbelt retractor, air bag inflation valve, air bag inflation controller and airbag vent valve, as well as those listed below in the definitions of "component" and "sensor".

As used herein, a "sensor system" generally includes any of the sensors listed below in the definition of "sensor" as well as any type of component or assembly of components which detect, sense or measure something.

The term "gage" or "gauge" is used herein interchangeably with the terms "sensor" and "sensing device".

REFERENCES

The following references are potentially relevant to the subject matter of the claimed invention and relevant to the disclosure herein.

1. Jacob, R. J. K. (1995). Eye tracking in advanced interface design. In Barøeld, W., & Furness, T. (Eds.), Advanced Interface Design and Virtual Environments, pp. 258288. Oxford University Press, Oxford. http://citeseer.nj.nec-.com/jacob95eye.html
2. Mirkin, Irina; Singher, Liviu "Adaptive scale-invariant filters"; Proceedings of SPIE Volume:
3159 Algorithms, Devices, and Systems for Optical Information Processing Editor(s): Javidi, Bahram; Psaltis, Demetri Published: 10/1997
3. O'Callaghan, Michael J.; Ward, David J.; Perlmutter, Stephen H.; Ji, Lianhua; Walker, Christopher M.; "Highly integrated single-chip optical correlator", Proceedings of SPIE Volume: 3466 Algorithms, Devices, and Systems for Optical Information Processing II Editor(s): Javidi, Bahram; Psaltis, Demetri, Published: October/1998
4. Awwal, Abdul Ahad S.; Michel, Howard E., "Single-step joint Fourier transform correlator", Proceedings of SPIE Volume: 3073 Optical Pattern Recognition VIII Editor(s): Casasent, David P.; Chao, Tien-Hsin, Published: March /1997
5. Javidi, Bahram, "Nonlinearjoint transform correlators", Real-Time Optical Information Processing, B. Javidi, and J. L. Homer, eds., Academic, NY, (1994)
6. M. Böhm, "Imagers Using Amorphous Silicon Thin Film on ASIC (TFA) Technology", Journal of Non-Crystalline Solids, 266-269, pp. 1145-1151, 2000.
7. A. Eckhardt, F. Blecher, B. Schneider, J. Sterzel, S. Benthien, H. Keller, T. Lule, P. Rieve, M. Sommer, K. Seibel, F. Mütze, M. Böhm, "Image Sensors in TFA (Thin Film on ASIC) Technology with Analog Image Pre-Processing", H. Reichl, E. Obermeier (eds.), Proc. Micro System Technologies 98, Potsdam, Germany, pp. 165-170, 1998.
8. T. Lulé, B. Schneider, M. Böhm, "Design and Fabrication of a High Dynamic Range Image Sensor in TFA Technology", invited paper for IEEE Journal of Solid-State Circuits, Special Issue on 1998 Symposium on VLSI Circuits, 1999.
9. M. Böhm, F. Blecher, A. Eckhardt, B. Schneider, S. Benthien, H. Keller, T. Lule, P. Rieve, M. Sommer, R. C. Lind, L. Humm, M. Daniels, N. Wu, H. Yen, "High Dynamic Range Image Sensors in Thin Film on ASIC—Technology for Automotive Applications", D. E. Ricken, W. Gessner (eds.), Advanced Microsystems for Automotive Applications, Springer-Verlag, Berlin, pp. 157-172, 1998.
10. Lake, D. W. "TFA Technology: The Coming Revolution in Photography", pp 3449, Advanced Imagining Magazine, Apr. 2, 2002.
11. M. Böhm, F. Blecher, A. Eckhardt, K. Seibel, B. Schneider, J. Sterzel, S. Benthien, H. Keller, T. Lulé, P. Rieve, M. Sommer, B. van Uffel, F. Librecht, R. C. Lind, L. Humm, U. Efron, E. Roth, "Image Sensors in Thin Film on ASIC Technology—Status & Future Trends", Mat. Res. Soc. Symp. Proc., vol. 507, pp. 327-338, 1998.
12. Schwarte, R. "A New Powerful Sensory Tool in Automotive Safety Systems Based on PMD-Technology, S-TEC GmbH Proceedings of the AMAA 2000 can be ordered at your local bookseller: "Advanced Microsystems for Automotive Applications 2000" Eds. S. Krueger, W. Gessner, Springer Verlag; Berlin, Heidelberg, N.Y., ISBN 3-540-67087-4
13. Nayar, S. K. and Mitsunaga, T., "High Dynamic Range Imaging: Spatially Varying Pixel Exposures" Proceedings of IEEE Conference on Computer Vision and Pattern Recognition, Hilton Head Island, S.C., June 2000.
14. Zorpette, G, "Working Knowledge: Focusing in a Flash", Scientific American Magazine, August, 2000.
15. Smeraldi, F., Carmona, J. B., "Saccadic search with Garbor features applied to eye detection and real-time head tracking", Image and Vision Computing 18 (2000) 323-329, Elsevier Science B. V.
16. Wang, Y., Yuan, B., "Human Eye Location Using Wavelet and Neural Network", Proceedings of the IEEE Internal Conference on Signal Processing 2000, p 1233-1236.
17. Sirohey, S. A., Rosenfeld, A., "Eye detection in a face using linear and nonlinear filters", Pattern Recognition 34 (2001) p 1367-1391, Elsevier Science Ltd.
18. Richards, A., Alien Vision, p. 6-9, 2001, SPIE Press, Bellingham, Wash.
19. Aguilar, M., Fay, D. A., Ross, W. D., Waxman, M., Ireland, D. B., and Racamato, J. P., "Rear-time fusion of low-light CCD and uncooled IR imagery for color night vision" SPIE Conference on Enhanced and Synthetic Vision 1998, Orlando, Fla. SPIE Vol. 3364 p. 124-133.
20. Fletcher, P., "Polymer material promises as inexpensive and thin full-color light-emitting plastic display", Electronic Design Magazine, Jan. 8, 1996
21 . . . "Organic light-emitting diodes represent the only display technology poised to meet third-generation mobile phone standards", p. 82-85 MIT Technology Review, April 2001.
22. Robinson, A. "New 'smart' glass darkens, lightens in a flash", p. 22F, Automotive news, Aug. 31, 1998.
23. "Markets for SPD technology", refr-spd.com/markets.h-tml
24. Feiner, S. "Augmented Reality: a new way of seeing", Scientific American Magazine, April 2002.
25. "Sigma SD9 Digital Camera Preview and Foveon Discussion", http://www.photo.net/sigma/sd9 (May 8, 2002)
26. Techniques And Application Of Neural Networks, edited by Taylor, M. and Lisboa, P., Ellis Horwood, West Sussex, England, 1993.
27. Naturally Intelligent Systems, by Caudill, M. and Butler, C., MIT Press, Cambridge Mass., 1990.
28. J. M. Zaruda, Introduction to Artificial Neural Systems, West publishing Co., N.Y., 1992.
29. Digital Neural Networks, by Kung, S. Y., PTR Prentice Hall, Englewood Cliffs, N.J., 1993 Eberhart, R., Simpson, P.
30. Dobbins, R., Computational Intelligence PC Tools, Academic Press, Inc., 1996, Orlando, Fla.
31. Cristianini, N. and Shawe-Taylor, J. An Introduction to Support Vector Machines and other kernel-based learning methods, Cambridge University Press, Cambridge England, 2000.

32. Proceedings of the 2000 6th IEEE International Workshop on Cellular Neural Networks and their Applications (CNNA 2000), IEEE, Piscataway N.J.

33. Sinha, N. K. and Gupta, M. M. Soft Computing & Intelligent Systems, Academic Press 2000 San Diego, Calif.

OBJECTS OF THE INVENTION

1. General Occupant Sensors

Briefly, the claimed inventions are methods and arrangements for obtaining information about an object in a vehicle as vehicle is defined above. This determination is used in various methods and arrangements for, for example, controlling occupant protection devices in the event of a vehicle crash and/or adjusting various vehicle components.

At least one of the inventions disclosed herein includes a system to sense the presence, position and/or type of an occupying item such as a child seat in a passenger compartment of a motor vehicle and more particularly, to identify and monitor the occupying items and their parts and other objects in the passenger compartment of a motor vehicle, such as an automobile or truck, by processing one or more signals received from the occupying items and their parts and other objects using one or more of a variety of pattern recognition techniques and illumination technologies. The received signal(s) may be a reflection of a transmitted signal, the reflection of some natural signal within the vehicle, or may be some signal emitted naturally by the object. Information obtained by the identification and monitoring system is then used to affect the operation of some other system in the vehicle.

At least one of the inventions disclosed herein is also a system designed to identify, locate and/or monitor occupants, including their parts, and other objects in the passenger compartment and in particular an occupied child seat in the rear facing position or an out-of-position occupant, by illuminating the contents of the vehicle with ultrasonic or electromagnetic radiation, for example, by transmitting radiation waves, as broadly defined above to include capacitors and electric or magnetic fields, from a wave generating apparatus into a space above the seat, and receiving radiation modified by passing through the space above the seat using two or more transducers properly located in the vehicle passenger compartment, in specific predetermined optimum locations.

More particularly, at least one of the inventions disclosed herein relates to a system including a plurality of transducers appropriately located and mounted and which analyze the received radiation from any object which modifies the waves or fields, or which analyze a change in the received radiation caused by the presence of the object (e.g., a change in the dielectric constant), in order to achieve an accuracy of recognition previously not possible to achieve in the past. Outputs from the receivers are analyzed by appropriate computational means employing trained pattern recognition technologies, and in particular combination neural networks, to classify, identify and/or locate the contents, and/or determine the orientation of, for example, a rear facing child seat.

In general, the information obtained by the identification and monitoring system is used to affect the operation of some other system, component or device in the vehicle and particularly the passenger and/or driver airbag systems, which may include a front airbag, a side airbag, a knee bolster, or combinations of the same. However, the information obtained can be used for controlling and/or affecting the operation of a multitude of other vehicle or in some cases, non-vehicle resident systems.

When the vehicle interior monitoring system in accordance with the invention is installed in the passenger compartment of an automotive vehicle equipped with an occupant protection apparatus, such as an inflatable airbag, and the vehicle is subjected to a crash of sufficient severity that the crash sensor has determined that the airbag is to be deployed, the system has determined (usually prior to the deployment) whether a child placed in the child seat in the rear facing position is present and if so, a signal has been sent to the control circuitry that the airbag should be controlled and most likely disabled and not deployed in the crash.

It must be understood though that instead of suppressing deployment, it is possible that the deployment may be controlled so that it might provide some meaningful protection for the occupied rear-facing child seat. The system developed using the teachings of at least one of the inventions disclosed herein also determines the position of the vehicle occupant relative to the airbag and controls and possibly disables deployment of the airbag if the occupant is positioned so that he or she is likely to be injured by the deployment of the airbag. As before, the deployment is not necessarily disabled but may be controlled to provide protection for the out-of-position occupant.

The invention also includes methods and arrangements for obtaining information about an object in a vehicle. This determination is used in various methods and arrangements for, e.g., controlling occupant protection devices in the event of a vehicle crash. The determination can also used in various methods and arrangements for, e.g., controlling heating and air-conditioning systems to optimize the comfort for any occupants, controlling an entertainment system as desired by the occupants, controlling a glare prevention device for the occupants, preventing accidents by a driver who is unable to safely drive the vehicle and enabling an effective and optimal response in the event of a crash (either oral directions to be communicated to the occupants or the dispatch of personnel to aid the occupants). Thus, one objective of the invention is to obtain information about occupancy of a vehicle and convey this information to remotely situated assistance personnel to optimize their response to a crash involving the vehicle and/or enable proper assistance to be rendered to the occupant(s) after the crash.

Accordingly, it is a principal object of the present invention to provide new and improved apparatus for obtaining information about an occupying item on a vehicle seat which apparatus may be integrated into vehicular component adjustment apparatus and methods which evaluate the occupancy of the seat and adjust the location and/or orientation relative to the occupant and/or operation of a part of the component or the component in its entirety based on the evaluated occupancy of the seat.

Some other objects related to general occupant sensors are:

To provide a new and improved system for identifying the presence, position and/or orientation of an object in a vehicle.

To provide a system for accurately detecting the presence of an occupied rear-facing child seat in order to prevent an occupant protection apparatus, such as an airbag, from deploying, when the airbag would impact against the rear-facing child seat if deployed.

To provide a system for accurately detecting the presence of an out-of-position occupant in order to prevent one or more deployable occupant protection apparatus such as airbags from deploying when the airbag(s) would impact against the head or chest of the occupant during its initial deployment phase causing injury or possible death to the occupant.

To provide an interior monitoring system that utilizes reflection, scattering, absorption or transmission of waves including capacitive or other field based sensors.

To determine the presence of a child in a child seat based on motion of the child.

To recognize the presence of a human on a particular seat of a motor vehicle and then to determine his or her velocity relative to the passenger compartment and to use this velocity information to affect the operation of another vehicle system.

To determine the presence of a life form anywhere in a vehicle based on motion of the life form.

To provide an occupant sensing system which detects the presence of a life form in a vehicle and under certain conditions, activates a vehicular warning system or a vehicular system to prevent injury to the life form.

To recognize the presence of a human on a particular seat of a motor vehicle and then to determine his or her position and to use this position information to affect the operation of another vehicle system.

To provide a reliable system for recognizing the presence of a rear-facing child seat on a particular seat of a motor vehicle.

To provide a reliable system for recognizing the presence of a human being on a particular seat of a motor vehicle.

To provide a reliable system for determining the position, velocity or size of an occupant in a motor vehicle.

To provide a reliable system for determining in a timely manner that an occupant is out-of-position, or will become out-of-position, and likely to be injured by a deploying airbag.

To provide an occupant vehicle interior monitoring system which has high resolution to improve system accuracy and permits the location of body parts of the occupant to be determined.

To provide a new and improved steering wheel or steering wheel assembly including a position and/or velocity sensor for use in determining the position of the occupant relative to the steering wheel or steering wheel assembly.

To provide a new and improved airbag module for mounting in a vehicle and which includes a position and/or velocity sensor for use in determining the position of the occupant to enable the airbag to be operationally controlled depending on the position of the occupant.

To provide new and improved methods and apparatus for controlling deployment of an airbag in which the distance between the occupant to be protected by the airbag and the steering wheel, in the case of the driver, or instrument panel, in the case of the front-seated passenger, are determined by a position and/or velocity sensor mounted on or in connection with the airbag module.

To provide a warning to a driver if he/she is falling asleep.

To sense that a driver is inebriated or otherwise suffering from a reduced capacity to operate a motor vehicle and to take appropriate action.

To provide a simplified system for determining the approximate location and velocity of a vehicle occupant and to use this system to control the deployment of a passive restraint. This occupant position and velocity determining system can be based on the position of the vehicle seat, the position of the seat back, the state of the seatbelt buckle switch, a seatbelt payout sensor or a combination thereof.

To provide new and improved adjustment apparatus and methods that evaluate the occupancy of the seat without the problems mentioned above.

To provide a method for accurately detecting the presence of an out-of-position occupant, and particularly one who becomes out-of-position during a high speed crash, in order to prevent one or more airbags from deploying, which airbag(s) would impact against the head or chest of the occupant during its initial deployment phase causing injury or possible death to the occupant.

1.1 Ultrasonics

Some objects mainly related to ultrasonic sensors are:

To provide adjustment apparatus and methods that evaluate the occupancy of the seat by a combination of ultrasonic sensors and additional sensors and adjust the location and/or orientation relative to the occupant and/or operation of a part of the component or the component in its entirety based on the evaluated occupancy of the seat.

To provide an occupant vehicle interior monitoring system this is not affected by temperature or thermal gradients. At least one of the inventions disclosed herein provides improvements to a system to sense the presence, position and/or type of an occupant in a passenger compartment of a motor vehicle in the presence of thermal gradients and more particularly, to identify and monitor occupants and their parts and other objects in the passenger compartment of a motor vehicle, such as an automobile or truck, by processing one or more signals received from the occupants and their parts and other objects using one or more of a variety of pattern recognition techniques and ultrasonic illumination technologies. The received signals are generally reflections of a transmitted signal. Information obtained by the identification and monitoring system is then used to affect the operation of some other system in the vehicle.

To enable the presence, position and type of occupying item in a passenger compartment to be detected even in the presence of thermal gradients.

To provide a method for reducing the effects of thermal gradients that occur when the sun beats down on a closed vehicle or from the operation of the heater or air conditioner, such gradients causing the ultrasonic or electromagnetic waves to be diffracted and thereby changing the received wave pattern.

To provide a reliable method using a single transducer for both sending and receiving ultrasonic or electromagnetic waves while permitting objects to be detected that are less than 4 inches from the transducer.

To provide a reliable method for dynamically determining the location of a vehicle occupant who is moving toward the airbag module due to vehicle decelerations caused by, for example, pre-crash braking and to use this information to control another vehicle system such as the airbag system.

To provide a reliable method for compensating for the effects of the change in the speed of sound due to temperature changes within the vehicle, such method based on the variation of a measurable property of the transducer such as its capacitance, inductance or natural frequency with temperature.

To provide a reliable method for determining in a timely manner, such as every 10-20 milliseconds, that an occupant is out of position, or will become out of position, and likely to be injured by a deploying airbag and to then output a signal to suppress the deployment of the airbag and to do so in sufficient time that the airbag deployment can be suppressed even in the case of a poorly designed or malfunctioning crash sensor which triggers late on a short duration crash.

To provide a method of controlling the wave pattern emitted from the transducer assembly so as to more precisely illuminate the area of interest.

To provide apparatus which permits speed of sound compensation to be achieved even when each transducer in the system operates at a different tuned frequency.

To provide apparatus which detect objects that are very close to the transducer assembly.

1.2 Optics

It is an object of at least one of the inventions disclosed herein to provide for the use of naturally occurring and artificial electromagnetic radiation in the visual, IR and ultraviolet portions of the electromagnetic spectrum. Such systems can employ, among others, cameras, CCD and CMOS arrays, Quantum Well Infrared Photodetector arrays, focal plane arrays and other imaging and radiation detecting devices and systems.

1.3 Ultrasonics and Optics

It is an object of at least one of the inventions disclosed herein to employ a combination of optical systems and ultrasonic systems to exploit the advantages of each system.

1.4 Other Transducers

It is an object of at least one of the inventions disclosed herein to also employ other transducers such as seat position, temperature, acceleration, pressure and other sensors and antennas.

2. Adaptation

It is an object of at least one of the inventions disclosed herein to provide for the adaptation of a system comprising a variety of transducers such as seatbelt payout sensors, seatbelt buckle sensors, seat position sensors, seatback position sensors, and weight sensors and which is adapted so as to constitute a highly reliable occupant presence and position system when used in combination with electromagnetic, ultrasonic or other radiation or field sensors.

3. Mounting Locations for and Quantity of Transducers

It is an object of at least one of the inventions disclosed herein to provide for one or a variety of transducer mounting locations in and on the vehicle including the headliner, A-Pillar, B-Pillar, C-Pillar, instrument panel, rear view mirror assembly, windshield, doors, windows and other appropriate locations for the particular application.

3.1 Single Camera, Dual Camera with Single Light Source

It is an object of at least one of the inventions disclosed herein to provide a single camera system that satisfies the requirements of FMVSS-208.

3.2 Location of the Transducers

It is an object of at least one of the inventions disclosed herein to provide for a driver monitoring system using an imaging transducer mounted on the rear view mirror assembly.

It is an object of at least one of the inventions disclosed herein to provide a system in which transducers are located within the passenger compartment at specific locations such that a high reliability of classification of objects and their position is obtained from the signals generated by the transducers.

3.3 Color Cameras—Multispectral Imaging

It is an object of at least one of the inventions disclosed herein to, where appropriate, use all frequencies or selected frequencies of the Radar, terahertz, infrared, visual, ultraviolet and X-ray portions of the electromagnetic spectrum.

3.4 High Dynamic Range Cameras

It is an object of at least one of the inventions disclosed herein to provide an imaging system that has sufficient dynamic range for the application. This may include the use of a high dynamic range camera (such as 120 db) or the use a lower dynamic range (such as 70 db or less) along with a method of adjusting the exposure either through use of an iris, a spatial light monitor or shutter control.

3.5 Fisheye Lens, Pan and Zoom

It is an object of at least one of the inventions disclosed herein, where appropriate, to provide for the use of a fisheye or similar very wide angle or otherwise distorting lens and to thereby achieve wide coverage and, in some cases, a pan and zoom capability.

It is a further object of at least one of the inventions disclosed herein to provide for a low-cost single element lens that can mount directly on the imaging chip.

4. 3D Cameras

It is a further object of at least one of the inventions disclosed herein to provide an interior monitoring system which provides three-dimensional information about an occupying item from a single transducer mounting location.

4.1 Stereo Vision

It is a further object of at least one of the inventions disclosed herein for some applications, where appropriate, to achieve a three-dimensional representation of objects in the passenger compartment through the use of at least two cameras. When two cameras are used, they may or may not be located near each other.

4.2 Distance by Focusing

It is a further object of at least one of the inventions disclosed herein to provide a method of measuring the distance from a sensor to an occupant or part thereof using calculations based of the degree of focus of an image.

4.3 Ranging

Further objects of at least one of the inventions disclosed herein are:

To provide a vehicle monitoring system using modulated radiation to aid in the determining of the distance from a transducer (either ultrasonic or electromagnetic) to an occupying item of a vehicle.

To provide a system of frequency domain modulation of the illumination of an object interior and/or exterior of a vehicle.

To utilize code modulation such as with a pseudo random code to permit the unambiguous monitoring of the vehicle exterior in the presence of other vehicles with the same system.

To use a chirp frequency modulation technique to aid in determining the distance to an object interior and/or exterior of a vehicle.

To use a beat frequency technique to aid in determining the distance to an object interior and/or exterior of a vehicle.

To utilize a correlation pattern modulation in a form of code division modulation for determining the distance of an object interior and/or exterior of a vehicle.

4.4 Pockel or Kerr Cell for Determining Range

It is a further object of at least one of the inventions disclosed herein to utilize a Pockel cell, Kerr cell or other spatial light monitor or equivalent to aid in determining the distance to an object in the interior or exterior of a vehicle.

4.5 Thin Film on ASIC (TFA)

It is a further object of at least one of the inventions disclosed herein to incorporate TFA technology in such a manner as to provide a three-dimensional image of the interior and/or exterior of a vehicle.

5. Glare Control

Further objects of at least one of the inventions disclosed herein are:

To determine the location of the eyes of a vehicle occupant and the direction of a light source such as the headlights of an oncoming vehicle or the sun and to cause a filter to be placed in a position to reduce the intensity of the light striking the eyes of the occupant.

To determine the location of the eyes of a vehicle occupant and the direction of a light source such as the headlights of a rear approaching vehicle or the sun and to cause a filter to be placed in a position to reduce the intensity of the light reflected from the rear view mirrors and striking the eyes of the occupant.

To provide a glare filter for a glare reduction system that uses semiconducting or metallic (organic) polymers to provide a low cost system, which may reside in the windshield, visor, mirror or special device.

To provide a glare filter based on electronic Venetian blinds, polarizers or spatial light monitors.

5.1 Windshield

It is a further object of at least one of the inventions disclosed herein to determine the location of the eyes of a vehicle occupant and the direction of a light source such as the headlights of an oncoming vehicle or the sun and to cause a filter to be placed in a position to reduce the intensity of the light striking the eyes of the occupant.

It is a further object of at least one of the inventions disclosed herein to provide a windshield where a substantial part of the area is covered by a plastic electronics film for a display and/or glare control.

5.2 Glare in Rear View Mirrors

It is an additional object of at least one of the inventions disclosed herein to determine the location of the eyes of a vehicle occupant and the direction of a light source such as the headlights of a rear approaching vehicle or the sun and to cause a filter to be placed in a rear view mirror to reduce the intensity of the light striking the eyes of the occupant.

5.3 Visor for Glare Control and HUD

It is a further object of at least one of the inventions disclosed herein to provide an occupant vehicle interior monitoring system which reduces the glare from sunlight and headlights by imposing a filter between the eyes of an occupant and the light source wherein the filter is placed in a visor.

6. Weight Measurement and Biometrics

Further objects of at least one of the inventions disclosed herein are:

To provide a system and method wherein the weight of an occupant is determined utilizing sensors located on the seat structure.

To provide apparatus and methods for measuring the weight of an occupying item on a vehicle seat which may be integrated into vehicular component adjustment apparatus and methods which evaluate the occupancy of the seat and adjust the location and/or orientation relative to the occupant and/or operation of a part of the component or the component in its entirety based on the evaluated occupancy of the seat.

To provide vehicular seats including a weight measuring feature and weight measuring methods for implementation in connection with vehicular seats.

To provide vehicular seats in which the weight applied by an occupying item to the seat is measured based on capacitance between conductive and/or metallic members underlying the seat cushion.

To provide adjustment apparatus and methods that evaluate the occupancy of the seat and adjust the location and/or orientation relative to the occupant and/or operation of a part of the component or the component in its entirety based on the evaluated occupancy of the seat and on a measurement of the occupant's weight or a measurement of a force or pressure exerted by the occupant on the seat.

To provide seat pressure or weight measurement systems in order to improve the accuracy of another apparatus or system that utilizes measured seat pressure or weight as input, e.g., a component adjustment apparatus.

To provide a system where the morphological characteristics of an occupant are measured by sensors located within the seat.

To provide a system for recognizing the identity of a particular individual in the vehicle.

To provide an improved seat pressure or weight measurement system and thereby improve the accuracy of another apparatus or system which utilizes measured seat pressure or weight as input, e.g., a component adjustment apparatus.

To provide a system for passively and automatically adjusting the position of a vehicle component to an optimum or near optimum location based on the size of an occupant.

To provide a system for recognizing a particular occupant of a vehicle and thereafter adjusting various components of the vehicle in accordance with the preferences of the recognized occupant.

To provide a pattern recognition system to permit more accurate location of an occupant's head and the parts thereof and to use this information to adjust a vehicle component.

To provide a method of determining whether a seat is occupied and, if not, leaving the seat at a neutral position.

6.1 Strain Gage Weight Sensors

It is a further object of at least one of the inventions disclosed herein to provide a seat pressure or weight measuring system based on the use of one or more strain gages.

6.2 Bladder Weight Sensors

It is a further object of at least one of the inventions disclosed herein to provide a seat pressure or weight measuring system based on the use of one or more fluid-filled bladders.

6.3 Dynamic Weight Measurement

It is a further object of at least one of the inventions disclosed herein:

To provide an occupant weight measuring system that utilizes the dynamic motion of the vehicle to determine the seat pressure applied by or weight of occupying items that is independent of seatbelt forces or residual stresses or other hysteretic effects in the seat pressure or weight measuring system.

To obtain a measurement of the weight of an occupying item in a seat of a vehicle while compensating for effects caused by a seatbelt, road roughness, steering maneuvers and a vehicle suspension system.

To classify an occupying item in a seat based on dynamic forces measured by a seat pressure or weight sensor associated with the seat, with an optional compensation for effects caused by the seatbelt, road roughness, etc.

To determine whether an occupying item is belted based on dynamic forces measured by a seat pressure or weight sensor associated with the seat, with an optional compensation for effects caused by the seatbelt, road roughness, etc.

To determine whether an occupying item in the seat is alive or inanimate based on dynamic forces measured by a seat pressure or weight sensor associated with the seat, with an optional compensation for effects caused by the seatbelt, road roughness, etc.

To determine the location of the occupying item on a seat based on dynamic forces measured by a seat pressure or weight sensor associated with the seat, with an optional compensation for effects caused by the seatbelt, road roughness, etc.

6.4 Combined Spatial and Weight

It is a further object of at least one of the inventions disclosed herein:

To provide an occupant sensing system that comprises both a seat pressure or weight measuring system and a special sensing system. To provide new and improved adjustment apparatus and methods that evaluate the occupancy of the seat by a combination of ultrasonic sensors and additional sensors and adjust the location and/or orientation relative to the occupant and/or operation of a part of the component or the component in its entirety based on the evaluated occupancy of the seat.

To provide new and improved adjustment apparatus and methods that reliably discriminate between a normally seated passenger and a forward facing child seat, between an abnormally seated passenger and a rear facing child seat, and whether or not the seat is empty and adjust the location and/or orientation relative to the occupant and/or operation of a part of the component or the component in its entirety based thereon.

6.5 Face Recognition (Face and iris IR Scans)

It is a further object of at least one of the inventions disclosed herein to recognize a particular driver based on such factors as facial characteristics, physical appearance or other attributes and to use this information to control another vehicle system such as the vehicle ignition, a security system, seat adjustment, or maximum permitted vehicle velocity, among others.

Further objects of at least one of the inventions disclosed herein are:

To determine the approximate location of the eyes of a driver and to use that information to control the position of the rear view mirrors of the vehicle and/or adjust the seat.

To control a vehicle component using eye tracking techniques.

To provide systems for approximately locating the eyes of a vehicle driver to thereby permit the placement of the driver's eyes at a particular location in the vehicle.

To provide systems for approximately locating the eyes of a vehicle driver to thereby permit the placement of the driver's eyes at a particular location in the vehicle.

6.6 Heartbeat and Health State

Further objects of at least one of the inventions disclosed herein are:

To provide a system using radar which detects a heartbeat of life forms in a vehicle.

To provide an occupant sensor which determines the presence and health state of any occupants in a vehicle. The presence of the occupants may be determined using an animal life or heartbeat sensor.

To provide an occupant sensor that determines whether any occupants of the vehicle are breathing by analyzing the occupant's motion. It can also be determined whether an occupant is breathing with difficulty.

To provide an occupant sensor which determines whether any occupants of the vehicle are breathing by analyzing the chemical composition of the air/gas in the vehicle, e.g., in proximity of the occupant's mouth.

To provide an occupant sensor that determines whether any occupants of the vehicle are conscious by analyzing movement of their eyes.

To provide an occupant sensor which determines whether any occupants of the vehicle are wounded to the extent that they are bleeding by analyzing air/gas in the vehicle, e.g., directly around each occupant.

To provide an occupant sensor which determines the presence and health state of any occupants in the vehicle by analyzing sounds emanating from the passenger compartment. Such sounds can be directed to a remote, manned site for consideration in dispatching response personnel.

6.7 Other Inputs

7. Illumination 7.1 Infrared Light

It is a further object of at least one of the inventions disclosed herein provide for infrared illumination in one or more of the near IR, SWIR, MWIR or LWIR regions of the infrared portion of the electromagnetic spectrum for illuminating the environment inside or outside of a vehicle.

7.2 Structured Light

It is a further object of at least one of the inventions disclosed herein to use structured light to help determine the distance to an object from a transducer.

7.3 Color and Natural Light

It is a further object of at least one of the inventions disclosed herein to provide a system that uses colored light and natural light in monitoring the interior and/or exterior of a vehicle.

7.4 Radar

Further objects of at least one of the inventions disclosed herein are:

To provide an occupant sensor which determines whether any occupants of the vehicle are moving using radar systems, e.g., micropower impulse radar (MIR), which can also detect the heartbeats of any occupants.

To provide an occupant sensor which determines whether any occupants of the vehicle are moving using radar systems, such as micropower impulse radar (MIR), which can also detect the heartbeats of any occupants and, optionally, to send this information by telematics to one or more remote sites.

7.5 Frequency or Spectrum Considerations

8. Field Sensors and Antennas

It is a further object of at least one of the inventions disclosed herein to provide a very low cost monitoring and presence detection system that uses the property that water in the near field of an antenna changes the antenna's loading or impedance matching or resonant properties.

9. Telematics

The occupancy determination can also be used in various methods and arrangements for, controlling heating and air-conditioning systems to optimize the comfort for any occupants, controlling an entertainment system as desired by the occupants, controlling a glare prevention device for the occupants, preventing accidents by a driver who is unable to safely drive the vehicle and enabling an effective and optimal response in the event of a crash (either oral directions to be communicated to the occupants or the dispatch of personnel to aid the occupants) as well as many others. Thus, one objective of the invention is to obtain information about occupancy of a vehicle before, during and/or after a crash and convey this information to remotely situated assistance personnel to optimize their response to a crash involving the vehicle and/or enable proper assistance to be rendered to the occupants after the crash.

It is an object of the present invention is to provide a new and improved method and system for obtaining information about occupancy of a vehicle and conveying this information to remotely situated assistance personnel after a crash involving the vehicle.

It is another object of the present invention is to provide a new and improved method and system for obtaining information about occupancy of a vehicle and conveying this information to remotely situated assistance personnel to optimize their response to a crash involving the vehicle and/or enable proper assistance to be rendered to the occupant(s) after the crash.

It is another object of the present invention to provide a new and improved method and system for determining the presence of an object on a particular seat of a motor vehicle and conveying this information over a wireless data link system or cellular phone.

It is another object of the present invention to provide a new and improved method and system for determining the presence of an object on a particular seat of a motor vehicle and using this information to affect the operation of a wireless data link system or cellular phone.

It is still another object of the present invention to provide a new and improved method and system for determining the presence of and total number of occupants of a vehicle and, in the event of an accident, transmitting that information, as well as other information such as the condition of the occupants, to a receiver site remote from the vehicle.

It is yet another object of the present invention to provide a new and improved occupant sensor which determines the presence and health state of any occupants in the vehicle by analyzing sounds emanating from the passenger compartment and directing directed such sounds to a remote, manned site for consideration in dispatching response personnel.

Still another object of the present invention is to provide a new and improved vehicle monitoring system which provides a communications channel between the vehicle (possibly through microphones distributed throughout the vehicle) and a manned assistance facility to enable communications with the occupants after a crash or whenever the occupants are in need of assistance particularly when the communication is initiated from the remote facility in response to a condition that the operator may not know exists (e.g., if the occupants are lost, then data forming maps as a navigational aid would be transmitted to the vehicle).

Further objects of at least one of the inventions disclosed herein are:

To determine the total number of occupants of a vehicle and in the event of an accident to transmit that information, as well as other information such as the condition of the occupants, to a receiver remote from the vehicle.

To determine the total number of occupants of a vehicle and in the event of an accident to transmit that information, as well as other information such as the condition of the occupants before, during and/or after a crash, to a receiver remote from the vehicle, such information may include images.

To provide an occupant sensor which determines the presence and health state of any occupants in a vehicle and, optionally, to send this information by telematics to one or more remote sites. The presence of the occupants may be determined using an animal life or heartbeat sensors.

To provide an occupant sensor which determines whether any occupants of the vehicle are breathing or breathing with difficulty by analyzing the occupant's motion and, optionally, to send this information by telematics to one or more remote sites.

To provide an occupant sensor which determines whether any occupants of the vehicle are breathing by analyzing the chemical composition of in the vehicle and, optionally, to send this information by telematics to one or more remote sites.

To provide an occupant sensor which determines whether any occupants of the vehicle are conscious by analyzing movement of their eyes, eyelids or other parts and, optionally, to send this information by telematics to one or more remote sites.

To provide an occupant sensor which determines whether any occupants of the vehicle are wounded to the extent that they are bleeding by analyzing the gas/air in the vehicle and, optionally, to send this information by telematics to one or more remote sites.

To provide an occupant sensor which determines the presence and health state of any occupants in the vehicle by analyzing sounds emanating from the passenger compartment and, optionally, to send this information by telematics to one or more remote sites. Such sounds can be directed to a remote, manned site for consideration in dispatching response personnel.

10. Display 10.1 Heads-up Display

It is a further object of at least one of the inventions disclosed herein to provide a heads-up display that positions the display on the windshield based of the location of the eyes of the driver so as to place objects at the appropriate location in the field of view.

10.2 Adjust HUD Based on Driver Seating Position

It is a further object of at least one of the inventions disclosed herein to provide a heads-up display that positions the display on the windshield based of the seating position of the driver so as to place objects at the appropriate location in the field of view.

10.3 HUD on Rear Window

It is a further object of at least one of the inventions disclosed herein to provide a heads-up display that positions the display on a rear window.

10.4 Plastic Electronics

It is a further object of at least one of the inventions disclosed herein to provide a heads-up display that uses plastic electronics rather than a projection system.

11. Pattern Recognition

It is a further object of at least one of the inventions disclosed herein to use pattern recognition techniques for determining the identity or location of an occupant or object in a vehicle.

It is a further object of at least one of the inventions disclosed herein to use pattern recognition techniques for analyzing three-dimensional image data of occupants of a vehicle and objects exterior to the vehicle.

11.1 Neural Networks

It is a further object of at least one of the inventions disclosed herein to use pattern recognition techniques comprising neural networks.

11.2 Combination Neural Networks

It is a further object of at least one of the inventions disclosed herein to use combination neural networks.

11.3 Interpretation of Other Occupant States—Inattention, Drowsiness, Sleep

Further objects of at least one of the inventions disclosed herein are:

To monitor the position of the head of the vehicle driver and determine whether the driver is falling asleep or otherwise impaired and likely to lose control of the vehicle and to use that information to affect another vehicle system.

To monitor the position of the eyes and/or eyelids of the vehicle driver and determine whether the driver is falling asleep or otherwise impaired and likely to lose control of the vehicle, or is unconscious after an accident, and to use that information to affect another vehicle system.

To monitor the position of the head and/or other parts of the vehicle driver and determine whether the driver is falling asleep or otherwise impaired and likely to lose control of the vehicle and to use that information to affect another vehicle system.

11.4 Combining Occupant Monitoring and Car Monitoring

It is a further object of at least one of the inventions disclosed herein to use a combination of occupant monitoring and vehicle monitoring to aid in determining if the driver is about to lose control of the vehicle.

11.5 Continuous Tracking

It is a further object of at least one of the inventions disclosed herein to provide an occupant position determination in a sufficiently short time that the position of an occupant can be tracked during a vehicle crash.

It is a further object of at least one of the inventions disclosed herein that the pattern recognition system is trained on the position of the occupant relative to the airbag rather than what zone the occupant occupies.

11.6 Preprocessing

Further objects of at least one of the inventions disclosed herein are:

To determine the presence of a child in a child seat based on motion of the child.

To determine the presence of a life form anywhere in a vehicle based on motion of the life form.

To provide a system using electromagnetics or ultrasonics to detect motion of objects in a vehicle and enable the use of the detection of the motion for control of vehicular components and systems.

11.7 Post-Processing

It is another object of at least one of the inventions disclosed herein to apply a filter to the output of the pattern recognition system that is based on previous decisions as a test of reasonableness.

13. Diagnostics and Prognostics

Principal objects and advantages of at least one of the inventions disclosed herein or other inventions disclosed herein are thus:

1. To prevent vehicle breakdowns.
2. To alert the driver of the vehicle that a component of the vehicle is functioning differently than normal and might be in danger of failing.
3. To alert the dealer, or repair facility, that a component of the vehicle is functioning differently than normal and is in danger of failing.
4. To provide an early warning of a potential component failure and to thereby minimize the cost of repairing or replacing the component.
5. To provide a device which will capture available information from signals emanating from vehicle components for a variety of uses such as current and future vehicle diagnostic purposes.
6. To provide a device that uses information from existing sensors for new purposes thereby increasing the value of existing sensors and, in some cases, eliminating the need for sensors that provide redundant information.
7. To provide a device which is trained to recognize deterioration in the performance of a vehicle component, or of the entire vehicle, based on information in signals emanating from the component or from vehicle angular and linear accelerations.
8. To provide a device which analyzes vibrations from various vehicle components that are transmitted through the vehicle structure and sensed by existing vibration sensors such as vehicular crash sensors used with airbag systems or by special vibration sensors, accelerometers, or gyroscopes.
9. To provide a device which provides information to the vehicle manufacturer of the events leading to a component failure.
10. To apply pattern recognition techniques based on training to diagnose potential vehicle component failures.
11. To apply component diagnostic techniques in combination with intelligent or smart highways wherein vehicles may be automatically guided without manual control in order to permit the orderly exiting of the vehicle from a restricted roadway prior to a breakdown of the vehicle.
12. To apply trained pattern recognition techniques using multiple sensors to provide an early prediction of the existence and severity of an accident.
13. To utilize pattern recognition techniques and the output from multiple sensors to determine at an early stage that a vehicle rollover might occur and to take corrective action through control of the vehicle acceleration, brakes and/or steering to prevent the rollover or if it is not preventable, to deploy side head protection airbags to attempt to reduce injuries.
14. To use the output from multiple sensors to determine that the vehicle is skidding or sliding and to send messages to the various vehicle control systems to activate the throttle, brakes and/or steering to correct for the vehicle sliding or skidding motion.
15. To provide a new and improved method and system for diagnosing components in a vehicle and the operating status of the vehicle and alerting the vehicle's dealer, or another repair facility, via a telematics link that a component of the vehicle is functioning abnormally and may be in danger of failing.
16. To provide a new and improved method and apparatus for obtaining information about a vehicle system and components in the vehicle in conjunction with failure of the component or the vehicle and sending this information to the vehicle manufacturer.
17. To provide a new and improved method and system for diagnosing components in a vehicle by monitoring the patterns of signals emitted from the vehicle components and, through the use of pattern recognition technology, forecasting component failures before they occur. Vehicle component behavior is thus monitored over time in contrast to systems that wait until a serious condition occurs. The forecast of component failure can be transmitted to a remote location via a telematics link.
18. To provide a new and improved on-board vehicle diagnostic module utilizing pattern recognition technologies which are trained to differentiate normal from abnormal component behavior. The diagnosis of component behavior can be transmitted to a remote location via a telematics link.
19. To provide a diagnostic module that determines whether a component is operating normally or abnormally based on a time series of data from a single sensor or from multiple sensors that contain a pattern indicative of the operating status of the component. The diagnosis of component operation can be transmitted to a remote location via a telematics link.
20. To provide a diagnostic module that determines whether a component is operating normally or abnormally based on data from one or more sensors that are not directly associated with the component, i.e., do not depend on the operation of the component. The diagnosis of component operation can be transmitted to a remote location via a telematics link.
21. To simultaneously monitor several sensors, primarily accelerometers, gyroscopes and strain gages, to determine the state of the vehicle and optionally its occupants and to determine that a vehicle is out of control and possibly headed for an accident, for example. If so, then a signal can be sent to a part of the vehicle control system to attempt to re-establish stability. If this is unsuccessful, then the same system of sensors can monitor the early stages of a crash to make an assessment of the severity of the crash and what occupant protection systems should be deployed and how such occupant protection systems should be deployed.

22. To provide new and improved sensors for a vehicle which wirelessly transmits information about a state measured or detected by the sensor.
23. To incorporate surface acoustic wave technology into sensors on a vehicle with the data obtained by the sensors being transmittable via a telematics link to a remote location.
24. To provide new and improved sensors for measuring the pressure, temperature and/or acceleration of tires with the data obtained by the sensors being transmittable via a telematics link to a remote location.
25. To provide new and improved weight or load measuring sensors, switches, temperature sensors, acceleration sensors, angular position sensors, angular rate sensors, angular acceleration sensors, proximity sensors, rollover sensors, occupant presence and position sensors, strain sensors and humidity sensors which utilize wireless data transmission, wireless power transmission, and/or surface acoustic wave technology with the data obtained by the sensors being transmittable via a telematics link to a remote location.
26. To provide new and improved sensors for detecting the presence of fluids or gases which utilize wireless data transmission, wireless power transmission, and/or surface acoustic wave technology with the data obtained by the sensors being transmittable via a telematics link to a remote location.
27. To provide new and improved sensors for detecting the condition or friction of a road surface which utilize wireless data transmission, wireless power transmission, and/or surface acoustic wave technology with the data obtained by the sensors being transmittable via a telematics link to a remote location.
28. To provide new and improved sensors for detecting chemicals which utilize wireless data transmission, wireless power transmission, and/or surface acoustic wave technology with the data obtained by the sensors being transmittable via a telematics link to a remote location.
29. To utilize any of the foregoing sensors for a vehicular component control system in which a component, system or subsystem in the vehicle is controlled based on the information provided by the sensor. Additionally, the information provided by the sensor can be transmitted via a telematics link to one or more remote facilities for further analysis.
30. To provide new and improved sensors which obtain and provide information about the vehicle, about individual components, systems, vehicle occupants, subsystems, or about the roadway, ambient atmosphere, travel conditions and external objects with the data obtained by the sensors being transmittable via a telematics link to a remote location 14. Other Products, Outputs, Features It is an object of the present invention to provide new and improved arrangements and methods for adjusting or controlling a component in a vehicle. Control of a component does not require an adjustment of the component if the operation of the component is appropriate for the situation.

It is another object of the present invention to provide new and improved methods and apparatus for adjusting a component in a vehicle based on occupancy of the vehicle. For example, an airbag system may be controlled based on the location of a seat and the occupant of the seat to be protected by the deployment of the airbag.

Further objects of at least one of the inventions disclosed herein related to additional capabilities are:

To recognize the presence of an object on a particular seat of a motor vehicle and to use this information to affect the operation of another vehicle system such as the entertainment system, airbag system, heating and air conditioning system, pedal adjustment system, mirror adjustment system, wireless data link system and cellular phone, among others.

To recognize the presence of an occupant on a particular seat of a motor vehicle and then to determine his/her position and to use this position information to affect the operation of another vehicle system.

To determine the approximate location of the eyes of a driver and to use that information to control the position of the rear view mirrors of the vehicle.

To recognize a particular driver based on such factors as physical appearance or other attributes and to use this information to control another vehicle system such as a security system, seat adjustment, or maximum permitted vehicle velocity, among others.

To recognize the presence of a human on a particular seat of a motor vehicle and then to determine his/her velocity relative to the passenger compartment and to use this velocity information to affect the operation of another vehicle system.

To provide a system using electric fields, electromagnetics or ultrasonics to detect motion of objects in a vehicle and enable the use of the detection of the motion for control of vehicular components and systems.

To provide a system for passively and automatically adjusting the position of a vehicle component to a near optimum location based on the size of an occupant.

To provide adjustment apparatus and methods that reliably discriminate between a normally seated passenger and a forward facing child seat, between an abnormally seated passenger and a rear facing child seat, and whether or not the seat is empty and adjust the location and/or orientation relative to the occupant and/or operation of a part of the component or the component in its entirety based thereon.

To provide a system for recognizing a particular occupant of a vehicle and thereafter adjusting various components of the vehicle in accordance with the preferences of the recognized occupant.

To provide a pattern recognition system to permit more accurate location of an occupant's head and the parts thereof and to use this information to adjust a vehicle component.

To provide a system for automatically adjusting the position of various components of the vehicle to permit safer and more effective operation of the vehicle including the location of the pedals and steering wheel.

To provide new and improved apparatus and methods for automatically adjusting a steering wheel based on the morphology of the driver, e.g., to place the steering wheel in an optimum position for driving the vehicle.

To provide a new and improved method and apparatus for adjusting a steering wheel in which the occupancy of the driver's seat is evaluated and the steering wheel adjusted automatically relative to the driver based on the evaluated occupancy of the driver's seat.

To recognize the presence of a human on a particular seat of a motor vehicle and then to determine his or her position and to use this position information to affect the operation of another vehicle system.

14.1 Control of Passive Restraints

It is another object of the present invention to provide new and improved arrangements and methods for controlling an occupant protection device based on the morphology of an occupant to be protected by the actuation of the device and optionally, the location of a seat on which the occupant is sitting. Control of the occupant protection device can entail suppression of actuation of the device, or adjustment of the actuation parameters of the device if such adjustment is deemed necessary.

Further objects of at least one of the inventions disclosed herein related to control of passive restraints are:

To determine the position, velocity and/or size of an occupant in a motor vehicle and to utilize this information to control the rate of gas generation, or the amount of gas generated, by an airbag inflator system or otherwise control the flow of gas into and/or out of an airbag.

To determine the fact that an occupant is not restrained by a seatbelt and therefore to modify the characteristics of the airbag system. This determination can be done either by monitoring the position or motion of the occupant or through the use of a resonating device placed on the shoulder belt portion of the seatbelt.

To determine the presence and/or position of rear seated occupants in the vehicle and to use this information to affect the operation of a rear seat protection airbag for frontal, rear or side impacts, or rollovers.

To recognize the presence of a rear facing child seat on a particular seat of a motor vehicle and to use this information to affect the operation of another vehicle system such as the airbag system.

To provide a vehicle interior monitoring system for determining the location of occupants within the vehicle and to include within the same system various electronics for controlling an airbag system.

To provide an occupant sensing system which detects the presence of a life form in a vehicle and under certain conditions, activates a vehicular warning system or a vehicular system to prevent injury to the life form.

To determine whether an occupant is out-of-position relative to the airbag and if so, to suppress deployment of the airbag in a situation in which the airbag would otherwise be deployed.

To adjust the flow of gas into and/or out of the airbag based on the morphology and/or position of the occupant to improve the performance of the airbag in reducing occupant injury.

To provide an occupant position sensor which reliably permits, and in a timely manner, a determination to be made that the occupant is out-of-position, or will become out-of-position, and likely to be injured by a deploying airbag and to then output a signal to suppress the deployment of the airbag.

14.2 Seat, Seatbelt, Steering Wheel and Pedal Adjustment and Resonators

Further objects of at least one of the inventions disclosed herein related to control of a seat and related adjustments are:

To determine the position of a seat in the vehicle using sensors remote from the seat and to use that information in conjunction with a memory system and appropriate actuators to position the seat in a predetermined location.

To remotely determine the fact that a vehicle door is not tightly closed using an illumination transmitting and receiving system such as one employing electromagnetic or acoustic waves.

To determine the position of the shoulder of a vehicle occupant and to use that information to control the seatbelt anchorage point.

To obtain information about an object in a vehicle using resonators or reflectors arranged in association with the object, such as the position of the object and the orientation of the object.

To provide a system designed to determine the orientation of a child seat using resonators or reflectors arranged in connection with the child seat.

To provide a system designed to determine whether a seatbelt is in use using resonators and reflectors, for possible use in the control of a safety device such as an airbag.

To provide a system designed to determine the position of an occupying item of a vehicle using resonators or reflectors, for possible use in the control of a safety device such as an airbag.

To provide a system designed to determine the position of a seat using resonators or reflectors, for possible use in the control of a vehicular component or system which would be affected by different seat positions.

To obtain information about an object in a vehicle using resonators or reflectors arranged in association with the object, such as the position of the object and the orientation of the object.

To provide a system for automatically adjusting the position of various components of the vehicle to permit safer and more effective operation of the vehicle including the location of the pedals and steering wheel.

To provide a system where the morphological characteristics of an occupant are measured by sensors located within the seat.

To provide a system and method wherein the weight of an occupant is determined utilizing sensors located on the seat structure.

To provide a system and method wherein other morphological properties are used to identify an individual including facial features, iris patterns, voiceprints, fingerprints and handprints.

To provide new and improved vehicular seats including a seat pressure or weight measuring feature and seat pressure or weight measuring methods for implementation in connection with vehicular seats.

14.3 Side Impacts

It is a further object of at least one of the inventions disclosed herein to determine the presence and/or position of occupants relative to the side impact airbag systems and to use this information to affect the operation of a side impact protection airbag system.

14.4 Children and Animals Left Alone

It is a further object of at least one of the inventions disclosed herein to detect whether children or animals are left alone in a vehicle or vehicle trunk and the environment is placing such children or animals in danger.

14.5 Vehicle Theft

It is a further object of at least one of the inventions disclosed herein to prevent vehicle theft by warning the owner that the vehicle is being stolen.

14.6 Security, Intruder Protection

It is a further object of at least one of the inventions disclosed herein to provide a security system for a vehicle which determines the presence of an unexpected life form in a vehicle and conveys the determination prior to entry of a driver into the vehicle.

It is a further object of at least one of the inventions disclosed herein to recognize a particular driver based on such factors as physical appearance or other attributes and to use this information to control another vehicle system such as a security system, seat adjustment, or maximum permitted vehicle velocity, among others.

14.7 Entertainment System Control

Further objects of at least one of the inventions disclosed herein related to control of the entertainment system are:

To affect the vehicle entertainment system, e.g., the speakers, based on a determination of the number, size and/or location of various occupants or other objects within the vehicle passenger compartment.

To determine the location of the ears of one or more vehicle occupants and to use that information to control the entertainment system, e.g., the speakers, so as to improve the quality of the sound reaching the occupants' ears through such methods as noise canceling sound.

14.8 HVAC

Further objects of at least one of the inventions disclosed herein related to control of the HVAC system are:

To affect the vehicle heating, ventilation and air conditioning system based on a determination of the number, size and location of various occupants or other objects within the vehicle passenger compartment.

To determine the temperature of an occupant based on infrared radiation coming from that occupant and to use that information to control the heating, ventilation and air conditioning system.

To recognize the presence of a human on a particular seat of a motor vehicle and to use this information to affect the operation of another vehicle system such as the airbag, heating and air conditioning, or entertainment systems, among others.

14.9 Obstruction Sensing

Further objects of at least one of the inventions disclosed herein related to sensing of window and door obstructions are:

To determine the extent of openness of a vehicle window and to use that information to affect another vehicle system.

To determine the presence of an occupant's hand or other object in the path of a closing window and to affect the window closing system.

To determine the presence of an occupant's hand or other object in the path of a closing door and to affect the door closing system.

To provide a new and improved system for monitoring closure of apertures.

To provide a new and improved system for monitoring closure of apertures in vehicles such as windows, doors, sunroofs, convertible tops and trunks.

To provide a new and improved system for monitoring closure of apertures such as windows, doors, sunroofs, convertible tops and trunks in vehicles and to suppress closure of the same if an obstacle is detected.

To provide a new and improved aperture monitoring system that does not depend on the reflectivity of the edges of the aperture and does not require the application of special materials to such edges.

To provide a new and improved aperture monitoring system that does not require the use of a calibration system such as a calibration LED.

14.10 Rear Impacts

It is a further object of at least one of the inventions disclosed herein to determine the position of the rear of an occupant's head and to use that information to control the position of the headrest.

It is an object of the present invention to provide new and improved headrests for seats in a vehicle which offer protection for an occupant in the event of a crash involving the vehicle.

It is another object of the present invention to provide new and improved seats for vehicles which offer protection for an occupant in the event of a crash involving the vehicle.

It is still another object of the present invention to provide new and improved cushioning arrangements for vehicles and protection systems including cushioning arrangements which provide protection for occupants in the event of a crash involving the vehicle.

It is yet another object of the present invention to provide new and improved cushioning arrangements for vehicles and protection systems including cushioning arrangements which provide protection for occupants in the event of a collision into the rear of the vehicle, i.e., a rear impact.

It is yet another object of the present invention to provide new and improved vehicular systems which reduce whiplash injuries from rear impacts of a vehicle by causing the headrest to be automatically positioned proximate to the occupant's head.

It is yet another object of the present invention to provide new and improved vehicular systems to position a headrest proximate to the head of a vehicle occupant prior to a pending impact into the rear of a vehicle.

It is yet another object of the present invention to provide a simple anticipatory sensor system for use with an adjustable headrest, or other safety system, to predict a rear impact.

It is yet another object of the present invention to provide a method and arrangement for protecting an occupant in a vehicle during a crash involving the vehicle using an anticipatory sensor system and a cushioning arrangement including a fluid-containing bag which is brought closer toward the occupant or ideally in contact with the occupant prior to or coincident with the crash. The bag would then conform to the portion of the occupant with which it is in contact.

It is yet another object of the present invention to provide an automatically adjusting system which conforms to the head and neck geometry of an occupant regardless of the occupant's particular morphology to properly support both the head and neck.

14.11 Combined with SDM and Other Systems

It is a further object of at least one of the inventions disclosed herein to provide for the combining of the electronics of the occupant sensor and the airbag control module into a single package.

14.12 Exterior Monitoring

Further objects of at least one of the inventions disclosed herein related to monitoring the exterior environment of the vehicle are:

To provide a system for monitoring the environment exterior of a vehicle in order to determine the presence and classification, identification and/or location of objects in the exterior environment.

To provide an anticipatory sensor that permits accurate identification of the about-to-impact object in the presence of snow and/or fog whereby the sensor is located within the vehicle.

To provide a smart headlight dimmer system which senses the headlights from an oncoming vehicle or the tail lights of a vehicle in front of the subject vehicle and identifies these lights differentiating them from reflections from signs or the road surface and then sends a signal to dim the headlights.

To provide a blind spot detector which detects and categorizes an object in the driver's blind spot or other location in the vicinity of the vehicle, and warns the driver in the event the driver begins to change lanes, for example, or continuously informs the driver of the state of occupancy of the blind spot.

To use the principles of time of flight to measure the distance to an occupant or object exterior to the vehicle.

To provide a camera system for interior and exterior monitoring, which can adjust on a pixel by pixel basis for the intensity of the received light.

To provide for the use of an active pixel camera for interior and exterior vehicle monitoring.

14.13 Monitoring of other Vehicles such as Cargo Containers, Truck Trailers and Railroad Cars It is an object of some embodiments of the present invention to provide new and improved systems for remotely monitoring transportation assets and other movable and/or stationary items which have very low power requirements.

It is another object of some embodiments of the present invention to provide new and improved systems for attachment to shipping containers and other transportation assets which enable remote monitoring of the location, contents and/or interior or exterior environment of shipping containers or other assets and transportation assets and since it has a low power requirement, lasts for years without needing maintenance. It is yet another object of some embodiments of the invention to provide new and improved tracking methods and systems for tracking shipping containers and other transportation assets and enabling recording of the travels of the shipping container or transportation asset.

SUMMARY OF THE INVENTION 15.1 Classification, Location and Identification

The occupant position sensor of at least one of the inventions disclosed herein is adapted for installation in the passenger compartment of an automotive vehicle equipped with a passenger passive protective device (also referred to herein as an occupant restraint device) such as an inflatable airbag. When the vehicle is subjected to a crash of sufficient magnitude as to require deployment of the passive protective device (airbag), and the crash sensor system has determined that the device is to be deployed, the occupant position sensor and associated electronic circuitry determines the position of the vehicle occupant relative to the airbag and the velocity of the occupant, and disables deployment of the airbag if the occupant is positioned and/or will be positioned so that he/she is likely to be injured by the deploying airbag.

In order to achieve some of the above objects, an optical classification method for classifying an occupant in a vehicle in accordance with the invention comprises the steps of acquiring images of the occupant from a single camera and analyzing the images acquired from the single camera to determine a classification of the occupant. The single camera may be a digital CMOS camera, a high-power near-infrared LED, and the LED control circuit. It is possible to detect brightness of the images and control illumination of an LED in conjunction with the acquisition of images by the single camera. The illumination of the LED may be periodic to enable a comparison of resulting images with the LED on and the LED off so as to determine whether a daytime condition or a nighttime condition is present. The position of the occupant can be monitored when the occupant is classified as a child, an adult or a forward-facing child restraint.

In one embodiment, analysis of the images entails preprocessing the images, compressing the data from the preprocessed images, determining from the compressed data or the acquired images a particular condition of the occupant and/or condition of the environment in which the images have been acquired, providing a plurality of trained neural networks, each designed to determine the classification of the occupant for a respective one of the conditions, inputting the compressed data into one of the neural networks designed to determine the classification of the occupant for the determined condition to thereby obtain a classification of the occupant and subjecting the obtained classification of the occupant to post-processing to improve the probability of the classification of the occupant corresponding to the actual occupant. The pre-processing step may involve removing random noise and enhancing contrast whereby the presence of unwanted objects other than the occupant are reduced. The presence of unwanted contents in the images other than the occupant may be detected and the camera adjusted to minimize the presence of the unwanted contents in the images.

The post-processing may involve filtering the classification of the occupant from the neural network to remove random noise and/or comparing the classification of the occupant from the neural network to a previously obtained classification of the occupant and determining whether any difference in the classification is possible.

The classification of the occupant from the neural network may be displayed in a position visible to the occupant and enabling the occupant to change or confirm the classification.

The position of the occupant may be monitored when the occupant is classified as a child, an adult or a forward-facing child restraint. One way to do this is to input the compressed data or acquired images into an additional neural network designed to determine a recommendation for control of a system in the vehicle based on the monitoring of the position of the occupant. Also, a plurality of additional neural networks may be used, each designed to determine a recommendation for control of a system in the vehicle for a particular classification of occupant. In this case, the compressed data or acquired images is input into one of the neural networks designed to determine the recommendation for control of the system for the obtained classification of the occupant to thereby obtain a recommendation for the control of the system for the particular occupant.

In another embodiment, the method also involves acquiring images of the occupant from an additional camera, preprocessing the images acquired from the additional camera, compressing the data from the pre-processed images acquired from the additional camera, determining from the compressed data or the acquired images from the additional camera a particular condition of the occupant or condition of the environment in which the images have been acquired, inputting the compressed data from the pre-processed images acquired by the additional camera into one of the neural networks designed to determine the classification of the occupant for the determined condition to thereby obtain a classification of the occupant, subjecting the obtained classification of the occupant to post-processing to improve the probability of the classification of the occupant corresponding to the actual occupant and comparing the obtained classification using the images acquired form the additional camera to the images acquired from the initial camera to ascertain any variations in classification.

To further improve the operation of the ultrasonic portion of the system, especially when thermal gradients are present, the received signal is processed using a pseudo logarithmic compression circuit. This circuit compresses high amplitude reflections in comparison to low amplitude reflections and thereby diminishes the effects of diffraction cause by thermal gradients.

A method for categorizing and determining the position of an object in a passenger compartment of a vehicle in accordance with the invention comprises the steps of mounting a plurality of wave-receiving transducers on the vehicle, training a first neural network on signals from at least some of the transducers representative of waves received by the transducers when different objects in different positions are situated in the passenger compartment such that the first neural network provides an output signal indicative of the categorization of the object, and training a second neural network on signals from at least some of the transducers representative of waves received by the transducers when different objects in different positions are situated in the passenger compartment such that the second neural network provides an output signal indicative of the position of the object.

Another method for identifying an object in a passenger compartment of a vehicle comprises the steps of mounting a plurality of wave-emitting and receiving transducers on the vehicle, each transducer being arranged to transmit and receive waves at a different frequency, controlling the transducers to simultaneously transmit waves at the different frequencies into the passenger compartment, and identifying the object based on the waves received by at least some of the transducers after being modified by passing through the passenger compartment. The spacing between the frequencies of the waves transmitted and received by the transducers is determined in order to reduce the possibility of each transducer receiving waves transmitted by another transducer. The position of the object is determined based on the waves received by at least some of the transducers after being modified by passing through the passenger compartment.

When ultrasonic transducers are used, motion of a respective vibrating element of at least one transducer can be electronically reduced in order to reduce ringing of the transducer. Also, at least one transducer may be mounted in a respective tube having an opening through which the waves are transmitted and received.

A processor may be coupled to the transducers for controlling the transducers to simultaneously transmit waves at the different frequencies into the passenger compartment and receive signals representative of the waves received by the transducers after being modified by passing through the passenger compartment. The processor would then identify the object and/or determine the position of the object based on the signals representative of the waves received by at least some of the transducers.

One embodiment of the interior monitoring system in accordance with the invention comprises a device for irradiating at least a portion of the compartment or other part of a vehicle in which an occupying item is situated, a receiver system for receiving radiation from the occupying item, e.g., a plurality of receivers, each arranged at a discrete location, a processor coupled to the receivers for processing the received radiation from each receiver in order to create a respective electronic signal characteristic of the occupying item based on the received radiation, each signal containing a pattern representative of the occupying item, a categorization unit coupled to the processor for categorizing the signals, and an output device coupled to the categorization unit for affecting another system within the vehicle based on the categorization of the signals characteristic of the occupying item. The categorization unit may use a pattern recognition technique for recognizing and thus identifying the class of the occupying item by processing the signals into a categorization thereof based on data corresponding to patterns of received radiation and associated with possible classes of occupying items of the vehicle. Each signal may comprise a plurality of data, all of which is compared to the data corresponding to patterns of received radiation and associated with possible classes of contents of the vehicle. In one specific embodiment, the system includes a location determining unit coupled to the processor for determining the location of the occupying item, e.g., based on the received radiation such that the output device coupled to the location determining unit, in addition to affecting the other system based on the categorization of the signals characteristic of the occupying item, affects the system based on the determined location of the occupying item. In another embodiment to determine the presence or absence of an occupant, the categorization unit comprises a pattern recognition system for recognizing the presence or absence of an occupying item in the compartment by processing each signal into a categorization thereof signal based on data corresponding to patterns of received radiation and associated with possible occupying items of the vehicle and the absence of such occupying items.

In a disclosed method for determining the occupancy of a seat in a passenger compartment of a vehicle in accordance with the invention, waves such as ultrasonic or electromagnetic waves are transmitted into the passenger compartment toward the seat, reflected waves from the passenger compartment are received by a component which then generates an output representative thereof, the weight applied onto the seat is measured and an output is generated representative thereof and then the seated-state of the seat is evaluated based on the outputs from the sensors and the weight measuring unit.

The evaluation of the seated-state of the seat may be accomplished by generating a function correlating the outputs representative of the received reflected waves and the measured weight and the seated-state of the seat, and incorporating the correlation function into a microcomputer. In the alternative, it is possible to generate a function correlating the outputs representative of the received reflected waves and the measured weight and the seated-state of the seat in a neural network, and execute the function using the outputs representative of the received reflected waves and the measured weight as input into the neural network.

To enhance the seated-state determination, the position of a seat track of the seat is measured and an output representative thereof is generated, and then the seated-state of the seat is evaluated based on the outputs representative of the received reflected waves, the measured weight and the measured seat track position. In addition to or instead of measuring the seat track position, it is possible to measure the reclining angle of the seat, i.e., the angle between the seat portion and the back portion of the seat, and generate an output representative thereof, and then evaluate the seated-state of the seat based on the outputs representative of the received reflected waves, the measured weight and the measured reclining angle of the seat (and seat track position, if measured).

Furthermore, the output representative of the measured weight may be compared with a reference value, and the occupying object of the seat identified, e.g., as an adult or a child, based on the comparison of the measured weight with the reference value.

In another method disclosed herein for determining the identification and position of objects in a passenger compartment of a vehicle in accordance with the invention, electromagnetic waves are transmitted into the passenger compartment from one or more locations, a plurality of images of the interior of the passenger compartment are obtained, each from a respective location, a three-dimensional representation of a portion of the interior of the passenger compartment or of the occupying item is created from the images, and a pattern recognition technique is applied to the representation in order to determine the identification and position of the objects in the passenger compartment. The pattern recognition technique may be a neural network, fuzzy logic or an optical correlator or combinations thereof. The representation may be obtained by utilizing a scanning laser radar system where the laser is operated in a pulse mode and determining the distance from the object being illuminated using range gating. (See, for example, H. Kage, W. Freemen, Y Miyke, E. Funstsu, K. Tanaka, K. Kyuma "Artificial retina chips as on-chip image processors and gesture-oriented interfaces", Optical Engineering, December, 1999, Vol. 38, Number 12, ISSN 0091-3286)

Also, disclosed herein is a system to identify, locate and monitor occupants, including their parts, and other objects in the compartment and objects outside of a vehicle, such as an automobile, container or truck, by illuminating the contents of the vehicle and/or objects outside of the vehicle with electromagnetic radiation, and preferably infrared radiation, using natural illumination such as from the sun, or using radiation naturally emanating from the object, and using one or more lenses to focus images of the contents onto one or more arrays of charge coupled devices (CCD's), CMOS or equivalent arrays. Outputs from the arrays are analyzed by appropriate computational devices employing trained pattern recognition technologies, to classify, identify or locate the contents and/or external objects. In general, the information obtained by the identification and monitoring system may be used to affect the operation of at least one other system in the vehicle.

In some implementations of the invention, several CCD, CMOS or equivalent arrays are placed such that the distance from, and the motion of the occupant toward, the airbag can be monitored as a transverse motion across the field of the array. In this manner, the need to measure the distance from the array to the object is obviated. In other implementations, the source of infrared light is a pulse-modulated laser which permits an accurate measurement of the distance to the point of reflection through the technique of range gating to measure the time of flight of the radiation pulse.

In some applications, a trained pattern recognition system, such as a neural network, sensor fusion or neural-fuzzy system is used to identify the occupancy of the vehicle or an object exterior to the vehicle. In some of these cases, the pattern recognition system determines which of a library of images most closely matches the seated state of a particular vehicle seat and thereby the location of certain parts of an occupant can be accurately estimated from stored data relating to the matched images, thus removing the requirement for the pattern recognition system to locate the head of an occupant, for example.

In yet another embodiment of the invention, the system for determining the occupancy state of a seat in a vehicle includes a plurality of transducers including at least two wave-receiving or electric field transducers arranged in the vehicle, each providing data relating to the occupancy state of the seat. One wave-receiving or electric field transducer is arranged on or adjacent to a ceiling of the vehicle and a second wave-receiving or electric field transducer is arranged at a different location in the vehicle such that an axis connecting these transducers is substantially parallel to a longitudinal axis of the vehicle, substantially parallel to a transverse axis of the vehicle or passes through a volume above the seat. A processor is coupled to the transducers for receiving data from the transducers and processing the data to obtain an output indicative of the current occupancy state of the seat. The processor comprises an algorithm which produces the output indicative of the current occupancy state of the seat upon inputting a data set representing the current occupancy state of the seat and being formed from data from the transducers.

Another measuring position arrangement comprises a light source capable of directing individual pulses of light, preferably infrared, into the environment, at least one array of light-receiving pixels arranged to receive light after reflection by any objects in the environment and a processor for determining the distance between any objects from which any pulse of light is reflected and the light source based on a difference in time between the emission of a pulse of light by the light source and the reception of light by the array. The light source can be arranged at various locations in the vehicle as described above to direct light into external and/or internal environments, relative to the vehicle.

The portion of the apparatus which includes the ultrasonic, optical or electromagnetic sensors, weight measuring unit and processor which evaluate the occupancy of the seat based on the measured weight of the seat and its contents and the returned waves from the ultrasonic, optical or electromagnetic sensors, may be considered to constitute a seated-state detecting unit. The seated-state detecting unit may further comprise a seat track position-detecting sensor. This sensor determines the position of the seat on the seat track in the forward and aft direction. In this case, the evaluation circuit evaluates the seated-state, based on a correlation function obtain from outputs of the ultrasonic sensors, an output of the weight sensor(s), and an output of the seat track position detecting sensor. With this structure, there is the advantage that the identification between the flat configuration of a detected surface in a state where a passenger is not sitting in the seat and the flat configuration of a detected surface which is detected when a seat is slid backwards by the amount of the thickness of a passenger, that is, of identification of whether a passenger seat is vacant or occupied by a passenger, can be reliably performed. Furthermore, the seated-state detecting unit may also comprise a reclining angle detecting sensor, and the evaluation circuit may also evaluate the seated-state based on a correlation function obtained from outputs of the ultrasonic, optical or electromagnetic sensors, an output of the weight sensor(s), and an output of the reclining angle detecting sensor. In this case, if the tilted angle information of the back portion of the seat is added as evaluation information for the seated-state, identification can be clearly performed between the flat configuration of a surface detected when a passenger is in a slightly slouching state and the configuration of a surface detected when the back portion of a seat is slightly tilted forward and similar difficult-to-discriminate cases.

This embodiment may even be combined with the output from a seat track position-detecting sensor to further enhance the evaluation circuit. Moreover, the seated-state detecting unit may comprise a comparison circuit for comparing the output of the weight sensor(s) with a reference value. In this case, the evaluation circuit identifies an adult and a child based on the reference value. Preferably, the seated-state detecting unit comprises: a plurality of ultrasonic, optical or electromagnetic sensors for transmitting ultrasonic or electromagnetic waves toward a seat and receiving reflected waves from the seat; one or more pressure or weight sensors for detecting seat pressure applied by or weight of a passenger in the seat; a seat track position detecting sensor; a reclining angle detecting sensor; and a neural network to which outputs of the ultrasonic or electromagnetic sensors and the pressure or weight sensor(s), an output of the seat track position detecting sensor, and an output of the reclining angle detecting sensor are inputted and which evaluates several kinds of seated-states, based on a correlation function obtained from the outputs. The kinds of seated-states that can be evaluated and categorized by the neural network include the following categories, among others, (i) a normally seated passenger and a forward facing child seat, (ii) an abnormally seated passenger and a rear-facing child seat, and (iii) a vacant seat. The seated-state detecting unit may further comprise a comparison circuit for comparing the output of the seat pressure or weight sensor(s) with a reference value and a gate circuit to which the evaluation signal and a comparison signal from the comparison circuit are input. This gate circuit, which may be implemented in software or hardware, outputs signals which evaluate several kinds of seated-states. These kinds of seated-states can include a (i) normally seated passenger, (ii) a forward facing child seat, (iii) an abnormally seated passenger, (iv) a rear facing child seat, and (v) a vacant seat. With this arrangement, the identification between a normally seated passenger and a forward facing child seat, the identification between an abnormally seated passenger and a rear facing child seat, and the identification of a vacant seat can be more reliably performed. The outputs of the plurality of ultrasonic or electromagnetic sensors, the output of the seat pressure or weight sensor(s), the outputs of the seat track position detecting sensor, and the outputs of the reclining angle detecting sensor are inputted to the neural network or other pattern recognition circuit, and the neural network determines the correlation function, based on training thereof during a training phase. The correlation function is then typically implemented in or incorporated into a microcomputer. For the purposes herein, neural network will be used to include both a single neural network, a plurality of neural networks, and other similar pattern recognition circuits or algorithms and combinations thereof including the combination of neural networks and fuzzy logic systems such as neural-fuzzy systems. To provide the input from the ultrasonic or electromagnetic sensors to the neural network, it is preferable that an initial reflected wave portion and a last reflected wave portion are removed from each of the reflected waves of the ultrasonic or electromagnetic sensors and then the output data is processed. This is a form of range gating. With this arrangement, the portions of the reflected ultrasonic or electromagnetic wave that do not contain useful information are removed from the analysis and the presence and recognition of an object on the passenger seat can be more accurately performed. The neural network determines the correlation function by performing a weighting process, based on output data from the plurality of ultrasonic or electromagnetic sensors, output data from the seat pressure or weight sensor(s), output data from the seat track position detecting sensor if present, and/or on output data from the reclining angle detecting sensor if present. Additionally, in advanced systems, outputs from the heartbeat and occupant motion sensors may be included.

With this arrangement, the portions of the reflected ultrasonic wave that do not contain useful information are removed from the analysis and the presence and recognition of an object on the passenger seat can be more accurately performed. Similar data pruning can take place with electromagnetic sensors on both a temporal or spatial basis.

One method described herein for determining the identification and position of objects in a passenger compartment of a vehicle in accordance with at least one invention herein comprises the steps of transmitting electromagnetic waves (optical or non-optical) into the passenger compartment from one or more locations, obtaining a plurality of images of the interior of the passenger compartment from several locations, and comparing the images of the interior of the passenger compartment with stored images representing different arrangements of objects in the passenger compartment, such as by using a neural network, to determine which of the stored images match most closely to the images of the interior of the passenger compartment such that the identification of the objects and their position is obtained based on data associated with the stored images. The electromagnetic waves may be transmitted from transmitter/receiver assemblies positioned at different locations around a seat such that each assembly is situated near a middle of a side of the ceiling surrounding the seat or near the middle of the headliner directly above the seat. The method would thus be operative to determine the identification and/or position of the occupants of that seat. Each assembly may comprise an optical transmitter (such as an infrared LED, an infrared LED with a diverging lens, a laser with a diverging lens and a scanning laser assembly) and an optical array (such as a CCD array and a CMOS array). The optical array is thus arranged to obtain the images of the interior of the passenger compartment represented by a matrix of pixels.

To enhance the method, prior to the comparison of the images, each obtained image or output from each array may be compared with a series of stored images or arrays representing different unoccupied states of the passenger compartment, such as different positions of the seat when unoccupied, and each stored image or array is subtracted from the obtained image or acquired array. Another way to determine which stored image matches most closely to the images of the interior of the passenger compartment is to analyze the total number of pixels of the image reduced below a threshold level, and analyze the minimum number of remaining detached pixels. Preferably, a library of stored images is generated by positioning an object on the seat, transmitting electromagnetic waves into the passenger compartment from one or more locations, obtaining images of the interior of the passenger compartment, each from a respective location, associating the images with the identification and position of the object, and repeating the positioning step, transmitting step, image obtaining step and associating step for the same object in different positions and for different objects in different positions. If the objects include a steering wheel, a seat and a headrest, the angle of the steering wheel, the telescoping position of the steering wheel, the angle of the back of the seat, the position of the headrest and the position of the seat may be obtained by the image comparison.

One advantage of this implementation is that after the identification and position of the objects are obtained, one or more systems in the vehicle, such as an occupant restraint device or system, a mirror adjustment system, a seat adjustment system, a steering wheel adjustment system, a pedal adjustment system, a headrest positioning system, a directional microphone, an air-conditioning/heating system, an entertainment system, may be affected based on the obtained identification and position of at least one of the objects.

The image comparison may entail inputting the images or a form thereof, or features extracted therefrom such as edges, into a neural network which provides for each image of the interior of the passenger compartment, an index of a stored image that most closely matches the image of the interior of the passenger compartment. The index is thus utilized to locate stored information from the matched image including, inter alia, a locus of a point representative of the position of the chest of the person, a locus of a point representative of the position of the head of the person, one or both ears of the person, one or both eyes of the person and the mouth of the person. Moreover, the position of the person relative to at least one airbag or other occupant restraint system of the vehicle may be determined so that deployment of the airbag(s) or occupant restraint system is controlled based on the determined position of the person. It is also possible to obtain information about the location of the eyes of the person from the image comparison and adjust the position of one or more of the rear view mirrors based on the location of the eyes of the person. Also, the location of the eyes of the person may be obtained such that an external light source may be filtered by darkening the windshield, or a transparent visor, of the vehicle at selective locations based on the location of the eyes of the person. Further, the location of the ears of the person may be obtained such that a noise cancellation system in the vehicle is operated based on the location the ears of the person. The location of the mouth of the person may be used to direct a directional microphone in the vehicle. In addition, the location of the locus of a point representative of the position of the chest or head (e.g., the probable center of the chest or head) over time may be monitored by the image comparison and one or more systems in the vehicle controlled based on changes in the location of the locus of the center of the chest or head over time. This monitoring may entail subtracting a most recently obtained image from an immediately preceding image and analyzing a leading edge of changes in the images or deriving a correlation function which correlates the images with the chest or head in an initial position with the most recently obtained images. In one particularly advantageous embodiment, the pressure or weight applied onto the seat is measured and one or more systems in the vehicle are affected (controlled) based on the measured pressure or weight applied onto the seat and the identification and position of the objects in the passenger compartment.

Also disclosed herein is an arrangement for determining vehicle occupant position relative to a fixed structure within the vehicle which comprises an array structured and arranged to receive an image of a portion of the passenger compartment of the vehicle in which the occupant is likely to be situated, a lens arranged between the array and the portion of the passenger compartment, an adjustment unit for changing the image received by the array, and a processor coupled to the array and the adjustment unit. The processor determines, upon changing by the adjustment unit of the image received by the array, when the image is clearest whereby a distance between the occupant and the fixed structure is obtainable based on the determination by the processor when the image is clearest. The image may be changed by adjusting the lens, e.g., adjusting the focal length of the lens and/or the position of the lens relative to the array, by adjusting the array, e.g., the position of the array relative to the lens, and/or by using software to perform a focusing process. The array may be arranged in several advantageous locations on the vehicle, e.g., on an A-pillar of the vehicle, above a top surface of an instrument panel of the vehicle and on an instrument panel of the vehicle and oriented to receive an image reflected by a windshield of the vehicle. The array may be a CCD array with an optional liquid crystal or electrochromic glass filter coupled to the array for filtering the image of the portion of the passenger compartment. The array could also be a CMOS array. In a preferred embodiment, the processor is coupled to an occupant protection device and controls the occupant protection device based on the distance between the occupant and the fixed structure. For example, the occupant protection device could be an airbag whereby deployment of the airbag is controlled by the processor. The processor may be any type of data processing unit such as a microprocessor. This arrangement could be adapted for determining distance between the vehicle and exterior objects, in particular, objects in a blind spot of the driver. In this case, such an arrangement would comprise an array structured and arranged to receive an image of an exterior environment surrounding the vehicle containing at least one object, a lens arranged between the array and the exterior environment, an adjustment unit for changing the image received by the array, and a processor coupled to the array and the adjustment unit. The processor determines, upon changing by the adjustment unit of the image received by the array, when the image is clearest whereby a distance between the object and the vehicle is obtainable based on the determination by the processor when the image is clearest. As before, the image may be changed by adjusting the lens, e.g., adjusting the focal length of the lens and/or the position of the lens relative to the array, by adjusting the array, e.g., the position of the array relative to the lens, and/or by using software to perform a focusing process. The array may be a CCD array with an optional liquid crystal or electrochromic glass filter coupled to the array for filtering the image of the portion of the passenger compartment. The array could also be a CMOS array. In a preferred embodiment, the processor is coupled to an occupant protection device and control the occupant protection device based on the distance between the occupant and the fixed structure. For example, the occupant protection device could be an airbag whereby deployment of the airbag is controlled by the processor. The processor may be any type of data processing unit such as a microprocessor.

At least one of the above-listed objects is achieved by an arrangement for determining vehicle occupant presence, type and/or position relative to a fixed structure within the vehicle, the vehicle having a front seat and an A-pillar. The arrangement comprises a first array mounted on the A-pillar of the vehicle and arranged to receive an image of a portion of the passenger compartment in which the occupant is likely to be situated, and a processor coupled to the first array for determining the presence, type and/or position of the vehicle occupant based on the image of the portion of the passenger compartment received by the first array. The processor preferably is arranged to utilize a pattern recognition technique, e.g., a trained neural network, sensor fusion, fuzzy logic. The processor can determine the vehicle occupant presence, type and/or position based on the image of the portion of the passenger compartment received by the first array. In some embodiments, a second array is arranged to receive an image of at least a part of the same portion of the passenger compartment as the first array. The processor is coupled to the second array and determines the vehicle occupant presence, type and/or position based on the images of the portion of the passenger compartment received by the first and second arrays. The second array may be arranged at a central portion of a headliner of the vehicle between sides of the vehicle. The determination of the occupant presence, type and/or position can be used in conjunction with a reactive component, system or subsystem so that the processor controls the reactive component, system or subsystem based on the determination of the occupant presence, type and/or position. For example, if the reactive component, system or subsystem is an airbag assembly including at least one airbag, the processor controls one or more deployment parameters of the airbag(s). The arrays may be CCD arrays with an optional liquid crystal or electrochromic glass filter coupled to the array for filtering the image of the portion of the passenger compartment. The arrays could also be CMOS arrays, active pixel cameras and HDRC cameras. In some cases only the second headliner mounted array is used.

Another embodiment disclosed herein is an arrangement for obtaining information about a vehicle occupant within the vehicle which comprises a transmission unit for transmitting a structured pattern of light, e.g., polarized light, a geometric pattern of dots, lines etc., into a portion of the passenger compartment in which the occupant is likely to be situated, an array arranged to receive an image of the portion of the passenger compartment, and a processor coupled to the array for analyzing the image of the portion of the passenger compartment to obtain information about the occupant. The transmission unit and array are proximate but not co-located one another and the information obtained about the occupant is a distance from the location of the transmission unit and the array. The processor obtains the information about the occupant utilizing a pattern recognition technique. The information about of the occupant can be used in conjunction with a reactive component, system or subsystem so that the processor controls the reactive component, system or subsystem based on the determination of the occupant presence, type and/or position. For example, if the reactive component, system or subsystem is an airbag assembly including at least one airbag, the processor controls one or more deployment parameters of the airbag(s).

Also disclosed herein is a system for determining occupancy of a vehicle which comprises a radar system for emitting radio waves into an interior of the vehicle in which objects might be situated and receiving radio waves and a processor coupled to the radar system for determining the presence of any repetitive motions indicative of a living occupant in the vehicle based on the radio waves received by the radar system such that the presence of living occupants in the vehicle is ascertainable upon the determination of the presence of repetitive motions indicative of a living occupant. Repetitive motions indicative of a living occupant may be a heartbeat or breathing as reflected by movement of the chest. Thus, for example, the processor may be programmed to analyze the frequency of the repetitive motions based on the radio waves received by the radar system whereby a frequency in a predetermined range is indicative of a heartbeat or breathing. The vehicle may be an ambulance. The processor could also be designed to analyze motion only at particular locations in the vehicle in which a chest of any occupants would be located whereby motion at the particular locations is indicative of a heartbeat or breathing. Enhancements of the invention include the provision of a unit for determining locations of the chest of any occupants whereby the radar system is adjusted based on the determined location of the chest of any occupants. The radar system may be a micropower impulse radar system which monitors motion at a set distance from the radar system, i.e., utilizes range-gating techniques. The radar system can be positioned to emit radio waves into a passenger compartment or trunk of the vehicle and/or toward a seat of the vehicle such that the processor determines whether the seats are occupied by living beings. Another enhancement would be to couple a reactive system to the processor for reacting to the determination by the processor of the presence of any repetitive motions. Such a reactive system might be an air connection device for providing or enabling air flow between the interior of the vehicle and the surrounding environment, if the presence of living beings is detected in a closed interior space. The reactive system could also be a security system for providing a warning. In one particularly useful embodiment, the radar system emits radio waves into a trunk of the vehicle and the reactive system is a trunk release for opening the trunk. The reactive system could also be airbag system which is controlled based on the determined presence of repetitive motions in the vehicle and a window opening system for opening a window associated with the passenger compartment.

A method for determining occupancy of the vehicle disclosed herein comprises the steps of emitting radio waves into an interior of the vehicle in which objects might be situated, receiving radio waves after interaction with any objects and determining the presence of any repetitive motions indicative of a living occupant in the vehicle based on the received radio waves such that the presence of living occupants in the vehicle is ascertainable upon the determination of the presence of repetitive motions indicative of a living occupant. Determining the presence of any repetitive motions can entail analyzing the frequency of the repetitive motions based on the received radio waves whereby a frequency in a predetermined range is indicative of a heartbeat or breathing and/or analyzing motion only at particular locations in the vehicle in which a chest of any occupants would be located whereby motion at the particular locations is indicative of a heartbeat or breathing. If the locations of the chest of any occupants are determined, the emission of radio waves can be adjusted based thereon. A radio wave emitter and receiver can be arranged to emit radio waves into a passenger compartment of the vehicle. Upon a determination of the presence of any occupants in the vehicle, air flow between the interior of the vehicle and the surrounding environment can be enabled or provided. A warning can also be provided upon a determination of the presence of any occupants in the vehicle. If the radio wave emitter and receiver emit radio waves into a trunk of the vehicle, the trunk can be designed to automatically open upon a determination of the presence of any occupants in the trunk to thereby prevent children or pets from suffocating if inadvertently left in the trunk. In a similar manner, if the radio wave emitter and receiver emits radio waves into a passenger compartment of the vehicle, a window associated with the passenger compartment can be automatically opened upon a determination of the presence of any occupants in the passenger compartment to thereby prevent people or pets from suffocating if the temperature of the air in the passenger compartment rises to an dangerous level.

Also disclosed herein is a vehicle including a monitoring arrangement for monitoring an environment of the vehicle which comprises at least one active pixel camera for obtaining images of the environment of the vehicle and a processor coupled to the active pixel camera(s) for determining at least one characteristic of an object in the environment based on the images obtained by the active pixel camera(s). The active pixel camera can be arranged in a headliner, roof or ceiling of the vehicle to obtain images of an interior environment of the vehicle, in an A-pillar or B-pillar of the vehicle to obtain images of an interior environment of the vehicle, or in a roof, ceiling, B-pillar or C-pillar of the vehicle to obtain images of an interior environment of the vehicle behind a front seat of the vehicle. These mounting locations are exemplary only and not limiting.

The determined characteristic can be used to enable optimal control of a reactive component, system or subsystem coupled to the processor. When the reactive component is an airbag assembly including at least one airbag, the processor can be designed to control at least one deployment parameter of the airbag(s).

One embodiment of a seated-state detecting unit and method for ascertaining the identity of an object in a seat in a passenger compartment of a vehicle in accordance with the invention comprises a wave-receiving sensor arranged to receive waves from a space above the seat and generate an output representative of the received waves, pressure or weight measuring means associated with the seat for measuring the pressure weight applied onto the seat (such as described herein) and generating an output representative of the measured pressure or weight applied onto the seat, and processor means for receiving the outputs from the wave-receiving sensor and the pressure or weight measuring means and for evaluating the seated-state of the seat based thereon to determine whether the seat is occupied by an object and when the seat is occupied by an object, to ascertain the identity of the object in the seat based on the outputs from the wave-receiving sensor and the weight measuring means. If necessary depending on the type of wave-receiving sensor, waves are transmitted into the passenger compartment toward the seat to enable reception of the same by the wave-receiving sensor. The wave-receiving sensor may be an ultrasonic sensor structured and arranged to receive ultrasonic waves, an electromagnetic sensor structured and arranged to receive electromagnetic waves or a capacitive or electric field sensor for generating an output representative of the object based on the object's dielectric properties. The processor means may comprise a microcomputer into which a function correlating the outputs from the wave-receiving sensor and the pressure or weight measuring means and the seated-state of the seat is incorporated or a neural network which generates a function correlating the outputs from the wave-receiving sensor and the pressure or weight measuring means and the seated-state of the seat and executes the function using the outputs from the wave-receiving sensor and the pressure or weight measuring means as input to determine the seated-state of the seat.

Additional sensors may be provided to enhance the procedure for ascertaining the identity of the object. Such sensors, e.g., a seat position detecting sensor, reclining angle detecting sensor, heartbeat or other animal life state sensor, motion sensor, etc., provide output directly or indirectly related to the object which is considered by the processor means when evaluating the seated-state of the seat.

The pressure or weight measuring means may comprise one or more pressure or weight sensors such as strain gage bases sensors, possibly arranged in connection with the seat, for measuring the force or pressure applied onto at least a portion of the seat. In the alternative, a bladder having at least one chamber may be arranged in a seat portion of the seat for measuring the force or pressure applied onto at least a portion of the seat.

The sensor system may comprise an array of occupant proximity sensors, each sensing distance from the occupant to that proximity sensor. The microprocessor determines the occupant's position by determining each distance and triangulating the distances from the occupant to each proximity sensor. The microprocessor includes memory in which the positions of the occupant over some interval of time are stored. The sensor system may be particularly sensitive to the position of the head of the passenger. As to the position of the sensor system, it may be arranged on the rear view mirror assembly, on the roof, on a windshield header of the vehicle, positioned to be operative rearward and/or at a front of the passenger compartment.

Another arrangement disclosed herein for determining the position of an occupant of a vehicle situated on a seat in the vehicle comprises occupant position sensing means for obtaining a first approximation of the position of the occupant, and confirmatory position sensing means for obtaining a second approximation of the position of the occupant such that a likely actual position of the occupant is reliably determinable from the first and second approximations. The confirmatory position sensing means are arranged to measure the position of the seat and/or a part thereof relative to a fixed point of reference and the length of a seatbelt pulled out of a seatbelt retractor. For example, the confirmatory position sensing means can be one or more sensors arranged to measure the position of a seat portion of the seat, the position of a back portion of the seat and the length of the seatbelt pulled out of the seatbelt retractor.

Furthermore, also disclosed herein is an apparatus for evaluating occupancy of a seat comprising emitter means for emitting electromagnetic radiation (e.g., visible light or infrared radiation (also referred to as infrared light herein)) into a space above the seat, detector means for detecting the emitted electromagnetic radiation returning from the direction of the seat, and processor means coupled to the detector means for determining the presence of an occupying item of the seat based on the electromagnetic radiation detected by the detector means, and if an occupying item is present, distinguishing between different occupying items to thereby obtain information about the occupancy of the seat. The processor means can also be arranged to determine the position of an occupying item if present and/or the position of only a part of an occupying item if present. In the latter case, if the occupying item is a human occupant, the part of the occupant whose position is determined by the processor means can be, e.g., the head of the occupant and the chest of the occupant. The detector means may comprise a plurality of detectors, e.g., receiver arrays such as CCD arrays or CMOS arrays, and the position of the part of the occupant determined by triangulation. In additional embodiments, the processor means can comprise pattern recognition means for applying an algorithm derived by conducting tests on the electromagnetic radiation detected by the detector means in the absence of an occupying item of the seat and in the presence of different occupying items. The emitter means may be arranged to emit a plurality of narrow beams of electromagnetic radiation, each in a different direction or include an emitter structured and arranged to scan through the space above the seat by emitting a single beam of electromagnetic radiation in one direction and changing the direction in which the beam of electromagnetic radiation is emitted. Either pulsed electromagnetic radiation or continuous electromagnetic radiation may be emitted. Further, if infrared radiation is emitted, the detector means are structured and arranged to detect infrared radiation. It is possible that the emitter means are arranged such that the infrared radiation emitted by the emitter means travels in a first direction toward a windshield of a vehicle in which the seat is situated, reflects off of the windshield and then travels in a second direction toward the space above the seat. The detector means may comprise an array of focused receivers such that an image of the occupying item if present is obtained. Possible locations of the emitter means and detector means include proximate or attached to a rear view mirror assembly of a vehicle in which the seat is situated, attached to the roof or headliner of a vehicle in which the seat is situated, arranged on a steering wheel of a vehicle in which the seat is situated and arranged on an instrument panel of the vehicle in which the seat is situated. The apparatus may also comprise determining means for determining whether the occupying item is a human being whereby the processor means are coupled to the determining means and arranged to consider the determination by the determining means as to whether the occupying item is a human being. For example, the determining means may comprise a passive infrared sensor for receiving infrared radiation emanating from the space above the seat or a motion or life sensor (e.g. a heartbeat sensor).

An embodiment of the vehicle occupant position and velocity sensor disclosed herein comprises ultrasonic sensor means for determining the relative position and velocity of the occupant within the motor vehicle, attachment means for attaching the sensor means to the motor vehicle, and response means coupled to the sensor means for responding to the determined relative position and velocity of the occupant. The ultrasonic sensor means may comprise at least one ultrasonic transmitter which transmits ultrasonic waves into a passenger compartment of the vehicle, at least one ultrasonic receiver which receives ultrasonic waves transmitted from the ultrasonic transmitter(s) after they have been reflected off of the occupant, position determining means for determining the position of the occupant by measuring the time for the ultrasonic waves to travel from the transmitter(s) to the receiver(s), and velocity determining means for determining the velocity of the occupant, for example, by measuring the frequency difference between the transmitted and the received waves. Further, the ultrasonic sensor means may be structured and arranged to determine the position and velocity of the occupant at a frequency exceeding that determined by the formula: the velocity of sound divided by two times the distance from the sensor means to the occupant. In addition, the ultrasonic sensor means may comprise at least one transmitter for transmitting a group of ultrasonic waves toward the occupant, at least one receiver for receiving at least some of the group of transmitted ultrasonic waves after reflection off of the occupant, the at least some of the group of transmitted ultrasonic waves constituting a group of received ultrasonic waves, measurement means for measuring a time delay between the time that the group of waves were transmitted by the at least one transmitter and the time that the group of waves were received by the at least one receiver, determining means for determining the position of the occupant based on the time delay between transmission of the group of transmitted ultrasonic waves and reception of the group of received ultrasonic waves, and velocity detector means for determining the velocity of the occupant, e.g., a passive infrared detector.

Also disclosed herein is an occupant head position sensor in accordance with the invention may comprise wave generator means arranged in the vehicle for directing waves toward a location in which a head of the occupant is situated, receiver means for receiving the waves reflected from the occupant's head, pattern recognition means coupled to the receiver means for receiving for determining the position of the occupant's head based on the waves reflected from the occupant's head and response means for responding to changes in the position of the occupant's head. The response means may comprise an alarm and/or limiting means for limiting the speed of the vehicle.

Other disclosed inventions include an arrangement in a vehicle for identifying an occupying item which comprises means for obtaining information or data about the occupying item and a pattern recognition system for receiving the information or data about the occupying item and analyzing the information or data about the occupying item with respect to size, position, shape and/or motion to determine what the occupying item is whereby a distinction can be made as to whether the occupying item is human or an inanimate object. The analysis with respect to size includes analysis with respect to changes in size, the analysis with respect to shape includes analysis with respect to changes in shape and the analysis with respect to position includes analysis with respect to changes in position. The means for obtaining information or data may comprise one or more receiver arrays (CCD's or CMOS arrays) which convert light, including infrared and ultraviolet radiation, into electrical signals such that the information or data about the occupying item is in the form of one or more electrical signals representative of an image of the occupying item. If two receiver arrays are used, they could be mounted one on each side of a steering wheel of the vehicle or the module in the case of a passenger airbag system. In the alternative, the means for obtaining information or data may comprise a single axis phase array antenna such that the information or data about the occupying item is in the form of an electrical signal representative of an image of the occupying item. A scanning radar beam and/or an array of light beams would also be preferably provided.

The arrangement could include means for obtaining information or data about the position and/or motion of the occupying item and a pattern recognition system for receiving the information or data about the position and/or motion of the occupying item and analyzing the information or data to determine what the occupying item is whereby a distinction can be made as to whether the occupying item is an occupant or an inanimate object based on its position and/or motion.

Disclosed herein is also a method for identifying an occupying item of a vehicle which comprises the steps of obtaining information or data about the occupying item, providing the information or data about the occupying item to a pattern recognition system, and determining what the occupying item is by analyzing the information or data about the occupying item with respect to size, position, shape and/or motion in the pattern recognition system whereby the pattern recognition system differentiates a human occupant from inanimate objects.

Another disclosed method for identifying an occupying item of a vehicle comprises the steps of obtaining information or data about the position and/or motion of the occupying item, providing the information or data about the position of the occupying item to a pattern recognition system, and determining what the occupying item is by analyzing the information or data about the position of the occupying item in the pattern recognition system whereby the pattern recognition system differentiates a human occupant from inanimate objects.

Acquisition of data may be from a plurality of sensors arranged in the vehicle, each providing data relating to the occupancy state of the seat. Possible sensors include a camera, an ultrasonic sensor, a capacitive sensor or other electric or magnetic field monitoring sensor, a weight or other morphological characteristic detecting sensor and a seat position sensor. Further sensors include an electromagnetic wave sensor, an electric field sensor, a seat belt buckle sensor, a seatbelt payout sensor, an infrared sensor, an inductive sensor, a radar sensor, a pressure or weight distribution sensor, a reclining angle detecting sensor for detecting a tilt angle of the seat between a back portion of the seat and a seat portion of the seat, and a heartbeat sensor for sensing a heartbeat of the occupant.

Classification of the type of occupant and the size of the occupant may be performed by a combination neural network created from a plurality of data sets, each data set representing a different occupancy state of the seat and being formed from data from the at least one sensor while the seat is in that occupancy state.

A feedback loop may be used in which a previous determination of the position of the occupant is provided to the algorithm for determining a current position of the occupant.

Adjustment of deployment of the occupant protection device when the occupant is classified as an empty seat or a rear-facing child seat may entail a depowered deployment, an oriented deployment and/or a late deployment.

A gating function may be incorporated into the method whereby it is determined whether the acquired data is compatible with data for classification of the type or size of the occupant and when the acquired data is not compatible with the data for classification of the type or size of the occupant, the acquired data is rejected and new data is acquired.

15.2 Control of Passive Restraints

In order to achieve one or more of the above-listed objects, a method for controlling deployment of an airbag comprises the steps of determining the position of an occupant to be protected by deployment of the airbag, assessing the probability that a crash requiring deployment of the airbag is occurring and enabling deployment of the airbag in consideration of the determined position of the occupant and the assessed probability that a crash is occurring. Deployment of the airbag may be enabled by analyzing the assessed probability relative to a pre-determined threshold whereby deployment of the airbag is enabled only when the assessed probability is greater than the threshold. The threshold may be adjusted based on the determined position of the occupant.

The position of the occupant may be determined in various ways including by receiving and analyzing waves from a space in a passenger compartment of the vehicle occupied by the occupant, transmitting waves to impact the occupant, receiving waves after impact with the occupant and measuring time between transmission and reception of the waves, obtaining two or three-dimensional images of a passenger compartment of the vehicle occupied by the occupant and analyzing the images with an optional focusing of the images prior to analysis, or by moving a beam of radiation through a passenger compartment of the vehicle occupied by the occupant. The waves may be ultrasonic, radar, electromagnetic, passive infrared, and the like, and capacitive in nature. In the latter case, a capacitance or capacitive sensor may be provided. An electric field sensor could also be used.

Deployment of the airbag can be disabled when the determined position is too close to the airbag.

The rate at which the airbag is inflated and/or the time in which the airbag is inflated may be determined based on the determined position of the occupant.

Another method for controlling deployment of an airbag comprises the steps of determining the position of an occupant to be protected by deployment of the airbag and adjusting a threshold used in a sensor algorithm which enables or suppresses deployment of the airbag based on the determined position of the occupant. The probability that a crash requiring deployment of the airbag is occurring may be assed and analyzed relative to the threshold whereby deployment of the airbag is enabled only when the assessed probability is greater than the threshold. The position of the occupant can be determined in any of the ways mentioned herein.

A system for controlling deployment of an airbag comprises determining means for determining the position of an occupant to be protected by deployment of the airbag, sensor means for assessing the probability that a crash requiring deployment of the airbag is occurring, and circuit means coupled to the determining means, the sensor means and the airbag for enabling deployment of the airbag in consideration of the determined position of the occupant and the assessed probability that a crash is occurring. The circuit means are structured and arranged to analyze the assessed probability relative to a pre-determined threshold whereby deployment of the airbag is enabled only when the assessed probability is greater than the threshold. Further, the circuit means are arranged to adjust the threshold based on the determined position of the occupant. The determining means may any of the determining systems discussed herein.

Another system for controlling deployment of an airbag comprises a crash sensor for providing information on a crash involving the vehicle, a position determining arrangement for determining the position of an occupant to be protected by deployment of the airbag and a circuit coupled to the airbag, the crash sensor and the position determining arrangement and arranged to issue a deployment signal to the airbag to cause deployment of the airbag. The circuit is arranged to consider a deployment threshold which varies based on the determined position of the occupant. Further, the circuit is arranged to assess the probability that a crash requiring deployment of the airbag is occurring and analyze the assessed probability relative to the threshold whereby deployment of the airbag is enabled only when the assessed probability is greater than the threshold.

A method for controlling deployment of an occupant restraint device based on the position of an object in a passenger compartment of a vehicle in accordance with the invention comprises the steps of mounting a plurality of wave-emitting and receiving transducers on the vehicle, each transducer being arranged to transmit and receive waves at a different frequency, controlling the transducers to simultaneously transmit waves at the different frequencies into the passenger compartment, determining whether the object is of a type requiring deployment of the occupant restraint device in the event of a crash involving the vehicle based on the waves received by at least some of the transducers after being modified by passing through the passenger compartment, and if so, determining whether the position of the object relative to the occupant restraint device would cause injury to the object upon deployment of the occupant restraint device based on the waves received by at least some of the transducers. The object may also be identified based on the waves received by at least some of the transducers after being modified by passing through the passenger compartment.

The determination of whether the object is of a type requiring deployment of the occupant restraint device may involve training a first neural network on signals from at least some of the transducers representative of waves received by the transducers when different objects are situated in the passenger compartment. The determination of whether the position of the object relative to the occupant restraint device would cause injury to the object upon deployment of the occupant restraint device may entail training a second neural network on signals from at least some of the transducers when different objects in different positions are situated in the passenger compartment.

In another method disclosed herein for determining the identification and position of objects in a passenger compartment of a vehicle, a plurality of images of the interior of the passenger compartment, each from a respective location and of radiation emanating from the objects in the passenger compartment, and the images of the radiation emanating from the objects in the passenger compartment are compared with data representative of stored images of radiation emanating from different arrangements of objects in the passenger compartment to determine which of the stored images match most closely to the images of the interior of the passenger compartment such that the identification of the objects and their position is obtained based on data associated with the stored images. In this embodiment, there is no illumination of the passenger compartment with electromagnetic waves. Nevertheless, the same processes described herein may be applied in conjunction with this method, e.g., affecting another system based on the position and identification of the objects, a library of stored images generated, external light source filtering, noise filtering, occupant restraint system deployment control and the possible utilization of weight for occupant restraint system control.

Another embodiment of an airbag control system comprises a sensor system mounted adjacent to or on an interior roof of the vehicle and a microprocessor connected to the sensor system and to an inflator of the air bag. The sensor system senses the position of the occupant with respect to the passenger compartment of the vehicle and generates output indicative of the position of the occupant. The microprocessor compares and performs an analysis of the output from the sensor system and activates the inflator to inflate the air bag when the analysis indicates that the vehicle is involved in a collision and deployment of the air bag is desired.

Also disclosed herein is a method of disabling an airbag system for a seating position within a motor vehicle which comprises the steps of providing to a roof above the seating position one or more electromagnetic wave occupant sensors, detecting presence or absence of an occupant of the seating position using the electromagnetic wave occupant sensor(s), disabling the airbag system if the seating position is unoccupied, detecting proximity of an occupant to the airbag door if the seating position is occupied and disabling the airbag system if the occupant is closer to the airbag door than a predetermined distance. The airbag deployment parameters, e.g., inflation rate and time of deployment, may be modified to adjust inflation of the airbag according to proximity of the occupant to the airbag door. The presence or absence of the occupant can be detected using pattern recognition techniques to process the waves received by the electromagnetic wave-occupant sensor(s).

An apparatus for disabling an airbag system for a seating position within a motor vehicle comprises one or more electromagnetic wave occupant sensors proximate a roof above the seating position, means for detecting presence or absence of an occupant of the seating position using the electromagnetic wave occupant sensor(s), means for disabling the airbag system if the seating position is unoccupied, means for detecting proximity of an occupant to the airbag door if the seating position is occupied and means for disabling the airbag system if the occupant is closer to the airbag door than a predetermined distance. Also, means for modifying airbag deployment parameters to adjust inflation of the airbag according to proximity of the occupant to the airbag door may be provided and may constitute a sensor algorithm resident in a crash sensor and diagnostic circuitry. The means for detecting presence or absence of the occupant may comprises a processor utilizing pattern recognition techniques to process the waves received by the electromagnetic wave-occupant sensor(s).

The motor vehicle air bag system for inflation and deployment of an air bag in front of a passenger in a motor vehicle during a collision in accordance with the invention comprises an air bag, inflation means connected to the airbag for inflating the same with a gas, passenger sensor means mounted adjacent to the interior roof of the vehicle for continuously sensing the position of a passenger with respect to the passenger compartment and for generating electrical output indicative of the position of the passenger and microprocessor means electrically connected to the passenger sensor means and to the inflation means. The microprocessor means compare and perform an analysis of the electrical output from the passenger sensor means and activate the inflation means to inflate and deploy the air bag when the analysis indicates that the vehicle is involved in a collision and that deployment of the air bag would likely reduce a risk of serious injury to the passenger which would exist absent deployment of the air bag and likely would not present an increased risk of injury to the passenger resulting from deployment of the air bag. In certain embodiments, the passenger sensor means is a means particularly sensitive to the position of the head of the passenger. The microprocessor means may include memory means for storing the positions of the passenger over some interval of time. The passenger sensor means may comprise an array of passenger proximity sensor means for sensing distance from a passenger to each of the passenger proximity sensor means. In this case, the microprocessor means includes means for determining passenger position by determining each of these distances and means for triangulation analysis of the distances from the passenger to each passenger proximity sensor means to determine the position of the passenger.

Thus, among the other inventions disclosed herein, is a simplified system for determining the approximate location of a vehicle occupant which may be used to control the deployment of the passive restraint. This occupant position determining system can be based on the position of the vehicle seat, the position of the seat back, the state of the seatbelt buckle switch, a seatbelt payout sensor or a combination of these. For example, in arrangements and method for determining the position of an occupant of a vehicle situated on a seat in accordance with the invention, the position of the seat and/or a part thereof is/are determined relative to a fixed point of reference to thereby enable a first approximation of the position of the occupant to be obtained, e.g., by a processor including a look-up table, algorithm or other means for correlating the position of the seat and/or part thereof to a likely position of the occupant. More particularly, the position of the seat portion of the seat and/or the back portion of the seat can be measured. If only the first approximation of the position of the occupant is obtained then this is considered the likely actual position of the occupant. However, to enhance the determination of the likely, actual position of the occupant, the length of the seatbelt pulled out of the seatbelt retractor can be measured by an appropriate sensor such that the position of the occupant is obtained in consideration of the position of the seat and the measured length of seatbelt pulled out of the seatbelt retractor. Also, a second approximation of the position of the occupant can be obtained, e.g., either by indirectly sensing the position of the occupant of the seat or by directly sensing the position of the occupant of the seat, such that the likely, actual position of the occupant is obtained in consideration of both approximations of the position of the occupant. By "directly" sensing the position of the occupant of the seat, it is meant that the position of the occupant itself is obtained by a detection of a property of the occupant without an intermediate measurement, e.g., a measurement of the position of the seat or the payout of the seatbelt, which must be correlated to the position of the occupant. Sensing the position of the occupant by taking an intermediate measurement would constitute an "indirect" sensing of the position of the occupant of the seat. The second approximation can be obtained by receiving waves from a space above the seat which are indicative of some aspect of the position of the occupant, e.g., the distance between the occupant and the receiver(s). If required, waves are transmitted into the space above the seat to be received by the receiver(s). Possible mounting locations for the transmitter and receiver(s) include proximate or attached to a rear view mirror assembly of the vehicle, attached to the roof or headliner of the vehicle, on a steering wheel of the vehicle, on an instrument panel of the vehicle and on a cover of an airbag module.

Other inventions disclosed herein are arrangements for controlling a deployable occupant restraint device in a vehicle to protect an occupant in a seat in the vehicle during a crash. Such arrangements include crash sensor means for determining whether deployment of the occupant restraint device is required as a result of the crash, an occupant position sensor arrangement for determining the position of the occupant, and processor means coupled to the crash sensor means and the occupant position sensor arrangement for controlling deployment of the occupant restraint device based on the determination by the crash sensor means if deployment of the occupant restraint device is required and the position of the occupant. The occupant position sensor arrangement includes seat position determining means for determining the position of the seat and/or a part thereof relative to a fixed point of reference to thereby enable a first approximation of the position of the occupant to be obtained. In the absence of additional approximations of the position of the occupant, the first approximation can be considered as the position of the occupant. The position of the seat and/or part thereof may be determined in any of the ways discussed herein. The occupant position sensor arrangement may include measuring means coupled to the processor means for measuring the length of the seatbelt pulled out of the seatbelt retractor such that the processor means control deployment of the occupant restraint device based on the determination by the crash sensor means if deployment of the occupant restraint device is required, the position of the occupant and the measured length of seatbelt pulled out of the seatbelt retractor. The occupant position sensor arrangement can also include means for providing an additional approximation of the position of the occupant, either a direct sensing of the position of the occupant (a measurement of a property of the occupant) or an indirect sensing (a measurement of a property of a component in the vehicle which can be correlated to the position of the occupant), such that this approximation will be used in conjunction with the first approximation to provide a better estimate of the likely, actual position of the occupant. Such means may include receiver means for receiving waves from a space above the seat and optional transmitter means for transmitting waves into the space above the seat to be received by the receiver means. Possible mounting locations for the transmitter means and receiver means include proximate or attached to a rear view mirror assembly of the vehicle, attached to the roof or headliner of the vehicle, on a steering wheel of the vehicle, on an instrument panel of the vehicle and on or proximate an occupant restraint device, e.g., on or proximate a cover of an airbag module. Other locations having a view of the space above seat are of course possible. An additional factor to consider in the deployment of the occupant restraint device is whether the seatbelt is buckled and thus in one embodiment, the occupant position sensor arrangement includes means coupled to the processor means for determining whether the seatbelt is buckled such that the processor means control deployment of the occupant restraint device based on the determination by the crash sensor means if deployment of the occupant restraint device is required, the position of the occupant and the determination of whether the seatbelt is buckled.

Another arrangement disclosed herein for controlling a deployable occupant restraint device in a vehicle to protect an occupant in a seat in the vehicle during a crash comprises crash sensor means for determining whether deployment of the occupant restraint device is required as a result of the crash, an occupant position sensor arrangement for determining the position of the occupant and processor means coupled to the crash sensor means and the occupant position sensor arrangement for controlling deployment of the occupant restraint device based on the determination by the crash sensor means if deployment of the occupant restraint device is required and the position of the occupant. The occupant position sensor arrangement includes occupant position sensing means for obtaining a first approximation of the position of the occupant, and confirmatory position sensing means for obtaining a second approximation of the position of the occupant such that the position of the occupant is reliably determinable from the first and second approximations. The confirmatory position sensing means are arranged to measure the position of the seat and/or a part thereof relative to a fixed point of reference and/or the length of a seatbelt pulled out of a seatbelt retractor. The occupant position sensor arrangement can also include means for determining whether the seatbelt is buckled in which case, the processor means control deployment of the occupant restraint device based on based on the determination by the crash sensor means if deployment of the occupant restraint device is required, the position of the occupant and the determination of whether the seatbelt is buckled.

A disclosed apparatus for controlling a deployable occupant restraint device in a vehicle to protect an occupant in a seat in the vehicle during a crash comprises emitter means for emitting electromagnetic radiation into a space above the seat, detector means for detecting the emitted electromagnetic radiation after it passes at least partially through the space above the seat, and processor means coupled to the detector means for determining the presence or absence of an occupying item of the seat based on the electromagnetic radiation detected by the detector means, if an occupying item is present, distinguishing between different occupying items to thereby obtain information about the occupancy of the seat, and affecting the deployment of the occupant restraint device based on the determined presence or absence of an occupying item and the information obtained about the occupancy of the seat. The processor means may also be arranged to determine the position of an occupying item if present and/or the distance between the occupying item if present and the occupant restraint device. In the latter case, deployment of the occupant restraint device is affected additionally based on the distance between the occupying item and the occupant restraint device. The processor means may also be arranged to determine the position of only a part of an occupying item if present, e.g., by triangulation. In additional embodiments, the processor means can comprise pattern recognition means for applying an algorithm derived by conducting tests on the electromagnetic radiation detected by the detector means in the absence of an occupying item of the seat and in the presence of different occupying items. The emitter means may be arranged to emit a plurality of narrow beams of electromagnetic radiation, each in a different direction or include an emitter structured and arranged to scan through the space above the seat by emitting a single beam of electromagnetic radiation in one direction and changing the direction in which the beam of electromagnetic radiation is emitted. Either pulsed electromagnetic radiation or continuous electromagnetic radiation may be emitted. Further, if infrared radiation is emitted, the detector means are structured and arranged to detect infrared radiation. It is possible that the emitter means are arranged such that the infrared radiation emitted by the emitter means travels in a first direction toward a windshield of a vehicle in which the seat is situated, reflects off of the windshield and then travels in a second direction toward the space above the seat. The detector means may comprise an array of focused receivers such that an image of the occupying item if present is obtained. Possible locations of the emitter means and detector means include proximate or attached to a rear view mirror assembly of a vehicle in which the seat is situated, attached to the roof or headliner of a vehicle in which the seat is situated, arranged on a steering wheel of a vehicle in which the seat is situated and arranged on an instrument panel of the vehicle in which the seat is situated. The apparatus may also comprise determining means for determining whether the occupying item is a human being whereby the processor means are coupled to the determining means and arranged to consider the determination by the determining means as to whether the occupying item is a human being. For example, the determining means may comprise a passive infrared sensor for receiving infrared radiation emanating from the space above the seat or a motion or life sensor (e.g. a heartbeat sensor). The processor means affect deployment of the occupant restraint device by suppressing deployment of the occupant restraint device, controlling the time at which deployment of the occupant restraint device starts, or controlling the rate of deployment of the occupant restraint device. If the occupant restraint device is an airbag inflatable with a gas, the processor means may affect deployment of the occupant restraint device by suppressing deployment of the airbag, controlling the time at which deployment of the airbag starts, controlling the rate of gas flow into the airbag, controlling the rate of gas flow out of the airbag or controlling the rate of deployment of the airbag.

In another invention disclosed herein, a vehicle occupant position system comprises sensor means for determining the position of the occupant in a passenger compartment of the vehicle, attachment means for attaching the sensor means to the motor vehicle; response means coupled to the sensor means for responding to the determined position of the occupant. The sensor means may comprise at least one transmitter for transmitting waves toward the occupant, at least one receiver for receiving waves which have been reflected off of the occupant and pattern recognition means for processing the waves received by the receiver(s). In some embodiments, when the vehicle includes a passive restraint system, the sensor means are arranged to determine the position of the occupant with respect to the passive restraint system, the system includes deployment means for deploying the passive restraint system and the response means comprise analysis means coupled to the sensor means and the deployment means for controlling the deployment means to deploy the passive restraint system based on the determined position of the occupant.

In yet another disclosed embodiment, the position and velocity sensor is arranged on the steering wheel or its assembly or on or in connection with the airbag module and is a wave-receiving sensor capable of receiving waves from the passenger compartment which vary depending on the distance between the sensor and an object in the passenger compartment. The sensor generates an output signal representative or corresponding to the received waves and thus which is a function of the instantaneous distance between the sensor and the object. By processing the output signal, e.g., in a processor, it is possible to determine the distance between the sensor and the object and the velocity of the object (e.g., from successive positions determinations). The sensor may be any known wave-receiving sensor includes those capable of receiving ultrasonic waves, infrared waves and electromagnetic waves. The sensor may also be a capacitance sensor which determines distance based on the capacitive coupling between one or more electrodes in the sensor and the object. According to another embodiment of the invention, a wave-generating transmitter is also mounted in the vehicle, possibly in combination with the wave-receiving sensor to thereby form a transmitter/receiver unit. The wave-generating transmitter can be designed to transmit a burst of waves which travel to the object (occupant) are modified by and/or are reflected back to and received by the wave-receiving sensor, which as noted above may be the same device as the transmitter. Both the transmitter and receiver may be mounted on the steering wheel or airbag module. The time period required for the waves to travel from the transmitter and return can be used to determine the position of the occupant (essentially the distance between the occupant and the sensor) and the frequency shift of the waves can be used to determine the velocity of the occupant relative to the airbag. Alternatively, the velocity of the occupant relative to the airbag can be determined from successive position measurements. The sensor is usually fixed in position relative to the airbag so that by determining the distance between the occupant and the sensor, it is possible to determine the distance between the airbag and the occupant. The transmitter can be any known wave propagating transmitter, such as an ultrasonic transmitter, infrared transmitter or electromagnetic-wave transmitter. In another embodiment, infrared or other electromagnetic radiation is directed toward the occupant and lenses are used to focus images of the occupant onto arrays of charge coupled devices (CCD). Outputs from the CCD arrays, are analyzed by appropriate logic circuitry, to determine the position and velocity of the occupant's head and chest. In yet another embodiment, a beam of radiation is moved back and forth across the occupant illuminating various portions of the occupant and with appropriate algorithms the position of the occupant in the seat is accurately determined. In a simple implementation, other information such as seat position and/or seatback position can be used with a buckle switch and/or seatbelt payout sensor to estimate the position of the occupant.

More particularly, an occupant position and velocity sensor system for a driver of a vehicle comprises a sensor arranged on or incorporated into the steering wheel assembly of the vehicle and which provides an output signal which varies as a function of the distance between the sensor and the driver of the vehicle such that the position of the driver can be determined relative to a fixed point in the vehicle. The sensor may be arranged on or incorporated into the steering wheel assembly. If the steering wheel assembly includes an airbag module, the sensor can be arranged in connection with the airbag module possibly in connection with the cover of the airbag module. The sensor can be arranged to receive waves (e.g., ultrasonic, infrared or electromagnetic) from the passenger compartment indicative of the distance between the driver and the sensor. If the sensor is an ultrasonic-wave-receiving sensor, it could be built to include a transmitter to transmit waves into the passenger compartment whereby the distance between the driver and the sensor is determined from the time between transmission and reception of the same waves. Alternatively, the transmitter could be separate from the wave-receiving sensor or a capacitance sensor. The sensor could also be any existing capacitance or electric field sensor. The sensor may be used to affect the operation of any component in the vehicle which would have a variable operation depending on the position of the occupant. For example, the sensor could be a part of an occupant restraint system including an airbag, crash sensor means for determining that a crash requiring deployment of the airbag is required, and control means coupled to the sensor and the crash sensor means for controlling deployment of the airbag based on the determination that a crash requiring deployment of the airbag is required and the distance between the driver and the sensor (and velocity of the driver). Since the sensor is fixed in relation to the airbag, the distance between the airbag and the driver is determinable from the distance between the sensor and the driver. The control means can suppress deployment of the airbag if the distance between the airbag and the driver is within a threshold, i.e., less than a predetermined safe deployment distance. Also, the control means could modify one or more parameters of deployment of the airbag based on the distance between the sensor and the driver, i.e., the deployment force or time. Further, successive measurements of the distance between the sensor and the driver can be obtained and the velocity of the driver determined therefrom, in which case, the control means can control deployment of the airbag based on the velocity of the driver. To avoid problems if the sensor is blocked, the occupant position sensor system may further comprises a confirming sensor arranged to provide an output signal which varies as a function of the distance between the confirming sensor and the driver of the vehicle. The output signal from this confirming sensor is used to verify the position of the driver relative to the fixed point in the vehicle as determined by the sensor. The confirming sensor can be arranged on an interior side of a roof of the vehicle or on a headliner of the vehicle.

In one preferred embodiment of the invention the space in front of the airbag that can be occupied by an occupant is divided into three zones. The deployment decision is based on taking into account the estimated severity of the crash, the identified size and or weight of the occupant, and the position of occupant or forecasted position of the occupant at the time of airbag deployment. For example, in a high severity crash, a 5% female located in the zone furthest away from the airbag, zone 3, would receive the depowered airbag deployment. On the other hand, a large heavy occupant in a similar crash and at a similar position would receive the high-powered airbag. As a further example a 50% male occupant located in the mid zone, or zone 2, would receive a depowered deployment. For the majority of the cases the zone 3 would call for a high-powered deployment, zone 2 or a depowered deployment and zone 1 for suppression or no deployment.

A further implementation of at least one of the inventions disclosed herein would require that the location of the zones be a function of the severity of the crash. For such a system, the accuracy of the decision can be assessed and the deployment decision modified. For example, if the system determines that the occupant is in the zone 1 but the probability of that decision being true is low, then the system would choose a depowered deployment. Similarly if the system determines that the occupant is in zone 3 but the accuracy of the decision is low, then once again a depowered deployment would be chosen. In this manner, when there is uncertainty as to where the occupant located, the default decision would be for depowered deployment.

Crash sensors now exist which can predict the severity of an accident as disclosed in U.S. Pat. Nos. 5,684,701, 6,609,053 and 6,532,408. Predicting the severity of the accident means that the velocity change of the vehicle passenger compartment can be predicted forward in time. If the occupant is not wearing a seatbelt the velocity of the occupant can also be predicted forward in time and will be approximately the same as the velocity predicted by the crash sensor. If the occupant is wearing a seatbelt then this velocity prediction will be significantly in error. This gives an independent method of determining seatbelt usage. Knowing the usage of the seatbelt can be used to determine whether the airbag should be deployed at all in a marginal crash, whether a depowered airbag should be deployed when a full powered airbag would otherwise the use etc. Knowing seatbelt usage can also be used in the calculation or prediction of the forward motion of the occupant in a crash.

Also disclosed is a steering wheel assembly for a vehicle which comprises a steering wheel, and a sensor arranged in connection therewith and arranged to provide an output signal which varies as a function of the distance between the sensor and the driver of the vehicle. The steering wheel assembly can include an airbag module, the sensor being arranged in connection therewith, e.g., on a cover thereof.

Also disclosed herein is an airbag module for a vehicle which comprises a deployable airbag, a cover overlying the airbag and arranged to be removed or broken upon deployment of the airbag, and a sensor arranged on the cover and which provides an output signal which varies as a function of the distance between the sensor and an object. The sensor may be as described above, e.g., a wave-receiving sensor, including a transmitter, etc.

Another occupant restraint system for a vehicle disclosed herein comprises an airbag module including a deployable airbag, a sensor arranged in connection with the module and which provides an output signal which varies as a function of the distance between the sensor and an object, crash sensor means for determining that a crash requiring deployment of the airbag is required, and control means coupled to the sensor and the crash sensor means for controlling deployment of the airbag based on the determination that a crash requiring deployment of the airbag is required and the distance between the object and the sensor. The control means may suppress deployment of the airbag or modify one or more parameters of deployment of the airbag based on the distance between the sensor and the object. A confirming sensor, as described above, may also be provided.

Another disclosed embodiment of an occupant restraint system for a vehicle comprises a steering wheel assembly including a deployable airbag, a sensor arranged in connection with or incorporated into the steering wheel assembly and which provides an output signal which varies as a function of the distance between the sensor and an object, crash sensor means for determining that a crash requiring deployment of the airbag is required, and control means coupled to the sensor and the crash sensor means for controlling deployment of the airbag based on the determination that a crash requiring deployment of the airbag is required and the distance between the object and the sensor. If the steering wheel assembly includes a cover overlying the airbag and arranged to be removed or broken upon deployment of the airbag, the sensor may be arranged on the cover.

A disclosed method for controlling deployment of an airbag in a vehicle comprises the steps of arranging the airbag in an airbag module, mounting the module in the vehicle, arranging a sensor in connection with the module, the sensor providing an output signal which varies as a function of the distance between the sensor and an object in the vehicle, determining whether a crash of the vehicle requiring deployment of the airbag is occurring or is about to occur, and controlling deployment of the airbag based on the determination of whether a crash of the vehicle requiring deployment of the airbag is occurring or is about to occur and the output signal from the sensor.

Moreover, a method for determining the position of an object in a vehicle including an airbag module comprises the steps of arranging a wave-receiving sensor in connection with the airbag module, and generating an output signal from the sensor representative of the distance between the sensor and the object such that the position of the object is determinable from the distance between the sensor and the object.

Another arrangement for controlling a vehicular component, e.g., an airbag, comprises means for obtaining information or data about an occupying item of a seat, a pattern recognition system for receiving the information or data about the occupying item and analyzing the information or data with respect to size, position, shape and/or motion, and control means for controlling the vehicular component based on the analysis of the information or data with respect to the size, position, shape and/or motion by the pattern recognition system. The control means may be arranged to enable suppression of deployment of the airbag.

Another disclosed method for controlling a vehicular component comprises the steps of obtaining information or data about the position of an occupying item of a seat of the vehicle, providing the information or data to a pattern recognition system, analyzing the information or data about the position of the occupying item in the pattern recognition system, and controlling the vehicular component based on the analysis of the information or data about the position of the occupying item by the pattern recognition system.

The disclosure herein also encompasses a method of disabling an airbag system for a seating position within a motor vehicle. The method comprises the steps of providing to a roof above the seating position one or more electromagnetic wave occupant sensors, detecting presence or absence of an occupant of the seating position using the electromagnetic wave occupant sensor(s), disabling the airbag system if the seating position is unoccupied, detecting proximity of an occupant to the airbag door if the seating position is occupied and disabling the airbag system if the occupant is closer to the airbag door than a predetermined distance. The airbag deployment parameters, e.g., inflation rate and time of deployment, may be modified to adjust inflation of the airbag according to proximity of the occupant to the airbag door. The presence or absence of the occupant can be detected using pattern recognition techniques to process the waves received by the electromagnetic wave-occupant sensor(s).

Also disclosed herein is an apparatus for disabling an airbag system for a seating position within a motor vehicle. The apparatus preferably comprises one or more electromagnetic wave occupant sensors proximate a roof above the seating position, means for detecting presence or absence of an occupant of the seating position using the electromagnetic wave occupant sensor(s), means for disabling the airbag system if the seating position is unoccupied, means for detecting proximity of an occupant to the airbag door if the seating position is occupied and means for disabling the airbag system if the occupant is closer to the airbag door than a predetermined distance. Also, means for modifying airbag deployment parameters to adjust inflation of the airbag according to proximity of the occupant to the airbag door may be provided and may constitute a sensor algorithm resident in a crash sensor and diagnostic circuitry. The means for detecting presence or absence of the occupant may comprise a processor utilizing pattern recognition techniques to process the waves received by the electromagnetic wave-occupant sensor(s).

Also disclosed herein is a motor vehicle airbag system for inflation and deployment of an airbag in front of a passenger in a motor vehicle during a collision. The airbag system comprises an airbag, inflation means connected to the airbag for inflating the same with a gas, passenger sensor means mounted adjacent to the interior roof of the vehicle for continuously sensing the position of a passenger with respect to the passenger compartment and for generating electrical output indicative of the position of the passenger and microprocessor means electrically connected to the passenger sensor means and to the inflation means. The microprocessor means compares and performs an analysis of the electrical output from the passenger sensor means and activates the inflation means to inflate and deploy the airbag when the analysis indicates that the vehicle is involved in a collision and that deployment of the airbag would likely reduce a risk of serious injury to the passenger which would exist absent deployment of the airbag and likely would not present an increased risk of injury to the passenger resulting from deployment of the airbag. In certain embodiments, the passenger sensor means is a means particularly sensitive to the position of the head of the passenger. The microprocessor means may include memory means for storing the positions of the passenger over some interval of time. The passenger sensor means may comprise an array of passenger proximity sensor means for sensing distance from a passenger to each of the passenger proximity sensor means. In this case, the microprocessor means includes means for determining passenger position by determining each of these distances and means for triangulation analysis of the distances from the passenger to each passenger proximity sensor means to determine the position of the passenger.

When the vehicle interior monitoring system in accordance with some embodiments of at least one of the inventions disclosed herein is installed in the passenger compartment of an automotive vehicle equipped with a passenger protective device, such as an inflatable airbag, and the vehicle is subjected to a crash of sufficient severity that the crash sensor has determined that the protective device is to be deployed, the system determines the position of the vehicle occupant relative to the airbag and disables deployment of the airbag if the occupant is positioned so that he/she is likely to be injured by the deployment of the airbag. In the alternative, the parameters of the deployment of the airbag can be tailored to the position of the occupant relative to the airbag, e.g., a depowered deployment.

One method for controlling deployment of an airbag from an airbag module comprising the steps of determining the position of the occupant or a part thereof, and controlling deployment of the airbag based on the determined position of the occupant or part thereof. The position of the occupant or part thereof is determined as in the arrangement described above.

Another method for controlling deployment of an airbag comprises the steps of determining whether an occupant is present in the seat, and controlling deployment of the airbag based on the presence or absence of an occupant in the seat. The presence of the occupant, and optionally position of the occupant or a part thereof, are determined as in the arrangement described above.

Other embodiments disclosed herein are directed to methods and arrangements for controlling deployment of an airbag. One exemplifying embodiment of an arrangement for controlling deployment of an airbag from an airbag module to protect an occupant in a seat of a vehicle in a crash comprises a determining unit for determining the position of the occupant or a part thereof, and a control unit coupled to the determining unit for controlling deployment of the airbag based on the determined position of the occupant or part thereof. The determining unit may comprise a receiver system, e.g., a wave-receiving transducer such as an electromagnetic wave receiver (such as a CCD, CMOS, capacitor plate or antenna) or an ultrasonic transducer, for receiving waves from a space above a seat portion of the seat and a processor coupled to the receiver system for generating a signal representative of the position of the occupant or part thereof based on the waves received by the receiver system. The determining unit can include a transmitter for transmitting waves into the space above the seat portion of the seat which are receivable by the receiver system. The receiver system may be mounted in various positions in the vehicle, including in a door of the vehicle, in which case, the distance between the occupant and the door would be determined, i.e., to determine whether the occupant is leaning against the door, and possibly adjacent the airbag module if it is situated in the door, or elsewhere in the vehicle. The control unit is designed to suppress deployment of the airbag, control the time at which deployment of the airbag starts, control the rate of gas flow into the airbag, control the rate of gas flow out of the airbag and/or control the rate of deployment of the airbag.

Another arrangement for controlling deployment of an airbag comprises a determining unit for determining whether an occupant is present in the seat, and a control unit coupled to the determining unit for controlling deployment of the airbag based on whether an occupant is present in the seat, e.g., to suppress deployment if the seat is unoccupied. The determining unit may comprise a receiver system, e.g., a wave-receiving transducer such as an ultrasonic transducer, CCD, CMOS, capacitor plate, capacitance sensor or antenna, for receiving waves from a space above a seat portion of the seat and a processor coupled to the receiver system for generating a signal representative of the presence or absence of an occupant in the seat based on the waves received by the receiver system. The determining unit may optionally include a transmitter for transmitting waves into the space above the seat portion of the seat which are receivable by the receiver system. Further, the determining unit may be designed to determine the position of the occupant or a part thereof when an occupant is in the seat in which case, the control unit is arranged to control deployment of side airbag based on the determined position of the occupant or part thereof.

A method disclosed herein for controlling deployment of an occupant restraint system in a vehicle comprises the steps of transmitting electromagnetic waves toward an occupant seated in a passenger compartment of the vehicle from one or more locations, obtaining one or more images of the interior of the passenger compartment, each from a respective location, analyzing the images to determine the distance between the occupant and the occupant restraint system, and controlling deployment of the occupant restraint system based on the determined distance between the occupant and the occupant restraint system. The images may be analyzed by comparing data from the images of the interior of the passenger compartment with data from stored images representing different arrangements of objects in the passenger compartment to determine which of the stored images match most closely to the images of the interior of the passenger compartment, each stored image having associated data relating to the distance between the occupant in the image and the occupant restraint system. The image comparison step may entail inputting the images, or features extracted therefrom such as edges, or a form thereof into a neural network which provides for each image of the interior of the passenger compartment, an index of a stored image that most closely matches the image of the interior of the passenger compartment. In a particularly advantageous embodiment, the weight of the occupant on a seat is measured and deployment of the occupant restraint system is controlled based on the determined distance between the occupant and the occupant restraint system and the measured weight of the occupant.

Other embodiments disclosed herein are directed to methods and arrangements for controlling deployment of an airbag. One exemplifying embodiment of an arrangement for controlling deployment of an airbag from an airbag module to protect an occupant in a seat of a vehicle in a crash comprises a determining unit for determining the position of the occupant or a part thereof, and control means coupled to the determining unit for controlling deployment of the airbag based on the determined position of the occupant or part thereof. The determining unit may comprise a receiver system, e.g., a wave-receiving transducer such as an electromagnetic wave receiver (such as a SAW, CCD, CMOS, capacitor plate or antenna) or an ultrasonic transducer, for receiving waves from a space above a seat portion of the seat and a processor coupled to the receiver system for generating a signal representative of the position of the occupant or part thereof based on the waves received by the receiver system. The determining unit can include a transmitter for transmitting waves into the space above the seat portion of the seat which are receivable by the receiver system. The receiver system may be mounted in various positions in the vehicle, including in a door of the vehicle, in which case, the distance between the occupant and the door would be determined, i.e., to determine whether the occupant is leaning against the door, and possibly adjacent the airbag module if it is situated in the door, or elsewhere in the vehicle. The control unit is designed to suppress deployment of the airbag, control the time at which deployment of the airbag starts, control the rate of gas flow into the airbag, control the rate of gas flow out of the airbag, and/or control the rate of deployment of the airbag.

Also in accordance with the invention, an occupant protection device control system comprises a vehicle seat provided for a vehicle occupant and movable relative to a chassis of the vehicle, at least one motor for moving the seat, a processor for controlling the motor(s) to move the seat, a memory unit for retaining an occupant pre-defined seat locations, a memory actuation unit for causing the processor to direct the motor(s) to move the seat to the occupant pre-defined seat location retained in the memory unit, measuring apparatus for measuring at least one morphological characteristic of the occupant, an automatic adjustment system coupled to the processor for positioning the seat based on the morphological characteristic(s) measured by the measuring apparatus (if and when a change in positioning is required), a manual adjustment system coupled to the processor manually operable for permitting movement of the seat and an actuatable occupant protection device for protecting the occupant. The processor is arranged to control actuation of the occupant protection device based on the position of the seat wherein location of the occupant relative to the occupant protection device is related to the position of the seat. This relationship can be determined by approximation and analysis, e.g., obtained during a training and programming stage. More particularly, the processor can be designed to suppress actuation of the occupant protection device when the position of the seat indicates that the occupant is more likely than not to be out-of-position for the actuation of the occupant protection device. Other factors can be considered by the processor when determining actuation of the occupant protection device. When the occupant protection device is an airbag system including airbag and enabling a variable inflation and/or deflation of the airbag, the processor can be designed to determine the inflation and/or deflation of the airbag based on the location of the occupant in view of the relationship between the location of the occupant and the position of the seat, e.g., varying an amount of gas flowing into the airbag during inflation or providing an exit orifice or valve arranged in the airbag and varying the size of the exit orifice or valve. The airbag may have an adjustable deployment direction, in which case, the processor can be designed to determine the deployment direction of the airbag based on the location of the occupant in view of the relationship between the location of the occupant and the position of the seat.

A method for controlling an occupant protection device in a vehicle comprises the steps of acquiring data from at least one sensor relating to an occupant in a seat to be protected by the occupant protection device, classifying the type of occupant based on the acquired data, when the occupant is classified as an empty seat or a rear-facing child seat, disabling or adjusting deployment of the occupant protection device, otherwise classifying the size of the occupant based on the acquired data, determining the position of the occupant by means of one of a plurality of algorithms selected based on the classified size of the occupant using the acquired data, each of the algorithms being applicable for a specific size of occupant, and disabling or adjusting deployment of the occupant protection device when the determined position of the occupant is more likely to result in injury to the occupant if the occupant protection device were to deploy. The algorithms may be pattern recognition algorithms such as neural networks.

The determination of the occupancy state of the seat is performed using at least one pattern recognition algorithm such as a combination neural network.

In order to achieve some objects of the invention, a control system for controlling an occupant restraint device effective for protection of an occupant of the seat comprises a receiving device arranged in the vehicle for obtaining information about contents of the seat and generating a signal based on any contents of the seat, a different signal being generated for different contents of the seat when such contents are present on the seat, an analysis unit such as a microprocessor coupled to the receiving device for analyzing the signal in order to determine whether the contents of the seat include a child seat, whether the contents of the seat include a child seat in a particular orientation and/or whether the contents of the seat include a child seat in a particular position, and a deployment unit coupled to the analysis unit for controlling deployment of the occupant restraint device based on the determination by the analysis unit.

The analysis unit can be programmed to determine whether the contents of the seat include a child seat in a rear-facing position, in a forward-facing position, a rear-facing child seat in an improper orientation, a forward-facing child seat in an improper orientation, and the position of the child seat relative to one or more of the occupant restraint devices.

The receiving device can include a wave transmitter for transmitting waves toward the seat, a wave receiver arranged relative to the wave transmitter for receiving waves reflected from the seat and a processor coupled to the wave receiver for generating the different signal for the different contents of the seat based on the received waves reflected from the seat. The wave receiver can comprise multiple wave receivers spaced apart from one another with the processor being programmed to process the reflected waves from each receiver in order to create respective signals characteristic of the contents of the seat based on the reflected waves. In this case, the analysis unit preferably categorizes the signals using for example a pattern recognition algorithm for recognizing and thus identifying the contents of the seat by processing the signals based on the reflected waves from the contents of the seat into a categorization of the signals characteristic of the contents of the seat.

15.2a Crash Sensing and Rear Impacts

In order to achieve at least one of the above-listed objects, a vehicle in accordance with the invention comprises a seat including a movable headrest against which an occupant can rest his or her head, an anticipatory crash sensor arranged to detect an impending crash involving the vehicle based on data obtained prior to the crash, and a movement mechanism coupled to the crash sensor and the headrest and arranged to move the headrest upon detection of an impending crash involving the vehicle by the crash sensor.

The crash sensor may be arranged to produce an output signal when an object external from the vehicle is approaching the vehicle at a velocity above a design threshold velocity. The crash sensor may be any type of sensor designed to provide an assessment or determination of an impending impact prior to the impact, i.e., from data obtained prior to the impact. Thus, the crash sensor can be an ultrasonic sensor, an electromagnetic wave sensor, a radar sensor, a noise radar sensor and a camera, a scanning laser radar and a passive infrared sensor.

To optimize the assessment of an impending crash, the crash sensor can be designed to determine the distance from the vehicle to an external object whereby the velocity of the external object can be calculated from successive distance measurements. To this end, the crash sensor can employ means for measuring time of flight of a pulse, means for measuring a phase change, means for measuring a Doppler radar pulse and means for performing range gating of an ultrasonic pulse, an optical pulse or a radar pulse.

To further optimize the assessment, the crash sensor may comprise pattern recognition means for recognizing, identifying or ascertaining the identity of external objects. The pattern recognition means may comprise a neural network, fuzzy logic, fuzzy system, neural-fuzzy system, sensor fusion and other types of pattern recognition systems.

The movement mechanism may be arranged to move the headrest from an initial position to a position more proximate to the head of the occupant.

Optionally, a determining system determines the location of the head of the occupant in which case, the movement mechanism may move the headrest from an initial position to a position more proximate to the determined location of the head of the occupant. The determining system can include a wave-receiving sensor arranged to receive waves from a direction of the head of the occupant. More particularly, the determining system can comprise a transmitter for transmitting radiation to illuminate different portions of the head of the occupant, a receiver for receiving a first set of signals representative of radiation reflected from the different portions of the head of the occupant and providing a second set of signals representative of the distances from the headrest to the nearest illuminated portion the head of the occupant, and a processor comprising computational means to determine the headrest vertical location corresponding to the nearest part of the head to the headrest from the second set of signals from the receiver. The transmitter and receiver may be arranged in the headrest.

The head position determining system can be designed to use waves, energy, radiation or other properties or phenomena. Thus, the determining system may include an electric field sensor, a capacitance sensor, a radar sensor, an optical sensor, a camera, a three-dimensional camera, a passive infrared sensor, an ultrasound sensor, a stereo sensor, a focusing sensor and a scanning system.

A processor may be coupled to the crash sensor and the movement mechanism and determines the motion required of the headrest to place the headrest proximate to the head. The processor then provides the motion determination to the movement mechanism upon detection of an impending crash involving the vehicle by the crash sensor. This is particularly helpful when a system for determining the location of the head of the occupant relative to the headrest is provided in which case, the determining system is coupled to the processor to provide the determined head location.

A method for protecting an occupant of a vehicle during a crash in accordance with the invention comprises the steps of detecting an impending crash involving the vehicle based on data obtained prior to the crash and moving a headrest upon detection of an impending crash involving the vehicle to a position more proximate to the occupant. Detection of the crash may entail determining the velocity of an external object approaching the vehicle and producing a crash signal when the object is approaching the vehicle at a velocity above a design threshold velocity.

Optionally, the location of the head of the occupant is determined in which case, the headrest is moved from an initial position to the position more proximate to the determined location of the head of the occupant.

If the system in the vehicle is an occupant restraint device, the additional neural networks can be designed to determine a recommendation of a suppression of deployment of the occupant restraint device, a depowered deployment of the occupant restraint device or a full power deployment of the occupant restraint device.

Conventionally, for a driver, the airbag is situated in a module mounted on the steering wheel or incorporated into the steering wheel assembly. In accordance with the invention, the sensor which determines the position of the occupant relative to the airbag, and which also enables the velocity of the occupant to be determined in some embodiments, is positioned on the steering wheel or its assembly or on the airbag module. The sensor may be formed as a part of the airbag module or separately and then attached thereto. Similarly, the sensor may be formed as a part of the steering wheel or steering wheel assembly or separately and then attached thereto.

The placement of the position (and velocity) sensor on the steering wheel or its assembly or on the airbag module provides an extremely precise and direct measurement of the distance between the occupant and the airbag (assuming the airbag is arranged in connection with the steering wheel). Obviously, this positioning of the sensor is for use with a driver airbag. For the passenger, the placement of the position (and velocity) sensor on or adjacent and in connection with the airbag module provides a similarly extremely precise and direct measurement of the distance between the passenger and the airbag.

The position of the occupant could be continuously or periodically determined and stored in memory so that instead of determining the position of the occupant(s) after the sensor system determines that the airbag is to be deployed, the most recently stored position is used when the crash sensor has determined that deployment of the airbag is necessary. In other words, the determination of the position of the occupant could precede (or even occur simultaneous with) the determination that the deployment of airbag is desired. Naturally, as discussed below, the addition of an occupant position and velocity sensor onto a vehicle leads to other possibilities such as the monitoring of the driver's behavior which can be used to warn a driver if he or she is falling asleep, or to stop the vehicle if the driver loses the capacity to control the vehicle. In fact, the motion of the occupant provides valuable data to an appropriate pattern recognition system to differentiate an animate from an inanimate occupying item.

15.3 Adapting the System to a Vehicle Model

To achieve one or more of the above objects, a method for generating a neural network for determining the position of an object in a vehicle comprises the steps of conducting a plurality of data generation steps, each data generating step involving placing an object in the passenger compartment of the vehicle, directing waves into at least a portion of the passenger compartment in which the object is situated, receiving reflected waves from the object at a receiver, forming a data set of a signal representative of the reflected waves from the object, the distance from the object to the receiver and the temperature of the passenger compartment between the object and the receiver and changing the temperature of the air between the object and the receiver. This sequence of steps is performed for the object at different temperatures between the object and the receiver. A pattern recognition algorithm is generated from the data sets such that upon operational input of a signal representative of reflected waves from the object, the algorithm provides an approximation of the distance from the object to the receiver. The algorithm may be a neural network. The waves may be ultrasonic waves or electromagnetic waves or other waves possessing the required properties for operation of the invention.

The sequence of steps may also include placing different objects in the passenger compartment and then performing the sequence of steps for the different objects. In this case, the identity of the object is included in the data set such that upon operational input of a signal representative of reflected waves from the object, the algorithm provides an approximation of the identity of the object.

The sequence of steps may also include placing the different objects in different positions in the passenger compartment and then performing the sequence of steps for the different objects in the different positions. In this case, the identity and/or position of the object are included in the data set such that upon operational input of a signal representative of reflected waves from the object, the algorithm provides an approximation of the identity and/or position of the object.

The temperature may be changed dynamically by introducing a flow of blowing air at a different temperature than the ambient temperature of the passenger compartment. The flow of blowing air may be created by operating a vehicle heater or air conditioner of the vehicle. In the alternative, the temperature of the air may be changed by creating a temperature gradient between a top and a bottom of the passenger compartment.

Disclosed herein is a system for determining the occupancy state of a seat which comprises a plurality of transducers arranged in the vehicle, each transducer providing data relating to the occupancy state of the seat, and a processor or a processing unit (e.g., a microprocessor) coupled to the transducers for receiving the data from the transducers and processing the data to obtain an output indicative of the current occupancy state of the seat. The processor comprises a combination neural network algorithm created from a plurality of data sets, each representing a different occupancy state of the seat and being formed from data from the transducers while the seat is in that occupancy state. The combination neural network algorithm discussed herein produces the output indicative of the current occupancy state of the seat upon inputting a data set representing the current occupancy state of the seat and being formed from data from the transducers. The algorithm may be a pattern recognition algorithm or neural network algorithm generated by a combination neural network algorithm-generating program.

The processor may be arranged to accept only a separate stream of data from each transducer such that the stream of data from each transducer is passed to the processor without combining with another stream of data. Further, the processor may be arranged to process each separate stream of data independent of the processing of the other streams of data.

The transducers may be selected from a wide variety of different sensors, all of which are affected by the occupancy state of the seat. That is, different combinations of known sensors can be utilized in the many variations of the invention. For example, the sensors used in the invention may include a weight sensor arranged in the seat, a reclining angle detecting sensor for detecting a tilt angle of the seat between a back portion of the seat and a seat portion of the seat, a seat position sensor for detecting the position of the seat relative to a fixed reference point in the vehicle, a heartbeat sensor for sensing a heartbeat of an occupying item of the seat, a capacitive sensor, an electric field sensor, a seat belt buckle sensor, a seatbelt payout sensor, an infrared sensor, an inductive sensor, a motion sensor, a chemical sensor such as a carbon dioxide sensor and a radar sensor. The same type of sensor could also be used, preferably situated in a different location, but possibly in the same location for redundancy purposes. For example, the system may include a plurality of weight sensors, each measuring the weight applied onto the seat at a different location. Such weight sensors may include a weight sensor, such as a strain gage or bladder, arranged to measure displacement of a surface of a seat portion of the seat and/or a strain, force or pressure gage arranged to measure displacement of the entire seat. In the latter case, the seat includes a support structure for supporting the seat above a floor of a passenger compartment of the vehicle whereby the strain gage can be attached to the support structure.

In some embodiments, the transducers include a plurality of electromagnetic wave sensors capable of receiving waves at least from a space above the seat, each electromagnetic wave sensor being arranged at a different location. Other wave or field sensors such as capacitive or electric field sensors can also be used.

In other embodiments, the transducers include at least two ultrasonic sensors capable of receiving waves at least from a space above the seat bottom, each ultrasonic sensor being arranged at a different location. For example, one sensor is arranged on a ceiling of the vehicle and the other is arranged at a different location in the vehicle, preferably so that an axis connecting the sensors is substantially parallel to a second axis traversing a volume in the vehicle above the seat. The second sensor may be arranged on a dashboard or instrument panel of the vehicle. A third ultrasonic sensor can be arranged on an interior side surface of the passenger compartment while a fourth can be arranged on or adjacent an interior side surface of the passenger compartment. The ultrasonic sensors are capable of transmitting waves at least into the space above the seat. Further, the ultrasonic sensors are preferably aimed such that the ultrasonic fields generated thereby cover a substantial portion of the volume surrounding the seat. Horns or grills may be provided for adjusting the transducer field angles of the ultrasonic sensors to reduce reflections off of fixed surfaces within the vehicle or otherwise control the shape of the ultrasonic field. Other types of sensors can of course be placed at the same or other locations.

The actual location or choice of the sensors can be determined by placing a significant number of sensors in the vehicle and removing those sensors which prove analytically to add little to system accuracy.

The ultrasonic sensors can have different transmitting and receiving frequencies and be arranged in the vehicle such that sensors having adjacent transmitting and receiving frequencies are not within a direct ultrasonic field of each other.

Another the system for determining the occupancy state of a seat in a vehicle includes a plurality of transducers arranged in the vehicle, each providing data relating to the occupancy state of the seat, and a processor coupled to the transducers for receiving only a separate stream of data from each transducer (such that the stream of data from each transducer is passed to the processor without combining with another stream of data) and processing the streams of data to obtain an output indicative of the current occupancy state of the seat. The processor comprises an algorithm created from a plurality of data sets, each representing a different occupancy state of the seat and being formed from separate streams of data, each only from one transducer, while the seat is in that occupancy state. The algorithm produces the output indicative of the current occupancy state of the seat upon inputting a data set representing the current occupancy state of the seat and being formed from separate streams of data, each only from one transducer. The processor preferably processes each separate stream of data independent of the processing of the other streams of data.

In still another embodiment of the invention, the system includes a plurality of transducers arranged in the vehicle, each providing data relating to the occupancy state of the seat, and which include wave-receiving transducers and/or non-wave-receiving transducers. The system also includes a processor coupled to the transducers for receiving the data from the transducers and processing the data to obtain an output indicative of the current occupancy state of the seat. The processor comprises an algorithm created from a plurality of data sets, each representing a different occupancy state of the seat and being formed from data from the transducers while the seat is in that occupancy state. The algorithm produces the output indicative of the current occupancy state of the seat upon inputting a data set representing the current occupancy state of the seat and being formed from data from the transducers.

In some of the embodiments of the invention described herein, a combination or combinational neural network is used. The particular combination neural network can be determined by a process in which a number of neural network modules are combined in a parallel and a serial manner and an optimization program can be utilized to determine the best combination of such neural networks to achieve the highest accuracy. Alternately, the optimization process can be undertaken manually in a trial and error manner. In this manner, the optimum combination of neural networks is selected to solve the particular pattern recognition and categorization objective desired.

15.4 Component Adjustment

To achieve at least one of the above objects, an apparatus for adjusting a steering wheel extending from a front console of a vehicle includes at least one motor coupled to the steering column or steering wheel and which is at least automatically controllable without manual intervention to adjust the steering wheel relative to the front console, a system for determining at least one morphological characteristic of a driver and a control circuit coupled to the system and the motor(s) for automatically controlling the motor(s) based on the morphological characteristic(s). In this manner, the position of the steering wheel can be adjusted for each driver and can be changed when the driver of the vehicle varies between sequential uses.

One motor may be arranged to adjust the longitudinal position of the steering wheel, possibly by being coupled to the steering column and/or steering wheel. Another may be arranged on the steering column to adjust the tilt angle of the steering wheel.

In addition to the morphology of the driver, the location of the driver can be determined and used to automatically position the steering wheel since the location of the driver will usually affect a comfortable position of the steering wheel for the driver. In this case, the control circuit is coupled to a location determining system and thus automatically controls the motor(s) based on the determined location of the driver as well as the driver's morphology.

The system for determining a morphological characteristic of the driver may comprise one or more measurement mechanisms for measuring a morphological characteristic of the driver. The control circuit may include a processor for determining an optimum position of the steering wheel based on the measured morphological characteristic(s) and providing a signal to the motor(s) to adjust to adjust the steering wheel to the optimum position. The morphological characteristic may be the weight of the driver, the height of the driver from a bottom of a seat, the length of the driver's arms, the length of the driver's legs and the inclination of the driver's back relative to a seat.

A vehicle including the steering wheel adjustment system is also contemplated which would include a front console, a steering column extending from the front console, a steering wheel arranged on the steering column, at least one motor automatically controllable without manual intervention to adjust the steering wheel relative to the front console, a system for determining at least one morphological characteristic of a driver and a control circuit coupled to the system and the motor(s) for automatically controlling the motor(s) based on the morphological characteristic(s) determined by the system.

A method in accordance with the invention for adjusting a steering wheel mounted on a steering column extending from a front console of a vehicle comprises the steps of providing at least one motor capable of adjusting the position of the steering wheel, determining at least one morphological characteristic of a driver, and automatically controlling the at least one motor based on the at least one morphological characteristic and without manual intervention to adjust the steering wheel relative to the front console. The same design options for the apparatus and vehicle described above may be applied in the method in accordance with the invention.

Another way to view the invention would be to consider steering wheel adjustment based on the determined occupancy state of the vehicle. In this case, an arrangement for automatically adjusting a steering wheel in a vehicle comprises a seated-state evaluating system for evaluating the seated-state of a driver's seat in the vehicle, a processor coupled to the evaluating system and including a table of settings for positions of the steering wheel based on seated-states of the driver's seat, and at least one motor for adjusting the steering wheel. The evaluating system operatively determines the seated-state of the driver's seat, and the processor obtains a setting for the position of the steering wheel for the operatively determined seated-state of the driver and controls the motor(s) to adjust the steering wheel to the position setting.

The evaluating system may comprise any number of sensors, such as measurement apparatus for measuring at least one morphological characteristic of the driver, one or more wave-receiving sensors which receive waves from the space in which the driver is likely situated, at least one capacitance sensor for detecting variations in capacitance based on the occupant of the driver's seat, at least one electric field sensor for detecting variation in an electric field in the space in which the driver is likely situated, pressure or weight measuring means for measuring the pressure or weight applied to the driver's seat, height measuring means for measuring the height of the driver from a bottom of the seat, a seat track position detecting sensor for determining the position of a seat track of the seat and a reclining angle detecting sensor for determining the reclining angle of a seat back of the seat. Thus, generally, the evaluating system comprises a plurality of sensors each providing information about the driver or about the driver's seat. A processor may be coupled to the sensors for receiving the information about the driver or the driver's seat and determine the seated-state of the driver's seat based thereon. The processor may embody a neural network or other type of trained pattern recognition system.

A related method for automatically adjusting a steering wheel in a vehicle comprises the steps of creating a table of settings for positions of the steering wheel based on seated-states of the driver's seat, determining the seated-state of a driver's seat in the vehicle, obtaining a setting for the position of the steering wheel from the table based on the determined seated-state of the driver's seat, providing at least one motor for adjusting the steering wheel, and controlling the motor(s) to adjust the steering wheel to the setting obtained from the table. The same design options for the arrangement discussed above may be used in methods in accordance with the invention as well.

In addition, a change in status of the driver's seat from an unoccupied state to an occupied state may be detected and the seated-state of the driver's seat determined upon detection of such a change.

Furthermore, disclosed herein are methods for controlling a system in the vehicle based on an occupying item in which at least a portion of the passenger compartment in which the occupying item is situated is irradiated, radiation from the occupying item are received, e.g., by a plurality of sensors or transducers each arranged at a discrete location, the received radiation is processed by a processor in order to create one or more electronic signals characteristic of the occupying item based on the received radiation, each signal containing a pattern representative and/or characteristic of the occupying item and each signal is then categorized by utilizing pattern recognition techniques for recognizing and thus identifying the class of the occupying item. In the pattern recognition process, each signal is processed into a categorization thereof based on data corresponding to patterns of received radiation stored within the pattern recognition system and associated with possible classes of occupying items of the vehicle. Once the signal(s) is/are categorized, the operation of the system in the vehicle may be affected based on the categorization of the signal(s), and thus based on the occupying item. If the system in the vehicle is a vehicle communication system, then an output representative of the number of occupants and/or their health or injury state in the vehicle may be produced based on the categorization of the signal(s) and the vehicle communication system thus controlled based on such output. Similarly, if the system in the vehicle is a vehicle entertainment system or heating and air conditioning system, then an output representative of specific seat occupancy may be produced based on the categorization of the signal(s) and the vehicle entertainment system or heating and air conditioning system thus controlled based on such output. In one embodiment designed to ensure safe operation of the vehicle, the attentiveness of the occupying item is determined from the signal(s) if the occupying item is an occupant, and in addition to affecting the system in the vehicle based on the categorization of the signal, the system in the vehicle is affected based on the determined attentiveness of the occupant.

Another method for controlling a vehicular component is also disclosed herein and comprises the steps of obtaining information or data about an occupying item of a seat of the vehicle, providing the information or data about the occupying item to a pattern recognition system, analyzing the information or data about the occupying item with respect to size, position, shape and/or motion in the pattern recognition system, and controlling the vehicular component based on the analysis of the information or data about the occupying item by the pattern recognition system. If the vehicular component is an airbag, then control thereof may entail enabling suppression of deployment of the airbag.

The adjustment system and method for adjusting a component of a vehicle based on the presence of an object on a seat include a wave-receiving sensor as described immediately above, weight measuring means as described above, adjustment means arranged in connection with the component for adjusting the component, and processor means for receiving the outputs from the wave-receiving sensor and the weight measuring means and for evaluating the seated-state of the seat based thereon to determine whether the seat is occupied by an object and when the seat is occupied by an object, to ascertain the identity of the object in the seat based on the outputs from the wave-receiving sensor and the weight measuring means. The processor means also direct the adjustment means to adjust the component based at least on the identity of the object.

If the component is an airbag system, the processor means may be designed to direct the adjustment means to suppress deployment of the airbag when the object is identified as an object for which deployment of the airbag is unnecessary or would be more likely to harm the object than protect the object, depowering the deployment of the airbag or affect any deployment parameter, e.g., the inflation rate, deflation rate, number of deploying airbags, deployment rate, etc. Thus, the component may be a valve for regulating the flow of gas into or out of an airbag.

The component adjustment system and methods in accordance with the invention automatically and passively adjust the component based on the morphology of the occupant of the seat, e.g., characteristics or properties of the driver when the component is a component which is used for driving the vehicle such as the steering wheel. As noted above, the adjustment system may include the seated-state detecting unit described above so that it will be activated if the seated-state detecting unit detects that an adult or child occupant is seated on the seat, i.e., the adjustment system will not operate if the seat is occupied by a child seat, pet or inanimate objects. Obviously, the same system can be used for any seat in the vehicle including the driver seat and the passenger seat(s). This adjustment system may incorporate the same components as the seated-state detecting unit described above, i.e., the same components may constitute a part of both the seated-state detecting unit and the adjustment system, e.g., the weight measuring means.

An arrangement for controlling deployment of a component in a vehicle in combination with the vehicle in accordance with the invention comprises measurement apparatus for measuring at least one morphological characteristic of an occupant, a processor coupled to the measurement apparatus for determining a new seat position based on the morphological characteristic(s) of the occupant, an adjustment system for adjusting the seat to the new seat position and a control unit coupled to the measurement apparatus and processor for controlling the component based on the measured morphological characteristic(s) of the occupant and the new seat position. The component could be a deployable occupant restraint device whereby the deployment of the occupant restraint device is controlled by the control unit. The processor may comprise a control circuit or module and can be arranged to determine a new position of a bottom portion and/or back portion of the seat. The adjustment system may comprise one or more motors for moving the seat or a portion thereof.

A method for controlling a component in a vehicle comprises the steps of measuring at least one morphological characteristic of an occupant, obtaining a current position of at least a part of a seat on which the occupant is situated, for example the bottom portion and/or the back portion, and controlling the component based on the measured morphological characteristic(s) of the occupant and the current position of the seat. The morphological characteristic could be the height of the occupant (measured from the top surface of the seat bottom), the weight of the occupant, etc.

One preferred embodiment of an adjustment system in accordance with the invention includes a plurality of wave-receiving sensors for receiving waves from the seat and its contents, if any, and one or more seat pressure or weight sensors for detecting pressure applied by or weight of an occupant in the seat or an absence of pressure or weight applied onto the seat indicative of a vacant seat. The pressure or weight sensing apparatus may include strain sensors mounted on or associated with the seat structure such that the strain measuring elements respond to the magnitude of the weight of the occupying item and the pressure applied thereby to the seat. The apparatus also includes a processor for receiving the output of the wave-receiving sensors and the pressure or weight sensor(s) and for processing the outputs to evaluate a seated-state based on the outputs. The processor then adjusts a part of the component or the component in its entirety based at least on the evaluation of the seated-state of the seat. The wave-receiving sensors may be ultrasonic sensors, optical sensors or electromagnetic sensors. If the wave-receiving sensors are ultrasonic or optical sensors, then they may also include a transmitter for transmitting ultrasonic or optical waves toward the seat. If the component is a seat, the system includes a power unit for moving at least one portion of the seat relative to the passenger compartment and a control unit connected to the power unit for controlling the power unit to move the portion(s) of the seat. In this case, the processor may direct the control unit to affect the power unit based at least in part on the evaluation of the seated-state of the seat. With respect to the direction or regulation of the control unit by the processor, this may take the form of a regulation signal to the control unit that no seat adjustment is needed, e.g., if the seat is occupied by a bag of groceries or a child seat in a rear or forward-facing position as determined by the evaluation of the output from the ultrasonic or optical and weight sensors. On the other hand, if the processor determines that the seat is occupied by an adult or child for which adjustment of the seat is beneficial or desired, then the processor may direct the control unit to affect the power unit accordingly. For example, if a child is detected on the seat, the processor may be designed to lower the headrest. In certain embodiments, the apparatus may include one or more sensors each of which measures a morphological characteristic of the occupying item of the seat, e.g., the height or weight of the occupying item, and the processor is arranged to obtain the input from these sensors and adjust the component accordingly. Thus, once the processor evaluates the occupancy of the seat and determines that the occupancy is by an adult or child, then the processor may additionally use either the obtained weight measurement or conduct additional measurements of morphological characteristics of the adult or child occupant and adjust the component accordingly. The processor may be a single microprocessor for performing all of the functions described above. In the alternative, one microprocessor may be used for evaluating the occupancy of the seat and another for adjusting the component. The processor may comprise an evaluation circuit implemented in hardware as an electronic circuit or in software as a computer program. In certain embodiments, a correlation function or state between the output of the various sensors and the desired result (i.e., seat occupancy identification and categorization) is determined, e.g., by a neural network that may be implemented in hardware as a neural computer or in software as a computer program. The correlation function or state that is determined by employing this neural network may also be contained in a microcomputer. In this case, the microcomputer can be employed as an evaluation circuit. The word circuit herein will be used to mean both an electronic circuit and the functional equivalent implemented on a microcomputer using software. In enhanced embodiments, a heartbeat sensor may be provided for detecting the heartbeat of the occupant and generating an output representative thereof. The processor additionally receives this output and evaluates the seated-state of the seat based in part thereon. In addition to or instead of such a heartbeat sensor, a capacitive sensor and/or a motion sensor may be provided. The capacitive sensor detects the presence of the occupant and generates an output representative of the presence of the occupant. The motion sensor detects movement of the occupant and generates an output representative thereof. These outputs are provided to the processor for possible use in the evaluation of the seated-state of the seat.

Also disclosed herein is an arrangement for controlling a component in a vehicle in combination with the vehicle which comprises measurement apparatus for measuring at least one morphological characteristic of an occupant, a determination circuit or system for obtaining a current position of at least a part of a seat on which the occupant is situated, and a control unit coupled to the measurement apparatus and the determination system for controlling the component based on the measured morphological characteristic(s) of the occupant and the current position of the seat. The component may be an occupant restraint device such as an airbag whereby the control unit could control inflation and/or deflation of the airbag, e.g., the flow of gas into and/or out of the airbag, and/or the direction of deployment of the airbag. The component could also be a brake pedal, an acceleration pedal, a rear-view mirror, a side mirror and a steering wheel. The measurement apparatus might measure a plurality of morphological characteristics of the occupant, possibly including the height of the occupant by means of a height sensor arranged in the seat, and the weight of the occupant.

A seat adjustment system can be provided, e.g., motors or actuators connected to various portions of the seat, and a memory unit in which the current position of the seat is stored. The adjustment system is coupled to the memory unit such that an adjusted position of the seat is stored in the memory unit. A processor is coupled to the measurement apparatus for determining an adjusted position of the seat for the occupant based on the measured morphological characteristic(s). The adjustment system is coupled to the processor such that the processor directs the adjustment system to move the seat to the determined adjusted position of the seat. The determination system may comprise a circuit, assembly or system for determining a current position of a bottom portion of the seat and/or a current position of a back portion of the seat.

In addition to a security system, the individual recognition system can be used to control vehicular components, such as the mirrors, the seat, the anchorage point of the seatbelt, the airbag deployment parameters including inflation rate and pressure, inflation direction, deflation rate, time of inflation, the headrest, the steering wheel, the pedals, the entertainment system and the air-conditioning/ventilation system. In this case, the system includes a control unit coupled to the component for affecting the component based on the indication from the pattern recognition algorithm whether the person is the individual.

A vehicle including a system for obtaining information about an object in the vehicle, comprises at least one resonator or reflector arranged in association with the object, each resonator emitting an energy signal upon receipt of a signal at an excitation frequency, a transmitter device for transmitting signals at least at the excitation frequency of each resonator, an energy signal detector for detecting the energy signal emitted by each resonator upon receipt of the signal at the excitation frequency, and a processor coupled to the detector for obtaining information about the object upon analysis of the energy signal detected by the detector.

The information obtained about the object may be a distance between each resonator and the detector, which positional information is useful for controlling components in the vehicle such as the occupant restraint or protection device.

If the object is a seat, the information obtained about the seat may be an indication of the position of the seat, the position of the back cushion of the seat, the position of the bottom cushion of the seat, the angular orientation of the seat, and other seat parameters.

The resonator(s) may be arranged within the object and may be a SAW device, antenna and/or RFID tag. When several resonators are used, each may be designed to emit an energy signal upon receipt of a signal at a different excitation frequency. The resonators may be tuned resonators including an acoustic cavity or a vibrating mechanical element.

In another embodiment, the vehicle comprises at least one reflector arranged in association with the object and arranged to reflect an energy signal, a transmitter for transmitting energy signals in a direction of each of reflector, an energy signal detector for detecting energy signals reflected by the reflector(s), and a processor coupled to the detector for obtaining information about the object upon analysis of the energy signal detected by the detector. The reflector may be a parabolic-shaped reflector, a corner cube reflector, a cube array reflector, an antenna reflector and other types of reflector or reflective devices. The transmitter may be an infrared laser system in which case, the reflector comprises an optical mirror.

The information obtained about the object may be a distance between each reflector and the detector, which positional information is useful for controlling components in the vehicle such as the occupant restraint or protection device. If the object is a seat, the information obtained about the seat may be an indication of the position of the seat, the position of the back cushion of the seat, the position of the bottom cushion of the seat, the angular orientation of the seat, and other seat parameters. If the object is a seatbelt, the information obtained about the seatbelt may be an indication of whether the seatbelt is in use and/or the position of the seatbelt. If the object is a child seat, the information obtained about the child seat may be whether the child seat is present and whether the child seat is rear-facing, front-facing, etc. If the object is a window of the vehicle, the information obtained about the window may be an indication of whether the window is open or closed, or the state of openness. If the object is a door, a reflector may be arranged in a surface facing the door such that closure of the door prevents reflection of the energy signal from the reflector, whereby the information obtained about the door is an indication of whether the door is open or closed.

Another embodiment of a motor vehicle detection system to achieve some of the above-listed objects comprises at least one transmitter for transmitting energy signals toward a target in a passenger compartment of the vehicle, at least one reflector arranged in association with the target, and at least one detector for detecting energy signals reflected by the reflector (s). A processor is optionally coupled to the detector(s) for obtaining information about the target upon analysis of the energy signal detected by the detector(s).

A system for obtaining information about an object in the vehicle comprises at least one resonator arranged in association with the object and which emits an energy signal upon receipt of a signal at an excitation frequency, a transmitter for transmitting signals at least at the excitation frequency of each resonator, an energy signal detector device for detecting the energy signal emitted by the resonator(s) upon receipt of the signal at the excitation frequency and a processor coupled to the detector device for obtaining information about the object upon analysis of the energy signal detected by the detector device. The information obtained about the object may be a distance between each resonator and the detector device or an indication of the position of the seat.

The resonator may comprise a tuned resonator including an acoustic cavity or a vibrating mechanical element. When multiple resonators are used, each resonator is preferably designed to emit an energy signal upon receipt of a signal at a different excitation frequency.

If the object is a seatbelt, the information obtained about the seatbelt may be an indication of whether the seatbelt is in use and/or an indication of the position of the seatbelt.

If the object is a child seat, the information obtained about the child seat may be an indication of the orientation of the child seat and/or an indication of the position of the child seat.

If the object is a window of the vehicle, the information obtained about the window may be an indication of whether the window is open or closed.

If the object is a door, the resonator is arranged in a surface facing the door such that closure of the door prevents emission of the energy signal therefrom, in which case, the information obtained about the door is an indication of whether the door is open or closed.

An arrangement for controlling a component in a vehicle based on contents of a passenger compartment of the vehicle comprises at least one wave-receiving sensor arranged to receive waves from the passenger compartment, a processing circuit coupled to the wave-receiving sensor(s) and arranged to remove at least one portion of each wave received by the sensor(s) in a discrete period of time to thereby form a shortened returned wave, and a processor coupled to the processing circuit and arranged to receive data derived from the shortened returned waves formed by the processing circuit. The processor generates a control signal to control the component based on the data derived from the shortened returned waves formed by the processing circuit.

The portion of the wave which is removed may be an initial wave portion starting from the beginning of the time period and/or an end wave portion at the end of the time period.

When multiple sensors are provided, a sensor driver circuit may be coupled to the sensors for driving the wave-receiving sensors and a multiplex circuit coupled to the sensors for processing the waves received by the wave-receiving sensors. The multiplex circuit is switched in synchronization with a timing signal from the driver circuit.

A band pass filter may be interposed between the sensor and the processing circuit for filtering waves at particular frequencies and noise from the waves received by the at least one wave-receiving sensor. An amplifier may be coupled to the band pass filter to amplify the waves provided by the band pass filter and an analog to digital converter (ADC) may be interposed between the amplifier and the processing circuit for removing a high frequency carrier wave component and generating an envelope wave signal.

Another arrangement for controlling a component in a vehicle based on contents of a passenger compartment of the vehicle comprises a generating device for generating a succession of time windows, a receiving device for receiving waves from the passenger compartment during the time windows, a processing circuit coupled to the receiving device and arranged to remove at least one portion of each wave received by the receiving device in each time window to thereby form a shortened wave, and a processor coupled to the processing circuit and arranged to receive data derived from the shortened waves formed by the processing circuit. The processor generates a control signal to control the component based on the data derived from the shortened waves formed by the processing circuit. The same variations of the above-described arrangement may be used for this arrangement as well.

A method for controlling a component in a vehicle based on contents of a passenger compartment of the vehicle in accordance with the invention comprises the steps of receiving waves from the passenger compartment, removing at least one portion of each received wave in a discrete period of time to thereby form a shortened wave, deriving data from the shortened waves, and generating a control signal to control the component based on the data derived from the shortened waves. The variations of the above-described arrangement may be used for this method as well.

Another method for controlling a component in a vehicle based on contents of a passenger compartment of the vehicle comprises the steps of generating a succession of time windows, receiving waves from the passenger compartment during the time windows, removing at least one portion of each received wave in each time window to thereby form a shortened wave, deriving data from the shortened waves, and generating a control signal to control the component based on the data derived from the shortened waves. The variations of the above-described arrangement may be used for this method as well.

A method for generating an algorithm capable of determining occupancy of a seat in accordance with the invention comprises the steps of mounting a plurality of wave-receiving sensors in the vehicle, obtaining data from the sensors while the seat has a particular occupancy, forming a vector from the data from the sensors obtained while the seat has a particular occupancy, repeatedly changing the occupancy of the seat and for each occupancy, repeating the steps of obtaining data from the sensors and forming a vector from the data, modifying the vectors by removing at least one portion of the wave received by each sensor during a discrete period of time, and generating the algorithm based on the modified vectors such that upon input from the sensors, the algorithm is capable of outputting a likely occupancy of the seat. The modified vectors may be normalized prior to generation of the algorithm.

The modified vectors may be input into a compression circuit that reduces the magnitude of reflected signals from high reflectivity targets compared to those of low reflectivity. Further, a time gain circuit may be applied to the modified vectors to compensate for the difference in sonic strength received by the sensors based on the distance of the reflecting object from the sensor.

Modification of the vectors may entail removing an initial portion of the wave during the time period and/or removing an end portion of the wave during the time period.

The data may be obtained from sensors other than wave-receiving sensors including weight sensors, weight distribution sensors, seatbelt buckle sensors, etc.

Another method for controlling a component in a vehicle comprises the steps of acquiring data from at least one sensor relating to an occupant of a seat interacting with or using the component, identifying the occupant based on the acquired data, determining the position of the occupant based on the acquired data, controlling the component based on at least one of the identification of the occupant and the determined position of the occupant, periodically acquiring new data from the at least one sensor, and for each time new data is acquired, identifying the occupant based on the acquired new data and an identification from a preceding time and determining the position of the occupant based on the acquired new data and then controlling the component based on at least one of the identification of the occupant and the determined position of the occupant. This also involves use of a feedback loop.

Determination of the position of the occupant based on the acquired new data may entail considering a determination of the position of the occupant from the preceding time.

Identification of the occupant based on the acquired data may entail using data from a first subset of the plurality of sensors whereas the determination of the position of the occupant based on the acquired data may entail using data from a second subset of the plurality of sensors different than the first subset.

Identification of the occupant based on the acquired data and the determination of the position of the occupant based on the acquired data may be performed using pattern recognition algorithms such as a combination neural network.

Another method for controlling a component in a vehicle may comprise the steps of acquiring data from at least one sensor relating to an occupant of a seat interacting with or using the component, identifying an occupant based on the acquired data, determining the position of the occupant based on the acquired data, controlling the component based on at least one of the identification of the occupant and the determined position of the occupant, periodically acquiring new data from the at least one sensor, and for each time new data is acquired, identifying an occupant based on the acquired new data and determining the position of the occupant based on the acquired new data and a determination of the position of the occupant from a preceding time and then controlling the component based on at least one of the identification of the occupant and the determined position of the occupant.

Another method for controlling a component in a vehicle comprises the steps of acquiring data from at least one sensor relating to an occupant of a seat interacting with or using the component, identifying the occupant based on the acquired data, when the occupant is identified as a child seat, determining the orientation of the child seat based on the acquired data, determining the position of the child seat by means of one of a plurality of algorithms selected based on the determined orientation of the child seat, each of the algorithms being applicable for a specific orientation of a child seat, and controlling the component based on the determined position of the child seat. When the occupant is identified as other than a child seat, the method entails determining at least one of the size and position of the occupant and controlling the component based on the at least one of the size and position of the occupant.

One preferred embodiment of an adjustment system in accordance with the invention includes a plurality of wave-receiving sensors for receiving waves from the seat and its contents, if any, and one or more pressure or weight sensors for detecting pressure applied by or weight of an occupant in the seat or an absence of pressure or weight applied onto the seat indicative of a vacant seat. The apparatus also includes processor means for receiving the output of the wave-receiving sensors and the weight sensor(s) and for processing the outputs to evaluate a seated-state based on the outputs. The processor means then adjust a part of the component or the component in its entirety based at least on the evaluation of the seated-state of the seat. The wave-receiving sensors may be ultrasonic sensors, optical sensors or electromagnetic sensors operating at other than optical frequencies. If the wave-receiving sensors are ultrasonic or optical sensors, then they may also include transmitter means for transmitting ultrasonic or optical waves toward the seat. For the purposes herein, optical is used to include the infrared, visible and ultraviolet parts of the electromagnetic spectrum.

If the component is a seat, the system includes power means for moving at least one portion of the seat relative to the passenger compartment and control means connected to the power means for controlling the power means to move the portion(s) of the seat. In this case, the processor means may direct the control means to affect the power means based at least in part on the evaluation of the seated-state of the seat. With respect to the direction or regulation of the control means by the processor means, this may take the form of a regulation signal to the control means that no seat adjustment is needed, e.g., if the seat is occupied by a bag of groceries or a child seat in a rear or forward-facing position as determined by the evaluation of the output from the ultrasonic or optical and weight sensors. On the other hand, if the processor means determines that the seat is occupied by an adult or child for which adjustment of the seat is beneficial or desired, then the processor means may direct the control means to affect the power means accordingly. For example, if a child is detected on the seat, the processor means may be designed to lower the headrest.

In certain embodiments, the apparatus may include one or more sensors each of which measures a morphological characteristic of the occupying item of the seat, e.g., the height, weight or dielectric properties of the occupying item, and the processor means are arranged to obtain the input from these sensors and adjust the component accordingly. Thus, once the processor means evaluates the occupancy of the seat and determines that the occupancy is by an adult or child, then the processor means may additionally use either the obtained pressure or weight measurement or conduct additional measurements of morphological characteristics of the adult or child occupant and adjust the component accordingly. The processor means may be a single microprocessor for performing all of the functions described above. In the alternative, one microprocessor may be used for evaluating the occupancy of the seat and another for adjusting the component.

The processor means may comprise an evaluation circuit implemented in hardware as an electronic circuit or in software as a computer program or a combination thereof.

Another method for controlling a component in a vehicle entails acquiring data from at least one sensor relating to an occupant of a seat interacting with or using the component, determining an occupancy state of the seat based on the acquired data, periodically acquiring new data from the at least one sensor, for each time new data is acquired, determining the occupancy state of the seat based on the acquired new data and the determined occupancy state from a preceding time and controlling the component based on the determined occupancy state of the seat. This thus involves use of a feedback loop.

15.4a

In order to achieve at least one of the above-listed objects, a system for detecting the presence of an object in an aperture in accordance with the invention comprises an electromagnetic wave emitting device for emitting modulated electromagnetic waves and directing the modulated electromagnetic waves from at least one edge of a frame defining the aperture, a receiver device for receiving reflected electromagnetic waves and a device for measuring a phase change between the modulated electromagnetic waves and the reflected electromagnetic waves. The phase change measurement device may be embodied in the electromagnetic wave receiving component(s), or possibly in a processor or other similar type of control logic component. The presence of an obstacle in the aperture causes a variation in the phase change from a situation where an obstacle is not present. That is, when the system is installed in connection with the frame, the phase change is measured when it is known that an obstacle is not present and stored in a memory unit such as a memory of a microprocessor. In this case, the electromagnetic waves are emitted from one edge of the frame defining the aperture and reflected from an opposite edge of the frame to be received by a electromagnetic wave receiver on the same edge of the frame as the electromagnetic wave emitter (the electromagnetic wave emitter and receptor preferably being located together). This phase change may vary depending on the distance between the edges of the frame. In use, the phase change of the electromagnetic waves emitted is again measured and compared with the reference phase change(s) stored in the memory unit whereby any variations between the measured phase change and the reference phase change are indicative of electromagnetic waves not being reflected from the opposite edge of the frame, but instead being reflected from an object in the aperture.

As noted above, the electromagnetic wave receiving device can be located together with the electromagnetic wave emitting device, and may also comprise a linear CMOS array or a one-dimensional camera, focal plane array or similar one or two dimensional electromagnetic wave receiver. The electromagnetic wave emitting device may comprise one or more electromagnetic wave emitting diodes or a scanning laser system, which may operate in the visual, infrared or other portion of the electromagnetic spectrum. In the latter case, a single photo diode can be used as the receiving device.

The electromagnetic wave emitting device may be designed to modulate the electromagnetic waves with a wavelength between about 1 foot and 20 feet and direct the electromagnetic waves into a plane substantially parallel to a plane in which the aperture is situated, which would be appropriate for substantially planar apertures, e.g., for sliding doors or windows in vehicles. For non-planar apertures, an appropriately shaped mirror or lens or a two-dimensional receiver or scanner can be used.

A method for detecting the presence of an object in an aperture in accordance with the invention comprises the steps of directing illuminating electromagnetic waves toward at least a portion of a frame defining the aperture, modulating the illuminating electromagnetic waves, providing a device for receiving electromagnetic waves reflected from an opposite part of the frame, and detecting the presence of an obstacle in the aperture by measuring a phase change between the modulated electromagnetic waves and the reflected electromagnetic waves. The presence of an obstacle in the aperture causes a variation in the phase change from a situation where an obstacle is not present. Thus, as in the system described above, a reference phase change, or a reference phase change function (phase change expressed as a function of the location along the edge of the frame defining the aperture), is obtained by measuring the phase change between the modulated electromagnetic wave and the reflected electromagnetic wave when an obstacle is known not to be present in the aperture. Detection of the presence of an obstacle is facilitated by a comparison of the measured phase change to the reference phase change or reference phase change function. The properties of the system described above can be utilized in the method in accordance with the invention.

Another system for detecting the presence of an object in an aperture comprises an electromagnetic pulse emitting mechanism for emitting an electromagnetic pulse and directing the electromagnetic pulse from at least one edge of a frame defining the aperture, a receiver for receiving reflected electromagnetic waves from the electromagnetic pulse and a processor or similar mechanism for measuring a time of flight between the emission of the electromagnetic pulse and the reception of the reflected electromagnetic waves. The presence of an obstacle in the aperture causes a variation in the time of flight from a reference time of flight in a situation where an obstacle is not present in the aperture.

The electromagnetic pulse emitting mechanism may comprise at least one light emitting diode and/or be structured and arranged to direct the electromagnetic pulse into a plane substantially parallel to a plane in which the aperture is situated. The electromagnetic pulse emitting mechanism and receiver may be located together in the frame defining the aperture.

Another method for detecting the presence of an object in an aperture comprises the steps of transmitting a coded signal toward at least a portion of a frame defining the aperture, providing a mechanism for receiving the coded signal reflected from the portion of the frame, and detecting the presence of an obstacle in the aperture by measuring the time of flight between the transmission of the coded signal and the reception of the coded signal using correlation. The presence of an obstacle in the aperture causes a variation in the time of flight from a situation where an obstacle is not present.

The coded signal may be a phase or amplitude modulated carrier wave or an individual pulse.

In a preferred embodiment, a reference time of flight or reference time of flight function is obtained by measuring the time of flight between the transmitted coded signal and the received coded signal when an obstacle is known not to be present in the aperture. As such, detection of the presence of an obstacle in the aperture may entail comparing the reference time of flight or reference time of flight function to the measured time of flight whereby a difference between the measured time of flight and the reference time of flight or reference time of flight function is indicative of the presence of an object in the aperture.

The mechanism for receiving the coded signal may be a linear CMOS array arranged in the frame of the aperture, a one-dimensional camera or a single photo diode.

Transmission of the coded signal may be achieved by arranging at least one electromagnetic wave emitting diode in the frame of the aperture, arranging a plurality of electromagnetic wave emitting diodes in the frame of the aperture or directing a laser beam and moving the laser beam to scan across at least a portion of the aperture.

15.5 Weight, Biometrics

One embodiment of the present invention is a seat pressure weight measuring apparatus for measuring the pressure applied by or weight of an occupying item of the seat wherein a load sensor is installed at at least one location where the seat is attached to the vehicle body, for measuring a part of the load applied to the seat including the seat back and the sitting surface of the seat.

According to this embodiment of the invention, because a load sensor can be installed only at a single location of the seat, the production cost and the assembling/wiring cost may be reduced in comparison with the related art.

An object of the seat weight measuring apparatus stated herein is basically to measure the pressure applied by or weight of the occupying item of the seat. Therefore, the apparatus for measuring only the weight of the passenger by canceling the net weight of the seat is included as an optional feature in the seat weight measuring apparatus in accordance with the invention.

The seat pressure or weight measuring apparatus according to another embodiment of the present invention is a seat weight measuring apparatus for measuring the pressure applied by or weight of an occupying item of the seat comprising a load sensor installed at at least one of the left and right seat frames at a portion of the seat at which the seat is fixed to the vehicle body.

The seat pressure or weight measuring apparatus of the present invention may further comprise a position sensor for detecting the position of occupying item of the seat. Considering the result detected by the position sensor makes the result detected by the load sensor more accurate.

A weight sensor for determining the pressure applied by or weight of an occupant of a seat in accordance with the invention includes a bladder arranged in a seat portion of the seat and including material or structure arranged in an interior for constraining fluid flow therein, and one or more transducers for measuring the pressure of the fluid in the interior of the bladder. The material or structure could be open cell foam. The bladder may include one or more chambers and if more than one chamber is provided, each chamber may be arranged at a different location in the seat portion of the seat.

An apparatus for determining the pressure or weight distribution of the occupant in accordance with the invention includes the pressure or weight sensor described above, in any of the various embodiments, with the bladder including several chamber and multiple transducers with each transducer being associated with a respective chamber so that weight distribution of the occupant is obtained from the pressure measurements of the transducers.

A method for determining the pressure applied by or weight of an occupant of an automotive seat in accordance with the invention involves arranging a bladder having at least one chamber in a seat portion of the seat, measuring the pressure in each chamber and deriving the weight of the occupant based on the measured pressure. The pressure in each chamber may be measured by a respective transducer associated therewith. The pressure or weight distribution of the occupant, the center of gravity of the occupant and/or the position of the occupant can be determined based on the pressure measured by the transducer(s). In one specific embodiment, the bladder is arranged in a container and fluid flow between the bladder and the container is permitted and optionally regulated, for example, via an adjustable orifice between the bladder and the container.

A vehicle seat in accordance with the invention includes a seat portion including a container having an interior containing fluid and a mechanism, material or structure therein to restrict flow of the fluid from one portion of the interior to another portion of the interior, a back portion arranged at an angle to the seat portion, and a measurement system arranged to obtain an indication of the pressure applied by or weight of the occupant when present on the seat portion based at least in part on the pressure of the fluid in the container.

In another vehicle seat in accordance with the invention, a container in the seat portion has an interior containing fluid and partitioned into multiple sections between which the fluid flows as a function of pressure applied to the seat portion. A measurement system obtains an indication of the pressure applied by or weight of the occupant when present on the seat portion based at least in part on the pressure of the fluid in the container. The container may be partitioned into an inner bladder and an outer container. In this case, the inner bladder may include an orifice leading to the outer container which has an adjustable size, and a control circuit controls the amount of opening of the orifice to thereby regulate fluid flow and pressure in and between the inner bladder and the outer container.

In another embodiment of a seat for a vehicle, the seat portion includes a bladder having a fluid-containing interior and is mounted by a mounting structure to a floor pan of the vehicle. A measurement system is associated with the bladder and arranged to obtain an indication of the pressure applied by or weight of the occupant when present on the seat portion based at least in part on the pressure of the fluid in the bladder.

A control system for controlling vehicle components based on occupancy of a seat as reflected by analysis of the pressure applied to or weight of the seat is also disclosed which and includes a bladder having at least one chamber and arranged in a seat portion of the seat; a measurement system for measuring the pressure in the chamber(s), one or more adjustment systems arranged to adjust one or more components in the vehicle and a processor coupled to the measurement system and to the adjustment system for determining an adjustment for the component(s) by the adjustment system based at least in part on the pressure measured by the measurement system. The adjustment system may be a system for adjusting deployment of an occupant restraint device, such as an airbag. In this case, the deployment adjustment system is arranged to control flow of gas into an airbag, flow of gas out of an airbag, rate of generation of gas and/or amount of generated gas. The adjustment system could also be a system for adjusting the seat, e.g., one or more motors for moving the seat, a system for adjusting the steering wheel, e.g., a motor coupled to the steering wheel, a system for adjusting a pedal, e.g., a motor coupled to the pedal.

The weight sensor arrangement can comprise a spring system arranged underneath a seat cushion and a sensor arranged in association with the spring system for generating a signal based on downward movement of the cushion caused by occupancy of the seat which is indicative of the weight of the occupying item. The sensor may be a displacement sensor structured and arranged to measure displacement of the spring system caused by occupancy of the seat. Such a sensor can comprise a spring retained at both ends and which is tensioned upon downward movement of the spring system and a measuring unit for measuring a force in the spring indicative of weight of the occupying item. The measuring unit can comprise a strain gage for measuring strain of the spring or a force-measuring device.

The sensor may also comprise a support, a cable retained at one end by the support and a length-measuring device arranged at an opposite end of the cable for measuring elongation of the cable indicative of weight of the occupying item. The sensor can also comprises one or more SAW strain gages and/or structured and arranged to measure a physical state of the spring system. If a bladder weight sensor is used, the pressure sensor can be a SAW based pressure sensor.

Furthermore, disclosed herein is a vehicle seat comprises a cushion defining a surface adapted to support an occupying item, a spring system arranged underneath the cushion and a sensor arranged in association with the spring system for generating a signal based on downward movement of the cushion and/or spring system caused by occupancy of the seat which is indicative of the weight of the occupying item. The spring system may be in contact with the sensor. The sensor may be a displacement sensor structured and arranged to measure displacement of the spring system caused by occupancy of the seat. In the alternative, the sensor may be designed to measure deflection of a bottom of the cushion, e.g., placed on the bottom of the cushion. Instead of a displacement sensor, the sensor can comprise a spring retained at both ends and which is tensioned upon downward movement of the spring system and a measuring unit for measuring a force in the spring indicative of weight of the occupying item. Non-limiting constructions of the measuring unit include a strain gage for measuring strain of the spring or the measuring unit can comprise a force measuring device. The sensor can also comprises a support, a cable retained at one end by the support and a length-measuring device arranged at an opposite end of the cable for measuring elongation of the cable indicative of weight of the occupying item. In this case, the length measuring device may comprises a cylinder, a rod arranged in the cylinder and connected to the opposite end of the cable, a spring arranged in the cylinder and connected to the rod to resist elongation of the cable and windings arranged in the cylinder. The amount of coupling between the windings provides an indication of the extent of elongation of the cable. A strain gage can also be used to measure the change in length of the cable. In one particular embodiment, the sensor comprises one or more strain gages structured and arranged to measure a physical state of the spring system or the seat. Electrical connections such as wires connect the strain gage (s) to the control system. Each strain gage transducer may incorporate signal conditioning circuitry and an analog to digital converter such that the measured strain is output as a digital signal. Alternately, a surface acoustical wave (SAW) strain gage can be used in place of conventional wire, foil or silicon strain gages and the strain measured either wirelessly or by a wire connection. For SAW strain gages, the electronic signal conditioning can be associated directly with the gage or remotely in an electronic control module as desired.

In a method for measuring weight of an occupying item on a seat cushion of a vehicle, a spring system is arranged underneath the cushion and a sensor is arranged in association with the cushion for generating a signal based on downward movement of the cushion and/or spring system caused by the occupying item which is indicative of the weight of the occupying item. The particular constructions of the spring system and sensor discussed above can be implemented in the method.

Another embodiment of a weight sensor system comprises a spring system adapted to be arranged underneath the cushion and extend between the supports and a sensor arranged in association with the spring system for generating a signal indicative of the weight applied to the cushion based on downward movement of the cushion and/or spring system caused by the weight applied to the seat. The particular constructions of the spring system and sensor discussed above can be implemented in this embodiment.

An embodiment of a vehicle including an arrangement for controlling a component based on an occupying item of the vehicle comprises a cushion defining a surface adapted to support the occupying item, a spring system arranged underneath the cushion, a sensor arranged in association with the spring system for generating a signal indicative of the weight of the occupying item based on downward movement of the cushion and/or spring system caused by occupancy of the seat and a processor coupled to the sensor for receiving the signal indicative of the weight of the occupying item and generating a control signal for controlling the component. The particular constructions of the spring system and sensor discussed above can be implemented in this embodiment. The component may be an airbag module or several airbag modules, or any other type of occupant protection or restraint device.

A method for controlling a component in a vehicle based on an occupying item comprises the steps of arranging a spring system arranged underneath a cushion on which the occupying item may rest, arranging a sensor in association with the cushion for generating a signal based on downward movement of the cushion and/or spring system caused by the occupying item which is indicative of the weight of the occupying item, and controlling the component based on the signal indicative of the weight of the occupying item. The particular constructions of the spring system and sensor discussed above can be implemented in this method.

In one weight measuring method in accordance with the invention disclosed herein, at least one strain gage transducer is mounted at a respective location on the support structure and provides a measurement of the strain of the support structure at that location, and the weight of the occupying item of the seat is determined based on the strain of the support structure measured by the strain gage transducer(s). In another method, the seat includes the slide mechanisms for mounting the seat to a substrate and bolts for mounting the seat to the slide mechanisms, the pressure exerted on the seat is measured by at least one pressure sensor arranged between one of the slide mechanisms and the seat. Each pressure sensor typically comprises first and second layers of shock absorbing material spaced from one another and a pressure sensitive material interposed between the first and second layers of shock absorbing material. The weight of the occupying item of the seat is determined based on the pressure measured by the at least one pressure sensor. In still another method for measuring the weight of an occupying item of a seat, a load cell is mounted between the seat and a substrate on which the seat is supported. The load cell includes a member and a strain gage arranged thereon to measure tensile strain therein caused by weight of an occupying item of the seat. The weight of the occupying item of the seat is determined based on the strain in the member measured by the strain gage. Naturally, the load cell can be incorporated at other locations in the seat support structure and need not be between the seat and substrate. In such a case, however, the seat would need to be especially designed for that particular mounting location. The seat would then become the weight measuring device.

Disclosed herein are apparatus for measuring the weight of an occupying item of a seat including at least one strain gage transducer, each mounted at a respective location on a support structure of the seat and arranged to provide a measurement of the strain of the support structure thereat. A control system is coupled to the strain gage transducer(s) for determining the weight of the occupying item of the seat based on the strain of the support structure measured by the strain gage transducer (s). The support structure of the seat is mounted to a substrate such as a floor pan of a motor vehicle. Electrical connection such as wires connect the strain gage transducer(s) to the control system. Each strain gage transducer may incorporate signal conditioning circuitry and an analog to digital converter such that the measured strain is output as a digital signal. The positioning of the strain gage transducer(s) depends in large part on the actual construction of the support structure of the seat. Thus, when the support structure comprises two elongate slide mechanisms adapted to be mounted on the substrate and support members for coupling the seat to the slide mechanisms, several strain gage transducers may be used, each arranged on a respective support member. If the support structure further includes a slide member, another strain gage transducer may be mounted thereon. It is advantageous to increase the accuracy of the strain gage transducers and/or concentrating the strain caused by occupancy of the seat and this may be accomplished, for example, by forming a support member from first and second tubes having longitudinally opposed ends and a third tube overlying the opposed ends of the first and second tubes and connected to the first and second tubes whereby a strain gage transducer is arranged on the third tube. Naturally, other structural shapes may be used in place of one or more of the tubes.

Another disclosed embodiment of an apparatus for measuring the weight of an occupying item of a seat includes a load cell adapted to be mounted to the seat and to a substrate on which the seat is supported. The load cell includes a member and a strain gage arranged thereon to measure tensile (or compression) strain in the member caused by weight of an occupying item of the seat. A control system is coupled to the strain gage for determining the weight of an occupying item of the seat based on the strain in the member measured by the strain gage. If the member is a beam and the strain gage includes two strain sensing elements, then one strain-sensing element is arranged in a longitudinal direction of the beam and the other is arranged in a transverse direction of the beam. If four strain sensing elements are present, a first pair is arranged in a longitudinal direction of the beam and a second pair is arranged in a transverse direction of the beam. The member may be a tube in which case, a strain-sensing element is arranged on the tube to measure compressive strain in the tube and another strain sensing element is arranged on the tube to measure tensile strain in the tube. The member may also be an elongate torsion bar mounted at its ends to the substrate. In this case, the load cell includes a lever arranged between the ends of the torsion bar and connected to the seat such that a torque is imparted to the torsion bar upon weight being exerted on the seat. The strain gage thus includes a torsional strain-sensing element.

In a method for measuring weight of an occupying item in a vehicle seat disclosed herein, support members are interposed between the seat and slide mechanisms which enable movement of the seat and such that at least a portion of the weight of the occupying item passes through the support members, at least one of the support members is provided with a region having a lower stiffness than a remaining region, at least one strain gage transducer is arranged in the lower stiffness region of the support member to measure strain thereof and an indication of the weight of the occupying item is obtained based at least in part on the strain of the lower stiffness region of the support member measured by the strain gage transducer(s). The support member(s) may be formed by providing an elongate member and cutting around the circumference of the elongate member to thereby obtain the lower stiffness region or by other means.

A vehicular arrangement for controlling a component based on an occupying item of the vehicle disclosed herein comprises a seat defining a surface adapted to contact the occupying item, slide mechanisms coupled to the seat for enabling movement of the seat, support members for supporting the seat on the slide mechanisms such that at least a portion of the weight of the occupying item passes through the support members. At least one of the support members has a region with a lower stiffness than a remaining region of the support member. A strain gage measurement system generates a signal indicative of the weight of the occupying item, and a processor coupled to the strain gage measurement system receives the signal indicative of the weight of the occupying item and generates a control signal for controlling the component. The strain gage measurement system includes at least one strain gage transducer arranged in the lower stiffness region of the support member to measure strain thereof. The component can be any vehicular component, system or subsystem which can utilize the weight of the occupying item of the seat for control, e.g., an airbag system.

Another method for controlling a component in a vehicle based on an occupying item disclosed herein comprises the steps of interposing support members between a seat on which the occupying item may rest and slide mechanisms which enable movement of the seat and such that at least a portion of the weight of the occupying item passes through the support members, providing at least one of the support members with a region having a lower stiffness than a remaining region, arranging at least one strain gage transducer in the lower stiffness region of the support member to measure strain thereof, and controlling the component based at least in part on the strain of the lower stiffness region of the support member measured by the strain gage transducer(s). If the component is an airbag, the step of controlling the component can entail controlling the rate of deployment of the airbag, the start time of deployment, the inflation rate of the airbag, the rate of gas removal from the airbag and/or the maximum pressure in the airbag.

In another weight measuring system, one or more of the connecting members which connect the seat to the slide mechanisms comprises an elongate stud having first and second threaded end regions and an unthreaded intermediate region between the first and second threaded end regions, the first threaded end region engaging the seat and the second threaded end region engaging one of the slide mechanisms, and a strain gage measurement system arranged on the unthreaded intermediate region for measuring strain in the connecting member at the unthreaded intermediate region which is indicative of weight being applied by an occupying item in the seat. The strain gage measurement system may comprises a SAW strain gage and associated circuitry and electric components capable of receiving a wave and transmitting a wave modified by virtue of the strain in the connecting member, e.g., an antenna. The connecting member can be made of a non-metallic, composite material to avoid problems with the electromagnetic wave propagation. An interrogator may be provided for communicating wirelessly with the SAW strain gage measurement system.

Further, disclosed herein is a vehicle seat structure which comprises a seat or cushion defining a surface adapted to contact an occupying item, slide mechanisms coupled to the seat for enabling movement of the seat, support members for supporting the seat on the slide mechanisms such that at least a portion of the weight of the occupying item passes through the support members. At least one of the support members has a region with a lower stiffness than a remaining region of the support member. The remaining regions of the support member are not necessarily the entire remaining portions of the support member and they may be multiple regions with a lower stiffness than other regions. A strain gage measurement system generates a signal indicative of the weight of the occupying item. The strain gage measurement system includes at least one strain gage transducer arranged in a lower stiffness region of the support member to measure strain thereof. The support member(s) may be tubular whereby the lower stiffness region has a smaller diameter than a diameter of the remaining region. If the support member is not tubular, the lower stiffness region may have a smaller circumference than a circumference of a remaining region of the support member. Each support member may have a first end connected to one of the slide mechanisms and a second end connected to the seat. Electrical connections, such as wires or electromagnetic waves which transfer power wirelessly, connect the strain gage transducer(s) to the control system. Each strain gage transducer may incorporate signal conditioning circuitry and an analog to digital converter such that the measured strain is output as a digital signal. Alternately, a surface acoustical wave (SAW) strain gage can be used in place of conventional wire, foil or silicon strain gages and the strain transmitted either wirelessly or by a wire connection. For SAW strain gages, the electronic signal conditioning can be associated directly with the gage or remotely in an electronic control module as desired. The strain gage measurement system preferably includes at least one additional strain gage transducer arranged on another support member and a control system coupled to the strain gage transducers for receiving the strain measured by the strain gage transducers and providing the signal indicative of the weight of the occupying item.

Disclosed herein is a vehicle seat structure comprising a seat defining a surface adapted to contact an occupying item and a weight sensor arrangement arranged in connection with the seat for providing an indication of the weight applied by the occupying item to the surface of the seat. The weight sensor arrangement includes conductive members spaced apart from one another such that a capacitance develops between opposed ones of the conductive members upon incorporation of the conductive members in an electrical circuit. The capacitance is based on the space between the conductive members which varies in relation to the weight applied by the occupying item to the surface of the seat. The weight sensor arrangement may include a pair of non-metallic substrates and a layer of material situated between the non-metallic substrates, possibly a compressible material. The conductive members may comprise a first electrode arranged on a first side of the material layer and a second electrode arranged on a second side of the material layer. The weight sensor arrangement may be arranged in connection with slide mechanisms adapted to support the seat on a substrate of the vehicle while enabling movement of the seat, possibly between the slide mechanisms and the seat. If bolts attach the seat to the slide mechanisms, the conductive members may be annular and placed on the bolts.

Another embodiment of a seat structure comprises a seat defining a surface adapted to contact an occupying item, slide mechanisms adapted to support the seat on a substrate of the vehicle while enabling movement of the seat and a weight sensor arrangement interposed between the seat and the slide mechanisms for measuring displacement of the seat which provides an indication of the weight applied by the occupying item to the seat. The weight sensor arrangement can include a capacitance sensor which measures a capacitance which varies in relation to the displacement of the seat. The capacitance sensor can include conductive members spaced apart from one another such that a capacitance develops between opposed ones of the conductive members upon incorporation of the members in an electrical circuit, the capacitance being based on the space between the members which varies in relation to the weight applied by the occupying item to the seat.

Another disclosed embodiment of an apparatus for measuring the weight of an occupying item of a seat includes slide mechanisms for mounting the seat to a substrate and bolts for mounting the seat to the slide mechanisms, the apparatus comprises at least one pressure sensor arranged between one of the slide mechanisms and the seat for measuring pressure exerted on the seat. Each pressure sensor may comprise first and second layers of shock absorbing material spaced from one another and a pressure sensitive material interposed between the first and second layers of shock absorbing material. A control system is coupled to the pressure sensitive material for determining the weight of the occupying item of the seat based on the pressure measured by the at least one pressure sensor. The pressure sensitive material may include an electrode on upper and lower faces thereof.

One embodiment of an apparatus in accordance with invention includes a first measuring system for measuring a first morphological characteristic of the occupying item of the seat and a second measuring system for measuring a second morphological characteristic of the occupying item. Morphological characteristics include the weight of the occupying item, the height of the occupying item from the bottom portion of the seat and if the occupying item is a human, the arm length, head diameter and leg length. The apparatus also includes a processor for receiving the output of the first and second measuring systems and for processing the outputs to evaluate a seated-state based on the outputs. The measuring systems described herein, as well as any other conventional measuring systems, may be used in the invention to measure the morphological characteristics of the occupying item.

The weight measuring apparatus described herein may be used in apparatus and methods for adjusting a vehicle component, although other weight measuring apparatus may also be used in the vehicle component adjusting systems and methods described herein.

One embodiment of such an apparatus in accordance with invention includes a first measuring system for measuring a first morphological characteristic of the occupying item of the seat and a second measuring system for measuring a second morphological characteristic of the occupying item. Morphological characteristics include the weight of the occupying item, the height of the occupying item from the bottom portion of the seat and if the occupying item is a human, the arm length, head diameter, facial features and leg length. The apparatus also includes processor means for receiving the output of the first and second measuring systems and for processing the outputs to evaluate a seated-state based on the outputs. The measuring systems described herein, as well as any other conventional measuring systems, may be used in the invention to measure the morphological characteristics of the occupying item.

Furthermore, although the weight measuring system and apparatus described herein are described for particular use in a vehicle, it is of course possible to apply the same constructions to measure the weight of an occupying item on other seats in non-vehicular applications, if a weight measurement is desired for some purpose.

Methods and arrangements for detecting motion of objects in a vehicle, and specifically motion of an occupant indicative of a heartbeat, are also disclosed. Detection of the heartbeat of occupants is useful to provide an indication that a seat is occupied and can also prevent infant suffocation by automatically opening a vent or window when an infant's heartbeat is detected anywhere in the vehicle, e.g., either in the passenger compartment or the trunk, and the temperature in the vehicle is rising. Further, detection of motion or a heartbeat in the passenger compartment of the vehicle can be used to warn a driver that someone is hiding in the vehicle.

The determination of the presence of human beings or other life forms in the vehicle can also used in various methods and arrangements for, e.g., controlling deployment of occupant restraint devices in the event of a vehicle crash, controlling heating and air-conditioning systems to optimize the comfort for any occupants, controlling an entertainment system as desired by the occupants, controlling a glare prevention device for the occupants, preventing accidents by a driver who is unable to safely drive the vehicle and enabling an effective and optimal response in the event of a crash (either oral directions to be communicated to the occupants or the dispatch of personnel to aid the occupants). Thus, one objective of the invention is to obtain information about occupancy of a vehicle and convey this information to remotely situated assistance personnel to optimize their response to a crash involving the vehicle and/or enable proper assistance to be rendered to the occupants after the crash.

In order to achieve at least some of the above-listed objects, a vehicle including a system for analyzing motion of occupants of the vehicle in accordance with the invention comprises a wave-receiving system for receiving waves from spaces above seats of the vehicle in which the occupants would normally be situated and a processor coupled to the wave-receiving system for determining movement of any occupants based on the waves received by the wave-receiving system. The wave-receiving system may be arranged on a rear view mirror assembly of the vehicle, in a headliner, roof, ceiling or windshield header of the vehicle, in an A-Pillar or B-Pillar of the vehicle, above a top surface of an instrument panel of the vehicle, and in connection with a steering wheel of the vehicle or an airbag module of the vehicle. The wave-receiving system may comprise a single axis antenna for receiving waves from spaces above a plurality of the seats in the vehicle or means for generating a scanning radar beam.

The processor can be programmed to determine the location of at least one of the head, chest and torso of any occupants. If it determines the location of the head of any occupants, it could monitor the position of the head of any occupants to determine whether the occupant is falling asleep or becoming incapacitated. If it determines a position of any occupants at several time intervals, it could enable a determination of movement of any occupants to be obtained based on differences between the position of any occupants over time.

A vehicle including a system for operating the vehicle by a driver in accordance with the invention comprises a wave-receiving system for receiving waves from a space above a seat in which the driver is situated, a processor coupled to the wave-receiving system for determining movement of the driver based on the waves received by the wave-receiving system and ascertaining whether the driver has become unable to operate the vehicle and a reactive system coupled to the processor for taking action to effect a change in the operation of the vehicle upon a determination that the driver has become unable to operate the vehicle. The wave-receiving system may be arranged on or adjacent a rear view mirror assembly of the vehicle, in a headliner, roof, ceiling or windshield header of the vehicle, in an A-Pillar or B-Pillar of the vehicle, above a top surface of an instrument panel of the vehicle, and in connection with a steering wheel of the vehicle or an airbag module of the vehicle.

A method for regulating operation of the vehicle by a driver in accordance with invention comprises the steps of receiving waves from a space above a seat in which the driver is situated, determining movement of the driver based on the received waves, ascertaining whether the driver has become unable to operate the vehicle based on any movement of the driver or a part of the driver, and taking action to effect a change in the operation of the vehicle upon a determination that the driver has become unable to operate the vehicle. Such action can be the activation of an alarm, a warning device, a steering wheel correction device and/or a steering wheel friction increasing device which would make it harder to turn the steering wheel.

In enhanced embodiments, a heartbeat or animal life state sensor may be provided for detecting the heartbeat of the occupant if present or animal life state and generating an output representative thereof. The processor means additionally receives this output and evaluates the seated-state of the seat based in part thereon. In addition to or instead of such a heartbeat or animal life state sensor, a capacitive or electric field sensor and/or a motion sensor may be provided. The capacitive sensor is a particular implementation of an electromagnetic wave sensor that detects the presence of the occupant and generates an output representative of the presence of the occupant based on its dielectric properties. The motion sensor detects movement of the occupant and generates an output representative thereof. These outputs are provided to the processor means for possible use in the evaluation of the seated-state of the seat.

The portion of the apparatus which includes the ultrasonic, optical or non-optical electromagnetic sensors, weight measuring means and processor means which evaluate the occupancy of the seat based on the measured weight of the seat and its contents and the returned waves from the ultrasonic, optical or non-optical electromagnetic sensors may be considered to constitute a seated-state detecting unit.

The seated-state detecting unit may further comprise a seat position-detecting sensor. This sensor determines the position of the seat in the forward and aft direction. In this case, the evaluation circuit evaluates the seated-state, based on a correlation function obtained from outputs of the ultrasonic sensors, an output of the weight sensor(s), and an output of the seat position detecting sensor. With this structure, there is the advantage that the identification between the flat configuration of a detected surface in a state where a passenger is not sitting in the seat and the flat configuration of a detected surface which is detected when a seat is slid backwards by the amount of the thickness of a passenger, that is, of identification of whether a passenger seat is vacant or occupied by a passenger, can be reliably performed.

Another control system for controlling a part of the vehicle based on occupancy of the seat in accordance with the invention comprises a plurality of strain gages mounted in connection with the seat, each measuring strain of a respective mounting location caused by occupancy of the seat, and a processor coupled to the strain gages and arranged to determine the weight of an occupying item based on the strain measurements from the strain gages over a period of time, i.e., dynamic measurements. The processor controls the part based at least in part on the determined weight of the occupying item of the seat. The processor can also determine motion of the occupying item of the seat based on the strain measurements from the strain gages over the period of time. One or more accelerometers may be mounted on the vehicle for measuring acceleration in which case, the processor may control the part based at least in part on the determined weight of the occupying item of the seat and the acceleration measured by the accelerometer(s).

By comparing the output of various sensors in the vehicle, it is possible to determine activities that are affecting parts of the vehicle while not affecting other parts. For example, by monitoring the vertical accelerations of various parts of the vehicle and comparing these accelerations with the output of strain gage load cells placed on the seat support structure, a characterization can be made of the occupancy of the seat. Not only can the weight of an object occupying the seat be determined, but also the gross motion of such an object can be ascertained and thereby an assessment can be made as to whether the object is a life form such as a human being. Strain gage weight sensors are disclosed in U.S. patent application Ser. No. 09/193,209 filed Nov. 17, 1998 (corresponding to International Publication No. WO 00/29257). In particular, the inventors contemplate the combination of all of the ideas expressed in this patent application with those expressed in the current invention.

15.6 Telematics and Diagnostics

A vehicle equipped in accordance with the invention includes an occupant sensing system arranged to determine at least one property or characteristic of occupancy of the vehicle constituting information about the occupancy of the vehicle, a crash sensor system for determining when the vehicle experiences a crash (one or more crash sensors) and a communications device coupled to the occupant sensing system and the crash sensor system and arranged to enable a communications channel to be established between the vehicle and a remote facility after the vehicle is determined to have experienced a crash. In this manner, information about the occupancy of the vehicle determined by the occupant sensing system can be transmitted via the communications channel to the remote facility. The communications device may comprise a cellular telephone system including an antenna or other similar communication-enabling device.

The occupant sensing system may include a plurality of the same or different sensors, for example, an image-obtaining sensor for obtaining images of the passenger compartment of the vehicle whereby the communications device transmits the images. If a crash sensor system is provided for determining when the vehicle experiences a crash, the image-obtaining sensor may be designed to obtain images including the driver of the vehicle with the communications device being coupled to the crash sensor system and arranged to transmit images of the passenger compartment just prior to the crash once the crash sensor system has determined that the vehicle has experienced a crash, during the crash once the crash sensor system has determined that the vehicle has experienced a crash and/or after the crash once the crash sensor system has determined that the vehicle has experienced a crash.

The occupant sensing system may also include at least one motion sensor with the communications device being arranged to transmit information about any motion of occupants in the passenger compartment as part of the information about the occupancy of the vehicle. This would help to assess whether the occupants are conscious after a crash and mobile.

The occupant sensing system may also include an arrangement for determining the number of occupants in the vehicle with the communications device being arranged to transmit the number of occupants in the passenger compartment as part of the information about the occupancy of the vehicle. The arrangement may include receivers arranged to receive waves, energy or radiation from all of the seating locations in the passenger compartment and a processor arranged to determine the number of occupants in the passenger compartment from the received waves, energy or radiation. Waves, energy or radiation may be in the form of ultrasonic waves, electromagnetic waves, electric fields, capacitive fields and the like. The arrangement may also include heartbeat sensors, weight sensors associated with seats in the vehicle and/or chemical sensors.

The processor can be arranged to determine the condition of any occupants in the vehicle. When the occupant sensing system comprises receivers arranged to receive waves, energy or radiation from the passenger compartment, the processor can determine the condition of any occupants in the vehicle based on the received waves, energy or radiation. In this case, the communications device transmits the condition of the occupants as part of the information about the occupancy of the vehicle.

In another embodiment, at least one vehicle sensor is provided, each sensing a state of the vehicle or a state of a component of the vehicle. The communications device is coupled, wired or wirelessly, directly or indirectly, to each vehicle sensor and transmits the state of the vehicle or the state of the component of the vehicle.

One or more environment sensors can be provided, each sensing a state of the environment around the vehicle. The communications device is coupled, wired or wirelessly, directly or indirectly, to each environment sensor and transmits information about the environment of the vehicle. The environment sensor may be an optical or other image-obtaining sensor for obtaining images of the environment around the vehicle. The environment sensor can also be a road condition sensor, an ambient temperature sensor, an internal temperature sensor, a clock, and a location sensor for sensing the location of objects around the vehicle such as the sun, lights and other vehicles, a sensor for sensing the presence of rain, snow, sleet and fog, the presence and location of potholes, ice and snow cover, the presence and status of the road and traffic, sensors which obtain images of the environment surrounding the vehicle, blind spot detectors which provides data on the blind spot of the driver, automatic cruise control sensors that can provide images of vehicles in front of the vehicle and radar devices which provide the position of other vehicles and objects relative to the vehicle.

When a crash sensor system for determining when the vehicle experiences a crash is coupled to the system in accordance with the invention, the communications device being coupled to the crash sensor system and arranged to transmit information about the occupancy of the vehicle upon the crash sensor system determining that the vehicle has experienced a crash.

Optionally, a memory unit is coupled to the occupant sensing system and the communications device and receives the information about the occupancy of the vehicle from the occupant sensing system and stores the information. The communications device interrogates the memory unit to obtain the stored information about the occupancy of the vehicle to enable transmission thereof.

A method for monitoring and providing assistance to a vehicle in accordance with the invention comprises the steps of determining at least one property or characteristic of occupancy of the vehicle constituting information about the occupancy of the vehicle, determining when the vehicle experiences a crash, establishing a communications channel between the vehicle and a remote facility only after the vehicle is determined to have experienced a crash and transmitting the information about the occupancy of the vehicle to a remote location after the vehicle is determined to have experienced a crash. At the remote facility, the information about the occupancy of the vehicle received from the vehicle is considered and assistance is directed to the vehicle based on the transmitted information.

Additional enhancements of the method include obtaining images of the passenger compartment of the vehicle and transmitting the images of the passenger compartment after the crash. It is possible to determine when the vehicle experiences a crash in which case, images including the driver of the vehicle just prior to the crash are obtained and transmitted once it has determined that the vehicle has experienced a crash.

Determining the properties or characteristics of occupancy of the vehicle may entail determining any motion in the passenger compartment of the vehicle, whereby information about any motion of occupants in the passenger compartment is transmitted as part of the information about the occupancy of the vehicle. In addition to or instead of motion, determining the property or characteristic of occupancy of the vehicle may entail determining the number of occupants in the passenger compartment, the number of occupants in the passenger compartment being transmitted as part of the information about the occupancy of the vehicle. To this end, the number of occupants in the vehicle can be determined by receiving waves, energy or radiation from all of the seating locations in the passenger compartment and determining the number of occupants in the passenger compartment from the received waves, energy or radiation. The number of occupants in the vehicle can also be determined by arranging at least one heartbeat sensor in the vehicle to detect the presence of heartbeats in the vehicle such that the number of occupants is determinable from the number of detected heartbeat signals. The number of occupants in the vehicle can also be determined by arranging at least one weight sensor system in the vehicle to detect the weight and/or weight distribution applied to the seats such that the number of occupants is determinable from the detected weight and/or weight distribution. Further, the number of occupants in the vehicle can be determined by arranging at least one temperature sensor to measure temperature in the passenger compartment whereby the number of occupants is determinable from the measured temperature in the passenger compartment. The number of occupants in the vehicle can also be determined by arranging at least one seatbelt buckle switch to provide an indication of the seatbelt being buckled whereby the number of occupants is determinable from the buckled state of the seatbelts. The number of occupants in the vehicle can also be determined by arranging at least one chemical sensor to provide an indication of the presence of a chemical indicative of the presence of an occupant whereby the number of occupants is determinable from the indication of the presence of the chemical indicative of the presence of an occupant.

The condition of any occupants in the vehicle can be determined based on the received waves, energy or radiation, the condition of the occupants being transmitted as part of the information about the occupancy of the vehicle. The number of human occupants can also be determined as the property or characteristic of occupancy of the vehicle.

The method can also include the steps of sensing a state of the vehicle or a state of a component of the vehicle and transmitting the state of the vehicle or the state of the component of the vehicle. Also, a state of the environment around the vehicle can be sensed and information about the environment of the vehicle transmitted.

When it is determined that the vehicle experiences a crash, information can be transmitted immediately thereafter. Optionally, a memory unit is provided to receive the information about the occupancy of the vehicle and store the information. The memory unit is interrogated, e.g., after a crash, to obtain the stored information about the occupancy of the vehicle to enable transmission thereof.

To achieve one or more of the above-listed objects, a control system and method for controlling an occupant restraint system in accordance with the invention comprise a plurality of electronic sensors mounted at different locations on the vehicle, each sensor providing a measurement related to a state thereof or a measurement related to a state of the mounting location, and a processor coupled to the sensors and arranged to diagnose the state of the vehicle based on the measurements of the sensors. The processor controls the occupant restraint system based at least in part on the diagnosed state of the vehicle in an attempt to minimize injury to an occupant. Various sensors may be used including one or more single axis acceleration sensors, double axis acceleration sensors, triaxial acceleration sensors, high dynamic range accelerometers and gyroscopes such as gyroscopes including a surface acoustic wave resonator which applies standing waves on a piezoelectric substrate. One or more sensors may include an RF response unit in which case, an RF interrogator device causes the RF response unit of to transmit a signal representative of the measurement of the sensor to the processor. A weight sensor may be coupled to a seat in the vehicle for sensing the weight of an occupying item of the seat and to the processor so that the processor controls the occupant restraint system based on the state of the vehicle and the weight of the occupying item of the seat sensed by the weight sensor.

The state of the vehicle diagnosed by the processor includes angular motion of the vehicle, a determination of a location of an impact between the vehicle and another object and/or angular acceleration. In the latter case, several sensors may be accelerometers such that the processor determines the angular acceleration of the vehicle based on the acceleration measured by the accelerometers.

The processor may be designed to forecast the severity of the impact using the force/crush properties of the vehicle at the impact location and control the occupant restraint system based at least in part on the severity of the impact. The processor may also include pattern recognition means for diagnosing the state of the vehicle. A display may be coupled to the processor for displaying an indication of the state of the vehicle. A warning device, alarm or other audible or visible signal indicator may be coupled to the processor for relaying or conveying a warning to an occupant of the vehicle relating to the state of the vehicle. A transmission device may also be coupled to the processor for transmitting a signal to a remote site relating to the state of the vehicle.

Another embodiment of a control system for controlling an occupant restraint system comprises a plurality of sensors mounted at different locations on the vehicle, each sensor providing a measurement related to a state thereof or a measurement related to a state of the mounting location and a processor coupled to the sensors and arranged to diagnose the state of the vehicle based on the measurements of the sensors. The processor is arranged to control the occupant restraint system based at least in part on the diagnosed state of the vehicle. At least two of the sensors are a single axis acceleration sensor, a dual axis acceleration sensor, a triaxial acceleration sensor or a gyroscope.

The sensors can be used in a control system for controlling a navigation system wherein the state of the vehicle diagnosed by the processor includes angular motion of the vehicle whereby angular position or orientation are derivable from the angular motion. The processor then controls the navigation system based on the angular acceleration of the vehicle.

Another method for monitoring and providing assistance to a vehicle in accordance with the invention comprises determining at least one property or characteristic of occupancy of the vehicle constituting information about the occupancy of the vehicle, determining at least one state of the vehicle or of a component of the vehicle constituting information about the operation of the vehicle, selectively establishing a communications channel between the vehicle and a remote facility and transmitting the information about the occupancy of the vehicle and the information about the operation of the vehicle to the remote facility when the communications channel is established to enable assistance to be provided to the vehicle based on the transmitted information. Thus, different recipients could receive different information, whatever information is pertinent and relevant to that recipient. Thus, selective transmission of information may entail addressing a transmission of information about the occupancy of the vehicle differently than a transmission of information about the operation of the vehicle. Moreover, at the remote facility, the information about the occupancy of the vehicle and the information about the operation of the vehicle received from the vehicle is considered and if necessary, assistance is directed to the vehicle based on the transmitted information.

In another embodiment of this method, images of the passenger compartment of the vehicle are obtained and transmitted after the crash. The images ideally include the driver of the vehicle. The images of the passenger compartment just prior to the crash can be transmitted once it has determined that the vehicle has experienced a crash. This would assist in accident reconstruction and placement of fault and liability.

The determination of a property or characteristic of occupancy of the vehicle may entail determining any motion in the passenger compartment of the vehicle, determining the number of occupants in the passenger compartment and/or determining the number of human occupants in the passenger compartment.

The determination of the number of occupants in the vehicle may be performed in a variety of ways. For example, by receiving waves, energy or radiation from all of the seating locations in the passenger compartment and determining the number of occupants in the passenger compartment from the received waves, energy or radiation, by arranging at least one heartbeat sensor in the vehicle to detect the presence of heartbeats in the vehicle such that the number of occupants is determinable from the number of detected heartbeat signals, by arranging at least one weight sensor system in the vehicle to detect the weight and/or weight distribution applied to the seats such that the number of occupants is determinable from the detected weight and/or weight distribution, by arranging at least one temperature sensor to measure temperature in the passenger compartment whereby the number of occupants is determinable from the measured temperature in the passenger compartment, by arranging at least one seatbelt buckle switch to provide an indication of the seatbelt being buckled whereby the number of occupants is determinable from the buckled state of the seatbelts, and/or by arranging at least one chemical sensor to provide an indication of the presence of a chemical indicative of the presence of an occupant whereby the number of occupants is determinable from the indication of the presence of the chemical indicative of the presence of an occupant.

The determination of a property of characteristic of occupancy of the vehicle may entail determining the condition of any occupants in the vehicle based on the received waves, energy or radiation, the condition of the occupants being transmitted as part of the information about the occupancy of the vehicle.

The method can also include the steps of sensing a state of the vehicle or a state of a component of the vehicle and transmitting the state of the vehicle or the state of the component of the vehicle. Also, a state of the environment around the vehicle can be sensed and information about the environment of the vehicle transmitted.

When it is determined that the vehicle experiences a crash, information can be transmitted immediately thereafter. Optionally, a memory unit is provided to receive the information about the occupancy of the vehicle and store the information. The memory unit is interrogated, e.g., after a crash, to obtain the stored information about the occupancy of the vehicle to enable transmission thereof.

Among the inventions disclosed herein is an arrangement for obtaining and conveying information about occupancy of a passenger compartment of a vehicle which comprises at least one occupant sensor, a generating system coupled to the occupant sensor for generating information about the occupancy of the passenger compartment based on the occupant sensor(s) and a communications device coupled to the generating system for transmitting the information about the occupancy of the passenger compartment. As such, response personnel can receive the information about the occupancy of the passenger compartment and respond appropriately, if necessary. There may be several occupant sensors and they may be, e.g., ultrasonic wave-receiving sensors, electromagnetic wave-receiving sensors, electric field sensors, antenna near field modification sensing sensors, energy absorption sensors, capacitance sensors, or combinations thereof. The information about the occupancy of the passenger compartment can include the number of occupants in the passenger compartment, as well as whether each occupant is moving non-reflexively and breathing. A transmitter may be provided for transmitting waves into the passenger compartment such that each wave-receiving sensor receives waves transmitted from the transmitter and modified by passing into and at least partially through the passenger compartment. Waves may also be from natural sources such as the sun, from lights on a vehicle or roadway, or radiation naturally emitted from the occupant or other object in the vehicle.

One or more memory units may be coupled to the generating system for storing the information about the occupancy of the passenger compartment and to the communications device. The communications device then can interrogate the memory unit(s) upon a crash of the vehicle to thereby obtain the information about the occupancy of the passenger compartment. In one particularly useful embodiment, a system for determining the health state of at least one occupant is provided, e.g., a heartbeat sensor, a motion sensor such as a micropower impulse radar sensor for detecting motion of the at least one occupant and motion sensor for determining whether the occupant(s) is/are breathing, and coupled to the communications device. The communications device can interrogate the health state determining system upon a crash of the vehicle, or some other event or even continuously, to thereby obtain and transmit the health state of the occupant (s). The health state determining system can also comprise a chemical sensor for analyzing the amount of carbon dioxide in the passenger compartment or around the at least one occupant or for detecting the presence of blood in the passenger compartment. Movement of the occupant can be determined by monitoring the weight distribution of the occupant (s), or an analysis of waves from the space occupied by the occupant(s). Each wave-receiving sensor generates a signal representative of the waves received thereby and the generating system may comprise a processor for receiving and analyzing the signal from the wave-receiving sensor in order to generate the information about the occupancy of the passenger compartment. The processor can comprise a pattern recognition system for classifying an occupant of the seat so that the information about the occupancy of the passenger compartment includes the classification of the occupant. The wave-receiving sensor may be a micropower impulse radar sensor adapted to detect motion of an occupant whereby the motion of the occupant or absence of motion of the occupant is indicative of whether the occupant is breathing. As such, the information about the occupancy of the passenger compartment generated by the generating system is an indication of whether the occupant is breathing. Also, the wave-receiving sensor may generate a signal representative of the waves received thereby and the generating system receive this signal over time and determine whether any occupants in the passenger compartment are moving. As such, the information about the occupancy of the passenger compartment generated by the generating system includes the number of moving and non-moving occupants in the passenger compartment.

A related method for obtaining and conveying information about occupancy of a passenger compartment of a vehicle comprises the steps of receiving waves from the passenger compartment, generating information about the occupancy of the passenger compartment based on the received waves, and transmitting the information about the occupancy of the passenger compartment whereby response personnel can receive the information about the occupancy of the passenger compartment. Waves may be transmitted into the passenger compartment whereby the transmitted waves are modified by passing into and at least partially through the passenger compartment and then received. The information about the occupancy of the passenger compartment may be stored in at least one memory unit which is subsequently interrogated upon a crash of the vehicle to thereby obtain the information about the occupancy of the passenger compartment and thereafter the information with or without pictures of the passenger compartment before, during and/or after a crash or other event can be sent to a remote location such as an emergency services personnel station. A signal representative of the received waves can be generated by sensors and analyzed in order to generate the information about the state of health of at least one occupant of the passenger compartment and/or to generate the information about the occupancy of the passenger compartment (i.e., determine non-reflexive movement and/or breathing indicating life). Pattern recognition techniques, e.g., a trained neural network, can be applied to analyze the signal and thereby recognize and identify any occupants of the passenger compartment. In this case, the identification of the occupants of the passenger compartment can be included into the information about the occupancy of the passenger compartment.

Among the inventions disclosed herein is an arrangement for obtaining and conveying information about occupancy of a passenger compartment of a vehicle comprises at least one wave-receiving sensor for receiving waves from the passenger compartment, generating means coupled to the wave-receiving sensor(s) for generating information about the occupancy of the passenger compartment based on the waves received by the wave-receiving sensor(s) and communications means coupled to the generating means for transmitting the information about the occupancy of the passenger compartment. As such, response personnel can receive the information about the occupancy of the passenger compartment and respond appropriately, if necessary. There may be several wave-receiving sensors and they may be, e.g., ultrasonic wave-receiving sensors, electromagnetic wave-receiving sensors, capacitance or electric field sensors, or combinations thereof. The information about the occupancy of the passenger compartment can include the number of occupants in the passenger compartment, as well as whether each occupant is moving non-reflexively and breathing. A transmitter may be provided for transmitting waves into the passenger compartment such that each wave-receiving sensor receives waves transmitted from the transmitter and modified by passing into and at least partially through the passenger compartment. One or more memory units may be coupled to the generating means for storing the information about the occupancy of the passenger compartment and to the communications means. The communications means then can interrogate the memory unit(s) upon a crash of the vehicle to thereby obtain the information about the occupancy of the passenger compartment. In one particularly useful embodiment, means for determining the health state of at least one occupant are provided, e.g., a heartbeat sensor, a motion sensor such as a micropower impulse radar sensor for detecting motion of the at least one occupant and motion sensor for determining whether the occupant(s) is/are breathing, and coupled to the communications means. The communications means can interrogate the health state determining means upon a crash of the vehicle to thereby obtain and transmit the health state of the occupant(s). The health state determining means can also comprise a chemical sensor for analyzing the amount of carbon dioxide in the passenger compartment or around the at least one occupant or for detecting the presence of blood in the passenger compartment. Movement of the occupant can be determined by monitoring the weight distribution of the occupant(s), or an analysis of waves from the space occupied by the occupant(s). Each wave-receiving sensor generates a signal representative of the waves received thereby and the generating means may comprise a processor for receiving and analyzing the signal from the wave-receiving sensor in order to generate the information about the occupancy of the passenger compartment. The processor can comprise pattern recognition means for classifying an occupant of the seat so that the information about the occupancy of the passenger compartment includes the classification of the occupant. The wave-receiving sensor may be a micropower impulse radar sensor adapted to detect motion of an occupant whereby the motion of the occupant or absence of motion of the occupant is indicative of whether the occupant is breathing. As such, the information about the occupancy of the passenger compartment generated by the generating means is an indication of whether the occupant is breathing. Also, the wave-receiving sensor may generate a signal representative of the waves received thereby and the generating means receive this signal over time and determine whether any occupants in the passenger compartment are moving. As such, the information about the occupancy of the passenger compartment generated by the generating means includes the number of moving and non-moving occupants in the passenger compartment.

A related method for obtaining and conveying information about occupancy of a passenger compartment of a vehicle comprises the steps of receiving waves from the passenger compartment, generating information about the occupancy of the passenger compartment based on the received waves, and transmitting the information about the occupancy of the passenger compartment whereby response personnel can receive the information about the occupancy of the passenger compartment. Waves may be transmitted into the passenger compartment whereby the transmitted waves are modified by passing into and at least partially through the passenger compartment and then received. The information about the occupancy of the passenger compartment may be stored in at least one memory unit which is subsequently interrogated upon a crash of the vehicle to thereby obtain the information about the occupancy of the passenger compartment. A signal representative of the received waves can be generated by sensors and analyzed in order to generate the information about the state of health of at least one occupant of the passenger compartment and/or to generate the information about the occupancy of the passenger compartment (i.e., determine non-reflexive movement and/or breathing indicating life). Pattern recognition techniques, e.g., a trained neural network, can be applied to analyze the signal and thereby recognize and identify any occupants of the passenger compartment. In this case, the identification of the occupants of the passenger compartment can be included into the information about the occupancy of the passenger compartment.

All of the above-described methods and apparatus, as well as those further described below, may be used in conjunction with one another and in combination with the methods and apparatus for optimizing the driving conditions for the occupants of the vehicle described herein.

In order to achieve some of the above-listed objects, an arrangement for obtaining and conveying information about occupants in a vehicle includes a health state determining mechanism for determining the health state of any occupants in the vehicle, and a communications mechanism coupled to the health state determining mechanism and arranged to establish a communications channel between the vehicle and a remote facility to thereby enable the determined health state of the occupants to be transmitted to the remote facility.

The health state determining mechanism may include a heartbeat sensor, a sensor for detecting motion of the occupants such as a Micropower impulse radar sensor and/or an arrangement for detecting changes in the weight distribution of the occupants, a motion sensor for determining whether the occupants are breathing, a chemical sensor for analyzing the amount of carbon dioxide in the passenger compartment or around the occupants and/or a chemical sensor for detecting the presence of blood in the passenger compartment.

The health state determining mechanism may be designed to determine whether a driver's breathing is erratic or indicative of a state in which the driver is dozing. It may also include a breath-analyzer for analyzing the alcohol content in air expelled by the driver.

The arrangement can also include an alarm or warning light which can be activated by the remote facility over the established communications channel based on analysis of the transmitted health state of the occupant.

A vehicle including the above arrangement could thus include a vehicle component or subsystem which can be activated by the remote facility over the established communications channel based on analysis of the transmitted health state of the driver. For example, when the driver is abnormally operating the vehicle as evidenced by the determined health state, the vehicle component is activated by the remote facility. The component may be an audible alarm, a visible warning light, an automatic guidance system arranged to guide the vehicle out of the traffic stream or to a shoulder of a roadway and an ignition shutoff arranged to shut off the ignition.

A method for obtaining and conveying information about occupants in a vehicle entails determining the health state of any occupants in the vehicle and establishing a communications channel between the vehicle and a remote facility to enable the determined health state of the occupants to be transmitted to the remote facility. The health state may be determined by any of the sensors described above.

A method for preventing accidents in accordance with the invention entails determining the health state of a driver of the vehicle, establishing a communications channel between the vehicle and a remote facility to enable the determined health state of the driver to be transmitted to the remote facility and activating a vehicle component or subsystem by the remote facility over the established communications channel based on analysis of the transmitted health state of the driver. For example, when the driver is abnormally operating the vehicle as evidenced by the determined health state, the vehicle component is activated by the remote facility. The component may be an audible alarm, a visible warning light, an automatic guidance system arranged to guide the vehicle out of the traffic stream or to a shoulder of a roadway and an ignition shutoff arranged to shut off the ignition.

15.7 Entertainment

Disclosed herein is an arrangement for controlling audio reception by at least one occupant of a passenger compartment of the vehicle which comprises a monitoring system for determining the position of the occupant(s) and a sound generating system coupled to the monitoring system for generating specific sounds. The sound generating system is automatically adjustable based on the determined position of the occupant(s) such that the specific sounds are audible to the occupant(s). The sound generating system may utilize hypersonic sound, e.g., comprise one or more pairs of ultrasonic frequency generators for generating ultrasonic waves whereby for each pair, the ultrasonic frequency generators generate ultrasonic waves which mix to thereby create new audio frequencies. Each pair of ultrasonic frequency generators is controlled independently of the others so that each of the occupants is able to have different new audio frequencies created.

For noise cancellation purposes, the vehicle can include a system for detecting the presence and direction of unwanted noise whereby the sound generating system is coupled to the unwanted noise presence and detection system and direct sound to prevent reception of the unwanted noise by the occupant(s).

If the sound generating system comprises speakers, the speakers may be controllable based on the determined positions of the occupants such that at least one speaker directs sounds toward each occupant.

The monitoring system may be any type of system which is capable of determining the location of the occupant, or more specifically, the location of the head or ears of the occupants. For example, the monitoring system may comprise at least one wave-receiving sensor for receiving waves from the passenger compartment, and a processor coupled to the wave-receiving sensor(s) for determining the position of the occupant(s) based on the waves received by the wave-receiving sensor(s). The monitoring system can also determine the position of objects other than the occupants and control the sound generating system in consideration of the determined position of the objects.

A method for controlling audio reception by occupants in a vehicle comprises the steps of determining the position of at least one occupant of the vehicle, providing a sound generator for generating specific sounds and automatically adjusting the sound generator based on the determined position of the occupant(s) such that the specific sounds are audible to the occupant(s). The features of the arrangement described above may be used in the method.

Another arrangement for controlling audio reception by occupants of a passenger compartment of the vehicle comprises a monitoring system for determining the presence of any occupants and a sound generating system coupled to the monitoring system for generating specific sounds. The sound generating system is automatically adjustable based on the determined presence of any occupants such that the specific sounds are audible to any occupants present in the passenger compartment. The monitoring system and sound generating system may be as in the arrangement described above. However, in this case, the sound generating system is controlled based on the determined presence of the occupants. All of the above-described methods and apparatus may be used in conjunction with one another and in combination with the methods and apparatus for optimizing the driving conditions for the occupants of the vehicle described herein.

15.8 Vehicle Operation

Another invention disclosed herein is a system for controlling operation of a vehicle based on recognition of an authorized individual comprises a processor embodying a pattern recognition algorithm, as defined herein, trained to identify whether a person is an authorized individual by analyzing data derived from images and one or more optical receiving units for receiving an optical image including the person and deriving data from the image. Each optical receiving unit is coupled to the processor to provide the data to the pattern recognition algorithm to thereby obtain an indication from the pattern recognition algorithm whether the person is an authorized individual. A security system is arranged to enable operation of the vehicle when the pattern recognition algorithm provides an indication that the person is an individual authorized to operate the vehicle and prevent operation of the vehicle when the pattern recognition algorithm does not provide an indication that the person is an individual authorized to operate the vehicle. An optional optical transmitting unit is provided in the vehicle for transmitting electromagnetic energy and is arranged relative to the optical receiving unit(s) such that electromagnetic energy transmitted by the optical transmitting unit is reflected by the person and received by at least one of the optical receiving units. The optical receiving units may be selected from a group consisting of a CCD array, a CMOS array, a QWIP array, an active pixel camera and an HDRC camera. Other types of two or three-dimensional imagers can also be used.

A method for controlling operation of a vehicle based on recognition of a person as one of a set of authorized individuals comprises the steps of obtaining images including the authorized individuals by means of one or more optical receiving unit, deriving data from the images, training a pattern recognition algorithm on the data derived from the images which is capable of identifying a person as one of the individuals, then subsequently obtaining images by means of the optical receiving unit(s), inputting data derived from the images subsequently obtained by the optical receiving unit(s) into the pattern recognition algorithm to obtain an indication whether the person is one of the set of authorized individuals, and providing a security system which enables operation of the vehicle when the pattern recognition algorithm provides an indication that the person is one of the set of individuals authorized to operate the vehicle and prevents operation of the vehicle when the pattern recognition algorithm does not provide an indication that the person is one of the set of individuals authorized to operate the vehicle. The data derivation from the images may entail any number of image processing techniques including eliminating pixels from the images which are present in multiple images and comparing the images with stored arrays of pixels and eliminating pixels from the images which are present in the stored arrays of pixels. The method can also be used to control a vehicular component based on recognition of a person as one of a predetermined set of particular individuals. This method includes the step of affecting the component based on the indication from the pattern recognition algorithm whether the person is one of the set of individuals. The components may be one or more of the following: the mirrors, the seat, the anchorage point of the seatbelt, the airbag deployment parameters including inflation rate and pressure, inflation direction, deflation rate, time of inflation, the headrest, the steering wheel, the pedals, the entertainment system and the air-conditioning/ventilation system.

15.9 Exterior Monitoring

An exterior monitoring arrangement comprises an imaging device for obtaining three-dimensional images of the environment (internal and/or external) and a processor embodying a pattern recognition technique for processing the three-dimensional images to determine at least one characteristic of an object in the environment based on the three-dimensional images obtained by the imaging device. The imaging device can be arranged at locations throughout the vehicle as described above. Control of a reactive component is enabled by the determination of the characteristic of the object.

Another arrangement for monitoring objects in or about a vehicle comprises a generating device for generating a first signal having a first frequency in a specific radio frequency range, a wave transmitter arranged to receive the signal and transmit waves toward the objects, a wave-receiver arranged relative to the wave transmitter for receiving waves transmitted by the wave transmitter after the waves have interacted with an object, the wave receiver being arranged to generate a second signal based on the received waves at the same frequency as the first signal but shifted in phase, and a detector for detecting a phase difference between the first and second signals, whereby the phase difference is a measure of a property of the object. The phase difference is a measure of the distance between the object and the wave receiver and the wave transmitter. The wave transmitter may comprise an infrared driver and the receiver comprises an infrared diode.

A vehicle including an arrangement for measuring position of an object in an environment of or about the vehicle comprises a light source capable of directing modulated light into the environment, at least one light-receiving pixel arranged to receive the modulated light after reflection by any objects in the environment and a processor for determining the distance between any objects from which the modulated light is reflected and the light source based on the reception of the modulated light by the pixel(s). The pixels can constitute an array. Components for modulating a frequency of the light being directed by the light source into the environment and for providing a correlation pattern in a form of code division modulation of the light being directed by the light source into the environment can be provided. The pixel can also be a photo diode such as a PIN or avalanche diode. The light may be infrared light.

All of the above-described methods and apparatus may be used in conjunction with one another and in combination with the methods and apparatus for optimizing the driving conditions for the occupants of the vehicle described herein.

15.10 Diagnostics and Prognostics

To achieve at least one of the objects listed above, an asset including an arrangement for self-monitoring comprises an interior sensor system arranged on the asset to obtain information about contents in the interior of the asset, a location determining system arranged on the asset to monitor the location of the asset and a communication system arranged on the asset and coupled to the interior sensor system and the location determining system. The communication system operatively transmits the information about the contents in the interior of the asset and the location of the asset to a remote facility.

The interior sensor system may comprise at least one wave transmitter arranged to transmit waves into the interior of the asset and at least one wave receiver arranged to receive waves from the interior of the asset. A processor is also typically provided to compare waves received by the wave receiver(s) at different times or analyze the waves received by the wave receiver(s), preferably compensating for thermal gradients in the interior of the asset in an appropriate manner. To conserve power, a door status sensor is arranged to detect when the door is closed after having been opened with the wave transmitter(s) being coupled to the door status sensor and transmitting waves into the interior of the asset only when the door status sensor detects when the door is closed after having been opened.

The interior sensor system can also comprise an RFID or SAW transmitter and receiver unit arranged to transmit signals into the interior of the asset and receive signals from RFID or SAW devices present in the interior of the asset. The interior sensor system can also comprise an optical barcode reader arranged to transmit light into the interior of the asset and receive light reflected from any barcodes present on objects in the interior of the asset.

The interior sensor system may be designed and constructed to determine the presence of objects and/or motion in the interior of the asset. It may also comprise at least one imager arranged to obtain images of the interior of the asset, in which case, a processor optionally embodying a pattern recognition system obtains information about the contents from the images obtained by the imager(s).

An inertial device may be coupled to the interior sensor system for detecting movement of the asset. The interior sensor system would receive information about movement of the asset and analyze the movement of the asset with the detected motion within the interior of the asset to ascertain whether the detected motion is caused by the movement of the asset or by independent movement of the contents in the interior of the asset.

Sensors included in the interior sensor system, may include at least one chemical sensor, a temperature sensor, a pressure sensor, a carbon dioxide sensor, a humidity sensor, a hydrocarbon sensor, a narcotics sensor, a mercury vapor sensor, a radioactivity sensor, a microphone and a light sensor. Another possible sensor is at least one weight sensor for measuring the weight of the contents of the asset or the distribution of weight in the interior of the asset. Still other possible sensors include inertial, acceleration, gyroscopic, ultrasonic, radar, electric field, magnetic, velocity, displacement among others. Any of the foregoing sensors can be provided with a diagnostic capability or self-diagnostic capability.

The interior sensor system may be designed to utilize a pattern recognition technique, neural network, modular neural network, combination neural network, fuzzy logic and the like that can be used to reduce the information about the contents in the interior of the asset to a minimum. Such techniques could also be used to reduce the information transmitted by the communication system to a minimum.

The interior sensor system can include an initiation device for periodically initiating the interior sensor system to obtain information about the contents in the interior of the asset. A wakeup sensor system can be provided for detecting the occurrence of an internal or external event requiring instantaneous or a change in the monitoring rate of the interior of the asset. The initiation device is coupled to the wakeup sensor system and arranged to change the rate at which it initiates the interior sensor system to obtain information about the contents in the interior of the asset in response to the detected occurrence of an internal or external event by the wakeup sensor system.

If the asset includes a motion or vibration detection system arranged to detect motion or vibration of the asset, the interior sensor system is optionally coupled thereto and arranged to detect information about the contents of the interior of the asset only after the asset is determined to have moved or vibrated from a stationary position.

If the asset includes a wakeup sensor system for detecting the occurrence of an internal or external event relating to the condition or location of the asset, the communication system is optionally coupled to the wakeup sensor system and arranged to transmit a signal relating to the detected occurrence of an internal or external event.

The asset can include a memory unit for storing data relating to the location of the asset and the contents in the interior of the asset. The memory unit can be arranged to store data relating to the opening and closing of the door, as determined by a door status sensor, in conjunction with the location of the asset and the contents in the interior of the asset.

If the asset includes a motion sensor arranged on the asset for monitoring motion of the asset, it can also include an alarm or warning system coupled to the motion sensor and activated when the motion sensor detects a potentially or actually dangerous motion of the asset.

The asset can also include one or more environment sensors arranged on the asset to measure a property of the environment in which the asset is situated, with such property being storable in a memory unit or transmittable in association with the location of the asset.

An exterior monitoring system for monitoring the area in the vicinity of the asset can also be provided. In this case, the exterior monitoring system can comprise an ultrasound sensor, imagers such as cameras both with and without illumination including visual, infrared or ultraviolet imagers, scanners, other types of sensors which sense other parts of the electromagnetic spectrum, capacitive sensors, electric or magnetic field sensors, laser radar, radar, phased array radar and chemical sensors, among others.

Another arrangement for monitoring an asset in accordance with the invention comprises a location determining system arranged on the asset to monitor the location of the asset, at least one environment sensor arranged on the asset to obtain information about the environment in which the asset is located and a communication system arranged on the asset and coupled to the environment sensor(s) and the location determining system. The communication system transmits the information about the location of the asset and the environment in which the asset is located to a remote facility. Other features of this arrangement include those mentioned above in the previous embodiment of the invention.

A method for monitoring movable assets and contents in the assets in accordance with the invention comprises the steps of assigning a unique identification code to each asset, determining the location of each asset, determining at least one property or characteristic of the contents of each asset, and transmitting the location of each asset along with the property(ies) or characteristic(s) of the contents of the asset to a data processing facility to form a database of information about the use of the assets or for retransmission to another location such as via the Internet. Determining a property or characteristic of the contents of each asset may entail determining the weight of the contents of the asset and/or determining the weight distribution of the contents of the asset, optionally utilizing the determined weight of the contents of the asset and/or the determined weight distribution of the contents of the asset and the known weight and weight distribution of the asset without contents.

At least one sensor may be arranged on each asset to determine a condition of the environment in the vicinity of the asset and the condition of the environment in the vicinity of the assets transmitted to the data processing for inclusion in the database or for retransmission. The sensor(s) can be constructed to measure or detect the exposure of the asset to excessive heat, exposure of the asset to excessive cold, vibrations of the asset, exposure of the asset to water and/or exposure of the asset to hazardous material.

At least one sensor may be arranged on each asset to determine a condition of the environment of the interior of the asset and the condition of the environment of the interior of the assets transmitted to the data processing facility for inclusion in the database or for retransmission. The sensor(s) can be constructed to measure or detect the presence of excessive heat in the interior of the asset, the presence of excessive cold in the interior of the asset, vibrations of the asset, the presence of water in the interior of the asset and/or the presence of hazardous material in the interior of the asset.

A responsive identification tag may be provided on individual cargo items at least when present in one of the assets and an initiation and reception device arranged in or on each asset to cause the identification tag on each cargo item in the asset to generate a responsive signal containing data on the cargo item when initiated by the initiation and reception device. Periodically, the initiation and reception device is initiated and the responsive signals from the cargo items received to thereby obtain information about the identification of the cargo items. The information about the identification of the cargo items is then transmitted to the data processing facility for inclusion in the database or for retransmission. The information about the identification of the cargo items received from each asset can be compared to pre-determined information about the identification of the cargo items in that asset. An alert may be generated upon the detection of differences between the information about the identification of the cargo items received from each asset and the pre-determined information about the identification of the cargo items in that asset.

A memory unit may be provided on each asset that may store information about the location of each asset along with the property or characteristic of the contents of the asset in the memory unit.

An optically readable identification code may be provided on individual cargo items at least when present in one of the assets and an initiation and reception device arranged in or on each asset to cause the identification code on each cargo items in the asset to provide a responsive pattern of light containing data on the cargo item when initiated by the initiation and reception device. Periodically, the initiation and reception device is initiated when the cargo items are in a position to direct light to the identification code on the cargo item. The responsive patterns of light are consequently received from the cargo items to thereby obtain information about the identification of the cargo items. The information about the identification of the cargo items may be transmitted to the data processing facility for inclusion in the database or otherwise processed and/or retransmitted. Optionally, the information about the identification of the cargo items received from each asset is compared to pre-determined information about the identification of the cargo items in that asset. An alert can thus be generated upon the detection of differences between the information about the identification of the cargo items received from each asset and the pre-determined information about the identification of the cargo items in that asset.

Openings and closings of each door of each asset can be detected such that the information about the openings and closings of each door is transmitted to the data processing for inclusion in the database or retransmitted.

To conserve power, closure of each door can be detected and the property or characteristic of the contents of each asset determined only after closure of the door is detected.

Information about an implement or individual moving the asset can be obtained and transmitted to the data processing facility for inclusion in the database or retransmission. This will keep tabs on the personnel or implements involved in the transfer, handling and movement of the asset.

Another method for monitoring movable assets and contents in the assets comprises mounting a portable, replaceable cell phone or PDA having a location providing function and a low duty cycle to the asset, enabling communications between the cell phone or PDA and the asset to enable the cell phone or PDA to obtain information about the asset and/or its contents (such as an identification number or other information obtained by various sensors associated with the asset) and establishing a communications channel between the cell phone or PDA and a location remote from the asset to enable the information about the asset and/or its contents to be transmitted to the remote location. The cell phone or PDA may be coupled to a battery fixed to the asset to extend its operational life. When a cell phone is mounted to the asset, and includes a sound-receiving component, the cell phone can be provided with a pattern recognition system to recognize events relating to the asset based on sounds received by the sound-receiving component.

Also described herein is an embodiment of a component diagnostic system for diagnosing the component in accordance with the invention which comprises a plurality of sensors not directly associated with the component, i.e., independent therefrom, such that the component does not directly affect the sensors, each sensor detecting a signal containing information as to whether the component is operating normally or abnormally and outputting a corresponding electrical signal, processor means coupled to the sensors for receiving and processing the electrical signals and for determining if the component is operating abnormally based on the electrical signals, and output means coupled to the processor means for affecting another system within the vehicle if the component is operating abnormally. The processor means preferably comprise pattern recognition means such as a trained pattern recognition algorithm, a neural network, modular neural networks, an ensemble of neural networks, a cellular neural network, or a support vector machine. In some cases, fuzzy logic will be used which can be combined with a neural network to form a neural fuzzy algorithm. The another system may be a display for indicating the abnormal state of operation of the component arranged in a position in the vehicle to enable a driver of the vehicle to view the display and thus the indicated abnormal operation of the component. At least one source of additional information, e.g., the time and date, may be provided and input means coupled to the vehicle for inputting the additional information into the processor means. The another system may also be a warning device including transmission means for transmitting information related to the component abnormal operating state to a site remote from the vehicle, e.g., a vehicle repair facility.

In another embodiment of the component diagnostic system discussed herein, at least one sensor detects a signal containing information as to whether the component is operating normally or abnormally and outputs a corresponding electrical signal. A processor or other computing device is coupled to the sensor(s) for receiving and processing the electrical signal(s) and for determining if the component is operating abnormally based thereon. The processor preferably comprises or embodies a pattern recognition algorithm for analyzing a pattern within the signal detected by each sensor. An output device (or multiple output devices) is coupled to the processor for affecting another system within the vehicle if the component is operating abnormally. The other system may be a display as mentioned above or a warning device.

A method for automatically monitoring one or more components of a vehicle during operation of the vehicle on a roadway entails, as discussed above, the steps of monitoring operation of the component in order to detect abnormal operation of the component, e.g., in one or the ways described above, and if abnormal operation of the component is detected, automatically directing the vehicle off of the restricted roadway. For example, in order to automatically direct the vehicle off of the restricted roadway, a signal representative of the abnormal operation of the component may be generated and directed to a guidance system of the vehicle that guides the movement of the vehicle. Possibly the directing the vehicle off of the restricted roadway may entail applying satellite positioning techniques or ground-based positioning techniques to enable the current position of the vehicle to be determined and a location off of the restricted highway to be determined and thus a path for the movement of the vehicle. Re-entry of the vehicle onto the restricted roadway may be prevented until the abnormal operation of the component is satisfactorily addressed.

Also disclosed herein is a vehicle including a diagnostic system arranged to diagnose the state of the vehicle or the state of a component of the vehicle and generate an output indicative or representative thereof and a communications device coupled to the diagnostic system and arranged to transmit the output of the diagnostic system. The diagnostic system may comprise a plurality of vehicle sensors mounted on the vehicle, each sensor providing a measurement related to a state of the sensor or a measurement related to a state of the mounting location, and a processor coupled to the sensors and arranged to receive data from the sensors and process the data to generate the output indicative or representative of the state of the vehicle or the state of a component of the vehicle. The sensors may be wirelessly coupled to the processor and arranged at different locations on the vehicle. The processor may embody a pattern recognition algorithm trained to generate the output from the data received from the sensors, such as a neural network, fuzzy logic, sensor fusion and the like, and be arranged to control one or more parts of the vehicle based on the output indicative or representative of the state of the vehicle or the state of a component of the vehicle. The state of the vehicle can include angular motion of the vehicle. A display may be arranged in the vehicle in a position to be visible from the passenger compartment. Such as display is coupled to the diagnostic system and arranged to display the diagnosis of the state of the vehicle or the state of a component of the vehicle. A warning device may also be coupled to the diagnostic system for relaying a warning to an occupant of the vehicle relating to the state of the vehicle or the state of the component of the vehicle as diagnosed by the diagnostic system. The communications device may comprise a cellular telephone system including an antenna as well as other similar or different electronic equipment capable of transmitting a signal to a remote location, optionally via a satellite. Transmission via the Internet, i.e., to a web site or host computer associated with the remote location is also a possibility for the invention. If the vehicle is considered its own site, then the transmission would be a site-to-site transmission via the Internet.

An occupant sensing system can be provided to determine at least one property or characteristic of occupancy of the vehicle. In this case, the communications device is coupled to the occupant sensing system and transmits the determined property or characteristic of occupancy of the vehicle. In a similar manner, at least one environment sensor can be provided, each sensing a state of the environment around the vehicle. In this case, the communications device is coupled to the environment sensor(s) and transmits the sensed state of the environment around the vehicle. Moreover, a location determining system, optionally incorporating GPS technology, could be provided on the vehicle to determine the location of the vehicle and transmitted to the remote location along with the diagnosis of the state of the vehicle or its component. A memory unit may be coupled to the diagnostic system and the communications device. The memory unit receives the diagnosis of the state of the vehicle or the state of a component of the vehicle from the diagnostic system and stores the diagnosis. The communications device then interrogates the memory unit to obtain the stored diagnosis to enable transmission thereof, e.g., at periodic intervals. The sensors may be any known type of sensor including, but not limited to, a single axis acceleration sensor, a double axis acceleration sensor, a triaxial acceleration sensor and a gyroscope. The sensors may include an RFID response unit and an RFID interrogator device which causes the RFID response units to transmit a signal representative of the measurement of the associated sensor to the processor. In addition to or instead or an RFID-based system, one or more SAW sensors can be arranged on the vehicle, each receiving a signal and returning a signal modified by virtue of the state of the sensor or the state of the mounting location of the sensor. For example, the SAW sensor can measure temperature and/or pressure of a component of the vehicle or in a certain location or space on the vehicle, or the concentration and/or presence of a chemical.

A method for monitoring a vehicle comprises diagnosing the state of the vehicle or the state of a component of the vehicle by means of a diagnostic system arranged on the vehicle, generating an output indicative or representative of the diagnosed state of the vehicle or the diagnosed state of the component of the vehicle, and transmitting the output to a remote location. Transmission of the output to a remote location may entail arranging a communications device comprising a cellular telephone system including an antenna on the vehicle. The output may be to a satellite for transmission from the satellite to the remote location. The output could also be transmitted via the Internet to a web site or host computer associated with the remote location.

It is important to note that raw sensor data is not generally transmitted from the vehicle the remote location for analysis and processing by the devices and/or personnel at the remote location. Rather, in accordance with the invention, a diagnosis of the vehicle or the vehicle component is performed on the vehicle itself and this resultant diagnosis is transmitted. The diagnosis of the state of the vehicle may encompass determining whether the vehicle is stable or is about to rollover or skid and/or determining a location of an impact between the vehicle and another object. A display may be arranged in the vehicle in a position to be visible from the passenger compartment in which case, the state of the vehicle or the state of a component of the vehicle is displayed thereon. Further, a warning can be relayed to an occupant of the vehicle relating to the state of the vehicle. In addition to the transmission of vehicle diagnostic information obtained by analysis of data from sensors performed on the vehicle, at least one property or characteristic of occupancy of the vehicle may be determined (such as the number of occupants, the status of the occupants-breathing or not, injured or not, etc.) and transmitted to a remote location, the same or a different remote location to which the diagnostic information is sent. The information can also be sent in a different manner than the information relating to the diagnosis of the vehicle.

Additional information for transmission by the components on the vehicle may include a state of the environment around the vehicle, for example, the temperature, pressure, humidity, etc. in the vicinity of the vehicle, and the location of the vehicle. A memory unit may be provided in the vehicle, possibly as part of a microprocessor, and arranged to receive the diagnosis of the state of the vehicle or the state of the component of the vehicle and store the diagnosis. As such, this memory unit can be periodically interrogated to obtain the stored diagnosis to enable transmission thereof.

Diagnosis of the state of the vehicle or the state of the component of the vehicle may entail mounting a plurality of sensors on the vehicle, measuring a state of each sensor or a state of the mounting location of each sensor and diagnosing the state of the vehicle or the state of a component of the vehicle based on the measurements of the state of the sensors or the state of the mounting locations of the sensors. These functions can be achieved by a processor which is wirelessly coupled to the sensors. The sensors can optionally be provided with RFID technology, i.e., an RFID response unit, whereby an RFID interrogator device is mounted on the vehicle and signals transmitted via the RFID interrogator device causes the RFID response units of any properly equipped sensors to transmit a signal representative of the measurements of that sensor to the processor. SAW sensors can also be used, in addition to, is part of or instead of RFID-based sensors.

One embodiment of the diagnostic module in accordance with the invention utilizes information which already exists in signals emanating from various vehicle components along with sensors which sense these signals and, using pattern recognition techniques, compares these signals with patterns characteristic of normal and abnormal component performance to predict component failure, vehicle instability or a crash earlier than would otherwise occur if the diagnostic module was not utilized. If fully implemented, at least one of the inventions disclosed herein is a total diagnostic system of the vehicle. In most implementations, the module is attached to the vehicle and electrically connected to the vehicle data bus where it analyzes data appearing on the bus, as well as other information, to diagnose components of the vehicle. In some implementations, one or more distributed accelerometers and/or microphones are present on the vehicle and, in some cases, some of the sensors will communicate using wireless technology to the vehicle bus or directly to the diagnostic module.

In other embodiments disclosed herein, the state of the entire vehicle is diagnosed whereby two or more sensors, preferably acceleration sensors and gyroscopes, detect the state of the vehicle and if the state is abnormal, output means are coupled to the processor means for affecting another system in the vehicle. The another system may be the steering control system, the brake system, the accelerator or the frontal or side occupant protection system. An exemplifying control system for controlling a part of the vehicle in accordance with the invention thus comprises a plurality of sensor systems mounted at different locations on the vehicle, each sensor system providing a measurement related to a state of the sensor system or a measurement related to a state of the mounting location, and a processor coupled to the sensor systems and arranged to diagnose the state of the vehicle based on the measurements of the sensor system, e.g., by the application of a pattern recognition technique. The processor controls the part based at least in part on the diagnosed state of the vehicle. At least one of the sensor systems may be a high dynamic range accelerometer or a sensor selected from a group consisting of a single axis acceleration sensor, a double axis acceleration sensor, a triaxial acceleration sensor and a gyroscope, and may optionally include an RFID response unit. The gyroscope may be a MEMS-IDT gyroscope including a surface acoustic wave resonator which applies standing waves on a piezoelectric substrate. If an RFID response unit is present, the control system would then comprise an RFID interrogator device which causes the RFID response unit(s) to transmit a signal representative of the measurement of the sensor system associated therewith to the processor.

The state of the vehicle diagnosed by the processor may be the vehicle's angular motion, angular acceleration and/or angular velocity. As such, the steering system, braking system or throttle system may be controlled by the processor in order to maintain the stability of the vehicle. The processor can also be arranged to control an occupant restraint or protection device in an attempt to minimize injury to an occupant.

The state of the vehicle diagnosed by the processor may also be a determination of a location of an impact between the vehicle and another object. In this case, the processor can forecast the severity of the impact using the force/crush properties of the vehicle at the impact location and control an occupant restraint or protection device based at least in part on the severity of the impact.

The system can also include a weight sensing system coupled to a seat in the vehicle for sensing the weight of an occupying item of the seat. The weight sensing system is coupled to the processor whereby the processor controls deployment or actuation of the occupant restraint or protection device based on the state of the vehicle and the weight of the occupying item of the seat sensed by the weight sensing system.

A display may be coupled to the processor for displaying an indication of the state of the vehicle as diagnosed by the processor. A warning device may be coupled to the processor for relaying a warning to an occupant of the vehicle relating to the state of the vehicle as diagnosed by the processor. Further, a transmission device may be coupled to the processor for transmitting a signal to a remote site relating to the state of the vehicle as diagnosed by the processor.

The state of the vehicle diagnosed by the processor may include angular acceleration of the vehicle whereby angular velocity and angular position or orientation are derivable from the angular acceleration. The processor can then be arranged to control the vehicle's navigation system based on the angular acceleration of the vehicle.

A method for controlling a part of the vehicle in accordance with the invention comprises the step of mounting a plurality of sensor systems at different locations on the vehicle, measuring a state of the sensor system or a state of the respective mounting location of the sensor system, diagnosing the state of the vehicle based on the measurements of the state of the sensor systems or the state of the mounting locations of the sensor systems, and controlling the part based at least in part on the diagnosed state of the vehicle. The state of the sensor system may be any one or more of the acceleration, angular acceleration, angular velocity or angular orientation of the sensor system. Diagnosis of the state of the vehicle may entail determining whether the vehicle is stable or is about to rollover or skid and/or determining a location of an impact between the vehicle and another object. Diagnosis of the state of the vehicle may also entail determining angular acceleration of the vehicle based on the acceleration measured by accelerometers if multiple accelerometers are present as the sensor systems.

Another control system for controlling a part of the vehicle in accordance with the invention comprises a plurality of sensor systems mounted on the vehicle, each providing a measurement of a state of the sensor system or a state of the mounting location of the sensor system and generating a signal representative of the measurement, and a pattern recognition system for receiving the signals from the sensor systems and diagnosing the state of the vehicle based on the measurements of the sensor systems. The pattern recognition system generates a control signal for controlling the part based at least in part on the diagnosed state of the vehicle. The pattern recognition system may comprise one or more neural networks. The features of the control system described above may also be incorporated into this control system to the extent feasible.

The state of the vehicle diagnosed by the pattern recognition system may include a state of an abnormally operating component whereby the pattern recognition system is designed to identify a potentially malfunctioning component based on the state of the component measured by the sensor systems and determine whether the identified component is operating abnormally based on the state of the component measured by the sensor systems.

In one preferred embodiment, the pattern recognition system may comprise a neural network system and the state of the vehicle diagnosed by the neural network system includes a state of an abnormally operating component. The neural network system includes a first neural network for identifying a potentially malfunctioning component based on the state of the component measured by the sensor systems and a second neural network for determining whether the identified component is operating abnormally based on the state of the component measured by the sensor systems.

Modular neural networks can also be used whereby the neural network system includes a first neural network arranged to identify a potentially malfunctioning component based on the state of the component measured by the sensor systems and a plurality of additional neural networks. Each of the additional neural networks is trained to determine whether a specific component is operating abnormally so that the measurements of the state of the component from the sensor systems are input into that one of the additional neural networks trained on a component which is substantially identical to the identified component.

Another method for controlling a part of the vehicle comprises the steps of mounting a plurality of sensor systems on the vehicle, measuring a state of the sensor system or a state of the respective mounting location of the sensor system, generating signals representative of the measurements of the sensor systems, inputting the signals into a pattern recognition system to obtain a diagnosis of the state of the vehicle and controlling the part based at least in part on the diagnosis of the state of the vehicle.

In one notable embodiment, a potentially malfunctioning component is identified by the pattern recognition system based on the states measured by the sensor systems and the pattern recognition system determine whether the identified component is operating abnormally based on the states measured by the sensor systems. If the pattern recognition system comprises a neural network system, identification of the component entails inputting the states measured by the sensor systems into a first neural network of the neural network system and the determination of whether the identified component is operating abnormally entails inputting the states measured by the sensor systems into a second neural network of the neural network system. A modular neural network system can also be applied in which the states measured by the sensor systems are input into a first neural network and a plurality of additional neural networks are provided, each being trained to determine whether a specific component is operating abnormally, whereby the states measured by the sensor systems are input into that one of the additional neural networks trained on a component which is substantially identical to the identified component.

15.11 Truck Trailer, Cargo Container and Railroad Car Monitoring

The monitoring techniques described above can also be modified to monitor truck trailers, cargo containers and railroad cars.

BRIEF DESCRIPTION OF THE DRAWINGS

The following drawings are illustrative of embodiments of the system developed or adapted using the teachings of at least one of the inventions disclosed herein and are not meant to limit the scope of the invention as encompassed by the claims. In particular, the illustrations below are frequently limited to the monitoring of the front passenger seat for the purpose of describing the system. Naturally, the invention applies as well to adapting the system to the other seating positions in the vehicle and particularly to the driver and rear passenger positions.

FIG. 19(*b*) is a diagram similar to FIG. 19(*a*) showing a step of extracting data based on the normalized reflected waves and a step of weighting the extracted data by employing the data of the seat track position detecting sensor, the data of the reclining angle detecting sensor, and the data of the weight sensor.

FIG. 76 is a database of data sets for use in training of a neural network in accordance with the invention.

FIG. 77 is a categorization chart for use in a training set collection matrix in accordance with the invention.

FIGS. 78, 79, 80 are charts of infant seats, child seats and booster seats showing attributes of the seats and a designation of their use in the training database, validation database or independent database in an exemplifying embodiment of the invention.

FIGS. 81A-81D show a chart showing different vehicle configurations for use in training of combination neural network in accordance with the invention.

FIGS. 82A-82H show a training set collection matrix for training a neural network in accordance with the invention.

FIG. 83 shows an independent test set collection matrix for testing a neural network in accordance with the invention.

FIG. 84 is a table of characteristics of the data sets used in the invention.

FIG. 85 is a table of the distribution of the main training subjects of the training data set.

FIG. 86 is a table of the distribution of the types of child seats in the training data set.

FIG. 87 is a table of the distribution of environmental conditions in the training data set.

FIG. 88 is a table of the distribution of the validation data set.

FIG. 89 is a table of the distribution of human subjects in the validation data set.

FIG. 90 is a table of the distribution of child seats in the validation data set.

FIG. 91 is a table of the distribution of environmental conditions in the validation data set.

FIG. 92 is a table of the inputs from ultrasonic transducers.

FIG. 93 is a table of the baseline network performance.

FIG. 94 is a table of the performance per occupancy subset.

FIG. 95 is a tale of the performance per environmental conditions subset.

FIG. 97 is a table of the results of the normalization study.

FIG. 98 is a table of the results of the low threshold filter study.

FIG. 99 shows single camera optical examples using preprocessing filters.

FIG. 100 shows single camera optical examples explaining the use of edge strength and edge orientation.

FIG. 101 shows single camera optical examples explaining the use of feature vector generated from distribution of horizontal/vertical edges.

FIG. 102 shows single camera optical example explaining the use of feature vector generated from distribution of tilted edges.

FIG. 103 shows single camera optical example explaining the use of feature vector generated from distribution of average intensities and deviations.

FIG. 104 is a table of issues that may affect the image data.

FIG. 105 is a flow chart of the use of two subsystems for handling different lighting conditions.

FIG. 106 shows two flow charts of the use of two modular subsystems consisting of 3 neural networks.

FIG. 107 is a flow chart of a modular subsystem consisting of 6 neural networks.

FIG. 108 is a table of post-processing filters implemented in the invention.

FIG. 109 is a flow chart of a decision-locking mechanism implemented using four internal states.

FIG. 110 is a table of definitions of the four internal states.

FIG. 111 is a table of the paths between the four internal states.

FIG. 112 is a table of the distribution of the nighttime database.

FIG. 113 is a table of the success rates of the nighttime neural networks.

FIG. 114 is a table of the performance of the nighttime subsystem.

FIG. 115 is a table of the distribution of the daytime database.

FIG. 116 is a table of the success rates of the daytime neural networks.

FIG. 117 is a table of the performance of the daytime subsystem.

Figure 118:
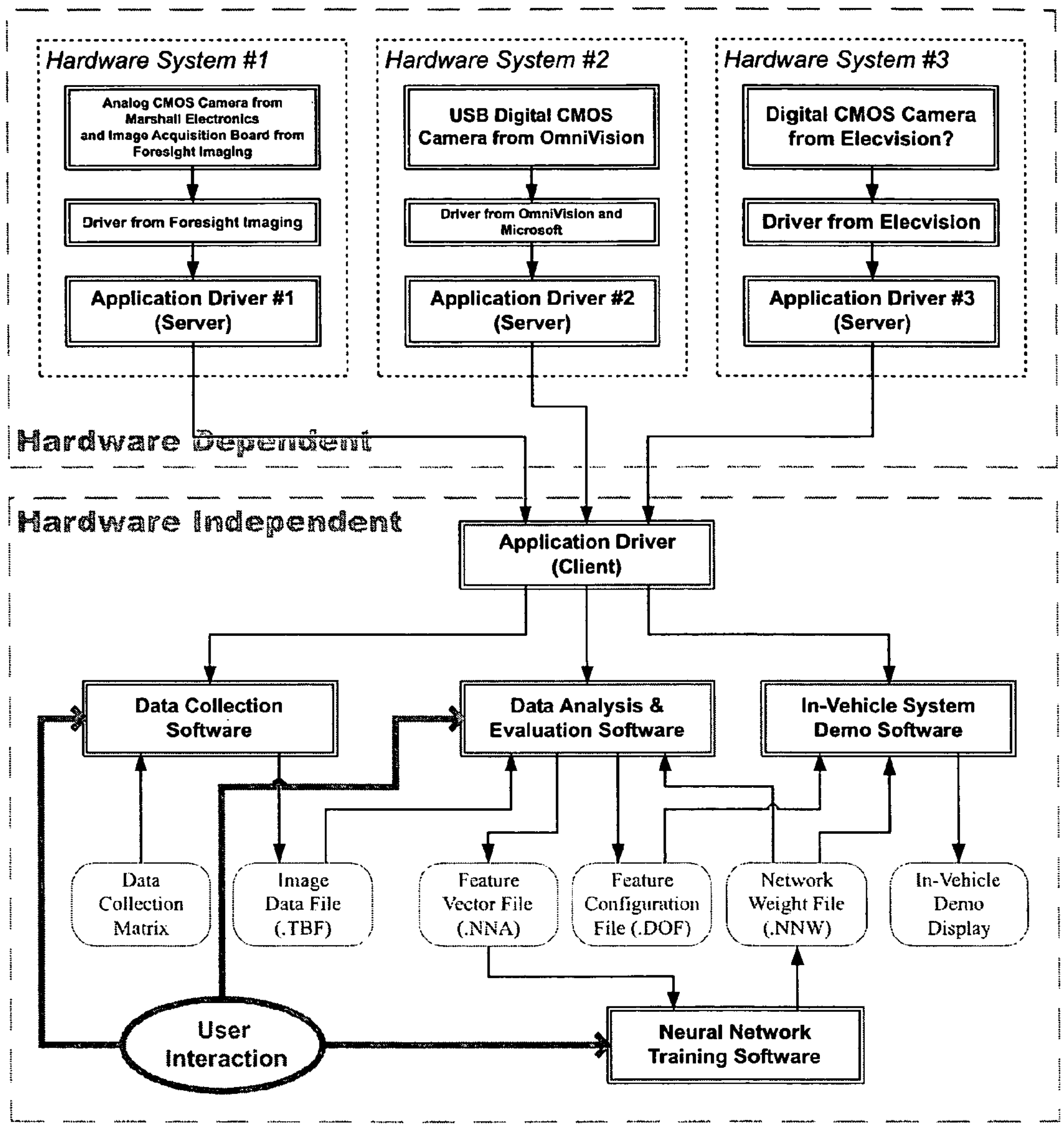

FIG. 118 is a flow chart of the software components for system development.

Figure 119:
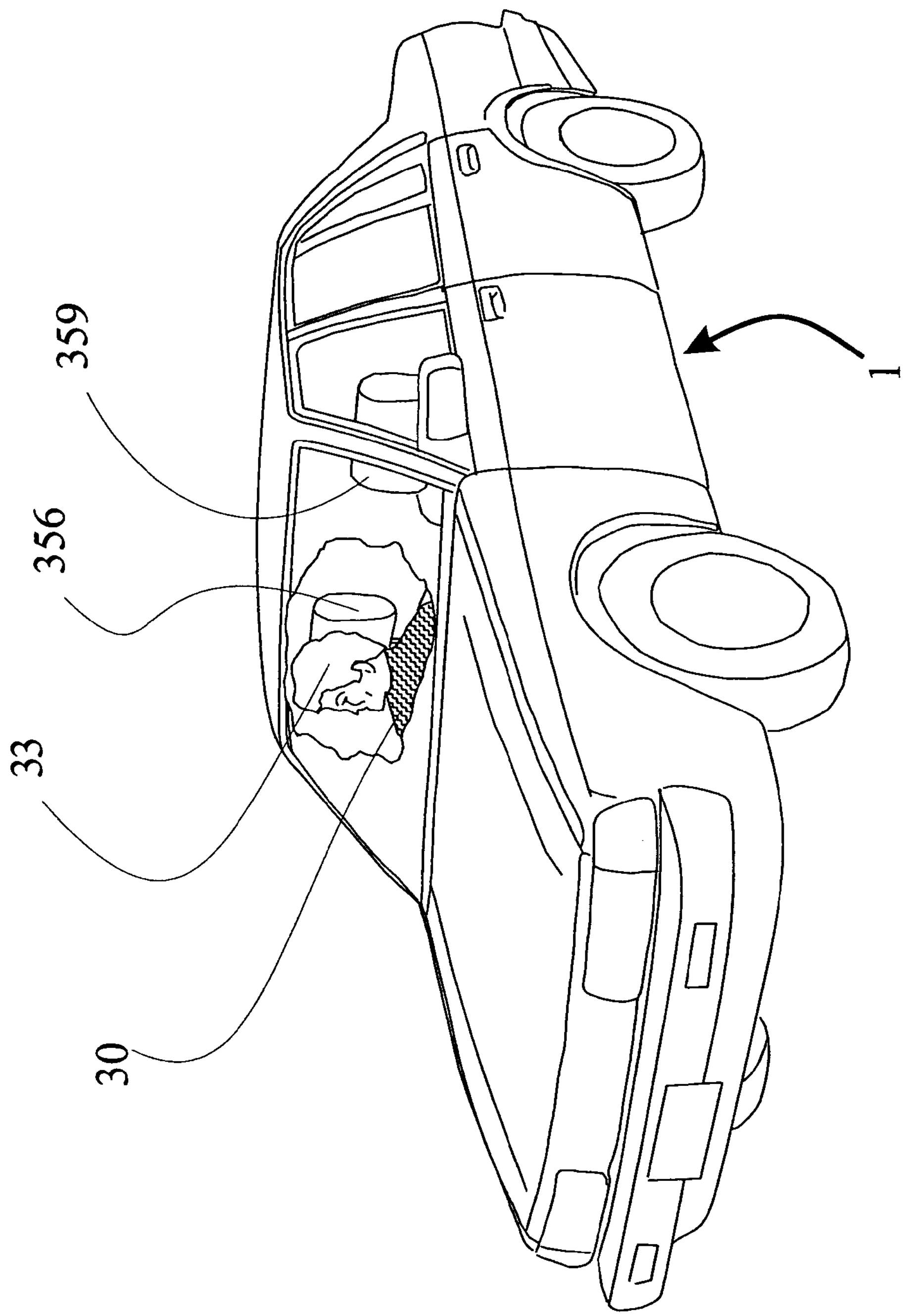

FIG. 119 is perspective view with portions cut away of a motor vehicle having a movable headrest and an occupant sitting on the seat with the headrest adjacent the head of the occupant to provide protection in rear impacts.

Figure 1:
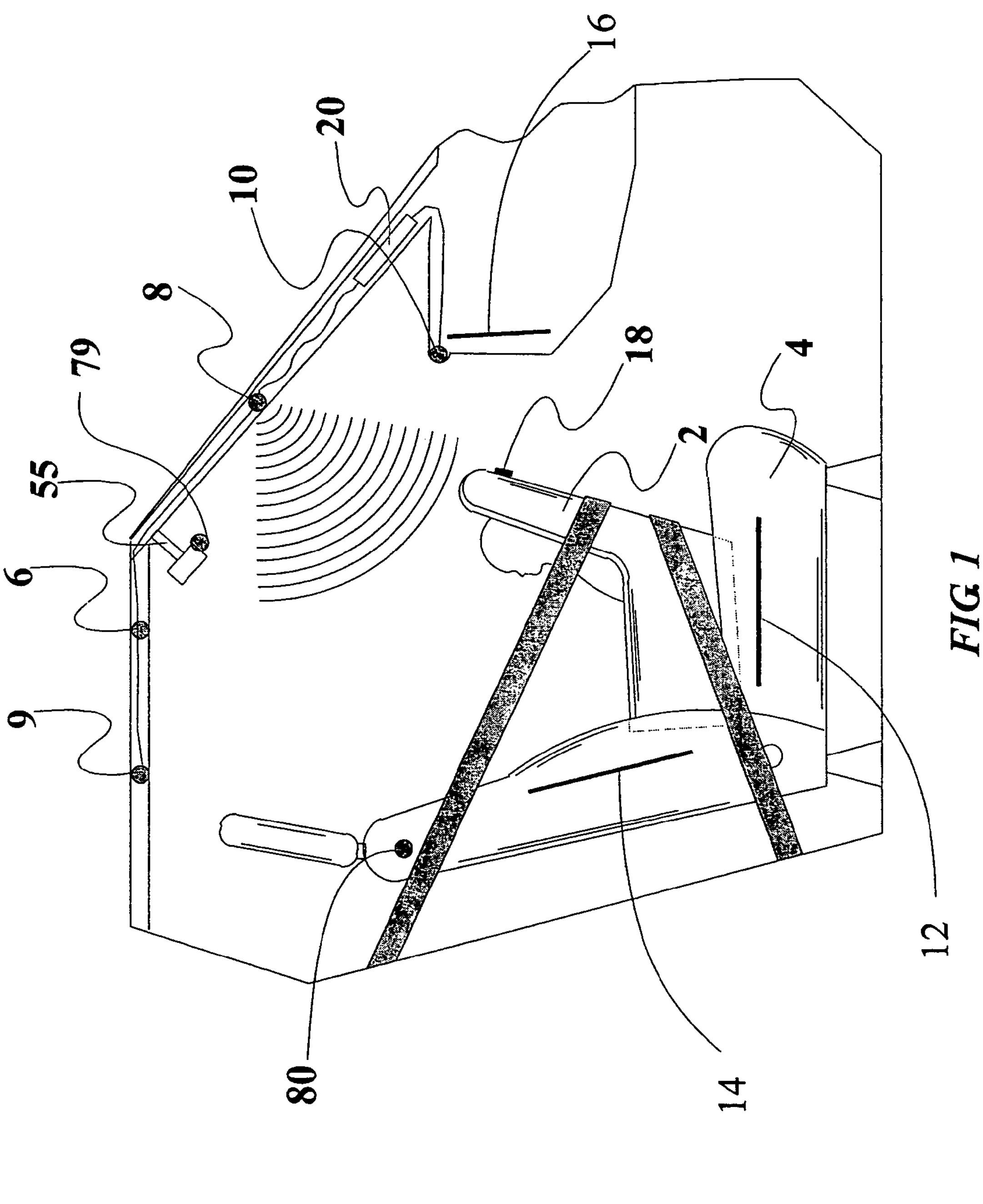
FIG. 1 is a side view with parts cutaway and removed of a vehicle showing the passenger compartment containing a rear facing child seat on the front passenger seat and a preferred mounting location for an occupant and rear facing child seat presence detector including an antenna field sensor and a resonator or reflector placed onto the forward most portion of the child seat.
Figure 120:
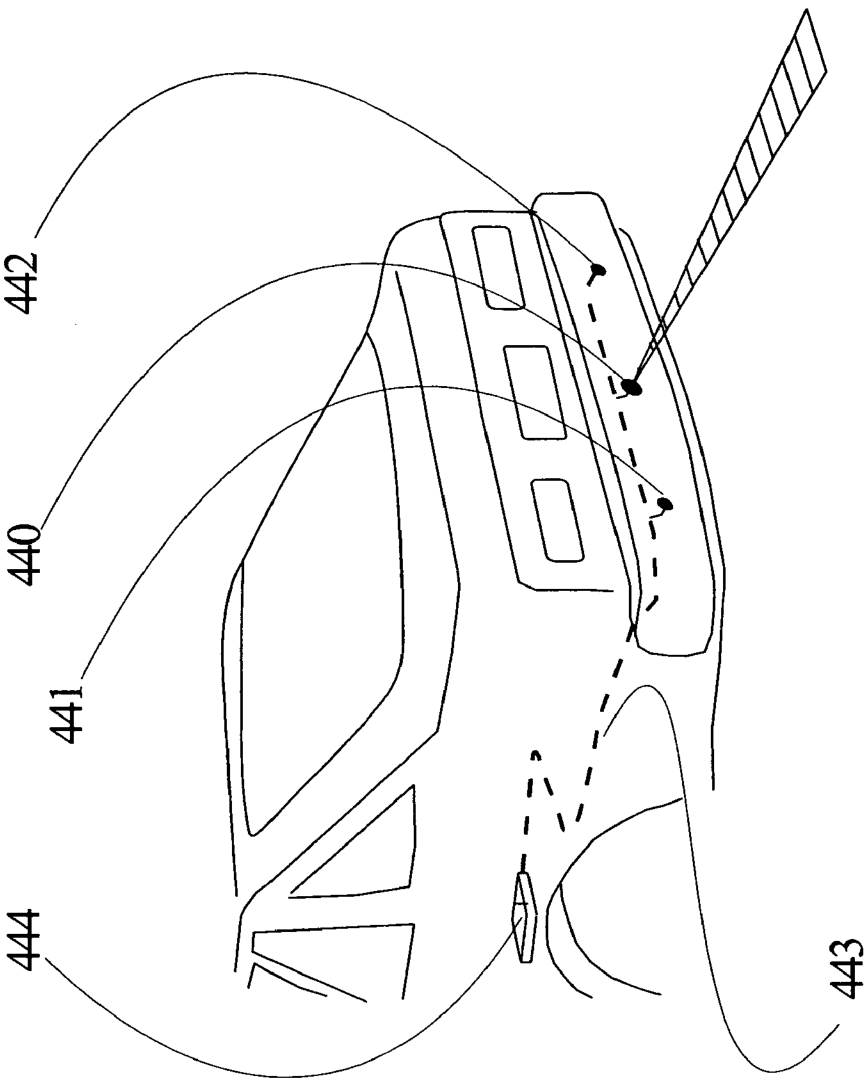

FIG. 120 is a perspective view of the rear portion of the vehicle shown FIG. 1 showing a rear crash anticipatory sensor connected to an electronic circuit for controlling the position of the headrest in the event of a crash.

Figure 121:
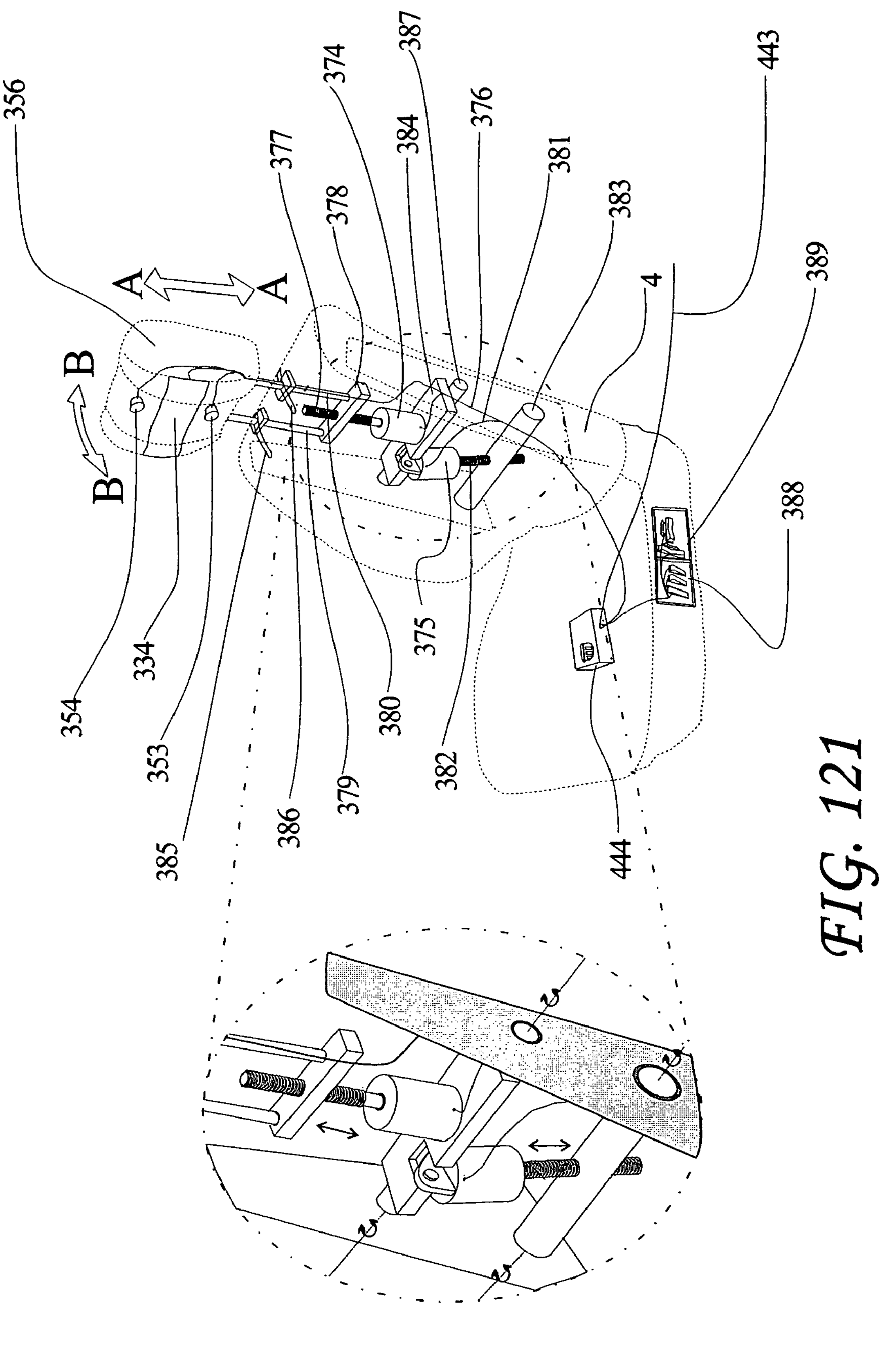

FIG. 121 is a perspective view of a headrest control mechanism mounted in a vehicle seat and ultrasonic head location sensors consisting of one transmitter and one receiver plus a head contact sensor, with the seat and headrest shown in phantom.

Figure 122:
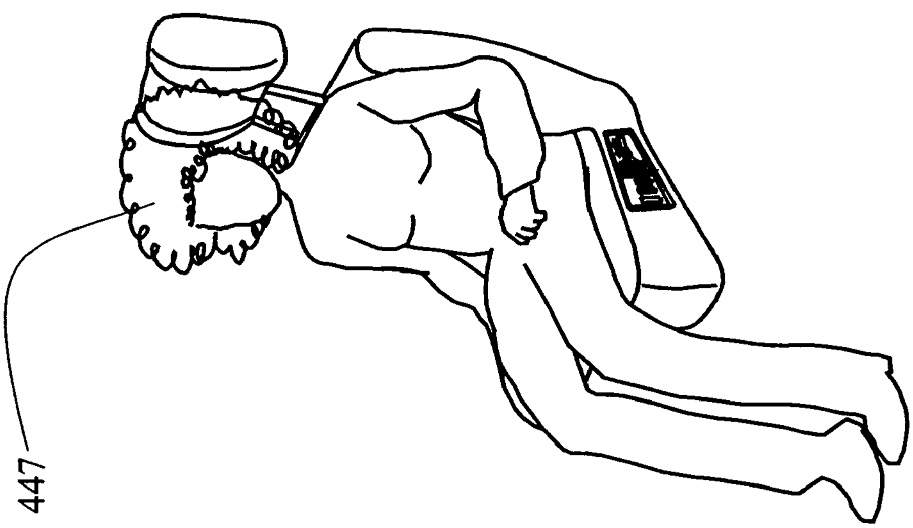

FIG. 122 is a perspective view of a female vehicle occupant having a large hairdo and also showing switches for manually adjusting the position of the headrest.

Figure 123:
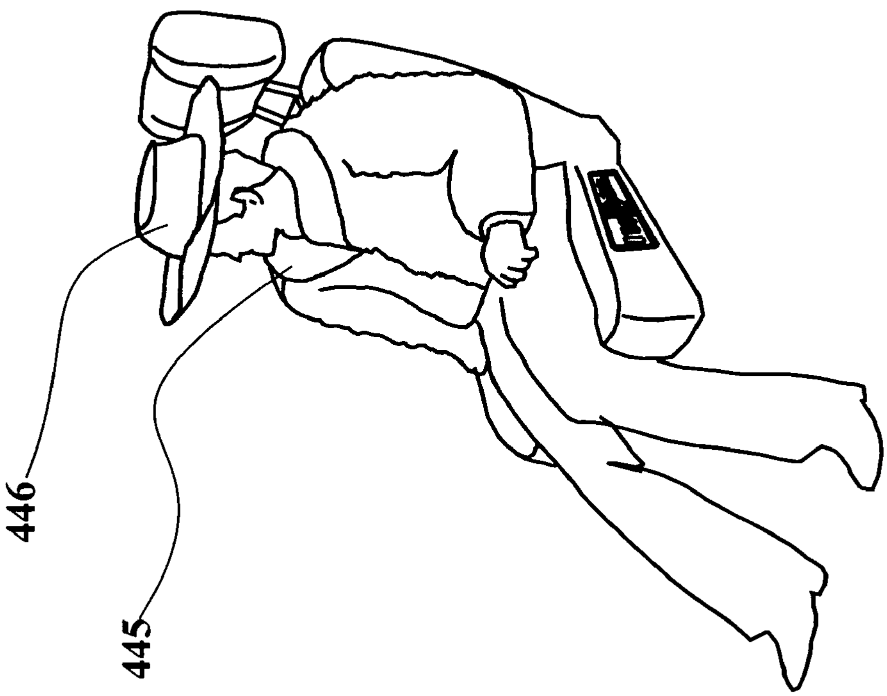

FIG. 123 is a perspective view of a male vehicle occupant wearing a winter coat and a large hat.

Figure 3:
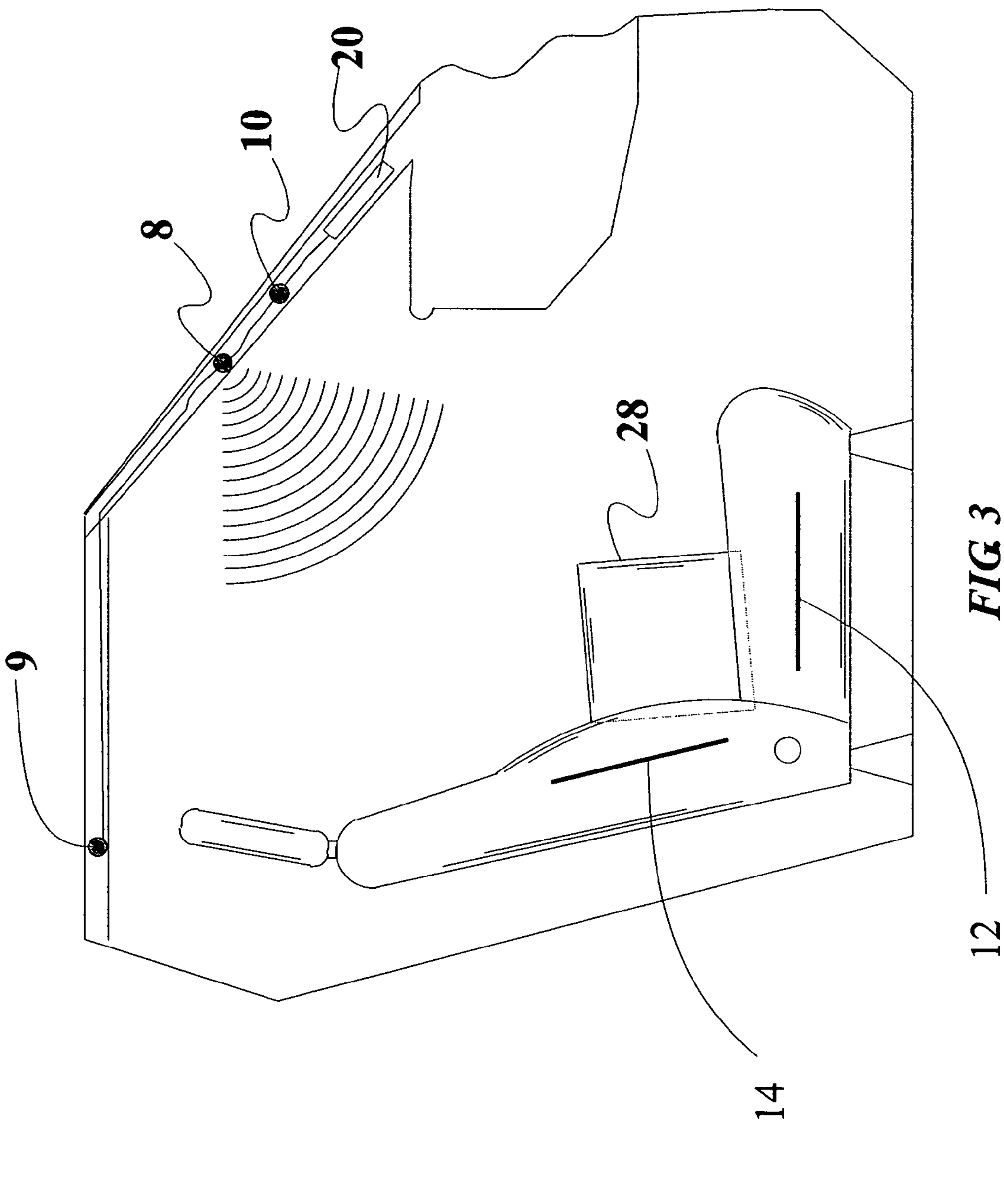
FIG. 3 is a side view with parts cutaway and removed of a vehicle showing the passenger compartment containing a box on the front passenger seat and a preferred mounting location for an occupant and rear facing child seat presence detector and including an antenna field sensor.
Figure 124:
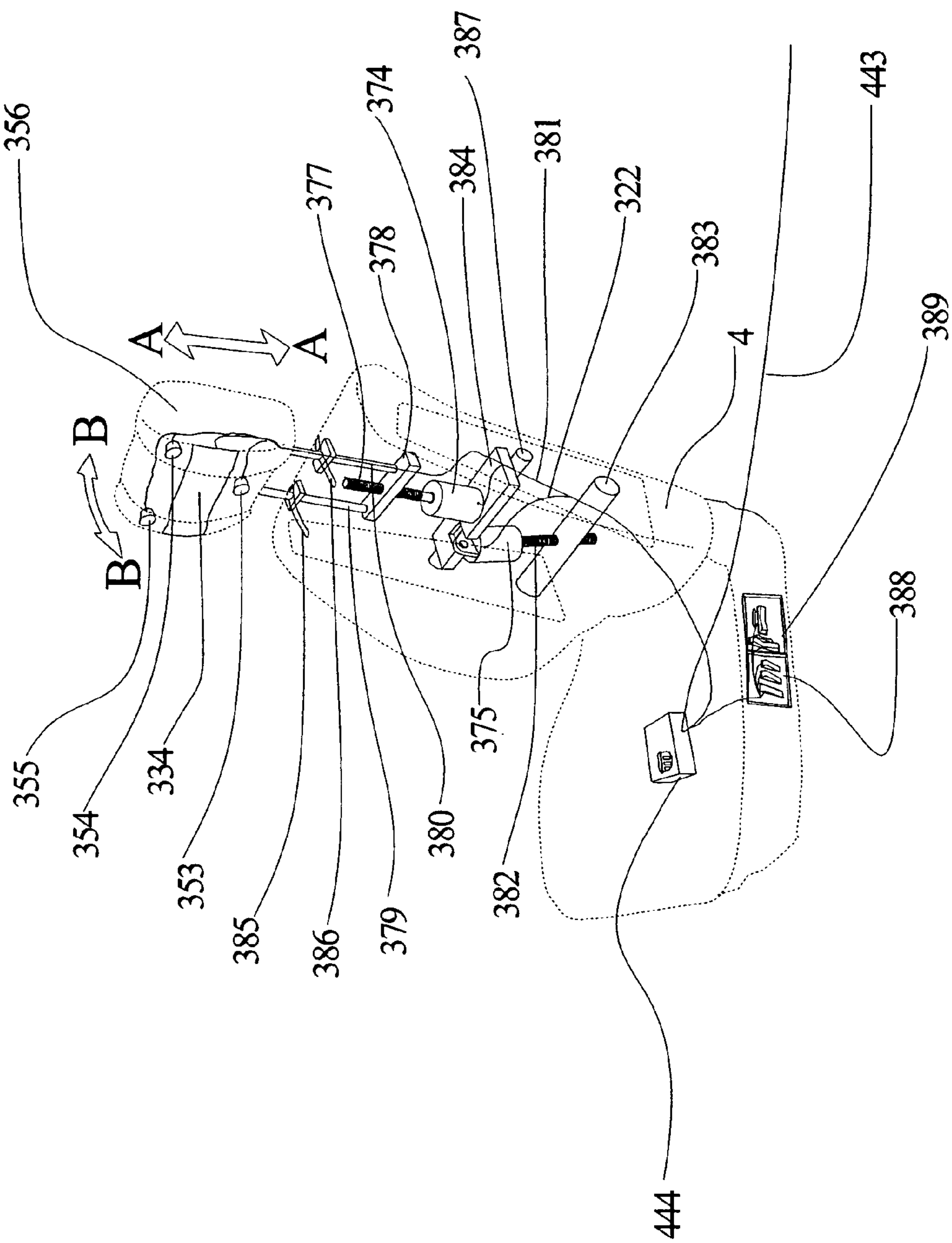

FIG. 124 is view similar to FIG. 3 showing an alternate design of a head sensor using one transmitter and three receivers for use with a pattern recognition system.

Figure 125:
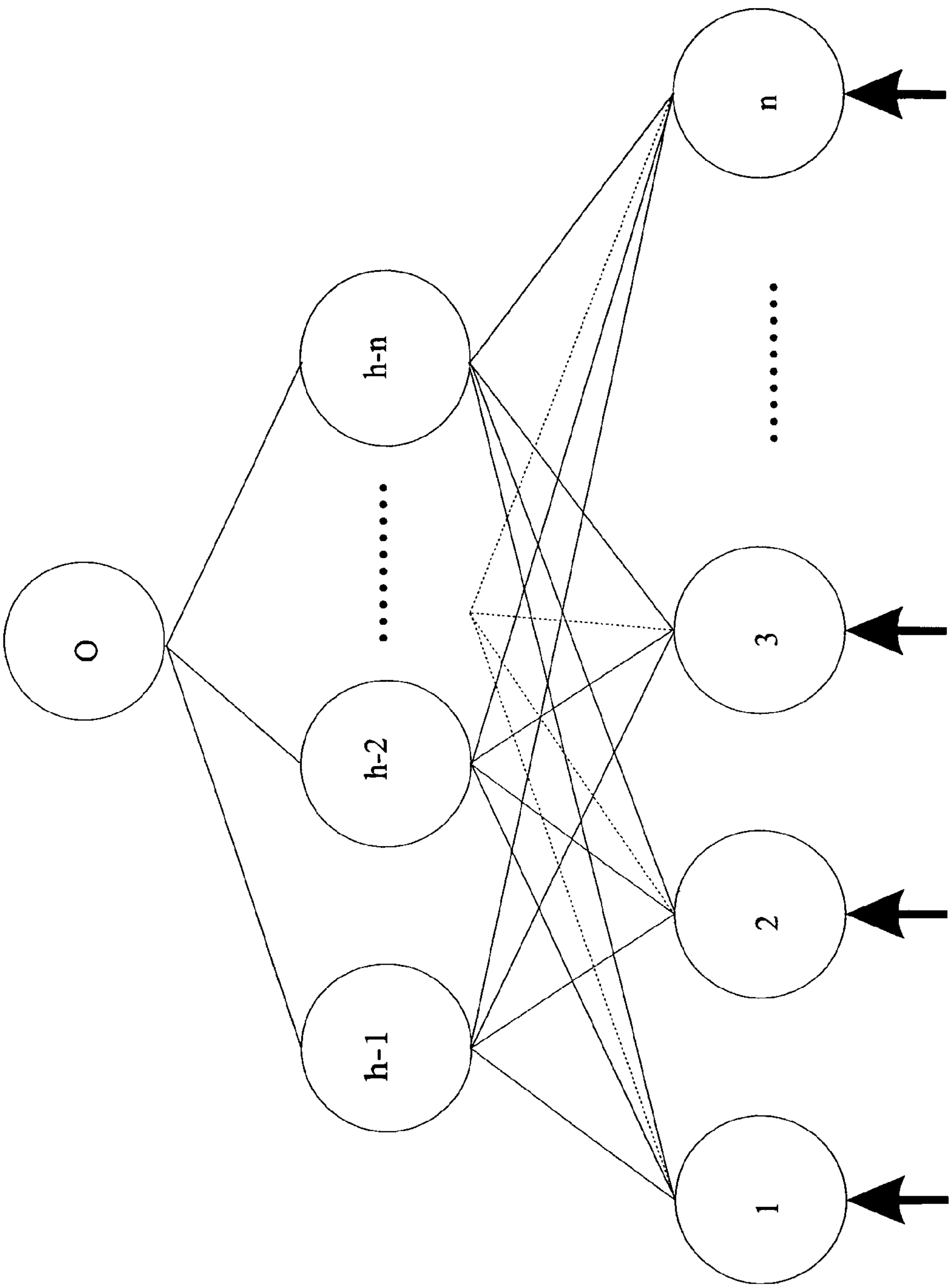

FIG. 125 is a schematic view of an artificial neural network pattern recognition system of the type used to recognize an occupant's head.

Figure 126:
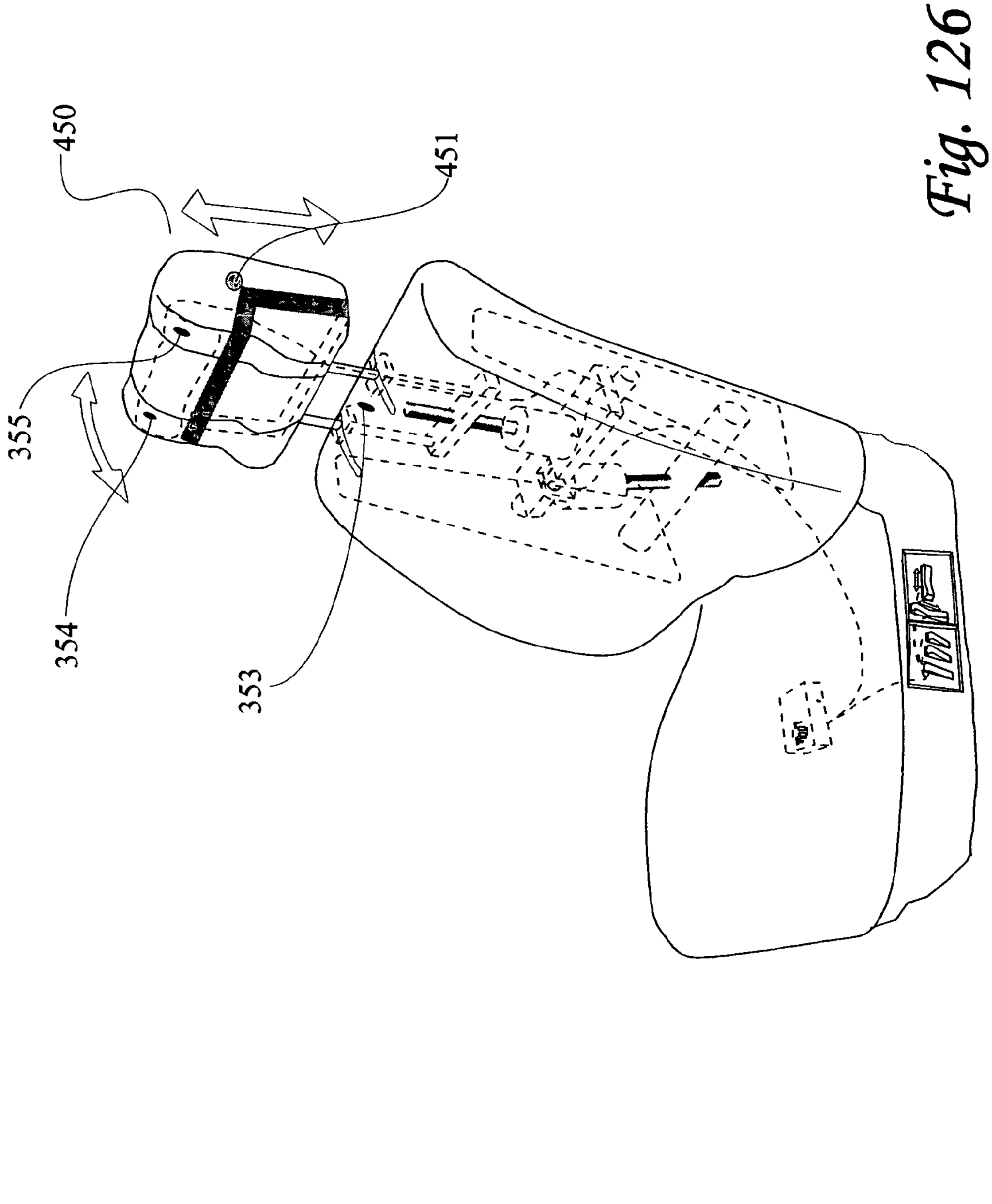

FIG. 126 is a perspective view of an of automatically adjusting head and neck supporting headrest.

Figure 126A:
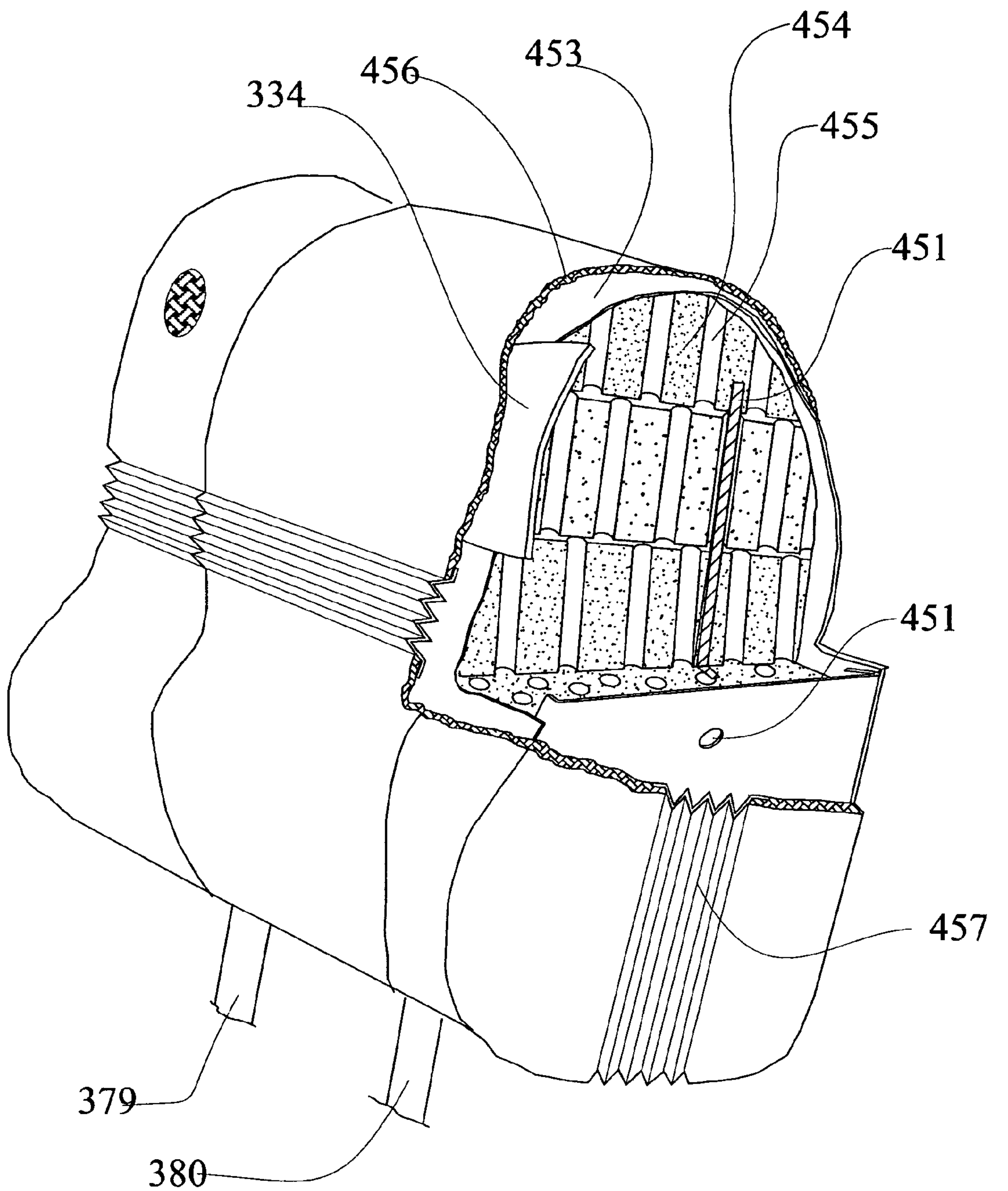

FIG. 126A is a perspective view with portions cut away and removed of the headrest of FIG. 125.

Figure 127A:
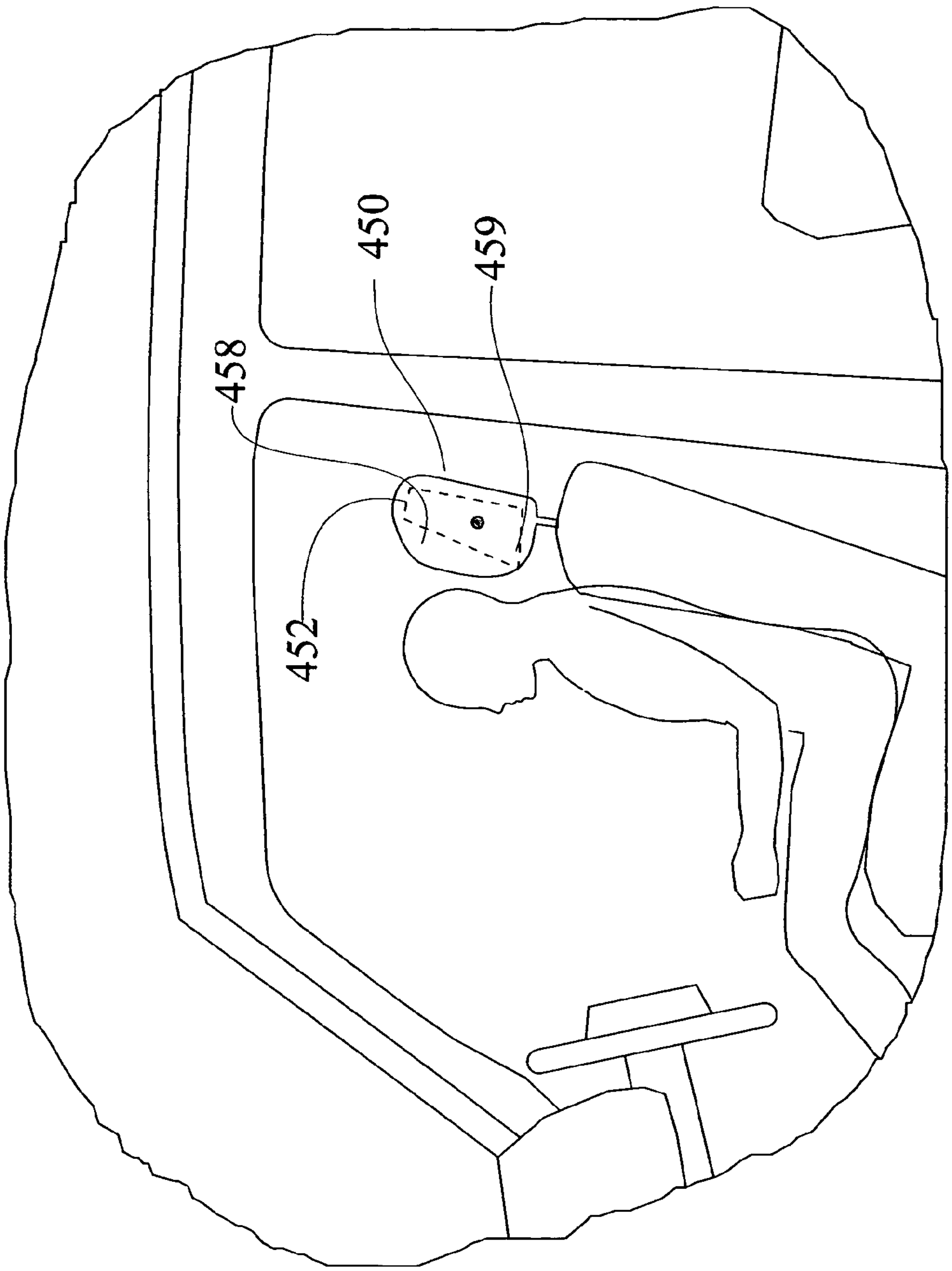

FIG. 127A is a side view of an occupant seated in the driver seat of an automobile with the headrest in the normal position.

Figure 127B:
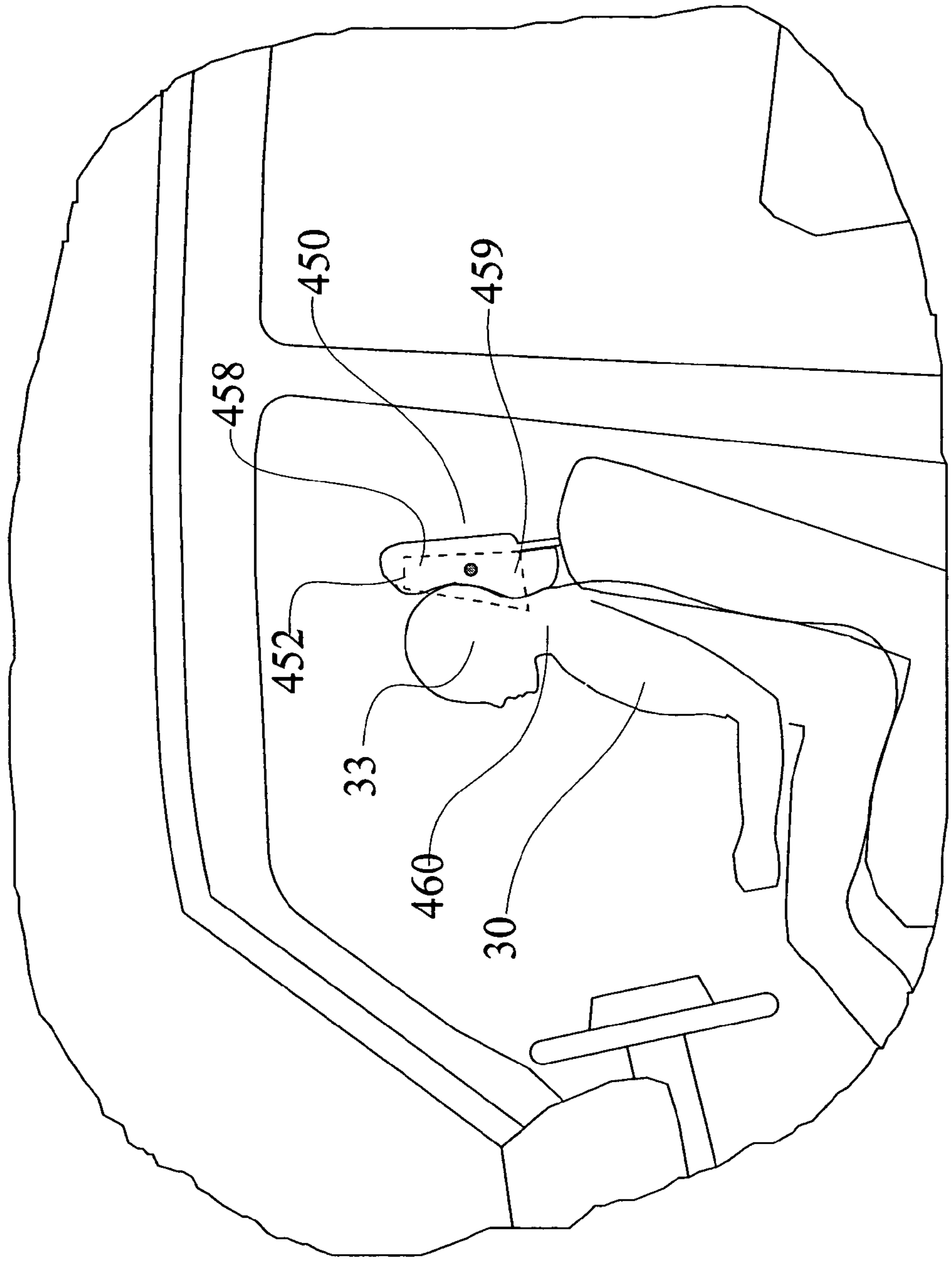

FIG. 127B is a view as in FIG. 126A with the headrest in the head contact position as would happen in anticipation of a rear crash.

Figure 128A:
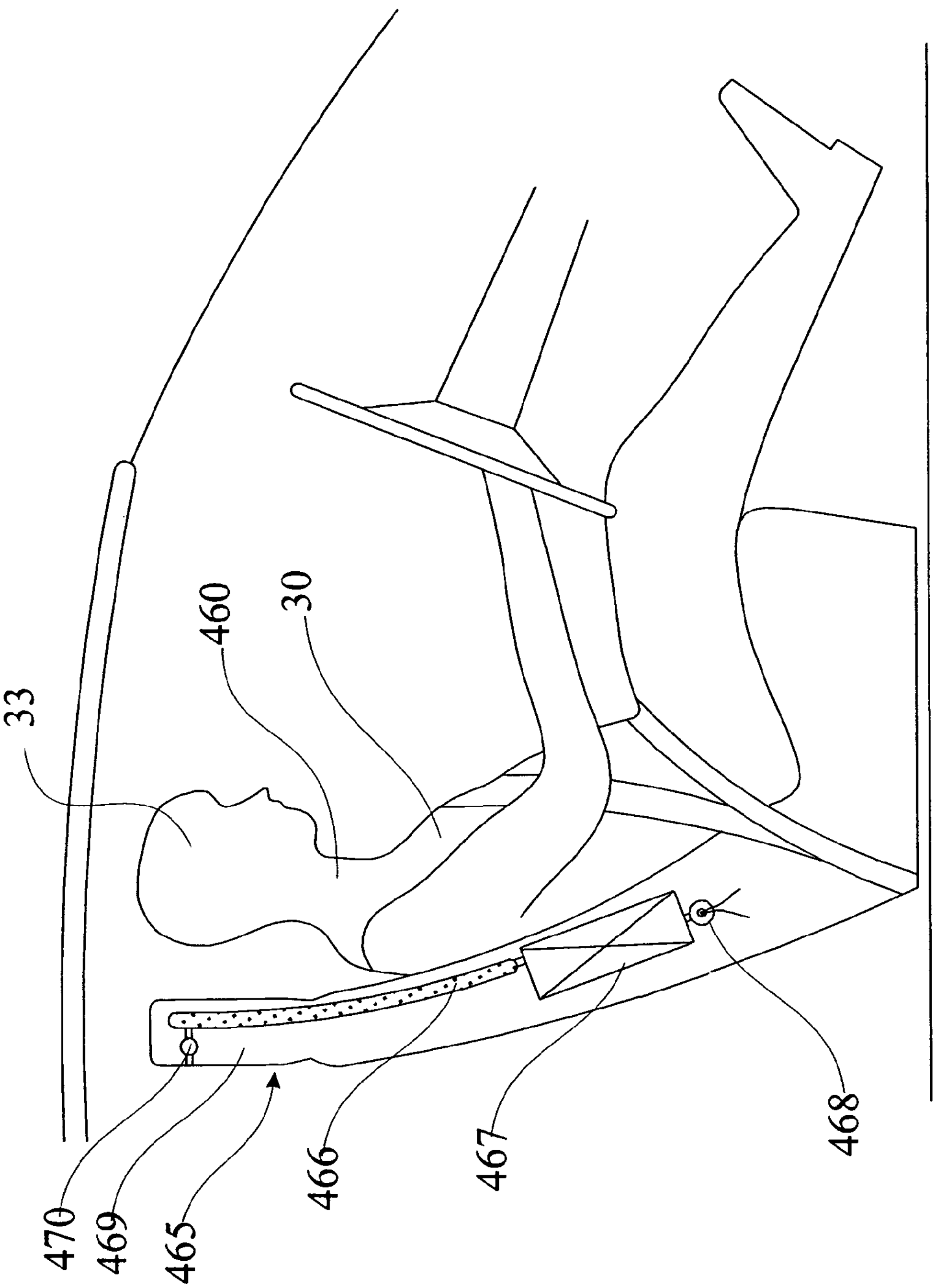

FIG. 128A is a side view of an occupant seated in the driver seat of an automobile having an integral seat and headrest and an inflatable pressure controlled bladder with the bladder in the normal position.

Figure 128B:
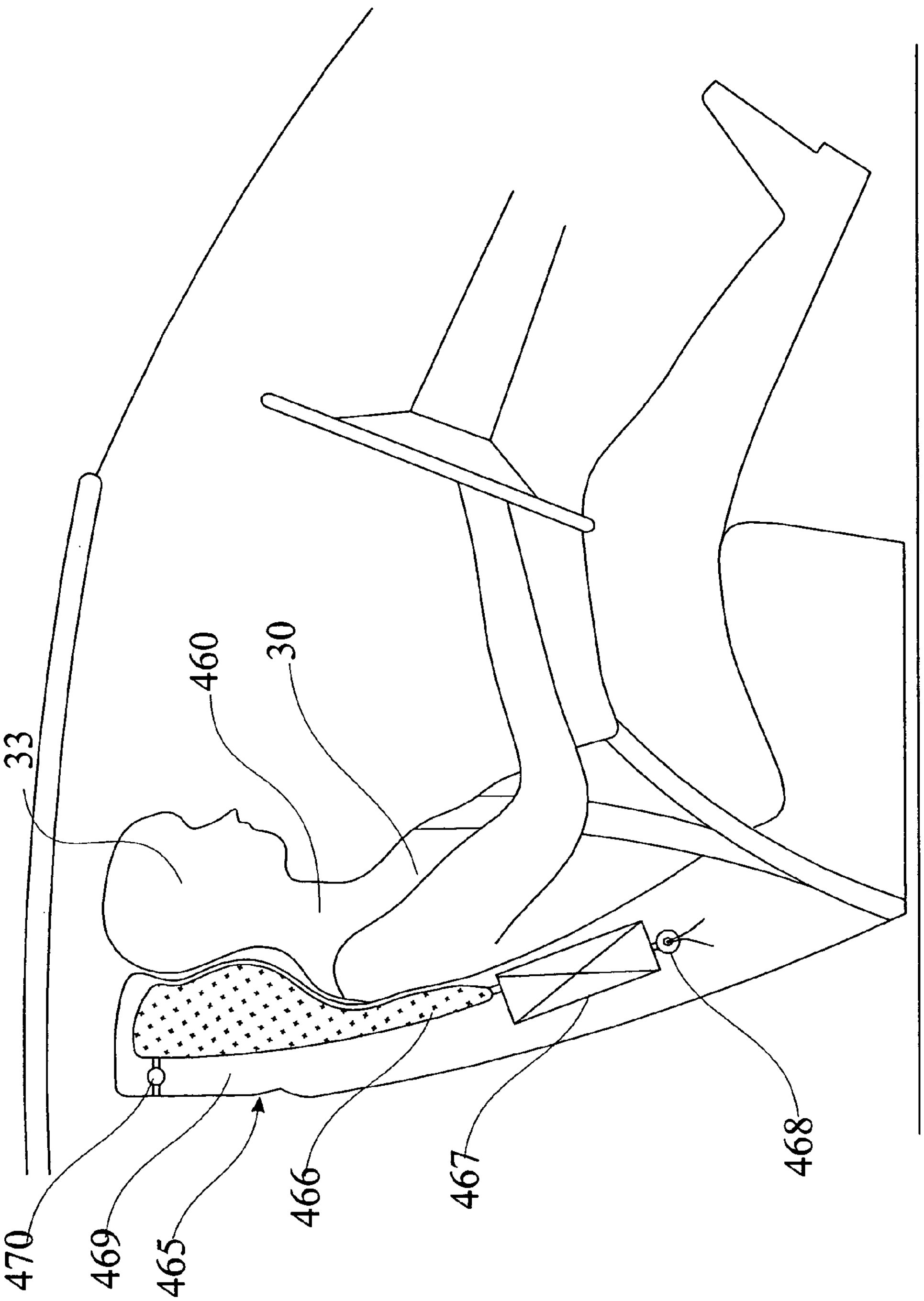

FIG. 128B is a view as in FIG. 127A with the bladder expanded in the head contact position as would happen in anticipation of, e.g., a rear crash.

Figure 129A:
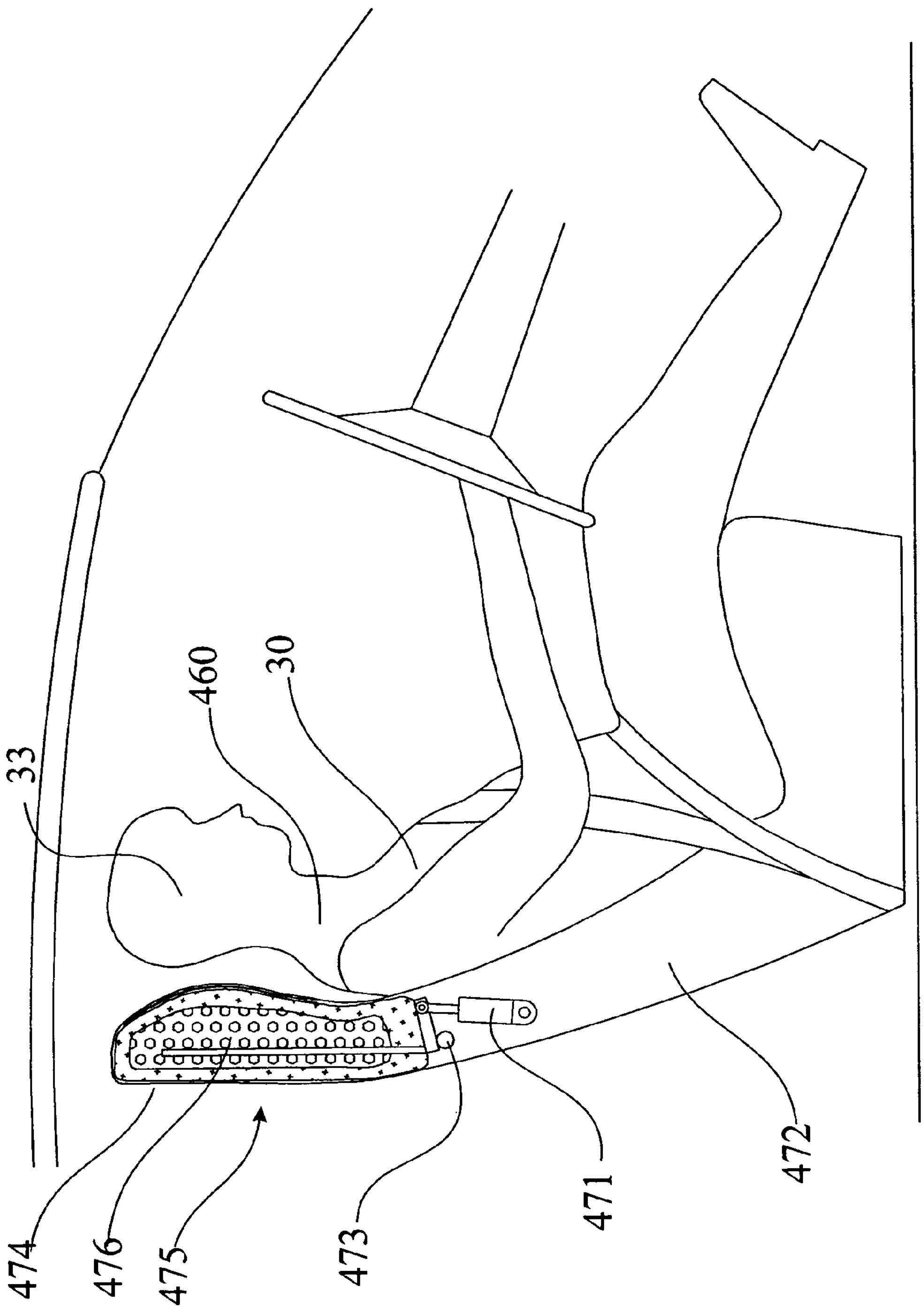

FIG. 129A is a side view of an occupant seated in the driver seat of an automobile having an integral seat and a pivotable headrest and bladder with the headrest in the normal position.

Figure 129B:
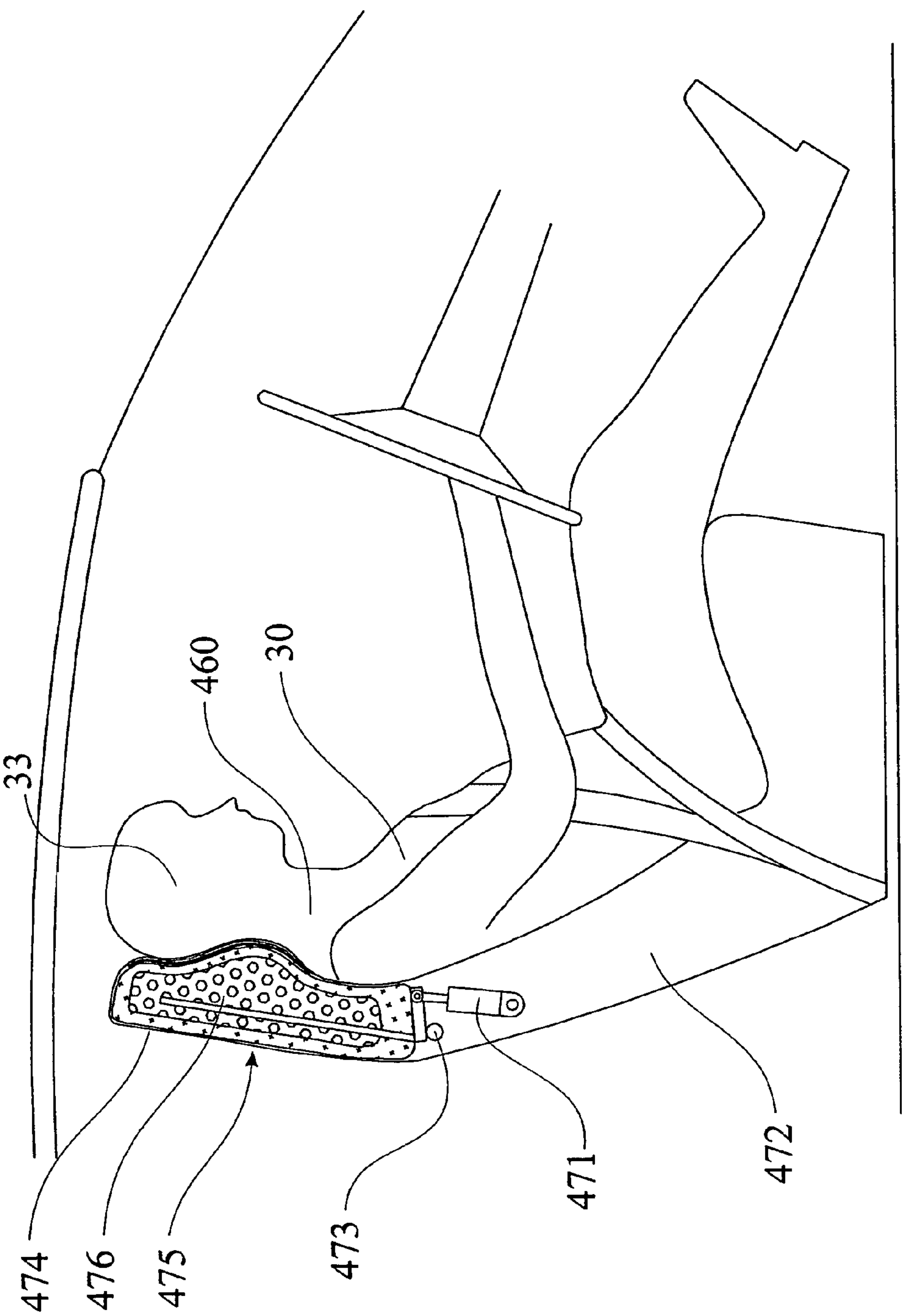

FIG. 129B is a view as in FIG. 128A with the headrest pivoted in the head contact position as would happen in anticipation of, e.g., a rear crash.

Figure 130:
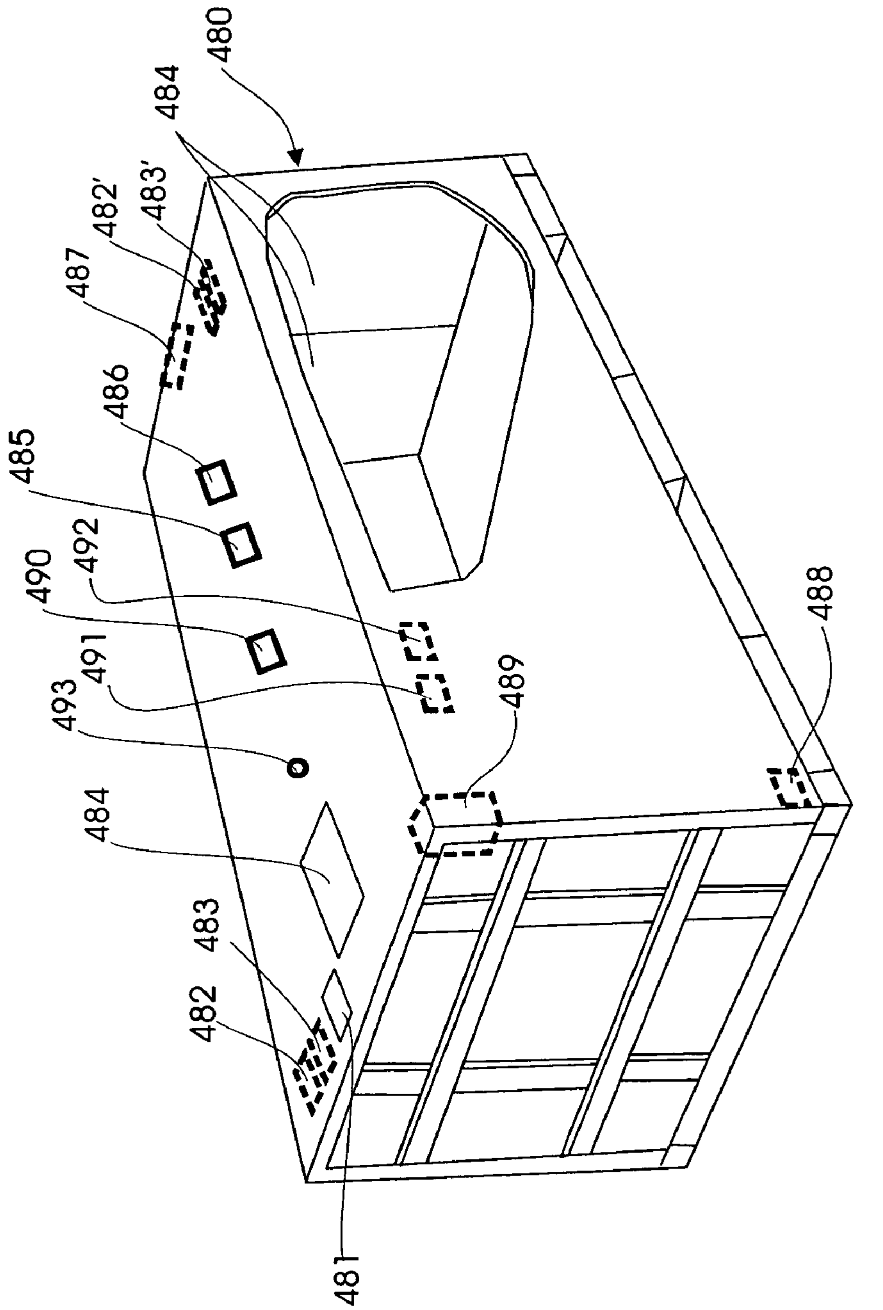

FIG. 130 is a perspective view showing a shipping container including one embodiment of the monitoring system in accordance with the present invention.

Figure 131:
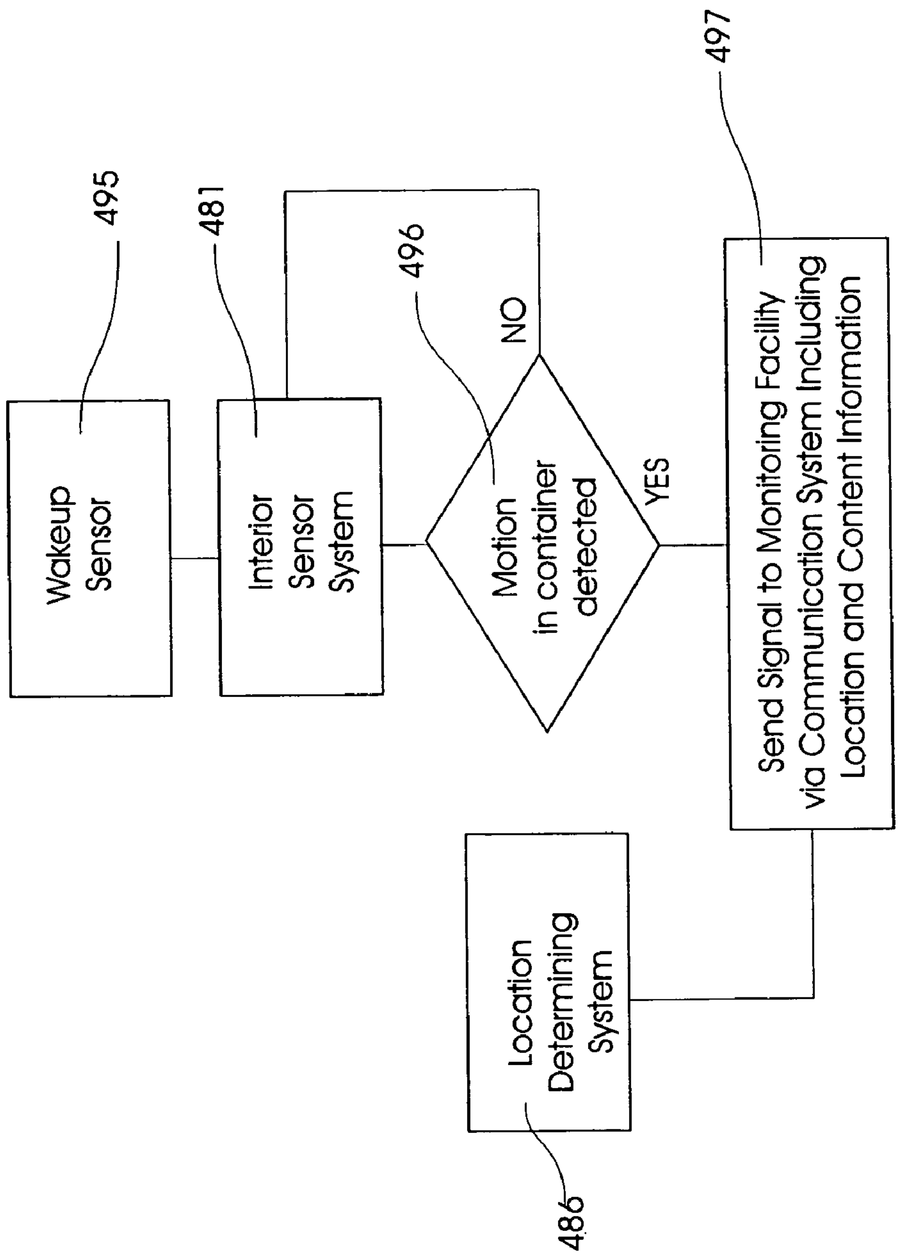

FIG. 131 is a flow chart showing one manner in which a container is monitored in accordance with the invention.

Figure 132A:
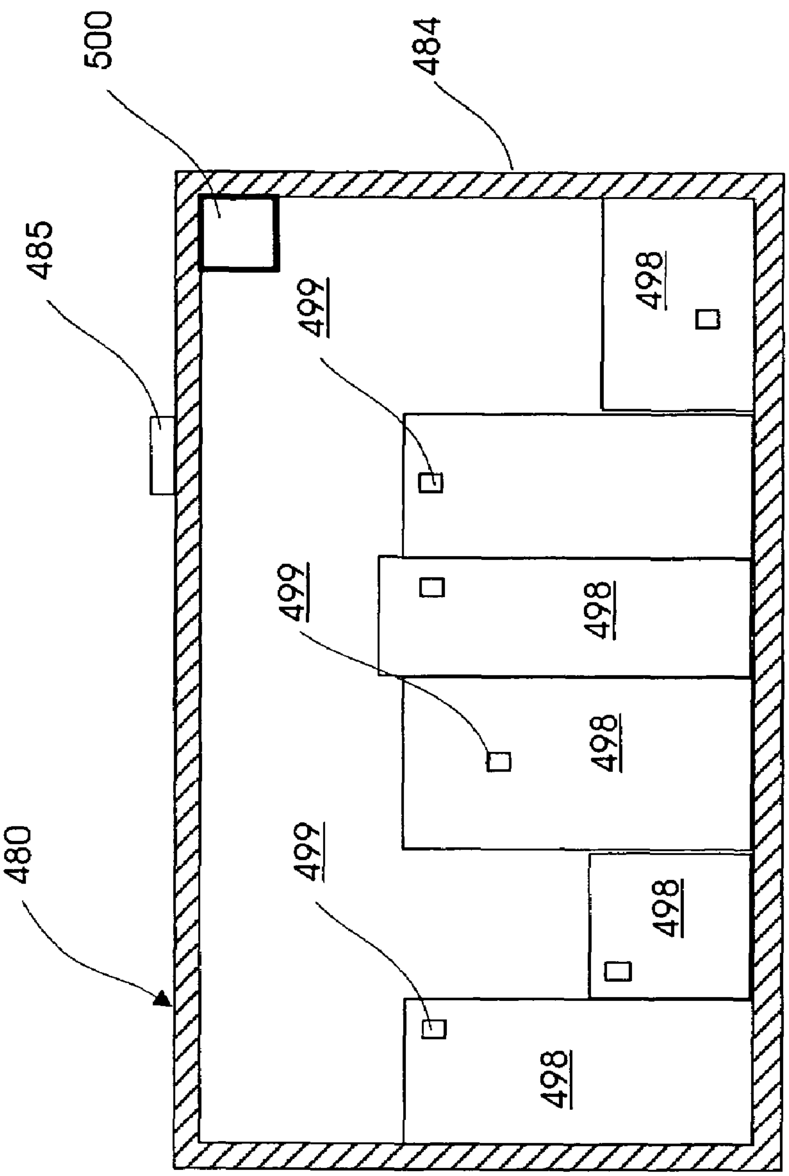

FIG. 132A is a cross-sectional view of a container showing the use of RFID technology in a monitoring system and method in accordance with the invention.

Figure 132B:
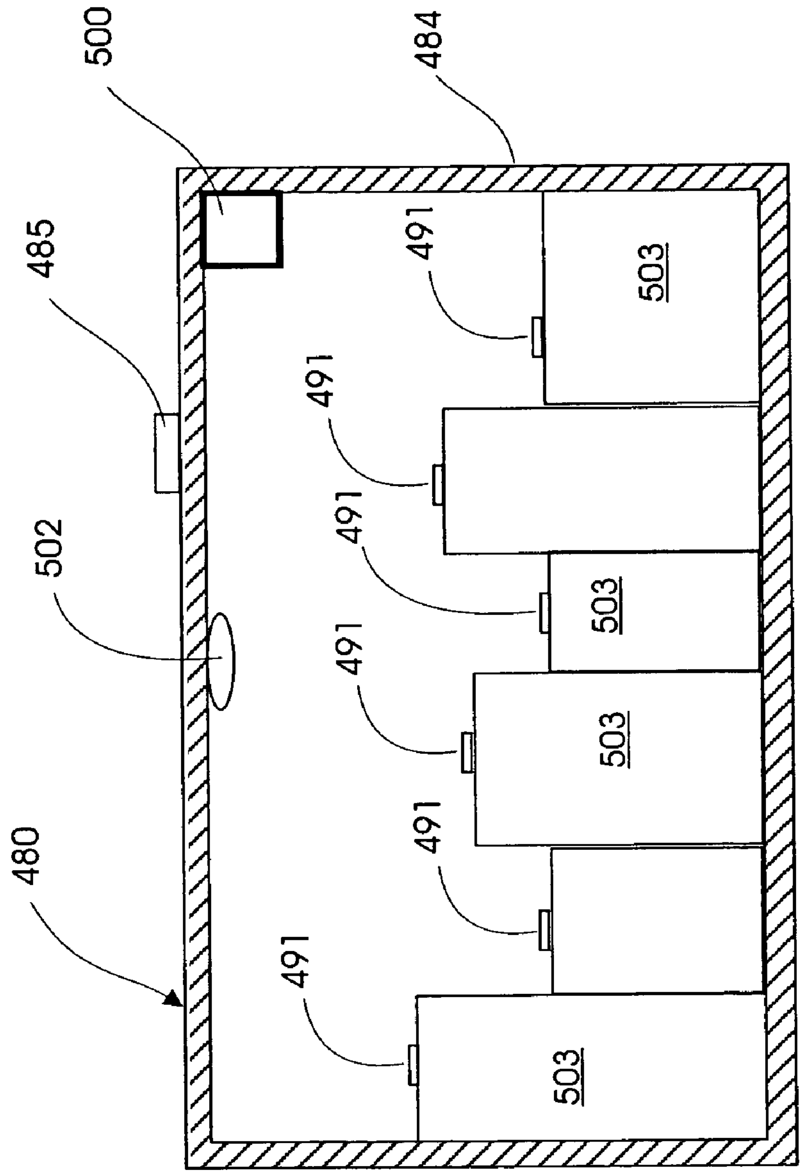

FIG. 132B is a cross-sectional view of a container showing the use of barcode technology in a monitoring system and method in accordance with the invention.

Figure 133:
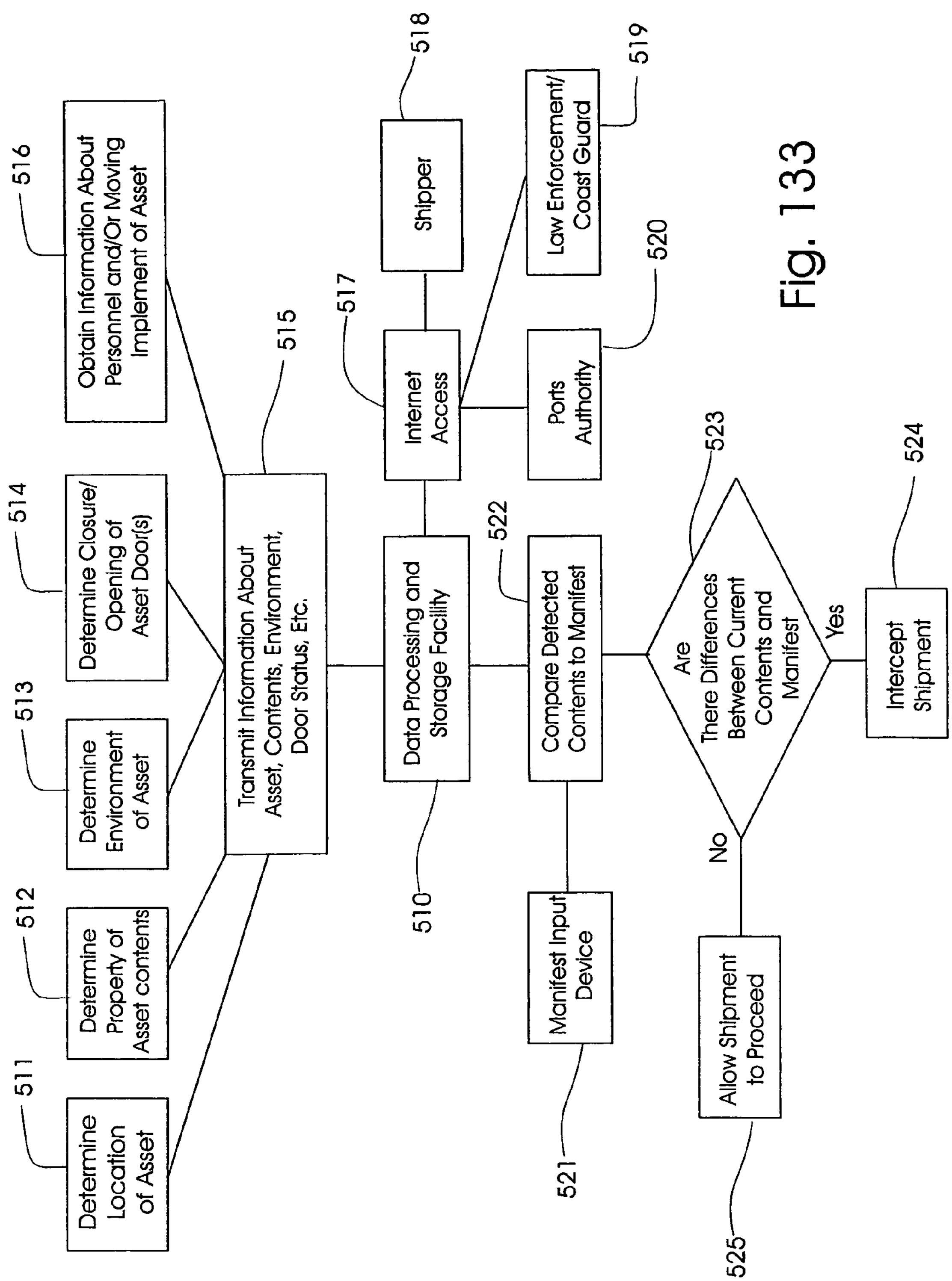

FIG. 133 is a flow chart showing one manner in which multiple assets are monitored in accordance with the invention.

Figure 134:
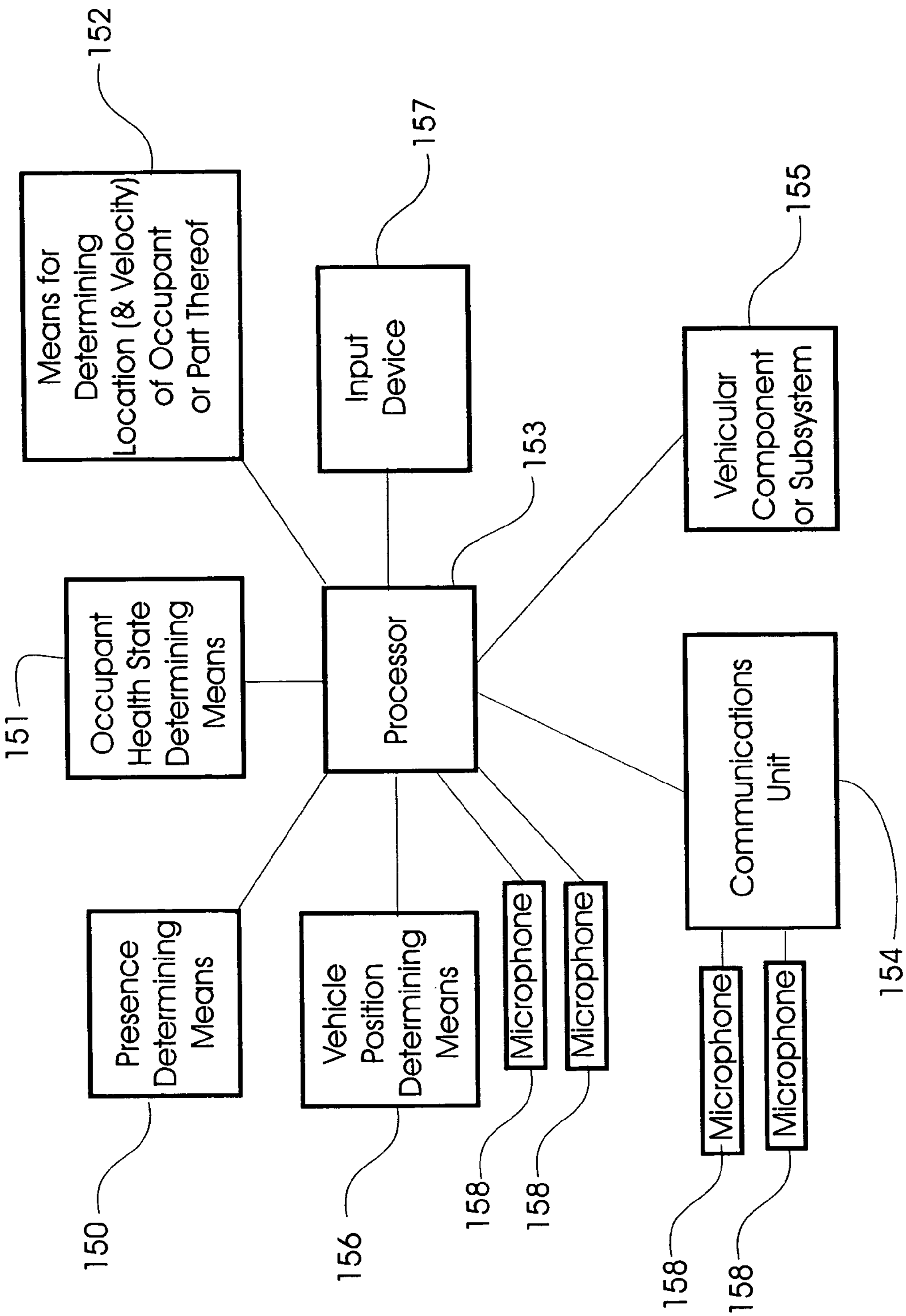

FIG. 134 is a diagram of one exemplifying embodiment of the invention.

Figure 135:
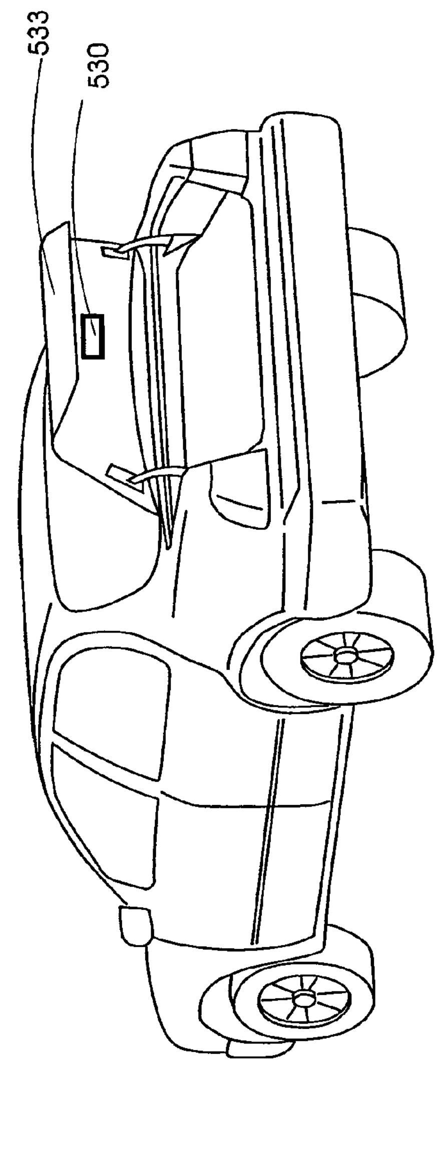

FIG. 135 is a perspective view of a carbon dioxide SAW sensor for mounting in the trunk lid for monitoring the inside of the trunk for detecting trapped children or animals.

Figure 135A:
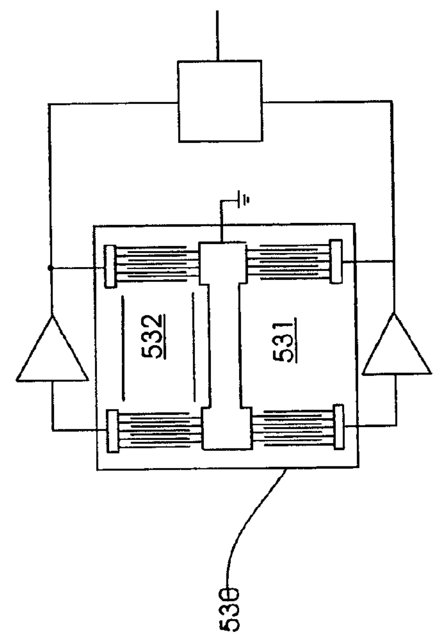

FIG. 135A is a detailed view of the SAW carbon dioxide sensor of FIG. 135.

Figure 136:
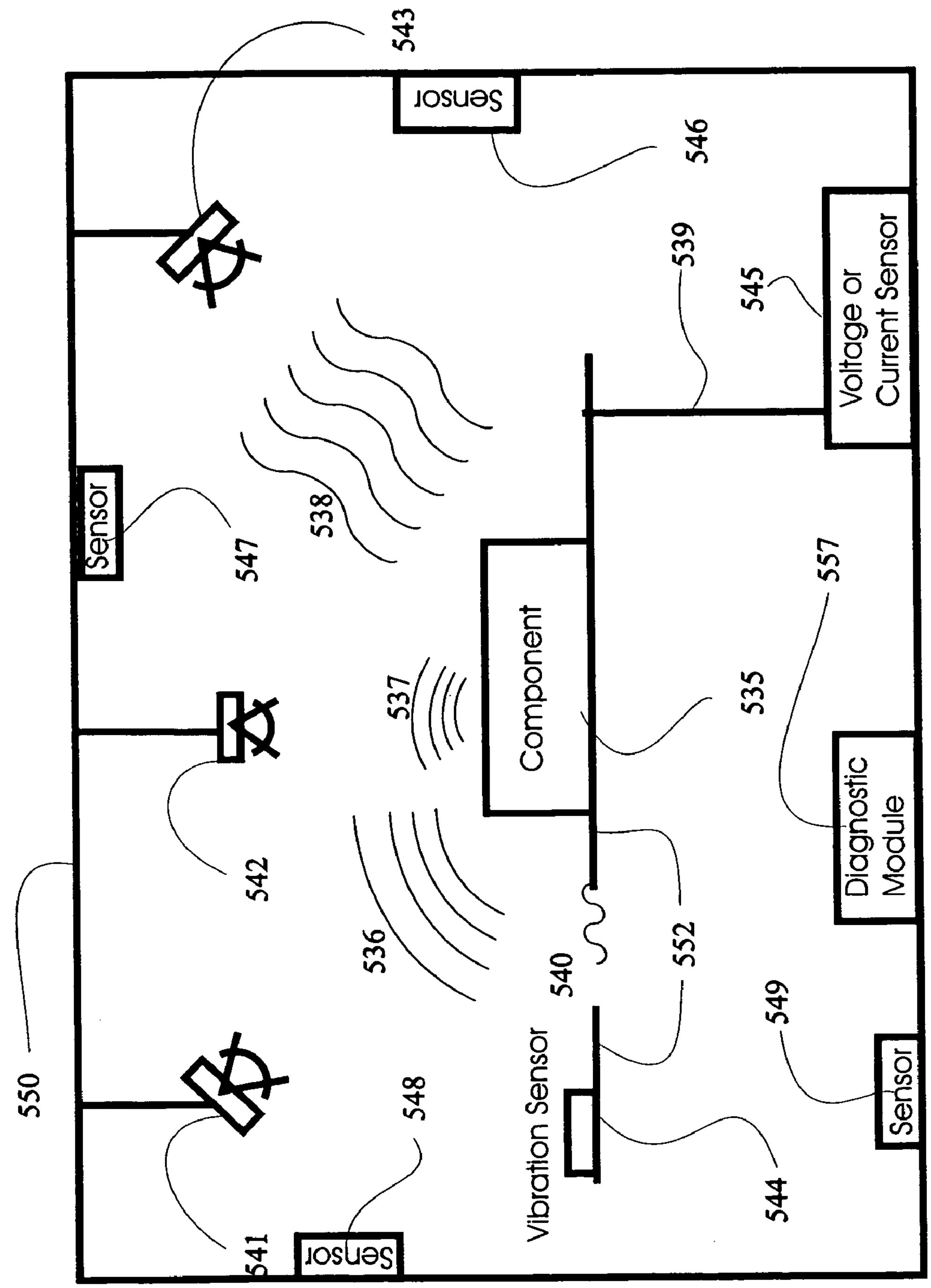

FIG. 136 is a schematic illustration of a generalized component with several signals being emitted and transmitted along a variety of paths, sensed by a variety of sensors and analyzed by the diagnostic module in accordance with the invention and for use in a method in accordance with the invention.

Figure 137:
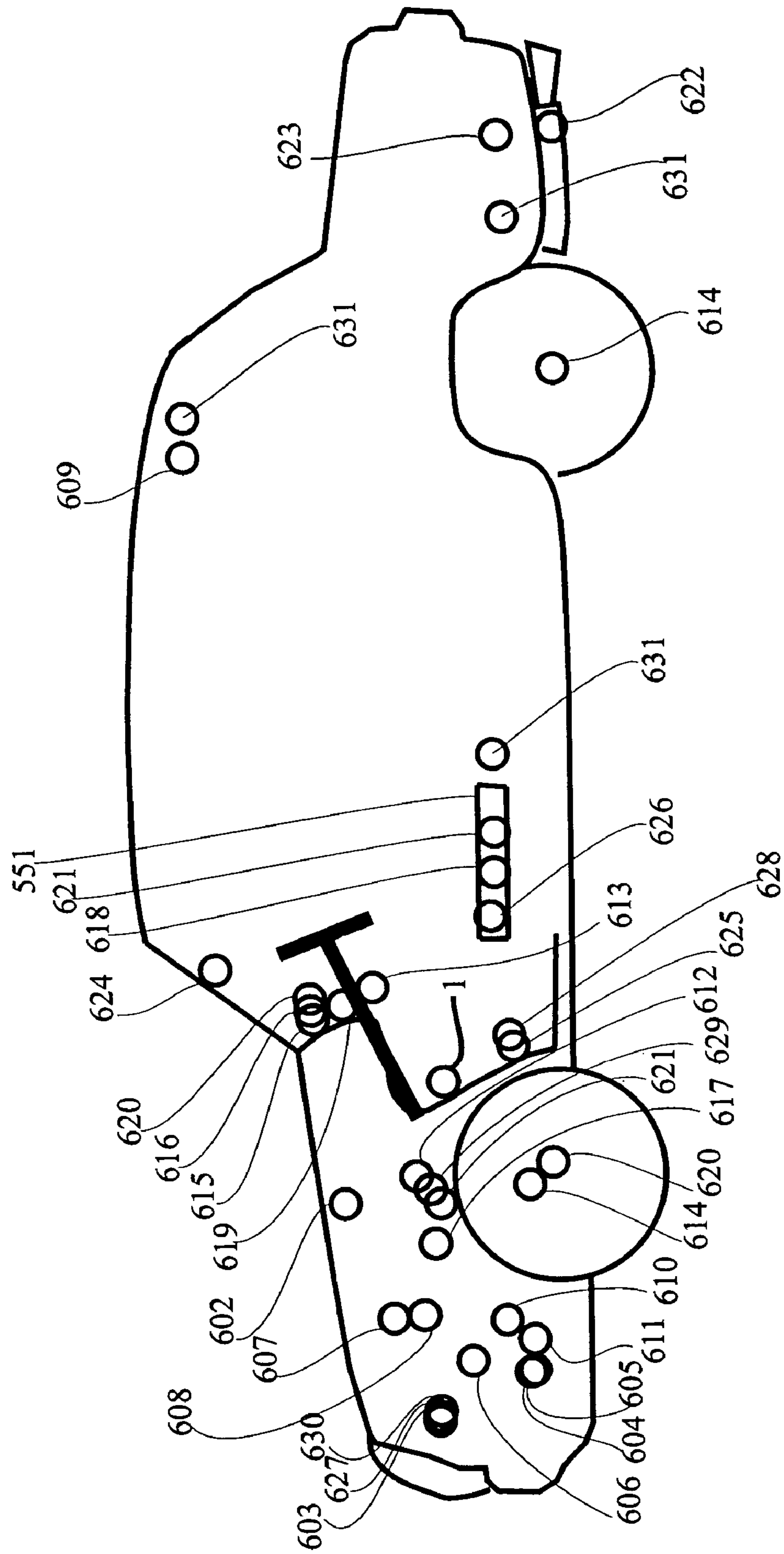

FIG. 137 is a schematic of a vehicle with several components and several sensors and a total vehicle diagnostic system in accordance with the invention utilizing a diagnostic module in accordance with the invention and which may be used in a method in accordance with the invention.

Figure 138:
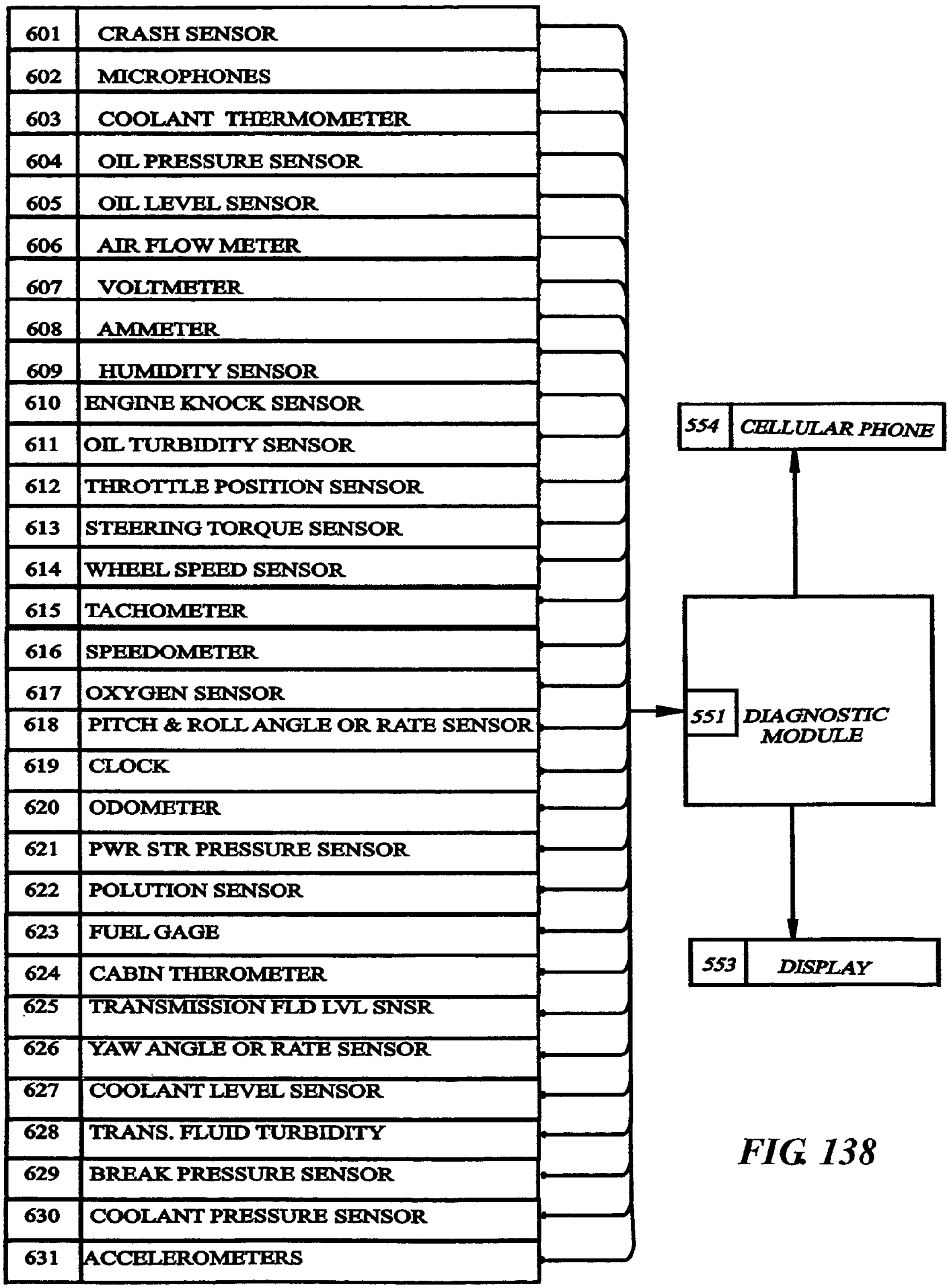

FIG. 138 is a flow diagram of information flowing from various sensors onto the vehicle data bus and thereby into the diagnostic module in accordance with the invention with outputs to a display for notifying the driver, and to the vehicle cellular phone for notifying another person, of a potential component failure.

Figure 139:
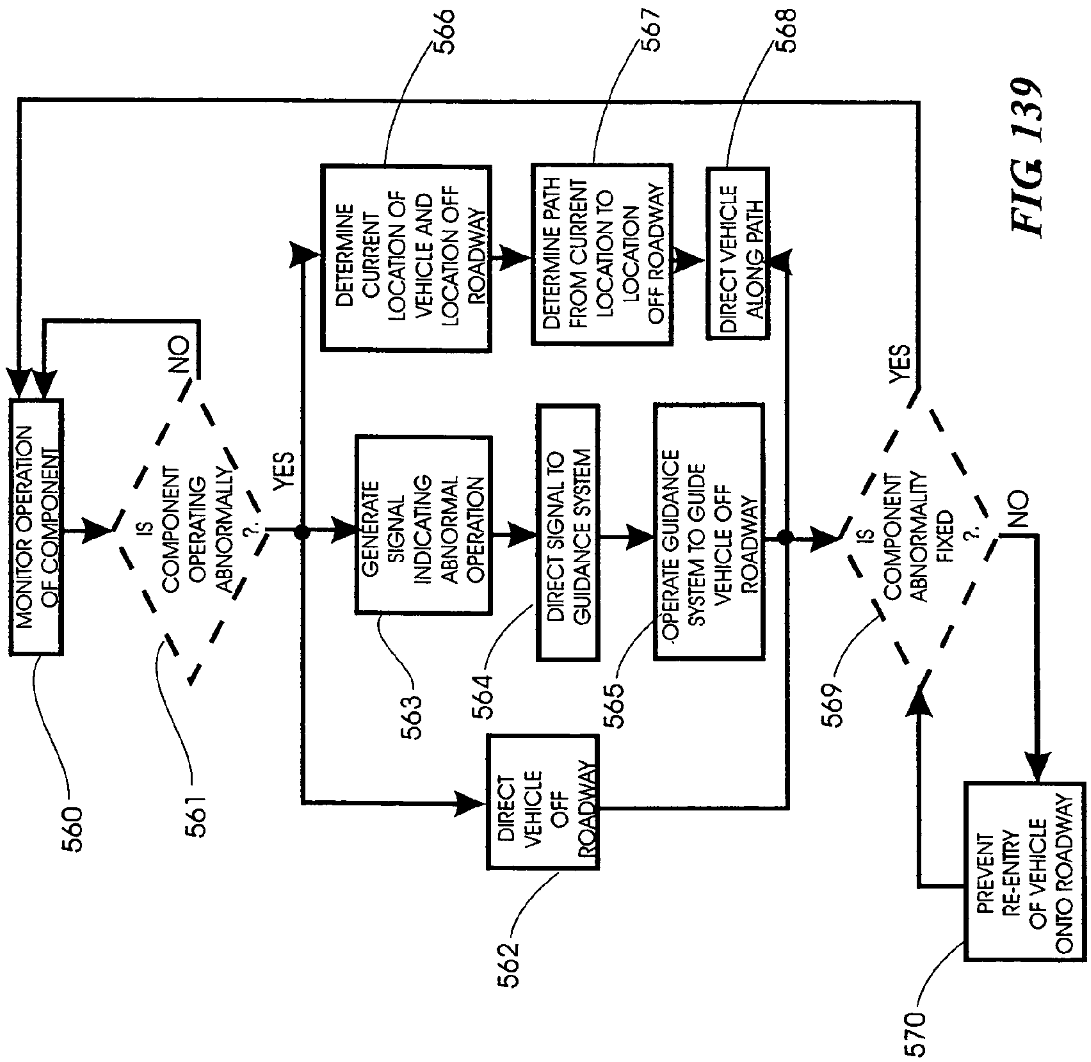

FIG. 139 is a flow chart of the methods for automatically monitoring a vehicular component in accordance with the invention.

Figure 140:
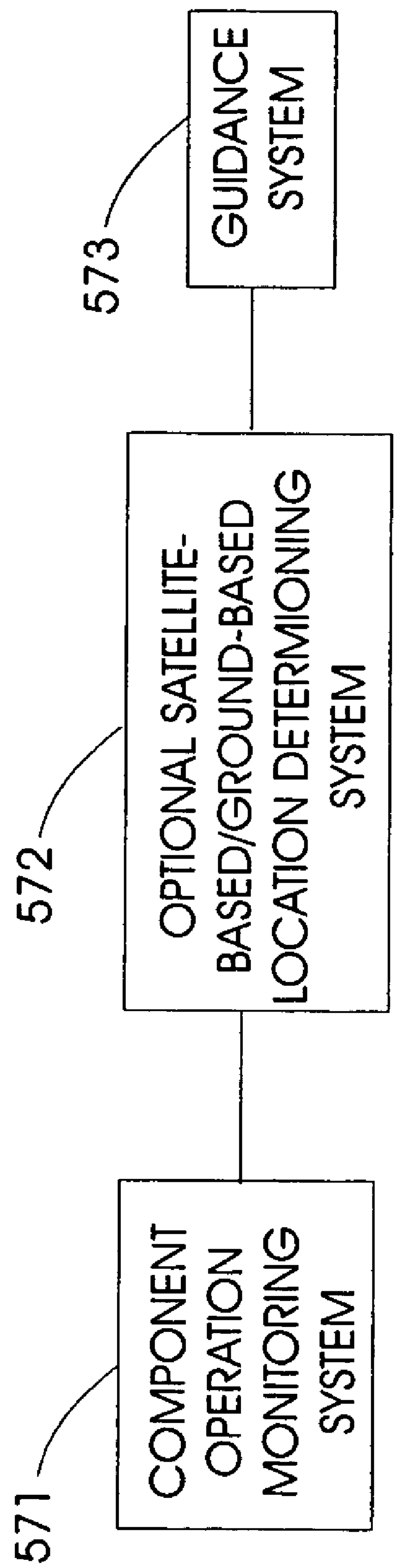

FIG. 140 is a schematic illustration of the components used in the methods for automatically monitoring a vehicular component.

Figure 141:
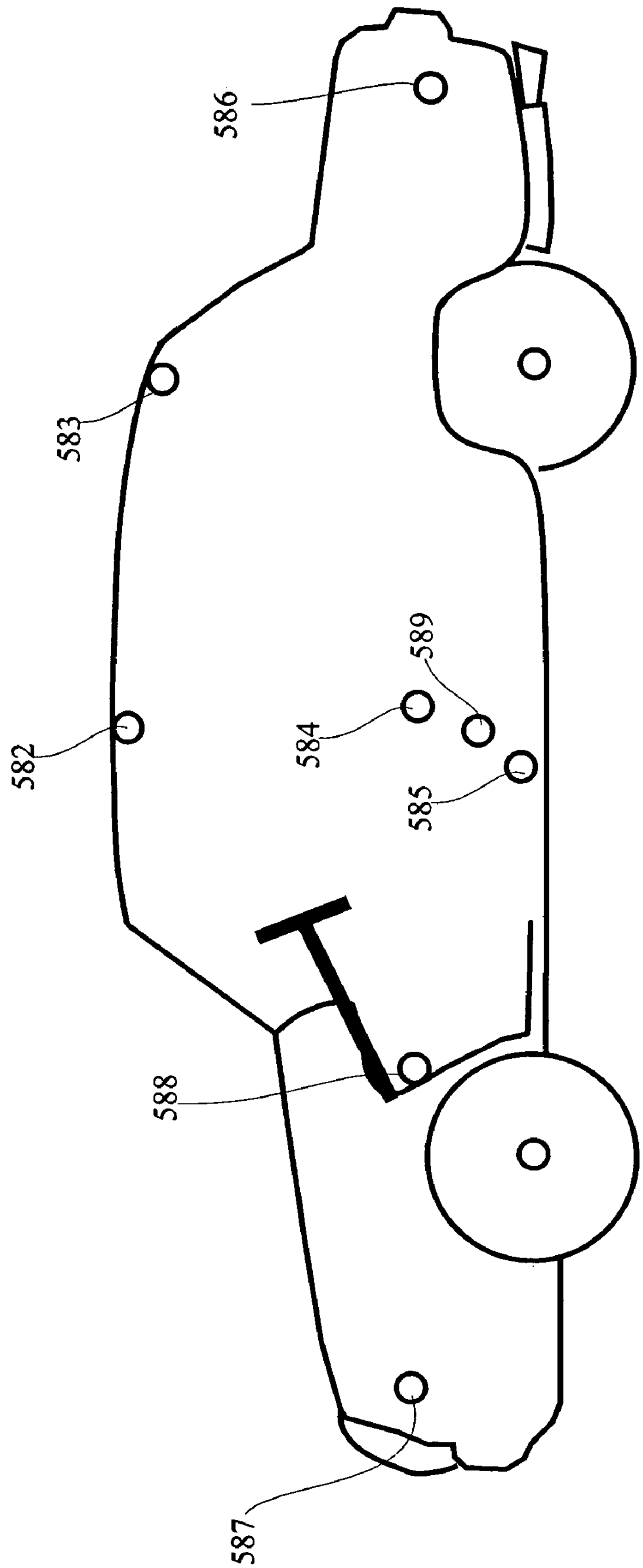

FIG. 141 is a schematic of a vehicle with several accelerometers and/or gyroscopes at preferred locations in the vehicle.

Figure 142:
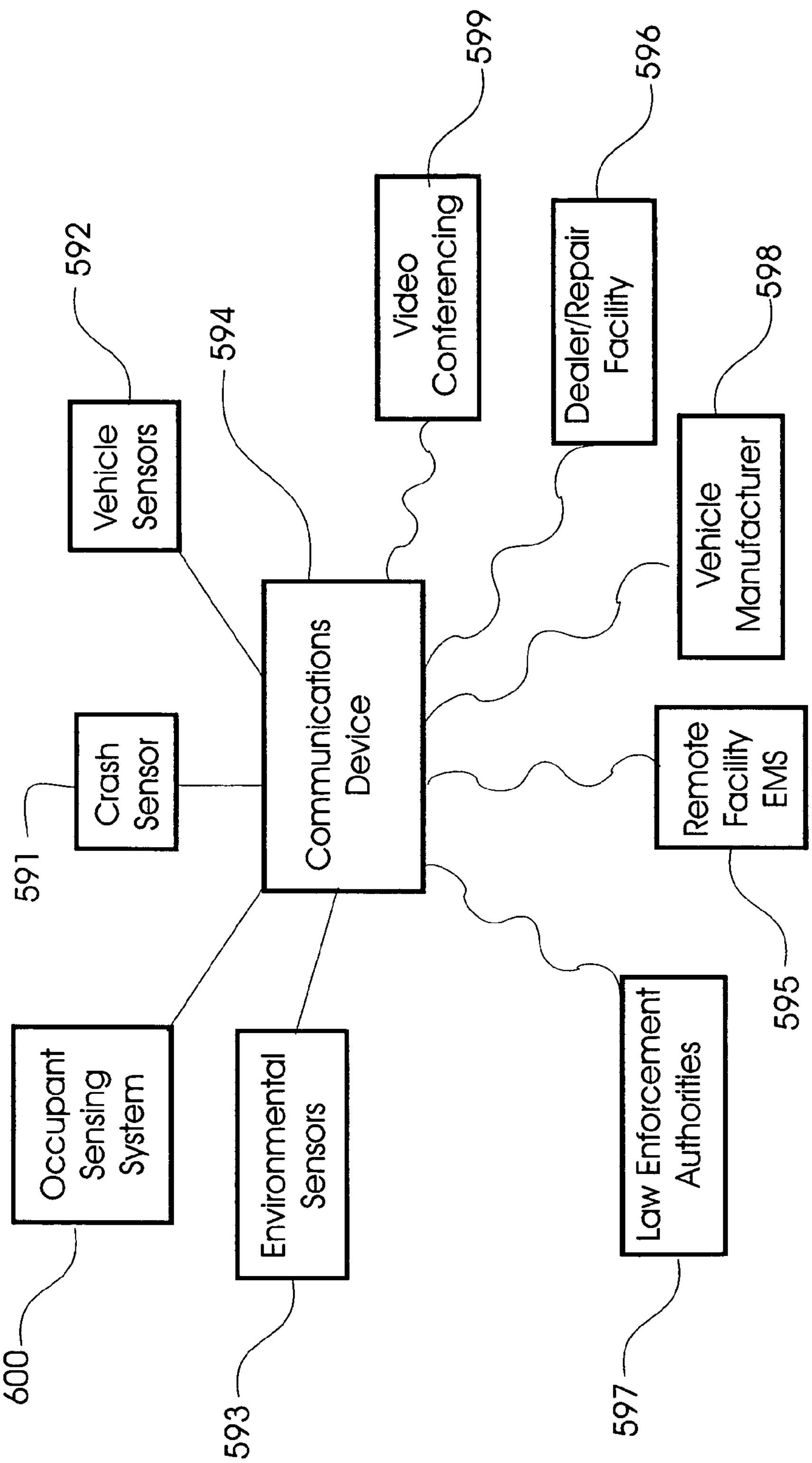

FIG. 142 is a schematic view of overall telematics system in accordance with the invention.

Figure 143A:
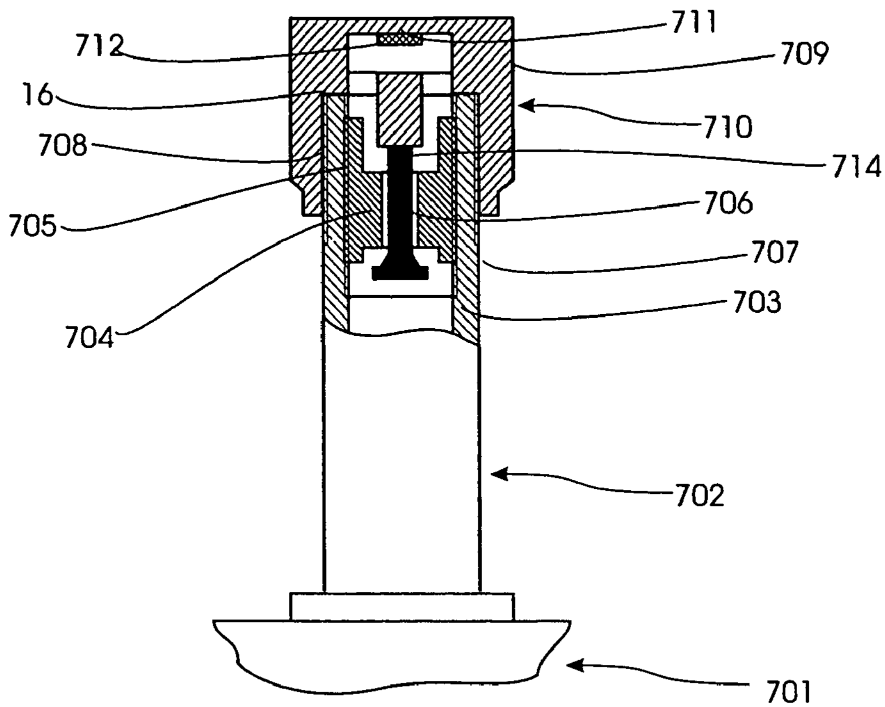

FIG. 143A is a partial cutaway view of a tire pressure monitor using an absolute pressure measuring SAW device.

Figure 143B:
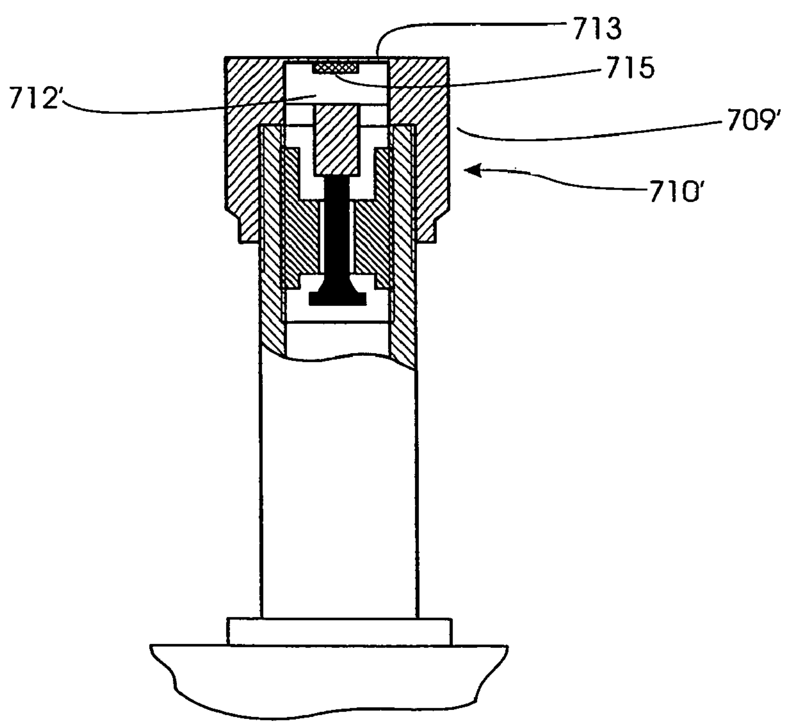

FIG. 143B is a partial cutaway view of a tire pressure monitor using a differential pressure measuring SAW device.

Figure 144:
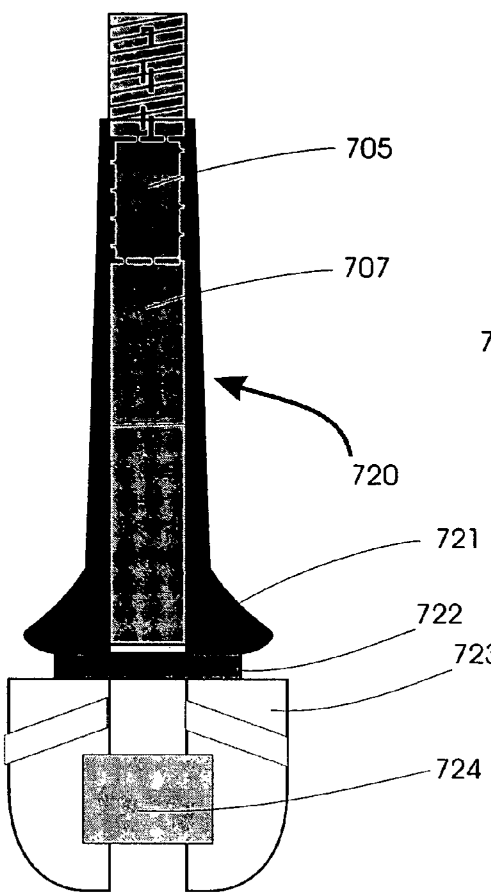

FIG. 144 is a partial cutaway view of an interior SAW tire temperature and pressure monitor mounted onto and below the valve stem.

Figure 144A:
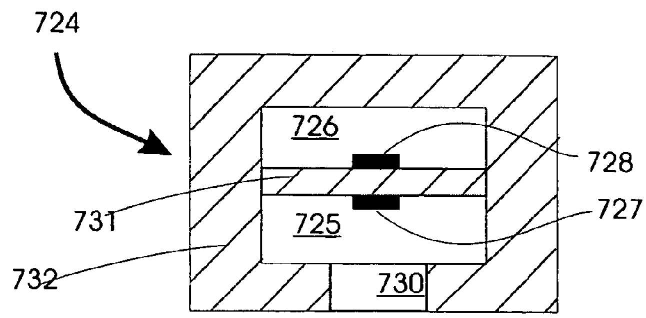

FIG. 144A is a sectioned view of the SAW tire pressure and temperature monitor of FIG. 144 incorporating an absolute pressure SAW device.

Figure 144B:
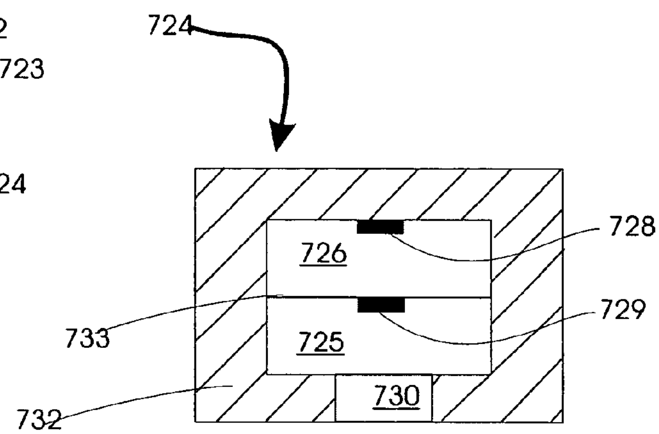

FIG. 144B is a sectioned view of the SAW tire pressure and temperature monitor of FIG. 144 incorporating a differential pressure SAW device.

Figure 145A:
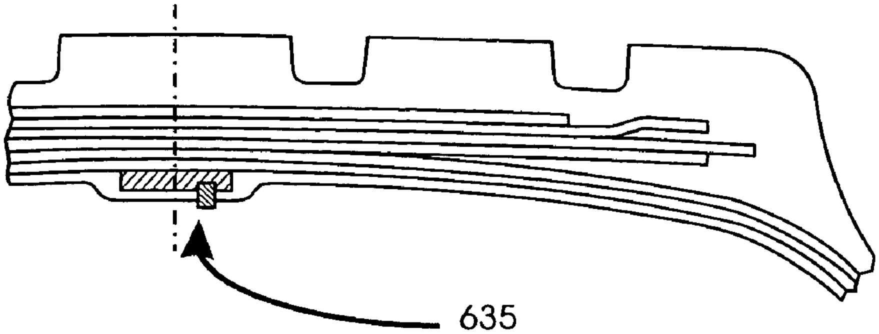
Figure 145:
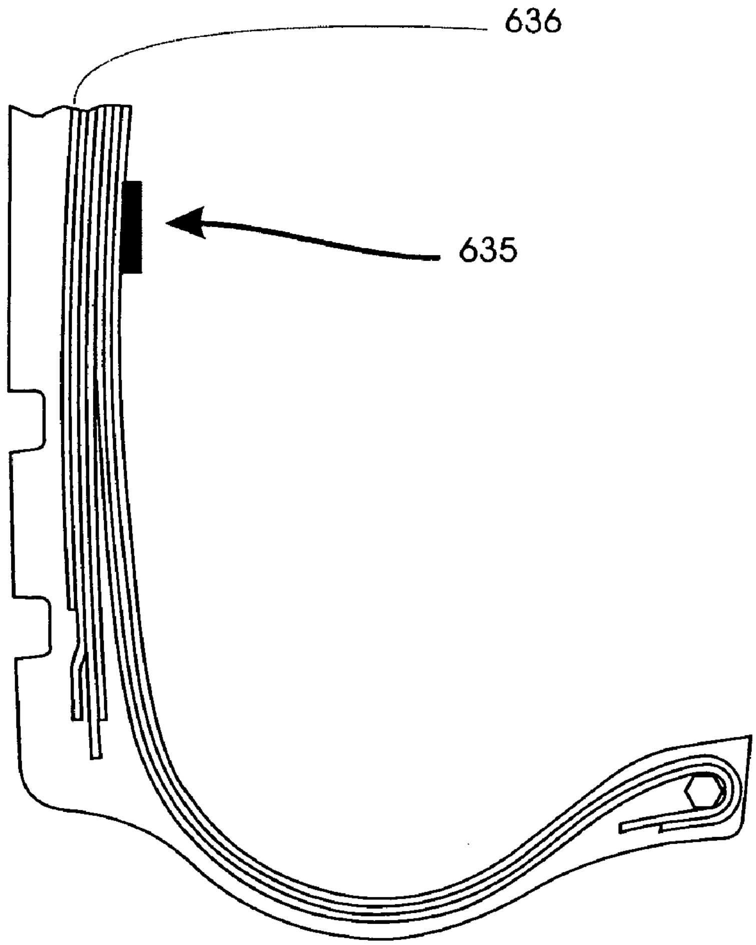

FIG. 145 is a view of an accelerometer-based tire monitor also incorporating a SAW pressure and temperature monitor and cemented to the interior of the tire opposite the tread.

FIG. 145A is a view of an accelerometer-based tire monitor also incorporating a SAW pressure and temperature monitor and inserted into the tire opposite the tread during manufacture.

Figure 146:
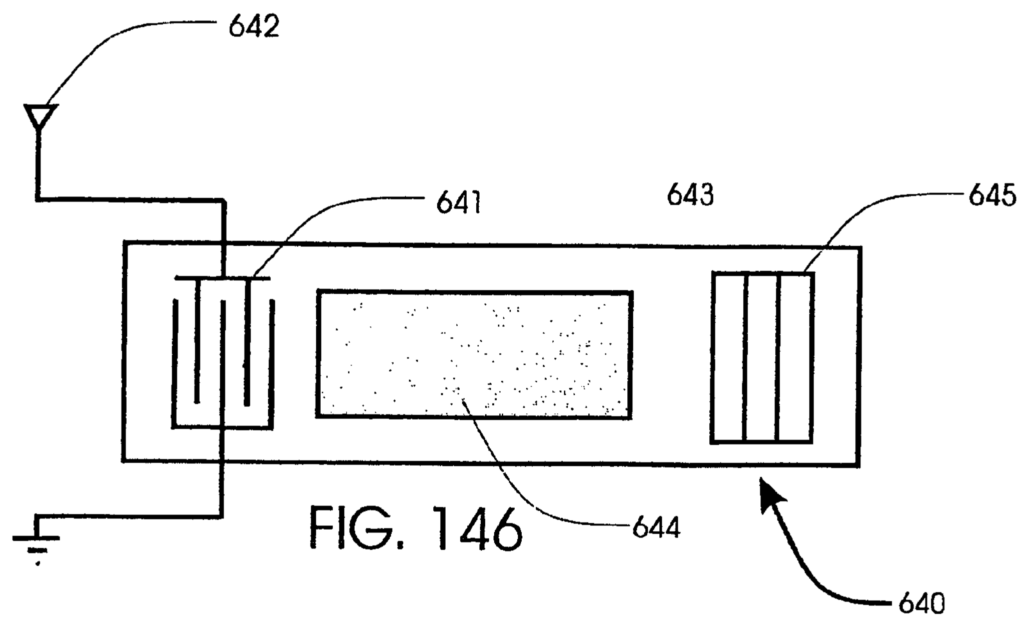

FIG. 146 is a detailed view of a polymer on SAW pressure sensor.

Figure 146A:
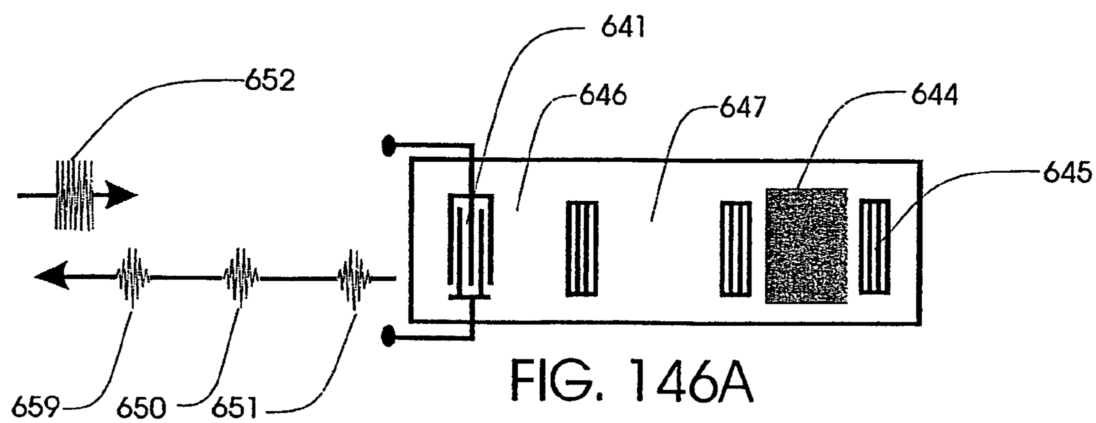

FIG. 146A is a view of a SAW temperature and pressure monitor on a single SAW device.

Figure 146B:
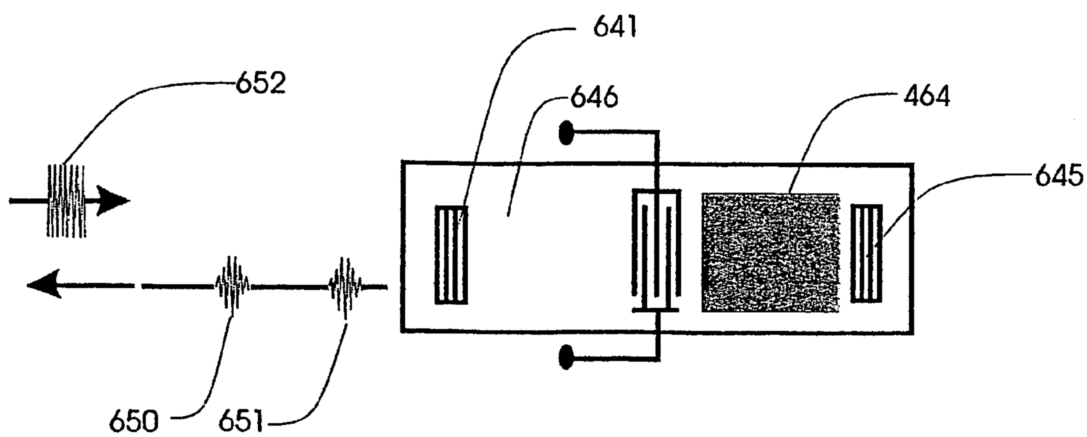

FIG. 146B is a view of an alternate design of a SAW temperature and pressure monitor on a single SAW device.

Figure 147B:
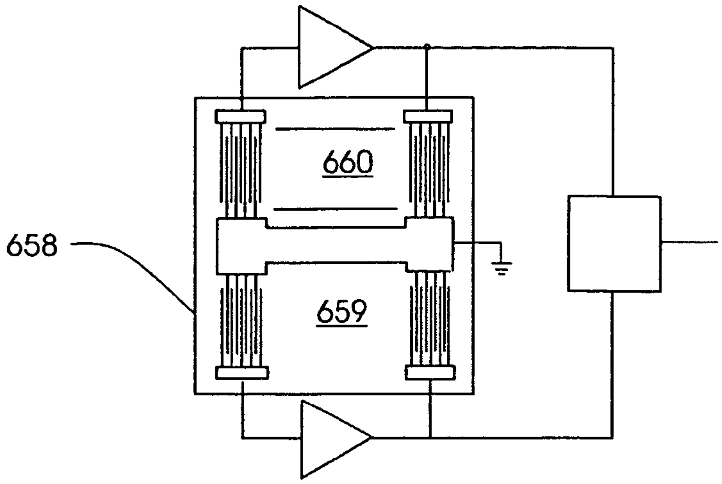
Figure 147A:
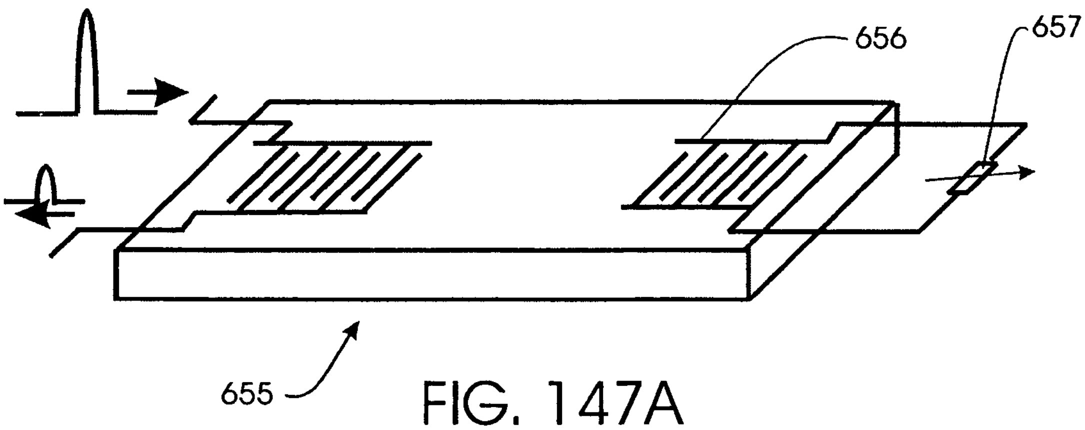
Figure 147:
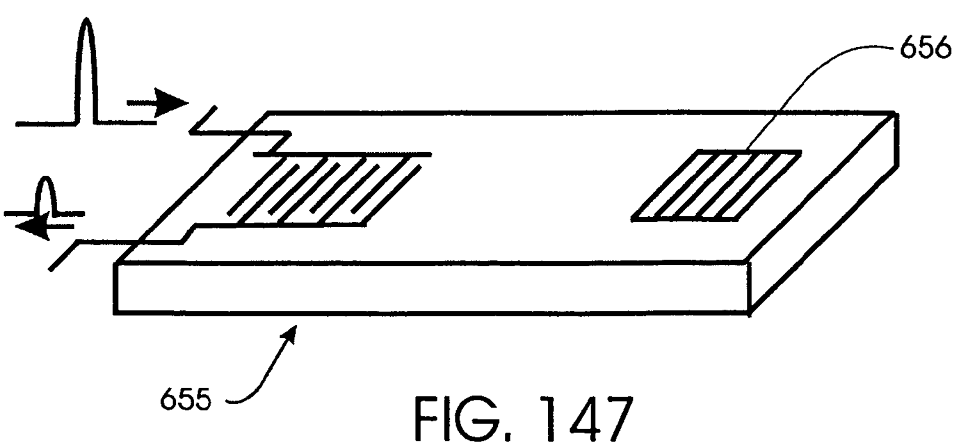

FIG. 147 is a perspective view of a SAW temperature sensor.

FIG. 147A is a perspective view of a device that can provide two measurements of temperature or one of temperature and another of some other physical or chemical property such as pressure or chemical concentration.

FIG. 147B is a top view of an alternate SAW device capable of determining two physical or chemical properties such as pressure and temperature.

Figure 148A:
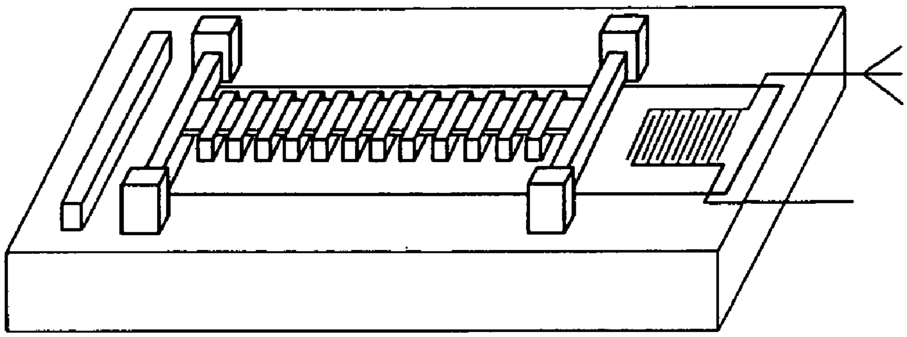
Figure 148:
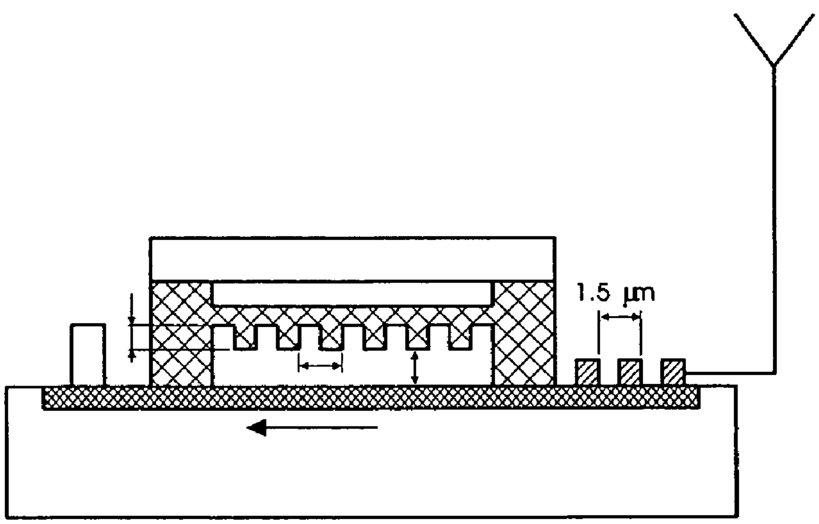

FIGS. 148 and 148A are views of a prior art SAW accelerometer that can be used for the tire monitor assembly of FIG. 145.

FIGS. 149A, 149B, 149C, 149D and 149E are views of occupant seat weight sensors using a slot spanning SAW strain gage and other strain concentrating designs.

Figure 150A:
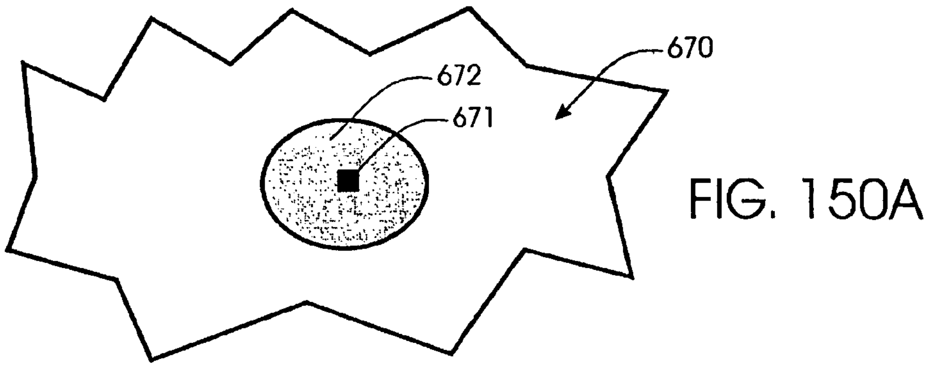

FIG. 150A is a view of a view of a SAW switch sensor for mounting on or within a surface such as a vehicle armrest.

Figure 150B:
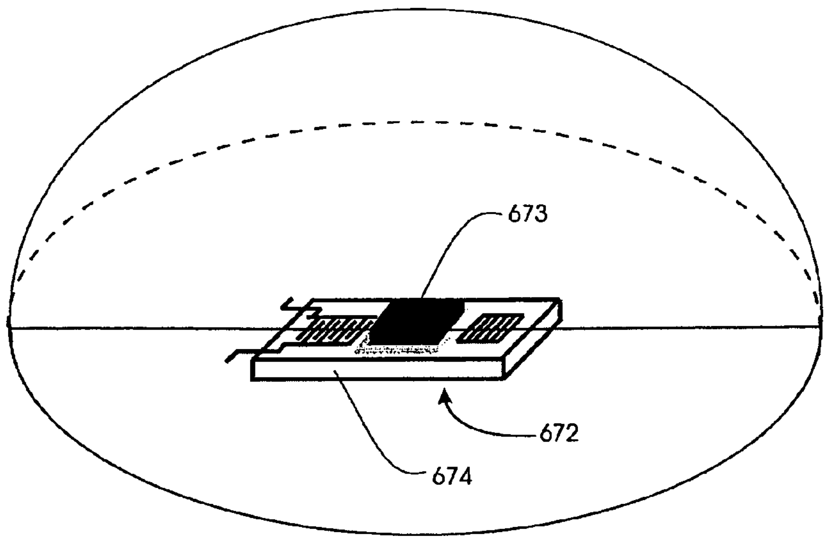

FIG. 150B is a detailed perspective view of the device of FIG. 150A with the force-transmitting member rendered transparent.

Figure 150C:
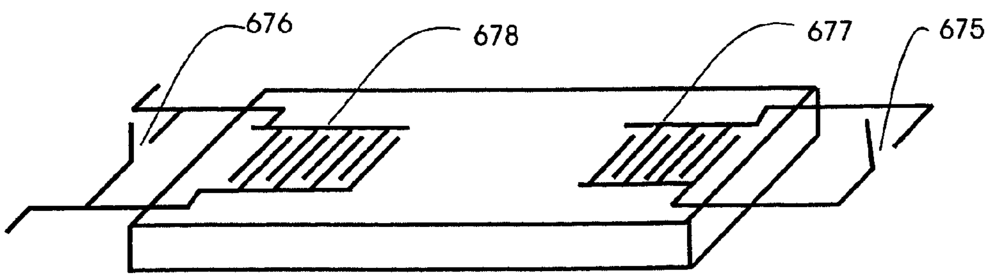

FIG. 150C is a detailed perspective view of an alternate SAW device for use in FIGS. 150A and 150B showing the use of one of two possible switches, one that activates the SAW and the other that suppresses the SAW.

Figure 151A:
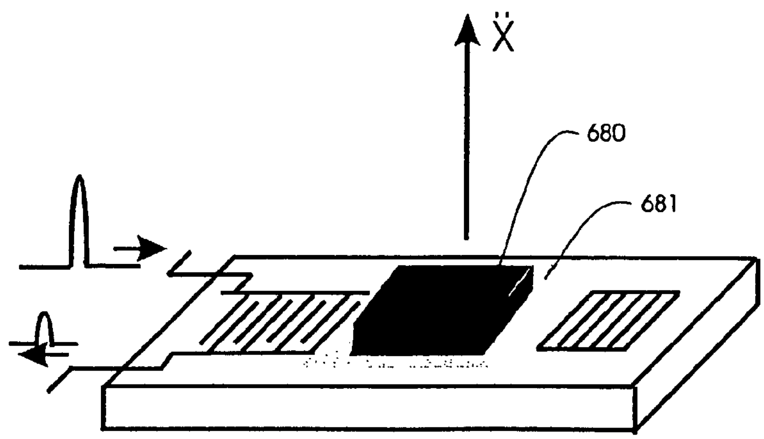

FIG. 151A is a detailed perspective view of a polymer and mass on SAW accelerometer for use in crash sensors, vehicle navigation, etc.

Figure 151B:
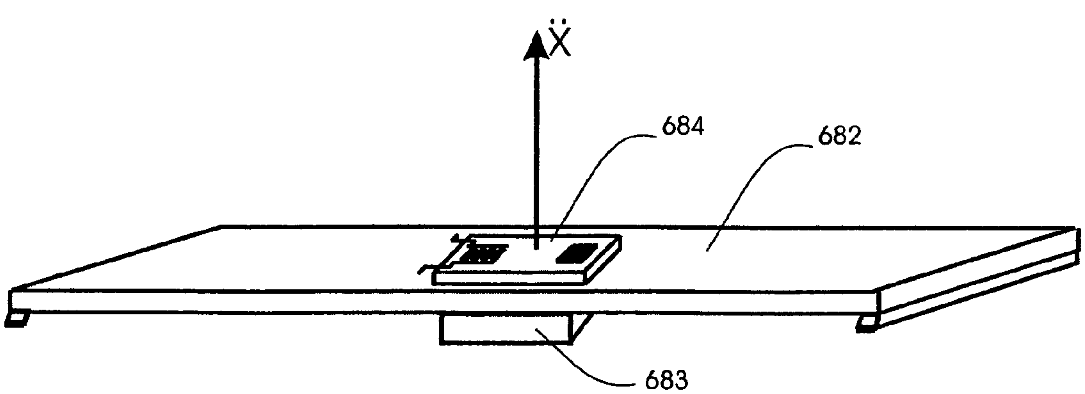

FIG. 151B is a detailed perspective view of a normal mass on SAW accelerometer for use in crash sensors, vehicle navigation, etc.

Figure 152:
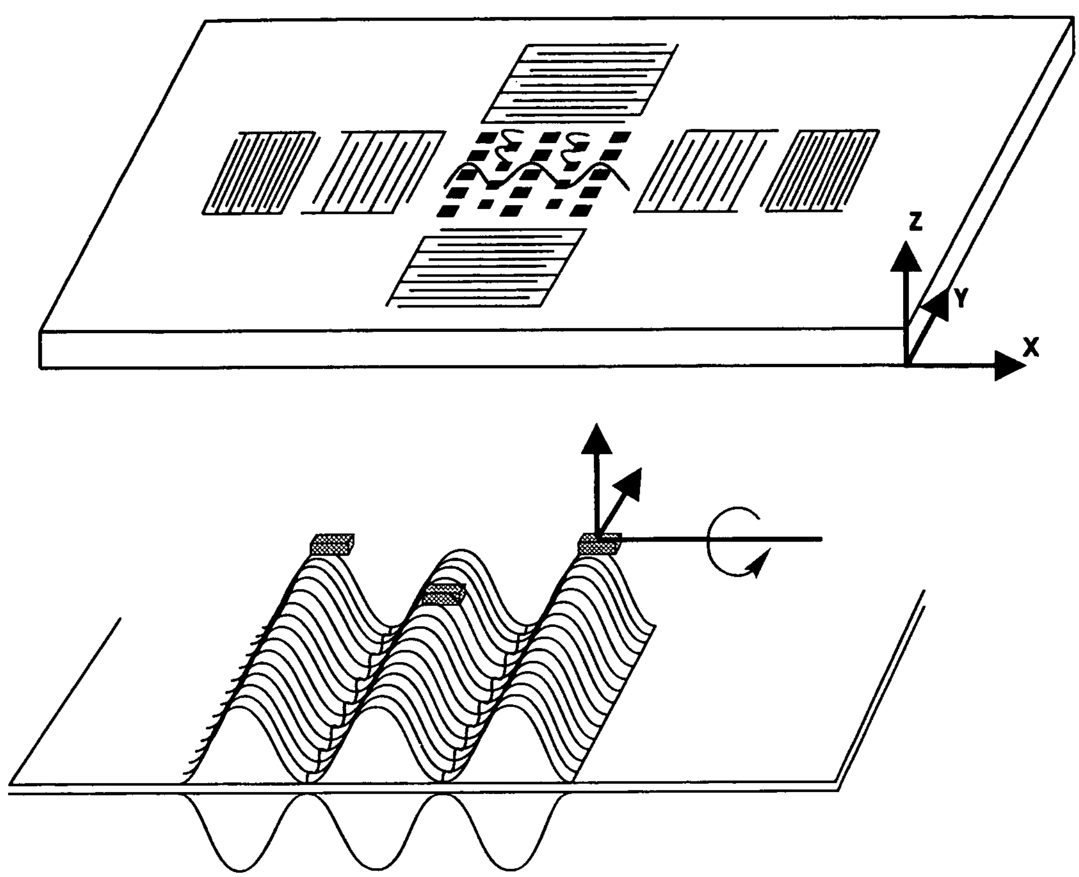

FIG. 152 is a view of a prior art SAW gyroscope that can be used with at least one of the inventions disclosed herein.

Figure 153A:
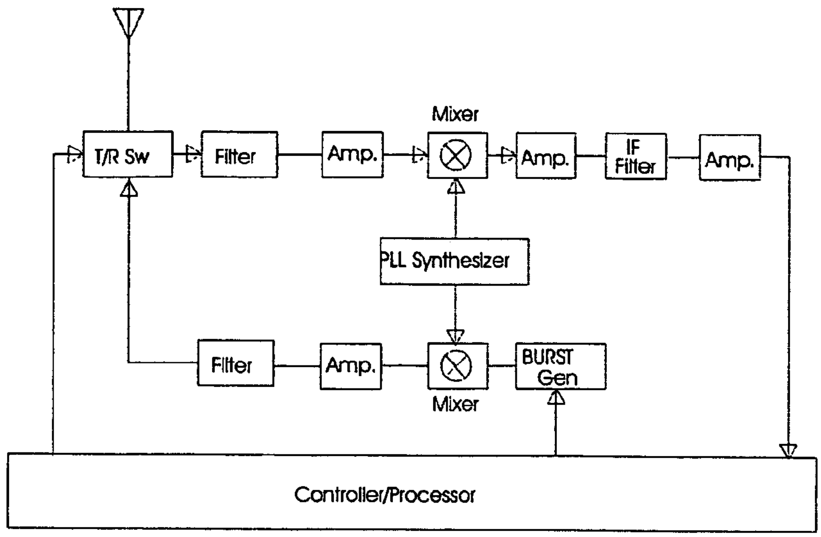
Figure 153B:
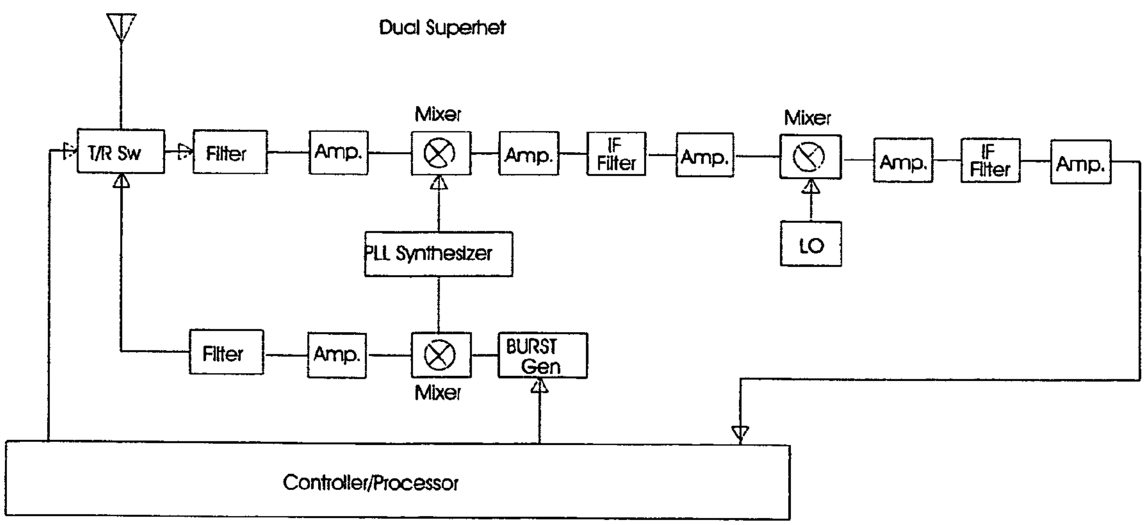
Figure 153C:
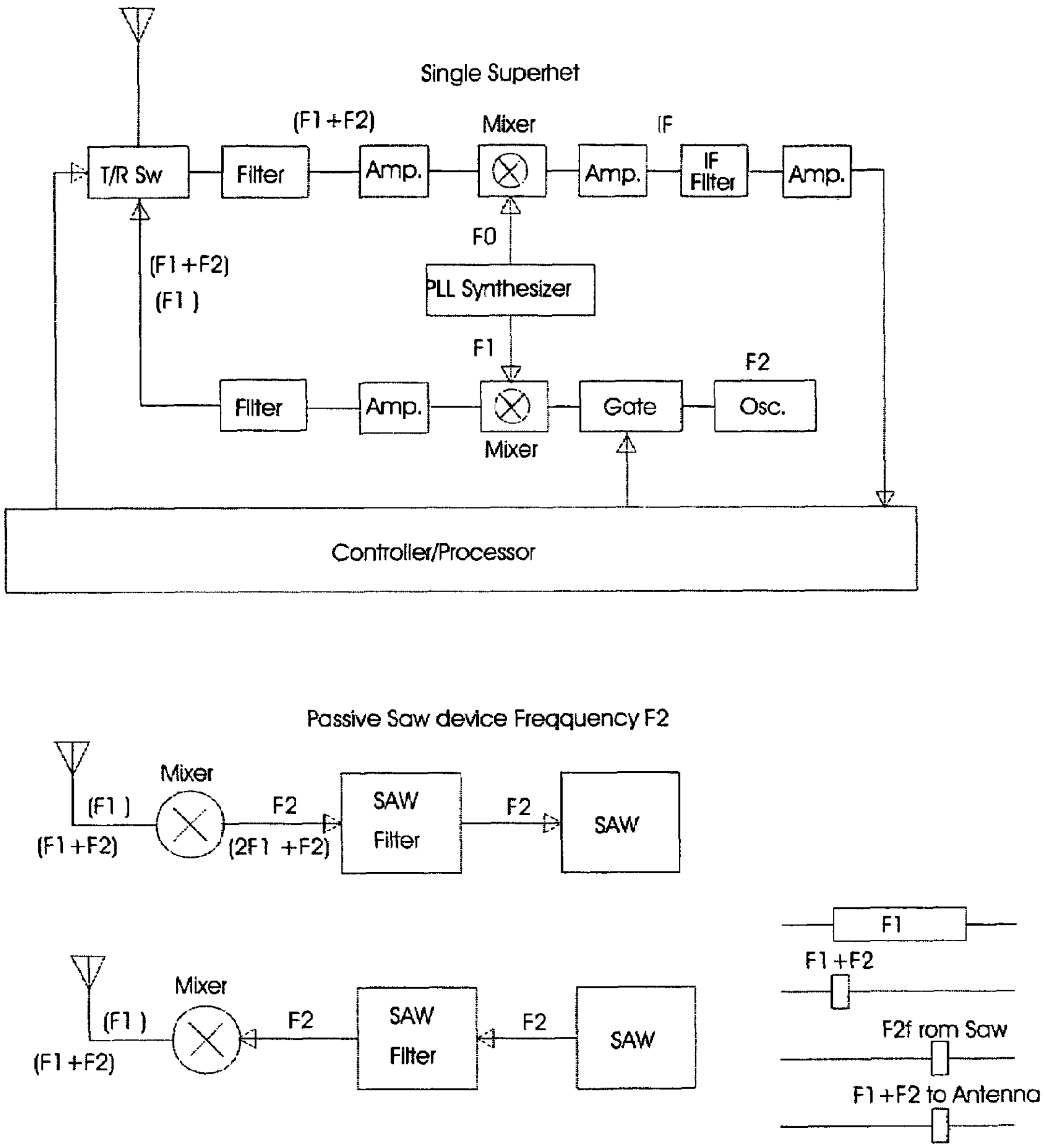

FIGS. 153A, 153B and 153C are block diagrams of three interrogators that can be used with at least one of the inventions disclosed herein to interrogate several different devices.

Figure 154:
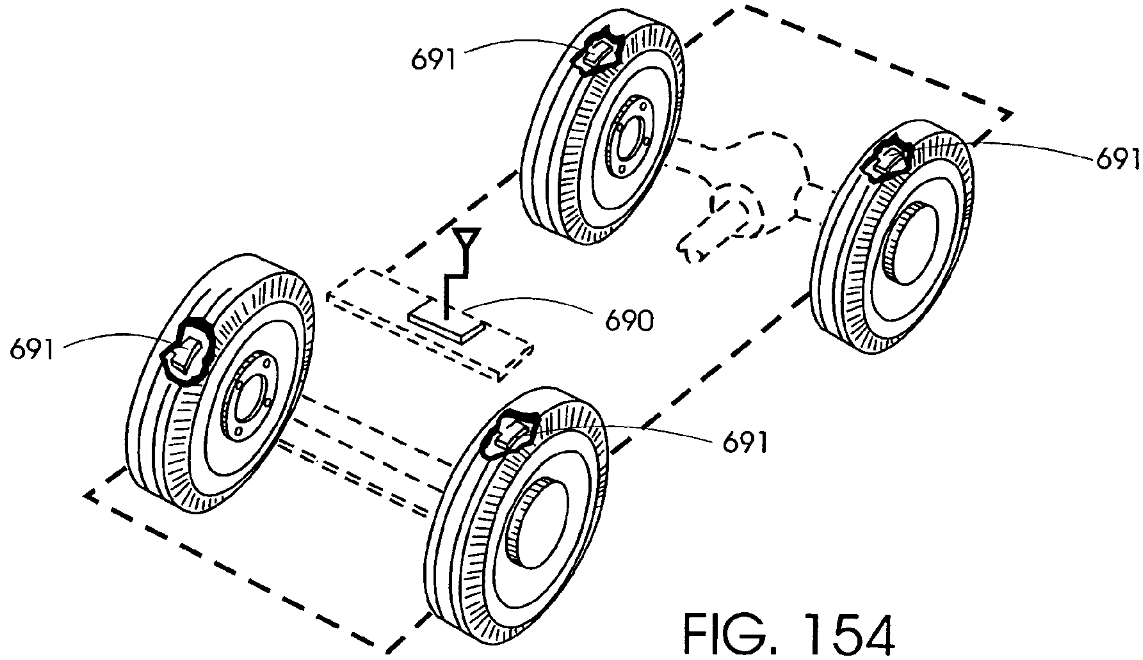

FIG. 154 is a perspective view of a SAW antenna system adapted for mounting underneath a vehicle and for communicating with the four mounted tires.

Figure 154A:
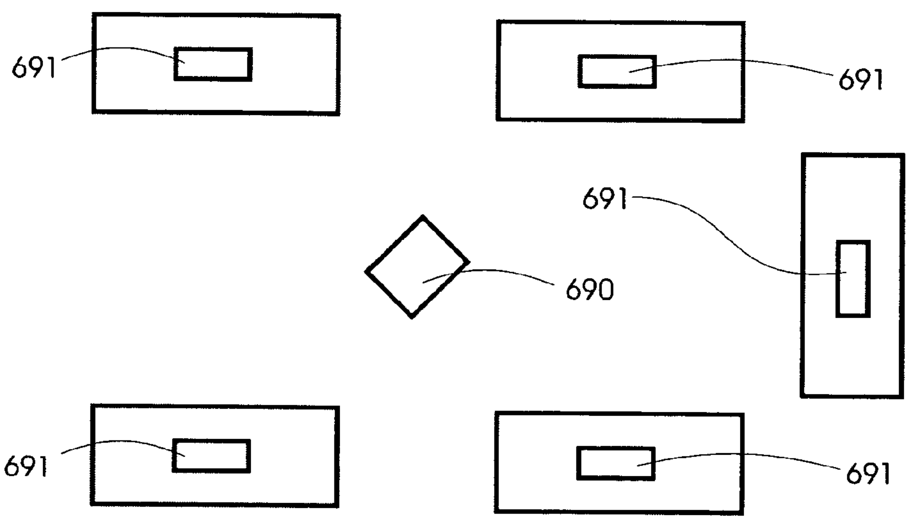

FIG. 154A is a detail view of an antenna system for use in the system of FIG. 154.

Figure 155:
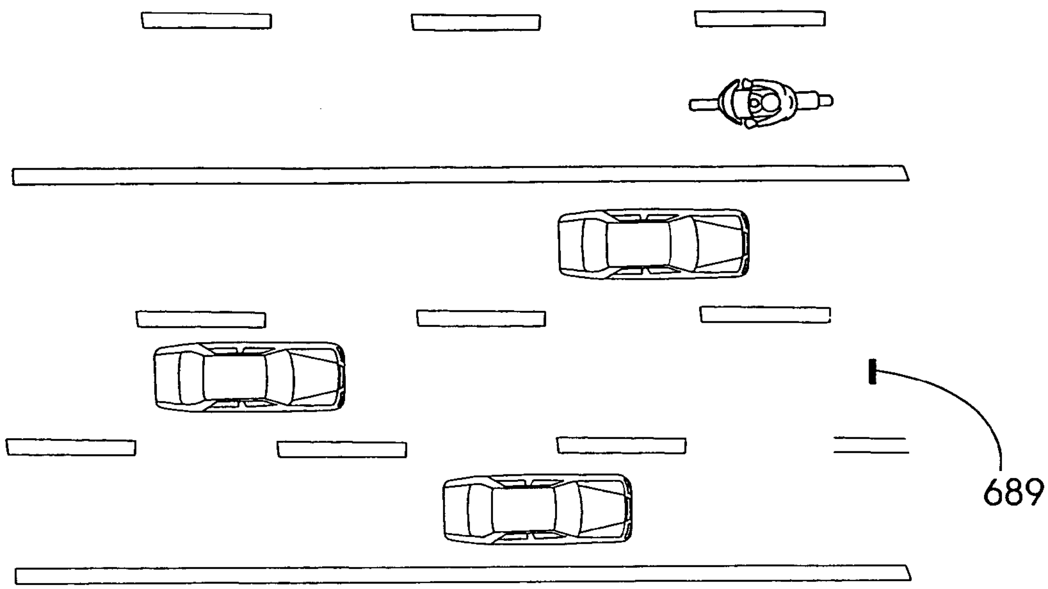

FIG. 155 is an overhead view of a roadway with vehicles and a SAW road temperature and humidity monitoring sensor.

Figure 155A:
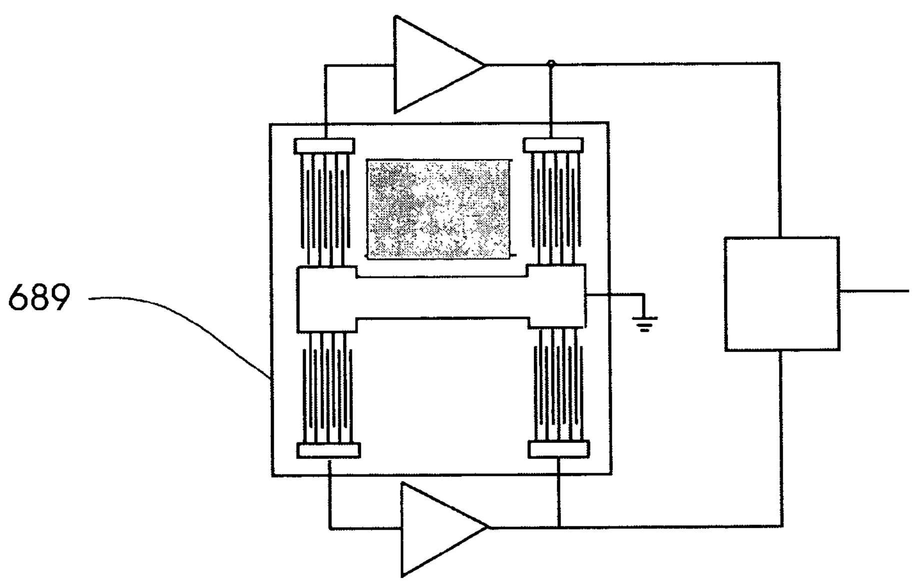

FIG. 155A is a detail drawing of the monitoring sensor of FIG. 155.

Figure 156:
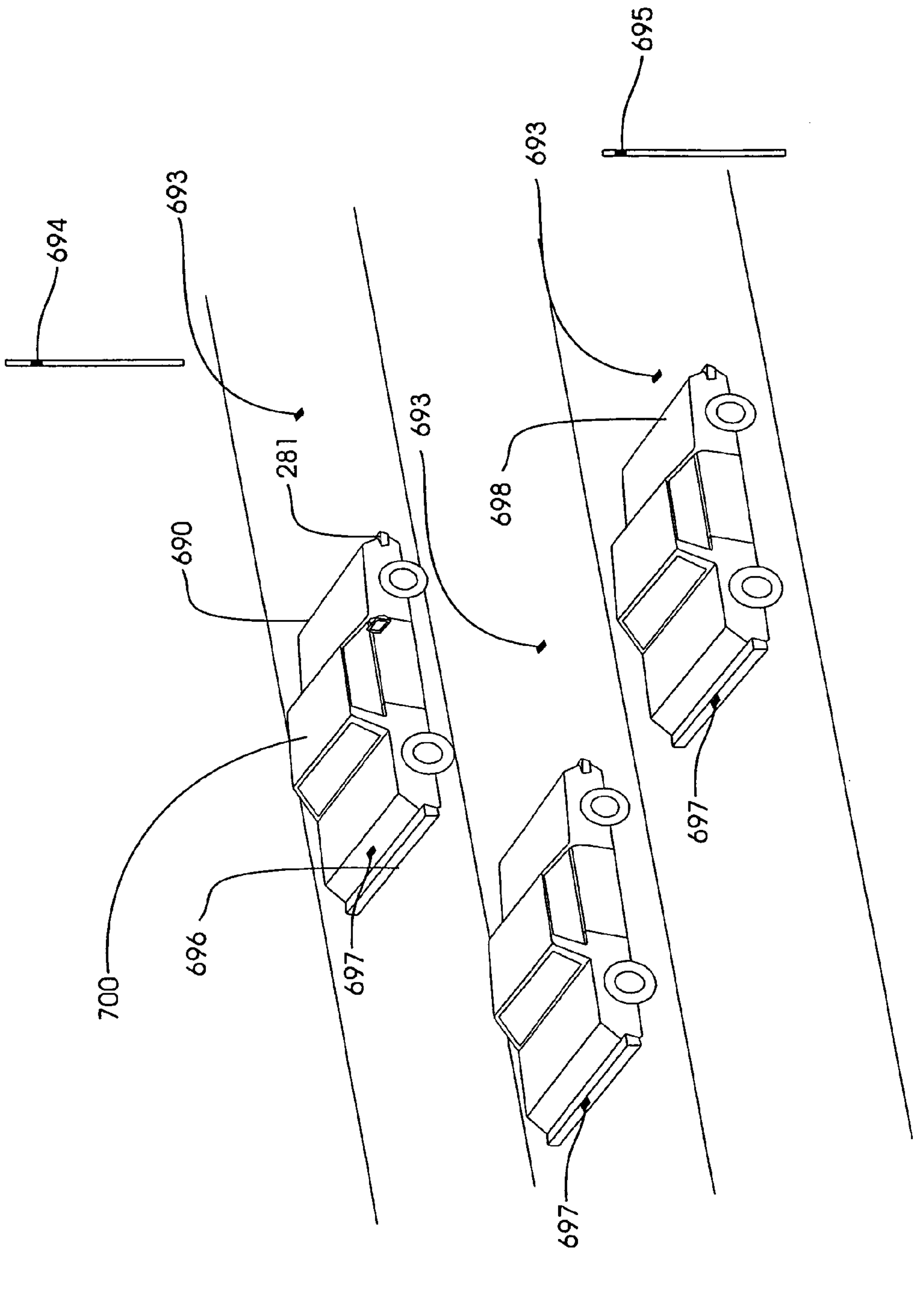

FIG. 156 is a perspective view of a SAW system for locating a vehicle on a roadway, and on the earth surface if accurate maps are available. It also illustrates the use of a SAW transponder in the license plate for the location of preceding vehicles and preventing rear end impacts.

Figure 157:
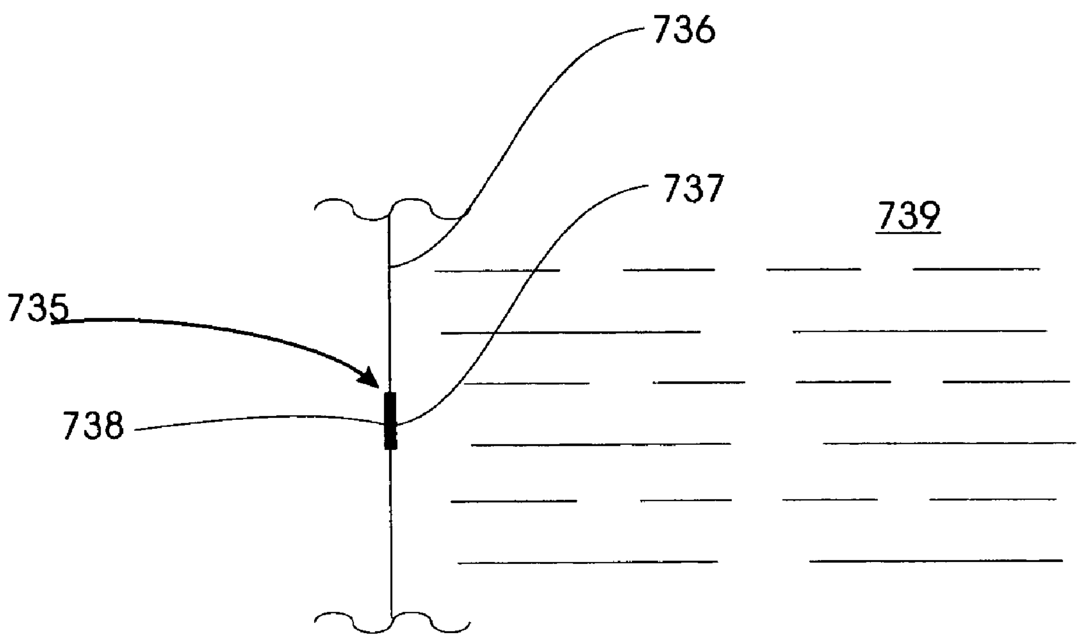

FIG. 157 is a partial cutaway view of a section of a fluid reservoir with a SAW fluid pressure and temperature sensor for monitoring oil, water, or other fluid pressure.

FIG. 158 is a perspective view of a vehicle suspension system with SAW load sensors.

FIG. 158A is a cross section detail view of a vehicle spring and shock absorber system with a SAW torque sensor system mounted for measuring the stress in the vehicle spring of the suspension system of FIG. 158.

FIG. 158B is a detail view of a SAW torque sensor and shaft compression sensor arrangement for use with the arrangement of FIG. 158.

Figure 159:
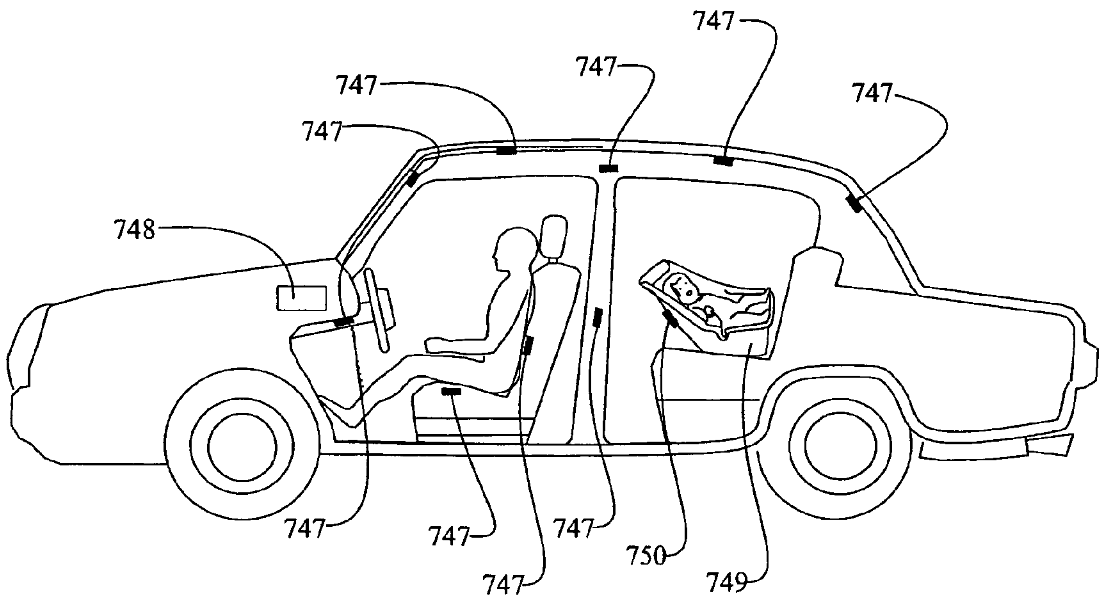

FIG. 159 is a cutaway view of a vehicle showing possible mounting locations for vehicle interior temperature, humidity, carbon dioxide, carbon monoxide, alcohol or other chemical or physical property measuring sensors.

Figure 160A:
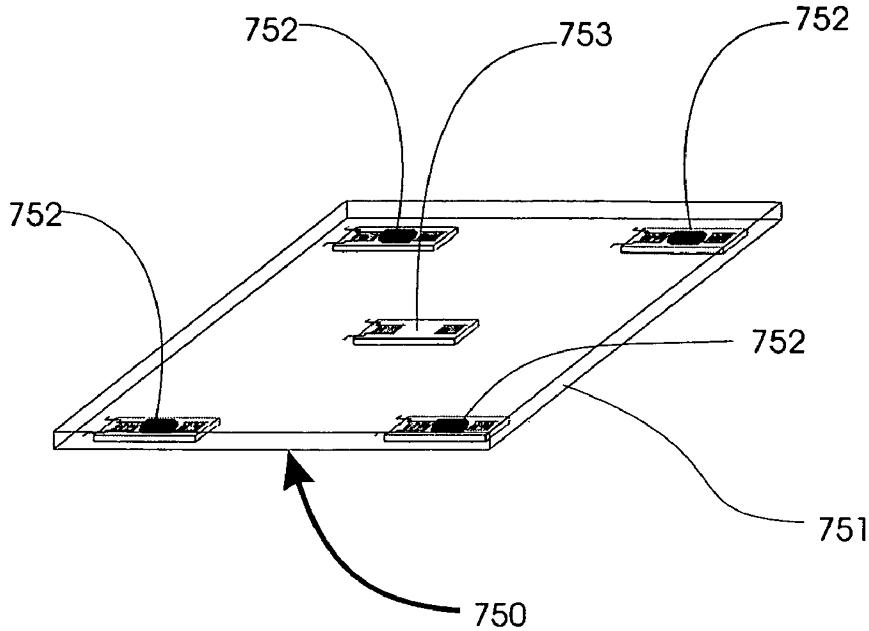

FIG. 160A is a perspective view of a SAW tilt sensor using four SAW assemblies for tilt measurement and one for temperature.

Figure 160B:
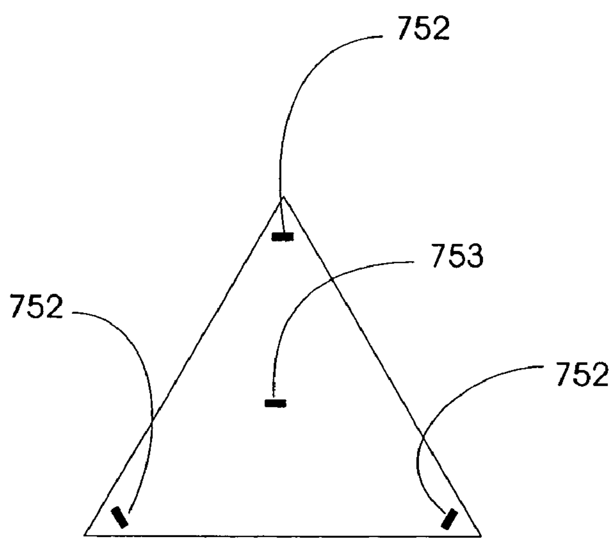

FIG. 160B is a top view of a SAW tilt sensor using three SAW assemblies for tilt measurement each one of which can also measure temperature.

Figure 161:
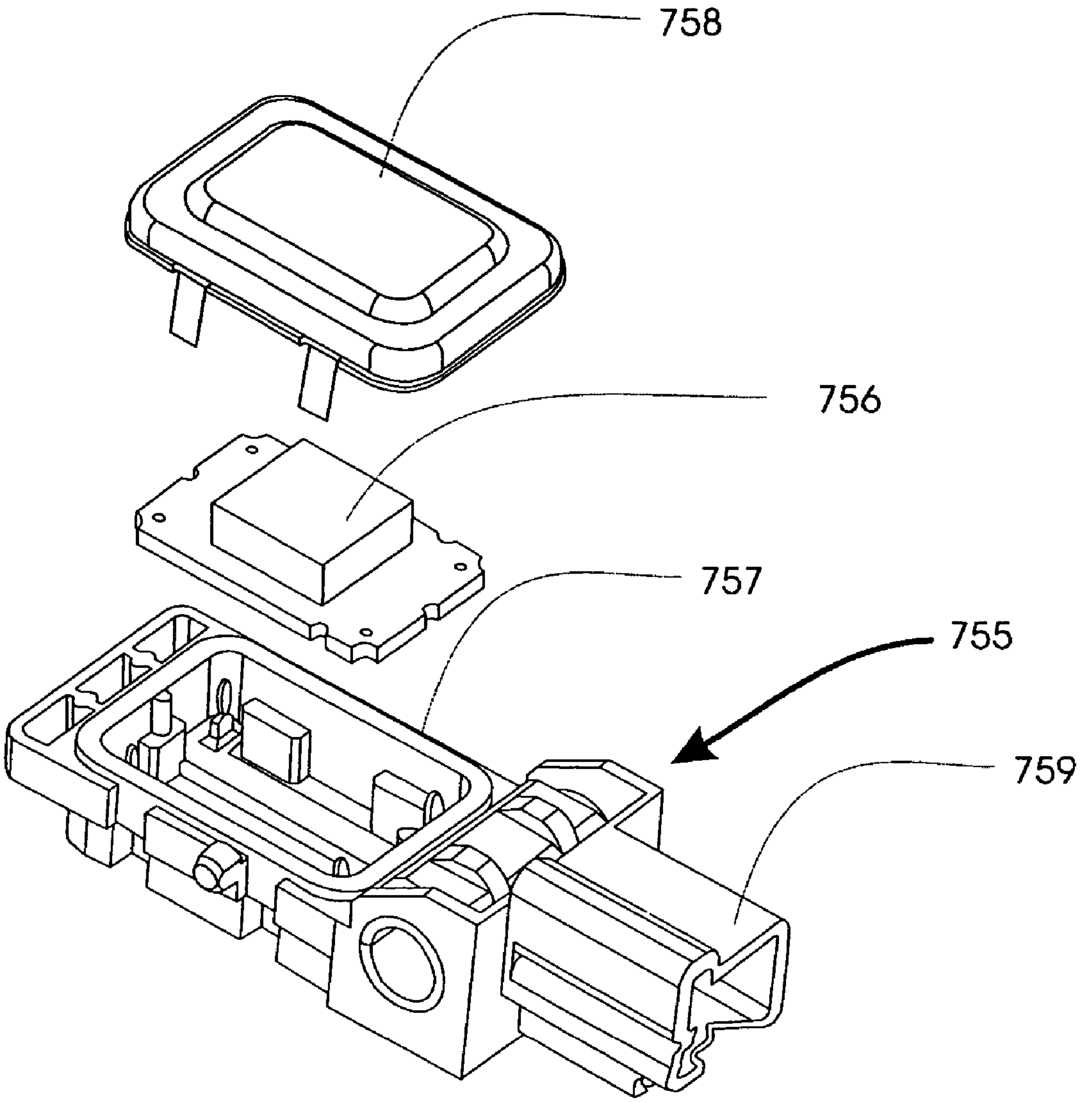

FIG. 161 is a perspective exploded view of a SAW crash sensor for sensing frontal, side or rear crashes.

Figure 162:
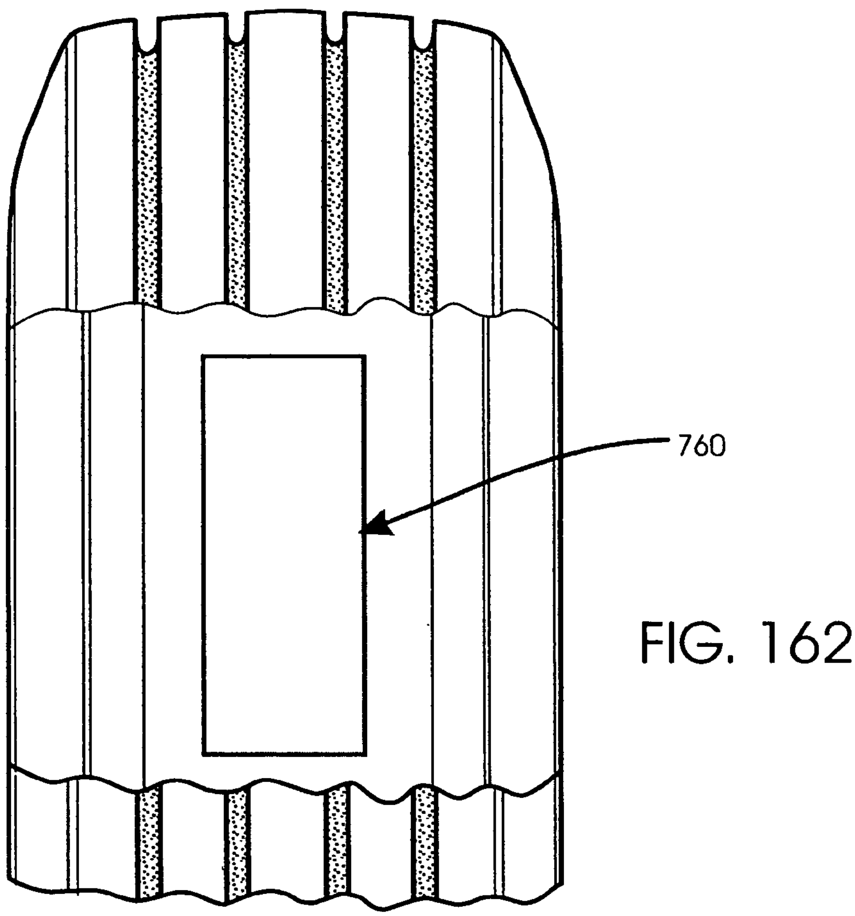

FIG. 162 is a partial cutaway view of a piezoelectric generator and tire monitor using PVDF film.

Figure 162A:
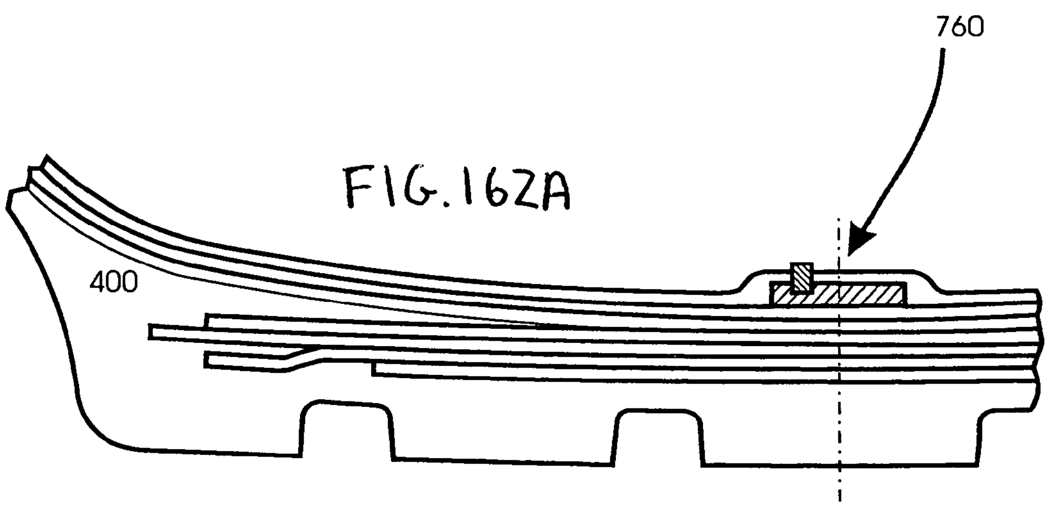

FIG. 162A is a cutaway view of the PVDF sensor of FIG. 162.

Figure 163:
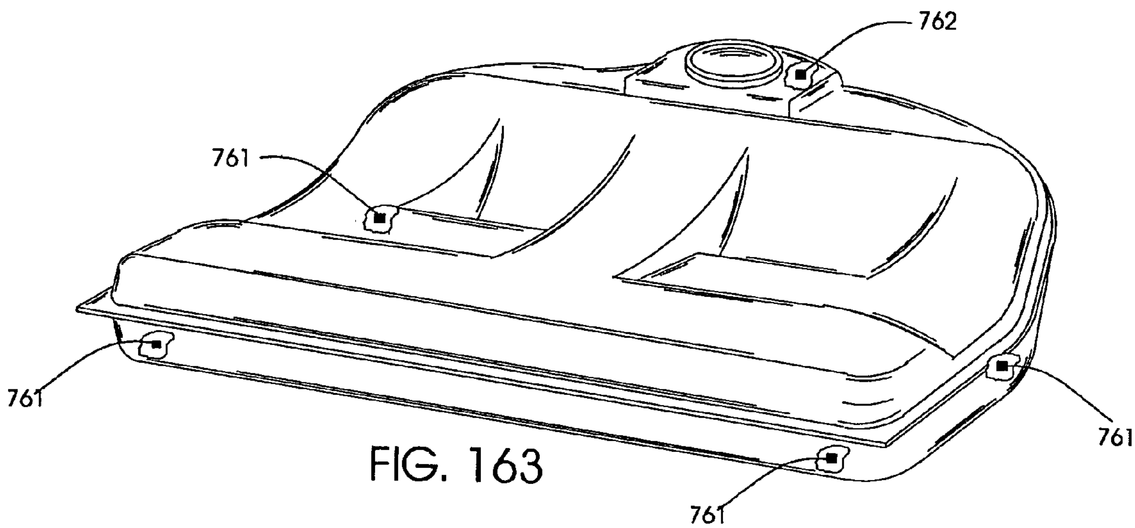

FIG. 163 is a perspective view with portions cutaway of a SAW based vehicle gas gage.

Figure 163A:
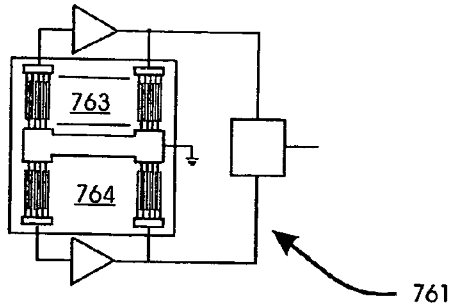

FIG. 163A is a top detailed view of a SAW pressure and temperature monitor for use in the system of FIG. 163.

Figure 164:
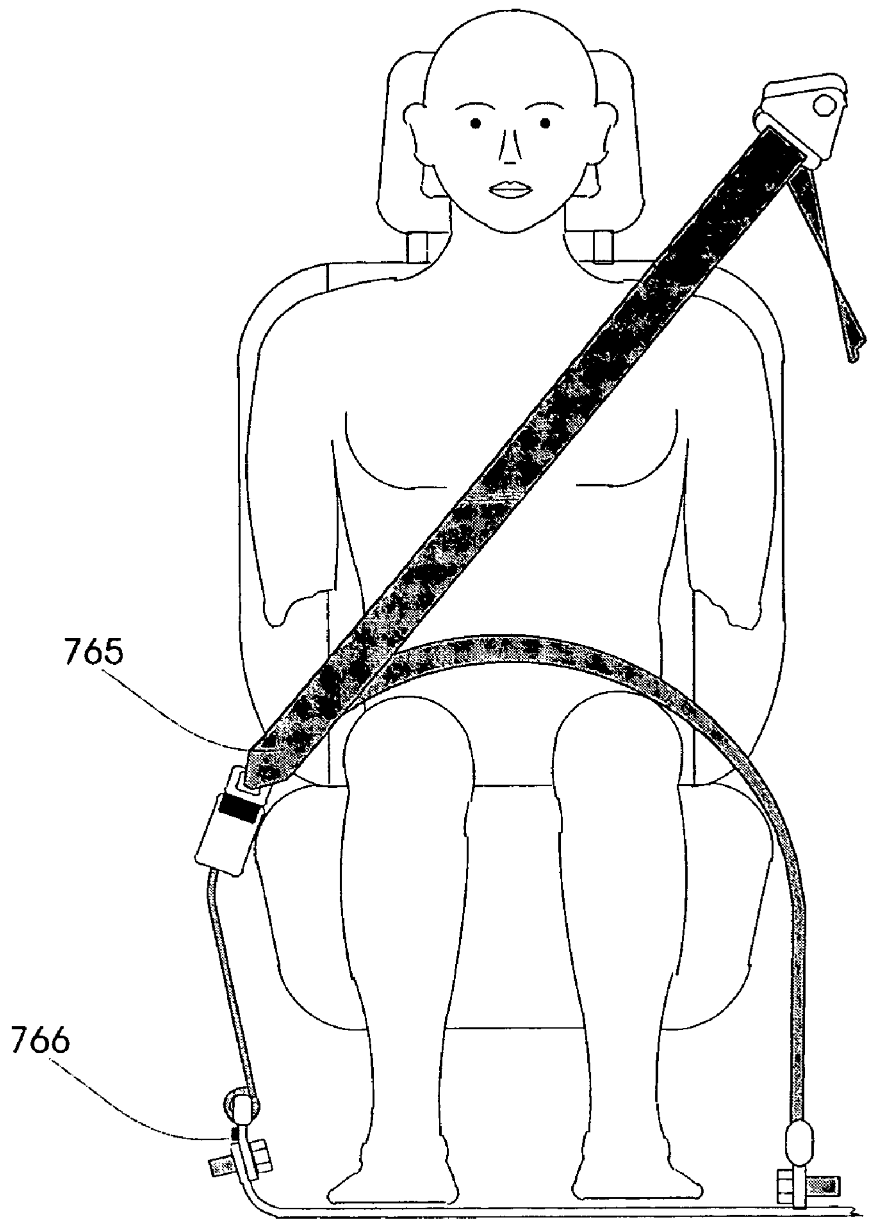

FIG. 164 is a partial cutaway view of a vehicle drives wearing a seatbelt with SAW force sensors.

Figure 165:
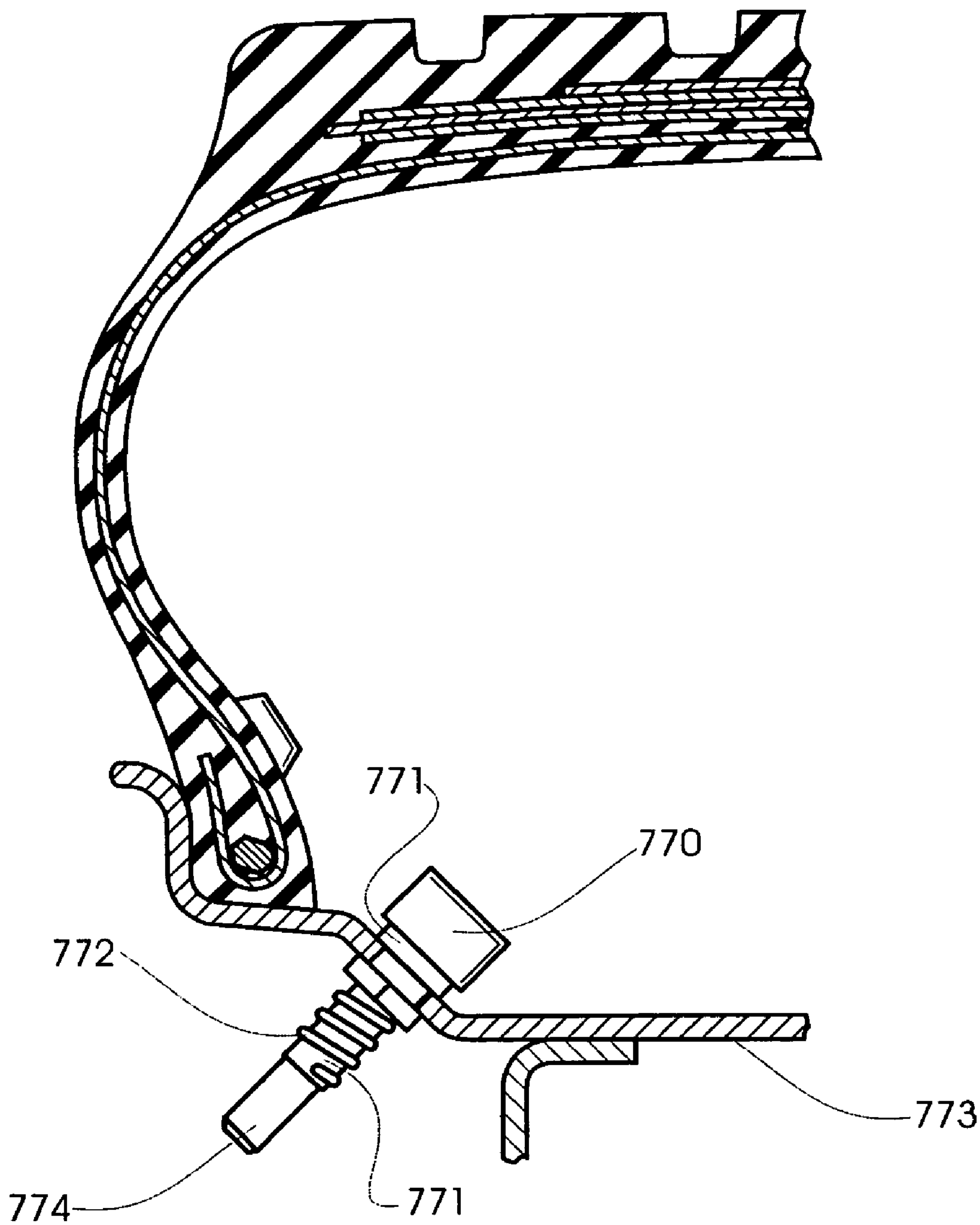

FIG. 165 is an alternate arrangement of a SAW tire pressure and temperature monitor installed in the wheel rim facing inside.

Figure 166A:
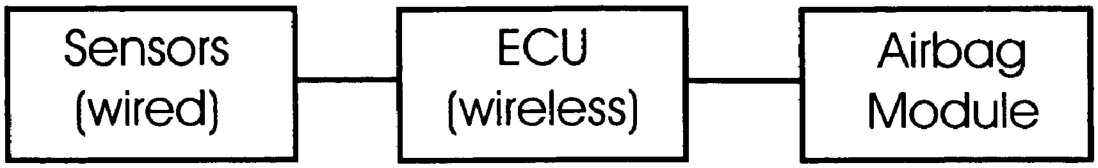

FIG. 166A is a schematic of a prior art deployment scheme for an airbag module.

Figure 166B:
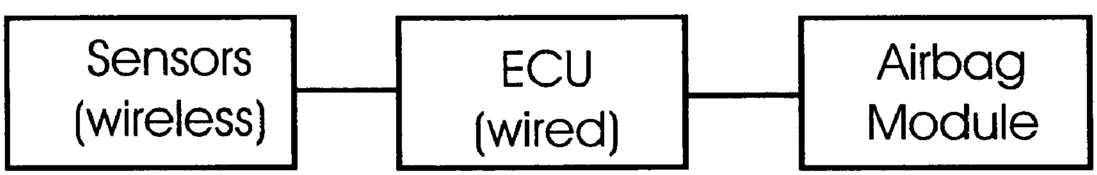

FIG. 166B is a schematic of a deployment scheme for an airbag module in accordance with the invention.

Figure 167:
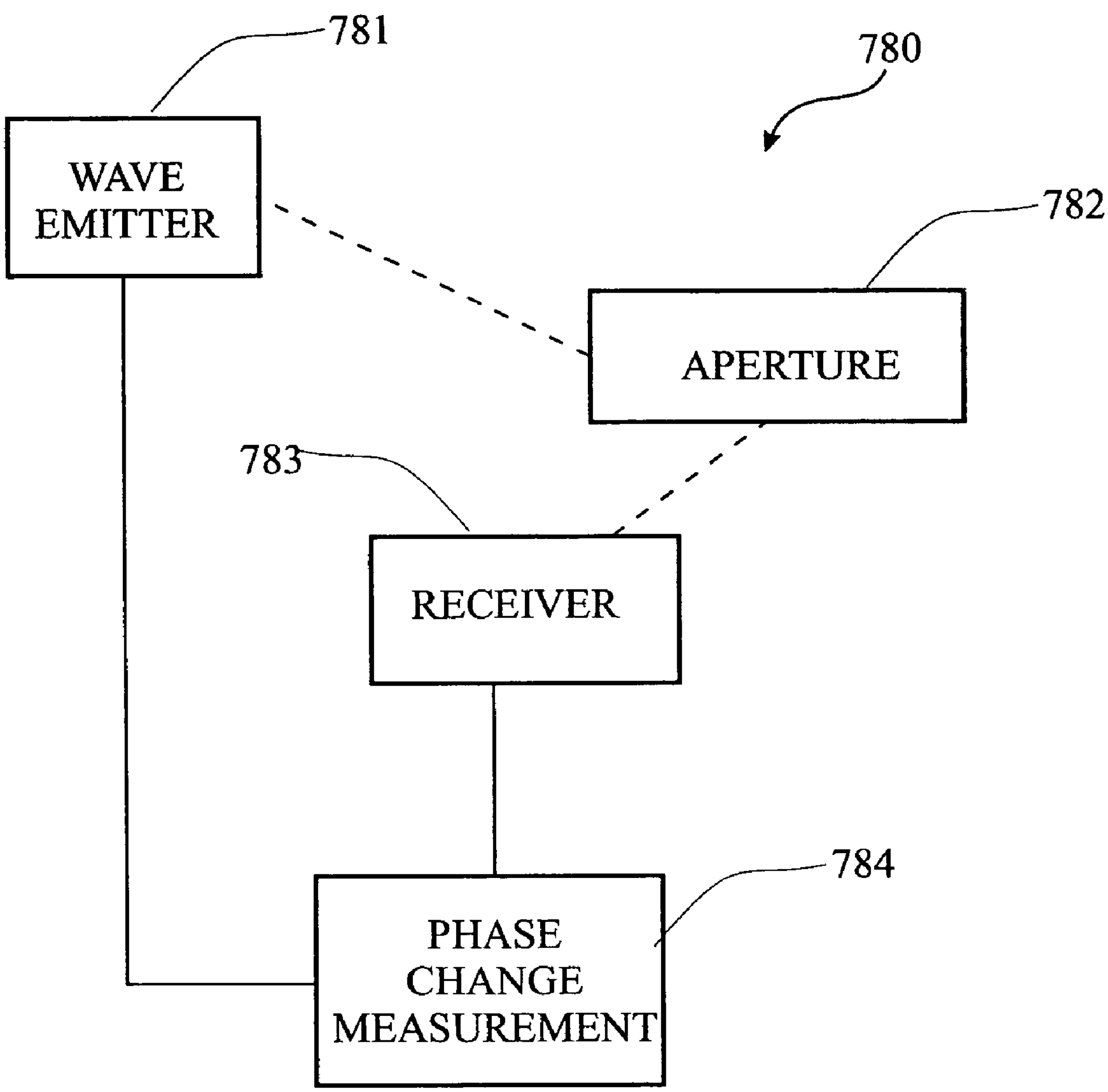

FIG. 167 is a schematic of an aperture monitoring system in accordance with the present invention.

Figure 168:
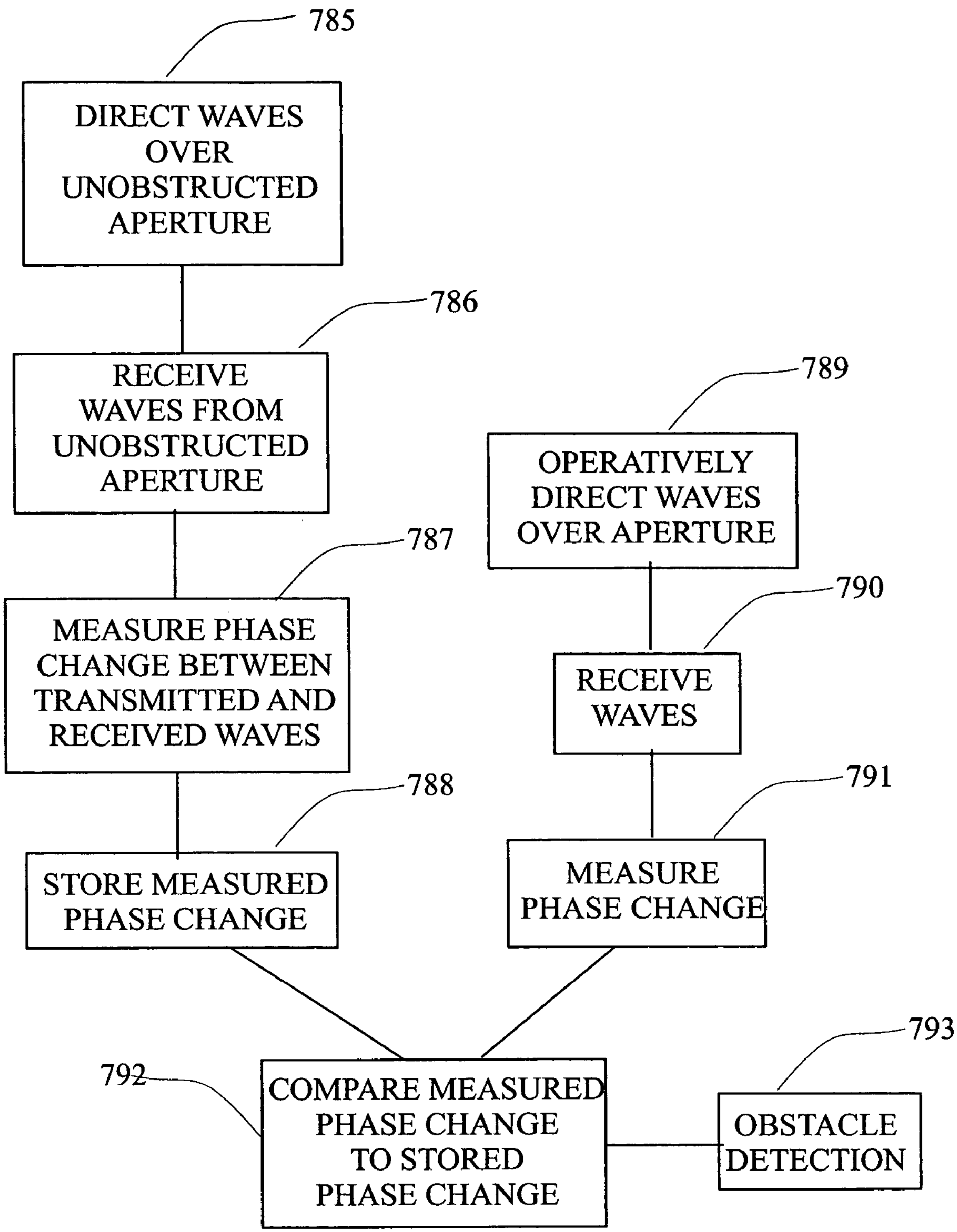

FIG. 168 is a flow chart of a method for monitoring an aperture in accordance with the present invention.

Figure 169:
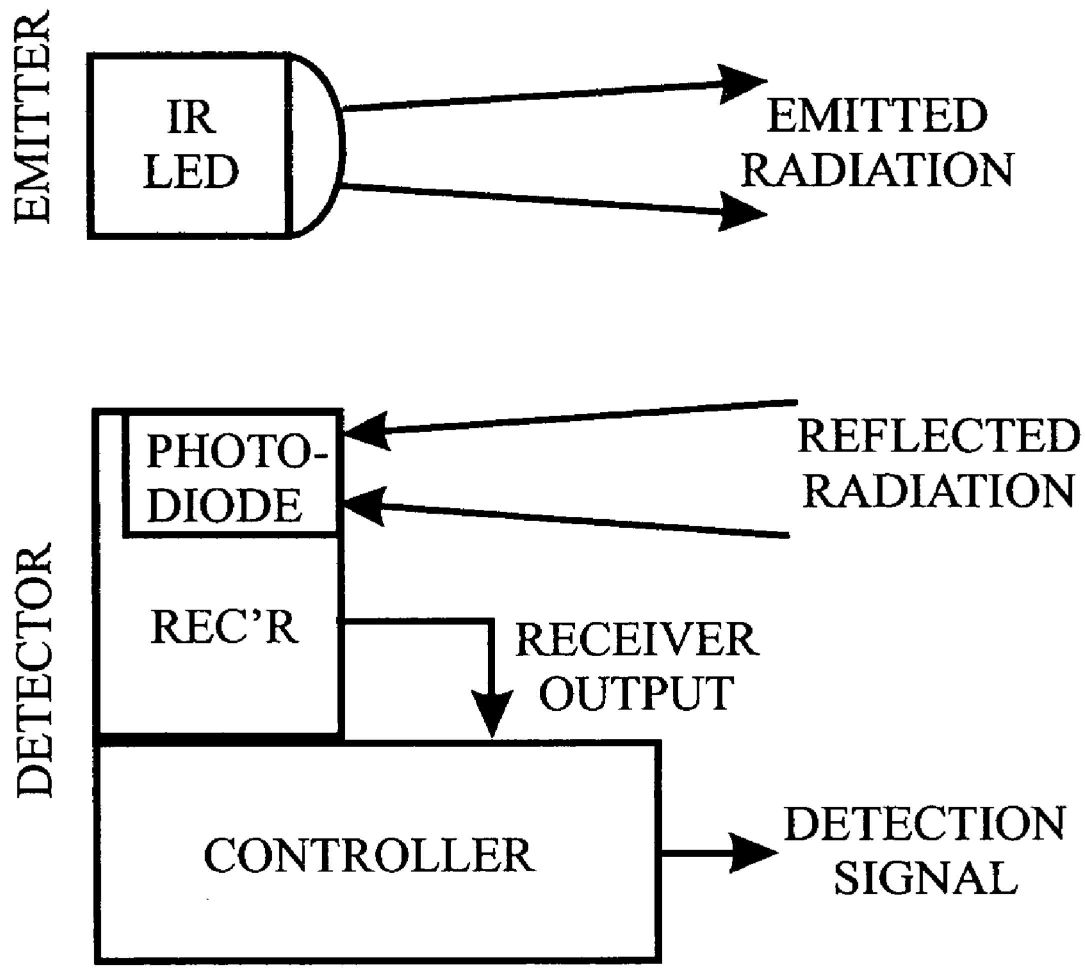

FIG. 169 is a block diagram of an aperture monitoring system in accordance with the present invention.

Figure 170:
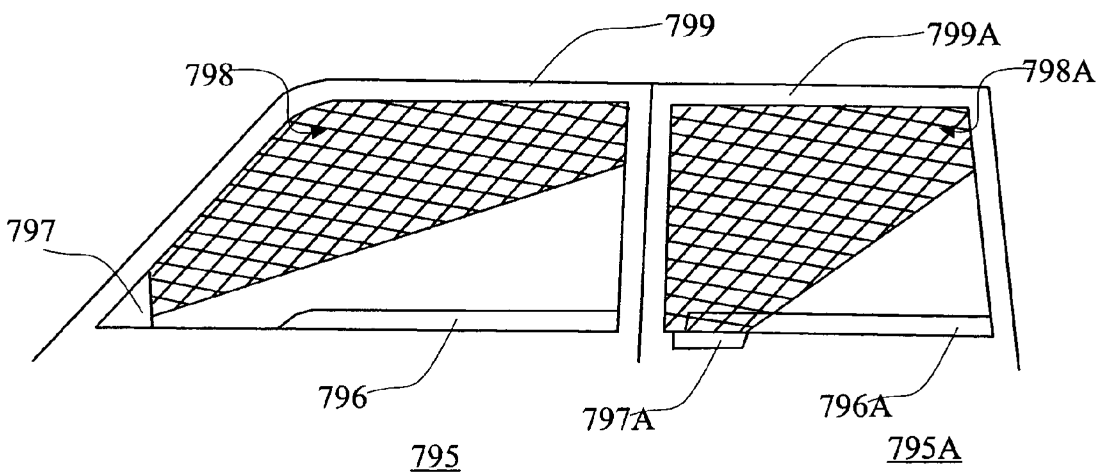

FIG. 170 is an illustration of the placement of aperture monitoring systems, such as of FIG. 169, in a vehicle for use with vehicle windows.

Figure 171:
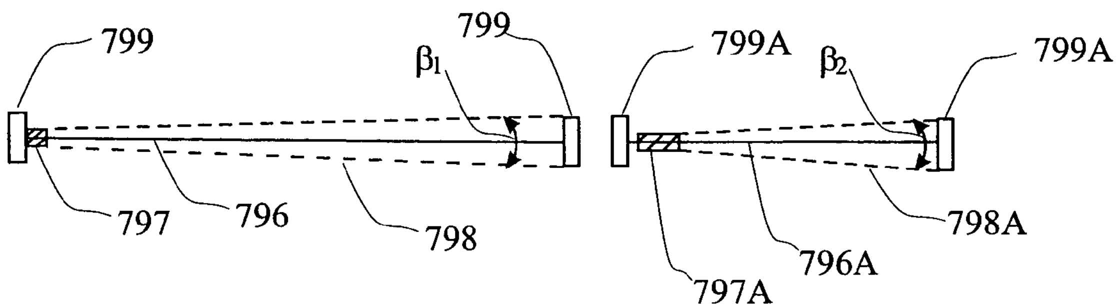

FIG. 171 is a top view of the systems of FIG. 170.

Figure 172:
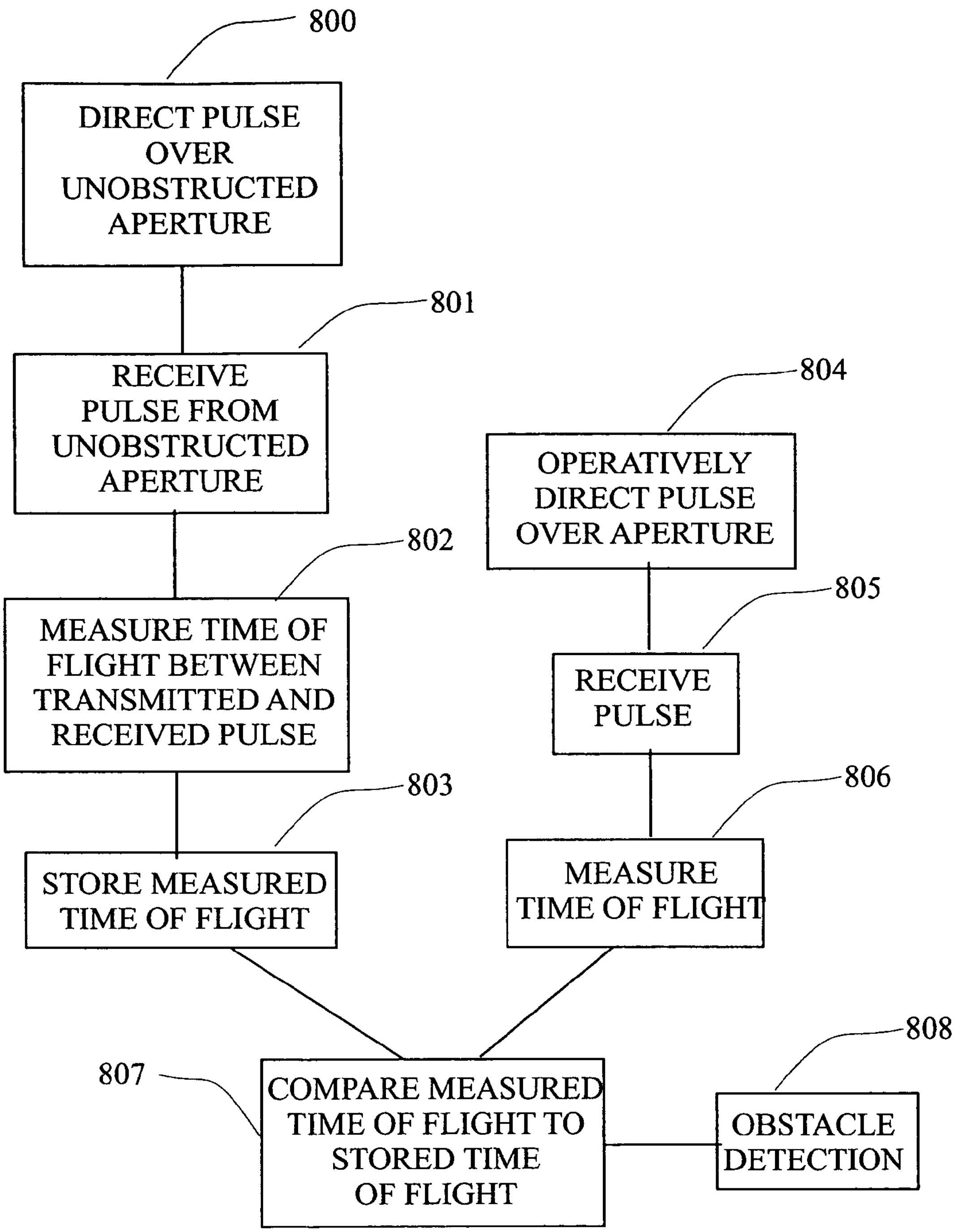

FIG. 172 is a flow chart of another method for monitoring an aperture in accordance with the present invention.

Figure 173:
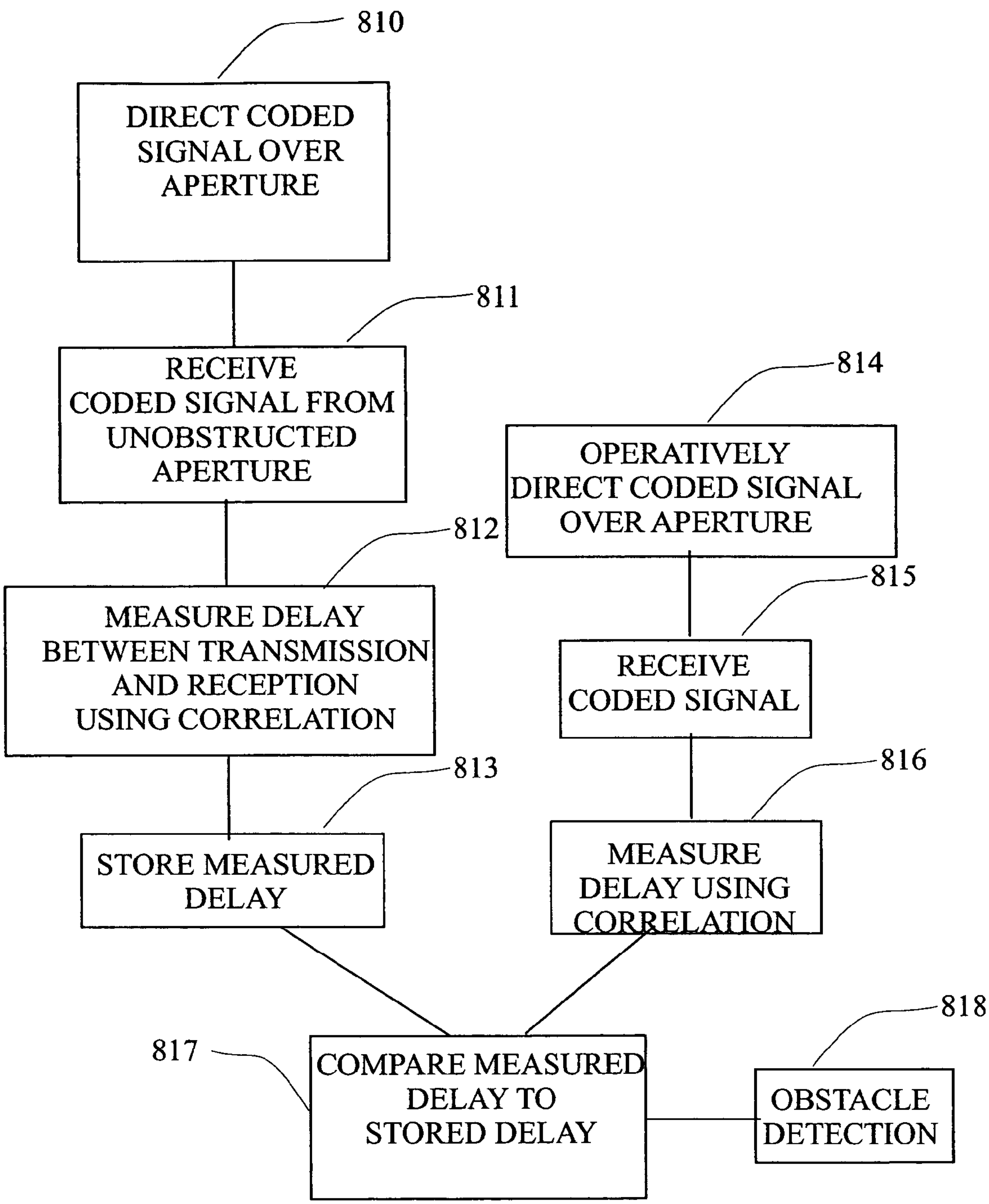

FIG. 173 is a flow chart of still another method for monitoring an aperture in accordance with the present invention.

Figure 174:
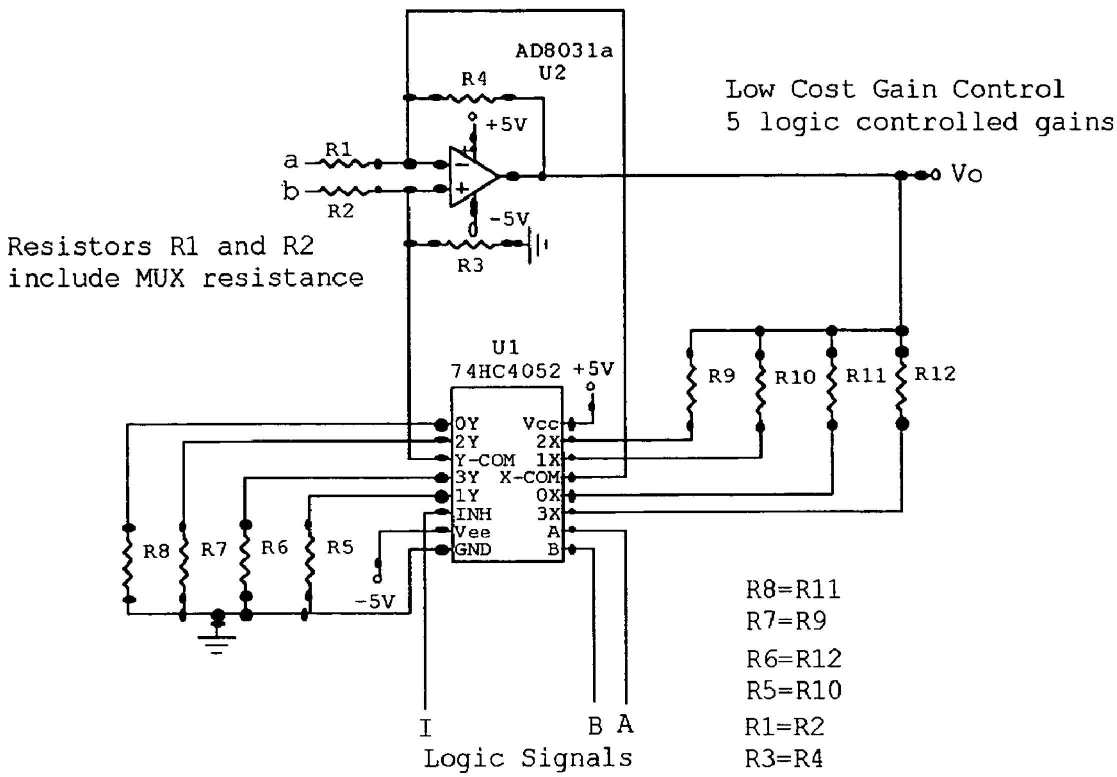

FIG. 174 is a circuit diagram showing a method of approximately compensating for the drop-off in signal strength due to distance to the target.

Figure 175:
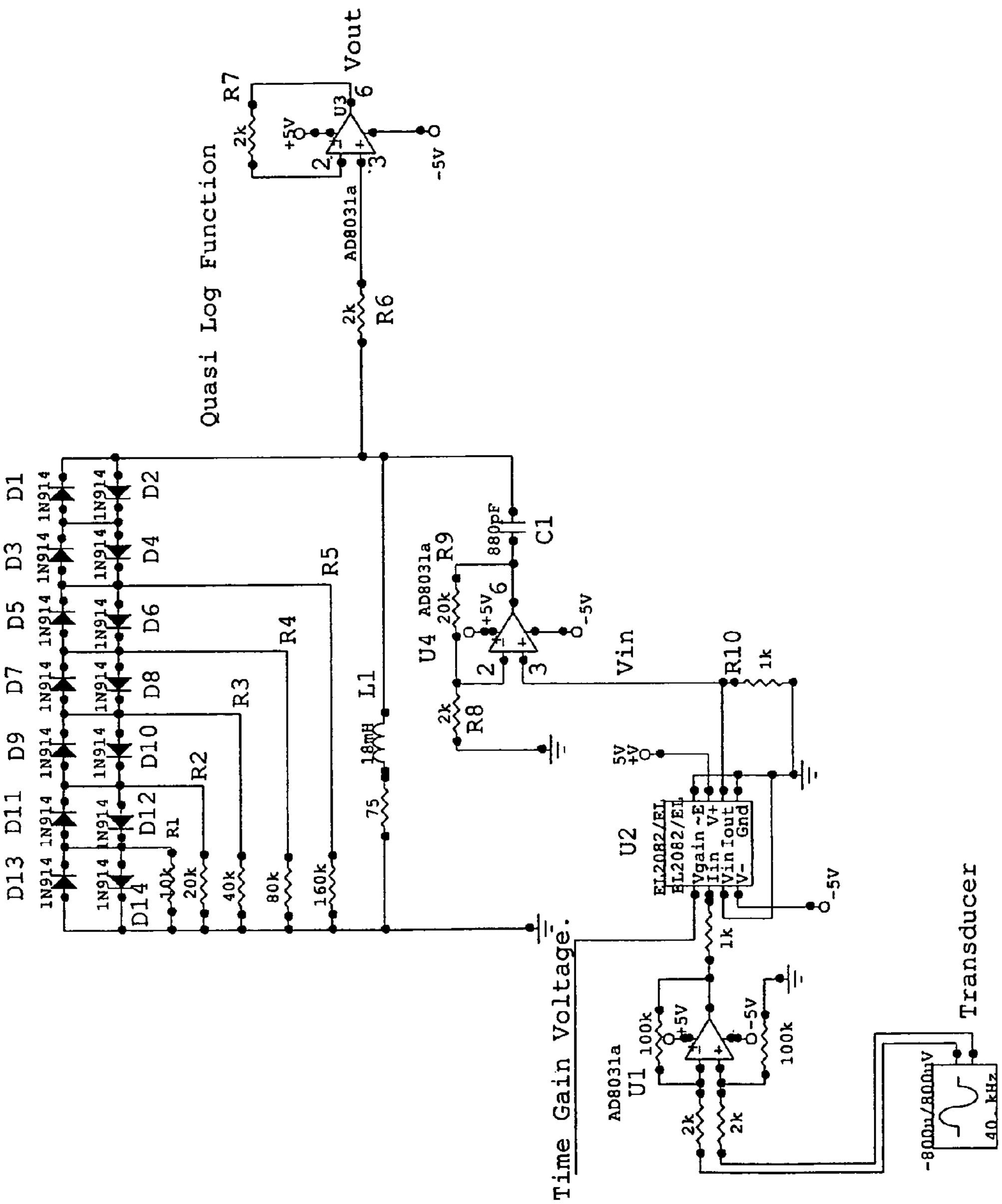

FIG. 175 illustrates a circuit that performs a quasi-logarithmic compression amplification of the return signal.

Figure 176:
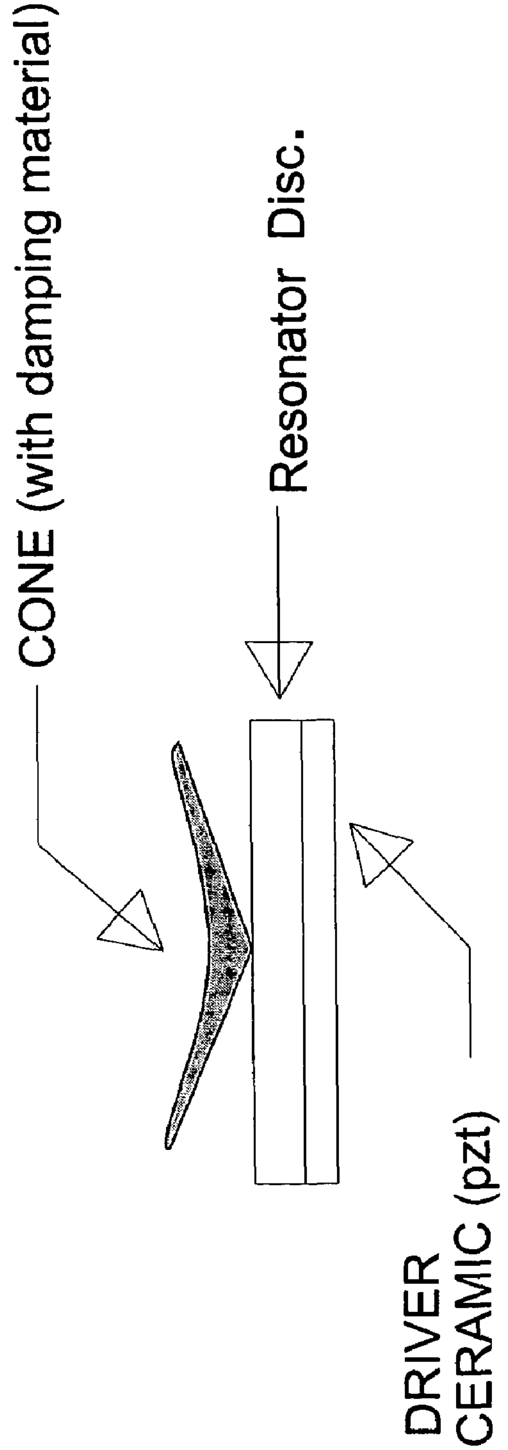

FIG. 176 illustrates a damped transducer where the damping material is placed in the transducer cone.

Figure 177:
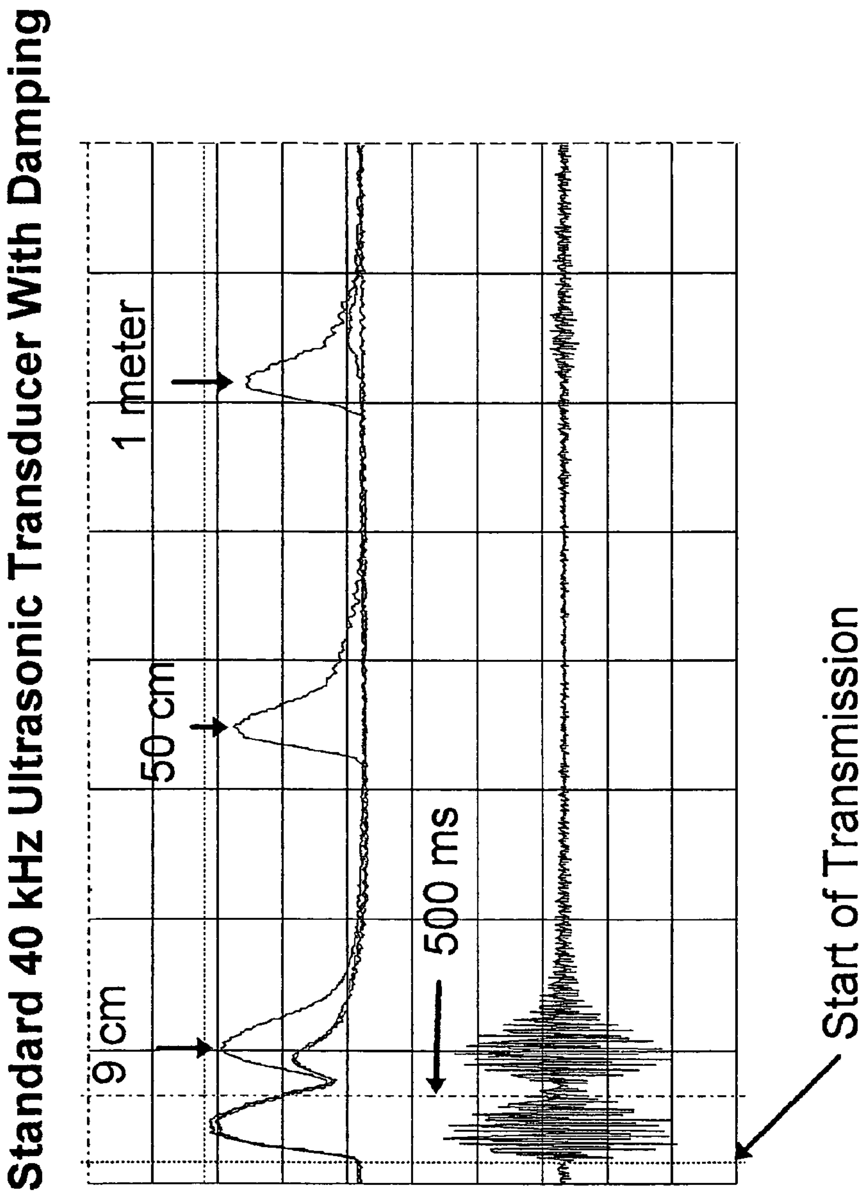

FIG. 177 illustrates the superimposed reflections from a target placed at three distances from the transducer, 9 cm, 50 cm and 1 meter respectively for a transducer with a damped cone as shown in FIG. 176.

Figure 178:
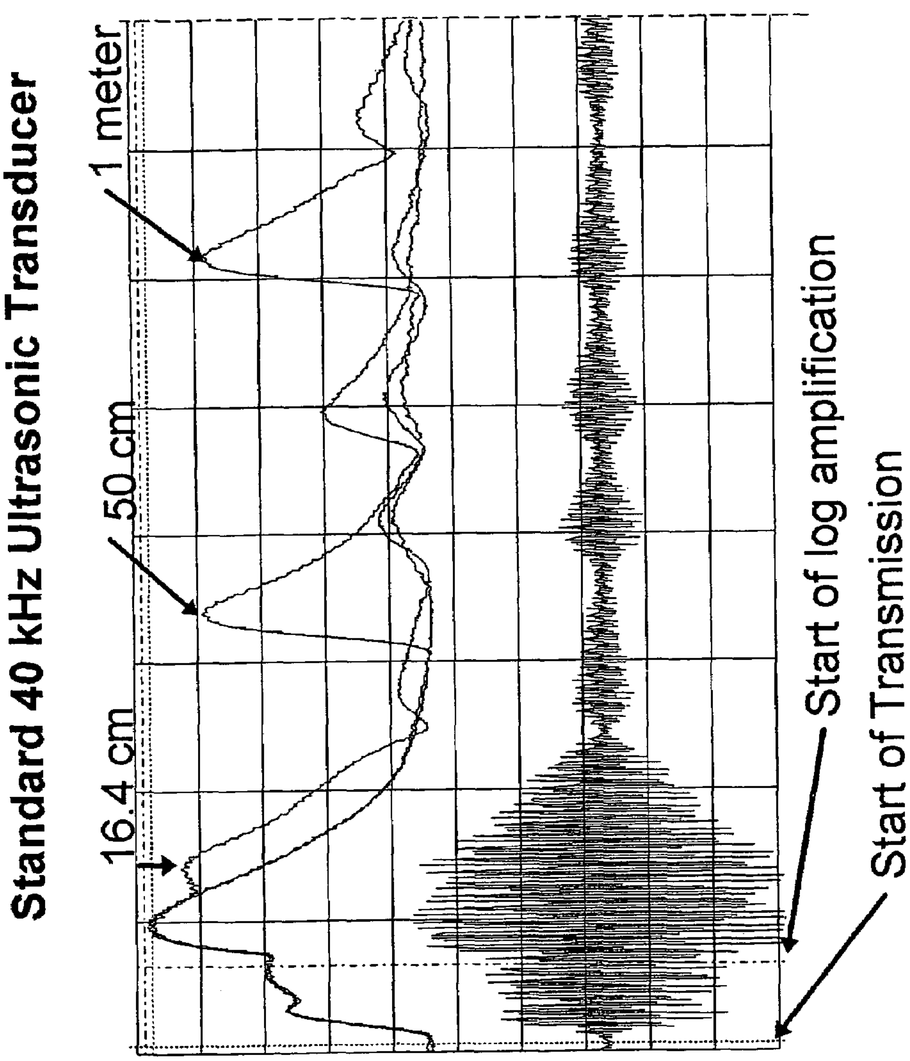

FIG. 178 illustrates the superimposed reflections from a target placed at 16.4 cm, 50 cm and 1 meter respectively for a transducer without a damped cone.

Figure 179D:
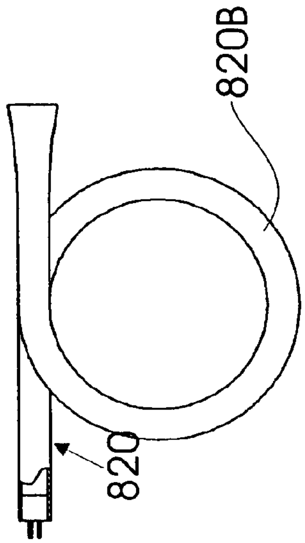
Figure 179E:
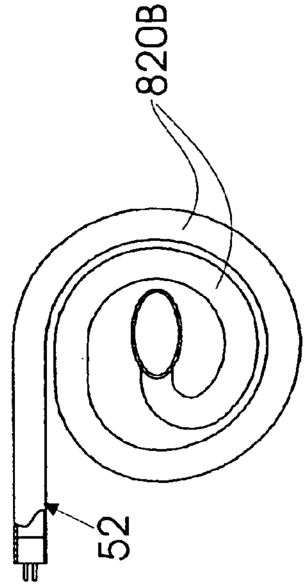
Figure 179F:
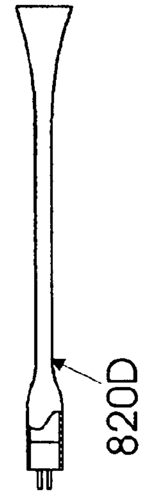
Figure 179A:
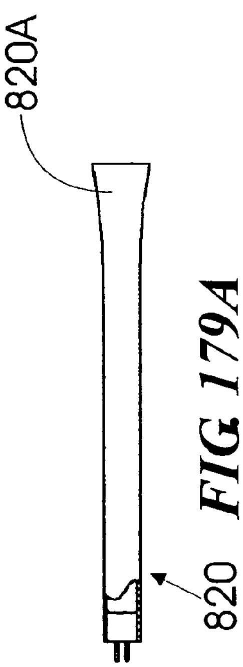
Figure 179B:
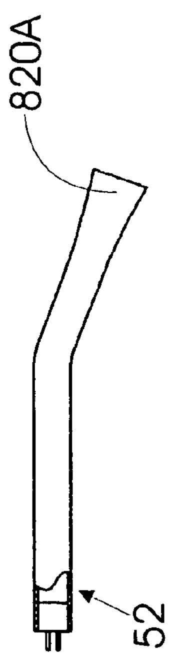
Figure 179C:
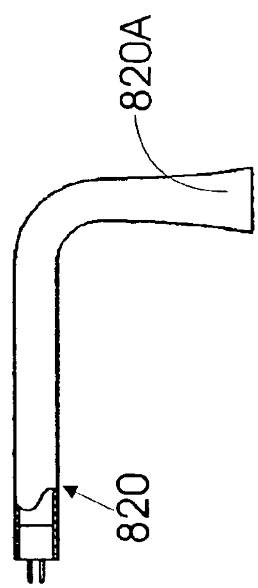

FIG. 179A-179F illustrate a variety of examples of a transducer in a tube design. A straight tube with an exponential horn is illustrated in FIG. 179A. FIGS. 179B and 179C illustrate the bending of the tube through 40 degrees and 90 degrees respectively. FIG. 179D illustrates the incorporation of a single loop and FIG. 179E of multiple loops. FIG. 179F illustrates the use of a small diameter tube.

Figure 180:
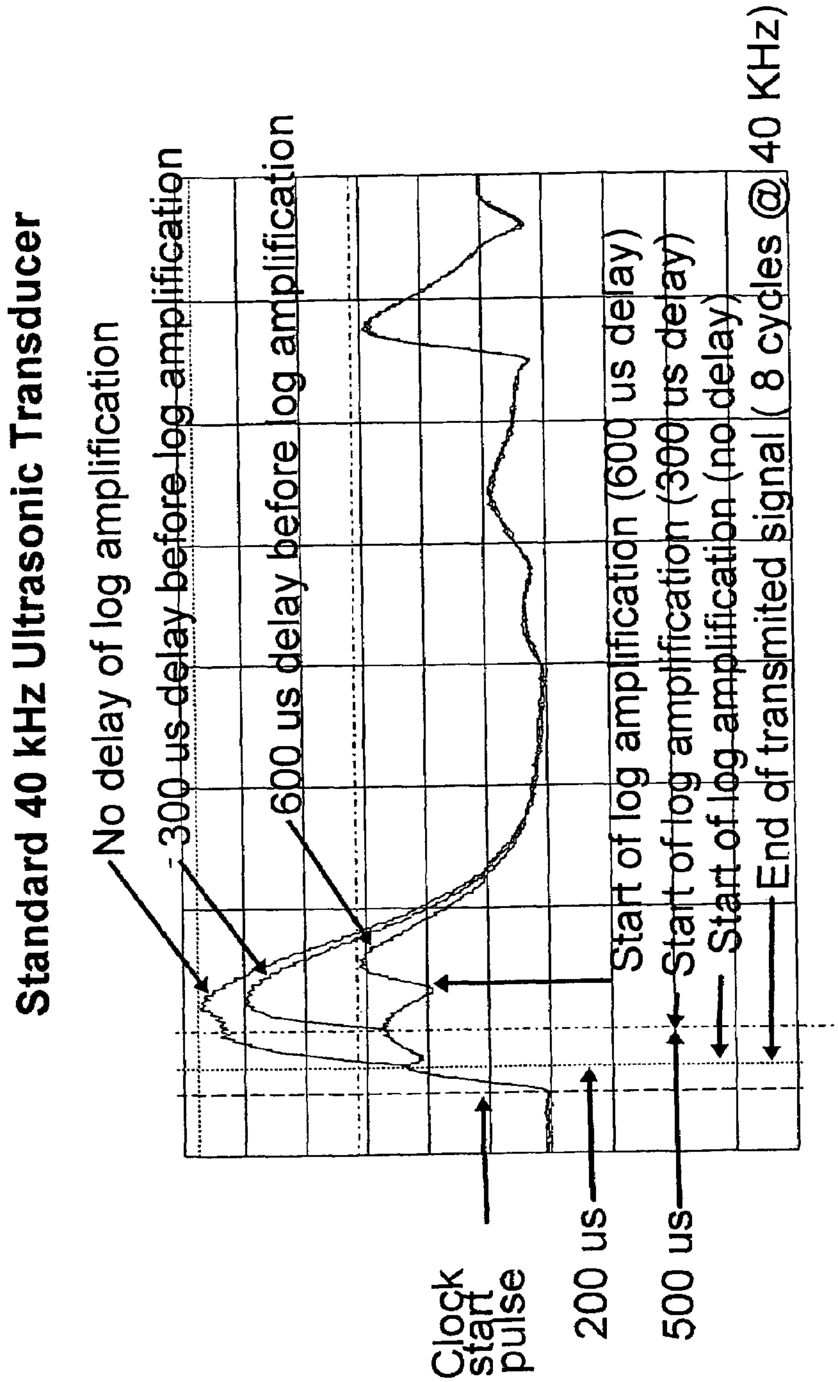

FIG. 180 illustrates the effect of a delay in the start of the amplifier for a fraction of a millisecond on the ability to measure close objects.

Figure 181A:
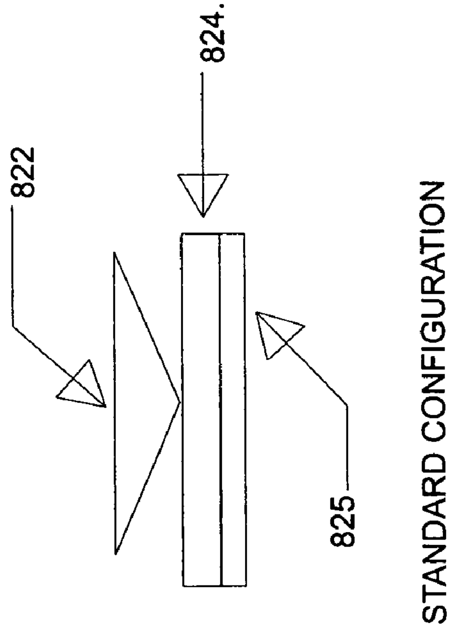
Figure 181B:
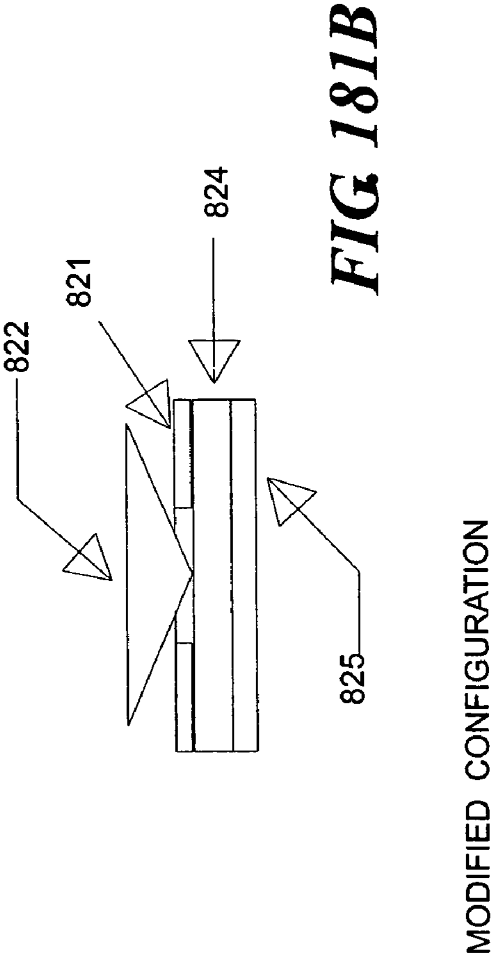

FIGS. 181A-B illustrates the use of a Colpits system for permitting the electronic damping the motion of the transducer cone and thereby eliminating the ringing.

FIG. 182 illustrates an alternative method of electronically reducing the ringing of the ultrasonic transducer.

Figure 183B:
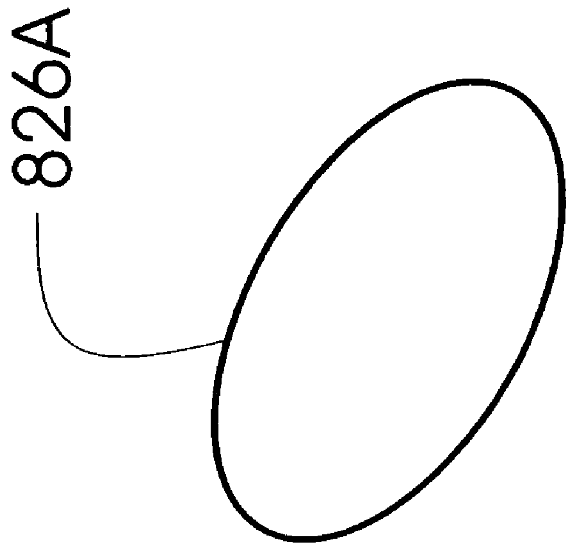
Figure 183A:
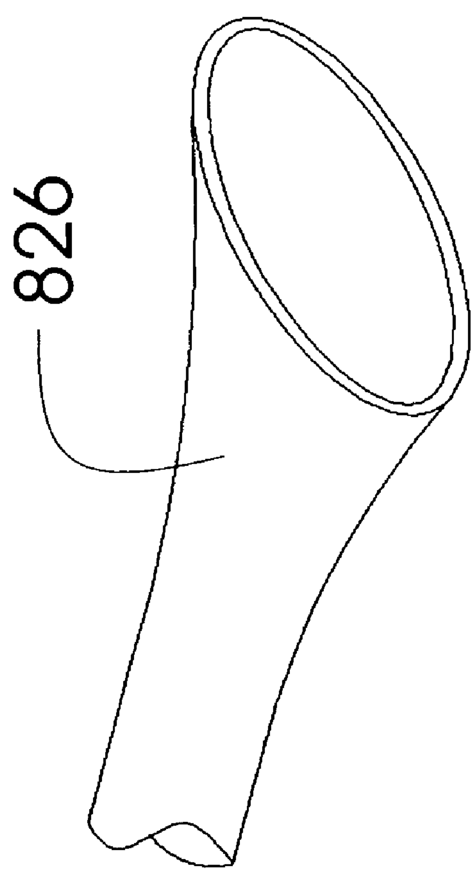

FIG. 183A is an example of a horn shaped to create an elliptical pattern and the resulting pattern is illustrated in FIG. 183B.

Figure 184:
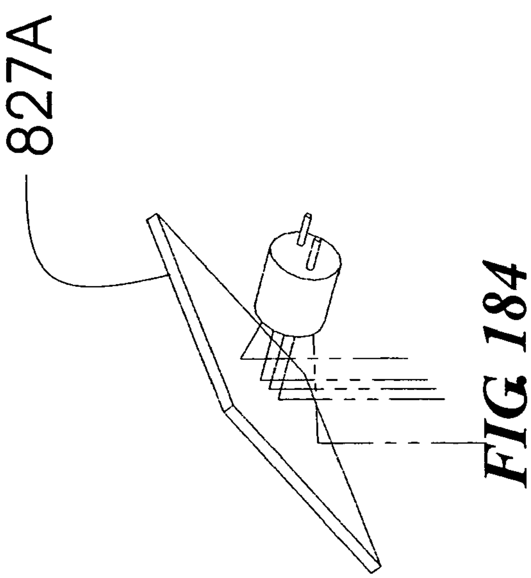

FIG. 184 illustrates an alternate method of achieving a particular desired ultrasonic field shape by using a flat reflector.

Figure 185:
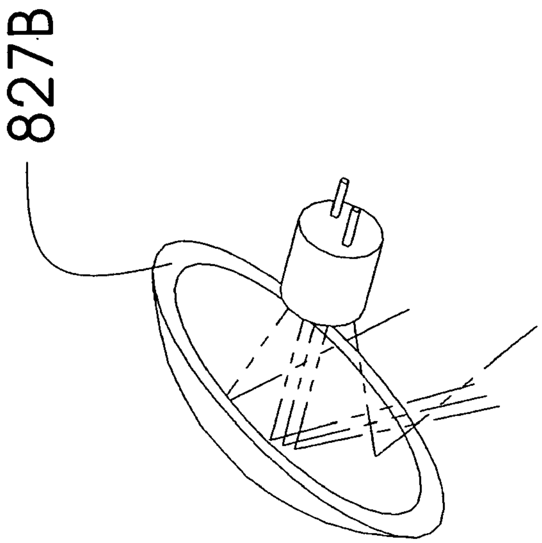

FIG. 185 is similar to FIG. 184 except a concave reflector is used.

Figure 186:
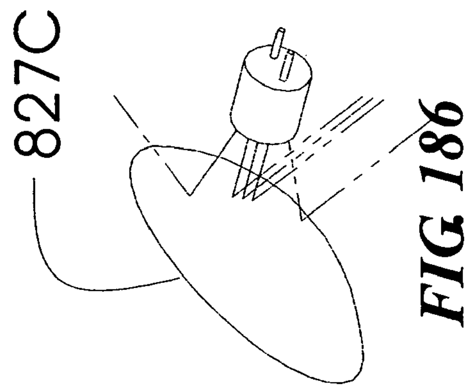

FIG. 186 is similar to FIG. 184 except a convex reflector is used.

Figure 19A:
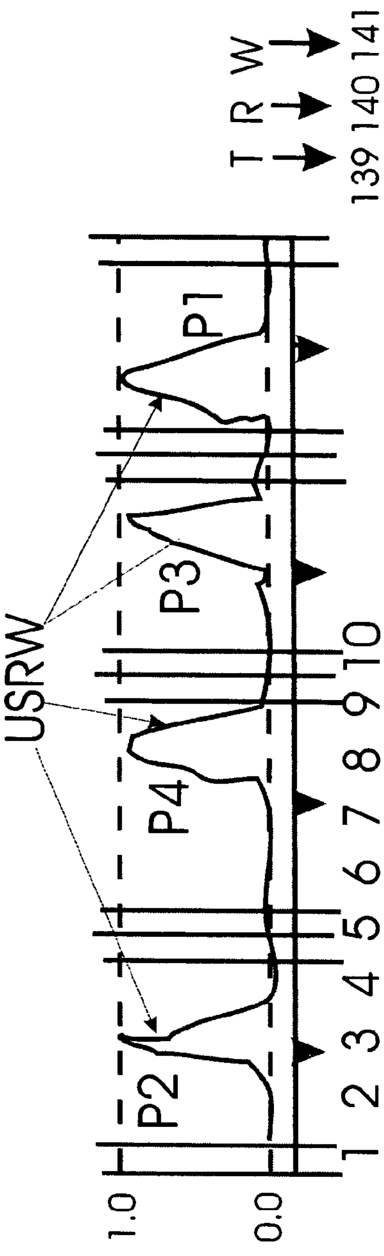
FIG. 19(*a*) is an explanatory diagram of a process for normalizing the reflected wave and shows normalized reflected waves.
Figure 19B:
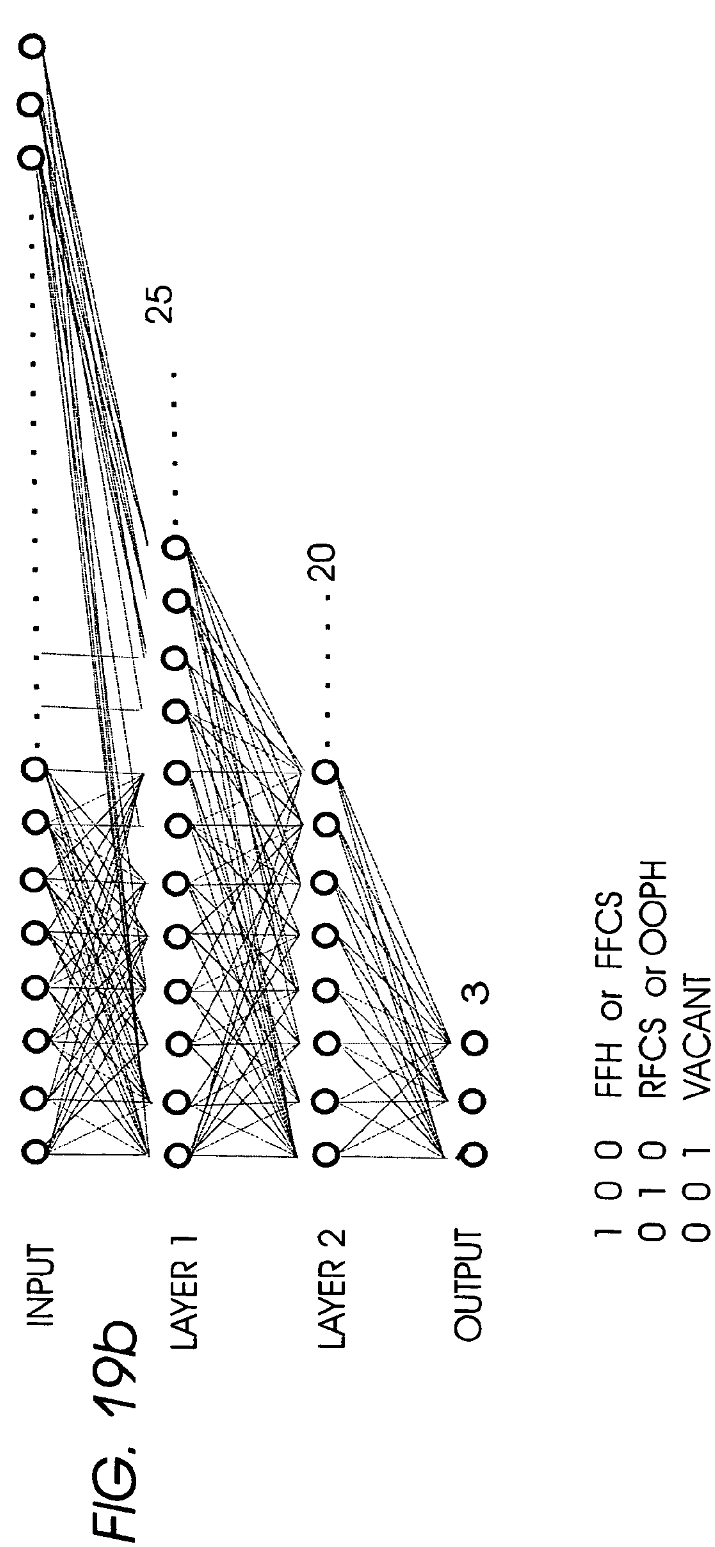
Figure 187:
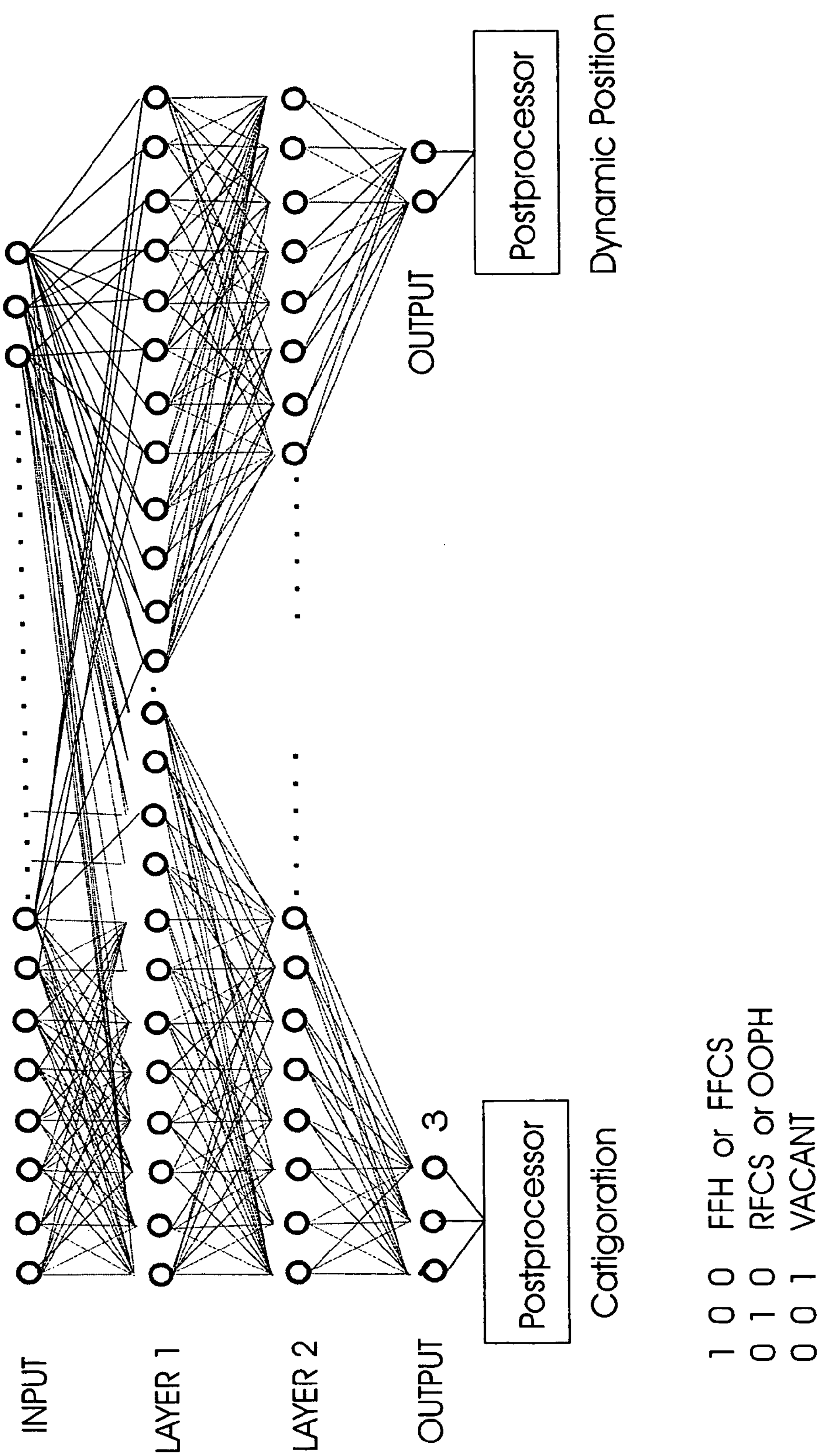

FIG. 187 is a diagram of a neural network similar to FIG. 19*b* only with a dual architecture with the addition of a post processing operation for both the categorization and position measurement networks and separate hidden layer nodes for each of the two networks.

Figure 188:
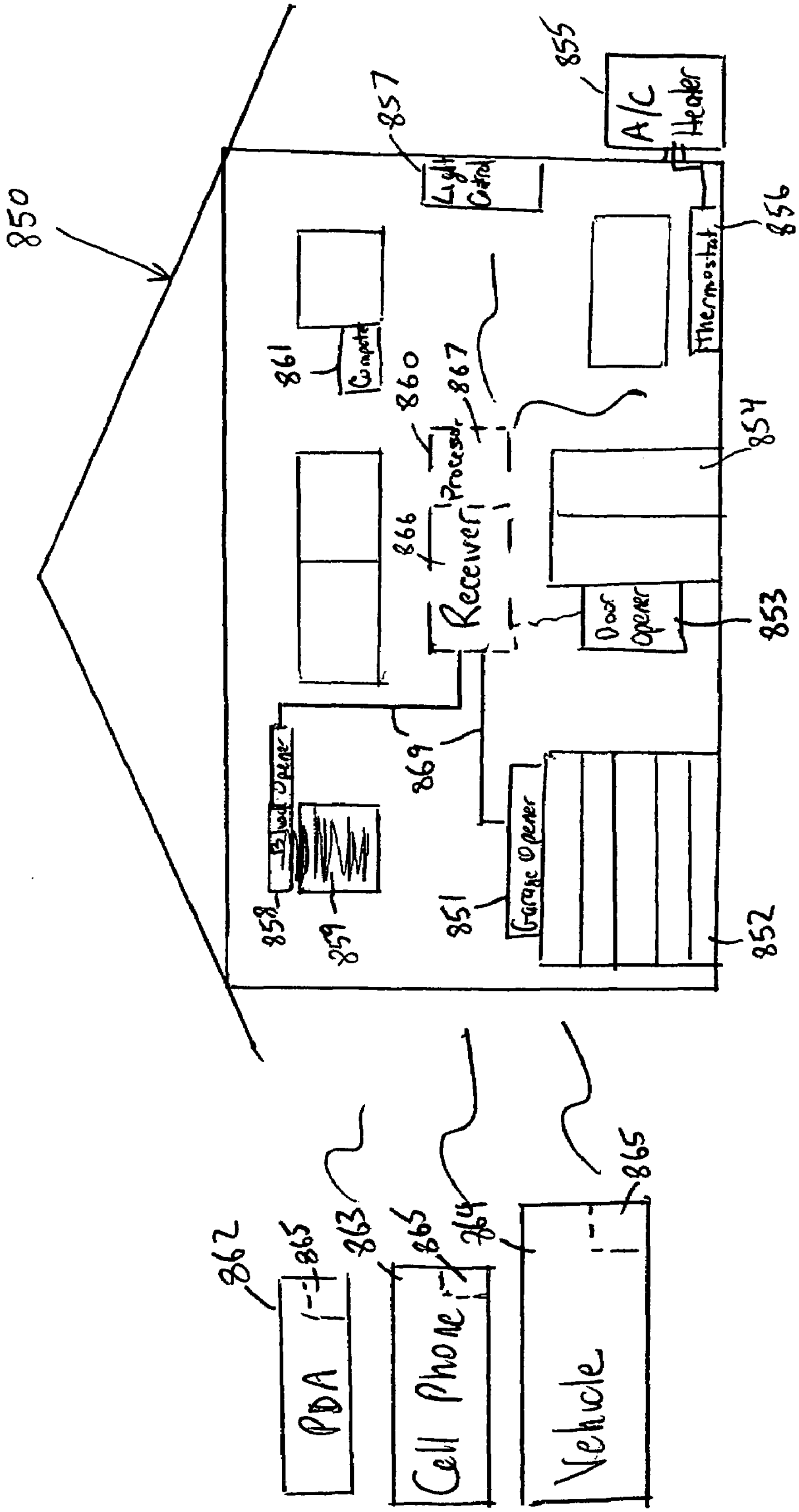

FIG. 188 is a diagram of a control system for an asset in accordance with the invention.

Figure 189A:
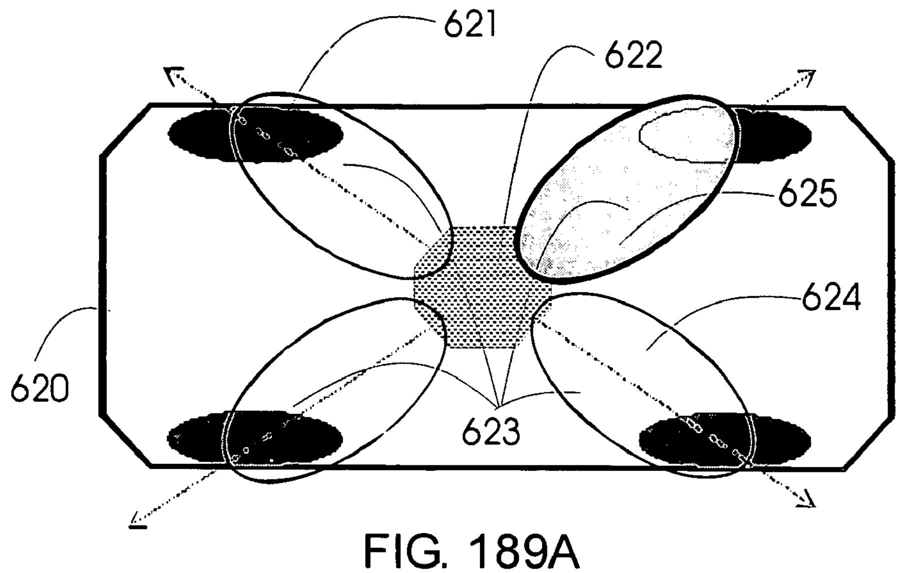

FIG. 189A is a top view of a system for obtaining information about a vehicle or a component therein, specifically information about the tires, such as pressure and/or temperature thereof.

Figure 189B:
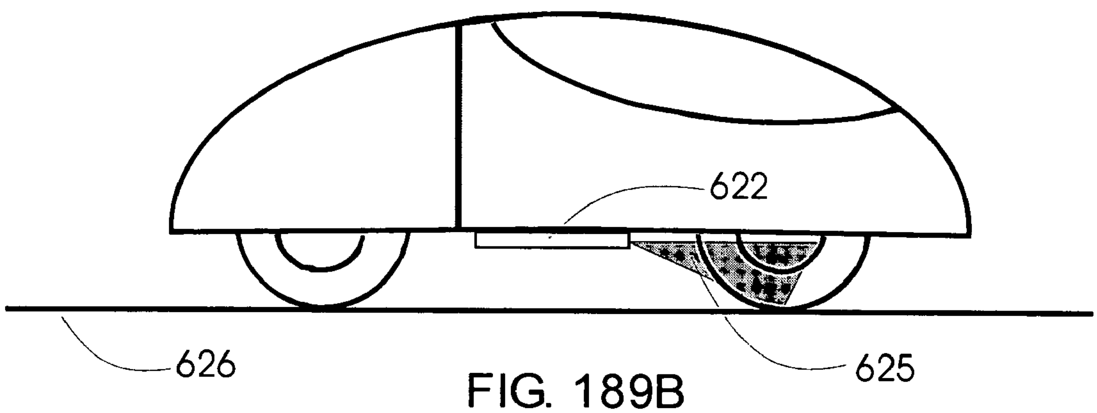

FIG. 189B is a side view of the vehicle shown in FIG. 189A.

Figure 189C:
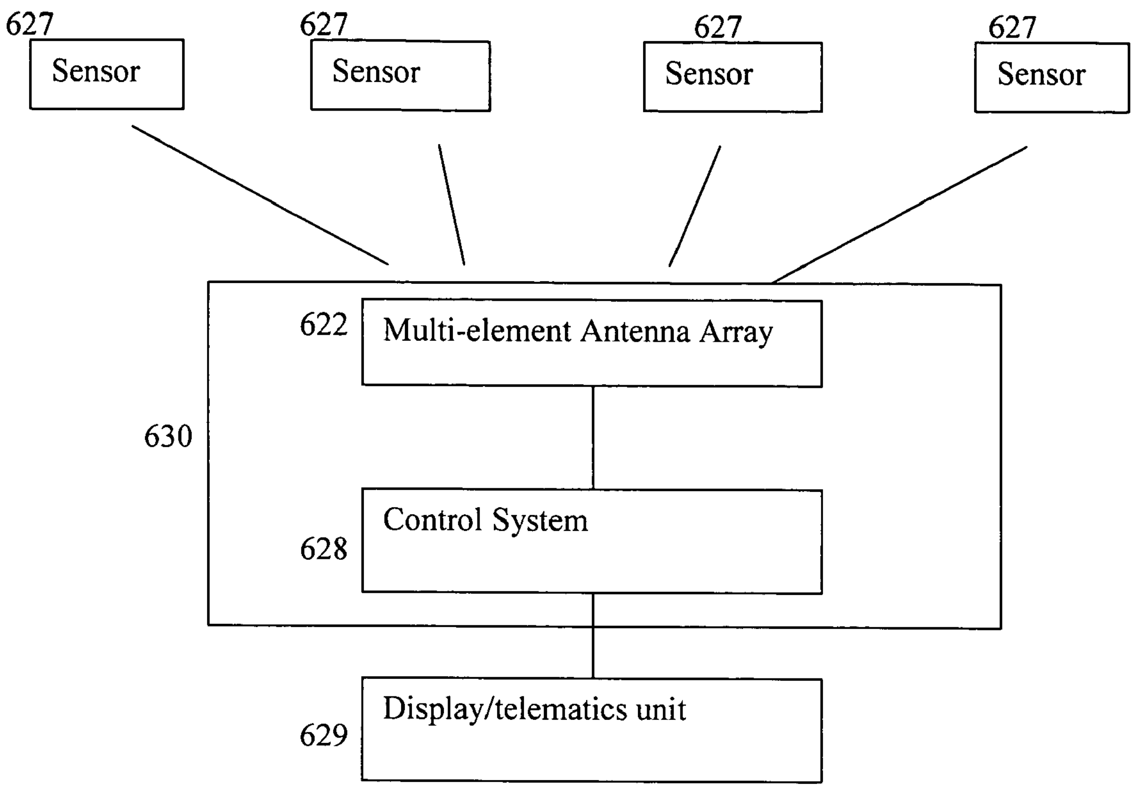

FIG. 189C is a schematic of the system shown in FIGS. 189A and 189B

Figure 190:
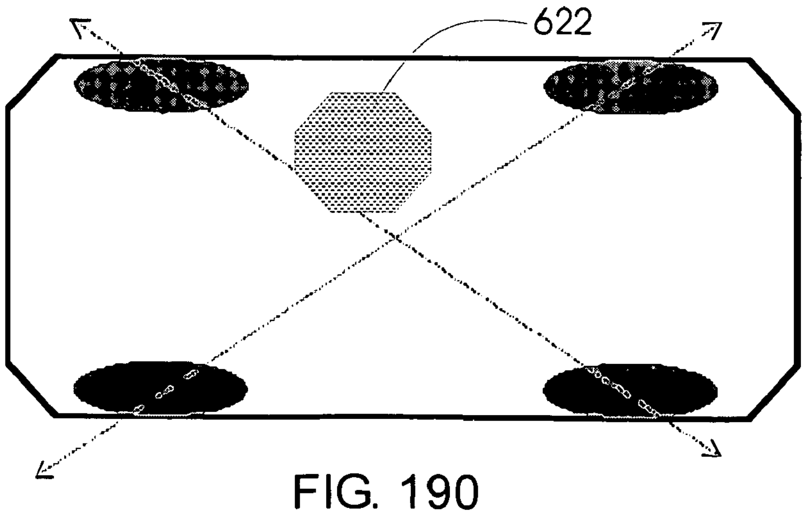

FIG. 190 is a top view of an alternate system for obtaining information about the tires of a vehicle.

DETAILED DESCRIPTION OF THE PREFERRED EMBODIMENTS

Note whenever a patent or literature is referred to below it is to be assumed that all of that patent or literature is to be incorporated by reference in its entirety to the extent the disclosure of these reference is necessary. Also note that although many of the examples below relate to a particular vehicle, an automobile, the invention is not limited to any particular vehicle and is thus applicable to all relevant vehicles including shipping containers and truck trailers and to all compartments of a vehicle including, for example, the passenger compartment and the trunk of an automobile or truck:

1. General Occupant Sensors

Referring to the accompanying drawings, FIG. 1 is a side view, with parts cutaway and removed of a vehicle showing the passenger compartment, or passenger container, containing a rear facing child seat 2 on a front passenger seat 4 and a preferred mounting location for a first embodiment of a vehicle interior monitoring system in accordance with the invention. The interior monitoring system is capable of detecting the presence of an object, occupying objects such as a box, an occupant or a rear facing child seat 2, determining the type of object, determining the location of the object, and/or determining another property or characteristic of the object. A property of the object could be the orientation of a child seat, the velocity of an adult and the like. For example, the vehicle interior monitoring system can determine that an object is present on the seat, that the object is a child seat and that the child seat is rear-facing. The vehicle interior monitoring system could also determine that the object is an adult, that he is drunk and that he is out of position relative to the airbag.

In this embodiment, three transducers 6, 8 and 10 are used alone, or, alternately in combination with one or more antenna near field monitoring sensors or transducers, 12, 14 and 16, although any number of wave-transmitting transducers or radiation-receiving receivers may be used. Such transducers or receivers may be of the type that emit or receive a continuous signal, a time varying signal or a spatial varying signal such as in a scanning system and each may comprise only a transmitter which transmits energy, waves or radiation, only a receiver which receives energy, waves or radiation, both a transmitter and a receiver capable of transmitting and receiving energy, waves or radiation, an electric field sensor, a capacitive sensor, or a self-tuning antenna-based sensor, weight sensor, chemical sensor, motion sensor or vibration sensor, for example.

One particular type of radiation-receiving receiver for use in the invention receives electromagnetic waves and another receives ultrasonic waves.

In an ultrasonic embodiment, transducer 8 can be used as a transmitter and transducers 6 and 10 can be used as receivers. Naturally, other combinations can be used such as where all transducers are transceivers (transmitters and receivers). For example, transducer 8 can be constructed to transmit ultrasonic energy toward the front passenger seat, which is modified, in this case by the occupying item of the passenger seat, i.e., the rear facing child seat 2, and the modified waves are received by the transducers 6 and 10, for example. A more common arrangement is where transducers 6, 8 and 10 are all transceivers. Modification of the ultrasonic energy may constitute reflection of the ultrasonic energy as the ultrasonic energy is reflected back by the occupying item of the seat. The waves received by transducers 6 and 10 vary with time depending on the shape of the object occupying the passenger seat, in this case the rear facing child seat 2. Each different occupying item will reflect back waves having a different pattern. Also, the pattern of waves received by transducer 6 will differ from the pattern received by transducer 10 in view of its different mounting location. This difference generally permits the determination of location of the reflecting surface (i.e., the rear facing child seat 2) through triangulation. Through the use of two transducers 6, 10, a sort of stereographic image is received by the two transducers and recorded for analysis by processor 20, which is coupled to the transducers 6, 8, 10, e.g., by wires or wirelessly. This image will differ for each object that is placed on the vehicle seat and it will also change for each position of a particular object and for each position of the vehicle seat. Elements 6, 8, 10, although described as transducers, are representative of any type of component used in a wave-based analysis technique. Also, although the example of an automobile passenger compartment has been shown, the same principle can be used for monitoring the interior of any vehicle including in particular shipping containers and truck trailers.

Wave-type sensors as the transducers 6, 8, 10 as well as electric field sensors 12, 14, 16 are mentioned above. Electric field sensors and wave sensors are essentially the same from the point of view of sensing the presence of an occupant in a vehicle. In both cases, a time varying electric field is disturbed or modified by the presence of the occupant. At high frequencies in the visual, infrared and high frequency radio wave region, the sensor is based on its capability to sense a change of wave characteristics of the electromagnetic field, such as amplitude, phase or frequency. As the frequency drops, other characteristics of the field are measured. At still lower frequencies, the occupant's dielectric properties modify parameters of the reactive electric field in the occupied space between or near the plates of a capacitor. In this latter case, the sensor senses the change in charge distribution on the capacitor plates by measuring, for example, the current wave magnitude or phase in the electric circuit that drives the capacitor. These measured parameters are directly connected with parameters of the displacement current in the occupied space. In all cases, the presence of the occupant reflects, absorbs or modifies the waves or variations in the electric field in the space occupied by the occupant. Thus, for the purposes of at least one of the inventions disclosed herein, capacitance, electric field or electromagnetic wave sensors are equivalent and although they are all technically "field" sensors they will be considered as "wave" sensors herein. What follows is a discussion comparing the similarities and differences between two types of field or wave sensors, electromagnetic wave sensors and capacitive sensors as exemplified by Kithil in U.S. Pat. No. 5,702,634.

An electromagnetic field disturbed or emitted by a passenger in the case of an electromagnetic wave sensor, for example, and the electric field sensor of Kithil, for example, are in many ways similar and equivalent for the purposes of at least one of the inventions disclosed herein. The electromagnetic wave sensor is an actual electromagnetic wave sensor by definition because they sense parameters of an electromagnetic wave, which is a coupled pair of continuously changing electric and magnetic fields. The electric field here is not a static, potential one. It is essentially a dynamic, rotational electric field coupled with a changing magnetic one, that is, an electromagnetic wave. It cannot be produced by a steady distribution of electric charges. It is initially produced by moving electric charges in a transmitter, even if this transmitter is a passenger body for the case of a passive infrared sensor.

In the Kithil sensor, a static electric field is declared as an initial material agent coupling a passenger and a sensor (see Column 5, lines 5-7: "The proximity sensor 12 each function by creating an electrostatic field between oscillator input loop 54 and detector output loop 56, which is affected by presence of a person near by, as a result of capacitive coupling, . . . "). It is a potential, non-rotational electric field. It is not necessarily coupled with any magnetic field. It is the electric field of a capacitor. It can be produced with a steady distribution of electric charges. Thus, it is not an electromagnetic wave by definition but if the sensor is driven by a varying current, then it produces a quasistatic electric field in the space between/near the plates of the capacitor.

Kithil declares that his capacitance sensor uses a static electric field. Thus, from the consideration above, one can conclude that Kithil's sensor cannot be treated as a wave sensor because there are no actual electromagnetic waves but only a static electric field of the capacitor in the sensor system. However, this is not believed to be the case. The Kithil system could not operate with a true static electric field because a steady system does not carry any information. Therefore, Kithil is forced to use an oscillator, causing an alternate current in the capacitor and a reactive quasi-static electric field in the space between the capacitor plates, and a detector to reveal an informative change of the sensor capacitance caused by the presence of an occupant (see FIG. 7 and its description). In this case, the system becomes a "wave sensor" in the sense that it starts generating an actual time-varying electric field that certainly originates electromagnetic waves according to the definition above. That is, Kithil's sensor can be treated as a wave sensor regardless of the shape of the electric field that it creates, a beam or a spread shape.

As follows from the Kithil patent, the capacitor sensor is likely a parametric system where the capacitance of the sensor is controlled by the influence of the passenger body. This influence is transferred by means of the near electromagnetic field (i.e., the wave-like process) coupling the capacitor electrodes and the body. It is important to note that the same influence takes place with a real static electric field also, that is in absence of any wave phenomenon. This would be a situation if there were no oscillator in Kithil's system. However, such a system is not workable and thus Kithil reverts to a dynamic system using time-varying electric fields.

Thus, although Kithil declares that the coupling is due to a static electric field, such a situation is not realized in his system because an alternating electromagnetic field ("quasi-wave") exists in the system due to the oscillator. Thus, his sensor is actually a wave sensor, that is, it is sensitive to a change of a wave field in the vehicle compartment. This change is measured by measuring the change of its capacitance. The capacitance of the sensor system is determined by the configuration of its electrodes, one of which is a human body, that is, the passenger inside of and the part which controls the electrode configuration and hence a sensor parameter, the capacitance.

The physics definition of "wave" from Webster's Encyclopedic Unabridged Dictionary is: "11. *Physics*. A progressive disturbance propagated from point to point in a medium or space without progress or advance of the points themselves, . . . ". In a capacitor, the time that it takes for the disturbance (a change in voltage) to propagate through space, the dielectric and to the opposite plate is generally small and neglected but it is not zero. As the frequency driving the capacitor increases and the distance separating the plates increases, this transmission time as a percentage of the period of oscillation can become significant. Nevertheless, an observer between the plates will see the rise and fall of the electric field much like a person standing in the water of an ocean. The presence of a dielectric body between the plates causes the waves to get bigger as more electrons flow to and from the plates of the capacitor. Thus, an occupant affects the magnitude of these waves which is sensed by the capacitor circuit. Thus, the electromagnetic field is a material agent that carries information about a passenger's position in both Kithil's and a beam-type electromagnetic wave sensor.

For ultrasonic systems, the "image" recorded from each ultrasonic transducer/receiver, is actually a time series of digitized data of the amplitude of the received signal versus time. Since there are two receivers, two time series are obtained which are processed by the processor 20. The processor 20 may include electronic circuitry and associated, embedded software. Processor 20 constitutes one form of generating means in accordance with the invention which generates information about the occupancy of the passenger compartment based on the waves received by the transducers 6, 8, 10.

When different objects are placed on the front passenger seat, the images from transducers 6, 8, 10 for example, are different but there are also similarities between all images of rear facing child seats, for example, regardless of where on the vehicle seat it is placed and regardless of what company manufactured the child seat. Alternately, there will be similarities between all images of people sitting on the seat regardless of what they are wearing, their age or size. The problem is to find the "rules" which differentiate the images of one type of object from the images of other types of objects, e.g., which differentiate the occupant images from the rear facing child seat images. The similarities of these images for various child seats are frequently not obvious to a person looking at plots of the time series and thus computer algorithms are developed to sort out the various patterns. For a more detailed discussion of pattern recognition see US RE 37260 to Varga et al.

The determination of these rules is important to the pattern recognition techniques used in at least one of the inventions disclosed herein. In general, three approaches have been useful, artificial intelligence, fuzzy logic and artificial neural networks (including cellular and modular or combination neural networks and support vector machines—although additional types of pattern recognition techniques may also be used, such as sensor fusion). In some implementations of at least one of the inventions disclosed herein, such as the determination that there is an object in the path of a closing window as described below, the rules are sufficiently obvious that a trained researcher can sometimes look at the returned signals and devise a simple algorithm to make the required determinations. In others, such as the determination of the presence of a rear facing child seat or of an occupant, artificial neural networks can be used to determine the rules. One such set of neural network software for determining the pattern recognition rules is available from the International Scientific Research, Inc. of Panama City, Panama.

Electromagnetic energy based occupant sensors exist that use many portions of the electromagnetic spectrum. A system based on the ultraviolet, visible or infrared portions of the spectrum generally operate with a transmitter and a receiver of reflected radiation. The receiver may be a camera or a photo detector such as a pin or avalanche diode as described in detail in above-referenced patents and patent applications. At other frequencies, the absorption of the electromagnetic energy is primarily used and at still other frequencies the capacitance or electric field influencing effects are used. Generally, the human body will reflect, scatter, absorb or transmit electromagnetic energy in various degrees depending on the frequency of the electromagnetic waves. All such occupant sensors are included herein.

In an embodiment wherein electromagnetic energy is used, it is to be appreciated that any portion of the electromagnetic signals that impinges upon, surrounds or involves a body portion of the occupant is at least partially absorbed by the body portion. Sometimes, this is due to the fact that the human body is composed primarily of water, and that electromagnetic energy of certain frequencies is readily absorbed by water. The amount of electromagnetic signal absorption is related to the frequency of the signal, and size or bulk of the body portion that the signal impinges upon. For example, a torso of a human body tends to absorb a greater percentage of electromagnetic energy than a hand of a human body.

Thus, when electromagnetic waves or energy signals are transmitted by a transmitter, the returning waves received by a receiver provide an indication of the absorption of the electromagnetic energy. That is, absorption of electromagnetic energy will vary depending on the presence or absence of a human occupant, the occupant's size, bulk, surface reflectivity, etc. depending on the frequency, so that different signals will be received relating to the degree or extent of absorption by the occupying item on the seat. The receiver will produce a signal representative of the returned waves or energy signals which will thus constitute an absorption signal as it corresponds to the absorption of electromagnetic energy by the occupying item in the seat.

One or more of the transducers 6, 8, 10 can also be image-receiving devices, such as cameras, which take images of the interior of the passenger compartment. These images can be transmitted to a remote facility to monitor the passenger compartment or can be stored in a memory device for use in the event of an accident, i.e., to determine the status of the occupant(s) of the vehicle prior to the accident. In this manner, it can be ascertained whether the driver was falling asleep, talking on the phone, etc.

A memory device for storing images of the passenger compartment, and also for receiving and storing any other information, parameters and variables relating to the vehicle or occupancy of the vehicle, may be in the form a standardized "black box" (instead of or in addition to a memory part in a processor 20). The IEEE Standards Association is currently beginning to develop an international standard for motor vehicle event data recorders. The information stored in the black box and/or memory unit in the processor 20, can include the images of the interior of the passenger compartment as well as the number of occupants and the health state of the occupant(s). The black box would preferably be tamper-proof and crash-proof and enable retrieval of the information after a crash.

Transducer 8 can also be a source of electromagnetic radiation, such as an LED, and transducers 6 and 10 can be CMOS, CCD imagers or other devices sensitive to electromagnetic radiation or fields. This "image" or return signal will differ for each object that is placed on the vehicle seat, or elsewhere in the vehicle, and it will also change for each position of a particular object and for each position of the vehicle seat or other movable objects within the vehicle. Elements 6, 8, 10, although described as transducers, are representative of any type of component used in a wave-based or electric field analysis technique, including, e.g., a transmitter, receiver, antenna or a capacitor plate.

Transducers 12, 14 and 16 can be antennas placed in the seat and instrument panel, or other convenient location within the vehicle, such that the presence of an object, particularly a water-containing object such as a human, disturbs the near field of the antenna. This disturbance can be detected by various means such as with Micrel parts MICREF102 and MICREF104, which have a built-in antenna auto-tune circuit. Note, these parts cannot be used as is and it is necessary to redesign the chips to allow the auto-tune information to be retrieved from the chip.

Other types of transducers can be used along with the transducers 6, 8, 10 or separately and all are contemplated by at least one of the inventions disclosed herein. Such transducers include other wave devices such as radar or electronic field sensing systems such as described in U.S. Pat. Nos. 5,366,241, 5,602,734, 5,691,693, 5,802,479, 5,844,486, 6,014,602, and 6,275,146 to Kithil, and U.S. Pat. No. 5,948,031 to Rittmueller. Another technology, for example, uses the fact that the content of the near field of an antenna affects the resonant tuning of the antenna. Examples of such a device are shown as antennas 12, 14 and 16 in FIG. 1. By going to lower frequencies, the near field range is increased and also at such lower frequencies, a ferrite-type antenna could be used to minimize the size of the antenna. Other antennas that may be applicable for a particular implementation include dipole, microstrip, patch, Yagi etc. The frequency transmitted by the antenna can be swept and the (VSWR) voltage and current in the antenna feed circuit can be measured. Classification by frequency domain is then possible. That is, if the circuit is tuned by the antenna, the frequency can be measured to determine the object in the field.

Figure 2:
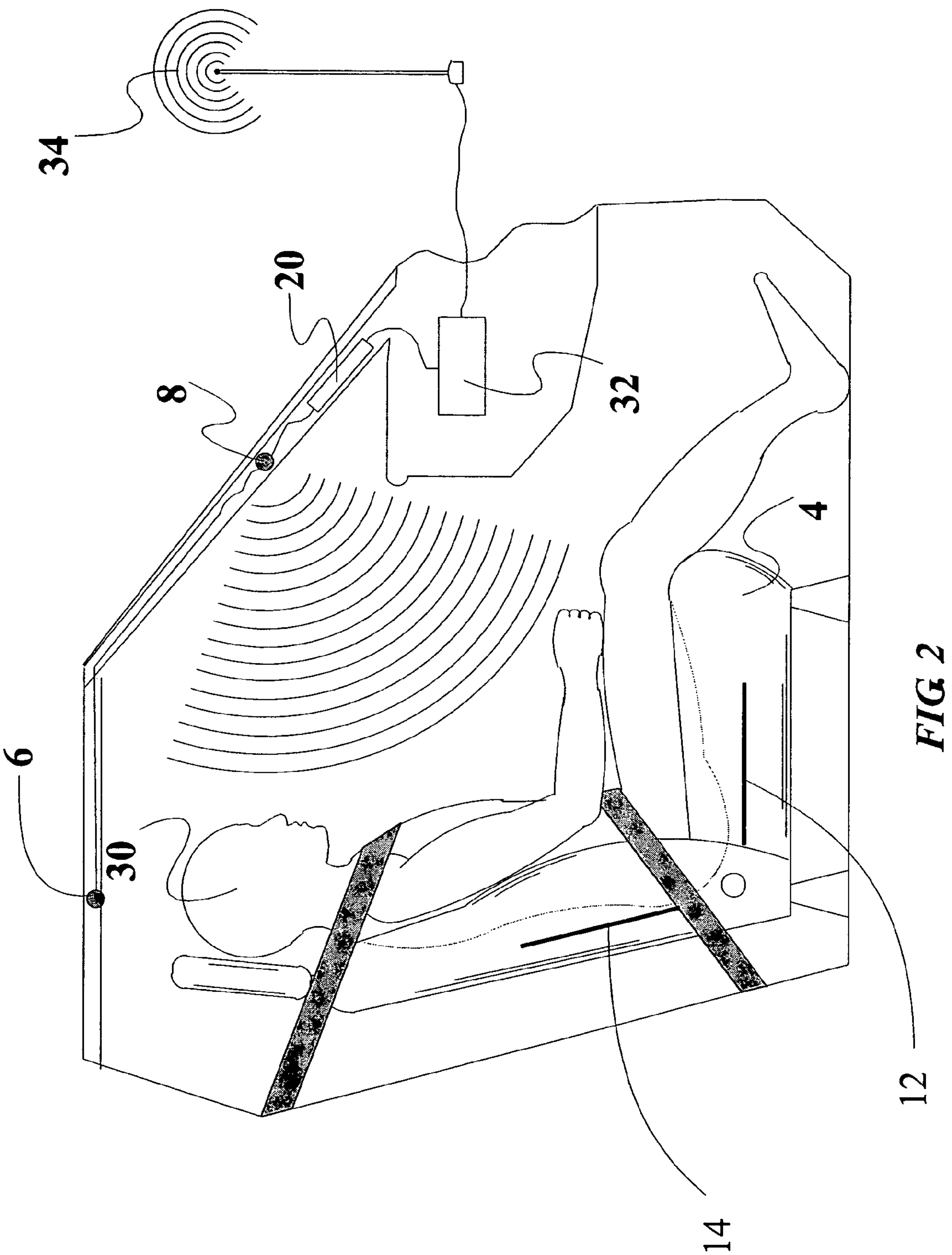
FIG. 2 is a side view with parts cutaway and removed showing schematically the interface between the vehicle interior monitoring system of at least one of the inventions disclosed herein and the vehicle cellular or other telematics communication system including an antenna field sensor.

An alternate system is shown in FIG. 2, which is a side view showing schematically the interface between the vehicle interior monitoring system of at least one of the inventions disclosed herein and the vehicle cellular or other communication system 32, such as a satellite based system such as that supplied by Skybitz, having an associated antenna 34. In this view, an adult occupant 30 is shown sitting on the front passenger seat 4 and two transducers 6 and 8 are used to determine the presence (or absence) of the occupant on that seat 4. One of the transducers 8 in this case acts as both a transmitter and receiver while the other transducer 6 acts only as a receiver. Alternately, transducer 6 could serve as both a transmitter and receiver or the transmitting function could be alternated between the two devices. Also, in many cases, more that two transmitters and receivers are used and in still other cases, other types of sensors, such as weight, chemical, radiation, vibration, acoustic, seatbelt tension sensor or switch, heartbeat, self tuning antennas (12, 14), motion and seat and seatback position sensors, are also used alone or in combination with the transducers 6 and 8. As is also the case in FIG. 1, the transducers 6 and 8 are attached to the vehicle embedded in the A-pillar and headliner trim, where their presence is disguised, and are connected to processor 20 that may also be hidden in the trim as shown or elsewhere. Naturally, other mounting locations can also be used and, in most cases, preferred as disclosed in Varga et. al. (US RE 37260).

The transducers 6 and 8 in conjunction with the pattern recognition hardware and software described below enable the determination of the presence of an occupant within a short time after the vehicle is started. The software is implemented in processor 20 and is packaged on a printed circuit board or flex circuit along with the transducers 6 and 8. Similar systems can be located to monitor the remaining seats in the vehicle, also determine the presence of occupants at the other seating locations and this result is stored in the computer memory, which is part of each monitoring system processor 20. Processor 20 thus enables a count of the number of occupants in the vehicle to be obtained by addition of the determined presence of occupants by the transducers associated with each seating location, and in fact, can be designed to perform such an addition. Naturally, the principles illustrated for automobile vehicles are applicable by those skilled in the art to other vehicles such as shipping containers or truck trailers and to other compartments of an automotive-vehicle such as the vehicle trunk.

For a general object, transducers 6, 8, 9, 10 can also be used to determine the type of object, determine the location of the object, and/or determine another property or characteristic of the object. A property of the object could be the orientation of a child seat, the velocity of an adult and the like. For example, the transducers 6, 8, 9, 10 can be designed to enable a determination that an object is present on the seat, that the object is a child seat and that the child seat is rear-facing.

The transducers 6 and 8 are attached to the vehicle buried in the trim such as the A-pillar trim, where their presence can be disguised, and are connected to processor 20 that may also be hidden in the trim as shown (this being a non-limiting position for the processor 20). The A-pillar is the roof support pillar that is closest to the front of the vehicle and which, in addition to supporting the roof, also supports the front windshield and the front door. Other mounting locations can also be used. For example, transducers 6, 8 can be mounted inside the seat (along with or in place of transducers 12 and 14), in the ceiling of the vehicle, in the B-pillar, in the C-pillar and in the doors. Indeed, the vehicle interior monitoring system in accordance with the invention may comprise a plurality of monitoring units, each arranged to monitor a particular seating location. In this case, for the rear seating locations, transducers might be mounted in the B-pillar or C-pillar or in the rear of the front seat or in the rear side doors. Possible mounting locations for transducers, transmitters, receivers and other occupant sensing devices are disclosed in the above-referenced patent applications and all of these mounting locations are contemplated for use with the transducers described herein.

The cellular phone or other communications system 32 outputs to an antenna 34. The transducers 6, 8, 12 and 14 in conjunction with the pattern recognition hardware and software, which is implemented in processor 20 and is packaged on a printed circuit board or flex circuit along with the transducers 6 and 8, determine the presence of an occupant within a few seconds after the vehicle is started, or within a few seconds after the door is closed. Similar systems located to monitor the remaining seats in the vehicle, also determine the presence of occupants at the other seating locations and this result is stored in the computer memory which is part of each monitoring system processor 20.

Periodically and in particular in the event of an accident, the electronic system associated with the cellular phone system 32 interrogates the various interior monitoring system memories and arrives at a count of the number of occupants in the vehicle, and optionally, even makes a determination as to whether each occupant was wearing a seatbelt and if he or she is moving after the accident. The phone or other communications system then automatically dials the EMS operator (such as 911 or through a telematics service such as OnStarg) and the information obtained from the interior monitoring systems is forwarded so that a determination can be made as to the number of ambulances and other equipment to send to the accident site, for example. Such vehicles will also have a system, such as the global positioning system, which permits the vehicle to determine its exact location and to forward this information to the EMS operator. Other systems can be implemented in conjunction with the communication with the emergency services operator. For example, a microphone and speaker can be activated to permit the operator to attempt to communicate with the vehicle occupant(s) and thereby learn directly of the status and seriousness of the condition of the occupant(s) after the accident.

Thus, in basic embodiments of the invention, wave or other energy-receiving transducers are arranged in the vehicle at appropriate locations, trained if necessary depending on the particular embodiment, and function to determine whether a life form is present in the vehicle and if so, how many life forms are present and where they are located etc. To this end, transducers can be arranged to be operative at only a single seating location or at multiple seating locations with a provision being made to eliminate a repetitive count of occupants. A determination can also be made using the transducers as to whether the life forms are humans, or more specifically, adults, child in child seats, etc. As noted herein, this is possible using pattern recognition techniques. Moreover, the processor or processors associated with the transducers can be trained to determine the location of the life forms, either periodically or continuously or possibly only immediately before, during and after a crash. The location of the life forms can be as general or as specific as necessary depending on the system requirements, i.e., a determination can be made that a human is situated on the driver's seat in a normal position (general) or a determination can be made that a human is situated on the driver's seat and is leaning forward and/or to the side at a specific angle as well as the position of his or her extremities and head and chest (specifically). The degree of detail is limited by several factors, including, for example, the number and position of transducers and training of the pattern recognition algorithm(s).

In addition to the use of transducers to determine the presence and location of occupants in a vehicle, other sensors could also be used. For example, a heartbeat sensor which determines the number and presence of heartbeat signals can also be arranged in the vehicle, which would thus also determine the number of occupants as the number of occupants would be equal to the number of heartbeat signals detected. Conventional heartbeat sensors can be adapted to differentiate between a heartbeat of an adult, a heartbeat of a child and a heartbeat of an animal. As its name implies, a heartbeat sensor detects a heartbeat, and the magnitude and/or frequency thereof, of a human occupant of the seat, if such a human occupant is present. The output of the heartbeat sensor is input to the processor of the interior monitoring system. One heartbeat sensor for use in the invention may be of the types as disclosed in McEwan (U.S. Pat. Nos. 5,573,012 and 5,766,208). The heartbeat sensor can be positioned at any convenient position relative to the seats where occupancy is being monitored. A preferred location is within the vehicle seatback.

An alternative way to determine the number of occupants is to monitor the weight being applied to the seats, i.e., each seating location, by arranging weight sensors at each seating location which might also be able to provide a weight distribution of an object on the seat. Analysis of the weight and/or weight distribution by a predetermined method can provide an indication of occupancy by a human, an adult or child, or an inanimate object.

Another type of sensor which is not believed to have been used in an interior monitoring system previously is a micropower impulse radar (MIR) sensor which determines motion of an occupant and thus can determine his or her heartbeat (as evidenced by motion of the chest). Such an MIR sensor can be arranged to detect motion in a particular area in which the occupant's chest would most likely be situated or could be coupled to an arrangement which determines the location of the occupant's chest and then adjusts the operational field of the MIR sensor based on the determined location of the occupant's chest. A motion sensor utilizing a micro-power impulse radar (MIR) system as disclosed, for example, in McEwan (U.S. Pat. No. 5,361,070), as well as many other patents by the same inventor.

Motion sensing is accomplished by monitoring a particular range from the sensor as disclosed in that patent. MIR is one form of radar which has applicability to occupant sensing and can be mounted at various locations in the vehicle. It has an advantage over ultrasonic sensors in that data can be acquired at a higher speed and thus the motion of an occupant can be more easily tracked. The ability to obtain returns over the entire occupancy range is somewhat more difficult than with ultrasound resulting in a more expensive system overall. MIR has additional advantages in lack of sensitivity to temperature variation and has a comparable resolution to about 40 kHz ultrasound. Resolution comparable to higher frequency ultrasound is also possible. Additionally, multiple MIR sensors can be used when high speed tracking of the motion of an occupant during a crash is required since they can be individually pulsed without interfering with each through time division multiplexing.

An alternative way to determine motion of the occupant(s) is to monitor the weight distribution of the occupant whereby changes in weight distribution after an accident would be highly suggestive of movement of the occupant. A system for determining the weight distribution of the occupants could be integrated or otherwise arranged in the seats such as the front seat 4 of the vehicle and several patents and publications describe such systems.

More generally, any sensor which determines the presence and health state of an occupant can also be integrated into the vehicle interior monitoring system in accordance with the invention. For example, a sensitive motion sensor can determine whether an occupant is breathing and a chemical sensor can determine the amount of carbon dioxide, or the concentration of carbon dioxide, in the air in the passenger compartment of the vehicle which can be correlated to the health state of the occupant(s). The motion sensor and chemical sensor can be designed to have a fixed operational field situated where the occupant's mouth is most likely to be located. In this manner, detection of carbon dioxide in the fixed operational field could be used as an indication of the presence of a human occupant in order to enable the determination of the number of occupants in the vehicle. In the alternative, the motion sensor and chemical sensor can be adjustable and adapted to adjust their operational field in conjunction with a determination by an occupant position and location sensor which would determine the location of specific parts of the occupant's body, e.g., his or her chest or mouth. Furthermore, an occupant position and location sensor can be used to determine the location of the occupant's eyes and determine whether the occupant is conscious, i.e., whether his or her eyes are open or closed or moving.

The use of chemical sensors can also be used to detect whether there is blood present in the vehicle, for example, after an accident. Additionally, microphones can detect whether there is noise in the vehicle caused by groaning, yelling, etc., and transmit any such noise through the cellular or other communication connection to a remote listening facility (such as operated by OnStar®).

In FIG. 3, a view of the system of FIG. 1 is illustrated with a box 28 shown on the front passenger seat in place of a rear facing child seat. The vehicle interior monitoring system is trained to recognize that this box 28 is neither a rear facing child seat nor an occupant and therefore it is treated as an empty seat and the deployment of the airbag or other occupant restraint device is suppressed. For other vehicles, it may be that just the presence of a box or its motion or chemical or radiation effluents that are desired to be monitored. The auto-tune antenna-based system 12, 14 is particularly adept at making this distinction particularly if the box 28 does not contain substantial amounts of water. Although a simple implementation of the auto-tune antenna system is illustrated, it is of course possible to use multiple antennas located in the seat 4 and elsewhere in the passenger compartment and these antenna systems can either operate at one or a multiple of different frequencies to discriminate type, location and/or relative size of the object being investigated. This training can be accomplished using a neural network or modular neural network with the commercially available software. The system assesses the probability that the box 28 is a person, however, and if there is even the remotest chance that it is a person, the airbag deployment is not suppressed. The system is thus typically biased toward enabling airbag deployment.

In cases where different levels of airbag inflation are possible, and there are different levels of injury associated with an out of position occupant being subjected to varying levels of airbag deployment, it is sometimes possible to permit a depowered or low level airbag deployment in cases of uncertainty. If, for example, the neural network has a problem distinguishing whether a box or a forward facing child seat is present on the vehicle seat, the decision can be made to deploy the airbag in a depowered or low level deployment state. Other situations where such a decision could be made would be when there is confusion as to whether a forward facing human is in position or out-of-position.

Neural networks systems frequently have problems in accurately discriminating the exact location of an occupant especially when different-sized occupants are considered. This results in a gray zone around the border of the keep out zone where the system provides a weak fire or weak no fire decision. For those cases, deployment of the airbag in a depowered state can resolve the situation since an occupant in a gray zone around the keep out zone boundary would be unlikely to be injured by such a depowered deployment while significant airbag protection is still being supplied.

Electromagnetic or ultrasonic energy can be transmitted in three modes in determining the position of an occupant, for example. In most of the cases disclosed above, it is assumed that the energy will be transmitted in a broad diverging beam which interacts with a substantial portion of the occupant or other object to be monitored. This method can have the disadvantage that it will reflect first off the nearest object and, especially if that object is close to the transmitter, it may mask the true position of the occupant or object. It can also reflect off many parts of the object where the reflections can be separated in time and processed as in an ultrasonic occupant sensing system. This can also be partially overcome through the use of the second mode which uses a narrow beam. In this case, several narrow beams are used. These beams are aimed in different directions toward the occupant from a position sufficiently away from the occupant or object such that interference is unlikely.

A single receptor could be used provided the beams are either cycled on at different times or are of different frequencies. Another approach is to use a single beam emanating from a location which has an unimpeded view of the occupant or object such as the windshield header in the case of an automobile or near the roof at one end of a trailer or shipping container, for example. If two spaced apart CCD array receivers are used, the angle of the reflected beam can be determined and the location of the occupant can be calculated. The third mode is to use a single beam in a manner so that it scans back and forth and/or up and down, or in some other pattern, across the occupant, object or the space in general. In this manner, an image of the occupant or object can be obtained using a single receptor and pattern recognition software can be used to locate the head or chest of the occupant or size of the object, for example. The beam approach is most applicable to electromagnetic energy but high frequency ultrasound can also be formed into a narrow beam.

A similar effect to modifying the wave transmission mode can also be obtained by varying the characteristics of the receptors. Through appropriate lenses or reflectors, receptors can be made to be most sensitive to radiation emitted from a particular direction. In this manner, a single broad beam transmitter can be used coupled with an array of focused receivers, or a scanning receiver, to obtain a rough image of the occupant or occupying object.

Figure 5:
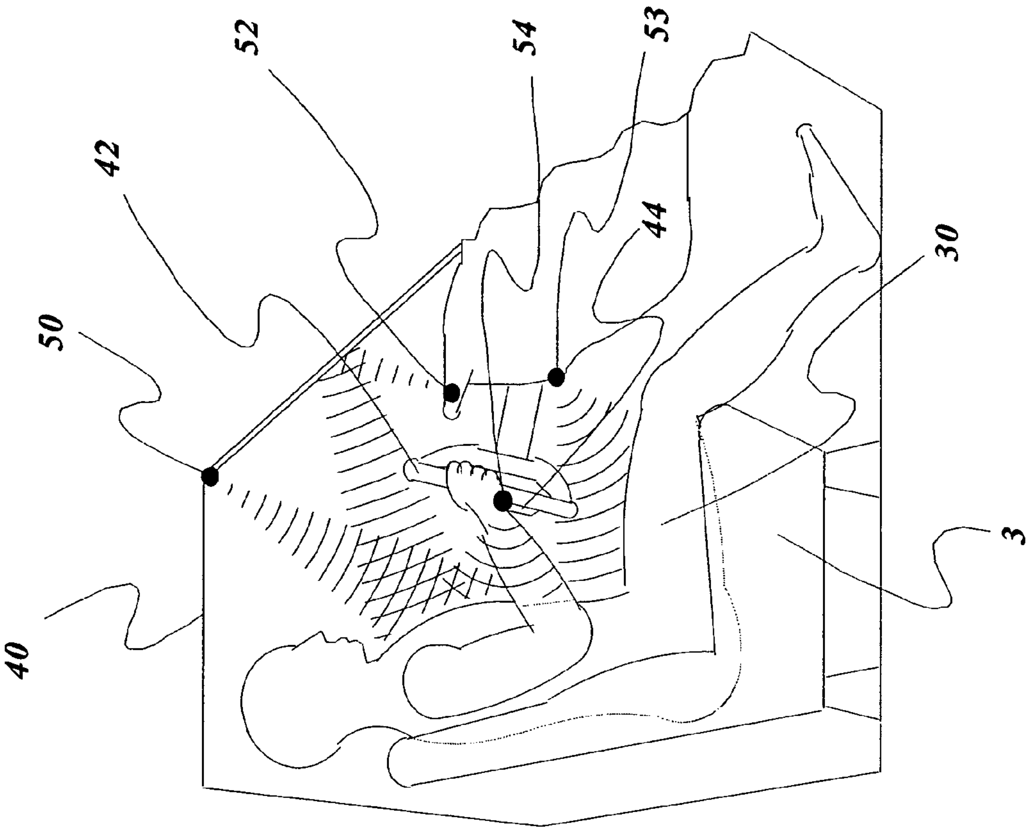
FIG. 5 is a side view, with certain portions removed or cut away, of a portion of the passenger compartment of a vehicle showing several preferred mounting locations of occupant position sensors for sensing the position of the vehicle driver.

Each of these methods of transmission or reception could be used, for example, at any of the preferred mounting locations shown in FIG. 5.

Figure 7:
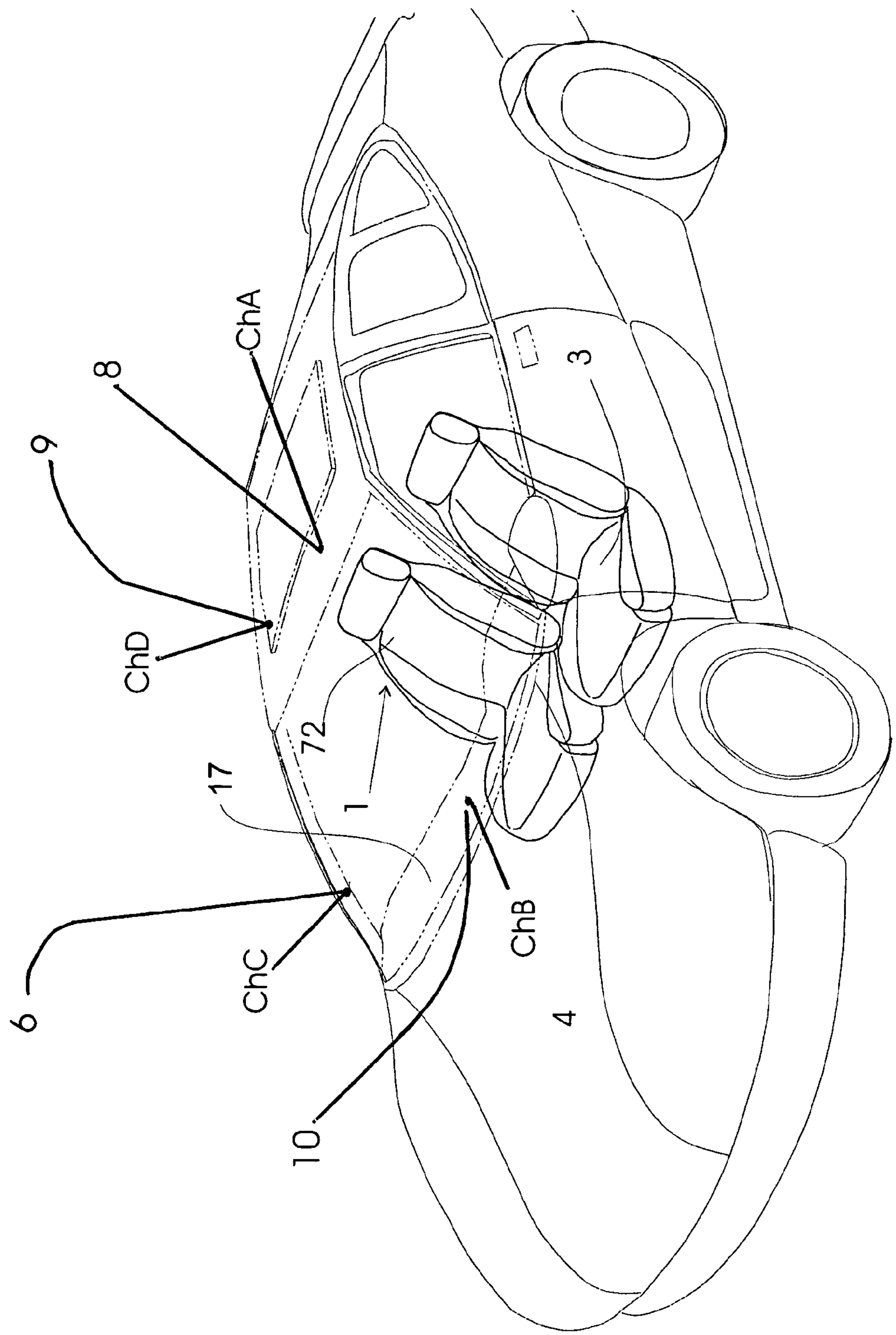
FIG. 7 is a perspective view of a vehicle showing the position of the ultrasonic or electromagnetic sensors relative to the driver and front passenger seats.

As shown in FIG. 7, there are provided four sets of wave-receiving sensor systems 6, 8, 9, 10 mounted within the passenger compartment of an automotive vehicle. Each set of sensor systems 6, 8, 9, 10 comprises a transmitter and a receiver (or just a receiver in some cases), which may be integrated into a single unit or individual components separated from one another. In this embodiment, the sensor system 6 is mounted on the A-Pillar of the vehicle. The sensor system 9 is mounted on the upper portion of the B-Pillar. The sensor system 8 is mounted on the roof ceiling portion or the headliner. The sensor system 10 is mounted near the middle of an instrument panel 17 in front of the driver's seat 3.

The sensor systems 6, 8, 9, 10 are preferably ultrasonic or electromagnetic, although sensor systems 6, 8, 9, 10 can be any other type of sensors which will detect the presence of an occupant from a distance including capacitive or electric field sensors. Also, if the sensor systems 6, 8, 9, 10 are passive infrared sensors, for example, then they may only comprise a wave-receiver. Recent advances in Quantum Well Infrared Photodetectors by NASA show great promise for this application. See "Many Applications Possible For Largest Quantum Infrared Detector", Goddard Space Center News Release Feb. 27, 2002.

The Quantum Well Infrared Photodetector is a new detector which promises to be a low-cost alternative to conventional infrared detector technology for a wide range of scientific and commercial applications, and particularly for sensing inside and outside of a vehicle. The main problem that needs to be solved is that it operates at 76 degrees Kelvin (−323 degrees F.). Chips are being developed capable of cooling other chips economically. It remains to be seen if these low temperatures can be economically achieved.

A section of the passenger compartment of an automobile is shown generally as 40 in FIGS. 8A-8D. A driver 30 of the vehicle sits on a seat 3 behind a steering wheel 42, which contains an airbag assembly 44. Airbag assembly 44 may be integrated into the steering wheel assembly or coupled to the steering wheel 42. Five transmitter and/or receiver assemblies 49, 50, 51, 52 and 54 are positioned at various places in the passenger compartment to determine the location of various parts of the driver, e.g., the head, chest and torso, relative to the airbag and to otherwise monitor the interior of the passenger compartment. Monitoring of the interior of the passenger compartment can entail detecting the presence or absence of the driver and passengers, differentiating between animate and inanimate objects, detecting the presence of occupied or unoccupied child seats, rear-facing or forward-facing, and identifying and ascertaining the identity of the occupying items in the passenger compartment. Naturally, a similar system can be used for monitoring the interior of a truck, shipping container or other containers.

A processor such as control circuitry 20 is connected to the transmitter/receiver assemblies 49, 50, 51, 52, 54 and controls the transmission from the transmitters, if a transmission component is present in the assemblies, and captures the return signals from the receivers, if a receiver component is present in the assemblies. Control circuitry 20 usually contains analog to digital converters (ADCs) or a frame grabber or equivalent, a microprocessor containing sufficient memory and appropriate software including, for example, pattern recognition algorithms, and other appropriate drivers, signal conditioners, signal generators, etc. Usually, in any given implementation, only three or four of the transmitter/receiver assemblies would be used depending on their mounting locations as described below. In some special cases, such as for a simple classification system, only a single or sometimes only two transmitter/receiver assemblies are used.

A portion of the connection between the transmitter/receiver assemblies 49, 50, 51, 52, 54 and the control circuitry 20, is shown as wires. These connections can be wires, either individual wires leading from the control circuitry 20 to each of the transmitter/receiver assemblies 49, 50, 51, 52, 54 or one or more wire buses or in some cases, wireless data transmission can be used.

The location of the control circuitry 20 in the dashboard of the vehicle is for illustration purposes only and does not limit the location of the control circuitry 20. Rather, the control circuitry 20 may be located anywhere convenient or desired in the vehicle.

It is contemplated that a system and method in accordance with the invention can include a single transmitter and multiple receivers, each at a different location. Thus, each receiver would not be associated with a transmitter forming transmitter/receiver assemblies. Rather, for example, with reference to FIG. 8A, only element 51 could constitute a transmitter/receiver assembly and elements 49, 50, 52 and 54 could be receivers only.

On the other hand, it is conceivable that in some implementations, a system and method in accordance with the invention include a single receiver and multiple transmitters. Thus, each transmitter would not be associated with a receiver forming transmitter/receiver assemblies. Rather, for example, with reference to FIG. 8A, only element 51 would constitute a transmitter/receiver assembly and elements 49, 50, 52, 54 would be transmitters only.

One ultrasonic transmitter/receiver as used herein is similar to that used on modern auto-focus cameras such as manufactured by the Polaroid Corporation. Other camera autofocusing systems use different technologies, which are also applicable here, to achieve the same distance to object determination. One camera system manufactured by Fuji of Japan, for example, uses a stereoscopic system which could also be used to determine the position of a vehicle occupant providing there is sufficient light available. In the case of insufficient light, a source of infrared light can be added to illuminate the driver. In a related implementation, a source of infrared light is reflected off of the windshield and illuminates the vehicle occupant. An infrared receiver 56 is located attached to the rear view mirror assembly 55, as shown in FIG. 8E. Alternately, the infrared can be sent by the device 50 and received by a receiver elsewhere. Since any of the devices shown in these figures could be either transmitters or receivers or both, for simplicity, only the transmitted and not the reflected wave fronts are frequently illustrated.

When using the surface of the windshield as a reflector of infrared radiation (for transmitter/receiver assembly and element 52), care must be taken to assure that the desired reflectivity at the frequency of interest is achieved. Mirror materials, such as metals and other special materials manufactured by Eastman Kodak, have a reflectivity for infrared frequencies that is substantially higher than at visible frequencies. They are thus candidates for coatings to be placed on the windshield surfaces for this purpose.

Figure 12A:
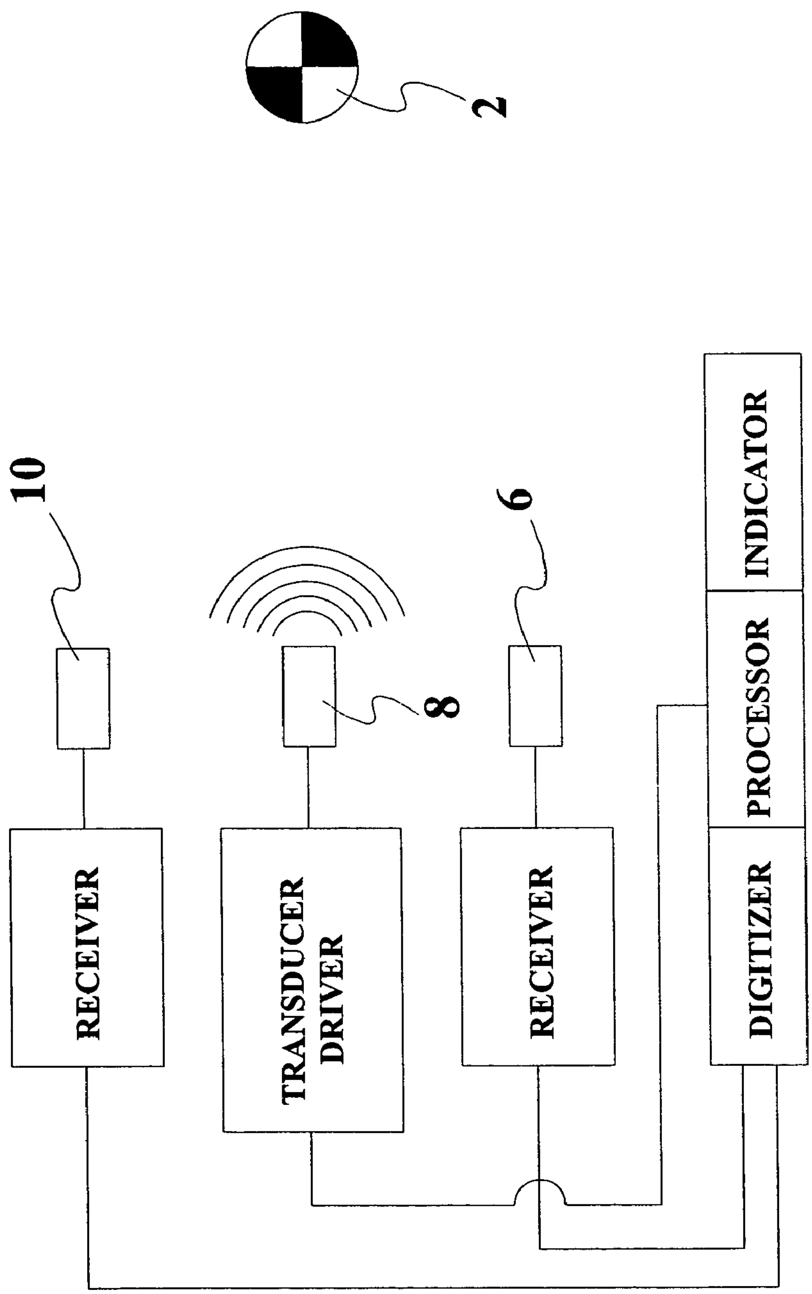
FIG. 12A is a functional block diagram of the ultrasonic imaging system illustrated in FIG. 1 using a microprocessor, DSP or field programmable gate array (FGPA). 12B is a functional block diagram of the ultrasonic imaging system illustrated in FIG. 1 using an application specific integrated circuit (ASIC).
Figure 12B:
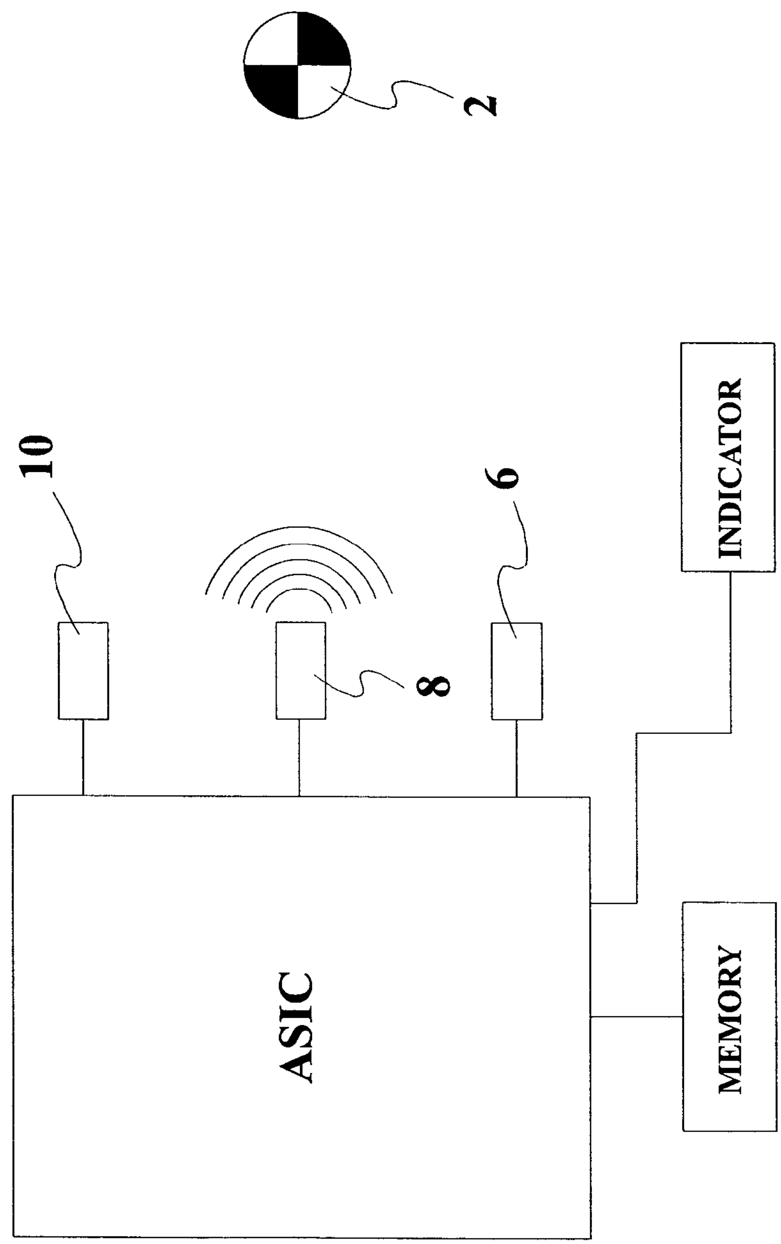

There are two preferred methods of implementing the vehicle interior monitoring system of at least one of the inventions disclosed herein, a microprocessor system and an application specific integrated circuit system (ASIC). Both of these systems are represented schematically as 20 herein. In some systems, both a microprocessor and an ASIC are used. In other systems, most if not all of the circuitry is combined onto a single chip (system on a chip). The particular implementation depends on the quantity to be made and economic considerations. A block diagram illustrating the microprocessor system is shown in FIG. 12A which shows the implementation of the system of FIG. 1. An alternate implementation of the FIG. 1 system using an ASIC is shown in FIG. 12B. In both cases, the target, which may be a rear facing child seat, is shown schematically as 2 and the three transducers as 6, 8, and 10. In the embodiment of FIG. 12A, there is a digitizer coupled to the receivers 6, 10 and the processor, and an indicator coupled to the processor. In the embodiment of FIG. 12B, there is a memory unit associated with the ASIC and also an indicator coupled to the ASIC.

The position of the occupant may be determined in various ways including by receiving and analyzing waves from a space in a passenger compartment of the vehicle occupied by the occupant, transmitting waves to impact the occupant, receiving waves after impact with the occupant and measuring time between transmission and reception of the waves, obtaining two or three-dimensional images of a passenger compartment of the vehicle occupied by the occupant and analyzing the images with an optional focusing of the images prior to analysis, or by moving a beam of radiation through a passenger compartment of the vehicle occupied by the occupant. The waves may be ultrasonic, radar, electromagnetic, passive infrared, and the like, and capacitive in nature. In the latter case, a capacitance or capacitive sensor may be provided. An electric field sensor could also be used.

Deployment of the airbag can be disabled when the determined position is too close to the airbag.

The rate at which the airbag is inflated and/or the time in which the airbag is inflated may be determined based on the determined position of the occupant.

Another method for controlling deployment of an airbag comprises the steps of determining the position of an occupant to be protected by deployment of the airbag and adjusting a threshold used in a sensor algorithm which enables or suppresses deployment of the airbag based on the determined position of the occupant. The probability that a crash requiring deployment of the airbag is occurring may be assessed and analyzed relative to the threshold whereby deployment of the airbag is enabled only when the assessed probability is greater than the threshold. The position of the occupant can be determined in any of the ways mentioned above.

A system for controlling deployment of an airbag comprises determining means for determining the position of an occupant to be protected by deployment of the airbag, sensor means for assessing the probability that a crash requiring deployment of the airbag is occurring, and circuit means coupled to the determining means, the sensor means and the airbag for enabling deployment of the airbag in consideration of the determined position of the occupant and the assessed probability that a crash is occurring. The circuit means are structured and arranged to analyze the assessed probability relative to a pre-determined threshold whereby deployment of the airbag is enabled only when the assessed probability is greater than the threshold. Further, the circuit means are arranged to adjust the threshold based on the determined position of the occupant. The determining means may any of the determining systems discussed above.

One method for controlling deployment of an airbag comprises a crash sensor for providing information on a crash involving the vehicle, a position determining arrangement for determining the position of an occupant to be protected by deployment of the airbag and a circuit coupled to the airbag, the crash sensor and the position determining arrangement and arranged to issue a deployment signal to the airbag to cause deployment of the airbag. The circuit is arranged to consider a deployment threshold which varies based on the determined position of the occupant. Further, the circuit is arranged to assess the probability that a crash requiring deployment of the airbag is occurring and analyze the assessed probability relative to the threshold whereby deployment of the airbag is enabled only when the assessed probability is greater than the threshold.

In another implementation, the sensor algorithm may determine the rate that gas is generated to affect the rate that the airbag is inflated. In all of these cases the position of the occupant is used to affect the deployment of the airbag either as to whether or not it should be deployed at all, the time of deployment or as to the rate of inflation.

1.1 Ultrasonics 1.1.1 General

The maximum acoustic frequency that is practical to use for acoustic imaging in the systems is about 40 to 160 kilohertz (kHz). The wavelength of a 50 kHz acoustic wave is about 0.6 cm which is too coarse to determine the fine features of a person's face, for example. It is well understood by those skilled in the art that features which are much smaller than the wavelength of the irradiating radiation cannot be distinguished. Similarly, the wavelength of common radar systems varies from about 0.9 cm (for 33 GHz K band) to 133 cm (for 225 MHz P band) which are also too coarse for person-identification systems.

Referring now to FIGS. 5 and 13-17, a section of the passenger compartment of an automobile is shown generally as 40 in FIG. 5. A driver of a vehicle 30 sits on a seat 3 behind a steering wheel 42 which contains an airbag assembly 44. Four transmitter and/or receiver assemblies 50, 52, 53 and 54 are positioned at various places in or around the passenger compartment to determine the location of the head, chest and torso of the driver 30 relative to the airbag assembly 44. Usually, in any given implementation, only one or two of the transmitters and receivers would be used depending on their mounting locations as described below.

FIG. 5 illustrates several of the possible locations of such devices. For example, transmitter and receiver 50 emits ultrasonic acoustical waves which bounce off the chest of the driver 30 and return. Periodically, a burst of ultrasonic waves at about 50 kilohertz is emitted by the transmitter/receiver and then the echo, or reflected signal, is detected by the same or different device. An associated electronic circuit measures the time between the transmission and the reception of the ultrasonic waves and determines the distance from the transmitter/receiver to the driver 30 based on the velocity of sound. This information can then be sent to a microprocessor that can be located in the crash sensor and diagnostic circuitry which determines if the driver 30 is close enough to the airbag assembly 44 that a deployment might, by itself, cause injury to the driver 30. In such a case, the circuit disables the airbag system and thereby prevents its deployment. In an alternate case, the sensor algorithm assesses the probability that a crash requiring an airbag is in process and waits until that probability exceeds an amount that is dependent on the position of the driver 30. Thus, for example, the sensor might decide to deploy the airbag based on a need probability assessment of 50%, if the decision must be made immediately for a driver 30 approaching the airbag, but might wait until the probability rises to 95% for a more distant driver. Although a driver system has been illustrated, the passenger system would be similar.

Alternate mountings for the transmitter/receiver include various locations on the instrument panel on either side of the steering column such as 53 in FIG. 5. Also, although some of the devices herein illustrated assume that for the ultrasonic system, the same device is used for both transmitting and receiving waves, there are advantages in separating these functions, at least for standard transducer systems. Since there is a time lag required for the system to stabilize after transmitting a pulse before it can receive a pulse, close measurements are enhanced, for example, by using separate transmitters and receivers. In addition, if the ultrasonic transmitter and receiver are separated, the transmitter can transmit continuously, provided the transmitted signal is modulated such that the received signal can be compared with the transmitted signal to determine the time it takes for the waves to reach and reflect off of the occupant.

Many methods exist for this modulation including varying the frequency or amplitude of the waves or pulse modulation or coding. In all cases, the logic circuit which controls the sensor and receiver must be able to determine when the signal which was most recently received was transmitted. In this manner, even though the time that it takes for the signal to travel from the transmitter to the receiver, via reflection off of the occupant or other object to be monitored, may be several milliseconds, information as to the position of the occupant is received continuously which permits an accurate, although delayed, determination of the occupant's velocity from successive position measurements. Other modulation methods that may be applied to electromagnetic radiations include TDMA, CDMA, noise or pseudo-noise, spatial, etc.

Conventional ultrasonic distance measuring devices must wait for the signal to travel to the occupant or other monitored object and return before a new signal is sent. This greatly limits the frequency at which position data can be obtained to the formula where the frequency is equal to the velocity of sound divided by two times the distance to the occupant. For example, if the velocity of sound is taken at about 1000 feet per second, occupant position data for an occupant or object located one foot from the transmitter can only be obtained every 2 milliseconds which corresponds to a frequency of about 500 Hz. At a three-foot displacement and allowing for some processing time, the frequency is closer to about 100 Hz.

This slow frequency that data can be collected seriously degrades the accuracy of the velocity calculation. The reflection of ultrasonic waves from the clothes of an occupant or the existence of thermal gradients, for example, can cause noise or scatter in the position measurement and lead to significant inaccuracies in a given measurement. When many measurements are taken more rapidly, as in the technique described here, these inaccuracies can be averaged and a significant improvement in the accuracy of the velocity calculation results.

The determination of the velocity of the occupant need not be derived from successive distance measurements. A potentially more accurate method is to make use of the Doppler Effect where the frequency of the reflected waves differs from the transmitted waves by an amount which is proportional to the occupant's velocity. In one embodiment, a single ultrasonic transmitter and a separate receiver are used to measure the position of the occupant, by the travel time of a known signal, and the velocity, by the frequency shift of that signal. Although the Doppler Effect has been used to determine whether an occupant has fallen asleep, it has not previously been used in conjunction with a position measuring device to determine whether an occupant is likely to become out of position, i.e., an extrapolated position in the future based on the occupant's current position and velocity as determined from successive position measurements, and thus in danger of being injured by a deploying airbag, or that a monitored object is moving. This combination is particularly advantageous since both measurements can be accurately and efficiently determined using a single transmitter and receiver pair resulting in a low cost system.

One problem with Doppler measurements is the slight change in frequency that occurs during normal occupant velocities. This requires that sophisticated electronic techniques and a low Q receiver should be utilized to increase the frequency and thereby render it easier to measure the velocity using the phase shift. For many implementations, therefore, the velocity of the occupant is determined by calculating the difference between successive position measurements.

The following discussion will apply to the case where ultrasonic sensors are used although a similar discussion can be presented relative to the use of electromagnetic sensors such as active infrared sensors, taking into account the differences in the technologies. Also, the following discussion will relate to an embodiment wherein the seat is the front passenger seat, although a similar discussion can apply to other vehicles and monitoring situations.

Figure 9:
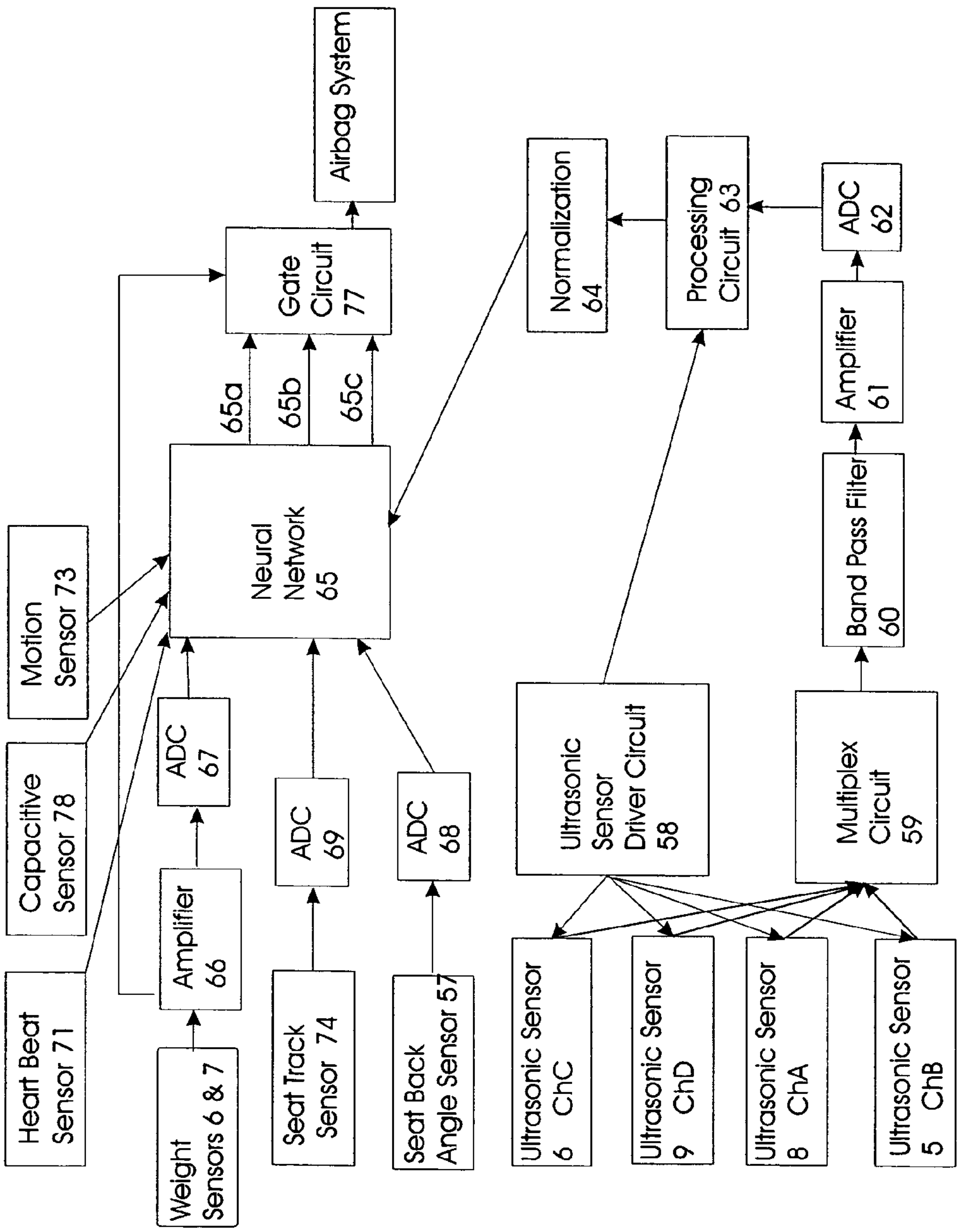
FIG. 9 is a circuit diagram of the seated-state detecting unit of the present invention.

The ultrasonic or electromagnetic sensor systems, 6, 8, 9 and 10 in FIG. 7 can be controlled or driven, one at a time or simultaneously, by an appropriate driver circuit such as ultrasonic or electromagnetic sensor driver circuit 58 shown in FIG. 9. The transmitters of the ultrasonic or electromagnetic sensor systems 6, 8, 9 and 10 transmit respective ultrasonic or electromagnetic waves toward the seat 4 and transmit pulses (see FIG. 10(*c*)) in sequence at times t1, t2, t3 and t4 (t4>t3>t2>t1) or simultaneously (t1=t2=t3=t4). The reflected waves of the ultrasonic or electromagnetic waves are received by the receivers ChA-ChD of the ultrasonic or electromagnetic sensors 6, 8, 9 and 10. The receiver ChA is associated with the ultrasonic or electromagnetic sensor system 8, the receiver ChB is associated with the ultrasonic or electromagnetic sensor system 5, the receiver ChD is associated with the ultrasonic or electromagnetic sensor system 6, and the receiver ChD is associated with the ultrasonic or electromagnetic sensor system 9.

Figures 10A, 10B, 10C:
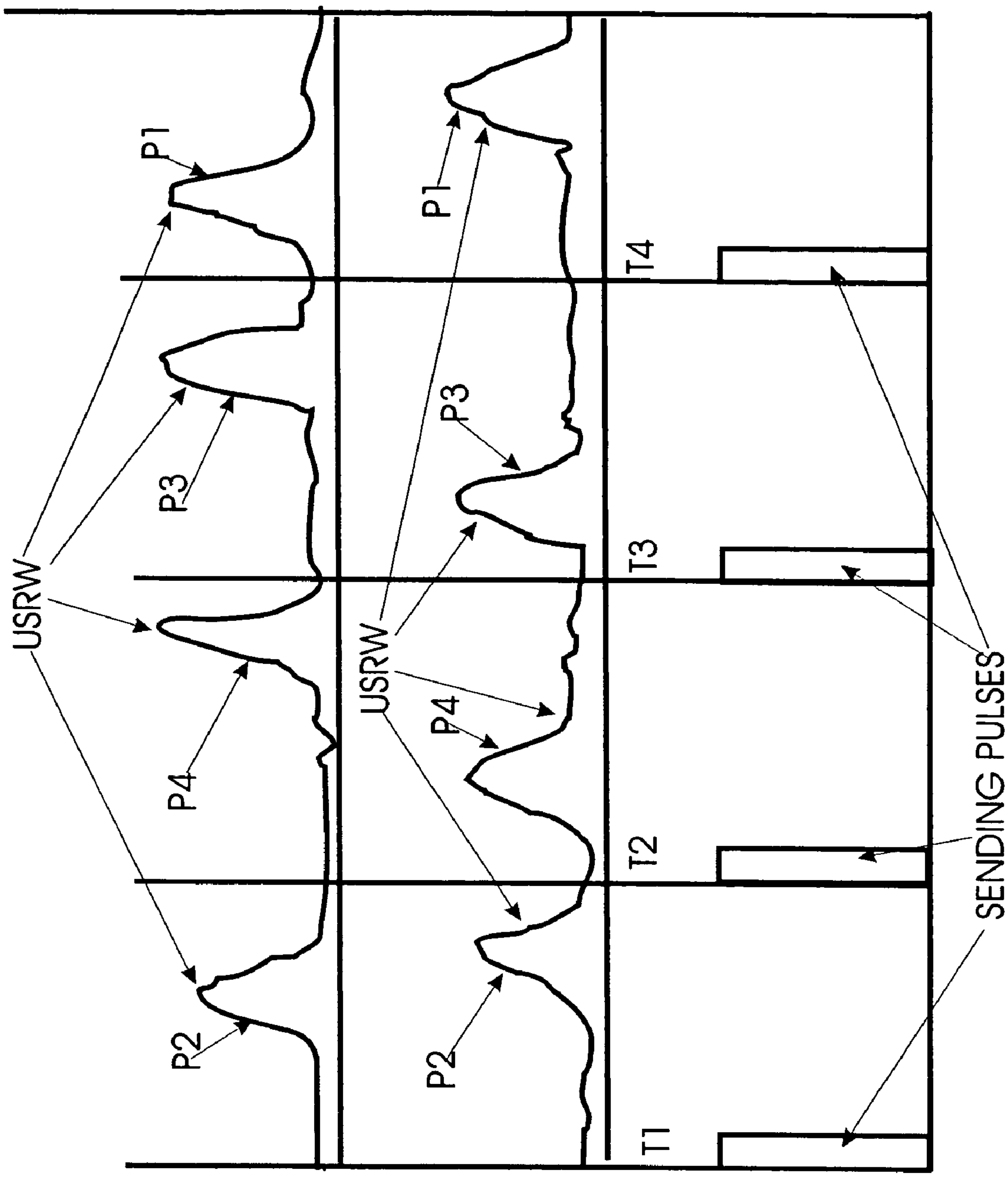
FIGS. 10(*a*), 10(*b*) and 10(*c*) are each a diagram showing the configuration of the reflected waves of an ultrasonic wave transmitted from each transmitter of the ultrasonic sensors toward the passenger seat, obtained within the time that the reflected wave arrives at a receiver, FIG. 10(*a*) showing an example of the reflected waves obtained when a passenger is in a normal seated-state, FIG. 10(*b*) showing an example of the reflected waves obtained when a passenger is in an abnormal seated-state (where the passenger is seated too close to the instrument panel), and FIG. 10(*c*) showing a transmit pulse.

FIGS. 10(*a*) and 10(*b*) show examples of the reflected ultrasonic waves USRW that are received by receivers ChA-ChD. FIG. 10(*a*) shows an example of the reflected wave USRW that is obtained when an adult sits in a normally seated space on the passenger seat 4, while FIG. 10(*b*) shows an example of the reflected wave USRW that are obtained when an adult sits in a slouching state (one of the abnormal seated-states) in the passenger seat 4.

Figure 6:
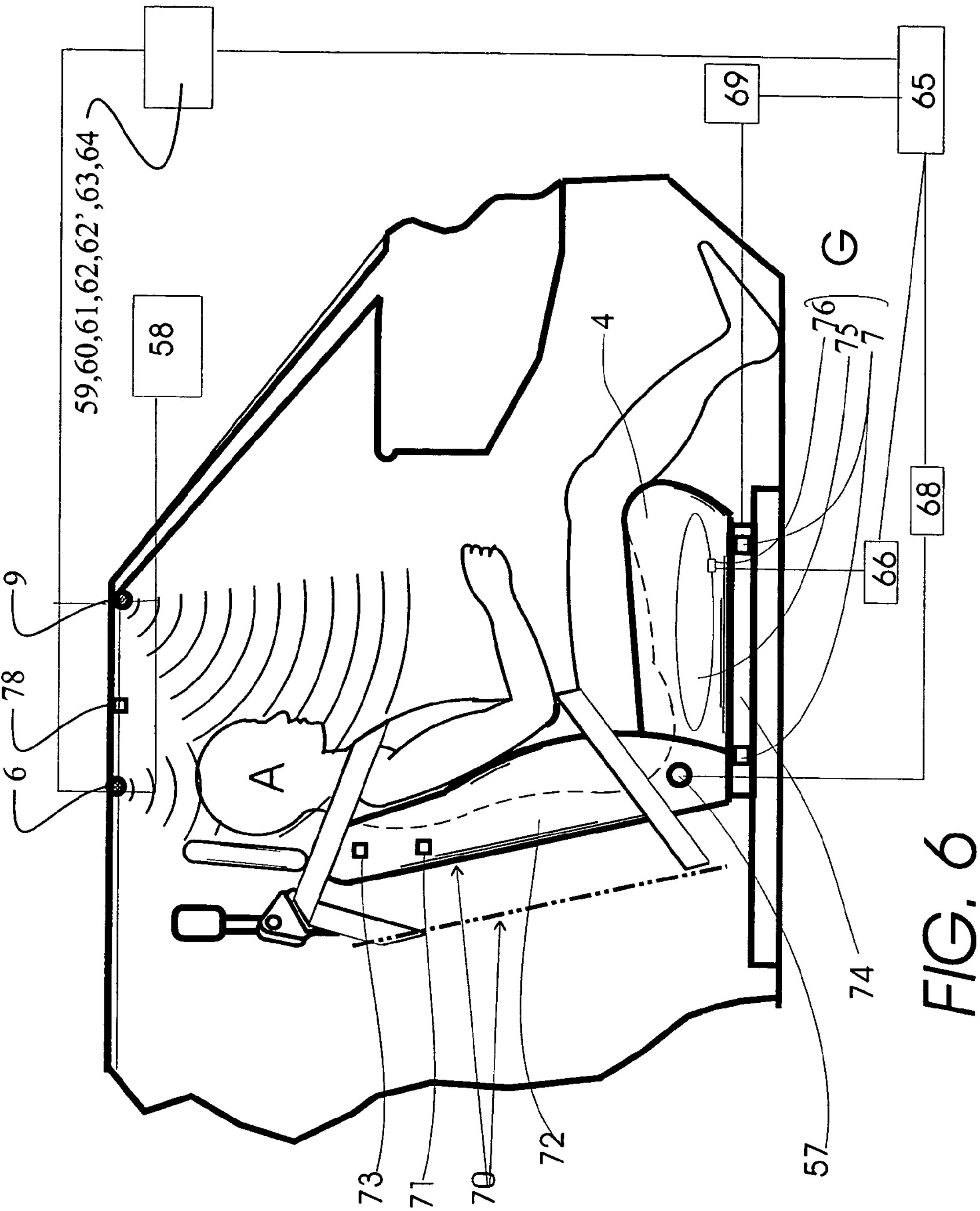
FIG. 6 shows a seated-state detecting unit in accordance with the present invention and the connections between ultrasonic or electromagnetic sensors, a weight sensor, a reclining angle detecting sensor, a seat track position detecting sensor, a heartbeat sensor, a motion sensor, a neural network, and an airbag system installed within a vehicle compartment.

In the case of a normally seated passenger, as shown in FIGS. 6 and 7, the location of the ultrasonic sensor system 6 is closest to the passenger A. Therefore, the reflected wave pulse P1 is received earliest after transmission by the receiver ChD as shown in FIG. 10(*a*), and the width of the reflected wave pulse P1 is larger. Next, the distance from the ultrasonic sensor 8 is closer to the passenger A, so a reflected wave pulse P2 is received earlier by the receiver ChA compared with the remaining reflected wave pulses P3 and P4. Since the reflected wave pauses P3 and P4 take more time than the reflected wave pulses P1 and P2 to arrive at the receivers ChC and ChB, the reflected wave pulses P3 and P4 are received as the timings shown in FIG. 10(*a*). More specifically, since it is believed that the distance from the ultrasonic sensor system 6 to the passenger A is slightly shorter than the distance from the ultrasonic sensor system 10 to the passenger A, the reflected wave pulse P3 is received slightly earlier by the receiver ChC than the reflected wave pulse P4 is received by the receiver ChB.

In the case where the passenger A is sitting in a slouching state in the passenger seat 4, the distance between the ultrasonic sensor system 6 and the passenger A is shortest. Therefore, the time from transmission at time t3 to reception is shortest, and the reflected wave pulse P3 is received by the receiver ChC, as shown in FIG. 10(*b*). Next, the distances between the ultrasonic sensor system 10 and the passenger A becomes shorter, so the reflected wave pulse P4 is received earlier by the receiver ChB than the remaining reflected wave pulses P2 and P1. When the distance from the ultrasonic sensor system 8 to the passenger A is compared with that from the ultrasonic sensor system 9 to the passenger A, the distance from the ultrasonic sensor system 8 to the passenger A becomes shorter, so the reflected wave pulse P2 is received by the receiver ChA first and the reflected wave pulse P1 is thus received last by the receiver ChD.

The configurations of the reflected wave pulses P1-P4, the times that the reflected wave pulses P1-P4 are received, the sizes of the reflected wave pulses P1-P4 are varied depending upon the configuration and position of an object such as a passenger situated on the front passenger seat 4. FIGS. 10(*a*) and (*b*) merely show examples for the purpose of description and therefore the present invention is not limited to these examples.

The outputs of the receivers ChA-ChD, as shown in FIG. 9, are input to a band pass filter 60 through a multiplex circuit 59 which is switched in synchronization with a timing signal from the ultrasonic sensor drive circuit 58. The band pass filter 60 removes a low frequency wave component from the output signal based on each of the reflected wave USRW and also removes some of the noise. The output signal based on each of the reflected wave USRW is passed through the band pass filter 60, then is amplified by an amplifier 61. The amplifier 61 also removes the high frequency carrier wave component in each of the reflected waves USRW and generates an envelope wave signal. This envelope wave signal is input to an analog/digital converter (ADC) 62 and digitized as measured data. The measured data is input to a processing circuit 63, which is controlled by the timing signal which is in turn output from the ultrasonic sensor drive circuit 58.

The processing circuit 63 collects measured data at intervals of 7 ms (or at another time interval with the time interval also being referred to as a time window or time period), and 47 data points are generated for each of the ultrasonic sensor systems 6, 8, 9 and 10. For each of these reflected waves USRW, the initial reflected wave portion T1 and the last reflected wave portion T2 are cut off or removed in each time window. The reason for this will be described when the training procedure of a neural network is described later, and the description is omitted for now. With this, 32, 31, 37 and 38 data points will be sampled by the ultrasonic sensor systems 6, 8, 9 and 10, respectively. The reason why the number of data points differs for each of the ultrasonic sensor systems 6, 8, 9 and 10 is that the distance from the passenger seat 4 to the ultrasonic sensor systems 6, 8, 9 and 10 differ from one another.

Each of the measured data is input to a normalization circuit 64 and normalized. The normalized measured data is input to the neural network 65 as wave data.

A comprehensive occupant sensing system will now be discussed which involves a variety of different sensors, again this is for illustration purposes only and a similar description can be constructed for other vehicles including shipping container and truck trailer monitoring. Many of these sensors will be discussed in more detail under the appropriate sections below. FIG. 6 shows a passenger seat 70 to which an adjustment apparatus including a seated-state detecting unit according to the present invention may be applied. The seat 70 includes a horizontally situated bottom seat portion 4 and a vertically oriented back portion 72. The seat portion 4 is provided with one or more pressure or weight sensors 7, 76 that determine the weight of the object occupying the seat or the pressure applied by the object to the seat. The coupled portion between the seated portion 4 and the back portion 72 is provided with a reclining angle detecting sensor 57, which detects the tilted angle of the back portion 72 relative to the seat portion 4. The seat portion 4 is provided with a seat track position-detecting sensor 74. The seat track position detecting sensor 74 detects the quantity of movement of the seat portion 4 which is moved from a back reference position, indicated by the dotted chain line. Optionally embedded within the back portion 72 are a heartbeat sensor 71 and a motion sensor 73. Attached to the headliner is a capacitance sensor 78. The seat 70 may be the driver seat, the front passenger seat or any other seat in a motor vehicle as well as other seats in transportation vehicles or seats in non-transportation applications.

Pressure or weight measuring means such as the sensors 7 and 76 are associated with the seat, e.g., mounted into or below the seat portion 4 or on the seat structure, for measuring the pressure or weight applied onto the seat. The pressure or weight may be zero if no occupying item is present and the sensors are calibrated to only measure incremental weight or pressure. Sensors 7 and 76 may represent a plurality of different sensors which measure the pressure or weight applied onto the seat at different portions thereof or for redundancy purposes, e.g., such as by means of an airbag or fluid filled bladder 75 in the seat portion 4. Airbag or bladder 75 may contain a single or a plurality of chambers, each of which may be associated with a sensor (transducer) 76 for measuring the pressure in the chamber. Such sensors may be in the form of strain, force or pressure sensors which measure the force or pressure on the seat portion 4 or seat back 72, a part of the seat portion 4 or seat back 72, displacement measuring sensors which measure the displacement of the seat surface or the entire seat 70 such as through the use of strain gages mounted on the seat structural members, such as 7, or other appropriate locations, or systems which convert displacement into a pressure wherein one or more pressure sensors can be used as a measure of weight and/or weight distribution. Sensors 7, 76 may be of the types disclosed in U.S. Pat. No. 6,242,701 and below herein. Although pressure or weight here is disclosed and illustrated with regard to measuring the pressure applied by or weight of an object occupying a seat in an automobile or truck, the same principles can be used to measure the pressure applied by and weight of objects occupying other vehicles including truck trailers and shipping containers. For example, a series of fluid filled bladders under a segmented floor could be used to measure the weight and weight distribution in a truck trailer.

Many practical problems have arisen during the development stages of bladder and strain gage based weight systems. Some of these problems relate to bladder sensors and in particular to gas-filled bladder sensors and are effectively dealt with in U.S. Pat. Nos. 5,918,696, 5,927,427, 5,957,491, 5,979,585, 5,984,349, 6,021,863, 6,056,079, 6,076,853, 6,260,879 and 6,286,861. Other problems relate to seatbelt usage and to unanticipated stresses and strains that occur in seat mounting structures and will be discussed below.

As illustrated in FIG. 9, the output of the pressure or weight sensor(s) 7 and 76 is amplified by an amplifier 66 coupled to the pressure or weight sensor(s) 7,76 and the amplified output is input to the analog/digital converter 67.

A heartbeat sensor 71 is arranged to detect a heartbeat, and the magnitude thereof, of a human occupant of the seat, if such a human occupant is present. The output of the heartbeat sensor 71 is input to the neural network 65. The heartbeat sensor 71 may be of the type as disclosed in McEwan (U.S. Pat. Nos. 5,573,012 and 5,766,208). The heartbeat sensor 71 can be positioned at any convenient position relative to the seat 4 where occupancy is being monitored. A preferred location is within the vehicle seatback. The heartbeat of a stowaway in a cargo container or truck trailer can similarly be measured be a sensor on the vehicle floor or other appropriate location that measures vibrations.

The reclining angle detecting sensor 57 and the seat track position-detecting sensor 74, which each may comprise a variable resistor, can be connected to constant-current circuits, respectively. A constant-current is supplied from the constant-current circuit to the reclining angle detecting sensor 57, and the reclining angle detecting sensor 57 converts a change in the resistance value on the tilt of the back portion 72 to a specific voltage. This output voltage is input to an analog/digital converter 68 as angle data, i.e., representative of the angle between the back portion 72 and the seat portion 4. Similarly, a constant current can be supplied from the constant-current circuit to the seat track position-detecting sensor 74 and the seat track position detecting sensor 74 converts a change in the resistance value based on the track position of the seat portion 4 to a specific voltage. This output voltage is input to an analog/digital converter 69 as seat track data. Thus, the outputs of the reclining angle-detecting sensor 57 and the seat track position-detecting sensor 74 are input to the analog/digital converters 68 and 69, respectively. Each digital data value from the ADCs 68, 69 is input to the neural network 65. Although the digitized data of the pressure or weight sensor(s) 7, 76 is input to the neural network 65, the output of the amplifier 66 is also input to a comparison circuit. The comparison circuit, which is incorporated in the gate circuit algorithm, determines whether or not the weight of an object on the passenger seat 70 is more than a predetermined weight, such as 60 lbs., for example. When the weight is more than 60 lbs., the comparison circuit outputs a logic 1 to the gate circuit to be described later. When the weight of the object is less than 60 lbs., a logic 0 is output to the gate circuit. A more detailed description of this and similar systems can be found in the above-referenced patents and patent applications assigned to the current assignee and in the description below. The system described above is one example of many systems that can be designed using the teachings of at least one of the inventions disclosed herein for detecting the occupancy state of the seat of a vehicle.

Figure 18:
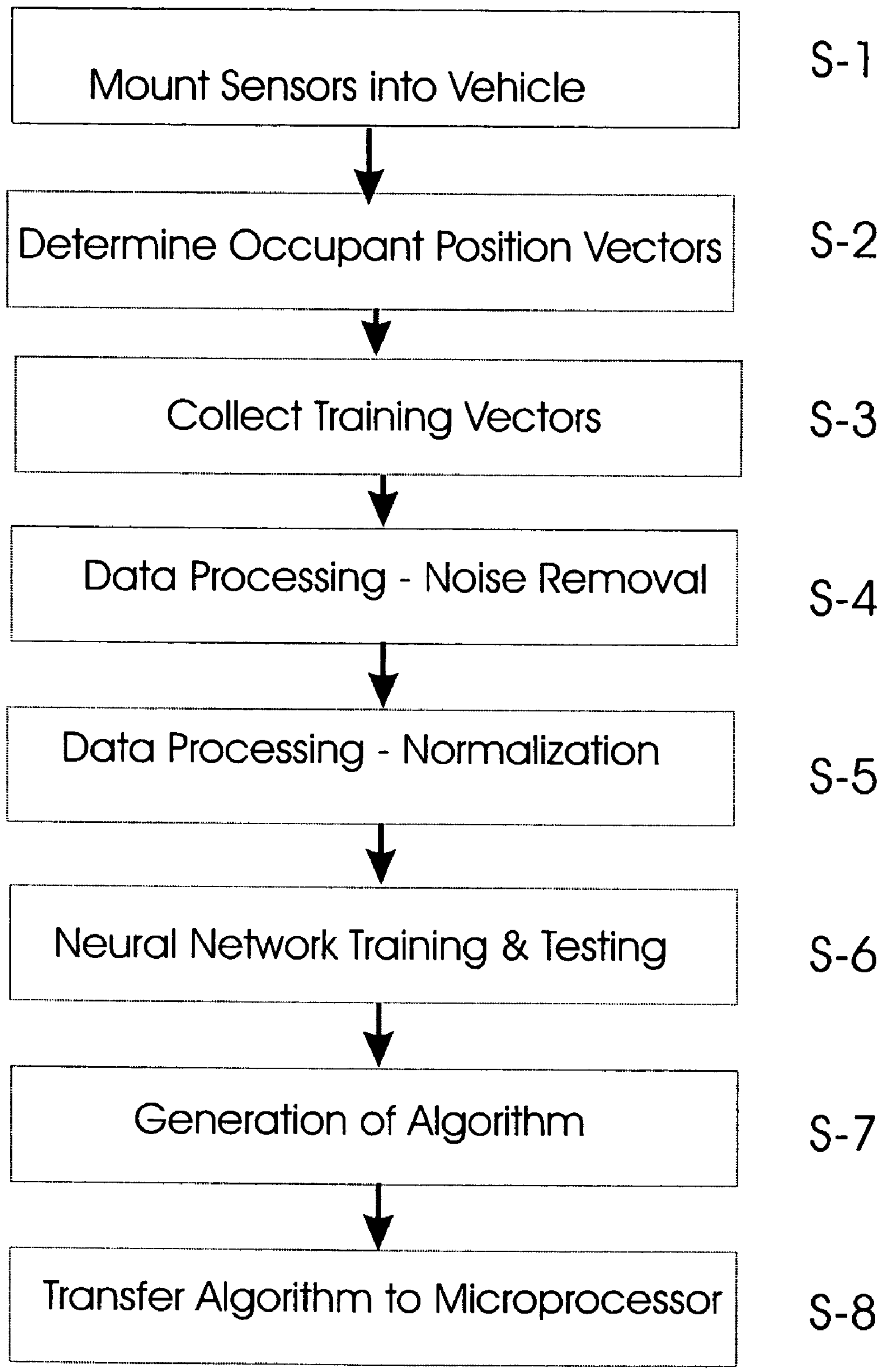
FIG. 18 a flowchart showing the training steps of a neural network.

As diagrammed in FIG. 18, the first step is to mount the four sets of ultrasonic sensor systems 11-14, the weight sensors 7,76, the reclining angle detecting sensor 57, and the seat track position detecting sensor 74, for example, into a vehicle (step S1). For other vehicle monitoring tasks different sets of sensors could be used. Next, in order to provide data for the neural network 65 to learn the patterns of seated states, data is recorded for patterns of all possible seated or occupancy states and a list is maintained recording the seated or occupancy states for which data was acquired. The data from the sensors/transducers 6, 8, 9, 10, 57, 71, 73, 74, 76 and 78 for a particular occupancy of the passenger seat, for example, is called a vector (step S2). It should be pointed out that the use of the reclining angle detecting sensor 57, seat track position detecting sensor 74, heartbeat sensor 71, capacitive sensor 78 and motion sensor 73 is not essential to the detecting apparatus and method in accordance with the invention. However, each of these sensors, in combination with any one or more of the other sensors enhances the evaluation of the seated-state of the seat or the occupancy of the vehicle.

Figure 11:
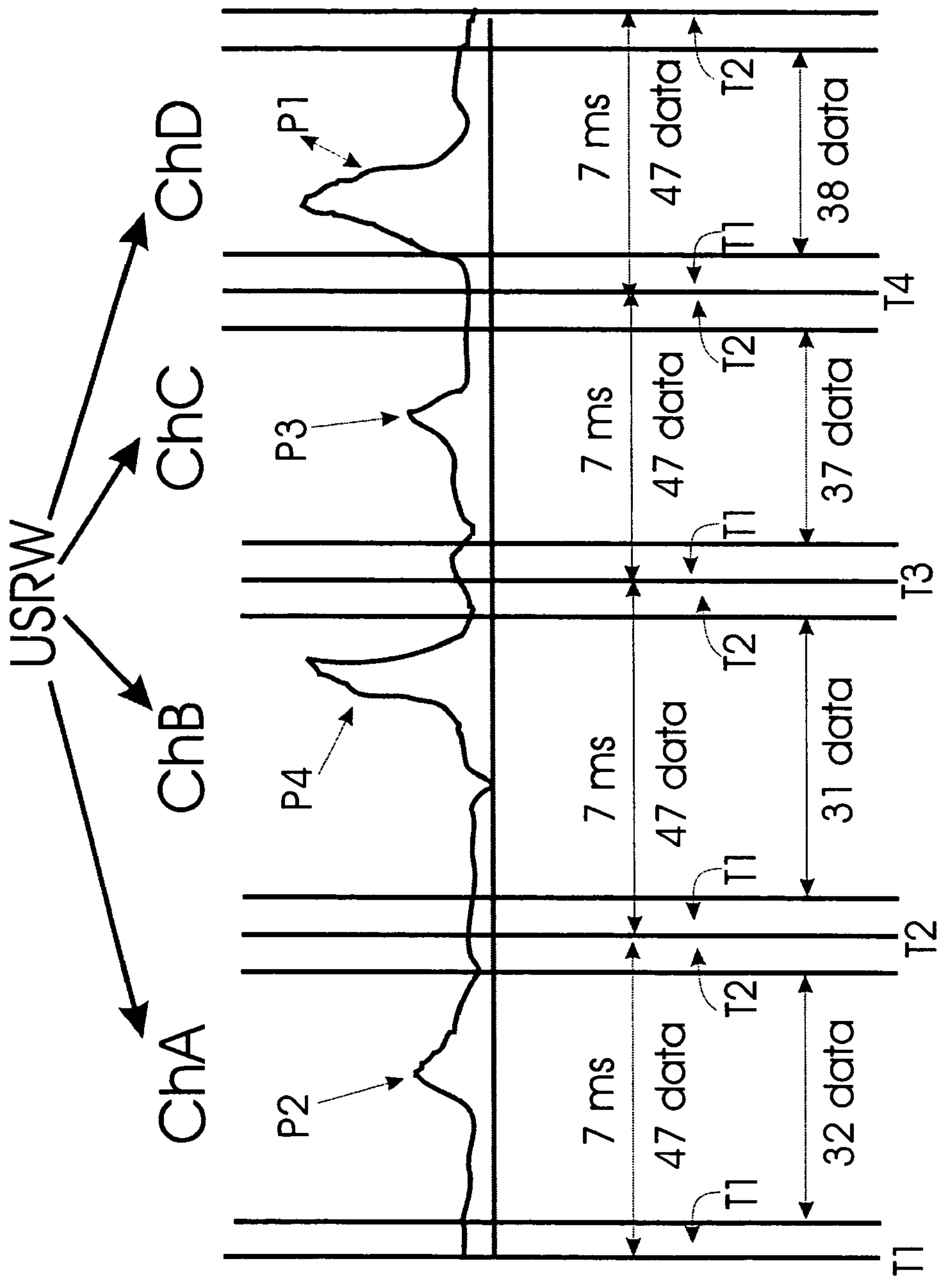
FIG. 11 is a diagram of the data processing of the reflected waves from the ultrasonic or electromagnetic sensors.

Next, based on the training data from the reflected waves of the ultrasonic sensor systems 6, 8, 9, 10 and the other sensors 7, 71, 73, 76, 78 the vector data is collected (step S3). Next, the reflected waves P1-P4 are modified by removing the initial reflected waves from each time window with a short reflection time from an object (range gating) (period T1 in FIG. 11) and the last portion of the reflected waves from each time window with a long reflection time from an object (period P2 in FIG. 11) (step S4). It is believed that the reflected waves with a short reflection time from an object is due to cross-talk, that is, waves from the transmitters which leak into each of their associated receivers ChA-ChD. It is also believed that the reflected waves with a long reflection time are reflected waves from an object far away from the passenger seat or from multipath reflections. If these two reflected wave portions are used as data, they will add noise to the training process. Therefore, these reflected wave portions are eliminated from the data.

Recent advances in ultrasonic transducer design have now permitted the use of a single transducer acting as both a sender (transmitter) and receiver. These same advances have substantially reduced the ringing of the transducer after the excitation pulse has been caused to die out to where targets as close as about 2 inches from the transducer can be sensed. Thus, the magnitude of the T1 time period has been substantially reduced.

As shown in FIG. 19(*a*), the measured data is normalized by making the peaks of the reflected wave pulses P1-P4 equal (step S5). This eliminates the effects of different reflectivities of different objects and people depending on the characteristics of their surfaces such as their clothing. Data from the weight sensor, seat track position sensor and seat reclining angle sensor is also frequently normalized based typically on fixed normalization parameters. When other sensors are used for other types of monitoring, similar techniques are used.

The data from the ultrasonic transducers are now also preferably fed through a logarithmic compression circuit that substantially reduces the magnitude of reflected signals from high reflectivity targets compared to those of low reflectivity. Additionally, a time gain circuit is used to compensate for the difference in sonic strength received by the transducer based on the distance of the reflecting object from the transducer.

Figure 20:
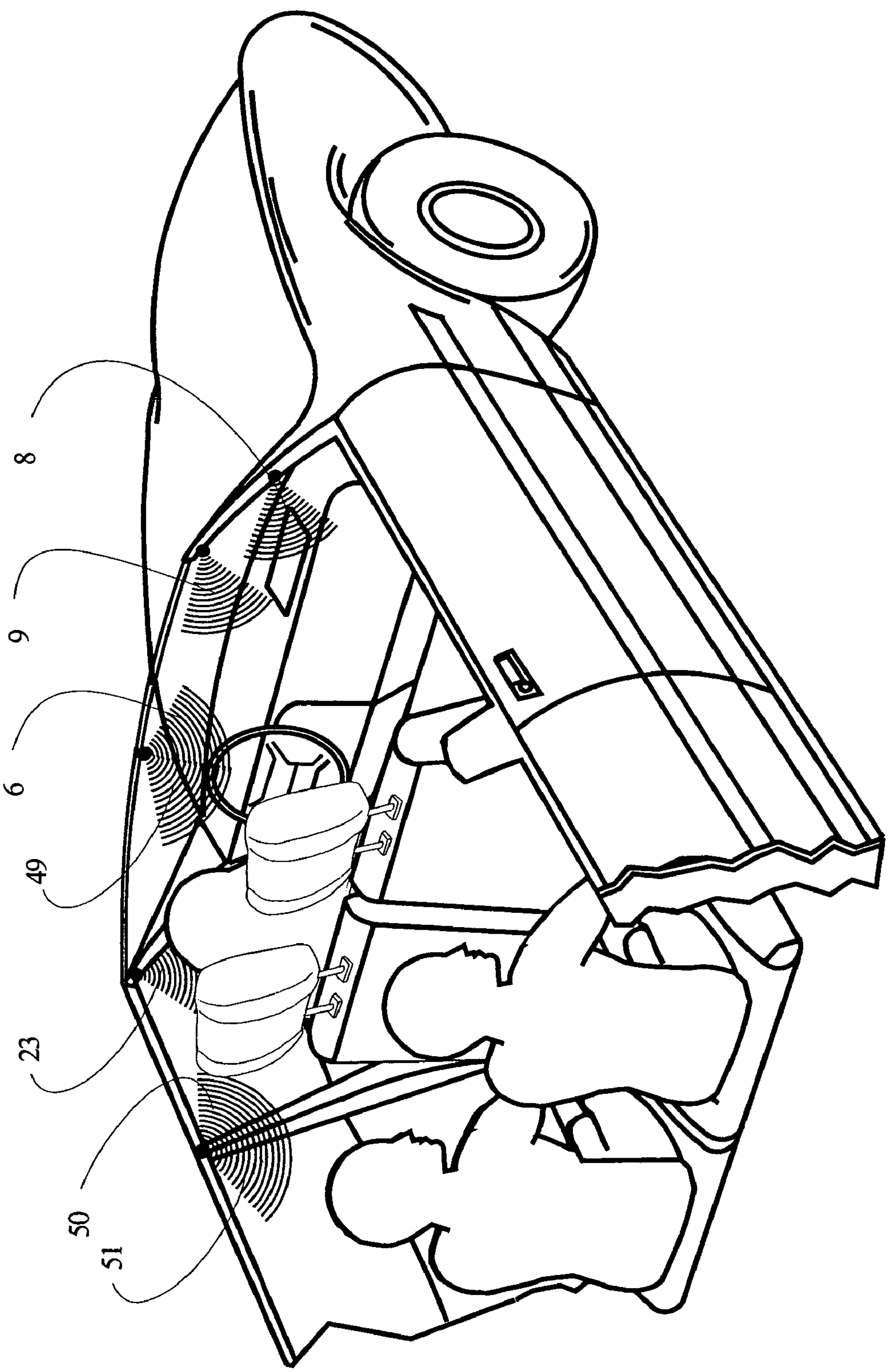
FIG. 20 is a perspective view of the interior of the passenger compartment of an automobile, with parts cut away and removed, showing a variety of transmitters that can be used in a phased array system.

As various parts of the vehicle interior identification and monitoring system described in the above reference patents and patent applications are implemented, a variety of transmitting and receiving transducers will be present in the vehicle passenger compartment. If several of these transducers are ultrasonic transmitters and receivers, they can be operated in a phased array manner, as described elsewhere for the headrest, to permit precise distance measurements and mapping of the components of the passenger compartment. This is illustrated in FIG. 20 which is a perspective view of the interior of the passenger compartment showing a variety of transmitters and receivers, 6, 8, 9, 23, 49-51 which can be used in a sort of phased array system. In addition, information can be transmitted between the transducers using coded signals in an ultrasonic network through the vehicle compartment airspace. If one of these sensors is an optical CCD or CMOS array, the location of the driver's eyes can be accurately determined and the results sent to the seat ultrasonically. Obviously, many other possibilities exist for automobile and other vehicle monitoring situations.

To use ultrasonic transducers in a phase array mode generally requires that the transducers have a low Q. Certain new micromachined capacitive transducers appear to be suitable for such an application. The range of such transducers is at present limited, however.

The speed of sound varies with temperature, humidity, and pressure. This can be compensated for by using the fact that the geometry between the transducers is known and the speed of sound can therefore be measured. Thus, on vehicle startup and as often as desired thereafter, the speed of sound can be measured by one transducer, such as transducer 18 in FIG. 21, sending a signal which is directly received by another transducer 5. Since the distance separating them is known, the speed of sound can be calculated and the system automatically adjusted to remove the variation due to variations in the speed of sound. Therefore, the system operates with same accuracy regardless of the temperature, humidity or atmospheric pressure. It may even be possible to use this technique to also automatically compensate for any effects due to wind velocity through an open window. An additional benefit of this system is that it can be used to determine the vehicle interior temperature for use by other control systems within the vehicle since the variation in the velocity of sound is a strong function of temperature and a weak function of pressure and humidity.

The problem with the speed of sound measurement described above is that some object in the vehicle may block the path from one transducer to the other. This of course could be checked and a correction would not be made if the signal from one transducer does not reach the other transducer. The problem, however, is that the path might not be completely blocked but only slightly blocked. This would cause the ultrasonic path length to increase, which would give a false indication of a temperature change. This can be solved by using more than one transducer. All of the transducers can broadcast signals to all of the other transducers. The problem here, of course, is which transducer pair should be believed if they all give different answers. The answer is the one that gives the shortest distance or the greatest calculated speed of sound. By this method, there are a total of 6 separate paths for four ultrasonic transducers.

An alternative method of determining the temperature is to use the transducer circuit to measure some parameter of the transducer that changes with temperature. For example, the natural frequency of ultrasonic transducers changes in a known manner with temperature and therefore by measuring the natural frequency of the transducer, the temperature can be determined. Since this method does not require communication between transducers, it would also work in situations where each transducer has a different resonant frequency.

The process, by which all of the distances are carefully measured from each transducer to the other transducers, and the algorithm developed to determine the speed of sound, is a novel part of the teachings of the instant invention for use with ultrasonic transducers. Prior to this, the speed of sound calculation was based on a single transmission from one transducer to a known second transducer. This resulted in an inaccurate system design and degraded the accuracy of systems in the field.

If the electronic control module that is part of the system is located in generally the same environment as the transducers, another method of determining the temperature is available. This method utilizes a device and whose temperature sensitivity is known and which is located in the same box as the electronic circuit. In fact, in many cases, an existing component on the printed circuit board can be monitored to give an indication of the temperature. For example, the diodes in a log comparison circuit have characteristics that their resistance changes in a known manner with temperature. It can be expected that the electronic module will generally be at a higher temperature than the surrounding environment, however, the temperature difference is a known and predictable amount. Thus, a reasonably good estimation of the temperature in the passenger compartment, or other container compartment, can also be obtained in this manner. Naturally, thermisters or other temperature transducers can be used.

The placement of ultrasonic transducers for the example of ultrasonic occupant position sensor system of at least one of the inventions disclosed herein include the following novel disclosures: (1) the application of two sensors to single-axis monitoring of target volumes; (2) the method of locating two sensors spanning a target volume to sense object positions, that is, transducers are mounted along the sensing axis beyond the objects to be sensed; (3) the method of orientation of the sensor axis for optimal target discrimination parallel to the axis of separation of distinguishing target features; and (4) the method of defining the head and shoulders and supporting surfaces as defining humans for rear facing child seat detection and forward facing human detection.

A similar set of observations is available for the use of electromagnetic, capacitive, electric field or other sensors and for other vehicle monitoring situations. Such rules however must take into account that some of such sensors typically are more accurate in measuring lateral and vertical dimensions relative to the sensor than distances perpendicular to the sensor. This is particularly the case for CMOS and CCD-based transducers.

Considerable work is ongoing to improve the resolution of the ultrasonic transducers. To take advantage of higher resolution transducers, data points should be obtained that are closer together in time. This means that after the envelope has been extracted from the returned signal, the sampling rate should be increased from approximately 1000 samples per second to perhaps 2000 samples per second or even higher. By doubling or tripling the amount of data required to be analyzed, the system which is mounted on the vehicle will require greater computational power. This results in a more expensive electronic system. Not all of the data is of equal importance, however. The position of the occupant in the normal seating position does not need to be known with great accuracy whereas, as that occupant is moving toward the keep out zone boundary during pre-crash braking, the spatial accuracy requirements become more important. Fortunately, the neural network algorithm generating system has the capability of indicating to the system designer the relative value of each data point used by the neural network. Thus, as many as, for example, 500 data points per vector may be collected and fed to the neural network during the training stage and, after careful pruning, the final number of data points to be used by the vehicle mounted system may be reduced to 150, for example. This technique of using the neural network algorithm-generating program to prune the input data is an important teaching of the present invention.

By this method, the advantages of higher resolution transducers can be optimally used without increasing the cost of the electronic vehicle-mounted circuits. Also, once the neural network has determined the spacing of the data points, this can be fine-tuned, for example, by acquiring more data points at the edge of the keep out zone as compared to positions well into the safe zone. The initial technique is done by collecting the full 500 data points, for example, while in the system installed in the vehicle the data digitization spacing can be determined by hardware or software so that only the required data is acquired.

1.1.2 Thermal Gradients

Thermal gradients can affect the propagation of sound within a vehicle interior in at least two general ways. These have been termed "long-term" and "short-term" thermal instability. When ultrasound waves travel through a region of varying air density, the direction the waves travel can be bent in much the same way that light waves are bent when going through the waves of a swimming pool resulting in varying reflection patterns off of the bottom.

Long-term instability is caused when a stable thermal gradient occurs in the vehicle as happens, for example, when the sun beats down on the vehicle's roof and the windows are closed. This effect can be reproduced in vehicles in laboratory tests using a heat lamp within the vehicle. The effect has been largely eliminated through training the neural network with data taken when the gradient is present. Additionally, changes in the electronics hardware including greater signal strength and a log amplifier, as discussed below, have eliminated the effect.

Short-term instability results when there is a flow of hot or cold air within the vehicle, such as caused by operating the heater when the vehicle is cold, or the air conditioner when the vehicle is hot. Bench tests have demonstrated that a combination of greater signal strength and a logarithmic amplification of the return signal can substantially reduce the variability of the reflected ultrasound signal from a target caused by short term instability. As with the long-term instability, it is important to train the neural network with this effect present. When the combination of these hardware changes and training is used, the short-term thermal instability is substantially reduced. If the data from five or more consecutive vectors is averaged, the effect becomes insignificant, see pre and post-processing descriptions below. A vector is the combined digitized data from, for example in this case, the four transducers, which is inputted into the neural network as described above.

Different techniques for compensating for thermal gradients are listed below.

1.1.2.1 Logarithmic Compression Amplifier

One method that has proven to be successful in reducing the effects of both short and long term thermal instability is to use a log compression amplifier, also referred to as a log compression amplifier circuit. A log compression amplifier is a general term used here to indicate an amplifier that amplifies the small return signals more than the large signals. Thus, there is a selective amplification of signals. This is coupled with changes to the circuit to increase the signal strength level of the return signal. The increase in signal strength can be accomplished in several ways, for example, by an increase in the transducer drive voltage, which results in a higher sound pressure level, or by generally increasing the gain of the amplifier of the return signal. A circuit diagram showing a method of approximately compensating for the drop-off in signal strength due to the distance between the target and the transducer is shown in FIG. 174. In both cases, if the log compression amplifier were not present, the analog to digital converter (ADC) would saturate on many of the reflected waves. The log compression amplifier prevents this by amplifying the higher return signals less than the lower signals in such a manner as to prevent this saturation. The log compression amplifier thus precedes the ADC in the signal processing arrangement. FIG. 175 illustrates a circuit that performs a quasi-logarithmic compression amplification of the return signal.

The log compression amplifier receives the signals from the ultrasonic receivers and selectively amplifies them and directs the amplified signals to the ADC. The use of a log compression amplifier between ultrasonic receivers and ADCs in a vehicular occupant identification and position detecting system provides significant advantages over prior art occupant identification and position detecting systems.

The operation of the quasi-logarithmic compression amplifier circuit shown on FIG. 175 is as follows:

(1) The echo detected by the ultrasonic transducer is amplified by stage U1.

(2) The function of stage U2 is to vary the gain of the amplifier with time to compensate for the signal attenuation with distance (time) of the echo reflected from various surfaces.

(3) The actual compression circuit is accomplished by U4, capacitor C1 and inductor L1 with the associated resistor diode network consisting of diodes D1-D14 and resistors R1-R5.

(4) C1 and L1 are tuned to the operating frequency of the transducer, typically between 40 and 80 kHz.

(5) For small signals, the diodes do not conduct and therefore the gain is at the maximum since there is no loading of the tuned circuit. Thus, the amplification is high.

(6) When the signal is high enough for diodes D1, D3 and D2, D4 to conduct resistor R5 shunts the tuned circuit lowering the Q and reducing the gain. Q is a measure of resonance capability of a transducer whereby a low Q is indicative of a weak resonance and a high Q is indicative of high resonance. D1, D3 and D2, D4 are connected back to back so that the negative half cycle has the same gain as the positive half cycle.

(7) When the signal increases more, diode D5 and D6 will conduct, shunting the tuned circuit with R4 as well as R5, which further reduces the gain of the stage.

(8) When the signal increases more, diode D7 and D8 will conduct, shunting the tuned circuit with R3 as well as R4 and R5, which further reduces the gain of the stage.

(9) When the signal increases more, diode D11 and D12 will conduct, shunting the tuned circuit with R1 as well as R2, R3, R4 and R5 which further reduces the gain of the stage.

(10) When the signal increases more, all of the diodes will conduct and the resistance of the diodes will shunt the resistors lowering the gain.

(11) The diodes are connected back-to-back so that the positive and negative half cycles will be compressed equally.

(12) The circuit can be temperature stabilized by maintaining the diodes at a constant temperature using apparatus known to those skilled in the art.

(13) The amount of compression can be changed by changing resistor values.

(14) The range of the circuit may be changed by changing the number of diodes and resistors in the network.

(15) The output of the network is buffered by a high impedance circuit with a buffer stage U3.

(16) U3 may be made into a demodulator by adding a diode and a resistor in the buffer stage.

The component designated AD8031A in FIG. 175 is a wide bandwidth rail-to-rail in and out operational amplifier. This operational amplifier and data sheets therefor may be obtained from Analog Devices, Incorporated.

Other circuits and other mathematical functions can be used as long as they amplify the lower level signals more than the higher level signals. In particular, a similar effect can be achieved by clipping the higher level signals by eliminating all return signal amplitudes above a certain value. When ultrasonic sensors are used in a pure ranging mode while thermal instabilities are present, it has been found that the location of a reflected signal is substantially invariable, provided the object is not moving, whereas the magnitude of the reflection may vary by factors of 10 or 100. It may sometimes be difficult to distinguish an actual return from the desired object from noise. Such noise may also be invariant in that it may be the result of reflections off of surfaces that are at substantial angles off of the axis of the transducer. These reflections are normally ignored since they are generally small in comparison with the main reflection. When thermal instabilities are present, however, these reflections can become significant relative to the main reflected pulse. One method of compensating for this effect is to average the returned amplitudes over a number of cycles. During dynamic out of position cases, however, there is not sufficient time to perform this averaging and each cycle must be evaluated independently of the other cycles. Using the selective amplification techniques described above, the apparent variation in the signal is substantially reduced and therefore the effects of the thermal instabilities are substantially eliminated. Again, there are many methods of accomplishing the desired result as long as the magnitude of the large reflected signals and reduced relative to the small reflected signals.

In at least some of these embodiments of the invention, multiple wave-emitting transducers are provided and operate simultaneously to transmit waves so that return waves, modified by the object, can be used to identify the object interacting with the waves. The object is thus identified based on the waves received by a plurality of the transducers after being modified by the object, i.e., waves are transmitted by a plurality of transducers toward the object, are modified thereby and return to the transducer and these returned waves are used to identify the object. Multiple wave-emitting transducers can also provided and operate simultaneously to transmit waves so that return waves, modified by the object, can be used to determine the position of the object interacting with the waves. The position of the object is thus determined based on the waves received by a plurality of the transducers after being modified by the object, i.e., waves are transmitted by a plurality of transducers toward the object, are modified thereby and return to the transducer and these returned waves are used to determine the position of the object. In a similar manner, multiple wave-emitting transducers may be provided and operate simultaneously to transmit waves so that return waves, modified by the object, can be used to determine the type of the object interacting with the waves. The type of the object is thus determined based on the waves received by a plurality of the transducers after being modified by the object, i.e., waves are transmitted by a plurality of transducers toward the object, are modified thereby and returned to the transducer and these returned waves are used to determine the type of the object. The identity, position and/or type can thus be provided.

1.1.2.2. Training Method With Heat

Since neural networks are preferably used herein as a pattern recognition system to differentiate occupancy conditions within the vehicle, it is quite straightforward to take data with and without the long-term and short-term thermal effects discussed above. The fact that the neural network can find and use the information within the data is not obvious since, especially in the short-term case, the reflected signals from the vehicle interior can vary significantly with time. Nevertheless, the neural network has proven that sufficient information is generally present to make an identification decision. Although neural networks are the preferred method of solving this problem, it is possible to use other pattern recognition systems, such as the sensor fusion system described in U.S. Pat. No. 5,482,314 to Corrado et al., using data taken with and without the thermal instabilities, resulting in a more accurate system than would be otherwise achievable.

A neural network for determining the position of an object in a vehicle can be generated in accordance with the invention by conducting a plurality of data generation steps, each data generating step comprising the steps of placing an object in the passenger compartment of the vehicle, irradiating at least a portion of the passenger compartment in which the object is situated (with ultrasonic waves from an ultrasonic transducer), receiving reflected radiation from the object at a receiver, and forming a data set of a signal representative of the reflected radiation from the object, the distance from the object to the receiver and the temperature of the passenger compartment between the object and the receiver. Then, the temperature of the air in the passenger compartment, or at least in the area between the object and the receiver, is changed, and the irradiation step, radiation receiving step and data set forming step are performed for the object at different temperatures between the object and the receiver. Thereafter, a pattern recognition algorithm, e.g., a neural network, is generated from the data sets such that upon operational input of a signal representative of reflected radiation from the object, the algorithm provides an approximation of the distance from the object to the receiver. By using a plurality of ultrasonic transducers, the contour or configuration of the object can be established thereby enabling the position of the object to be obtained.

In an enhanced embodiment, different objects are used to form the data and the identity of the object is included in the data set such that upon operational input of a signal representative of reflected radiation from the object, the algorithm provides an approximation of the identity of the object. Further, the objects can be placed in different positions in the passenger compartment so that both the identity and actual position of the object are included in the data set. As such, upon operational input of a signal representative of reflected radiation from the object, the algorithm provides an approximation of the identity and position of the object. In the alternative, a single object can be placed in different positions in the passenger compartment so that the actual position of the object is included in the data set. As such, upon operational input of a signal representative of reflected radiation from the object, the algorithm provides an approximation of the position of the object. The temperature of the air may be changed by dynamically changing the temperature of the air, e.g., by introducing a flow of blowing air at a different temperature than the ambient temperature of the passenger compartment. The blowing air flow may be created by operating a vehicle heater or air conditioner of the vehicle. The temperature of the air may also be changed by creating a temperature gradient between a top and a bottom of the passenger compartment.

The generation of a trained neural network in consideration of the temperature between the object and the ultrasonic receiver(s) can be used in conjunction with any of the other methods disclosed herein for improving the accuracy of the determination of the identity and position of an object. For example, the ultrasonic transducers can be arranged in a tubular mounting structure, the ringing of the transducers can be reduced or even completely suppressed and the transducer cone mechanically damped.

1.1.2.3. Single Transducer Send and Receive

When standard piezoelectric ceramic ultrasonic transducers, such as manufactured by MuRata, are used, and excited with a driving pulse of a few cycles, the transducer rings (continues to vibrate and emit ultrasound like a bell) for a considerable period after the driving pulse has stopped. In one common case, eight cycles were used to drive the transducer at 40 kHz and, even though the driving pulse was over at about 0.2 milliseconds, the transducer was still ringing at 1.3 milliseconds. Thus, if a single transducer is to be used for both sending and receiving the ultrasonic waves, it is unable to sense the reflected waves from a target that is closer than about eight to twelve inches. In many situations within the vehicle, important targets are closer than eight inches and thus transducers must be used in pairs, one for sending and the other for receiving. This is less of a problem when piezo-film or electrostatic transducers are used, but such transducers have other significant problems related to temperature sensitivity, the generated signal strength and physical size.

Another point worth noting is that when a piezo-ceramic transducer is used with a horn, as described elsewhere in this specification, the location of the transducer in the horn is critically important. As the transducer is moved further into and out of the base of the horn, the field pattern of ultrasonic radiation changes. At the proper location, the main pattern generally has the widest field angle and the radiation pattern is characterized by the absence of side lobes of ultrasonic radiation. That is, all of the energy is confined to the main field. Side lobes can cause several undesirable effects. In particular, when the transducers are used in pairs, one for sending and the other for receiving, the lobes contribute to cross-talk between the two transducers reducing the ability to measure objects close to the transducer. Also, side lobes frequently send ultrasonic energy into places in the passenger compartment where undesirable reflections result. In one case, for example, reflections from the driver were recorded. In another case reflections from adjacent fixed surfaces such, as the instrument panel (IP) or headliner surface, were received with the effect that when new IP and headliner parts were used, the reflection patterns changed and the system accuracy was significantly degraded. When reflections, either directly or indirectly, occur from such surfaces, the ability to transfer the system from one vehicle to another identical vehicle is compromised.

A. Damped Transducer

The ringing problem described above is related to the Q (a measure of the resonance capability of the transducer) of the device, which is typically in the range of about 10 to 20 for piezo-ceramic transducers. Attempts to add damping to the transducer have proven to be difficult to manufacture. A primary transducer supplier, for example, declines to supply transducers with greater damping or lower Q. In addition, many attempts to add damping have been reported in the patent literature with limited success. Experiments have determined, however, that if the damping material is placed in the transducer cone as shown in FIG. 176, in a manner as described herein, the damping can be accurately controlled. The greater the amount of the damping material, which is typically a silicone rubber compound, the greater the damping, with the hardness or durometer of the rubber playing a lesser but significant role.

If the cone is entirely filled with a preferred compound, too much damping may result for some applications depending on the material. However, if the rubber is diluted with a solvent in the proper proportions, the cone can be filled with the diluted mixture and the proper residue will result after the solvent evaporates. In this manner, not only can the proper amount of damping material be administered, but also the resulting uniform coating is desirable. One preferred compound is silicone RTV diluted with Xylene. By this method, a surprisingly consistently damped transducer is achieved. Other damping compounds can be used and different methods of achieving an accurate amount of damping material within the cone can be developed. Additionally, damping material can be placed on other parts of the transducer to achieve similar results. Another approach is to incorporate another plate parallel to, but on the opposite side of, the piezoelectric material from the resonating disk in the transducer assembly, such as one made from tungsten, which serves to reduce the transducer Q. However, the placement within the cone has had the best results and therefore is preferred.

FIG. 177 illustrates the superimposed reflections from a target placed at three distances from the transducer, 9 cm, 50 cm and 1 meter respectively for a single send and receive transducer with a damped cone as described above. FIG. 178 illustrates the superimposed reflections from a target placed at 16.4 cm, 50 cm and 1 meter respectively for a transducer without a damped cone. The upper curves represent the envelopes of the returned signals. In each case the returned signals from the closest target are shown in the lower curves. Several distinct differences are evident. The closest that could be achieved without the ringing pulse overwhelming the reflected target pulse was 9 cm for the damped case and 16.4 cm for the undamped case. The undamped case also exhibited several unwanted signals that do not represent reflections from the target and could confuse the neural network. No such unwanted reflections were evident in the damped case. The 9 cm target reflection is clearly evident in the damped case while the 16.4 reflection interfered with the ringing signal in the undamped case. In both cases, the logarithmic amplifier was turned on after 600 microseconds as described below B. Transducer in a Tube Another method of achieving a single transducer send and receive assembly is to place the transducer into a tube with the length of the tube determined by the distance required for the ringing to subside and the closest required sensing distance. That is, the length of tube is equal to the distance required for the ringing to subside less the closest required sensing distance. In this situation, since the combined length of the tube and closest required sensing distance is equal to the distance required for the ringing to subside, the ringing will subside at the start of the operative sensing distance. For example, if the minimum target sensing distance is 4 inches and 8 inches is required for the ringing to subside, then the tube can be made 4 inches long. The use of a tube as a conduit for ultrasound is disclosed in DuVall et al. U.S. Pat. No. 5,629,681 entitled "Tubular Ultrasonic Displacement Sensor".

DuVall et al. shows a displacement sensor and switch including a tube which function based on the detection of a constriction in the tube caused by an external object. The sensor or switch is placed, e.g., across a road to count vehicles, along a vehicular window, door, sunroof and trunk to detect an obstruction in the closing of the same, and in a vehicle door for use as a crash sensor. In all of these situations, the tube must be placed in a position in which it will be compressed or constricted by the external object since such compression or constriction is essentially to the operation of the sensor or switch. The tube is used as a conduit for transmitting sonic waves. A sonic transducer is arranged at both ends of the tube or at only one end of the tube. Sonic energy is directed from a transmitting transducer into the tube and received by a receiving transducer. If the tube is compressed (deflected) or obstructed, a change in the received sonic energy is detected and the location of the compression or obstruction can be determined therefrom.

A variety of examples of a transducer in a tube design are illustrated in FIGS. 179A-179F. A straight tube 820 with an exponential horn 820A is illustrated in FIG. 179A. FIGS. 179B and 179C illustrate the bending of the tube 820 through 40 degrees and 90 degrees, respectively. FIG. 179D illustrates the incorporation of a single loop 820B and FIG. 179E of multiple loops 820C, which can be used to achieve a significant tube length in a confined space. It has been found that there is about a 3-dB drop in signal intensity that occurs when transmitting through an 8-inch tube having the same diameter as the transducer and no significant effect has been observed from coiling the tube. A surprising result, however, is that very little additional attenuation occurs even if the tube diameter is substantially decreased providing care is taken in the lead in of the ultrasound into the tube. Thus, it is possible to use a tube which has perhaps a diameter of half that of the transducer will little additional signal loss. This fact substantially facilitates the implementation of this concept since space in the A and B pillars and the headliner is limited.

A smaller tube 820D is illustrated in FIG. 179F where the tube is now shown to have a straight shape; however, it can be easily bent to adjust to the space available. FIG. 179D and FIG. 179E illustrate a transducer assembly similar to FIG. 179A but wherein the tube is now coiled and can be molded as two parts and later joined together permitting the assembly to occupy a small space. Thus, now the single transducer send and receive assembly not only permits measurements of objects very close to the mounting surface, the headliner for example, but the assembly need not occupy significantly more space than the original two transducer design. There is a substantial cost saving since only a single transducer is required and only a single pair of wires also is needed. A mounting device is required in any case and the design of FIG. 179E is no more expensive that the earlier mounting hardware design which needed to accommodate two transducers. Thus, a substantial improvement in performance has been achieved with the additional benefit of a substantial reduction in cost.

Care must be taken in the design of the tube assembly since the reflections of the waves back into the tube at the end of the tube depend on the ratio of the tube diameter to the wavelength. The smaller the tube, the greater the reflection. If the tube diameter is greater than one wavelength, less than one percent of the energy will be reflected but this still may be large compared with the reflection off of a distant target. One method of partially solving this problem is through the use of a wave pattern shaping horn as disclosed below and illustrated in FIGS. 179A-179F.

1.1.2.4. Delay In Turning On The Logarithmic Compression Amplifier

If the return signal logarithmic compression amplifier is turned on at the time that the transducer is being driven, in some designs, the combination of the very strong driving pulse and the signal smoothing effect of the amplifier can cause a feed forward effect. This creates an interference with the signal being received making it more difficult to measure reflections from objects close to the transducer. It has been found that if the start of the amplifier is delayed for a fraction of a millisecond the ability to measure close objects is improved. This is illustrated in FIG. 180 where the effects of three different cases is shown for the standard 40 kHz undamped ultrasonic transducer.

1.1.2.5. Electronic Damping

Although the use of a Colpits oscillator is well known in the art of buzzers, such as used in alarms on watches where energy considerations require that the buzzer be driven at its natural frequency, such oscillators have heretofore not been applied to ultrasonic transducers. Particularly, the Colpits oscillator has not been used in a circuit for electronically reducing and preferably suppressing the motion of the transducer cone 822 and thereby eliminating the ringing. The principle, as illustrated in FIGS. 181A and 181B, is to use a separate small, auxiliary transducer 821, which could be formed as part of the main transducer 825, for the purpose of measuring the motion of the main transducer 825. This auxiliary transducer 821 monitors the motion of the resonator 824 and provides the information to feedback to appropriate electronic circuitry. Transducer 821 may be donut-shaped or bar-shaped or an isolated section of the ceramic of the main transducer 825. This feedback is used during the driving phase to ascertain that the transducer is being driven at its natural frequency. The separate transducer also permits exact monitoring of the transducer motion after the driving phase, permitting an inverted signal to be used to reverse drive the transducer, i.e., mechanically dampen the resonator 824, thereby stopping its motion. This design requires some added complication to the transducer and circuitry but provides the optimum reduction or suppression and thus the closest approach to the transducer by a target.

In addition to the Colpits oscillator, another design that may also have application to solving this problem and is known in the art is the Hartley oscillator.

By reducing or eliminating the ringing, all of these damping methods provide better control over the total number of pulses that are sent to the passenger compartment. This results in a sharper image of the contents of the passenger compartment and thus more accurate information.

An alternate method of eliminating the ringing is illustrated in FIG. 182. In this case, the natural frequency of each transducer is sensed and the drive circuitry is tuned to drive the transducer exactly at its natural frequency. Once the natural frequency is known, however, then, based on some trial and error development, a sequence of pulses is derived which is fed into the transducer drive circuit with reversed polarity to counteract the motion of the transducer and quickly reduce or suppress its oscillations. Thus, by this method the same results as are achieved from the Colpits design with a much simpler implementation that does not require an additional sensing element to be designed into the transducer or the additional wires to the transducer that are needed in the Colpits design. Note that the waveforms in FIG. 182 are shown as square waves whereas they are in fact sine waves. Also note that the ringing has been shown as shorter than the drive pulse whereas in fact, it can last four to five times longer depending on the transducer design. With the implementation of the technique disclosed here, the period of the ringing is reduced to about 10% of what is typically present in the standard transducer.

1.1.2.6. Field Shaping

The purpose of an ultrasonic occupant sensing system is to transmit ultrasonic waves into the passenger compartment and from the received reflected waves determine the occupancy state of the vehicle. Thus, waves that do not reflect off of surfaces of interest, such as the driver (when the passenger side is being monitored) and the instrument panel (IP) and headliner as discussed above, add noise to the system. In the worst case, they can interfere with or mask other important reflected signals. For this reason, significant improvements to the occupant sensing system can be achieved by carefully controlling the shape of the ultrasonic fields emitted by each of the transducers.

A. Horns

A horn is generally required especially when transferring the ultrasound waves from the tube to the passenger compartment. The angle of radiation from the tube without the horn would be quite large sending radiation into areas where no desired object would be situated. Since the horn can now be arbitrarily shaped, the radiation angle can not only be made narrower but can be arbitrarily elliptically shaped so as to cover the desired volume in the most efficient manner. An example of a horn 826 shaped to create an elliptical pattern is illustrated in FIG. 183A (the opening at the end of the tube being elliptical) whereas the elliptical pattern 826A created by the horn 826 is shown in FIG. 183B. Previously, the output from the transducer had to be baffled or blocked so that it did not receive reflections from the rear seat or the driver, for example. This wasted energy and required additional hardware and thus increased the cost of the installation.

The horn may be a part of the tube, i.e., formed as a unitary structure, or formed as a separate unit and then attached to the tube. Generally, the transducer would be mounted in a cylindrical tube and the horn would begin right at the end of the cylindrical tube. As such, the horn starts out as being cylindrical in the vicinity of the transducer and then expands into the horn. The tube does not have to be cylindrical but may have other forms.

B. Reflective Mode

An alternate method of achieving the desired field shape is to use a reflector. This has the advantage that more control of the sound waves can be achieved through the careful shaping of the reflector surface as illustrated in FIGS. 184, 185 and 186. FIG. 184 illustrates the reflection off of a flat plane 827A, FIG. 185 illustrates the reflection off of a concave surface 827B and FIG. 186 illustrates the reflection off of a convex surface 827C, respectively. The figures illustrate the extremes of reflections that can be achieved and permit a great deal of freedom in the design of the resulting field patterns. The design problem is significantly more complicated than appears from the figures, however. Since the dimensions of the reflectors are of the same order of magnitude as the wave length of the ultrasound, simple ray tracing, as shown in the figures, will not produce accurate results and an accurate computer model, or extensive trial and error testing, is required.

1.1.2.7. Neural Network Improvements/Dual Level ANN

A dual level neural network architecture has proven advantageous in improving categorization accuracy and to prepare for the next level occupant sensing system that includes Dynamic Out-of-Position measurements (DOOP). This will be discussed in section 11.1 below.

1.1.2.8. Dynamic Out-Of-Position (DOOP)

Although it has been proven that crash sensors mounted in the crush zone are better and faster at discriminating airbag required crashes from those where an airbag deployment is not desired, the automobile manufacturers have preferred to use electronic sensors mounted in the passenger compartment, so called single point sensors. Since there is no acceptable theory that guides a sensor designer in determining the proper algorithm for use with single point sensors (see for Breed, D. S., Sanders, W. T. and Castelli, V. "A Critique of Single Point Crash Sensing", Society of Automotive Engineers Paper SAE 920124, 1992), there are many such algorithms in existence with varying characteristics. Some perform better than others. There is a concern among the automobile manufacturers that such sensors might trigger late in some real world crashes for which they have not been tested.

In such cases, the automobile manufacturers do not want the airbag to deploy. If the occupant position sensor designer could rely on the single point sensor doing a reasonable job in triggering on time, or at least as good a job as the electromechanical crush zone mounted sensors, then cases such as high speed barrier crashes need not be considered. Since the characteristics of the electromechanical sensors are well known and can be easily modeled, the occupant position sensor designer can determine when this kind of sensor would trigger in all crashes and as a result high speed barrier crashes, for example, need not be considered. Single point sensor algorithms, on the other hand, are generally proprietary to the supplier. Therefore no assumptions can be made about their ability to respond in time to various crashes. Consequently, the occupant sensor designer must assume the worst case in that the sensor will trigger at the worst possible time in all crashes. It has been shown that if the sensor responds nearly as well as the electromechanical crush zone mounted sensor, that determining the position of the occupant every 50 milliseconds is adequate (see for example Society of Automotive Engineers paper 940527, "Vehicle Occupant Position Sensing" by Breed et al, which is included herein by reference). With the requirement that all worst cases be considered, the time required for measuring the position of an occupant who is not wearing a seatbelt in a high speed short duration crash is closer to 10-20 milliseconds.

Sound travels in air at about 331 meters/second (~1086 feet/second). If an object is as much as three feet from the transducer, the ultrasound will require about 6 milliseconds to travel to the object and back. If the processor requires an additional three milliseconds to process the data (assuming that the neural network is solved each time new data from any transducer is available), it requires a total of about 10 milliseconds for a single transducer to interrogate the desired volume. If four transducers are used, as in the present design, at least 40 milliseconds are therefore required. As discussed above, this is too long and thus an alternative arrangement is required when ultrasound is used for DOOP. One solution is to operate the system in two modes. Mode one would use four transducers to identify what is in the subject volume and where it is, relative to the airbag, before the crash begins and mode two would use only one, or at most two, transducers to monitor the motion of the object during the crash. The problem with this solution is that occasionally the selected transducer for mode two could be blocked by a newspaper, for example, or a hat. If two transducers were used this problem would theoretically be solved but there is a problem as to which transducer should be believed if they are providing different answers. This latter problem is sufficiently complicated as to require a neural network type solution. In this case however, the neural network really needs the output from all four of the transducers to make an accurate decision due to the vast number of different configurations that can occur in the passenger compartment. To make a highly reliable decision, therefore, all of the transducers need to be used which means that they all have to work at the same time. This can be accomplished if each one uses a different frequency. One could operate at 45 kHz, a second at 55 kHz, the third at 65 kHz and the forth at 75 kHz, for example. The 10 kHz (or even 5 kHz) spacing is sufficient to permit each one to transmit and receive without hearing the transmissions from any other transducer. Thus, the apparatus used in the instant invention contemplates, for most applications, the use of multiple frequencies in contrast to all other systems which have thus far been disclosed.

For the majority of the cases, the position of the occupant at the start of a crash is all that is necessary to determine if he or she is out of position for airbag deployment determination. This is because the motion of the occupant is usually very small during the time that the crash sensors determine that the airbag should be deployed. Below is a mathematical analysis demonstrating this conclusion. There are some rare cases, however, where it would be desirable to track the occupant in as close to real time as possible. Such cases include: (1) panic braking where the occupant begins at a significant distance from the danger zone; (2) a multiple accident scenario where the first accident is not sufficient to deploy the airbag but does impart a significant relative velocity to the occupant; and (3) an unusually high deceleration prior to a crash such as might occur due to sliding along a guard rail or going through mud or water. Some automobile manufacturers add a fourth category, which is the case of a mal-functioning or poorly functioning crash sensor where the motion of the occupant even in a barrier crash can be significant. For these cases, dynamic out of position (DOOP) needs to be considered and careful attention paid to the development of the post processor algorithms.

DYNAMIC OUT-OF-POSITION ANALYSIS

Concern has been expressed as to whether the Ultrasonic Automatic Occupant Sensor (UAOS) is sufficiently fast to detect Dynamic Out-of-Position (DOOP). This is based on the belief that the UAOS updates only every 100 milliseconds and that to measure DOOP an update every 10 milliseconds is required. This study therefore will demonstrate two points:

The UAOS can achieve an update rate of once every 10 milliseconds.

A slower update rate of 50 milliseconds or 20 milliseconds is in fact sufficient.

One critical point is that the UAOS system, because of the use of pattern recognition, knows the location of the important parts of the occupant and therefore will probably not be fooled by motions of the extremities. Simpler systems could misinterpret the motion of the arms of a belted occupant for the occupant's chest.

The first issue is to determine what update timing is required for DOOP and when. If the occupant is initially positioned far back from the airbag, for example, there is little doubt that even a 50 millisecond update time is sufficient.

In order to get a preliminary understanding of the problem, consider the simple case to a constant deceleration pulse varying from 1 to 16 G's for a period of 0.1 seconds. 1 G represents something greater than what occurs in braking and 16 G's represents an approximation to a 35 MPH barrier crash. The argument is made that a square wave approximates braking pulses and that vehicles are designed to attempt to achieve a square wave barrier crash pulse. It is also believed that the square wave approximation to a crash pulse is more severe for the purposes here than some other shape. Later in this preliminary report, a Haversine crash pulse will be considered. A Haversine crash pulse is a sine wave upwardly displaced so that the lowest point is on the x-axis.

The problem then can be stated that: given that there is some clearance from the airbag at the time that an airbag inflation is initiated such that if an occupant is closer than that clearance the airbag should not be deployed (the restricted zone), how much additional clearance must be provided to allow a prediction to be made that the occupant will move to within the restricted zone before the sensor triggers. This additional clearance, called the sensing clearance, will of course depend on the sensing time which we will assume here will vary from 10 to 100 milliseconds. The worst case is where the occupant is at rest and then begins moving just after his position has been measured. Since it is assumed that a measurement has been made before occupant motion begins, the calculation of the sensing clearance amounts to determining the motion of the occupant, represented here as an unrestrained mass, that can take place during the sensing period. The worst case initial position of the occupant is where the occupant is initially very close to the restricted zone since if he or she starts out at a greater distance there is more time to take position measurements and then project the position of the occupant at a later time.

For the assumption above, which are believed to be worst case, the sensing clearance can be calculated as shown in the table.

"na" in the table signifies that the crash sensor would have triggered before a second measurement reading

| ACCELERATION | SENSING TIME | | | | |
|---|---|---|---|---|---|
| G's | 0.01 | 0.02 | 0.03 | 0.05 | 0.1 |
| SENSING CLEARANCE (inches) | | | | | |
| 1 | 0.02 | 0.08 | 0.17 | 0.48 | 1.93 |
| 2 | 0.04 | 0.15 | 0.35 | 0.97 | 3.86 |
| 4 | 0.08 | 0.31 | 0.70 | 1.93 | 7.73 |
| 8 | 0.15 | 0.62 | 1.39 | na | na |
| 16 | 0.31 | 1.24 | na | na | na |
| VELOCITY (mph) | | | | | |
| 1 | 0.22 | 0.44 | 0.66 | 1.10 | 2.20 |
| 2 | 0.44 | 0.88 | 1.32 | 2.20 | 4.39 |
| 4 | 0.88 | 1.76 | 2.63 | 4.39 | 8.78 |
| 8 | 1.76 | 3.51 | 5.27 | 8.78 | 17.56 |
| 16 | 3.51 | 7.03 | 10.54 | 17.56 | 35.13 |

can be taken. For 16 G 0.03 second case, for example, the sensor would have triggered before 0.02 seconds. From the table, it can be seen that for this worst case scenario for 20 millisecond sampling the sensing clearance is about 1 inch, for 30 milliseconds it is about 1.5 inches and even for 50 milliseconds it is less than 2 inches.

In the table below, 0.7 G braking was assumed followed by a Haversine shaped crash pulse. The program was run for a variety of crash impact speeds, braking durations and initial occupant positions. Out of many thousands of cases which were run, only those cases are shown where the computer predicted that the occupant was further than 8 inches, the restricted clearance, and where the actual position at sensor triggering was within the restricted clearance, that is less than 8 inches. The sensor triggering time was based on the 5 inch less 30 millisecond criteria. It is noteworthy that only a simple linear extrapolation of the last two measurements was used to predict the occupant position. A more realistic extrapolation formula would of course give better results.

Crash impact speeds were varied from 8 to 34 mph with 2 mph steps. For each impact speed, crash duration was varied from 30 ms to 180 ms with 30 ms steps and for each crash duration, pre-crash braking times varied from 100 to 2200 ms with 300 ms steps. Finally, for each pre-crash braking time initial occupant clearance varied from 30 inches to 4 inches by 4 inches steps. From that full set, these are the cases where the occupant clearance at sensor fire was less than or equal to 8 inches and the predicted clearance was over 8 inches.

| | |
|---|---|
| Driver motion when airbag opened, inches | 5.0000 |
| Airbag deployment time, ms | 30.0000 |
| Time between position and velocity measurements, ms | 20.0000 |
| Pre-crash braking deceleration, g | 0.7000 |
| Minimum occupant clearance at sensor fire, inches | 8.0000 |

| | |
|---|---|
| Vcr | is the crash impact speed, mph |
| T | is the crash duration, ms |
| tb | is the pre-crash braking time, ms |
| Dpab0 | is the initial occupant clearance, inches |
| Vc0 | is the vehicle pre-braking speed, mph |
| ts | is the required sensor fire time, ms |
| Dpaba | is the actual occupant clearance at ts |
| Dbarpabts | is the predicted occupant clearance at ts |
| Dpabm | is the last measured occupant clearance, inches |
| Dpabm2 | is the previous measured occupant clearance, inches |

| Vcr | T | tb | Dpab0 | Vc0 | ts | Dpaba | Dbarpabts | Dpabm | Dpabm2 |
|---|---|---|---|---|---|---|---|---|---|
| 8.0 | 90.0 | 100.0 | 12.0 | 9.54 | 150.49 | 7.9 | 8.82 | 9.59 | 10.36 |
| 8.0 | 120.0 | 100.0 | 12.0 | 9.54 | 165.17 | 7.2 | 8.01 | 8.96 | 9.92 |
| 10.0 | 120.0 | 100.0 | 12.0 | 11.54 | 157.44 | 7.7 | 8.53 | 9.35 | 10.16 |
| 12.0 | 150.0 | 100.0 | 12.0 | 13.54 | 164.91 | 7.5 | 8.19 | 9.06 | 9.94 |
| 14.0 | 150.0 | 100.0 | 12.0 | 15.54 | 160.24 | 7.7 | 8.47 | 9.27 | 10.08 |
| 16.0 | 150.0 | 100.0 | 12.0 | 17.54 | 156.47 | 8.0 | 8.68 | 9.44 | 10.19 |
| 16.0 | 180.0 | 100.0 | 12.0 | 17.54 | 168.03 | 7.4 | 8.09 | 8.97 | 9.84 |
| 18.0 | 180.0 | 100.0 | 12.0 | 19.54 | 164.57 | 7.6 | 8.28 | 9.12 | 9.95 |
| 20.0 | 180.0 | 100.0 | 12.0 | 21.54 | 161.62 | 7.8 | 8.45 | 9.25 | 10.04 |
| 22.0 | 180.0 | 100.0 | 12.0 | 23.54 | 159.05 | 7.9 | 8.59 | 9.35 | 10.12 |

From these results, a sensing clearance of less than 1 inch appears to be adequate.

To further validate the conclusions here, a study should be done using real crash pulses and realistic braking decelerations. From the above analysis, it is unlikely that sensing times faster than 20 milliseconds are required and 50 milliseconds is probably adequate.

In specifying the 8 inch restricted zone, the automobile manufacturers have obviously not taken into account the velocity of the occupant as he or she enters that zone since the amount of displacement into the restricted zone while the airbag is deploying will obviously vary with occupant velocity. A full MADYMO simulation validated by crash and sled tests, of course, will ultimately settle this issue. MADYMO is a computer program which is available from TNO Road Vehicles Research Institute, Schoemakerstraat 97, Delft, The Netherlands. It is often used to simulate crash tests (as described, for example, in U.S. Pat. No. 5,695,242).

A. DOOP—Multiple Frequencies

In a standard ultrasonic system as described above, typically four transducers interrogate the occupant, one after the other. The first transducer transmits a few cycles of typically 40 kHz ultrasound and waits for all of the echoes to return and then the second transducer transmits, etc. Since it takes as much as 7 to 10 milliseconds for the waves to be transmitted, received and for the reverberations to subside, it takes approximately 40 milliseconds for four to do so. If four different frequencies are used, on the other hand, all four transmitters can transmit and receive simultaneously reducing the total time to 10 milliseconds. The time required to calculate the neural network is small compared with 10 milliseconds and can take place while the transducers are transmitting. If the driver is also included, as many as eight frequencies would be used.

In particular, in one method for identifying an object in a passenger compartment of a vehicle, a plurality of ultrasonic wave-emitting and receiving transducers are mounted on the vehicle, each arranged to transmit and receive waves at a different frequency, the transducers are controlled, e.g., by a central processor, to simultaneously transmit waves at the different frequencies into the passenger compartment, and the object is identified based on the waves received by at least some of the transducers after being modified by passing through the passenger compartment, i.e., reflected by the object. Since different objects will most likely cause different reflections to the ultrasonic receivers, the object can be identified with reasonable precision based on the returned waves. By appropriately determining the spacing between the frequencies of the waves transmitted and received by the transducers, the possibility of each transducer receiving waves transmitted by another transducer is reduced and the accuracy of the system is improved. The position of the object can also be determined in addition to or instead of the determination of the identity of the object, based on the waves received by at least some of the transducers after being modified by passing through the passenger compartment.

The improvements relating to the use of ultrasonic transducers described herein may be used in conjunction with this embodiment. For example, motion of a respective vibrating element or cone of one or more of the transducers can be electronically diminished or suppressed to reduce ringing of the transducer and one or more of the transducers may be arranged in a respective tube having an opening through which the waves are transmitted and received. Neural networks may be used and reside in the central processor, and which are possibly trained using heat as discussed above.

A similar arrangement for identifying an object in a passenger compartment of the vehicle includes a plurality of wave-emitting and receiving transducers mounted on the vehicle, each transducer being arranged to transmit and receive waves at a different frequency, and a processor coupled to the transducers for controlling the transducers to simultaneously transmit waves at the different frequencies into the passenger compartment. The processor or processor means receive signals representative of the waves received by the transducers after being modified by passing through the passenger compartment and identifies the object based on the signals representative of the waves received by the transducers. Depending on its design and programming, the processor can also determine the position of the object based on the signals representative of the waves received by the transducers, either in addition to or instead of the determination of the identity of the object.

The improvements relating to the use of ultrasonic transducers described herein may be used in conjunction with this embodiment. For example, the signals from the receivers may be operated upon by a compression amplifier such as those described above and one or more of the transducers may be arranged in a respective tube having an opening through which the waves are transmitted and received.

Although this system is described with particular advantageous use for ultrasonic transducers, it is conceivable that other transducers which transmit in ranges other than the ultrasonic range can also be used in accordance with the invention.

B. Differential Mode—Velocity

In addition to the inputs from the transducers, it has been found that the difference between the current vector and the previous vector also contains valuable information as to the motion of the occupant. It represents a kind of velocity vector and is useful in predicting where the occupant will be in the next time period. In addition to a vector representing the latest difference, a series of such difference or velocity vectors has also proven useful for the dynamic out-of-position calculation. Additionally, the difference vector provides a check on the accuracy of the vector since the motion of an occupant must be within a certain narrow band within a 10-millisecond period. This fact can be used to correct errors within a vector.

1.1.2.9. Other Applications—Miscellaneous

A. Location of the Seatback and Seat

The positions of the seatback and the seat are valuable information in determining the location of the occupant for seats without position sensors. One cost-effective method of obtaining this information is to use one or more ultrasonic transducers to locate the seat or seatback relative to a particular point in the vehicle. In many cases, only the seatback location is required as it gives an indication of the location of the occupant's chest for various combinations of seat and seatback position. This measure is particularly useful in helping to differentiate a forward facing human from an empty seat.

B. Ultrasonic Weight Sensor

An ultrasonic transducer also can be used as a pressure or weight sensor by measuring the deflection of the seat bottom relative to some seat supporting structure.

C. Thermometer Temperature Compensation

In previous applications, the speed of sound has been determined by measuring the time it takes the sound to travel from one transducer to another. This is successful only if the second transducer can hear the particular frequency being sent by the first transducer. It can be fooled if an object partially obstructs the path from the one transducer to the other creating a second path for the sound to travel. The speed of sound is primarily a function of the temperature of the air. From about −40° C. to 85° C., the speed of sound changes by about 24%. The speed of sound is also affected by humidity, however, this effect is considerably smaller. It is not affected by barometric pressure except to the extent that the temperature is affected. In going from 0% to 100% relative humidity at about 40° C., the speed of sound changes by less than about 1.5%. Thus, it is clear that the temperature is the dominant consideration in this system. The percentage 1.5% represents about 3 centimeters for a target at about 1 meter which is below the accuracy of the ultrasonic system. For these reasons, temperature compensation is all that is required and that can be handled in some cases by placing a temperature sensor on the electronic circuit board and measuring the temperature directly, thereby avoiding the multipath effect.

One problem with measuring the temperature on the printed circuit board, however, is that that temperature may not be representative of the air temperature within the vehicle passenger compartment. An alternate and preferred method is to use a characteristic of each of the transducers which changes with temperature as a measurement of the temperature at the transducer. Since the transducers are generally not in a box with other electronic circuitry, they should have a temperature which is an approximation of the surrounding air temperature. Of the three properties which have been identified as varying with temperature and which are easily measured, capacitance, inductance and resonant frequency, the resonant frequency is the easiest to determine and is thus the preferred method as described above although the measure of the capacitance is also practical.

D. Electromagnetic Thermal Compensation

Generally, the examples provided above have focused on compensating for thermal gradients which affect ultrasonic waves. It is to be understood however that the same techniques can be used to compensate for thermal gradients which affect other types of waves such as electromagnetic waves (optics). Thermal gradients adversely affect optics (e.g., create mirages) but typically do so to a lesser extent than they affect ultrasonic waves.

For example, an optical system used in a vehicle, in the same manner as an ultrasonic system is used as discussed in detail above, may include a high dynamic range camera (HDRC). HDRC's are known devices to those skilled in the art. In accordance with the invention, the HDRC can be coupled to a log compression amplifier so that the log compression amplifier amplifies some electromagnetic waves received by the HDRC relative to others. Thus, in this embodiment, the log compression amplifier would compensate for thermal instability affecting the propagation of electromagnetic waves within the vehicle interior. Some HDRC cameras are already designed to have this log compression built in such as one developed by Fraunhofer-Inst. of Microelectron. Circuits & Systems in Duisburg, Germany. An alternate approach using a combination of spatially varying images is described in International Application No. WO 00/79784 assigned to Columbia University.

Although the above discussion has centered on the front passenger seat, it is obvious that the same or similar apparatus can be used for the driver seat as well as the rear seats. Although attention has been focused of frontal protection airbags, again the apparatus can be applied to solving similar problems in side and rear impacts and to control the deployment of other occupant restraints in addition to airbags. Thus, to reiterate some of the more novel features of the invention, this application discloses: (1) the use of a tubular mounting structure for the transducers; (2) the use of electronic reduction or suppression of transducer ringing; (3) the use of mechanical damping of the transducer cone, all three of which permits the use of a single transducer for both sending and receiving; (4) the use of a shaped horn to control the pattern of ultrasound; (5) the use of the resonant frequency monitoring principle to permit speed of sound compensation; (6) the use of multiple frequencies with sufficient spacing to isolate the signals from each other; (7) the ability to achieve a complete neural network update using four transducers every 10 to 20 milliseconds; (8) the ability to package the transducer and tube into a small package due to the ability to use a small diameter tube for transmission with minimal signal loss; (9) the use of a logarithmic compression amplifier to minimize the effects of thermal gradients in the vehicle; and (10) the significant cost reduction and performance improvement which results from the applications of the above principles. To the extent possible, the foregoing features can be used in combination with one another.

Thus, disclosed above is a method and apparatus for use in a system to identify, locate and/or monitor occupants, including their parts, and other objects in the passenger compartment and in particular a child seat in the rear facing position or an out-of-position occupant in which the contents of the vehicle are irradiated with ultrasonic radiation, e.g., by transmitting ultrasonic radiation waves from an ultrasonic wave generating apparatus, and ultrasonic radiation is received using at least one ultrasonic transducer properly located in the vehicle passenger compartment, and in specific predetermined optimum locations. The ultrasonic radiation is reflected from any objects in the passenger compartment. More particularly, at least one of the inventions disclosed herein relates to methods and apparatus for enabling a single ultrasonic transducer to be used for both sending and receiving ultrasonic waves, to provide temperature compensation for a system using an ultrasonic transducer, to reduce the effects of thermal gradients on the accuracy of a system using an ultrasonic transducer, for enabling all of a plurality of ultrasonic transducers to send and receive data (waves) simultaneously, for enabling precise control of the radiated pattern of ultrasound waves, in order to achieve a speed, cost and accuracy of recognition heretofore not possible. Outputs from the ultrasonic receivers, are analyzed by appropriate computational means employing trained pattern recognition technologies, to classify, identify and/or locate the contents, and/or determine the orientation of a rear facing child seat, for example. In general, the information obtained by the identification and monitoring system is used to affect the operation of some other system in the vehicle and particularly the passenger and/or driver airbag systems, which may include a front airbag, a side airbag, a knee bolster, or combinations of the same. However, the information obtained can be used for a multitude of other vehicle systems.

1.2 Optics

Figure 4:
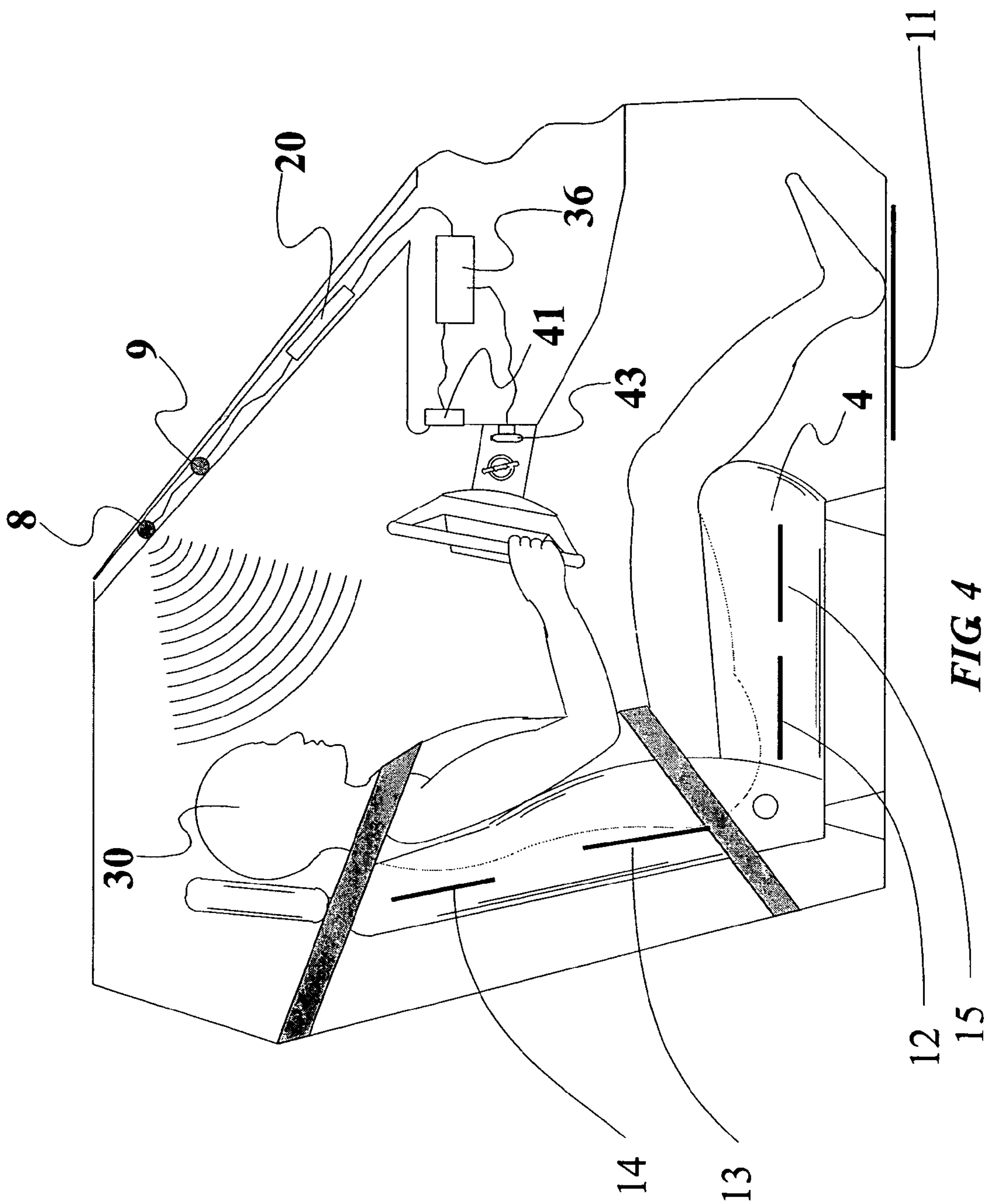
FIG. 4 is a side view with parts cutaway and removed of a vehicle showing the passenger compartment containing a driver and a preferred mounting location for an occupant identification system and including an antenna field sensor and an inattentiveness response button.

In FIG. 4, the ultrasonic transducers of the previous designs are replaced by laser transducers 8 and 9 which are connected to a microprocessor 20. In all other manners, the system operates the same. The design of the electronic circuits for this laser system is described in some detail in U.S. Pat. No. 5,653,462 and in particular FIG. 8 thereof and the corresponding description. In this case, a pattern recognition system such as a neural network system is employed and uses the demodulated signals from the laser transducers 8 and 9.

A more complicated and sophisticated system is shown conceptually in FIG. 5 where transmitter/receiver assembly 52 is illustrated. In this case, as described briefly above, an infrared transmitter and a pair of optical receivers are used to capture the reflection of the passenger. When this system is used to monitor the driver as shown in FIG. 5, with appropriate circuitry and a microprocessor, the behavior of the driver can be monitored. Using this system, not only can the position and velocity of the driver be determined and used in conjunction with an airbag system, but it is also possible to determine whether the driver is falling asleep or exhibiting other potentially dangerous behavior by comparing portions of his/her image over time. In this case, the speed of the vehicle can be reduced or the vehicle even stopped if this action is considered appropriate. This implementation has the highest probability of an unimpeded view of the driver since he/she must have a clear view through the windshield in order to operate the motor vehicle.

The output of microprocessor 20 of the monitoring system is shown connected schematically to a general interface 36 which can be the vehicle ignition enabling system; the entertainment system; the seat, mirror, suspension or other adjustment systems; telematics or any other appropriate vehicle system.

Figure 8A:
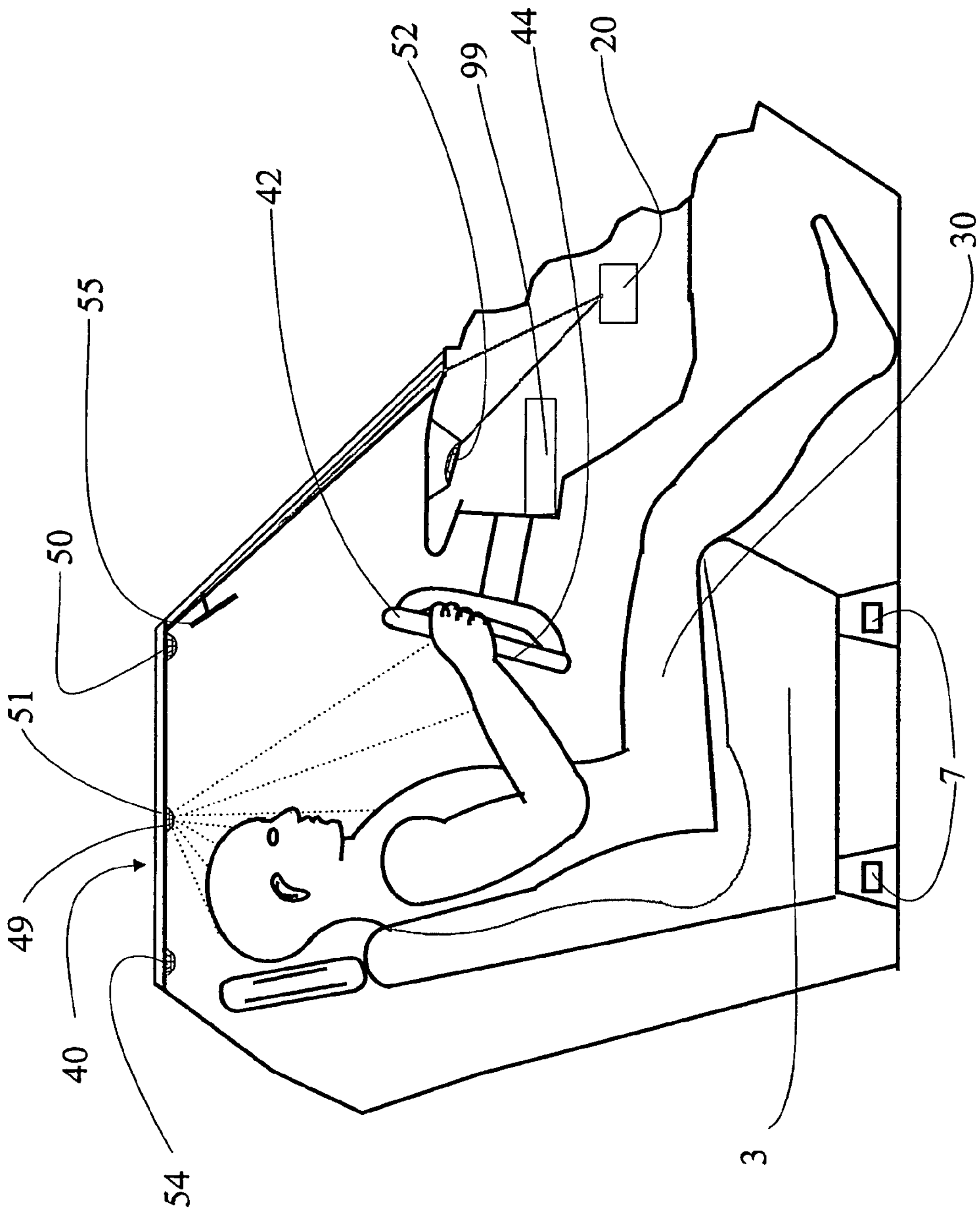
FIG. 8A is a side planar view, with certain portions removed or cut away, of a portion of the passenger compartment of a vehicle showing several preferred mounting locations of interior vehicle monitoring sensors shown particularly for sensing the vehicle driver illustrating the wave pattern from a CCD or CMOS optical position sensor mounted along the side of the driver or centered above his or her head.

FIG. 8A illustrates a typical wave pattern of transmitted infrared waves from transmitter/receiver assembly 49, which is mounted on the side of the vehicle passenger compartment above the front, driver's side door. Transmitter/receiver assembly 51, shown overlaid onto transmitter/receiver 49, is actually mounted in the center headliner of the passenger compartment (and thus between the driver's seat and the front passenger seat), near the dome light, and is aimed toward the driver. Typically, there will be a symmetrical installation for the passenger side of the vehicle. That is, a transmitter/receiver assembly would be arranged above the front, passenger side door and another transmitter/receiver assembly would be arranged in the center headliner, near the dome light, and aimed toward the front, passenger side door. Additional transducers can be mounted in similar places for monitoring both rear seat positions, another can be used for monitoring the trunk or any other interior volumes. As with the ultrasonic installations, most of the examples below are for automobile applications since these are generally the most complicated. Nevertheless, at least one of the inventions disclosed herein is not limited to automobile vehicles and similar but generally simpler designs apply to other vehicles such as shipping containers, railroad cars and truck trailers.

In a preferred embodiment, each transmitter/receiver assembly 49, 51 comprises an optical transducer, which may be a camera and an LED, that will frequently be used in conjunction with other optical transmitter/receiver assemblies such as shown at 50, 52 and 54, which act in a similar manner. In some cases, especially when a low cost system is used primarily to categorize the seat occupancy, a single or dual camera installation is used. In many cases, the source of illumination is not co-located with the camera. For example, in one preferred implementation, two cameras such as 49 and 51 are used with a single illumination source located at 49.

These optical transmitter/receiver assemblies frequently comprise an optical transmitter, which may be an infrared LED (or possibly a near infrared (NIR) LED), a laser with a diverging lens or a scanning laser assembly, and a receiver such as a CCD or CMOS array and particularly an active pixel CMOS camera or array or a HDRL or HDRC camera or array as discussed below. The transducer assemblies map the location of the occupant(s), objects and features thereof, in a two or three-dimensional image as will now be described in more detail.

Optical transducers using CCD arrays are now becoming price competitive and, as mentioned above, will soon be the technology of choice for interior vehicle monitoring. A single CCD array of 160 by 160 pixels, for example, coupled with the appropriate trained pattern recognition software, can be used to form an image of the head of an occupant and accurately locate the head, eyes, ears etc. for some of the purposes of at least one of the inventions disclosed herein.

The location or position of the occupant can be determined in various ways as noted and listed above and below as well. Generally, any type of occupant sensor can be used. Some particular occupant sensors which can be used in the systems and methods in accordance with the invention. Specifically, a camera or other device for obtaining images of a passenger compartment of the vehicle occupied by the occupant and analyzing the images can be mounted at the locations of the transmitter and/or receiver assemblies 49, 50, 51, and 54 in FIG. 8C. The camera or other device may be constructed to obtain three-dimensional images and/or focus the images on one or more optical arrays such as CCDs. Further, a mechanism for moving a beam of radiation through a passenger compartment of the vehicle occupied by the occupant, i.e., a scanning system, can be used. When using ultrasonic or electromagnetic waves, the time of flight between the transmission and reception of the waves can be used to determine the position of the occupant. The occupant sensor can also be arranged to receive infrared radiation from a space in a passenger compartment of the vehicle occupied by the occupant. It can also comprise an electric field sensor operative in a seat occupied by the occupant or a capacitance sensor operative in a seat occupied by the occupant. The implementation of such sensors in the invention will be readily appreciated by one skilled in the art in view of the disclosure herein of general occupant sensors for sensing the position of the occupant using waves, energy or radiation.

Figure 22:
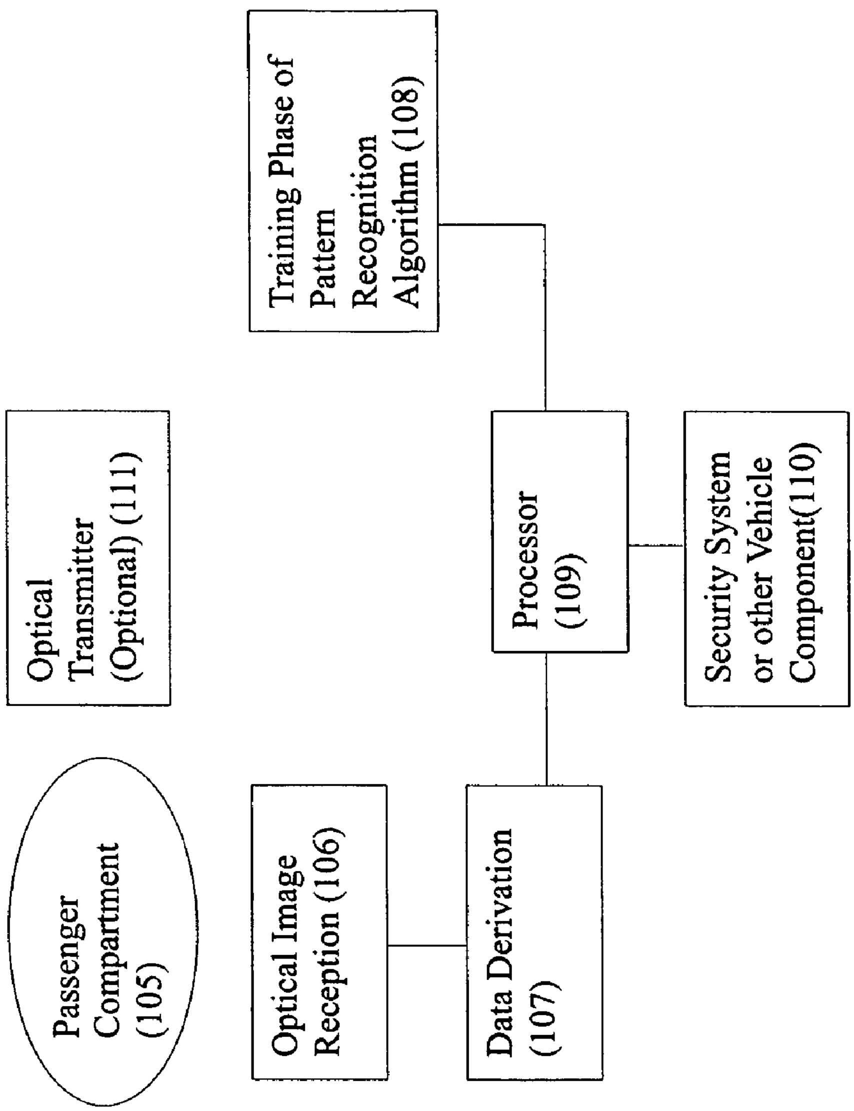
FIG. 22 is a schematic illustration of a system for controlling operation of a vehicle or a component thereof based on recognition of an authorized individual.

Looking now at FIG. 22, a schematic illustration of a system for controlling operation of a vehicle based on recognition of an authorized individual in accordance with the invention is shown. One or more images of the passenger compartment 105 are received at 106 and data derived therefrom at 107. Multiple image receivers may be provided at different locations. The data derivation may entail any one or more of numerous types of image processing techniques such as those described in U.S. Pat. No. 6,397,136 including those designed to improve the clarity of the image. A pattern recognition algorithm, e.g., a neural network, is trained in a training phase 108 to recognize authorized individuals. The training phase can be conducted upon purchase of the vehicle by the dealer or by the owner after performing certain procedures provided to the owner, e.g., entry of a security code or key. In the case of the operator of a truck or when such an operator takes possession of a trailer or cargo container, the identity of the operator can be sent by telematics to a central station for recording and perhaps further processing.

In the training phase for a theft prevention system, the authorized driver(s) would sit themselves in the driver or passenger seat and optical images would be taken and processed to obtain the pattern recognition algorithm. A processor 109 is embodied with the pattern recognition algorithm thus trained to identify whether a person is the authorized individual by analysis of subsequently obtained data derived from optical images. The pattern recognition algorithm in processor 109 outputs an indication of whether the person in the image is an authorized individual for which the system is trained to identify. A security system 110 enables operations of the vehicle when the pattern recognition algorithm provides an indication that the person is an individual authorized to operate the vehicle and prevents operation of the vehicle when the pattern recognition algorithm does not provide an indication that the person is an individual authorized to operate the vehicle.

Optionally, an optical transmitting unit 111 is provided to transmit electromagnetic energy into the passenger compartment, or other volume in the case of other vehicles, such that electromagnetic energy transmitted by the optical transmitting unit is reflected by the person and received by the optical image reception device 106.

As noted above, several different types of optical reception devices can be used including a CCD array, a CMOS array, focal plane array (FPA), Quantum Well Infrared Photodetector (QWIP), any type of two-dimensional image receiver, any type of three-dimensional image receiver, an active pixel camera and an HDRC camera.

The processor 109 can be trained to determine the position of the individuals included in the images obtained by the optical image reception device, as well as the distance between the optical image reception devices and the individuals.

Instead of a security system, another component in the vehicle can be affected or controlled based on the recognition of a particular individual. For example, the rear view mirror, seat, seat belt anchorage point, headrest, pedals, steering wheel, entertainment system, ride quality, air-conditioning/ventilation system can be adjusted.

Figure 24:
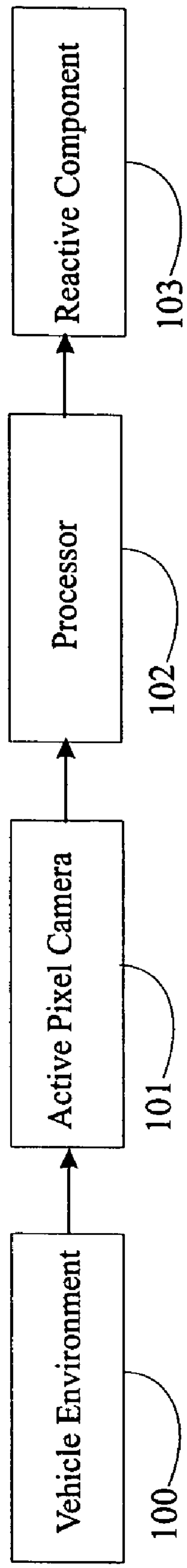
FIG. 24 is a schematic illustration of the environment monitoring in accordance with the invention.

FIG. 24 shows the components of the manner in which an environment of the vehicle, designated 100, is monitored. The environment may either be an interior environment (car, trailer, truck, shipping container, railroad car), the entire passenger compartment or only a part thereof, or an exterior environment. An active pixel camera 101 obtains images of the environment and provides the images or a representation thereof, or data derived therefrom, to a processor 102. The processor 102 determines at least one characteristic of an object in the environment based on the images obtained by the active pixel camera 101, e.g., the presence of an object in the environment, the type of object in the environment, the position of an object in the environment, the motion of an object in the environment and the velocity of an object in the environment. The environment can be any vehicle environment. Several active pixel cameras can be provided, each focusing on a different area of the environment, although some overlap is desired. Instead of an active pixel camera or array, a single light-receiving pixel can be used in some cases.

Systems based on ultrasonics and neural networks have been very successful in analyzing the seated-state of both the passenger and driver seats of automobiles. Such systems are now going into production for preventing airbag deployment when a rear facing child seat or and out-of-position occupant is present. The ultrasonic systems, however, suffer from certain natural limitations that prevent system accuracy from getting better than about 99 percent. These limitations relate to the fact that the wavelength of ultrasound is typically between 3 mm and 8 mm. As a result, unexpected results occur which are due partially to the interference of reflections from different surfaces. Additionally, commercially available ultrasonic transducers are tuned devices that require several cycles before they transmit significant energy and similarly require several cycles before they effectively receive the reflected signals. This requirement has the effect of smearing the resolution of the ultrasound to the point that, for example, using a conventional 40 kHz transducer, the resolution of the system is approximately three inches.

In contrast, the wavelength of near infrared is less than one micron and no significant interferences occur. Similarly, the system is not tuned and therefore is theoretically sensitive to a very few cycles. As a result, resolution of the optical system is determined by the pixel spacing in the CCD or CMOS arrays. For this application, typical arrays have been chosen to be 100 pixels by 100 pixels and therefore the space being imaged can be broken up into pieces that are significantly less than 1 cm in size. Naturally, if greater resolution is required arrays having larger numbers of pixels are readily available. Another advantage of optical systems is that special lenses can be used to magnify those areas where the information is most critical and operate at reduced resolution where this is not the case. For example, the area closest to the at-risk zone in front of the airbag can be magnified.

To summarize, although ultrasonic neural network systems are operating with high accuracy, they do not totally eliminate the problem of deaths and injuries caused by airbag deployments. Optical systems, on the other hand, at little or no increase in cost, have the capability of virtually 100 percent accuracy. Additional problems of ultrasonic systems arise from the slow speed of sound and diffraction caused by variations is air density. The slow sound speed limits the rate at which data can be collected and thus eliminates the possibility of tracking the motion of an occupant during a high speed crash.

In an embodiment wherein electromagnetic energy is used, it is to be appreciated that any portion of the electromagnetic signals that impinges upon a body portion of the occupant is at least partially absorbed by the body portion. Sometimes, this is due to the fact that the human body is composed primarily of water, and that electromagnetic energy at certain frequencies can be readily absorbed by water. The amount of electromagnetic signal absorption is related to the frequency of the signal, and size or bulk of the body portion that the signal impinges upon. For example, a torso of a human body tends to absorb a greater percentage of electromagnetic energy as compared to a hand of a human body for some frequencies.

Thus, when electromagnetic waves or energy signals are transmitted by a transmitter, the returning waves received by a receiver provide an indication of the absorption of the electromagnetic energy. That is, absorption of electromagnetic energy will vary depending on the presence or absence of a human occupant, the occupant's size, bulk, etc., so that different signals will be received relating to the degree or extent of absorption by the occupying item on a seat or elsewhere in the vehicle. The receiver will produce a signal representative of the returned waves or energy signals which will thus constitute an absorption signal as it corresponds to the absorption of electromagnetic energy by the occupying item in the seat.

Another optical infrared transmitter and receiver assembly is shown generally at 52 in FIG. 5 and is mounted onto the instrument panel facing the windshield. Although not shown in this view, reference 52 consists of three devices, one transmitter and two receivers, one on each side of the transmitter. In this case, the windshield is used to reflect the illumination light, and also the light reflected back by the driver, in a manner similar to the "heads-up" display which is now being offered on several automobile models. The "heads-up" display, of course, is currently used only to display information to the driver and is not used to reflect light from the driver to a receiver. In this case, the distance to the driver is determined stereoscopically through the use of the two receivers. In its most elementary sense, this system can be used to measure the distance between the driver and the airbag module. In more sophisticated applications, the position of the driver, and particularly of the driver's head, can be monitored over time and any behavior, such as a drooping head, indicative of the driver falling asleep or of being incapacitated by drugs, alcohol or illness can be detected and appropriate action taken. Other forms of radiation including visual light, radar, terahertz and microwaves as well as high frequency ultrasound could also be used by those skilled in the art.

A passive infrared system could be used to determine the position of an occupant relative to an airbag or even to detect the presence of a human or other life form in a vehicle. Passive infrared measures the infrared radiation emitted by the occupant and compares it to the background. As such, unless it is coupled with an imager and a pattern recognition system, it can best be used to determine that an occupant is moving toward the airbag since the amount of infrared radiation would then be increasing. Therefore, it could be used to estimate the velocity of the occupant but not his/her position relative to the airbag, since the absolute amount of such radiation will depend on the occupant's size, temperature and clothes as well as on his position. When passive infrared is used in conjunction with another distance measuring system, such as the ultrasonic system described above, the combination would be capable of determining both the position and velocity of the occupant relative to the airbag. Such a combination would be economical since only the simplest circuits would be required. In one implementation, for example, a group of waves from an ultrasonic transmitter could be sent to an occupant and the reflected group received by a receiver. The distance to the occupant would be proportional to the time between the transmitted and received groups of waves and the velocity determined from the passive infrared system. This system could be used in any of the locations illustrated in FIG. 5 as well as others not illustrated including truck trailers and cargo containers.

Recent advances in Quantum Well Infrared Photodetectors (QWIP) are particularly applicable here due to the range of frequencies that they can be designed to sense (3-18 microns) which encompasses the radiation naturally emitted by the human body. Currently, QWIPs need to be cooled and thus are not quite ready for vehicle applications. There are, however, longer wave IR detectors based of focal plane arrays (FPA) that are available in low resolution now. As the advantages of SWIR, MWIR and LWIR become more evident, devices that image in this part of the electromagnetic spectrum will become more available.

Passive infrared could also be used effectively in conjunction with a pattern recognition system. In this case, the passive infrared radiation emitted from an occupant can be focused onto a QWIP or FPA or even a CCD array, in some cases, and analyzed with appropriate pattern recognition circuitry, or software, to determine the position of the occupant. Such a system could be mounted at any of the preferred mounting locations shown in FIG. 5 as well as others not illustrated.

Lastly, it is possible to use a modulated scanning beam of radiation and a single pixel receiver, PIN or avalanche diode, in the inventions described above. Any form of energy or radiation used above may also be in the infrared or radar spectrums and may be polarized and filters may be used in the receiver to block out sunlight etc. These filters may be notch filters and may be made integral with the lens as one or more coatings on the lens surface as is well known in the art. Note, in many applications, this may not be necessary as window glass blocks all IR except the near IR.

For some cases, such as a laser transceiver that may contain a CMOS array, CCD, PIN or avalanche diode or other light sensitive devices, a scanner is also required that can be either solid state as in the case of some radar systems based on a phased array, an acoustical optical system as is used by some laser systems, or a mirror or MEMS based reflecting scanner, or other appropriate technology.

Figure 25:
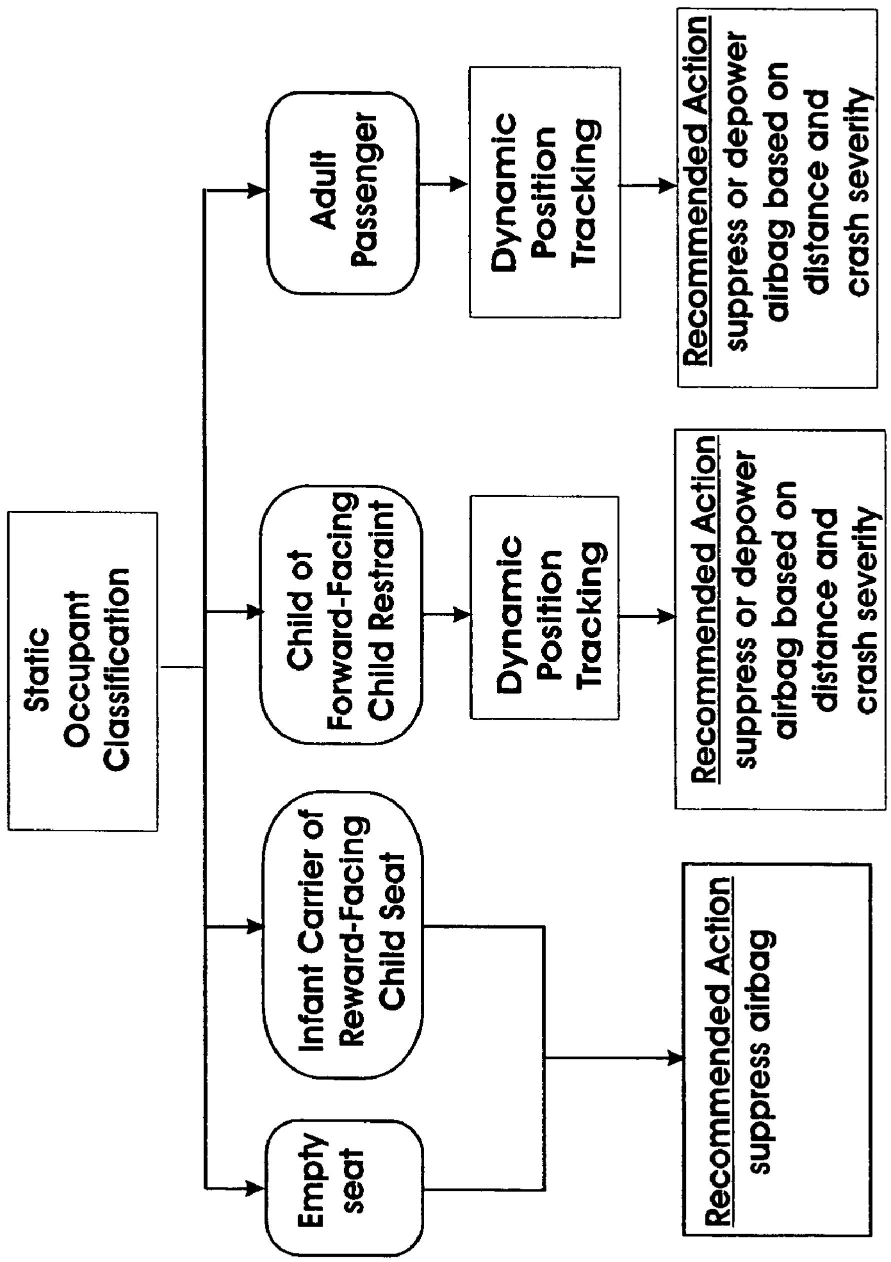
FIG. 25 is a diagram showing an example of an occupant sensing strategy for a single camera optical system.

An optical classification system using a single or dual camera design will now be discussed, although more than two cameras can also be used in the system described below. The occupant sensing system should perform occupant classification as well as position tracking since both are critical information for making decision of airbag deployment in an auto accident. For other purposes such as container or truck trailer monitoring generally only classification is required. FIG. 25 shows a preferred occupant sensing strategy. Occupant classification may be done statically since the type of occupant does not change frequently. Position tracking, however, has to be done dynamically so that the occupant can be tracked reliably during pre-crash braking situations. Position tracking should provide continuous position information so that the speed and the acceleration of the occupant can be estimated and a prediction can be made even before the next actual measurement takes place.

Figure 26:
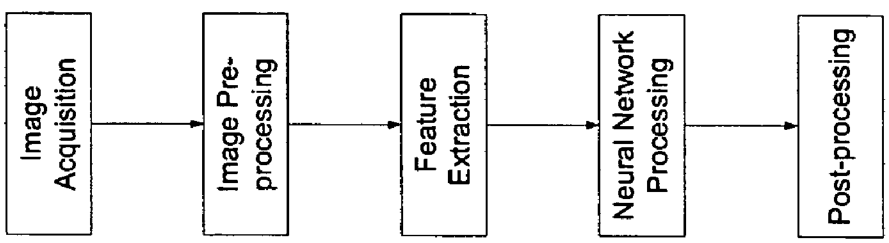
FIG. 26 is a processing block diagram of the example of FIG. 25.

The current assignee has demonstrated that occupant classification and dynamic position tracking can be done with a stand-alone optical system that uses a single camera. The same image information is processed in a similar fashion for both classification and dynamic position tracking. As shown in FIG. 26, the whole process can involve five steps: image acquisition, image preprocessing, feature extraction, neural network processing, and post-processing. These steps will now be discussed.

Step-1 image acquisition is to obtain the image from the imaging hardware. The imaging hardware main components may include one or more of the following image acquisition devices, a digital CMOS camera, a high-power near-infrared LED, and the LED control circuit. A plurality of such image acquisition devices can be used. This step also includes image brightness detection and LED control for illumination. Note that the image brightness detection and LED control do not have to be performed for every frame. For example, during a specific interval, the ECU can turn the LED ON and OFF and compare the resulting images. If the image with LED ON is significantly brighter, then it is identified as nighttime condition and the LED will remain ON; otherwise, it is identified as daytime condition and the LED can remain OFF.

Step-2 image preprocessing performs such activities as removing random noise and enhancing contrast. Under daylight condition, the image contains unwanted contents because the background is illuminated by sunlight. For example, the movement of the driver, other passengers in the backseat, and the scenes outside the passenger window can interfere if they are visible in the image. Usually, these unwanted contents cannot be completely eliminated by adjusting the camera position, but they can be removed by image preprocessing. This process is much less complicated for some vehicle monitoring cases such as trailer and cargo containers where sunlight is rarely a problem.

Step-3 feature extraction compresses the data from, for example, the 76,800 image pixels in the prototype camera to only a few hundred floating-point numbers, which may be based of edge detection algorithms, while retaining most of the important information. In this step, the amount of the data is significantly reduced so that it becomes possible to process the data using neural networks in Step-4.

There are many methods to extract information from an image for the purposes herein. One preferred method is to extract information as to the location of the edges of an object and then to input this information into a pattern recognition algorithm. As will be discussed below, the location and use of the edges of an occupying item as features in an imager is an important contribution of the inventions disclosed herein for occupant or other object sensing and tracking in a vehicle.

Step-4, to increase the system learning capability and performance stability, modular or combination neural networks can be used with each module handling a different subtask (for example, to handle either daytime or nighttime condition, or to classify a specific occupant group).

Step-5 post-processing removes random noise in the neural network outputs via filtering. Besides filtering, additional knowledge can be used to remove some of the undesired changes in the neural network output. For example, it is impossible to change from an adult passenger to a child restraint without going through an empty-seat state or key-off. After post-processing, the final decision of classification is output to the airbag control module, or other system, and it is up to the automakers or vehicle owners or managers to decide how to utilize the information. A set of display LED's on the instrument panel provides the same information to the vehicle occupant(s).

If multiple images are acquired substantially simultaneously, each by a different image acquisition device, then each image can be processed in the manner above. A comparison of the classification of the occupant obtained from the processing of the image obtained by each image acquisition device can be performed to ascertain any variations. If there are no variations, then the classification of the occupant is likely to be very accurate. However, in the presence of variations, then the images can be discarded and new images acquired until variations are eliminated.

A majority approach might also be used. For example, if three or more images are acquired by three different cameras, or other imagers, then if two provide the same classification, this classification will be considered the correct classification. Alternately, all of the data from all of the images can be analyzed and together in one combined neural network or combination neural network.

Referring again to FIG. 25, after the occupant is classified from the acquired image or images, i.e., as an empty seat (classification 1), an infant carrier or an occupied rearward-facing child seat (classification 2), a child or occupied forward-facing child seat (classification 3) or an adult passenger (classification 4), additional classification may be performed for the purpose of determining a recommendation for control of a vehicular component such as an occupant restraint device.

For classifications 1 and 2, the recommendation is always to suppress deployment of the occupant restraint device. For classifications 3 and 4, dynamic position tracking is performed. This involves the training of neural networks or other pattern recognition techniques, one for each classification, so that once the occupant is classified, the particular neural network can be trained to analyze the dynamic position of that occupant will be used. That is, the data from acquired images will be input to the neural network to determine a recommendation for control of the occupant restraint device and also into the neural network for dynamic position tracking of an adult passenger when the occupant is classified as an adult passenger. The recommendation may be either a suppression of deployment, a depowered deployment or a full power deployment.

To additionally summarize, the system described can be a single or multiple camera or other imager system where the cameras are typically mounted on the roof or headliner of the vehicle either on the roof rails or center or other appropriate location. The source of illumination is typically one or more infrared LEDs and if infrared, the images are typically monochromic, although color can effectively be used when natural illumination is available. Images can be obtained at least as fast as 100 frames per second; however, slower rates are frequently adequate. A pattern recognition algorithmic system can be used to classify the occupancy of a seat into a variety of classes such as: (1) an empty seat; (2) an infant seat which can be further classified as rear or forward facing; (3) a child which can be further classified as in or out-of-position and (4) an adult which can also be further classified as in or out-of-position. Such a system can be used to suppress the deployment of an occupant restraint. If the occupant is further tracked so that his or her position relative to the airbag, for example, is known more accurately, then the airbag deployment can be tailored to the position of the occupant. Such tracking can be accomplished since the location of the head of the occupant is either known from the analysis or can be inferred due to the position of other body parts.

As will be discussed in more detail below, data and images from the occupant sensing system, which can include an assessment of the type and magnitude of injuries, along with location information if available, can be sent to an appropriate off-vehicle location such as an emergency medical system (EMS) receiver either directly by cell phone, for example, via a telematics system such as OnStar®, or over the internet if available in order to aid the service in providing medical assistance and to access the urgency of the situation. The system can additionally be used to identify that there are occupants in the vehicle that has been parked, for example, and to start the vehicle engine and heater if the temperature drops below a safe threshold or to open a window or operate the air conditioning in the event that the temperature raises to a temperature above a safe threshold. In both cases, a message can be sent to the EMS or other services by any appropriate method such as those listed above. A message can also be sent to the owner's beeper or PDA.

The system can also be used alone or to augment the vehicle security system to alert the owner or other person or remote site that the vehicle security has been breeched so as to prevent danger to a returning owner or to prevent a theft or other criminal act. As discussed elsewhere herein, one method of alerting the owner or another interested person is through a satellite communication with a service such a as Skybitz or equivalent. The advantage here is that the power required to operate the system can be supplied by a long life battery and thus the system can be independent of the vehicle power system.

As discussed above and below, other occupant sensing systems can also be provided that monitor the breathing or other motion of the driver, for example, including the driver's heartbeat, eye blink rate, gestures, direction or gaze and provide appropriate responses including the control of a vehicle component including any such components listed herein. If the driver is falling asleep, for example, a warning can be issued and eventually the vehicle directed off the road if necessary.

The combination of a camera system with a microphone and speaker allows for a wide variety of options for the control of vehicle components. A sophisticated algorithm can interpret a gesture, for example, that may be in response to a question from the computer system. The driver may indicate by a gesture that he or she wants the temperature to change and the system can then interpret a "thumbs up" gesture for higher temperature and a "thumbs down" gesture for a lower temperature. When it is correct, the driver can signal by gesture that it is fine. A very large number of component control options exist that can be entirely executed by the combination of voice, speakers and a camera that can see gestures. When the system does not understand, it can ask to have the gesture repeated, for example, or it can ask for a confirmation. Note, the presence of an occupant in a seat can even be confirmed by a word spoken by the occupant, for example, which can use a technology known as voice print if it is desired to identify the particular occupant.

It is also to be noted that the system can be trained to recognize essentially any object or object location that a human can recognize and even some that a human cannot recognize since the system can have the benefit of special illumination as discussed above. If desired, a particular situation such as the presence of a passenger's feet on the instrument panel, hand on a window frame, head against the side window, or even lying down with his or her head in the lap of the driver, for example, can be recognized and appropriate adjustments to a component performed.

Note, it has been assumed that the camera would be permanently mounted in the vehicle in the above discussion. This need not be the case and especially for some after-market products, the camera function can be supplied by a cell phone or other device and a holder appropriately (and removably) mounted in the vehicle.

Again the discussion above related primarily to sensing the interior of and automotive vehicle for the purposes of controlling a vehicle component such as a restraint system. When the vehicle is a shipping container then different classifications can be used depending on the objective. If it is to determine whether there is a life form moving within the container, a stowaway, for example, then that can be one classification. Another may be the size of a cargo box or whether it is moving. Still another may be whether there is an unauthorized entry in progress or that the door has been opened. Others include the presence of a particular chemical vapor, radiation, excessive temperature, excessive humidity, excessive shock, excessive vibration etc.

1.3 Ultrasonics and Optics

In some cases, a combination of an optical system such as a camera and an ultrasonic system can be used. In this case, the optical system can be used to acquire an image providing information as to the vertical and lateral dimensions of the scene and the ultrasound can be used to provide longitudinal information, for example.

A more accurate acoustic system for determining the distance to a particular object, or a part thereof, in the passenger compartment is exemplified by transducers 24 in FIG. 8E. In this case, three ultrasonic transmitter/receivers 24 are shown spaced apart mounted onto the A-pillar of the vehicle. Due to the wavelength, it is difficult to get a narrow beam using ultrasonics without either using high frequencies that have limited range or a large transducer. A commonly available 40 kHz transducer, for example, is about 1 cm. in diameter and emits a sonic wave that spreads at about a sixty-degree angle. To reduce this angle requires making the transducer larger in diameter. An alternate solution is to use several transducers and to phase the transmissions from the transducers so that they arrive at the intended part of the target in phase. Reflections from the selected part of the target are then reinforced whereas reflections from adjacent parts encounter interference with the result that the distance to the brightest portion within the vicinity of interest can be determined. A low-Q transducer may be necessary for this application.

By varying the phase of transmission from the three transducers 24, the location of a reflection source on a curved line can be determined. In order to locate the reflection source in space, at least one additional transmitter/receiver is required which is not co-linear with the others. The waves shown in FIG. 8E coming from the three transducers 24 are actually only the portions of the waves which arrive at the desired point in space together in phase. The effective direction of these wave streams can be varied by changing the transmission phase between the three transmitters 24.

A determination of the approximate location of a point of interest on the occupant can be accomplished by a CCD or CMOS array and appropriate analysis and the phasing of the ultrasonic transmitters is determined so that the distance to the desired point can be determined.

Although the combination of ultrasonics and optics has been described, it will now be obvious to others skilled in the art that other sensor types can be combined with either optical or ultrasonic transducers including weight sensors of all types as discussed below, as well as electric field, chemical, temperature, humidity, radiation, vibration, acceleration, velocity, position, proximity, capacitance, angular rate, heartbeat, radar, other electromagnetic, and other sensors.

1.3 SAW and Other Wireless Sensors in General 1.3.1 Antenna Considerations

Antennas are a very important aspect to SAW and RFID wireless devices such as can be used in tire monitors, seat monitors, weight sensors, child seat monitors, fluid level sensors and similar devices or sensors which monitor, detect, measure, determine or derive physical properties or characteristics of a component in or on the vehicle or of an area of the vehicle, as disclosed in the current assignee's granted patents and pending patent applications. In many cases, the location of a SAW or RFID device needs to be determined such as when such a device is used to locate the position of a movable item in or on a vehicle such as a seat. In other cases, the particular device from a plurality of similar devices, such as a tire pressure and/or temperature monitor that is reporting, needs to be identified. Thus, a combination of antennas can be used and the time or arrival, angle of arrival or similar method used to identify the reporting device.

Additionally, since the signal level from a SAW or RFID device is frequently low, various techniques can be used to improve the signal to noise ratio as described below. Finally, at the frequencies frequently used such as 433 MHz, the antennas can become large and methods are needed to reduce their size. These and other antenna considerations that can be used to improve the operation of SAW, RFID and similar wireless devices are described below.

1.3.1.1 Tire Information Determination

One method of maintaining a single central antenna assembly while interrogating all four tires on a conventional automobile, is illustrated in FIGS. 189A and 189B. An additional antenna can be located near the spare tire, which is not shown. It should be noted that the system described below is equally applicable for vehicles with more than more tires such as trucks.

A vehicle body is illustrated as 620 having four tires 621 and a centrally mounted four element, switchable directional antenna array 622. The four beams are shown schematically as 623 with an inactivated beam as 624 and the activated beam as 625. The road surface 626 supports the vehicle. An electronic control circuit, not shown, which may reside inside the antenna array housing 622 or elsewhere, alternately switches each of the four antennas of the array 622 which then sequentially, or in some other pattern, send RF signals to each of the four tires 621 and wait for the response from the RFID, SAW or similar tire pressure, temperature, acceleration and/or other property monitor arranged in connection with or associated with the tire 621. This represents a time domain multiple access system.

In another application, as illustrated in FIG. 190, the antennas of the array 622 transmit the RF signals simultaneously and space the returns through the use of a delay line in the circuitry from each antenna so that each return is spaced in time in a known manner without requiring that the antennas be switched. Another method is to offset the antenna array, as illustrated in FIG. 190, so that the returns naturally are spaced in time due to the different distances from the tires 621 to the antennas of the array 622. In this case, each signal will return with a different phase and can be separated by this difference in phase using methods known to those in the art.

In another application, not shown, two wide angle antennas can be used that each receives any four signals but each antenna receives each signal at a slightly different time and different amplitude permitting each signal to be separated by looking at the return from both antennas since, each signal will be received differently based on its angle of arrival.

Additionally, each SAW or RFID device can be designed to operate on a slightly different frequency and the antennas of the array 622 can be designed to send a chirp signal and the returned signals will then be separated in frequency, permitting the four signals to be separated. Alternately, the four antennas of the array 622 can each transmit an identification signal to permit separation. This identification can be a numerical number or the length of the SAW substrate, for example, can be random so that each property monitor has a slightly different delay built in which permits signal separation. The identification number can be easily achieved in RFID systems and, with some difficulty and added expense, in SAW systems. Other methods of separating the signals from each of the tires 621 will now be apparent to those skilled in the art.

Although mention is made of the determination of information about the tires, the same system can be used to determine the location of seats, the location of child seats when equipped with sensors, information about the presence of object or chemicals in vehicular compartments and the like.

1.3.1.2 Smart Antennas

A key to overcoming the critical shortcomings in today's wireless products is the cost-effective implementation of smart antenna technology. A smart antenna is a multi-element antenna that significantly improves reception by intelligently combining the signals received at each antenna element and adjusting the antenna characteristics to optimize performance as the user moves and the environment changes.

Smart antennas can suppress interfering signals, combat signal fading and increase signal range-thereby increasing the performance and capacity of wireless systems.

Another subtle method of separating signals from multiple tires is to use a smart antenna such as that manufactured by Motia which at 433 MHz mitigates the multipath signals. The signals returning to the antennas from the tires contain some multipath effects that, especially if the antennas are offset somewhat from the vehicle center, are different for each wheel. Since the adaptive formula will differ for each wheel, the signals can be separated (see "enhancing 802.11 WLANs through Smart Antennas", January 2004). This white paper is available from the Motia web site (www.motia.com). The following is taken from that paper.

"A key enabler to overcome these critical product shortcomings in today's legacy products is cost-effective implementation of adaptive smart antenna array technology. Antenna arrays can provide gain, combat multipath fading, and suppress interfering signals, thereby increasing both the performance and capacity of wireless systems. Smart antennas have been implemented in a wide variety of wireless systems, where they have been demonstrated to provide a large performance improvement. However, the various types of spatial processing techniques have different advantages and disadvantages in each type of system."

"This strategy permits the seamless integration of smart antenna technology with today's legacy WLAN chipset architecture. Since the 802.11 system uses time division duplexing (the same frequency is used for transmit and receive), smart antennas can be used for both transmit and receive, providing a gain on both uplink and downlink, using smart antennas on either the client or access point alone. Results show a 13 dB gain with a four element smart antenna over a single antenna system with the smart antenna on one side only, and an 18 dB gain with the smart antenna on both the client and access point. Thus, this "plug-and-play" adaptive array technology can provide greater range, average data rate increases per user, and better overall coverage.

"In the multibeam or phased array antenna, a beamformer forms several narrow beams, and a beam selector chooses the beam for reception that has the largest signal power. In the adaptive array, the signal is received by several antenna elements, each with similar antenna patterns, and the received signals are weighted and combined to form the output signal. The multibeam antenna is simpler to implement as the beamformer is fixed, with the beam selection only needed every few seconds for user movement, while the adaptive array must calculate the complex beamforming weights at least an order of magnitude faster than the fading rate, which can be several Hertz for pedestrian users.

"Finally, there is pattern diversity, the use of antenna elements with different patterns. The combination of these types of diversity permits the use of a large number of antennas even in a small form factor, such as a PCMCIA card or handset, with near ideal performance."

Although the DLM is being applied to several communication applications, it has yet to be applied to the monitoring applications as disclosed in the current assignee's granted patents and pending patent applications, all of which are incorporated by reference herein. The antenna gain that results and the ability to pack several antennas into a small package are attractive features of this technology.

Through its adaptive beamforming technology, Motia has developed cost-effective smart antenna appliques that vastly improve wireless performance in a wide variety of wireless applications including Wi-Fi that can be incorporated into wireless systems without major modifications to existing products. Although the Motia chipset has been applied to several communication applications, it has yet to be applied to the monitoring applications as disclosed in the current assignee's granted patents and pending patent applications, and in particular vehicular monitoring applications.

1.3.1.3 Distributed load Monopole

Recent antenna developments in the physics department at the University of Rhode Island have resulted in a new antenna technology. The antennas developed called DLM's (Distributed loaded monopole) are small efficient, wide bandwidth antennas. The simple design exhibits 50-ohm impedance and is easy to implement. They require only a direct feed from a coax cable and require no elaborate matching networks.

The prime advantage to this technology is a substantial reduction of the size of an antenna. Typically, the DLM antenna is about ⅓ the size of a normal dipole with only minor loss in efficiency. This is especially important for vehicle applications where space is always at a premium. Such antennas can be used for a variety of vehicle radar and communication applications as well for the monitoring of RFID, SAW and similar devices on a vehicle and especially for tire pressure, temperature, and/or acceleration monitoring as well as other monitoring purposes.

1.3.1.4 Plasma Antenna

The following disclosure was taken from "Markland Technologies—Gas Plasma": "Plasma antenna technology employs ionized gas enclosed in a tube (or other enclosure) as the conducting element of an antenna. This is a fundamental change from traditional antenna design that generally employs solid metal wires as the conducting element. Ionized gas is an efficient conducting element with a number of important advantages. Since the gas is ionized only for the time of transmission or reception, "ringing" and associated effects of solid wire antenna design are eliminated. The design allows for extremely short pulses, important to many forms of digital communication and radars. The design further provides the opportunity to construct an antenna that can be compact and dynamically reconfigured for frequency, direction, bandwidth, gain and beamwidth. Plasma antenna technology will enable antennas to be designed that are efficient, low in weight and smaller in size than traditional solid wire antennas."

"When gas is electrically charged, or ionized to a plasma state it becomes conductive, allowing radio frequency (RF) signals to be transmitted or received. We employ ionized gas enclosed in a tube as the conducting element of an antenna. When the gas is not ionized, the antenna element ceases to exist. This is a fundamental change from traditional antenna design that generally employs solid metal wires as the conducting element. We believe our plasma antenna offers numerous advantages including stealth for military applications and higher digital performance in commercial applications. We also believe our technology can compete in many metal antenna applications."

"Initial studies have concluded that a plasma antenna's performance is equal to a copper wire antenna in every respect. Plasma antennas can be used for any transmission and/or modulation technique: continuous wave (CW), phase modulation, impulse, AM, FM, chirp, spread spectrum or other digital techniques. And the plasma antenna can be used over a large frequency range up to 20 GHz and employ a wide variety of gases (for example neon, argon, helium, krypton, mercury vapor and zenon). The same is true as to its value as a receive antenna."

"Plasma antenna technology has the following additional attributes:

- No antenna ringing provides an improved signal to noise ratio and reduces multipath signal distortion.
- Reduced radar cross section provides stealth due to the non-metallic elements.
- Changes in the ion density can result in instantaneous changes in bandwidth over wide dynamic ranges.
- After the gas is ionized, the plasma antenna has virtually no noise floor.
- While in operation, a plasma antenna with a low ionization level can be decoupled from an adjacent high-frequency transmitter.
- A circular scan can be performed electronically with no moving parts at a higher speed than traditional mechanical antenna structures.
- It has been mathematically illustrated that by selecting the gases and changing ion density that the electrical aperture (or apparent footprint) of a plasma antenna can be made to perform on par with a metal counterpart having a larger physical size.
- Our plasma antenna can transmit and receive from the same aperture provided the frequencies are widely separated.
- Plasma resonance, impedance and electron charge density are all dynamically reconfigurable. Ionized gas antenna elements can be constructed and configured into an array that is dynamically reconfigurable for frequency, beamwidth, power, gain, polarization and directionality—on the fly.
- A single dynamic antenna structure can use time multiplexing so that many RF subsystems can share one antenna resource reducing the number and size of antenna structures.

For the purposes of this invention, several of the characteristics discussed above are of particular usefulness including the absence of ringing, the ability to turn the antenna off after transmission and then immediately back on for reception, the ability to send very short pulses, the ability to alter the directionality of the antenna and to sweep thereby allowing one antenna to service multiple devices such as tires and to know which tire is responding. Additional advantages include, smaller size, the ability to work with chirp, spread spectrum and other digital technologies, improved signal to noise ratio, wide dynamic range, circular scanning without moving parts, antenna sharing over differing frequencies, among others.

Some of the applications disclosed herein can use ultra wideband transceivers. UWB transceivers want to radiate most of it energy with its frequency centered around the physical length of the antenna. With the UWB connected to a plasma antenna, the center frequency of the UWB transceiver could be hoped or swept simultaneously.

A plasma antenna could solve the problem of multiple antennas by changing its electrical characteristic to match the function required—Time domain multiplexed. It could be used for high-gain antennas such as phase array, parabolic focus steering, log periodic, yogi, patch quadrafiler, etc. The antenna could serve as GPS, Ad-hoc (Car to Car) communication, collision avoidance, back up sensing, cruse control, highway judicial radar, toll identification and data communications.

Although the plasma antennas are being applied to several communication applications, they have yet to be applied to the monitoring applications as disclosed herein. The many advantages that result and the ability to pack several antenna functions into a small package are attractive features of this technology. Patents and applications that discuss plasma antennas include: U.S. Pat. No. 6,710,746, US20030160742 and U.S. Pat. No. 2,004,0130497.

1.3.1.5 Dielectric Antenna

A great deal of work is underway to make antennas from dielectric materials. In one case, the electric field that impinges on the dielectric is used to modulate a transverse electric light beam. In another case, the reduction of the speed of electro magnetic waves due to the dielectric constant is used to reduce the size of the antenna. It can be expected that developments in this area will affect the antennas used in cell phones as well as in RFID and SAW-based communication devices in the future.

1.3.1.6 Nanotube Antenna

Antennas made from carbon nanotubes are beginning to show promise of increasing the sensitivity of antennas and thus increasing the range for communication devices based on RFID, SAW or similar devices where the signal strength frequently limits the range of such devices. The use of these antennas can therefore be expected to be found in tire monitors, for example, in the near future.

Naturally combinations of the above antenna designs in many cases can benefit from the advantages of each type to add further improvements to the field. Thus this invention is not limited to any one of the above concepts nor is it limited to their use alone. Where feasible all combinations are contemplated herein.

1.3.1.7 Summary

Referring now to FIG. 189C, a general system for obtaining information about a vehicle or a component thereof or therein, includes multiple sensors 627 which may be arranged at specific locations on the vehicle, on specific components of the vehicle, on objects temporarily placed in the vehicle such as child seats, or on or in any other object in or on the vehicle about which information is desired. The sensors 627 may be SAW or RFID sensors or other sensors which generate a return signal upon the detection of a transmitted radio frequency signal. A multi-element antenna array 622 is mounted on the vehicle, in either a centrally location as shown in FIG. 189A or in an offset location as shown in FIG. 190, to provide the radio frequency signals which cause the sensors 627 to generate the return signals.

A control system 628 is coupled to the antenna array 622 and control the antennas in the array 622 to be operative as necessary to enable reception of return signals from the sensors 627. There are several ways for the control system 628 to control the array 622, including to cause the antennas to be alternately switched on in order to sequentially transmit the RF signals therefrom and receive the return signals from the sensors 627 and to cause the antennas to transmit the RF signals simultaneously and space the return signals from the sensors 627 via a delay line in circuitry from each antennas such that each return signal is spaced in time in a known manner without requiring switching of the antennas.

The control system 628 also processes the return signals to provide information about the vehicle or the component. The processing of the return signals can be any known processing including the use of pattern recognition techniques, neural networks, fuzzy systems and the like.

The antenna array 622 and control system 628 can be housed in a common antenna array housing 630.

Once the information about the vehicle or the component is known, it is directed to a display/telematics/adjustment unit 629 where the information can be displayed on a display 629 to the driver, sent to a remote location for analysis via a telematics unit 629 and/or used to control or adjust a component in the vehicle.

1.4 Other Transducers

In FIG. 4, the ultrasonic transducers of the previous designs can be replaced by laser or other electromagnetic wave transducers or transceivers 8 and 9, which are connected to a microprocessor 20. As discussed above, these are only illustrative mounting locations and any of the locations described herein are suitable for particular technologies. Also, such electromagnetic transceivers are meant to include the entire electromagnetic spectrum including from X-rays to low frequencies where sensors such as capacitive or electric field sensors including so called "displacement current sensors" as discussed in detail elsewhere herein, and the auto-tune antenna sensor also discussed herein operate.

Figure 27:
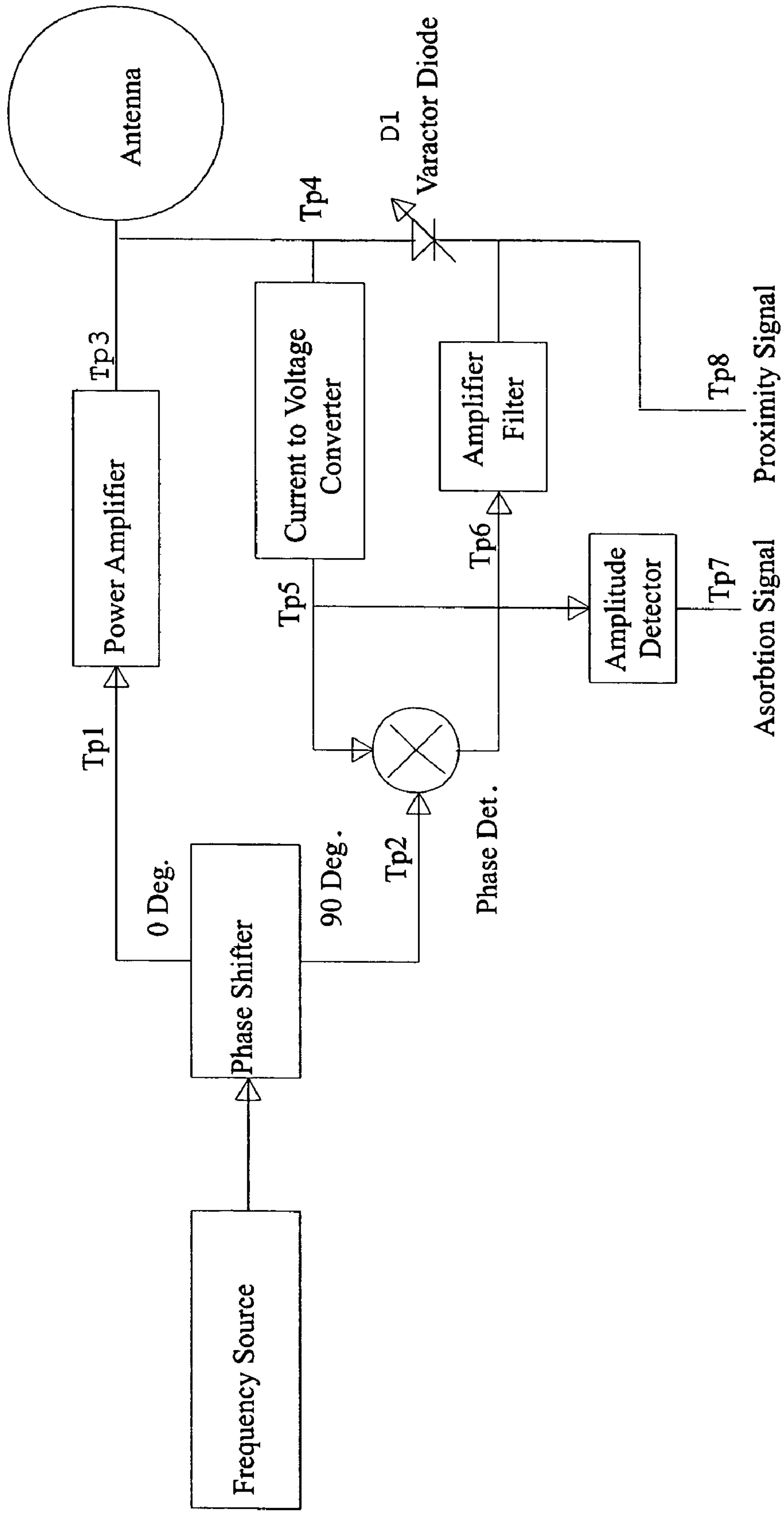
FIG. 27 is a block diagram of an antenna-based near field object discriminator.

A block diagram of an antenna based near field object detector is illustrated in FIG. 27. The circuit variables are defined as follows:

F=Frequency of operation Hz.

ω=2*π*F radians/second

α=Phase angle between antenna voltage and antenna current.

A, k1,k2,k3,k4 are scale factors, determined by system design.

Tp1-8 are points on FIG. 20.

Tp1=k1*Sin(ωt)

Tp2=k1*Cos(ωt) Reference voltage to phase detector

Tp3=k2*Sin(ωt) drive voltage to Antenna

Tp4=k3*Cos(ωt+δ) Antenna current

Tp5=k4*Cos(ωt+δ) Voltage representing Antenna current

Tp6=0.5ωt)Sin(ωT) Output of phase detector

Tp7=Absorption signal output

Tp8=Proximity signal output

In a tuned circuit, the voltage and the current are 90 degrees out of phase with each other at the resonant frequency. The frequency source supplies a signal to the phase shifter. The phase shifter outputs two signals that are out of phase by 90 degrees at frequency F. The drive to the antenna is the signal Tp3. The antenna can be of any suitable type such as dipole, patch, Yagi etc. When the signal Tp1 from the phase shifter has sufficient power, the power amplifier may be eliminated.

The antenna current is at Tp4, which is converted into a voltage since the phase detector requires a voltage drive. The output of the phase detector is Tp6, which is filtered and used to drive the varactor tuning diode D1. Multiple diodes may be used in place of diode D1. The phase detector, amplifier filter, varactor tuning diode D1 and current to voltage converter form a closed loop servo that keeps the antenna voltage and current in a 90-degree relationship at frequency F. The tuning loop maintains a 90-degree phase relationship between the antenna voltage and the antenna current. When an object such as a human comes near the antenna and attempts to detune it, the phase detector senses the phase change and adds or subtracts capacity by changing voltage to the varactor tuning diode D1 thereby maintaining resonance at frequency F.

The voltage Tp8 is an indication of the capacity of a nearby object. An object that is near the loop and absorbs energy from it, will change the amplitude of the signal at Tp5, which is detected and outputted to Tp7. The two signals Tp7 and Tp8 are used to determine the nature of the object near the antenna.

An object such as a human or animal with a fairly high electrical permittivity or dielectric constant and a relatively high loss dielectric property (high loss tangent) absorbs significant energy. This effect varies with the frequency used for the detection. If a human, who has a high loss tangent is present in the detection field, then the dielectric absorption causes the value of the capacitance of the object to change with frequency. For a human with high dielectric losses (high loss tangent), the decay with frequency will be more pronounced than for objects that do not present this high loss tangency. Exploiting this phenomenon makes it possible to detect the presence of an adult, child, baby, pet or other animal in the detection field.

An older method of antenna tuning used the antenna current and the voltage across the antenna to supply the inputs to a phase detector. In a 25 to 50 mw transmitter with a 50 ohm impedance, the current is small, it is therefore preferable to use the method described herein.

Note that the auto-tuned antenna sensor is preferably placed in the vehicle seat, headrest, floor, dashboard, headliner, or airbag module cover for an automotive vehicle. Seat mounted examples are shown at 12, 13, 14 and 15 in FIG. 4 and a floor mounted example at 11. In most other manners, the system operates the same. The geometry of the antenna system would differ depending on the vehicle to which it is applied and the intended purpose. Such a system, for example, can be designed to detect the entry of a person into a container or trailer through the door.

1.5 Circuits

There are several preferred methods of implementing the vehicle interior monitoring systems of at least one of the inventions disclosed herein including a microprocessor, an application specific integrated circuit system (ASIC), a system on a chip and/or an FPGA or DSP. These systems are represented schematically as 20 herein. In some systems, both a microprocessor and an ASIC are used. In other systems, most if not all of the circuitry is combined onto a single chip (system on a chip). The particular implementation depends on the quantity to be made and economic considerations. It also depends on time-to-market considerations where FPGA is frequently the technology of choice.

The design of the electronic circuits for a laser system is described in some detail in U.S. Pat. No. 5,653,462 and in particular FIG. 8 thereof and the corresponding description.

2. Adaptation

Let us now consider the process of adapting a system of occupant or object sensing transducers to a vehicle. For example, if a candidate system for an automobile consisting of eight transducers is considered, four ultrasonic transducers and four weight transducers, and if cost considerations require the choice of a smaller total number of transducers, it is a question of which of the eight transducers should be eliminated. Fortunately, the neural network technology discussed below provides a technique for determining which of the eight transducers is most important, which is next most important, etc. If the six most critical transducers are chosen, that is the six transducers which contain or provide the most useful information as determined by the neural network, a neural network can be trained using data from those six transducers and the overall accuracy of the system can be determined. Experience has determined, for example, that typically there is almost no loss in accuracy by eliminating two of the eight transducers, for example, two of the strain gage weight sensors. A slight loss of accuracy occurs when one of the ultrasonic transducers is then eliminated. In this manner, by the process of adaptation, the most cost effective system can be determined from a proposed set of sensors.

This same technique can be used with the additional transducers described throughout this disclosure. A transducer space can be determined with perhaps twenty different transducers comprised of ultrasonic, optical, electromagnetic, electric field, motion, heartbeat, weight, seat track, seatbelt payout, seatback angle and other types of transducers depending on the particular vehicle application. The neural network can then be used in conjunction with a cost function to determine the cost of system accuracy. In this manner, the optimum combination of any system cost and accuracy level can be determined.

System Adaptation involves the process by which the hardware configuration and the software algorithms are determined for a particular vehicle. Each vehicle model or platform will most likely have a different hardware configuration and different algorithms. Some of the various aspects that make up this process are as follows:

- The determination of the mounting location and aiming or orientation of the transducers. The determination of the transducer field angles or area or volume monitored
- The use of a combination neural network algorithm generating program such as available from International Scientific Research, Inc. to help generate the algorithms or other pattern recognition algorithm generation program. (as described below)
- The process of the collection of data in the vehicle, for example, for neural network training purposes.
- The method of automatic movement of the vehicle seats or other structures or objects etc. while data is collected
- The determination of the quantity of data to acquire and the setups needed to achieve a high system accuracy, typically several hundred thousand vectors or data sets.
- The collection of data in the presence of varying environmental conditions such as with thermal gradients.
- The photographing of each data setup.
- The makeup of the different databases and the use of typically three different databases.
- The method by which the data is biased to give higher probabilities for, e.g., forward facing humans.
- The automatic recording of the vehicle setup including seat, seat back, headrest, window, visor, armrest, and other object positions, for example, to help insure data integrity.
- The use of a daily setup to validate that the transducer configuration and calibration has not changed.
- The method by which bad data is culled from the database.

The inclusion of the Fourier transforms and other preprocessors of the data in the algorithm generation process if appropriate.

The use of multiple algorithm levels, for example, for categorization and position.

The use of multiple algorithms in parallel.

The use of post processing filters and the particularities of these filters.

The addition of fuzzy logic or other human intelligence based rules.

The method by which data errors are corrected using, for example, a neural network.

The use of a neural network generation program as the pattern recognition algorithm generating system, if appropriate.

The use of back propagation neural networks for training.

The use of vector or data normalization.

The use of feature extraction techniques, for ultrasonic systems for example, including:

The number of data points prior to a peak.

The normalization factor.

The total number of peaks.

The vector or data set mean or variance.

The use of feature extraction techniques, for optics systems for example, including:

Motion.

Edge detection.

Feature detection such as the eyes, head etc.

Texture detection.

Recognizing specific features of the vehicle.

Line subtraction—i.e., subtracting one line of pixels from the adjacent line with every other line illuminated. This works primarily only with rolling shutter cameras.

The equivalent for a snapshot camera is to subtract an artificially illuminated image from one that is illuminated only with natural light.

The use of other computational intelligence systems such as genetic algorithms

The use the data screening techniques.

The techniques used to develop stable networks including the concepts of old and new networks.

The time spent or the number of iterations spent in, and method of, arriving at stable networks.

The technique where a small amount of data is collected first such as 16 sheets followed by a complete data collection sequence.

The use of a cellular neural network for high speed data collection and analysis when electromagnetic transducers are used.

The use of a support vector machine.

The process of adapting the system to the vehicle begins with a survey of the vehicle model. Any existing sensors, such as seat position sensors, seat back sensors, door open sensors etc., are immediate candidates for inclusion into the system. Input from the customer will determine what types of sensors would be acceptable for the final system. These sensors can include: seat structure-mounted weight sensors, pad-type weight sensors, pressure-type weight sensors (e.g., bladders), seat fore and aft position sensors, seat-mounted capacitance, electric field or antenna sensors, seat vertical position sensors, seat angular position sensors, seat back position sensors, headrest position sensors, ultrasonic occupant sensors, optical occupant sensors, capacitive sensors, electric field sensors, inductive sensors, radar sensors, vehicle velocity and acceleration sensors, shock and vibration sensors, temperature sensors, chemical sensors, radiation sensors, brake pressure, seatbelt force, payout and buckle sensors accelerometers, gyroscopes, etc. A candidate array of sensors is then chosen and mounted onto the vehicle. At least one of the inventions disclosed herein contemplates final systems including any such sensors or combinations of such sensors, where appropriate, for the monitoring of the interior and/or exterior of any vehicle as the term is defined above.

The vehicle can also be instrumented so that data input by humans is minimized. Thus, the positions of the various components in the vehicle such as the seats, windows, sun visor, armrest, etc. are automatically recorded where possible. Also, the position of the occupant while data is being taken is also recorded through a variety of techniques such as direct ultrasonic ranging sensors, optical ranging sensors, radar ranging sensors, optical tracking sensors etc., where appropriate. Special cameras can also be installed to take one or more pictures of the setup to correspond to each vector of data collected or at some other appropriate frequency. Herein, a vector is used to represent a set of data collected at a particular epoch or representative of the occupant or environment of vehicle at a particular point in time.

A standard set of vehicle setups is chosen for initial trial data collection purposes. Typically, the initial trial will consist of between 20,000 and 100,000 setups, although this range is not intended to limit the invention.

Initial digital data collection now proceeds for the trial setup matrix. The data is collected from the transducers, digitized and combined to form to a vector of input data for analysis by a pattern recognition system such as a neural network program or combination neural network program. This analysis should yield a training accuracy of nearly 100%. If this is not achieved, then additional sensors are added to the system or the configuration changed and the data collection and analysis repeated. Note, in some cases the task is sufficiently simple that a neural network is not necessary, such as the determination that a trailer is not empty.

In addition to a variety of seating states for objects in the passenger compartment, for example, the trial database can also include environmental effects such as thermal gradients caused by heat lamps and the operation of the air conditioner and heater, or where appropriate lighting variations or other environmental variations that might affect particular transducer types. A sample of such a matrix is presented in FIGS. 82A-82H, with some of the variables and objects used in the matrix being designated or described in FIGS. 76-81D for automotive occupant sensing. A similar matrix can be generated for other vehicle monitoring applications such as cargo containers and truck trailers. After the neural network has been trained on the trial database, the trial database will be scanned for vectors that yield erroneous results (which would likely be considered bad data). A study of those vectors along with vectors from associated in time cases are compared with the photographs to determine whether there is erroneous data present. If so, an attempt is made to determine the cause of the erroneous data. If the cause can be found, for example if a voltage spike on the power line corrupted the data, then the vector will be removed from the database and an attempt is made to correct the data collection process so as to remove such disturbances.

At this time, some of the sensors may be eliminated from the sensor matrix. This can be determined during the neural network analysis, for example, by selectively eliminating sensor data from the analysis to see what the effect if any results. Caution should be exercised here, however, since once the sensors have been initially installed in the vehicle, it requires little additional expense to use all of the installed sensors in future data collection and analysis.

The neural network, or other pattern recognition system, that has been developed in this first phase can be used during the data collection in the next phases as an instantaneous check on the integrity of the new vectors being collected.

The next set of data to be collected when neural networks are used, for example, is the training database. This will usually be the largest database initially collected and will cover such setups as listed, for example, in FIGS. 24A-24H for occupant sensing. The training database, which may contain 500,000 or more vectors, will be used to begin training of the neural network or other pattern recognition system. In the foregoing description, a neural network will be used for exemplary purposes with the understanding that the invention is not limited to neural networks and that a similar process exists for other pattern recognition systems. At least one of the inventions disclosed herein is largely concerned with the use of pattern recognition systems for vehicle internal monitoring. The best mode is to use trained pattern recognition systems such as neural networks. While this is taking place, additional data will be collected according to FIGS. 78-80 and 83 of the independent and validation databases.

The training database is usually selected so that it uniformly covers all seated states that are known to be likely to occur in the vehicle. The independent database may be similar in makeup to the training database or it may evolve to more closely conform to the occupancy state distribution of the validation database. During the neural network training, the independent database is used to check the accuracy of the neural network and to reject a candidate neural network design if its accuracy, measured against the independent database, is less than that of a previous network architecture.

Although the independent database is not actually used in the training of the neural network, nevertheless, it has been found that it significantly influences the network structure or architecture. Therefore, a third database, the validation or real world database, is used as a final accuracy check of the chosen system. It is the accuracy against this validation database that is considered to be the system accuracy. The validation database is usually composed of vectors taken from setups which closely correlate with vehicle occupancy in real vehicles on the roadway or wherever they are used. Initially, the training database is usually the largest of the three databases. As time and resources permit, the independent database, which perhaps starts out with 100,000 vectors, will continue to grow until it becomes approximately the same size or even larger than the training database. The validation database, on the other hand, will typically start out with as few as 50,000 vectors. However, as the hardware configuration is frozen, the validation database will continuously grow until, in some cases, it actually becomes larger than the training database. This is because near the end of the program, vehicles will be operating on highways, ships, railroad tracks etc. and data will be collected in real world situations. If in the real world tests, system failures are discovered, this can lead to additional data being taken for both the training and independent databases as well as the validation database.

Once a neural network, or other pattern recognition system, has been trained or otherwise developed using all of the available data from all of the transducers, it is expected that the accuracy of the network will be very close to 100%. It is usually not practical to use all of the transducers that have been used in the training of the system for final installation in real production vehicle models. This is primarily due to cost and complexity considerations. Usually, the automobile manufacturer, or other customer, will have an idea of how many transducers would be acceptable for installation in a production vehicle. For example, the data may have been collected using 20 different transducers but the customer may restrict the final selection to 6 transducers. The next process, therefore, is to gradually eliminate transducers to determine what is the best combination of six transducers, for example, to achieve the highest system accuracy. Ideally, a series of neural networks, for example, would be trained using all combinations of six transducers from the 20 available. The activity would require a prohibitively long time. Certain constraints can be factored into the system from the beginning to start the pruning process. For example, it would probably not make sense to have both optical and ultrasonic transducers present in the same system since it would complicate the electronics. In fact, the customer may have decided initially that an optical system would be too expensive and therefore would not be considered. The inclusion of optical transducers, therefore, serves as a way of determining the loss in accuracy as a function of cost. Various constraints, therefore, usually allow the immediate elimination of a significant number of the initial group of transducers. This elimination and the training on the remaining transducers provides the resulting accuracy loss that results.

The next step is to remove each of the transducers one at a time and determine which sensor has the least effect on the system accuracy. This process is then repeated until the total number of transducers has been pruned down to the number desired by the customer. At this point, the process is reversed to add in one at a time those transducers that were removed at previous stages. It has been found, for example, that a sensor that appears to be unimportant during the early pruning process can become very important later on. Such a sensor may add a small amount of information due to the presence of various other transducers. Whereas the various other transducers, however, may yield less information than still other transducers and, therefore may have been removed during the pruning process. Reintroducing the sensor that was eliminated early in the cycle therefore can have a significant effect and can change the final choice of transducers to make up the system.

The above method of reducing the number of transducers that make up the system is but one of a variety approaches which have applicability in different situations. In some cases, a Monte Carlo or other statistical approach is warranted, whereas in other cases, a design of experiments approach has proven to be the most successful. In many cases, an operator conducting this activity becomes skilled and after a while knows intuitively what set of transducers is most likely to yield the best results. During the process it is not uncommon to run multiple cases on different computers simultaneously. Also, during this process, a database of the cost of accuracy is generated. The automobile manufacturer, for example, may desire to have the total of 6 transducers in the final system, however, when shown the fact that the addition of one or two additional transducers substantially increases the accuracy of the system, the manufacturer may change his mind. Similarly, the initial number of transducers selected may be 6 but the analysis could show that 4 transducers give substantially the same accuracy as 6 and therefore the other 2 can be eliminated at a cost saving.

While the pruning process is occurring, the vehicle is subjected to a variety of real world tests and would be subjected to presentations to the customer. The real world tests are tests that are run at different locations than where the fundamental training took place. It has been found that unexpected environmental factors can influence the performance of the system and therefore these tests can provide critical information. The system therefore, which is installed in the test vehicle, should have the capability of recording system failures. This recording includes the output of all of the transducers on the vehicle as well as a photograph of the vehicle setup that caused the error. This data is later analyzed to determine whether the training, independent or validation setups need to be modified and/or whether the transducers or positions of the transducers require modification.

Once the final set of transducers in some cases is chosen, the vehicle is again subjected to real world testing on highways, or wherever it is eventually to be used, and at customer demonstrations. Once again, any failures are recorded. In this case, however, since the total number of transducers in the system is probably substantially less than the initial set of transducers, certain failures are to be expected. All such failures, if expected, are reviewed carefully with the customer to be sure that the customer recognizes the system failure modes and is prepared to accept the system with those failure modes.

The system described so far has been based on the use of a single neural network or other pattern recognition system. It is frequently necessary and desirable to use combination neural networks, multiple neural networks, cellular neural networks or support vector machines or other pattern recognition systems. For example, for determining the occupancy state of a vehicle seat or other part of the vehicle, there may be at least two different requirements. The first requirement is to establish what is occupying the seat, for example, and the second requirement is to establish where that object is located. Another requirement might be to simply determine whether an occupying item warranting analysis by the neural networks is present. Generally, a great deal of time, typically many seconds, is available for determining whether a forward facing human or an occupied or unoccupied rear facing child seat, for example, occupies a vehicle seat. On the other hand, if the driver of the vehicle is trying to avoid an accident and is engaged in panic braking, the position of an unbelted occupant can be changing rapidly as he or she is moving toward the airbag. Thus, the problem of determining the location of an occupant is time critical. Typically, the position of the occupant in such situations must be determined in less than 20 milliseconds. There is no reason for the system to have to determine that a forward facing human being is in the seat while simultaneously determining where that forward facing human being is. The system already knows that the forward facing human being is present and therefore all of the resources can be used to determine the occupant's position. Thus, in this situation, a dual level or modular neural network can be advantageously used. The first level determines the occupancy of the vehicle seat and the second level determines the position of that occupant. In some situations, it has been demonstrated that multiple neural networks used in parallel can provide some benefit. This will be discussed in more detail below. Both modular and multiple parallel neural networks are examples of combination neural networks.

The data fed to the pattern recognition system will usually not be the raw vectors of data as captured and digitized from the various transducers. Typically, a substantial amount of preprocessing of the data is undertaken to extract the important information from the data that is fed to the neural network. This is especially true in optical systems and where the quantity of data obtained, if all were used by the neural network, would require very expensive processors. The techniques of preprocessing data will not be described in detail here. However, the preprocessing techniques influence the neural network structure in many ways. For example, the preprocessing used to determine what is occupying a vehicle seat is typically quite different from the preprocessing used to determine the location of that occupant. Some particular preprocessing concepts will be discussed in more detail below.

A pattern recognition system, such as a neural network, can sometimes make irrational decisions. This typically happens when the pattern recognition system is presented with a data set or vector that is unlike any vector that has been in its training set. The variety of seating states of a vehicle is unlimited. Every attempt is made to select from that unlimited universe a set of representative cases. Nevertheless, there will always be cases that are significantly different from any that have been previously presented to the neural network. The final step, therefore, to adapting a system to a vehicle, is to add a measure of human intelligence or common sense. Sometimes this goes under the heading of fuzzy logic and the resulting system has been termed in some cases, a neural fuzzy system. In some cases, this takes the form of an observer studying failures of the system and coming up with rules and that say, for example, that if transducer A perhaps in combination with another transducer produces values in this range, then the system should be programmed to override the pattern recognition decision and substitute therefor a human decision.

An example of this appears in R. Scorcioni, K. Ng, M. M. Trivedi, N. Lassiter; "MoNiF: A Modular Neuro-Fuzzy Controller for Race Car Navigation"; in Proceedings of the 1997 *IEEE Symposium on Computational Intelligence and Robotics Applications*, Monterey, Calif., USA July 1997, which describes the case of where an automobile was designed for autonomous operation and trained with a neural network, in one case, and a neural fuzzy system in another case. As long as both vehicles operated on familiar roads both vehicles performed satisfactorily. However, when placed on an unfamiliar road, the neural network vehicle failed while the neural fuzzy vehicle continued to operate successfully. Naturally, if the neural network vehicle had been trained on the unfamiliar road, it might very well have operated successful. Nevertheless, the critical failure mode of neural networks that most concerns people is this uncertainty as to what a neural network will do when confronted with an unknown state.

One aspect, therefore, of adding human intelligence to the system, is to ferret out those situations where the system is likely to fail. Unfortunately, in the current state-of-the-art, this is largely a trial and error activity. One example is that if the range of certain parts of vector falls outside of the range experienced during training, the system defaults to a particular state. In the case of suppressing deployment of one or more airbags, or other occupant protection apparatus, this case would be to enable airbag deployment even if the pattern recognition system calls for its being disabled. An alternate method is to train a particular module of a modular neural network to recognize good from bad data and reject the bad data before it is fed to the main neural networks.

The foregoing description is applicable to the systems described in the following drawings and the connection between the foregoing description and the systems described below will be explained below. However, it should be appreciated that the systems shown in the drawings do not limit the applicability of the methods or apparatus described above.

Figure 6A:
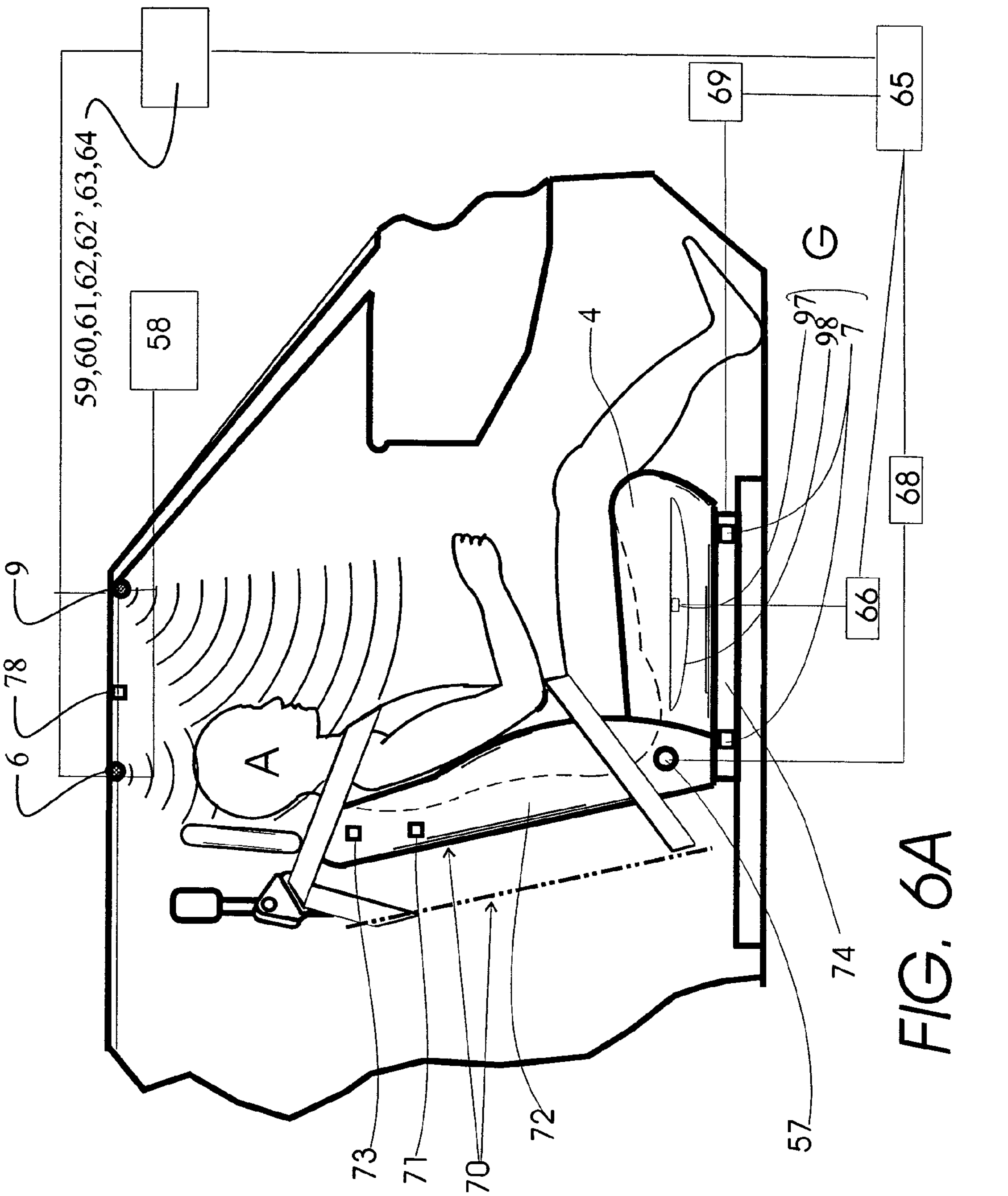
FIG. 6A is an illustration as in FIG. 6 with the replacement of a strain gage weight sensor within a cavity within the seat cushion for the bladder weight sensor of FIG. 6.

Referring again to FIG. 6, and to FIG. 6A which differs from FIG. 6 only in the use of a strain gage weight sensor mounted within the seat cushion, motion sensor 73 can be a discrete sensor that detects relative motion in the passenger compartment of the vehicle. Such sensors are frequently based on ultrasonics and can measure a change in the ultrasonic pattern that occurs over a short time period. Alternately, the subtracting of one position vector from a previous position vector to achieve a differential position vector can detect motion. For the purposes herein, a motion sensor will be used to mean either a particular device that is designed to detect motion for the creation of a special vector based on vector differences or a neural network trained to determine motion based on successive vectors.

An ultrasonic, optical or other sensor or transducer system 9 can be mounted on the upper portion of the front pillar, i.e., the A-Pillar, of the vehicle and a similar sensor system 6 can be mounted on the upper portion of the intermediate pillar, i.e., the B-Pillar. Each sensor system 6, 9 may comprise a transducer. The outputs of the sensor systems 6 and 9 can be input to a band pass filter 60 through a multiplex circuit 59 which can be switched in synchronization with a timing signal from the ultrasonic sensor drive circuit 58, for example, and then can be amplified by an amplifier 61. The band pass filter 60 removes a low frequency wave component from the output signal and also removes some of the noise. The envelope wave signal can be input to an analog/digital converter (ADC) 62 and digitized as measured data. The measured data can be input to a processing circuit 63, which can be controlled by the timing signal which can be in turn output from the sensor drive circuit 58. The above description applies primarily to systems based on ultrasonics and will differ somewhat for optical, electric field and other systems and for different vehicle types.

Each of the measured data can be input to a normalization circuit 64 and normalized. The normalized measured data can be input to the combination neural network (circuit) 65, for example, as wave data.

The output of the pressure or weight sensor(s) 7, 76 or 97 (see FIG. 6A) can be amplified by an amplifier 66 coupled to the pressure or weight sensor(s) 7, 76 and 97 and the amplified output can be input to an analog/digital converter and then directed to the neural network 65, for example, of the processor means. Amplifier 66 can be useful in some embodiments but it may be dispensed with by constructing the sensors 7, 76, 97 to provide a sufficiently strong output signal, and even possibly a digital signal. One manner to do this would be to construct the sensor systems with appropriate electronics.

The neural network 65 can be directly connected to the ADCs 68 and 69, the ADC associated with amplifier 66 and the normalization circuit 64. As such, information from each of the sensors in the system (a stream of data) can be passed directly to the neural network 65 for processing thereby. The streams of data from the sensors are usually not combined prior to the neural network 65 and the neural network 65 can be designed to accept the separate streams of data (e.g., at least a part of the data at each input node) and process them to provide an output indicative of the current occupancy state of the seat or of the vehicle. The neural network 65 thus includes or incorporates a plurality of algorithms derived by training in the manners discussed herein. Once the current occupancy state of the seat or vehicle is determined, it is possible to control vehicular components or systems, such as the airbag system or telematics system, in consideration of the current occupancy state of the seat or vehicle.

What follows now is a discussion of the methodology of adapting a monitoring system to an automotive vehicle for the purpose primarily of controlling a component such as a restraint system. This is one of the most complicated implementations of vehicle monitoring systems and serves as a good illustration of the methodology. Generally simpler systems are used for cargo container, truck trailer and other vehicle monitoring cases.

Figure 28:
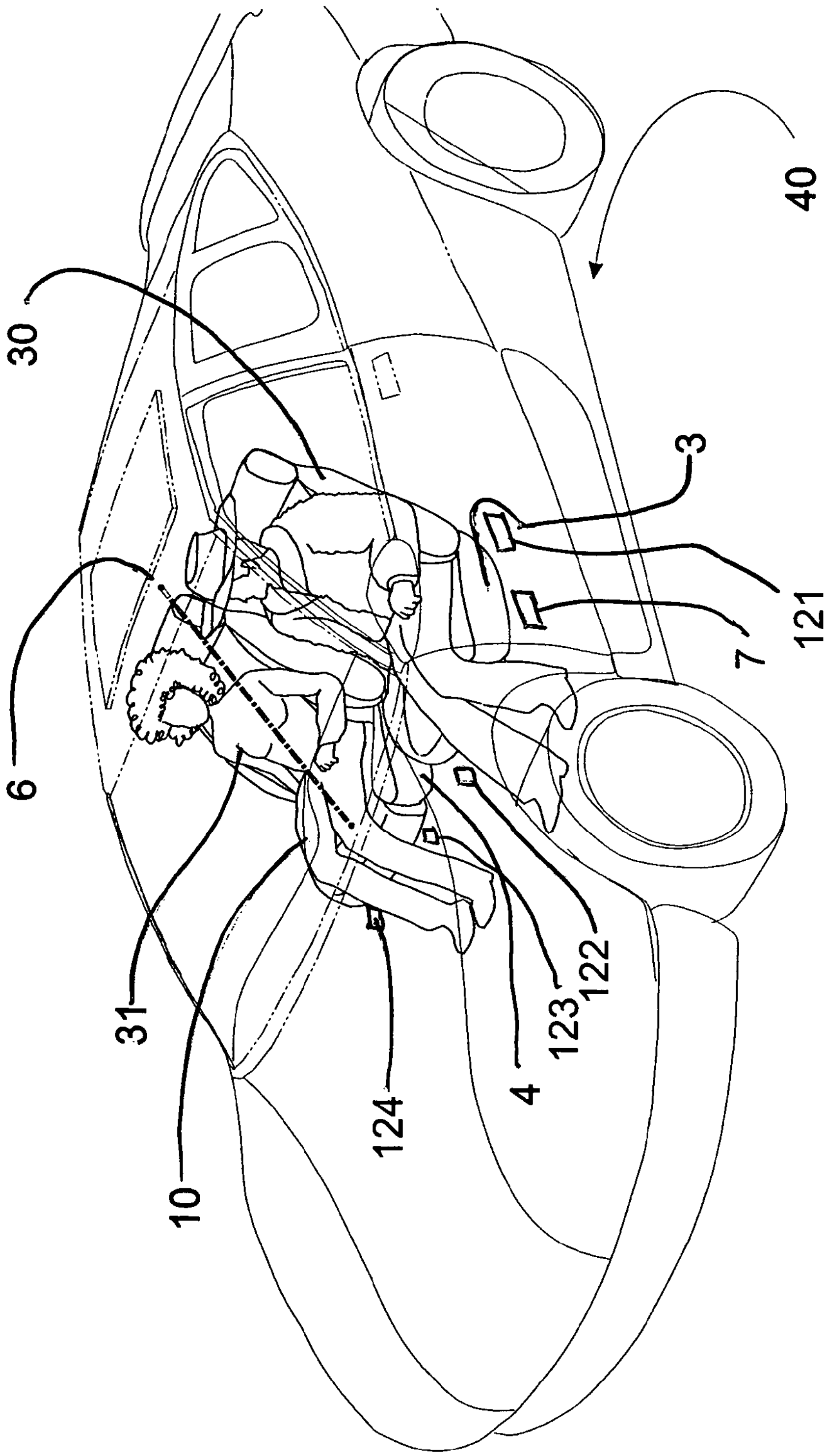
FIG. 28 is a perspective view of a vehicle containing two adult occupants on the front seat with the vehicle shown in phantom illustrating one preferred location of the transducers placed according to the methods taught in at least one of the inventions disclosed herein.

A section of the passenger compartment of an automobile is shown generally as 40 in FIG. 28. A driver 30 of a vehicle sits on a seat 3 behind a steering wheel, not shown, and an adult passenger 31 sits on seat 4 on the passenger side. Two transmitter and/or receiver assemblies 6 and 10, also referred to herein as transducers, are positioned in the passenger compartment 40, one transducer 6 is arranged on the headliner adjacent or in proximity to the dome light and the other transducer 10 is arranged on the center of the top of the dashboard or instrument panel of the vehicle. The methodology leading to the placement of these transducers is important to at least one of the inventions disclosed herein as explained in detail below. In this situation, the system developed in accordance with at least one of the inventions disclosed herein will reliably detect that an occupant is sitting on seat 3, 4 and deployment of the airbag is enabled in the event that the vehicle experiences a crash. Transducers 6, 10 are placed with their separation axis parallel to the separation axis of the head, shoulder and rear facing child seat volumes of occupants of an automotive passenger seat and in view of this specific positioning, are capable of distinguishing the different configurations. In addition to the transducers 6, 10, pressure-measuring or weight-measuring sensors 7, 121, 122, 123 and 124 are also present. These pressure or weight sensors may be of a variety of technologies including, as illustrated here, strain-measuring transducers attached to the vehicle seat support structure as described in more detail in U.S. Pat. No. 6,081,757 and below. Other pressure or weight systems can be utilized including systems that measure the deflection of, or pressure on, the seat cushion. The pressure or weight sensors described here are meant to be illustrative of the general class of pressure or weight sensors and not an exhaustive list of methods of measuring occupant weight or pressure applied by the occupant to the seat.

Figure 21:
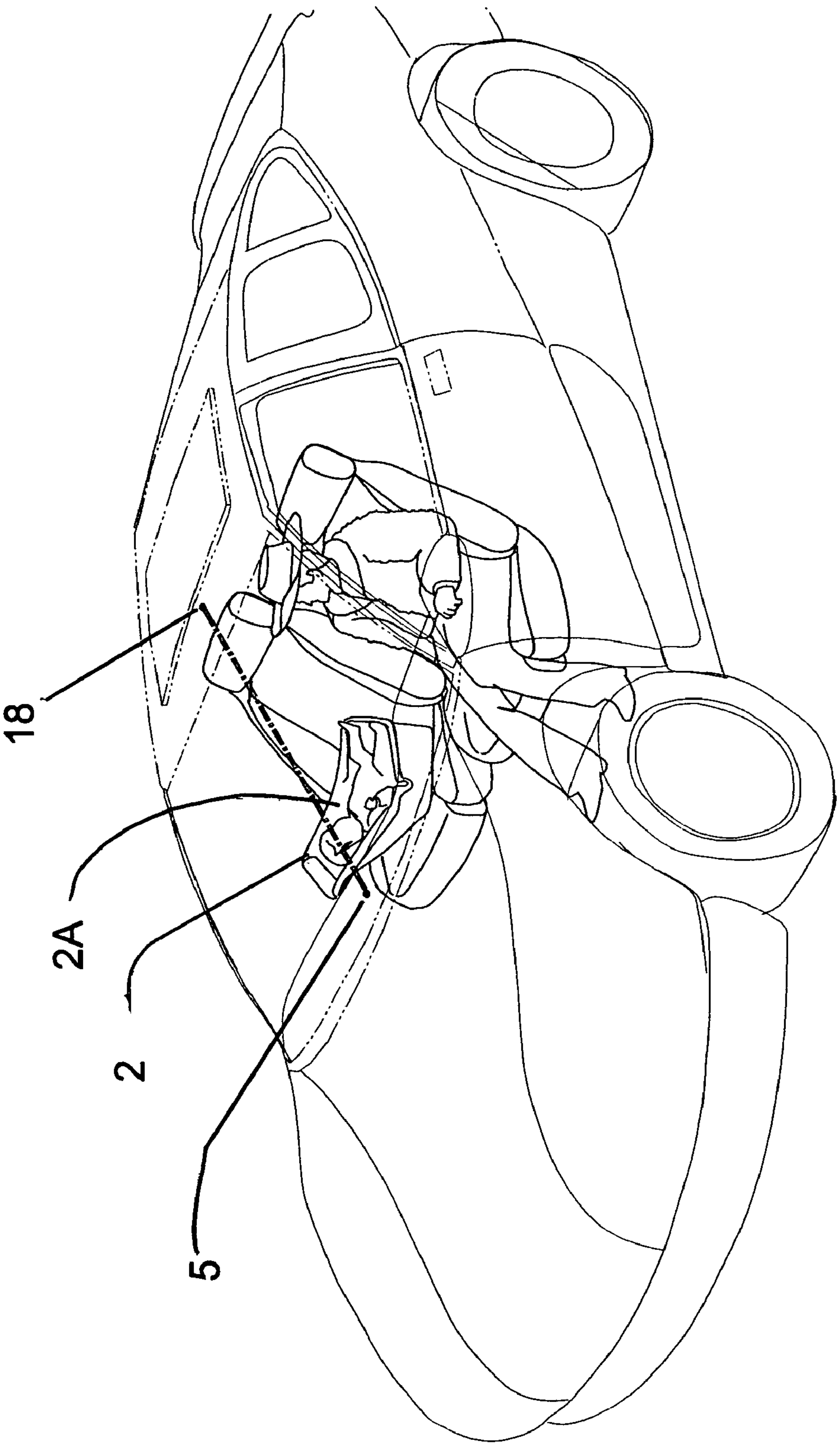
FIG. 21 is a perspective view of a vehicle containing an adult occupant and an occupied infant seat on the front seat with the vehicle shown in phantom illustrating one preferred location of the transducers placed according to the methods taught in at least one of the inventions disclosed herein.
Figure 29:
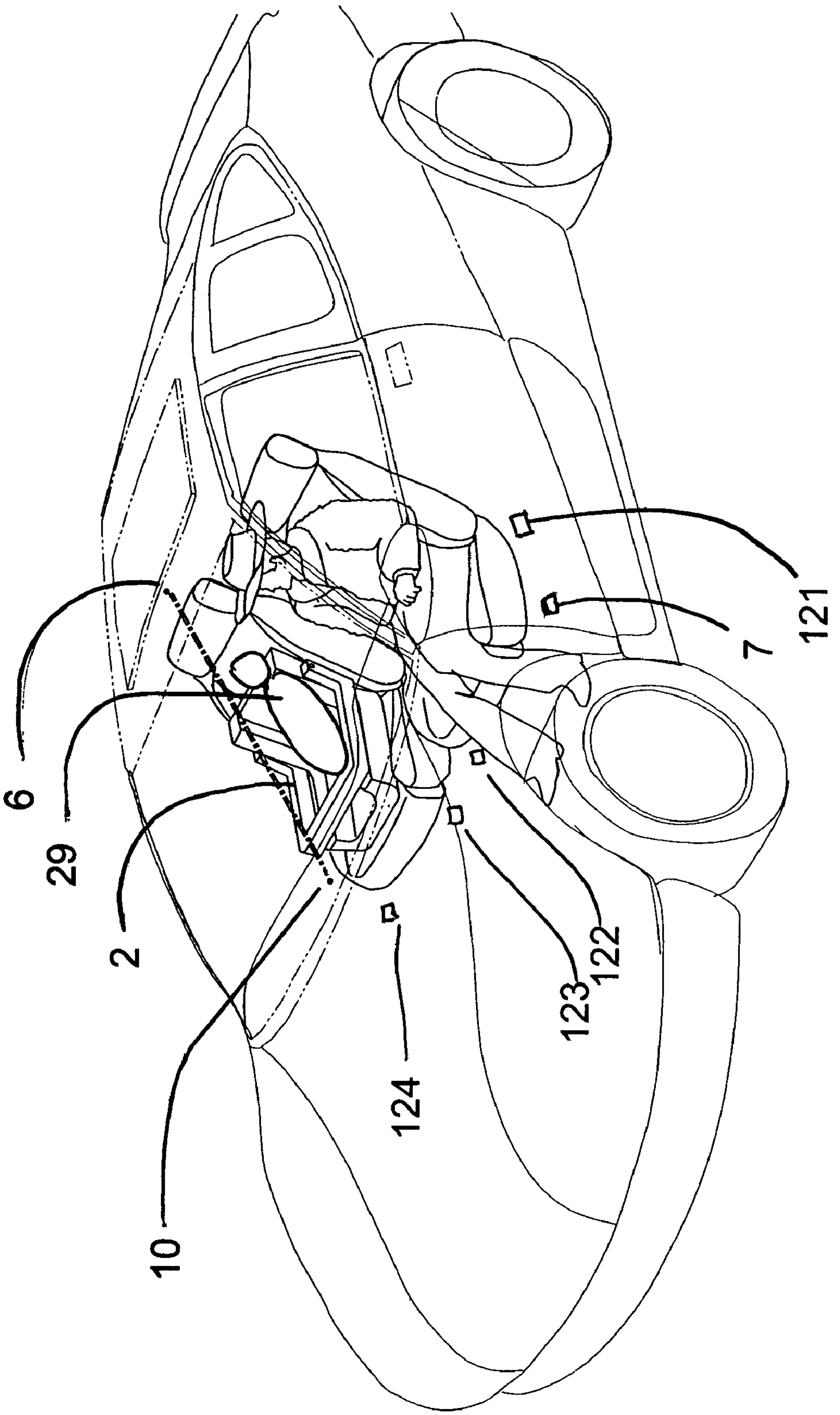
FIG. 29 is a view as in FIG. 28 with the passenger occupant replaced by a child in a forward facing child seat.
Figure 30:
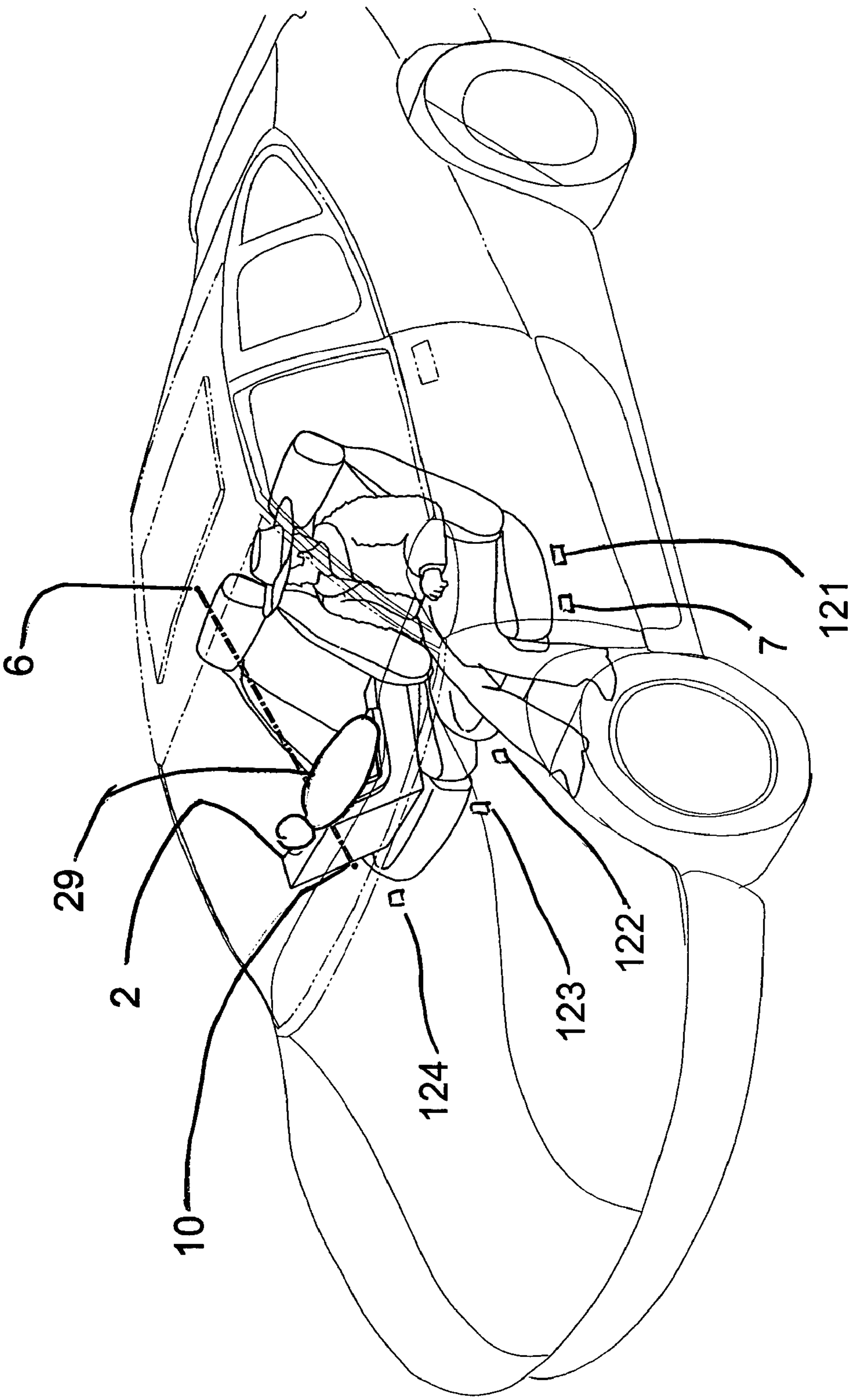
FIG. 30 is a view as in FIG. 28 with the passenger occupant replaced by a child in a rearward facing child seat.

In FIG. 29, a child seat 2 in the forward facing direction containing a child 29 replaces the adult passenger 31 as shown in FIG. 28. In this case, it is usually required that the airbag not be disabled, or enabled in the depowered mode, in the event of an accident. However, in the event that the same child seat 2 is placed in the rearward facing position as shown in FIG. 30, then the airbag is usually required to be disabled since deployment of the airbag in a crash can seriously injure or even kill the child 29. Furthermore, as illustrated in FIG. 21, if an infant 29 in an infant carrier 2 is positioned in the rear facing position of the passenger seat, the airbag should be disabled for the reasons discussed above. Instead of disabling deployment of the airbag, the deployment could be controlled to provide protection for the infant 29, e.g., to reduce the force of the deployment of the airbag. It should be noted that the disabling or enabling of the passenger airbag relative to the item on the passenger seat may be tailored to the specific application. For example, in some embodiments, with certain forward facing child seats, it may in fact be desirable to disable the airbag and in other cases, to deploy a depowered airbag.

The selection of when to disable, depower or enable the airbag, as a function of the item in the passenger seat and its location, is made during the programming or training stage of the sensor system and, in most cases, the criteria set forth above will be applicable, i.e., enabling airbag deployment for a forward facing child seat and an adult in a proper seating position and disabling airbag deployment for a rearward facing child seat and infant and for any occupant who is out-of-position and in close proximity to the airbag module. The sensor system developed in accordance with the invention may however be programmed according to other criteria.

Several systems using other technologies have been devised to discriminate between the four cases illustrated above but none have shown a satisfactory accuracy or reliability of discrimination. Some of these systems appear to work as long as the child seat is properly placed on the seat and belted in. So called "tag systems", for example, whereby a device is placed on the child seat which is electromagnetically sensed by sensors placed within the seat can fail but can add information to the overall system. One system has a resonator is built into the child seat and a low power signal from the car prompts a return signal from the resonator sensing the presence of the seat and automatically turning off the passenger's front airbag. One version of this technology uses a Radio Frequency Identification (RFID) tag. Another sensor uses a normally closed magnetic proximity switch to detect the presence of a child seat. A metal plate installed on the child seat is detected and the sensor deactivates the airbag. These sensors work by detecting the presence of a child (or infant) seat and deactivating the airbag on the front passenger's side. When used alone, they function well as long as the child seat is restrained by a seatbelt, but when this is not the case, they have a high failure rate. Since the seatbelt usage of the population of the United States is now somewhat above 70%, it is quite likely that a significant percentage of child seats will not be properly belted onto the seat and thus children will be subjected to injury and death in the event of an accident.

One novel tag system that has applicability if placed on all child seats uses an RFID tag or multiple such tags that are interrogated by a general purpose interrogator. One such tag system uses SAW (Surface Acoustic Wave) tags that can be interrogated by the same interrogator that is used to monitor tire pressure and temperature when such a system is present.

This methodology will now be described as it relates primarily to wave-type sensors such as those based on optics, ultrasonics or radar. A similar methodology applies to other transducer types, such as electric field sensors, and which will now be obvious to those skilled in the art after a review of the methodology described below.

Figure 31:
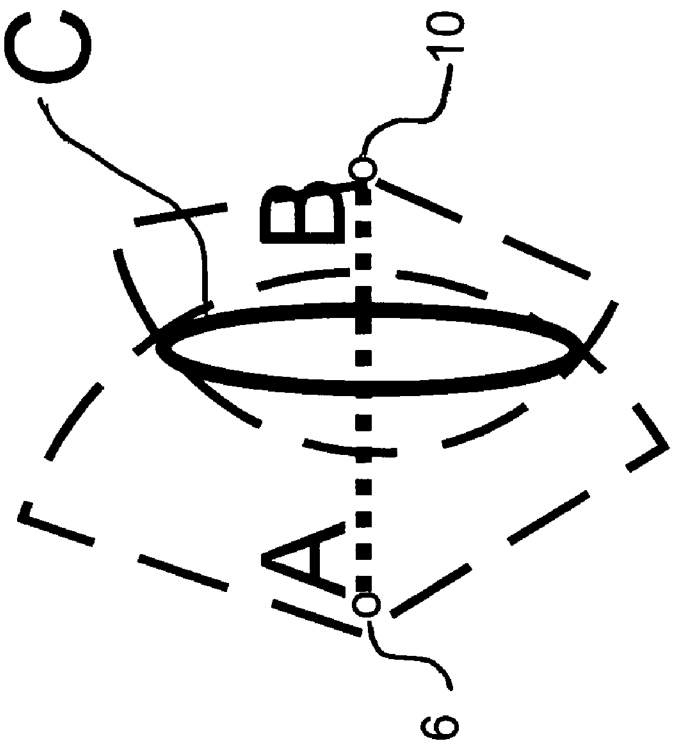
FIG. 31 is a diagram illustrating the interaction of two ultrasonic sensors and how this interaction is used to locate a circle is space.

To understand this methodology, consider two transmitters and receivers 6 and 10 (transducers) which are connected by an axis AB in FIG. 31. Each transmitter radiates a signal which is primarily confined to a cone angle, called the field angle, with its origin at the transmitter. For simplicity, assume that the transmitter and receiver are embodied in the same device, although in some cases a separate device will be used for each function. When a transducer sends out a burst of waves, for example, to thereby irradiate the passenger compartment with radiation, and then receives a reflection or modified radiation from some object in the passenger compartment, the distance of the object from the transducer can be determined by the time delay between the transmission of the waves and the reception of the reflected or modified waves, by the phase angle or by a correlation process.

When looking at a single transducer, it may not be possible to determine the direction to the object which is reflecting or modifying the signal but it may be possible to know how far that object is from the transducer. That is, a single transducer may enable a distance measurement but not a directional measurement. In other words, the object may be at a point on the surface of a three-dimensional spherical segment having its origin at the transducer and a radius equal to the distance. This will generally be the case for an ultrasonic transducer or other broad beam single pixel device. Consider two transducers, such as 6 and 10 in FIG. 31, and both transducers 6, 10 receive a reflection from the same object, which is facilitated by proper placement of the transducers, the timing of the reflections depends on the distance from the object to each respective transducer. If it is assumed for the purposes of this analysis that the two transducers act independently, that is, they only listen to the reflections of waves which they themselves transmitted (which may be achieved by transmitting waves at different frequencies or at different times or through a coding scheme—FDMA, TDMA, CDMA etc.), then each transducer enables the determination of the distance to the reflecting object but not its direction. Assuming the transducer radiates in all directions within the field cone angle, each transducer enables the determination that the object is located on a spherical surface A', B' a respective known distance from the transducer, that is, each transducer enables the determination that the object is a specific distance from that transducer which may or may not be the same distance between the other transducer and the same object. Since now there are two transducers, and the distance of the reflecting object has been determined relative to each of the transducers, the actual location of the object resides on a circle which is the intersection of the two spherical surfaces A', and B'. This circle is labeled C in FIG. 31. At each point along circle C, the distance to the transducer 6 is the same and the distance to the transducer 10 is the same. This, of course, is strictly true only for ideal one-dimensional objects.

For many cases, the mere knowledge that the object lies on a particular circle is sufficient since it is possible to locate the circle such that the only time that an object lies on a particular circle that its location is known. That is, the circle which passes through the area of interest otherwise passes through a volume where no objects can occur. Thus, the mere calculation of the circle in this specific location, which indicates the presence of the object along that circle, provides valuable information concerning the object in the passenger compartment which may be used to control or affect another system in the vehicle such as the airbag system. This of course is based on the assumption that the reflections to the two transducers are in fact from the same object. Care must be taken in locating the transducers such that other objects do not cause reflections that could confuse the system.

Figure 32:
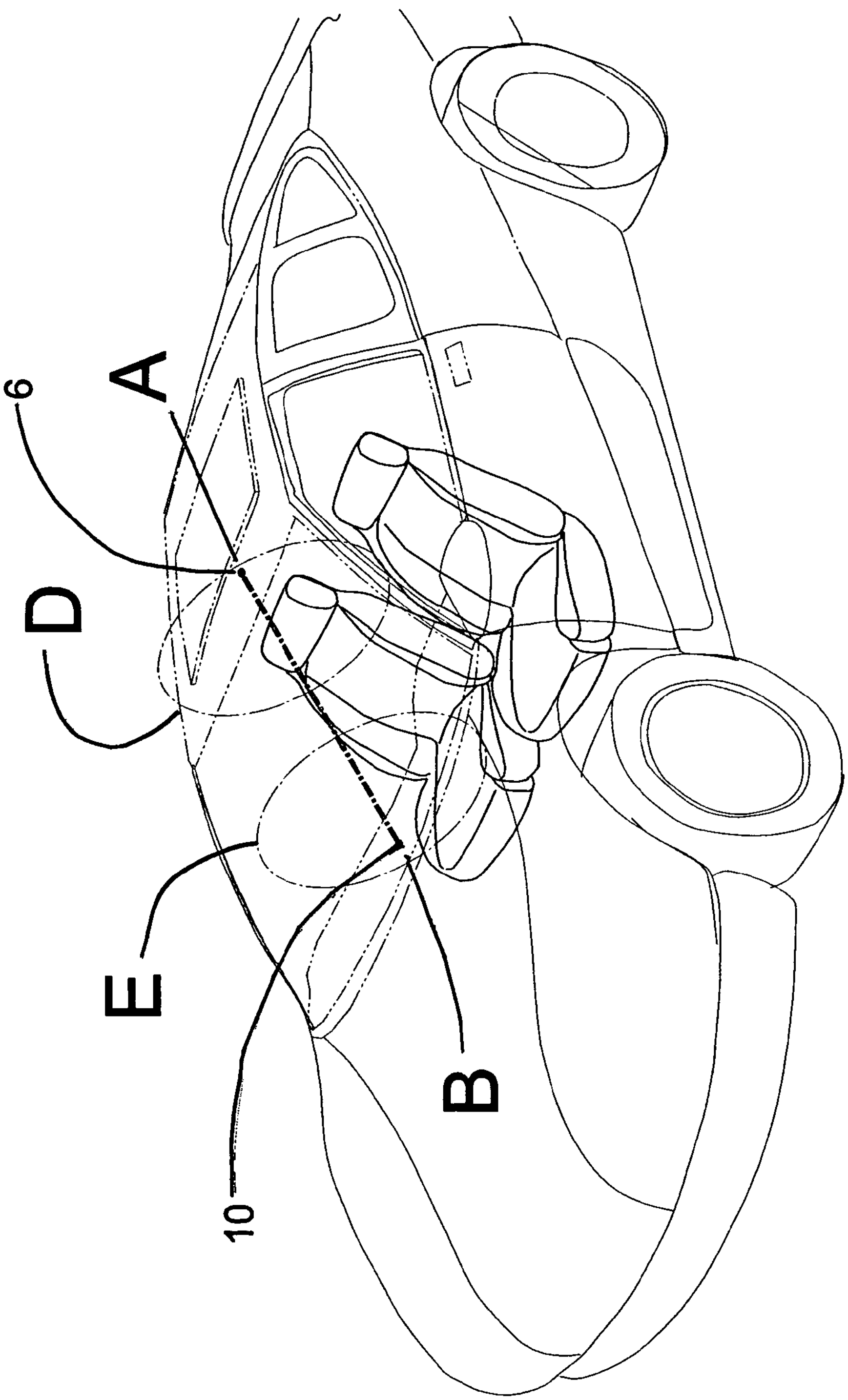
FIG. 32 is a view as in FIG. 28 with the occupants removed illustrating the location of two circles in space and how they intersect the volumes characteristic of a rear facing child seat and a larger occupant.

FIG. 32, for example, illustrates two circles D and E of interest which represent the volume which is usually occupied when the seat is occupied by a person not in a child seat or by a forward facing child seat and the volume normally occupied by a rear facing child seat, respectively. Thus, if the virtual circle generated by the system, (i.e., by appropriate processor means which receives the distance determination from each transducer and creates the circle from the intersection of the spherical surfaces which represent the distance from the transducers to the object) is at a location which is only occupied by an adult passenger, the airbag would not be disabled since its deployment in a crash is desired. On the other hand, if a virtual circle is at a location occupied only by a rear facing child seat, the airbag would be disabled.

The above discussion of course is simplistic in that it does not take into account the volume occupied by the object or the fact that reflections from more than one object surface will be involved. In reality, transducer B is likely to pick up the rear of the occupant's head and transducer A, the front. This makes the situation more difficult for an engineer looking at the data to analyze. It has been found that pattern recognition technologies are able to extract the information from these situations and through a proper application of these technologies, an algorithm can be developed, and when installed as part of the system for a particular vehicle, the system accurately and reliably differentiates between a forward facing and rear facing child seat, for example, or an in-position or out-of-position forward facing human being.

From the above discussion, a method of transducer location is disclosed which provides unique information to differentiate between (i) a forward facing child seat or a forward properly positioned occupant where airbag deployment is desired and (ii) a rearward facing child seat and an out-ofposition occupant where airbag deployment is not desired. In actuality, the algorithm used to implement this theory does not directly calculate the surface of spheres or the circles of interaction of spheres. Instead, a pattern recognition system is used to differentiate airbag-deployment desired cases from those where the airbag should not be deployed. For the pattern recognition system to accurately perform its function, however, the patterns presented to the system must have the requisite information. That is, for example, a pattern of reflected waves from an occupying item in a passenger compartment to various transducers must be uniquely different for cases where airbag deployment is desired from cases where airbag deployment is not desired. The theory described herein teaches how to locate transducers within the vehicle passenger compartment so that the patterns of reflected waves, for example, will be easily distinguishable for cases where airbag deployment is desired from those where airbag deployment is not desired. In the case presented thus far, it has been shown that in some implementations, the use of only two transducers can result in the desired pattern differentiation when the vehicle geometry is such that two transducers can be placed such that the virtual circles D (airbag enabled) and E (airbag disabled) fall outside of the transducer field cones except where they are in the critical regions where positive identification of the condition occurs. Thus, the aiming and field angles of the transducers are important factors to determine in adapting a system to a particular vehicle, especially for ultrasonic and radar sensors, for example.

Figure 33:
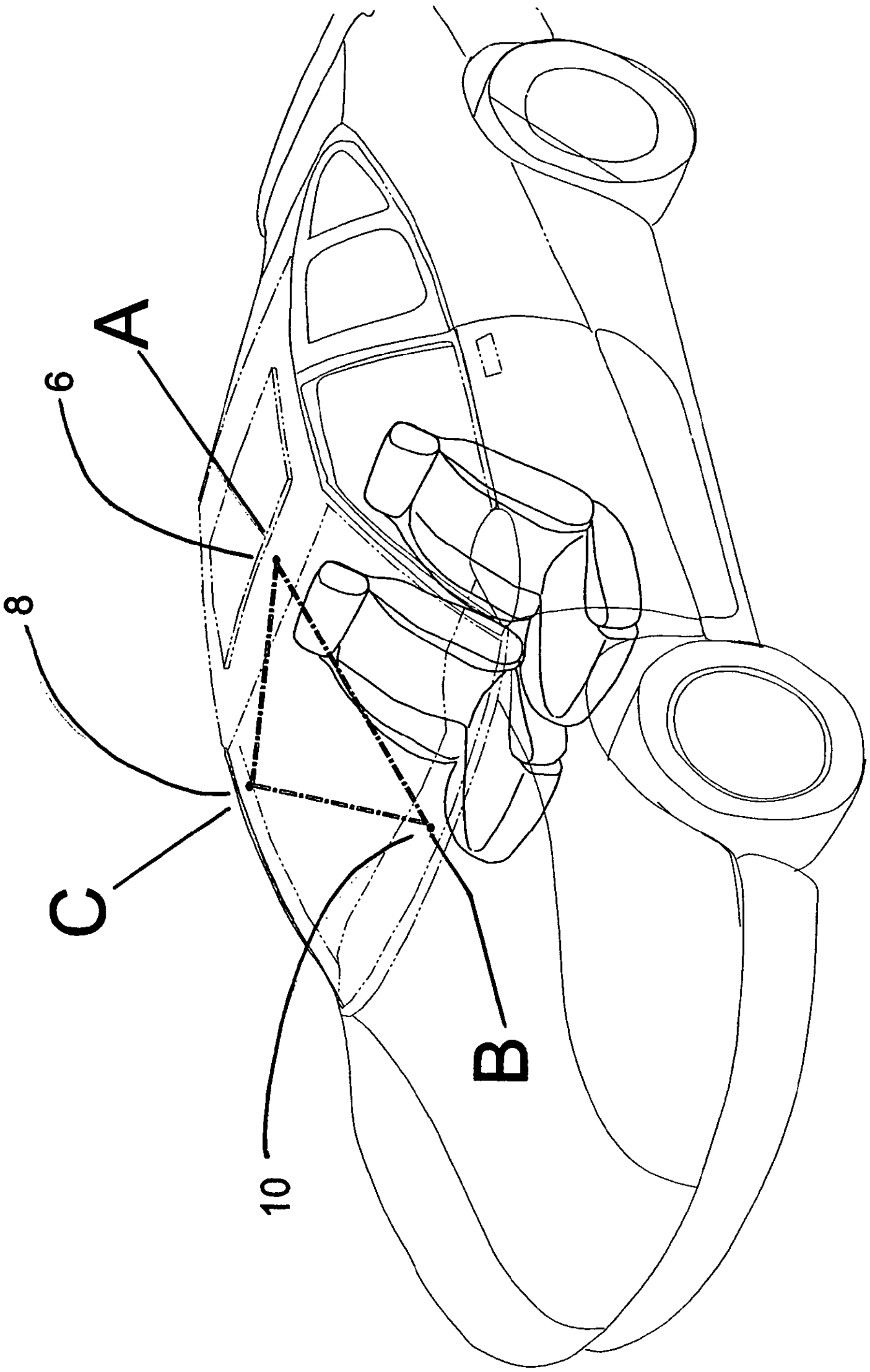
FIG. 33 illustrates a preferred mounting location of a three-transducer system.
Figure 34:
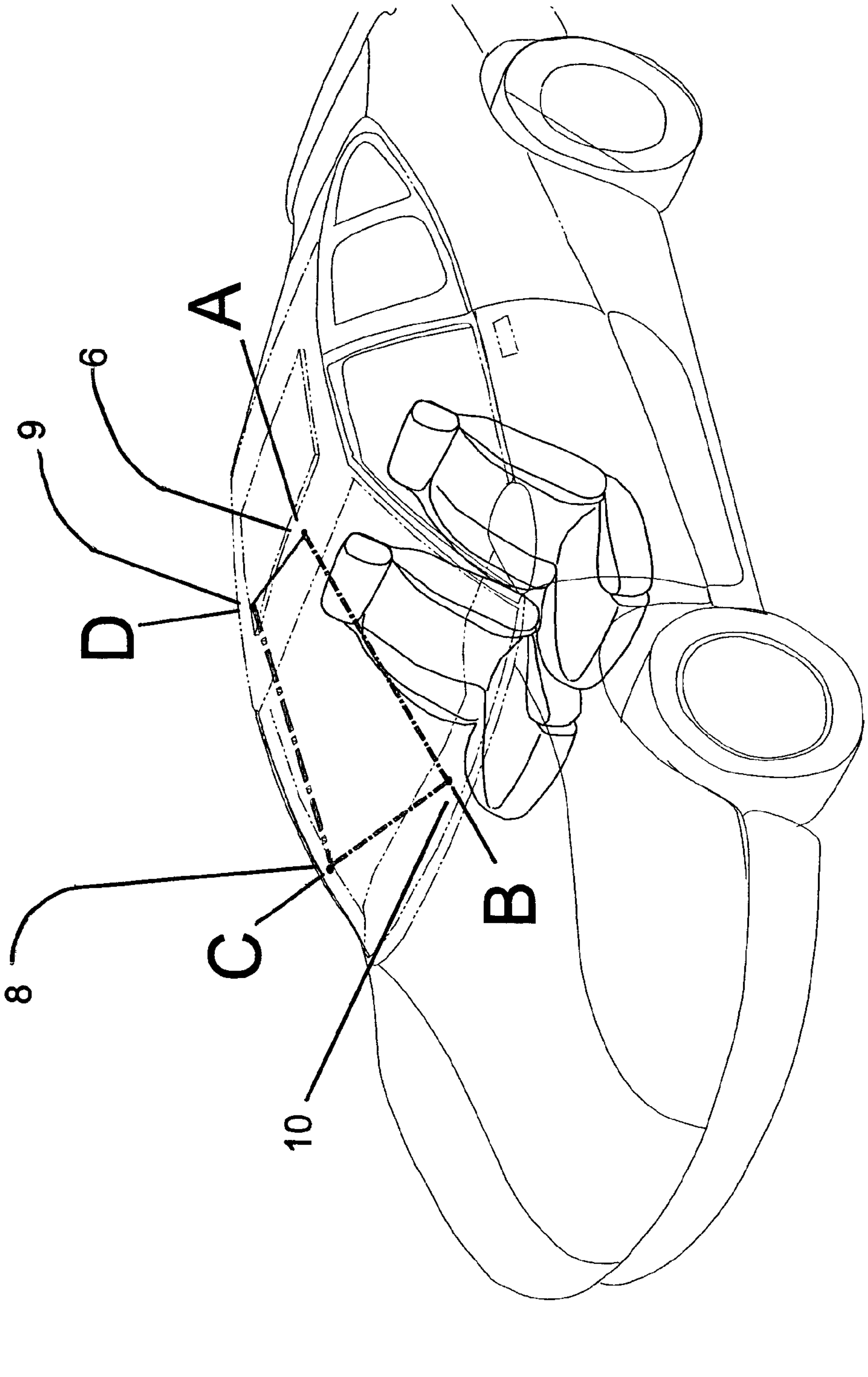
FIG. 34 illustrates a preferred mounting location of a four-transducer system.

The use of only two transducers in a system for automobile occupant sensing for airbag suppression may not be acceptable since one or both of the transducers can be rendered inoperable by being blocked, for example, by a newspaper. Thus, it is usually desirable to add a third transducer 8 as shown in FIG. 33, which now provides a third set of spherical surfaces relative to the third transducer. Transducer 8 is positioned on the passenger side of the A-pillar (which is a preferred placement if the system is designed to operate on the passenger side of the vehicle). Three spherical surfaces now intersect in only two points and in fact, usually at one point if the aiming angles and field angles are properly chosen. Once again, this discussion is only strictly true for a point object. For a real object, the reflections will come from different surfaces of the object, which usually are at similar distances from the object. Thus, the addition of a third transducer substantially improves system reliability. Finally, with the addition of a fourth transducer 9 as shown in FIG. 34, even greater accuracy and reliability is attained. Transducer 9 can be positioned on the ceiling of the vehicle close to the passenger side door. In FIG. 34, lines connecting the transducers C and D and the transducers A and B are substantially parallel permitting an accurate determination of asymmetry and thereby object rotation. Thus, for example, if the infant seat is placed on an angle as shown in FIG. 30, this condition can be determined and taken into account when the decision is made to disable the deployment of the airbag.

The discussion above has partially centered on locating transducers and designing a system for determining whether the two target volumes, that adjacent the airbag and that adjacent the upper portion of the vehicle seat, are occupied. Other systems have been described in the above-referenced patents using a sensor mounted on or adjacent the airbag module and a sensor mounted high in the vehicle to monitor the space near the vehicle seat. Such systems use the sensors as independent devices and do not use the combination of the two sensors to determine where the object is located. In fact, the location of such sensors is usually poorly chosen so that it is easy to blind either or both with a newspaper for those transducers using high frequency electromagnetic waves or ultrasonic waves, for example. Furthermore, no system is known to have been disclosed, except in patents and patent applications assigned to the current assignee, which uses more than two transducers especially such that one or more can be blocked without causing serious deterioration of the system. Again, the examples here have been for the purpose of suppressing the deployment of the airbag when it is necessary to prevent injury. The sensor system disclosed can be used for many other purposes such as disclosed in the above-mentioned patents and patent applications assigned to the current assignee. The ability to use the sensors for these other applications, such as for truck trailers and cargo containers or for controlling other systems within a vehicle is generally lacking in the systems disclosed in the other referenced patents.

Figure 35:
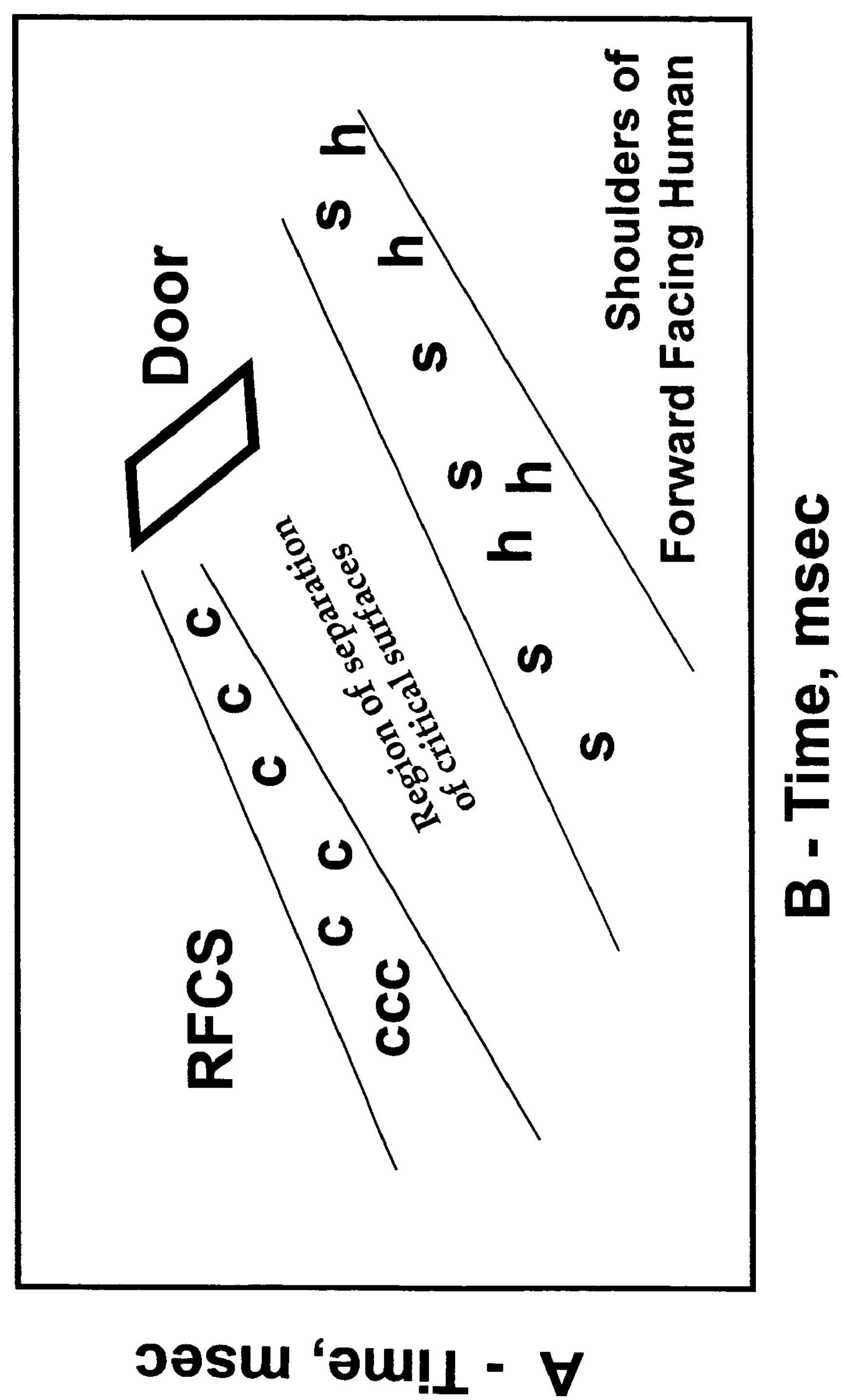
FIG. 35 is a plot showing the target volume discrimination for two transducers.
Figure 36:
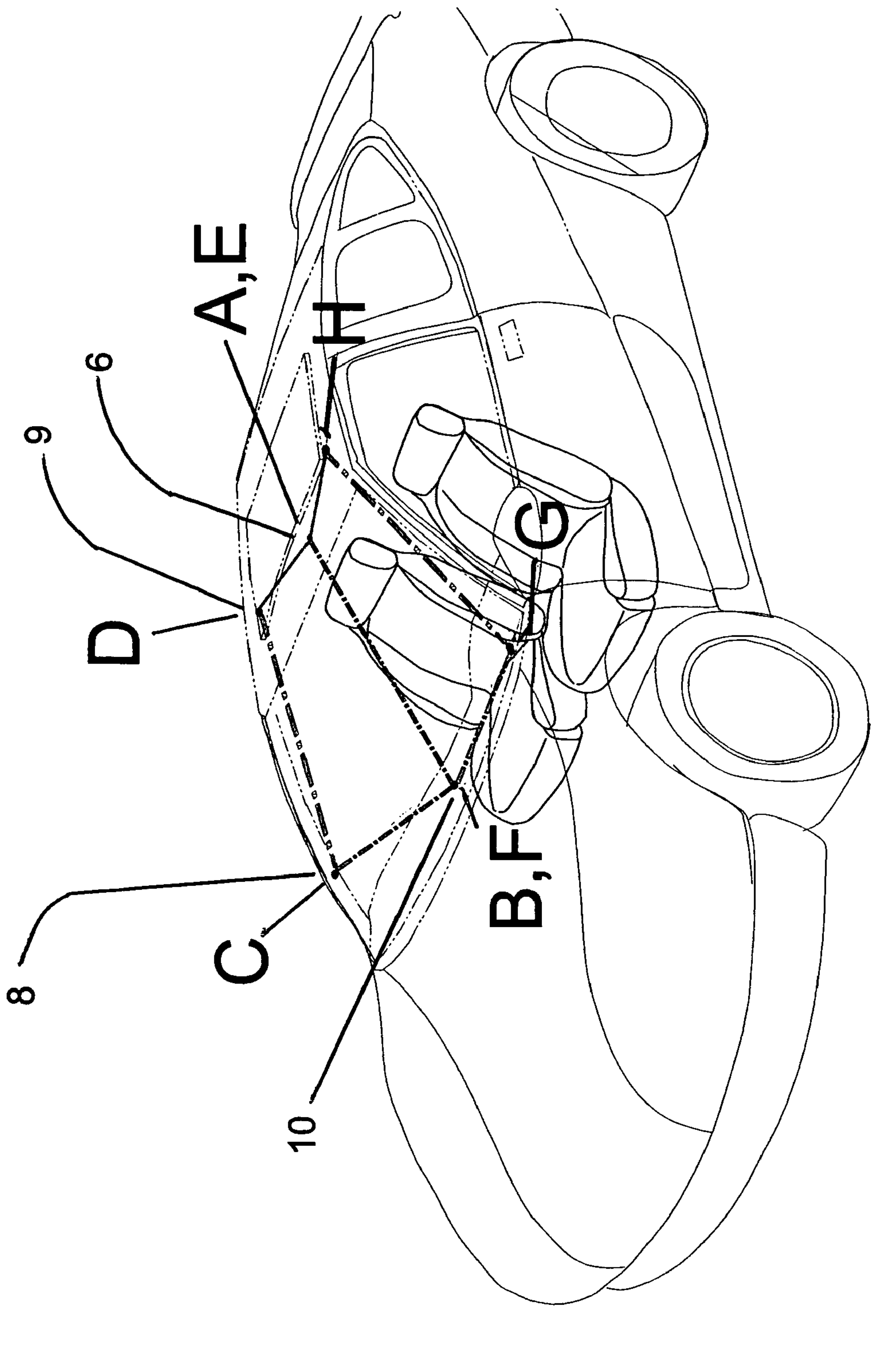
FIG. 36 illustrates a preferred mounting location of a eight-transducer system.

Considering once again the condition of these figures where two transducers are used, a plot can be made showing the reflection times of the objects which are located in the region of curve E and curve F of FIG. 36. This plot is shown on FIG. 35 where the c's represent ultrasound reflections from rear facing child seats from various tests where the seats were placed in a variety of different positions and similarly the s's and h's represent shoulders and heads respectively of various forward facing human occupants. In these results from actual experiments using ultrasonic transducers, the effect of body thickness is present and yet the results still show that the basic principles of separation of key volumes are valid. Note that there is a region of separation between corridors that house the different object classes. It is this fact which is used in conjunction with neural networks, as described here and in the above-referenced patents and patent applications, which permit the design of a system that provides an accurate discrimination of rear facing child seats from forward facing humans. Previously, before the techniques for locating the transducers to separate these two zones were discovered, the entire discrimination task was accomplished using neural networks. There was significant overlap between the reflections from the various objects and therefore separation was done based on patterns of the reflected waves. By using the technology described herein to carefully position and orient the transducers so as to create this region of separation of the critical surfaces, wherein all of the rear facing child seat data falls within a known corridor, the task remaining for the neural networks is substantially simplified with the result that the accuracy of identification is substantially improved.

Three general classes of child seats exist as well as several models which are unique. First, there is the infant only seat as shown in FIG. 30 which is for occupants weighing up to about 20 pounds. This is designed to be only placed in the rear facing position. The second which is illustrated in FIG. 29 is for children from about 20 to about 40 pounds and can be used in both the forward and rear facing position and the third is for use only in the forward facing position and is for children weighing over about 40 pounds. All of these seats as well as the unique models are used in test setups according to at least one of the inventions disclosed herein for adapting a system to an automotive vehicle. For each child seat, there are several hundred unique orientations representing virtually every possible position of that seat within the vehicle. Tests are run, for example, with the seat tilted 22 degrees, rotated 17 degrees, placed on the front of the seat with the seat back fully up with the seat fully back and with the window open as well as all variations of these parameters. A large number of cases are also run, when practicing the teachings of at least one of the inventions disclosed herein, with various accessories, such as clothing, toys, bottles, blankets etc., added to the child seat.

Similarly, wide variations are used for the occupants including size, clothing and activities such as reading maps or newspapers, leaning forward to adjust the radio, for example. Also included are cases where the occupant puts his/her feet on the dashboard or otherwise assumes a wide variety of unusual positions. When all of the above configurations are considered along with many others not mentioned, the total number of configurations which are used to train the pattern recognition system for an automobile, for example, can exceed 500,000. The goal is to include in the configuration training set, representations of all occupancy states that occur in actual use. Since the system is highly accurate in making the correct decision for cases which are similar to those in the training set, the total system accuracy increases as the size of the training set increases providing the cases are all distinct and not copies of other cases.

In addition to all of the variations in occupancy states, it is important to consider environmental effects during the data collection. Thermal gradients or thermal instabilities are particularly important for systems based on ultrasound since sound waves can be significantly diffracted by density changes in air. There are two aspects of the use of thermal gradients or instability in training. First, the fact that thermal instabilities exist and therefore data with thermal instabilities present should be part of database. For this case, a rather small amount of data collected with thermal instabilities would be used. A much more important use of thermal instability comes from the fact that they add variability to data. Thus, considerably more data is taken with thermal instability and in fact, in some cases a substantial percentage of the database is taken with time varying thermal gradients in order to provide variability to the data so that the neural network does not memorize but instead generalizes from the data. This is accomplished by taking the data with a cold vehicle with the heater operating and with a hot vehicle with the air conditioner operating, for example. Additional data is also taken with a heat lamp in a closed vehicle to simulate a stable thermal gradient caused by sun loading.

To collect data for 500,000 vehicle configurations is not a formidable task. A trained technician crew can typically collect data on in excess on 2000 configurations or vectors per hour. The data is collected typically every 50 to 100 milliseconds. During this time, the occupant is continuously moving, assuming a continuously varying position and posture in the vehicle including moving from side to side, forward and back, twisting his/her head, reading newspapers and books, moving hands, arms, feet and legs, until the desired number of different seated state examples are obtained. In some cases, this process is practiced by confining the motion of an occupant into a particular zone. In some cases, for example, the occupant is trained to exercise these different seated state motions while remaining in a particular zone that may be the safe zone, the keep out zone, or an intermediate gray zone. In this manner, data is collected representing the airbag disable, depowered airbag-enabled or full power airbag-enabled states. In other cases, the actual position of the back of the head and/or the shoulders of the occupant are tracked using string pots, high frequency ultrasonic transducers, optically, by RF or other equivalent methods. In this manner, the position of the occupant can be measured and the decision as to whether this should be a disable or enable airbag case can be decided later. By continuously monitoring the occupant, an added advantage results in that the data can be collected to permit a comparison of the occupant from one seated state to another. This is particularly valuable in attempting to project the future location of an occupant based on a series of past locations as would be desirable for example to predict when an occupant would cross into the keep out zone during a panic braking situation prior to crash.

It is important to note that it is not necessary to tailor the system for every vehicle produced but rather to tailor it for each model or platform. However, a neural network, and especially a combination neural network, can be designed with some adaptability to compensate for vehicle to vehicle differences within a platform such as mounting tolerances, or to changes made by the owner or due to aging. A platform is an automobile manufacturer's designation of a group of vehicle models that are built on the same vehicle structure. A model would also apply to a particular size, shape or geometry of truck trailer or cargo container The methods above have been described mainly in connection with the use of ultrasonic transducers. Many of the methods, however, are also applicable to optical, radar, capacitive, electric field and other sensing systems and where applicable, at least one of the inventions disclosed herein is not limited to ultrasonic systems. In particular, an important feature of at least one of the inventions disclosed herein is the proper placement of two or more separately located receivers such that the system still operates with high reliability if one of the receivers is blocked by some object such as a newspaper or box. This feature is also applicable to systems using electromagnetic radiation instead of ultrasonic, however the particular locations will differ based on the properties of the particular transducers. Optical sensors based on two-dimensional cameras or other image sensors, for example, are more appropriately placed on the sides of a rectangle surrounding the seat to be monitored, for the automotive vehicle case, rather than at the corners of such a rectangle as is the case with ultrasonic sensors. This is because ultrasonic sensors measure an axial distance from the sensor where the 2D camera is most appropriate for measuring distances up and down and across its field view rather than distances to the object. With the use of electromagnetic radiation and the advances which have recently been made in the field of very low light level sensitivity, it is now possible, in some implementations, to eliminate the transmitters and use background light as the source of illumination along with using a technique such as auto-focusing or stereo vision to obtain the distance from the receiver to the object. Thus, only receivers would be required further reducing the complexity of the system.

Although implicit in the above discussion, an important feature of at least one of the inventions disclosed herein which should be emphasized is the method of developing a system having distributed transducer mountings. Other systems which have attempted to solve the rear facing child seat (RFCS) and out-of-position problems have relied on a single transducer mounting location or at most, two transducer mounting locations. Such systems can be easily blinded by a newspaper or by the hand of an occupant, for example, which is imposed between the occupant and the transducers. This problem is almost completely eliminated through the use of three or more transducers which are mounted so that they have distinctly different views of the passenger compartment volume of interest. If the system is adapted using four transducers as illustrated in the distributed system of FIG. 34, for example, the system suffers only a slight reduction in accuracy even if two of the transducers are covered so as to make them inoperable. However, the automobile manufacturers may not wish to pay the cost of several different mounting locations and an alternate is to mount the sensors high where blockage is difficult and to diagnose whether a blockage state exists.

It is important in order to obtain the full advantages of the system when a transducer is blocked, that the training and independent databases contains many examples of blocked transducers. If the pattern recognition system, the neural network in this case, has not been trained on a substantial number of blocked transducer cases, it will not do a good job in recognizing such cases later. This is yet another instance where the makeup of the databases is crucial to the success of designing the system that will perform with high reliability in a vehicle and is an important aspect of the instant invention. When camera-based transducers are used, for example, an alternative strategy is to diagnose when a newspaper or other object is blocking a camera, for example. In most cases, a short time blockage is of little consequence since earlier decisions provide the seat occupancy and the decision to enable deployment or suppress deployment of the occupant restraint will not change. For a prolonged blockage, the diagnostic system can provide a warning light indicating to the driver, operator or other interested party which may be remote from the vehicle, that the system is malfunctioning and the deployment decision is again either not changed or changed to the default decision, which is usually to enable deployment for the automobile occupant monitoring case.

Let us now consider some specific issues:

1. Blocked transducers. It is sometimes desirable to positively identify a blocked transducer and when such a situation is found to use a different neural network which has only been trained on the subset of unblocked transducers. Such a network, since it has been trained specifically on three transducers, for example, will generally perform more accurately than a network which has been trained on four transducers with one of the transducers blocked some of the time. Once a blocked transducer has been identified the occupant or other interested party can be notified if the condition persists for more than a reasonable time.

2. Transducer Geometry. Another technique, which is frequently used in designing a system for a particular vehicle, is to use a neural network to determine the optimum mounting locations, aiming or orientation directions and field angles of transducers. For particularly difficult vehicles, it is sometimes desirable to mount a large number of ultrasonic transducers, for example, and then use the neural network to eliminate those transducers which are least significant. This is similar to the technique described above where all kinds of transducers are combined initially and later pruned.

3. Data quantity. Since it is very easy to take large amounts data and yet large databases require considerably longer training time for a neural network, a test of the variability of the database can be made using a neural network. If, for example, after removing half of the data in the database, the performance of a trained neural network against the validation database does not decrease, then the system designer suspects that the training database contains a large amount of redundant data. Techniques such as similarity analysis can then be used to remove data that is virtually indistinguishable from other data. Since it is important to have a varied database, it is undesirable generally to have duplicate or essentially duplicate vectors in the database since the presence of such vectors can bias the system and drive the system more toward memorization and away from generalization.

4. Environmental factors. An evaluation can be made of the beneficial effects of using varying environmental influences, such as temperature or lighting, during data collection on the accuracy of the system using neural networks along with a technique such as design of experiments.

5. Database makeup. It is generally believed that the training database must be flat, meaning that all of the occupancy states that the neural network must recognize must be approximately equally represented in the training database. Typically, the independent database has approximately the same makeup as the training database. The validation database, on the other hand, typically is represented in a non-flat basis with representative cases from real world experience. Since there is no need for the validation database to be flat, it can include many of the extreme cases as well as being highly biased towards the most common cases. This is the theory that is currently being used to determine the makeup of the various databases. The success of this theory continues to be challenged by the addition of new cases to the validation database. When significant failures are discovered in the validation database, the training and independent databases are modified in an attempt to remove the failure.

6. Biasing. All seated state occupancy states are not equally important. The final system for the automotive case for example must be nearly 100% accurate for forward facing "in-position" humans, i.e., normally positioned humans. Since that will comprise the majority of the real world situations, even a small loss in accuracy here will cause the airbag to be disabled in a situation where it otherwise would be available to protect an occupant. A small decrease in accuracy will thus result in a large increase in deaths and injuries. On the other hand, there are no serious consequences if the airbag is deployed occasionally when the seat is empty. Various techniques are used to bias the data in the database to take this into account. One technique is to give a much higher value to the presence of a forward facing human during the supervised learning process than to an empty seat. Another technique is to include more data for forward facing humans than for empty seats. This, however, can be dangerous as an unbalanced network leads to a loss of generality.

7. Screening. It is important that the loop be closed on data acquisition. That is, the data must be checked at the time the data is acquired to be sure that it is good data. Bad data can happen, for example, because of electrical disturbances on the power line, sources of ultrasound such as nearby welding equipment, or due to human error. If the data remains in the training database, for example, then it will degrade the performance of the network. Several methods exist for eliminating bad data. The most successful method is to take an initial quantity of data, such as 30,000 to 50,000 vectors, and create an interim network. This is normally done anyway as an initial check on the system capabilities prior to engaging in an extensive data collection process. The network can be trained on this data and, as the real training data is acquired, the data can be tested against the neural network created on the initial data set. Any vectors that fail are examined for reasonableness.

8. Vector normalization method. Through extensive research, it has been found that the vector should be normalized based on all of the data in the vector, that is have all its data values range from 0 to 1. For particular cases, however, it has been found desirable to apply the normalization process selectively, eliminating or treating differently the data at the early part of the data from each transducer. This is especially the case when there is significant ringing on the transducer or cross talk when a separate ultrasonic send and receive transducer is used. There are times when other vector normalization techniques are required and the neural network system can be used to determine the best vector normalization technique for a particular application.

9. Feature extraction. The success of a neural network system can frequently be aided if additional data is inputted into the network. One ultrasonic example can be the number of 0 data points before the first peak is experienced. Alternately, the exact distance to the first peak can be determined prior to the sampling of the data. Other features can include the number of peaks, the distance between the peaks, the width of the largest peak, the normalization factor, the vector mean or standard deviation, etc. These normalization techniques are frequently used at the end of the adaptation process to slightly increase the accuracy of the system.

10. Noise. It has been frequently reported in the literature that adding noise to the data that is provided to a neural network can improve the neural network accuracy by leading to better generalization and away from memorization. However, the training of the network in the presence of thermal gradients has been shown to substantially eliminate the need to artificially add noise to the data for ultrasonic systems. Nevertheless, in some cases, improvements have been observed when random arbitrary noise of a rather low level is superimposed on the training data.

11. Photographic recording of the setup. After all of the data has been collected and used to train a neural network, it is common to find a significant number of vectors which, when analyzed by the neural network, give a weak or wrong decision. These vectors must be carefully studied especially in comparison with adjacent vectors to see if there is an identifiable cause for the weak or wrong decision. Perhaps the occupant was on the borderline of the keep out zone and strayed into the keep out zone during a particular data collection event. For this reason, it is desirable to photograph each setup simultaneous with the collection of the data. This can be done using one or more cameras mounted in positions where they can have a good view of the seat occupancy. Sometimes several cameras are necessary to minimize the effects of blockage by a newspaper, for example. Having the photographic record of the data setup is also useful when similar results are obtained when the vehicle is subjected to real world testing. During real world testing, one or more cameras should also be present and the test engineer is required to initiate data collection whenever the system does not provide the correct response. The vector and the photograph of this real world test can later be compared to similar setups in the laboratory to see whether there is data that was missed in deriving the matrix of vehicle setups for training the vehicle.

12. Automation. When collecting data in the vehicle it is desirable to automate the motion of the vehicle seat, seatback, windows, visors etc. so that in this manner, the positions of these items can be controlled and distributed as desired by the system designer. This minimizes the possibility of taking too much data at one configuration and thereby unbalancing the network.

13. Automatic setup parameter recording. To achieve an accurate data set, the key parameters of the setup should be recorded automatically. These include the temperatures at various positions inside the vehicle and for the automotive case, the position of the vehicle seat, and seatback, the position of the headrest, visor and windows and, where possible, the position of the vehicle occupant(s). The automatic recordation of these parameters minimizes the effects of human errors.

14. Laser Pointers. For the ultrasonic case, during the initial data collection with full horns mounted on the surface of the passenger compartment, care must the exercised so that the transducers are not accidentally moved during the data collection process. In order to check for this possibility, a small laser diode is incorporated into each transducer holder. The laser is aimed so that it illuminates some other surface of the passenger compartment at a known location. Prior to each data taking session, each of the transducer aiming points is checked.

15. Multi-frequency transducer placement. When data is collected for dynamic out-of-position, each of the ultrasonic transducers must operate at a different frequency so that all transducers can transmit simultaneously. By this method, data can be collected every 10 milliseconds, which is sufficiently fast to approximately track the motion of an occupant during pre-crash braking prior to an impact. A problem arises in the spacing of the frequencies between the different transducers. If the spacing is too close, it becomes very difficult to separate the signals from different transducers and it also affects the sampling rate of the transducer data and thus the resolution of the transducers. If an ultrasonic transducer operates at a frequency much below about 35 kHz, it can be sensed by dogs and other animals. If the transducer operates at a frequency much above 70 kHz, it is very difficult to make the open type of ultrasonic transducer, which produces the highest sound pressure. If the multiple frequency system is used for both the driver and passenger-side, as many as eight separate frequencies are required. In order to find eight frequencies between 35 kHz and 70 kHz, a frequency spacing of 5 kHz is required. In order to use conventional electronic filters and to provide sufficient spacing to permit the desired resolution at the keep out zone border, a 10 kHz spacing is desired. These incompatible requirements can be solved through a careful, judicious placement of the transducers such that transducers that are within 5 kHz of each other are placed such that there is no direct path between the transducers and any indirect path is sufficiently long so that it can be filtered temporally. An example of such an arrangement is shown in FIG. 36. For this example, the transducers operate at the following frequencies A 65 kHz, B 55 kHz, C 35 kHz, D 45 kHz, E 50 kHz, F 40 kHz, G 60 kHz, H 70 kHz. Actually, other arrangements adhering to the principle described above would also work.

16. Use of a PC in data collection. When collecting data for the training, independent, and validation databases, it is frequently desirable to test the data using various screening techniques and to display the data on a monitor. Thus, during data collection the process is usually monitored using a desktop PC for data taken in the laboratory and a laptop PC for data taken on the road.

17. Use of referencing markers and gages. In addition to and sometimes as a substitution for, the automatic recording of the positions of the seats, seatbacks, windows etc. as described above, a variety of visual markings and gages are frequently used. This includes markings to show the angular position of the seatback, the location of the seat on the seat track, the degree of openness of the window, etc. Also in those cases where automatic tracking of the occupant is not implemented, visual markings are placed such that a technician can observe that the test occupant remains within the required zone for the particular data taking exercise. Sometimes, a laser diode is used to create a visual line in the space that represents the boundary of the keep out zone or other desired zone boundary.

18. Subtracting out data that represents reflections from known seat parts or other vehicle components. This is particularly useful if the seat track and seatback recline positions are known.

19. Improved identification and tracking can sometimes be obtained if the object can be centered or otherwise located in a particular part of the neural network in a manner similar to the way the human eye centers an object to be examined in the center of its field of view.

20. Continuous tracking of the object in place of a zone-based system also improves the operation of the pattern recognition system since discontinuities are frequently difficult for the pattern recognition system, such as a neural network, to handle. In this case, the location of the occupant relative to the airbag cover, for example, would be determined and then a calculation as to what zone the object is located in can be determined and the airbag deployment decision made (suppression, depowered, delayed, deployment). This also permits a different suppression zone to be used for different sized occupants further improving the matching of the airbag deployment to the occupant.

It is important to realize that the adaptation process described herein applies to any combination of transducers that provide information about the vehicle occupancy. These include weight sensors, capacitive sensors, electric field sensors, inductive sensors, moisture sensors, chemical sensors, ultrasonic, radiation, optic, infrared, radar, X-ray among others. The adaptation process begins with a selection of candidate transducers for a particular vehicle model. This selection is based on such considerations as cost, alternate uses of the system other than occupant sensing, vehicle interior compartment geometry, desired accuracy and reliability, vehicle aesthetics, vehicle manufacturer preferences, and others. Once a candidate set of transducers has been chosen, these transducers are mounted in the test vehicle according to the teachings of at least one of the inventions disclosed herein. The vehicle is then subjected to an extensive data collection process wherein various objects are placed in the vehicle at various locations as described below and an initial data set is collected. A pattern recognition system is then developed using the acquired data and an accuracy assessment is made. Further studies are made to determine which, if any, of the transducers can be eliminated from the design. In general, the design process begins with a surplus of sensors plus an objective as to how many sensors are to be in the final vehicle installation. The adaptation process can determine which of the transducers are most important and which are least important and the least important transducers can be eliminated to reduce system cost and complexity.

A process for adapting an ultrasonic system to a vehicle will now be described. Note, some steps will not apply to some vehicles. A more detailed list of steps is provided in Appendix 2. Although the pure ultrasonic system is described here for automotive applications, a similar or analogous set of steps applies for other vehicle types and when other technologies such as weight and optical (scanning or imager) or other electromagnetic wave or electric field systems such as capacitance and field monitoring systems are used. This description is thus provided to be exemplary and not limiting:

1. Select transducer, horn and grill designs to fit the vehicle. At this stage, usually full horns are used which are mounted so that they project into the compartment. No attempt is made at this time to achieve an esthetic matching of the transducers to the vehicle surfaces. An estimate of the desired transducer fields is made at this time either from measurements in the vehicle directly or from CAD drawings.
2. Make polar plots of the transducer ultrasonic fields. Transducers and candidate horns and grills are assembled and tested to confirm that the desired field angles have been achieved. This frequently requires some adjustment of the transducers in the horn and of the grill. A properly designed grill for ultrasonic systems can perform a similar function as a lens for optical systems.
3. Check to see that the fields cover the required volumes of the vehicle passenger compartment and do not impinge on adjacent flat surfaces that may cause multipath effects. Redesign horns and grills if necessary.
4. Install transducers into vehicle.
5. Map transducer fields in the vehicle and check for multipath effects and proper coverage.
6. Adjust transducer aim and re-map fields if necessary.
7. Install daily calibration fixture and take standard setup data.
8. Acquire 50,000 to 100,000 vectors of data
9. Adjust vectors for volume considerations by removing some initial data points if cross talk or ringing is present and some final points to keep data in the desired passenger compartment volume.
10. Normalize vectors.
11. Run neural network algorithm generating software to create algorithm for vehicle installation.
12. Check the accuracy of the algorithm. If not sufficiently accurate collect more data where necessary and retrain. If still not sufficiently accurate, add additional transducers to cover holes.
13. When sufficient accuracy is attained, proceed to collect ~500,000 training vectors varying:
    Occupancy (see Appendices 1 and 3):
    Occupant size, position (zones), clothing etc
    Child seat type, size, position etc.
    Empty seat
    Vehicle configuration:
    Seat position
    Window position
    Visor and armrest position
    Presence of other occupants in adjoining seat or rear seat
    Temperature
    Temperature gradient—stable
    Temperature turbulence—heater and air conditioner
    Wind turbulence—High speed travel with windows open, top down etc.
    Other similar features when the adaptation is to a vehicle other than an automobile.
14. Collect ~100,000 vectors of Independent data using other combinations of the above
15. Collect ~50,000 vectors of "real world data" to represent the acceptance criteria and more closely represent the actual seated state probabilities in the real world.
16. Train network and create an algorithm using the training vectors and the Independent data vectors.
17. Validate the algorithm using the real world vectors.
18. Install algorithm into the vehicle and test.
19. Decide on post processing methodology to remove final holes (areas of inaccuracy) in system
20. Implement post-processing methods into the algorithm
21. Final test. The process up until step 13 involves the use of transducers with full horns mounted on the surfaces of the interior passenger compartment. At some point, the actual transducers which are to be used in the final vehicle must be substituted for the trial transducers. This is either done prior to step 13 or at this step. This process involves designing transducer holders that blend with the visual surfaces of the vehicle compartment so that they can be covered with a properly designed grill that helps control the field and also serves to retain the esthetic quality of the interior. This is usually a lengthy process and involves several consultations with the customer. Usually, therefore, the steps from 13-20 are repeated at this point after the final transducer and holder design has been selected. The initial data taken with full horns gives a measure of the best system that can be made to operate in the vehicle. Some degradation in performance is expected when the aesthetic horns and grills are substituted for the full horns. By conducting two complete data collection cycles, an accurate measure of this accuracy reduction can be obtained.

22. Up until this point, the best single neural network algorithm has been developed. The final step is to implement the principles of a combination neural network in order to remove some remaining error sources such as bad data and to further improve the accuracy of the system. It has been found that the implementation of combination neural networks can reduce the remaining errors by up to 50 percent. A combination neural network CAD optimization program provided by International Scientific Research Inc. can now be used to derive the neural network architecture. Briefly, the operator lays out a combination neural network involving many different neural networks arranged in parallel and in series and with appropriate feedbacks which the operator believes could be important. The software then optimizes each neural network and also provides an indication of the value of the network. The operator can then selectively eliminate those networks with little or no value and retrain the system. Through this combination of pruning, retraining and optimizing the final candidate combination neural network results.

23. Ship to customers to be used in production vehicles.

24. Collect additional real world validation data for continuous improvement.

Figure 37:
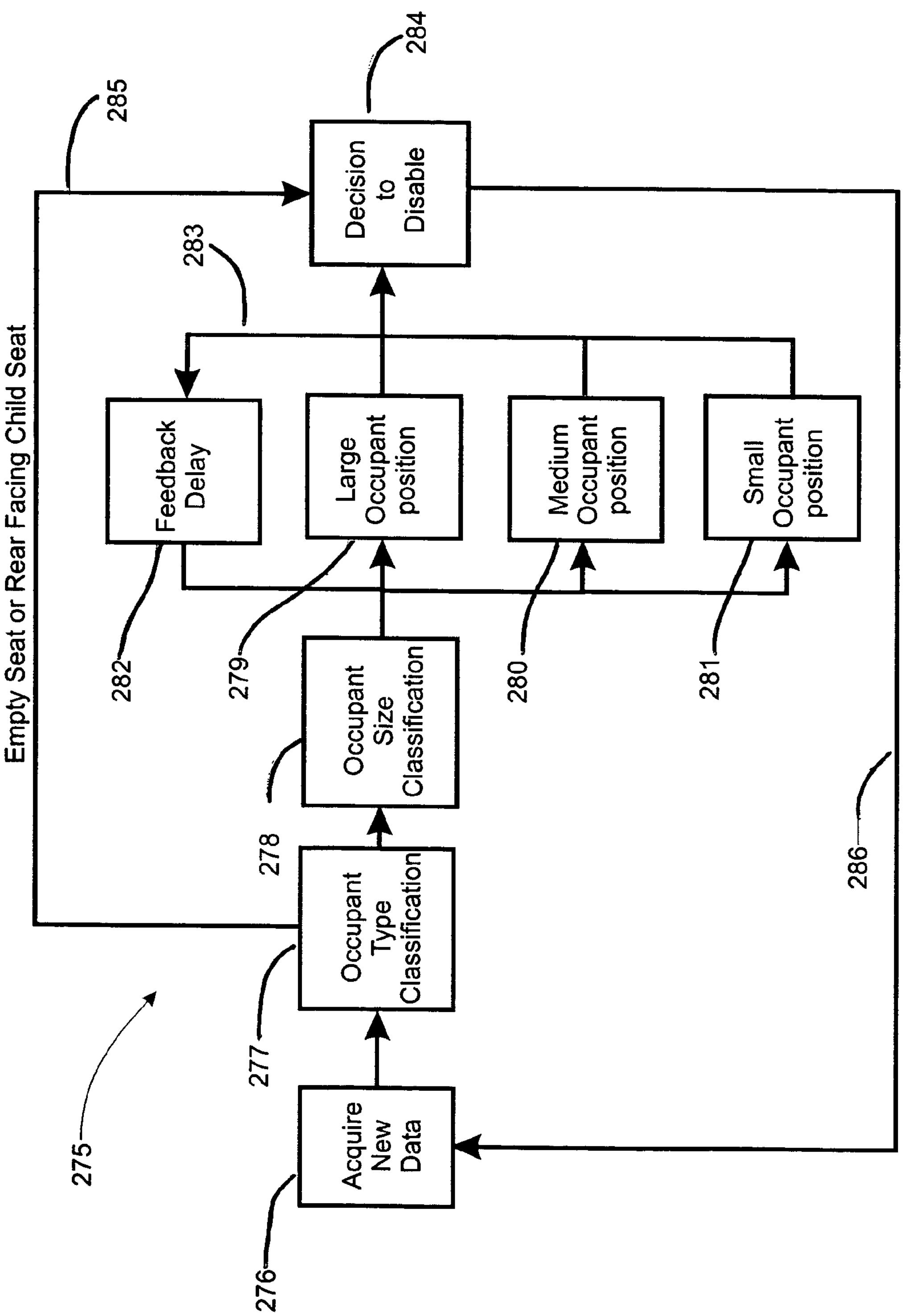
FIG. 37 is a schematic illustrating a combination neural network system.

More detail on the operation of the transducers and control circuitry as well as the neural network is provided in the above-referenced patents and patent applications and elsewhere herein. One particular example of a successful neural network for the two transducer case had 78 input nodes, 6 hidden nodes and 1 output node and for the four transducer case had 176 input nodes 20 hidden layer nodes on hidden layer one, 7 hidden layer nodes on hidden layer two and 1 output node. The weights of the network were determined by supervised training using the back propagation method as described in the above-referenced patents and patent applications and in more detail in the references cited therein. Other neural network architectures are possible including RCE, Logicon Projection, Stochastic, cellular, or support vector machine, etc. An example of a combination neural network system is shown in FIG. 37. Any of the network architectures mention here can be used for any of the boxes in FIG. 37.

Finally, the system is trained and tested with situations representative of the manufacturing and installation tolerances that occur during the production and delivery of the vehicle as well as usage and deterioration effects. Thus, for example, the system is tested with the transducer mounting positions shifted by up to one inch in any direction and rotated by up to 5 degrees, with a simulated accumulation of dirt and other variations. This tolerance to vehicle variation also sometimes permits the installation of the system onto a different but similar model vehicle with, in many cases, only minimal retraining of the system.

3. Mounting Locations for and Quantity of Transducers

Ultrasonic transducers are relatively good at measuring the distance along a radius to a reflective object. An optical array, to be discussed now, on the other hand, can get accurate measurements in two dimensions, the lateral and vertical dimensions relative to the transducer. Assuming the optical array has dimensions of 100 by 100 as compared to an ultrasonic sensor that has a single dimension of 100, an optical array can therefore provide 100 times more information than the ultrasonic sensor. Most importantly, this vastly greater amount of information does not cost significantly more to obtain than the information from the ultrasonic sensor.

As illustrated in FIGS. 8A-8D, the optical sensors are typically located for an automotive vehicle at the positions where the desired information is available with the greatest resolution. These positions are typically in the center front and center rear of the occupancy seat and at the center on each side and top. This is in contrast to the optimum location for ultrasonic sensors, which are the corners of such a rectangle that outlines the seated volume. Styling and other constraints often prevent mounting of transducers at the optimum locations.

Figure 8B:
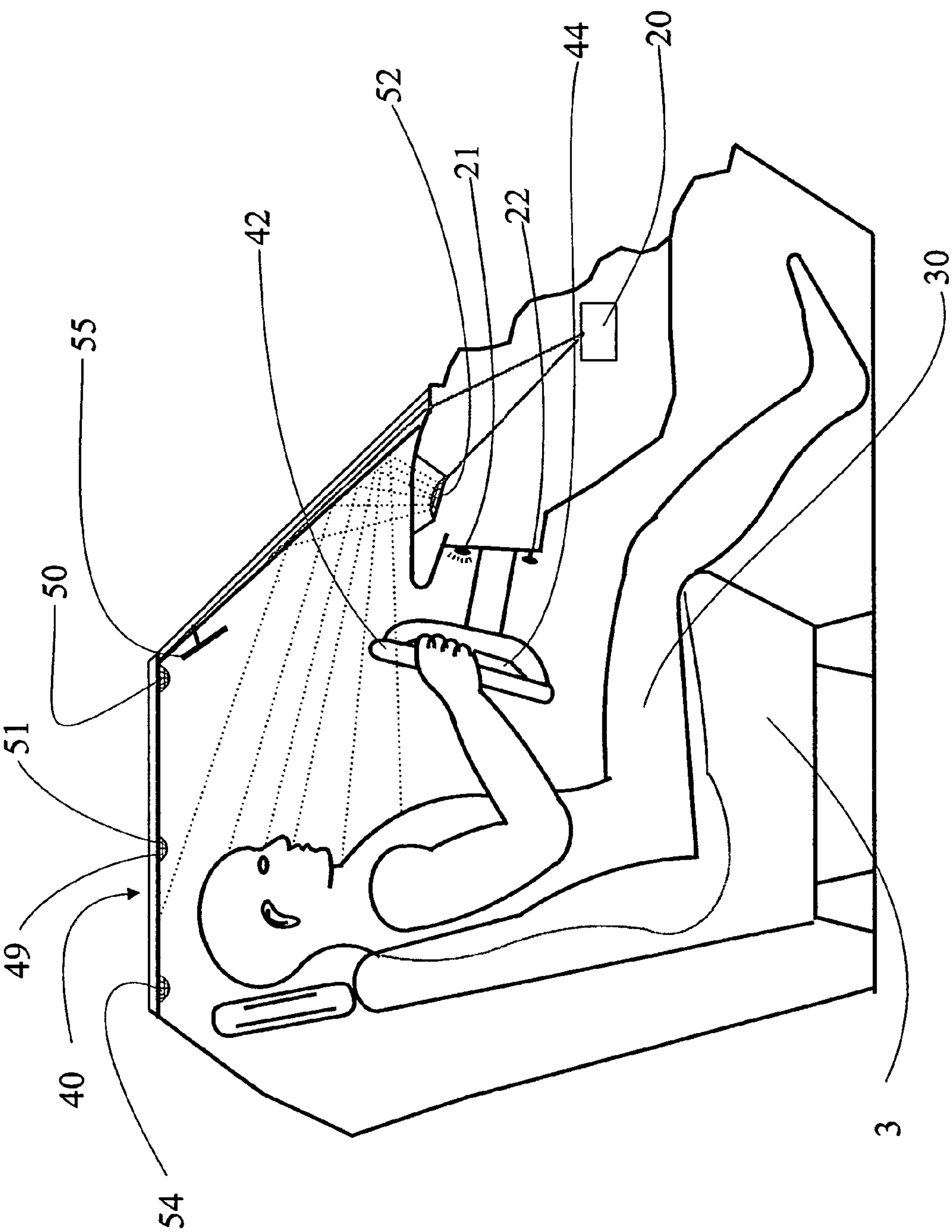
FIG. 8B is a view as in FIG. 8A illustrating the wave pattern from an optical system using an infrared light source and a CCD or CMOS array receiver using the windshield as a reflection surface and showing schematically the interface between the vehicle interior monitoring system of at least one of the inventions disclosed herein and an instrument panel mounted inattentiveness warning light or buzzer and reset button.

An optical infrared transmitter and receiver assembly is shown generally at 52 in FIG. 8B and is mounted onto the instrument panel facing the windshield. Assembly 52 can either be recessed below the upper face of the instrument panel or mounted onto the upper face of the instrument panel. Assembly 52, shown enlarged, comprises a source of infrared radiation, or another form of electromagnetic radiation, and a CCD, CMOS or other appropriate arrays of typically 160 pixels by 160 pixels. In this embodiment, the windshield is used to reflect the illumination light provided by the infrared radiation toward the objects in the passenger compartment and also reflect the light being reflected back by the objects in the passenger compartment, in a manner similar to the "heads-up" display which is now being offered on several automobile models. The "heads-up" display, of course, is currently used only to display information to the driver and is not used to reflect light from the driver to a receiver. Once again, unless one of the distance measuring systems as described below is used, this system alone cannot be used to determine distances from the objects to the sensor. Its main purpose is object identification and monitoring. Depending on the application, separate systems can be used for the driver and for the passenger. In some cases, the cameras located in the instrument panel which receive light reflected off of the windshield can be co-located with multiple lenses whereby the respective lenses aimed at the driver and passenger seats respectively.

Assembly 52 is actually about two centimeters or less in diameter and is shown greatly enlarged in FIG. 8B. Also, the reflection area on the windshield is considerably smaller than illustrated and special provisions are made to assure that this area of the windshield is flat and reflective as is done generally when heads-up displays are used. For cases where there is some curvature in the windshield, it can be at least partially compensated for by the CCD optics.

Transducers 23-25 are illustrated mounted onto the A-pillar of the vehicle, however, since these transducers are quite small, typically less than 2 cm on a side, they could alternately be mounted onto the windshield itself, or other convenient location which provides a clear view of the portion of the passenger compartment being monitored. Other preferred mounting locations include the headliner above and also the side of the seat. Some imagers are now being made that are less than 1 cm on a side.

Figure 38:
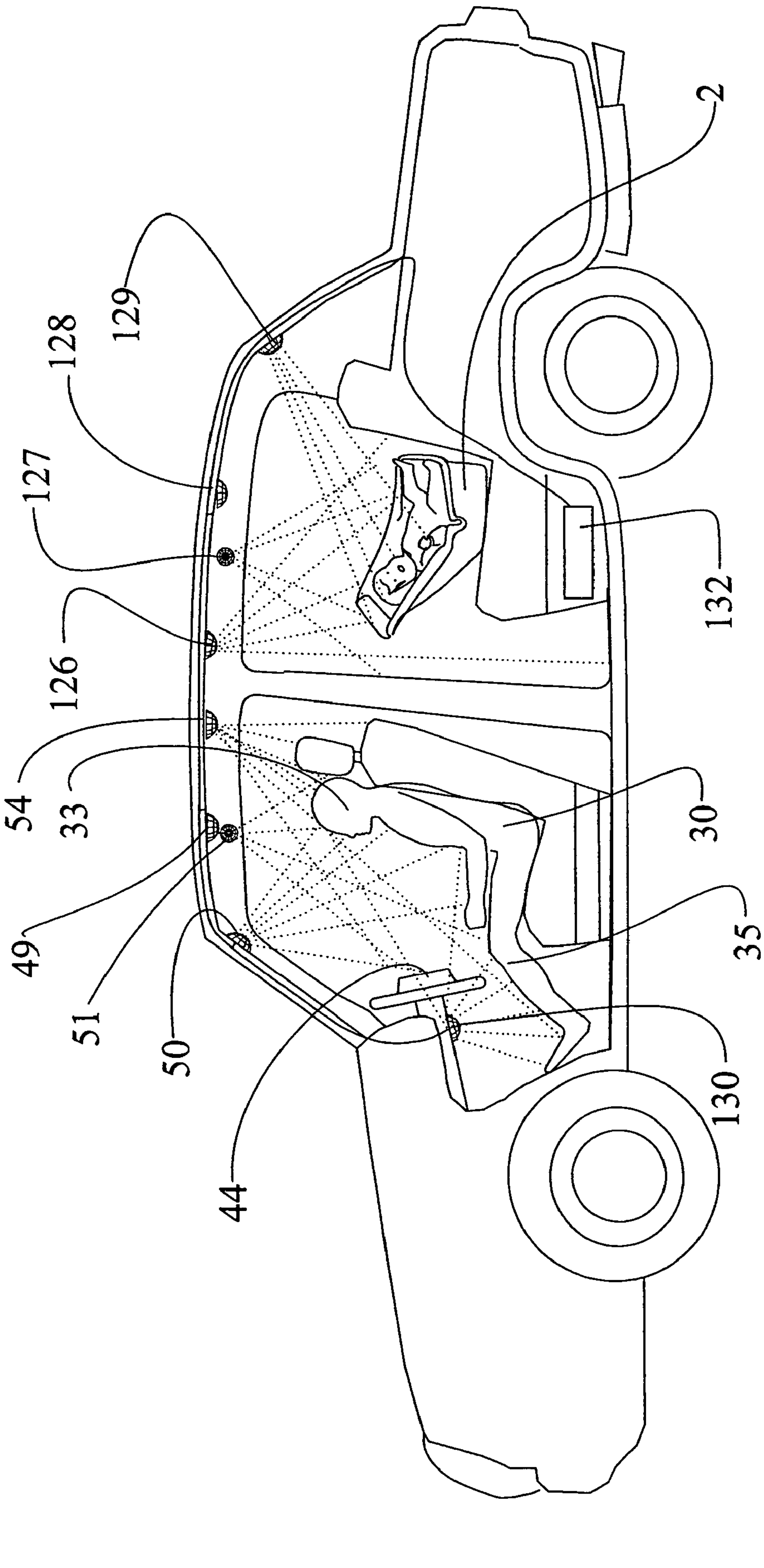
FIG. 38 is a side view, with certain portions removed or cut away, of a portion of the passenger compartment of a vehicle showing preferred mounting locations of optical interior vehicle monitoring sensors

FIG. 38 is a side view, with certain portions removed or cut away, of a portion of the passenger compartment of a vehicle showing preferred mounting locations of optical interior vehicle monitoring sensors (transmitter/receiver assemblies or transducers) 49, 50, 51, 54, 126, 127, 128, 129, and 130. Each of these sensors is illustrated as having a lens and is shown enlarged in size for clarity. In a typical actual device, the diameter of the lens is less than 2 cm and it protrudes from the mounting surface by less than 1 cm. Specially designed sensors can be considerably smaller. This small size renders these devices almost unnoticeable by vehicle occupants. Since these sensors are optical, it is important that the lens surface remains relatively clean. Control circuitry 132, which is coupled to each transducer, contains a self-diagnostic feature where the image returned by a transducer is compared with a stored image and the existence of certain key features is verified. If a receiver fails this test, a warning is displayed to the driver which indicates that cleaning of the lens surface is required.

The technology illustrated in FIG. 38 can be used for numerous purposes relating to monitoring of the space in the passenger compartment behind the driver including: (i) the determination of the presence and position of objects in the rear seat(s), (ii) the determination of the presence, position and orientation of child seats 2 in the rear seat, (iii) the monitoring of the rear of an occupant's head 33, (iv) the monitoring of the position of occupant 30, (v) the monitoring of the position of the occupant's knees 35, (vi) the monitoring of the occupant's position relative to the airbag 44, (vii) the measurement of the occupant's height, as well as other monitoring functions as described elsewhere herein.

Information relating to the space behind the driver can be obtained by processing the data obtained by the sensors 126, 127, 128 and 129, which data would be in the form of images if optical sensors are used as in the preferred embodiment. Such information can be the presence of a particular occupying item or occupant, e.g., a rear facing child seat 2 as shown in FIG. 38, as well as the location or position of occupying items. Additional information obtained by the optical sensors can include an identification of the occupying item. The information obtained by the control circuitry by processing the information from sensors 126, 127, 128 and 129 may be used to affect any other system or component in the vehicle in a similar manner as the information from the sensors which monitor the front seat is used as described herein, such as the airbag system. Processing of the images obtained by the sensors to determine the presence, position and/or identification of any occupants or occupying item can be effected using a pattern recognition algorithm in any of the ways discussed herein, e.g., a trained neural network. For example, such processing can result in affecting a component or system in the front seat such as a display that allows the operator to monitor what is happening in the rear seat without having to turn his or her head.

In the preferred implementation, as shown in FIGS. 8A-8E, four transducer assemblies are positioned around the seat to be monitored, each can comprise one or more LEDs with a diverging lenses and a CMOS array. Although illustrated together, the illuminating source in many cases will not be co-located with the receiving array. The LED emits a controlled angle, 120° for example, diverging cone of infrared radiation that illuminates the occupant from both sides and from the front and rear. This angle is not to be confused with the field angle used in ultrasonic systems. With ultrasound, extreme care is required to control the field of the ultrasonic waves so that they will not create multipath effects and add noise to the system. With infrared, there is no reason, in the implementation now being described, other than to make the most efficient use of the infrared energy, why the entire vehicle cannot be flooded with infrared energy either from many small sources or from a few bright ones.

The image from each array is used to capture two dimensions of occupant position information, thus, the array of assembly 50 positioned on the windshield header, which is approximately 25% of the way laterally across the headliner in front of the driver, provides a both vertical and transverse information on the location of the driver. A similar view from the rear is obtained from the array of assembly 54 positioned behind the driver on the roof of the vehicle and above the seatback potion of the seat 72. As such, assembly 54 also provides both vertical and transverse information on the location of the driver. Finally, arrays of assemblies 49 and 51 provide both vertical and longitudinal driver location information. Another preferred location is the headliner centered directly above the seat of interest. The position of the assemblies 49-52 and 54 may differ from that shown in the drawings. In the invention, in order that the information from two or more of the assemblies 49-52 and 54 may provide a three-dimensional image of the occupant, or portion of the passenger compartment, the assemblies generally should not be arranged side-by-side. A side-by-side arrangement as used in several prior art references discussed above, will provide two essentially identical views with the difference being a lateral shift. This does not enable a complete three-dimensional view of the occupant.

One important point concerns the location and number of optical assemblies. It is possible to use fewer than four such assemblies with a possible resulting loss in accuracy. The number of four was chosen so that either a forward or rear assembly or either of the side assemblies can be blocked by a newspaper, for example, without seriously degrading the performance of the system. Since drivers rarely are reading newspapers while driving, fewer than four arrays are usually adequate for the driver side. In fact, one is frequently sufficient. One camera is also usually sufficient for the passenger side if the goal of the system is classification only or if camera blockage is tolerated for occupant tracking.

The particular locations of the optical assemblies were chosen to give the most accurate information as to the locations of the occupant. This is based on an understanding of what information can be best obtained from a visual image. There is a natural tendency on the part of humans to try to gauge distance from the optical sensors directly. This, as can be seen above, is at best complicated involving focusing systems, stereographic systems, multiple arrays and triangulation, time of flight measurement, etc. What is not intuitive to humans is to not try to obtain this distance directly from apparatus or techniques associated with the mounting location. Whereas ultrasound is quite good for measuring distances from the transducer (the z-axis), optical systems are better at measuring distances in the vertical and lateral directions (the x and y-axes). Since the precise locations of the optical transducers are known, that is, the geometry of the transducer locations is known relative to the vehicle, there is no need to try to determine the displacement of an object of interest from the transducer (the z-axis) directly. This can more easily be done indirectly by another transducer. That is, the vehicle z-axis to one transducer is the camera x-axis to another.

Figure 13:
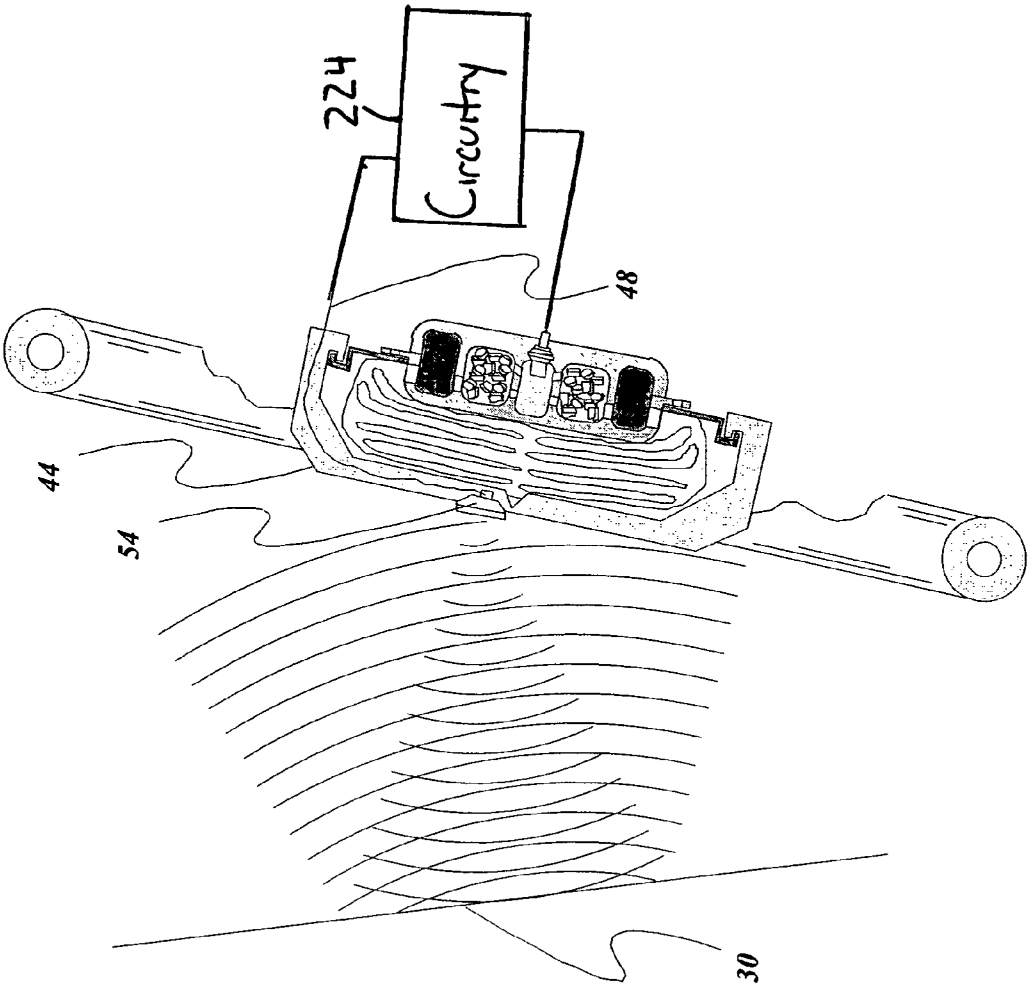
FIG. 13 is a cross section view of a steering wheel and airbag module assembly showing a preferred mounting location of an ultrasonic wave generator and receiver.
Figure 14:
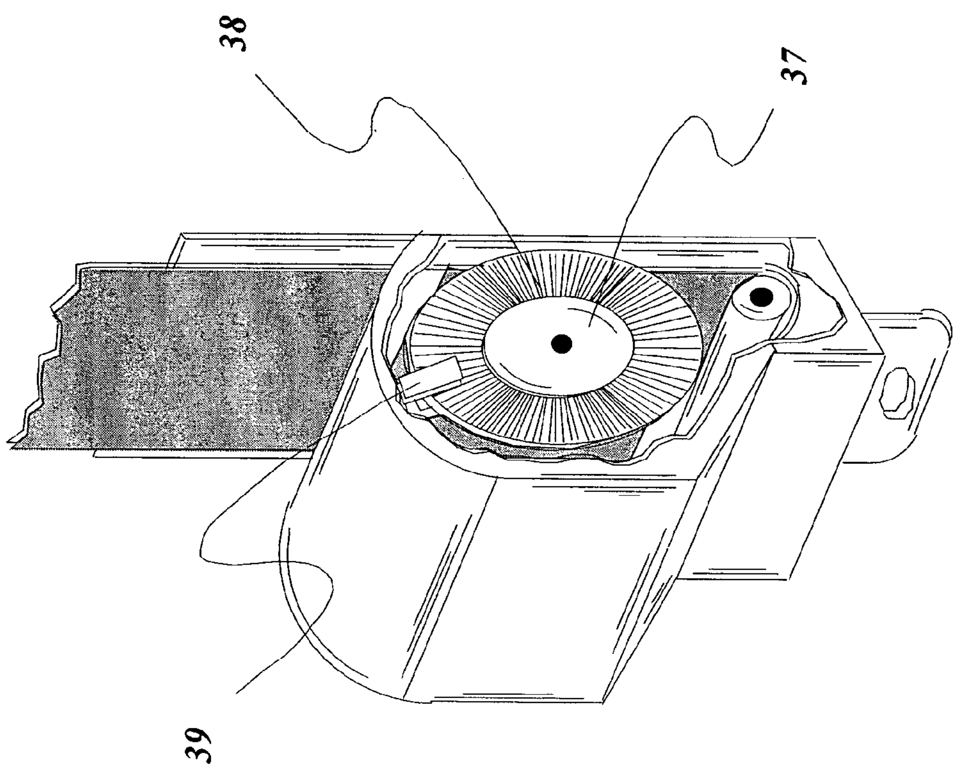
FIG. 14 is a partial cutaway view of a seatbelt retractor with a spool out sensor utilizing a shaft encoder.

Another preferred location of a transmitter/receiver for use with airbags is shown at 54 in FIGS. 5 and 13. In this case, the device is attached to the steering wheel and gives an accurate determination of the distance of the driver's chest from the airbag module. This implementation would generally be used with another device such as 50 at another location.

A transmitter/receiver 54 shown mounted on the cover of the airbag module 44 is shown in FIG. 13. The transmitter/receiver 54 is attached to various electronic circuitry 224 by means of wire cable 48. Circuitry 224 is coupled to the inflator portion of the airbag module 44 and as discussed below, can determine whether deployment of the airbag should occur, whether deployment should be suppressed and modify a deployment parameter, depending on the construction of the airbag module 44. When an airbag in the airbag module 44 deploys, the cover begins moving toward the driver. If the driver is in close proximity to this cover during the early stages of deployment, the driver can be seriously injured or even killed. It is important, therefore, to sense the proximity of the driver to the cover and if he or she gets too close, to disable deployment of the airbag. An accurate method of obtaining this information would be to place the distance-measuring device 54 onto the airbag cover as shown in FIG. 13. Appropriate electronic circuitry, either in the transmitter/receiver unit 54 (which can also be referred to as a distance measuring device for this embodiment) or circuitry 224 can be used to not only determine the actual distance of the driver from the cover but also the driver's velocity as discussed above. In this manner, a determination can be made as to where the driver is likely to be at the time of deployment of the airbag, i.e., the driver's expected position based on his current position and velocity. This constitutes a determination of the expected position of the driver based on the current measured position, measured by the transmitter/receiver 54, and current velocity, determined from multiple distance measurements or otherwise as discussed herein. For example, with knowledge of the driver's current position and velocity, the driver's future, expected position can be extrapolated (for example, future position equals current position plus velocity multiplied by the time at which the future position is desired to be known considering the velocity to be constant over the time difference). This information (about where the driver is likely to be at the time of deployment of the airbag) can be used by the circuitry 224 most importantly to prevent deployment of the airbag (which constitutes suppression of the deployment) but also to modify any deployment parameter of the airbag via control of the inflator module such as the rate of airbag deployment. This constitutes control of a component (the airbag module) in consideration of the expected position of the occupant. In FIG. 5, for one implementation, ultrasonic waves are transmitted by a transmitter/receiver 54 toward the chest of the driver 30. The reflected waves are then received by the same transmitter/receiver 54.

One problem of the system using a transmitter/receiver 54 in FIG. 5 or 13 is that a driver may have inadvertently placed his hand over the transmitter/receiver 54, thus defeating the operation of the device. A second confirming transmitter/receiver 50 can therefore be placed at some other convenient position such as on the roof or headliner of the passenger compartment as shown in FIG. 5. This transmitter/receiver 50 operates in a manner similar to transmitter/receiver 54.

The applications described herein have been illustrated using the driver of the vehicle. The same systems of determining the position of the occupant relative to the airbag apply to the passenger, sometimes requiring minor modifications. Also of course, a similar system can be appropriately designed for other monitoring situations such as for cargo containers and truck trailers.

It is likely that the sensor required triggering time based on the position of the occupant will be different for the driver than for the passenger. Current systems are based primarily on the driver with the result that the probability of injury to the passenger is necessarily increased either by deploying the airbag too late or by failing to deploy the airbag when the position of the driver would not warrant it but the passenger's position would. With the use of occupant position sensors for both the passenger and driver, the airbag system can be individually optimized for each occupant and result in further significant injury reduction. In particular, either the driver or passenger system can be disabled if either the driver or passenger is out of position.

There is almost always a driver present in vehicles that are involved in accidents where an airbag is needed. Only about 30% of these vehicles, however, have a passenger. If the passenger is not present, there is usually no need to deploy the passenger side airbag. The occupant position sensor, when used for the passenger side with proper pattern recognition circuitry, can also ascertain whether or not the seat is occupied, and if not, can disable the deployment of the passenger side airbag and thereby save the cost of its replacement. A sophisticated pattern recognition system could even distinguish between an occupant and a bag of groceries or a box, for example, which in some cargo container or truck trailer monitoring situations is desired. Finally, there has been much written about the out of position child who is standing or otherwise positioned adjacent to the airbag, perhaps due to pre-crash braking. The occupant position sensor described herein can prevent the deployment of the airbag in this situation.

3.1 Single Camera, Dual Camera with Single Light Source

Many automobile companies are opting to satisfy the requirements of FMVSS-208 by using a weight only system such as the bladder or strain gage systems disclosed here. Such a system provides an elementary measure of the weight of the occupying object but does not give a reliable indication of its position, at least for automotive vehicles. It can also be easily confused by any object that weighs 60 or more pounds and that is interpreted as an adult. Weight only systems are also static systems in that due to vehicle dynamics that frequently accompany a pre crash braking event they are unable to track the position of the occupant. The load from seatbelts can confuse the system and therefore a special additional sensor must be used to measure seatbelt tension. In some systems, the device must be calibrated for each vehicle and there is some concern as to whether this calibration will be proper for the life on the vehicle.

A single camera can frequently provide considerably more information than a weight only system without the disadvantages of weight sensors and do so at a similar cost. Such a single camera in its simplest installation can categorize the occupancy state of the vehicle and determine whether the airbag should be suppressed due to an empty seat or the presence of a child of a size that corresponds to one weighing less than 60 pounds. Of course, a single camera can also easily do considerably more by providing a static out-of-position indication and, with the incorporation of a faster processor, dynamic out-of-position determination can also be provided. Thus, especially with the costs of microprocessors continuing to drop, a single camera system can easily provide considerably more functionality than a weight only system and yet stay in the same price range.

A principal drawback of a single camera system is that it can be blocked by the hand of an occupant or by a newspaper, for example. This is a rare event since the preferred mounting location for the camera is typically high in the vehicle such as on the headliner. Also, it is considerably less likely that the occupant will always be reading a newspaper, for example, and if he or she is not reading it when the system is first started up, or at any other time during the trip, the camera system will still get an opportunity to see the occupant when he or she is not being blocked and make the proper categorization. The ability of the system to track the occupant will be impaired but the system can assume that the occupant has not moved toward the airbag while reading the newspaper and thus the initial position of the occupant can be retained and used for suppression determination. Finally, the fact that the camera is blocked can be determined and the driver made aware of this fact in much the same manner that a seatbelt light notifies the driver that the passenger is not wearing his or her seatbelt.

The accuracy of a single camera system can be above 99% which significantly exceeds the accuracy of weight only systems. Nevertheless, some automobile manufacturers desire even greater accuracy and therefore opt for the addition of a second camera. Such a camera is usually placed on the opposite side of the occupant as the first camera. The first camera may be placed on or near the dome light, for example, and the second camera can be on the headliner above the side door. A dual camera system such as this can operate more accurately in bright daylight situations where the window area needs to be ignored in the view of the camera that is mounted near the dome.

Sometimes, in a dual camera system, only a single light source is used. This provides a known shadow pattern for the second camera and helps to accentuate the edges of the occupying item rendering classification easier. Any of the forms of structured light can also be used and through these and other techniques the corresponding points in the two images can more easily be determined thus providing a three-dimensional model of the occupant or occupying object in the case of other vehicle types such as a cargo container or truck trailer.

As a result, the current assignee has developed a low cost single camera system which has been extensively tested for the most difficult problem of automobile occupant sensing but is nevertheless also applicable for monitoring of other vehicles such as cargo containers and truck trailers. The automotive occupant position sensor system uses a CMOS camera in conjunction with pattern recognition algorithms for the discrimination of out-of-position occupants and rear facing child safety seats. A single imager, located strategically within the occupant compartment, is coupled with an infrared LED that emits unfocused, wide-beam pulses toward the passenger volume. These pulses, which reflect off of objects in the passenger seat and are captured by the camera, contain information for classification and location determination in approximately 10 msec. The decision algorithm processes the returned information using a uniquely trained neural network, which may not be necessary in the simpler cargo container or truck trailer monitoring cases. The logic of the neural network was developed through extensive in-vehicle training with thousands of realistic occupant size and position scenarios. Although the optical occupant position sensor can be used in conjunction with other technologies (such as weight sensing, seat belt sensing, crash severity sensing, etc.), it is a stand-alone system meeting the requirements of FMVSS-208. This device will be discussed in detail below.

3.2 Location of the Transducers

Any of the transducers discussed herein such as an active pixel or other camera can be arranged in various locations in the vehicle including in a headliner, roof, ceiling, rear view mirror assembly, an A-pillar, a B-pillar and a C-pillar or a side wall or even a door in the case of a cargo container or truck trailer. Images of the front seat area or the rear seat area can be obtained by proper placement and orientation of the transducers such as cameras. The rear view mirror assembly can be a good location for a camera, particularly if it is attached to the portion of the mirror support that does not move when the occupant is adjusting the mirror. Cameras at this location can get a good view of the driver, passenger as well as the environment surrounding the vehicle and particularly in the front of the vehicle. It is an ideal location for automatic dimming headlight cameras.

3.3 Color Cameras—Multispectral Imaging

All occupant sensing systems, except those of the current assignee, developed to date as reported in the patent and non-patent literature have been generally based on a single frequency. As discussed herein, the use of multiple frequencies with ultrasound makes it possible to change a static system into a dynamic system allowing the occupant to be tracked during pre-crash braking, for example. Multispectral imaging can also provide advantages for camera or other optical-based systems. The color of the skin of an occupant is a reliable measure of the presence of an occupant and also renders the segmentation of the image to be more easily accomplished. Thus, the face can be more easily separated from the rest of the image simplifying the determination of the location of the eyes of the driver, for example. This is particularly true for various frequencies of passive and active infrared. Also, as discussed in more detail below, life forms react to radiation of different frequencies differently than non-life forms again making the determination of the presence of a life form easier. Finally, there is just considerably more information in a color or multispectral image than in a monochromic image. This additional information improves the accuracy of the identification and tracking process and thus of the system. In many cases, this accuracy improvement is so small that the added cost is not justified but as costs of electronics and cameras continue to drop this equation is changing and it is expected that multispectral imaging will prevail.

Illumination for nighttime is frequently done using infrared. When multispectral imaging is used the designer has the choice of reverting to IR only for night time or using a multispectral LED and a very sensitive camera so that the flickering light does not annoy the driver. Alternately, a sensitive camera along with a continuous low level of illumination can be used. Of course, multispectral imaging does not require that the visible part of the spectrum be used. Ultraviolet, X-rays and many other frequencies in the infrared part of the spectrum are available. Life forms, particularly humans, exhibit particularly interesting and identifiable reactions (reflection, absorption, scattering, transmission, emission) to frequencies in other parts of the electromagnetic spectrum (see for example the book *Alien Vision* referenced above) as discussed elsewhere herein.

3.4 High Dynamic Range Cameras

An active pixel camera is a special camera which has the ability to adjust the sensitivity of each pixel of the camera similar to the manner in which an iris adjusts the sensitivity of all of the pixels together of a camera. Thus, the active pixel camera automatically adjusts to the incident light on a pixel-by-pixel basis. An active pixel camera differs from an active infrared sensor in that an active infrared sensor, such as of the type envisioned by Mattes et al. (discussed above), is generally a single pixel sensor that measures the reflection of infrared light from an object. In some cases, as in the HDRC camera, the output of each pixel is a logarithm of the incident light thus giving a high dynamic range to the camera. This is similar to the technique used to suppress the effects of thermal gradient distortion of ultrasonic signals as described in the above cross-referenced patents. Thus, if the incident radiation changes in magnitude by 1,000,000, for example, the output of the pixel may change by a factor of only 6.

A dynamic pixel camera is a camera having a plurality of pixels and which provides the ability to pick and choose which pixels should be observed, as long as they are contiguous.

An HDRC camera is a type of active pixel camera where the dynamic range of each pixel is considerably broader. An active pixel camera manufactured by the Photobit Corporation has a dynamic range of 70 db while an IMS Chips camera, an HDRC camera manufactured by another manufacturer, has a dynamic range of 120 db. Thus, the HDRC camera has a 100,000 times greater range of light sensitivity than the Photobit camera.

The accuracy of the optical occupant sensor is dependent upon the accuracy of the camera. The dynamic range of light within a vehicle can exceed 120 decibels. When a car is driving at night, for example, very little light is available whereas when driving in a bright sunlight, especially in a convertible, the light intensity can overwhelm many cameras. Additionally, the camera must be able to adjust rapidly to changes in light caused by, for example, the emergence of the vehicle from tunnel, or passing by other obstructions such as trees, buildings, other vehicles, etc. which temporarily block the sun and can cause a strobing effect at frequencies approaching 1 kHz.

As mentioned, the IMS HDRC technology provides a 120 dB dynamic intensity response at each pixel in a monochromatic mode. The technology has a 1 million to one dynamic range at each pixel. This prevents blooming, saturation and flaring normally associated with CMOS and CCD camera technology. This solves a problem that will be encountered in an automobile when going from a dark tunnel into bright sunlight. Such a range can even exceed the 120 dB intensity.

There is also significant infrared radiation from bright sunlight and from incandescent lights within the vehicle. Such situations may even exceed the dynamic range of the HDRC camera and additional filtering may be required. Changing the bias on the receiver array, the use of a mechanical iris, or of electrochromic glass or liquid crystal, or a Kerr or Pockel cell can provide this filtering on a global basis but not at a pixel level. Filtering can also be used with CCD arrays, but the amount of filtering required is substantially greater than for the HDRC camera. A notch filter can be used to block significant radiation from the sun, for example. This notch filter can be made as a part of the lens through the placement of various coatings onto the lens surface.

Liquid crystals operate rapidly and give as much as a dynamic range of 10,000 to 1 but may create a pixel interference affect. Electrochromic glass operates more slowly but more uniformly thereby eliminating the pixel affect. The pixel effect arises whenever there is one pixel device in front of another. This results in various aliasing, Moiré patterns and other ambiguities. One way of avoiding this is to blur the image. Another solution is to use a large number of pixels and combine groups of pixels to form one pixel of information and thereby to blur the edges to eliminate some of the problems with aliasing and Moiré patterns. An alternate to the liquid crystal device is the suspended particle device or SPD as discussed elsewhere herein. Other alternatives include spatial light monitors such as Pockel or Kerr cells also discussed elsewhere herein.

One straightforward approach is the use of a mechanical iris. Standard cameras already have response times of several tens of milliseconds range. They will switch, for example, in a few frames on a typical video camera (1 frame=0.033 seconds). This is sufficiently fast for categorization but much too slow for dynamic out-of-position tracking.

An important feature of the IMS Chips HDRC camera is that the full dynamic range is available at each pixel. Thus, if there are significant variations in the intensity of light within the vehicle, and thereby from pixel to pixel, such as would happen when sunlight streams and through a window, the camera can automatically adjust and provide the optimum exposure on a pixel by pixel basis. The use of the camera having this characteristic is beneficial to the invention described herein and contributes significantly to system accuracy. CCDs have a rather limited dynamic range due to their inherent linear response and consequently cannot come close to matching the performance of human eyes. A key advantage of the IMS Chips HDRC camera is its logarithmic response which comes closest to matching that of the human eye. The IMS HDRC camera is also useful in monitoring cargo containers and truck trailers where very little light is available when the door is shut. A small IR LED then can provide the necessary light at a low power consumption which is consistent with a system that may have to operate for long periods on battery power.

Another approach, which is applicable in some vehicles at some times, is to record an image without the infrared illumination and then a second image with the infrared illumination and to then subtract the first image from the second image. In this manner, illumination caused by natural sources such as sunlight or even from light bulbs within the vehicle can be subtracted out. Using the logarithmic pixel system of the IMS Chips camera, care must be taken to include the logarithmic effect during the subtraction process. For some cases, natural illumination such as from the sun, light bulbs within the vehicle, or radiation emitted by the object itself can be used alone without the addition of a special source of infrared illumination as discussed below.

Other imaging systems such as CCD arrays can also of course be used with at least one of the inventions disclosed herein. However, the techniques will be different since the camera is very likely to saturate when bright light is present and to require the full resolution capability, when the light is dim, of the camera iris and shutter speed settings to provide some compensation. Generally, when practicing at least one of the inventions disclosed herein, the interior of the passenger compartment will be illuminated with infrared radiation.

One novel solution is to form the image in memory by adding up a sequence of very short exposures. The number stored in memory would be the sum of the exposures on a pixel by pixel basis and the problem of saturation disappears since the memory location can be made as floating point numbers. This then permits the maximum dynamic range but requires that the information from all of the pixels be removed at high speed. In some cases, each pixel would then be zeroed while in others, the charge can be left on the pixel since when saturation occurs the relevant information will already have been obtained.

There are other bright sources of infrared that must be accounted for. These include the sun and any light bulbs that may be present inside the vehicle. This lack of a high dynamic range inherent with the CCD technology requires the use of an iris, fast electronic shutter, liquid crystal, Kerr or Pockel cell, or electrochromic glass filter to be placed between the camera and the scene. Even with these filters however, some saturation can take place with CCD cameras under bright sun or incandescent lamp exposure. This saturation reduces the accuracy of the image and therefore the accuracy of the system. In particular, the training regimen that must be practiced with CCD cameras is more severe since all of the saturation cases must be considered since the camera may be unable to appropriately adjust. Thus, although CCD cameras can be used, HDRC logarithmic cameras such as manufactured by IMS Chips are preferred. They not only provide a significantly more accurate image but also significantly reduce the amount of training effort and associated data collection that must be undertaken during the development of the neural network algorithm or other computational intelligence system. In some applications, it is possible to use other more deterministic image processing or pattern recognition systems than neural networks.

Another very important feature of the HDRC camera from IMS Chips is that the shutter time is constant at less than 100 ns irrespective of brightness of the scene. The pixel data arrives at constant rate synchronous with the internal imager clock. Random access to each pixel facilitates high-speed intelligent access to any sub-frame (block) size or sub-sampling ratio and a trade-off of frame speed and frame size therefore results. For example, a scene with 128 K pixels per frame can be taken at 120 frames per second, or about 8 milliseconds per frame, whereas a sub-frame can be taken in run at as high as 4000 frames per second with 4 K pixels per frame. This combination allows the maximum resolution for the identification and classification part of the occupant sensor problem while permitting a concentration on those particular pixels which track the head or chest, as described above, for dynamic out-of-position tracking. In fact, the random access features of these cameras can be used to track multiple parts of the image simultaneously while ignoring the majority of the image, and do so at very high speed. For example, the head can be tracked simultaneously with the chest by defining two separate sub-frames that need not be connected. This random access pixel capability, therefore, is optimally suited for recognizing and tracking vehicle occupants. It is also suited for monitoring the environment outside of the vehicle for the purposes of blind spot detection, collision avoidance and anticipatory sensing. Photobit Corporation of 135 North Los Robles Ave., Suite 700, Pasadena, Calif. 91101 manufactures a camera with some characteristics similar to the IMS Chips camera. Other competitive cameras can be expected to appear on the market.

Photobit refers to their Active Pixel Technology as APS. According to Photobit, in the APS, both the photo detector and readout amplifier are part of each pixel. This allows the integrated charge to be converted into a voltage in the pixel that can then be read out over X-Y wires instead of using a charge domain shift register as in CCDs. This column and row addressability (similar to common DRAM) allows for window of interest readout (windowing) which can be utilized for on chip electronic pan/tilt and zoom. Windowing provides added flexibility in applications, such as disclosed herein, needing image compression, motion detection or target tracking. The APS utilizes intra-pixel amplification in conjunction with both temporal and fixed pattern noise suppression circuitry (i.e., correlated double sampling), which produces exceptional imagery in terms of wide dynamic range (~75 dB) and low noise (~15 e–rms noise floor) with low fixed pattern noise (<0.15% sat). Unlike CCDs, the APS is not prone to column streaking due to blooming pixels. This is because CCDs rely on charge domain shift registers that can leak charge to adjacent pixels when the CCD registers overflows. Thus, bright lights "bloom" and cause unwanted streaks in the image. The active pixel can drive column busses at much greater rates than passive pixel sensors and CCDs. On-chip analog-to-digital conversion (ADC) facilitates driving high speed signals off chip. In addition, digital output is less sensitive to pickup and crosstalk, facilitating computer and digital controller interfacing while increasing system robustness. A high speed APS recently developed for a custom binary output application produced over 8,000 frames per second, at a resolution of 128×128 pixels. It is possible to extend this design to a 1024×1024 array size and achieve greater than 1000 frames per second for machine vision. All of these features can be important to many applications of at least one of the inventions disclosed herein.

These advanced cameras, as represented by the HDRC and the APS cameras, now make it possible to more accurately monitor the environment in the vicinity of the vehicle. Previously, the large dynamic range of environmental light has either blinded the cameras when exposed to bright light or else made them unable to record images when the light level was low. Even the HDRC camera with its 120 dB dynamic range may be marginally sufficient to handle the fluctuations in environmental light that occur. Thus, the addition of a electrochromic, liquid crystal, SPD, spatial light monitors or other similar filter may be necessary. This is particularly true for cameras such as the Photobit APS camera with its 75 dB dynamic range.

At about 120 frames per second, these cameras are adequate for cases where the relative velocity between vehicles is low. There are many cases, however, where this is not the case and a much higher monitoring rate is required. This occurs for example, in collision avoidance and anticipatory sensor applications. The HDRC camera is optimally suited for handling these cases since the number of pixels that are being monitored can be controlled resulting in a frame rate as high as about 4000 frames per second with a smaller number of pixels.

Another key advantage of the HDRC camera is that it is quite sensitive to infrared radiation in the 0.8 to 1 micron wavelength range. This range is generally beyond visual range for humans permitting this camera to be used with illumination sources that are not visible to the human eye. Naturally, a notch filter is frequently used with the camera to eliminate unwanted wavelengths. These cameras are available from the Institute for Microelectronics (IMS Chips), Allamndring 30a, D-70569 Stuttgart, Germany with a variety of resolutions ranging from 512 by 256 to 720 by 576 pixels and can be custom fabricated for the resolution and response time required.

One problem with high dynamic range cameras, particularly those making use of a logarithmic compression is that the edges of objects in the field of view tend to wash out and the picture loses a lot of contrast. This causes problems for edge detecting algorithms and thus reduces the accuracy of the system. There are a number of other different methods of achieving a high dynamic range without sacrificing contrast. One system by Nayar, as discussed elsewhere herein, takes a picture using adjacent pixels with different radiation blocking filers. Four such pixel types are used allowing Nayar to essentially obtain 4 separate pictures with one snap of the shutter. Software then selects which of the four pixels to use for each part of the image so that the dark areas receive one exposure and somewhat brighter areas another exposure and so on. The brightest pixel receives all of the incident light, the next brightest filters half of the light, the next brightest half again and the dullest pixel half again. Other ratios could be used as could more levels of pixels, e.g., eight instead of four. Experiments have shown that this is sufficient to permit a good picture to be taken when bright sunlight is streaming into a dark room. A key advantage of this system is that the full frame rate is available and the disadvantage is that only 25% of the pixels are in fact used to form the image.

Another system drains the charge off of the pixels as the picture is being taken and stored the integrated results in memory. TFA technology lends itself to this implementation. As long as the memory capacity is sufficient, the pixel never saturates. An additional approach is to take multiple images at different iris or shutter settings and combine them in much the same way as with the Nayar method. A still different approach is to take several pictures at a short shutter time or a small iris setting and combine the pictures in a processor or other appropriate device. In this manner, the effective dynamic range of the camera can be extended. This method may be too slow for some dynamic applications.

3.5 Fisheye Lens, Pan and Zoom

Figure 8C:
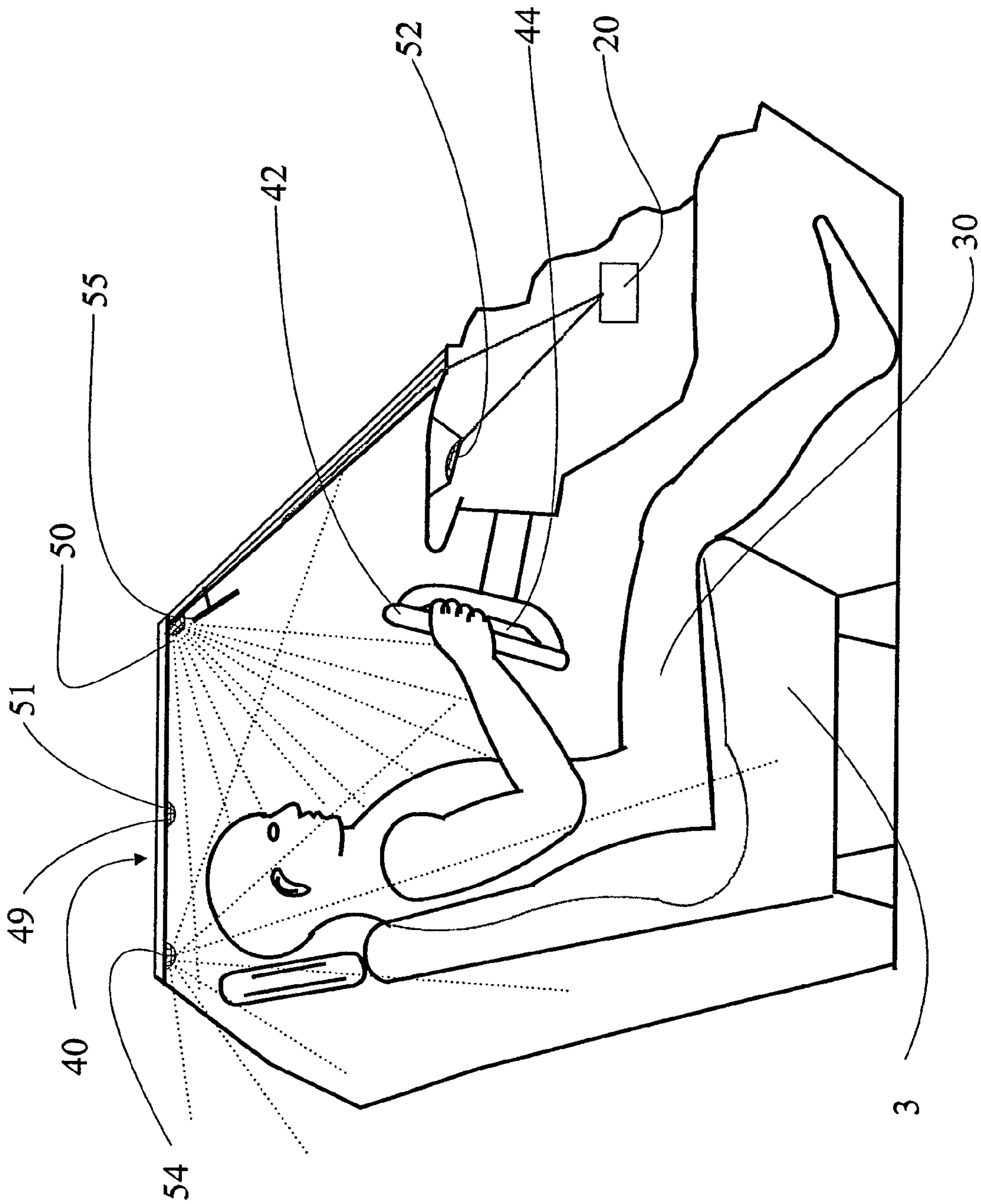
FIG. 8C is a view as in FIG. 8A illustrating the wave pattern from an optical system using an infrared light source and a CCD or CMOS array receiver where the CCD or CMOS array receiver is covered by a lens permitting a wide angle view of the contents of the passenger compartment.
Figure 8D:
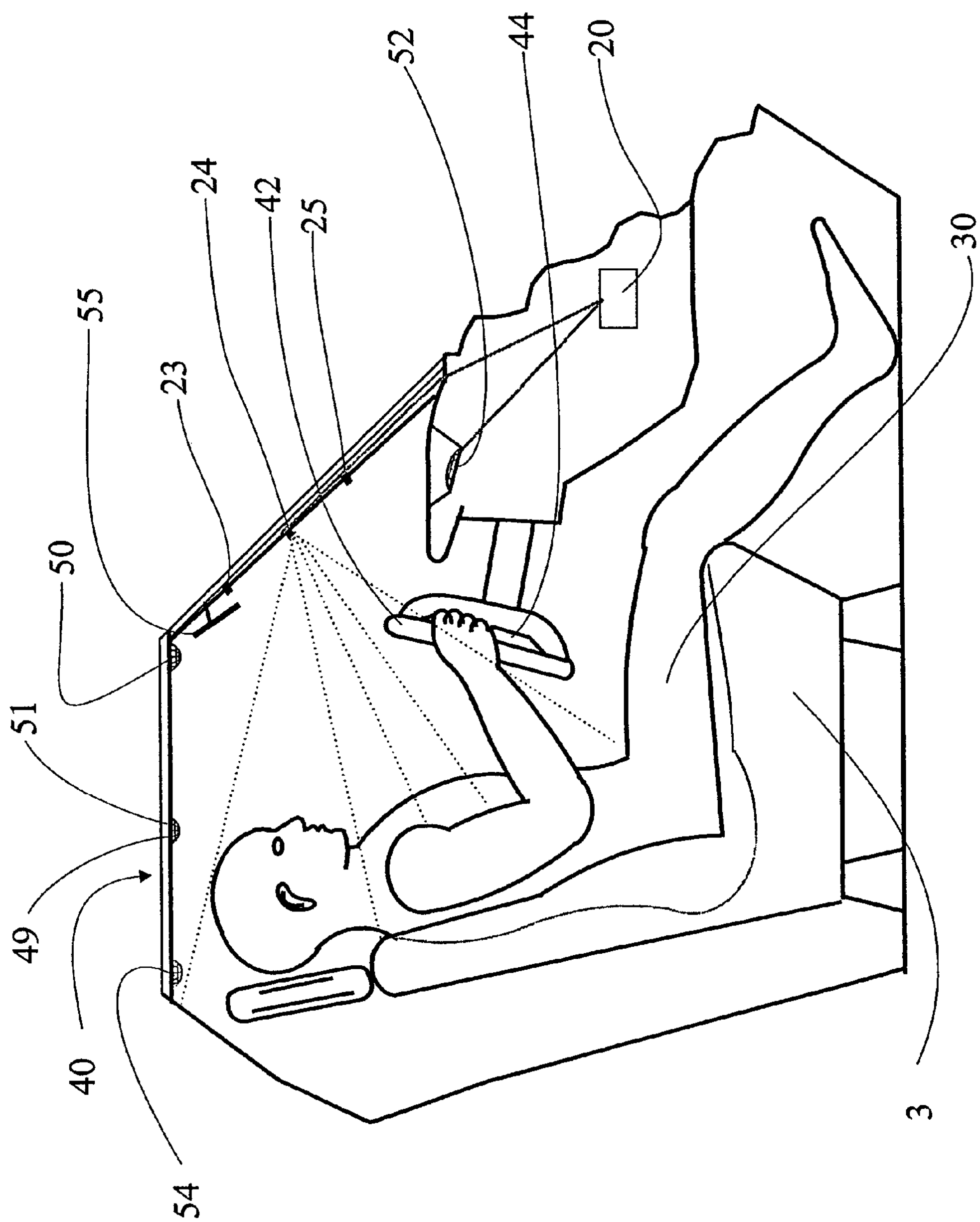
FIG. 8D is a view as in FIG. 8A illustrating the wave pattern from a pair of small CCD or CMOS array receivers and one infrared transmitter where the spacing of the CCD or CMOS arrays permits an accurate measurement of the distance to features on the occupant.
Figure 8E:
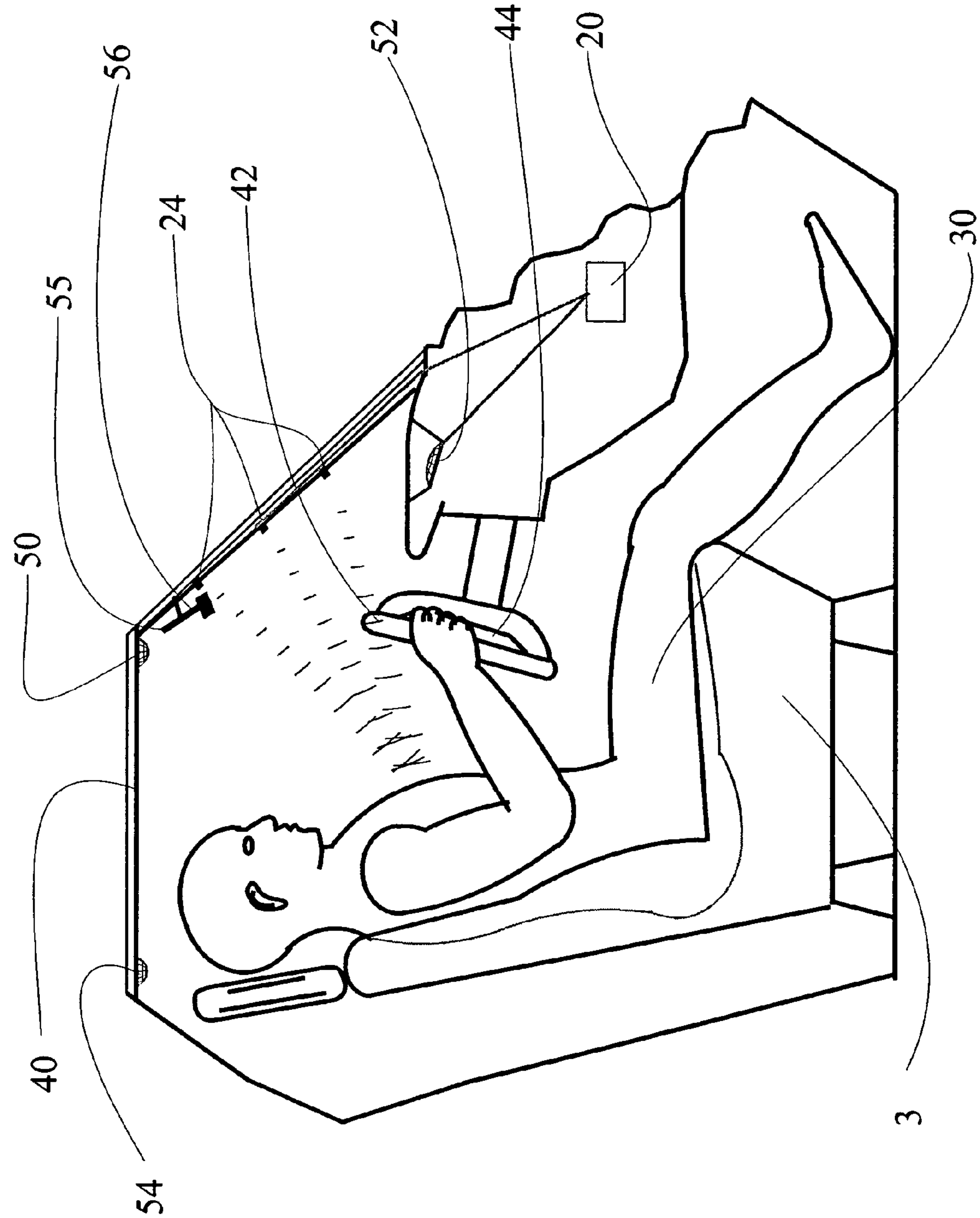
FIG. 8E is a view as in FIG. 8A illustrating the wave pattern from a set of ultrasonic transmitter/receivers where the spacing of the transducers and the phase of the signal permits an accurate focusing of the ultrasonic beam and thus the accurate measurement of a particular point on the surface of the driver.

Infrared waves are shown coming from the front and back transducer assemblies 54 and 55 in FIG. 8C. FIG. 8D illustrates two optical systems each having a source of infrared radiation and a CCD, CMOS, FPR, TFA or QWIP array receiver. The price of such arrays has dropped dramatically recently making most of them practical for interior and exterior vehicle monitoring. In this embodiment, transducers 54 and 55 are CMOS arrays having 160 pixels by 160 pixels covered by a lens. In some applications, this can create a "fisheye" effect whereby light from a wide variety of directions can be captured. One such transducer placed by the dome light or other central position in the vehicle headliner, such as the transducer designated 54, can monitor the entire vehicle interior with sufficient resolution to determine the occupancy of the vehicle, for example. Imagers such as those used herein are available from Marshall Electronics Inc. of Culver City, Calif. and others. A fisheye lens is" . . . a wide-angle photographic lens that covers an angle of about 180°, producing a circular image with exaggerated foreshortening in the center and increasing distortion toward the periphery". (*The American Heritage Dictionary of the English Language, Third Edition,* 1992 by Houghton Mifflin Company). This distortion of a fisheye lens can be substantially changed by modifying the shape of the lens to permit particular portions of the interior passenger compartment to be observed. Also, in many cases the full 180° is not desirable and a lens which captures a smaller angle may be used. Although primarily spherical lenses are illustrated herein, it is understood that the particular lens design will depend on the location in the vehicle and the purpose of the particular receiver. A fisheye lens can be particularly useful for some truck trailer, cargo container, railroad car and automobile trunk monitoring cases.

A camera that provides for pan and zoom using a fisheye lens is described in U.S. Pat. No. 5,185,667 and is applicable to at least one of the inventions disclosed herein. Here, however, it is usually not necessary to remove the distortion since the image will in general not be viewed by a human but will be analyzed by software. One exception is when the image is sent to emergency services via telematics. In that case, the distortion removal is probably best done at the EMS site.

Although a fisheye camera has primarily been discussed above, other types of distorting lenses or mirrors can be used to accomplished particular objectives. A distorting lens or mirror, for example, can have the effect of dividing the image into several sub-pictures so that the available pixels can cover more than one area of a vehicle interior or exterior. Alternately, the volume in close proximity to an airbag, for example, can be allocated a more dense array of pixels so that measurements of the location of an occupant relative to the airbag can be more accurately achieved. Numerous other objectives can now be envisioned which can now be accomplished with a reduction in the number of cameras or imagers through either distortion or segmenting of the optical field.

Another problem associated with lens is cleanliness. In general, the optical systems of these inventions comprise methods to test for the visibility through the lens and issue a warning when that visibility begins to deteriorate. Many methods exist for accomplishing this feat including the taking of an image when the vehicle is empty and not moving and at night. Using neural networks, for example, or some other comparison technique, a comparison of the illumination reaching the imager can be compared with what is normal. A network can be trained on empty seats, for example, in all possible positions and compared with the new image. Or, those pixels that correspond to any movable surface in the vehicle can be removed from the image and a brightness test on the remaining pixels used to determine lens cleanliness.

Once a lens has been determined to be dirty, then either a warning light can be set telling the operator to visit the dealer or a method of cleaning the lens automatically invoked. One such method for night vision systems is disclosed in WO0234572. Another, which is one on the inventions disclosed herein, is to cover the lens with a thin film. This film may be ultrasonically excited thereby greatly minimizing the tendency for it to get dirty and/or the film can be part of a roll of film that is advanced when the diagnostic system detects a dirty lens thereby placing a new clean surface in front of the imager. The film roll can be sized such that under normal operation, the roll would last some period such as 20 years. A simple, powerless mechanism can be designed that will gradually advance the film across the lens over a period of 10 to 20 years using the normal daily thermal cycling to cause relative expansion and contraction of materials with differing thermal expansion coefficients.

4. 3D Cameras

Optical sensors can be used to obtain a three-dimensional measurement of the object through a variety of methods that use time of flight, modulated light and phase measurement, quantity of light received within a gated window, structured light and triangulation etc. Some of these techniques are discussed in the current assignee's U.S. Pat. No. 6,393,133 and below.

4.1 Stereo

One method of obtaining a three-dimensional image is illustrated in FIG. 8D wherein transducer 24 is an infrared source having a wide transmission angle such that the entire contents of the front driver's seat is illuminated. Receiving imager transducers 23 and 25 are shown spaced apart so that a stereographic analysis can be made by the control circuitry 20. This circuitry 20 contains a microprocessor with appropriate pattern recognition algorithms along with other circuitry as described above. In this case, the desired feature to be located is first selected from one of the two returned images from either imaging transducer 23 or 25. The software then determines the location of the same feature, through correlation analysis or other methods, on the other image and thereby, through analysis familiar to those skilled in the art, determines the distance of the feature from the transducers by triangulation.

As the distance between the two or more imagers used in the stereo construction increases, a better and better model of the object being imaged can be obtained since more of the object is observable. On the other hand, it becomes increasingly difficult to pair up points that occur in both images. Given sufficient computational resources, this not a difficult problem but with limited resources and the requirement to track a moving occupant during a crash, for example, the problem becomes more difficult. One method to ease the problem is to project onto the occupant, a structured light that permits a recognizable pattern to be observed and matched up in both images. The source of this projection should lie midway between the two imagers. By this method, a rapid correspondence between the images can be obtained.

On the other hand, if a source of structured light is available at a different location than the imager, then a simpler three-dimensional image can be obtained using a single imager. Furthermore, the model of the occupant really only needs to be made once during the classification phase of the process and there is usually sufficient time to accomplish that model with ordinary computational power. Once the model has been obtained, then only a few points need be tracked by either one or both of the cameras.

Another method exists whereby the displacement between two images from two cameras is estimated using a correlator. Such a fast correlator has been developed by Professor Lukin of Kyiv, Ukraine in conjunction with his work on noise radar.

This correlator is very fast and can probably determine the distance to an occupant at a rate sufficient for tracking purposes.

4.2 Distance by Focusing

In the above-described imaging systems, a lens within a receptor captures the reflected infrared light from the head or chest of the driver, or other object to be monitored, and displays it onto an imaging device (CCD, CMOS, FPA, TFA, QWIP or equivalent) array. For the discussion of FIGS. 5 and 13-17 at least, either CCD or the word imager will be used to include all devices which are capable of converting light frequencies, including infrared, into electrical signals. In one method of obtaining depth from focus, the CCD is scanned and the focal point of the lens is altered, under control of an appropriate circuit, until the sharpest image of the driver's head or chest, or other object, results and the distance is then known from the focusing circuitry. This trial and error approach may require the taking of several images and thus may be time consuming and perhaps too slow for occupant tracking during pre-crash braking.

The time and precision of this measurement is enhanced if two receptors (e.g., lenses) are used which can either project images onto a single CCD or onto separate CCDs. In the first case, one of the lenses could be moved to bring the two images into coincidence while in the other case, the displacement of the images needed for coincidence would be determined mathematically. Other systems could be used to keep track of the different images such as the use of filters creating different infrared frequencies for the different receptors and again using the same CCD array. In addition to greater precision in determining the location of the occupant, the separation of the two receptors can also be used to minimize the effects of hands, arms or other extremities which might be very close to the airbag. In this case, where the receptors are mounted high on the dashboard on either side of the steering wheel, an arm, for example, would show up as a thin object but much closer to the airbag than the larger body parts and, therefore, easily distinguished and eliminated, permitting the sensors to determine the distance to the occupant's chest. This is one example of the use of pattern recognition.

An alternate method is to use a lens with a short focal length. In this case, the lens is mechanically focused, e.g., automatically, directly or indirectly, by the control circuitry 20, to determine the clearest image and thereby obtain the distance to the object. This is similar to certain camera auto-focusing systems such as one manufactured by Fuji of Japan. Again this is a time consuming method. Other methods can be used as described in the patents and patent applications referenced above.

Instead of focusing the lens, the lens could be moved relative to the array to thereby adjust the image on the array. Instead of moving the lens, the array could be moved to achieve the proper focus. In addition, it is also conceivable that software could be used to focus the image without moving the lens or the array especially if at least two images are available.

An alternative is to use the focusing systems described in patents U.S. Pat. Nos. 5,193,124 and 5,003,166. These systems are quite efficient requiring only two images with different camera settings. Thus, if there is sufficient time to acquire an image, change the camera settings and acquire a second image, this system is fine and can be used with the inventions disclosed herein. Once the position of the occupant has been determined for one point in time, then the process may not have to be repeated as a measurement of the size of a part of an occupant can serve as a measure of its relative location compared to the previous image from which the range was obtained. Thus, other than the requirement of a somewhat more expensive imager, the system of the '124 and '166 patents is fine. The accuracy of the range is perhaps limited to a few centimeters depending on the quality of the imager used. Also, if multiple ranges to multiple objects are required, then the process becomes a bit more complicated.

4.3 Ranging

The scanning portion of a pulse laser radar device can be accomplished using rotating mirrors, vibrating mirrors, or preferably, a solid state system, for example one utilizing $TeO_2$ as an optical diffraction crystal with lithium niobate crystals driven by ultrasound (although other solid state systems not necessarily using $TeO_2$ and lithium niobate crystals could also be used) which is an example of an acoustic optical scanner. An alternate method is to use a micromachined mirror, which is supported at its center and caused to deflect by miniature coils or equivalent MEMS device. Such a device has been used to provide two-dimensional scanning to a laser. This has the advantage over the $TeO_2$— lithium niobate technology in that it is inherently smaller and lower cost and provides two-dimensional scanning capability in one small device. The maximum angular deflection that can be achieved with this process is on the order of about 10 degrees. Thus, a diverging lens or equivalent will be needed for the scanning system.

Another technique to multiply the scanning angle is to use multiple reflections off of angled mirror surfaces. A tubular structure can be constructed to permit multiple interior reflections and thus a multiplying effect on the scan angle.

An alternate method of obtaining three-dimensional information from a scanning laser system is to use multiple arrays to replace the single arrays used in FIG. 8A. In the case, the arrays are displaced from each other and, through triangulation, the location of the reflection from the illumination by a laser beam of a point on the object can be determined in a manner that is understood by those skilled in the art. Alternately, a single array can be used with the scanner displaced from the array.

A new class of laser range finders has particular application here. This product, as manufactured by Power Spectra, Inc. of Sunnyvale, Calif., is a GaAs pulsed laser device which can measure up to 30 meters with an accuracy of <2 cm and a resolution of <1 cm. This system can be implemented in combination with transducer 24 and one of the receiving transducers 23 or 25 may thereby be eliminated. Once a particular feature of an occupying item of the passenger compartment has been located, this device is used in conjunction with an appropriate aiming mechanism to direct the laser beam to that particular feature. The distance to that feature can then be known to within 2 cm and with calibration even more accurately. In addition to measurements within the passenger compartment, this device has particular applicability in anticipatory sensing and blind spot monitoring applications exterior to the vehicle. An alternate technology using range gating to measure the time of flight of electromagnetic pulses with even better resolution can be developed based on the teaching of the McEwan patents listed above.

Figure 17:
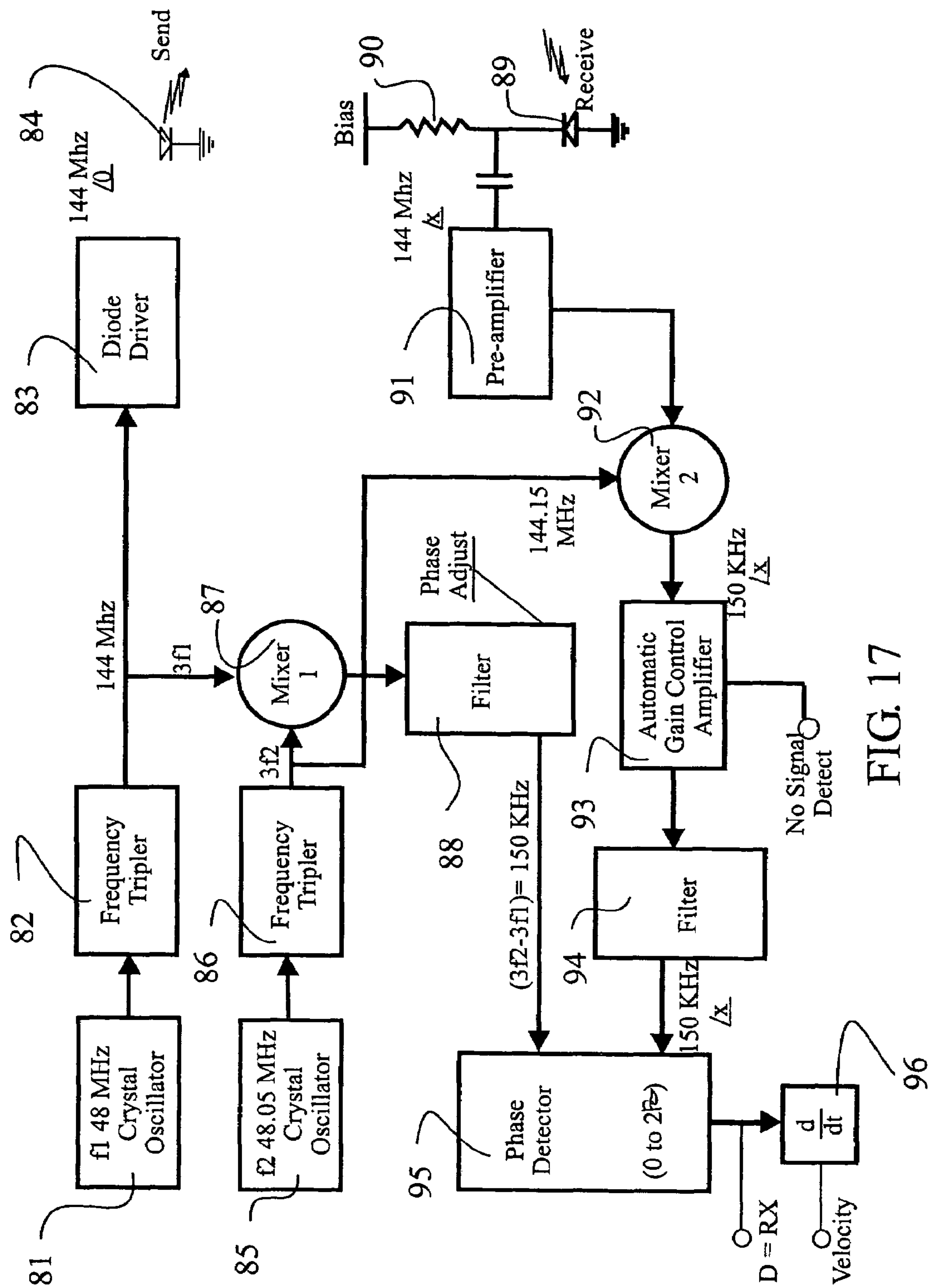
FIG. 17 is a schematic illustrating the circuit of an occupant position-sensing device using a modulated infrared signal, beat frequency and phase detector system.

A particular implementation of an occupant position sensor having a range of from 0 to 2 meters (corresponding to an occupant position of from 0 to 1 meter since the signal must travel both to and from the occupant) using infrared is illustrated in the block diagram schematic of FIG. 17. This system was designed for automobile occupant sensing and a similar system having any reasonable range up to and exceeding 100 meters can be designed on the same principles for other monitoring applications. The operation is as follows. A 48 MHz signal, f1, is generated by a crystal oscillator 81 and fed into a frequency tripler 82 which produces an output signal at 144 MHz. The 144 MHz signal is then fed into an infrared diode driver 83 which drives the infrared diode 84 causing it to emit infrared light modulated at 144 MHz and a reference phase angle of zero degrees. The infrared diode 84 is directed at the vehicle occupant. A second signal f2 having a frequency of 48.05 MHz, which is slightly greater than f1, is similarly fed from a crystal oscillator 85 into a frequency tripler 86 to create a frequency of 144.15 MHz. This signal is then fed into a mixer 87 which combines it with the 144 MHz signal from frequency tripler 82. The combined signal from the mixer 87 is then fed to filter 88 which removes all signals except for the difference, or beat frequency, between 3 times f1 and 3 times f2, of 150 kHz. The infrared signal which is reflected from the occupant is received by receiver 89 and fed into pre-amplifier 91, a resistor 90 to bias being coupled to the connection between the receiver 89 and the pre-amplifier 91. This signal has the same modulation frequency, 144 MHz, as the transmitted signal but now is out of phase with the transmitted signal by an angle x due to the path that the signal took from the transmitter to the occupant and back to the receiver.

The output from pre-amplifier 91 is fed to a second mixer 92 along with the 144.15 MHz signal from the frequency tripler 86. The output from mixer 92 is then amplified by an automatic gain amplifier 93 and fed into filter 94. The filter 94 eliminates all frequencies except for the 150 kHz difference, or beat, frequency, in a similar manner as was done by filter 88. The resulting 150 kHz frequency, however, now has a phase angle x relative to the signal from filter 88. Both 150 kHz signals are now fed into a phase detector 95 which determines the magnitude of the phase angle x. It can be shown mathematically that, with the above values, the distance from the transmitting diode to the occupant is x/345.6 where x is measured in degrees and the distance in meters. The velocity can also be obtained using the distance measurement as represented by 96. An alternate method of obtaining distance information, as discussed above, is to use the teachings of the McEwan patents discussed elsewhere herein.

As reported above, cameras can be used for obtaining three-dimensional images by modulation of the illumination as taught in U.S. Pat. No. 5,162,861. The use of a ranging device for occupant sensing is believed to have been first disclosed by the current assignee in the above-referenced patents. More recent attempts include the PMD camera as disclosed in PCT application WO09810255 and similar concepts disclosed in U.S. Pat. Nos. 6,057,909 and 6,100,517.

Note that although the embodiment in FIG. 17 uses near infrared, it is possible to use other frequencies of energy without deviating from the scope of the invention. In particular, there are advantages in using the short wave (SWIR), medium wave (MWIR) and long wave (LWIR) portions of the infrared spectrum as the interact in different and interesting ways with living occupants as described elsewhere herein and in the book Alien Vision referenced above.

4.4 Pockel or Kerr Cell for Determining Range

Pockel and Kerr cells are well known in optical laboratories. They act as very fast shutters (up to 10 billion cycles per second) and as such can be used to range-gate the reflections based on distance giving a range resolution of up to 3 cm without the use of phase techniques to divide the interval into parts or sub millimeter resolution using phasing techniques. Thus, through multiple exposures the range to all reflecting surfaces inside and outside of the vehicle can be determined to any appropriate degree of accuracy. The illumination is transmitted, the camera shutter opened and the cell allows only that reflected light to enter the camera that arrived at the cell a precise time range after the illumination was initiated.

These cells are part of a class of devices called spatial light modulators (SLM). One novel application of an SLM is reported in U.S. Pat. No. 5,162,861. In this case, an SLM is used to modulate the light returning from a transmitted laser pulse that is scattered from a target. By comparing the intensities of the modulated and unmodulated images, the distance to the target can be ascertained. Using a SLM in another manner, the light valve can be kept closed for all ranges except the ones of interest. Thus, by changing the open time of the SLM, only returns from certain distances are permitted to pass through to the imager. By selective changing the opened time, the range to the target can be "range-gated" and thereby accurately determined. Thus, the outgoing light need not be modulated and a scanner is not necessary unless there is a need to overcome the power of the sun reflecting off of the object of interest. This form of range-gating can of course be used for either external or internal applications.

4.5 Thin Film on ASIC (TFA)

Since the concepts of using cameras for monitoring the passenger compartment of a vehicle and measuring distance to a vehicle occupant based on the time of flight were first disclosed in the commonly assigned above-referenced patents, several improvements have been reported in the literature including the thin film on ASIC (TFA) (references 6-11) and photonic mixing device (PMD) (reference 12) camera technologies. Both of these technologies and combinations thereof are good examples of devices that can be used in practicing the inventions herein and those in the above-referenced patents and applications for monitoring both inside and exterior to a vehicle.

An improvement to these technologies is to use noise or pseudo noise modulation for a PMD-like device to permit more accurate distance to object determination especially for exterior to the vehicle monitoring through correlation of the generated and reflected modulation sequences. This has the further advantage that systems from different vehicles will not interfere with each other.

The TFA is an example of a high dynamic range camera (HDRC) the use of which for interior monitoring was first disclosed in U.S. Pat. No. 6,393,133. Since there is direct connection between each pixel and an associated electronic circuit, the potential exists for range gating the sensor to isolate objects between certain limits thus simplifying the identification process by eliminating reflections from objects that are closer or further away than the object of interest. A further advantage of the TFA is that it can be doped to improve its sensitivity to infrared and it also can be fabricated as a three-color camera system.

Another novel HDRC camera is disclosed by Nayar (reference 13), as discussed above, and involves varying the sensitivity of pixels in the imager. Each of four adjacent pixels has a different exposure sensitivity and an algorithm is presented that combines the four exposures in a manner that loses little resolution but provides a high dynamic range picture. This particularly simple system is a preferred approach to handling the dynamic range problem in several monitoring applications of at least one of the inventions disclosed herein.

Figure 52:
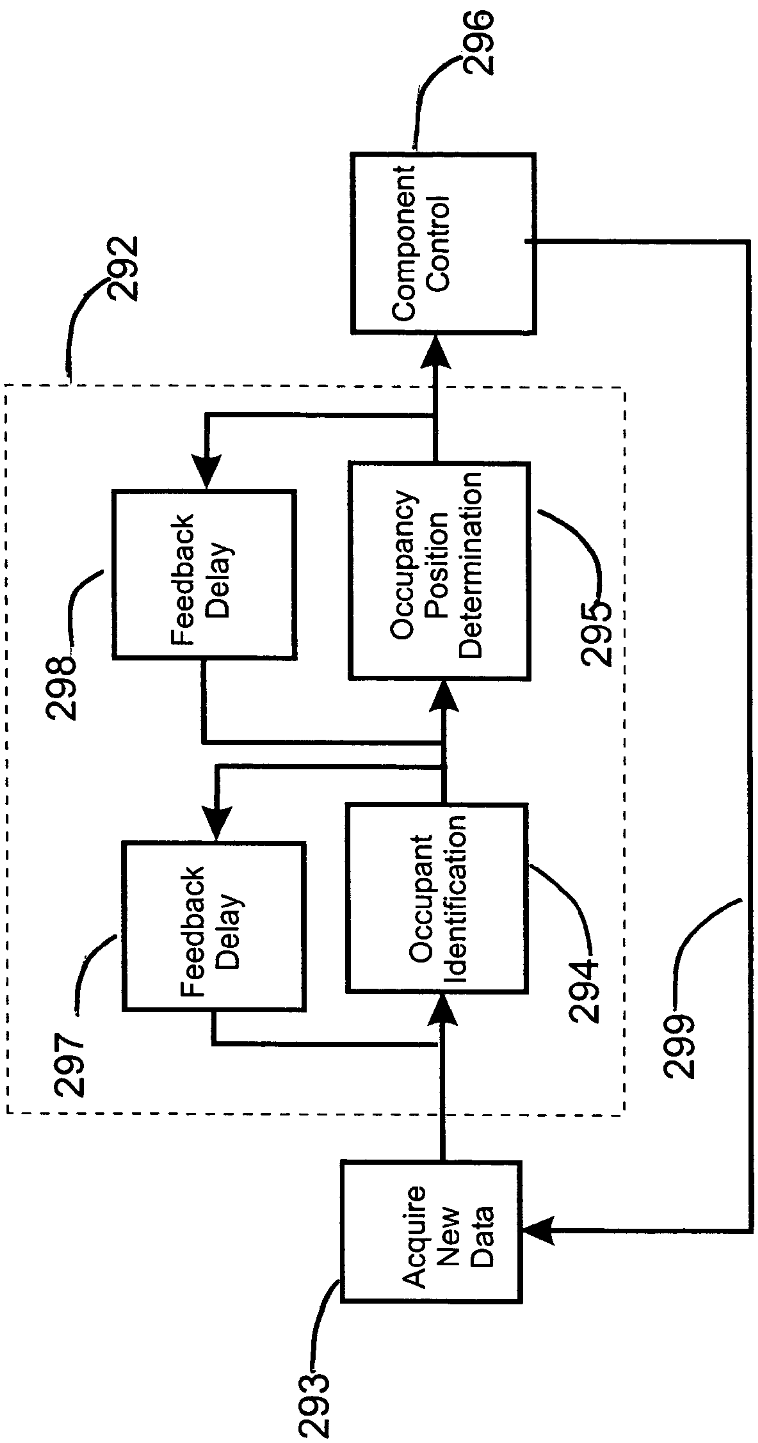
FIG. 52 is a schematic illustration of a method in which the identification and position of the occupant is determined using a combination neural network in accordance with the invention.
Figure 53:
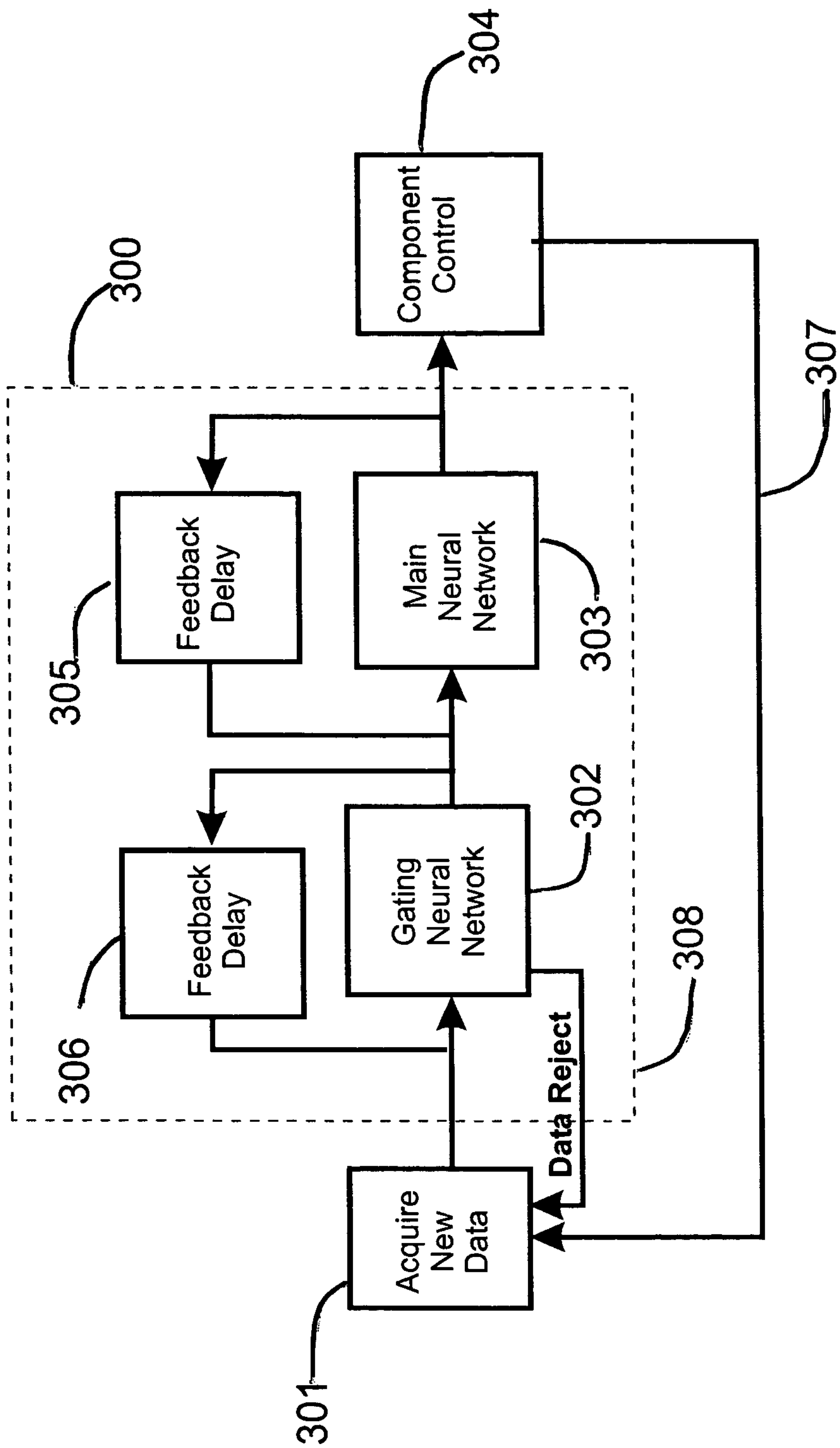
FIG. 53 is a schematic illustration of a method in which the occupancy state of a seat of a vehicle is determined using a combination neural network in accordance with the invention in which bad data is prevented from being used to determine the occupancy state of the vehicle.

A great deal of development effort has gone into automatic camera focusing systems such as described in the Scientific American Article "Working Knowledge: Focusing in a Flash" (reference 14). The technology is now to the point that it can be taught to focus on a particular object, such as the head or chest of an occupant, or other object, and measure the distance to the object to within approximately 1 inch. If this technology is coupled with the Nayar camera, a very low cost semi 3D high dynamic range camera or imager results that is sufficiently accurate for locating an occupant in the passenger compartment or an object in another container. If this technology is coupled with an eye locator and the distance to the eyes of the occupant are determined, then a single camera is all that is required for either the driver or passenger. Such a system would display a fault warning when it is unable to find the occupant's eyes. Such a system is illustrated in FIGS. 52 and 53.

As discussed above, thin film on ASIC technology, as described in Lake, D. W. "TFA Technology: The Coming Revolution in Photography", Advanced Imaging Magazine, April, 2002 (www.advancedimagingmag.com) shows promise of being the next generation of imager for automotive and other vehicle monitoring applications. The anticipated specifications for this technology, as reported in the Lake article, are:

| | |
|---|---|
| Dynamic Range | 120 db |
| Sensitivity | 0.01 lux |
| Anti-blooming | 1,000,000:1 |
| Pixel Density | 3,200,000 |
| Pixel Size | 3.5 um |
| Frame Rate | 30 fps |
| DC Voltage | 1.8 v |
| Compression | 500 to 1 |

All of these specifications, except for the frame rate, are attractive for occupant sensing. It is believed that the frame rate can be improved with subsequent generations of the technology. Some advantages of this technology for occupant sensing include the possibility of obtaining a three-dimensional image by varying the pixel on time in relation to a modulated illumination in a simpler manner than that proposed with the PMD imager or with a Pockel or Kerr cell. The ability to build the entire package on one chip will reduce the cost of this imager compared with two or more chips required by current technology. Other technical papers on TFA are referenced above.

TFA thus appears to be a major breakthrough when used in the interior and exterior imaging systems. Its use in these applications falls within the teachings of the inventions disclosed herein.

5. Glare Control

The headlights of oncoming vehicles frequently make it difficult for the driver of a vehicle to see the road and safely operate the vehicle. This is a significant cause of accidents and much discomfort. The problem is especially severe during bad weather where rain can cause multiple reflections. Opaque visors are now used to partially solve this problem but they do so by completely blocking the view through a large portion of the window and therefore cannot be used to cover the entire windshield. Similar problems happen when the sun is setting or rising and the driver is operating the vehicle in the direction of the sun. U.S. Pat. No. 4,874,938 attempts to solve this problem through the use of a motorized visor but although it can block some glare sources, it also blocks a substantial portion of the field of view.

The vehicle interior monitoring system disclosed herein can contribute to the solution of this problem by determining the position of the driver's eyes. If separate sensors are used to sense the direction of the light from the on-coming vehicle or the sun, and through the use of electrochromic glass, a liquid crystal device, suspended particle device glass (SPD) or other appropriate technology, a portion of the windshield, or special visor, can be darkened to impose a filter between the eyes of the driver and the light source. Electrochromic glass is a material where the transparency of the glass can be changed through the application of an electric current. The term "liquid crystal" as used herein will be used to represent the class of all such materials where the optical transmissibility can be varied electrically or electronically. Electrochromic products are available from Gentex of Zeeland, Mich., and Donnelly of Holland, Mich. Other systems for selectively imposing a filter between the eyes of an occupant and the light source are currently under development.

By dividing the windshield into a controlled grid or matrix of contiguous areas and through feeding the current into the windshield from orthogonal directions, selective portions of the windshield can be darkened as desired. Other systems for selectively imposing a filter between the eyes of an occupant and the light source are currently under development. One example is to place a transparent sun visor type device between the windshield and the driver to selectively darken portions of the visor as described above for the windshield.

5.1 Windshield

Figures 39, 39A:
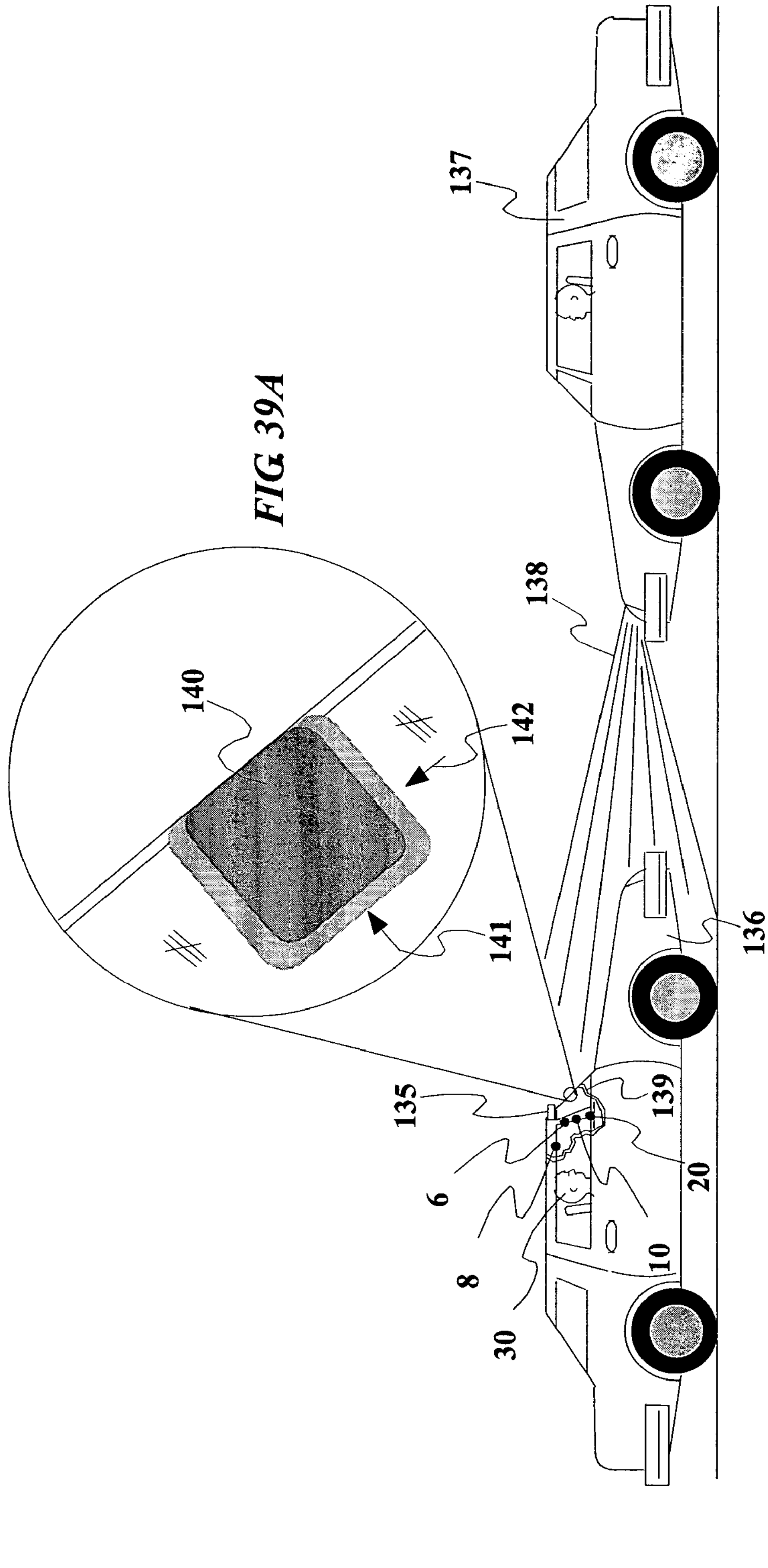
FIG. 39 is a side view with parts cutaway and removed of a subject vehicle and an oncoming vehicle, showing the headlights of the oncoming vehicle and the passenger compartment of the subject vehicle, containing detectors of the driver's eyes and detectors for the headlights of the oncoming vehicle and the selective filtering of the light of the approaching vehicle's headlights through the use of electro-chromic glass, organic or metallic semiconductor polymers or electropheric particulates (SPD) in the windshield.
FIG. 39A is an enlarged view of the section 39A in FIG. 39.

FIG. 39 illustrates how such a system operates for the windshield. A sensor 135 located on vehicle 136 determines the direction of the light 138 from the headlights of oncoming vehicle 137. Sensor 135 is comprised of a lens and a charge-coupled device (CCD), CMOS or similar device, with appropriate software or electronic circuitry that determines which elements of the CCD are being most brightly illuminated. An algorithm stored in processor 20 then calculates the direction of the light from the oncoming headlights based on the information from the CCD, or CMOS device. Usually two systems 135 are required to fix the location of the offending light. Transducers 6, 8 and 10 determine the probable location of the eyes of the operator 30 of vehicle 136 in a manner such as described above and below. In this case, however, the determination of the probable locus of the driver's eyes is made with an accuracy of a diameter for each eye of about 3 inches (7.5 cm). This calculation sometimes will be in error especially for ultrasonic occupant sensing systems and provision is made for the driver to make an adjustment to correct for this error as described below.

The windshield 139 of vehicle 136 comprises electrochromic glass, a liquid crystal, SPD device or similar system, and is selectively darkened at area 140, FIG. 39A, due to the application of a current along perpendicular directions 141 and 142 of windshield 139. The particular portion of the windshield to be darkened is determined by processor 20. Once the direction of the light from the oncoming vehicle is known and the locations of the driver's eyes are known, it is a matter of simple trigonometry to determine which areas of the windshield matrix should be darkened to impose a filter between the headlights and the driver's eyes. This is accomplished by the processor 20. A separate control system, not shown, located on the instrument panel, steering wheel or at some other convenient location, allows the driver to select the amount of darkening accomplished by the system from no darkening to maximum darkening. In this manner, the driver can select the amount of light that is filtered to suit his particular physiology. Alternately, this process can take place automatically. The sensor 135 can either be designed to respond to a single light source or to multiple light sources to be sensed and thus multiple portions of the vehicle windshield 139 to be darkened. Unless the camera is located on the same axis at the eyes of the driver, two cameras would in general be required to determine the distance of the glare causing object from the eyes of the driver. Without this third dimension, two glare sources that are on the same axis to the camera could be on different axes to the driver, for example.

As an alternative to locating the direction of the offending light source, a camera looking at the eyes of the driver can determine when they are being subjected to glare and then impose a filter. A trial and error process or through the use of structured light created by a pattern on the windshield, determines where to create the filter to block the glare.

More efficient systems are now becoming available to permit a substantial cost reduction as well as higher speed selective darkening of the windshield for glare control. These systems permit covering the entire windshield which is difficult to achieve with LCDs. For example, such systems are made from thin sheets of plastic film, sometimes with an entrapped liquid, and can usually be sandwiched between the two pieces of glass that make up a typical windshield. The development of conductive plastics permits the addressing and thus the manipulation of pixels of a transparent film that previously was not possible. These new technologies will now be discussed.

If the objective is for glare control, then the Xerox Gyricon technology applied to windows can be appropriate. Previously, this technology has only been used to make e-paper and a modification to the technology is necessary for it to work for glare control. Gyricon is a thin layer of transparent plastic full of millions of small black and white or red and white beads, like toner particles. The beads are contained in an oil-filled cavity. When voltage is applied, the beads rotate to present a colored side to the viewer. The advantages of Gyricon are: (1) it is electrically writeable and erasable; (2) it can be re-used thousands of times; (3) it does not require backlighting or refreshing; (4) it is brighter than today's reflective displays; and, (5) it operates on low power. The changes required are to cause the colored spheres to rotate 90 degrees rather than 180 degrees and to make half of each sphere transparent so that the display switches from opaque to 50% transparent.

Another technology, SPD light control technology from Research Frontiers Inc., has been used to darken entire windows but not as a system for darkening only a portion of the glass or sun visor to impose a selective filter to block the sun or headlights of an oncoming vehicle. Although it has been used as a display for laptop computers, it has not been used as a heads-up display (HUD) replacement technology for automobile or truck windshields.

Both SPD and Gyricon technologies require that the particles be immersed in a fluid so that the particles can move. Since the properties of the fluid will be temperature sensitive, these technologies will vary somewhat in performance over the automotive temperature range. The preferred technology, therefore, is plastic electronics although in many applications either Gyricon or SPD will also be used in combination with plastic electronics, at least until the technology matures. Currently plastic electronics can only emit light and not block it. However, research is ongoing to permit it to also control the transmission of light.

The calculations of the location of the driver's eyes using acoustic systems may be in error and therefore provision must be made to correct for this error. One such system permits the driver to adjust the center of the darkened portion of the windshield to correct for such errors through a knob, mouse pad, joy stick or other input device, on the instrument panel, steering wheel, door, armrest or other convenient location. Another solution permits the driver to make the adjustment by slightly moving his head. Once a calculation as to the location of the driver's eyes has been made, that calculation is not changed even though the driver moves his head slightly. It is assumed that the driver will only move his head in a very short time period to center the darkened portion of the windshield to optimally filter the light from the oncoming vehicle. The monitoring system will detect this initial head motion and make the correction automatically for future calculations. Additionally, a camera observing the driver or other occupant can monitor the reflections of the sun or the headlights of oncoming vehicles off of the occupant's head or eyes and automatically adjust the filter in the windshield or sun visor.

5.2 Glare in Rear View Mirrors

Electrochromic glass is currently used in rear view mirrors to darken the entire mirror in response to the amount of light striking an associated sensor. This substantially reduces the ability of the driver to see objects coming from behind his vehicle. If one rear-approaching vehicle, for example, has failed to dim his lights, the mirror will be darkened to respond to the light from that vehicle making it difficult for the driver to see other vehicles that are also approaching from the rear. If the rear view mirror is selectively darkened on only those portions that cover the lights from the offending vehicle, the driver is able to see all of the light coming from the rear whether the source is bright or dim. This permits the driver to see all of the approaching vehicles not just the one with bright lights.

Figures 40, 40A, 40B:
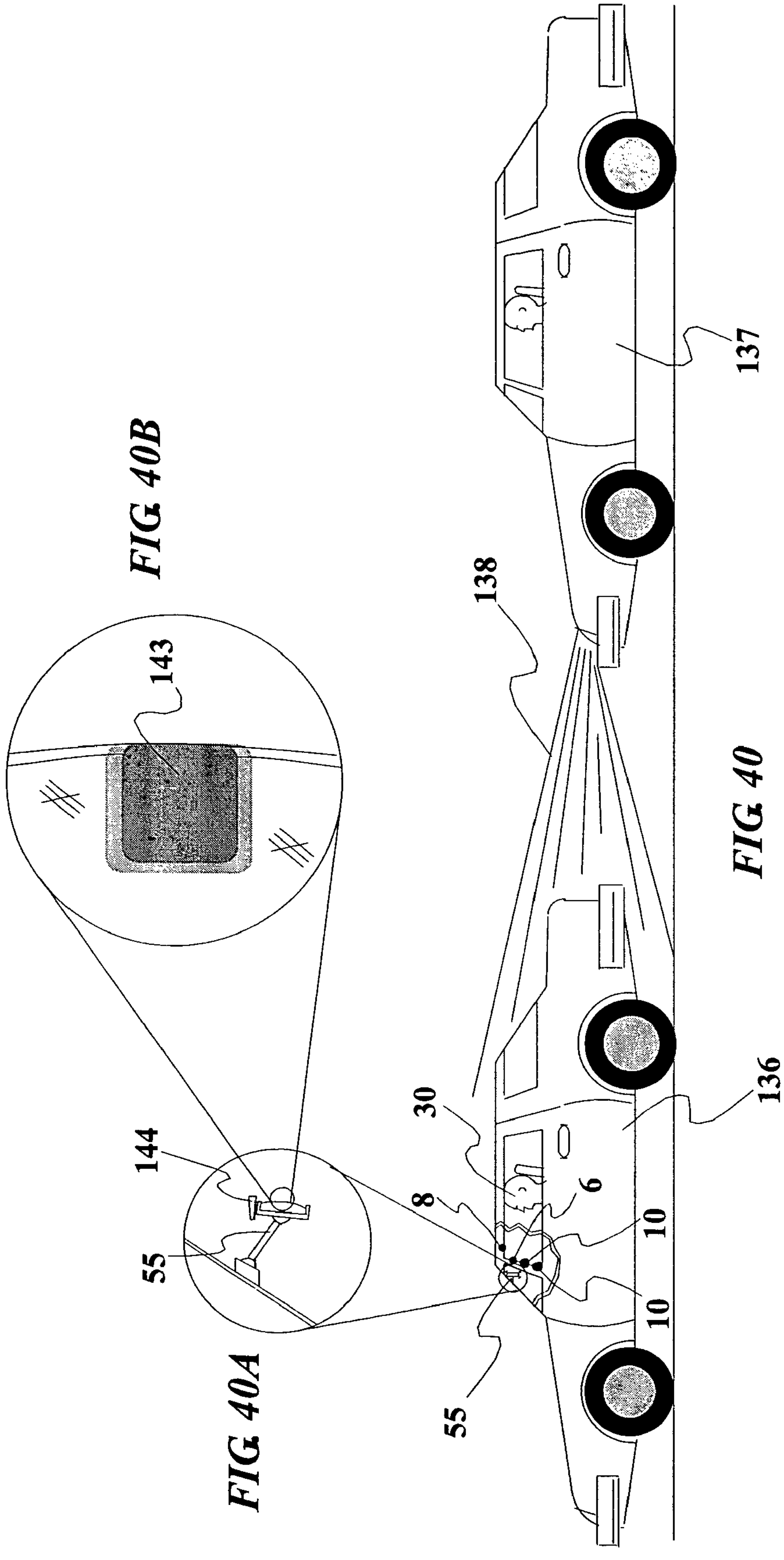
FIG. 40 is a side view with parts cutaway and removed of a vehicle and a following vehicle showing the headlights of the following vehicle and the passenger compartment of the leading vehicle containing a driver and a preferred mounting location for driver eyes and following vehicle headlight detectors and the selective filtering of the light of the following vehicle's headlights through the use of electrochromic glass, SPD glass or equivalent, in the rear view mirror.
FIG. 40B is an enlarged view of the section designated 40A in FIG. 40.

Such a system is illustrated in FIGS. 40, 40A and 40B wherein rear view mirror 55 is equipped with electrochromic glass, or comprises a liquid crystal or similar device, having the capability of being selectively darkened, e.g., at area 143. Associated with mirror 55 is a light sensor 144 that determines the direction of light 138 from the headlights of rear approaching vehicle 137. Again, as with the windshield, a stereo camera is used if the camera is not aligned with the eye view path. This is easier to accomplish with a mirror due to its much smaller size. In such a case, the imager could be mounted on the movable part of the mirror and could even look through the mirror from behind. In the same manner as above, transducers 6, 8 and 10 determine the location of the eyes of the driver 30. The signals from both sensor systems, 6, 8, 10 and 144, are combined in the processor 20, where a determination is made as to what portions of the mirror should be darkened, e.g., area 143. Appropriate currents are then sent to the mirror 55 in a manner similar to the windshield system described above. Again, an alternative solution is to observe a glare reflection on the face of the driver and remove the glare with a filter.

Note, the rearview mirror is also an appropriate place to display icons of the contents of the blind spot or other areas surrounding the vehicle as disclosed in U.S. patent application Ser. No. 09/851,362 filed May 8, 2001.

5.3 Visor for Glare Control and HUD

Figure 41:
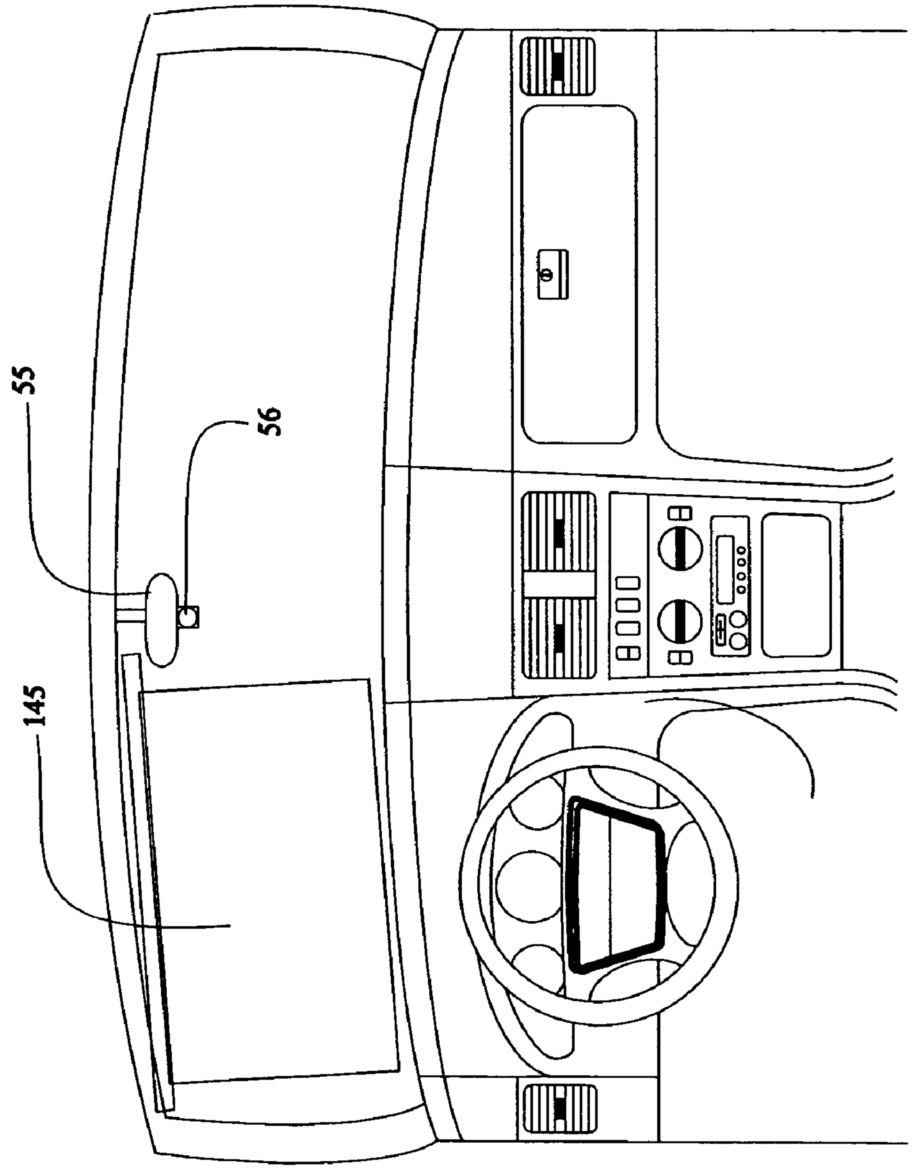
FIG. 41 illustrates the interior of a passenger compartment with a rear view mirror, a camera for viewing the eyes of the driver and a large generally transparent visor for glare filtering.

FIG. 41 illustrates the interior of a passenger compartment with a rear view mirror assembly 55, a camera for viewing the eyes of the driver 56 and a large generally transparent sun visor 145. The sun visor 145 is normally largely transparent and is made from electrochromic glass, suspended particle glass, a liquid crystal device or equivalent. The camera 56 images the eyes of the driver and looks for a reflection indicating that glare is impinging on the driver's eyes. The camera system may have a source of infrared or other frequency illumination that would be momentarily activated to aid in locating the driver's eyes. Once the eyes have been located, the camera monitors the area around the eyes, or direct reflections from the eyes themselves, for an indication of glare. The camera system in this case would not know the direction from which the glare is originating; it would only know that the glare was present. The glare blocker system then can darken selected portions of the visor to attempt to block the source of glare and would use the observation of the glare from or around the eyes of the driver as feedback information. When the glare has been eliminated, the system maintains the filter, perhaps momentarily reducing it from time to time to see that the source of glare has not stopped.

If the filter is electrochromic glass, a significant time period is required to activate the glare filter and therefore a trial and error search for the ideal filter location could be too slow. In this case, a non-recurring spatial pattern can be placed in the visor such that when light passes through the visor and illuminates the face of the driver, the location where the filter should be placed can be easily determined. That is, the pattern reflection off of the face of the driver would indicate the location of the visor through which the light causing the glare was passing. Such a structured light system can also be used for the SPD and LCD filters but since they act significantly more rapidly, it would serve only to simplify the search algorithm for filter placement.

A second photo sensor 135 can also be used pointing through the windshield to determine only that glare was present. In this manner, when the source of the glare disappears, the filter can be turned off. A more sophisticated system as described above for the windshield system whereby the direction of the light is determined using a camera-type device can also be implemented.

The visor 145 is illustrated as substantially covering the front windshield in front of the driver. This is possible since it is transparent except where the filter is applied, which would in general be a small area. A second visor, not shown, can also be used to cover the windshield for the passenger side that would also be useful when the light-causing glare on the driver's eyes enters thought the windshield in front of the passenger or if a passenger system is also desired. In some cases, it might even be advantageous to supply a similar visor to cover the side windows but in general, standard opaque visors would serve for both the passenger side windshield area and the side windows since the driver in general only needs to look through the windshield in front of him or her.

A smaller visor can also be used as long as it is provided with a positioning system or method. The visor only needs to cover the eyes of the driver. This could either be done manually or by electric motors similar to the system disclosed in U.S. Pat. No. 4,874,938. If electric motors are used, then the adjustment system would first have to move the visor so that it covered the driver's eyes and then provide the filter. This could be annoying if the vehicle is heading into the sun and turning and/or going up and down hills. In any case, the visor should be movable to cover any portion of the windshield where glare can get through, unlike conventional visors that only cover the top half of the windshield. The visor also does not need to be close to the windshield and the closer that it is to the driver, the smaller and thus the less expensive it can be.

As with the windshield, the visor of at least one of the inventions disclosed herein can also serve as a display using plastic electronics as described above either with or without the SPD or other filter material. Additionally, visor-like displays can now be placed at many locations in the vehicle for the display of Internet web pages, movies, games etc. Occupants of the rear seat, for example, can pull down such displays from the ceiling, up from the front seatbacks or out from the B-pillars or other convenient locations.

A key advantage of the systems disclosed herein is the ability to handle multiple sources of glare in contrast to the system of U.S. Pat. No. 4,874,938, which requires that the multiple sources must be close together.

5.4 Headlamp Control

In a similar manner, the forward looking camera(s) can also be used to control the lights of vehicle 136 when either the headlights or taillights of another vehicle are sensed. In this embodiment, the CCD array is designed to be sensitive to visible light and a separate source of illumination is not used. The key to this technology can be the use of trained pattern recognition algorithms and particularly the artificial neural network. Here, as in the other cases above and in the patents and patent applications referenced above, the pattern recognition system is trained to recognize the pattern of the headlights of an oncoming vehicle or the tail lights of a vehicle in front of vehicle 136 and to then dim the headlights when either of these conditions is sensed. It is also trained to not dim the lights for other reflections such as reflections off of a sign post or the roadway. One problem is to differentiate taillights where dimming is desired from distant headlights where dimming is not desired. At least three techniques can be used: (i) measurement of the spacing of the light sources, (ii) determination of the location of the light sources relative to the vehicle, and (iii) use of a red filter where the brightness of the light source through the filter is compared with the brightness of the unfiltered light. In the case of the taillight, the brightness of the red filtered and unfiltered light is nearly the same while there is a significant difference for the headlight case. In this situation, either two CCD arrays are used, one with a filter, or a filter which can be removed either electrically, such as with a liquid crystal, or mechanically. Alternately a fast Fourier transform, or other spectral analysis technique, of the data can be taken to determine the relative red content.

6. Weight Measurement and Biometrics

One way to determine motion of the occupant(s) is to monitor the weight distribution of the occupant whereby changes in weight distribution after an accident would be highly suggestive of movement of the occupant. A system for determining the weight distribution of the occupants can be integrated or otherwise arranged in the seats 3 and 4 of the vehicle and several patents and publications describe such systems.

More generally, any sensor that determines the presence and health state of an occupant can also be integrated into the vehicle interior monitoring system in accordance with the inventions herein. For example, a sensitive motion sensor can determine whether an occupant is breathing and a chemical sensor, such as accomplished using SAW technology, can determine the amount of carbon dioxide, or the concentration of carbon dioxide, in the air in the vehicle, which can be correlated to the health state of the occupant(s). The motion sensor and chemical sensor can be designed to have a fixed operational field situated near the occupant. In the alternative, the motion sensor and chemical sensor can be adjustable and adapted to adjust their operational field in conjunction with a determination by an occupant position and location sensor that would determine the location of specific parts of the occupant's body such as his or her chest or mouth. Furthermore, an occupant position and location sensor can be used to determine the location of the occupant's eyes and determine whether the occupant is conscious, that is, whether his or her eyes are open or closed or moving.

Chemical sensors can also be used to detect whether there is blood present in the vehicle such as after an accident. Additionally, microphones can detect whether there is noise in the vehicle caused by groaning, yelling, etc., and transmit any such noise through the cellular or similar connection to a remote listening facility using a telematics communication system such as operated by OnStarm.

FIG. 2A shows a schematic diagram of an embodiment of the invention including a system for determining the presence and health state of any occupants of the vehicle and a telecommunications link. This embodiment includes means 150 for determining the presence of any occupants 151, which may take the form of a heartbeat sensor, chemical sensor or motion sensor as described above and means for determining the health state of any occupants 151. The latter means may be integrated into the means for determining the presence of any occupants using the same or different component. The presence determining means 150 may encompass a dedicated presence determination device associated with each seating location in the vehicle, or at least sufficient presence determination devices having the ability to determine the presence of an occupant at each seating location in the vehicle. Further, means for determining the location, and optionally velocity, of the occupants or one or more parts thereof 152 are provided and may be any conventional occupant position sensor or preferably, one of the occupant position sensors as described herein such as those utilizing waves such as electromagnetic radiation or fields such as capacitance sensors or as described in the current assignee's patents and patent applications referenced above as well as herein.

A processor 153 is coupled to the presence determining means 150, the health state determining means 151 and the location determining means 152. A communications unit 154 is coupled to the processor 153. The processor 153 and/or communications unit 154 can also be coupled to microphones 158 that can be distributed throughout the vehicle passenger compartment and include voice-processing circuitry to enable the occupant(s) to effect vocal control of the processor 153, communications unit 154 or any coupled component or oral communications via the communications unit 154. The processor 153 is also coupled to another vehicular system, component or subsystem 155 and can issue control commands to effect adjustment of the operating conditions of the system, component or subsystem. Such a system, component or subsystem can be the heating or air-conditioning system, the entertainment system, an occupant restraint device such as an airbag, a glare prevention system, etc. Also, a positioning system 156, such as a GPS or differential GPS system, could be coupled to the processor 153 and provides an indication of the absolute position of the vehicle.

Pressure or weight sensors 7, 76 and 97 are also included in the system shown in FIGS. 6 and 6A. Although strain gage-type sensors are schematically illustrated mounted to the supporting structure of the seat portion 4, and a bladder pressure sensor mounted in the seat portion 4, any other type of pressure or weight sensor can be used including mat or butt spring sensors. Strain gage sensors are described in detail in U.S. Pat. No. 6,242,701 as well as herein. Weight can be used to confirm the occupancy of the seat, i.e., the presence or absence of an occupant as well as whether the seat is occupied by a light or heavy object. In the latter case, a measured weight of less than 60 pounds is often determinative of the presence of a child seat whereas a measured weight of greater than 60 pounds is often indicative of the absence of a child seat. The weight sensors 7 can also be used to determine the weight distribution of the occupant of the seat and thereby ascertain whether the occupant is moving and the position of the occupant. As such, the weight sensors 7 could be used to confirm the position and motion of the occupant. The measured pressure or weight or distribution thereof can also be used in combination with the data from the transmitter/receiver assemblies 49, 50, 51, 52 and 54 of FIG. 8C to provide an identification of the occupants in the seat.

As discussed below, weight can be measured both statically and dynamically. Static weight measurements require that the pressure or strain gage system be accurately calibrated and care must be taken to compensate for the effects of seatbelt load, aging, unwanted stresses in the mounting structures, temperature etc. Dynamic measurements, on the other hand, can be used to measure the mass of an object on the seat, the presence of a seatbelt load and can be made insensitive to unwanted static stresses in the supporting members and to aging of the seat and its structure. In the simplest implementation, the natural frequency of seat is determined due to the random vibrations or accelerations that are input to the seat from the vehicle suspension system. In more sophisticated embodiments, an accelerometer and/or seatbelt tension sensor is also used to more accurately determine the forces acting on the occupant. In another embodiment, a vibrator can be used in conjunction with the seat to excite the seat occupying item either on a total basis or on a local basis using PVDF film as an exciter and a determination of the contact pattern of the occupant with the seat determined by the local response to the PVDF film. This latter method using the PVDF film or equivalent is closer to a pattern determination rather than a true weight measurement.

Although many weight sensing systems are described herein, at least one of the inventions disclosed herein is, among other things, directed to the use of weight in any manner to determine the occupancy of a vehicle. Prior art mat sensors determined the occupancy through the butt print of the occupying item rather than actually measuring its weight. In an even more general sense, at least one of the inventions disclosed herein is the use of any biometric measurement to determine vehicle occupancy.

As to the latter issue, when an occupant or object is strapped into the seat using a seatbelt, it can cause an artificial load on a bladder-type weight sensor and/or strain gage-type weight sensors when the seatbelt anchorage points are not on the seat. The effects of seatbelt load can be separated from the effects of object or occupant weight, as disclosed in U.S. Pat. No. 6,242,701, if the time-varying signals are considered rather than merely using averaging to obtain the static load. If a vehicle-mounted vertical accelerometer is present, then the forcing function on the seat caused by road roughness, steering maneuvers, and the vehicle suspension system can be compared with the response of the seat as measured by the bladder or strain gage pressure or weight sensors. Through mathematical analysis, the magnitude of the bladder pressure or strain caused by seat belt loads can be separated from pressure and strain caused by occupant or object mass. Also, since animated objects such as people cannot sit still indefinitely, such occupants can be distinguished from inanimate objects by similarly observing the change in pressure and strain distribution over time.

A serious problem that has plagued researchers attempting to adapt strain gage technology to seat weight sensing arises from fact that a typical automobile seat is an over-determined structure containing indeterminate stresses and strains in the supporting structure. This arises from a variety of causes such as the connection between the seat structure and the slide mechanisms below the seat or between the slide mechanisms and the floor which induces twisting and bending moments in the seat structural members. Similarly, since most seats have four attachment points and since only three points are necessary to determine a plane, there can be an unexpected distribution of compression and tensile stresses in the support structure. To complicate the situation, these indeterminable stresses and strains can vary as a function of seat position and temperature. The combination of all of these effects produces a significant error in the calculation of the weight of an occupying item and the distribution of this weight.

This problem can be solved by looking at changes in pressure and strain readings in addition to the absolute values. The dynamic response of an occupied seat is a function of the mass of the occupying item. As the car travels down the road, a forcing function is provided to the seat which can be measured by the vertical acceleration component and other acceleration components. This provides a method of measuring the response of the seat as well as the forcing function and thereby determining the mass of occupying item.

For example, when an occupant first enters the vehicle and sits on a seat, the change in pressure and/or strain measurements will provide an accurate measurement of the occupant's weight. This accuracy deteriorates as soon as the occupant attaches a seatbelt and/or moves the seat to a new position. Nevertheless, the change in occupancy of the seat is a significant event that can be easily detected and if the change in pressure and strain measurements are used as the measurement of the occupant weight, then the weight can be accurately determined. Similarly, the sequence of events for attaching a child seat to a vehicle is one that can be easily discerned since the seat is first placed into the vehicle and the seat belt cinched followed by placing the child in the seat or, alternately, the child and seat are placed in the vehicle followed by a cinching of the seatbelt. Either of these event sequences gives a high probability of the occupancy being a child in a child seat. This decision can be confirmed by dynamical measurements as described above.

A control system for controlling a component of the vehicle based on occupancy of the seat in accordance with the invention may comprise a plurality of strain gages, or bladder chambers, mounted in connection with the seat, each measuring strain or pressure of a respective location caused by occupancy of the seat, and a processor coupled to the strain or pressure gages and arranged to determine the weight of an occupying item based on the strain or pressure measurements from the strain or pressure gages over a period of time, i.e., dynamic measurements. The processor controls the vehicle component based at least in part on the determined weight of the occupying item of the seat. The processor can also determine motion of the occupying item of the seat based on the strain or pressure measurements from the strain or pressure gages over the period of time. One or more accelerometers may be mounted on the vehicle for measuring acceleration in which case, the processor may control the component based at least in part on the determined weight of the occupying item of the seat and the acceleration measured by the accelerometer(s). (See the discussion below in reference to FIG. 23.)

By comparing the output of various sensors in the vehicle, it is possible to determine activities that are affecting parts of the vehicle while not affecting other parts. For example, by monitoring the vertical accelerations of various parts of the vehicle and comparing these accelerations with the output of strain gage load cells placed on the seat support structure, or bladder sensors, a characterization can be made of the occupancy of the seat. Not only can the weight of an object occupying the seat be determined, but also the gross motion of such an object can be ascertained and thereby an assessment can be made as to whether the object is a life form such as a human being and whether the seatbelt is engaged. Strain gage weight sensors are disclosed, for example, in U.S. Pat. No. 6,242,701. In particular, the inventors contemplate the combination of all of the ideas expressed in the '701 patent with those expressed in the current invention.

Thus, the combination of the outputs from these accelerometer sensors and the output of strain gage or bladder weight sensors in a vehicle seat, or in or on a support structure of the seat, can be used to make an accurate assessment of the occupancy of the seat and differentiate between animate and inanimate occupants as well as determining where in the seat the occupants are sitting and whether the seatbelt is engaged. This can be done by observing the acceleration signals from the sensors of FIG. 23 and simultaneously the dynamic strain gage measurements from seat-mounted strain or pressure gages or pressure measurements of bladder weight sensors. The accelerometers provide the input function to the seat and the strain gages measure the reaction of the occupying item to the vehicle acceleration and thereby provide a method of determining dynamically the mass of the occupying item and its location. This is particularly important during occupant position sensing during a crash event. By combining the outputs of the accelerometers and the strain gages and appropriately processing the same, the mass and weight of an object occupying the seat can be determined as well as the gross motion of such an object so that an assessment can be made as to whether the object is a life form such as a human being and whether a seatbelt is used and if so how tightly it is cinched.

Both strain gage and bladder weight sensors will be considered in detail below. There are of course several ways to process the acceleration signal and the stain or pressure signal or any other weight measuring apparatus. In general, the dynamic load applied to the seat is measured or a forcing function of the seat is measured, as a function of the acceleration signal. This represents the effect of the movement of the vehicle on the occupant which is reflected in the measurement of weight by the strain or pressure gages. Thus, the measurement obtained by the strain or pressure gages can be considered to have two components, one component resulting from the weight applied by the occupant in a stationary state of the vehicle and the other arising or resulting from the movement of the vehicle. The vehicle-movement component can be separated from the total strain or pressure gage measurement to provide a more accurate indication of the weight of the occupant.

To provide a feeling for the implementation of at least one of the inventions disclosed herein, consider the following approximate analysis.

To begin with, the seatbelt can be represented as a one-way spring in that the force is high for upward motion and low for downward motion. This however introduces non-linearity into the analysis making an exact solution difficult. Therefore for the purposes of this simplified analysis, an assumption is made that the force from the seatbelt is the same in both directions. Although the stiffness of the seat will vary significantly from vehicle to vehicle, assume here that it is about 30 kg per cm. Also assume that the input from the road is 1 Hz with a magnitude of 10 cm for the vertical motion of the vehicle wheels (axle) on the road. The motion of the seat will be much less due to the vehicle suspension system.

The problem is to find is the weight of an occupant from the response of the seat (as measured by strain or pressure gages) to the road displacement acting through the vehicle suspension. The intent here is only to show that it is possible to determine the weight of the occupant and the use of a seatbelt by measuring the dynamic strain or pressure due to the seat motion as a function of the weight of the occupant and the seatbelt force. The functions and equations used below and the solution to them can be implemented in a processor.

Figure 6B:
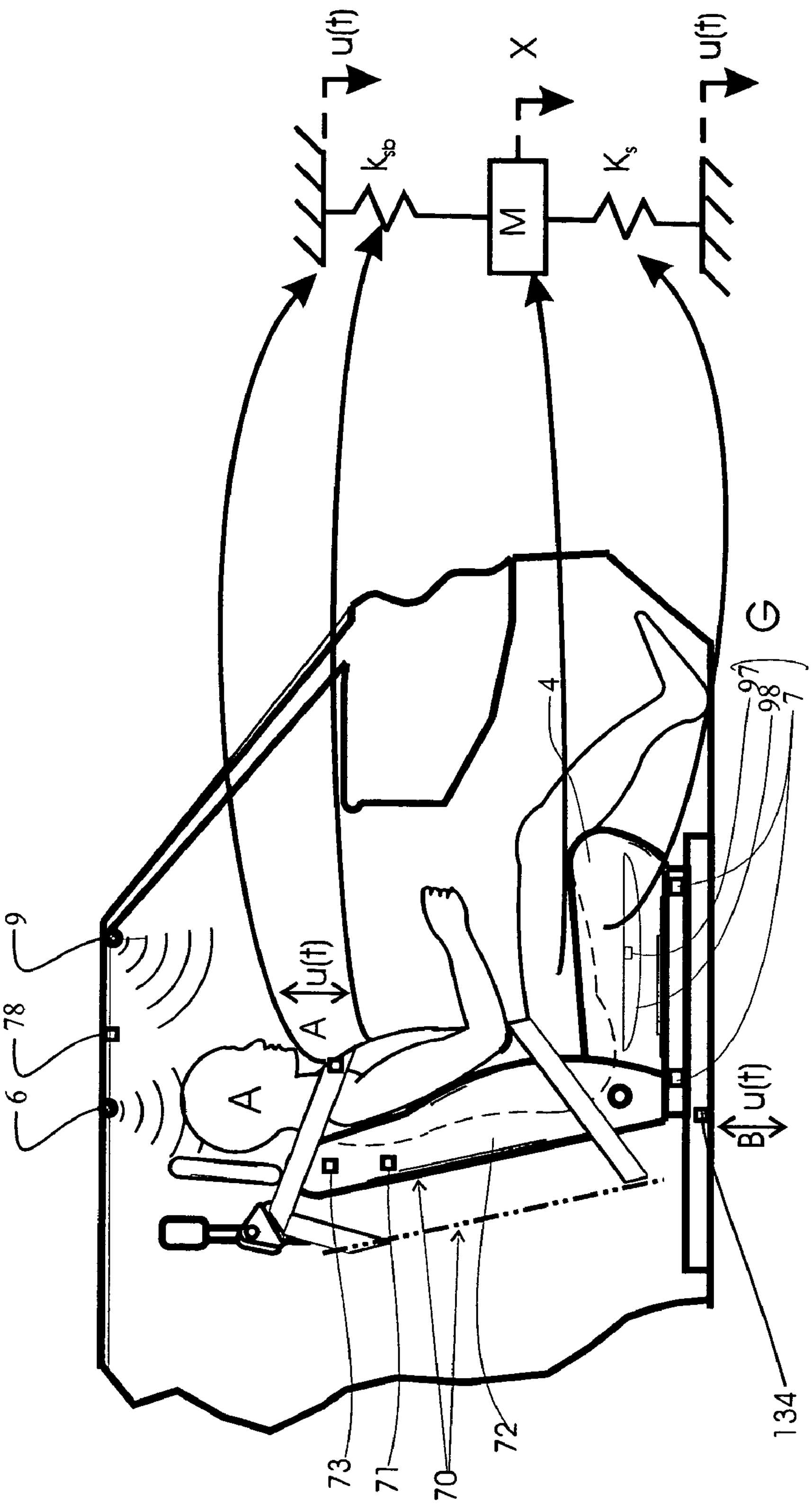
FIG. 6B is a schematic showing the manner in which dynamic forces of the vehicle can be compensated for in a weight measurement of the occupant.

Looking now at FIG. 6B, suppose that point A (the point where a seatbelt is fixed to the seat) and point B are subjected to harmonic displacements $u(t)=U_0\cos\omega t$ caused by a car's vertical movements on the road. As a result, springs modeling a seat and a seatbelt (their corresponding stiffness are $k_s$ and $k_{sb}$) affect a passenger mass m with forces $-k_{sb}(u-x)$ and $k_x(u-x)$. (Minus in the first force is taken because the seatbelt spring contracts when the seat spring stretches and vice versa). Under the action forces, the mass gets accelerated $d^2x/dt^2$, so the initial equation to be solved will be $$m\frac{d^2x}{dt^2} = -k_{sb}(u-x) + k_s(u-x). \tag{1}$$

This equation can be rewritten in the form $$m\frac{d^2x}{dt^2} + (k_s - k_{sb})x = u(t)(k_s - k_{sb}). \tag{2}$$

or $$m\frac{d^2x}{dt^2} + (k_s - k_{sb})x = U_0(k_s - k_{sb})\cos\omega t \tag{3}$$

This is a differential equation of a harmonic oscillator under action of a harmonic external force $f(t)=U_0(t)(k_s-k_{sb})\cos\omega t$. If there is no seatbelt ($k_{sb}=0$), the solution of this equation in the case of a harmonic external force $f(t)=F_0\cos\omega t$ is well known [Strelkov S. P. *Introduction in the theory of oscillations*, Moscow, "Nauka", 1964, p. 56]:

$$x(t) = \frac{U_0}{\left(1-\frac{\omega^2}{\omega_0^2}\right)}\cos\omega t + C_1\cos\omega_0 t + C_2\sin\omega_0 t, \tag{4}$$

where the oscillator natural frequency.

$$\omega_0 = \sqrt{\frac{k_s}{m}}. \tag{5}$$

The second and third terms in equation (4) describe natural oscillations of the oscillator, which decay if there is any, even very small, friction in the system. Having assumed such small friction to be present, for steady forced oscillation, the equation is thus:

$$x(t) = \frac{U_0}{1-\frac{\omega^2}{\omega_0^2}}\cos\omega t. \tag{6}$$

Thus, in steady mode the system oscillates with the external force frequency ω. Now, it is possible to calculate acceleration of the mass:

$$\frac{d^2x}{dt^2} = -\frac{\omega^2 U_0}{1-\frac{\omega^2}{\omega_0^2}}\cos\omega t, \tag{7}$$

and the amplitude of the force acting in the system $$F_m = \left|m\frac{d^2x}{dt^2}\right| = \left|-\frac{m\omega^2 U_0}{1-\frac{\omega^2}{\omega_0^2}}\right|. \tag{8}$$

In the situation where a seatbelt is present, it is not possible to use the same formulae because the seatbelt stiffness is always greater than stiffness of a seat, and $(k_s-k_{sb})<0$. Therefore, instead of equation (3) we should consider the equation $$\frac{d^2x}{dt^2} - \omega_0^2 x = -\omega_0^2 U_0\cos\omega t, \tag{9}$$

where $\omega_0^2=|k_s-k_{sb}|/m>0$. Following the same procedure (Strelkov S. P., ibid.), one can find a solution of inhomogeneous equation (9):

$$x(t) = \frac{U_0}{1+\frac{\omega^2}{\omega_0^2}}\cos\omega t. \tag{10}$$

Then its general solution will be [as per Korn G. A., Korn T. M. *Mathematical handbook for scientists and engineers*. Russian translation: Moscow, "Nauka", 1970, pp. 268-270]:

$$x(t) = \frac{U_0}{\left(1+\frac{\omega^2}{\omega_0^2}\right)}\cos\omega t + C_1\cos\omega_0 t + C_2\sin\omega_0 t. \tag{11}$$

Thus, in a steady mode, the amplitude of the acting force is:

$$F_m = \left|-\frac{m\omega^2 U_0}{1+\frac{\omega^2}{\omega_0^2}}\right|, \tag{12}$$

and the natural frequency of the system is:

$$\omega_0 = \sqrt{\frac{|k_s - k_{sb}|}{m}}. \tag{13}$$

Using the formulae (5), (8) (the "no seatbelt case"), (12) and (13) (the "seatbelt present case"), a tab be created as shown below. In the table, $\rho_m$ denotes amplitude of pressure acting on the seat surface. The initial data used in calculations are as follows:

- $k_s$=30 Kg/cm=$3\times10^4$ N/m (the seat stiffness);
- $k_{sb}$=600 N/0.3 cm=$2\times10^5$ N/m (the seatbelt stiffness);
- $U_0$=0.1 m (the acting displacement amplitude);
- f=1 Hz (the acting frequency).
- S=0.05 $m^2$ (the seat surface square that the passenger acting upon).

Naturally, where the frequency $f=\omega/2\pi$, $f_0$ is natural frequency of the system. Columns "No seatbelt" is calculated when $k_{sb}=0$.

| The passenger | No seatbelt | | | There is a seatbelt | | |
|---|---|---|---|---|---|---|
| mass, kg | $f_0$, Hz | $F_m$, N | $p_m$, Pa | $f_0$, Hz | $F_m$, N | $p_m$, Pa |
| 20 | 6.2 | 81.1 | $1.62\times10^3$ | 14.7 | 78.6 | $1.57\times10^3$ |
| 40 | 4.4 | 166.7 | $3.33\times10^3$ | 10.4 | 156.5 | $3.13\times10^3$ |
| 60 | 3.6 | 257.2 | $5.14\times10^3$ | 8.5 | 233.6 | $4.67\times10^3$ |
| 100 | 2.8 | 454.6 | $9.09\times10^3$ | 6.6 | 385.8 | $7.72\times10^3$ |

From the above table, it can be seen that there is a different combination of seat structure force (as can be measured by strain gages), or pressure (as can be measured by a bladder and pressure sensor) and natural frequency for each combination of occupant weight and seatbelt use. Indeed, it can easily be seen that use of a seatbelt significantly affects the weight measurement of the weight sensors. By using the acceleration data, e.g., a forcing function, it is possible to eliminate the effect of the seatbelt and the road on the weight measurement. Thus, by observing the response of the seat plus occupant and knowing the input from the road, an estimate of the occupant weight and seatbelt use can be made without even knowing the static forces or pressures in the strain or pressure gages. By considering the dynamic response of the seat to road-induced input vibrations, the occupant weight and seatbelt use can be determined.

In an actual implementation, the above problem can be solved more accurately by using a pattern recognition system that compares the pattern of the seat plus occupant response (pressure or strain gage readings) to the pattern of input accelerations. This can be done through the training of a neural network, modular neural network or other trainable pattern recognition system. Many other mathematical techniques can be used to solve this problem including various simulation methods where the coefficients of dynamical equations are estimated from the response of the seat and occupant to the input acceleration. Thus, although the preferred implementation of the present invention is to use neural networks to solve this problem, the invention is not limited thereby.

6.1 Strain Gage Weight Sensors

Figure 42:
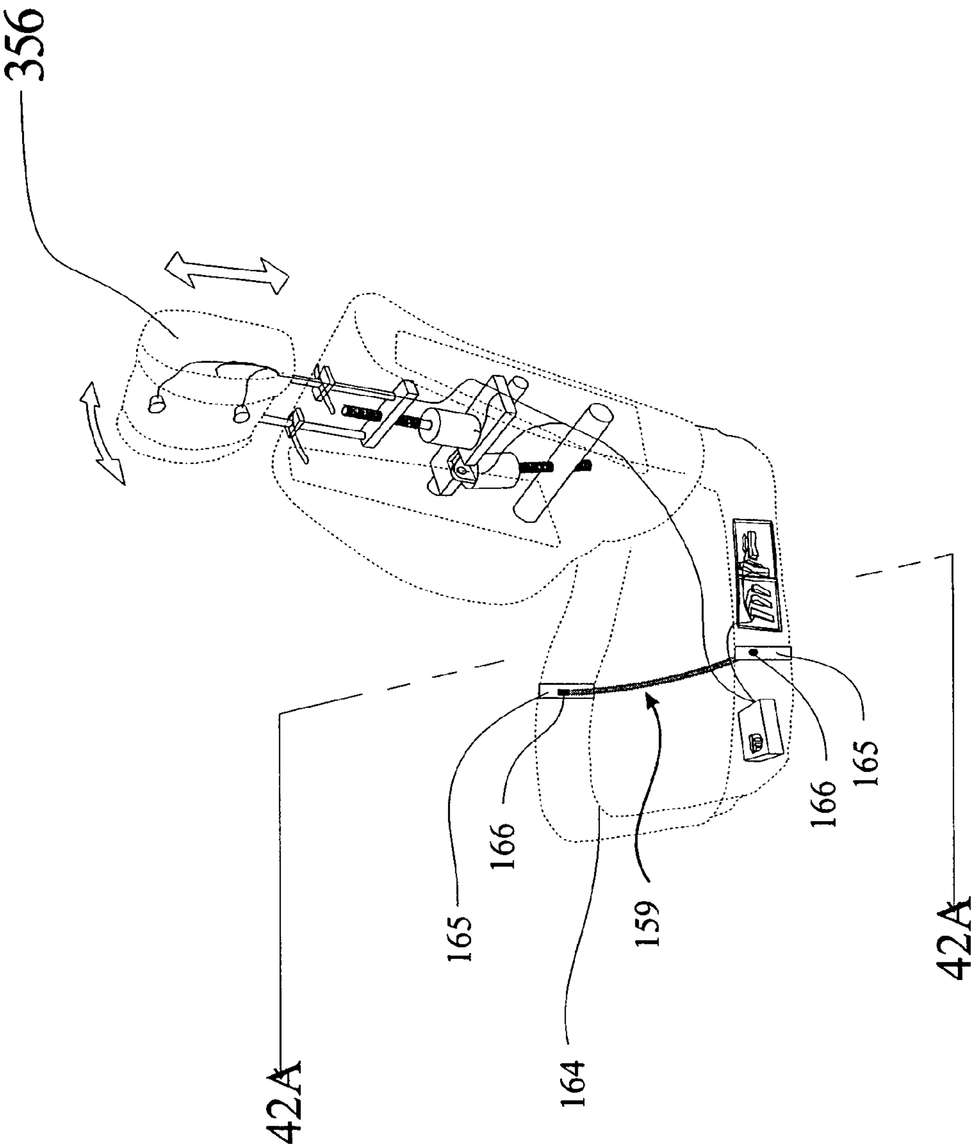
FIG. 42 is a perspective view of a seat shown in phantom, with a movable headrest and sensors for measuring the height of the occupant from the vehicle seat, and a weight sensor shown mounted onto the seat.
Figure 42A:
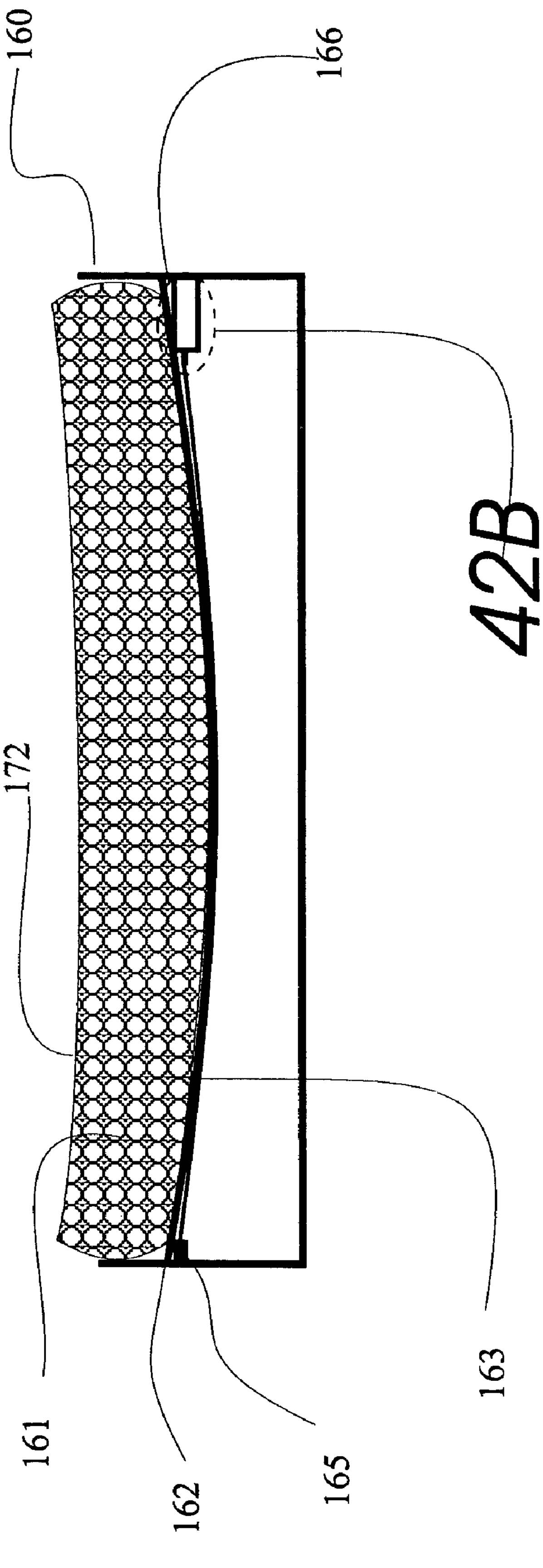
FIG. 42A is a view taken along line 42A-42A in FIG. 42.
Figure 42B:
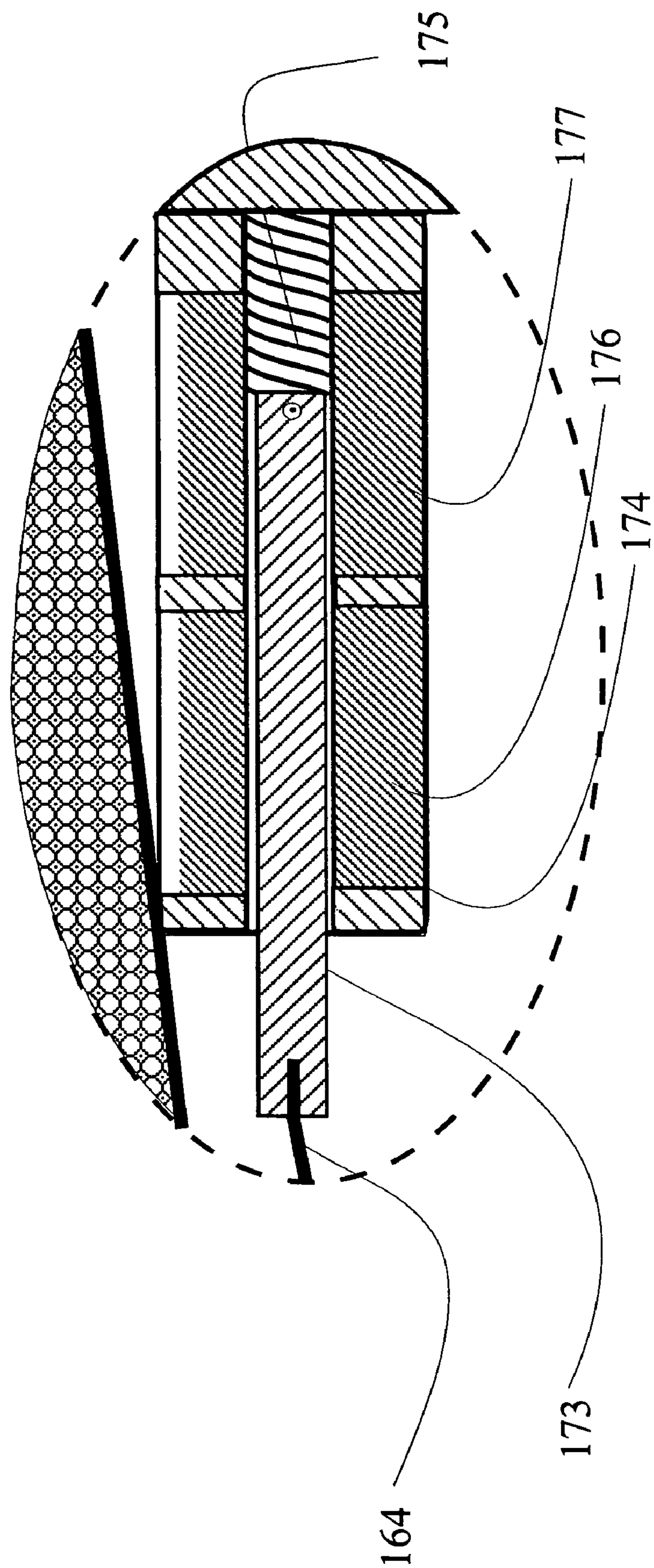
FIG. 42B is an enlarged view of the section designated 42B in FIG. 42.
Figure 42C:
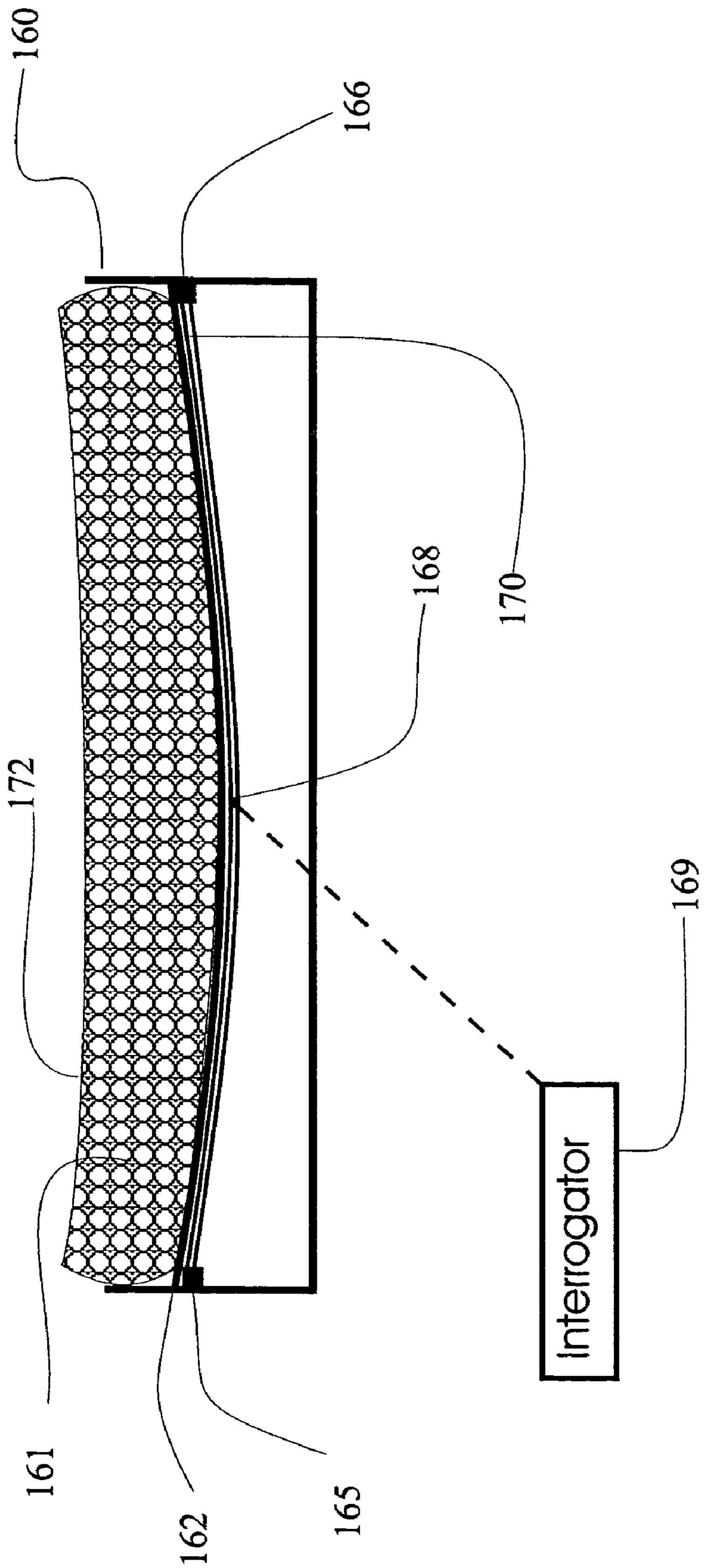
FIG. 42C is a view of another embodiment of a seat with a weight sensor similar to the view shown in FIG. 42A.

Referring now to FIG. 42A, which is a view of the apparatus of FIG. 42 taken along line 42A-42A, seat 160 is constructed from a cushion or foam layer 161 which is supported by a spring system 162 which is in contact and/or association with the displacement sensor 163. As shown, displacement sensor 163 is underneath the spring system 162 but this relative positioning is not a required feature of the invention. The displacement sensor 163 comprises an elongate cable 164 retained at one end by support 165 and a displacement sensor 166 situated at an opposite end. This displacement sensor 166 can be any of a variety of such devices including, but not limited to, a linear rheostat, a linear variable differential transformer (LVDT), a linear variable capacitor, or any other length measuring device. Alternately, as shown in FIG. 42C, the cable can be replaced with one or more springs 167 retained between supports 165 and the tension in the spring(s) 167 measured using a strain gage (conventional wire, foil, silicon or a SAW strain gage) or other force measuring device 168 or the strain in the seat support structure can be measured by appropriately placing strain gages on one or more of the seat supports as described in more detail below. The strain gage or other force measuring device could be arranged in association with the spring system 162 and could measure the deflection of the bottom surface of the cushion or foam layer 161.

When a SAW strain gage 168 is used as part of weight sensor 163, an interrogator 169 could be placed on the vehicle to enable wireless communication and/or power transfer to the SAW strain gage 168. As such, when it is desired to obtain the force being applied by the occupying item on the seat, the interrogator 169 sends a radio signal to the SAW strain gage causing it to transmit a return signal with the measured strain of the spring 170. Interrogator 169 is coupled to the processor used to determine the control of the vehicle component.

Figure 42D:
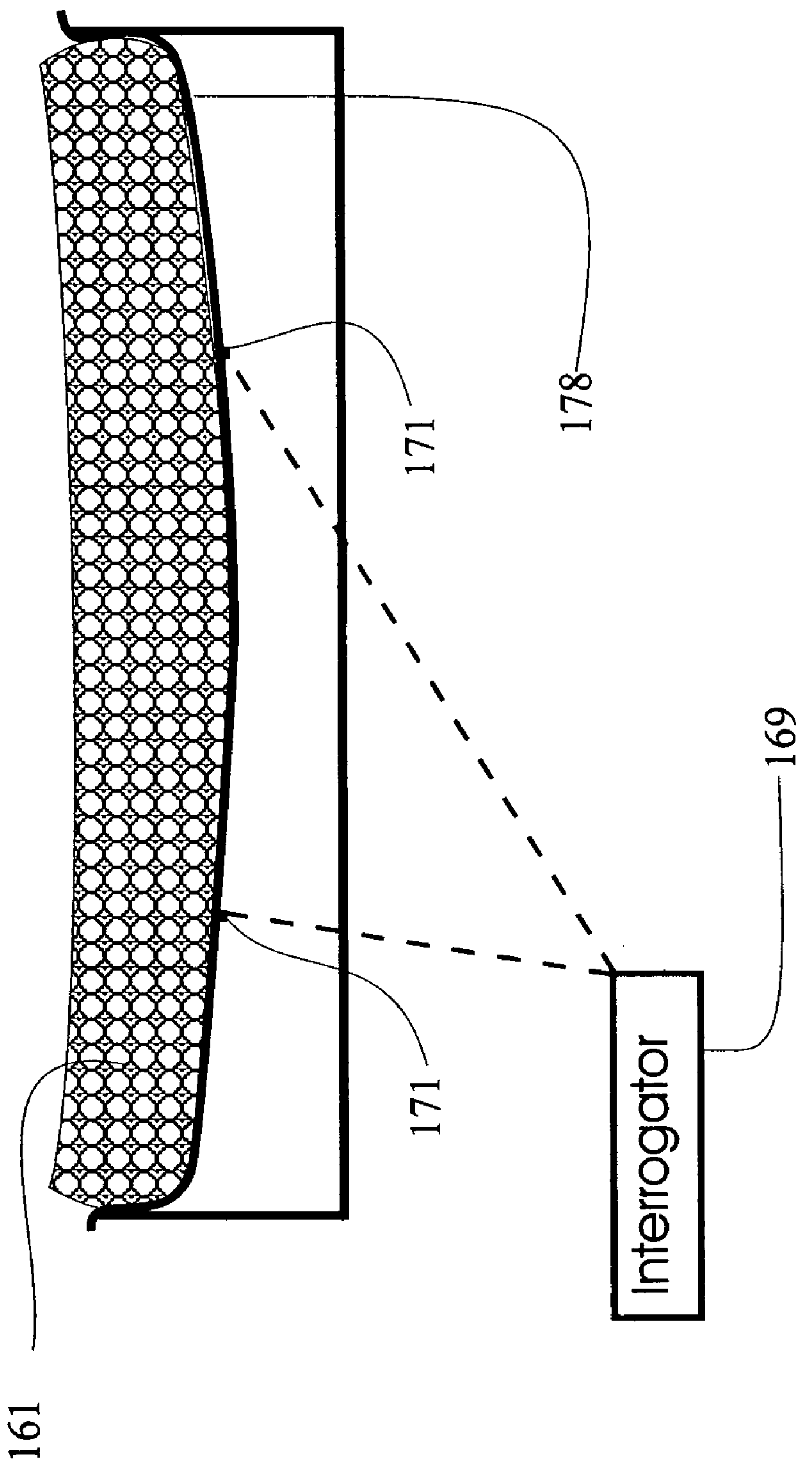
FIG. 42D is a view of another embodiment of a seat with a weight sensor in which a SAW strain gage is placed on the bottom surface of the cushion.

As shown in FIG. 42D, one or more SAW strain gages 171 could also be placed on the bottom surface or support pan 178 of the cushion or foam layer 161 in order to measure the deflection of the bottom surface which is representative of the weight of the occupying item on the seat or the pressure applied by the occupying item to the seat. An interrogator 169 could also be used in this embodiment.

One seat design is illustrated in FIG. 42. Similar weight measurement systems can be designed for other seat designs. Also, some products are available which can approximately measure weight based on pressure measurements made at or near the upper seat surface 172. It should be noted that the weight measured here will not be the entire weight of the occupant since some of the occupant's weight will be supported by his or her feet which are resting on the floor or pedals. As noted above, the weight may also be measured by the weight sensor(s) 7, 76 and 97 described above in the seated-state detecting unit.

As weight is placed on (pressure applied to) the seat surface 172, it is supported by spring system 162 which deflects downward causing cable 164 of the sensor 163 to begin to stretch axially. Using a LVDT as an example of length measuring device 166, the cable 164 pulls on rod 173 tending to remove rod 173 from cylinder 174 (FIG. 42B). The movement of rod 173 out of cylinder 174 is resisted by a spring 175 which returns the rod 173 into the cylinder 174 when the weight is removed from the seat surface 172. The amount which the rod 173 is removed from the cylinder 174 is measured by the amount of coupling between the windings 176 and 177 of the transformer as is well understood by those skilled in the art. LVDT's are commercially available devices. In this matter, the deflection of the seat can be measured which is a measurement of the weight on the seat, i.e., the pressure applied by an occupying item to the seat surface. The exact relationship between weight and LVDT output is generally determined experimentally for this application.

SAW strain gages could also be used to determine the downward deflection of the spring system 162 and the deflection of the cable 164.

By use of a combination of weight and height, the driver of the vehicle can in general be positively identified among the class of drivers who operate the vehicle. Thus, when a particular driver first uses the vehicle, the seat will be automatically adjusted to the proper position. If the driver changes that position within a prescribed time period, the new seat position can be stored in the second table for the particular driver's height and weight. When the driver reenters the vehicle and his or her height and weight are again measured, the seat will go to the location specified in the second table if one exists. Otherwise, the location specified in the first table will be used. Naturally other methods having similar end results can be used.

Figure 43:
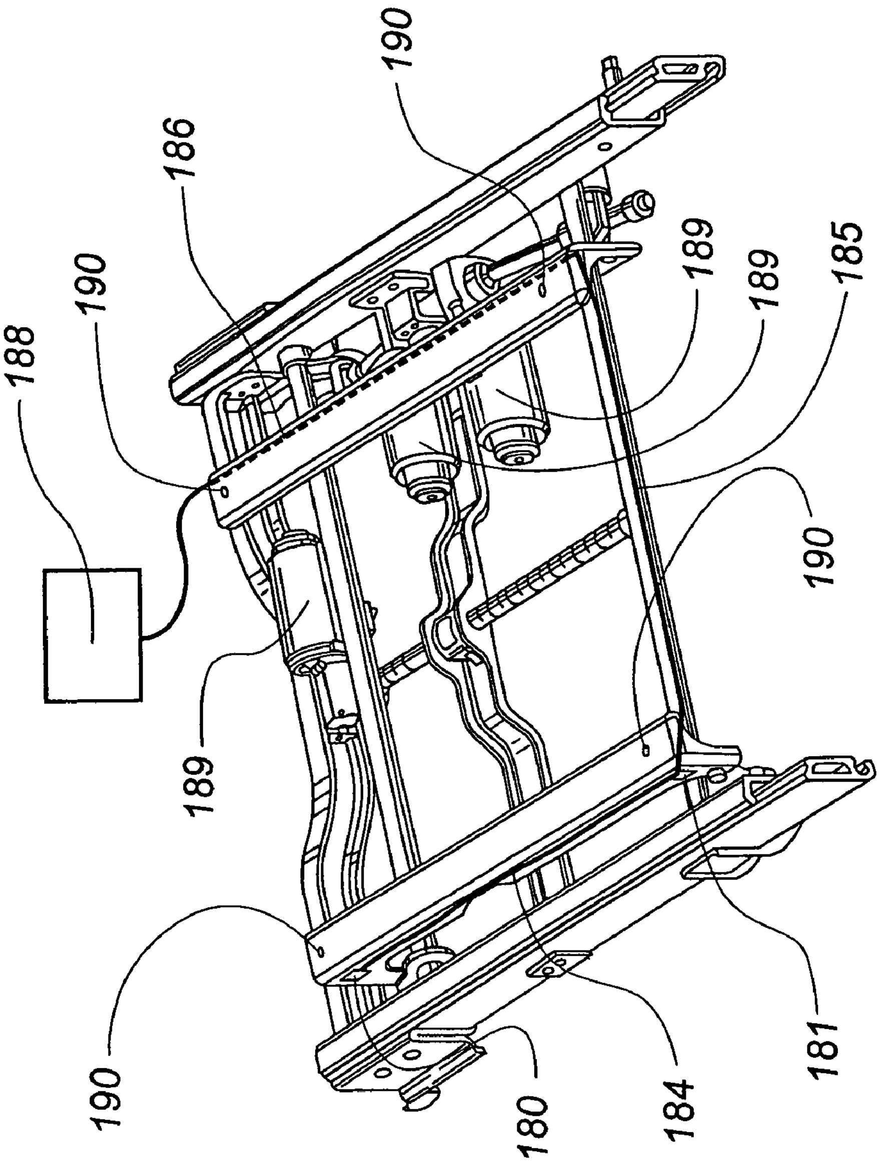
FIG. 43 is a perspective view of a one embodiment of an apparatus for measuring the weight of an occupying item of a seat illustrating weight sensing transducers mounted on a seat control mechanism portion which is attached directly to the seat.

In a first embodiment of a weight measuring apparatus shown in FIG. 43, four strain gage weight sensors or transducers are used, two being illustrated at 180 and 181 on one side of a bracket of the support structure of the seat and the other two being at the same locations on another bracket of the support (i.e., hidden on the corresponding locations on the other side of the support). The support structure of the seat supports the seat on a substrate such as a floor pan of the vehicle. Each of the strain gage transducers 180,181 also can contain electronic signal conditioning apparatus, e.g., amplifiers, analog to digital converters, filters etc., which is associated such that output from the transducers is a digital signal. Such signal conditioning apparatus can also eliminate residual stresses in the transducer readings that may be present from the manufacturing, assembly or mounting processes or due to seat motion or temperature. The electronic signal travels from transducer 180 to transducer 181 through a wire 184. Similarly, wire 185 transmits the output from transducers 180 and 181 to the next transducer in the sequence (one of the hidden transducers). Additionally, wire 186 carries the output from these three transducers toward the fourth transducer (the other hidden transducer) and wire 187 finally carries all four digital signals to an electronic control system or module 188. These signals from the transducers 180, 181 are time, code or frequency division multiplexed as is well known in the art. The seat position is controlled by motors 189 as described in detail in U.S. Pat. No. 5,179,576. Finally, the seat is bolted onto the support structure through bolts not shown which attach the seat through holes 190 in the brackets.

By placing the signal conditioning electronics, analog to digital converters, and other appropriate electronic circuitry adjacent the strain gage element, the four transducers can be daisy chained or otherwise attach together and only a single wire is required to connect all of the transducers to the control module 188 as well as provide the power to run the transducers and their associated electronics.

The control system 188, e.g., a microprocessor, is arranged to receive the digital signals from the transducers 180,181 and determine the weight of the occupying item of the seat based thereon. In other words, the signals from the transducers 180,181 are processed by the control system 188 to provide an indication of the weight of the occupying item of the seat, i.e., the pressure or force exerted by the occupying item on the seat support structure.

Figure 44:
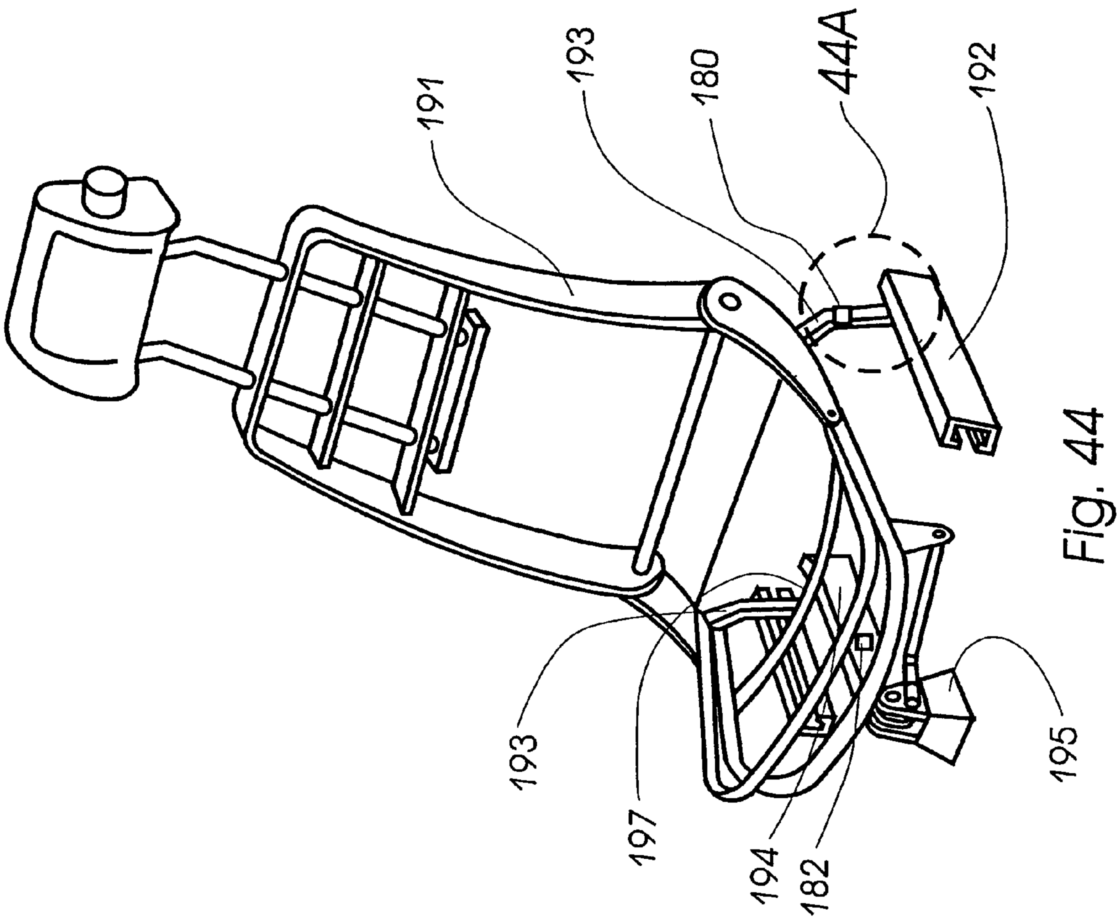
FIG. 44 illustrates a seat structure with the seat cushion and back cushion removed illustrating a three-slide attachment of the seat to the vehicle and preferred mounting locations on the seat structure for strain measuring weight sensors of an apparatus for measuring the weight of an occupying item of a seat in accordance with the invention.

A typical manually controlled seat structure is illustrated in FIG. 44 and described in greater detail in U.S. Pat. No. 4,285,545. The seat 191 (only the frame of which is shown) is attached to a pair of slide mechanisms 192 in the rear thereof through support members such as rectangular tubular structures 193 angled between the seat 191 and the slide mechanisms 192. The front of the seat 191 is attached to the vehicle (more particularly to the floor pan) through another support member such as a slide member 194, which is engaged with a housing 195. Slide mechanisms 192, support members 193, slide member 194 and housing 195 constitute the support structure for mounting the seat on a substrate, i.e., the floor pan. Strain gage transducers are located for this implementation at 180 and 182, strain gage transducer 180 being mounted on each tubular structure 193 (only one of such strain gage is shown) and strain gage transducer 182 being mounted on slide member 194.

When an occupying item is situated on the seat cushion (not shown), each of the support members 193 and 194 are deformed or strained. This strain is measured by transducers 180 and 182, respectively, to enable a determination of the weight of the item occupying the seat, as can be understood by those skilled in the strain gage art. More specifically, a control system or module or other compatible processing unit (not shown) is coupled to the strain gage transducers 180, 182, e.g., via electrical wires (not shown), to receive the measured strain and utilize the measured strain to determine the weight of the occupying item of the seat or the pressure applied by the occupying item to the seat. The determined weight, or the raw measured strain, may be used to control a vehicular component such as the airbag.

Support members 193 are substantially vertically oriented and are preferably made of a sufficiently rigid, non-bending component.

Figure 44A:
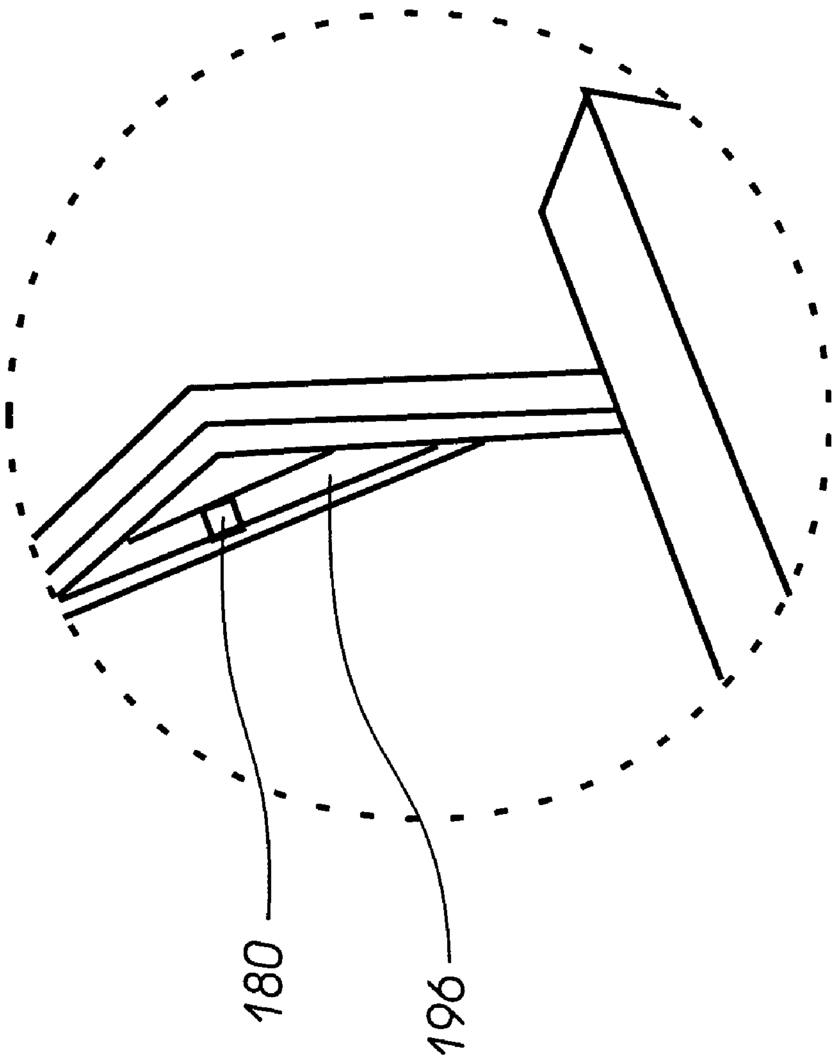
FIG. 44A illustrates an alternate view of the seat structure transducer mounting location taken in the circle 44A of FIG. 44 with the addition of a gusset and where the strain gage is mounted onto the gusset.

FIG. 44A illustrates an alternate arrangement for the seat support structures wherein a gusset 196 has been added to bridge the angle on the support member 193. Strain gage transducer 180 is placed on this gusset 196.

Since the gusset 196 is not a supporting member, it can be made considerably thinner than the seat support member 193. As the seat is loaded by an occupying item, the seat support member 193 will bend. Since the gusset 196 is relatively weak, greater strain will occur in the gusset 196 than in the support member 193. The existence of this greater strain permits more efficient use of the strain gage dynamic range thus improving the accuracy of the weight measurement.

Figure 44B:
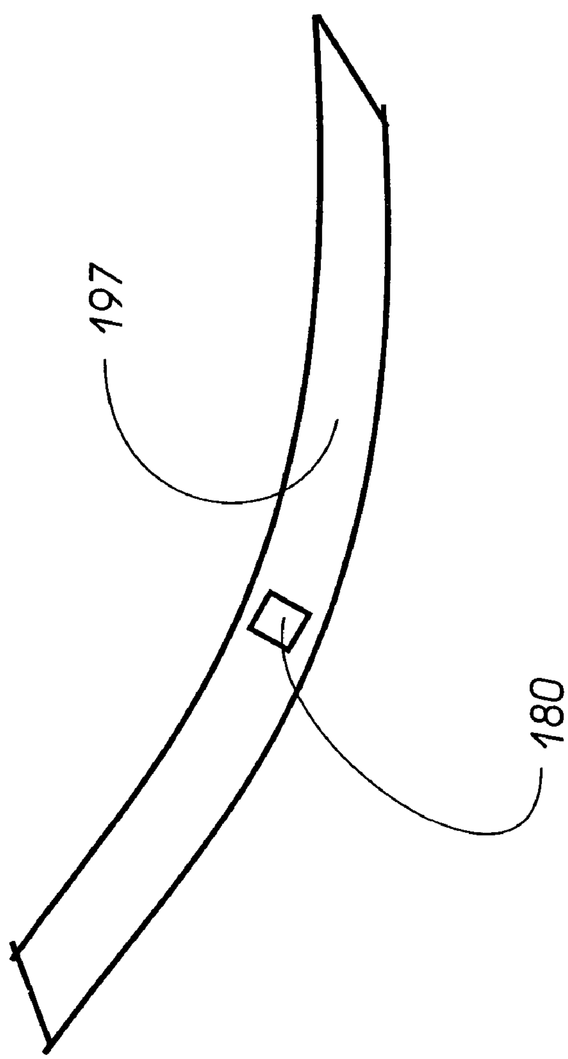
FIG. 44B illustrates a mounting location for a weight sensing transducer on a centralized transverse support member in an apparatus for measuring the weight of an occupying item of a seat in accordance with the invention.

FIG. 44B illustrates a seat transverse support member 197 of the seat shown in FIG. 44, which is situated below the base cushion and extends between opposed lateral sides of the seat. This support member 197 will be directly loaded by the vehicle seat and thus will provide an average measurement of the force exerted or weight of the occupying item. The deflection or strain in support member 197 is measured by a strain gage transducer 180 mounted on the support member 197 for this purpose. In some applications, the support member 197 will occupy the entire space fore and aft below the seat cushion. Here it is shown as a relatively narrow member. The strain gage transducer 180 is coupled, e.g., via an electrical wire (not shown), to a control module or other processing unit (not shown) which utilizes the measured strain to determine the weight of the occupying item of the seat.

Figures 45A, 45B, 45C:
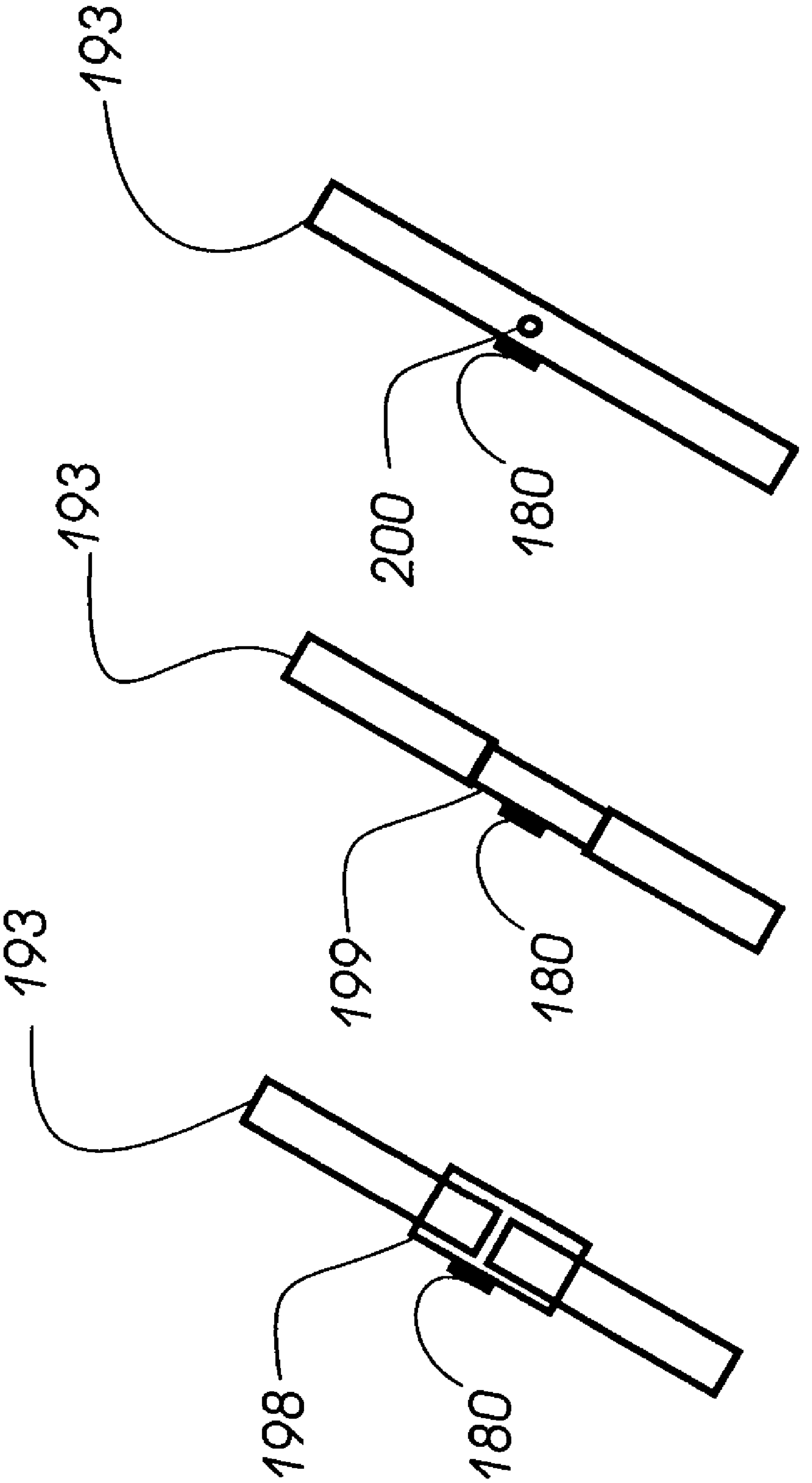
FIGS. 45A, 45B and 45C illustrate three alternate methods of mounting strain transducers of an apparatus for measuring the weight of an occupying item of a seat in accordance with the invention onto a tubular seat support structural member.

In FIG. 44, the support members 193 are shown as rectangular tubes having an end connected to the seat 191 and an opposite end connected to the slide mechanisms 192. In the constructions shown in FIGS. 45A-45C, the rectangular tubular structure has been replaced by a circular tube where only the lower portion of the support is illustrated. FIGS. 45A-45C show three alternate ways of improving the accuracy of the strain gage system, i.e., the accuracy of the measurements of strain by the strain gage transducers. Generally, a reduction in the stiffness of the support member to which the strain gage transducer is mounted will concentrate the force and thereby improve the strain measurement. There are several means disclosed below to reduce the stiffness of the support member. These means are not exclusive and other ways to reduce the stiffness of the support member are included in the invention and the interpretation of the claims.

In each illustrated embodiment, the transducer is represented by 180 and the substantially vertically oriented support member corresponding to support member 193 in FIG. 44 has been labeled 193A. In FIG. 45A, the tube support member 193A has been cut to thereby form two separate tubes having longitudinally opposed ends and an additional tube section 198 is connected, e.g., by welding, to end portions of the two tubes. In this manner, a more accurate tube section 198 can be used to permit a more accurate measurement of the strain by transducer 180, which is mounted on tube section 198.

In FIG. 45B, a small circumferential cut has been made in tube support member 193A so that a region having a smaller circumference than a remaining portion of the tube support member 193A is formed. This cut is used to control the diameter of the tube support member 193A at the location where strain gage transducer 180 is measuring the strain. In other words, the strain gage transducer 180 is placed at a portion wherein the diameter thereof is less than the diameter of remaining portions of the tube support member 193A. The purpose of this cut is to correct for manufacturing variations in the diameter of the tube support member 193A. The magnitude of the cut is selected so as to not significantly weaken the structural member but instead to control the diameter tolerance on the tube so that the strain from one vehicle to another will be the same for a particular loading of the seat.

In FIG. 45C, a small hole 200 is made in the tube support member 193A adjacent the transducer 180 to compensate for manufacturing tolerances on the tube support member 193A.

From this discussion, it can be seen that all three techniques have as their primary purpose to increase the accuracy of the strain in the support member corresponding to weight on the vehicle seat. The preferred approach would be to control the manufacturing tolerances on the support structure tubing so that the variation from vehicle to vehicle is minimized. For some applications where accurate measurements of weight are desired, the seat structure will be designed to optimize the ability to measure the strain in the support members and thereby to optimize the measurement of the weight of the occupying item. The inventions disclosed herein, therefore, are intended to cover the entire seat when the design of the seat is such as to be optimized for the purpose of strain gage weight sensing and alternately for the seat structure when it is so optimized.

Figure 46:
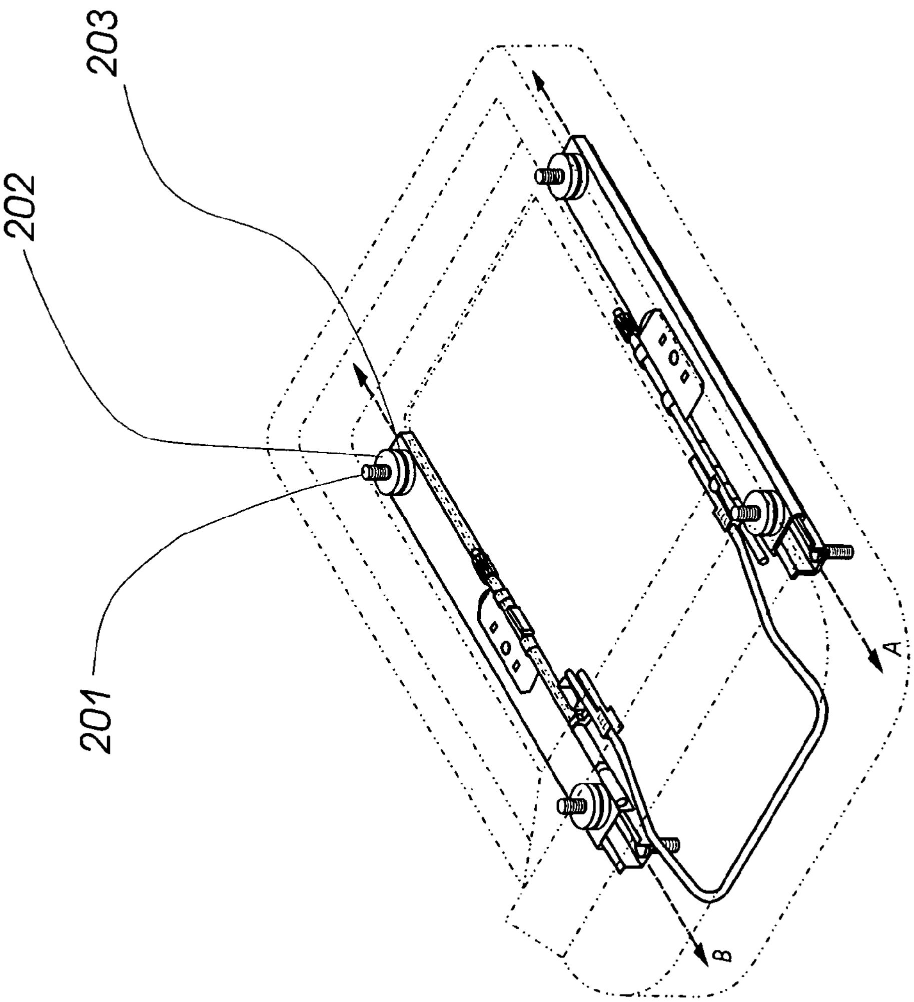
FIG. 46 illustrates an alternate weight sensing transducer utilizing pressure sensitive transducers.

Although strain measurement devices have been discussed above, pressure measurement systems can also be used in the seat support structure to measure the weight on the seat. Such a system is illustrated in FIG. 46. A general description of the operation of this apparatus is disclosed in U.S. Pat. No. 5,785, 291. In that patent, the vehicle seat is attached to the slide mechanism by means of bolts 201. Between the seat and the slide mechanism, a shock-absorbing washer has been used for each bolt. In the present invention, this shock-absorbing washer has been replaced by a sandwich construction consisting of two washers of shock absorbing material 202 with a pressure sensitive material 203 sandwiched in between.

A variety of materials can be used for the pressure sensitive material 203, which generally work on either the capacitance or resistive change of the material as it is compressed. The wires from this material 203 leading to the electronic control system are not shown in this view. The pressure sensitive material 203 is coupled to the control system, e.g., a microprocessor, and provides the control system with an indication of the pressure applied by the seat on the slide mechanism which is related to the weight of the occupying item of the seat. Generally, material 203 is constructed with electrodes on the opposing faces such that as the material 202 is compressed, the spacing between the electrodes is decreased. This spacing change thereby changes both the resistive and the capacitance of the sandwich which can be measured and which is a function of the compressive force on the material 202. Measurement of the change in capacitance of the sandwich, i.e., two spaced apart conductive members, is obtained by any method known to those skilled in the art, e.g., connecting the electrodes in a circuit with a source of alternating or direct current. The conductive members may be made of a metal. The use of such a pressure sensor is not limited to the illustrated embodiment wherein the shock absorbing material 202 and pressure sensitive material 203 are placed around bolt 201. It is also not limited to the use or incorporation of shock absorbing material in the implementation.

Figure 46A:
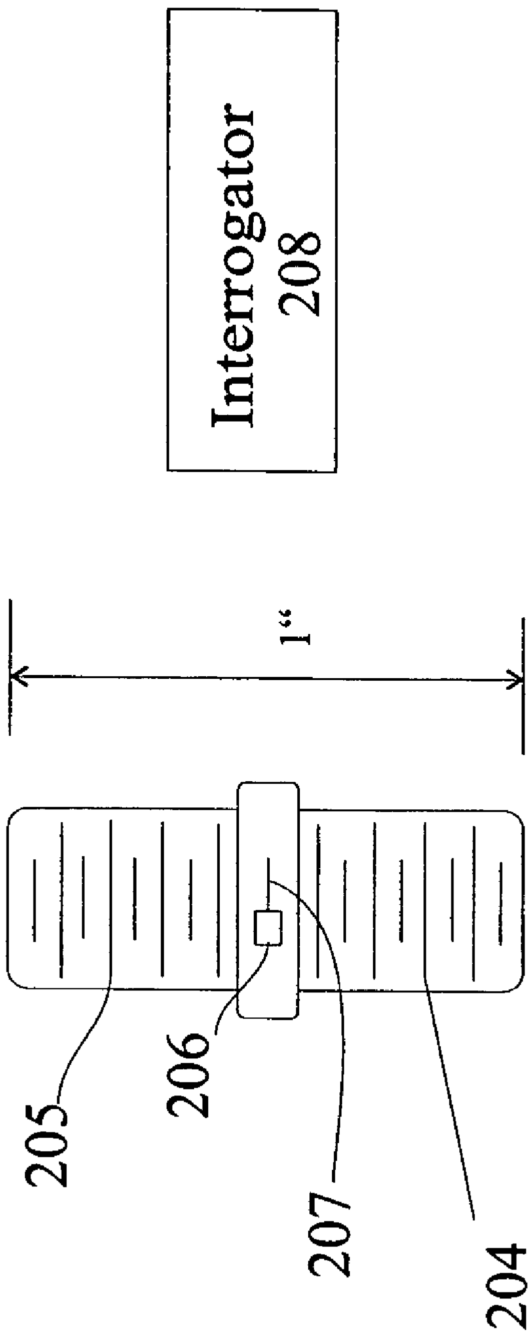
FIG. 46A illustrates a part of another alternate weight sensing system for a seat.

FIG. 46A shows a substitute construction for the bolt 201 in FIG. 46 and which construction is preferably arranged in connection with the seat and the adjustment slide mechanism. A bolt-like member, hereinafter referred to as a stud 204, is threaded 205 on both ends with a portion remaining unthreaded between the ends. A SAW strain measuring device including a SAW strain gage 206 and antenna 207 is arranged on the center unthreaded section of the stud 400 and the stud 400 is attached at its ends to the seat and the slide mechanism using appropriate threaded nuts. Based on the particular geometry of the SAW device used, the stud 400 can result in as little as a 3 mm upward displacement of the seat compared to a normal bolt mounting system. No wires are required to attach the SAW device to the stud 204. The total length of stud 204 may be as little as 1 inch. Antennas larger than one inch may be required depending on the frequency and antenna technology used and other considerations.

In operation, an interrogator 208 transmits a radio frequency pulse at for example, 925 MHz, which excites the antenna 207 associated with the SAW strain gage 206. After a delay caused by the time required for the wave to travel the length of the SAW device, a modified wave is re-transmitted to the interrogator 208 providing an indication of the strain and thus a representative value of the weight of an object occupying the seat. For a seat which is normally bolted to the slide mechanism with four bolts, at least four SAW strain measuring devices or sensors would be used. Each conventional bolt could thus be replaced by a stud as described above. Since the individual SAW devices are very small, multiple such SAW devices can be placed on the stud to provide multiple redundant measurements or to permit the stud to be arbitrarily located with at least one SAW device always within direct view of the interrogator antenna. Note that if quarter wave dipole antennas are used, they may be larger than the strain gage and may in that case need to be mounted to the seat bottom, for example, or some other convenient place. This, however, will also make it easier to align the antennas with the interrogator antenna.

To avoid potential problems with electromagnetic interference, the stud 204 may be made of a non-metallic, possibly composite, material which would not likely cause or contribute to any possible electromagnetic wave interference. The stud 204 could also be modified for use as an antenna.

If the seat is unoccupied, then the interrogation frequency can be substantially reduced in comparison to when the seat is occupied. For an occupied seat, information as to the identity and/or category and position of an occupying item of the seat can be obtained through the use of multiple weight sensors. For this reason, and due to the fact that during pre-crash event the position of an occupying item of the seat may be changing rapidly, interrogations as frequently as once every 10 milliseconds or even faster can be desirable. This would also enable a distribution of the weight being applied to the seat being obtained which provides an estimation of the position of the object occupying the seat. Using pattern recognition technology, e.g., a trained neural network, sensor fusion, fuzzy logic, etc., the identification of the object can be ascertained based on the determined weight and/or determined weight distribution.

Although each of the SAW devices can be interrogated and/or powered using wireless means, in some cases, it may be desirable to supply power to and or obtained information from such devices using wires. Also, strain gage coupled to circuits employing RFID type technology (no on-board power) can also result in a wireless interrogation system. Additionally, energy harvesting techniques can be used to generate the power required. Conventional strain gages can also be used.

Figure 47:
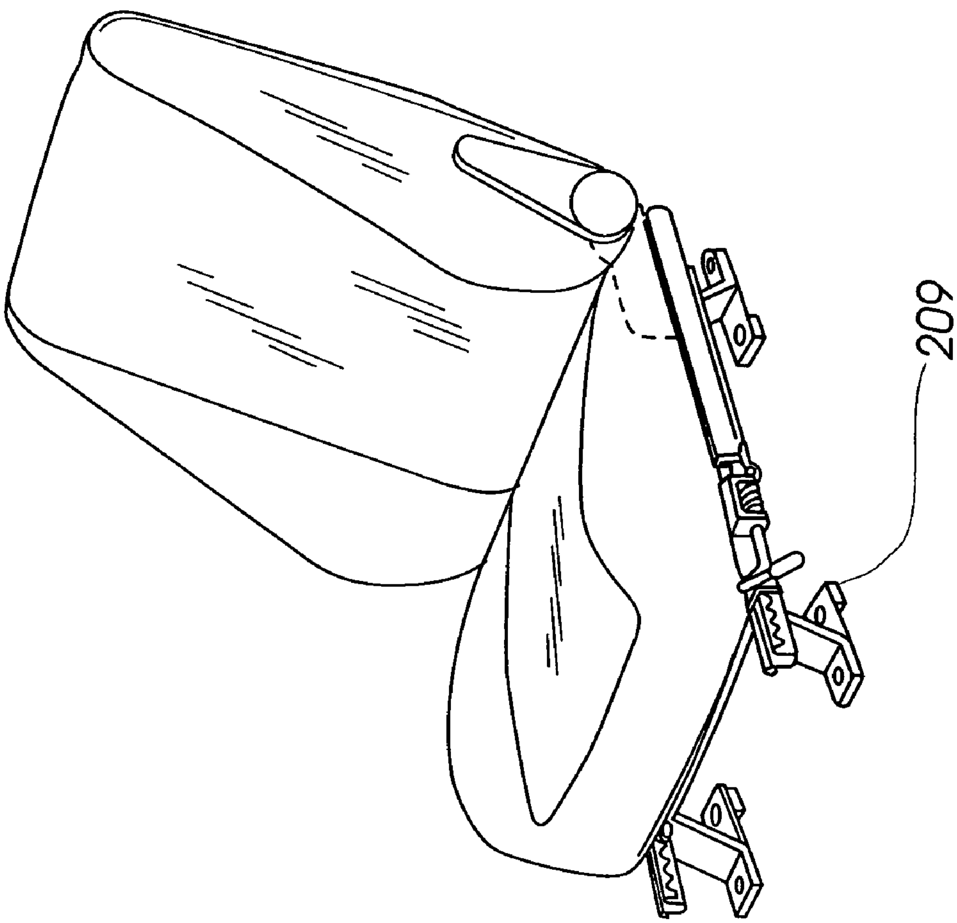
FIG. 47 illustrates an alternate seat structure assembly utilizing strain transducers.

In FIG. 47, which is a view of a seat attachment structure described in U.S. Pat. No. 5,531,503, a more conventional strain gage load cell design designated 209 is utilized. One such load cell design 209 is illustrated in detail in FIG. 47A.

Figure 47A:
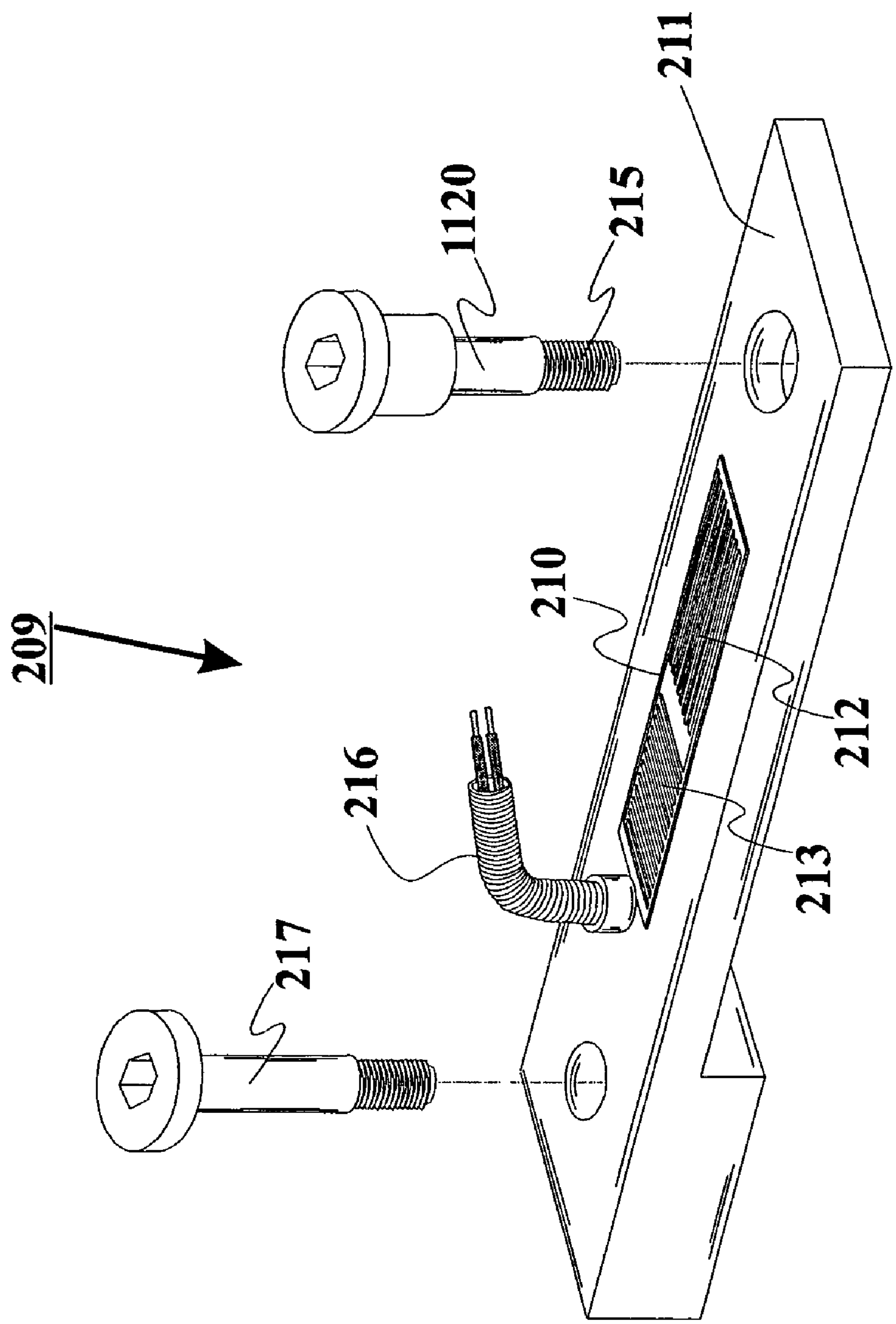
FIG. 47A is a perspective view of a cantilevered beam type load cell for use with the weight measurement system of at least one of the inventions disclosed herein for mounting locations of FIG. 47, for example.

A cantilevered beam load cell design using a half bridge strain gage system 209 is shown in FIG. 47A. Fixed resistors mounted within the electronic package, which are not shown in this drawing, provide the remainder of the whetstone bridge system. The half bridge system is frequently used for economic reasons and where some sacrifice in accuracy is permissible. The load cell 209 includes a member 211 on which the strain gage 210 is situated. The strain gage assembly 209 includes strain-measuring elements 212 and 213 arranged on the load cell. The longitudinal element 212 measures the tensile strain in the beam when it is loaded by the seat and its contents, not shown, which is attached to end 215 of bolt 214. The load cell is mounted to the vehicle or other substrate using bolt 217. Temperature compensation is achieved in this system since the resistance change in strain elements 212 and 213 will vary the same amount with temperature and thus the voltage across the portions of the half bridge will remain the same. The strain gage 209 is coupled to a control system (e.g., a microprocessor-not shown) via wires 216 and receives the measured tensile strain and determines the weight of an occupying item of the seat based thereon.

One problem with using a cantilevered load cell is that it imparts a torque to the member on which it is mounted. One preferred mounting member on an automobile is the floor-pan which will support significant vertical loads but is poor at resisting torques since floor-pans are typically about 1 mm (0.04 inches) thick. This problem can be overcome through the use of a simply supported load cell design designated 220 as shown in FIG. 47B.

Figure 47B:
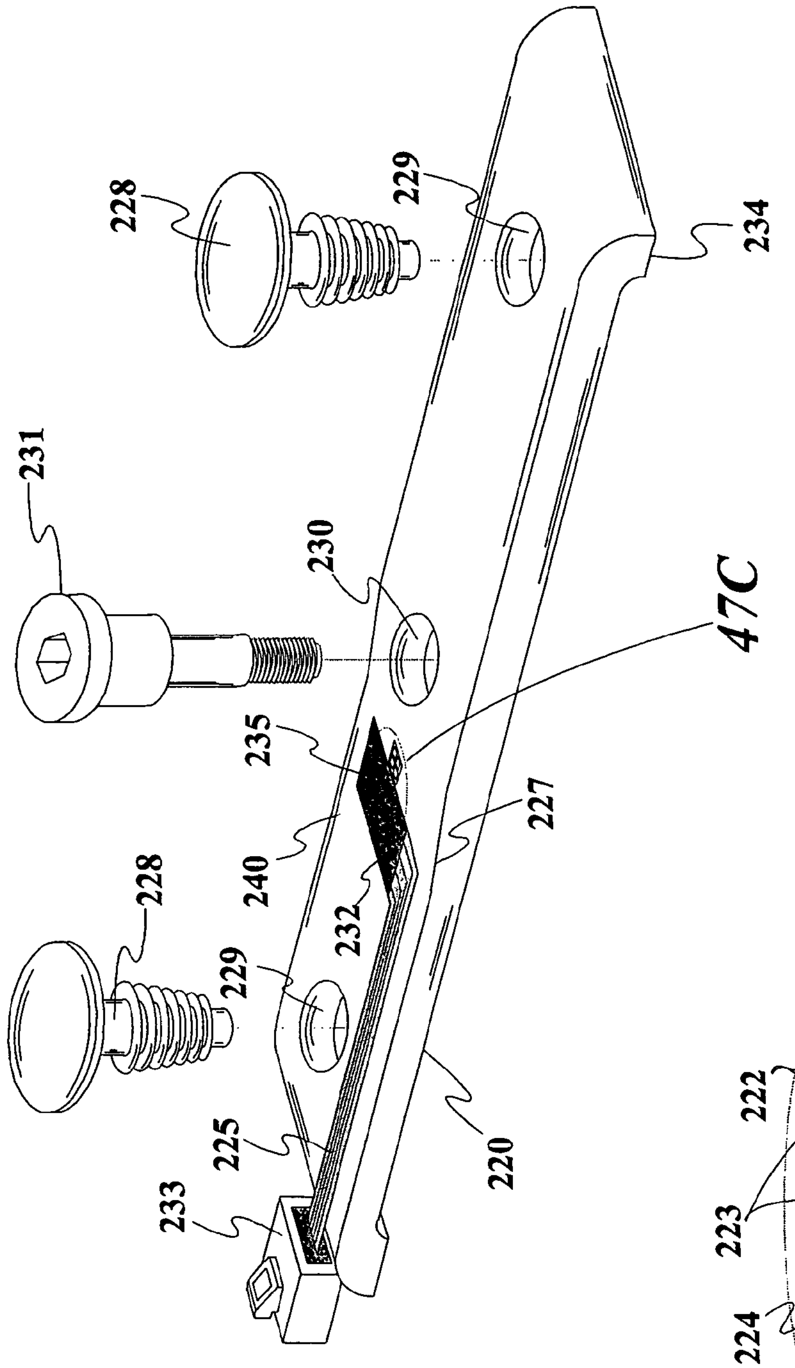
FIG. 47B is a perspective view of a simply supported beam type load cell for use with the weight measurement system of at least one of the inventions disclosed herein as an alternate to the cantilevered load cell of FIG. 47A.
Figure 47C:
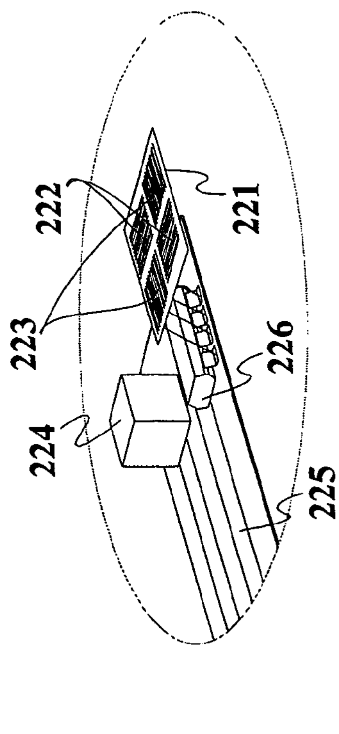
FIG. 47C is an enlarged view of the portion designated 47C in FIG. 47B.

In FIGS. 47B and 47C, a full bridge strain gage system 221 is used with all four elements 222, 223 mounted on the top of a beam 240. Elements 222 are mounted parallel to the beam 240 and elements 223 are mounted perpendicular to it. Since the maximum strain is in the middle of the beam 240, strain gage 221 is mounted close to that location. The load cell, shown generally as 220, is supported by the floor pan, not shown, at supports 234 that are formed by bending the beam 240 downward at its ends. Fasteners 228 fit through holes 229 in the beam 240 and serve to hold the load cell 220 to the floor pan without putting significant forces on the load cell 220. Holes are provided in the floor-pan for a bolt 231 and for fasteners 228. Bolt 231 is attached to the load cell 220 through hole 230 of the beam 240 which serves to transfer the force from the seat to the load cell 220 Although this design would place the load cell 220 between the slide mechanism and the floor, in many applications it would be placed between the seat and the slide mechanism. In the first case, the evaluation algorithm may also require a seat position input if the weight distribution is to be determined.

The electronics package can be potted within hole 235 using urethane potting compound 232 and can include signal conditioning circuits, a microprocessor with integral ADCs 226 and a flex circuit 225 (FIG. 47C). The flex circuit 225 terminates at an electrical connector 233 for connection to other vehicle electronics, e.g., a control system. The beam 240 is slightly tapered at location 227 so that the strain is constant in the strain gage.

Figure 47D:
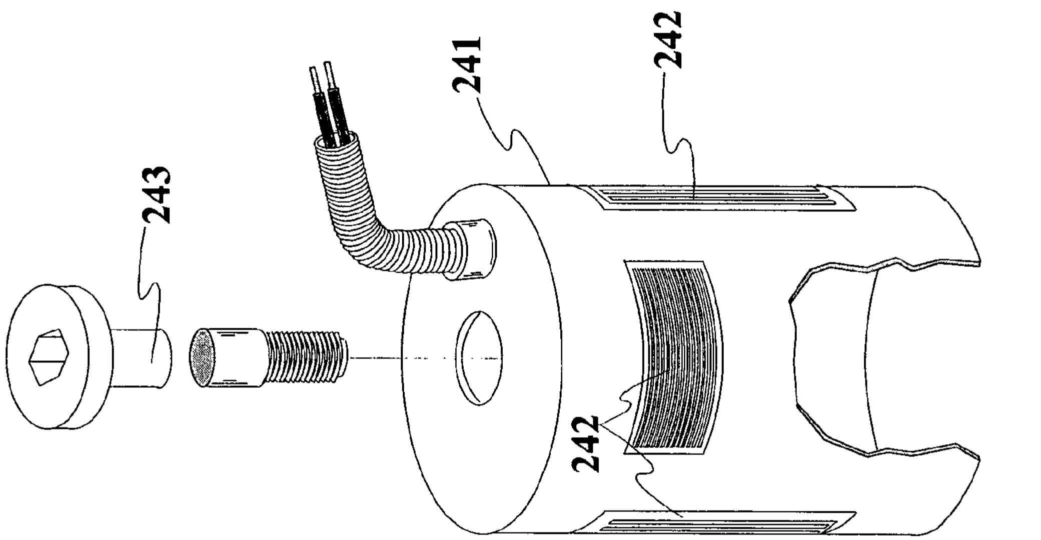
FIG. 47D is a perspective view of a tubular load cell for use with the weight measurement system of at least one of the inventions disclosed herein as an alternate to the cantilevered load cell of FIG. 47A.

Although thus far only beam-type load cells have been described, other geometries can also be used. One such geometry is a tubular type load cell. Such a tubular load cell is shown generally at 241 in FIG. 47D and instead of an elongate beam, it includes a tube. It also comprises a plurality of strain sensing elements 242 for measuring tensile and compressive strains in the tube as well as other elements, not shown, which are placed perpendicular to the elements 242 to provide for temperature compensation. Temperature compensation is achieved in this manner, as is well known to those skilled in the art of the use of strain gages in conjunction with a whetstone bridge circuit, since temperature changes will affect each of the strain gage elements identically and the total effect thus cancels out in the circuit. The same bolt 243 can be used in this case for mounting the load cell to the floor-pan and for attaching the seat to the load cell.

Figure 47E:
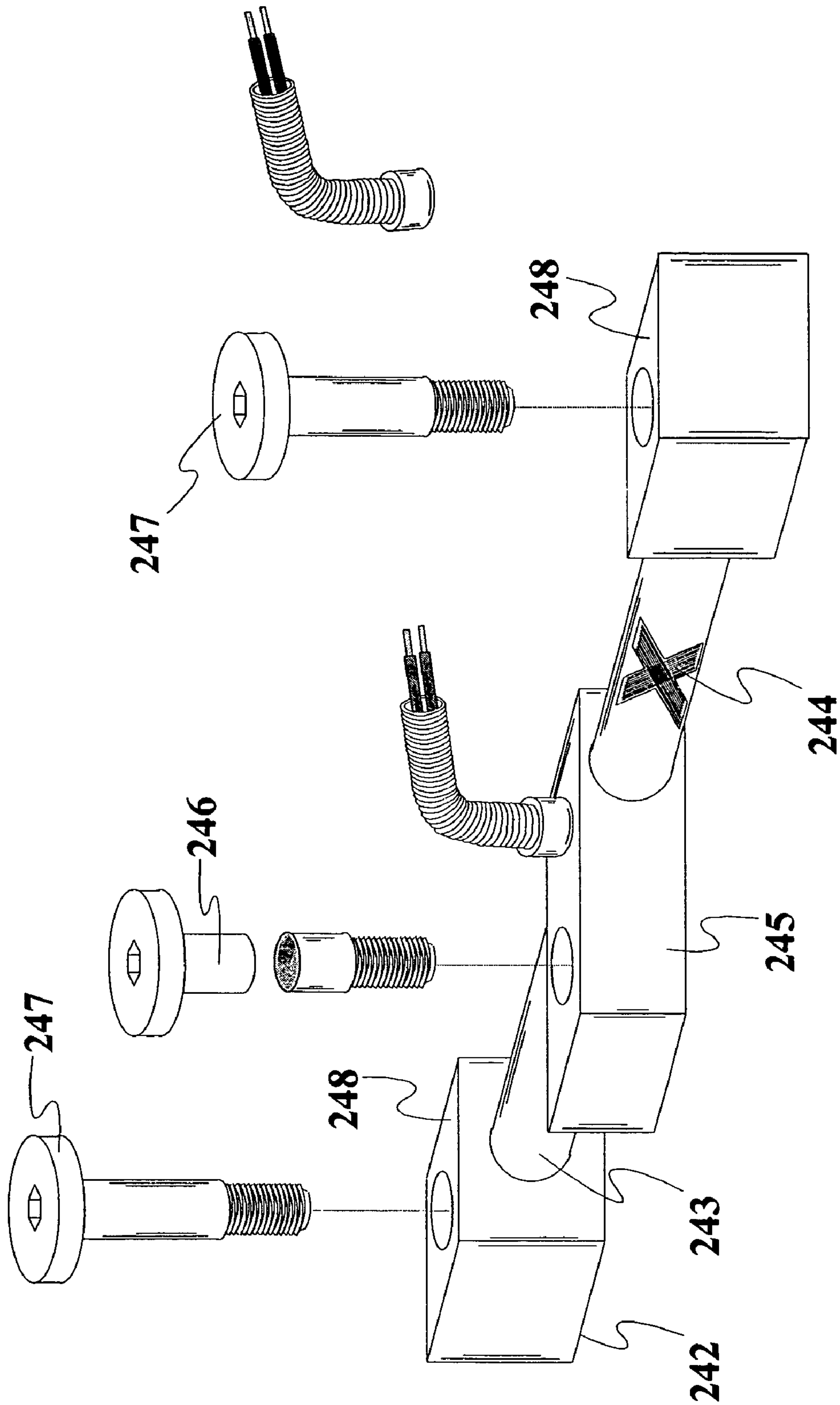
FIG. 47E is a perspective view of a torsional beam load cell for use with the weight measurement apparatus in accordance with the invention as an alternate to the cantilevered load cell of FIG. 47A.

Another alternate load cell design shown generally in FIG. 47E as 242 makes use of a torsion bar 243 and appropriately placed torsional strain sensing elements 244. A torque is imparted to the bar 243 by means of lever 245 and bolt 246 which attaches to the seat structure not shown. Bolts 247 attach the mounting blocks 248 at ends of the torsion bar 243 to the vehicle floor-pan.

The load cells illustrated above are all preferably of the foil strain gage-type. Other types of strain gages exist which would work equally well which include wire strain gages and strain gages made from silicon. Silicon strain gages have the advantage of having a much larger gage factor and the disadvantage of greater temperature effects. For the high-volume implementation of at least one of the inventions disclosed herein, silicon strain gages have an advantage in that the electronic circuitry (signal conditioning, ADCs, etc.) can be integrated with the strain gage for a low cost package.

Other strain gage materials and load cell designs may, of course, be incorporated within the teachings of at least one of the inventions disclosed herein. In particular, a surface acoustical wave (SAW) strain gage can be used in place of conventional wire, foil or silicon strain gages and the strain measured either wirelessly or by a wire connection. For SAW strain gages, the electronic signal conditioning can be associated directly with the gage or remotely in an electronic control module as desired. For SAW strain gages, the problems discussed above with low signal levels requiring bridge structures and the methods for temperature compensation may not apply. Generally, SAW strain gages are more accurate that other technologies but may require a separate sensor to measure the temperature for temperature compensation depending on the material used. Materials that can be considered for SAW strain gages are quartz, lithium niobate, lead zirconate, lead titanate, zinc oxide, polyvinylidene fluoride and other piezoelectric materials.

Many seat designs have four attachment points for the seat structure to attach to the vehicle. Since the plane of attachment is determined by three points, the potential exists for a significant uncertainty or error to be introduced. This problem can be compounded by the method of attachment of the seat to the vehicle. Some attachment methods using bolts, for example, can introduce significant strain in the seat supporting structure. Some compliance therefore should be introduced into the seat structure to reduce these attachment-induced stresses to a minimum. Too much compliance, on the other hand, can significantly weaken the seat structure and thereby potentially cause a safety issue. This problem can be solved by rendering the compliance section of the seat structure highly nonlinear or significantly limiting the range of the compliance. One of the support members, for example, can be attached to the top of the seat structure through the use of the pinned joint wherein the angular rotation of the joint is severely limited. Methods will now be obvious to those skilled in the art to eliminate the attachment-induced stress and strain in the structure which can cause inaccuracies in the strain measuring system.

In the examples illustrated above, strain measuring elements have been shown at each of the support members. This of course is necessary if an accurate measurement of the weight of the occupying item of the seat is to be determined. For this case, typically a single value is inputted into the neural network representing weight. Experiments have shown, however, for the four strain gage transducer system, that most of the weight and thus most of the strain occurs in the strain elements mounted on the rear seat support structural members. In fact, about 85 percent of the load is typically carried by the rear supports. Little accuracy is lost therefore if the forward strain measuring elements are eliminated. Similarly, for most cases, the two rear-mounted support strain elements measure approximately the same strain. Thus, the information represented by the strain in one rear seat support is sufficient to provide a reasonably accurate measurement of the weight of the occupying item of the seat. Thus, at least one of the inventions disclosed herein can be implemented using one or more load cells or strain gages. As disclosed elsewhere herein, other sensors, such as occupant position sensors based on spatial monitoring technologies, can be used in conjunction with one or more load cells or other pressure or weight sensors to augment and improve the accuracy of the system. A simple position sensor mounted in the seat back or headrest, for example, as illustrated at 354-365 in FIGS. 42, 48, 49 and 126 can be used.

If a system consisting of eight transducers is considered, four ultrasonic transducers and four weight transducers, and if cost considerations require the choice of a smaller total number of transducers, it is a question of which of the eight transducers should be eliminated. Fortunately, the neural network technology provides a technique for determining which of the eight transducers is most important, which is next most important, etc. If the six most critical transducers are chosen, that is the six transducers which contain the most useful information as determined by the neural network, a neural network can be trained using data from those six transducers and the overall accuracy of the system can be determined. Experience has determined, for example, that typically there is almost no loss in accuracy by eliminating two of the eight transducers, that is two of the strain gage weight sensors. A slight loss of accuracy occurs when one of the ultrasonic transducers is then eliminated.

This same technique can be used with the additional transducers described above. A transducer space can be determined with perhaps twenty different transducers comprised of ultrasonic, optical, electromagnetic, motion, heartbeat, weight, seat track, seatbelt payout, seatback angle etc. transducers. The neural network can then be used in conjunction with a cost function to determine the cost of system accuracy. In this manner, the optimum combination of any system cost and accuracy level can be determined.

In many situations where the four strain measuring weight sensors are applied to the vehicle seat structure, the distribution of the weight among the four strain gage sensors, for example, will vary significantly depending on the position of the seat in the vehicle, and particularly the fore and aft location, and secondarily, the seatback angle position. A significant improvement to the accuracy of the strain gage weight sensors, particularly if less than four such sensors are used, can result by using information from a seat track position and/or a seatback angle sensor. In many vehicles, such sensors already exist and therefore the incorporation of this information results in little additional cost to the system and results in significant improvements in the accuracy of the weight sensors.

There have been attempts to use seat weight sensors to determine the load distribution of the occupying item and thereby reach a conclusion about the state of seat occupancy. For example, if a forward facing human is out of position, the weight distribution on the seat will be different than if the occupant is in position. Similarly, a rear facing child seat will have a different weight distribution than a forward facing child seat. This information is useful for determining the seated state of the occupying item under static or slowly changing conditions. For example, even when the vehicle is traveling on moderately rough roads, a long term averaging or filtering technique can be used to determine the total weight and weight distribution of the occupying item. Thus, this information can be useful in differentiating between a forward facing and rear facing child seat.

It is much less useful however for the case of a forward facing human or forward facing child seat that becomes out of position during a crash. Panic braking prior to a crash, particularly on a rough road surface, will cause dramatic fluctuations in the output of the strain sensing elements. Filtering algorithms, which require a significant time slice of data, will also not be particularly useful. A neural network or other pattern recognition system, however, can be trained to recognize such situations and provide useful information to improve system accuracy.

Other dynamical techniques can also provide useful information especially if combined with data from the vehicle crash accelerometer. By studying the average weight over a few cycles, as measured by each transducer independently, a determination can be made that the weight distribution is changing. Depending on the magnitude of the change, a determination can be made as to whether the occupant is being restrained by a seatbelt. If a seatbelt restraint is not being used, the output from the crash accelerometer can be used to accurately project the position of the occupant during pre-crash braking and eventually the impact itself providing his or her initial position is known.

In this manner, a weight sensor with provides weight distribution information can provide useful information to improve the accuracy of the occupant position sensing system for dynamic out of position determination. Even without the weight sensor information, the use of the vehicle crash sensor data in conjunction with any means of determining the belted state of the occupant will dramatically improve the dynamic determination of the position of a vehicle occupant. The use of the dynamics of the occupant to measure weight dynamically is disclosed in the current assignee's U.S. patent application Ser. No. 10/174,803 filed Jun. 19, 2002.

Strain gage weight sensors can also be mounted in other locations such as within a cavity within a seat cushion as shown as 97 in FIG. 6A and described above. The strain gage can be mounted on a flexible diaphragm that flexes and thereby strains the strain gage as the seat is loaded. In the example of FIG. 6A, a single chamber 98, diaphragm and strain gage 97 is illustrated. A plurality of such chambers can be used to provide a distribution of the load on the occupying item onto the seat.

There are several applications for weight or load measuring devices in a vehicle including the vehicle suspension system and seat weight sensors for use with automobile safety systems. As reported in U.S. Pat. Nos. 4,096,740, 4,623,813, 5,585,571, 5,663,531, 5,821,425 and 5,910,647 and International Publication No. WO 00/65320(A1), SAW devices are appropriate candidates for such weight measurement systems. In this case, the surface acoustic wave on the lithium niobate, or other piezoelectric material, is modified in delay time, resonant frequency, amplitude and/or phase based on strain of the member upon which the SAW device is mounted. For example, the conventional bolt that is typically used to connect the passenger seat to the seat adjustment slide mechanism can be replaced with a stud which is threaded on both ends. A SAW strain device is mounted to the center unthreaded section of the stud and the stud is attached to both the seat and the slide mechanism using appropriate threaded nuts. Based on the particular geometry of the SAW device used, the stud can result in as little as a 3 mm upward displacement of the seat compared to a normal bolt mounting system. No wires are required to attach the SAW device to the stud. The interrogator transmits a radio frequency pulse at, for example, 925 MHz, that excites antenna on the SAW strain measuring system. After a delay caused by the time required for the wave to travel the length of the SAW device, a modified wave is re-transmitted to the interrogator providing an indication of the strain of the stud with the weight of an object occupying the seat corresponding to the strain. For a seat that is normally bolted to the slide mechanism with four bolts, at least four SAW strain sensors would be used. Since the individual SAW devices can be small, multiple devices can be placed on a stud to provide multiple redundant measurements, or permit bending strains to be determined, and/or to permit the stud to be arbitrarily located with at least one SAW device always within direct view of the interrogator antenna. In some cases, the bolt or stud will be made on non-conductive material to limit the blockage of the RF signal. In other cases, it will be insulated from the slide (mechanism) and used as an antenna.

If two longitudinally spaced apart antennas are used to receive the SAW transmissions from the seat weight sensors, one antenna in front of the seat and the other behind the seat, then the position of the seat can be determined eliminating the need for current seat position sensors. A similar system can be used for other seat and seatback position measurements.

For strain gage weight sensing, the frequency of interrogation would be considerably higher than that of the tire monitor, for example. However, if the seat is unoccupied, then the frequency of interrogation can be substantially reduced. For an occupied seat, information as to the identity and/or category and position of an occupying item of the seat can be obtained through the multiple weight sensors described. For this reason, and due to the fact that during the pre-crash event, the position of an occupying item of the seat may be changing rapidly, interrogations as frequently as once every 10 milliseconds or faster can be desirable. This would also enable a distribution of the weight being applied to the seat to be obtained which provides an estimation of the position of the object occupying the seat. Using pattern recognition technology, e.g., a trained neural network, sensor fusion, fuzzy logic, etc., the identification of the object can be ascertained based on the determined weight and/or determined weight distribution.

There are many other methods by which SAW devices can be used to determine the weight and/or weight distribution of an occupying item other than the methods described above and all such uses of SAW strain sensors for determining the weight and weight distribution of an occupant are contemplated. For example, SAW devices with appropriate straps can be used to measure the deflection of the seat cushion top or bottom caused by an occupying item, or if placed on the seat belts, the load on the belts can determined wirelessly and powerlessly. Geometries similar to those disclosed in U.S. Pat. No. 6,242,701 (which discloses multiple strain gage geometries) using SAW strain-measuring devices can also be constructed, e.g., any of the multiple strain gage geometries shown therein.

Although a preferred method for using the invention is to interrogate each of the SAW devices using wireless means, in some cases it may be desirable to supply power to and/or obtain information from one or more of the devices using wires. As such, the wires would be an optional feature.

One advantage of the weight sensors of at least one of the inventions disclosed herein along with the geometries disclosed in the '701 patent and herein below, is that in addition to the axial stress in the seat support, the bending moments in the structure can be readily determined. For example, if a seat is supported by four "legs", it is possible to determine the state of stress, assuming that axial twisting can be ignored, using four strain gages on each leg support for a total of sixteen such gages. If the seat is supported by three legs, then this can be reduced to twelve. Naturally, a three-legged support is preferable than four since with four, the seat support is over-determined severely complicating the determination of the stress caused by an object on the seat. Even with three supports, stresses can be introduced depending on the nature of the support at the seat rails or other floor-mounted supporting structure. If simple supports are used that do not introduce bending moments into the structure, then the number of gages per seat can be reduced to three providing a good model of the seat structure is available. Unfortunately, this is usually not the case and most seats have four supports and the attachments to the vehicle not only introduce bending moments into the structure but these moments vary from one position to another and with temperature. The SAW strain gages of at least one of the inventions disclosed herein lend themselves to the placement of multiple gages onto each support as needed to approximately determine the state of stress and thus the weight of the occupant depending on the particular vehicle application. Furthermore, the wireless nature of these gages greatly simplifies the placement of such gages at those locations that are most appropriate.

One additional point should be mentioned. In many cases, the determination of the weight of an occupant from the static strain gage readings yields inaccurate results due to the indeterminate stress state in the support structure. However, the dynamic stresses to a first order are independent of the residual stress state. Thus, the change in stress that occurs as a vehicle travels down a roadway caused by dips in the roadway can provide an accurate measurement of the weight of an object in a seat. This is especially true if an accelerometer is used to measure the vertical excitation provided to the seat.

Figure 149A:
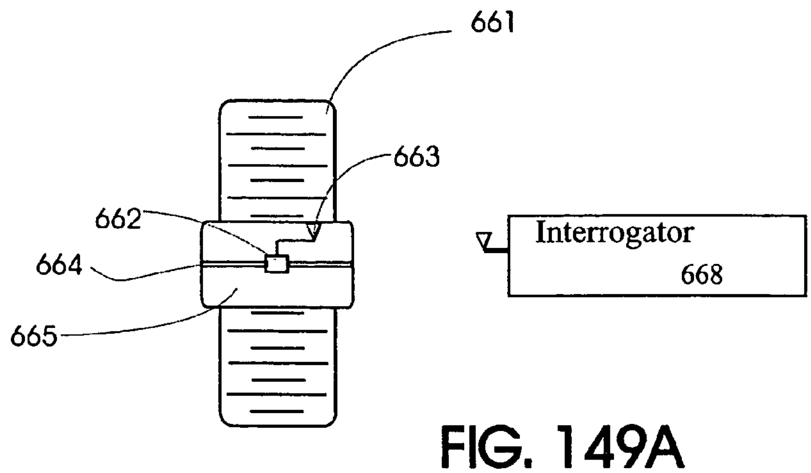

A stud which is threaded on both ends and which can be used to measure the weight of an occupant seat is illustrated in FIGS. 149A-149E. The operation of this device is disclosed in U.S. Pat. No. 6,653,577, wherein the center section of stud 661 is solid. It has been discovered that sensitivity of the device can be significantly improved if a slotted member is used as described in U.S. Pat. No. 5,539,236. FIG. 149A illustrates a SAW strain gage 662 mounted on a substrate and attached to span a slot 664 in a center section 665 of the stud 661. This technique can be used with any other strain-measuring device.

Figure 149B:
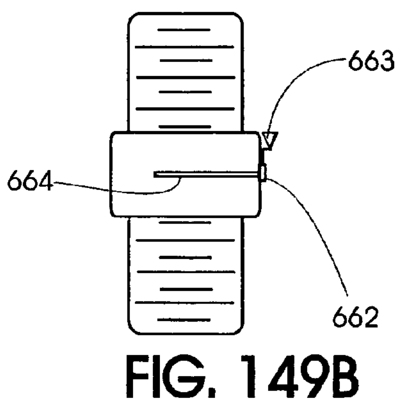

FIG. 149B is a side view of the device of FIG. 149A.

Figure 149C:
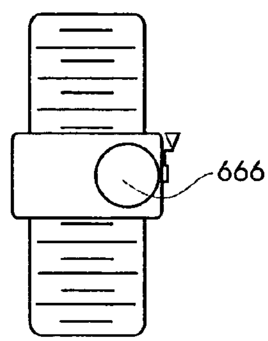

FIG. 149C illustrates use of a single hole 666 drilled off-center in the center section 665 of the stud 661. A single hole 666 also serves to magnify the strain as sensed by the strain gage 662. It has the advantage in that strain gage 662 does not need to span an open space. The amount of magnification obtained from this design, however, is significantly less than obtained with the design of FIG. 149A.

Figure 149D:
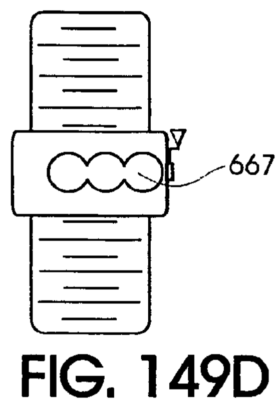
Figure 149E:
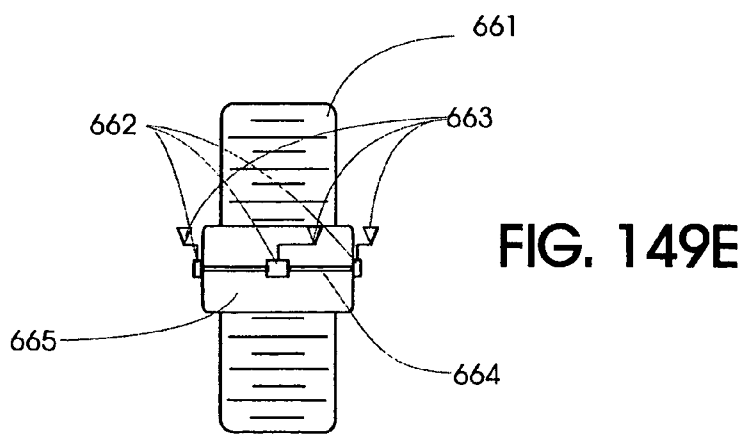

To improve the sensitivity of the device shown in FIG. 149C, multiple smaller holes 667 can be used as illustrated in FIG. 149D. FIG. 149E in an alternate configuration showing four gages for determining the bending moments as well as the axial stress in the support member.

In operation, the SAW strain gage 662 receives radio frequency waves from an interrogator 668 and returns electromagnetic waves via a respective antenna 663 which are delayed based on the strain sensed by strain gage 662.

6.2 Bladder Weight Sensors

One embodiment of a weight sensor and method for determining the weight of an occupant of a seat, which may be used in the methods and apparatus for adjusting a vehicle component and identifying an occupant of a seat, comprises a bladder having at least one chamber adapted to be arranged in a seat portion of the seat, and at least one transducer for measuring the pressure in a respective chamber. The bladder may comprise a plurality of chambers, each adapted to be arranged at a different location in the seat portion of the seat. Thus, it is possible to determine the weight distribution of the occupant using this weight sensor with several transducers whereby each transducer is associated with one chamber and the weight distribution of the occupant is obtained from the pressure measurements of the transducers. The position of the occupant and the center of gravity of the occupant can also be determined by one skilled in the art based on the weight distribution.

Figure 48:
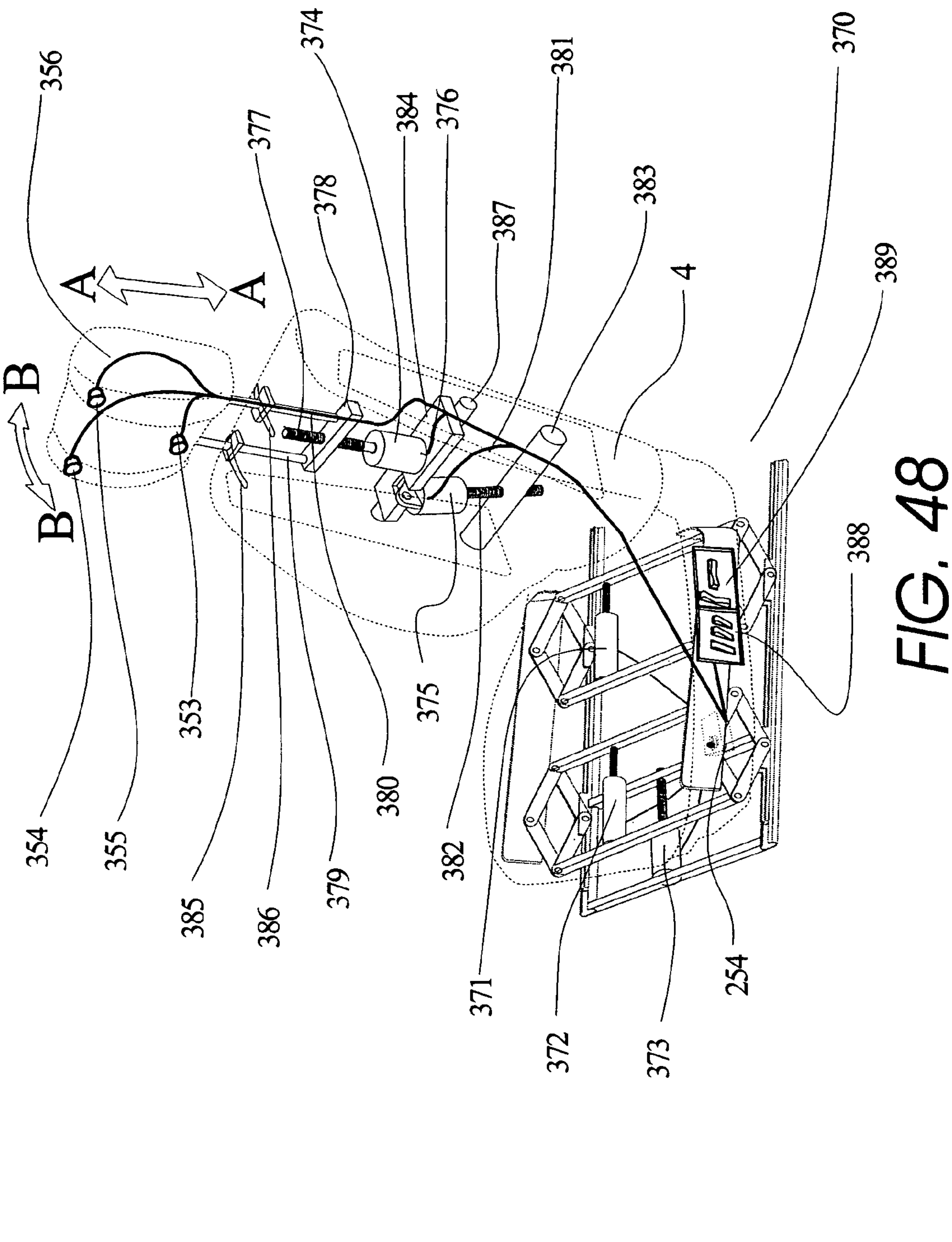
FIG. 48 is a perspective view of an automatic seat adjustment system, with the seat shown in phantom, with a movable headrest and sensors for measuring the height of the occupant from the vehicle seat showing motors for moving the seat and a control circuit connected to the sensors and motors.

With knowledge of the weight of an occupant, additional improvements can be made to automobile and truck seat designs. In particular, the stiffness of the seat can be adjusted so as to provide the same level of comfort for light and for heavy occupants. The damping of occupant motions, which previously has been largely neglected, can also be readily adjusted as shown on FIG. 49 which is a view of the seat of FIG. 48 showing one of several possible arrangements for changing the stiffness and the damping of the seat. In the seat bottom 250, there is a container 251, the conventional foam and spring design has been replaced by an inflated rectangular container very much like an air mattress which contains a cylindrical inner container 252 which is filled with an open cell urethane foam, for example, or other means which constrain the flow of air therein. An adjustable orifice 253 connects the two containers both of which can be bladders 251, 252 so that air, or other fluid, can flow in a controlled manner therebetween. The amount of opening of orifice 253 is controlled by control circuit 254. A small air compressor, or fluid pump, 255 controls the pressure in container 251 under control of the control circuit 254. A pressure transducer 256 monitors the pressure within container 251 and inputs this information into control circuit 254.

The operation of the system is as follows. When an occupant sits on the seat, pressure initially builds up in the seat container or bladder 251 which gives an accurate measurement of the weight of the occupant. Control circuit 254, using an algorithm and a microprocessor, then determines an appropriate stiffness for the seat and adds pressure to achieve that stiffness. The pressure equalizes between the two containers 251 and 252 through the flow of fluid through orifice 253. Control circuit 254 also determines an appropriate damping for the occupant and adjusts the orifice 253 to achieve that damping. As the vehicle travels down the road and the road roughness causes the seat to move up and down, the inertial force on the seat by the occupant causes the fluid pressure to rise and fall in container 252 and also, but, much less so, in container 251 since the occupant sits mainly above container 252 and container 251 is much larger than container 252. The major deflection in the seat takes place first in container 252 which pressurizes and transfers fluid to container 251 through orifice 253. The size of the orifice opening determines the flow rate between the two containers 251, 252 and therefore the damping of the motion of the occupant. Since this opening is controlled by control circuit 254, the amount of damping can thereby also be controlled. Thus, in this simple structure, both the stiffness and damping can be controlled to optimize the seat for a particular driver. Naturally, if the driver does not like the settings made by control circuit 254, he or she can change them to provide a stiffer or softer ride. When fluid is used above, it can mean a gas, liquid, gel or other flowable medium.

The stiffness of a seat is the change in force divided by the change in deflection. This is important for many reasons, one of which is that it controls the natural vibration frequency of the seat occupant combination. It is important that this be different from the frequency of vibrations which are transmitted to the seat from the vehicle in order to minimize the up and down motions of the occupant. The damping is a force which opposes the motion of the occupant and which is dependent on the velocity of relative motion between the occupant and the seat bottom. It thus removes energy and minimizes the oscillatory motion of the occupant. These factors are especially important in trucks where the vibratory motions of the driver's seat, and thus the driver, have caused many serious back injuries among truck drivers.

Figure 49:
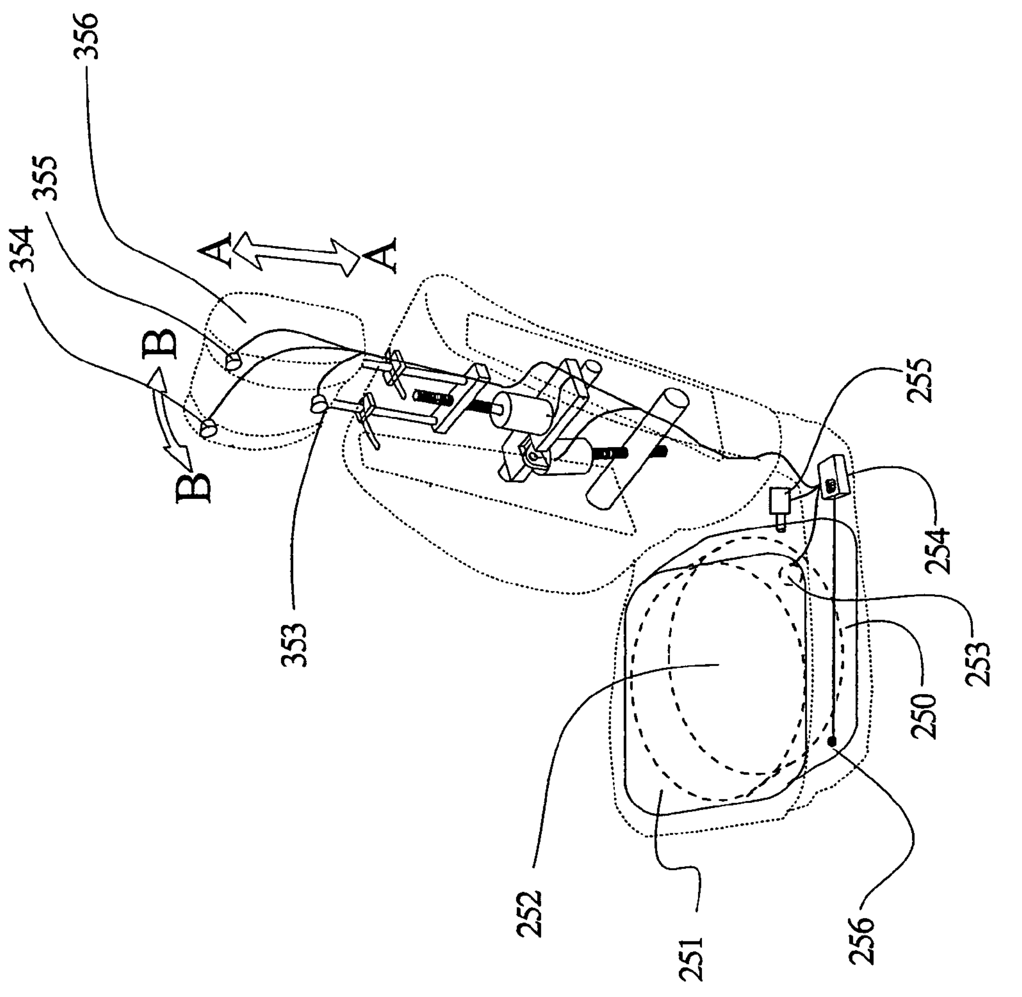
FIG. 49 is a view of the seat of FIG. 48 showing a system for changing the stiffness and the damping of the seat.
Figure 49A:
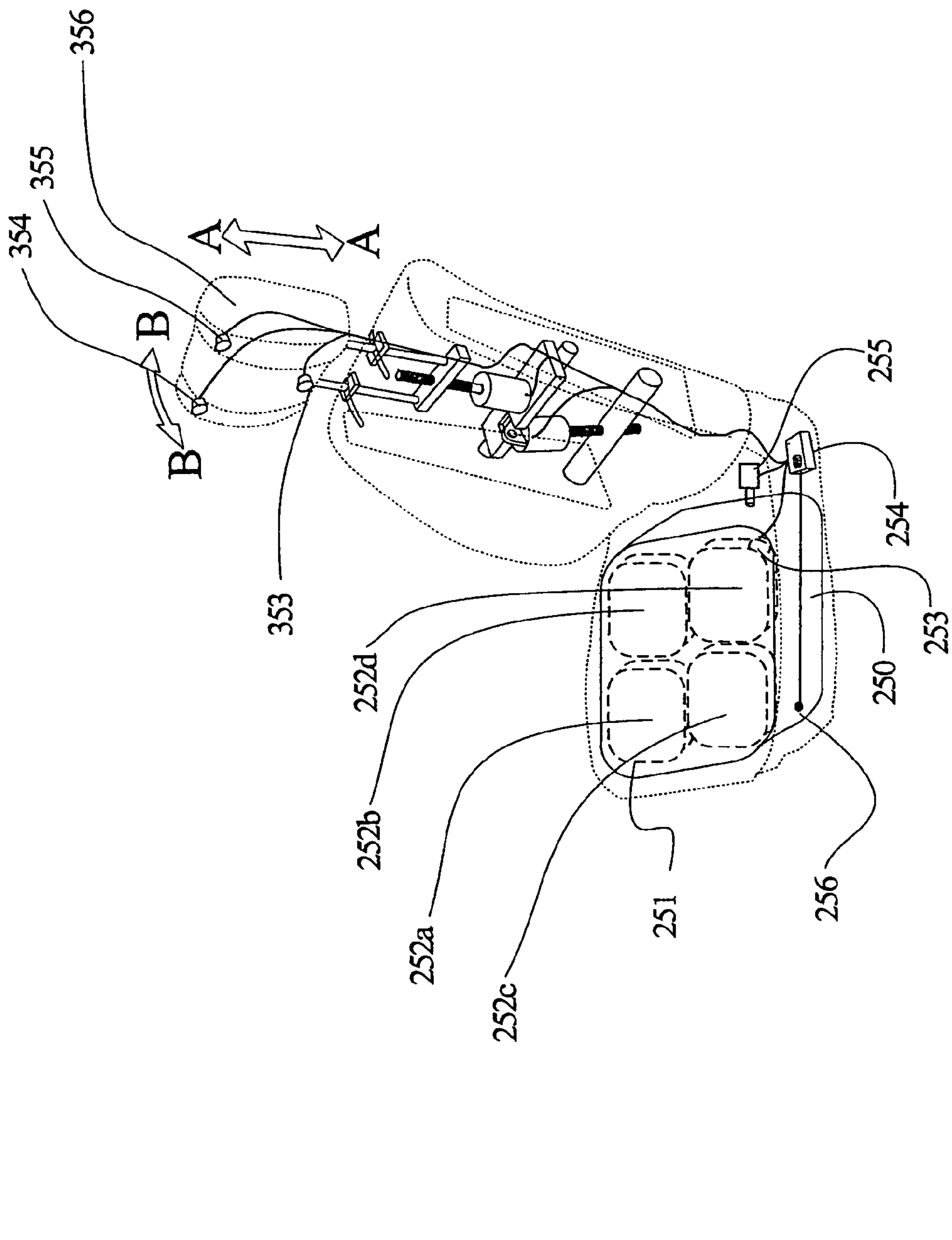
FIG. 49A is a view of the seat of FIG. 48 wherein the bladder contains a plurality of chambers.

In FIG. 49, the airbag or bladder 241 which interacts with the occupant is shown with a single chamber. Naturally, bladder 241 can be composed of multiple chambers 241*a*, 241*b*, 241*c*, and 241*d* as shown in FIG. 49A. The use of multiple chambers permits the weight distribution of the occupant to be determined if a separate pressure transducer is used in each cell of the bladder, or if a single gage is switched from chamber to chamber. Such a scheme gives the opportunity of determining to some extent the position of the occupant on the seat or at least the position of the center of gravity of the occupant. Naturally, more than four chambers can be used.

Any one of a number of known pressure measuring sensors can be used with the bladder weight sensor disclosed herein. One particular technology that has been developed for measuring the pressure in a rotating tire uses surface acoustic wave (SAW) technology and has the advantage that the sensor is wireless and powerless. Thus, the sensor does not need a battery nor is it required to run wires from the sensor to control circuitry. An interrogator is provided that transmits an RF signal to the sensor and receives a return signal that contains the temperature and pressure of the fluid within the bladder. The interrogator can be the same one that is used for tire pressure monitoring thus making this SAW system very inexpensive to implement and easily expandable to several seats within the vehicle. The switches that control the seat can also now be made wireless using SAW technology and thus they can be placed at any convenient location such as the vehicle door-mounted armrest without requiring wires to connect the switch to the seat motors. Other uses of SAW technology are discussed in the current assignee's U.S. Pat. No. 6,662,642. Although a SAW device has been described above, an equivalent system can be constructed using RFID type technology where the interrogator transmits sufficient RF energy to power the RFID circuit. This generally requires that the interrogator antenna be closer to the device antenna than in the case of SAW devices but the interrogator circuitry is generally simpler and thus less expensive. Also energy harvesting can also be used to provide energy to run the RFID circuit or to boost the SAW circuit.

In the description above, the air is the preferred use as the fluid to fill the bladder 241. In some cases, especially where damping and natural frequency control is not needed, another fluid such as a liquid or jell could be used to fill the bladder 241. In addition to silicone, candidate liquids include ethylene glycol or other low freezing point liquids.

In an apparatus for adjusting the stiffness of a seat in a vehicle, at least two containers are arranged in or near a bottom portion of the seat, the first container substantially supports the load of a seat occupant and the second container is relatively unaffected by this load. The two containers are in flow communication with each other through a variable flow passage. Insertion means, e.g., an air compressor or fluid pump, are provided for directing a medium into one of the container and monitoring means, e.g., a pressure transducer, measuring the pressure in one or both containers. A control circuit is coupled to the medium insertion means and the monitoring means for regulating flow of medium into the first container via the medium insertion means until the pressure in the first container as measured by the monitoring means is indicative of a desired stiffness for the seat. The control circuit may also be arranged to adjust the flow passage to thereby control flow of medium between the two containers and thus damping the motion of on object on the seat. The flow passage may be an orifice in a peripheral wall of the inner container.

A method for adjusting the stiffness of a seat in a vehicle comprises the steps of arranging a first container in a bottom portion of the seat and subjected to the load on the seat, arranging a second container in a position where it is relatively unaffected by the load on the seat, coupling interior volumes of the two containers through a variable flow passage, measuring the pressure in the first container, and introducing medium into the first container until the measured pressure in the first container is indicative of a desired stiffness for the seat.

6.3 Dynamic Weight Sensing

The combination of the outputs from these accelerometer sensors and the output of strain gage weight sensors in a vehicle seat, or in or on a support structure of the seat, can be used to make an accurate assessment of the occupancy of the seat and differentiate between animate and inanimate occupants as well as determining where in the seat the occupants are sitting and the state of the use of the seatbelt. This can be done by observing the acceleration signals from the sensors of FIG. 141 and simultaneously the dynamic strain gage measurements from seat-mounted strain gages. The accelerometers provide the input function to the seat and the strain gages measure the reaction of the occupying item to the vehicle acceleration and thereby provide a method of determining dynamically the mass of the occupying item and its location. This is particularly important during occupant position sensing during a crash event. By combining the outputs of the accelerometers and the strain gages and appropriately processing the same, the mass and weight of an object occupying the seat can be determined as well as the gross motion of such an object so that an assessment can be made as to whether the object is a life form such as a human being.

Several ways to process the acceleration signal and the stain or pressure signal are discussed herein with reference to FIG. 167. In general, the dynamic load applied to the seat is measured or a forcing function of the seat is measured, as a function of the acceleration signal. This represents the effect of the movement of the vehicle on the occupant which is reflected in the measurement of weight by the strain or pressure gages. Thus, the measurement obtained by the strain or pressure gages can be considered to have two components, one component resulting from the weight applied by the occupant in a stationary state of the vehicle and the other arising or resulting from the movement of the vehicle. The vehicle-movement component can be separated from the total strain or pressure gage measurement to provide a more accurate indication of the weight of the occupant.

For this embodiment, sensor 589 represents one or more strain gage weight sensors mounted on the seat or in connection with the seat or its support structure. Suitable mounting locations and forms of weight sensors are discussed in the current assignee's U.S. Pat. No. 6,242,701 and contemplated for use herein as well. The mass or weight of the occupying item of the seat (or pressure applied by the occupying item to the seat) can thus be measured based on the dynamic measurement of the strain gages with optional consideration of the measurements of accelerometers on the vehicle, which are represented by any of sensors 582-588.

Also disclosed herein is an arrangement for determining weight of an occupying item in a seat which comprises at least one weight sensor arranged to obtain a measurement of the force applied to the seat, a forcing function determination arrangement for measuring a forcing function of the seat and a processor coupled to the weight sensor(s) and forcing function determination arrangement for receiving the measurement of the force applied to the weight sensor(s) and the measurement of the forcing function from the forcing function measurement system and determining the weight of the occupying item based thereon. The forcing function determination arrangement may comprise at least one accelerometer, for example, a vertical accelerometer. The forcing function determination arrangement may be arranged to measure effects on the seat caused by load of a seatbelt associated with the seat whereby the forcing function is dependent on the load caused by the seatbelt. Also, the forcing function determination arrangement can measure effects on the seat of road roughness, steering maneuvers, and a vehicle suspension system whereby the forcing function is dependent on the road roughness, steering maneuvers and the vehicle suspension system. The weight sensors may be of various, different types including a bladder having at least one chamber and at least one transducer for measuring the pressure in a respective chamber. The processor can be designed or programmed to determine whether the occupying item is belted by analyzing the measurements from the weight sensor(s) over time and the forcing function of the seat from the forcing function determination arrangement over time. Also, the processor can be designed or programmed to differentiate between animate and inanimate objects by analyzing measurements from the weight sensor(s) over time and the forcing function of the seat from the forcing function determination arrangement over time. In addition, the processor can be designed or programmed to determine the position of the occupying item on the seat by analyzing the measurements from the weight sensor(s) over time and the forcing function of the seat from the forcing function determination arrangement over time An arrangement for classifying an occupying item in a seat in accordance with the invention comprises at least one weight sensor arranged to measure the force applied to the seat at time intervals and a processor coupled to the weight sensor(s) for receiving the force measurements therefrom. The processor analyzes the force measurements from the weight sensor(s) over time to discern patterns providing classification information about the occupying item. More particularly, the processor may be trained to discern patterns providing information about the occupying item by conducting tests in which different occupying items are placed in the seat and measurements of the force applied to the seat are obtained by the weight sensor(s), before, during and after placement of the occupying item in the seat. A forcing function determination arrangement may be provided and coupled to the processor for measuring a forcing function of the seat. The processor then considers the forcing function in the discerning of the patterns providing classification information about the occupying item. A measuring system can also be coupled to the processor for measuring dynamic forces applied to the seat. The processor would then consider the dynamic forces applied to the seat in the discerning of the patterns providing classification information about the occupying item.

A method for determining weight of an occupying item in a seat of a vehicle comprises the steps of measuring the force applied to the seat, measuring a forcing function of the seat, and determining the weight of the occupying item based on the measured force applied to the seat and the measured forcing function. The features of the arrangements described above can be used in connection with this method.

Another method for determining weight of an occupying item in a seat comprises the steps of measuring the force applied to the seat, measuring dynamic forces applied to the seat and determining the weight of the occupying item based on the measured force applied to the seat and the measured dynamic forces applied to the seat. The features of the arrangements described above can be used in connection with this method.

A method for classifying an occupying item in a seat in accordance with the invention comprises the steps of measuring the force applied to the seat at time intervals and identifying patterns indicative of a classification of particular occupying items based on the measurements of the force applied to the seat over time. Identification of such patterns may entail utilizing a pattern recognition algorithm to identify patterns from the measurements of the force applied to the seat over time. For example, the pattern recognition algorithm can be trained by conducting tests in which different occupying items are placed in the seat and measuring the force applied to the seat before, during and after placement of the occupying item in the seat. Further, a forcing function of the seat can be measured so that identification of patterns would additionally entail identifying patterns based on the measurements of the force applied to the seat and the forcing function. Also, dynamic forces applied to the seat may be measured so that identification of patterns might entail identifying patterns based on the measurements of the force applied to the seat and the measurements of the dynamic forces applied to the seat.

Another arrangement for determining weight of an occupying item in a seat comprises at least one weight sensor arranged to obtain a measurement of the force applied to the seat by the occupying item, a measuring system for measuring dynamic forces being applied to the seat and a processor coupled to the weight sensor(s) and measuring system for receiving the measurement of the force applied to the seat from the weight sensor(s) and the dynamic forces from the measuring system and determining the weight of the occupying item based thereon. The measuring system may comprise at least one accelerometer, for example, a vertical accelerometer. It also may be arranged to measure effects on the seat caused by load of a seatbelt associated with the seat and/or effects on the seat of road roughness, steering maneuvers, and a vehicle suspension system. The weight sensors may be of various, different types including a bladder having at least one chamber and at least one transducer for measuring the pressure in a respective chamber. The processor can be designed or programmed to determine whether the occupying item is belted by analyzing the measurements from by the weight sensor(s) over time and the dynamic forces applied to the seat by the measuring system over time. Also, the processor can be designed or programmed to differentiate between animate and inanimate objects by analyzing measurements from the weight sensor(s) over time and the dynamic forces applied to the seat by the measuring system over time. In addition, the processor can be designed or programmed to determine the position of the occupying item on the seat by analyzing the measurements from the weight sensor(s) over time and the dynamic forces applied to the seat by the measuring system over time 6.4 Combined Spatial and Weight A novel occupant position sensor for a vehicle, for determining the position of the occupant, comprises a weight sensor for determining the weight of an occupant of a seat as described immediately above and processor means for receiving the determined weight of the occupant from the weight sensor and determining the position of the occupant based at least in part on the determined weight of the occupant. The position of the occupant could also be determined based in part on waves received from the space above the seat, data from seat position sensors, reclining angle sensors, etc.

Although spatial sensors such as ultrasonic, electric field and optical occupant sensors can accurately identify and determine the location of an occupying item in the vehicle, a determination of the mass of the item is less accurate as it can be fooled in some cases by a thick but light winter coat, for example. Therefore, it is desirable, when the economics permit, to provide a combined system that includes both weight and spatial sensors. Such a system permits a fine tuning of the deployment time and the amount of gas in the airbag to match the position and the mass of the occupant. If this is coupled with a smart crash severity sensor, then a true smart airbag system can result, as disclosed in the current assignee's U.S. Pat. No. 6,532,408.

As disclosed in several of the current assignee's patents, referenced herein and others, the combination of a reduced number of transducers including weight and spatial can result from a pruning process starting from a larger number of sensors. For example, such a process can begin with four load cells and four ultrasonic sensors and after a pruning process, a system containing two ultrasonic sensors and one load cell can result. At least one of the inventions disclosed herein is therefore not limited to any particular number or combination of sensors and the optimum choice for a particular vehicle will depend on many factors including the specifications of the vehicle manufacturer, cost, accuracy desired, availability of mounting locations and the chosen technologies.

6.5 Face Recognition

A neural network, or other pattern recognition system, can be trained to recognize certain people as permitted operators of a vehicle or for granting access to a cargo container or truck trailer. In this case, if a non-recognized person attempts to operate the vehicle or to gain access, the system can disable the vehicle and/or sound an alarm or send a message to a remote site via telematics. Since it is unlikely that an unauthorized operator will resemble the authorized operator, the neural network system can be quite tolerant of differences in appearance of the operator. The system defaults to where a key or other identification system must be used in the case that the system doesn't recognize the operator or the owner wishes to allow another person to operate the vehicle or have access to the container. The transducers used to identify the operator can be any of the types described in detail above. A preferred method is to use optical imager-based transducers perhaps in conjunction with a weight sensor for automotive applications. This is necessary due to the small size of the features that need to be recognized for a high accuracy of recognition. An alternate system uses an infrared laser, which can be modulated to provide three-dimensional measurements, to irradiate or illuminate the operator and a CCD or CMOS device to receive the reflected image. In this case, the recognition of the operator is accomplished using a pattern recognition system such as described in Popesco, V. and Vincent, J. M. "Location of Facial Features Using a Boltzmann Machine to Implement Geometric Constraints", Chapter 14 of Lisboa, P. J. G. and Taylor, M. J. Editors, *Techniques and Applications of Neural Networks*, Ellis Horwood Publishers, New York, 1993. In the present case, a larger CCD element array containing 50,000 or more elements would typically be used instead of the 16 by 16 or 256 element CCD array used by Popesco and Vincent.

FIG. 22 shows a schematic illustration of a system for controlling operation of a vehicle based on recognition of an authorized individual in accordance with the invention. A similar system can be designed for allowing access to a truck trailer, cargo container or railroad car, for example. One or more images of the passenger compartment 260 are received at 261 and data derived therefrom at 262. Multiple image receivers may be provided at different locations. The data derivation may entail any one or more of numerous types of image processing techniques such as those described in the current assignee's U.S. Pat. No. 6,397,136 including those designed to improve the clarity of the image. A pattern recognition algorithm, e.g., a neural network, is trained in a training phase 263 to recognize authorized individuals. The training phase can be conducted upon purchase of the vehicle by the dealer or by the owner after performing certain procedures provided to the owner, e.g., entry of a security code or key or at another appropriate time and place. In the training phase for a theft prevention system, the authorized operator (s) would sit themselves in the passenger seat and optical images would be taken and processed to obtain the pattern recognition algorithm. Alternately, the training can be done away from the vehicle which would be more appropriate for cargo containers and the like.

A processor 264 is embodied with the pattern recognition algorithm thus trained to identify whether a person is the authorized individual by analysis of subsequently obtained data derived from optical images 262. The pattern recognition algorithm in processor 264 outputs an indication of whether the person in the image is an authorized individual for which the system is trained to identify. A security system 265 enables operations of the vehicle when the pattern recognition algorithm provides an indication that the person is an individual authorized to operate the vehicle and prevents operation of the vehicle when the pattern recognition algorithm does not provide an indication that the person is an individual authorized to operate the vehicle.

In some cases, the recognition system can be substantially improved if different parts of the electromagnetic spectrum are used. As taught in the book *Alien Vision* referenced above, distinctive facial markings are evident when viewed under near UV or MWIR illumination that can be used to positively identify a person. Other biometric measures can be used with, or in place of, a facial or iris image to further improve the recognition accuracy such as voice recognition (voice-print), finger or hand prints, weight, height, arm length, hand size etc.

Instead of a security system, another component in the vehicle can be affected or controlled based on the recognition of a particular individual. For example, the rear view mirror, seat, seat belt anchorage point, headrest, pedals, steering wheel, entertainment system, air-conditioning/ventilation system can be adjusted. Additionally, the door can be unlocked upon approach of an authorized person.

Figure 23:
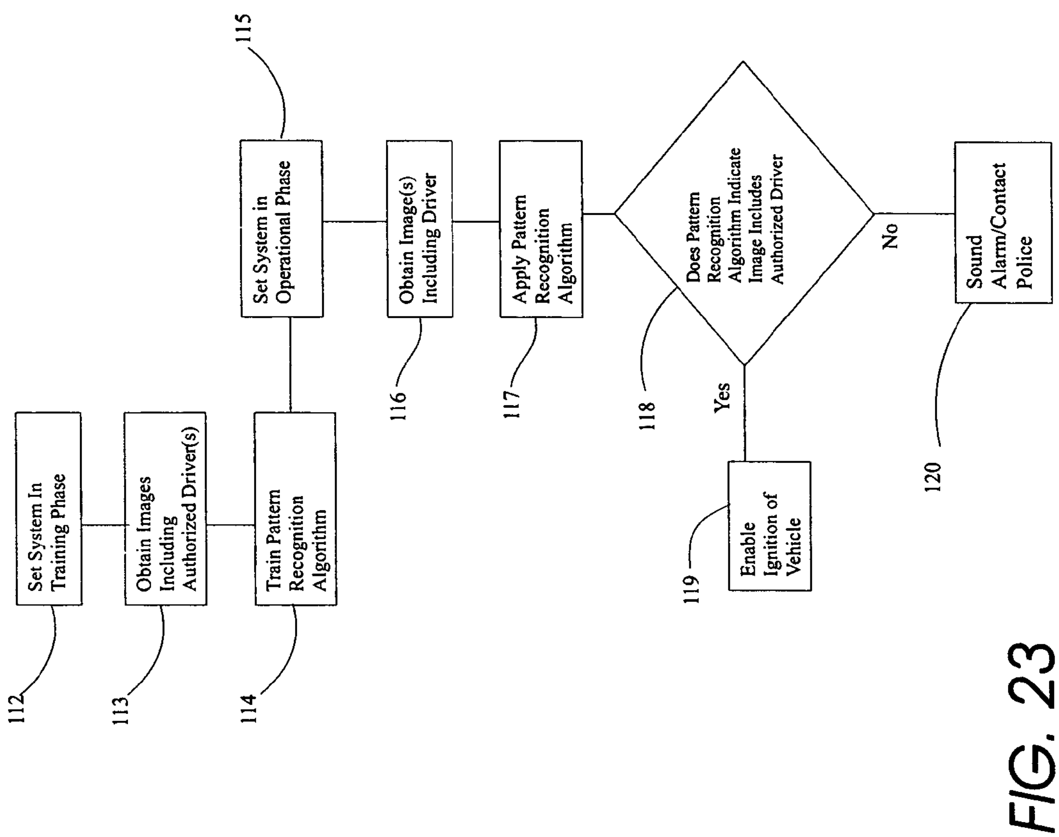
FIG. 23 is a schematic illustration of a method for controlling operation of a vehicle based on recognition of an individual.

FIG. 23 is a schematic illustration of a method for controlling operation of a vehicle based on recognition of a person as one of a set of authorized individuals. Although the method is described and shown for permitting or preventing ignition of the vehicle based on recognition of an authorized driver, it can be used to control for any vehicle component, system or subsystem based on recognition of an individual.

Initially, the system is set in a training phase 266 in which images, and other biometric measures, including the authorized individuals are obtained by means of at least one optical receiving unit 267 and a pattern recognition algorithm is trained based thereon 268, usually after application of one or more image processing techniques to the images. The authorized individual(s) occupy the passenger compartment, or some other appropriate location, and have their picture taken by the optical receiving unit to enable the formation of a database on which the pattern recognition algorithm is trained. Training can be performed by any known method in the art, although combination neural networks are preferred.

The system is then set in an operational phase 269 wherein an image is operatively obtained 270, including the driver when the system is used for a security system. If the system is used for component adjustment, then the image would include any passengers or other occupying items in the vehicle. The obtained image, or images if multiple optical receiving units are used, plus other biometric information, are input into the pattern recognition algorithm 271, preferably after some image processing, and a determination is made whether the pattern recognition algorithm indicates that the image includes an authorized driver 272. If so, ignition, or some other system, of the vehicle is enabled 273, or the vehicle may actually be started automatically. If not, an alarm is sounded and/or the police or other remote site may be contacted 274.

Once an optic-based system is present in a vehicle, other options can be enabled such as eye-tracking as a data input device or to detect drowsiness, as discussed above, and even lip reading as a data input device or to augment voice input. This is discussed, for example, Eisenberg, Anne, "Beyond Voice Recognition to a Computer That Reads Lips", New York Times, Sep. 11, 2003. Lip reading can be implemented in a vehicle through the use of IR illumination and training of a pattern recognition algorithm, such as a neural network or a combination network. This is one example of where an adaptive neural or combination network can be employed that learns as it gains experience with a particular driver. The word "radio", for example, can be associated with lip motions when the vehicle is stopped or moving slowly and then at a later time when the vehicle is traveling at high speed with considerable wind noise, the voice might be difficult for the system to understand. When augmented with lip reading, the word "radio" can be more accurately recognized. Thus, the combination of lip reading and voice recognition can work together to significantly improve accuracy.

Face recognition can of course be done in two or three dimensions and can involve the creation of a model of the person's head that can aid when illumination is poor, for example. Three dimensions are available if multiple two dimensional images are acquired as the occupant moves his or her head or through the use of a three-dimensional camera. A three-dimensional camera generally has two spaced-apart lenses plus software to combine the two views. Normally, the lenses are relatively close together but this may not need to be the case and significantly more information can be acquired if the lenses are spaced further apart and in some cases, even such that one camera has a frontal view and the other a side view, for example. Naturally, the software is complicated for such cases but the system becomes more robust and less likely to be blocked by a newspaper, for example. A scanning laser radar, PMD or similar system with a modulated beam or with range gating as described above can also be used to obtain three-dimensional information or a 3D image.

Eye tracking as disclosed in Jacob, "Eye Tracking in Advanced Interface Design", Robert J. K. Jacob, Human-Computer Interaction Lab, Naval Research Laboratory, Washington, D.C, can be used by vehicle operator to control various vehicle components such as the turn signal, lights, radio, air conditioning, telephone, Internet interactive commands, etc. much as described in U.S. patent application Ser. No. 09/645,709. The display used for the eye tracker can be a heads-up display reflected from the windshield or it can be a plastic electronics display located either in the visor or the windshield.

The eye tracker works most effectively in dim light where the driver's eyes are sufficiently open that the cornea and retina are clearly distinguishable. The direction of operator's gaze is determined by calculation of the center of pupil and the center of the iris that are found by illuminating the eye with infrared radiation. FIG. 8E illustrates a suitable arrangement for illuminating eye along the same axis as the pupil camera. The location of occupant's eyes must be first determined as described elsewhere herein before eye tracking can be implemented. In FIG. 8E, imager system 52, 54, or 56 are candidate locations for eye tracker hardware.

The technique is to shine a collimated beam of infrared light on to be operator's eyeball producing a bright corneal reflection can be bright pupil reflection. Imaging software analyzes the image to identify the large bright circle that is the pupil and a still brighter dot which is the corneal reflection and computes the center of each of these objects. The line of the gaze is determined by connecting the centers of these two reflections.

It is usually necessary only to track a single eye as both eyes tend to look at the same object. In fact, by checking that both eyes are looking at the same object, many errors caused by the occupant looking through the display onto the road or surrounding environment can be eliminated Object selection with a mouse or mouse pad, as disclosed in the '709 application cross-referenced above is accomplished by pointing at the object and depressing a button. Using eye tracking, an additional technique is available based on the length of time the operator gazes at the object. In the implementations herein, both techniques are available. In the simulated mouse case, the operator gazes at an object, such as the air conditioning control, and depresses a button on the steering wheel, for example, to select the object. Alternately, the operator merely gazes at the object for perhaps one-half second and the object is automatically selected. Both techniques can be implemented simultaneously allowing the operator to freely choose between them. The dwell time can be selectable by the operator as an additional option. Typically, the dwell times will range from about 0.1 seconds to about 1 second.

The problem of finding the eyes and tracking the head of the driver, for example, is handled in Smeraldi, F., Carmona, J. B., "Saccadic search with Garbor features applied to eye detection and real-time head tracking", Image and Vision Computing 18 (2000) 323-329, Elsevier Science B. V. The Saccadic system described is a very efficient method of locating the most distinctive part of a persons face, the eyes, and in addition to finding the eyes, a modification of the system can be used to recognize the driver. The system makes use of the motion of the subject's head to locate the head prior to doing a search for the eyes using a modified Garbor decomposition method. By comparing two consecutive frames, the head can usually be located if it is in the field of view of the camera. Although this is the preferred method, other eye location and tracking methods can also be used as reported in the literature and familiar to those skilled in the art.

6.6 Heartbeat and Health State

In addition to the use of transducers to determine the presence and location of occupants in a vehicle, other sensors can also be used. For example, as discussed above, a heartbeat sensor, which determines the number and presence of heartbeats, can also be arranged in the vehicle. Heartbeat sensors can be adapted to differentiate between a heartbeat of an adult, a heartbeat of a child and a heartbeat of an animal. As its name implies, a heartbeat sensor detects a heartbeat, and the magnitude thereof, of a human occupant of the seat or other position, if such a human occupant is present. The output of the heartbeat sensor is input to the processor of the interior monitoring system. One heartbeat sensor for use in the invention may be of the types as disclosed in McEwan in U.S. Pat. Nos. 5,573,012 and 5,766,208. The heartbeat sensor can be positioned at any convenient position relative to the seats or other appropriate location where occupancy is being monitored. A preferred automotive location is within the vehicle seatback.

This type of micropower impulse radar (MIR) sensor is not believed to have been used in an interior monitoring system in the past. It can be used to determine the motion of an occupant and thus can determine his or her heartbeat (as evidenced by motion of the chest), for example. Such an MIR sensor can also be arranged to detect motion in a particular area in which the occupant's chest would most likely be situated or could be coupled to an arrangement which determines the location of the occupant's chest and then adjusts the operational field of the MIR sensor based on the determined location of the occupant's chest. A motion sensor utilizing a micro-power impulse radar (MIR) system as disclosed, for example, in McEwan U.S. Pat. No. 5,361,070, as well as many other patents by the same inventor. Motion sensing is accomplished by monitoring a particular range from the sensor as disclosed in that patent. MIR is one form of radar that has applicability to occupant sensing and can be mounted at various locations in the vehicle. Other forms include, among others, ultra wideband (UWB) by the Time Domain Corporation and noise radar (NR) by Professor Konstantin Lukin of the National Academy of Sciences of Ukraine Institute of Radiophysics and Electronics. Radar has an advantage over ultrasonic sensors in that data can be acquired at a higher speed and thus the motion of an occupant can be more easily tracked. The ability to obtain returns over the entire occupancy range is somewhat more difficult than with ultrasound resulting in a more expensive system overall. MIR, UWB or NR have additional advantages in their lack of sensitivity to temperature variation and have a comparable resolution to about 40 kHz ultrasound. Resolution comparable to higher frequency is of course possible using millimeter waves, for example. Additionally, multiple MIR, UWB or NR sensors can be used when high-speed tracking of the motion of an occupant during a crash is required since they can be individually pulsed without interfering with each other through frequency, time or code division multiplexing or other multiplexing schemes.

Other methods have been reported for measuring heartbeat including vibrations introduced into a vehicle and variations in the electric field in the vicinitv of where an occupant might reside. All such methods are considered encompassed by the teachings of at least one of the inventions disclosed herein. The detection of a heartbeat regardless of how it is accomplished is indicative of the presence of a living being within the vehicle and such a detection as part of an occupant presence detection system is novel to at least one of the inventions disclosed herein. Similarly, any motion of an object that is not induced by the motion of the vehicle itself is indicative of the presence of a living being and thus part of the teachings herein. The sensing of occupant motion regardless of how it is accomplished when used in a system to affect another vehicle system is contemplated herein.

6.7 Other Inputs

Information can be provided as to the location of the driver, or other vehicle occupant, relative to an airbag, to appropriate circuitry which will process this information and make a decision as to whether to prevent deployment of the airbag in a situation where it would otherwise be deployed, or otherwise affect the time of deployment, rate of inflation, rate of deflation etc. One method of determining the position of the driver as discussed above is to actually measure his or her position either using electric fields, radar, optics or acoustics. An alternate approach, which is preferably used to confirm the measurements made by the systems described above, is to use information about the position of the seat and the seatbelt spool out to determine the likely location of the driver relative to the airbag. To accomplish this, the length of belt material which has been pulled out of the seatbelt retractor can be measured using conventional shaft encoder technology using either magnetic or optical systems. An example of an optical encoder is illustrated generally as 37 in FIG. 14. It consists of an encoder disk 38 and a receptor 39 which sends a signal to appropriate circuitry every time a line on the encoder disk 38 passes by the receptor 39.

Figure 15:
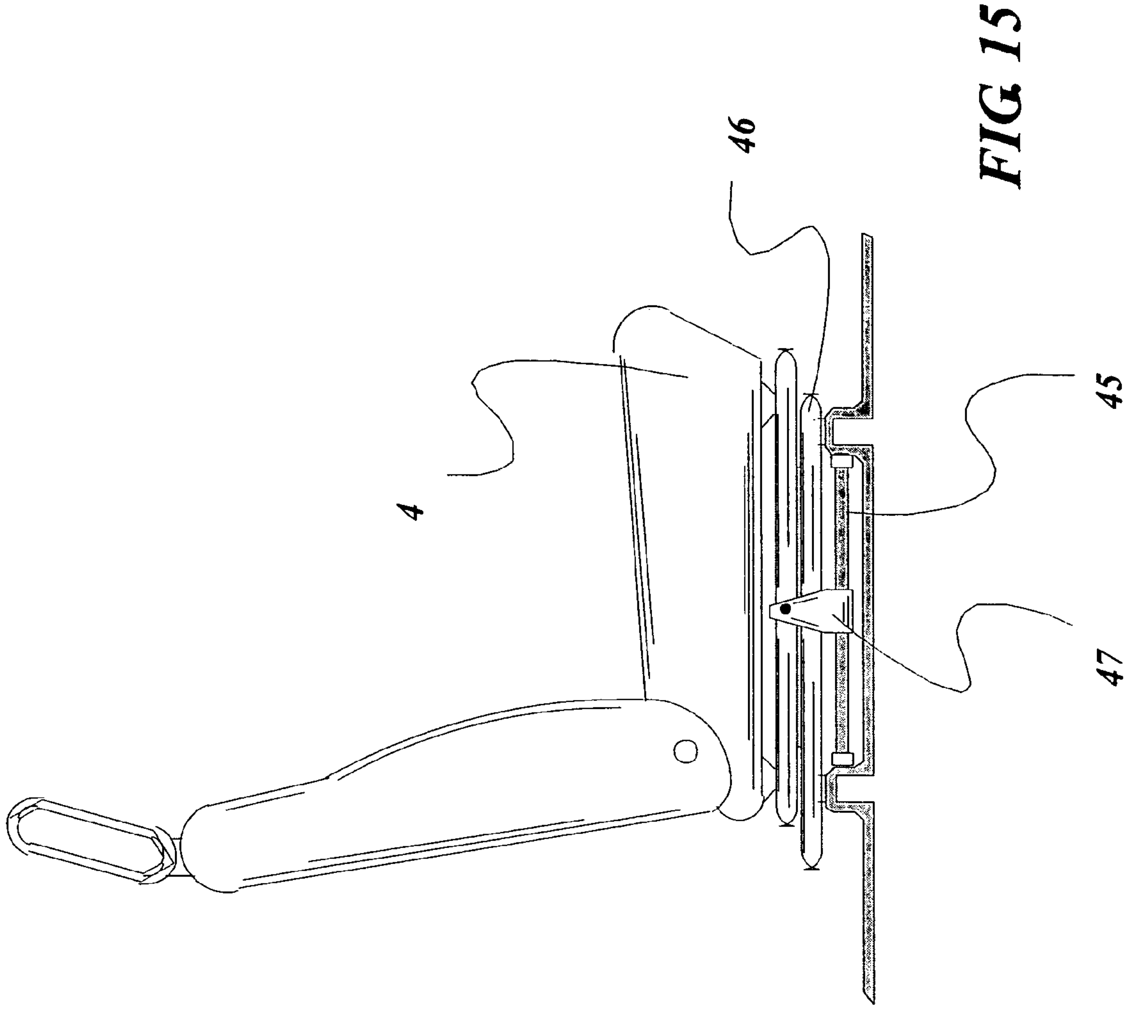
FIG. 15 is a side view of a portion of a seat and seat rail showing a seat position sensor utilizing a potentiometer.
Figure 16:
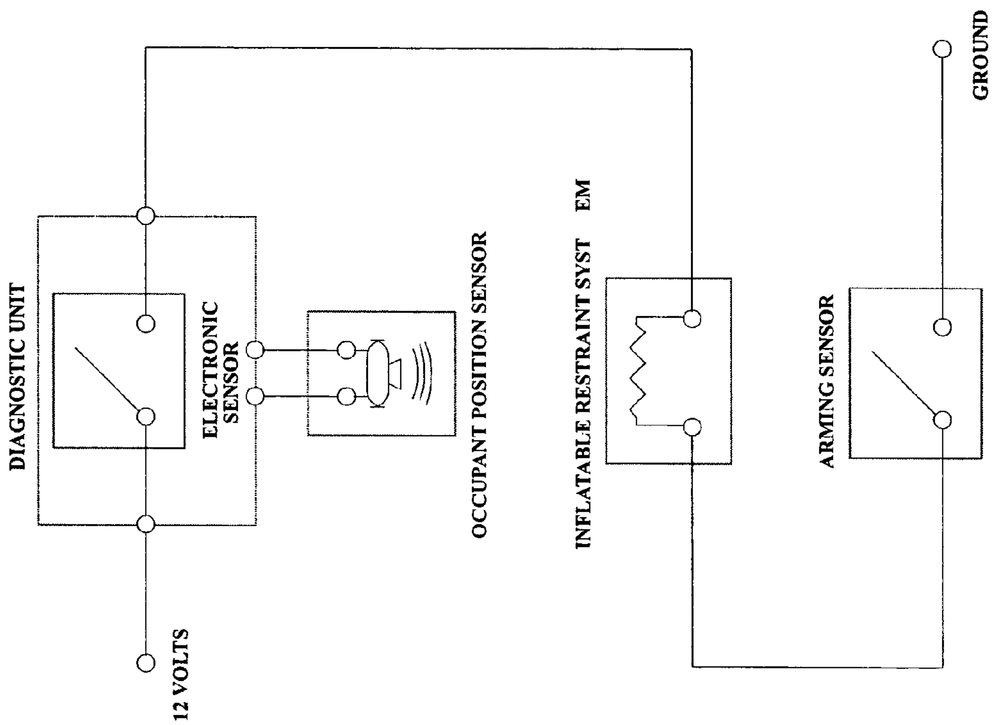
FIG. 16 is a circuit schematic illustrating the use of the occupant position sensor in conjunction with the remainder of the inflatable restraint system.

In a similar manner, the position of the seat can be determined through either a linear encoder or a potentiometer as illustrated in FIG. 15. In this case, a potentiometer 45 is positioned along the seat track 46 and a sliding brush assembly 47 can be used with appropriate circuitry to determine the fore and aft location of the seat 4. For those seats which permit the seat back angle to be adjusted, a similar measuring system would be used to determine the angle of the seat back. In this manner, the position of the seat relative to the airbag module can be determined. This information can be used in conjunction with the seatbelt spool out sensor to confirm the approximate position of the chest of the driver relative to the airbag. Of course, there are many other ways of measuring the angles and positions of the seat and its component parts.

For a simplified occupant position measuring system, a combination of seatbelt spool out sensor, seat belt buckle sensor, seat back position sensor, and seat position sensor (the "seat" in this last case meaning the seat portion) can be used either together or as a subset of such sensors to make an approximation as to the location of the driver or passenger in the vehicle. This information can be used to confirm the measurements of the electric field, ultrasonic and infrared sensors or as a stand-alone system. As a stand-alone system, it will not be as accurate as systems using ultrasonics or electromagnetics. Since a significant number of fatalities involve occupants who are not wearing seatbelts, and since accidents frequently involved significant pre-crash maneuvers and breaking that can cause at least the vehicle passenger to be thrown out of position, this system has serious failure modes. Nevertheless, sensors that measure seat position, for example, are available now and this system permits immediate introduction of a crude occupant position sensing system immediately and therefore it has great value. One such simple system, employs a seat position sensor only. For the driver, for example, if the seat is in the forwardmost position, then it makes no sense to deploy the driver airbag at full power. Instead, either a depowered deployment or no deployment would be called for in many crash situations.

For most cases, the seatbelt spool out sensor would be sufficient to give a good confirming indication of the position of the occupant's chest regardless of the position of the seat and seat back. This is because the seatbelt is usually attached to the vehicle at least at one end. In some cases, especially where the seat back angle can be adjusted, separate retractors can be used for the lap and shoulder portions of the seatbelt and the belt would not be permitted to slip through the "D-ring". The length of belt spooled out from the shoulder belt retractor then becomes a very good confirming measure of the position of the occupant's chest.

7. Illumination 7.1 Infrared Light

Many forms illumination can of course be used as discussed herein. Near infrared is a preferred source since it can be produced relatively inexpensively with LEDs and is not seen by vehicle occupants or others outside of the vehicle. The use of spatially modulated (as in structured light) and temporally modulated (as in amplitude, frequency, pulse, code, random or other such methods) permits additional information to be obtained such as a three-dimensional image as first disclosed by the current assignee in earlier patents. Infrared is also interesting since the human body naturally emits IR and this fact can be used to positively identify that there is a human occupying a vehicle seat and to determine fairly accurately the size of the occupant. This technique only works when the ambient temperature is different from body temperature, which is most of the time. In some climates, it is possible that the interior temperature of a vehicle can reach or exceed 100 degrees F., but it is unlikely to stay at that temperature for long as humans find such a temperature uncomfortable. However, it is even more unlikely that such a temperature will exist except when there is significant natural illumination in the visible part of the spectrum. Thus, a visual size determination is possible especially since it is very unlikely that such an occupant will be wearing heavy or thick clothing. Passive infrared, used of course with an imaging system, is thus a viable technique for the identification of a human occupant if used in conjunction with an optical system for high temperature situations. Even if the ambient temperature is nearly the same as body temperature, there will still be contrasts in the image which are sufficient to differentiate an occupant or his or her face from the background. Whereas a single pixel sensor, as in the prior art patents to Colorado and Mattes referenced above, could give false results, an imaging system such as a focal plane array as disclosed herein can still operate effectively.

Passive IR is also a good method of finding the eyes and other features of the occupant since hair, some hats and other obscuring items frequently do not interfere with the transmission of IR. When active IR illumination is used, the eyes are particularly easy to find due to corneal reflection and the eyes will be dilated at night when finding the eyes is most important. Even in glare situations, where the glare is coming through the windshield, passive IR is particularly useful since glass blocks most IR with wavelengths beyond 1.1 microns and thus the glare will not interfere with the imaging of the face.

Particular frequencies of active IR are especially useful for external monitoring. Except for monitoring objects close to the vehicle, most radar systems have a significant divergence angle making imaging more that a few meters from the vehicle problematic. Thus there is typically not enough information from a scene say 100 meters away to permit the monitor to obtain an image that would permit classification of sensed objects. Using radar, it is difficult to distinguish a car from a truck or a parked car at the side of the road from one on the same lane as the vehicle or from an advertising sign, for example. Normal visual imaging also will not work in bad weather situations however some frequencies of IR do penetrate fog, rain and snow sufficiently well as to permit the monitoring of the road at a significant distance and with enough resolution to permit imaging and thus classification even in the presence of rain, snow and fog.

As mentioned elsewhere herein, there are various methods of illuminating the object or occupant in the passenger compartment. A scanning point of IR can be used to overcome reflected sunlight. A structured pattern can be used to help achieve a three-dimensional representation of the vehicle contents. An image can be compared with illumination and without in an attempt to eliminate the effects on natural and uncontrollable illumination. This generally doesn't work very well since the natural illumination can overpower the IR. Thus it is usually better to develop two pattern recognition algorithms, one for IR illumination and one for natural illumination. For the natural illumination case, the entire visual and near visual spectrum can be used or some subset of it. For the case where a rolling shutter is used, the process can be speeded up substantially if one line of pixels is subtracted from the adjacent line where the illumination is turned on for every other row and off for the intervening rows. In addition to structured light, there are many other methods of obtaining a 3D image as discussed above.

7.2 Structured Light

In the applications discussed and illustrated above, the source and receiver of the electromagnetic radiation have frequently been mounted in the same package. This is not necessary and in some implementations, the illumination source will be mounted elsewhere. For example, a laser beam can be used which is directed along an axis which bisects the angle between the center of the seat volume, or other volume of interest, and two of the arrays. Such a beam may come from the A-Pillar, for example. The beam, which may be supplemental to the main illumination system, provides a point reflection from the occupying item that, in most cases, can be seen by two receivers, even if they are significantly separated from each other, making it easier to identify corresponding parts in the two images. Triangulation thereafter can precisely determination the location of the illuminated point. This point can be moved, or a pattern of points provided, to provide even more information. In another case where it is desired to track the head of the occupant, for example, several such beams can be directed at the occupant's head during pre-crash braking or even during a crash to provide the fastest information as to the location of the head of the occupant for the fastest tracking of the motion of the occupant's head. Since only a few pixels are involved, even the calculation time is minimized.

In most of the applications above, the assumption has been made that either a uniform field of light or a scanning spot of light will be provided. This need not be the case. The light that is emitted or transmitted to illuminate the object can be structured light. Structured light can take many forms starting with, for example, a rectangular or other macroscopic pattern of light and dark that can be superimposed on the light by passing it through a filter. If a similar pattern is interposed between the reflections and the camera, a sort of pseudo-interference pattern can result sometimes known as Moiré patterns. A similar effect can be achieved by polarizing transmitted light so that different parts of the object that is being illuminated are illuminated with light of different polarization. Once again, by viewing the reflections through a similarly polarized array, information can be obtained as to where the source of light came from which is illuminating a particular object. Any of the transmitter/receiver assemblies or transducers in any of the embodiments above using optics can be designed to use structured light.

Usually the source of the structured light is displaced either vertically, laterally or axially from the imager, but this need not necessarily be the case. One excellent example of the use of structured light to determine a 3D image where the source of the structured light and the imager are on the same axis is illustrated in U.S. Pat. No. 5,031,66. Here, the third dimension is obtained by measuring the degree of blur of the pattern as reflected from the object. This can be done since the focal point of the structured light is different from the camera. This is accomplished by projecting it through its own lens system and then combining the two paths through the use of a beam splitter. The use of this or any other form of structured light is within the scope of at least one of the inventions disclosed herein. There are so many methods that the details of all of them cannot be enumerated here.

One consideration when using structured light is that the source of structured light should not generally be exactly co-located with the array because in this case, the pattern projected will not change as a function of the distance between the array and the object and thus the distance between the array and the object cannot be determined, except by the out-of-focus and similar methods discussed above. Thus, it is usually necessary to provide a displacement between the array and the light source. For example, the light source can surround the array, be on top of the array or on one side of the array. The light source can also have a different virtual source, i.e., it can appear to come from behind of the array or in front of the array, a variation of the out-of-focus method discussed above.

For a laterally displaced source of structured light, the goal is to determine the direction that a particular ray of light had when it was transmitted from the source. Then, by knowing which pixels were illuminated by the reflected light ray along with the geometry of the vehicle, the distance to the point of reflection off of the object can be determined. If a particular light ray, for example, illuminates an object surface which is near to the source, then the reflection off of that surface will illuminate a pixel at a particular point on the imaging array. If the reflection of the same ray however occurs from a more distant surface, then a different pixel will be illuminated in the imaging array. In this manner, the distance from the surface of the object to the array can be determined by triangulation formulas. Similarly, if a given pixel is illuminated in the imager from a reflection of a particular ray of light from the transmitter, and knowing the direction that that ray of light was sent from the transmitter, then the distance to the object at the point of reflection can be determined. If each ray of light is individually recognizable and therefore can be correlated to the angle at which it was transmitted, a full three-dimensional image can be obtained of the object that simplifies the identification problem. This can be done with a single imager.

One particularly interesting implementation due to its low cost is to project one or more dots or other simple shapes onto the occupant from a position which is at an angle relative to the occupant such as 10 to 45 degrees from the camera location. These dots will show up as bright spots even in bright sunlight and their location on the image will permit the position of the occupant to be determined. Since the parts of the occupant are all connected with relative accuracy, the position of the occupant can now be accurately determined using only one simple camera. Additionally, the light that makes up the dots can be modulated and the distance from the dot source can then be determined if there is a receiver at the light source and appropriate circuitry such as used with a scanning range meter.

The coding of the light rays coming from the transmitter can be accomplished in many ways. One method is to polarize the light by passing the light through a filter whereby the polarization is a combination of the amount and angle of the polarization. This gives two dimensions that can therefore be used to fix the angle that the light was sent. Another method is to superimpose an analog or digital signal onto the light which could be done, for example, by using an addressable light valve, such as a liquid crystal filter, electrochromic filter, or, preferably, a garnet crystal array. Each pixel in this array would be coded such that it could be identified at the imager or other receiving device. Any of the modulation schemes could be applied such as frequency, phase, amplitude, pulse, random or code modulation.

The techniques described above can depend upon either changing the polarization or using the time, spatial or frequency domains to identify particular transmission angles with particular reflections. Spatial patterns can be imposed on the transmitted light which generally goes under the heading of structured light. The concept is that if a pattern is identifiable, then either the direction of transmitted light can be determined or, if the transmission source is co-linear with the receiver, then the pattern differentially expands or contracts relative to the field of view as it travels toward the object and then, by determining the size or focus of the received pattern, the distance to the object can be determined. In some cases, Moiré pattern techniques are utilized.

When the illumination source is not placed on the same axis as the receiving array, it is typically placed at an angle such as 45 degrees. At least two other techniques can be considered. One is to place the illumination source at 90 degrees to the imager array. In this case, only those surface elements that are closer to the receiving array than previous surfaces are illuminated. Thus, significant information can be obtained as to the profile of the object. In fact, if no object is occupying the seat, then there will be no reflections except from the seat itself. This provides a very powerful technique for determining whether the seat is occupied and where the initial surfaces of the occupying item are located. A combination of the above techniques can be used with temporally or spatially varying illumination. Taking images with the same imager but with illumination from different directions can also greatly enhance the ability to obtain three-dimensional information.

The particular radiation field of the transmitting transducer can also be important to some implementations of at least one of the inventions disclosed herein. In some techniques, the object which is occupying the seat is the only part of the vehicle which is illuminated. Extreme care is exercised in shaping the field of light such that this is true. For example, the objects are illuminated in such a way that reflections from the door panel do not occur. Ideally, if only the items which occupy the seat can be illuminated, then the problem of separating the occupant from the interior vehicle passenger compartment surfaces can be more easily accomplished. Sending illumination from both sides of the vehicle across the vehicle can accomplish this.

The above discussion has concentrated on automobile occupant sensing but the teachings, with some modifications, are applicable to monitoring of other vehicles including railroad cars, truck trailers and cargo containers.

7.3 Color and Natural Light

As discussed above, the use of multispectral imaging can be a significant aid in recognizing objects inside and outside of a vehicle. Two objects may not be separable under monochromic illumination yet be quite distinguishable when observed in color or with illumination from other parts of the electromagnetic spectrum. Also, the identification of a particular individual is enhanced using near UV radiation, for example. Even low level X-rays can be useful in identifying and locating objects in a vehicle.

7.4 Radar

Particular mention should be made of the use of radar since novel inexpensive antennas and ultra wideband radars are now readily available. A scanning radar beam can be used in this implementation and the reflected signal is received by a phase array antenna to generate an image of the occupant for input into the appropriate pattern detection circuitry. Naturally, the image is not very clear due to the longer wave lengths used and the difficulty in getting a small enough radar beam. The word circuitry as used herein includes, in addition to normal electronic circuits, a microprocessor and appropriate software.

Another preferred embodiment makes use of radio waves and a voltage-controlled oscillator (VCO). In this embodiment, the frequency of the oscillator is controlled through the use of a phase detector which adjusts the oscillator frequency so that exactly one half wave occupies the distance from the transmitter to the receiver via reflection off of the occupant. The adjusted frequency is thus inversely proportional to the distance from the transmitter to the occupant. Alternately, an FM phase discriminator can be used as known to those skilled in the art. These systems could be used in any of the locations illustrated in FIG. 5 as well as in the monitoring of other vehicle types.

In FIG. 6, a motion sensor 73 is arranged to detect motion of an occupying item on the seat 4 and the output thereof is input to the neural network 65. Motion sensors can utilize a micro-power impulse radar (MIR) system as disclosed, for example, in McEwan U.S. Pat. No. 5,361,070, as well as many other patents by the same inventor. Motion sensing is accomplished by monitoring a particular range from the sensor as disclosed in that patent. MIR is one form of radar which has applicability to occupant sensing and can be mounted, for example, at locations such as designated by reference numerals 6 and 8-10 in FIG. 7. It has an advantage over ultrasonic sensors in that data can be acquired at a higher speed and thus the motion of an occupant can be more easily tracked. The ability to obtain returns over the entire occupancy range is somewhat more difficult than with ultrasound resulting in a more expensive system overall. MIR has additional advantages over ultrasound in lack of sensitivity to temperature variation and has a comparable resolution to about 40 kHz ultrasound. Resolution comparable to higher frequency is feasible but has not been demonstrated. Additionally, multiple MIR sensors can be used when high speed tracking of the motion of an occupant during a crash is required since they can be individually pulsed without interfering with each, through time division multiplexing. MIR sensors are also particularly applicable to the monitoring of other vehicles and can be configured to provide a system that requires very low power and thus is ideal for use with battery-operated systems that require a very long life.

Sensors 126, 127, 128, 129 in FIG. 38 can also be microwave or mm wave radar sensors which transmit and receive radar waves. As such, it is possible to determine the presence of an object in the rear seat and the distance between the object and the sensors. Using multiple radar sensors, it would be possible to determine the contour of an object in the rear seat and thus using pattern recognition techniques, the classification or identification of the object. Motion of objects in the rear seat can also be determined using radar sensors. For example, if the radar sensors are directed toward a particular area and/or are provided with the ability to detect motion in a predetermined frequency range, they can be used to determine the presence of children or pets left in the vehicle, i.e., by detecting heartbeats or other body motions such as movement of the chest cavity.

7.5 Frequency or Spectrum Considerations

The maximum acoustic frequency range that is practical to use for acoustic imaging in the acoustic systems herein is about 40 to 160 kilohertz (kHz). The wavelength of a 50 kHz acoustic wave is about 0.6 cm, which is too coarse to determine the fine features of a person's face, for example. It is well understood by those skilled in the art that features that are smaller than the wavelength of the irradiating radiation cannot be distinguished. Similarly, the wavelength of common radar systems varies from about 0.9 cm (for 33 GHz K band) to 133 cm (for 225 MHz P band), which is also too coarse for person identification systems. Millimeter wave and sub-millimeter wave radar can of course emit and receive waves considerably smaller. Millimeter wave radar and Micropower Impulse Radar (MIR) as discussed above are particularly useful for occupant detection and especially the motion of occupants such as motion caused by heartbeats and breathing, but still too course for feature identification. For security purposes, for example, MIR can be used to detect the presence of weapons on a person that might be approaching a vehicle such as a bus, truck or train and thus provide a warning of a potential terrorist threat. Passive IR is also useful for this purpose.

MIR is reflected by edges, joints and boundaries and through the technique of range gating, particular slices in space can be observed. Millimeter wave radar, particularly in the passive mode, can also be used to locate life forms because they naturally emit waves at particular wave lengths such as 3 mm. A passive image of such a person will also show the presence of concealed weapons as they block this radiation. Similarly, active millimeter wave radar reflects off of metallic objects but is absorbed by the water in a life form. The absorption property can be used by placing a radar receiver or reflector behind the occupant and measuring the shadow caused by the absorption. The reflective property of weapons including plastics can be used as above to detect possible terrorist threats. Finally, the use of sub-millimeter waves again using a detector or reflector on the other side of the occupant can be used not only to determine the density of the occupant but also some measure of its chemical composition as the chemical properties alter the pulse shape. Such waves are more readily absorbed by water than by plastic. From the above discussion, it can be seen that there are advantages of using different frequencies of radar for different purposes and, in some cases, a combination of frequencies is most useful. This combination occurs naturally with noise radar (NR), ultra-wideband radar (UWB) and MIR and these technologies are most appropriate for occupant detection when using electromagnetic radiation at longer wavelengths than visible light and IR.

Another variant on the invention is to use no illumination source at all. In this case, the entire visible and infrared spectrum could be used. CMOS arrays are now available with very good night vision capabilities making it possible to see and image an occupant in very low light conditions. QWIP, as discussed above, may someday become available when on-chip cooling systems using a dual stage Peltier system become cost effective or when the operating temperature of the device rises through technological innovation. For a comprehensive introduction to multispectral imaging, see Richards, Austin *Alien Vision. Exploring the Electromagnetic Spectrum with Imaging Technology*, SPIE Press, 2001.

Thus many different frequencies can be used to image a scene each having particular advantages and disadvantages. At least one of the inventions disclosed herein is not limited to using a particular frequency or part of the electromagnetic spectrum and images can advantageously be combined from different frequencies. For example, a radar image can be combined or fused with an image from the infrared or ultraviolet portions of the spectrum. Additionally, the use of a swept frequency range such as in a chirp can be advantageously used to distinguish different objects or in some cases different materials. It is well known that different materials absorb and reflect different electromagnetic waves and that this fact can be used to identify the material as in spectrographic analysis.

8. Field Sensors and Antennas

A living object such as an animal or human has a fairly high electrical permittivity (Dielectric Constant) and relatively lossy dielectric properties (Loss Tangent) absorbs a lot of energy absorption when placed in an appropriate varying electric field. This effect varies with the frequency. If a human, which is a lossy dielectric, is present in the detection field, then the dielectric absorption causes the value of the capacitance of the object to change with frequency. For a human (poor dielectric) with high dielectric losses (loss tangent), the decay with frequency will be more pronounced than objects that do not present this high loss tangency. Exploiting this phenomena, it is possible to detect the presence of an adult, child, baby or pet that is in the field of the detection circuit.

In FIG. 6, a capacitive sensor 78 is arranged to detect the presence of an occupying item on the seat 4 and the output thereof is input to the neural network 65. Capacitive sensors can be located many other places in the passenger compartment. Capacitive sensors appropriate for this function are disclosed in Kithil U.S. Pat. Nos. 5,602,734, 5,802,479 and 5,844,486 and U.S. Pat. No. 5,948,031 to Jinno et al. Capacitive sensors can in general be mounted at locations designated by reference numerals 6 and 8-10 in FIG. 7 or as shown in FIG. 6 or in the vehicle seat and seatback, although by their nature they can occupy considerably more space than shown in the drawings.

In FIG. 4, transducers 5, 11, 12, 13, 14 and 15 can be antennas placed in the seat and headrest such that the presence of an object, particularly a water-containing object such as a human, disturbs the near field of the antenna. This disturbance can be detected by various means such as with Micrel parts MICREF102 and MICREF104, which have a built-in antenna auto-tune circuit. Note, these parts cannot be used as is and it is necessary to redesign the chips to allow the auto-tune information to be retrieved from the chip.

Note that the bio-impedance that can be measured using the methods described above can be used to obtain a measure of the water mass, for example, of an object and thus of its weight.

9. Telematics

Some of the inventions herein relate generally to telematics and the transmission of information from a vehicle to one or more remote sites which can react to the position or status of the vehicle and/or occupant(s) therein.

Initially, sensing of the occupancy of the vehicle and the optional transmission of this information, which may include images, to remote locations will be discussed. This entails obtaining information from various sensors about the occupants in the passenger compartment of the vehicle, e.g., the number of occupants, their type and their motion, if any. Then, the concept of a low cost automatic crash notification system will be discussed. Next, a diversion into improvements in cell phones will be discussed followed by a discussion of trapped children and how telematics can help save their lives. Finally, the use of telematics with non-automotive vehicles will round out this section.

Elsewhere in section 13, the use of telematics is included with a discussion of general vehicle diagnostic methods with the diagnosis being transmittable via a communications device to the remote locations. The diagnostics section includes an extensive discussion of various sensors for use on the vehicle to sense different operating parameters and conditions of the vehicle is provided. All of the sensors discussed herein can be coupled to a communications device enabling transmission of data, signals and/or images to the remote locations, and reception of the same from the remote locations.

9.1 Transmission of Occupancy Information

The cellular phone system, or other telematics communication device, is shown schematically in FIG. 2 by box 34 and outputs to an antenna 32. The phone system or telematics communication device 34 can be coupled to the vehicle interior monitoring system in accordance with any of the embodiments disclosed herein and serves to establish a communications channel with one or more remote assistance facilities, such as an EMS facility or dispatch facility from which emergency response personnel are dispatched. The telematics system can also be a satellite-based system such as provided by Skybitz.

In the event of an accident, the electronic system associated with the telematics system interrogates the various interior monitoring system memories in processor 20 and can arrive at a count of the number of occupants in the vehicle, if each seat is monitored, and, in more sophisticated systems, even makes a determination as to whether each occupant was wearing a seatbelt and if he or she is moving after the accident, and/or the health state of one or more of the occupants as described above, for example. The telematics communication system then automatically notifies an EMS operator (such as 911, OnStar® or equivalent) and the information obtained from the interior monitoring systems is forwarded so that a determination can be made as to the number of ambulances and other equipment to send to the accident site. Vehicles having the capability of notifying EMS in the event one or more airbags deployed are now in service but are not believed to use any of the innovative interior monitoring systems described herein. Such vehicles will also have a system, such as the global positioning system, which permits the vehicle to determine its location and to forward this information to the EMS operator.

FIG. 134 shows a schematic diagram of an embodiment of the invention including a system for determining the presence and health state of any occupants of the vehicle and a telecommunications link. This embodiment includes means for determining the presence of any occupants 150 which may take the form of a heartbeat sensor, chemical sensor and/or motion sensor as described above and means for determining the health state of any occupants 151 as discussed above. The latter means may be integrated into the means for determining the presence of any occupants, i.e., one and the same component, or separate therefrom. Further, means for determining the location, and optionally velocity, of the occupants and/or one or more parts thereof 152 are provided and may be any conventional occupant position sensor or preferably, one of the occupant position sensors as described herein (e.g., those utilizing waves. electromagnetic radiation, electric fields, bladders, strain gages etc.) or as described in the current assignee's patents and patent applications referenced above.

A processor 153 is coupled to the presence determining means 150, the health state determining means 151 and the location determining means 152. A communications unit 154 is coupled to the processor 153. The processor 153 and/or communications unit 154 can also be coupled to microphones 158 that can be distributed throughout the vehicle and include voice-processing circuitry to enable the occupant(s) to effect vocal control of the processor 153, communications unit 154 or any coupled component or oral communications via the communications unit 154. The processor 153 is also coupled to another vehicular system, component or subsystem 155 and can issue control commands to effect adjustment of the operating conditions of the system, component or subsystem. Such a system, component or subsystem can be the heating or air-conditioning system, the entertainment system, an occupant restraint device such as an airbag, a glare prevention system, etc. Also, a positioning system 156 could be coupled to the processor 153 and provides an indication of the absolute position of the vehicle, preferably using satellite-based positioning technology (e.g., a GPS receiver).

In normal use (other then after a crash), the presence determining means 150 determine whether any human occupants are present, i.e., adults or children, and the location determining means 152 determine the occupant's location. The processor 153 receives signals representative of the presence of occupants and their location and determines whether the vehicular system, component or subsystem 155 can be modified to optimize its operation for the specific arrangement of occupants. For example, if the processor 153 determines that only the front seats in the vehicle are occupied, it could control the heating system to provide heat only through vents situated to provide heat for the front-seated occupants.

The communications unit 154 performs the function of enabling establishment of a communications channel to a remote facility to receive information about the occupancy of the vehicle as determined by the presence determining means 150, occupant health state determining means 151 and/or occupant location determining means 152. The communications unit 154 thus can be designed to transmit over a sufficiently large range and at an established frequency monitored by the remote facility, which may be an EMS facility, sheriff department, or fire department. Alternately, it can communicate with a satellite system such as the Skybitz system and the information can be forwarded to the appropriate facility via the Internet or other appropriate link.

Another vehicular telematics system, component or subsystem is a navigational aid, such as a route guidance display or map. In this case, the position of the vehicle as determined by the positioning system 156 is conveyed through processor 153 to the communications unit 154 to a remote facility and a map is transmitted from this facility to the vehicle to be displayed on the route display. If directions are needed, a request for such directions can be entered into an input unit 157 associated with the processor 153 and transmitted to the facility. Data for the display map and/or vocal instructions can then be transmitted from this facility to the vehicle.

Moreover, using this embodiment, it is possible to remotely monitor the health state of the occupants in the vehicle and most importantly, the driver. The health state determining means 151 may be used to detect whether the driver's breathing is erratic or indicative of a state in which the driver is dozing off. The health state determining means 151 can also include a breath-analyzer to determine whether the driver's breath contains alcohol. In this case, the health state of the driver is relayed through the processor 153 and the communications unit 154 to the remote facility and appropriate action can be taken. For example, it would be possible to transmit a command, e.g., in the form of a signal, to the vehicle to activate an alarm or illuminate a warning light or if the vehicle is equipped with an automatic guidance system and ignition shut-off, to cause the vehicle to come to a stop on the shoulder of the roadway or elsewhere out of the traffic stream. The alarm, warning light, automatic guidance system and ignition shut-off are thus particular vehicular components or subsystems represented by 155. The vehicular component or subsystem could be activated directly by the signal from the remote facility, if they include a signal receiver, or indirectly via the communications unit 154 and processor 153.

In use after a crash, the presence determining means 150, health state determining means 151 and location determining means 152 obtain readings from the passenger compartment and direct such readings to the processor 153. The processor 153 analyzes the information and directs or controls the transmission of the information about the occupant(s) to a remote, manned facility. Such information could include the number and type of occupants, i.e., adults, children, infants, whether any of the occupants have stopped breathing or are breathing erratically, whether the occupants are conscious (as evidenced by, e.g., eye motion), whether blood is present (as detected by a chemical sensor) and whether the occupants are making sounds (as detected by a microphone). The determination of the number of occupants is obtained from the presence determining mechanism 150, i.e., the number of occupants whose presence is detected is the number of occupants in the passenger compartment. The determination of the status of the occupants, i.e., whether they are moving is performed by the health state determining mechanism 151, such as the motion sensors, heartbeat sensors, chemical sensors, etc. Moreover, the communications link through the communications unit 154 can be activated immediately after the crash to enable personnel at the remote facility to initiate communications with the vehicle.

Once an occupying item has been located in a vehicle, or any object outside of the vehicle, the identification or categorization information along with an image, including an IR or multispectral image, or icon of the object can be sent via a telematics channel to a remote location. A passing vehicle, for example, can send a picture of an accident or a system in a vehicle that has had an accident can send an image of the occupant(s) of the vehicle to aid in injury assessment by the EMS team.

Although in most if not all of the embodiments described above, it has been assumed that the transmission of images or other data from the vehicle to the EMS or other off-vehicle (remote) site is initiated by the vehicle, this may not always be the case and in some embodiments, provision is made for the off-vehicle site to initiate the acquisition and/or transmission of data including images from the vehicle. Thus, for example, once an EMS operator knows that there has been an accident, he or she can send a command to the vehicle to control components in the vehicle to cause the components send images and other data so that the situation can be monitored by the operator or other person. The capability to receive and initiate such transmissions can also be provided in an emergency vehicle such as a police car or ambulance. In this manner, for a stolen vehicle situation, the police officer, for example, can continue to monitor the interior of the stolen vehicle.

FIG. 142 shows a schematic of the integration of the occupant sensing with a telematics link and the vehicle diagnosis with a telematics link. As envisioned, the occupant sensing system 600 includes those components which determine the presence, position, health state, and other information relating to the occupants, for example the transducers discussed above with reference to FIGS. 1, 2 and 134 and the SAW device discussed above with reference to FIG. 135. Information relating to the occupants includes information as to what the driver is doing, talking on the phone, communicating with OnStarg or other route guidance, listening to the radio, sleeping, drunk, drugged, having a heart attack The occupant sensing system may also be any of those systems and apparatus described in any of the current assignee's above-referenced patents and patent applications or any other comparable occupant sensing system which performs any or all of the same functions as they relate to occupant sensing. Examples of sensors which might be installed on a vehicle and constitute the occupant sensing system include heartbeat sensors, motion sensors, weight sensors, microphones and optical sensors.

A crash sensor system 591 is provided and determines when the vehicle experiences a crash. This crash sensor may be part of the occupant restraint system or independent from it. Crash sensor system 591 may include any type of crash sensors, including one or more crash sensors of the same or different types.

Vehicle sensors 592 include sensors which detect the operating conditions of the vehicle such as those sensors discussed with reference to FIGS. 135-138. Also included are tire sensors such as disclosed in U.S. Pat. No. 6,662,642. Other examples include velocity and acceleration sensors, and angle and angular rate pitch, roll and yaw sensors. Of particular importance are sensors that tell what the car is doing: speed, skidding, sliding, location, communicating with other cars or the infrastructure, etc.

Environment sensors 593 includes sensors which provide data to the operating environment of the vehicle, e.g., the inside and outside temperatures, the time of day, the location of the sun and lights, the locations of other vehicles, rain, snow, sleet, visibility (fog), general road condition information, pot holes, ice, snow cover, road visibility, assessment of traffic, video pictures of an accident, etc. Possible sensors include optical sensors which obtain images of the environment surrounding the vehicle, blind spot detectors which provides data on the blind spot of the driver, automatic cruise control sensors that can provide images of vehicles in front of the host vehicle, various radar devices which provide the position of other vehicles and objects relative to the subject vehicle.

The occupant sensing system 600, crash sensors 591, vehicle sensors 592, environment sensors 593 and all other sensors listed above can be coupled to a communications device 594 which may contain a memory unit and appropriate electrical hardware to communicate with the sensors, process data from the sensors, and transmit data from the sensors. The memory unit would be useful to store data from the sensors, updated periodically, so that such information could be transmitted at set time intervals.

The communications device 594 can be designed to transmit information to any number of different types of facilities. For example, the communications device 594 would be designed to transmit information to an emergency response facility 595 in the event of an accident involving the vehicle. The transmission of the information could be triggered by a signal from a crash sensor 591 that the vehicle was experiencing a crash or experienced a crash. The information transmitted could come from the occupant sensing system 600 so that the emergency response could be tailored to the status of the occupants. For example, if the vehicle was determined to have ten occupants, multiple ambulances might be sent. Also, if the occupants are determined not be breathing, then a higher priority call with living survivors might receive assistance first. As such, the information from the occupant sensing system 600 would be used to prioritize the duties of the emergency response personnel.

Information from the vehicle sensors 592 and environment sensors 593 can also be transmitted to law enforcement authorities 597 in the event of an accident so that the cause(s) of the accident could be determined. Such information can also include information from the occupant sensing system 600, which might reveal that the driver was talking on the phone, putting on make-up, or another distracting activity, information from the vehicle sensors 592 which might reveal a problem with the vehicle, and information from the environment sensors 593 which might reveal the existence of slippery roads, dense fog and the like.

Information from the occupant sensing system 600, vehicle sensors 592 and environment sensors 593 can also be transmitted to the vehicle manufacturer 598 in the event of an accident so that a determination can be made as to whether failure of a component of the vehicle caused or contributed to the cause of the accident. For example, the vehicle sensors might determine that the tire pressure was too low so that advice can be disseminated to avoid maintaining the tire pressure too low in order to avoid an accident. Information from the vehicle sensors 592 relating to component failure could be transmitted to a dealer/repair facility 596 which could schedule maintenance to correct the problem.

The communications device 594 can be designed to transmit particular information to each site, i.e., only information important to be considered by the personnel at that site. For example, the emergency response personnel have no need for the fact that the tire pressure was too low but such information is important to the law enforcement authorities 597 (for the possible purpose of issuing a recall of the tire and/or vehicle) and the vehicle manufacturer 598.

In one exemplifying use of the system shown in FIG. 142, the operator at the remote facility 595 could be notified when the vehicle experiences a crash, as detected by the crash sensor system 591 and transmitted to the remote facility 595 via the communications device 594. In this case, if the vehicle occupants are unable to, or do not, initiate communications with the remote facility 595, the operator would be able to receive information from the occupant sensing system 600, as well as the vehicle sensors 592 and environmental sensors 593. The operator could then direct the appropriate emergency response personnel to the vehicle. The communications device 594 could thus be designed to automatically establish the communications channel with the remote facility when the crash sensor system 591 determines that the vehicle has experienced a crash.

The communications device 594 can be a cellular phone, OnStar® or other subscriber-based telematics system, a peer-to-peer vehicle communication system that eventually communicates to the infrastructure and then, perhaps, to the Internet with e-mail to the dealer, manufacturer, vehicle owner, law enforcement authorities or others. It can also be a vehicle to LEO or Geostationary satellite system such as Skybitz which can then forward the information to the appropriate facility either directly or through the Internet.

The communication may need to be secret so as not to violate the privacy of the occupants and thus encrypted communication may in many cases be required. Other innovations described herein include the transmission of any video data from a vehicle to another vehicle or to a facility remote from the vehicle by any means such as a telematics communication system such as OnStar®, a cellular phone system, a communication via GEO, geocentric or other satellite system and any communication that communicates the results of a pattern recognition system analysis. Also, any communication from a vehicle that combines sensor information with location information is anticipated by at least one of the inventions disclosed herein.

When optical sensors are provided as part of the occupant sensing system 600, video conferencing becomes a possibility, whether or not the vehicle experiences a crash. That is, the occupants of the vehicle can engage in a video conference with people at another location 599 via establishment of a communications channel by the communications device 594.

The vehicle diagnostic system described above using a telematics link can transmit information from any type of sensors on the vehicle.

9.2 Low Cost Automatic Crash Notification

A system for notifying remote personnel, e.g., emergency response personnel, of an accident is described herein.

9.3 Cell Phone Improvements

Figure 50:
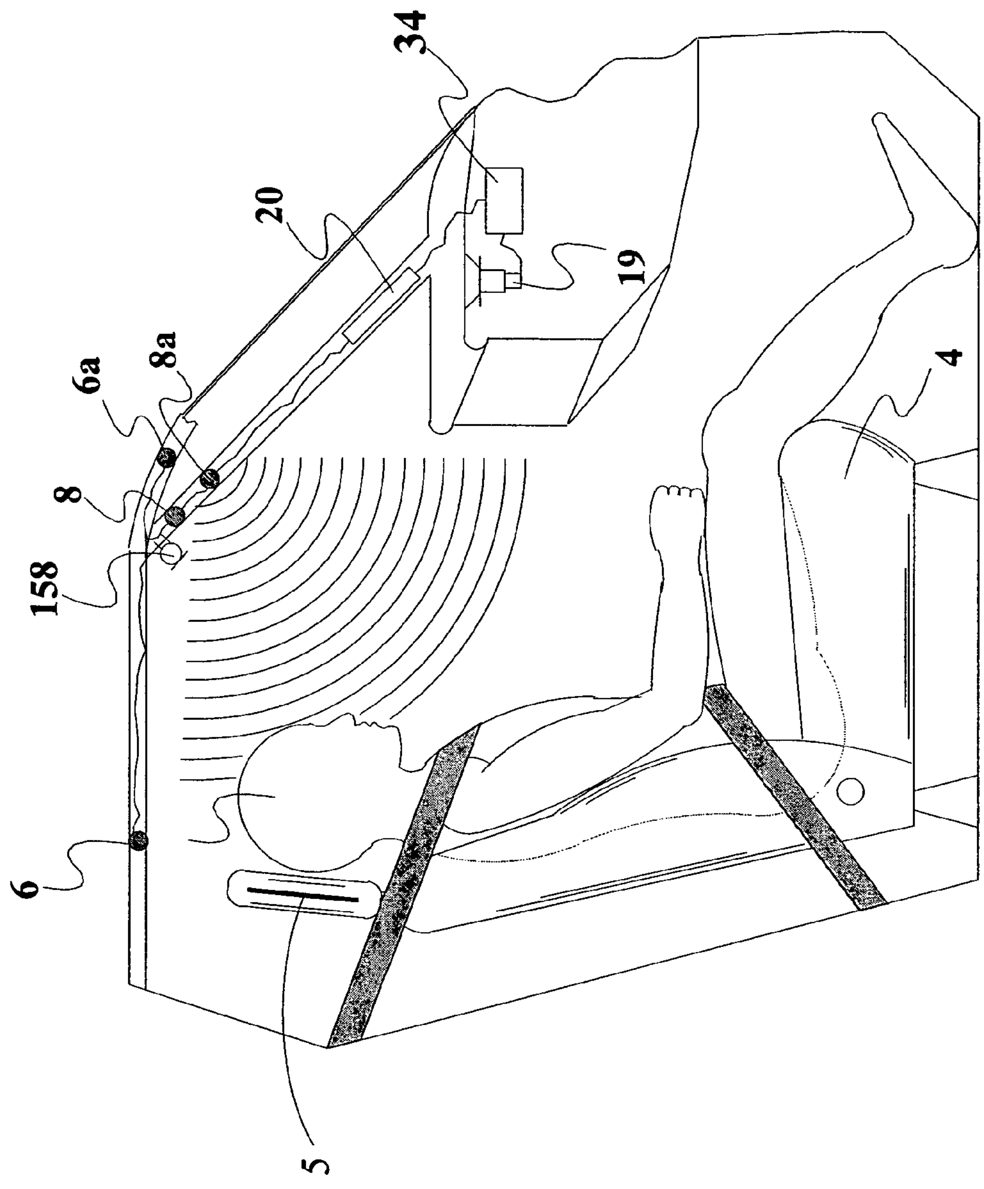
FIG. 50 is a side view with parts cutaway and removed of a vehicle showing the passenger compartment containing a front passenger and a preferred mounting location for an occupant head detector and a preferred mounting location of an adjustable microphone and speakers and including an antenna field sensor in the headrest for a rear of occupant's head locator for use with a headrest adjustment system to reduce whiplash injuries, in particular, in rear impact crashes.

When the driver of a vehicle is using a cellular phone, the phone microphone frequently picks up other noise in the vehicle making it difficult for the other party to hear what is being said. This noise can be reduced if a directional microphone is used and directed toward the mouth of the driver. This is difficult to do since the position of driver's mouth varies significantly depending on such things as the size and seating position of the driver. By using the vehicle interior identification and monitoring system of at least one of the inventions disclosed herein, and through appropriate pattern recognition techniques, the location of the driver's head can be determined with sufficient accuracy even with ultrasonics to permit a directional microphone assembly to be sensitized to the direction of the mouth of the driver resulting in a clear reception of his voice. The use of directional speakers in a similar manner also improves the telephone system performance. In the extreme case of directionality, the techniques of hypersonic sound can be used. Such a system can also be used to permit effortless conversations between occupants of the front and rear seats. Such a system is shown in FIG. 50, which is a system similar to that of FIG. 2 only using three ultrasonic transducers 6, 8 and 10 to determine the location of the driver's head and control the pointing direction of a microphone 158. Speaker 19 is shown connected schematically to the phone system 34 completing the system.

The transducer 8 can be placed high in the A-pillar, transducer 8 on the headliner and transducer 10 on the IP. Other locations are possible as discussed above. The three transducers are placed high in the vehicle passenger compartment so that the first returned signal is from the head. Temporal filtering is used to eliminate signals that are reflections from beyond the head and the determination of the head center location is then found by the approximate centroid of the head-returned signal. That is, once the location of the return signal centroid is found from the three received signals from transducers 6, 8 and 10, the distance to that point is known for each of the transducers based on the time it takes the signal to travel from the head to each transducer. In this manner, by using the three transducers, all of which send and receive, plus an algorithm for finding the coordinates of the head center, using processor 20, and through the use of known relationships between the location of the mouth and the head center, an estimate of the mouth location, and the ear locations, can be determined within a circle having a diameter of about five inches (13 cm). This is sufficiently accurate for a directional microphone to cover the mouth while excluding the majority of unwanted noise. Camera-based systems can be used to more accurately locate parts of the body such as the head.

The placement of multiple imagers in the vehicle, the use of a plastic electronics-based display plus telematics permits the occupants of the vehicle to engage in a video conference if desired. Naturally, until autonomous vehicles appear, it would be best if the driver did not participate.

9.4 Children Trapped in a Vehicle

An occupant sensing system can also involve sensing for the presence of a living occupant in a trunk of a vehicle or in a closed vehicle, for example, when a child is inadvertently left in the vehicle or enters the trunk and the trunk closes. To this end, a SAW-based chemical sensor 530 is illustrated in FIG. 135A for mounting in a vehicle trunk as illustrated in FIG. 135. The chemical sensor 530 is designed to measure carbon dioxide concentration through the mass loading effects as described in U.S. Pat. No. 4,895,017 with a polymer coating selected that is sensitive to carbon dioxide. The speed of the surface acoustic wave is a function of the carbon dioxide level in the atmosphere. Section 532 of the chemical sensor 530 contains a coating of such a polymer and the acoustic velocity in this section is a measure of the carbon dioxide concentration. Temperature effects are eliminated through a comparison of the sonic velocities in sections 531 and 532 as described above.

Thus, when trunk lid 533 is closed and a source of carbon dioxide such as a child or animal is trapped within the trunk, the chemical sensor 530 will provide information indicating the presence of the carbon dioxide producing object to the interrogator which can then release the trunk lock, permitting trunk to automatically open. In this manner, the problem of children and animals suffocating in closed trunks is eliminated. Alternately, information that a person or animal is trapped in a trunk can be sent by the telematics system to law enforcement authorities or other location remote from the vehicle.

A similar device can be distributed at various locations within the passenger compartment of vehicle along with a combined temperature sensor. If the car has been left with a child or other animal while owner is shopping, for example, and if the temperature rises within the vehicle to an unsafe level or, alternately, if the temperature drops below an unsafe level, then the vehicle can be signaled to take appropriate action which may involve opening the windows or starting the vehicle with either air conditioning or heating as appropriate. Alternately, information that a person or animal is trapped within a vehicle can be sent by the telematics system to law enforcement authorities or other location remote from the vehicle. Thus, through these simple wireless powerless sensors, the problem of suffocation either from lack of oxygen or death from excessive heat or cold can all be solved in a simple, low-cost manner through using an interrogator as disclosed in the current assignee's U.S. Pat. No. 6,662,642.

Additionally, a sensitive layer on a SAW can be made to be sensitive to other chemicals such as water vapor for humidity control or alcohol for drunken driving control. Similarly, the sensitive layer can be designed to be sensitive to carbon monoxide thereby preventing carbon monoxide poisoning. Many other chemicals can be sensed for specific applications such as to check for chemical leaks in commercial vehicles, for example. Whenever such a sensor system determines that a dangerous situation is developing, an alarm can be sounded and/or the situation can be automatically communicated to an off vehicle location through telematics, a cell phone such as a 911 call, the Internet or though a subscriber service such as OnStar®.

9.5 Telematics with Non-Automotive Vehicles

The transmission of data obtained from imagers, or other transducers, to another location, requiring the processing of the information, using neural networks for example, to a remote location is an important feature of the inventions disclosed herein. This capability can permit an owner of a cargo container or truck trailer to obtain a picture of the interior of the vehicle at any time via telematics. When coupled with occupant sensing, the driver of a vehicle can be recognized and the result sent by telematics for authorization to minimize the theft or unauthorized operation of a vehicle. The recognition of the driver can either be performed on the vehicle or an image of the driver can be sent to a remote location for recognition at that location.

Generally monitoring of containers, trailers, chassis etc. is accomplished through telecommunications primarily with LEO or geostationary satellites or through terrestrial-based communication systems. These systems are commercially available and will not be discussed here. Expected future systems include communication between the container and the infrastructure to indicate to the monitoring authorities that a container with a particular identification number is passing a particular terrestrial point. If this is expected, then no action would be taken. The container identification number can be part of a national database that contains information as to the contents of the container. Thus, for example, if a container containing hazardous materials approaches a bridge or tunnel that forbids such hazardous materials from passing over the bridge or through the tunnel, then an emergency situation can be signaled and preventive action taken.

It is expected that monitoring of the transportation of cargo containers will dramatically increase as the efforts to reduce terrorist activities also increase. If every container that passes within the borders of the United States has an identification number and that number is in a database that provides the contents of that container, then the use of shipping containers by terrorists or criminals should gradually be eliminated. If these containers are carefully monitored by satellite or another communication system that indicates any unusual activity of a container, an immediate investigation can result and then the cargo transportation system will gradually approach perfection where terrorists or criminals are denied this means of transporting material into and within the United States. If any container is found containing contraband material, then the entire history of how that container entered the United States can be checked to determine the source of the failure. If the failure is found to have occurred at a loading port outside of the United States, then sanctions can be imposed on the host country that could have serious effects on that country's ability to trade worldwide. Just the threat of such an action would be a significant deterrent. Thus, the use of containers to transport hazardous materials or weapons of mass destruction as well as people, narcotics, or other contraband and can be effectively eliminated through the use of the container monitoring system of at least one of the inventions disclosed herein.

Prior to the entry of a container ship into a harbor, a Coast Guard boat from the U.S. Customs Service can approach the container vessel and scan all of the containers thereon to be sure that all such containers are registered and tracked including their contents. Where containers contain dangerous material legally, the seals on those containers can be carefully investigated prior to the ship entering U.S. waters. Obviously, many other security precautions can now be conceived once the ability to track all containers and their contents has been achieved according to the teachings of at least one of the inventions disclosed herein.

Containers that enter the United States through land ports of entry can also be interrogated in a similar fashion. As long as the shipper is known and reputable and the container contents are in the database, which would probably be accessible over the Internet, is properly updated, then all containers will be effectively monitored that enter the United States with the penalty of an error resulting in the disenfranchisement of the shipper, and perhaps sanctions against the country, which for most reputable shippers or shipping companies would be a severe penalty sufficient to cause such shippers or shipping companies to take appropriate action to assure the integrity of the shipping containers. Naturally, intelligent selected random inspections guided by the container history would still take place.

Although satellite communication is preferred, communication using cell phones and infrastructure devices placed at appropriate locations along roadways are also possible. Eventually there will be a network linking all vehicles on the highways in a peer-to-peer arrangement (perhaps using Bluetooth, IEEE 802.11 (WI-FI), Wi-Mobile or other local, mesh or ad-hoc network) at which time information relative to container contents etc. can be communicated to the Internet or elsewhere through this peer-to-peer network. It is expected that a pseudo-noise-based or similar communication system such as a code division multiple access (CDMA) system, wherein the identifying code of a vehicle is derived from the vehicle's GPS determined location, will be the technology of choice for this peer-to-peer vehicle network. It is expected that this network will be able to communicate such information to the Internet (with proper security precautions including encryption where necessary or desired) and that all of the important information relative to the contents of moving containers throughout the United States will be available on the Internet on a need-to-know basis. Thus, law enforcement agencies can maintain computer programs that will monitor the contents of containers using information available from the Internet. Similarly, shippers and receivers can monitor the status of their shipments through a connection onto the Internet. Thus, the existence of the Internet or equivalent can be important to the monitoring system described herein.

An alternate method of implementing the invention is to make use of a cell phone or PDA. Cell phones that are now sold contain a GPS-based location system as do many PDAs. Such a system along with minimal additional apparatus can be used to practice the teachings disclosed herein. In this case, the cell phone, PDA or similar portable device could be mounted through a snap-in attachment system, for example, wherein the portable device is firmly attached to the vehicle. The device can at that point, for example, obtain an ID number from the container through a variety of methods such as a RFID, SAW or hardwired based system. It can also connect to a satellite antenna that would permit the device to communicate to a LEO or GEO satellite system, such as Skybitz as described above. Since the portable device would only operate on a low duty cycle, the battery should last for many days or perhaps longer. Of course, if it is connected to the vehicle power system, its life could be indefinite. Naturally, when power is waning, this fact can be sent to the satellite or cell phone system to alert the appropriate personnel. Since a cell phone contains a microphone, it could be trained, using an appropriate pattern recognition system, to recognize the sound of an accident or the deployment of an airbag or similar event. It thus becomes a very low cost OnStar® type telematics system.

As an alternative to using a satellite network, the cell phone network can be used in essentially the same manner when a cell phone signal is available. Naturally, all of the sensors disclosed herein can either be incorporated into the portable device or placed on the vehicle and connected to the portable device when the device is attached to the vehicle. This system has a key advantage of avoiding obsolescence. With technology rapidly changing, the portable device can be exchanged for a later model or upgraded as needed or desired, keeping the overall system at the highest technical state. Existing telematics systems such as OnStar® can of course also be used with this system.

Importantly, an automatic emergency notification system can now be made available to all owners of appropriately configured cell phones, PDAs, or other similar portable devices that can operate on a very low cost basis without the need for a monthly subscription since they can be designed to operate only on an exception basis. Owners would pay only as they use the service. Stolen vehicle location, automatic notification in the event of a crash even with the transmission of a picture for camera-equipped devices is now possible. Automatic door unlocking can also be done by the device since it could transmit a signal to the vehicle, in a similar fashion as a keyless entry system, from either inside or outside the vehicle. The phone can be equipped with a biometric identification system such as fingerprint, voice print, facial or iris recognition etc. thereby giving that capability to vehicles. The device can thus become the general key to the vehicle or house, and can even open the garage door etc. If the cell phone is lost, its whereabouts can be instantly found since it has a GPS receiver and knows where it is. If it is stolen, it will become inoperable without the biometric identification from the owner.

Other communication systems will also frequently be used to connect the container with the chassis and/or the tractor and perhaps the identification of the driver or operator. Thus, information can be available on the Internet showing what tractor, what trailer, what container and what driver is operating at a particular time, at a particular GPS location, on a particular roadway, with what particular container contents. Suitable security will be provided to ensure that this information is not freely available to the general public. Naturally, redundancy can be provided to prevent the destruction or any failure of a particular site from failing the system.

This communication between the various elements of the shipping system which are co-located (truck, trailer, container, container contents, driver etc.) can be connected through a wired or wireless bus such as the CAN bus. Also, an electrical system such as disclosed in U.S. Pat. Nos. 5,809,437, 6,175,787 and 6,326,704 can also be used in the invention.

10. Display

A portion of the windshield, such as the lower left corner, can be used to display the vehicle and surrounding vehicles or other objects as seen from above, for example, as described in U.S. patent application Ser. No. 09/851,362 filed May 8, 2000. This display can use pictures or icons as appropriate. In another case, the condition of the road such as the presence, or likelihood of black ice can be displayed on the windshield where it would show on the road if the driver could see it. Naturally, this would require a source of information that such a condition exists, however, here the concern is that it can be displayed whatever the source of this or any other relevant information. When used in conjunction with a navigation system, directions including pointing arrows or a path outline perhaps in color, similar to the first down line on a football field as seen on TV, can be displayed to direct the driver to his destination or to points of interest.

10.1 Heads-up Display

The use of a heads-up display has been discussed above. An occupant sensor of at least one of the inventions disclosed herein permits the alignment of the object discovered by a night vision camera with the line of sight of the driver so that the object will be placed on the display where the driver would have seen it if he were able. Of course, the same problem exists as with the glare control system in that to do this job precisely a stereo night vision camera is required. However, in most cases the error will be small if a single camera is used.

10.2 Adjust HUD Based on Driver Seating Position

Another option is to measure or infer the location of the eyes of the driver and to adjust the HUD based on where the eyes of the driver are likely to be located. Then a manual fine tuning adjustment capability can be provided.

10.3 HUD on Rear Window

Previously, HUDs have only been considered for the windshield. This need not be so and the rear window can also be a location for a HUD display to aid the driver in seeing approaching vehicles from the rear or to warn of approaching emergency vehicles, for example.

10.4 Plastic Electronics

SPD and Plastic electronics can be combined in the same visor or windshield. In this case, the glare can be reduced and the visor or windshield used as a heads up display. The SPD technology is described in references (20), (22) and (23) and the plastic electronics in reference (21).

Another method of using the display capabilities of any heads-up display and in particular a plastic electronics display is to create an augmented reality situation such as described in a Scientific American article "Augmented Reality: A New Way of Seeing" (reference 24) where the visor or windshield becomes the display instead of a head mounted display. Some applications include the display of the road edges and lane markers onto either the windshield or visor at the location that they would appear if the driver could see them through the windshield. The word windshield when used herein will mean any partially transparent or sometimes transparent display device or surface that is imposed between the eyes of a vehicle occupant and which can serve as a glare blocker and/or as a display device unless alternate devices are mentioned in the same sentence.

Other applications include the pointing out of features in the scene to draw attention to a road where the driver should go, the location of a business or service establishment, a point of interest, or any other such object. Along with such an indication, a voice system within the vehicle can provide directions, give a description of the business or service establishment, or give history or other information related to a pint of interest etc. The display can also provide additional visual information such as a created view of a building that is planned for a location, a view of a object of interest that used to be located at a particular point, the location of underground utilities etc. or anything that might appear on a GIS map database or other database relating to the location.

One particularly useful class of information relates to signage. Since a driver frequently misses seeing the speed limit sign, highway or road name sign etc., all such information can be displayed on the windshield in an inconspicuous manner along with the past five or so signs that the vehicle has passed and the forthcoming five or so signs alone with their distances. Naturally, these signs can be displayed in any convenient language and can even be spoken if desired by the vehicle operator.

The output from night vision camera systems can now also be displayed on the display where it would be located if the driver could see the object through the windshield. The problems of glare rendering such a display unreadable are solved by the glare control system described elsewhere herein. In some cases where the glare is particularly bad making it very difficult to see the roadway, the augmented reality roadway can be displayed over the glare blocking system providing the driver with a clear view of the road location. Naturally, a radar or other collision avoidance system would also be required to show the driver the location of all other vehicles or other objects in the vicinity. Sometimes the actual object can be displayed while in other cases an icon is all that is required and in fact, provides a clearer representation of the object.

The augmented reality (AR) system can be controlled by a voice recognition system or by other mouse, joystick, switches or similar input device, which can be located on the steering wheel or other convenient location. Even gestures can be used. Thus, this AR system is displayed on a see-through windshield and augments the information normally seen by the occupant. This system provides the right information to the occupant at the right time to aid in the safe operation of the vehicle and the pleasure and utility of the trip. The source of the information displayed may be resident within the vehicle or be retrieved from the Internet, a local transmitting station, a satellite, another vehicle, a cell phone tower or any other appropriate system.

Plastic electronics is now becoming feasible and will permit any surface in or on the vehicle to become a display surface. In particular, this technology is likely to be the basis of future HUDs.

Plastic electronics offer the possibility of turning any window into a display. This can be the windshield of an automobile or any window in a vehicle or house or other building, for that matter. A storefront can become a changeable advertising display, for example, and the windows of a house could be a display where emergency services warn people of a coming hurricane. For automotive and truck use, the windshield can now fulfill all of the functions that previously have required a heads-up display (HUD). These include displays of any information that a driver may want or need including the gages normally on the instrument panel, displaying the results of a night vision camera and, if an occupant sensor is present, an image of an object, or an icon representation, can be displayed on the windshield where the driver would see it if it were visible through the windshield as discussed in more detail elsewhere herein and in the commonly assigned patents and patent applications listed above. In fact, plastic electronics have the ability to cover most or even the entire windshield area at low cost and without the necessity of an expensive and difficult to mount projection system. In contrast, most HUDs are very limited in windshield coverage. Plastic electronics also provide for a full color display, which is difficult to provide with a HUD since the combiner in the HUD is usually tuned to reflect only a single color.

In addition to safety uses, turning one or more windows of a house or vehicle into a display can have "infotainment" and other uses. For example, a teenager may wish to display a message on the side windows to a passing vehicle such as "hi, can I have your phone number (or email address)?" The passing vehicle can then display the phone number (or email address) if the occupant of that vehicle wishes. A vehicle or a vehicle operator that is experiencing problems can display "HELP" or some other appropriate message. The occupants of the back seat of a vehicle can use the side window displays to play games or search the Internet, for example. Similarly, a special visor-like display based of plastic electronics can be rotated or pulled down from the ceiling for the same purposes. Thus, in a very cost effective manner, any or all of the windows or sun visors of the vehicle (or house or building) can now become computer or TV displays and thus make use of previously unused surfaces for information display.

Plastic electronics is in an early stage of development but will have an enormous impact on the windows, sunroofs and sun visors of vehicles. For example, researchers at Philips Research Laboratories have made a 64×64-pixel liquid crystal display (LCD) in which each pixel is controlled by a plastic transistor. Other researchers have used a polymer-dispersed liquid-crystal display (PDLCD) to demonstrate their polymeric transistor patterning. A PDLCD is a reflective display that, unlike most LCD technologies, is not based on polarization effects and so can be used to make a flexible display that could be pulled down like a shade, for example. In a PDLCD, light is either scattered by nonaligned molecules in liquid-crystal domains or the LC domains are transparent because an electrical field aligns the molecules.

Pentacene (5A) and sexithiophene (6T) are currently the two most widely used organic semiconductors. These are two conjugated molecules whose means of assembly in the solid state lead to highly orderly materials, including even the single crystal. The excellent transport properties of these molecules may be explained by the high degree of crystallinity of the thin films of these two semiconductor components.

The discovery of conducting polymers has become even more significant as this class of materials has proven to be of great technological promise. Conducting polymers have been put to use in such niche applications as electromagnetic shielding, antistatic coatings on photographic films, and windows with changeable optical properties. The undoped polymers, which are semiconducting and sometimes electroluminescent, have led to even more exciting possibilities, such as transistors, light-emitting diodes (LEDs), and photodetectors. The quantum efficiency (the ratio of photons out to electrons in) of the first polymer LEDs was about 0.01%, but subsequent work quickly raised it to about 1%. Polymer LEDs now have efficiencies of above about 10%, and they can emit a variety of colors. The upper limit of efficiency was once thought to be about 25% but this limitation has now been exceeded and improvements are expected to continue.

A screen based on PolyLEDs has advantages since it is lightweight and flexible. It can be rolled up or embedded into a windshield or other window. With plastic chips the electronics driving the screen are integrated into the screen itself. Some applications of the PolyLED are information screens of almost unlimited size, for example alongside motorways or at train stations. They now work continuously for about 50,000 hours, which is more that the life of an automobile. Used as a display, PolyLEDs are much thinner than an LCD screen with backlight.

The most important benefit of the PolyLED is the high contrast and the high brightness with the result that they can be easily read in both bright and dark environments, which is important for automotive applications. A PolyLED does not have the viewing angle problem associates with LCDs. The light is transmitted in all directions with the same intensity. Of particular importance is that PolyLEDs can be produced in large quantities at a low price. The efficiency of current plastic electronic devices depends somewhat on their electrical conductivity, which is currently considerably below that of metals. With improved ordering of the polymer chains, however, the conductivity is expected to eventually exceed that of the best metals.

Plastic electronics can be made using solution-based processing methods, such as spin-coating, casting, and printing. This fact can potentially reduce the fabrication cost and lead to large area reel-to-reel production. In particular, printing methods (particularly screen printing) are especially desirable since the deposition and patterning steps can be combined in one single step. Screen printing has been widely used in commercial printed circuit boards and was recently adopted by several research groups to print electrodes as well as the active polymer layers for organic transistors and simple circuits. Inkjets and rubber stamps are alternative printing methods. A full-color polymer LED fabricated by ink-jet printing has been demonstrated using a solution of semiconducting polymer in a common solvent as the ink.

As reported in Science Observer, November-December, 1998 "Printing Plastic Transistors" plastic transistors can be made transparent, so that they could be used in display systems incorporated in an automobile's windshield. The plastic allows these circuits to be bent along the curvature of a windshield or around a package. For example, investigators at Philips Research in The Netherlands have developed a disposable identification tag that can be incorporated in the wrapping of a soft package.

11. Pattern Recognition

In basic embodiments of the inventions, wave or energy-receiving transducers are arranged in the vehicle at appropriate locations, associated algorithms are trained, if necessary depending on the particular embodiment, and function to determine whether a life form, or other object, is present in the vehicle and if so, how many life forms or objects are present. A determination can also be made using the transducers as to whether the life forms are humans, or more specifically, adults, child in child seats, etc. As noted above and below, this is possible using pattern recognition techniques. Moreover, the processor or processors associated with the transducers can be trained (loaded with a trained pattern recognition algorithm) to determine the location of the life forms or objects, either periodically or continuously or possibly only immediately before, during and after a crash. The location of the life forms or objects can be as general or as specific as necessary depending on the system requirements, i.e., a determination can be made that a human is situated on the driver's seat in a normal position (general) or a determination can be made that a human is situated on the driver's seat and is leaning forward and/or to the side at a specific angle as well as determining the position of his or her extremities and head and chest (specific). Or, a determination can be made as to the size or type of objects such as boxes are in a truck trailer or cargo container.

The degree of detail is limited by several factors, including, e.g., the number, position and type of transducers and the training of the pattern recognition algorithm. When different objects are placed on the front passenger seat, the images (here "image" is used to represent any form of signal) from transducers 6, 8, 10 (FIG. 1) are different for different objects but there are also similarities between all images of rear facing child seats, for example, regardless of where on the vehicle seat it is placed and regardless of what company manufactured the child seat. Alternately, there will be similarities between all images of people sitting on the seat regardless of what they are wearing, their age or size. The problem is to find the set of "rules" or an algorithm that differentiates the images of one type of object from the images of other types of objects, for example which differentiate the adult occupant images from the rear facing child seat images or boxes. The similarities of these images for various child seats are frequently not obvious to a person looking at plots of the time series from ultrasonic sensors, for example, and thus computer algorithms are developed to sort out the various patterns. For a more detailed discussion of pattern recognition see US RE37260 to Varga et. and discussions elsewhere herein.

The determination of these rules is important to the pattern recognition techniques used in at least one of the inventions disclosed herein. In general, three approaches have been useful, artificial intelligence, fuzzy logic and artificial neural networks including modular or combination neural networks. Other types of pattern recognition techniques may also be used, such as sensor fusion as disclosed in Corrado U.S. Pat. Nos. 5,482,314, 5,890,085, and 6,249,729. In some of the inventions disclosed herein, such as the determination that there is an object in the path of a closing window or door using acoustics or optics as described herein, the rules are sufficiently obvious that a trained researcher can look at the returned signals and devise an algorithm to make the required determinations. In others, such as the determination of the presence of a rear facing child seat or of an occupant, artificial neural networks are used to determine the rules. Neural network software for determining the pattern recognition rules is available from various sources such as International Scientific Research, Inc., Panama City, Panama.

The human mind has little problem recognizing faces even when they are partially occluded such as with a hat, sunglasses or a scarf, for example. With the increase in low cost computing power, it is now becoming possible to train a rather large neural network, perhaps a combination neural network, to recognize most of those cases where a human mind will also be successful.

Other techniques which may or may not be part of the process of designing a system for a particular application include the following:

1. Fuzzy logic. Neural networks frequently exhibit the property that when presented with a situation that is totally different from any previously encountered, an irrational decision can result. Frequently, when the trained observer looks at input data, certain boundaries to the data become evident and cases that fall outside of those boundaries are indicative of either corrupted data or data from a totally unexpected situation. It is sometimes desirable for the system designer to add rules to handle these cases. These can be fuzzy logic-based rules or rules based on human intelligence. One example would be that when certain parts of the data vector fall outside of expected bounds that the system defaults to an airbag-enable state or the previously determined state.

2. Genetic algorithms. When developing a neural network algorithm for a particular vehicle, there is no guarantee that the best of all possible algorithms has been selected. One method of improving the probability that the best algorithm has been selected is to incorporate some of the principles of genetic algorithms. In one application of this theory, the network architecture and/or the node weights are varied pseudo-randomly to attempt to find other combinations which have higher success rates. The discussion of such genetic algorithms systems appears in the book *Computational Intelligence* referenced above.

Although neural networks are preferred other classifiers such as Bayesian classifiers can be used as well as any other pattern recognition system. A key feature of most of the inventions disclosed herein is the recognition that the technology of pattern recognition rather than deterministic mathematics should be applied to solving the occupant sensing problem.

11.1 Neural Networks

An occupant can move from a position safely displaced from the airbag to a position where he or she can be seriously injured by the deployment of an airbag within a fraction of a second during pre-crash braking, for example. On the other hand, it takes a substantially longer time period to change the seat occupancy state from a forward facing person to a rear facing child seat, or even from a forward facing child seat to a rear facing child seat. This fact can be used in the discrimination process through post-processing algorithms. One method, which also prepares for DOOP, is to use a two-layered neural network or two separate neural networks. The first one categorizes the seat occupancy into, for example, (1) empty seat, (2) rear facing child seat, (3) forward facing child seat and (4) forward facing human (not in a child seat). The second is used for occupant position determination. In the implementation, the same input layer can be used for both neural networks but separate hidden and output layers are used. This is illustrated in FIG. 187 which is similar to FIG. 19*b* with the addition of a post processing operation for both the categorization and position networks and the separate hidden layer nodes for each network.

If the categorization network determines that either a category (3) or (4) exists, then the second network is run, which determines the location of the occupant. Significant averaging of the vectors is used for the first network and substantial evidence is required before the occupancy class is changed. For example, if data is acquired every 10 milliseconds, the first network might be designed to require 600 out of 1000 changed vectors before a change of state is determined. In this case, at least 6 seconds of confirming data would be required. Such a system would therefore not be fooled by a momentary placement of a newspaper by a forward facing human, for example, that might look like a rear-facing child seat.

If, on the other hand, a forward facing human were chosen, his or her position could be determined every 10 milliseconds. A decision that the occupant had moved out of position would not necessarily be made from one 10 millisecond reading unless that reading was consistent with previous readings. Nevertheless, a series of consistent readings would lead to a decision within 10 milliseconds of when the occupant crossed over into the danger zone proximate to the airbag module. This method of using history is used to eliminate the effects of temperature gradients, for example, or other events that could temporarily distort one or more vectors. The algorithms which perform this analysis are part of the post-processor.

More particularly, in one embodiment of the method in accordance with at least one of the inventions herein in which two neural networks are used in the control of the deployment of an occupant restraint device based on the position of an object in a passenger compartment of a vehicle, several wave-emitting and receiving transducers are mounted on the vehicle. In one preferred embodiment, the transducers are ultrasonic transducers which simultaneously transmit and receive waves at different frequencies from one another. A determination is made by a first neural network whether the object is of a type requiring deployment of the occupant restraint device in the event of a crash involving the vehicle based on the waves received by at least some of the transducers after being modified by passing through the passenger compartment. If so, another determination is made by a second neural network whether the position of the object relative to the occupant restraint device would cause injury to the object upon deployment of the occupant restraint device based on the waves received by at least some of the transducers. The first neural network is trained on signals from at least some of the transducers representative of waves received by the transducers when different objects are situated in the passenger compartment. The second neural network is trained on signals from at least some of the transducers when different objects in different positions are situated in the passenger compartment.

The transducers used in the training of the first and second neural networks and operational use of method are not necessary the same transducers and different sets of transducers can be used for the typing or categorizing of the object via the first neural network and the position determination of the object via the second neural network.

The modifications described above with respect to the use of ultrasonic transducers can also be used in conjunction with a dual neural network system. For example, motion of a respective vibrating element or cone of one or more of the transducers may be electronically or mechanically diminished or suppressed to reduce ringing of the transducer and/or one or more of the transducers may be arranged in a respective tube having an opening through which the waves are transmitted and received.

In another embodiment of the invention, a method for categorizing and determining the position of an object in a passenger compartment of a vehicle entails mounting a plurality of wave-receiving transducers on the vehicle, training a first neural network on signals from at least some of the transducers representative of waves received by the transducers when different objects in different positions are situated in the passenger compartment, and training a second neural network on signals from at least some of the transducers representative of waves received by the transducers when different objects in different positions are situated in the passenger compartment. As such, the first neural network provides an output signal indicative of the categorization of the object while the second neural network provides an output signal indicative of the position of the object. The transducers may be controlled to transmit and receive waves each at a different frequency, as discussed elsewhere herein, and one or more of the transducers may be arranged in a respective tube having an opening through which the waves are transmitted and received.

Although this system is described with particular advantageous use for ultrasonic and optical transducers, it is conceivable that other transducers other than the ultrasonics or optics can also be used in accordance with the invention. A dual neural network is a form of a modular neural network and both are subsets of combination neural networks.

The system used in a preferred implementation of at least one of the inventions disclosed herein for the determination of the presence of a rear facing child seat, of an occupant or of an empty seat, for example, is the artificial neural network, which is also commonly referred to as a trained neural network. In one case, illustrated in FIG. 1, the network operates on the returned signals as sensed by transducers 6, 8, 9 and 10, for example. Through a training session, the system is taught to differentiate between the different cases. This is done by conducting a large number of experiments where a selection of the possible child seats is placed in a large number of possible orientations on the front passenger seat. Similarly, a sufficiently large number of experiments are run with human occupants and with boxes, bags of groceries and other objects (both inanimate and animate). For each experiment with different objects and the same object in different positions, the returned signals from the transducers 6, 8, 9 and 10, for example, are associated with the identification of the occupant in the seat or the empty seat and information about the occupant such as its orientation if it is a child seat and/or position. Data sets are formed from the returned signals and the identification and information about the occupant or the absence of an occupant. The data sets are input into a neural network-generating program that creates a trained neural network that can, upon receiving input of returned signals from the transducers 6, 8, 9 and 10, provide an output of the identification and information about the occupant most likely situated in the seat or ascertained the existence of an empty seat. Sometimes as many as 1,000,000 such experiments are run before the neural network is sufficiently trained and tested so that it can differentiate among the several cases and output the correct decision with a very high probability. The data from each trial is combined to form a one-dimensional array of data called a vector. Of course, it must be realized that a neural network can also be trained to differentiate among additional cases, for example, a forward facing child seat. It can also be trained to recognize the existence of one or more boxes or other cargo within a truck trailer, cargo container, automobile trunk or railroad car, for example.

Considering now FIG. 9, the normalized data from the ultrasonic transducers 6, 8, 9 and 10, the seat track position detecting sensor 74, the reclining angle detecting sensor 57, from the weight sensor(s) 7, 76 and 97, from the heartbeat sensor 71, the capacitive sensor 78 and the motion sensor 73 are input to the neural network 65, and the neural network 65 is then trained on this data. More specifically, the neural network 65 adds up the normalized data from the ultrasonic transducers, from the seat track position detecting sensor 74, from the reclining angle detecting sensor 57, from the weight sensor(s) 7, 76 and 97, from the heartbeat sensor 71, from the capacitive sensor 78 and from the motion sensor 73 with each data point multiplied by an associated weight according to the conventional neural network process to determine correlation function (step S6 in FIG. 18).

Looking now at FIG. 19B, in this embodiment, 144 data points are appropriately interconnected at 25 connecting points of layer 1, and each data point is mutually correlated through the neural network training and weight determination process. The 144 data points consist of 138 measured data points from the ultrasonic transducers, the data (139th) from the seat track position detecting sensor 74, the data (140th) from the reclining angle detecting sensor 57, the data (141st) from the weight sensor(s) 7 or 76, the data ($142^{nd}$) from the heartbeat sensor 71, the data ($143^{rd}$) from the capacitive sensor and the data ($144^{th}$) from the motion sensor (the last three inputs are not shown on FIG. 19B. Each of the connecting points of the layer 1 has an appropriate threshold value, and if the sum of measured data exceeds the threshold value, each of the connecting points will output a signal to the connecting points of layer 2. Although the weight sensor input is shown as a single input, in general there will be a separate input from each weight sensor used. For example, if the seat has four seat supports and a strain measuring element is used on each support, what will be four data inputs to the neural network.

The connecting points of the layer 2 comprises 20 points, and the 25 connecting points of the layer 1 are appropriately interconnected as the connecting points of the layer 2. Similarly, each data is mutually correlated through the training process and weight determination as described above and in the above-referenced neural network texts. Each of the 20 connecting points of the layer 2 has an appropriate threshold value, and if the sum of measured data exceeds the threshold value, each of the connecting points will output a signal to the connecting points of layer 3.

The connecting points of the layer 3 comprises 3 points, and the connecting points of the layer 2 are interconnected at the connecting points of the layer 3 so that each data is mutually correlated as described above. If the sum of the outputs of the connecting points of layer 2 exceeds a threshold value, the connecting points of the latter 3 will output Logic values (100), (010), and (001) respectively, for example.

The neural network 65 recognizes the seated-state of a passenger A by training as described in several books on Neural Networks mentioned in the above referenced patents and patent applications. Then, after training the seated-state of the passenger A and developing the neural network weights, the system is tested. The training procedure and the test procedure of the neural network 65 will hereafter be described with a flowchart shown in FIG. 18.

The threshold value of each connecting point is determined by multiplying weight coefficients and summing up the results in sequence, and the aforementioned training process is to determine a weight coefficient Wj so that the threshold value (ai) is a previously determined output.

$$ai=\Sigma Wj\cdot Xj(j=1 \text{ to } N)$$

wherein Wj is the weight coefficient,

Xj is the data and

N is the number of samples.

Based on this result of the training, the neural network 65 generates the weights for the coefficients of the correlation function or the algorithm (step S7).

At the time the neural network 65 has learned a suitable number of patterns of the training data, the result of the training is tested by the test data. In the case where the rate of correct answers of the seated-state detecting unit based on this test data is unsatisfactory, the neural network is further trained and the test is repeated. In this embodiment, the test was performed based on about 600,000 test patterns. When the rate of correct test result answers was at about 98%, the training was ended. Further improvements to the ultrasonic occupant sensor system has now resulted in accuracies exceeding 98% and for the optical system exceeding 99%.

The neural network software operates as follows. The training data is used to determine the weights which multiply the values at the various nodes at the lower level when they are combined at nodes at a higher level. Once a sufficient number of iterations have been accomplished, the independent data is used to check the network. If the accuracy of the network using the independent data is lower than the last time that it was checked using the independent data, then the previous weights are substituted for the new weights and training of the network continues on a different path. Thus, although the independent data is not used to train the network, it does strongly affect the weights. It is therefore not really independent. Also, both the training data and the independent data are created so that all occupancy states are roughly equally represented. As a result, a third set of data is used which is structured to more closely represent the real world of vehicle occupancy. This third data set, the "real world" data, is then used to arrive at a figure as to the real accuracy of the system.

The neural network 65 has outputs 65*a*, 65*b* and 65*c* (FIG. 9). Each of the outputs 65*a*, 65*b* and 65*c* output a signal of logic 0 or 1 to a gate circuit or algorithm 77. Based on the signals from the outputs 65*a*, 65*b* and 65*c*, any one of these combination (100), (010) and (001) is obtained. In another preferred embodiment, all data for the empty seat was removed from the training set and the empty seat case was determined based on the output of the weight sensor alone. This simplifies the neural network and improves its accuracy.

In this embodiment, the output (001) correspond to a vacant seat, a seat occupied by an inanimate object or a seat occupied by a pet (VACANT), the output (010) corresponds to a rear facing child seat (RFCS) or an abnormally seated passenger (ASP or OOPA), and the output (100) corresponds to a normally seated passenger (NSP or FFA) or a forward facing child seat (FFCS).

The gate circuit (seated-state evaluation circuit) 77 can be implemented by an electronic circuit or by a computer algorithm by those skilled in the art and the details will not be presented here. The function of the gate circuit 77 is to remove the ambiguity that sometimes results when ultrasonic sensors and seat position sensors alone are used. This ambiguity is that it is sometimes difficult to differentiate between a rear facing child seat (RFCS) and an abnormally seated passenger (ASP), or between a normally seated passenger (NSP) and a forward facing child seat (FFCS). By the addition of one or more weight sensors in the function of acting as a switch when the weight is above or below 60 lbs., it has been found that this ambiguity can be eliminated. The gate circuit therefore takes into account the output of the neural network and also the weight from the weight sensor(s) as being above or below 60 lbs. and thereby separates the two cases just described and results in five discrete outputs.

The use of weight data must be heavily filtered since during driving conditions, especially on rough roads or during an accident, the weight sensors will give highly varying output. The weight sensors, therefore, are of little value during the period of time leading up to and including a crash and their influence must be minimized during this time period. One way of doing this is to average the data over a long period of time such as from 5 seconds to a minute or more.

Thus, the gate circuit 77 fulfills a role of outputting five kinds of seated-state evaluation signals, based on a combination of three kinds of evaluation signals from the neural network 65 and superimposed information from the weight sensor(s). The five seated-state evaluation signals are input to an airbag deployment determining circuit that is part of the airbag system and will not be described here. As disclosed in the above-referenced patents and patent applications, the output of this system can also be used to activate a variety of lights or alarms to indicate to the operator of the vehicle the seated state of the passenger. The system that has been here described for the passenger side is also applicable for the most part for the driver side.

An alternate and preferred method of accomplishing the function performed by the gate circuit is to use a modular neural network. In this case, the first level neural network is trained on determining whether the seat is occupied or vacant. The input to this neural network consists of all of the data points described above. Since the only function of this neural network is to ascertain occupancy, the accuracy of this neural network is very high. If this neural network determines that the seat is not vacant, then the second level neural network determines the occupancy state of the seat.

In this embodiment, although the neural network 65 has been employed as an evaluation circuit, the mapping data of the coefficients of a correlation function may also be implemented or transferred to a microcomputer to constitute the evaluation circuit (see Step S8 in FIG. 18).

According to the seated-state detecting unit of the present invention, the identification of a vacant seat (VACANT), a rear facing child seat (RFCS), a forward facing child seat (FFCS), a normally seated adult passenger (NSP), an abnormally seated adult passenger (ASP), can be reliably performed. Based on this identification, it is possible to control a component, system or subsystem in the vehicle. For example, a regulation valve which controls the inflation or deflation of an airbag may be controlled based on the evaluated identification of the occupant of the seat. This regulation valve may be of the digital or analog type. A digital regulation valve is one that is in either of two states, open or closed. The control of the flow is then accomplished by varying the time that the valve is open and closed, i.e., the duty cycle.

The neural network has been previously trained on a significant number of occupants of the passenger compartment. The number of such occupants depends strongly on whether the driver or the passenger seat is being analyzed. The variety of seating states or occupancies of the passenger seat is vastly greater than that of the driver seat. For the driver seat, a typical training set will consist of approximately 100 different vehicle occupancies. For the passenger seat, this number can exceed 1000. These numbers are used for illustration purposes only and will differ significantly from vehicle model to vehicle model. Of course many vectors of data will be taken for each occupancy as the occupant assumes different positions and postures.

The neural network is now used to determine which of the stored occupancies most closely corresponds to the measured data. The output of the neural network can be an index of the setup that was used during training that most closely matches the current measured state. This index can be used to locate stored information from the matched trained occupancy.

Information that has been stored for the trained occupancy typically includes the locus of the centers of the chest and head of the driver, as well as the approximate radius of pixels which is associated with this center to define the head area, for example. For the case of FIG. 8A, it is now known from this exercise where the head, chest, and perhaps the eyes and ears, of the driver are most likely to be located and also which pixels should be tracked in order to know the precise position of the driver's head and chest. What has been described above is the identification process for automobile occupancy and is only representative of the general process. A similar procedure, although usually simpler with fewer steps, is applicable to other vehicle monitoring cases.

The use of trainable pattern recognition technologies such as neural networks is an important part of the some of the inventions discloses herein particularly for the automobile occupancy case, although other non-trained pattern recognition systems such as fuzzy logic, correlation, Kalman filters, and sensor fusion can also be used. These technologies are implemented using computer programs to analyze the patterns of examples to determine the differences between different categories of objects. These computer programs are derived using a set of representative data collected during the training phase, called the training set. After training, the computer programs output a computer algorithm containing the rules permitting classification of the objects of interest based on the data obtained after installation in the vehicle. These rules, in the form of an algorithm, are implemented in the system that is mounted onto the vehicle. The determination of these rules is important to the pattern recognition techniques used in at least one of the inventions disclosed herein. Artificial neural networks using back propagation are thus far the most successful of the rule determination approaches, however, research is underway to develop systems with many of the advantages of back propagation neural networks, such as learning by training, without the disadvantages, such as the inability to understand the network and the possibility of not converging to the best solution. In particular, back propagation neural networks will frequently give an unreasonable response when presented with data than is not within the training data. It is well known that neural networks are good at interpolation but poor at extrapolation. A combined neural network fuzzy logic system, on the other hand, can substantially solve this problem. Additionally, there are many other neural network systems in addition to back propagation. In fact, one type of neural network may be optimum for identifying the contents of the passenger compartment and another for determining the location of the object dynamically.

Numerous books and articles, including more that 500 U.S. patents, describe neural networks in great detail and thus the theory and application of this technology is well known and will not be repeated here. Except in a few isolated situations where neural networks have been used to solve particular problems limited to engine control, for example, they have not previously been applied to automobiles, trucks or other vehicle monitoring situations.

The system generally used in the instant invention, therefore, for the determination of the presence of a rear facing child seat, an occupant, or an empty seat is the artificial neural network or a neural-fuzzy system. In this case, the network operates on the returned signals from a CCD or CMOS array as sensed by transducers 49, 50, 51 and 54 in FIG. 8D, for example. For the case of the front passenger seat, for example, through a training session, the system is taught to differentiate between the three cases. This is done by conducting a large number of experiments where available child seats are placed in numerous positions and orientations on the front passenger seat of the vehicle.

Once the network is determined, it is possible to examine the result to determine, from the algorithm created by the neural network software, the rules that were finally arrived at by the trial and error training technique. In that case, the rules can then be programmed into a microprocessor. Alternately, a neural computer can be used to implement the neural network directly. In either case, the implementation can be carried out by those skilled in the art of pattern recognition using neural networks. If a microprocessor is used, a memory device is also required to store the data from the analog to digital converters which digitize the data from the receiving transducers. On the other hand, if a neural network computer is used, the analog signal can be fed directly from the transducers to the neural network input nodes and an intermediate memory is not required. Memory of some type is needed to store the computer programs in the case of the microprocessor system and if the neural computer is used for more than one task, a memory is needed to store the network specific values associated with each task.

A review of the literature on neural networks yields the conclusion that the use of such a large training set is unique in the neural network field. The rule of thumb for neural networks is that there must be at least three training cases for each network weight. Thus, for example, if a neural network has 156 input nodes, 10 first hidden layer nodes, 5 second hidden layer nodes, and one output node this results in a total of 1,622 weights. According to conventional theory 5000 training examples should be sufficient. It is highly unexpected, therefore, that greater accuracy would be achieved through 100 times that many cases. It is thus not obvious and cannot be deduced from the neural network literature that the accuracy of the system will improve substantially as the size of the training database increases even to tens of thousands of cases. It is also not obvious looking at the plots of the vectors obtained using ultrasonic transducers that increasing the number of tests or the database size will have such a significant effect on the system accuracy. Each of the vectors is typically a rather course plot with a few significant peaks and valleys. Since the spatial resolution of an ultrasonic system is typically about 2 to 4 inches, it is once again surprising that such a large database is required to achieve significant accuracy improvements.

The back propagation neural network is a very successful general-purpose network. However, for some applications, there are other neural network architectures that can perform better. If it has been found, for example, that a parallel network as described above results in a significant improvement in the system, then, it is likely that the particular neural network architecture chosen has not been successful in retrieving all of the information that is present in the data. In such a case, an RCE, Stochastic, Logicon Projection, cellular, support vector machine or one of the other approximately 30 types of neural network architectures can be tried to see if the results improve. This parallel network test, therefore, is a valuable tool for determining the degree to which the current neural network is capable of using efficiently the available data.

One of the salient features of neural networks is their ability of find patterns in data regardless of its source. Neural networks work well with data from ultrasonic sensors, optical imagers, strain gage and bladder weight sensors, temperature sensors, chemical sensors, radiation sensors, pressure sensors, electric field sensors, capacitance based sensors, any other wave sensors including the entire electromagnetic spectrum, etc. If data from any sensors can be digitized and fed into a neural network generating program and if there is information in the pattern of the data then neural networks can be a viable method of identifying those patterns and correlating them with a desired output function. Note that although the inventions disclosed herein preferably use neural networks and combination neural networks to be described next, these inventions are not limited to this form or method of pattern recognition. The major breakthrough in occupant sensing came with the recognition by the current assignee that ordinary analysis using mathematical equations where the researcher looks at the data and attempts, based on the principles of statistics, engineering or physics, to derive the relevant relationships between the data and the category and location of an occupying item, is not the proper approach and that pattern recognition technologies should be used. This is believed to be the first use of such pattern recognition technologies in the automobile safety and monitoring fields with the exception that neural networks have been used by the current assignee and others as the basis of a crash sensor algorithm and by certain automobile manufacturers for engine control. Note for many monitoring situations in truck trailers, cargo containers and railroad cars where questions such as “is there anything in the vehicle?” are asked, neural networks may not always be required.

11.2 Combination Neural Networks

The technique that was described above for the determination of the location of an occupant during panic or braking pre-crash situations involved the use of a modular neural network. In that case, one neural network was used to determine the occupancy state of the vehicle and one or more neural networks were used to determine the location of the occupant within the vehicle. The method of designing a system utilizing multiple neural networks is a key teaching of the present invention. When this idea is generalized, many potential combinations of multiple neural network architectures become possible. Some of these will now be discussed.

One of the earliest attempts to use multiple neural networks was to combine different networks trained differently but on substantially the same data under the theory that the errors which affect the accuracy of one network would be independent of the errors which affect the accuracy of another network. For example, for a system containing four ultrasonic transducers, four neural networks could be trained each using a different subset of the data from the four transducers. Thus, if the transducers are arbitrarily labeled A, B, C and D, the first neural network would be trained on data from A, B and C. The second neural network would be trained on data from B, C, and D etc. This technique has not met with a significant success since it is an attempt to mask errors in the data rather than to eliminate them. Nevertheless, such a system does perform marginally better in some situations compared to a single network using data from all four transducers. The penalty for using such a system is that the computational time is increased by approximately a factor of three. This significantly affects the cost of the system installed in a vehicle.

An alternate method of obtaining some of the advantages of the parallel neural network architecture described above, is to form a single neural network but where the nodes of one or more of the hidden layers are not all connected to all of the input nodes. Alternately, if the second hidden layer is chosen, all of the notes from the previous hidden layer are not connected to all of the nodes of the subsequent layer. The alternate groups of hidden layer nodes can then be fed to different output notes and the results of the output nodes combined, either through a neural network training process into a single decision or a voting process. This latter approach retains most of the advantages of the parallel neural network while substantially reducing the computational complexity.

The fundamental problem with parallel networks is that they focus on achieving reliability or accuracy by redundancy rather than by improving the neural network architecture itself or the quality of the data being used. They also increase the cost of the final vehicle installed systems. Alternately, modular neural networks improve the accuracy of the system by dividing up the tasks. For example, if a system is to be designed to determine the type of tree or the type of animal in a particular scene, the modular approach would be to first determine whether the object of interest is an animal or a tree and then use separate neural networks to determine the type of tree and the type of animal. When a human looks at a tree, he is not asking himself “is that a tiger or a monkey?”. Modular neural network systems are efficient since once the categorization decision is made, e.g., the seat is occupied by forward facing human, the location of that object can be determined more accurately and without requiring increased computational resources.

Another example where modular neural networks have proven valuable is to provide a means for separating “normal cases” from “special cases”. It has been found that in some cases, the vast majority of the data falls into what might be termed “normal” cases that are easily identified with a neural network. The balance of the cases cause the neural network considerable difficulty, however, there are identifiable characteristics of the special cases that permits them to be separated from the normal cases and dealt with separately. Various types of human intelligence rules can be used, in addition to a neural network, to perform this separation including fuzzy logic, statistical filtering using the average class vector of normal cases, the vector standard deviation, and threshold where a fuzzy logic network is used to determine chance of a vector belonging to a certain class. If the chance is below a threshold, the standard neural network is used and if above the threshold, the special one is used.

Mean-Variance calculations, Fuzzy Logic, Stochastic, and Genetic Algorithm networks, and combinations thereof such as Neuro-Fuzzy systems are other technologies considered in designing an appropriate system. During the process of designing a system to be adapted to a particular vehicle, many different neural networks and other pattern recognition architectures are considered including those mentioned above. The particular choice of architecture is frequently determined on a trial and error basis by the system designer in many cases using the combination neural network CAD software from International Scientific Research Inc. (ISR). Although the parallel architecture system described above has not proven to be in general beneficial, one version of this architecture has shown some promise. It is known that when training a neural network, that as the training process proceeds, the accuracy of the decision process improves for the training and independent databases. It is also known that the ability of the network to generalize suffers. That is, when the network is presented with a system which is similar to some case in the database but still with some significant differences, the network may make the proper decision in the early stages of training, but the wrong decisions after the network has become fully trained. This is sometimes called the young network vs. old network dilemma. In some cases, therefore, using an old network in parallel with a young network can retain some of the advantages of both networks, that is, the high accuracy of the old network coupled with the greater generality of the young network. Once again, the choice of any of these particular techniques is part of the process of designing a system to be adapted to a particular vehicle and is a prime subject of at least one of the inventions disclosed herein. The particular combination of tools used depends on the particular application and the experience of the system designer.

It has been found that the accuracy of the neural network pattern recognition system can be substantially enhanced if the problem is broken up into several problems. Thus, for example, rather than deciding that the airbag should be deployed or not using a single neural network and inputting all of the available data, the accuracy is improved it is first decided whether the data is good, then whether the seat is empty or occupied and then whether it is occupied by an adult or a child. Finally, if the decisions say that there is a forward facing adult occupying the seat, then the final level of neural network determines the location of the adult. Once the location is determined, a non-neural network algorithm can determine whether to enable deployment of the restraint system. The process of using multiple layers of neural networks is called modular neural networks and when other features are added, it is called combination neural networks.

An example of a combination neural network is shown generally at 275 in FIG. 37. The process begins at 276 with the acquisition of new data. This could be from a variety of sources such as multiple cameras, ultrasonic sensors, capacitive sensors, other electromagnetic field monitoring sensors, and other electric and/or magnetic or acoustic-based wave sensors, etc. Additionally, the data can come from other sources such as weight or other morphological characteristic detecting sensors, occupant-presence detecting sensors, chemical sensors or seat position sensors. The data is preprocessed and fed into a neural network at 277 where the type of occupying item is determined. If the neural network determines that the type of occupying item is either an empty seat or a rear facing child seat, control is passed to box 284 via line 285 and the decision is made to disable the airbag. It is envisioned though that instead of disabling deployment if a rear-facing child seat is present, a depowered deployment, a late deployment or an oriented deployment may be made if it is determined that such a deployment would more likely prevent injury to the child in the child seat than cause harm.

In the event that the occupant type classification neural network 277 has determined that the seat is occupied by something other than a rear-facing child seat, control is transferred to neural network 278, occupant size classification, which has the task of determining whether the occupant is a small, medium or large occupant. It has been found that the accuracy of the position determination is usually improved if the occupant size is first classified and then a special occupant position neural network is used to monitor the position of the occupant relative to airbag module. Nevertheless, the order of applying the neural networks, e.g., the size classification prior to the position classification, is not critical to the practice of the invention.

Once the size of the occupant has been classified by a neural network at 278, control is passed to neural networks 279, 280 or 281 depending on the output size determination from neural network 278. The chosen network then determines the position of the occupant and that position determination is fed to the feedback delay algorithm 282 via line 283 and to the decision-to-disable algorithm 284. The feedback delay 282 can be a function of occupant size as well as the rate at which data is acquired. The results of the feedback delay algorithm 282 are fed to the appropriate large, medium or small occupant position neural networks 279, 280 or 281. It has been found that if the previous position of the occupant is used as input to the neural network, a more accurate estimation of the present position results. In some cases, multiple previous position values are fed instead of only the most recent value. This is determined for a particular application and programmed as part as of the feedback delay algorithm 266. After the decision to disable has been made in algorithm 284, control is returned to algorithm 276 via line 286 to acquire new data.

FIG. 37 is a singular example of an infinite variety combination neural networks that can be employed. This case combines a modular neural network structure with serial and parallel architectures. Feedback has also been used in a similar manner as a cellular neural network. Other examples include situations where imprecise data requires the input data to be divided into subsets and fed to a series of neural networks operating in parallel. The output of these neural networks can then be combined in a voting or another analytical manner to determine the final decision, e.g., whether and how to deploy the occupant protection apparatus. In other cases, particular transducers are associated with particular neural networks and the data combined after initial process by those dedicated neural networks. In still other cases, as discussed above, an initial neural network is used to determine whether the data to be analyzed is part of the same universe of data that has been used to train the networks. Sometimes transducers provide erroneous data and sometimes the wiring in the vehicle can be a source of noise that can corrupt the data. Similarly, a neural network is sometimes used as part of the decision to disable activity to compare results over time to again attempt to eliminate spurious false decisions. Thus, an initial determination as to whether the data is consistent with data on which the neural network is trained is often an advisable step.

In each of the boxes in FIG. 37, with the exception of the decision-to-disable box 284 and the feedback delay box 282, it has been assumed that each box would be a neural network. In many cases, a deterministic algorithm can be used, and in other cases correlation analysis, fuzzy logic or neural fuzzy systems, a support vector machine, a cellular neural network or any other pattern recognition algorithm or system are appropriate. Therefore, a combination neural network can include non-neural network analytical tasks.

FIG. 37 illustrates the use of a combination neural network to determine whether and how to deploy or disable an airbag. It must be appreciated that the same architecture may be used to determine whether and how to deploy any type of occupant protection apparatus as defined above. More generally, the architecture shown in FIG. 37 may be used simply to determine the occupancy state of the vehicle, e.g., the type, size and position of the occupant. A determination of the occupancy state of the vehicle includes a determination of any or all of the occupant's type, identification, size, position, health state, etc. The occupancy state can then be used to aid in the control of any vehicular component, system or subsystem.

Figure 51:
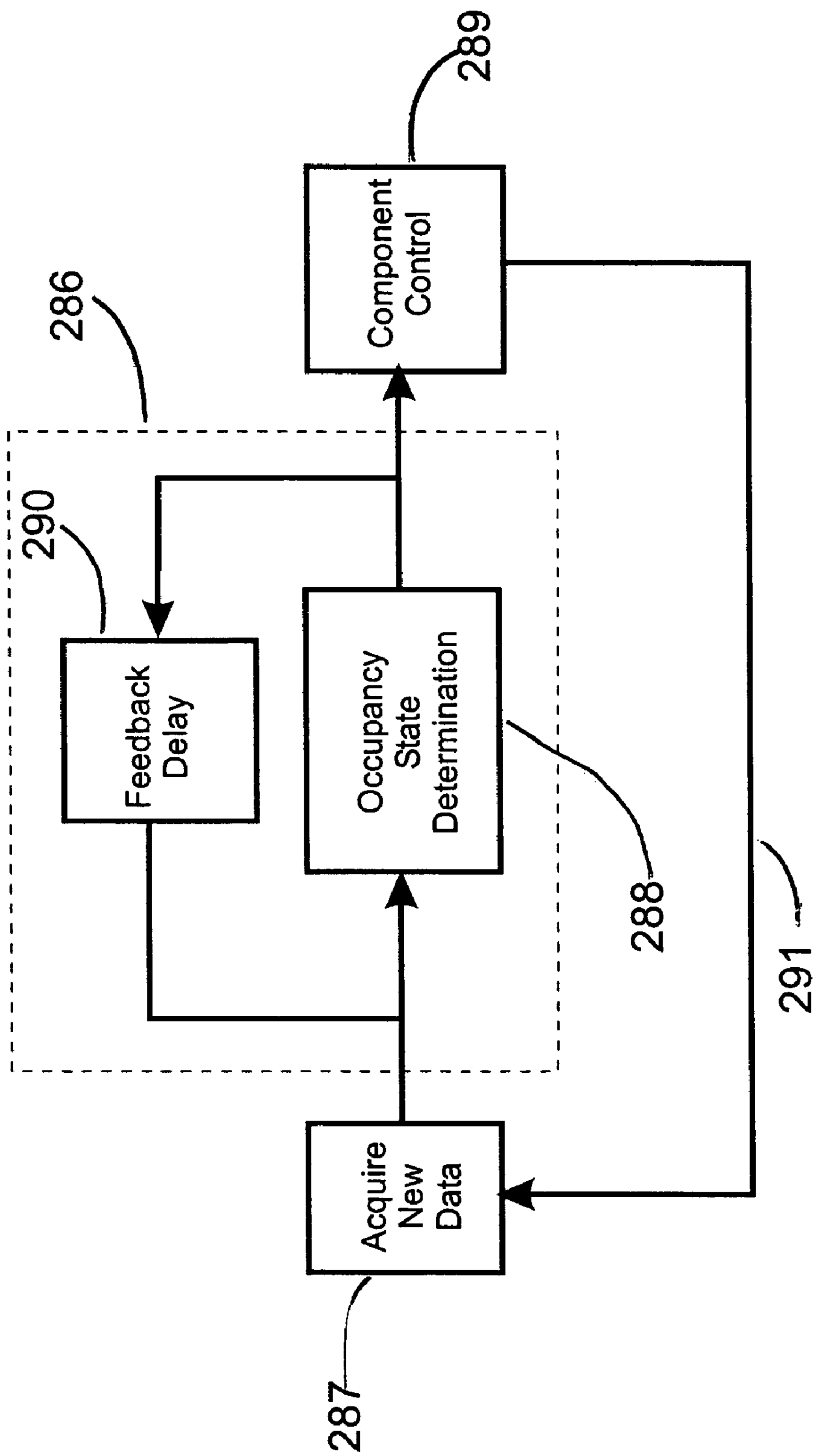
FIG. 51 is a schematic illustration of a method in which the occupancy state of a seat of a vehicle is determined using a combination neural network in accordance with the invention.

FIG. 51 shows a more general schematic illustration of the use of a combination neural network, or a combination pattern recognition network, designated 286 in accordance with the invention. Data is acquired at 287 and input into the occupancy state determination unit, i.e., the combination neural network, which provides an indication of the occupancy state of the seat. Once the occupancy state is determined at 288, it is provided to the component control unit 289 to effect control of the component. A feedback delay 290 is provided to enable the determination of the occupancy state from one instance to be used by the combination neural network at a subsequent instance. After the component control 289 is affected, the process begins anew by acquiring new data via line 291.

FIG. 52 shows a schematic illustration of the use of a combination neural network in accordance with the invention designated 292 in which the occupancy state determination entails an identification of the occupying item by one neural network and a determination of the position of the occupying item by one or more other neural network. Data is acquired at 293 and input into the identification neural network 294 which is trained to provide the identification of the occupying item of the seat based on at least some of the data, i.e., data from one or more transducers might have been deemed of nominal relevance for the identification determination and thus the identification neural network 294 was not trained on such data. Once the identification of the occupying item is determined at 294, it is provided to one of the position neural networks 295 which is trained to provide an indication of the position of the occupying item, e.g., relative to the occupant protection apparatus, based on at least some of the data. That is, data from one or more transducers, although possibly useful for the identification neural network 294, might have been deemed of nominal relevance for the position neural network 295 and thus the position neural network was not trained on such data. Once the identification and position of the occupying item are determined, they are provided to the component control unit 296 to effect control of the component based on one of these determinations or both. A feedback delay 297 is provided for the identification neural network 294 to enable the determination of the occupying item's identification from one instance to be used by the identification neural network 294 at a subsequent instance. A feedback delay 298 is provided for the position neural network 295 to enable the determination of the occupying item's position from one instance to be used by the position neural network 295 at a subsequent instance. After the component control 296 is effected, the process begins anew by acquiring new data via line 299. The identification neural network 294, the position determination neural network 295 and feedback delays 297 and 298 combine to constitute the combination neural network 292 in this embodiment (shown in dotted lines).

The data used by the identification neural network 294 to determine the identification of the occupying item may be different than the data used by the position determination neural network 295 to determine the position of the occupying item. That is, data from a different set of transducers may be applied by the identification neural network 294 than by the position determination neural network. Instead of a single position determination neural network as schematically shown in FIG. 52, a plurality of position determination neural networks may be used depending on the identification of the occupying item. Also, a size determination neural network may be incorporated into the combination neural network after the identification neural network 294 and then optionally, a plurality of the position determination neural networks as shown in the embodiment of FIG. 37.

Using the feedback delays 297 and 298, it is possible to use the position determination from position neural network 295 as input into the identification neural network 294. Note that any or all of the neural networks may have associated pre and post processors. For example, in some cases, the input data to a particular neural network can be pruned to eliminate data points that are not relevant to the decision making of a particular neural network.

FIG. 53 shows a schematic illustration of the use of a combination neural network in accordance with the invention designated 300 in which the occupancy state determination entails an initial determination as to the quality of the data obtained by the transducers and intended for input into a main occupancy state determination neural network. Data from the transducers is acquired at 301 and input into a gating neural network 302 which is trained to allow only data which agrees with or is similar to data on which a main neural network 303 is trained. If the data provided by transducers has been corrupted and thus deviates from data on which the main neural network 303 has been trained, the gating neural network 302 will reject it and request new data via line 301 from the transducers. Thus, gating neural network 302 serves as a gate to prevent data which might cause an incorrect occupancy state determination from entering as input to the main neural network 303. If the gating neural network 302 determines that the data is reasonable, it allows the data to pass as input to the main neural network 303 which is trained to determine the occupancy state. Once the occupancy state is determined, it is provided to the component control unit 304 to effect control of the component. A feedback delay 306 is provided for the gating neural network 302 to enable the indication of unreasonable data from one instance to be used by the gating neural network 302 at a subsequent instance. A feedback delay 305 is provided for the main neural network 303 to enable the determination of the occupancy state from one instance to be used by the main neural network 303 at a subsequent instance. After the component control 304 is effected, the process begins anew by acquiring new data via line 307. The gating neural network 302, the main neural network 303 and optional feedback delays 305 and 306 combine to constitute the combination neural network 300 in this embodiment (shown in dotted lines).

Instead of a single occupancy state neural network as schematically shown in FIG. 53, the various combinations of neural networks disclosed herein for occupancy state determination may be used. Similarly, the use of a gating neural network, or a fuzzy logic algorithm or other algorithm, may be incorporated into any of the combination neural networks disclosed herein to prevent unreasonable data from entering into any of the neural networks in any of the combination neural networks.

Figure 54:
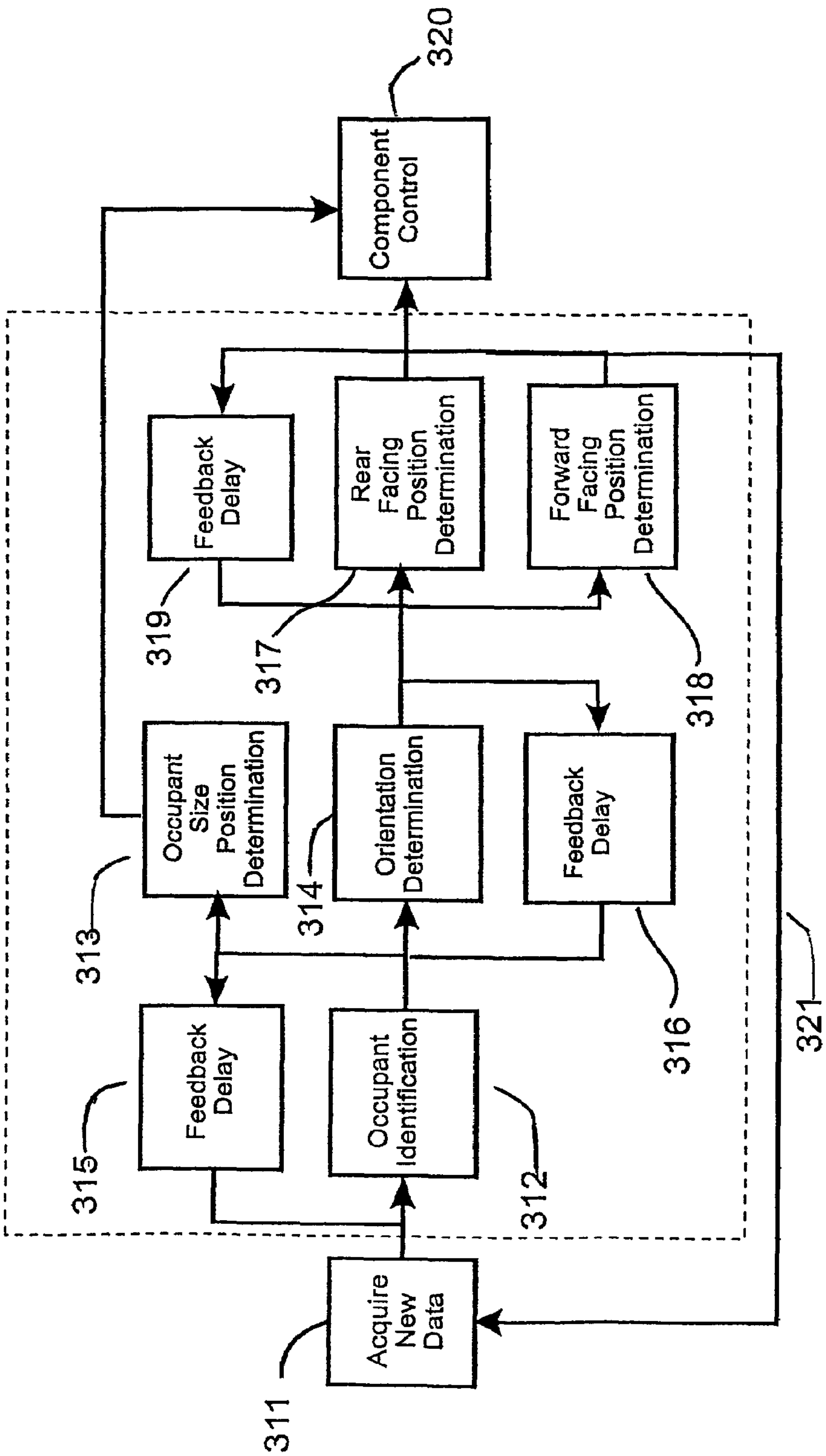
FIG. 54 is a schematic illustration of another method in which the occupancy state of a seat of a vehicle is determined, in particular, for the case when a child seat is present, using a combination neural network in accordance with the invention.

FIG. 54 shows a schematic illustration of the use of a combination neural network in accordance with the invention designated 310 with a particular emphasis on determining the orientation and position of a child seat. Data is acquired at 311 and input into the identification neural network 312 which is trained to provide the identification of the occupying item of the seat based on at least some of the data. If the occupying item is other than a child seat, the process is directed to size/position determination neural network 313 which is trained to determine the size and position of the occupying item and pass this determination to the component control 320 to enable control of the component to be effected based on the identification, size and/or position of the occupying item. Note that the size/position determination neural network may itself be a combination neural network.

When the occupying item is identified as a child seat, the process passes to orientation determination neural network 314 which is trained to provide an indication of the orientation of the child seat, i.e., whether it is rear-facing or forward-facing, based on at least some of the data. That is, data from one or more transducers, although possibly useful for the identification neural network 312, might have been deemed of nominal relevance for the orientation determination neural network 314 and thus the orientation neural network was not trained on such data. Once the orientation of the child seat is determined, control is then passed to position determination neural networks 317 and 318 depending on the orientation determination from neural network 314. The chosen network then determines the position of the child seat and that position determination is passed to component control 320 to effect control of the component.

A feedback delay 315 can be provided for the identification neural network 312 to enable the determination of the occupying item's identification from one instance to be used by the identification neural network 312 at a subsequent instance. A feedback delay 316 is provided for the orientation determination neural network 314 to enable the determination of the child seat's orientation from one instance to be used by the orientation determination neural network 314 at a subsequent instance. A feedback delay 319 can be provided for the position determination neural networks 317 and 318 to enable the position of the child seat from one instance to be used by the respective position determination neural networks 317 and 318 at a subsequent instance. After the component control 320 is effected, the process begins anew by acquiring new data via line 321. The identification neural network 312, the position/size determination neural network 313, the child seat orientation determination neural network 314, the position determination neural networks 317 and 318 and the feedback delays 315, 316 and 319 combine to constitute the combination neural network 310 in this embodiment (shown in dotted lines).

The data used by the identification neural network 312 to determine the identification of the occupying item, the data used by the position/size determination neural network 313 to determine the position of the occupying item, the data used by the orientation determination neural network 314, the data used by the position determination neural networks 317 and 318 may all be different from one another. For example, data from a different set of transducers may be applied by the identification neural network 312 than by the position/size determination neural network 313. As mentioned above, instead of a single position/size determination neural network as schematically shown in FIG. 52, a plurality of position determination neural networks may be used depending on the identification of the occupying item.

Using feedback delays 315, 316 and 319, it is possible to provide either upstream or downstream feedback from any of the neural networks to any of the other neural networks.

Figure 55:
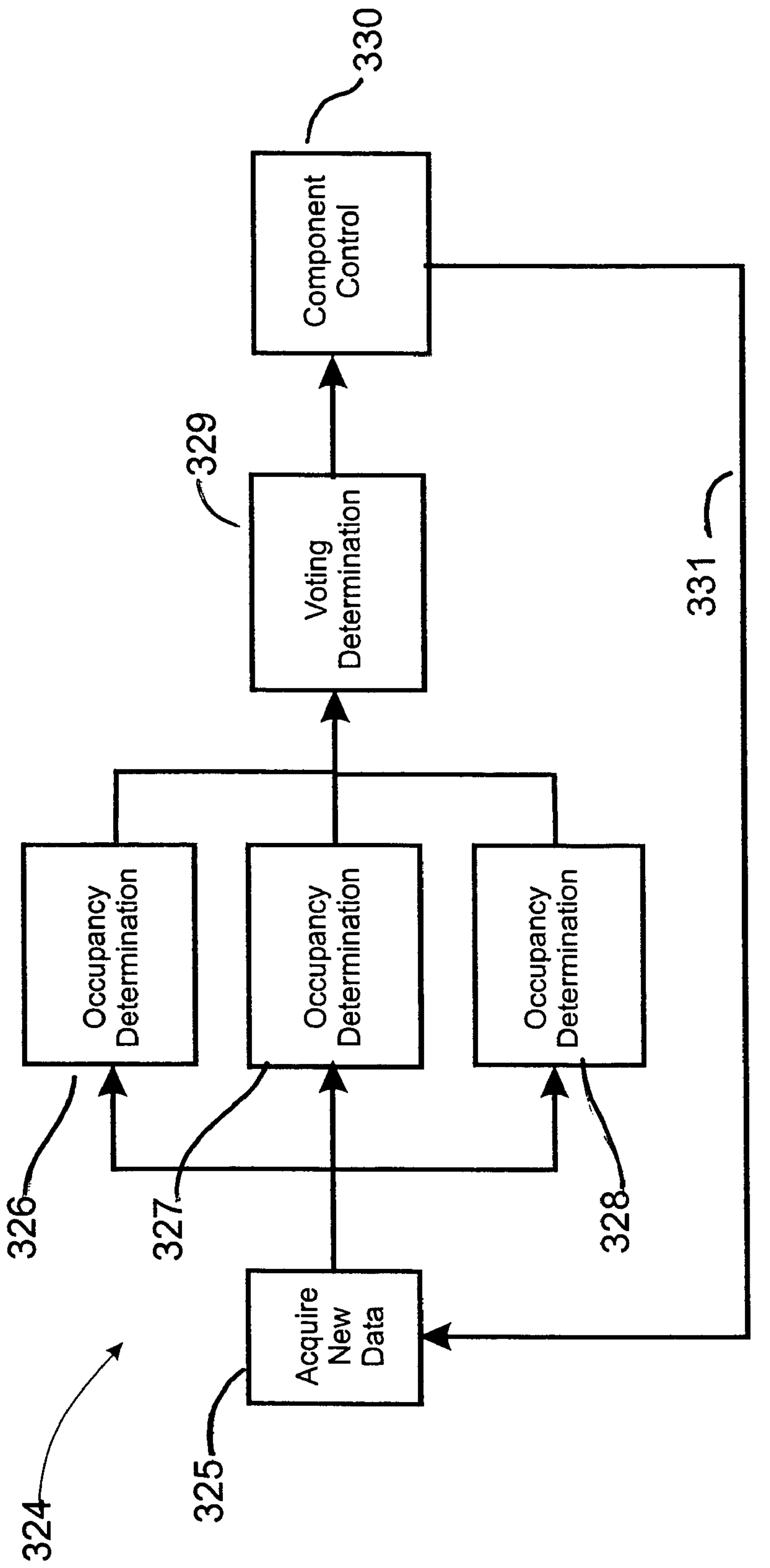
FIG. 55 is a schematic illustration of a method in which the occupancy state of a seat of a vehicle is determined using a combination neural network in accordance with the invention, in particular, an ensemble arrangement of neural networks.

FIG. 55 shows a schematic illustration of the use of an ensemble type of combination neural network in accordance with the invention designated 324. Data from the transducers is acquired at 325 and three streams of data are created. Each stream of data contains data from a different subset of transducers. Each stream of data is input into a respective occupancy determination neural network 326, 327 and 328, each of which is trained to determine the occupancy state based on the data from the respective subset of transducers. Once the occupancy state is determined by each neural network 326, 327 and 328, it is provided to a voting determination system 329 to consider the determination of the occupancy states from the occupancy determination neural networks 326, 327 and 328 and determine the most reasonable occupancy state which is passed to the component control unit 330 to effect control of the component. Ideally, the occupancy state determined by each neural network 326, 327 and 328 will be the same and such would be passed to the component control unit 330. However, in the event they differ, the voting determination system 329 weighs the occupancy states determined by each neural network 326, 327 and 328 and "votes" for one. For example, if two neural networks 326 and 327 provided the same occupancy state while neural network 328 provides a different occupancy state, the voting determination system 329 could be designed to accept the occupancy state from the majority of neural networks, in this case, that of neural networks 326 and 327. A feedback delay may be provided for each neural network 326, 327 and 328 as well as from the voting determination system 329 to each neural network 326, 327 and 328. The voting determination system 329 may itself be a neural network. After the component control unit 330 is effected, the process begins anew by acquiring new data via line 331.

Instead of the single occupancy state neural networks 326, 327 and 328 as schematically shown in FIG. 55, the various combinations of neural networks disclosed herein for occupancy state determination may be used.

The discussion above is primarily meant to illustrate the tremendous power and flexibility that combined neural networks provide. To apply this technology, the researcher usually begins with a simple network of neural networks and determines the accuracy of the system based on the real world database. Normally, even a simple structure, provided sufficient transducers or sensors are chosen, will yield accuracies above 98% and frequently above 99%. The networks then have to be biased so that virtually 100% accuracy is achieved for a normally seated forward seated adult since that is the most common seated state and any degradation for that condition could cause the airbag to be suppressed and result in more injuries rather than less injuries. In biasing the results for that case, the results of other cases are usually reduced at a multiple. Thus, to go from 99.9% for the normally facing adult to 100% might cause the rear facing child seat accuracy to go from 99% to 98.6%. For each 0.1% gain for the normally seated adult, a 0.4% loss thus resulted for the rear facing child seat. Through trial and error and using optimization software from ISR, the combination network now begins to become more complicated as the last few tenths of a percent accuracy is obtained for the remaining seated states. Note that no other system known to the current assignee achieves accuracies in the 98% to 99% range and many are below 95%. 11.3 Interpretation of other occupant states Once a vehicle interior monitoring system employing a sophisticated pattern recognition system, such as a neural network or modular neural network, is in place, it is possible to monitor the motions of the driver over time and determine if he is falling asleep or has otherwise become incapacitated. In such an event, the vehicle can be caused to respond in a number of different ways. One such system is illustrated in FIG. 6 and consists of a monitoring system having transducers 8 and 9 plus microprocessor 20 programmed to compare the motions of the driver over time and trained to recognize changes in behavior representative of becoming incapacitated e.g., the eyes blinking erratically and remaining closed for ever longer periods of time. If the system determines that there is a reasonable probability that the driver has fallen asleep, for example, then it can turn on a warning light shown here as 41 or send a warning sound. If the driver fails to respond to the warning by pushing a button 43, for example, then the horn and lights can be operated in a manner to warn other vehicles and the vehicle brought to a stop. One novel approach, not shown, would be to use the horn as the button 43. For a momentary depression of the horn, for this case, the horn would not sound. Other responses can also be programmed and other tests of driver attentiveness can be used, without resorting to attempting to monitor the motions of the driver's eyes that would signify that the driver was alert. These other responses can include an input to the steering wheel, motion of the head, blinking or other motion of the eyes etc. In fact, by testing a large representative sample of the population of drivers, the range of alert responses to the warning light and/or sound can be compared to the lack of response of a sleeping driver and thereby the state of attentiveness determined.

An even more sophisticated system of monitoring the behavior of the driver is to track his eye motions using such techniques as are described in: Freidman et al., U.S. Pat. No. 4,648,052 "Eye Tracker Communication System"; Heyner et al., U.S. Pat. No. 4,720,189 "Eye Position Sensor"; Hutchinson, U.S. Pat. No. 4,836,670 "Eye Movement Detector"; and Hutchinson, U.S. Pat. No. 4,950,069 "Eye Movement Detector With Improved Calibration and Speed" as well as U.S. Pat. Nos. 5,008,946 and 5,305,012 referenced above. The detection of the impaired driver in particular can be best determined by these techniques. These systems use pattern recognition techniques plus, in many cases, the transmitter and CCD receivers must be appropriately located so that the reflection off of the cornea of the driver's eyes can be detected as discussed in the above-referenced patents. The size of the CCD arrays used herein permits their location, sometimes in conjunction with a reflective windshield, where this corneal reflection can be detected with some difficulty. Sunglasses or other items can interfere with this process.

In a similar manner as described in these patents, the motion of the driver's eyes can be used to control various systems in the vehicle permitting hands off control of the entertainment system, heating and air conditioning system or all of the other systems described above. Although some of these systems have been described in the afore-mentioned patents, none have made use of neural networks for interpreting the eye movements. The use of particular IR wavelengths permits the monitoring of the driver's eyes without the driver knowing that this is occurring. IR with a wave length above about 1.1 microns, however, is blocked by glass eyeglasses and thus other invisible frequencies may be required.

The use of the windshield as a reflector is particularly useful when monitoring the eyes of the driver by means of a camera mounted on the rear view mirror assembly. The reflections from the cornea are highly directional, as every driver knows whose lights have reflected off the eyes of an animal on the roadway. For this to be effective, the eyes of the driver must be looking at the radiation source. Since the driver is presumably looking through the windshield, the source of the radiation must also come from the windshield and the reflections from the driver's eyes must also be in the direction of the windshield. Using this technique, the time that the driver spends looking through the windshield can be monitored and if that time drops below some threshold value, it can be presumed that the driver is not attentive and may be sleeping or otherwise incapacitated.

The location of the eyes of the driver, for this application, is greatly facilitated by the teachings of the inventions as described above. Although others have suggested the use of eye motions and corneal reflections for drowsiness determination, up until now there has not been a practical method for locating the driver's eyes with sufficient precision and reliability as to render this technique practical. Also, although sunglasses might defeat such a system, most drowsiness caused accidents happen at night when it is less likely that sunglasses are worn.

11.4 Combining Occupant Monitoring and Car Monitoring

There is an inertial measurement unit (IMU) under development by the current assignee that will have the equivalent accuracy as an expensive military IMU but will sell for under $200 in sufficient volume. This IMU can contain three accelerometers and three gyroscopes and permit a very accurate tracking of the motion of the vehicle in three dimensions. The main purposes of this device will be replace all non-crush zone crash and rollover sensors, chassis control gyros etc. with a single device that will be up to 100 times more accurate. Another key application will be in vehicle guidance systems and it will eventually form the basis of a system that will know exactly where the vehicle is on the face of the earth within a few centimeters.

An additional use will be to monitor the motion of the vehicle in comparison with that of an occupant. From this, several facts can be gained. First, if the occupant moves in such a manner that is not caused by the motion of the vehicle, then the occupant must be alive. Conversely, if the driver motion is only caused by the vehicle, then perhaps he or she is asleep or otherwise incapacitated. A given driver will usually have a characteristic manner of operating the steering wheel to compensate for drift on the road. If this manner changes, then again, the occupant may be falling asleep. If the motion of the occupant seems to be restrained relative to what a free body would do, then there would be an indication that the seatbelt is in use, and if not, that the seatbelt is not in use or that it is too slack and needs to be retracted somewhat.

11.5 Continuous Tracking

Previously, the output of the pattern recognition system, the neural network or combined neural network, has been the zone that the occupant is occupying. This is a somewhat difficult task for the neural network since it calls for a discontinuous output for a continuous input. If the occupant is in the safe seating zone, then the output may be 0, for example and 1 if he moves into the at-risk zone. Thus, for a small motion there is a big change in output. On the other hand, as long as the occupant remains in the safe seating zone, he or she can move substantially with no change in output. A better method is to have as the output the position of the occupant from the airbag, for example, which is a continuous function and easier for the neural network to handle. This also provides for a meaningful output that permits, for example, the projection or extrapolation of the occupant's position forward in time and thus a prediction as to when he or she will enter another zone. This training of a neural network using a continuous position function is an important teaching of at least one of the inventions disclosed herein.

To do continuous tracking, however, the neural network must be trained on data that states the occupant location rather than the zone that he or she is occupying. This requires that this data be measured by a different system than is being used to monitor the occupant. Various electromagnetic systems have been tried but they tend to get foiled by the presence of metal in the interior passenger compartment. Ultrasonic systems have provided such information as have various optical systems. Tracking with a stereo camera arrangement using black light for illumination, for example is one technique. The occupant can even be illuminated with a UV point of light to make displacement easier to measure.

In addition, when multiple cameras are used in the final system, a separate tracking system may not be required. The normalization process conducted above, for example, created a displacement value for each of the CCD or CMOS arrays in the assemblies 49, 50, 52, 52, and 54, (FIG. 8A) or a subset thereof, which can now be used in reverse to find the precise location of the driver's head or chest, for example, relative to the known location of the airbag. From the vehicle geometry, and the head and chest location information, a choice can now be made as to whether to track the head or chest for dynamic out-of-position analysis.

Tracking of the motion of the occupant's head or chest can be done using a variety of techniques. One preferred technique is to use differential motion, that is, by subtracting the current image from the previous image to determine which pixels have changed in value and by looking at the leading edge of the changed pixels and the width of the changed pixel field, a measurement of the movement of the pixels of interest, and thus the driver, can be readily accomplished. Alternately, a correlation function can be derived which correlates the pixels in the known initial position of the head, for example, with pixels that were derived from the latest image. The displacement of the center of the correlation pixels would represent the motion of the head of the occupant. Naturally, a wide variety of other techniques will now be obvious to those skilled in the art.

In a method disclosed above for tracking motion of a vehicular occupant's head or chest in accordance with the inventions, electromagnetic waves are transmitted toward the occupant from at least one location, a first image of the interior of the passenger compartment is obtained from each location, the first image being represented by a matrix of pixels, and electromagnetic waves are transmitted toward the occupant from the same location(s) at a subsequent time and an additional image of the interior of the passenger compartment is obtained from each location, the additional image being represented by a matrix of pixels. The additional image is subtracted from the first image to determine which pixels have changed in value. A leading edge of the changed pixels and a width of a field of the changed pixels is determined to thereby determine movement of the occupant from the time between which the first and additional images were taken. The first image is replaced by the additional image and the steps of obtaining an additional image and subtracting the additional image from the first image are repeated such that progressive motion of the occupant is attained.

Other methods of continuous tracking include placing an ultrasonic transducer in the seatback and also on the airbag, each providing a measure of the displacement of the occupant. Knowledge of vehicle geometry is required here, such as the position of the seat. The thickness of the occupant can then be calculated and two measures of position are available. Other ranging systems such as optical range meters and stereo or distance by focusing cameras could be used in place of the ultrasonic sensors. Another system involves the placement on the occupant of a resonator or reflector such as a radar reflector, resonating antenna, or an RFID or SAW tag. In several of these cases, two receivers and triangulation based on the time of arrival of the returned pulses may be required.

Tracking can also be done during data collection using the same or a different system comprising structured light. If a separate tracking system is used, the structured light can be projected onto the object at time intervals in-between the taking of data with the main system. In this manner, the tracking system would not interfere with the image being recorded by the primary system. All of the methods of obtaining three-dimensional information described above can be implemented in a separate tracking system.

11.6 Preprocessing

Another important feature of a system, developed in accordance with the teachings of at least one of the inventions disclosed herein, is the realization that motion of the vehicle can be used in a novel manner to substantially increase the accuracy of the system. Ultrasonic waves reflect on most objects as light off a mirror. This is due to the relatively long wavelength of ultrasound as compared with light. As a result, certain reflections can overwhelm the receiver and reduce the available information. When readings are taken while the occupant and/or the vehicle is in motion, and these readings averaged over several transmission/reception cycles, the motion of the occupant and vehicle causes various surfaces to change their angular orientation slightly but enough to change the reflective pattern and reduce this mirror effect. The net effect is that the average of several cycles gives a much clearer image of the reflecting object than is obtainable from a single cycle. This then provides a better image to the neural network and significantly improves the identification accuracy of the system. The choice of the number of cycles to be averaged depends on the system requirements. For example, if dynamic out-of-position is required, then each vector must be used alone and averaging in the simple sense cannot be used. This will be discussed more detail below. Similar techniques can be used for other transducer technologies. Averaging, for example, can be used to minimize the effects of flickering light in camera-based systems.

Only rarely is unprocessed or raw data that is received from the A to D converters fed directly into the pattern recognition system. Instead, it is preprocessed to extract features, normalize, eliminate bad data, remove noise and elements that have no informational value etc.

For example, for military target recognition is common to use the Fourier transform of the data rather than the data itself. This can be especially valuable for categorization as opposed to location of the occupant and the vehicle. When used with a modular network, for example, the Fourier transform of the data may be used for the categorization neural network and the non-transformed data used for the position determination neural network. Recently wavelet transforms have also been considered as a preprocessor.

Above, under the subject of dynamic out-of-position, it was discussed that the position of the occupant can be used as a preprocessing filter to determine the quality of the data in a particular vector. This technique can also be used in general as a method to improve the quality of a vector of data based on the previous positions of the occupant. This technique can also be expanded to help differentiate live objects in the vehicle from inanimate objects. For example, a forward facing human will change his position frequently during the travel of the vehicle whereas a box will tend to show considerably less motion. This is also useful, for example, in differentiating a small human from an empty seat. The motion of a seat containing a small human will be significantly different from that of an empty seat even though the particular vector may not show significant differences. That is, a vector formed from the differences from two successive vectors is indicative of motion and thus of a live occupant.

Preprocessing can also be used to prune input data points. If each receiving array of assemblies, 49, 50, 51, and 54 for example (FIG. 8A), contains a matrix of 100 by 100 pixels, then 40,000 (4×100×100) pixels or data elements of information will be created each time the system interrogates the driver seat, for example. There are many pixels of each image that can be eliminated as containing no useful information. This typically includes the corner pixels, back of the seat and other areas where an occupant cannot reside. This pixel pruning can typically reduce the number of pixels by up to 50 percent resulting in approximately 20,000 remaining pixels. The output from each array is then compared with a series of stored arrays representing different unoccupied positions of the seat, seatback, steering wheel etc. For each array, each of the stored arrays is subtracted from the acquired array and the results analyzed to determine which subtraction resulted in the best match. The best match is determined by such things as the total number of pixels reduced below the threshold level, or the minimum number of remaining detached pixels, etc. Once this operation is completed for all four images, the position of the movable elements within the passenger compartment has been determined. This includes the steering wheel angle, telescoping position, seatback angle, headrest position, and seat position. This information can be used elsewhere by other vehicle systems to eliminate sensors that are currently being used to sense such positions of these components. Alternately, the sensors that are currently on the vehicle for sensing these component positions can be used to simplify processes described above. Each receiving array may also be a 256×256 CMOS pixel array as described in the paper by C. Sodini et al. referenced above greatly increasing the need for an efficient pruning process.

An alternate technique of differentiating between the occupant and the vehicle is to use motion. If the images of the passenger seat are compared over time, reflections from fixed objects will remain static whereas reflections from vehicle occupants will move. This movement can be used to differentiate the occupant from the background.

Following the subtraction process described above, each image now consists of typically as many as 50 percent fewer pixels leaving a total of approximately 10,000 pixels remaining, for the 4 array 100×100 pixel case. The resolution of the images in each array can now be reduced by combining adjacent pixels and averaging the pixel values. This results in a reduction to a total pixel count of approximately 1000. The matrices of information that contains the pixel values is now normalized to place the information in a location in the matrix which is independent of the seat position. The resulting normalized matrix of 1000 pixel values can now be used as input into an artificial neural network and represents the occupancy of the seat independent of the position of the occupant. This is a brut force method and better methods based on edge detection and feature extraction can greatly simplify this process as discussed below.

There are many mathematical techniques that can be applied to simplify the above process. One technique used in military pattern recognition, as mentioned above, uses the Fourier transform of particular areas in an image to match with known Fourier transforms of known images. In this manner, the identification and location can be determined simultaneously. There is even a technique used for target identification whereby the Fourier transforms are compared optically as mentioned elsewhere herein. Other techniques utilize thresholding to limit the pixels that will be analyzed by any of these processes. Other techniques search for particular features and extract those features and concentrate merely on the location of certain of these features. (See for example the Kage et al. artificial retina publication referenced above.)

Generally, however as mentioned, the pixel values are not directly fed into a pattern recognition system but rather the image is preprocessed through a variety of feature extraction techniques such as an edge detection algorithm. Once the edges are determined, a vector is created containing the location of the edges and their orientation and that vector is fed into the neural network, for example, which performs the pattern recognition.

Another preprocessing technique that improves accuracy is to remove the fixed parts of the image, such as the seatback, leaving only the occupying object. This can be done many ways such as by subtracting one mage form another after the occupant has moved, as discussed above. Another is to eliminate pixels related to fixed parts of the image through knowledge of what pixels to removed based on seat position and previous empty seat analysis. Other techniques are also possible. Once the occupant has been isolated then those pixels remaining can be placed in a particular position in the neural network vector. This is akin to the fact that a human, for example, will always move his or her eyes so as to place the object under observation into the center of the field of view, which is a small percent of the total field of view. In this manner the same limited number in pixels always observe the image of the occupying item thereby removing a significant variable and greatly improving system accuracy. The position of the occupant than can be determined by the displacement required to put the image into the appropriate part of the vector.

11.7 Post Processing

Once the pattern recognition system has been applied to the preprocessed data, one or more decisions are available as output. The output from the pattern recognition system is usually based on a snapshot of the output of the various transducers unless a combination neural network with feedback was used. Thus, it represents one epoch or time period. The accuracy of such a decision can usually be substantially improved if previous decisions from the pattern recognition system are also considered. In the simplest form, which is typically used for the occupancy identification stage, the results of many decisions are averaged together and the resulting averaged decision is chosen as the correct decision. Once again, however, the situation is quite different for dynamic out-of-position occupants. The position of the occupant must be known at that particular epoch and cannot be averaged with his previous position. On the other hand, there is information in the previous positions that can be used to improve the accuracy of the current decision. For example, if the new decision says that the occupant has moved six inches since the previous decision, and, from physics, it is known that this could not possibly take place, then a better estimate of the current occupant position can be made by extrapolating from earlier positions. Alternately, an occupancy position versus time curve can be fitted using a variety of techniques such as the least squares regression method, to the data from previous 10 epochs, for example. This same type of analysis could also be applied to the vector itself rather than to the final decision thereby correcting the data prior to entry into the pattern recognition system. An alternate method is to train a module of a modular neural network to predict the position of the occupant based on feedback from previous results of the module.

Summarizing, when an occupant is sitting in the vehicle during normal vehicle operation, the determination of the occupancy state can be substantially improved by using successive observations over a period of time. This can either be accomplished by averaging the data prior to insertion into a neural network, or alternately the decision of the neural network can be averaged. This is known as the categorization phase of the process. During categorization, the occupancy state of the vehicle is determined. Is the vehicle occupied by the forward facing human, an empty seat, a rear facing child seat, or an out-of-position human? Typically many seconds of data can be accumulated to make the categorization decision. For non-automotive vehicles this categorization process may be the only process that is required. Is the container occupied or is it empty? If occupied is there a human or other life form present? Is there a hazardous chemical or a source of radioactivity present etc.?

When a driver senses an impending crash, he or she will typically slam on the brakes to try to slow vehicle prior to impact. If an occupant, particularly the passenger, is unbelted, he or she will begin moving toward the airbag during this panic braking. For the purposes of determining the position of the occupant, there is not sufficient time to average data as in the case of categorization. One method is to determine the location of the occupant using the neural network based on previous training. The motion of the occupant can then be compared to a maximum likelihood position based on the position estimate of the occupant at previous vectors. Thus, for example, perhaps the existence of thermal gradients in the vehicle caused an error in the current vector leading to a calculation that the occupant has moved 12 inches since the previous vector. Since this could be a physically impossible move during ten milliseconds, the measured position of the occupant can be corrected based on his previous positions and known velocity. Naturally, if an accelerometer is present in the vehicle and if the acceleration data is available for this calculation, a much higher accuracy prediction can be made. Thus, there is information in the data in previous vectors as well as in the positions of the occupant determined from the latest data that can be used to correct erroneous data in the current vector and, therefore, in a manner not too dissimilar from the averaging method for categorization, the position accuracy of the occupant can be known with higher accuracy.

Post processing can use a comparison of the results at each time interval along with a test of reasonableness to remove erroneous results. Also averaging through a variety of techniques can improve the stability of the output results. Thus the output of a combination neural network is not necessarily the final decision of the system.

One principal used in a preferred implementation of at least one invention herein is to use images of different views of the occupant to correlate with known images that were used to train a neural network for vehicle occupancy. Then carefully measured positions of the known images are used to locate particular parts of the occupant such as his or her head, chest, eyes, ears, mouth, etc. An alternate approach is to make a three-dimensional map of the occupant and to precisely locate these features using neural networks, sensor fusion, fuzzy logic or other pattern recognition techniques. One method of obtaining a three-dimensional map is to utilize a scanning laser radar system where the laser is operated in a pulse mode and the distance from the object being illuminated is determined using range gating in a manner similar to that described in various patents on micropower impulse radar to McEwan. (See, for example, U.S. Pat. Nos. 5,457,394 and 5,521,600) Naturally, many other methods of obtaining a 3D representation can be used as discussed in detail above. This post processing step allows the determination of occupant parts from the image once the object is classified as an occupant.

Many other post processing techniques are available as discussed elsewhere herein.

11.8 An Example of Image Processing

As an example of the above concepts, a description of a single imager optical occupant classification system will now be presented.

11.8.1 Image Preprocessing

A number of image preprocessing filters have been implemented, including noise reduction, contrast enhancement, edge detection, image down sampling and cropping, etc. and some of them will now be discussed.

The Gaussian filter, for example, is very effective in reducing noise in an image. The Laplacian filter can be used to detect edges in an image. The result from a Laplacian filter plus the original image produces an edge-enhanced image. Both the Gaussian filter and the Laplacian filter can be implemented efficiently when the image is scanned twice. The original Kirsch filter consists of 8 filters that detect edges of 8 different orientations. The max Kirsch filter, however, uses a single filter that detects (but does not distinguish) edges of all 8 different orientations.

The histogram-based contrast enhancement filter improves image contrast by stretching pixel grayscale values until a desired percentage of pixels are suppressed and/or saturated. The wavelet-based enhancement filter modifies an image by performing multilevel wavelet decomposition and then applies a nonlinear transfer function to the detail coefficients. This filter reduces noise if the nonlinear transfer function suppresses the detail coefficients, and enhances the image if the nonlinear transfer function retains and increases the significant detail coefficients. A total of 54 wavelet functions from 7 families, for example, have been implemented.

Mathematical morphology has been proven to be a powerful tool for image processing (especially texture analysis). For example, the grayscale morphological filter that has been implemented by the current assignee includes the following operators: dilation, erosion, close, open, white top hat, black top hat, h-dome, and noise removal. The structure element is totally customizable. The implementation uses fast algorithms such as van Herk/Gil-Werman's dilation/erosion algorithm, and Luc Vincent's grayscale reconstruction algorithm.

Sometimes using binary images instead of grayscale images increases the system robustness. The binarization filter provides 3 different ways to convert a grayscale image into a binary image: 1) using a constant threshold; 2) specifying a white pixel percentage; 3) Otsu's minimum deviation method. The image down-size filter performs image down-sampling and image cropping. This filter is useful for removing unwanted background (but limited to preserving a rectangular region). Image down-sampling is also useful because our experiments show that, given the current accuracy requirement, using a lower resolution image for occupant position detection does not degrade the system performance, and is more computationally efficient.

Three other filters that were implemented provide maximum flexibility, but require more processing time. The generic in-frame filter implements almost all known and to be developed window-based image filters. It allows the user to specify a rectangular spatial window, and define a mathematical function of all the pixels within the window. This covers almost all well-known filters such as averaging, median, Gaussian, Laplacian, Prewit, Sobel, and Kirsch filters. The generic cross-frame filter implements almost all known and to be developed time-based filters for video streams. It allows the user to specify a temporal window, and define a mathematical function of all the frames within the window. The pixel transfer filter provides a flexible way to transform an image. A pixel value in the resulting image is a customizable function of the pixel coordinates and the original pixel value. The pixel transfer filter is useful in removing unwanted regions with irregular shapes.

FIG. 99 shows some examples of the preprocessing filters that have been implemented. FIG. 99(1) shows the original image. FIG. 99(2) shows the result from a histogram-based contrast enhancement filter. FIG. 99(3) shows the fading effect generated using a pixel transfer filter where the transfer function is defined as $$\frac{1}{14}z^{1.5}e^{-0.0001\left[(x-60)^2+(y-96)^2\right]}.$$

FIG. 99(4) shows the result from a morphological filter followed by a histogram-based contrast enhancement filter. The h-dome operator was used with the dome height=128. One can see that the h-dome operator preserves bright regions and regions that contain significant changes, and suppresses dark and flat regions. FIG. 99(5) shows the edges detected using a Laplacian filter. FIG. 99(6) shows the result from a Gaussian filter followed by a max Kirsch filter, a binarization filter that uses Otsu's method, and a morphological erosion that uses a 3×3 flat structure element.

11.8.2 Feature Extraction Algorithm

The image size in the current classification system is 320×240, i.e. 76,800 pixels, which is too large for the neural network to handle. In order to reduce the amount of the data while retaining most of the important information, a good feature extraction algorithm is needed. One of the algorithms that was developed includes three steps:

1) Divide the whole image into small rectangular blocks.
2) Calculate a few feature values from each block.
3) Line up the feature values calculated from individual blocks and then apply normalization.

By dividing the image into blocks, the amount of the data is effectively reduced while most of the spatial information is preserved.

Figure 100:
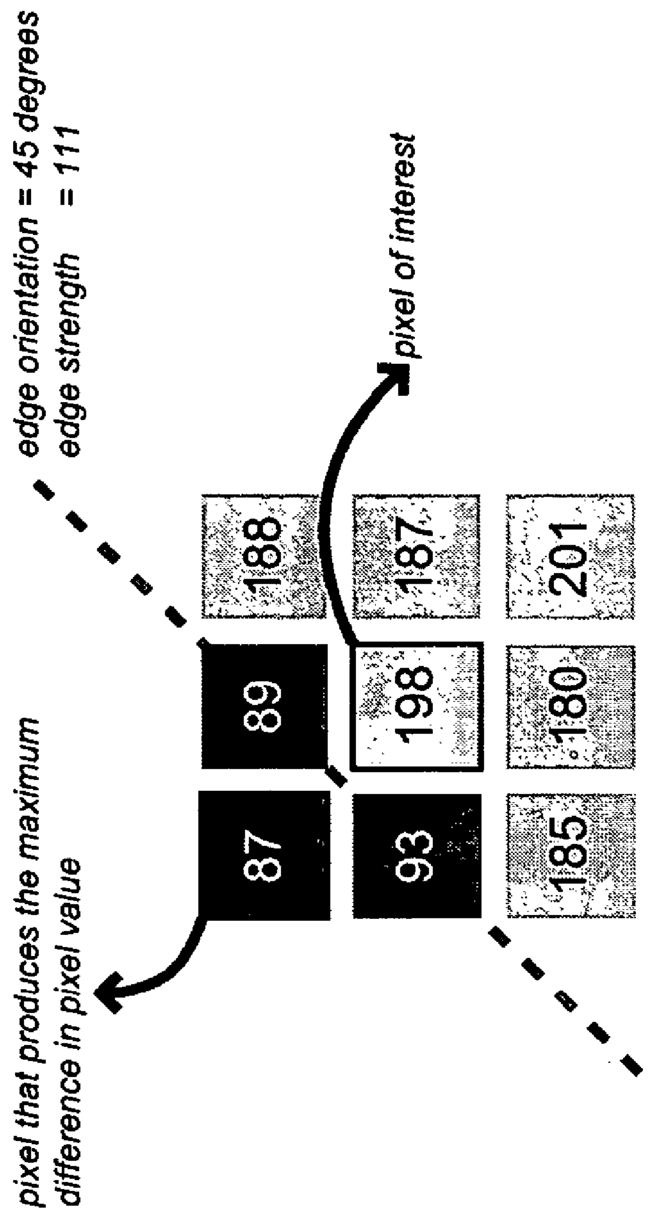

This algorithm was derived from a well-known algorithm that has been used in applications such as handwriting recognition. For most of the document related applications, binary images are usually used. Studies have shown that the numbers of the edges of different orientations in a block are very effective feature values for handwriting recognition. For our application where grayscale images are used, the count of the edges can be replaced by the sum of the edge strengths that are defined as the largest differences between the neighboring pixels. The orientation of an edge is determined by the neighboring pixel that produces the largest difference between itself and the pixel of interest (see FIG. 100).

FIGS. 101 and 102 show the edges of eight different orientations that are detected using Kirsch filters. The feature values that are calculated from these edges are also shown. Besides Kirsch filters, other edge detection methods such as Prewit and Sobel filters were also implemented.

Figure 103:
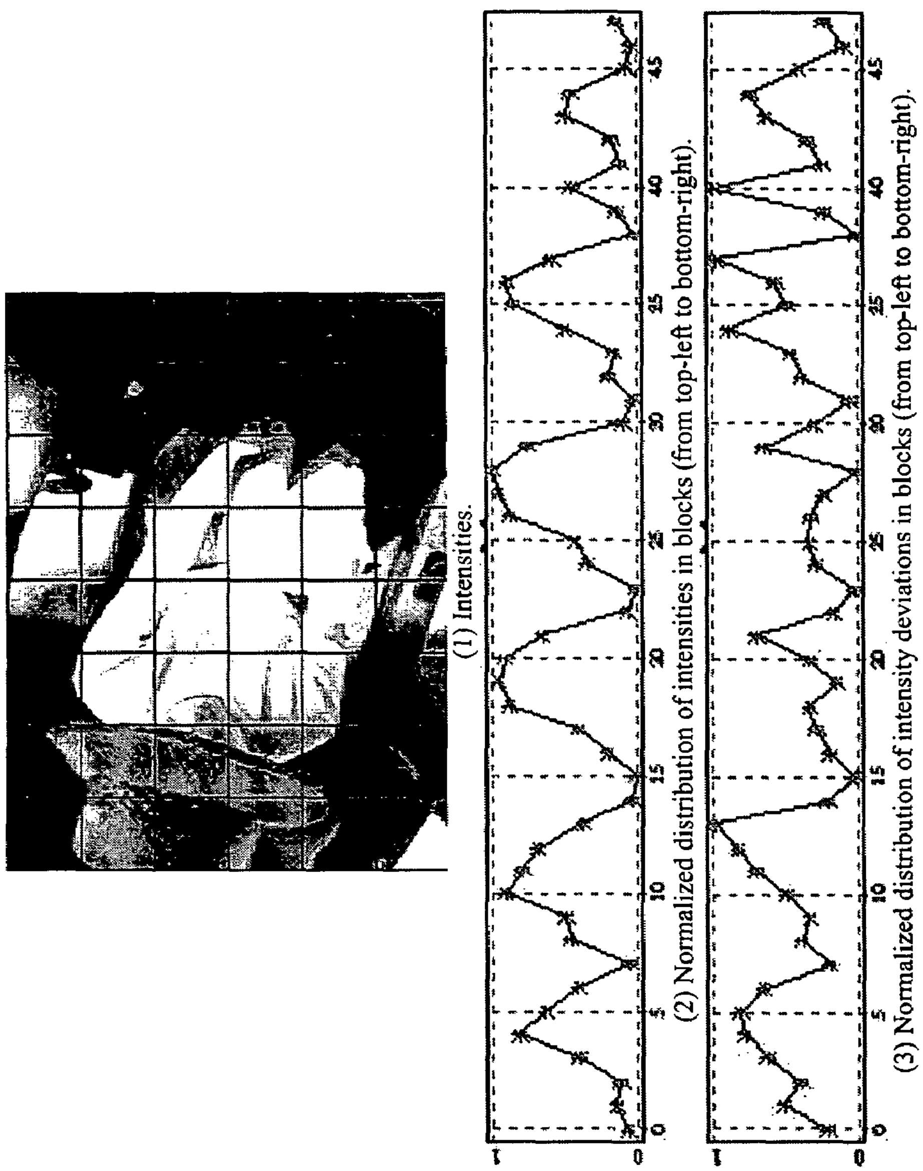

Besides the edges, other information can also be used as the feature values. FIG. 103 shows the feature values calculated from the block-average intensities and deviations. Our studies show that the deviation feature is less effective than the edge and the intensity features.

The edge detection techniques are usually very effective for finding sharp (or abrupt) edges. But for blunt (or rounded) edges, most of the techniques are not effective at all. These kinds of edges also contain useful information for classification. In order to utilize such information, a multi-scale feature extraction technique was developed. In other words, after the feature extraction algorithm was applied to the image of the original size, a 50% down-sampling was done and the same feature extraction algorithm (with the same block size) was applied to the image of reduced size. If it is desired to find even blunter edges, this technique can be applied again to the down-sampled image.

11.8.3 Modular Neural Network Architecture

The camera based optical occupant classification system described here was designed to be a standalone system whose only input is the image from the camera. Once an image is converted into a feature vector, the classification decision can be made using any pattern recognition technique. A vast amount of evidence in literature shows that a neural network technique is particularly effective in image based pattern recognition applications.

In this application the patterns of the feature vectors are extremely complex. FIG. 104 shows a list of things that may affect the image data and therefore the feature vector. Considering all the combinations, there could be an infinite number of patterns. For a complex system like this, it would be almost impossible to train a single neural network to handle all the possible scenarios. Our studies have shown that by dividing a large task into many small subtasks, a modular approach is extremely effective with such complex systems.

As a first step the problem can be divided into an ambient light (or daytime) condition and a low-light (or nighttime) condition, each of which can be handled by a subsystem (see FIG. 105). Under low-light condition, the center of the view is illuminated by near infrared LEDs. The background (including the floor, the backseats, and the scene outside the window) is virtually invisible, which makes classification somewhat easier. Classification is more difficult under the ambient light condition because the background is illuminated by sunlight, and sometimes the bright sunlight projects sharp shadows onto the seat, which creates patterns in the feature vectors.

Based on the classification requirement, each subsystem can be implemented using a modular neural network architecture that consists of multiple neural networks. FIG. 106 shows two modular architectures that both consist of three neural networks. In FIG. 106(1), the three neural networks are connected in a cascade fashion. This architecture was based on the following facts that were observed:

1) Separating empty-seat (ES) patterns from all other patterns is much easier than isolating any other patterns;
2) After removing ES patterns, isolating the patterns of infant carriers and rearward-facing child seats (RFCS) is relatively easier than isolating the patterns of adult passengers.

In this architecture, the "empty-seat" neural network identifies ES from all classes, and it has to be trained with all data; the "infant" neural network identifies infant carrier and rearward-facing child seat, and it is trained with all data except the ES data; and the "adult" neural network is trained with the adult data against the data of child, booster seat, and forward-facing child seat (FFCS). Since isolating the patterns of adult passengers is the most difficult task here, training the "adult" neural network with fewer patterns improves the success rate.

The architecture in FIG. 106(2) is similar to FIG. 106(1) except that the "infant" neural network and the "adult" neural network run in parallel. As a result, the output from this architecture has an extra "undetermined" state. The advantage of this architecture is that a misclassification between adult and infant/RFCS happens only if both the "infant" and "adult" neural networks fail at the same time. The disadvantage is that the success rates of individual classes (except ES) are slightly lower. In this architecture, both the "infant" and "adult" neural networks must be trained with the similar data patterns.

Figure 107:
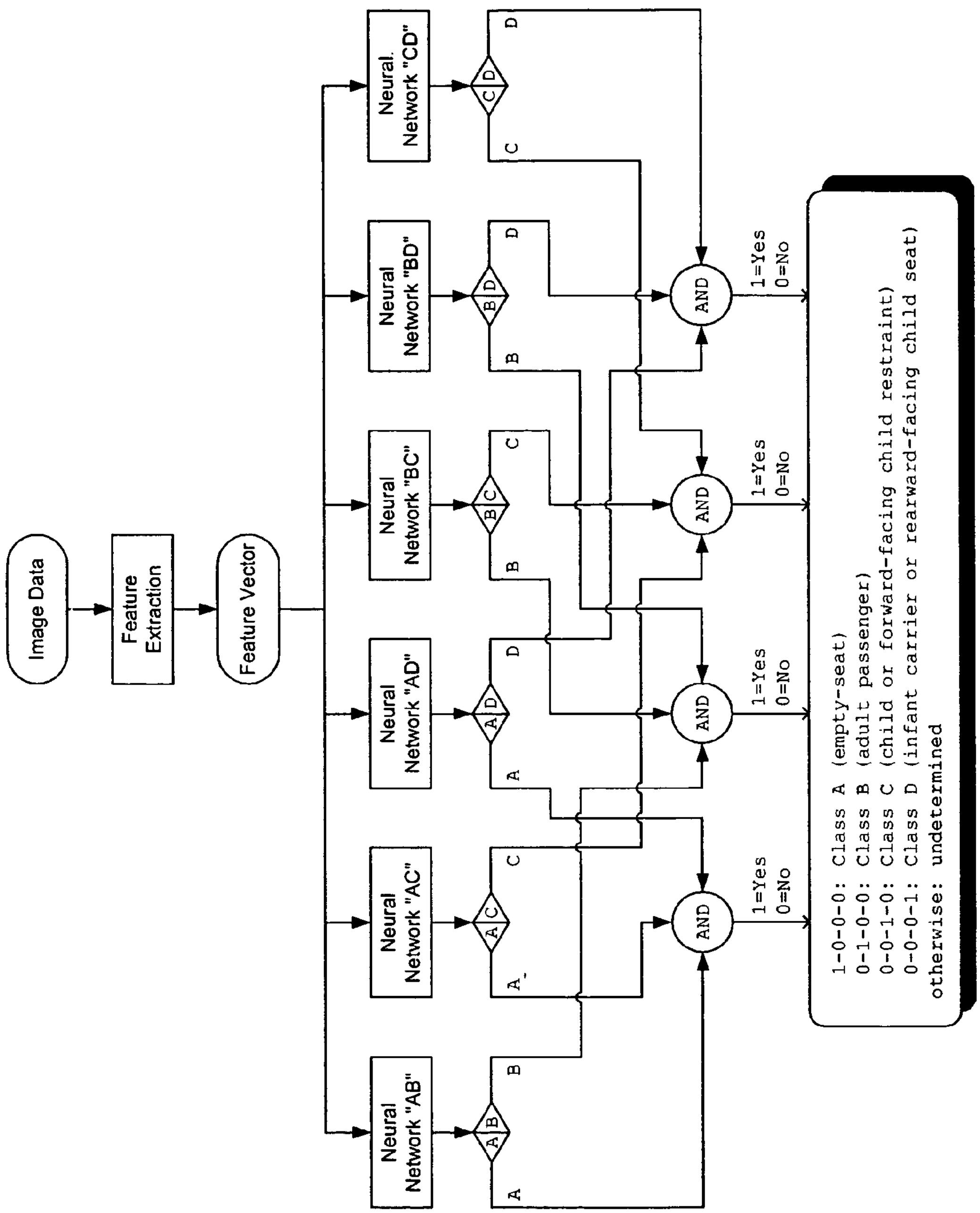

The architecture in FIG. 107 is more symmetrical. Although it is designed for classification among four different classes, it can be generalized to classify more classes. This architecture consists of six neural networks. Each neural network is trained to separate two classes, and it is trained with the data from these two classes only. Therefore high success rates can be expected from all six neural networks. This architecture has two unique characteristics:

1) Since the outputs of all the six neural networks can be considered as binary, there are 64 possible output combinations, but only 32 of them are valid. For an untrained data pattern, it is very likely that the output combination is invalid. This is very important. Given an input data pattern, most of the neural network systems are able to tell you "what I think it is", but they are not able to tell you "I haven't seen it before and I don't know what it is". With this architecture, most of the "never seen" data can be easily identified and processed accordingly.
2) From FIG. 107, it can be seen that, for a class A data pattern to be misclassified as class B, the trained neural network "AB", and the untrained neural networks "BC" and "BD"—all three of them—have to vote for class B. Given a fairly good training data set, the chance for that to happen should be very small. The chance for a misclassification can be made even smaller by using tighter thresholds. Assume that the neural network "AB" uses sigmoid transfer function, so its output is always between 0 and 1. Usually, an input data pattern is classified as class A if the output is below 0.5, and as class B otherwise. "Using tighter thresholds" means that an input data pattern is allowed to be classified as class A only if the output is below 0.4, as class B only if the output is above 0.6, and as undetermined if the output is between 0.4 and 0.6.

11.8.4 Post Neural Network Processing 11.8.4.1 Post-Processing Filters

Figures 108, 109:
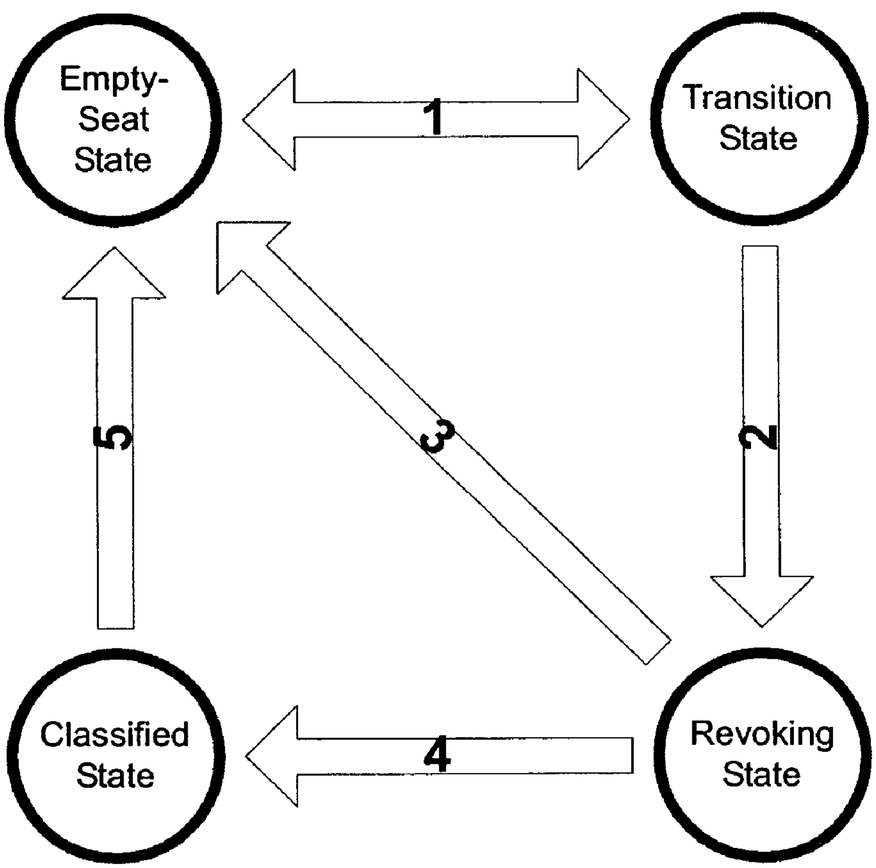

The simplest way to utilize the temporal information is to use the fact that the data pattern always changes continuously. Since the input to the neural networks is continuous, the output from the neural networks should also be continuous. Based on this idea, post-processing filters can be used to eliminate the random fluctuations in the neural network output. FIG. 108 shows a list of four of the many post-processing filters that have been implemented so far.

The generic digital filter covers almost all window-based FIR and IIR filters, which include averaging, exponential, Butterworth, Chebyshev, Elliptic, Kaiser window, and all other windowing functions such as Barlett, Hanning, Hamming, and Blackman. The output from a generic digital filter can be written as, $$y(n) = \frac{B_0x(n) + B_1x(n-1) + \ldots + B_Mx(n-M)}{A_1y(n-1) + A_2y(n-2) + \ldots + A_Ny(n-N)}$$

where x(n) and y(n) are current input and output respectively, and x(n-i) and y(n-j) are the previous input and output respectively. The characteristics of the filter are determined by the coefficients $B_i$ and $A_j$.

The Kalman filter algorithm can be summarized by the following group of equations:

$$\begin{cases} x_{k+1}^- = \Phi_{k+1}x_k & \text{(state extrapolation)} \\ P_{k+1}^- = \Phi_{k+1}P_k\Phi_{k+1}^T + Q_k & \text{(convarianve extrapolation)} \\ K_{k+1} = P_{k+1}^-H_{k+1}^T(H_{k+1}P_{k+1}^-H_{k+1}^T + R_{k+1})^{-1} & \text{(Kalman gain computation)} \\ x_{k+1} = x_{k+1}^- + K_{k+1}(z_{k+1} - H_{k+1}x_{k+1}^-) & \text{(state update)} \\ P_{k+1} = P_{k+1}^- - K_{k+1}H_{k+1}P_{k+1}^- & \text{(convarianve update)} \end{cases}$$

where x is the state vector, Φ is the state transition matrix, P is the filter error covariance matrix, Q is the process noise covariance matrix, R is the measurement noise covarianve matrix, H is the observation matrix, z is the observation vector, and $x^-$, $P^-$ and K are intermediate variables. The subscript k indicates that a variable is at time k. Given the initial conditions ($x_0$ and $P_0$), the Kalman filter gives the optimal estimate of the state vector as each new observation becomes available. The Kalman filter implemented here is a simplified version, where a linear AR(ρ) time series model is used. All the noise covariance matrices (Q and R) are assumed to be identity matrices multiplied by constants. The observation matrix H=(1 0 . . . 0). The state transition matrix $$\Phi = \begin{pmatrix} \phi_1 & \phi_2 & \phi_3 & \cdots & \phi_{p-1} & \phi_p \\ 1 & 0 & 0 & \cdots & 0 & 0 \\ 0 & 1 & 0 & \cdots & 0 & 0 \\ 0 & 0 & 1 & \cdots & 0 & 0 \\ \cdots & \cdots & \cdots & \cdots & \cdots & \cdots \\ 0 & 0 & 0 & \cdots & 1 & 0 \end{pmatrix},$$

where $\phi_i$ are parameters of the system.

The Median filter is a simple window-based filter that uses the median value within the window as the current output. ATI's post-decision filter is also a window-based filter. Basically it performs a weighted averaging, but the weight of a previous input depends on its "age" and its "locality" in the internal buffer.

Besides filtering, additional knowledge can be used to remove some of the undesired changes in the neural network output. For example, it is impossible to change from an adult passenger to a child restraint without going indicated that a rear facing infant seat was present. At 10 milliseconds per decision this would mean about 1 second of data. Once this occurred then the count of consecutive rear facing infant seat decisions could be kept and in order for the decision to change that number of consecutive changed decisions would have to occur. Thus, until the decision function was reset, it would be difficult, but not impossible, to change the decision. This is a simplistic example of such a decision function but serves to illustrate the concept. Naturally an infinite number of similar functions can now be implemented by those skilled in the art. The use of any such decision function that locks the decision to prevent toggling, or for any other similar purpose is within the scope of these inventions. One further comment, the motion of the vehicle indicating that the locking process should commence can be accomplished by an accelerometer or other motion sensor or by a magnetic flux sensor thereby making it unnecessary to connect to other vehicle systems that may not have sufficient reliability.

The decision-locking mechanism is the first use of such a mechanism in the vehicle monitoring art. In U.S. patent publication No. 2003/0168895 referenced-above, the time that a vehicle seat is in a given weight state alone with a door switch and seatbelt switch is used in a somewhat similar manner except that once the decision is made, it remains until the door is opened or the seatbelt in unfastened, as best as can be discerned from the description. This is quite different from the general use of the time that a seat is in a given state to lock the decision until there is a significant time period where the state has changed, as disclosed herein.

11.8.5 Data Collection and Neural Network Training 11.8.5.1 Night Time Subsystem The data collection on the night subsystem was done inside a building where the illumination from outside the vehicle can be filtered out using a near-infrared filter. The initial data set consisted of 364,000 images. After evaluating the subsystem trained with the initial data set, an additional data set (all from child restraints) consisting of 58,000 images was collected. Later a third data set (for boosting adult and dummy) was collected consisting of 150,750 images. Combining the three data sets together, the data distribution is shown in FIG. 112.

The night subsystem used the 3-network architecture shown in FIG. 106(2). The performance of the latest neural networks is shown in FIG. 113. Only a small portion of the data was used in training these three neural networks: for "infant" network and "adult" network, less than 44% of the data was used; for "empty-seat" network; only about 16% of the data was used. According to our experiences, given a complex data set like this one, a balanced training becomes very difficult to achieve once the data entries used in the training exceed 250,000. The success rates in Table 6, however, were obtained by testing these neural networks against the entire data set. The performance of the whole modular subsystem is shown in FIG. 114. A Gaussian filter was used for image preprocessing, the selected image features included pixel intensity and the edges detected using Sobel filters, and the features were calculated using 40×40 blocks.

11.8.5.2 Daytime Subsystem

The data collection on the daytime subsystem consisted of 195,000 images, and the data distribution is shown in FIG. 115. This is the first daytime subsystem that the assignee considered, and the data set collected was not complete. All images in this data set were collected under sunny condition with the same vehicle orientation.

The data collection on daytime subsystem should be more complex because different sunlight conditions have to be considered. The matrix covers both sunny conditions and overcast conditions. For sunny condition, a schedule was created to cover all sunlight conditions corresponding to different times of the day. The vehicle configuration (including seat track, seat recline, passenger window, sun visor, center console, and vehicle orientation) is set randomly in order to provide a flat distribution.

The day subsystem used a neural network architecture simpler than the ones shown in FIG. 106. This architecture includes two neural networks: the "empty-seat" network and the "adult" network. This subsystem did not separate infant carrier and rearward-facing child seat from child and forward-facing child restraint. The performance of the neural networks is shown in FIG. 116, and the performance of the whole modular subsystem is shown in FIG. 117.

For this daytime subsystem, a Gaussian filter was used for image preprocessing, and the selected image feature included only the edges detected using Prewit filters, and the features were calculated using 30×30 blocks.

For this daytime subsystem, the back seat was clearly visible since the background was illuminated by the sunlight. The initial training results showed that the classification of child restraints was mistakenly associated with the presence of the operator in the back seat because the operator was moving the child restraint from the back seat during data collection. The classification of child restraints failed when the back seat was empty. This problem was solved by removing that particular region (about 80 pixel wide) from the image.

The accuracies reported in the above tables are based on single images and when the post processing steps are included the overall system accuracy approaches 100% and is a substantial improvement over previous systems.

11.8.6 Conclusions and Discussions

The symmetrical neural network architecture shown in FIG. 107 was developed after the system reported here. The results prove that this architecture gives better performance than the other architectures. With this architecture, it is possible to reduce misclassifications by replacing the weak classifications with "undetermined" states. More importantly, this architecture provides a way to identify "unseen" patterns.

The development of an optical occupant sensing system requires many software tools whose functionalities include: communication with hardware, assisting data collection, analyzing and converting data, training modular neural networks, evaluating and demonstrating system performance, and evaluating new algorithms. The major software components are shown in FIG. 118 where the components in red boxes are developed by assignee.

It is important to note that the classification accuracies reported here are based on single images and when the post processing steps are included the overall system accuracy approaches 100%. This is a substantial improvement over previous systems even thought it is based on a single camera. Although this system is capable of dynamic tracking, some additional improvement can be obtained through the addition of a second camera. Nevertheless, the system as described herein is cost competitive with a weight only system and substantially more accurate. This system is now ready for commercialization where the prototype system described herein is made ready for high volume serial production.

12. Optical Correlators

A great deal of effort has been ongoing to develop fast optical pattern recognition systems to allow military vehicles such as helicopters to locate all of the enemy vehicles in a field of view. Some of the systems that have been developed are called optical correlation systems and have the property that the identification and categorization of various objects in the field of view happens very rapidly. A helicopter, for example coming onto a scene with multiple tanks and personnel carriers in a wide variety of poses and somewhat camouflaged can locate, identify and count all such vehicles in a fraction of a second. The cost of these systems has been prohibitively expensive for their use in automobiles for occupant tracking or for collision avoidance but this is changing.

Theoretically system performance is simple. The advantage of optical correlation approach is that correlation function is calculated almost instantly, much faster that with microprocessors and neural networks, for example. In simplest case one looks for correlation of an input image with reference samples. The sample which has the largest correlation peak is assumed as a match. In practice, the system is based on a training set of reference samples. Special filters are constructed for correlation with input image. Filters are used in order to reduce number of correlations to calculate. The output of the filters, the result of the correlation, is frequently a set of features. Finally the features are fed into a classifier for decision making. This classifier can use Neural Networks.

The main bottleneck of optical correlators is large number of filters, or reference image samples, that are required. For example, if it is requirement to detect 10 different types of objects at different orientation, scale and illumination conditions, every modification factor enlarges number of filters for feature selection or correlation by factor of approximately 10. So, in a real system one may have to input 10,000 filters or reference images. Most correlators are able to find correlation of an input image with about of 5-20 filters during single correlation cycle. In other words the reference image contains 5-20 filters. Therefore during decision making cycle one needs to feed into correlator and find correlation with approximately 1000 filters.

If the problem is broken down, as was done with modular neural networks, then the classification stage may take on the order of a second while the tracking stage can be done perhaps in a millisecond.

U.S. Pat. Nos. 5,473,466 and 5,051,738 describe a miniature high resolution display system for use with heads up displays for installation into the helmets of fighter pilots. This system, which is based on a thin garnet crystal, requires very little power and maintains a particular display until display is changed. Thus, for example, if there is a loss of power the display will retain the image that was last displayed. This technology has the capability of producing a very small heads up display unit as will be described more detail below. This technology has also been used as a spatial light monitor for pattern recognition based on optical correlation. Although this technology has been applied to military helicopters, it has previously not been used for occupant sensing, collision avoidance, anticipatory sensing, blind spot monitoring or any other ground vehicle application.

Although the invention described herein is not limited to a particular spatial light monitor (SLM) technology, the preferred or best mode technology is to use the garnet crystal system described U.S. Pat. No. 5,473,466. Although the system has never been applied to automobiles, it has significant advantages over other systems particularly in the resolution and optical intensity areas. The resolution of the garnet crystals as manufactured by Revtek is approximately 600 by 600 pixels. The size of the crystal is typically 1 cm square.

Basically, the optical correlation pattern recognition system works as follows. Stored in a computer are many Fourier transforms of images of objects that the system should identify. For collision avoidance, these include cars, trucks, deer or other animals, pedestrians, motorcycles, bicycles, or any other objects that could occur on a roadway. For an interior monitoring, these objects could include faces (particularly ones that are authorized to operate the vehicle), eyes, ears, child seats, children, adults of all sizes etc. The image from the scene that is captured by the lens is fed through a diffraction grating that optically creates the Fourier transform of the scene and projects it through SLM such as the garnet crystal of the '466 patent. The SLM is simultaneously fed and displays the Fourier stored transforms and a camera looks at the light that comes through the SLM. If there is a match then the camera sees a spike that locates the matching objects in the scene, there can be many such objects, all are found. The main advantage of this system over neural network pattern recognition systems is speed since it is all done optically and in parallel.

For collision avoidance, for example, many vehicles can be easily classified and tracked. For occupant sensing, the occupant's eyes can be tracked even if he is rapidly moving his head and the occupant herself can be tracked during a crash.

13. Diagnostics and Prognostics 13.1 General Diagnostics

Described above in section 9 and elsewhere is a system for determining the status of occupants in a vehicle, and in the event of an accident or at any other appropriate time, transmitting the status of the occupants, and optionally additional information, via a communications channel or link to a remote monitoring facility. In addition to the status of the occupant, it is also important to be able to analyze the operating conditions of the vehicle and detect when a component of the vehicle is about to fail. By notifying the driver of the impending failure of the component, appropriate corrective action can be taken to avoid such failure.

The operating conditions of the vehicle can also be transmitted along with the status of the occupants to a remote monitoring facility. The operating conditions of the vehicle include whether the motor is running and whether the vehicle is moving. Thus, in a general embodiment in which information on both occupancy of the vehicle and the operating conditions of the vehicle are transmitted, one or more properties or characteristics of occupancy of the vehicle are determined, such constituting information about the occupancy of the vehicle, and one or more states of the vehicle or of a component of the vehicle is determined, such constituting information about the operation of the vehicle. The information about the occupancy of the vehicle and operation of the vehicle are selectively transmitted, possibly the information about occupancy to an emergency response center and the information about the vehicle to a dealer or repair facility.

Transmission of the information about the operation of the vehicle, i.e., diagnostic information, may be achieved via a satellite, cell phone, modem and/or via the Internet, or other telematics system. The vehicle would thus include appropriate electronic hardware and/or software to enable the transmission of a signal to a satellite, from where it could be re-transmitted to a remote location, and/or to enable the transmission to a web site or host computer etc. In the latter case, the vehicle could be assigned a domain name or e-mail address for identification or transmission origination purposes. One preferred system is operated by Skybitz and discussed elsewhere herein.

It is important to appreciate that the preferred embodiment of the vehicle diagnostic unit described below performs the diagnosis, i.e., processes the input from the various sensors, on the vehicle using for example a processor embodying a pattern recognition technique such as a neural network or combination neural network. The processor thus receives data or signals from the sensors and generates an output indicative or representative of the operating conditions of the vehicle or its component. A signal could thus be generated indicative of an under inflated tire, or an overheating engine, for example.

For the discussion below, the following terms are defined as follows:

The term "component" refers to any part or assembly of parts which is mounted to or a part of a motor vehicle and which is capable of emitting a signal representative of its operating state. The following is a partial list of general automobile and truck components, the list not being exclusive:

engine;
transmission;
brakes and associated brake assembly;
tires;
wheel;
steering wheel and steering column assembly;
water pump;
alternator;
shock absorber;
wheel mounting assembly;
radiator;
battery;
oil pump;
fuel pump;
air conditioner compressor;
differential gear;
exhaust system;
fan belts;
engine valves;
steering assembly;
vehicle suspension including shock absorbers;
vehicle wiring system; and
engine cooling fan assembly.

The term "sensor" refers to any measuring or sensing device mounted on a vehicle or any of its components including new sensors mounted in conjunction with the diagnostic module in accordance with the invention. A partial, non-exclusive list of common sensors mounted on an automobile or truck is as follows:

airbag crash or rollover sensor;
accelerometer;
microphone;
camera;
antenna, capacitance sensor or other electromagnetic wave sensor;
stress or strain sensor;

pressure sensor;
weight sensor;
magnetic field sensor;
coolant thermometer;
oil pressure sensor;
oil level sensor;
air flow meter;
voltmeter;
ammeter;
humidity sensor;
engine knock sensor;
oil turbidity sensor;
throttle position sensor;
steering wheel torque sensor;
wheel speed sensor;
tachometer;
speedometer;
other velocity sensors;
other position or displacement sensors;
oxygen sensor;
yaw, pitch and roll angular sensors;
clock;
odometer;
power steering pressure sensor;
pollution sensor;
fuel gauge;
cabin thermometer;
transmission fluid level sensor;
gyroscopes or other angular rate sensors including yaw, pitch and roll rate sensors;
coolant level sensor;
transmission fluid turbidity sensor;
break pressure sensor;
tire pressure sensor;
tire temperature sensor,
chemical or gas sensor, and
coolant pressure sensor.

The term "signal" herein refers to any time varying output from a component including electrical, acoustic, thermal, electric field, magnetic field, or electromagnetic radiation, or mechanical vibration. Then acoustic is used in this section it will mean any frequency from 10 Hz to 200,000 Hz.

Sensors on a vehicle are generally designed to measure particular parameters of particular vehicle components. However, frequently these sensors also measure outputs from other vehicle components. For example, electronic airbag crash sensors currently in use contain one or more accelerometers for determining the accelerations of the vehicle structure so that the associated electronic circuitry of the airbag crash sensor can determine whether a vehicle is experiencing a crash of sufficient magnitude so as to require deployment of the airbag. This accelerometer continuously monitors the vibrations in the vehicle structure regardless of the source of these vibrations. If a wheel is out of balance, or if there is extensive wear of the parts of the front wheel mounting assembly, or wear in the shock absorbers, the resulting abnormal vibrations or accelerations can, in many cases, be sensed by a crash sensor accelerometer. There are other cases, however, where the sensitivity or location of the airbag crash sensor accelerometer is not appropriate and one or more additional accelerometers may be mounted onto a vehicle for the purposes of at least one of the inventions disclosed herein. Some airbag crash sensors are not sufficiently sensitive accelerometers or have sufficient dynamic range for the purposes herein.

Every component of a vehicle emits various signals during its life. These signals can take the form of electromagnetic radiation, a varying electric or magnetic field, acoustic radiation, thermal radiation, vibrations transmitted through the vehicle structure, and voltage or current fluctuations, depending on the particular component. When a component is functioning normally, it may not emit a perceptible signal. In that case, the normal signal is no signal, i.e., the absence of a signal. In most cases, a component will emit signals that change over its life and it is these changes which contain information as to the state of the component, e.g., whether failure of the component is impending. Usually components do not fail without warning. However, most such warnings are either not perceived or if perceived are not understood by the vehicle operator until the component actually fails and, in some cases, a breakdown of the vehicle occurs. In a few years, it is expected that various roadways will have systems for automatically guiding vehicles operating thereon. Such systems have been called "smart highways" and are part of the field of intelligent transportation systems (ITS). If a vehicle operating on such a smart highway were to breakdown, serious disruption of the system could result and the safety of other users of the smart highway could be endangered.

In accordance with the invention, each of these signals emitted by the vehicle components is typically converted into electrical signals and then digitized (i.e., the analog signal is converted into a digital signal) to create numerical time series data which is then entered into a processor. Pattern recognition algorithms then are applied in the processor to attempt to identify and classify patterns in this time series data. For a particular component, such as a tire for example, the algorithm attempts to determine from the relevant digital data whether the tire is functioning properly or whether it requires balancing, additional air, or perhaps replacement.

Frequently, the data entered into the computer needs to be preprocessed before being analyzed by a pattern recognition algorithm. The data from a wheel speed sensor, for example, might be used as is for determining whether a particular tire is operating abnormally in the event it is unbalanced, whereas the integral of the wheel speed data over a long time period (a preprocessing step), when compared to such sensors on different wheels, might be more useful in determining whether a particular tire is going flat and therefore needs air. In some cases, the frequencies present in a set of data are a better predictor of component failures than the data itself. For example, when a motor begins to fail due to worn bearings, certain characteristic frequencies began to appear. In most cases, the vibrations arising from rotating components, such as the engine, will be normalized based on the rotational frequency as disclosed in the NASA TSP referenced above. Moreover, the identification of which component is causing vibrations present in the vehicle structure can frequently be accomplished through a frequency analysis of the data. For these cases, a Fourier transformation of the data is made prior to entry of the data into a pattern recognition algorithm. Other mathematical transformations are also made for particular pattern recognition purposes in practicing the teachings of at least one of the inventions disclosed herein. Some of these include shifting and combining data to determine phase changes for example, differentiating the data, filtering the data, and sampling the data. Also, there exist certain more sophisticated mathematical operations that attempt to extract or highlight specific features of the data. At least one of the inventions disclosed herein contemplates the use of a variety of these preprocessing techniques and the choice of which ones is left to the skill of the practitioner designing a particular diagnostic module or system.

Another technique that is contemplated for some implementations of at least one of the inventions disclosed herein is the use of multiple accelerometers and/or microphones that will allow the system to locate the source of any measured vibrations based on the time of flight and/or triangulation techniques. Once a distributed accelerometer installation has been implemented to permit this source location, the same sensors can be used for smarter crash sensing as it will permit the determination of the location of the impact on the vehicle. Once the impact location is known, a tailored algorithm can be used to accurately forecast the crash severity making use of knowledge of the force vs. crush properties of the vehicle at the impact location.

When a vehicle component begins to change its operating behavior, it is not always apparent from the particular sensors, if any, which are monitoring that component. The output from any one of these sensors can be normal even though the component is failing. By analyzing the output of a variety of sensors, however, the pending failure can be diagnosed. For example, the rate of temperature rise in the vehicle coolant, if it were monitored, might appear normal unless it were known that the vehicle was idling and not traveling down a highway at a high speed. Even the level of coolant temperature which is in the normal range could be in fact abnormal in some situations signifying a failing coolant pump, for example, but not detectable from the coolant thermometer alone.

The pending failure of some components is difficult to diagnose and sometimes the design of the component requires modification so that the diagnosis can be more readily made. A fan belt, for example, frequently begins failing by a cracking of the inner surface. The belt can be designed to provide a sonic or electrical signal when this cracking begins in a variety of ways. Similarly, coolant hoses can be designed with an intentional weak spot where failure will occur first in a controlled manner that can also cause a whistle sound as a small amount of steam exits from the hose. This whistle sound can then be sensed by a general purpose microphone, for example.

In FIG. 136, a generalized component 535 emitting several signals which are transmitted along a variety of path, sensed by a variety of sensors and analyzed by the diagnostic device in accordance with the invention is illustrated schematically. Component 535 is mounted to a vehicle 552 and during operation it emits a variety of signals such as acoustic 536, electromagnetic radiation 537, thermal radiation 538, current and voltage fluctuations in conductor 539 and mechanical vibrations 540. Various sensors are mounted in the vehicle to detect the signals emitted by the component 535. These include one or more vibration sensors (accelerometers) 544, 546 and/or gyroscopes also mounted to the vehicle, one or more acoustic sensors 541, 547, electromagnetic radiation sensor 542, heat radiation sensor 543, and voltage or current sensor 545.

In addition, various other sensors 548, 549 measure other parameters of other components that in some manner provide information directly or indirectly on the operation of component 535. All of the sensors illustrated on FIG. 136 can be connected to a data bus 550. A diagnostic module 551, in accordance with the invention, can also be attached to the vehicle data bus 550 and receives the signals generated by the various sensors. The sensors may however be wirelessly connected to the diagnostic module 551 and be integrated into a wireless power and communications system or a combination of wired and wireless connections.

As shown in FIG. 136, the diagnostic module 551 has access to the output data of each of the sensors that have information relative to the component 535. This data appears as a series of numerical values each corresponding to a measured value at a specific point in time. The cumulative data from a particular sensor is called a time series of individual data points. The diagnostic module 551 compares the patterns of data received from each sensor individually, or in combination with data from other sensors, with patterns for which the diagnostic module has been trained to determine whether the component is functioning normally or abnormally.

Important to at least one of the inventions disclosed herein is the manner in which the diagnostic module 551 determines a normal pattern from an abnormal pattern and the manner in which it decides what data to use from the vast amount of data available. This is accomplished using pattern recognition technologies such as artificial neural networks and training. The theory of neural networks including many examples can be found in several books on the subject including. See references 26 through 33. The invention described herein frequently uses combinations of neural networks to improve the pattern recognition process called combination neural networks.

The neural network will be used here to illustrate one example of a pattern recognition technology but it is emphasized that at least one of the inventions disclosed herein is not limited to neural networks. Rather, the invention may apply any known pattern recognition technology including sensor fusion and various correlation technologies. The diagnostics methods described below are based on the use of pattern recognition technologies and particularly neural networks and combination neural networks. However, for many applications pure analytical methods will also work. For example, even though the sensing of an out of balance tire is used as an example with neural networks, it is clear that this could also be diagnosed by many simple analytical procedures. The inventions described below are thus not limited to the use of pattern recognition or neural networks in particular. Many of the concepts presented are new regardless of the procedure used to analyze the signals. Nevertheless, with this in mind the discussion below will use pattern recognition and neural networks in particular as an example of one method of analysis but the inventions are not to be limited thereby. A brief description of a particular example of a neural network pattern recognition technology is now set forth below.

Neural networks are constructed of processing elements known as neurons that are interconnected using information channels call interconnects. Each neuron can have multiple inputs but only one output. Each output however is usually connected to all other neurons in the next layer. The neurons in the first layer operate collectively on the input data as described in more detail below. Neural networks learn by extracting relational information from the data and the desired output. Neural networks have been applied to a wide variety of pattern recognition problems including automobile occupant sensing, speech recognition, optical character recognition, and handwriting analysis.

To train a neural network, data is provided in the form of one or more time series that represents the condition to be diagnosed as well as normal operation. As an example, the simple case of an out of balance tire will be used. Various sensors on the vehicle can be used to extract information from signals emitted by the tire such as an accelerometer, a torque sensor on the steering wheel, the pressure output of the power steering system, a tire pressure monitor or tire temperature monitor. Other sensors that might not have an obvious relationship to tire unbalance are also included such as, for example, the vehicle speed or wheel speed that can be determined from the ABS system. Data is taken from a variety of vehicles where the tires were accurately balanced under a variety of operating conditions also for cases where varying amounts of unbalance was intentionally introduced. Once the data had been collected, some degree of preprocessing or feature extraction is usually performed to reduce the total amount of data fed to the neural network. In the case of the unbalanced tire, the time period between data points might be chosen such that there are at least ten data points per revolution of the wheel. For some other application, the time period might be one minute or one millisecond. It is important to note that heretofore no attempt has been made to diagnose an unbalanced tire or many other similar faults in a running vehicle.

Once the data has been collected, it is processed by a neural network-generating program, for example, if a neural network pattern recognition system is to be used. Such programs are available commercially, e.g., from NeuralWare of Pittsburgh, Pa. or from International Scientific Research, Inc., of Panama City, Panama for modular neural networks. The program proceeds in a trial and error manner until it successfully associates the various patterns representative of abnormal behavior, an unbalanced tire, with that condition. The resulting neural network can be tested to determine if some of the input data from some of the sensors, for example, can be eliminated. In this way, the engineer can determine what sensor data is relevant to a particular diagnostic problem. The program then generates an algorithm that is programmed onto a microprocessor, microcontroller, neural processor, FPGA, or DSP (herein collectively referred to as a microprocessor or processor). Such a microprocessor appears inside the diagnostic module 551 in FIG. 136. Once trained, the neural network, as represented by the algorithm, will now recognize an unbalanced tire on a vehicle when this event occurs. At that time, when the tire is unbalanced, the diagnostic module 551 will output a message to the driver indicating that the tire should now be balanced as described in more detail below. The message to the driver is provided by output means coupled to or incorporated within the module 551 and may be, e.g., a light on the dashboard, a vocal message, a tone or any other recognizable indication apparatus. A similar message may also be sent to the dealer or other repair facility or remote facility or even to the vehicle or tire manufacturer.

It is important to note that there may be many neural networks involved in a total vehicle diagnostic system. These can be organized either in parallel, series, as an ensemble, cellular neural network, modular neural network or as a combination neural network system. In one implementation of a modular neural network, a primary neural network identifies that there is an abnormality and tries to identify the likely source. Once a choice has been made as to the likely source of the abnormality, another of a group of neural networks is called upon to determine the exact cause of the abnormality. In this manner, the neural networks are arranged in a tree pattern with each neural network trained to perform a particular pattern recognition task. Naturally purely analytical techniques or other methods can also be arranged in a tree structure where one analysis leads to another.

Discussions on the operation of a neural network can be found in the above references on the subject and are well understood by those skilled in the art. Neural networks are the most well known of the pattern recognition technologies based on training, although neural networks have only recently received widespread attention and have been applied to only very limited and specialized problems in motor vehicles. Other non-training based pattern recognition technologies exist, such as fuzzy logic. However, the programming required to use fuzzy logic, where the patterns must be determine by the programmer, can render these systems impractical for general vehicle diagnostic problems such as described herein. Therefore, preferably the pattern recognition systems that learn by training are used herein even though analytical methods will of course work especially for simple diagnostic problems.

The neural network is the first highly successful of what will be a variety of pattern recognition techniques based on training. There is nothing that suggests that it is the only and it may not even be the best technology. The characteristics of all of these technologies which render them applicable to this general diagnostic problem include the use of time-based or frequency based input data and that they are trainable. In all cases, the pattern recognition technology learns from examples of data characteristic of normal and abnormal component operation.

A diagram of one example of a neural network used for diagnosing an unbalanced tire, for example, based on the teachings of at least one of the inventions disclosed herein is shown in FIG. 125. The process can be programmed to periodically test for an unbalanced tire. Since this need be done only infrequently, the same processor can be used for many such diagnostic problems. When the particular diagnostic test is run, data from the previously determined relevant sensors is preprocessed and analyzed with the neural network algorithm, for example. For the unbalanced tire, using the data from an accelerometer for example, the digital acceleration values from the analog to digital converter in the accelerometer are entered into nodes 1 through n and the neural network algorithm compares the pattern of values on nodes 1 through n with patterns for which it has been trained as follows.

Each of the input nodes is connected to each of the second layer nodes, h-1,h-2, . . . ,h-n, called the hidden layer, either electrically as in the case of a neural computer, or through mathematical functions containing multiplying coefficients called weights, in the manner described in more detail in the above references. At each hidden layer node, a summation occurs of the values from each of the input layer nodes, which have been operated on by functions containing the weights, to create a node value. Similarly, the hidden layer nodes are in like manner connected to the output layer node(s), which in this example is only a single node 0 representing the decision to notify the driver, and/or a remote facility, of the unbalanced tire. During the training phase, an output node value of 1, for example, is assigned to indicate that the driver should be notified and a value of 0 is assigned to not doing so. Once again, the details of this process are described in above-referenced texts and will not be presented here.

In the example above, twenty input nodes were used, five hidden layer nodes and one output layer node. In this example, only one sensor was considered and accelerations from only one direction were used. If other data from other sensors such as accelerations from the vertical or lateral directions were also used, then the number of input layer nodes would increase. Again, the theory for determining the complexity of a neural network for a particular application has been the subject of many technical papers and will not be presented in detail here. Determining the requisite complexity for the example presented here can be accomplished by those skilled in the art of neural network design.

Briefly, the neural network described above defines a method, using a pattern recognition system, of sensing an unbalanced tire and determining whether to notify the driver, and/or a remote facility, and comprises the steps of:

(a) obtaining an acceleration signal from an accelerometer mounted on a vehicle;

(b) converting the acceleration signal into a digital time series;

(c) entering the digital time series data into the input nodes of the neural network;

(d) performing a mathematical operation on the data from each of the input nodes and inputting the operated on data into a second series of nodes wherein the operation performed on each of the input node data prior to inputting the operated on value to a second series node is different from that operation performed on some other input node data;

(e) combining the operated on data from all of the input nodes into each second series node to form a value at each second series node;

(f) performing a mathematical operation on each of the values on the second series of nodes and inputting this operated on data into an output series of nodes wherein the operation performed on each of the second series node data prior to inputting the operated on value to an output series node is different from that operation performed on some other second series node data;

(g) combining the operated on data from all of the second series nodes into each output series node to form a value at each output series node; and, (h) notifying a driver if the value on one output series node is within a chosen range signifying that a tire requires balancing.

This method can be generalized to a method of predicting that a component of a vehicle will fail comprising the steps of:

(a) sensing a signal emitted from the component;

(b) converting the sensed signal into a digital time series;

(c) entering the digital time series data into an algorithm;

(d) executing the algorithm to determine if there exists within the digital time series data information characteristic of abnormal operation of the component; and (e) notifying a driver and/or a remote facility if the abnormal pattern is recognized.

The particular neural network described and illustrated above contains a single series of hidden layer nodes. In some network designs, more than one hidden layer is used, although only rarely will more than two such layers appear. There are of course many other variations of the neural network architecture illustrated above which appear in the referenced literature.

The implementation of neural networks can take on at least two forms, an algorithm programmed on a digital microprocessor, FPGA, DSP or in a neural computer (including a cellular neural network or support vector machine). In this regard, it is noted that neural computer chips are now becoming available.

In the example above, only a single component failure was discussed using only a single sensor since the data from the single sensor contains a pattern which the neural network was trained to recognize as either normal operation of the component or abnormal operation of the component. The diagnostic module 551 contains preprocessing and neural network algorithms for a number of component failures. The neural network algorithms are generally relatively simple, requiring only a relatively small number of lines of computer code. A single general neural network program can be used for multiple pattern recognition cases by specifying different coefficients for the various terms, one set for each application. Thus, adding different diagnostic checks can have only a small affect on the cost of the system. Also, the system has available to it all of the information available on the data bus. During the training process, the pattern recognition program sorts out from the available vehicle data on the data bus or from other sources, those patterns that predict failure of a particular component.

Although this disclosure is mainly concerned with mechanical and electrical devices, the same methods are also applicable to electronic components and the inventions herein are not limited to diagnosing mechanical and electrical devices.

In FIG. 137, a schematic of a vehicle with several components and several sensors is shown in their approximate locations on a vehicle along with a total vehicle diagnostic system in accordance with the invention utilizing a diagnostic module in accordance with the invention. A flow diagram of information passing from the various sensors shown in FIG. 137 onto the vehicle data bus and thereby into the diagnostic device in accordance with the invention is shown in FIG. 138 along with outputs to a display for notifying the driver and to the vehicle cellular phone, or other communication device, for notifying the dealer, vehicle manufacturer or other entity concerned with the failure of a component in the vehicle. If the vehicle is operating on a smart highway, for example, the pending component failure information may also be communicated to a highway control system and/or to other vehicles in the vicinity so that an orderly exiting of the vehicle from the smart highway can be facilitated. FIG. 138 also contains the names of the sensors shown numbered on FIG. 137.

Sensor 601 is a crash sensor having an accelerometer (alternately one or more dedicated accelerometers 631 can be used), sensor 602 is represents one or more microphones, sensor 603 is a coolant thermometer, sensor 604 is an oil pressure sensor, sensor 605 is an oil level sensor, sensor 606 is an air flow meter, sensor 607 is a voltmeter, sensor 608 is an ammeter, sensor 609 is a humidity sensor, sensor 610 is an engine knock sensor, sensor 611 is an oil turbidity sensor, sensor 612 is a throttle position sensor, sensor 613 is a steering torque sensor, sensor 614 is a wheel speed sensor, sensor 615 is a tachometer, sensor 616 is a speedometer, sensor 617 is an oxygen sensor, sensor 618 represents a pitch and/or roll angle or angular rate sensor(s), sensor 619 is a clock, sensor 620 is an odometer, sensor 621 is a power steering pressure sensor, sensor 622 is a pollution sensor, sensor 623 is a fuel gauge, sensor 624 is a cabin thermometer, sensor 625 is a transmission fluid level sensor, sensor 626 represents a yaw angle or angular rate sensor(s), sensor 627 is a coolant level sensor, sensor 628 is a transmission fluid turbidity sensor, sensor 629 is brake pressure sensor and sensor 630 is a coolant pressure sensor. Other possible sensors include a temperature transducer, a pressure transducer, a liquid level sensor, a flow meter, a position sensor, a velocity sensor, a RPM sensor, a chemical sensor and an angle sensor, angular rate sensor or gyroscope.

If a distributed group of acceleration sensors or accelerometers are used to permit a determination of the location of a vibration source, the same group can, in some cases, also be used to determine the pitch, yaw and/or roll angular acceleration, velocity and position of the vehicle eliminating the need for dedicated angular rate sensors. In addition, as mentioned above, such a suite of sensors can also be used to determine the location and severity of a vehicle crash and additionally to determine that the vehicle is on the verge of rolling over. Thus, the same suite of accelerometers optimally performs a variety of functions including inertial navigation, crash sensing, vehicle diagnostics, rollover sensing etc.

Consider now some examples. The following is a partial list of potential component failures and the sensors from the list on FIG. 138 that might provide information to predict the failure of the component:

| | |
|---|---|
| Out of balance tires | 601, 613, 614, 615, 620, 621 |
| Front end out of alignment | 601, 613, 621, 626 |
| Tune up required | 601, 603, 610, 612, 615, 617, 620, 622 |
| Oil change needed | 603, 604, 605, 611 |
| Motor failure | 601, 602, 603, 604, 605, 606, 610, 612, 615, 617, 622 |
| Low tire pressure | 601, 613, 614, 615, 620, 621 |
| Front end looseness | 601, 613, 616, 621, 626 |
| Cooling system failure | 603, 615, 624, 627, 630 |
| Alternator problems | 601, 602, 607, 608, 615, 619, 620 |
| Transmission problems | 601, 603, 612, 615, 616, 620, 625, 628 |
| Differential problems | 601, 612, 614 |
| Brakes | 601, 602, 614, 618, 620, 626, 629 |
| Catalytic converter and muffler | 601, 602, 612, 615, 622 |
| Ignition | 601, 602, 607, 608, 609, 610, 612, 617, 623 |
| Tire wear | 601, 613, 614, 615, 618, 620, 621, 626 |
| Fuel leakage | 620, 623 |
| Fan belt slippage | 601, 602, 603, 607, 608, 612, 615, 619, 620 |
| Alternator deterioration | 601, 602, 607, 608, 615, 619 |
| Coolant pump failure | 601, 602, 603, 624, 627, 630 |
| Coolant hose failure | 601, 602, 603, 627, 630 |
| Starter failure | 601, 602, 607, 608, 609, 612, 615 |
| Dirty air filter | 602, 603, 606, 611, 612, 617, 622 |

Several interesting facts can be deduced from a review of the above list. First, all of the failure modes listed can be at least partially sensed by multiple sensors. In many cases, some of the sensors merely add information to aid in the interpretation of signals received from other sensors. In today's automobile, there are few if any cases where multiple sensors are used to diagnose or predict a problem. In fact, there is virtually no failure prediction undertaken at all. Second, many of the failure modes listed require information from more than one sensor. Third, information for many of the failure modes listed cannot be obtained by observing one data point in time as is now done by most vehicle sensors. Usually an analysis of the variation in a parameter as a function of time is necessary. In fact, the association of data with time to create a temporal pattern for use in diagnosing component failures in automobile is unique to at least one of the inventions disclosed herein as in the combination of several such temporal patterns. Fourth, the vibration measuring capability of the airbag crash sensor, or other accelerometer, is useful for most of the cases discussed above yet there is no such current use of accelerometers. The airbag crash sensor is used only to detect crashes of the vehicle. Fifth, the second most used sensor in the above list, a microphone, does not currently appear on any automobiles yet sound is the signal most often used by vehicle operators and mechanics to diagnose vehicle problems. Another sensor that is listed above which also does not currently appear on automobiles is a pollution sensor. This is typically a chemical sensor mounted in the exhaust system for detecting emissions from the vehicle. It is expected that this and other chemical sensors will be used more in the future.

In addition, from the foregoing depiction of different sensors which receive signals from a plurality of components, it is possible for a single sensor to receive and output signals from a plurality of components which are then analyzed by the processor to determine if any one of the components for which the received signals were obtained by that sensor is operating in an abnormal state. Likewise, it is also possible to provide for a multiplicity of sensors each receiving a different signal related to a specific component which are then analyzed by the processor to determine if that component is operating in an abnormal state. Note that neural networks can simultaneously analyze data from multiple sensors of the same type or different types.

The discussion above has centered on notifying the vehicle operator of a pending problem with a vehicle component. Today, there is great competition in the automobile marketplace and the manufacturers and dealers who are most responsive to customers are likely to benefit by increased sales both from repeat purchasers and new customers. The diagnostic module disclosed herein benefits the dealer by making him instantly aware, through the cellular telephone system, or other communication link, coupled to the diagnostic module or system in accordance with the invention, when a component is likely to fail. As envisioned, on some automobiles, when the diagnostic module 551 detects a potential failure it not only notifies the driver through a display 553, but also automatically notifies the dealer through a vehicle cellular phone 554 or other telematics communication link. The dealer can thus contact the vehicle owner and schedule an appointment to undertake the necessary repair at each party's mutual convenience. Contact by the dealer to the vehicle owner can occur as the owner is driving the vehicle, using a communications device. Thus, the dealer can contact the driver and informed him of their mutual knowledge of the problem and discuss scheduling maintenance to attend to the problem. The customer is pleased since a potential vehicle breakdown has been avoided and the dealer is pleased since he is likely to perform the repair work. The vehicle manufacturer also benefits by early and accurate statistics on the failure rate of vehicle components. This early warning system can reduce the cost of a potential recall for components having design defects. It could even have saved lives if such a system had been in place during the Firestone tire failure problem mentioned above. The vehicle manufacturer will thus be guided toward producing higher quality vehicles thus improving his competitiveness. Finally, experience with this system will actually lead to a reduction in the number of sensors on the vehicle since only those sensors that are successful in predicting failures will be necessary.

For most cases, it is sufficient to notify a driver that a component is about to fail through a warning display. In some critical cases, action beyond warning the driver may be required. If, for example, the diagnostic module detected that the alternator was beginning to fail, in addition to warning the driver of this eventuality, the module could send a signal to another vehicle system to turn off all non-essential devices which use electricity thereby conserving electrical energy and maximizing the time and distance that the vehicle can travel before exhausting the energy in the battery. Additionally, this system can be coupled to a system such as OnStar® or a vehicle route guidance system, and the driver can be guided to the nearest open repair facility or a facility of his or her choice.

In the discussion above, the diagnostic module of at least one of the inventions disclosed herein assumes that a vehicle data bus exists which is used by all of the relevant sensors on the vehicle. Most vehicles today do not have such a data bus although it is widely believed that most vehicles will have one in the future. Naturally, the relevant signals can be transmitted to the diagnostic module through a variety of coupling means other than through a data bus and at least one of the inventions disclosed herein is not limited to vehicles having a data bus. For example, the data can be sent wirelessly to the diagnostic module using the Bluetooth™ specification. In some cases, even the sensors do not have to be wired and can obtain their power via RF from the interrogator as is well known in the RFID-radio frequency identification (either silicon or surface acoustic wave (SAW) based)) field. Alternately an inductive or capacitive power transfer system can be used.

As can be appreciated from the above discussion, the invention described herein brings several new improvements to automobiles including, but not limited to, the use of pattern recognition technologies to diagnose potential vehicle component failures, the use of trainable systems thereby eliminating the need of complex and extensive programming, the simultaneous use of multiple sensors to monitor a particular component, the use of a single sensor to monitor the operation of many vehicle components, the monitoring of vehicle components which have no dedicated sensors, and the notification of both the driver and possibly an outside entity of a potential component failure in time so that the failure can be averted and vehicle breakdowns substantially eliminated. Additionally, improvements to the vehicle stability, crash avoidance, crash anticipation and occupant protection are available.

To implement a component diagnostic system for diagnosing the component utilizing a plurality of sensors not directly associated with the component, i.e., independent of the component, a series of tests are conducted. For each test, the signals received from the sensors are input into a pattern recognition training algorithm with an indication of whether the component is operating normally or abnormally (the component being intentionally altered to provide for abnormal operation). The data from the test are used to generate the pattern recognition algorithm, e.g., neural network, so that in use, the data from the sensors is input into the algorithm and the algorithm provides an indication of abnormal or normal operation of the component. Also, to provide a more versatile diagnostic module for use in conjunction with diagnosing abnormal operation of multiple components, tests may be conducted in which each component is operated abnormally while the other components are operating normally, as well as tests in which two or more components are operating abnormally. In this manner, the diagnostic module may be able to determine based on one set of signals from the sensors during use that either a single component or multiple components are operating abnormally.

Furthermore, the pattern recognition algorithm may be trained based on patterns within the signals from the sensors. Thus, by means of a single sensor, it would be possible to determine whether one or more components are operating abnormally. To obtain such a pattern recognition algorithm, tests are conducted using a single sensor, such as a microphone, and causing abnormal operation of one or more components, each component operating abnormally while the other components operate normally and multiple components operating abnormally. In this manner, in use, the pattern recognition algorithm may analyze a signal from a single sensor and determine abnormal operation of one or more components. Note that in some cases, simulations can be used to analytically generate the relevant data.

13.2 Smart Highways

The invention is also particularly useful in light of the foreseeable implementation of smart highways. Smart highways will result in vehicles traveling down highways under partial or complete control of an automatic system, i.e., not being controlled by the driver. The on-board diagnostic system will thus be able to determine failure of a component prior to or upon failure thereof and inform the vehicle's guidance system to cause the vehicle to move out of the stream of traffic, i.e., onto a shoulder of the highway, in a safe and orderly manner. Moreover, the diagnostic system may be controlled or programmed to prevent the movement of the disabled vehicle back into the stream of traffic until the repair of the component is satisfactorily completed.

In a method in accordance with this embodiment, the operation of the component would be monitored and if abnormal operation of the component is detected, e.g., by any of the methods and apparatus disclosed herein (although other component failure detection systems may of course be used in this implementation), the guidance system of the vehicle which controls the movement of the vehicle would be notified, e.g., via a signal from the diagnostic module to the guidance system, and the guidance system would be programmed to move the vehicle out of the stream of traffic, or off of the restricted roadway, possibly to a service station or dealer, upon reception of the particular signal from the diagnostic module. The automatic guidance systems for vehicles traveling on highways may be any existing system or system being developed, such as one based on satellite positioning techniques or ground-based positioning techniques. Since the guidance system may be programmed to ascertain the vehicle's position on the highway, it can determine the vehicle's current position, the nearest location out of the stream of traffic, or off of the restricted roadway, such as an appropriate shoulder or exit to which the vehicle may be moved, and the path of movement of the vehicle from the current position to the location out of the stream of traffic, or off of the restricted roadway. The vehicle may thus be moved along this path under the control of the automatic guidance system. In the alternative, the path may be displayed to a driver and the driver can follow the path, i.e., manually control the vehicle. The diagnostic module and/or guidance system may be designed to prevent re-entry of the vehicle into the stream of traffic, or off of the restricted roadway, until the abnormal operation of the component is satisfactorily addressed.

FIG. 139 is a flow chart of some of the methods for directing a vehicle off of a roadway if a component is operating abnormally. The component's operation is monitored at 560 and a determination is made at 561 whether its operation is abnormal. If not, the operation of the component is monitored further. If the operation of the component is abnormal, the vehicle can be directed off the roadway at 562. More particularly, this can be accomplished by generating a signal indicating the abnormal operation of the component at 563, directing this signal to a guidance system in the vehicle at 564 that guides movement of the vehicle off of the roadway at 565. Also, if the component is operating abnormally, the current position of the vehicle and the location of a site off of the roadway can be determined at 566, e.g., using satellite-based or ground-based location determining techniques, a path from the current location to the off-roadway location determined at 567 and then the vehicle directed along this path at 568. Periodically, a determination is made at 569 whether the component's abnormality has been satisfactorily addressed and/or corrected and if so, the vehicle can re-enter the roadway and operation of the component begins again. If not, the re-entry of the vehicle onto the roadway is prevented at 570.

FIG. 140 schematically shows the basic components for performing this method, i.e., a component operation monitoring system 571 (such as described above), an optional satellite-based or ground-based positioning system 572 and a vehicle guidance system 573.

13.3 Sensor Placement

FIG. 141 illustrates the placement of a variety of sensors, primarily accelerometers and/or gyroscopes, which can be used to diagnose the state of the vehicle itself. Sensor 582 can be located in the headliner or attached to the vehicle roof above the side door. Typically, there can be two such sensors one on either side of the vehicle. Sensor 583 is shown in a typical mounting location midway between the sides of the vehicle attached to or near the vehicle roof above the rear window. Sensor 586 is shown in a typical mounting location in the vehicle trunk adjacent the rear of the vehicle. Either one, two or three such sensors can be used depending on the application. If three such sensors are use one would be adjacent each side of vehicle and one in the center. Sensor 584 is shown in a typical mounting location in the vehicle door and sensor 585 is shown in a typical mounting location on the sill or floor below the door. Sensor 587, which can be also multiple sensors, is shown in a typical mounting location forward in the crush zone of the vehicle. Finally, sensor 588 can measure the acceleration of the firewall or instrument panel and is located thereon generally midway between the two sides of the vehicle. If three such sensors are used, one would be adjacent each vehicle side and one in the center.

In general, sensors 582-588 provide a measurement of the state of the vehicle, such as its velocity, angular velocity, acceleration, angular acceleration, position, angular orientation or temperature, or a state of the location at which the sensor is mounted. Thus, measurements related to the state of the sensor would include measurements of the acceleration of the sensor, measurements of the temperature of the mounting location as well as changes in the state of the sensor and rates of changes of the state of the sensor. As such, any described use or function of the sensors 582-588 above is merely exemplary and is not intended to limit the form of the sensor or its function.

Each of the sensors 582-588 may be single axis, dual axis or triaxial accelerometers and/or gyroscopes typically of the MEMS type. These sensors 582-588 can either be wired to the central control module or processor directly wherein they would receive power and transmit information, or they could be connected onto the vehicle bus or, in some cases, using RFID, SAW or similar technology, the sensors can be wireless and would receive their power through RF from one or more interrogators located in the vehicle. In this case, the interrogators can be connected either to the vehicle bus or directly to control module. Alternately, an inductive or capacitive power and information transfer system can be used.

One particular implementation will now be described. In this case, each of the sensors 582-588 is a single or dual axis accelerometer. They are made using silicon micromachined technology such as disclosed in U.S. Pat. Nos. 5,121,180 and 5,894,090. These are only representative patents of these devices and there exist more than 100 other relevant U.S. patents describing this technology. Commercially available MEMS gyroscopes such as from Systron Doner have accuracies of approximately one degree per second. In contrast, optical gyroscopes typically have accuracies of approximately one degree per hour. Unfortunately, the optical gyroscopes are prohibitively expensive for automotive applications at this time but it is expected that FOG (fiber optical gyroscopes) will also become smaller and significantly less expensive in the future. On the other hand, typical MEMS gyroscopes are not sufficiently accurate for many automotive applications.

13.4 IMU

The angular rate function can be obtained through placing accelerometers at two separated, non-co-located points in a vehicle and using the differential acceleration to obtain an indication of angular motion and angular acceleration. From the variety of accelerometers shown on FIG. 141, it can be appreciated that not only will all accelerations of key parts of the vehicle be determined, but the pitch, yaw and roll angular rates can also be determined based on the accuracy of the accelerometers. By this method, low cost systems can be developed which, although not as accurate as the optical gyroscopes, are considerably more accurate than conventional MEMS gyroscopes. Alternately, it has been found that from a single package containing up to three low cost MEMS gyroscopes and three low cost MEMS accelerometers, when carefully calibrated, an accurate inertial measurement unit (IMU) can be constructed that performs as well as units costing a great deal more. Such a package is sold by Crossbow Technology, Inc. 41 Daggett Dr., San Jose, Calif. 95134 or now from International Scientific Research, Inc., Panama City, Panama. If this IMU is combined with a GPS system and sometimes other vehicle sensor inputs using a Kalman filter; accuracy approaching that of expensive military units can be achieved.

Instead of using two accelerometers at separate locations on the vehicle, a single conformal MEMS-IDT gyroscope may be used. Such a conformal MEMS-IDT gyroscope is described in a paper by V. K. Varadan, "Conformal MEMS-IDT Gyroscopes and Their Comparison With Fiber Optic Gyro". The MEMS-IDT gyroscope is based on the principle of surface acoustic wave (SAW) standing waves on a piezoelectric substrate. A surface acoustic wave resonator is used to create standing waves inside a cavity and the particles at the anti-nodes of the standing waves experience large amplitude of vibrations, which serves as the reference vibrating motion for the gyroscope. Arrays of metallic dots are positioned at the anti-node locations so that the effect of Coriolis force due to rotation will acoustically amplify the magnitude of the waves. Unlike other MEMS gyroscopes, the MEMS-IDT gyroscope has a planar configuration with no suspended resonating mechanical structures. Other SAW-based gyroscopes are also now under development.

The system of FIG. 141 using dual axis accelerometers, or the IMU Kalman filter system, therefore provides a complete diagnostic system of the vehicle itself and its dynamic motion. Such a system is far more accurate than any system currently available in the automotive market. This system provides very accurate crash discrimination since the exact location of the crash can be determined and, coupled with knowledge of the force deflection characteristics of the vehicle at the accident impact site, an accurate determination of the crash severity and thus the need for occupant restraint deployment can be made. Similarly, the tendency of a vehicle to roll over can be predicted in advance and signals sent to the vehicle steering, braking and throttle systems to attempt to ameliorate the rollover situation or prevent it. In the event that it cannot be prevented, the deployment side curtain airbags can be initiated in a timely manner.

Similarly, the tendency of the vehicle to the slide or skid can be considerably more accurately determined and again the steering, braking and throttle systems commanded to minimize the unstable vehicle behavior.

Thus, through the sample deployment of inexpensive accelerometers at a variety of locations in the vehicle, or the IMU Kalman filter system significant improvements are made in the vehicle stability control, crash sensing, rollover sensing, and resulting occupant protection technologies.

13.5 Wireless

In one particular use of the invention, a wireless sensing and communication system is provided whereby the information or data obtained through processing of input from sensors of the wireless sensing and communication system is further transmitted for reception by a remote facility. Thus, in such a construction, there is an intra-vehicle communications between the sensors on the vehicle and a processing system (control module, computer or the like) and remote communications between the same or a coupled processing system (control module, computer or the like). The electronic components for the intra-vehicle communication may be designed to transmit and receive signals over short distances whereas the electronic components which enable remote communications should be designed to transmit and receive signals over relatively long distances.

The wireless sensing and communication system includes sensors that are located on the vehicle or in the vicinity of the vehicle and which provide information which is transmitted to one or more interrogators in the vehicle by wireless radio frequency means, using wireless radio frequency transmission technology. In some cases, the power to operate a particular sensor is supplied by the interrogator while in other cases the sensor is independently connected to either a battery, generator, vehicle power source or some source of power external to the vehicle.

The sensors for a system installed in a vehicle would likely include tire pressure, temperature and acceleration monitoring sensors, weight or load measuring sensors, switches, temperature, acceleration, angular position, angular rate, angular acceleration, proximity, rollover, occupant presence, humidity, presence of fluids or gases, strain, road condition and friction, chemical sensors and other similar sensors providing information to a vehicle system, vehicle operator or external site. The sensors can provide information about the vehicle and its interior or exterior environment, about individual components, systems, vehicle occupants, subsystems, or about the roadway, ambient atmosphere, travel conditions and external objects.

The system can use one or more interrogators each having one or more antennas that transmit radio frequency energy to the sensors and receive modulated radio frequency signals from the sensors containing sensor and/or identification information. One interrogator can be used for sensing multiple switches or other devices. For example, an interrogator may transmit a chirp form of energy at 905 MHz to 925 MHz to a variety of sensors located within or in the vicinity of the vehicle. These sensors may be of the RFID electronic type or of the surface acoustic wave (SAW) type. In the electronic type, information can be returned immediately to the interrogator in the form of a modulated RF signal. In the case of SAW devices, the information can be returned after a delay. Naturally, one sensor can respond in both the electronic and SAW delayed modes.

When multiple sensors are interrogated using the same technology, the returned signals from the various sensors can be time, code, space or frequency multiplexed. For example, for the case of the SAW technology, each sensor can be provided with a different delay. Alternately, each sensor can be designed to respond only to a single frequency or several frequencies. The radio frequency can be amplitude or frequency modulated. Space multiplexing can be achieved through the use of two or more antennas and correlating the received signals to isolate signals based on direction.

In many cases, the sensors will respond with an identification signal followed by or preceded by information relating to the sensed value, state and/or property. In the case of a SAW-based switch, for example, the returned signal may indicate that the switch is either on or off or, in some cases, an intermediate state can be provided signifying that a light should be dimmed, rather than or on or off, for example.

Great economies are achieved by using a single interrogator or even a small number of interrogators to interrogate many types of devices. For example, a single interrogator may monitor tire pressure and temperature, the weight of an occupying item of the seat, the position of the seat and seatback, as well as a variety of switches controlling windows, door locks, seat position, etc. in a vehicle. Such an interrogator may use one or multiple antennas and when multiple antennas are used, may switch between the antennas depending on what is being monitored.

13.5.1 Tire Pressure Monitors

The tire monitoring system of at least one of the inventions disclosed herein actually comprises three separate systems corresponding to three stages of product evolution. Generation 1 is a tire valve cap that provides information as to the pressure within the tire as described below. Generation 2 requires the replacement of the tire valve stem, or the addition of a new stem-like device, with a new valve stem that also measures temperature and pressure within the tire or it may be a device that attaches to the vehicle wheel rim. Generation 3 is a product that is attached to the inside of the tire adjacent the tread and provides a measure of the diameter of the footprint between the tire and the road, the tire pressure and temperature, indications of tire wear and, in some cases, the coefficient of friction between the tire and the road.

Surface acoustic wave technology permits the measurement of many physical and chemical parameters without the requirement of local power or energy. Rather, the energy to run devices can be obtained from radio frequency electromagnetic waves. These waves excite an antenna that is coupled to the SAW device. Through various means, the properties of the acoustic waves on the surface of the SAW device are modified as a function of the variable to be measured. The SAW device belongs to the field of microelectromechanical systems (MEMS) and can be produced in high-volume at low cost.

For the generation 1 system, a valve cap contains a SAW material at the end of the valve cap, which may be polymer covered. This device senses the absolute pressure in the valve cap. Upon attaching the valve cap to the valve stem, a depressing member gradually depresses the valve permitting the air pressure inside the tire to communicate with a small volume inside the valve cap. As the valve cap is screwed onto the valve stem, a seal prevents the escape of air to the atmosphere. The SAW device is electrically connected to the valve cap, which is also electrically connected to the valve stem that acts as an antenna for transmitting and receiving radio frequency waves. An interrogator located within 20 feet of the tire periodically transmits radio waves that power the SAW device. The SAW device measures the absolute pressure in the valve cap that is equal to the pressure in the tire.

The generation 2 system permits the measurement of both the tire pressure and tire temperature. In this case, the tire valve stem is removed and replaced with a new tire valve stem that contains a SAW device attached at the bottom of the valve stem. This device actually contains two SAW devices, one for measuring temperature and the second for measuring pressure through a novel technology discussed below. This second generation device therefore permits the measurement of both the pressure and the temperature inside the tire. Alternately, this device can be mounted inside the tire, attached to the rim or attached to another suitable location. An external pressure sensor is mounted in the interrogator to measure the pressure of the atmosphere to compensate for altitude and/or barometric changes.

The generation 3 device contains a pressure and temperature sensor, as in the case of the generation 2 device, but additionally contains one or more accelerometers which measure at least one component of the acceleration of the vehicle tire tread adjacent the device. This acceleration varies in a known manner as the device travels in an approximate circle attached to the wheel. This device is capable of determining when the tread adjacent the device is in contact with road surface. It is also able to measure the coefficient of friction between the tire and the road surface. In this manner, it is capable of measuring the length of time that this tread portion is in contact with the road and thereby provides a measure of the diameter of the tire footprint on the road. A technical discussion of the operating principle of a tire inflation and load detector based on flat area detection follows:

When tires are inflated and not in contact with the ground, the internal pressure is balanced by the circumferential tension in the fibers of the shell. Static equilibrium demands that tension is equal to the radius of curvature multiplied by the difference between the internal and the external gas pressure. Tires support the weight of the automobile by changing the curvature of the part of the shell that touches the ground. The relation mentioned above is still valid. In the part of the shell that gets flattened, the radius of curvature increases while the tension in the tire structure stays the same. Therefore, the difference between the external and internal pressures becomes small to compensate for the growth of the radius. If the shell were perfectly flexible, the tire contact with the ground would develop into a flat spot with an area equal to the load divided by the pressure.

A tire operating at correct values of load and pressure has a precise signature in terms of variation of the radius of curvature in the loaded zone. More flattening indicates under-inflation or overloading, while less flattening indicates over-inflation or under-loading. Note that tire loading has essentially no effect on internal pressure. Thus, this is a system for measuring vehicle overload.

From the above, one can conclude that monitoring the curvature of the tire as it rotates can provide a good indication of its operational state. A sensor mounted inside the tire at its largest diameter can accomplish this measurement. Preferably, the sensor would measure mechanical strain. However, a sensor measuring acceleration in the radial (preferred) or tangential axis could also serve the purpose.

In the case of the strain measurement, the sensor would indicate a constant strain as it spans the arc over which the tire is not in contact with the ground and a pattern of increased stretch during the arc of close proximity with the ground. A simple ratio of the times of duration of these two states would provide a good indication of inflation, but more complex algorithms could be employed, where the values and the shape of the period of increased strain are utilized.

In the case of acceleration measurement, the system would utilize the fact that the part of the tire in contact with the ground possesses zero vertical velocity for a finite period of time while the radial acceleration is changing as the radius is shortened and then lengthened in a cyclic fashion. The resulting acceleration profiles in the radial axis present a characteristic near-constant portion and a varying portion the length of which, when related to the rest of the rotation, is a result of the state of tire inflation and load on the tire.

As an indicator of tire health, the measurement of strain on the largest inside diameter of the tire is believed to be superior to the measurement of stress, such as inflation pressure, because, the tire could be deforming, as it ages or otherwise progresses toward failure, without any changes in inflation pressure. Radial strain could also be measured on the inside of the tire sidewall thus indicating the degree of flexure that the tire undergoes.

The accelerometer approach has the advantage of giving a signature from which a harmonic analysis of once-per-revolution disturbances could indicate developing problems such as hernias, flat spots, loss of part of the tread, sticking of foreign bodies to the tread, etc.

As a bonus, both of the above-mentioned sensors give clear once-per-revolution signals for each tire that could be used as inputs for speedometers, odometers, differential slip indicators, tire wear indicators, etc.

Tires can fail for a variety of reasons including low pressure, high temperature, delamination of the tread, excessive flexing of the sidewall, and wear (see, e.g., Summary Root Cause Analysis Bridgestone/Firestone, Inc." http: II www. bridgestone-firestone.com/homeimgs/rootcause. htm, Printed March, 2001). Most tire failures can be predicted based on tire pressure alone and the TREAD Act thus addresses the monitoring of tire pressure. However, some failures, such as the Firestone tire failures, can result from substandard materials especially those that are in contact with a steel-reinforcing belt. If the rubber adjacent the steel belt begins to move relative to the belt, then heat will be generated and the temperature of the tire will rise until the tire fails catastrophically. This can happen even in properly inflated tires.

Finally, tires can fail due to excessive vehicle loading and excessive sidewall flexing even if the tire is properly inflated. This can happen if the vehicle is overloaded or if the wrong size tire has been mounted on the vehicle. In most cases, the tire temperature will rise as a result of this additional flexing, however, this is not always the case, and it may even occur too late. Therefore, the device which measures the diameter of the tire footprint on the road is a superior method of measuring excessive loading of the tire.

Generation 1 devices monitor pressure only while generation 2 devices also monitor the temperature and therefore will provide a warning of imminent tire failure more often than through monitoring pressure alone. Generation 3 devices will give an indication that the vehicle is overloaded before either a pressure or temperature monitoring system can respond. The generation 3 system can also be augmented to measure the vibration signature of the tire and thereby detect when a tire has worn to the point that the steel belt is contacting the road. In this manner, the generation 3 system also provides an indication of a worn out tire and, as will be discussed below, an indication of the road coefficient of friction.

Each of these devices communicates to an interrogator with pressure, temperature, and acceleration as appropriate. In none of these generational devices is a battery mounted within the vehicle tire required, although in some cases a generator can be used. In most cases, the SAW devices will optionally provide an identification number corresponding to the device to permit the interrogator to separate one tire from another.

Key advantages of the tire monitoring system disclosed herein over most of the currently known prior art are:

- very small size and insignificant weight eliminating the need for wheel counterbalance,
- cost competitive for tire monitoring only, significant cost advantage when systems are combined,
- exceeds customers' price targets,
- high update rate,
- self-diagnostic,
- automatic wheel identification,
- no batteries required—powerless,
- no wires required—wireless.

SAW devices have been used for sensing many parameters including devices for chemical sensing and materials characterization in both the gas and liquid phase. They also are used for measuring pressure, strain, temperature, acceleration, angular rate and other physical states of the environment.

The monitoring of temperature and or pressure of a tire can take place infrequently. It is adequate to check the pressure and temperature of vehicle tires once every ten seconds to once per minute. To utilize the centralized interrogator of at least one of the inventions disclosed herein, the tire monitoring system would preferably use SAW technology and the device could be located in the valve stem, wheel, tire side wall, tire tread, or other appropriate location with access to the internal tire pressure of the tires. A preferred system is based on a SAW technology discussed above.

At periodic intervals, such as once every minute, the interrogator sends a radio frequency signal at a frequency such as 905 MHz to which the tire monitor sensors have been sensitized. When receiving this signal, the tire monitor sensors (of which there are five in a typical configuration) respond with a signal providing an optional identification number, temperature and pressure data. In one implementation, the interrogator would use multiple, typically two or four, antennas which are spaced apart. By comparing the time of the returned signals from the tires to the antennas, the location of each of the senders can be approximately determined. That is, the antennas can be so located that each tire is a different distance from each antenna and by comparing the return time of the signals sensed by the antennas, the location of each tire can be determined and associated with the returned information. If at least three antennas are used, then returns from adjacent vehicles can be eliminated.

An identification number can accompany each transmission from each tire sensor and can also be used to validate that the transmitting sensor is in fact located on the subject vehicle. In traffic situations, it is possible to obtain a signal from the tire of an adjacent vehicle. This would immediately show up as a return from more than five vehicle tires and the system would recognize that a fault had occurred. The sixth return can be easily eliminated, however, since it could contain an identification number that is different from those that have heretofore been returned frequently to the vehicle system or based on a comparison of the signals sensed by the different antennas. Thus, when the vehicle tire is changed or tires are rotated, the system will validate a particular return signal as originating from the tire-monitoring sensor located on the subject vehicle.

This same concept is also applicable for other vehicle-mounted sensors. This permits a plug and play scenario whereby sensors can be added to, changed, or removed from a vehicle and the interrogation system will automatically adjust. The system will know the type of sensor based on the identification number, frequency, delay and/or its location on the vehicle. For example, a tire monitor could have a different code in the identification number or different delay from a switch or weight-monitoring device. This also permits new kinds of sensors to be retroactively installed on a vehicle. If a totally new type of the sensor is mounted to the vehicle, the system software would have to be updated to recognize and know what to do with the information from the new sensor type. By this method, the configuration and quantity of sensing systems on a vehicle can be easily changed and the system interrogating these sensors need only be updated with software upgrades which could occur automatically over the Internet.

Preferred tire-monitoring sensors for use with at least one of the inventions disclosed herein use the surface acoustic wave (SAW) technology. A radio frequency interrogating signal is sent to all of the tire gages simultaneously and the received signal at each tire gage is sensed using an antenna. The antenna is connected to the IDT transducer that converts the electrical wave to an acoustic wave that travels on the surface of a material such as lithium niobate, or other piezoelectric material such as zinc oxide, Langasite or the polymer polyvinylidene fluoride (PVDF). During its travel on the surface of the piezoelectric material, either the time delay, resonant frequency, amplitude, or phase of the signal (or even possibly combinations thereof) is modified based on the temperature and/or pressure in the tire. This modified wave is sensed by one or more IDT transducers and converted back to a radio frequency wave that is used to excite an antenna for re-broadcasting the wave back to interrogator. The interrogator receives the wave at a time delay after the original transmission that is determined by the geometry of the SAW transducer and decodes this signal to determine the temperature and/or pressure in the subject tire. By using slightly different geometries for each of the tire monitors, slightly different delays can be achieved and randomized so that the probability of two sensors having the same delay is small. The interrogator transfers the decoded information to a central processor that then determines whether the temperature and/or pressure of each of the tires exceed specifications. If so, a warning light can be displayed informing the vehicle driver of the condition. In some cases, this random delay is all that is required to separate the five tire signals and to identify which tires are on the vehicle and thus ignore responses from adjacent vehicles.

With an accelerometer mounted in the tire, as is the case for the generation 3 system, information is present to diagnose other tire problems. For example, when the steel belt wears through the rubber tread, it will make a distinctive noise and create a distinctive vibration when it contacts the pavement. This can be sensed by the SAW accelerometer. The interpretation of various such signals can be done using neural network technology. Similar systems are described more detail in U.S. Pat. No. 5,829,782. As the tread begins to separate from the tire as in the Bridgestone cases, a distinctive vibration is created which can also be sensed by a tire-mounted accelerometer.

As the tire rotates, stresses are created in the rubber tread surface between the center of the footprint and the edges. If the coefficient of friction on the pavement is low, these stresses can cause the shape of the footprint to change. The generation 3 system, which measures the circumferential length of the footprint, can therefore also be used to measure the friction coefficient between the tire and the pavement.

Similarly, the same or a different interrogator can be used to monitor various components of the vehicle's safety system including occupant position sensors, vehicle acceleration sensors, vehicle angular position, velocity and acceleration sensors, related to both frontal, side or rear impacts as well as rollover conditions. The interrogator could also be used in conjunction with other detection devices such as weight sensors, temperature sensors, accelerometers which are associated with various systems in the vehicle to enable such systems to be controlled or affected based on the measured state.

The antennas used for interrogating the vehicle tire pressure transducers will be located outside of the vehicle passenger compartment. For many other transducers to be sensed the antennas must be located at various positions within passenger compartment. At least one of the inventions disclosed herein contemplates, therefore, a series of different antenna systems, which can be electronically switched by the interrogator circuitry. Alternately, in some cases, all of the antennas can be left connected and total transmitted power increased.

Referring now to FIGS. 143A-166B, a first embodiment of a valve cap 710 including a tire pressure monitoring system in accordance with the invention is shown generally at 710 in FIG. 13A. A tire 701 has a protruding, substantially cylindrical valve stem 702 which is shown in a partial cutaway view in FIG. 143A. The valve stem 702 comprises a sleeve 703 and a tire valve assembly 705. The sleeve 703 of the valve stem 702 is threaded on both its inner surface and its outer surface. The tire valve assembly 705 is arranged in the sleeve 703 and includes threads on an outer surface which are mated with the threads on the inner surface of the sleeve 703. The valve assembly 705 comprises a valve seat 704 and a valve pin 706 arranged in an aperture in the valve seat 704. The valve assembly 705 is shown in the open condition in FIG. 143A whereby air flows through a passage between the valve seat 704 and the valve pin 706.

The valve cap 710 includes a substantially cylindrical body 709 and is attached to the valve stem 702 by means of threads 708 arranged on an inner cylindrical surface of body 709 which are mated with the threads on the outer surface of the sleeve 703. The valve cap 710 comprises a valve pin depressor 714 arranged in connection with the body 709 and a SAW pressure sensor 711. The valve pin depressor 714 engages the valve pin 706 upon attachment of the valve cap 710 to the valve stem 702 and depresses it against its biasing spring, not shown, thereby opening the passage between the valve seat 704 and the valve pin 706 allowing air to pass from the interior of tire 701 into a reservoir or chamber 712 in the body 709. Chamber 712 contains the SAW pressure sensor 711 as described in more detail below.

Pressure sensor 711 is an absolute pressure-measuring device. It functions based on the principle that the increase in air pressure and thus air density in the chamber 712 increases the mass loading on a SAW device changing the velocity of surface acoustic wave on the piezoelectric material. The pressure sensor 711 is therefore positioned in an exposed position in the chamber 712.

A second embodiment of a valve cap 710' in accordance with the invention is shown in FIG. 143B and comprises a SAW strain sensing device 715 that is mounted onto a flexible membrane 713 attached to the body 709' of the valve cap 710' and in a position in which it is exposed to the air in the chamber 712'. When the pressure changes in chamber 712', the deflection of the membrane 713 changes thereby changing the stress in the SAW device 715.

Strain sensor 715 is thus a differential pressure-measuring device. It functions based on the principle that changes in the flexure of the membrane 713 can be correlated to changes in pressure in the chamber 712' and thus, if an initial pressure and flexure are known, the change in pressure can be determined from the change in flexure.

FIGS. 143A and 143B therefore illustrate two different methods of using a SAW sensor in a valve cap for monitoring the pressure inside a tire. The precise manner in which the SAW sensors 711,715 operate is discussed fully below but briefly, each sensor 711,715 includes an antenna and an interdigital transducer which receives a wave via the antenna from an interrogator which proceeds to travel along a substrate. The time in which the waves travel across the substrate and return to the interdigital transducer is dependent on the temperature, the mass loading on the substrate (in the embodiment of FIG. 143A) or the flexure of membrane 713 (in the embodiment of FIG. 143B). The antenna transmits a return wave which is receives and the time delay between the transmitted and returned wave is calculated and correlated to the pressure in the chamber 712 or 712'.

Sensors 711 and 715 are electrically connected to the metal valve cap 710 that is electrically connected to the valve stem 702. The valve stem 702 is electrically isolated from the tire rim and serves as an antenna for transmitting radio frequency electromagnetic signals from the sensors 711 and 715 to a vehicle mounted interrogator, not shown, to be described in detail below. As shown in FIG. 143A, a pressure seal 716 is arranged between an upper rim of the sleeve 703 and an inner shoulder of the body 709 of the valve cap 710 and serves to prevent air from flowing out of the tire 701 to the atmosphere.

The speed of the surface acoustic wave on the piezoelectric substrate changes with temperature in a predictable manner as well as with pressure. For the valve cap implementations, a separate SAW device can be attached to the outside of the valve cap and protected with a cover where it is subjected to the same temperature as the SAW sensors 711 or 715 but is not subject to pressure or strain. This requires that each valve cap comprise two SAW devices, one for pressure sensing and another for temperature sensing. Since the valve cap is exposed to ambient temperature, a preferred approach is to have a single device on the vehicle which measures ambient temperature outside of the vehicle passenger compartment. Many vehicles already have such a temperature sensor. A separate SAW temperature sensor can be mounted associated with the interrogator antenna, as illustrated below, or some other convenient place for those installations where access to this temperature data is not convenient.

Although the valve cap 710 is provided with the pressure seal 716, there is a danger that the valve cap 710 will not be properly assembled onto the valve stem 702 and a small quantity of the air will leak over time. FIG. 144 provides an alternate design where the SAW temperature and pressure measuring devices are incorporated into the valve stem. This embodiment is thus particularly useful in the initial manufacture of a tire.

The valve stem assembly is shown generally at 720 and comprises a brass valve stem 707 which contains a tire valve assembly 705. The valve stem 707 is covered with a coating 721 of a resilient material such as rubber, which has been partially removed in the drawing. A metal conductive ring 722 is electrically attached to the valve stem 707. A rubber extension 723 is also attached to the lower end of the valve stem 707 and contains a SAW pressure and temperature sensor 724. The SAW pressure and temperature sensor 724 can be of at least two designs wherein the SAW sensor is used as an absolute pressure sensor as shown in FIG. 144A or an as a differential sensor based on membrane strain as shown in FIG. 144B.

In FIG. 144A, the SAW sensor 724 comprises a capsule 732 having an interior chamber in communication with the interior of the tire via a passageway 730. A SAW absolute pressure sensor 727 is mounted onto one side of a rigid membrane or separator 731 in the chamber in the capsule 732. Separator 731 divides the interior chamber of the capsule 732 into two compartments 725 and 726, with only compartment 725 being in flow communication with the interior of the tire. The SAW absolute pressure sensor 727 is mounted in compartment 725 which is exposed to the pressure in the tire through passageway 730. A SAW temperature sensor 728 is attached to the other side of the separator 731 and is exposed to the pressure in compartment 726. The pressure in compartment 726 is unaffected by the tire pressure and is determined by the atmospheric pressure when the device was manufactured and the effect of temperature on this pressure. The speed of sound on the SAW temperature sensor 728 is thus affected by temperature but not by pressure in the tire.

The operation of SAW sensors 727 and 728 is discussed elsewhere more fully but briefly, since SAW sensor 727 is affected by the pressure in the tire, the wave which travels along the substrate is affected by this pressure and the time delay between the transmission and reception of a wave can be correlated to the pressure. Similarly, since SAW sensor 728 is affected by the temperature in the tire, the wave which travels along the substrate is affected by this temperature and the time delay between the transmission and reception of a wave can be correlated to the temperature.

FIG. 144B illustrates an alternate configuration of sensor 724 where a flexible membrane 733 is used instead of the rigid separator 731 shown in the embodiment of FIG. 144A, and a SAW device is mounted on flexible member 733. In this embodiment, the SAW temperature sensor 728 is mounted to a different wall of the capsule 732. A SAW device 729 is thus affected both by the strain in membrane 733 and the absolute pressure in the tire. Normally, the strain effect will be much larger with a properly designed membrane 733.

The operation of SAW sensors 728 and 729 is discussed elsewhere more fully but briefly, since SAW sensor 728 is affected by the temperature in the tire, the wave which travels along the substrate is affected by this temperature and the time delay between the transmission and reception of a wave can be correlated to the temperature. Similarly, since SAW sensor 729 is affected by the pressure in the tire, the wave which travels along the substrate is affected by this pressure and the time delay between the transmission and reception of a wave can be correlated to the pressure.

In both of the embodiments shown in FIG. 144A and FIG. 144B, a separate temperature sensor is illustrated. This has two advantages. First, it permits the separation of the temperature effect from the pressure effect on the SAW device. Second, it permits a measurement of tire temperature to be recorded. Since a normally inflated tire can experience excessive temperature caused, for example, by an overload condition, it is desirable to have both temperature and pressure measurements of each vehicle tire The SAW devices 727, 728 and 729 are electrically attached to the valve stem 707 which again serves as an antenna to transmit radio frequency information to an interrogator. This electrical connection can be made by a wired connection; however, the impedance between the SAW devices and the antenna may not be properly matched. An alternate approach as described in Varadan, V. K. et al., "Fabrication, characterization and testing of wireless MEMS-IDT based micro accelerometers" Sensors and Actuators A 90 (2001) p. 7-19, 2001 Elsevier Netherlands, is to inductively couple the SAW devices to the brass tube.

Although an implementation into the valve stem and valve cap examples have been illustrated above, an alternate approach is to mount the SAW temperature and pressure monitoring devices elsewhere within the tire. Similarly, although the tire stem in both cases above serves the antenna, in many implementations, it is preferable to have a separately designed antenna mounted within or outside of the vehicle tire. For example, such an antenna can project into the tire from the valve stem or can be separately attached to the tire or tire rim either inside or outside of the tire. In some cases, it can be mounted on the interior of the tire on the sidewall.

A more advanced embodiment of a tire monitor in accordance with the invention is illustrated generally at 635 in FIGS. 145 and 145A. In addition to temperature and pressure monitoring devices as described in the previous applications, the tire monitor assembly 635 comprises an accelerometer of any of the types to be described below which is configured to measure either or both of the tangential and radial accelerations. Tangential accelerations as used herein mean accelerations tangent to the direction of rotation of the tire and radial accelerations as used herein mean accelerations toward or away from the wheel axis.

In FIG. 145, the tire monitor assembly 635 is cemented to the interior of the tire opposite the tread. In FIG. 145A, the tire monitor assembly 635 is inserted into the tire opposite the tread during manufacture.

Superimposed on the acceleration signals will be vibrations introduced into tire from road interactions and due to tread separation and other defects. Additionally, the presence of the nail or other object attached to the tire will, in general, excite vibrations that can be sensed by the accelerometers. When the tread is worn to the extent that the wire belts 636 begin impacting the road, additional vibrations will be induced.

Through monitoring the acceleration signals from the tangential or radial accelerometers within the tire monitor assembly 635, delamination, a worn tire condition, imbedded nails, other debris attached to the tire tread, hernias, can all be sensed. Additionally, as previously discussed, the length of time that the tire tread is in contact with the road opposite tire monitor 635 can be measured and, through a comparison with the total revolution time, the length of the tire footprint on the road can be determined. This permits the load on the tire to be measured, thus providing an indication of excessive tire loading. As discussed above, a tire can fail due to over loading even when the tire interior temperature and pressure are within acceptable limits. Other tire monitors cannot sense such conditions.

In the discussion above, the use of the tire valve stem as an antenna has been discussed. An antenna can also be placed within the tire when the tire sidewalls are not reinforced with steel. In some cases and for some frequencies, it is sometimes possible to use the tire steel bead or steel belts as an antenna, which in some cases can be coupled to inductively. Alternately, the antenna can be designed integral with the tire beads or belts and optimized and made part of the tire during manufacture.

Although the discussion above has centered on the use of SAW devices, the configuration of FIG. 145 can also be effectively accomplished with other pressure, temperature and accelerometer sensors. One of the advantages of using SAW devices is that they are totally passive thereby eliminating the requirement of a battery. For the implementation of tire monitor assembly 635, the changes in acceleration can also be used to generate sufficient electrical energy to power a silicon microcircuit. In this configuration, additional devices, typically piezoelectric devices, are used as a generator of electricity that can be stored in one or more conventional capacitors or ultra-capacitors. Naturally, other types of electrical generators can be used such as those based on a moving coil and a magnetic field etc. A PVDF piezoelectric polymer can also be used to generate electrical energy based on the flexure of the tire as described in section 13.5.12.

FIG. 146 illustrates an absolute pressure sensor based on surface acoustic wave (SAW) technology. A SAW absolute pressure sensor 640 has an interdigital transducer (IDT) 641 which is connected to antenna 642. Upon receiving an RF signal of the proper frequency, the antenna induces a surface acoustic wave in the material 643 which can be lithium niobate, quartz, zinc oxide, or other appropriate piezoelectric material. As the wave passes through a pressure sensing area 644 formed on the material 643, its velocity is changed depending on the air pressure exerted on the sensing area 644. The wave is then reflected by reflectors 645 where it returns to the IDT 641 and to the antenna 642 for retransmission back to the interrogator. The material in the pressure sensing area 644 can be a thin (such as one micron) coating of a polymer that absorbs or reversibly reacts with oxygen or nitrogen where the amount absorbed depends on the air density.

In FIG. 146A, two additional sections of the SAW device, designated 646 and 647, are provided such that the air pressure affects sections 646 and 647 differently than pressure sensing area 644. This is achieved by providing three reflectors. The three reflecting areas cause three reflected waves to appear, 649, 650 and 651 when input wave 652 is provided. The spacing between waves 649 and 650 and between waves 650 and 651 provides a measure of the pressure. This construction of a pressure sensor may be utilized in the embodiments of FIGS. 143A-145 or in any embodiment wherein a pressure measurement by a SAW device is obtained.

There are many other ways in which the pressure can be measured based on either the time between reflections or on the frequency or phase change of the SAW device as is well known to those skilled in the art. FIG. 146B, for example, illustrates an alternate SAW geometry where only two sections are required to measure both temperature and pressure. This construction of a temperature and pressure sensor may be utilized in the embodiments of FIGS. 143A-145 or in any embodiment wherein both a pressure measurement and a temperature measurement by a single SAW device is obtained.

Another method where the speed of sound on a piezoelectric material can be changed by pressure was first reported in Varadan et al., "Local/Global SAW Sensors for Turbulence" referenced above. This, phenomenon has not been applied to solving pressure sensing problems within an automobile until now. The instant invention is believed to be the first application of this principle to measuring tire pressure, oil pressure, coolant pressure, pressure in a gas tank, etc. Experiments to date, however, have been unsuccessful.

In some cases, a flexible membrane is placed loosely over the SAW device to prevent contaminants from affecting the SAW surface. The flexible membrane permits the pressure to be transferred to the SAW device without subjecting the surface to contaminants. Such a flexible membrane can be used in most if not all of the embodiments described herein.

A SAW temperature sensor 655 is illustrated in FIG. 147. Since the SAW material, such as lithium niobate, expands significantly with temperature, the natural frequency of the device also changes. Thus, for a SAW temperature sensor to operate, a material for the substrate is selected which changes its properties as a function of temperature, i.e., expands. Similarly, the time delay between the insertion and retransmission of the signal also varies measurably. Since speed of a surface wave is typically 100,000 times slower then the speed of light, usually the time for the electromagnetic wave to travel to the SAW device and back is small in comparison to the time delay of the SAW wave and therefore the temperature is approximately the time delay between transmitting electromagnetic wave and its reception.

An alternate approach as illustrated in FIG. 147A is to place a thermistor 657 across an interdigital transducer (IDT) 656, which is now not shorted as it was in FIG. 147. In this case, the magnitude of the returned pulse varies with the temperature. Thus, this device can be used to obtain two independent temperature measurements, one based on time delay or natural frequency of the device 60 and the other based on the resistance of the thermistor 657.

When some other property such as pressure is being measured by the device 658 as shown in FIG. 147B, two parallel SAW devices are commonly used. These devices are designed so that they respond differently to one of the parameters to be measured. Thus, SAW device 659 and SAW device 660 can be designed to both respond to temperature and respond to pressure. However, SAW device 660, which contains a surface coating, will respond differently to pressure than SAW device 659. Thus, by measuring natural frequency or the time delay of pulses inserted into both SAW devices 659 and 660, a determination can be made of both the pressure and temperature, for example. Naturally, the device which is rendered sensitive to pressure in the above discussion could alternately be rendered sensitive to some other property such as the presence or concentration of a gas, vapor, or liquid chemical as described in more detail below.

An accelerometer that can be used for either radial or tangential acceleration in the tire monitor assembly of FIG. 15 is illustrated in FIGS. 148 and 148A. The design of this accelerometer is explained in detail in Varadan, V. K. et al., "Fabrication, characterization and testing of wireless MEMS-IDT based microaccelerometers" referenced above.

FIG. 154A is a schematic of the vehicle shown in FIG. 154. The antenna package 685, which can be considered as an electronics module, contains a time domain multiplexed antenna array that sends and receives data from each of the five tires (including the spare tire), one at a time. It comprises a microstrip or stripline antenna array and a microprocessor on the circuit board. The antennas that face each tire are in an X configuration so that the transmissions to and from the tire can be accomplished regardless of the tire rotation angle.

FIG. 165 illustrates another version of a tire temperature and/or pressure monitor 770. Monitor 770 may include at an inward end, any one of the temperature transducers or sensors described above and/or any one of the pressure transducers or sensors described above, or any one of the combination temperature and pressure transducers or sensors described above.

The monitor 770 has an elongate body attached through the wheel rim 773 typically on the inside of the tire so that the under-vehicle mounted antenna(s) have a line of sight view of antenna 774. Monitor 770 is connected to an inductive wire 772, which matches the output of the device with the antenna 774, which is part of the device assembly. Insulating material 771 surrounds the body which provides an air tight seal and prevents electrical contact with the wheel rim 773.

13.5.2 Other SAW Strain Sensors

Some vehicle models provide load leveling and ride control functions that depend on the magnitude and distribution of load carried by the vehicle suspension. Frequently, wire strain gage technology is used for these functions. That is, the wire strain gages are used to sense the load and/or load distribution of the vehicle on the vehicle suspension system. Such strain gages can be advantageously replaced with strain gages based on SAW technology with the significant advantages in terms of cost, wireless monitoring, dynamic range, and signal level. In addition, SAW strain gage systems can be significantly more accurate than wire strain gage systems.

A strain detector in accordance with at least one of the inventions disclosed herein can convert mechanical strain to variations in electrical signal frequency with a large dynamic range and high accuracy even for very small displacements. The frequency variation is produced through use of a surface acoustic wave delay line as the frequency control element of an oscillator. A surface acoustic wave delay line comprises a transducer deposited on a piezoelectric material such as quartz or lithium niobate which is disposed so as to be deformed by strain in the member which is to be monitored. Deformation of the piezoelectric substrate changes the frequency characteristics of the surface acoustic wave delay line, thereby changing the frequency of the oscillator. Consequently, the oscillator frequency change is a measure of the strain in the member being monitored and thus the weight applied to the seat or other item. A SAW strain transducer is capable of resolution substantially greater than that of a conventional strain gage.

Other applications of weight measuring systems for an automobile include measuring the weight of the fuel tank or other containers of fluid to determine quantity of fluid contained therein.

One problem with SAW devices is that if they are designed to operate at the GHz frequency, the feature sizes become exceeding small and the devices are difficult to manufacture. On the other hand, if the frequencies are considerably lower, for example, in the tens of megahertz range, then the antenna sizes become excessive. It is also more difficult to obtain antenna gain at the lower frequencies. This is also related to antenna size. One method of solving this problem is to transmit an interrogation signal in the many GHz range which is modulated at the hundred MHz range. At the SAW transducer, the transducer is tuned to the modulated frequency. Using a nonlinear device such as a Schottky diode, the modified signal can be mixed with the incoming high frequency signal and re-transmitted through the same antenna. For this case, the interrogator could continuously broadcast the carrier frequency.

In addition to measuring the weight of an occupying item on a seat, the location of the seat and setback can also be determined by the interrogator. Since the SAW devices inherently create a delayed return signal, either that delay must be very accurately known or an alternate approach is required. One such alternate approach is to use the heterodyne principal described above to cause the antenna to return a signal of a different frequency. By comparing the phases of the sending and received signal, the distance to the device can be determined. Also, as discussed above, multiple antennas can be used for seat position and seatback position sensing.

13.5.3 SAW Switches

Devices based on RFID technology can be used as switches in a vehicle as described in U.S. Pat. Nos. 6,078,252 and 6,144,288, and U.S. patent application Ser. No. 09/765,558 filed Jan. 19, 2001. There are many ways that it can be accomplished. A switch can be used to connect an antenna to either an RFID electronic device or to an RFID SAW device. This of course requires contacts to the closed by the switch activation. An alternate approach is to use pressure from an occupant's finger, for example, to alter the properties of the acoustic wave on the SAW material much as in a SAW touch screen. These properties that can be modified include the amplitude of the acoustic wave, and its phase, and/or the time delay or an external impedance connected to one of the SAW reflectors as disclosed in U.S. Pat. No. 6,084,503. In this implementation, the SAW transducer can contain two sections, one which is modified by the occupant and the other which serves as a reference. A combined signal is sent to the interrogator that decodes the signal to determine that the switch has been activated. By any of these technologies, switches can be arbitrarily placed within the interior of an automobile, for example, without the need for wires. (The wires would be an optional feature.) Since wires and connectors are the clause of most warranty repairs in an automobile, not only is the cost of switches substantially reduced but also the reliability of the vehicle electrical system is substantially improved.

The interrogation of switches can take place with moderate frequency such as once every 100 milliseconds. Either through the use of different frequencies or different delays, a large number of switches can be either time, code, space or frequency multiplexed to permit separation of the signals obtained by the interrogator.

Another approach is to attach a variable impedance device across one of the reflectors on the SAW device. The impedance can therefore used to determine the relative reflection from the reflector compared to other reflectors on the SAW device. In this way, the magnitude as well as the presence of a force exerted by an occupant's finger, for example, can be used to provide rate sensitivity to the desired function. In an alternate design, as shown U.S. Pat. No. 6,144,288, the switch is used to connect the antenna to the SAW device. Of course, in this case the interrogator will not get a return from the SAW switch unless it is depressed.

Temperature measurement is another field in which SAW technology can be applied and the invention encompasses several embodiments of SAW temperature sensors.

A SAW device can also be used as a wireless switch as shown in FIGS. 150A and 150B. FIG. 150A shows a surface 670 containing a projection 672 on top of a SAW device 671. Surface material 670 could be, for example, the armrest of an automobile, the steering wheel airbag cover, or any other surface within the passenger compartment of an automobile or elsewhere. Projection 672 will typically be a material capable of transmitting force to the surface of SAW device 671. As shown in FIG. 150B, a projection 673 may be placed on top of the SAW device 674. This projection 673 permits force exerted on the projection 672 to create a pressure on the SAW device 674. This increased pressure changes the time delay or natural frequency of the SAW wave traveling on the surface of material. Alternately, it can affect the magnitude of the returned signal. The projection 673 is typically held slightly out of contact with the surface until forced into contact with it.

An alternate approach is to place a switch across the IDT 677 as shown in FIG. 150C. If switch 675 is open, then the device will not return a signal to the interrogator. If it is closed, than the IDT 677 will act as a reflector sending a single back to IDT 678 and thus to the interrogator. Alternately, a switch 676 can be placed across the SAW device. In this case, a switch closure shorts the SAW device and no signal is returned to the interrogator. For the embodiment of FIG. 150C, using switch 676 instead of switch 675, a standard reflector IDT would be used in place of the IDT 677.

13.5.4 SAW Temperature Sensors

U.S. Pat. No. 4,249,418 is one of many examples of prior art SAW temperature sensors. Temperature sensors are commonly used within vehicles and many more applications might exist if a low cost wireless temperature sensor is available, i.e., the invention. The SAW technology can be used for such temperature sensing tasks. These tasks include measuring the vehicle coolant temperature, air temperature within passenger compartment at multiple locations, seat temperature for use in conjunction with seat warming and cooling systems, outside temperatures and perhaps tire surface temperatures to provide early warning to operators of road freezing conditions. One example, is to provide air temperature sensors in the passenger compartment in the vicinity of ultrasonic transducers used in occupant sensing systems as described in the current assignee's USRE37260 (a reissue of U.S. Pat. No. 5,943,295 Varga et al.) since the speed of sound in the air varies by approximately 20% from −40° C. to 85° C. The subject matter of this patent is included in the invention to form a part thereof. Current ultrasonic occupant sensor systems do not measure or compensate for this change in the speed of sound with the effect of significantly reducing the accuracy of the systems at the temperature extremes. Through the judicious placement of SAW temperature sensors in the vehicle, the passenger compartment air temperature can be accurately estimated and the information provided wirelessly to the ultrasonic occupant sensor system thereby permitting corrections to be made for the change in speed of sound.

13.5.5 SAW Accelerometers

Acceleration sensing is another field in which SAW technology can be applied and the invention encompasses several embodiments of SAW accelerometers.

U.S. Pat. Nos. 4,199,990, 4,306,456 and 4,549,436 are examples of prior art SAW accelerometers. Most airbag crash sensors for determining whether the vehicle is experiencing a frontal or side impact currently use micromachined accelerometers. These accelerometers are usually based on the deflection of a mass which is sensed using either capacitive or piezoresistive technologies. SAW technology has heretofore not been used as a vehicle accelerometer or for vehicle crash sensing. Due to the importance of this function, at least one interrogator could be dedicated to this critical function. Acceleration signals from the crash sensors should be reported at least preferably every 100 microseconds. In this case, the dedicated interrogator would send an interrogation pulse to all crash sensor accelerometers every 100 microseconds and receive staggered acceleration responses from each of the SAW accelerometers wirelessly. This technology permits the placement of multiple low-cost accelerometers at ideal locations for crash sensing including inside the vehicle side doors, in the passenger compartment and in the frontal crush zone. Additionally crash sensors can now be located in the rear of the vehicle in the crush zone to sense rear impacts. Since the acceleration data is transmitted wirelessly, concern about the detachment or cutting of wires from the sensors disappears. One of the main concerns, for example, of placing crash sensors in the vehicle doors where they most appropriately can sense vehicle side impacts, is the fear that an impact into the A-pillar of the automobile would sever the wires from the door-mounted crash sensor before the crash was sensed. This problem disappears with the current wireless technology of at least one of the inventions disclosed herein. If two accelerometers are placed at some distance from each other, the roll rate of the vehicle can be determined and thus the tendency of the vehicle to rollover can be predicted in time to automatically take corrective action and/or deploy a curtain airbag or other airbag(s).

Although the sensitivity of measurement is considerably greater than that obtained with conventional piezo-electric accelerometers, the frequency deviation remains low in absolute value. Accordingly, the frequency drift of thermal origin has to be made as low as possible by selecting a suitable cut of the piezoelectric material. The resulting accuracy is impressive as presented in U.S. Pat. No. 4,549,436 which discloses an angular accelerometer with a dynamic a range of 1 million, temperature coefficient of 0.005%/deg F, an accuracy of 1 microradian/sec$^2$, a power consumption of 1 milliwatt, a drift of 0.01% per year, a volume of 1 cc/axis and a frequency response of 0 to 1000 Hz. The subject matter of this patent is hereby included in the invention to constitute a part of the invention. A similar design can be used for acceleration sensing.

In a similar manner as the polymer coated SAW device is used to measure pressure, a similar device wherein a seismic mass is attached to a SAW device through a polymer interface can be made to sense acceleration. This geometry has a particular advantage for sensing accelerations below 1 G, which has proved to be very difficult in conventional micromachined accelerometers due to their inability to both measure low accelerations and withstand shocks.

Most SAW-based accelerometers work on the principle of straining the SAW surface and thereby changing either the time delay or natural frequency of the system. An alternate novel accelerometer is illustrated FIG. 151A wherein a mass 680 is attached to a silicone rubber coating 681 which has been applied the SAW device. Acceleration of the mass in FIG. 151 in the direction of arrow X changes the amount of rubber in contact with the surface of the SAW device and thereby changes the damping, natural frequency or the time delay of the device. By this method, accurate measurements of acceleration below 1 G are readily obtained. Furthermore, this device can withstand high deceleration shocks without damage. FIG. 151B illustrates a more conventional approach where the strain in a beam 682 caused by the acceleration acting on a mass 683 is measured with a SAW strain sensor 684.

It is important to note that all of these devices have a high dynamic range compared with most competitive technologies. In some cases, this dynamic range can exceed 100,000. This is the direct result of the ease with which frequency and phase can be accurately measured.

13.5.6 SAW Gyroscopes

Gyroscopes are another field in which SAW technology can be applied and the invention encompasses several embodiments of SAW gyroscopes.

The SAW technology is particularly applicable for gyroscopes as described in International Publication No.

WO 00/79217A2 to Varadan et al. The output of such gyroscopes can be determined with an interrogator that is also used for the crash sensor accelerometers, or a dedicated interrogator can be used. Gyroscopes having an accuracy of approximately 1 degree per second have many applications in a vehicle including skid control and other dynamic stability functions. Additionally, gyroscopes of similar accuracy can be used to sense impending vehicle rollover situations in time to take corrective action.

SAW gyroscopes of the type described in WO 00/79217A2 have the capability of achieving accuracies approaching 3 degrees per hour. This high accuracy permits use of such gyroscopes in an inertial measuring unit (IMU) that can be used with accurate vehicle navigation systems and autonomous vehicle control based on differential GPS corrections. Such a system is described in U.S. Pat. No. 6,370,475. Such navigation systems depend on the availability of four or more GPS satellites and an accurate differential correction signal such as provided by the OmniStar Corporation or NASA or through the National Differential GPS system now being deployed. The availability of these signals degrades in urban canyon environments, tunnels, and on highways when the vehicle is in the vicinity of large trucks. For this application, an IMU system should be able to accurately control the vehicle for perhaps 15 seconds and preferably for up to five minutes. An IMU based on SAW technology or the technology of U.S. Pat. No. 4,549,436 discussed above are the best-known devices capable of providing sufficient accuracies for this application at a reasonable cost. Other accurate gyroscope technologies such as fiber optic systems are more accurate but can cost many thousands of dollars. In contrast, in high volume production, an IMU of the required accuracy based on SAW technology should cost less than $100 in high volume production.

Once an IMU of the accuracy described above is available in the vehicle, this same device can be used to provide significant improvements to vehicle stability control and rollover prediction systems.

A gyroscope, which is suitable for automotive applications, is illustrated in FIG. 152 and described in detail in V. K. Varadan's International Application No. WO 00/79217. This SAW-based gyroscope has applicability for the vehicle navigation, dynamic control, and rollover sensing among others. A variety of MEMS based gyroscopes are now available in the market based, for example, on placing a MEMS sensor on a vibrating beam and measuring the coriolis acceleration.

13.5.7 Keyless Entry

Keyless entry systems are another field in which SAW technology can be applied and the invention encompasses several embodiments of access control systems using SAW devices.

A good use of SAW technology could be for access control to buildings as well as vehicles. RFID technology using electronics is also applicable for this purpose; however, the range of electronic RFID technology is usually limited to one meter or less. In contrast, the SAW technology can permit sensing up to about 30 meters. As a keyless entry system, an automobile can be configured such that the doors unlock as the holder of a card containing the SAW ID system approaches the vehicle, perhaps with a time delay, and similarly, the vehicle doors can be automatically locked when occupant with the card travels beyond a certain distance from the vehicle. When the occupant enters the vehicle, the doors can again automatically lock either through logic or through a current system wherein doors automatically lock when the vehicle is placed in gear. An occupant with such a card would also not need to have an ignition key. The vehicle would recognize that the SAW based card was inside vehicle and then permit the vehicle to be started by issuing an oral command if a voice recognition system is present or by depressing a button, for example, without the need for an ignition key.

13.5.8 Wireless Information Network

Occupant presence and position sensing is another field in which SAW technology can be applied and the invention encompasses several embodiments of SAW occupant presence and/or position sensors.

Many sensing systems are available for the use to identify and locate occupants or other objects in a passenger compartment of the vehicle. Such sensors include ultrasonic sensors, chemical sensors (e.g. carbon dioxide), cameras, radar systems, heat sensors, capacitance, magnetic or other field change sensors, etc. Most of these sensors require power to operate and return information to a central processor for analysis. An ultrasonic sensor, for example, may be mounted in or near the headliner of the vehicle and periodically it transmits a few ultrasonic waves and receives reflections of these waves from occupying items of the passenger seat. Current systems on the market are controlled by electronics in a dedicated ECU.

An alternate method as taught in at least one of the inventions disclosed herein is to use an interrogator to send a signal to the headliner-mounted ultrasonic sensor causing that sensor to transmit and receive ultrasonic waves. The sensor in this case would perform mathematical operations on the received waves and create a vector of data containing perhaps twenty to forty values and transmit that vector wirelessly to the interrogator. By means of this system, the ultrasonic sensor need only be connected to the vehicle power system and the information could be transferred to and from the sensor wirelessly. Such a system significantly reduces the wiring complexity especially when there may be multiple such sensors distributed in the passenger compartment. Now, only a power wire needs to be attached to the sensor and there does not need to be any direct connection between the sensor and the control module. Naturally, the same philosophy would apply to radar-based sensors, electromagnetic sensors of all kinds including cameras, capacitive or other electromagnetic field change sensitive sensors etc. In some cases, the sensor itself can operate on power supplied by the interrogator through radio frequency transmission. In this case, even the connection to the power line can be omitted. This principle can be extended to the large number of sensors and actuators that are currently in the vehicle where the only wires that are needed are those to supply power to the sensors and actuators and the information is supplied wirelessly. These systems can be based on RFID, SAW, Bluetooth, Wi-Fi or other systems.

Such wireless powerless sensors can also be use, for example, as close proximity sensors based on measurement of thermal radiation from an occupant. Such sensors can be mounted on any of the surfaces in the passenger compartment, including the seats, which are likely to receive such radiation.

13.5.9 SAW Chemical Sensors

A significant number of people suffocate each year in automobiles due to excessive heat, carbon dioxide, carbon monoxide, or other dangerous fumes. The SAW sensor technology is particularly applicable to solving these kinds of problems. The temperature measurement capabilities of SAW transducers have been discussed above. If the surface of a SAW device is covered with a material which captures carbon dioxide, for example, such that the mass, elastic constants or other property of surface coating changes, the characteristics of the surface acoustic waves can be modified as described in detail in U.S. Pat. No. 4,637,987 and elsewhere. Once again, an interrogator can sense the condition of these chemical-sensing sensors without the need to supply power and connect the sensors with either wireless communication or through the power wires. If a concentration of carbon monoxide is sensed, for example, an alarm can be sounded, the windows opened, and/or the engine extinguished. Similarly, if the temperature within the passenger compartment exceeds a certain level, the windows can be automatically opened a little to permit an exchange of air reducing the inside temperature and thereby perhaps saving the life of an infant or pet left in the vehicle unattended.

In a similar manner, the coating of the surface wave device can contain a chemical which is responsive to the presence of alcohol. In this case, the vehicle can be prevented from operating when the concentration of alcohol vapors in the vehicle exceeds some determined limit.

Each year a number of children and animals are killed when they are locked into a vehicle trunk. Since children and animals emit significant amounts of carbon dioxide, a carbon dioxide sensor connected to the vehicle system wirelessly and powerlessly provides an economic way of detecting the presence of a life form in the trunk. If a life form is detected, then a control system can release a trunk lock thereby opening the trunk. Alarms can also be sounded or activated when a life form is detected in the trunk.

Although they will not be discussed in detail, SAW sensors operating in the wireless mode can also be used to sense for ice on the windshield or other exterior surfaces of the vehicle, condensation on the inside of the windshield or other interior surfaces, rain sensing, heat load sensing and many other automotive sensing functions. They can also be used to sense outside environmental properties and states including temperature, humidity, etc.

SAW sensors can be economically used to measure the temperature and humidity at numerous places both inside and outside of a vehicle. When used to measure humidity inside the vehicle, a source of water vapor can be activated to increase the humanity when desirable and the air conditioning system can be activated to reduce the humidity when necessary. Temperature and humidity measurements outside of the vehicle can be an indication of potential road icing problems. Such information can be used to provide early warning to a driver of potentially dangerous conditions. Although the invention described herein is related to land vehicles, many of these advances are equally applicable to other vehicles such as boats, trucks, trailers, containers, airplanes and even, in some cases, homes and buildings. The invention disclosed herein, therefore, is not limited to automobiles or other land vehicles.

13.5.10 Road Condition Sensing

Road condition sensing is another field in which SAW technology can be applied and the invention encompasses several embodiments of SAW road condition sensors.

The temperature and moisture content of the surface of a roadway are critical parameters in determining the icing state of the roadway. Attempts have been made to measure the coefficient of friction between a tire and the roadway by placing strain gages in the tire tread. Naturally, such strain gages are ideal for the application of SAW technology especially since they can be interrogated wirelessly from a distance and they require no power for operation. As discussed above, SAW accelerometers can also perform this function. The measurement of the friction coefficient, however, is not predictive and the vehicle operator is only able to ascertain the condition after the fact. SAW based transducers have the capability of being interrogated as much as 100 feet from the interrogator. Therefore, the judicious placement of low-cost powerless SAW temperature and humidity sensors in or on the roadway at critical positions can provide an advance warning to vehicle operators that road is slippery ahead. Such devices are very inexpensive and therefore could be placed at frequent intervals along a highway.

An infrared sensor that looks down the highway in front of the vehicle can actually measure the road temperature prior to the vehicle traveling on that part of the roadway. This system also would not give sufficient warning if the operator waited for the occurrence of a frozen roadway. The probability of the roadway becoming frozen, on the other hand, can be predicted long before it occurs, in most cases, by watching the trend in the temperature.

Some lateral control of the vehicle can also be obtained from SAW transducers or electronic RFID tags placed down the center of the lane, either above the vehicles or in the roadway, for example. A vehicle having two receiving antennas approaching such devices, through triangulation, is able to determine the lateral location of the vehicle relative to these SAW devices. If the vehicle also has an accurate map of the roadway, the identification number associated with each such device can be used to obtain highly accurate longitudinal position determinations. Ultimately, the SAW devices can be placed on structures beside the road and perhaps on every mile or tenth of a mile marker. If three antennas are used, as discussed herein, the distances to the SAW device can be determined.

Electronic RFID tags are also suitable for lateral and longitudinal positioning purposes, however, the range available for electronic RFID systems is considerably less than that of SAW based systems. On the other hand, as taught in U.S. patent application Ser. No. 09/765,558 the time of flight of the RFID system can be used to determine the distance from the vehicle to the RFID tag. Because of the inherent delay in the SAW devices and its variation with temperature, accurate distance measurement is probably not practical based on time of flight but somewhat less accurate distance measurements based on relative time of arrival can be made. Even if the exact delay imposed by the SAW device was accurately known at one temperature, such devices are usually reasonably sensitive to changes in temperature, hence they make good temperature sensors, and thus the accuracy of the delay in the SAW device is more difficult to maintain. An interesting variation of an electronic RFID that is particularly applicable to this and other applications of at least one of the inventions disclosed herein is disclosed in A. Pohl, L. Reindl, "New passive sensors", Proc. 16th IEEE Instrumentation and Measurement Technology Conf., IMTC/99, 1999, pp. 1251-1255.

Many SAW devices are based on lithium niobate or similar strong piezoelectric materials. Such materials can have high thermal expansion coefficients. An alternate material is quartz that has a very low thermal expansion coefficient. However, its piezoelectric properties are inferior to lithium niobate. One solution to this problem is to use lithium niobate as the coupling system between the antenna and the material upon which the surface acoustic wave travels. In this matter, the advantages of a low thermal expansion coefficient material can be obtained while using the lithium niobate for its strong piezoelectric properties. Other useful materials such as Langasite have properties that are intermediate between lithium niobate and quartz. Note that it is also possible to use combinations of materials to achieve particular objectives with property measurement since different materials respond differently to different sensed properties or environments.

The use of SAW tags as an accurate precise positioning system as described above would be applicable for accurate vehicle location, as discussed in U.S. Pat. No. 6,370,475, for lanes in tunnels, for example, or other cases where loss of satellite lock is common.

The various technologies discussed above can be used in combination. The electronic RFID tag can be incorporated into a SAW tag (or vice versa) providing a single device that provides both an instant reflection of the radio frequency waves as well as a re-transmission at a later time. This marriage of the two technologies permits the strengths of each technology to be exploited in the same device. For most of the applications described herein, the cost of mounting such a tag in a vehicle or on the roadway far exceeds the cost of the tag itself. Therefore, combining the two technologies does not significantly affect the cost of implementing tags onto vehicles or roadways or side structures.

An alternate method to the electronic RFID tag is to simply use a radar reflector and measure the time of flight to the reflector and back. The radar reflector can even be made of a series of reflecting surfaces displaced from each other to achieve some simple coding.

Based on the frequency and power available, and on FCC limitations, SAW devices can be designed to permit transmission distances of up to 100 feet or more. Since SAW devices can measure both temperature and humidity, they are also capable of monitoring road conditions in front of and around a vehicle. Thus, a properly equipped vehicle can determine the road conditions prior to entering a particular road section if such SAW devices are embedded in the road surface or on mounting structures close to the road surface as shown at 689 in FIG. 155. Such devices could provide advance warning of freezing conditions, for example. Although at 60 miles per hour, such devices may only provide a one second warning, this can be sufficient to provide information to a driver to prevent dangerous skidding. Additionally, since the actual temperature and humidity can be reported, the driver will be warned prior to freezing of the road surface. SAW device 689 is shown in detail in FIG. 155A.

13.5.11 Ultrasound on a Surface

Another field in which SAW technology can be applied is for "ultrasound-on-a-surface" type of devices. U.S. Pat. No. 5,629,681, assigned to the same assignee herein, describes many uses of ultrasound in a tube. Many of the applications are also candidates for ultrasound-on-a-surface devices. In this case, a micromachined SAW device will in general be replaced by a much larger structure.

Touch screens based on surface acoustic waves are well known in the art. The use of this technology for a touch pad for use with a heads-up display is disclosed in the current assignee's U.S. patent application Ser. No. 09/645,709. The use of surface acoustic waves in either one or two dimensional applications has many other possible uses such as for pinch protection on window and door closing systems, crush sensing crash sensors, occupant presence detector and butt print measurement systems, generalized switches such as on the circumference or center of the steering wheel, etc. Since these devices typically require significantly more power than the micromachined SAW devices discussed above, most of these applications will require a power connection. On the other hand, the output of these devices can go through a SAW device or, in some other manner, be attached to an antenna and interrogated using a remote interrogator thus eliminating the need for a direct wire communication link.

One example would be to place a surface acoustic wave device on the circumference of the steering wheel. Upon depressing a section of this device, the SAW wave would be attenuated. The interrogator would notify the acoustic wave device at one end of the device to launch an acoustic wave and then monitor output from the antenna. Depending on the phase, time delay, and/or amplitude of the output wave, the interrogator would know where the operator had depressed the steering wheel SAW switch and therefore know the function desired by the operator.

13.5.12 Piezoelectric Generator

Piezoelectric generators are another field in which SAW technology can be applied and the invention encompasses several embodiments of SAW piezoelectric generators.

An alternate approach for some applications, such as tire monitoring, where it is difficult to interrogate the SAW device as the wheel, and thus the antenna, is rotating, the transmitting power can be significantly increased if there is a source of energy inside the tire. Many systems now use a battery but this leads to problems related to having to periodically replace the battery and temperature effects. In some cases, the manufacturers recommend that the battery be replaced as often as every 6 to 12 months. Batteries also sometimes fail to function properly at cold temperatures and have their life reduced when operated at high temperatures. For these reasons, there is a strong belief that a tire monitoring system should obtain its power from some source external of the tire. Similar problems can be expected for other applications.

One novel solution to this problem is to use the flexing of the tire itself to generate electricity. If a thin film of PVDF is attached to the tire inside and adjacent to the tread, then as the tire rotates the film will flex and generate electricity. This energy can then be stored on one or more capacitors, or ultracapacitors, and used to power the tire monitoring circuitry. Also, since the amount of energy that is generated depends of the flexure of the tire, this generator can also be used to monitor the health of the tire in a similar manner as the generation 3 accelerometer system described above.

As mentioned above, the transmissions from different SAW devices can be time multiplexed by varying the delay time from device to device, frequency multiplexed by varying the natural frequencies of the SAW devices, code multiplexed by varying the identification code of the SAW devices or space multiplexed by using multiple antennas. Considering the time multiplexing case, varying the length of the SAW device and thus the delay before retransmission can separate different classes of devices. All seat sensors can have one delay which would be different from tire monitors or light switches etc.

13.5.13 Interrogator

Note that any of the disclosed SAW applications can be interrogated by the central interrogator of at least one of the inventions disclosed herein and can either be powered or operated powerlessly as described in general above. Block diagrams of three interrogators suitable for use in at least one of the inventions disclosed herein are illustrated in FIGS. 153A-153C. FIG. 153A illustrates a super-heterodyne circuit and FIG. 153B illustrates a dual super-heterodyne circuit. FIG. 153C operates as follows. During the burst time two frequencies, F1 and F1+F2, are sent by the transmitter after being generated by mixing using oscillator Osc. The two frequencies are needed by the SAW transducer where they are mixed yielding F2 which is modulated by the SAW and contains the information. Frequency (F1+F2) is sent only during the burst time while frequency F1 remains on until the signal F2 returns from the SAW. This signal is used for mixing. The signal returned from the SAW transducer to the interrogator is F1+F2 where F2 has been modulated by the SAW transducer. It is expected that the mixing operations will result in about 12 db loss in signal strength.

FIG. 154 illustrates a central antenna mounting arrangement for permitting interrogation of the tire monitors for four tires and is similar to that described in U.S. Pat. No. 4,237,728. An antenna package 685 is mounted on the underside of the vehicle and communicates with devices 686 through their antennas as described above. In order to provide for antennas both inside (for example for weight sensor interrogation) and outside of the vehicle, another antenna assembly (not shown) can be mounted on the opposite side of the vehicle floor from the antenna assembly 685.

13.5.14 Geolocation

If a SAW device 693 is placed in a roadway, as illustrated in FIG. 156, and if a vehicle 700 has two receiving antennas 690 and 691, an interrogator can transmit a signal from either of the two antennas and at a later time, the two antennas will receive the transmitted signal from the SAW device. By comparing the arrival time of the two received pulses, the position of vehicle on a lane can precisely determined (since the direction from each antenna 690,691 to the SAW device 693 can be calculated). If the SAW device 693 has an identification code encoded into the returned signal generated thereby, then the vehicle 700 can determine, providing a precise map is available, its position on the surface of the earth. If another antenna 696 is provided, for example, at the rear of the vehicle 700 then the longitudinal position of the vehicle can also be accurately determined as the vehicle passes the SAW device 693. Of course the SAW device 693 need not be in the center of the road. Alternate locations for positioning of the SAW device 693 are on overpasses above the road and on poles such as 694 and 695 on the roadside. Such a system has an advantage over a competing system using radar and reflectors in that it is easier to measure the relative time between the two received pulses than it is to measure time of flight of a radar signal to a reflector and back. Such a system operates in all weather conditions and is known as a precise location system. Eventually such a SAW device 693 can be placed every tenth of a mile along the roadway or at some other appropriate spacing. In some cases the SAW device may be powered using a battery, solar cell, ultracapacitor or other appropriate energy source. Also in some cases an RFID system (either powerless or powered) can be used in place of the SAW device. At present FCC regulations limit the RF power that can be transmitted and thus the range of either SAW or RFID based devices. Also at present, SAW devices have greater range than unpowered RFID devices but the cost of the SAW interrogator is higher due to the lower signal level that must be sensed.

If a vehicle is being guided by a DGPS and accurate map system such as disclosed in U.S. Pat. No. 6,405,132, a problem arises when the GPS receiver system looses satellite lock as would happen when the vehicle enters a tunnel, for example. If a precise location system as described above is placed at the exit of the tunnel then the vehicle will know exactly where it is and can re-establish satellite lock in as little as one second rather than typically 15 seconds as might otherwise be required. Other methods making use of the cell phone system can be used to establish an approximate location of the vehicle suitable for rapid acquisition of satellite lock as described in G. M. Djuknic, R. E. Richton "Geolocation and Assisted GPS", Computer Magazine, February 2001, IEEE Computer Society. Of course the precise location system can also be placed along the road in the tunnel to provide location information to the vehicle while it is in the tunnel.

More particularly, geolocation technologies that rely exclusively on wireless networks such as time of arrival, time difference of arrival, angle of arrival, timing advance, and multipath fingerprinting offer a shorter time-to-first-fix (TTFF) than GPS. They also offer quick deployment and continuous tracking capability for navigation applications, without the added complexity and cost of upgrading or replacing any existing GPS receiver in vehicles. Compared to either mobile-station-based, stand-alone GPS or network-based geolocation, assisted-GPS (AGPS) technology offers superior accuracy, availability, and coverage at a reasonable cost. AGPS for use with vehicles would comprise a communications unit with a partial GPS receiver arranged in the vehicle, an AGPS server with a reference GPS receiver that can simultaneously "see" the same satellites as the communications unit, and a wireless network infrastructure consisting of base stations and a mobile switching center. The network can accurately predict the GPS signal the communication unit will receive and convey that information to the mobile, greatly reducing search space size and shortening the TTFF from minutes to a second or less. In addition, an AGPS receiver in the communication unit can detect and demodulate weaker signals than those that conventional GPS receivers require. Because the network performs the location calculations, the communication unit only needs to contain a scaled-down GPS receiver. It is accurate within about 15 meters when they are outdoors, an order of magnitude more sensitive than conventional GPS.

Since an AGPS server can obtain the vehicle's position from the mobile switching center, at least to the level of cell and sector, and at the same time monitor signals from GPS satellites seen by mobile stations, it can predict the signals received by the vehicle for any given time. Specifically, the server can predict the Doppler shift due to satellite motion of GPS signals received by the vehicle, as well as other signal parameters that are a function of the vehicle's location. In a typical sector, uncertainty in a satellite signal's predicted time of arrival at the vehicle is about ±5 μs, which corresponds to ±5 chips of the GPS coarse acquisition (C/A) code. Therefore, an AGPS server can predict the phase of the pseudorandom noise (PRN) sequence that the receiver should use to despread the C/A signal from a particular satellite—each GPS satellite transmits a unique PRN sequence used for range measurements —and communicate that prediction to the vehicle. The search space for the actual Doppler shift and PRN phase is thus greatly reduced, and the AGPS receiver can accomplish the task in a fraction of the time required by conventional GPS receivers. Further, the AGPS server maintains a connection with the vehicle receiver over the wireless link, so the requirement of asking the communication unit to make specific measurements, collect the results, and communicate them back is easily met. After despreading and some additional signal processing, an AGPS receiver returns back "pseudoranges"—that is, ranges measured without taking into account the discrepancy between satellite and receiver clocks—to the AGPS server, which then calculates the vehicle's location. The vehicle can even complete the location fix itself without returning any data to the server.

Sensitivity assistance, also known as modulation wipe-off, provides another enhancement to detection of GPS signals in the vehicle's receiver. The sensitivity-assistance message contains predicted data bits of the GPS navigation message, which are expected to modulate the GPS signal of specific satellites at specified times. The mobile station receiver can therefore remove bit modulation in the received GPS signal prior to coherent integration. By extending coherent integration beyond the 20-ms GPS data-bit period—to a second or more when the receiver is stationary and to 400 ms when it is fast-moving-this approach improves receiver sensitivity. Sensitivity assistance provides an additional 3-to-4-dB improvement in receiver sensitivity. Because some of the gain provided by the basic assistance-code phases and Doppler shift values—is lost when integrating the GPS receiver chain into a mobile system, this can prove crucial to making a practical receiver.

Achieving optimal performance of sensitivity assistance in TIA/EIA-95 CDMA systems is relatively straightforward because base stations and mobiles synchronize with GPS time. Given that global system for mobile communication (GSM), time division multiple access (TDMA), or advanced mobile phone service (AMPS) systems do not maintain such stringent synchronization, implementation of sensitivity assistance and AGPS technology in general will require novel approaches to satisfy the timing requirement. The standardized solution for GSM and TDMA adds time calibration receivers in the field—location measurement units—that can monitor both the wireless-system timing and GPS signals used as a timing reference.

Many factors affect the accuracy of geolocation technologies, especially terrain variations such as hilly versus flat and environmental differences such as urban versus suburban versus rural. Other factors, like cell size and interference, have smaller but noticeable effects. Hybrid approaches that use multiple geolocation technologies appear to be the most robust solution to problems of accuracy and coverage.

AGPS provides a natural fit for hybrid solutions because it uses the wireless network to supply assistance data to GPS receivers in vehicles. This feature makes it easy to augment the assistance-data message with low-accuracy distances from receiver to base stations measured by the network equipment. Such hybrid solutions benefit from the high density of base stations in dense urban environments, which are hostile to GPS signals. Conversely, rural environments—where base stations are too scarce for network-based solutions to achieve high accuracy—provide ideal operating conditions for AGPS because GPS works well there.

13.5.15 Other SAW Devices

SAW or passive or active RFID transponders can also be placed in the license plates 697 (FIG. 156) of all vehicles at nominal cost. An appropriately equipped automobile can then determine the angular location of vehicles in its vicinity. If a third antenna 698 is placed at the center of the vehicle front, then an indication of the distance to a license plate of a preceding vehicle can also be obtained as described elsewhere herein. Thus, once again, a single interrogator coupled with multiple antenna systems can be used for many functions. Alternately, if more than one SAW transponders is placed spaced apart on a vehicle and if two antennas are on the other vehicle, then the direction and position of the SAW vehicle can be determined by the receiving vehicle.

Basically any two of a triad of three antenna can give an angle and thus a vector to the license plate. With three antenna three such vectors can be derived that all intersect at the location of the license plate thus giving the distance to the license plate.

A general SAW temperature and pressure gage which can be wireless and powerless is shown generally at 735 located in the sidewall 736 of a fluid container 739 in FIG. 157. A pressure sensor 737 is located on the inside of the container 739, where it measures deflection of the container wall, and the fluid temperature sensor 738 on the outside. The temperature measuring SAW 735 can be covered with an insulating material to avoid influence from the ambient temperature outside of the container 739.

A SAW load sensor can also be used to measure load in the vehicle suspension system powerless and wirelessly as shown in FIG. 158. FIG. 158A illustrates a strut 740 such as either of the rear struts of the vehicle of FIG. 158. A coil spring 741 stresses in torsion as the vehicle encounters disturbances from the road and this torsion can be measured using SAW strain gages as described in U.S. Pat. No. 5,585,571 for measuring the torque in shafts. This concept is also disclosed in U.S. Pat. No. 5,714,695. The use of SAW strain gages to measure the torsional stresses in a spring, as shown in FIG. 158B, and in particular in an automobile suspension spring has, to the knowledge of the inventors, not been heretofore disclosed. In FIG. 158B, the strain measured by SAW strain gage 743 is subtracted from the strain measured by SAW strain gage 742 to get the temperature compensated strain in spring 741.

Since a portion of the dynamic load is also carried by the shock absorber, the SAW strain gages 742 and 743 will only measure the steady or average load on the vehicle. However, additional SAW strain gages 744 can be placed on a piston rod 745 of the shock absorber to obtain the dynamic load. These load measurements can then be used for active or passive vehicle damping or other stability control purposes.

FIG. 159 illustrates a vehicle passenger compartment, and the engine compartment, with multiple SAW temperature sensors 747. SAW temperature sensors are distributed throughout the passenger compartment, such as on the A-pillar, on the B-pillar, on the steering wheel, on the seat, on the ceiling, on the headliner, and on the rear glass and generally in the engine compartment. These sensors, which can be independently coded with different IDs and different delays, can provide an accurate measurement of the temperature distribution within the vehicle interior. Such a system can be used to tailor the heating and air conditioning system based on the temperature at a particular location in the passenger compartment. If this system is augmented with occupant sensors, then the temperature can be controlled based on seat occupancy and the temperature at that location. If the occupant sensor system is based on ultrasonics than the temperature measurement system can be used to correct the ultrasonic occupant sensor system for the speed of sound within the passenger compartment. Without such a correction, the error in the sensing system can be as large as about 20 percent.

In one case, the SAW temperature sensor can be made from PVDF film and incorporated within the ultrasonic transducer assembly. For the 40 kHz ultrasonic transducer case, for example, the SAW temperature sensor would return the several pulses sent to drive the ultrasonic transducer to the control circuitry using the same wires used to transmit the pulses to the transducer after a delay that is proportional to the temperature within the transducer housing. Thus a very economical device can add this temperature sensing function using much of the same hardware that is already present for the occupant sensing system. Since the frequency is low, PVDF could be fabricated into a very low cost temperature sensor for this purpose. Other piezoelectric materials could also be used.

Other sensors can be combined with the temperature sensors 747, or used separately, to measure carbon dioxide, carbon monoxide, alcohol, humidity or other desired chemicals as discussed above.

The SAW temperature sensors 747 provide the temperature at their mounting location to a processor unit via an interrogator with the processor unit 748 including appropriate control algorithms for controlling the heating and air conditioning system based on the detected temperatures. The processor unit can control, e.g., which vents in the vehicle are open and closed, the flow rate through vents and the temperature of air passing through the vents. In general, the processor unit can control whatever adjustable components are present or form part of the heating and air conditioning system.

As shown in FIG. 159, a child seat 749 is present on the rear vehicle seat. The child seat 749 can be fabricated with one or more RFID tags or SAW tags 746. The RFID tag(s) and SAW tag(s) can be constructed to provide information on the occupancy of the child seat, i.e., whether a child is present, based on the weight or the closing of a SAW switch. Also, the mere transmission of waves from the RFID tag(s) or SAW tag(s) on the child seat would be indicative of the presence of a child seat. The RFID tag(s) and SAW tag(s) can also be constructed to provide information about the orientation of the child seat, i.e., whether it is facing rearward or forward. Such information about the presence and occupancy of the child seat and its orientation can be used in the control of vehicular systems, such as the vehicle airbag system. In this case, a processor would control the airbag system and would receive information from the RFID tag(s) and SAW tag(s) via an interrogator.

There are many applications for which knowledge of the pitch and/or roll orientation of a vehicle or other object is desired. An accurate tilt sensor can be constructed using SAW devices. Such a sensor is illustrated in FIG. 160A and designated 750. This sensor 750 utilizes a substantially planar and rectangular mass 751 and four supporting SAW devices 752 which are sensitive to gravity. For example, the masses act to deflect a membrane on which the SAW device resides thereby straining the SAW device. Other properties can also be used for a tilt sensor such as the direction of the earth's magnetic field. SAW devices 752 are shown arranged at the corners of the planar mass 751, but it must be understood that this arrangement is a preferred embodiment only and not intended to limit the invention. A fifth SAW device 753 can be provided to measure temperature. By comparing the outputs of the four SAW devices 752, the pitch and roll of the automobile can be measured. This sensor 750 can be used to correct errors in the SAW rate gyros described above. If the vehicle has been stationary for a period of time, the yaw SAW rate gyro can initialized to 0 and the pitch and roll SAW gyros initialized to a value determined by the tilt sensor of FIG. 160A. Many other geometries of tilt sensors utilizing one or more SAW devices can now be envisioned for automotive and other applications. In particular, an alternate preferred configuration is illustrated in FIG. 160B where a triangular geometry is used. In this embodiment, the planar mass is triangular and the SAW devices 752 are arranged at the corners, although as with FIG. 160A, this is a non-limiting, preferred embodiment.

Either of the SAW accelerometers described above can be utilized for crash sensors as shown at 755 in FIG. 161. These accelerometers have a substantially higher dynamic range than competing accelerometers now used for crash sensors such as those based on MEMS silicon springs and masses and others based on MEMS capacitive sensing. As discussed above, this is partially a result of the use of frequency or phase shifts which can be easily measured over a very wide range. Additionally, many conventional accelerometers that are designed for low acceleration ranges are unable to withstand high acceleration shocks without breaking. This places practical limitations on many accelerometer designs so that the stresses in the silicon springs are not excessive. Also for capacitive accelerometers, there is a narrow limit over which distance, and thus acceleration, can be measured.

The SAW accelerometer for this particular crash sensor design is housed in a container 756 which is assembled into a housing 757 and covered with a cover 758. This particular implementation shows a connector 759 indicating that this sensor would require power and the response would be provided through wires. Alternately, as discussed for other devices above, the connector 759 can be eliminated and the information and power to operate the device transmitted wirelessly. Such sensors can be used as frontal, side or rear impact sensors. They can be used in the crush zone, in the passenger compartment or any other appropriate vehicle location. If two such sensors are separated and have appropriate sensitive axes, then the angular acceleration of the vehicle can be also be determined. Thus, for example, forward-facing accelerometers mounted in the vehicle side doors can used to measure the yaw acceleration of the vehicle. Alternately two vertical sensitive axis accelerometers in the side doors can be used to measure the roll acceleration of vehicle, which would be useful for rollover sensing.

Although piezoelectric SAW devices normally use rigid material such as quartz or lithium niobate, it is also possible to utilize polyvinylidene fluoride (PVDF) providing the frequency is low. A piece of PVDF film can also be used as a sensor of tire flexure by itself. Such a sensor is illustrated in FIGS. 162 and 162A at 760. The output of flexure of the PVDF film can be used to supply power to a silicon microcircuit that contains pressure and temperature sensors. The waveform of the output from the PVDF film also provides information as to the flexure of an automobile tire and can be used to diagnose problems with the tire as well as the tire footprint in a manner similar to the device described in FIG. 145. In this case, however, the PVDF film supplies sufficient power to permit significantly more transmission energy to be provided. The frequency and informational content can be made compatible with the SAW interrogator described above such that the same interrogator can be used. The power available for the interrogator, however, can be significantly greater thus increasing the reliability and reading range of the system.

There is a general problem with tire pressure monitors as well as systems that attempt to interrogate passive SAW or electronic RFID type devices in that the FCC severely limits the frequencies and radiating power that can be used. Once it becomes evident that these systems will eventually save many lives, the FCC can be expected to modify their position. In the meantime, various schemes can be used to help alleviate this problem. The lower frequencies that have been opened for automotive radar permit higher power to be used and they could be candidates for the devices discussed above. It is also possible, in some cases, to transmit power on multiple frequencies and combine the received power to boost the available energy. Energy can of course be stored and periodically used to drive circuits and work is ongoing to reduce the voltage required to operate semiconductors. The devices of at least one of the inventions disclosed herein will make use of some or all of these developments as they take place.

If the vehicle has been at rest for a significant time period, power will leak from the storage capacitors and will not be available for transmission. However, a few tire rotations are sufficient to provide the necessary energy. Note that recently developed ultracapacitors can retain their charge for periods comparable to batteries.

U.S. Pat. No. 6,615,656, assigned to the current assignee of at least one of the inventions disclosed herein, provides multiple means for determining the amount of gas in a gas tank. Using the SAW pressure devices of at least one of the inventions disclosed herein, multiple pressure sensors can be placed at appropriate locations within a fuel tank to measure the fluid pressure and thereby determine the quantity of fuel remaining in the tank. This is illustrated in FIG. 163. In this example, four SAW pressure transducers 761 are placed on the bottom of the fuel tank and one SAW pressure transducer 762 is placed at the top of the fuel tank to eliminate the effects of vapor pressure within tank. Using neural networks, or other pattern recognition techniques, the quantity of fuel in the tank can be accurately determined from these pressure readings in a manner similar that described the ’656 patent. The SAW measuring device illustrated in FIG. 163A combines temperature and pressure measurements in a single unit using parallel paths 763 and 764 in the same manner as described above.

Occupant weight sensors can give erroneous results if the seatbelt is pulled tight pushing the occupant into the seat. This is particularly a problem when the seatbelt is not attached to the seat. For such cases, it has been proposed to measure the tension in various parts of the seatbelt. Using conventional technology requires that such devices be hard-wired into the vehicle complicating the wire harness.

With reference to FIG. 164, using a SAW strain gage as described above, the tension in the seat belt 765 can be measured without the requirement of power or signal wires. FIG. 164 illustrates a powerless and wireless passive SAW strain gage based device 766 for this purpose. There are many other places that such a device can be mounted to measure the tension in the seatbelt at one or at multiple places.

FIG. 166A shows a schematic of a prior art airbag module deployment scheme in which sensors, which detect data for use in determining whether to deploy an airbag in the airbag module, are wired to an electronic control unit (ECU) and a command to initiate deployment of the airbag in the airbag module is sent wirelessly.

By contrast, as shown in FIG. 166B, in accordance with the invention, the sensors are wireless connected to the electronic control unit and thus transmit data wirelessly. The ECU is however wired to the airbag module.

SAW sensors also have applicability to various other sectors of the vehicle, including the powertrain, chassis, and occupant comfort and convenience. For example, SAW sensors have applicability to sensors for the powertrain area including oxygen sensors, gear-tooth Hall effect sensors, variable reluctance sensors, digital speed and position sensors, oil condition sensors, rotary position sensors, low pressure sensors, manifold absolute pressure/manifold air temperature (MAP/MAT) sensors, medium pressure sensors, turbo pressure sensors, knock sensors, coolant/fluid temperature sensors, and transmission temperature sensors.

SAW sensors for chassis applications include gear-tooth Hall effect sensors, variable reluctance sensors, digital speed and position sensors, rotary position sensors, non-contact steering position sensors, and digital ABS (anti-lock braking system) sensors.

SAW sensors for the occupant comfort and convenience area include low-pressure sensors, HVAC temperature and humidity sensors, air temperature sensors, and oil condition sensors.

SAW sensors also have applicability such areas as controlling evaporative emissions, transmission shifting, mass air flow meters, oxygen, NOx and hydrocarbon sensors. SAW based sensors are particularly useful in high temperature environments where many other technologies fail.

SAW sensors can facilitate compliance with U.S. regulations concerning evaporative system monitoring in vehicles, through a SAW fuel vapor pressure and temperature sensors that measure fuel vapor pressure within the fuel tank as well as temperature. If vapors leak into the atmosphere, the pressure within the tank drops. The sensor notifies the system of a fuel vapor leak, resulting in a warning signal to the driver and/or notification to a repair facility. This application is particularly important since the condition within the fuel tank can be ascertained wirelessly reducing the chance of a fuel fire in an accident. The same interrogator that monitors the tire pressure SAW sensors can also monitor the fuel vapor pressure and temperature sensors resulting in significant economies.

A SAW humidity sensor can be used for measuring the relative humidity and the resulting information can be input to the engine management system or the heating, ventilation, and air conditioning (HVAC) system for more efficient operation. The relative humidity of the air entering an automotive engine impacts the engine's combustion efficiency; i.e., the ability of the spark plugs to ignite the fuel/air mixture in the combustion chamber at the proper time. A SAW humidity sensor in this case can measure the humidity level of the incoming engine air, helping to calculate a more precise fueUair ratio for improved fuel economy and reduced emissions.

Dew point conditions are reached when the air is fully saturated with water. When the cabin dew point temperature matches the windshield glass temperature, water from the air condenses quickly, creating frost or fog. A SAW humidity sensor with a temperature-sensing element and a window glass-temperature-sensing element can prevent the formation of visible fog formation by automatically controlling the HVAC system.

14. Other Products, Outputs, Features

Once the occupancy state of the seat (or seats) in the vehicle or of the vehicle itself, as in a cargo container, truck trailer or railroad car, is known, this information can be used to control or affect the operation of a significant number of vehicular systems, components and devices. That is, the systems, components and devices in the vehicle can be controlled and perhaps their operation optimized in consideration of the occupancy of the seat(s) in the vehicle or of the vehicle itself. Thus, the vehicle includes control means coupled to the processor means for controlling a component or device in the vehicle in consideration of the output indicative of the current occupancy state of the seat obtained from the processor means. The component or device can be an airbag system including at least one deployable airbag whereby the deployment of the airbag is suppressed, for example, if the seat is occupied by a rear-facing child seat, or otherwise the parameters of the deployment are controlled. Thus, the seated-state detecting unit described above may be used in a component adjustment system and method described below when the presence of a human being occupying the seat is detected. The component can also be a telematics system such as the Skybitz or OnStar systems where information about the occupancy state of the vehicle, or changes in that state, can be sent to a remote site.

The component adjustment system and methods in accordance with the invention can automatically and passively adjust the component based on the morphology of the occupant of the seat. As noted above, the adjustment system may include the seated-state detecting unit described above so that it will be activated if the seated-state detecting unit detects that an adult or child occupant is seated on the seat, that is, the adjustment system will not operate if the seat is occupied by a child seat, pet or inanimate objects. Obviously, the same system can be used for any seat in the vehicle including the driver seat and the passenger seat(s). This adjustment system may incorporate the same components as the seated-state detecting unit described above, that is, the same components may constitute a part of both the seated-state detecting unit and the adjustment system, for example, the weight measuring system.

The adjustment system described herein, although improved over the prior art, will at best be approximate since two people, even if they are identical in all other respects, may have a different preferred driving position or other preferred adjusted component location or orientation. A system that automatically adjusts the component, therefore, should learn from its errors. Thus, when a new occupant sits in the vehicle, for example, the system automatically estimates the best location of the component for that occupant and moves the component to that location, assuming it is not already at the best location. If the occupant changes the location, the system should remember that change and incorporate it into the adjustment the next time that person enters the vehicle and is seated in the same seat. Therefore, the system need not make a perfect selection the first time but it should remember the person and the position the component was in for that person. The system, therefore, makes one, two or three measurements of morphological characteristics of the occupant and then adjusts the component based on an algorithm. The occupant will correct the adjustment and the next time that the system measures the same measurements for those measurement characteristics, it will set the component to the corrected position. As such, preferred components for which the system in accordance with the invention is most useful are those which affect a driver of the vehicle and relate to the sensory abilities of the driver, i.e., the mirrors, the seat, the steering wheel and steering column and accelerator, clutch and brake pedals.

Thus, although the above description mentions that the airbag system can be controlled by the control circuitry 20 (FIG. 1), any vehicular system, component or subsystem can be controlled based on the information or data obtained by transmitter and/or receiver assemblies 6, 8, 9 and 10. Control circuitry 20 can be programmed or trained, if for example a neural network is used, to control heating an air-conditioning systems based on the presence of occupants in certain positions so as to optimize the climate control in the vehicle. The entertainment system can also be controlled to provide sound only to locations at which occupants are situated. There is no limit to the number and type of vehicular systems, components and subsystems that can be controlled using the analysis techniques described herein.

Furthermore, if multiple vehicular systems are to be controlled by control circuitry 20, then these systems can be controlled by the control circuitry 20 based on the status of particular components of the vehicle. For example, an indication of whether a key is in the ignition can be used to direct the control circuitry 20 to either control an airbag system (when the key is present in the ignition) or an antitheft system (when the key is not present in the ignition). Control circuitry 20 would thus be responsive to the status of the ignition of the motor vehicle to perform one of a plurality of different functions. More particularly, the pattern recognition algorithm, such as the neural network described herein, could itself be designed to perform in a different way depending on the status of a vehicular component such as the detected presence of a key in the ignition. It could provide one output to control an antitheft system when a key is not present and another output when a key is present using the same inputs from the transmitter and/or receiver assemblies 6, 8, 9 and 10.

The algorithm in control circuitry 20 can also be designed to determine the location of the occupant's eyes either directly or indirectly through a determination of the location of the occupant and an estimation of the position of the eyes therefrom. As such, the position of the rear view mirror 55 can be adjusted to optimize the driver's use thereof.

Once a characteristic of the object is obtained, it can be used for numerous purposes. For example, the processor can be programmed to control a reactive component, system or subsystem 103 in FIG. 24 based on the determined characteristic of the object. When the reactive component is an airbag assembly including one or more airbags, the processor can control one or more deployment parameters of the airbag(s).

Figure 56:
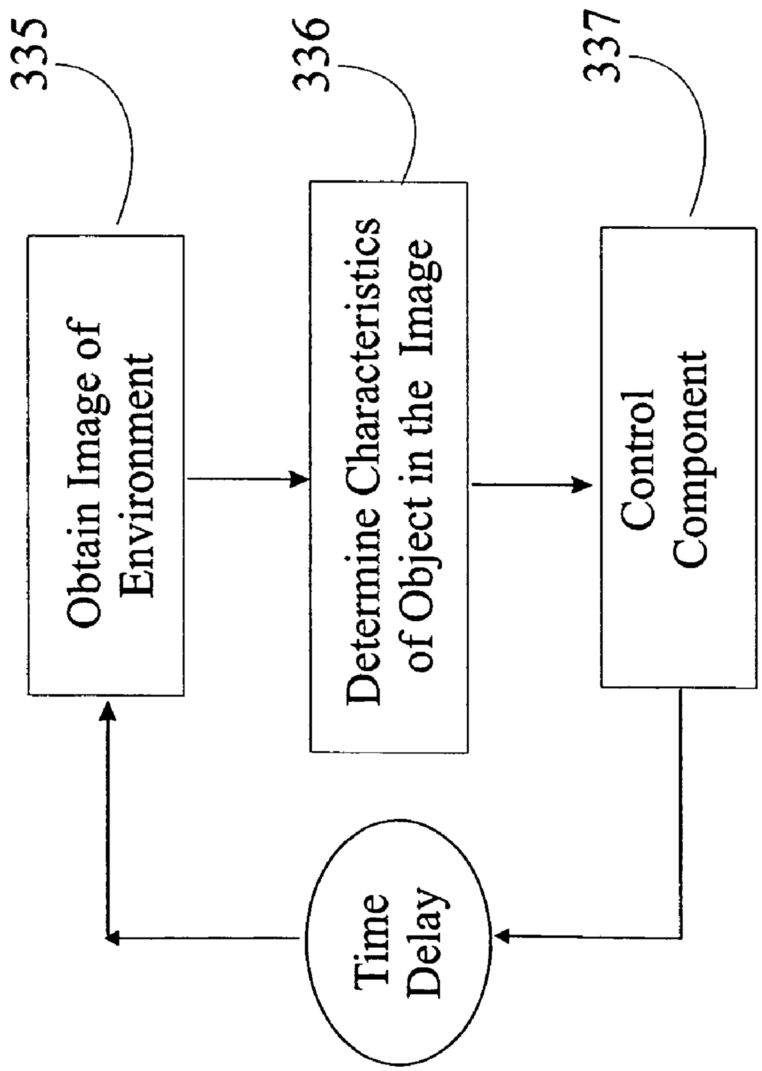
FIG. 56 is a flow chart of the environment monitoring in accordance with the invention.

The apparatus can operate in a manner as illustrated in FIG. 56 wherein as a first step 335, one or more images of the environment are obtained. One or more characteristics of objects in the images are determined at 336, using, for example, pattern recognition techniques, and then one or more components are controlled at 337 based on the determined characteristics. The process of obtaining and processing the images, or the processing of data derived from the images or data representative of the images, is periodically continued at least throughout the operation of the vehicle.

14.1 Control of Passive Restraints

The use of the vehicle interior monitoring system to control the deployment of an airbag is discussed in detail in U.S. Pat. No. 5,653,462 referenced above. In that case, the control is based on the use of a pattern recognition system, such as a neural network, to differentiate between the occupant and his extremities in order to provide an accurate determination of the position of the occupant relative to the airbag. If the occupant is sufficiently close to the airbag module that he is more likely to be injured by the deployment itself than by the accident, the deployment of the airbag is suppressed. This process is carried further by the interior monitoring system described herein in that the nature or identity of the object occupying the vehicle seat is used to contribute to the airbag deployment decision. FIG. 4 shows a side view illustrating schematically the interface between the vehicle interior monitoring system of at least one of the inventions disclosed herein and the vehicle airbag system 44. A similar system can be provided for the passenger as described in U.S. patent application Ser. No. 10/151,615 filed May 20, 2002.

In this embodiment, ultrasonic transducers 8 and 9 transmit bursts of ultrasonic waves that travel to the occupant where they are reflected back to transducers or receptors/receivers 8 and 9. The time period required for the waves to travel from the generator and return is used to determine the distance from the occupant to the airbag as described in the aforementioned U.S. Pat. No. 5,653,462, i.e., and thus may also be used to determine the position or location of the occupant. An optical imager based system would also be appropriate. In the invention, however, the portion of the return signal that represents the occupants' head or chest, has been determined based on pattern recognition techniques such as a neural network. The relative velocity of the occupant toward the airbag can then be determined, by Doppler principles or from successive position measurements, which permits a sufficiently accurate prediction of the time when the occupant would become proximate to the airbag. By comparing the occupant relative velocity to the integral of the crash deceleration pulse, a determination as to whether the occupant is being restrained by a seatbelt can also be made which then can affect the airbag deployment initiation decision. Alternately, the mere knowledge that the occupant has moved a distance that would not be possible if he were wearing a seatbelt gives information that he is not wearing one.

Another method of providing a significant improvement to the problem of determining the position of the occupant during vehicle deceleration is to input the vehicle deceleration directly into the occupant sensing system. This can be done through the use of the airbag crash sensor accelerometer or a dedicated accelerometer can be used. This deceleration or its integral can be entered directly into the neural network or can be integrated through an additional post-processing algorithm. Post processing in general is discussed in section 11.7. One significant advantage of neural networks is their ability to efficiently use information from any source. It is the ultimate "sensor fusion" system.

A more detailed discussion of this process and of the advantages of the various technologies, such as acoustic or electromagnetic, can be found in SAE paper 940527, "Vehicle Occupant Position Sensing" by Breed et al, In this paper, it is demonstrated that the time delay required for acoustic waves to travel to the occupant and return does not prevent the use of acoustics for position measurement of occupants during the crash event. For position measurement and for many pattern recognition applications, ultrasonics is the preferred technology due to the lack of adverse health effects and the low cost of ultrasonic systems compared with either camera, laser or radar based systems. This situation has changed, however, as the cost of imagers has come down. The main limiting feature of ultrasonics is the wavelength, which places a limitation on the size of features that can be discerned. Optical systems, for example, are required when the identification of particular individuals is desired.

Figure 57:
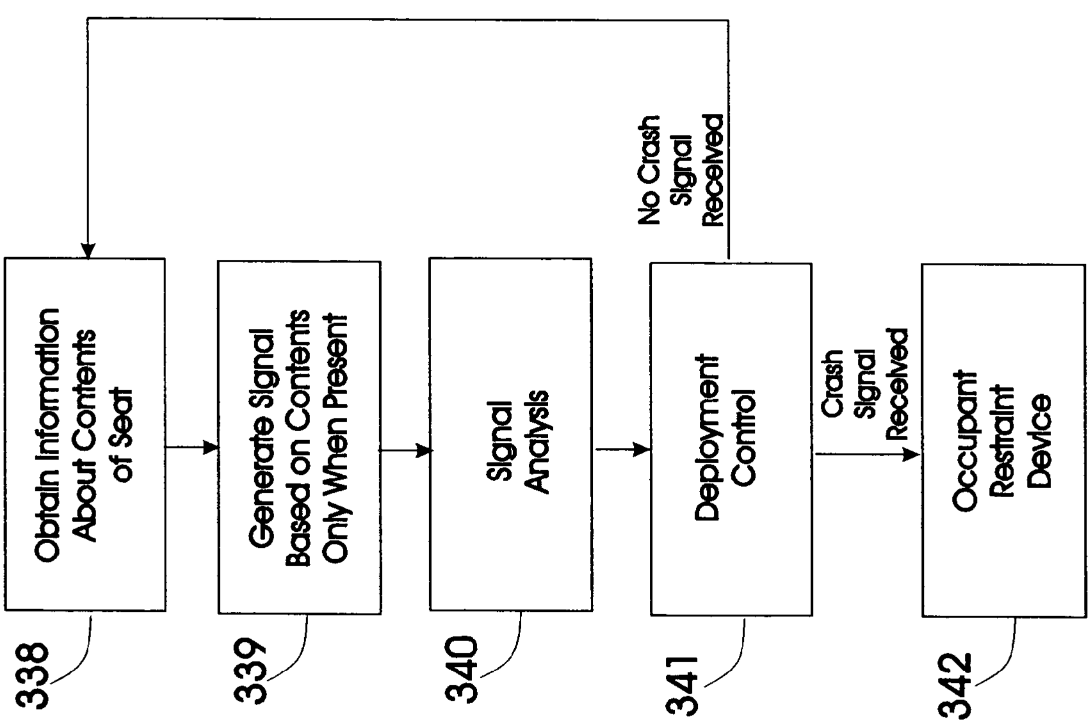
FIG. 57 is a schematic drawing of one embodiment of an occupant restraint device control system in accordance with the invention.

FIG. 57 is a schematic drawing of one embodiment of an occupant restraint device control system in accordance with the invention. The first step is to obtain information about the contents of the seat at step 338, when such contents are present on the seat. To this end, a presence sensor can be employed to activate the system only when the presence of an object, or living being, is detected. Next, at step 339, a signal is generated based on the contents of the seat, with different signals being generated for different contents of the seat. Thus, while a signal for a dog will be different than the signal for a child set, the signals for different child seats will not be that different. Next, at step 340, the signal is analyzed to determine whether a child seat is present, whether a child seat in a particular orientation is present and/or whether a child seat in a particular position is present. Deployment control 341 provides a deployment control signal or command based on the analysis of the signal generated based on the contents of the seat. This signal or command is directed to the occupant protection or restraint device 342 to provide for deployment for that particular content of the seat. The system continually obtains information about the contents of the seat until such time as a deployment signal is received from, e.g., a crash sensor, to initiate deployment of the occupant restraint device.

Figure 58:
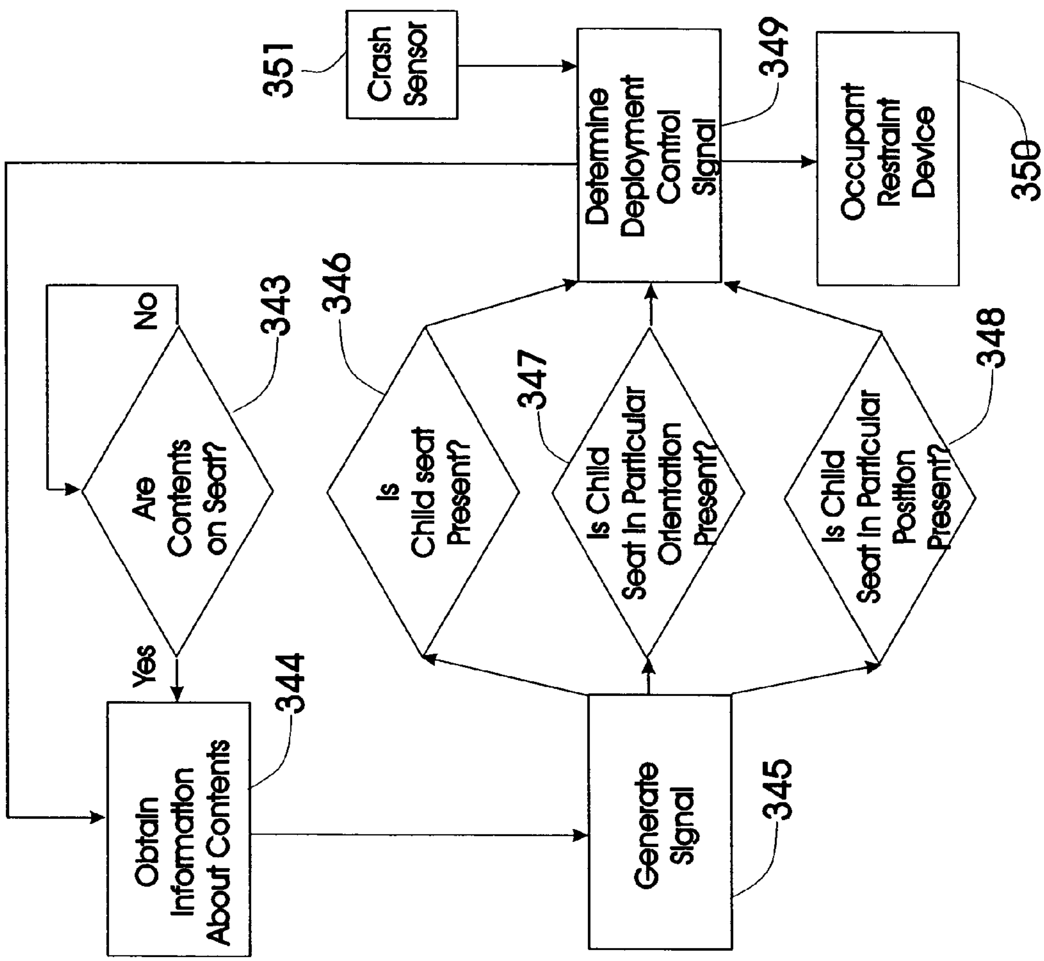
FIG. 58 is a flow chart of the operation of one embodiment of an occupant restraint device control method in accordance with the invention.

FIG. 58 is a flow chart of the operation of one embodiment of an occupant restraint device control method in accordance with the invention. The first step is to determine whether contents are present on the seat at step 910. If so, information is obtained about the contents of the seat at step 344. At step 345, a signal is generated based on the contents of the seat, with different signals being generated for different contents of the seat. The signal is analyzed to determine whether a child seat is present at step 346, whether a child seat in a particular orientation is present at step 347 and/or whether a child seat in a particular position is present at step 348. Deployment control 349 provides a deployment control signal or command based on the analysis of the signal generated based on the contents of the seat. This signal or command is directed to the occupant protection or restraint device 350 to provide for deployment for those particular contents of the seat. The system continually obtains information about the contents of the seat until such time as a deployment signal is received from, e.g., a crash sensor 351, to initiate deployment of the occupant restraint device.

In another implementation, the sensor algorithm may determine the rate that gas is generated to affect the rate that the airbag is inflated. In all of these cases, the position of the occupant is used to affect the deployment of the airbag either as to whether or not it should be deployed at all, the time of deployment and/or the rate of inflation and/or deflation.

Such a system can also be used to positively identify or confirm the presence of a rear facing child seat in the vehicle, if the child seat is equipped with a resonator. In this case, a resonator 18 is placed on the forward most portion of the child seat, or in some other convenient position, as shown in FIG. 1. The resonator 18, or other type of signal generating device, such as an RFID tag, which generates a signal upon excitation, e.g., by a transmitted energy signal, can be used not only to determine the orientation of the child seat but also to determine the position of the child seat (in essentially the same manner as described above with respect to determining the position of the seat and the position of the seatbelt).

The determination of the presence of a child seat can be used to affect another system in the vehicle. Most importantly, deployment of an occupant restraint device can be controlled depending on whether a child seat is present. Control of the occupant restraint device may entail suppression of deployment of the device. If the occupant restraint device is an airbag, e.g., a frontal airbag or a side airbag, control of the airbag deployment may entail not only suppression of the deployment but also depowered deployment, adjustment of the orientation of the airbag, adjustment of the inflation rate or inflation time and/or adjustment of the deflation rate or time.

Figure 59:
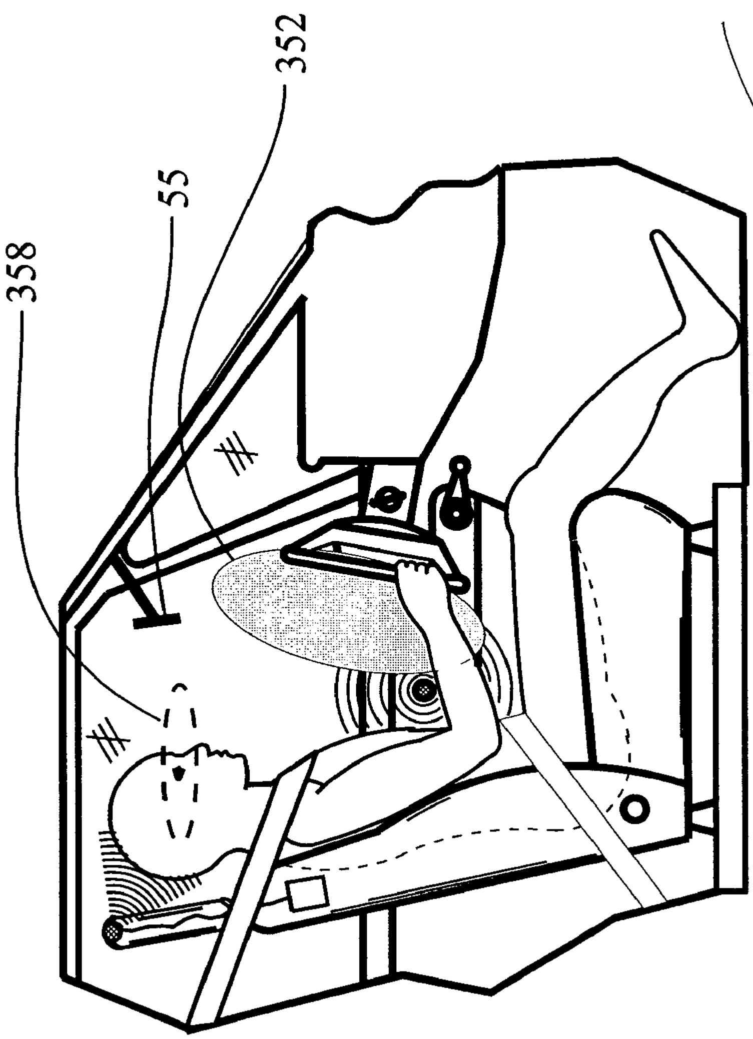
FIG. 59 is a view similar to FIG. 50 showing an inflated airbag and an arrangement for controlling both the flow of gas into and the flow of gas out of the airbag during the crash where the determination is made based on a height sensor located in the headrest and a weight sensor in the seat.

Several systems are in development for determining the location of an occupant and modifying the deployment of the airbag based of his or her position. These systems are called “smart airbags”. The passive seat control system in accordance with at least one of the inventions disclosed herein can also be used for this purpose as illustrated in FIG. 59. This figure shows an inflated airbag 352 and an arrangement for controlling both the flow of gas into and out of the airbag during a crash. The determination is made based on height sensors 353, 354 and 355 (FIG. 49) located in the headrest, a weight sensor 252 in the seat and the location of the seat which is known by control circuit 254. Other smart airbags systems rely only on the position of the occupant determined from various position sensors using ultrasonics or optical sensors, or equivalent.

The weight sensor coupled with the height sensor and the occupant’s velocity relative to the vehicle, as determined by the occupant position sensors, provides information as to the amount of energy that the airbag will need to absorb during the impact of the occupant with the airbag. This, along with the location of the occupant relative to the airbag, is then used to determine the amount of gas that is to be injected into the airbag during deployment and the size of the exit orifices that control the rate of energy dissipation as the occupant is interacting with the airbag during the crash. For example, if an occupant is particularly heavy then it is desirable to increase the amount of gas, and thus the initial pressure, in the airbag to accommodate the larger force which will be required to arrest the relative motion of the occupant. Also, the size of the exit orifices should be reduced, since there will be a larger pressure tending to force the gas out of the orifices, in order to prevent the bag from bottoming out before the occupant’s relative velocity is arrested. Similarly, for a small occupant the initial pressure would be reduced and the size of the exit orifices increased. If, on the other hand, the occupant is already close to the airbag then the amount of gas injected into the airbag will need to be reduced.

Another and preferred approach is to incorporate an accelerometer into the seatbelt or the airbag surface and to measure the deceleration of the occupant and to control the outflow of gas from the airbag to maintain the occupant’s chest acceleration below some maximum value such as 40 Gs. This maximum value can be set based on the forecasted severity of the crash. If the occupant is wearing a seatbelt the outflow from the airbag can be significantly reduced since the seatbelt is taking up most of the load and the airbag then should be used to help spread the load over more of the occupant’s chest. Although the pressure in the airbag is one indication of the deceleration being imparted to the occupant it is a relatively crude measure since it does not take into account the mass of the occupant. Since it is acceleration that should be controlled it is better to measure acceleration rather than pressure in the airbag.

There are many ways of varying the amount of gas injected into the airbag some of which are covered in the patent literature and include, for example, inflators where the amount of gas generated and the rate of generation is controllable. For example, in a particular hybrid inflator once manufactured by the Allied Signal Corporation, two pyrotechnic charges are available to heat the stored gas in the inflator. Either or both of the pyrotechnic charges can be ignited and the timing between the ignitions can be controlled to significantly vary the rate of gas flow to the airbag.

The flow of gas out of the airbag is traditionally done through fixed diameter orifices placed in the bag fabric. Some attempts have been made to provide a measure of control through such measures as blowout patches applied to the exterior of the airbag. Other systems were disclosed in U.S. patent application Ser. No. 07/541,464 filed Feb. 9, 1989, now abandoned.

Figure 59A:
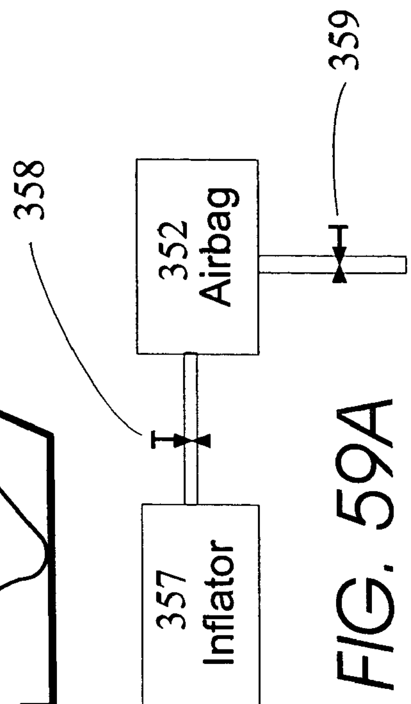
FIG. 59A illustrates the valving system of FIG. 59.

FIG. 59A illustrates schematically an inflator 357 generating gas to fill airbag 352 through control valve 358. If the control valve 358 is closed while a pyrotechnic generator is operating, provision must be made to store or dump the gas being generated so to prevent the inflator from failing from excess pressure. The flow of gas out of airbag 352 is controlled by exit control valve 359. The exit valve 359 can be implemented in many different ways including, for example, a motor operated valve located adjacent the inflator and in fluid communication with the airbag or a digital flow control valve as discussed elsewhere herein. When control circuit 254 (FIG. 49) determines the size and weight of the occupant, the seat position and the relative velocity of the occupant, it then determines the appropriate opening for the exit valve 359, which is coupled to the control circuit 254. A signal is then sent from control circuit 254 to the motor controlling this valve which provides the proper opening.

Consider, for example, the case of a vehicle that impacts with a pole or brush in front of a barrier. The crash sensor system may deduce that this is a low velocity crash and only initiate the first inflator charge. Then as the occupant is moving close to the airbag the barrier is struck but it may now be too late to get the benefit of the second charge. For this case, a better solution might be to always generate the maximum amount of gas but to store the excess in a supplemental chamber until it is needed.

In a like manner, other parameters can also be adjusted, such as the direction of the airbag, by properly positioning the angle and location of the steering wheel relative to the driver. If seatbelt pretensioners are used, the amount of tension in the seatbelt or the force at which the seatbelt spools out, for the case of force limiters, could also be adjusted based on the occupant morphological characteristics determined by the system of at least one of the inventions disclosed herein. The force measured on the seatbelt, if the vehicle deceleration is known, gives a confirmation of the mass of the occupant. This force measurement can also be used to control the chest acceleration given to the occupant to minimize injuries caused by the seatbelt. Naturally, as discussed above, it is better to measure the acceleration of the chest directly.

In the embodiment shown in FIG. 8A, transmitter/receiver assemblies 49, 50, 51 and 54 emit infrared waves that reflect off of the head and chest of the driver and return thereto. Periodically, the device, as commanded by control circuitry 20, transmits a pulse of infrared waves and the reflected signal is detected by the same (i.e. the LEDs and imager are in the same housing) or a different device. The transmitters can either transmit simultaneously or sequentially. An associated electronic circuit and algorithm in control circuitry 20 processes the returned signals as discussed above and determines the location of the occupant in the passenger compartment. This information is then sent to the crash sensor and diagnostic circuitry, which may also be resident in control circuitry 20 (programmed within a control module), which determines if the occupant is close enough to the airbag that a deployment might, by itself, cause injury which exceeds that which might be caused by the accident itself. In such a case, the circuit disables the airbag system and thereby prevents its deployment.

In an alternate case, the sensor algorithm assesses the probability that a crash requiring an airbag is in process and waits until that probability exceeds an amount that is dependent on the position of the occupant. Thus, for example, the sensor might decide to deploy the airbag based on a need probability assessment of 50%, if the decision must be made immediately for an occupant approaching the airbag, but might wait until the probability rises above 95% for a more distant occupant. In the alternative, the crash sensor and diagnostic circuitry optionally resident in control circuitry 20 may tailor the parameters of the deployment (time to initiation of deployment, rate of inflation, rate of deflation, deployment time, etc.) based on the current position and possibly velocity of the occupant, for example a depowered deployment.

In another implementation, the sensor algorithm may determine the rate that gas is generated to affect the rate that the airbag is inflated. One method of controlling the gas generation rate is to control the pressure in the inflator combustion chamber. The higher the internal pressure the faster gas is generated. Once a method of controlling the gas combustion pressure is implemented, the capability exists to significantly reduce the variation in inflator properties with temperature. At lower temperatures the pressure control system would increase the pressure in the combustion chamber and at higher ambient temperatures it would reduce the pressure. In all of these cases, the position of the occupant can be used to affect the deployment of the airbag as to whether or not it should be deployed at all, the time of deployment and/or the rate of inflation.

The applications described herein have been illustrated using the driver and sometimes the passenger of the vehicle. The same systems of determining the position of the occupant relative to the airbag apply to a driver, front and rear seated passengers, sometimes requiring minor modifications. It is likely that the sensor required triggering time based on the position of the occupant will be different for the driver than for the passenger. Current systems are based primarily on the driver with the result that the probability of injury to the passenger is necessarily increased either by deploying the airbag too late or by failing to deploy the airbag when the position of the driver would not warrant it but the passenger's position would. With the use of occupant position sensors for the passenger and driver, the airbag system can be individually optimized for each occupant and result in further significant injury reduction. In particular, either the driver or passenger system can be disabled if either the driver or passenger is out-of-position or if the passenger seat is unoccupied.

There is almost always a driver present in vehicles that are involved in accidents where an airbag is needed. Only about 30% of these vehicles, however, have a passenger. If the passenger is not present, there is usually no need to deploy the passenger side airbag. The occupant monitoring system, when used for the passenger side with proper pattern recognition circuitry, can also ascertain whether or not the seat is occupied, and if not, can disable the deployment of the passenger side airbag and thereby save the cost of its replacement. The same strategy applies also for monitoring the rear seat of the vehicle. Also, a trainable pattern recognition system, as used herein, can distinguish between an occupant and a bag of groceries, for example. Finally, there has been much written about the out-of-position child who is standing or otherwise positioned adjacent to the airbag, perhaps due to pre-crash braking. The occupant position sensor described herein can prevent the deployment of the airbag in this situation as well as in the situation of a rear facing child seat as described above.

Naturally as discussed elsewhere herein, occupant sensors can also be used for monitoring the rear seats of the vehicle for the purpose, among others, of controlling airbag or other restraint deployment.

14.2 Seat, Seatbelt, Steering Wheel and Pedal Adjustment and Resonators

Acoustic or electromagnetic resonators are active or passive devices that resonate at a preset frequency when excited at that frequency. If such a device, which has been tuned to 40 kHz for example, or some other appropriate frequency, is subjected to radiation at 40 kHz it will return a signal that can be stronger than the reflected radiation. Tuned radar antennas, RFID tags and SAW resonators are examples of such devices as is a wine glass.

If such a device is placed at a particular point in the passenger compartment of a vehicle, and irradiated with a signal that contains the resonant frequency, the returned signal can usually be identified as a high magnitude narrow signal at a particular point in time that is proportional to the distance from the resonator to the receiver. Since this device can be identified, it provides a particularly effective method of determining the distance to a particular point in the vehicle passenger compartment (i.e., the distance between the location of the resonator and the detector). If several such resonators are used they can be tuned to slightly different frequencies and therefore separated and identified by the circuitry. If, for example, an ultrasonic signal is transmitted that is slightly off of the resonator frequency then a resonance can still be excited in the resonator and the return signal positively identified by its frequency. Ultrasonic resonators are rare but electromagnetic resonators are common. The distance to a resonator can be more easily determined using ultrasonics, however, due to its lower propagation velocity.

Figure 60:
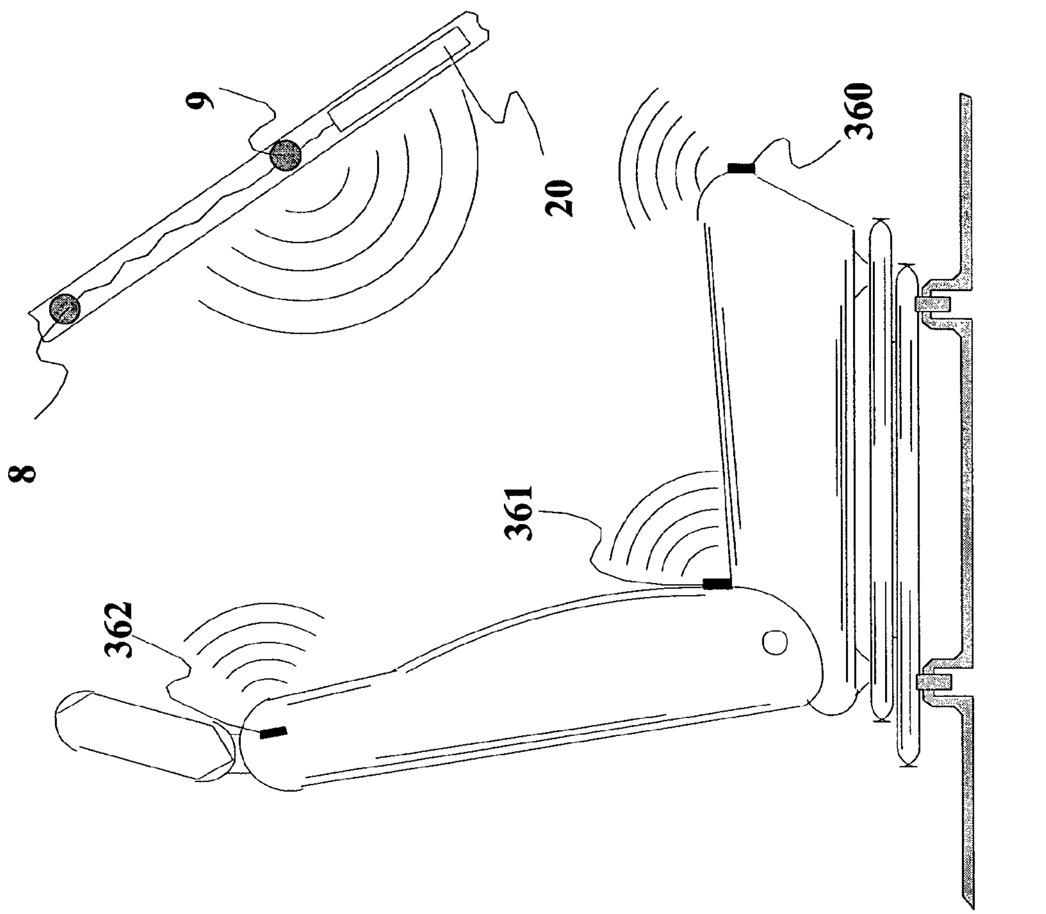
FIG. 60 is a side view with parts cutaway and removed of a seat in the passenger compartment of a vehicle showing the use of resonators or reflectors to determine the position of the seat.

Using such resonators, the positions of various objects in the vehicle can be determined. In FIG. 60, for example, three such resonators are placed on the vehicle seat and used to determine the location of the front and back of the seat portion and the top of the seat back portion. The seat portion is connected to the frame of the vehicle. In this case, transducers 8 and 9, mounted in the A-pillar, are used in conjunction with resonators 360, 361 and 362 to determine the position of the seat. Transducers 8 and 9 constitute both transmitter means for transmitting energy signals at the excitation frequencies of the resonators 360, 361 and 362 and detector means for detecting the return energy signals from the excited resonators. Processor 20 is coupled to the transducers 8 and 9 to analyze the energy signals received by the detectors and provide information about the object with which the resonators are associated, i.e., the position of the seat in this embodiment. This information is then fed to the seat memory and adjustment system, not shown, eliminating the currently used sensors that are placed typically beneath the seat adjacent the seat adjustment motors. In the conventional system, the seat sensors must be wired into the seat adjustment system and are prone to being damaged. By using the vehicle interior monitoring system alone with inexpensive passive resonators, the conventional seat sensors can be eliminated resulting in a cost saving to the vehicle manufacturer. An efficient reflector, such as a parabolic shaped reflector, or in some cases a corner cube reflector (which can be a multiple cube pattern array), can be used in a similar manner as the resonator. Similarly, a surface acoustic wave (SAW) device, RFID, variable resistor, inductor or capacitor device and radio frequency radiation can be used as a resonator or a delay line returning a signal to the interrogator permitting the presence and location of an object to be obtained as described in detail in U.S. Pat. No. 6,662,642. Optical reflectors such as an array of corner cube reflectors can also be used with infrared. Additionally such an array can comprise a pattern so that there is no doubt that infrared is reflecting off of the reflector. These reflectors can be similar to those found on bicycles, joggers athletic clothes, rear of automobiles, signs, reflective tape on roadways etc.

Resonators or reflectors, of the type described above can be used for making a variety of position measurements in the vehicle. They can be placed on an object such as a child seat 2 (FIG. 1) to permit the direct detection of its presence and, in some cases, its orientation. Optical reflecting tape, for example, could be easily applied to child seats. These resonators are made to resonate at a particular frequency. If the number of resonators increases beyond a reasonable number, dual frequency resonators can be used, or alternately, resonators that return an identification number such as can be done with an RFID or SAW device or a pattern as can be done with optical reflectors. For the dual frequency case, a pair of frequencies is then used to identify a particular location. Alternately, resonators tuned to a particular frequency can be used in combination with special transmitters, which transmit at the tuned frequency, which are designed to work with a particular resonator or group of resonators. The cost of the transducers is sufficiently low to permit special transducers to be used for special purposes. The use of resonators that resonate at different frequencies requires that they be irradiated by radiation containing those frequencies. This can be done with a chirp circuit, for example.

An alternate approach is to make use of secondary emission where the frequency emitted form the device is at a different frequency that the interrogator. Phosphors, for example, convert ultraviolet to visible and devices exist that convert electromagnetic waves to ultrasonic waves. Other devices can return a frequency that is a sub-harmonic of the interrogation frequency. Additionally, an RFID tag can use the incident RF energy to charge up a capacitor and then radiate energy at a different frequency. Additionally, sufficient energy can also be supplied using energy harvesting principles wherein the vibrations associated with vehicle motion can be used to generate electric power which can then be stored in a battery, capacitor or ultracapacitor.

Another application for a resonator of the type described is to determine the location of the seatbelt and therefore determine whether it is in use. If it is known that the occupants are wearing seatbelts, the airbag deployment parameters can be controlled or adjusted based on the knowledge of seatbelt use, e.g., the deployment threshold can be increased since the airbag is not needed in low velocity accidents if the occupants are already restrained by seatbelts. Deployment of other occupant restraint devices could also be effected based on the knowledge of seatbelt use. This will reduce the number of deployments for cases where the airbag provides little or no improvement in safety over the seatbelt. FIG. 2, for example, shows the placement of a resonator 26 on the front surface of the seatbelt where it can be sensed by the transducer 8. Such a system can also be used to positively identify the presence of a rear facing child seat in the vehicle. In this case, a resonator 18 is placed on the forward most portion of the child seat, or in some other convenient position, as shown in FIG. 1. As illustrated and discussed in U.S. Pat. No. 6,662,642, there are various methods of obtaining distance from a resonator, reflector, RFID or SAW device which include measuring the time of flight, using phase measurements, correlation analysis and triangulation.

Figure 61:
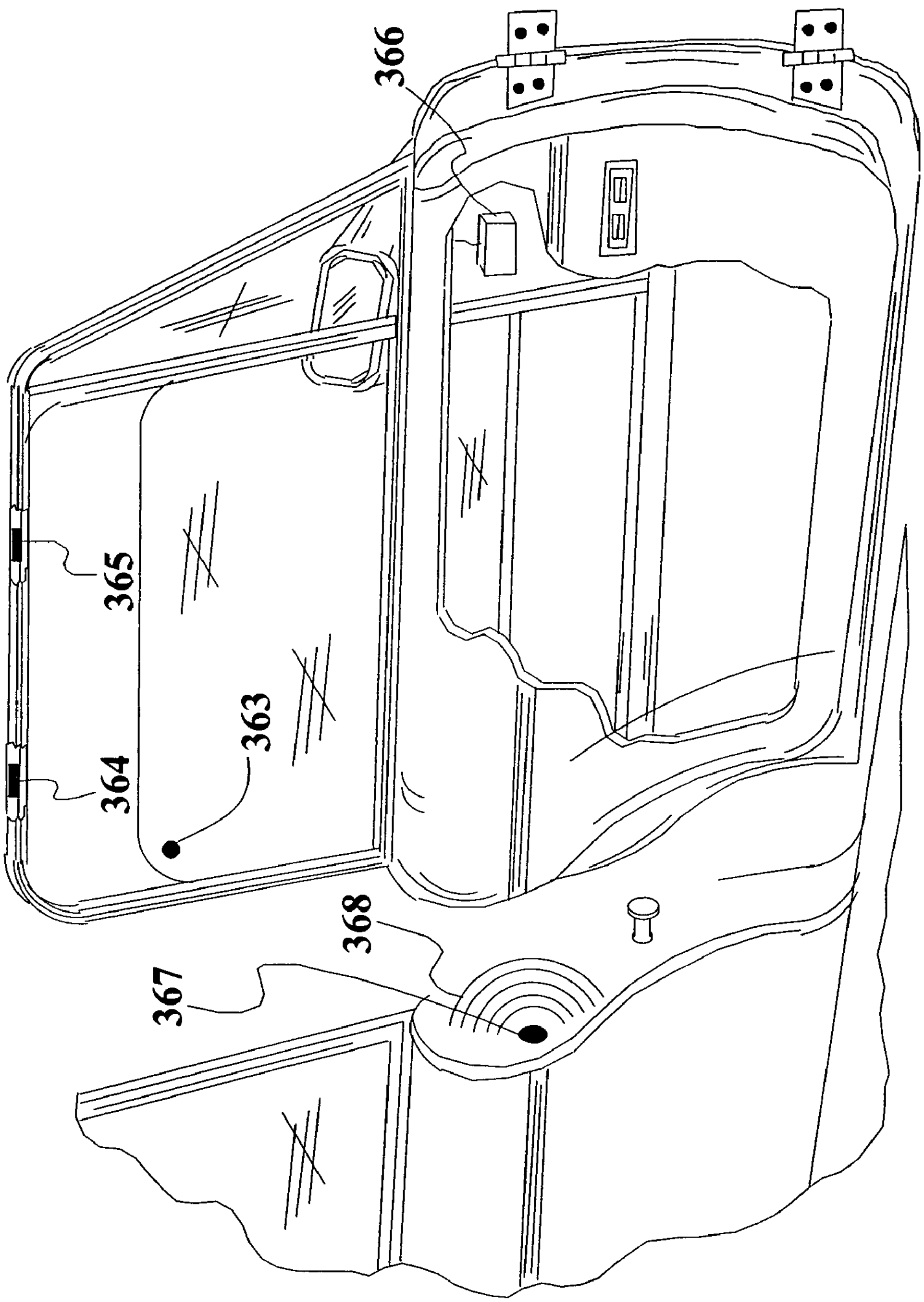
FIG. 61 is a side view with parts cutaway and removed of the door system of a passenger compartment of a vehicle showing the use of a resonator or reflector to determine the extent of opening of the driver window and of a system for determining the presence of an object, such as the hand of an occupant, in the window opening and showing the use of a resonator or reflector to determine the extent of opening of the driver window and of another system for determining the presence of an object, such as the hand of an occupant, in the window opening, and also showing the use of a resonator or reflector to determine the extent of opening position of the driver side door.

Other uses for such resonators or reflectors include placing them on doors and windows in order to determine whether either is open or closed. In FIG. 61, for example, such a resonator 363 is placed on the top of the window and is sensed by transducers 364 and 365. In this case, transducers 364 and 365 also monitor the space between the edge of the window glass and the top of the window opening. Many vehicles now have systems that permit the rapid opening of the window, called "express open", by a momentary push of a button. For example, when a vehicle approaches a tollbooth, the driver needs only touch the window control button and the window opens rapidly. Some automobile manufacturers do not wish to use such systems for closing the window, called "express close", because of the fear that the hand of the driver, or of a child leaning forward from the rear seat, or some other object, could get caught between the window and window frame. If the space between the edge of the window and the window frame were monitored with an interior monitoring system, this problem can be solved. The presence of the resonator or reflector 363 on the top of the window glass also gives a positive indication of where the top surface is and reflections from below that point can be ignored. Other solutions to the express close problem are presented elsewhere herein.

Various design variations of the window monitoring system are possible and the particular choice will depend on the requirements of the vehicle manufacturer and the characteristics of the vehicle. Two systems will be briefly described here.

A recording of the output of transducers 364 and 365 is made of the open window without an object in the space between the window edge and the top of the window frame. When in operation, the transducers 364 and 365 receive the return signal from the space it is monitoring and compares that signal with the stored signal referenced above. This is done by processor 366. If the difference between the test signal and the stored signal indicates that there is a reflecting object in the monitored space, the window is prevented from closing in the express close mode. If the window is part way up, a reflection will be received from the edge of the window glass that, in most cases, is easily identifiable from the reflection of a hand for example. A simple algorithm based on the intensity, or timing, of the reflection in most cases is sufficient to determine that an object rather than the window edge is in the monitored space. In other cases, the algorithm is used to identify the window edge and ignore that reflection and all other reflections that are lower (i.e., later in time) than the window edge. In all cases, the system will default in not permitting the express close if there is any doubt. The operator can still close the window by holding the switch in the window closing position and the window will then close slowly as it now does in vehicles without the express close feature.

Alternately, the system can use pattern recognition using the two transducers 364 and 365 as shown in FIG. 61 and the processor 366 which comprises a neural network. In this example the system is trained for all cases where the window is down and at intermediate locations. In operation, the transducers monitor the window space and feed the received signals to processor 366. As long as the signals are similar to one of the signals for which the network was trained, the express close system is enabled. As before, the default is to suppress the express close.

If there are sufficient imagers placed at appropriate locations, a likely condition as the cost of imagers and processors continues to drop, the presence of an obstruction in an open window, door, sunroof, trunk opening, hatchback etc., can be sensed by such an imager and the closing of the opening stopped. This likely outcome will simplify interior monitoring by permitting one device to carry out multiple functions.

The use of a resonator, RFID or SAW tag, or reflector, to determine whether the vehicle door is properly shut is also illustrated in FIG. 61. In this case, the resonator or reflector 367 is placed in the B-pillar in such a manner that it is shielded by the door, or by a cover or other inhibiting mechanism (not shown) engaged by the door, and blocked or prevented from resonating when the door is closed. Resonator 367 provides waves 368. If transducers such as 8 and 10 in FIG. 1 are used in this system, the closed-door condition would be determined by the absence of a return signal from the B-pillar resonator 367. This system permits the substitution of an inexpensive resonator or reflector for a more expensive and less reliable electrical switch plus wires.

The use of a resonator or reflector has been described above. For those cases where an infrared laser system is used, an optical mirror, reflector or even a bar code or equivalent would replace the mechanical resonator used with the acoustic system. In the acoustic system, the resonator can be any of a variety of tuned resonating systems including an acoustic cavity or a vibrating mechanical element. As discussed above, a properly designed antenna, corner reflector, or a SAW or RFID device fulfills this function for radio frequency waves.

For the purposes herein, the word resonator will frequently be used to include any device that returns a signal when excited by a signal sent by another device through the air. Thus, resonator would include a resonating antenna, a reflector, a surface acoustic wave (SAW) device, an RFID tag, an acoustic resonator, or any other device that performs substantially the same function such as a bar or other coded tag.

Other types of tags can also be used such as disclosed in 05821859. Concealed magnetic ID code and antitheft tags can also be used.

In most of the applications described above, single frequency energy was used to irradiate various occupying items of the passenger compartment. This was for illustrative purposes only and at least one of the inventions disclosed herein is not limited to single frequency irradiation. In many applications, it is useful to use several discrete frequencies or a band of frequencies or a chirp. In this manner, considerably greater information is received from the reflected irradiation permitting greater discrimination between different classes of objects. In general each object will have a different reflectivity, absorptivity and transmissivity at each frequency. Also, the different resonators placed at different positions in the passenger compartment can now be tuned to different frequencies making it easier to isolate one resonator from another.

Let us now consider the adjustment of a seat to adapt to an occupant. First some measurements of the morphological properties of the occupant are necessary. The first characteristic considered is a measurement of the height of the occupant from the vehicle seat. This can be done by a sensor in the ceiling of the vehicle but this becomes difficult since, even for the same seat location, the head of the occupant will not be at the same angle with respect to the seat and therefore the angle to a ceiling mounted sensor is in general unknown at least as long as only one ceiling mounted sensor is used. This problem can be solved if two or three sensors are used as described in more detail below. The simplest implementation is to place the sensor in the seat. In U.S. Pat. No. 5,694,320, a rear impact occupant protection apparatus is disclosed which uses sensors mounted within the headrest. This same system can also be used to measure the height of the occupant from the seat and thus, for no additional cost assuming the rear impact occupant protection system described in the '320 patent is provided, the first measure of the occupant's morphology can be achieved. See also FIGS. 48 and 49. For some applications, this may be sufficient since it is unlikely that two operators will use the vehicle that both have the same height. For other implementations, one or more additional measurements are used. Naturally, a face, fingerprint, voiceprint or iris recognition system will have the least problem identifying a previous occupant.

Referring now to FIG. 48, an automatic adjustment system for adjusting a seat (which is being used only as an example of a vehicle component) is shown generally at 371 with a movable headrest 356 and ultrasonic sensors 353, 354 and 355 for measuring the height of the occupant of the seat. Other types of wave, energy or radiation receiving sensors may also be used in the invention instead of the ultrasonic transmitter/receiver set 353, 354, 355. Power means such as motors 371, 372, and 373 connected to the seat for moving the base of the seat, control means such as a control circuit, system or module 254 connected to the motors and a headrest actuation mechanism using servomotors 374 and 375, which may be servomotors, are also illustrated. The seat 4 and headrest 356 are shown in phantom. Vertical motion of the headrest 356 is accomplished when a signal is sent from control module 254 to servomotor 374 through a wire 376. Servomotor 374 rotates lead screw 377 which engages with a threaded hole in member 378 causing it to move up or down depending on the direction of rotation of the lead screw 377. Headrest support rods 379 and 380 are attached to member 378 and cause the headrest 356 to translate up or down with member 378. In this manner, the vertical position of the headrest can be controlled as depicted by arrow A-A. Ultrasonic transmitters and receivers 353, 354, 355 may be replaced by other appropriate wave-generating and receiving devices, such as electromagnetic, active infrared transmitters and receivers, and capacitance sensors and electric field sensors.

Wire 381 leads from control module 254 to servomotor 375 which rotates lead screw 382. Lead screw 382 engages with a threaded hole in shaft 383 which is attached to supporting structures within the seat shown in phantom. The rotation of lead screw 382 rotates servo motor support 384, upon which servomotor 374 is situated, which in turn rotates headrest support rods 379 and 380 in slots 385 and 386 in the seat 4. Rotation of the servomotor support 384 is facilitated by a rod 387 upon which the servo motor support 384 is positioned. In this manner, the headrest 356 is caused to move in the fore and aft direction as depicted by arrow B-B. Naturally there are other designs which accomplish the same effect in moving the headrest up and down and fore and aft.

The operation of the system is as follows. When an adult or child occupant is seated on a seat containing the headrest and control system described above as determined by the neural network 65, the ultrasonic transmitters 353, 354 and 355 emit ultrasonic energy which reflects off of the head of the occupant and is received by the same transducers. An electronic circuit in control module 254 contains a microprocessor which determines the distance from the head of the occupant based on the time between the transmission and reception of the ultrasonic pulses. In the embodiment wherein capacitance or electric field sensors are used instead of ultrasonic transducers, the manner in which the distance can be determined using such sensors is known to those skilled in the art.

Control module 254 may be within the same microprocessor as neural network 65 or separate therefrom. The headrest 356 moves up and down until it finds the top of the head and then the vertical position closest to the head of the occupant and then remains at that position. Based on the time delay between transmission and reception of an ultrasonic pulse, the system can also determine the longitudinal distance from the headrest to the occupant's head. Since the head may not be located precisely in line with the ultrasonic sensors, or the occupant may be wearing a hat, coat with a high collar, or may have a large hairdo, there may be some error in this longitudinal measurement.

When an occupant sits on seat 4, the headrest 356 moves to find the top of the occupant's head as discussed above. This is accomplished using an algorithm and a microprocessor which is part of control circuit 254. The headrest 356 then moves to the optimum location for rear impact protection as described in the above referenced '320 patent. Once the height of the occupant has been measured, another algorithm in the microprocessor in control circuit 254 compares the occupant's measured height with a table representing the population as a whole and from this table, the appropriate positions for the seat corresponding to the occupant's height is selected. For example, if the occupant measured 33 inches from the top of the seat bottom, this might correspond to an 85% human, depending on the particular seat and statistical table of human measurements.

Careful study of each particular vehicle model provides the data for the table of the location of the seat to properly position the eyes of the occupant within the "eye-ellipse", the steering wheel within a comfortable reach of the occupant's hands and the pedals within a comfortable reach of the occupant's feet, based on his or her size, etc. Of course one or more pedals can be manually adjusted providing they are provided with an actuator such as an electric motor and any such adjustment, either manual or automatic, is contemplated by the inventions disclosed herein.

Once the proper position has been determined by control circuit 254, signals are sent to motors 371, 372, and 373 to move the seat to that position, if such movement is necessary. That is, it is possible that the seat will be in the proper position so that movement of the seat is not required. As such, the position of the motors 371,372,373 and/or the position of the seat prior to occupancy by the occupant may be stored in memory so that after occupancy by the occupant and determination of the desired position of the seat, a comparison is made to determine whether the desired position of the seat deviates from the current position of the seat. If not, movement of the seat is not required. Otherwise, the signals are sent by the control circuit 254 to the motors. In this case, control circuit 254 would encompass a seat controller.

Instead of adjusting the seat to position the driver in an optimum driving position, or for use when adjusting the seat of a passenger, it is possible to perform the adjustment with a view toward optimizing the actuation or deployment of an occupant protection or restraint device. For example, after obtaining one or more morphological characteristics of the occupant, the processor can analyze them and determine one or more preferred positions of the seat, with the position of the seat being related to the position of the occupant, so that if the occupant protection device is deployed, the occupant will be in an advantageous position to be protected against injury by such deployment. In this case then, the seat is adjusted based on the morphology of the occupant view a view toward optimizing deployment of the occupant protection device. The processor is provided in a training or programming stage with the preferred seat positions for different morphologies of occupants.

Movement of the seat can take place either immediately upon the occupant sitting in the seat or immediately prior to a crash requiring deployment of the occupant protection device. In the latter case, if an anticipatory sensing arrangement is used, the seat can be positioned immediately prior to the impact, much in a similar manner as the headrest is adjusted for a rear impact as disclosed in the '320 patent referenced above.

If during some set time period after the seat has been positioned, the operator changes these adjustments, the new positions of the seat are stored in association with an occupant height class in a second table within control circuit 254. When the occupant again occupies the seat and his or her height has once again been determined, the control circuit 254 will find an entry in the second table which takes precedence over the basic, original table and the seat returns to the adjusted position. When the occupant leaves the vehicle, or even when the engine is shut off and the door opened, the seat can be returned to a neutral position which provides for easy entry and exit from the vehicle.

Figures 62A, 62B:
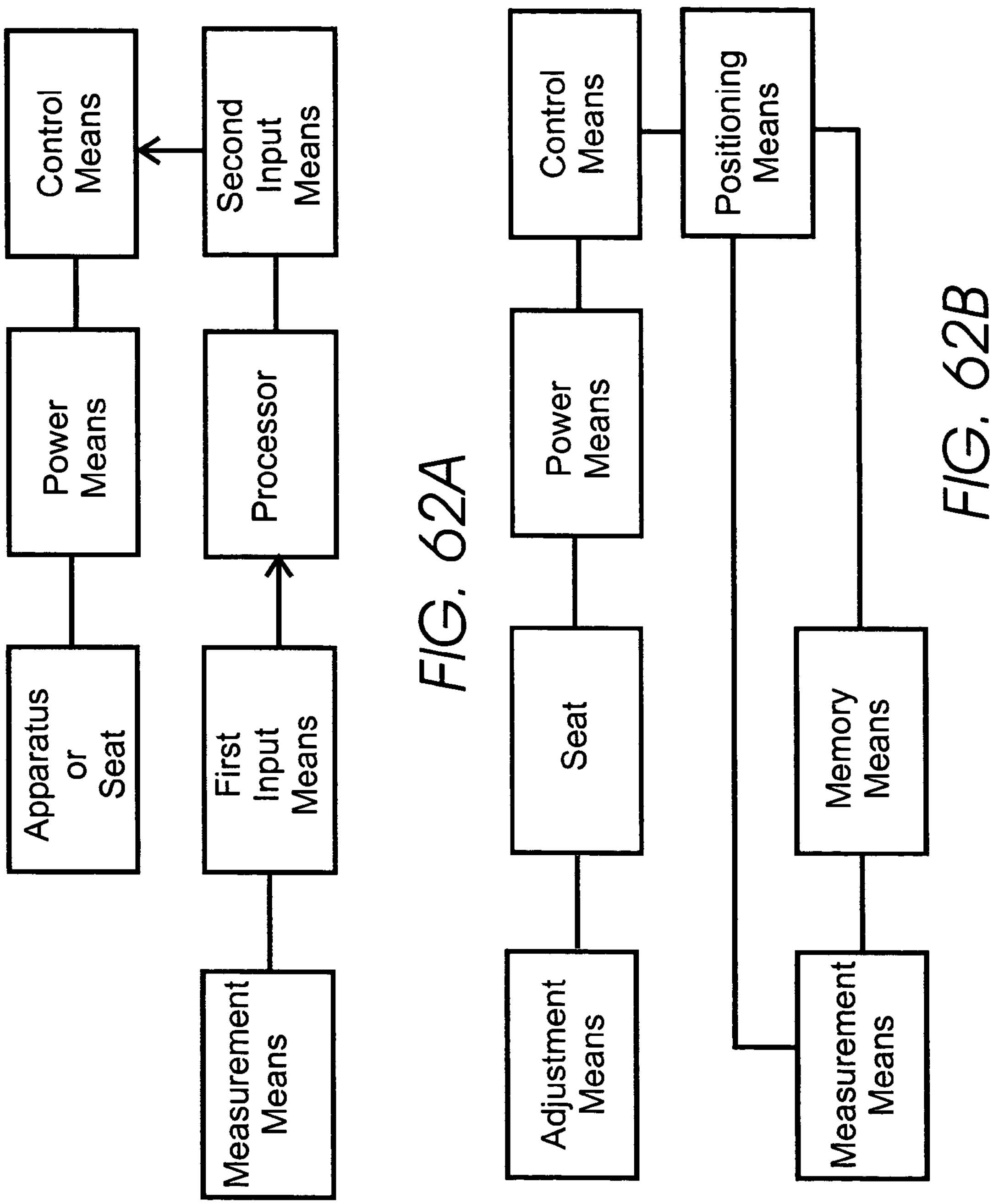
FIG. 62A is a schematic drawing of the basic embodiment of the adjustment system in accordance with the invention.
FIG. 62B is a schematic drawing of another basic embodiment of the adjustment system in accordance with the invention.

The seat 4 also contains two control switch assemblies 388 and 389 for manually controlling the position of the seat 4 and headrest 356. The seat control switches 388 permits the occupant to adjust the position of the seat if he or she is dissatisfied with the position selected by the algorithm. The headrest control switches 389 permit the occupant to adjust the position of the headrest in the event that the calculated position is uncomfortably close to or far from the occupant's head. A woman with a large hairdo might find that the headrest automatically adjusts so as to contact her hairdo. This adjustment she might find annoying and could then position the headrest further from her head. For those vehicles which have a seat memory system for associating the seat position with a particular occupant, which has been assumed above, the position of the headrest relative to the occupant's head could also be recorded. Later, when the occupant enters the vehicle, and the seat automatically adjusts to the recorded preference, the headrest will similarly automatically adjust as diagrammed in FIGS. 62A and 62B.

The height of the occupant, although probably the best initial morphological characteristic, may not be sufficient especially for distinguishing one driver from another when they are approximately the same height. A second characteristic, the occupant's weight, can also be readily determined from sensors mounted within the seat in a variety of ways as shown in FIG. 42 which is a perspective view of the seat shown in FIG. 48 with a displacement or weight sensor 159 shown mounted onto the seat.

Displacement sensor 159 is supported from supports 165. In general, displacement sensor 164, or another non-displacement sensor, measures a physical state of a component affected by the occupancy of the seat. An occupying item of the seat will cause a force to be exerted downward and the magnitude of this force is representative of the weight of the occupying item. Thus, by measuring this force, information about the weight of the occupying item can be obtained. A physical state may be any force changed by the occupancy of the seat and which is reflected in the component, e.g., strain of a component, compression of a component, tension of a component. Naturally other weight measuring systems as described herein and elsewhere including bladders and strain gages can be used.

An alternative approach is to measure the load on the vehicle suspension system while the vehicle is at rest (static) or when it is in motion (dynamic). The normal empty state of the vehicle can be determined when the vehicle is at rest for a prolonged time period. After then the number and location of occupying items can be determined by measuring the increased load on the suspension devices that attach the vehicle body to its frame. SAW strain measuring elements can be placed on each suspension spring, for example, and used to measure the increased load on the vehicle as an object or occupant is placed in the vehicle. This approach has the advantage that it is not affected by seatbelt loadings, for example. If the vehicle is monitored as each item is paced in the vehicle a characterization of that item can be made. The taking on of fuel, for example, will correspond to a particular loading pattern over time that will permit the identification of the amount of the weight on the suspension that can be attributed to fuel. Dynamic measuring systems are similar to those used in section 6.3 and thus will not be repeated here.

The system described above is based on the assumption that the occupant will be satisfied with one seat position throughout an extended driving trip. Studies have shown that for extended travel periods that the comfort of the driver can be improved through variations in the seat position. This variability can be handled in several ways. For example, the amount and type of variation preferred by an occupant of the particular morphology can be determined through case studies and focus groups. If it is found, for example, that the 50 percentile male driver prefers the seat back angle to vary by 5 degrees sinusodially with a one-hour period, this can be programmed to the system. Since the system knows the morphology of the driver it can decide from a lookup table what is the best variability for the average driver of that morphology. The driver then can select from several preferred possibilities if, for example, he or she wishes to have the seat back not move at all or follow an excursion of 10 degrees over two hours.

This system provides an identification of the driver based on two morphological characteristics which is adequate for most cases. As additional features of the vehicle interior identification and monitoring system described in the above referenced patent applications are implemented, it will be possible to obtain additional morphological measurements of the driver which will provide even greater accuracy in driver identification. Such additional measurements include iris scans, voice prints, face recognition, fingerprints, voiceprints hand or palm prints etc. Two characteristics may not be sufficient to rely on for theft and security purposes, however, many other driver preferences can still be added to seat position with this level of occupant recognition accuracy. These include the automatic selection of a preferred radio station, pedal position, vehicle temperature, steering wheel and steering column position, etc.

One advantage of using only the height and weight is that it avoids the necessity of the seat manufacturer from having to interact with the headliner manufacturer, or other component suppliers, since all of the measuring transducers are in the seat. This two characteristic system is generally sufficient to distinguish drivers that normally drive a particular vehicle. This system costs little more than the memory systems now in use and is passive, i.e., it does not require action on the part of the occupant after his initial adjustment has been made.

Instead of measuring the height and weight of the occupant, it is also possible to measure a combination of any two morphological characteristics and during a training phase, derive a relationship between the occupancy of the seat, e.g., adult occupant, child occupant, etc., and the data of the two morphological characteristic. This relationship may be embodied within a neural network so that during use, by measuring the two morphological characteristics, the occupancy of the seat can be determined.

Naturally, there are other methods of measuring the height of the driver such as placing the transducers at other locations in the vehicle. Some alternatives are shown in other figures herein and include partial side images of the occupant and ultrasonic transducers positioned on or near the vehicle headliner. These transducers may already be present because of other implementations of the vehicle interior identification and monitoring system described in the above referenced patent applications. The use of several transducers provides a more accurate determination of location of the head of the driver. When using a headliner mounted sensor alone, the exact position of the head is ambiguous since the transducer measures the distance to the head regardless of what direction the head is. By knowing the distance from the head to another headliner mounted transducer the ambiguity is substantially reduced. This argument is of course dependent on the use of ultrasonic transducers. Optical transducers using CCD, CMOS or equivalent arrays are now becoming price competitive and, as pointed out in the above referenced patent applications, will be the technology of choice for interior vehicle monitoring. A single CMOS array of 160 by 160 pixels, for example, coupled with the appropriate pattern recognition software, can be used to form an image of the head of an occupant and accurately locate the head for the purposes of at least one of the inventions disclosed herein. It can also be used with a face recognition algorithm to positively identify the occupant.

Figure 64:
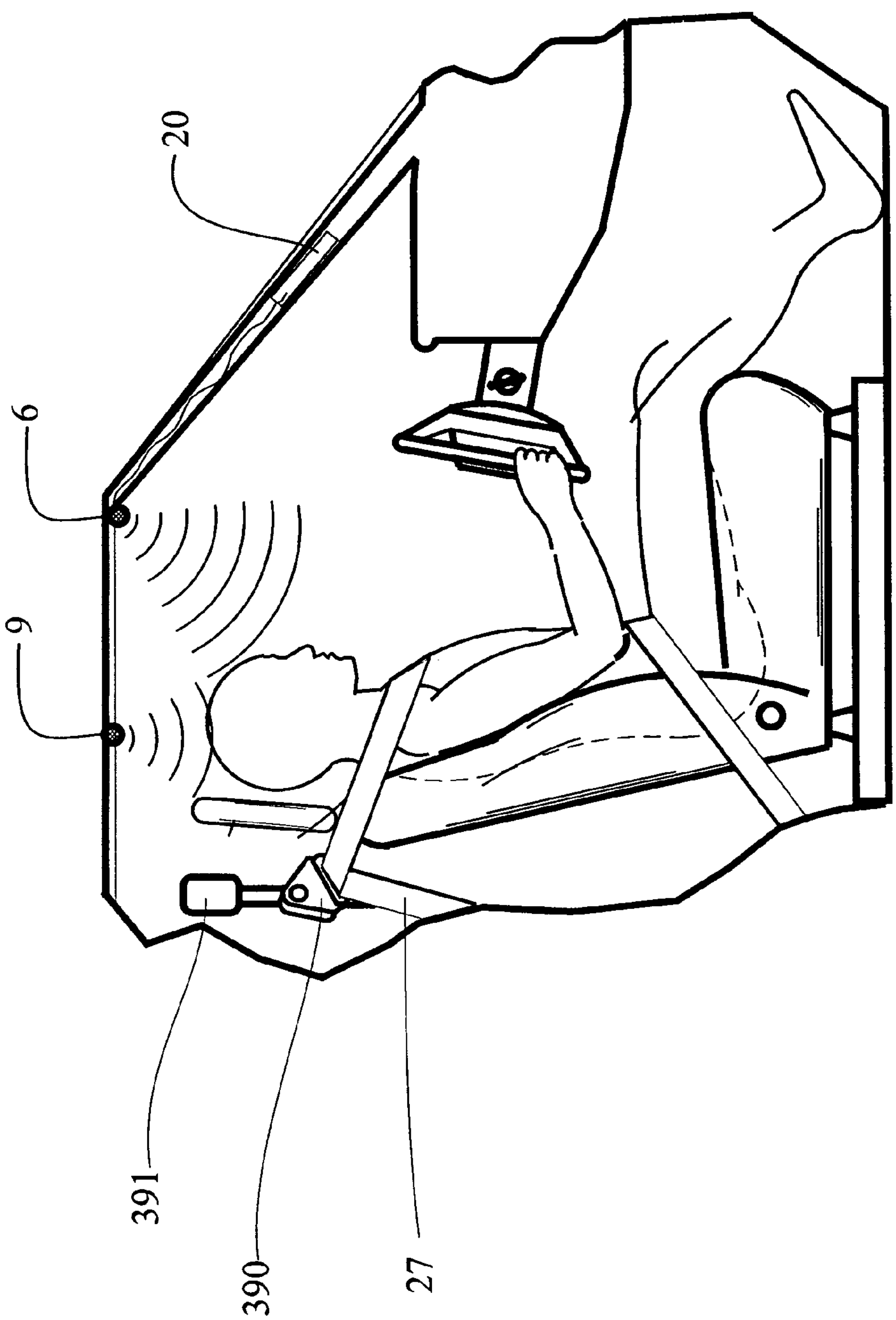
FIG. 64 is a side plan view of the interior of an automobile, with portions cut away and removed, with two occupant height measuring sensors, one mounted into the headliner above the occupant's head and the other mounted onto the A-pillar and also showing a seatbelt associated with the seat wherein the seatbelt has an adjustable upper anchorage point which is automatically adjusted based on the height of the occupant.

FIG. 64 also illustrates a system where the seatbelt 27 has an adjustable upper anchorage point 390 which is automatically adjusted by a motor 391 to a location optimized based on the height of the occupant. In this system, infrared transmitter and CCD array receivers 6 and 9 are positioned in a convenient location proximate the occupant's shoulder, such as in connection with the headliner, above and usually to the outside of the occupant's shoulder. An appropriate pattern recognition system, as may be resident in control circuitry 20 to which the receivers 6 and 9 are coupled, as described above is then used to determine the location and position of the shoulder. This information is provided by control circuitry 20 to the seatbelt anchorage height adjustment system 391 (through a conventional coupling arrangement), shown schematically, which moves the attachment point 390 of the seatbelt 27 to the optimum vertical location for the proper placement of the seatbelt 27.

The calculations for this feature and the appropriate control circuitry can also be located in control module 20 or elsewhere if appropriate. Seatbelts are most effective when the upper attachment point to the vehicle is positioned vertically close to the shoulder of the occupant being restrained. If the attachment point is too low, the occupant experiences discomfort from the rubbing of the belt on his or her shoulder. If it is too high, the occupant may experience discomfort due to the rubbing of the belt against his or her neck and the occupant will move forward by a greater amount during a crash which may result in his or her head striking the steering wheel. For these reasons, it is desirable to have the upper seatbelt attachment point located slightly above the occupant's shoulder. To accomplish this for various sized occupants, the location of the occupant's shoulder should be known, which can be accomplished by the vehicle interior monitoring system described herein.

Figure 65:
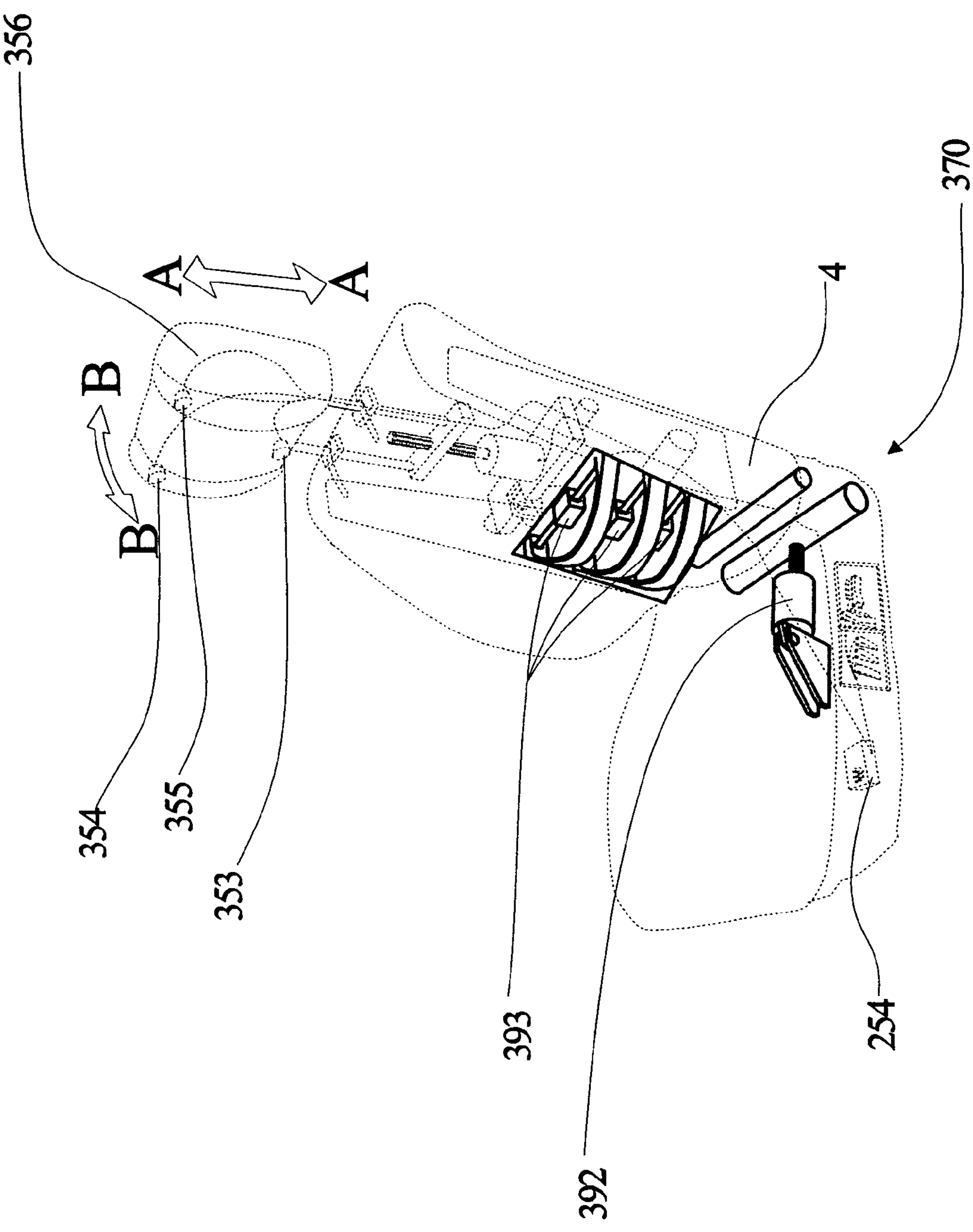
FIG. 65 is a view of the seat of FIG. 48 showing motors for changing the tilt of seat back and the lumbar support.

Many luxury automobiles today have the ability to control the angle of the seat back as well as a lumbar support. These additional motions of the seat can also be controlled by the seat adjustment system in accordance with the invention. FIG. 65 is a view of the seat of FIG. 48 showing motors 392 and 393 for changing the tilt of the seat back and the lumbar support. Three motors 393 are used to adjust the lumbar support in this implementation. The same procedure is used for these additional motions as described for FIG. 48 above.

An initial table is provided based on the optimum positions for various segments of the population. For example, for some applications the table may contain a setting value for each five percentile of the population for each of the 6 possible seat motions, fore and aft, up and down, total seat tilt, seat back angle, lumbar position, and headrest position for a total of 120 table entries. The second table similarly would contain the personal preference modified values of the 6 positions desired by a particular driver.

The angular resolution of a transducer is proportional to the ratio of the wavelength to the diameter of the transmitter. Once three transmitters and receivers are used, the approximate equivalent single transmitter and receiver is one which has a diameter approximately equal to the shortest distance between any pair of transducers. In this case, the equivalent diameter is equal to the distance between transmitter 354 or 355 and 353. This provides far greater resolution and, by controlling the phase between signals sent by the transmitters, the direction of the equivalent ultrasonic beam can be controlled. Thus, the head of the driver can be scanned with great accuracy and a map made of the occupant's head. Using this technology plus an appropriate pattern recognition algorithm, such as a neural network, an accurate location of the driver's head can be found even when the driver's head is partially obscured by a hat, coat, or hairdo. This also provides at least one other identification morphological characteristic which can be used to further identify the occupant, namely the diameter of the driver's head.

In an automobile, there is an approximately fixed vertical distance between the optimum location of the occupant's eyes and the location of the pedals. The distant from a driver's eyes to his or her feet, on the other hand, is not the same for all people. An individual driver now compensates for this discrepancy by moving the seat and by changing the angle between his or hers legs and body. For both small and large drivers, this discrepancy cannot be fully compensated for and as a result, their eyes are not appropriately placed. A similar problem exists with the steering wheel. To help correct these problems, the pedals and steering column should be movable as illustrated in FIG. 66 which is a plan view similar to that of FIG. 64 showing a driver and driver seat with an automatically adjustable steering column and pedal system which is adjusted based on the morphology of the driver.

Figure 66:
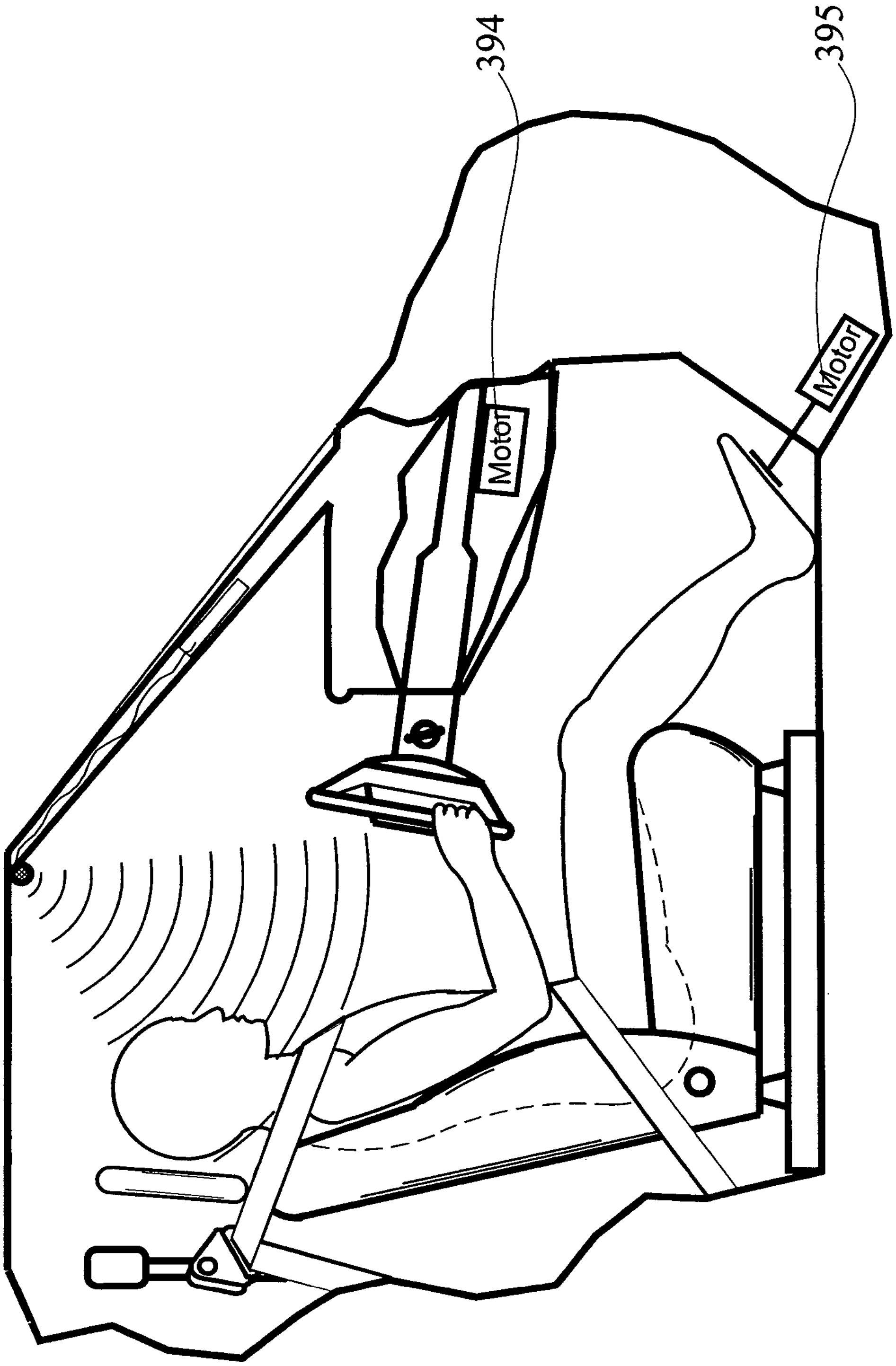
FIG. 66 is a view as in FIG. 64 showing a driver and driver seat with an automatically adjustable steering column and pedal system which is adjusted based on the morphology of the driver.

In FIG. 66, a motor 394 is connected to and controls the position of the steering column and another motor 395 is connected to and controls the position of the pedals. Both motors 394 and 395 are coupled to and controlled by control circuit 254 wherein now the basic table of settings includes values for both the pedals and steering column locations.

The settings may be determined through experimentation or empirically by determining an optimum position of the pedals and steering wheel for drivers having different morphologies, i.e., different heights, different leg lengths, etc.

Figure 66A:
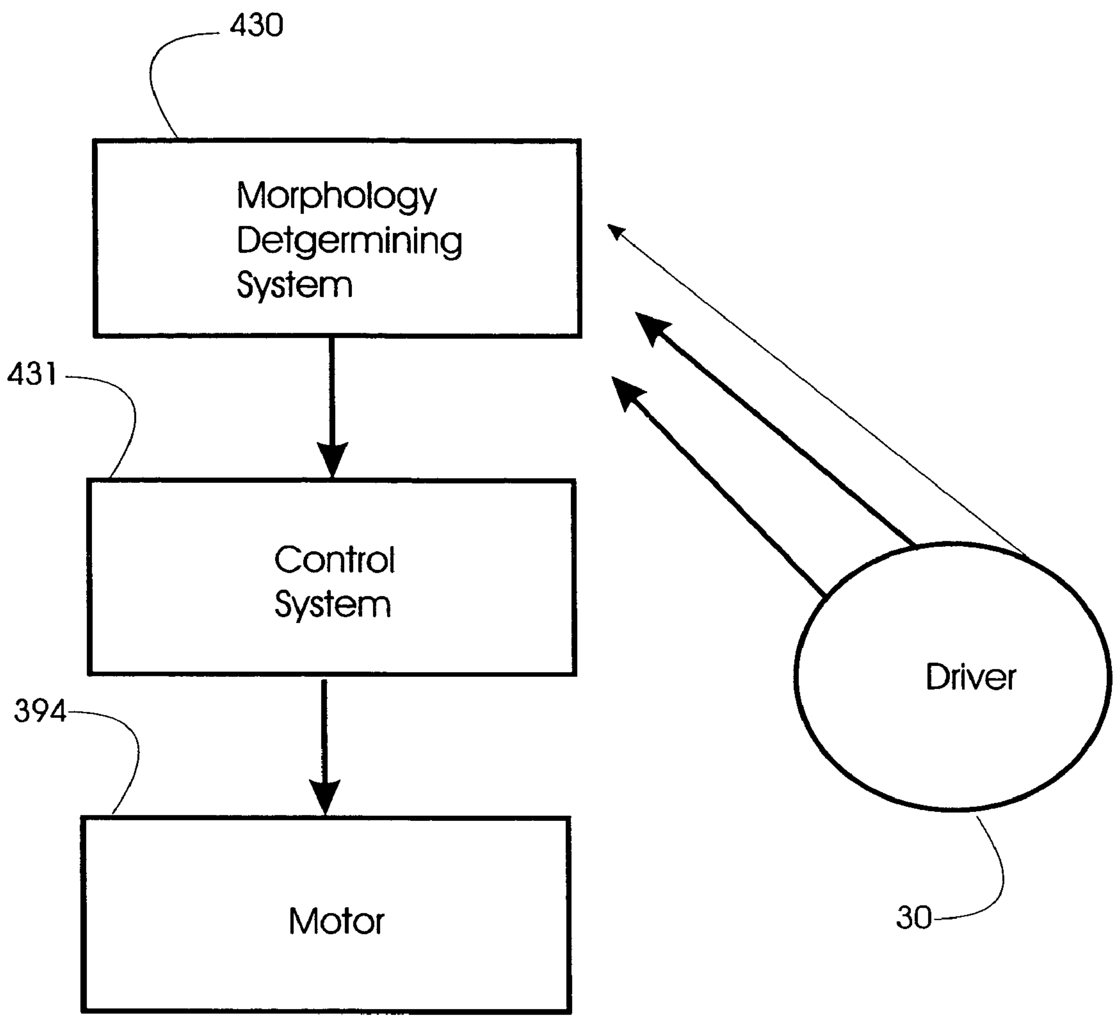

More specifically, as shown in FIG. 66A, the morphology determination system 430 determines one or more physical properties or characteristics of the driver 30 which would affect the position of the steering column, e.g., leg length, height, and arm length. The determination of these properties may be obtained in any of the manners disclosed herein. For example, height may be determined using the system shown in FIG. 48. Leg length and arm length may be determined by measuring the weight, height, etc of the driver and then using a table to obtain an estimated or average leg length or arm length based on the measured properties. In the latter case, the control circuit 431 could obtain the measurements and include data for the leg length and arm length, or would include data on the position of the steering wheel for the measured driver, i.e., the table of settings.

In either case, the control system 431 is provided with the setting for the steering wheel and if necessary, directs the motor 394 to move the steering wheel to the desired position. Movement of the steering wheel is thus provided in a totally automatic manner without manual intervention by the driver, either, by adjusting a knob on the steering wheel or by depressing a button.

Figure 66B:
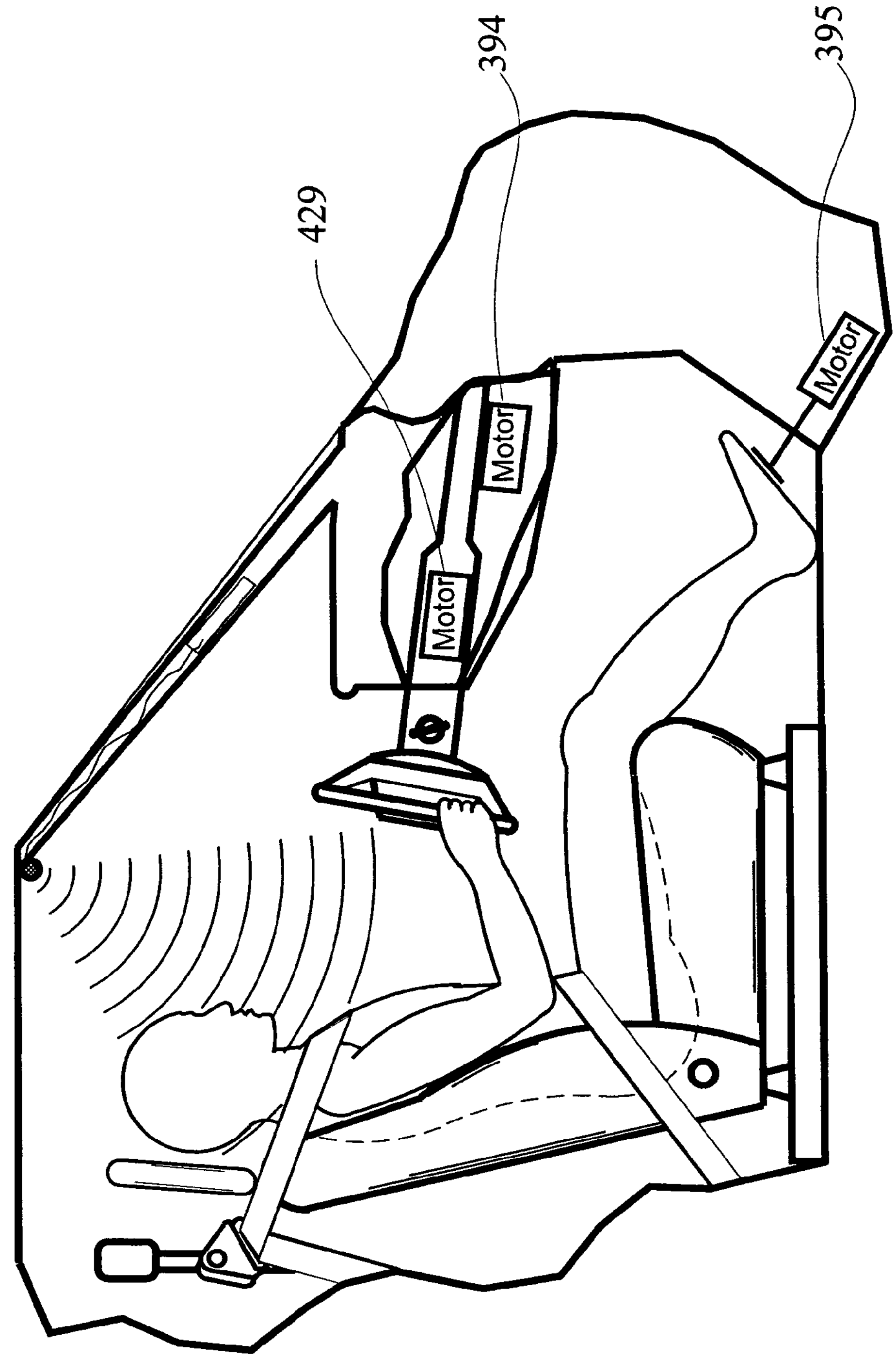

Although movement of the steering wheel is shown here as being controlled by a motor 394 that moves the steering column fore and aft, other methods are sometimes used in various vehicles such as changing the tilt angle of the steering column or the tilt angle of the steering wheel. Naturally, motors can be provided that cause these other motions and are contemplated by at least one of the inventions disclosed herein as is any other method that controls the position of the steering wheel. For example, FIG. 66B shows a schematic of a motor 429 which may be used to control the tilt angle of the steering wheel relative to the steering column.

Regardless of which motor or motors are used, the invention contemplates the adjustment or movement of the steering wheel relative to the front console of the vehicle and thus relative to the driver of the vehicle. This movement may be directly effective on the steering wheel (via motor 429) or effective on the steering column and thus indirectly effective on the steering wheel since movement of the steering column will cause movement of the steering wheel. Additionally when the ignition is turned off the steering wheel and column and any other adjustable device or component can be automatically moved to a more out of the way position to permit easier ingress and egress from the vehicle, for example.

The steering wheel adjustment feature may be designed to be activated upon detection of the presence of an object on the driver's seat. Thus, when a driver's first sits on the seat, the sensors could be designed to initiate measurement of the driver's morphology and then control the motor or motors to adjust the steering wheel, if such adjustment is deemed necessary. This is because an adjustment in the position of the steering wheel is usually not required during the course of driving but is generally only required when a driver first sits in the seat. The detection of the presence of the driver may be achieved using the weight sensors and/or other presence detection means, such as using the wave-based sensors, capacitance sensors, electric field sensors, etc.

Figure 67:
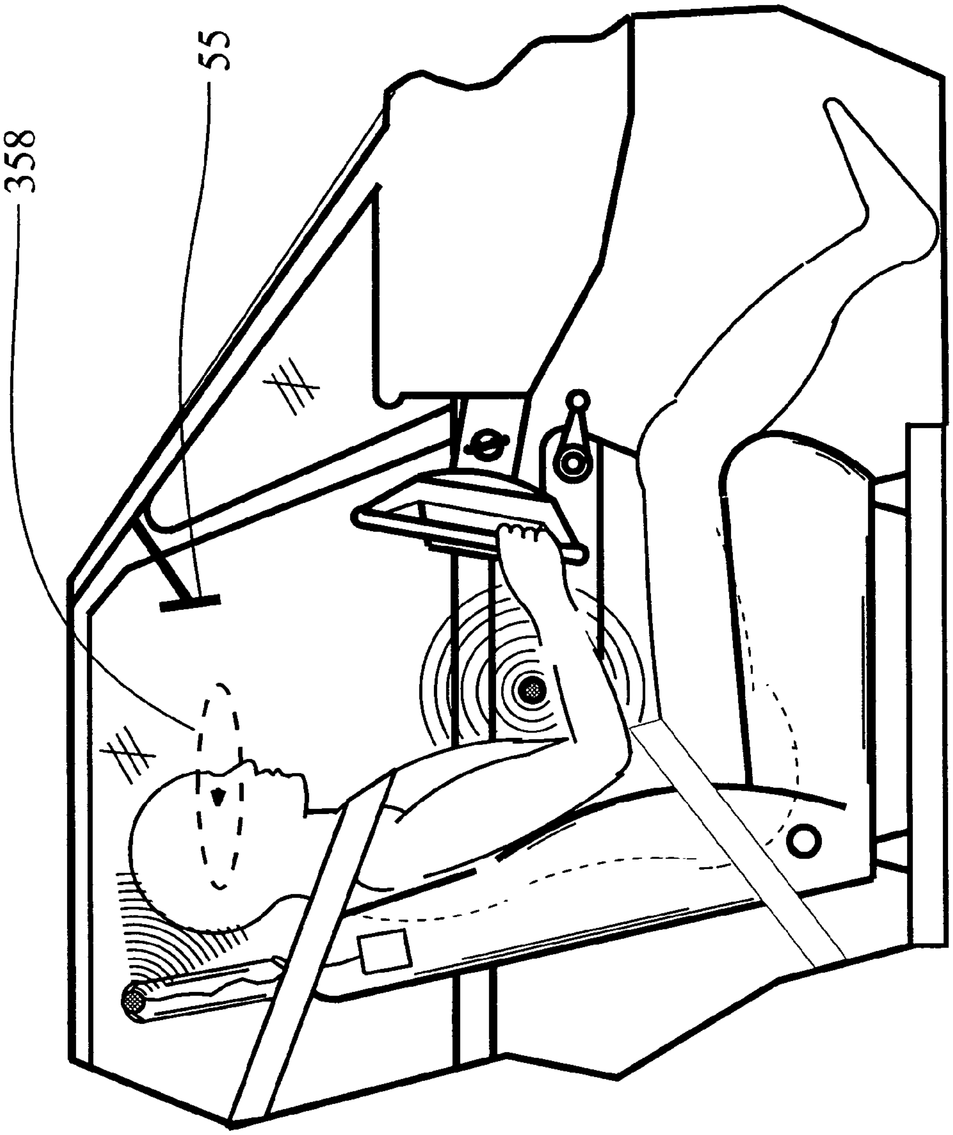
FIG. 67 is a view similar to FIG. 48 showing the occupant's eyes and the seat adjusted to place the eyes at a particular vertical position for proper viewing through the windshield and rear view mirror.

The eye ellipse discussed above is illustrated at 358 in FIG. 67, which is a view showing the occupant's eyes and the seat adjusted to place the eyes at a particular vertical position for proper viewing through the windshield and rear view mirror. Many systems are now under development to improve vehicle safety and driving ease. For example, night vision systems are being sold which project an enhanced image of the road ahead of the vehicle onto the windshield in a "heads-up display". The main problem with the systems now being sold is that the projected image does not precisely overlap the image as seen through the windshield. This parallax causes confusion in the driver and can only be corrected if the location of the driver's eyes is accurately known. One method of solving this problem is to use the passive seat adjustment system described herein to place the occupant's eyes at the optimum location as described above. Once this has been accomplished, in addition to solving the parallax problem, the eyes are properly located with respect to the rear view mirror 55 and little if any adjustment is required in order for the driver to have the proper view of what is behind the vehicle. Currently the problem is solved by projecting the heads-up display onto a different portion of the windshield, the bottom.

Although it has been described herein that the seat can be automatically adjusted to place the driver's eyes in the "eye-ellipse", there are many manual methods that can be implemented with feedback to the driver telling him or her when his or her eyes are properly position. At least one of the inventions disclosed herein is not limited by the use of automatic methods.

Once the morphology of the driver and the seat position is known, many other objects in the vehicle can be automatically adjusted to conform to the occupant. An automatically adjustable seat armrest, a cup holder, the cellular phone, or any other objects with which the driver interacts can be now moved to accommodate the driver. This is in addition to the personal preference items such as the radio station, temperature, etc. discussed above.

Once the system of at least one of the inventions disclosed herein is implemented, additional features become possible such as a seat which automatically makes slight adjustments to help alleviate fatigue or to account for a change of position of the driver in the seat, or a seat which automatically changes position slightly based on the time of day. Many people prefer to sit more upright when driving at night, for example. Other similar improvements based on knowledge of the occupant morphology will now become obvious to those skilled in the art.

Figure 63:
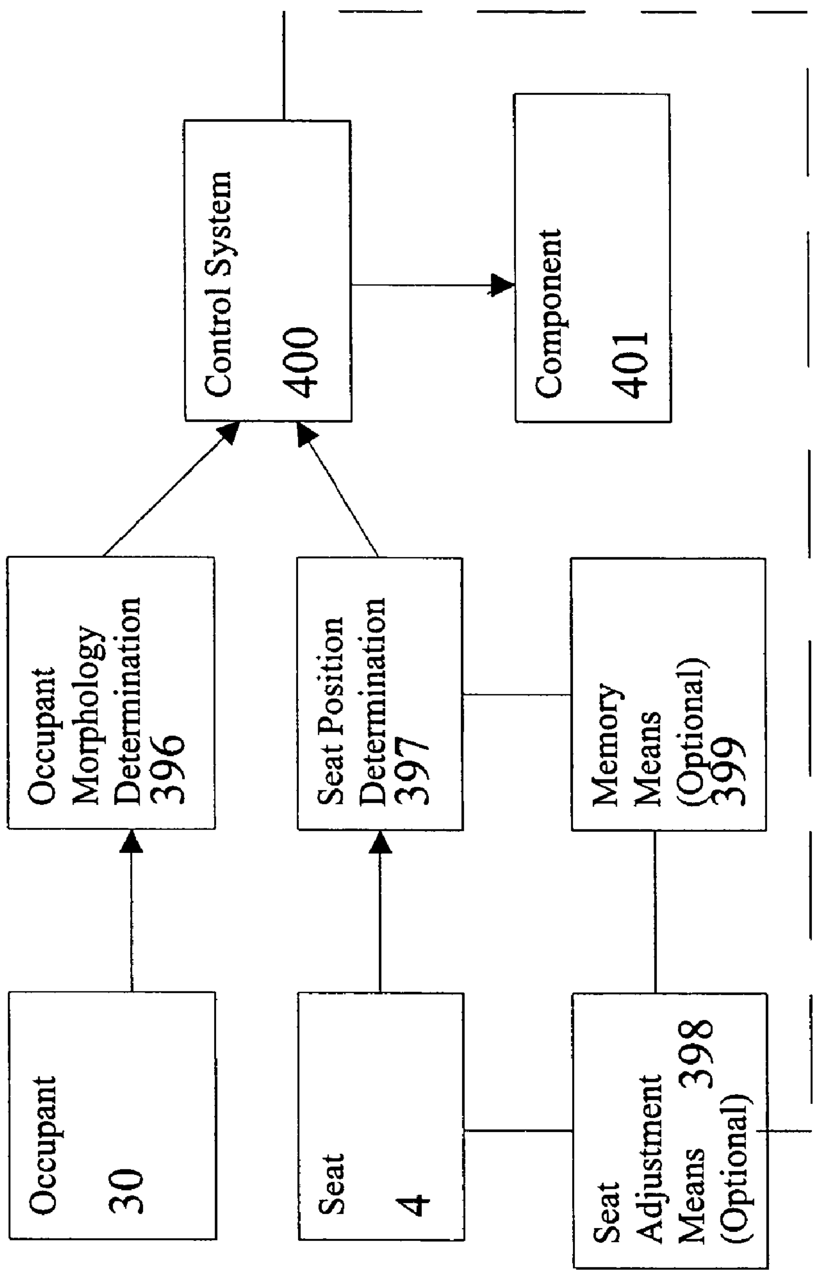
FIG. 63 is a flow chart of an arrangement for controlling a component in accordance with the invention.

FIG. 63 shows a flow chart of one manner in the arrangement and method for controlling a vehicle component in accordance with the invention functions. A measurement of the morphology of the occupant 30 is performed at 396, i.e., one or more morphological characteristics are measured in any of the ways described above. The position of the seat portion 4 is obtained at 397 and both the measured morphological characteristic of the occupant 30 and the position of the seat portion 4 are forwarded to the control system 400. The control system considers these parameters and determines the manner in which the component 401 should be controlled or adjusted, and even whether any adjustment is necessary.

Preferably, seat adjustment means 398 are provided to enable automatic adjustment of the seat portion 4. If so, the current position of the seat portion 4 is stored in memory means 399 (which may be a previously adjusted position) and additional seat adjustment, if any, is determined by the control system 400 to direct the seat adjustment means 398 to move the seat. The seat portion 4 may be moved alone, i.e., considered as the component, or adjusted together with another component, i.e., considered separate from the component (represented by way of the dotted line in FIG. 63).

Although several preferred embodiments are illustrated and described above, there are other possible combinations using different sensors which measure either the same or different morphological characteristics, such as knee position, of an occupant to accomplish the same or similar goals as those described herein.

It should be mentioned that the adjustment system may be used in conjunction with each vehicle seat. In this case, if a seat is determined to be unoccupied, then the processor means may be designed to adjust the seat for the benefit of other occupants, i.e., if a front passenger side seat is unoccupied but the rear passenger side seat is occupied, then adjustment system could adjust the front seat for the benefit of the rear-seated passenger, e.g., move the seat base forward.

In additional embodiments, the present invention involves the measurement of one or more morphological characteristics of a vehicle occupant and the use of these measurements to classify the occupant as to size and weight, and then to use this classification to position a vehicle component, such as the seat, to a near optimum position for that class of occupant. Additional information concerning occupant preferences can also be associated with the occupant class so that when a person belonging to that particular class occupies the vehicle, the preferences associated with that class are implemented. These preferences and associated component adjustments include the seat location after it has been manually adjusted away from the position chosen initially by the system, the mirror location, temperature, radio station, steering wheel and steering column positions, pedal positions etc. The preferred morphological characteristics used are the occupant height from the vehicle seat, weight of the occupant and facial features. The height is determined by sensors, usually ultrasonic or electromagnetic, located in the headrest, headliner or another convenient location. The weight is determined by one of a variety of technologies that measure either pressure on or displacement of the vehicle seat or the force in the seat supporting structure. The facial features are determined by image analysis comprising an imager such as a CCD or CMOS camera plus additional hardware and software.

The eye tracker systems discussed above are facilitated by at least one of the inventions disclosed herein since one of the main purposes of determining the location of the driver's eyes either by directly locating them with trained pattern recognition technology or by inferring their location from the location of the driver's head, is so that the seat can be automatically positioned to place the driver's eyes into the "eye-ellipse". The eye-ellipse is the proper location for the driver's eyes to permit optimal operation of the vehicle and for the location of the mirrors etc. Thus, if the location of the driver's eyes are known, then the driver can be positioned so that his or her eyes are precisely situated in the eye ellipse and the reflection off of the eye can be monitored with a small eye tracker system. Also, by ascertaining the location of the driver's eyes, a rear view mirror positioning device can be controlled to adjust the mirror 55 to an optimal position. See section 6.5.

14.3 Side Impacts

Figure 68:
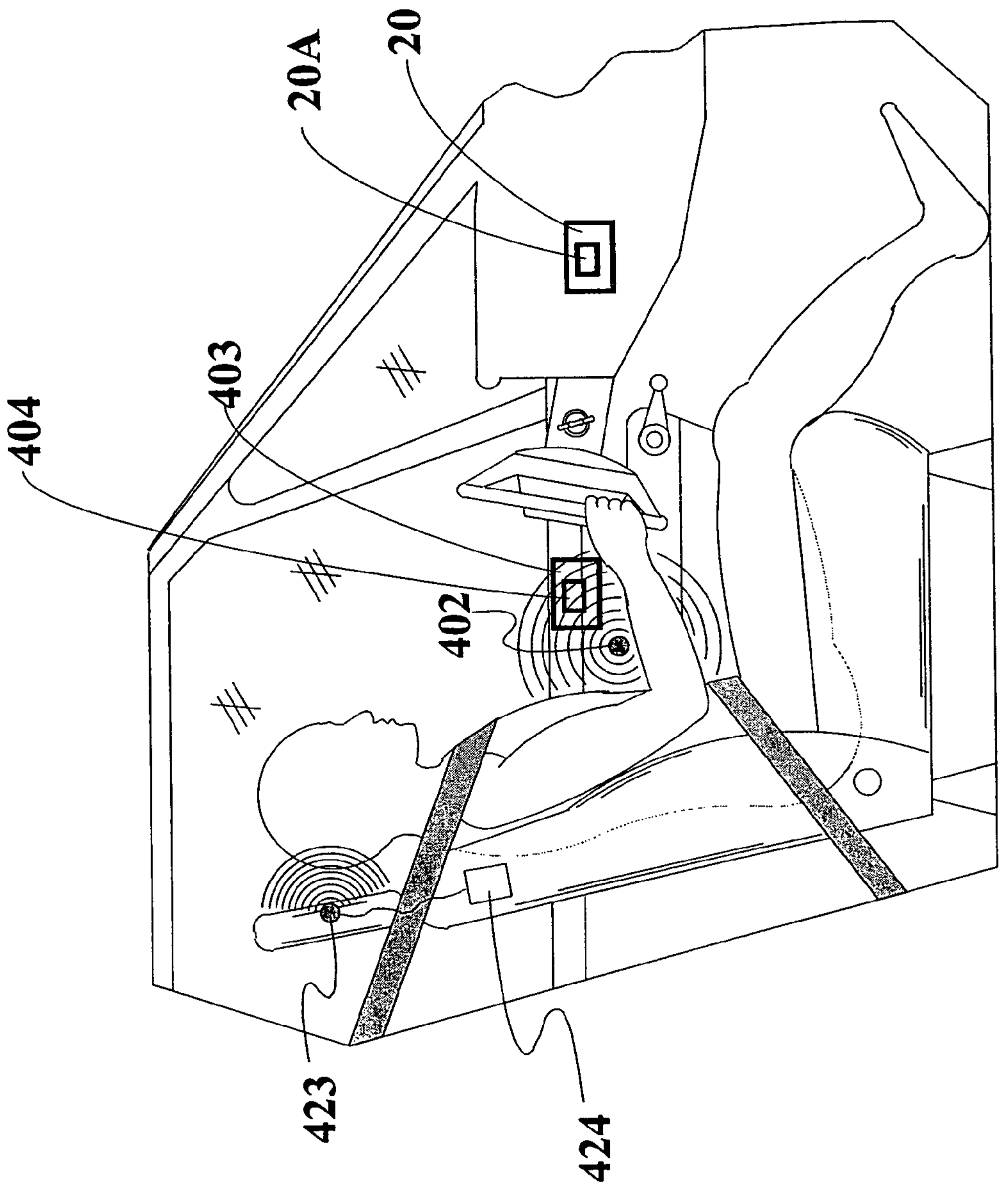
FIG. 68 is a side view with parts cutaway and removed of a vehicle showing the passenger compartment containing a driver and a preferred mounting location for an occupant position sensor for use in side impacts and also of a rear of occupant's head locator for use with a headrest adjustment system to reduce whiplash injuries in rear impact crashes.

Side impact airbags are now used on some vehicles. Some are quite small compared to driver or passenger airbags used for frontal impact protection. Nevertheless, a small child could be injured if he is sleeping with his head against the airbag module when the airbag deploys and a vehicle interior monitoring system is needed to prevent such a deployment. In FIG. 68, a single ultrasonic transducer 420 is shown mounted in a door adjacent airbag system 403 which houses an airbag 404. This sensor has the particular task of monitoring the space adjacent to the door-mounted airbag. Sensor 402 may also be coupled to control circuitry 20 which can process and use the information provided by sensor 402 in the determination of the location or identity of the occupant or location of a part of the occupant.

Similar to the embodiment in FIG. 4 with reference to U.S. Pat. No. 5,653,462, the airbag system 403 and components of the interior monitoring system, e.g., transducer 402, can also be coupled to a processor 20 including a control circuit 20A for controlling deployment of the airbag 404 based on information obtained by the transducer 402. This device does not have to be used to identify the object that is adjacent the airbag but it can be used to merely measure the position of the object. It can also be used to determine the presence of the object, i.e., the received waves are indicative of the presence or absence of an occupant as well as the position of the occupant or a part thereof. Instead of an ultrasonic transducer, another wave-receiving transducer may be used as described in any of the other embodiments herein, either solely for performing a wave-receiving function or for performing both a wave-receiving function and a wave-transmitting function.

Figure 69:
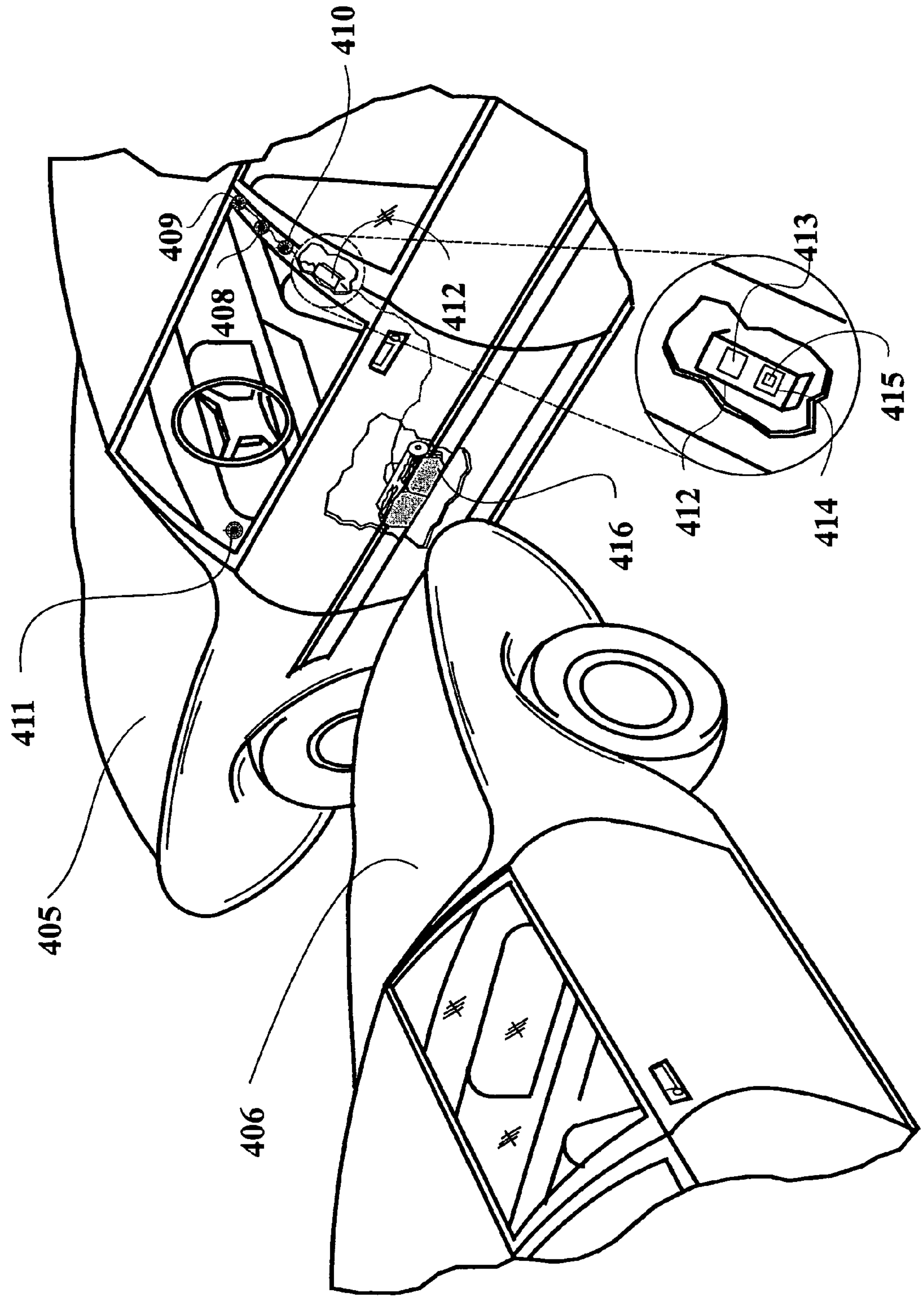
FIG. 69 is a perspective view of a vehicle about to impact the side of another vehicle showing the location of the various parts of the anticipatory sensor system of at least one of the inventions disclosed herein.

FIG. 69 is an angular perspective overhead view of a vehicle 405 about to be impacted in the side by an approaching vehicle 406, where vehicle 405 is equipped with an anticipatory sensor system showing a transmitter 408 transmitting electromagnetic, such as infrared, waves toward vehicle 406. This is one example of many of the uses of the instant invention for exterior monitoring. The transmitter 408 is connected to an electronic module 412. Module 412 contains circuitry 413 to drive transmitter 408 and circuitry 414 to process the returned signals from receivers 409 and 410 which are also coupled to module 412. Circuitry 414 contains a processor such as a neural computer 415 or microprocessor with a pattern recognition algorithm, which performs the pattern recognition determination based on signals from receivers 409 and 410. Receivers 409 and 410 are mounted onto the B-Pillar of the vehicle and are covered with a protective transparent cover. An alternate mounting location is shown as 411 which is in the door window trim panel where the rear view mirror (not shown) is frequently attached. One additional advantage of this system is the ability of infrared to penetrate fog and snow better than visible light which makes this technology particularly applicable for blind spot detection and anticipatory sensing applications. Although it is well known that infrared can be significantly attenuated by both fog and snow, it is less so than visual light depending on the frequency chosen. (See for example L. A. Klein, *Millimeter-Wave and Infrared Multisensor Design and Signal Processing*, Artech House, Inc, Boston 1997, ISBN 0-89006-764-3).

14.4 Children and Animals Left Alone

The various occupant sensing systems described herein can be used to determine if a child or animal has been left alone in a vehicle and the temperature is increasing or decreasing to where the child's or animal's health is at risk. When such a condition is discovered, the owner or an authority can be summoned for help or, alternately, the vehicle engine can be started and the vehicle warmed or cooled as needed. See section 9.4.

14.5 Vehicle Theft

If a vehicle is stolen then several options are available when the occupant sensing system is installed. Upon command by the owner over a telematics system, a picture of the vehicles interior can be taken and transmitted to the owner. Alternately a continuous flow of pictures can be sent over the telematics system along with the location of the vehicle if a GPS system is available or from the cell phone otherwise to help the owner or authorities determine where the vehicle is.

14.6 Security, Intruder Protection

If the owner has parked the vehicle and is returning, and an intruder has entered and is hiding, that fact can be made known to the owner before he or she opens the vehicle door. This can be accomplished thought a wireless transmission to any of a number of devices that have been programmed for that function such as vehicle remote key fob, cell phones, PDAs etc.

14.7 Entertainment System Control

It is well known among acoustics engineers that the quality of sound coming from an entertainment system can be substantially affected by the characteristics and contents of the space in which it operates and the surfaces surrounding that space. When an engineer is designing a system for an automobile he or she has a great deal of knowledge about that space and of the vehicle surfaces surrounding it. He or she has little knowledge of how many occupants are likely to be in the vehicle on a particular day, however, and therefore the system is a compromise. If the system knew the number and position of the vehicle occupants, and maybe even their size, then adjustments could be made in the system output and the sound quality improved. FIG. 8A, therefore, illustrates schematically the interface between the vehicle interior monitoring system of at least one of the inventions disclosed herein, i.e., transducers 49-52 and 54 and processor 20 which operate as set forth above, and the vehicle entertainment system 99. The particular design of the entertainment system that uses the information provided by the monitoring system can be determined by those skilled in the appropriate art. Perhaps in combination with this system, the quality of the sound system can be measured by the audio system itself either by using the speakers as receiving units also or through the use of special microphones. The quality of the sound can then be adjusted according to the vehicle occupancy and the reflectivity, or absorbtivity, of the vehicle occupants. If, for example, certain frequencies are being reflected, or absorbed, more that others, the audio amplifier can be adjusted to amplify those frequencies to a lesser, or greater, amount than others.

The acoustic frequencies that are practical to use for acoustic imaging in the systems are between 40 to 160 kilohertz (kHz). The wavelength of a 50 kHz acoustic wave is about 0.6 cm which is too coarse to determine the fine features of a person's face, for example. It is well understood by those skilled in the art that features which are smaller than the wavelength of the illuminating radiation cannot be distinguished. Similarly the wave length of common radar systems varies from about 0.9 cm (for 33,000 MHz K band) to 133 cm (for 225 MHz P band) which is also too coarse for person identification systems. In FIG. 4, therefore, the ultrasonic transducers of the previous designs are replaced by laser transducers 8 and 9 which are connected to a microprocessor 20. In all other manners, the system operates similarly. The design of the electronic circuits for this laser system is described in some detail in the U.S. Pat. No. 5,653,462 referenced above and in particular FIG. 8 thereof and the corresponding description. In this case, a pattern recognition system such as a neural network system is employed and uses the demodulated signals from the receptors 8 and 9. The output of processor 20 of the monitoring system is shown connected schematically to a general interface 36 which can be the vehicle ignition enabling system; the entertainment system; the seat, mirror, suspension or other adjustment systems; or any other appropriate vehicle system.

Recent developments in the field of directing sound using hyper-sound (also referred to as hypersonic sound) now make it possible to accurately direct sound to the vicinity of the ears of an occupant so that only that occupant can hear the sound. The system of at least one of the inventions disclosed herein can thus be used to find the proximate direction of the ears of the occupant for this purpose.

Hypersonic sound is described in detail in U.S. Pat. No. 5,885,129 (Norris), U.S. Pat. No. 5,889,870 (Norris) and U.S. Pat. No. (Raida et al.) and International Publication No. WO 00/18031. By practicing the techniques described in these patents and the publication, in some cases coupled with a mechanical or acoustical steering mechanism, sound can be directed to the location of the ears of a particular vehicle occupant in such a manner that the other occupants can barely hear the sound, if at all. This is particularly the case when the vehicle is operating at high speeds on the highway and a high level of "white" noise is present. In this manner, one occupant can be listening to the news while another is listening to an opera, for example. Naturally, white noise can also be added to the vehicle and generated by the hypersonic sound system if necessary when the vehicle is stopped or traveling in heavy traffic. Thus, several occupants of a vehicle can listen to different programming without the other occupants hearing that programming. This can be accomplished using hypersonic sound without requiring earphones.

In principle, hypersonic sound utilizes the emission of inaudible ultrasonic frequencies that mix in air and result in the generation of new audio frequencies. A hypersonic sound system is a highly efficient converter of electrical energy to acoustical energy. Sound is created in air at any desired point that provides flexibility and allows manipulation of the perceived location of the source of the sound. Speaker enclosures are thus rendered dispensable. The dispersion of the mixing area of the ultrasonic frequencies and thus the area in which the new audio frequencies are audible can be controlled to provide a very narrow or wide area as desired.

The audio mixing area generated by each set of two ultrasonic frequency generators in accordance with the invention could thus be directly in front of the ultrasonic frequency generators in which case the audio frequencies would travel from the mixing area in a narrow straight beam or cone to the occupant. Also, the mixing area can include only a single ear of an occupant (another mixing area being formed by ultrasonic frequencies generated by a set of two other ultrasonic frequency generators at the location of the other ear of the occupant with presumably but not definitely the same new audio frequencies) or be large enough to encompass the head and both ears of the occupant. If so desired, the mixing area could even be controlled to encompass the determined location of the ears of multiple occupants, e.g., occupants seated one behind the other or one next to another.

Vehicle entertainment system 99 may include means for generating and transmitting sound waves at the ears of the occupants, the position of which are detected by transducers 49-52 and 54 and processor 20, as well as means for detecting the presence and direction of unwanted noise. In this manner, appropriate sound waves can be generated and transmitted to the occupant to cancel the unwanted noise and thereby optimize the comfort of the occupant, i.e., the reception of the desired sound from the entertainment system 99.

More particularly, the entertainment system 99 includes sound generating components such as speakers, the output of which can be controlled to enable particular occupants to each listen to a specific musical selection. As such, each occupant can listen to different music, or multiple occupants can listen to the same music while other occupant(s) listen to different music. Control of the speakers to direct sound waves at a particular occupant, i.e., at the ears of the particular occupant located in any of the ways discussed herein, can be enabled by any known manner in the art, for example, speakers having an adjustable position and/or orientation or speakers producing directable sound waves. In this manner, once the occupants are located, the speakers are controlled to direct the sound waves at the occupant, or even more specifically, at the head or ears of the occupants.

Figure 70:
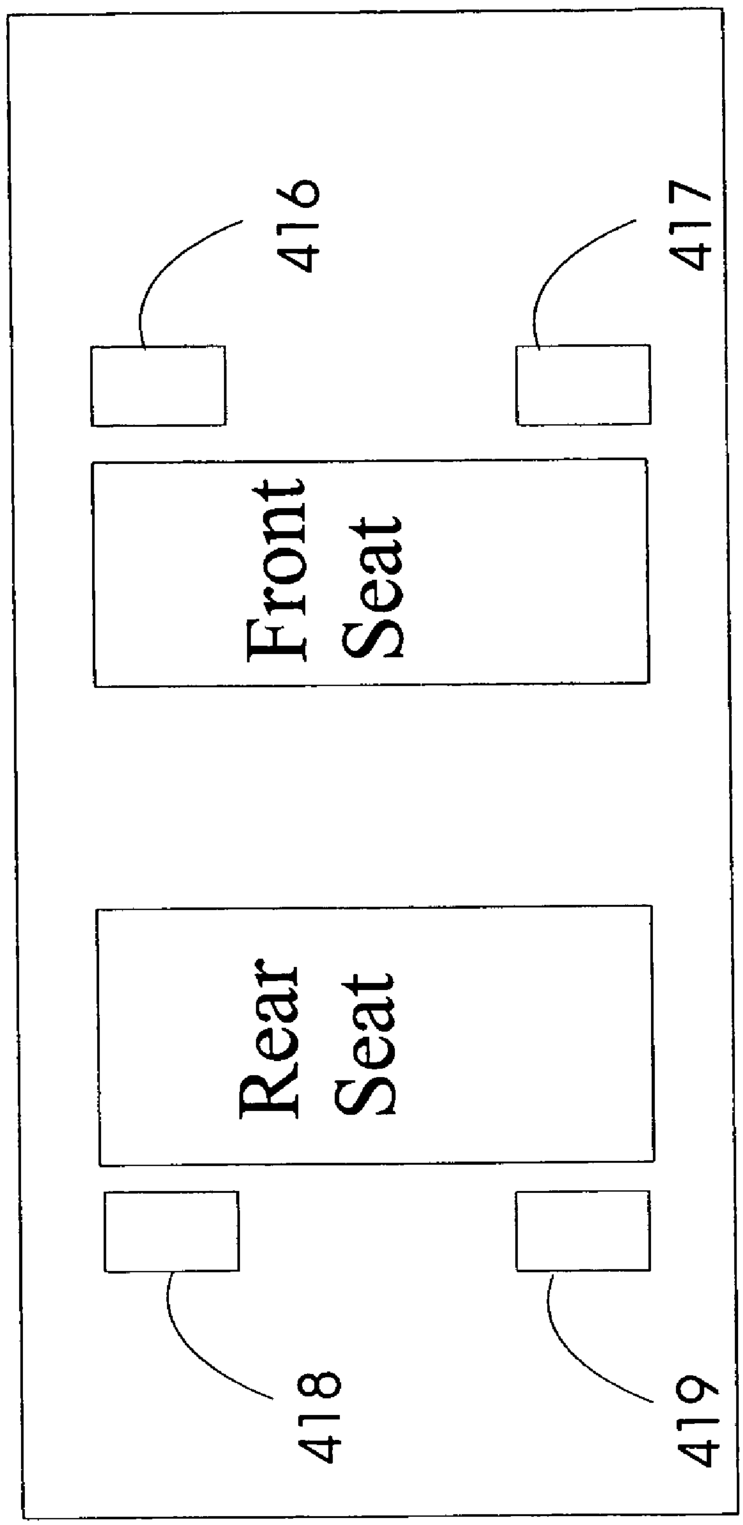
FIG. 70 is a side view with parts cutaway and removed showing schematically the interface between the vehicle interior monitoring system of at least one of the inventions disclosed herein and the vehicle entertainment system.

FIG. 70 shows a schematic of a vehicle with four sound generating units 416-420 forming part of the entertainment system 99 of the vehicle which is coupled to the processor 20. Sound generating unit 416 is located to provide sound to the driver. Sound generating unit 417 is located to provide sound for the front-seated passenger. Sound generating unit 418 is located to provide sound for the passenger in the rear seat behind the driver and sound generating unit 419 is located to provide sound for the passenger in the rear seat behind the front-seated passenger. A single sound generating unit could be used to provide sound for multiple locations or multiple sound generating units could be used to provide sound for a single location. Naturally, as in the cases above, each of the sound generating units 416-420, in addition to being sending transducers can be receivers also. In this case, microphones can be used, as discussed above, to permit communication from any seat to any other seat in a manner similar to recently issued patent U.S. Pat. No. 6,363,156.

Sound generating units 416-420 operate independently and are activated independently so that, for example when the rear seat is empty, sound generating units 418-419 may not be not operated. This constitutes control of the entertainment system based on, for example, the presence, number and position of the occupants. Further, each sound generating unit 416-419 can generate different sounds so as to customize the audio reception for each occupant.

Each of the sound generating units 416-419 may be constructed to utilize hypersonic sound to enable specific, desired sounds to be directed to each occupant independent of sound directed to another occupant. The construction of sound generating units utilizing hypersonic sound is described in, for example, U.S. Pat. Nos. 5,885,129, 5,889,870 and 6,016,351 mentioned above. In general, in hypersonic sound, ultrasonic waves are generated by a pair of ultrasonic frequency generators and mix after generation to create new audio frequencies. By appropriate positioning, orientation and/or control of the ultrasonic frequency generators, the new audio frequencies will be created in an area encompassing the head of the occupant intended to receive the new audio frequencies. Control of the sound generating units 416-419 is accomplished automatically upon a determination by the monitoring system of at least the position of any occupants.

Furthermore, multiple sound generating units or speakers, and microphones, can be provided for each sitting position and these sound generating units or speakers independently activated so that only those sound generating units or speakers which provide sound waves at the determined position of the ears of the occupant will be activated. In this case, there could be four speakers associated with each seat and only two speakers would be activated for, e.g., a small person whose ears are determined to be below the upper edge of the seat, whereas the other two would be activated for a large person whose ears are determined to be above the upper edge of the seat. All four could be activated for a medium size person. This type of control, i.e., control over which of a plurality of speakers are activated, would likely be most advantageous when the output direction of the speakers is fixed in position and provide sound waves only for a predetermined region of the passenger compartment.

When the entertainment system comprises speakers which generate actual audio frequencies, the speakers can be controlled to provide different outputs for the speakers based on the occupancy of the seats. For example, using the identification methods disclosed herein, the identity of the occupants can be determined in association with each seating position and, by enabling such occupants to store music preferences, for example a radio station, the speakers associated with each seating position can be controlled to provide music from the respective radio station. The speakers could also be automatically directed or orientable so that at least one speaker directs sound toward each occupant present in the vehicle. Speakers that cannot direct sound to an occupant would not be activated.

Thus, one of the more remarkable advantages of the improved audio reception system and method disclosed herein is that by monitoring the position of the occupants, the entertainment system can be controlled without manual input to optimize audio reception by the occupants. Noise cancellation is now possible for each occupant independently Many automobile accidents are now being caused by driver's holding onto and talking into cellular phones. Vehicle noise significantly deteriorates the quality of the sound heard by the driver from speakers. This problem can be solved through the use of hypersound and by knowing the location of the ears of the driver. Hypersound permits the precise focusing of sound waves along a line from the speaker with little divergence of the sound field. Thus, if the locations of the ears of the driver are known, the sound can be projected to them directly thereby overcoming much of the vehicle noise. In addition to the use of hypersound, directional microphones are known in the microphone art which are very sensitive to sound coming from a particular direction. If the driver has been positioned so that his eyes are in the eye ellipse, then the location of the driver's mouth is also accurately known and a fixed position directional microphone can be used to selectively sense sound emanating from the mouth of the driver. In many cases, the sensitivity of the microphone can be designed to include a large enough area such that most motions of the driver's head can be tolerated. Alternately the direction of the microphone can be adjusted using motors or the like. Systems of noise cancellation now also become possible if the ear locations are precisely known and noise canceling microphones as described in U.S. patent application Ser. No. 09/645,709 if the location of the driver's mouth is known. Although the driver is specifically mentioned here, the same principles can apply to the other seating positions in the vehicle.

Most vehicle occupants have noticed from time to time that the passenger compartment is particularly sensitive to certain frequencies and they appear to be unreasonably loud. In one aspect of the inventions disclosed herein, this problem can be eliminated by determining the acoustic spectral characteristics of the interior of a passenger compartment for a particular occupancy. This can be done by broadcasting into the compartment a series of notes or tones (perhaps the whole scale) and measuring the response and doing this periodically since the acoustic characteristics of the compartment will change with occupancy. Once the response is known, perhaps on a speaker by speaker basis, then the notes emitted by the speaker can be adjusted in volume so that all sounds have uniform response. This can be further improved since, for example, as the ambient noise level increases, the soft notes are lost. They could then be selectively amplified allowing a listener to hear an entire opera, for example, although at reduces dynamic range.

A flow chart showing describing this method could include the following steps:

1. broadcasting into the compartment a series of notes (perhaps the whole scale)
2. measuring the response
3. modify the notes emitted by the speaker so that all sounds have uniform response.

14.8 HVAC

Considering again FIG. 2A. In normal use (other than after a crash), the system determines whether any human occupants are present, i.e., adults or children, and the location determining means 152 determines the occupant's location. The processor 152 receives signals representative of the presence of occupants and their location and determines whether the vehicular system, component or subsystem 155 can be modified to optimize its operation for the specific arrangement of occupants. For example, if the processor 153 determines that only the front seats in the vehicle are occupied, it could control the heating system to provide heat only through vents situated to provide heat for the front-seated occupants.

Thus, the control of the heating, ventilating, and air conditioning (HVAC) system can also be a part of the monitoring system although alone it would probably not justify the implementation of an interior monitoring system at least until the time comes when electronic heating and cooling systems replace the conventional systems now used. Nevertheless, if the monitoring system is present, it can be used to control the HVAC for a small increment in cost. The advantage of such a system is that since most vehicles contain only a single occupant, there is no need to direct heat or air conditioning to unoccupied seats. This permits the most rapid heating or cooling for the driver when the vehicle is first started and he or she is alone without heating or cooling unoccupied seats. Since the HVAC system does consume energy, an energy saving also results by only heating and cooling the driver when he or she is alone, which is about 70% of the time.

Figure 71:
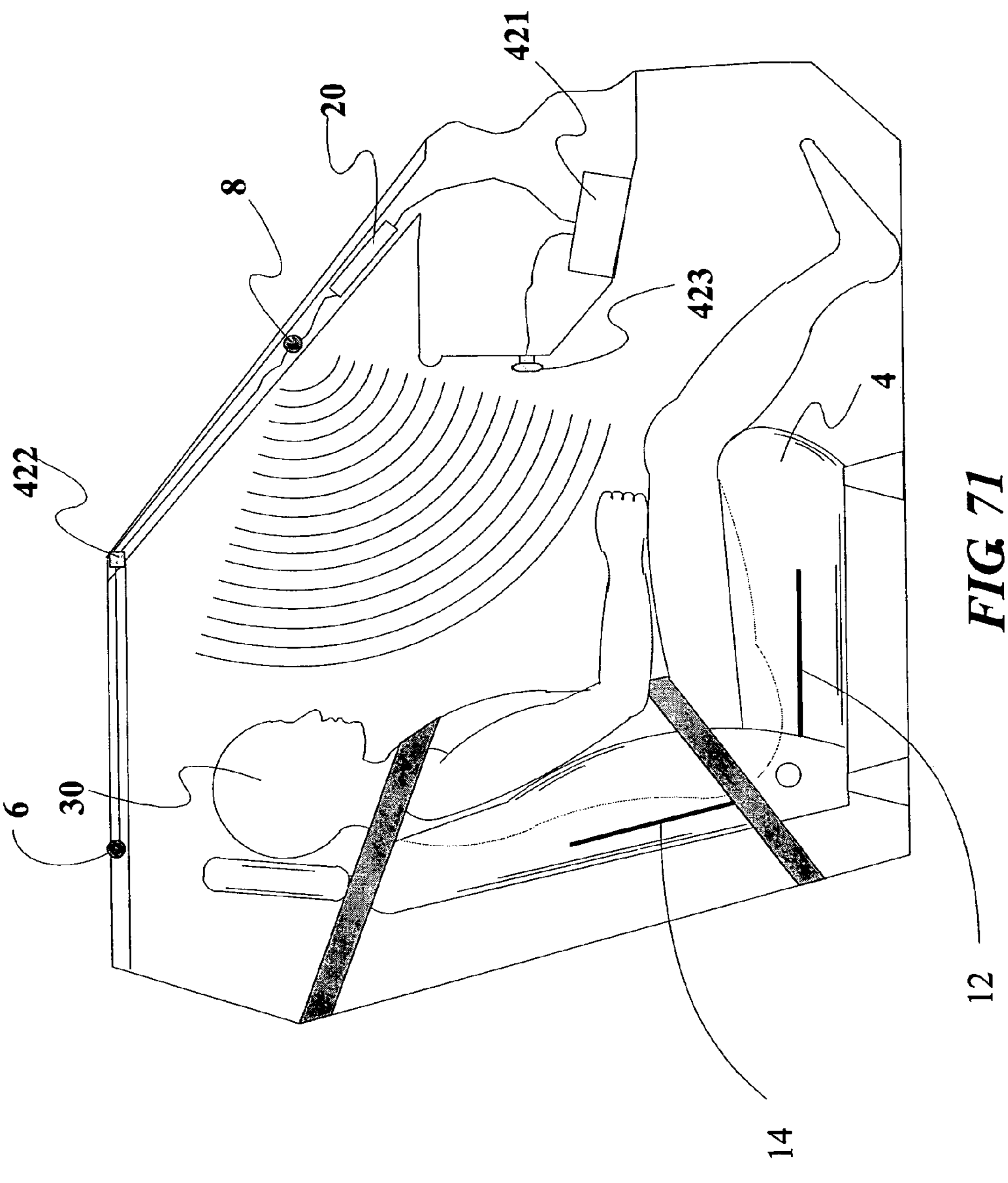
FIG. 71 is a side view with parts cutaway and removed showing schematically the interface between the vehicle interior monitoring system of at least one of the inventions disclosed herein and the vehicle heating and air conditioning system and including an antenna field sensor.

FIG. 71 shows a side view of a vehicle passenger compartment showing schematically an interface 421 between the vehicle interior monitoring system of at least one of the inventions disclosed herein and the vehicle heating and air conditioning system. In addition to the transducers 6 and 8, which at least in this embodiment are preferably acoustic transducers, an infrared sensor 422 is also shown mounted in the A-pillar and is constructed and operated to monitor the temperature of the occupant. The output from each of the transducers is fed into processor 20 that is in turn connected to interface 421. In this manner, the HVAC control is based on the occupant's temperature rather than that of the ambient air in the vehicle, as well as the determined presence of the occupant via transducers 6 and 8 as described above. This also permits each vehicle occupant to be independently monitored and the HVAC system to be adjusted for each occupant either based on a set temperature for all occupants or, alternately, each occupant could be permitted to set his or her own preferred temperature through adjusting a control knob shown schematically as 423 in FIG. 71.

Since the monitoring system is already installed in the vehicle with its associated electronics including processor 20, the infrared sensor can be added with little additional cost and can share the processing unit. The infrared sensor can be a single pixel device as in the Corrado patents discussed above or an infrared imager. In the former case the temperature being measured may be that of a cup pf coffee or other articles rather then the occupant. It will also tend to be an average temperature that may take into account a heated seat. Thus much more accurate results can be obtained using an infrared imager and a pattern recognition algorithm to find the occupant before the temperature is determined. Not only can this system be used for directing hot and cold air, but developments in the field of directing sound using hyper-sound (also referred to as hypersonic sound herein) now makes it possible to accurately direct sound to the vicinity of the ears of an occupant so that only that occupant can hear the sound. The system of at least one of the inventions disclosed herein can thus be used to find the proximate direction of the ears of the occupant for this purpose. Additional discussion of this aspect is set forth above.

14.9 Obstruction Sensing

To the extent that occupant monitoring transducers can locate and track parts of an occupant, this system can also be used to prevent arms, hands, fingers or heads from becoming trapped in a closing window or door. Although specific designs have been presented above for window and door anti-trap solutions, if there are several imagers in the vehicle these same imagers can monitor the various vehicle openings such as the windows, sunroof, doors, trunk lid, hatchback door etc. In some cases the system can be aided through the use of special lighting designs that either cover only the opening or comprise structured light so that the distance to a reflecting surface in or near to an opening can be determined.

A fundamental difference between at least one of the inventions disclosed herein and the monitoring system described in Chapdelaine et al. (U.S. Pat. No. 6,157,024) is that the instant invention is not primarily concerned with the reflectivity of the surface which the infrared LED, for example, illuminates. Rather, in at least one invention herein, the reflections from the surface can be used to measure distance using a phase change in the modulated electromagnetic waves and thus, there is little concern with reflectivity of these surfaces as long as there are some reflected electromagnetic waves. This makes at least one of the inventions disclosed herein significantly improved over the system described in Chapdelaine et al.

For example, one advantage of at least one of the inventions disclosed herein over the system of Chapdelaine et al. is that calibration based on reflectivity is not required, as it is in the system of Chapdelaine et al. A calibration based on phase is required when the system is first installed in a vehicle or in an early sample of a particular vehicle model.

A fundamental concept of at least one of the inventions disclosed herein is therefore to determine the distance to a reflective object that is reflecting infrared rays to the receptor based on relative phase. This is accomplished by modulating the illuminating electromagnetic waves and measuring the phase of the reflected electromagnetic waves compared to the illuminating electromagnetic waves. Naturally, since some parts of the window edge are closer than other parts, it is necessary to divide the window edge up into a number of parts. This can be accomplished in a variety of ways. A preferred method is to use a linear CMOS array as the receptor. This array may be composed of as many as 1000 to 4000 pixels that are arranged in a single line. It is therefore a one-dimensional camera.

The electromagnetic waves from the LED or laser diode, in a preferred implementation, are distributed into a line which illuminates those sections of FIG. 170. A lens receives the reflected electromagnetic waves from the illuminated window frame, for example, and since the electromagnetic waves have been modulated with a frequency having a wavelength of something like two feet, the distance to the reflected surface on a pixel-by-pixel basis for each pixel can be determined. This can be done by any manner known to one skilled in the art. Usually, a processor is employed with an appropriate measurement ability or unit to calculate the distance between the electromagnetic wave emitter/receptor and the obstacle based on the time between the transmission and reception of the electromagnetic waves. Since a phase change can also be determined when the installation is made, which will serve as the reference phase change, if any object penetrates the plane of electromagnetic waves created by the focused LED or laser diode, one or more pixels will register a change in phase (which would be different than the reference phase change) and therefore a change in distance to the reflecting object. This then determines that there is an object in the window space and therefore the automatic window closure system must be suppressed. In the alternative, the system does not have to be associated with an automatic window closure system but could simply be associated with a system which detects the presence of objects in the aperture. The system could thus notify a driver via a display, alarm or other similar device when a passenger sticks his or her hand, head or foot out of the window.

There is a tradeoff between the wavelength and the microprocessor accuracy. A phase difference between two signals can be measured to at least one part in 1000. Thus, the distance measurement capability of a modulated wavelength of two feet provides is 0.002 feet or 0.024 inches. This is easily accomplished and is greater accuracy than required by government specifications. This also requires a 16-bit processor. An 8-bit processor can measure approximately 0.1 inches for a two-foot wavelength or 0.05 inches for a 1-foot wavelength. However, to achieve a one-foot wavelength, more sophisticated modulation electronics are required, thus the tradeoff. It is easier to create longer wavelengths but that requires higher precision processors to determine phase differences.

If a thousand pixel CMOS array is used and if the illuminated pinch area of the window is two feet long, then each pixel, through an appropriately designed lens or mirror, will measure a length of the illuminated window edge of about 0.024 inches. This is sufficient to easily detect a 3 mm diameter rod, the requirement of the federal standard.

The preferred system described above uses an infrared LED (light emitting diode) with appropriate optics to create a line of electromagnetic, preferably infrared, waves which illuminates the window frame just inside of the window glass. It is thus not interfered with by the position of the glass in the window. An alternate system is to use the LED or a laser in a scanning mode in which case the 1000 pixel linear CMOS array can be replaced by a single photo diode. Again, as above, the electromagnetic radiation will be modulated with a wavelength somewhere between about 1 and about 20 feet. The optical receptor is simplified by this alternate design at the expense of requiring a scanning system to be used in conjunction with the LED or laser infrared electromagnetic wave source.

An alternate approach is to use multiple LEDs and to excite an array of such illumination sources sequentially and/or by some other known pattern. To achieve the same resolution as can be achieved with a 1000 pixel CMOS array, however, would require an array of electromagnetic wave sources of comparable magnitude.

The system can also be used to monitor vehicle sliding doors. In this case, the electromagnetic wave source and a receiver array are placed just inside door and it monitors closure of the sliding door by creating a plane of electromagnetic wave in the area just inside the sliding door. The technique used is the same. Any object that penetrates the plane of electromagnetic waves will create a return that is closer to the CMOS (or equivalent) linear array than expected, that is, the phase difference will be less than expected. This event can cause the motion of the sliding door to stop.

If someone outside of vehicle carefully positions his or her fingers in the path of the sliding door, then the system described above will not respond. Thus, the system will only properly respond to an obstruction that comes from inside the vehicle. If an obstruction from outside the vehicle is also required to be sensed, then a separate unit, perhaps a capacitive sensor or a beam linearly covering the last few inches of door travel but from outside of the vehicle, can be used. The key point is that this system measures the distance from a reflected electromagnetic wave source to a pixel and if that distance sensed is different than expected then the system will stop moving the door toward the closed position.

Up until now, we have only considered a flat plane of electromagnetic waves. The shape of the sealing area of a typical trunk is not the border of a plane. Instead, it follows a torturous path. The system of at least one of the inventions disclosed herein with some significant enhancements can also solve the trunk lid closure problem.

In this case, the sealing areas of the trunk must be illuminated with the infrared radiation. Since the line that needs to be illuminated is a torturous path and does not lie in plane, the electromagnetic waves used to illuminate the pinch area as well as the system that receives the reflected electromagnetic waves must be capable of dealing with this geometry. One method is to use a mirror for both projecting the electromagnetic waves to the pinch area and receiving reflected electromagnetic waves and projecting it onto a linear CMOS array. Although it is theoretically possible to accomplish this using lenses, the design of such lenses is more complicated and their manufacture could likewise be a problem. If a mirror is used, on the other hand, this problem becomes significantly less. The mirror would thus have a complex shape as it reflects the LED electromagnetic waves around the edges of the trunk and receives the reflected electromagnetic waves and straightens them into a straight line for illuminating the CMOS one-dimensional camera.

An alternate but more complicated approach is to use a two-dimensional camera and pattern recognition algorithm such as a neural network to track the motion of the trunk lid. A further alternate is to use a two dimensional scanning system that is controlled to follow the contour of the trunk lid aperture.

Thus, as shown in FIG. 167, the aperture monitoring system 780 in accordance with the invention includes a wave emitter 781, e.g., an electromagnetic wave emitter, a receiver 783 which receives waves reflected by an edge of a frame defining an aperture 782 when no obstruction is present or from an obstruction in the aperture when present, and a phase change measurement system 784. The emitter 781 includes appropriate components to modulate the waves, which are typically sine waves and referred to as a sine wave modulated carrier waves. Operation of the emitter 781 can be dependent on the satisfaction of a condition such as the presence of an object in the vehicle, proximate the vehicle, proximate the aperture, in the seat alongside the aperture, or the operation of the window or door etc.

The phase change measurement system 784 measures a phase change, or the phase of the modulation, between the modulated waves and the reflected waves. In an initialization step, the phase change is measured in the absence of an obstruction over the aperture. This phase change measurement can be stored in a memory unit associated with or part of the phase change measurement system 784. In some cases where the variation from vehicle to vehicle is small, the initialization step can be done on any example of a vehicle model and then used for all other particular vehicles belonging to that model.

In operation, the emitter 781 continuously or periodically emits waves over the aperture 782, again in possible dependence on satisfaction of a condition which would indicate the possibility of an obstruction in the aperture or operation of the door or window etc. The receiver 783 receives a reflection of waves and enables the phase change measurement system 784 to determine the phase change between the emitted modulated waves and the received waves. This phase change is compared to the stored phase change in order to determine whether the aperture 782 is obstructed. If so, appropriate action can be taken, such as halting closure of the window.

An important advantage of the use of the same measuring system for obtaining both the reference phase change and the operative phase change is that the measurements are equally affected by changes in the environment of the measuring means. For example, if the effectiveness of the measuring means has deteriorated over time, both the reference phase change and operative phase change will be measured by the measuring in the deteriorated state so that an accurate comparison of the phase changes can be made. The reference phase change thus does not become stale.

FIG. 168 shows a flow chart of the method for monitoring an aperture in accordance with the invention wherein in step 785, waves are directed over an unobstructed aperture. The reflected waves are received by a receiver 786, which may be located together with the emitter from which the waves are emitted. A phase change between the modulated waves and the received waves is measured at 787 and stored at 788 as a reference phase change for future use, i.e., during operation of the method, e.g., when installed in a vehicle. The measured phase change can vary along the aperture, in which case, the reference phase change may be a reference phase change expressed as a function of the distance along the side of the frame defining the aperture.

Thereafter, in operation, modulated waves are continuously or periodically directed over the aperture at 789 and received by a receiver 790. The phase change between the modulated waves and the received waves is measured or determined at 791 and then compared with the reference phase change (or reference phase change function) at 792. If there is a difference between the reference phase change and the operationally-measured phase, an indication of the detection of an obstacle or obstruction is provided at 393. This may take the form of a warning light, a warning alarm, cessation of an activity such as closure of the aperture, etc.

FIG. 169 shows another embodiment of the invention including a detector, comprising a receiver and a controller. The detector may be an optical detector, an infrared detector, an ultrasound detector, or similar devices. The receiver may be either integral with or in communication with the controller. The receiver output is indicative of the strength of the received, reflected radiation. For example, the receiver may produce plural pulses having durations related to the intensity of the energy received by the detector. The detector may then deliver a detection signal when the duration of one pulse exceeds a predetermined value, referred to as a threshold.

Alternatively, the detector may produce the detection signal when the duration of each of a predetermined number of consecutive pulses exceeds the threshold.

The threshold may be related to the duration of a pulse when no obstruction is present or the average duration of pulses produced when no obstruction is present and a closure such as a window or door moves from an open position to a closed position. The threshold may include a correction factor that accounts for variations in the duration of pulses produced when no obstruction is present, and may vary based upon the position of the closure. The threshold, or some other value indicative of an obstruction-free opening, may be stored during an initialization procedure.

The initialization procedure may be performed once and for all on any sample of a vehicle model, when the vehicle is manufactured and/or at every time when the vehicle is occupied or when the seat adjacent the aperture is occupied. Thus, a seat or vehicle presence determination unit can be provide in the vehicle and used as a trigger to initiate the initialization procedure. As such, the initialization procedure is performed when the vehicle is occupied and/or when the seat adjacent the aperture is occupied. Alternately, the initialization procedure can take place once or from time to time when the seat is known to be unoccupied and thus there cannot be an obstruction in the aperture.

The threshold may be a single value, whereby an alarm condition is recognized if a pulse duration value is either above or below the threshold, depending upon the embodiment. Alternatively, the threshold may be defined by a range of acceptable values, whereby an alarm condition is recognized if the pulse duration value is only above this range, only below this range, or either above or below the range.

Alternatively, the detector may provide some other output signal representative of the received radiation strength, such as an analog signal whose voltage varies with the level of the received radiation.

The detector and emitter may be contained in an integral unit, which may be a compact unit in which the detector and the emitter share a common lens. The emitter may include a light emitting diode or a laser device.

Automatic closing or opening of the closure within the aperture may be initiated by a rain sensor, a temperature sensor, a motion sensor, a light sensor, or by manual activation of a switch. Thus, a system in accordance with the invention may be provided with a signal commanding the opening or closing of an aperture, this signal coming from one of many possible sources. However, the system provides the same function, regardless of the source of the control command.

In a preferred embodiment, the monitoring system is activated after receipt of this commanding signal and before operation of the powered closure, though it can also be utilized to determine aperture environment status at any other time. While the present invention is directed towards the detection of an obstacle within an aperture about to be closed, it may also be utilized to detect conditions proximate a closed aperture prior to initiating the opening of the aperture. For instance, in a system which is adapted for monitoring the environment adjacent an automatic sliding door, it may be useful to inhibit automatic opening of the door if the monitoring system detects the presence of an object lying against the inside surface of the door. It may be preferable to provide an override feature to a door control system such that a warning from a monitoring system may be overridden.

An aperture monitoring system is illustrated in FIG. 170, in the form of a vehicle window monitoring system. This system includes a front emitter/receiver unit 797 disposed in a front door 795 and positioned to produce an energy curtain 798 in a region to be traversed by a front window. Also provided is a rear emitter/receiver unit 797A in a rear door 795A, positioned to produce a second energy curtain 798A. An opposite side of the vehicle would typically be provided with like monitoring systems for the respective windows.

The emitter/receiver units 797, 797A include emitters that produce the energy curtains 798, 798A and receivers that detect any portion of the respective energy curtain that is reflected back to the emitter/receiver units 797, 797A from the window frame 799, 799A. Depending upon the monitoring system embodiment, an obstacle interjected into the radiation field either increases or decreases this reflected portion of the radiation curtain.

The front emitter/receiver unit 797 is positioned at the lower front corner of the window aperture. This ensures that the energy curtain 798 covers a significant portion of the window aperture, a portion in which an obstruction could be caught between the window and the surrounding window frame. Likewise, the rear emitter/receiver unit 797A is positioned at the lower front corner of the window. This positioning ensures suitable coverage of the aperture by the radiation curtain 798A, and enables convenient installation within a door panel 796, 796A.

In FIG. 171, the two emitter/receiver units 797, 797A are positioned so that horizontal angles $\beta_1$, $\beta_2$ of the energy curtains 798, 798A are roughly centered in the window frame 799, 799A of the door 795, 795A. This ensures that, even if an emitter/receiver unit 797, 797A is misaligned due to vibration, repeated door closure, or other reason, the energy curtains 798, 798A will still be capable of detecting obstructions in the planes defined by the respective windows. Installation concerns arising from aligning discrete emitter and receiver units are also addressed by packaging the emitter and receiver in the same physical package. Common packaging also minimizes the opportunity for misalignment between the emitter and receiver due to environmental vibration or shock. In many implementations, the angles $\beta$ are smaller than illustrated in FIG. 171.

The installations illustrated for the vehicle window embodiments in FIGS. 170 and 171 may be instructive in envisioning installations proximate sunroofs, power doors or other apertures having power or automatic closures. What is required is an emitter/receiver unit positioned relative to the aperture such that a radiation field is capable of being emitted adjacent or within the respective aperture, or both; a predictable radiation return is generated in the absence of a foreign object near or within the aperture.

A controller associated with the emitter/receiver unit operates the aperture monitoring system according to a prescribed series of steps, discussed in greater detail below. Typically, the controller does not activate the monitoring system until the controller has received a close request signal. Automatic close requests can be generated by the controller itself in response to input from various environmental sensors such as a rain sensor or a temperature sensor. An automatic close request can also be generated by a vehicle operator or passenger, and is typically identified by the controller as the activation of a window control switch for more than a certain time period, e.g. 3/10 second. If the close request is an automatic close request, the controller activates the appropriate emitter, then the characteristics of the receiver output pulse are analyzed. In an embodiment where the output pulse width is varied according to the received radiation phase, the presence of an obstruction adjacent or within the aperture is reflected in a variance of the receiver output pulse widths from a predicted norm. Thus, the controller detects obstructions by comparing the output pulse width t to T, an initialization value related to the length of a detection pulse produced by the receiver when an aperture environment is free from obstructions. T is generated in an initialization procedure during installation of the system. The emitter is activated and the detection signal is monitored while the aperture is closed under obstruction-free conditions. T, the average value of the output pulse width while the window is being closed, is determined from the detection signal.

The controller receives inputs from various system sensors, such as a rain sensor, temperature sensor, light sensor and the aperture monitoring system, and provides control signals to window motors, a sunroof motor, or an automatic door motor, depending upon the specific application. The controller can also interface the aperture monitoring system to an alarm unit which may produce audible or visual alarms, and which may prevent vehicle operation. The alarm unit may also transmit an alarm or beacon signal, such as an RF signal at a specified frequency.

Additional details of the use of the controller and aperture monitoring system can be found in U.S. Pat. No. 6,157,024.

It has been assumed above that the transmitted electromagnetic waves are in the form of a modulated carrier frequency and the phases of the transmitted and received waves are compared. Other techniques can also be employed without deviating from the scope of at least one of the inventions disclosed herein including transmitting a single pulse of radiation and measuring the time of flight to the reflection surface and back. Another preferred technique is to pulse modulate either a carrier wave or to send pure pulses of electromagnetic radiation to the reflection surfaces and compare the returned signal with the transmitted signal through a correlation analysis, or other appropriate technique, such as disclosed in various patents on micropower impulse radar and noise radar. See for example, U.S. Pat. Nos. 6,121,915, 5,291,202, 5,719,579, and 5,075,863 for examples of the use of noise radar and U.S. Pat. Nos. 5,774,091, 5,519,400 and 5,589,838 as examples of micropower impulse radar. In many cases pseudo-noise can be used in place of random noise.

The embodiment wherein the time of flight of the radiation pulses is used to determine the presence or absence of an obstacle in an aperture is shown in FIG. 172. In step 800, a pulse of radiation is directed over an unobstructed aperture. A pulse can be directed at multiple times so that a series of pulses is generated. The reflected pulse is received by a receiver 801, which may be located together with the emitter from which the pulse is emitted. The time of flight is measured at 802, i.e., the time span between the emission of the pulse and the reception of the pulse, and stored at 803 as a reference time of flight for future use, i.e., during operation of the method, e.g., when installed in a vehicle. The measured time of flight can vary along the aperture, in which case, the reference time of flight may be a reference time of flight expressed as a function of the distance along the side of the frame defining the aperture.

Thereafter, in operation, pulses are continuously or periodically directed over the aperture at 804 and received by a receiver 804. The time of flight between the emitted pulse and the received pulse is measured or determined at 806 and then compared with the reference time of flight (or reference time of flight function) at 807. If there is a difference between the reference time of flight and the operationally-measured time of flight, an indication of the detection of an obstacle or obstruction is provided at 808. This may take the form of a warning light, a warning alarm, cessation of an activity such as closure of the aperture, etc.

As discussed above, in one embodiment of the invention, a sine wave modulated carrier wave is emitted or transmitted and the phase of the modulation measured. In the alternative, it is contemplated that a square wave or pulse modulation can be used with a code (such as 10011101011000) and as long as the code is unique, the time of flight can be determined by comparing the coded signal that was sent to that which is received and determining the delay. Either individual pulses can be sent or the carrier wave can have its amplitude—or phase-modulated. The returned wave is compared with the sent wave using a technique called correlation. Correlation is a whole field by itself and there are fast correlators (that work on the information sent and received during a chosen interval as a whole) in existence so that you do not have to use a trial and error method. One skilled in the art of correlation would be able to readily select particular types and constructions of correlators for use in the invention.

The embodiment wherein a coded signal is used in combination with correlation is shown as a flow chart in FIG. 173. In step 810, the coded signal is directed over an unobstructed aperture. The reflected wave is received by a receiver 811, which may be located with the emitter from which the coded signal is emitted. The delay is measured at 812 using correlation, i.e., the time span between the emission of the coded signal and the reception of the coded signal, and stored at 813 as a reference delay for future use, i.e., during operation of the method, e.g., when installed in a vehicle. The measured delay can vary along the aperture, in which case, the reference delay may be a reference delay expressed as a function of the distance along the side of the frame defining the aperture.

Thereafter, in operation, coded signals are continuously or periodically directed over the aperture at 814 and received by a receiver 815. The delay between the emitted coded signal and the received coded signal is measured or determined at 816 and then compared with the reference delay (or reference delay function) at 817. If there is a difference between the reference delay and the operationally-measured delay, an indication of the detection of an obstacle or obstruction is provided at 818. This may take the form of a warning light, a warning alarm, cessation of an activity such as closure of the aperture, etc.

14.10 Rear Impacts

Rear impact protection is also discussed elsewhere herein. A rear-of-head detector 423 is illustrated in FIG. 68. This detector 423, which can be one of the types described above, is used to determine the distance from the headrest to the rearmost position of the occupant's head and to therefore control the position of the headrest so that it is properly positioned behind the occupant's head to offer optimum support during a rear impact. Although the headrest of most vehicles is adjustable, it is rare for an occupant to position it properly if at all. Each year there are in excess of 400,000 whiplash injuries in vehicle impacts approximately 90,000 of which are from rear impacts (source: National Highway Traffic Safety Admin.). A properly positioned headrest could substantially reduce the frequency of such injuries, which can be accomplished by the head detector of at least one of the inventions disclosed herein. The head detector 423 is shown connected schematically to the headrest control mechanism and circuitry 424. This mechanism is capable of moving the headrest up and down and, in some cases, rotating it fore and aft.

Referring now to FIGS. 119-129B, FIG. 119 is perspective view with portions cut away of a motor vehicle, shown generally at 1, having two movable headrests 356 and 359 and an occupant 30 sitting on the seat with the headrest 356 adjacent a head 33 of the occupant to provide protection in rear impacts.

In FIG. 120, a perspective view of the rear portion of the vehicle shown in FIG. 119 is shown with a rear impact crash anticipatory sensor, comprising a transmitter 440 and two receivers 441 and 442, connected by appropriate electrical connections, e.g., wire 443, to an electronic circuit or control module 444 for controlling the position of the headrest in the event of a crash. In commonly owned U.S. Pat. No. 6,343,810 an anticipatory sensor system for side impacts is disclosed. This sensor system uses sophisticated pattern recognition technology to differentiate different categories of impacting vehicles. A side impact with a large truck at 20 mph is more severe than an impact with a motorcycle at 40 mph, and, since in that proposed airbag system the driver would no longer be able to control the vehicle, the airbag must not be deployed except in life threatening situations. Therefore, it is critical in order to predict the severity of a side impact, to know the type of impacting vehicle.

To improve the assessment of the impending crash, the crash sensor will optimally determine the position and velocity of an approaching object. The crash sensor can be designed to use differences between the transmitted and reflected waves to determine the distance between the vehicle and the approaching object and from successive distance measurements, the velocity of the approaching object. In this regard, the difference between the transmitted and received waves or pulses may be reflected in the time of flight of the pulse, a change in the phase of the pulse and/or a Doppler radar pulse, or by range gating an ultrasonic pulse, an optical pulse or a radar pulse. As such, the crash sensor can comprise a radar sensor, a noise radar sensor, a camera, a scanning laser radar and/or a passive infrared sensor.

The situation is quite different in the case of rear impacts and the headrest system described herein. The movement of the headrest to the proximity of an occupant's head is not likely to affect his or her ability to control the automobile. Also, it is unlikely that anything but another car or truck will be approaching the rear of the vehicle at a velocity relative to the vehicle of greater than 8 mph, for example. The one exception is a motorcycle and it would not be serious if the headrest adjusted in that situation. Thus, a simple ranging sensor is all that is necessary. There are, of course, advantages in using a more sophisticated pattern recognition system as will be discussed below.

FIG. 120, therefore, illustrates a simple ranging sensor using a transmitter 440 and two receivers 441 and 442. Transmitter 440 may be any wave-generating device such as an ultrasonic transmitter while the receivers 441,442 are compatible wave-receiving devices such as ultrasonic receivers. The ultrasonic transmitter 440 transmits ultrasonic waves. These transducers are connected to the electronic control module (ECM) 444 by means of wire 443, although other possible connecting means (wired or wireless) may also be used in accordance with the invention. Naturally, other configurations of the transmitter 440, receivers 441,442 and ECM 444 might be equally or more advantageous. The sensors determine the distance of the approaching object and determine its velocity by differentiating the distance measurements or by use of the Doppler effect or other appropriate method.

Although a system based on ultrasonics is generally illustrated and described above and represents one of the best mode of practicing at least one of the inventions disclosed herein, it will be appreciated by those skilled in the art that other technologies employing electromagnetic energy such as optical, infrared, radar, capacitance etc. could also be used. Also, although the use of reflected energy is disclosed, any modification of the energy by an object behind the vehicle is contemplated including absorption, phase change, transmission and reemission or even the emission or reflection of natural radiation. Such modification can be used to determine the presence of an object behind the vehicle and the distance to the object.

Thus, the system for determining the location of the head of the occupant can comprise an electric field sensor, a capacitance sensor, a radar sensor, an optical sensor, a camera, a three-dimensional camera, a passive infrared sensor, an ultrasound sensor, a stereo sensor, a focusing sensor and a scanning system. One skilled in the art would be able to apply these systems in the invention in view of the disclosure herein and the knowledge of the operation of such systems attributed to one skilled in the art.

Although pattern recognition systems, such as neural nets, might not be required, such a system would be desirable. With pattern recognition, other opportunities become available such as the determination of the nature of objects behind the vehicle. This could be of aid in locating and recognizing objects, such as children, when vehicles are backing up and for other purposes. Although some degree of pattern recognition can be accomplished with the system illustrated in FIG. 120, especially if an optical system is used instead of the ultrasonic system illustrated, additional transducers significantly improve the accuracy of the pattern recognition systems if either ultrasonics or radar systems are used.

The wire 443 shown in FIG. 120 leads to the electronic control module 444 which is also shown in FIG. 121. FIG. 121 is a perspective view of a headrest actuation mechanism, mounted in a vehicle seat 4, and transducers 353,354 plus a head contact sensor 334. Transducer 353 may be an ultrasonic transmitter and transducer 354 may be an ultrasonic receiver. The transducers 353,354 may be based on any type of propagating phenomenon such as electromagnetics (for example capacitive systems), and are not limited to use with ultrasonics. The seat 4 and headrest 356 are shown in phantom. Vertical motion of the headrest 356 is accomplished when a signal is sent from control module 444 to servomotor 374 through wire 376. Servomotor 364 rotates lead screw 377 which mates with a threaded hole in elongate member 378 causing it to move up or down depending on the direction of rotation of the lead screw 377. Headrest support rods 379 and 380 are attached to member 378 and cause the headrest 356 to translate up or down with member 378. In this manner, the vertical position of the headrest 356 can be controlled as depicted by arrow A-A.

Wire 381 leads from the control module 444 to servomotor 375 which rotates lead screw 382. Lead screw 382 mates with a threaded hole in elongate, substantially cylindrical shaft 383 which is attached to supporting structures within the seat shown in phantom. The rotation of lead screw 382 rotates servo motor support 384 which in turn rotates headrest support rods 379 and 380 in slots 385 and 386 in the seat 4. In this manner, the headrest 356 is caused to move in the fore and aft direction as depicted by arrow B-B. Naturally there are other designs which accomplish the same effect of moving the headrest to where it is proximate to the occupant's head The operation of the system is as follows. When an occupant is seated on a seat containing the headrest and control system described above, the transducer 353 emits ultrasonic energy which reflects off of the back of the head of the occupant and is received by transducer 354. An electronic circuit containing a microprocessor determines the distance from the head of the occupant based on the time period between the transmission and reception of an ultrasonic pulse. The headrest 356 moves up and/or down until it finds the vertical position at which it is closest to the head of the occupant. The headrest remains at that position. Based on the time delay between transmission and reception of an ultrasonic pulse, the system can also determine the longitudinal distance from the headrest to the occupant's head. Since the head may not be located precisely in line with the ultrasonic sensors, or the occupant may be wearing a hat, coat with a high collar, or may have a large hairdo, there may be some error in the longitudinal measurement. This problem is solved in an accident through the use of a contact switch 334 on the surface of the headrest. When the headrest contacts a hard object, such as the rear of an occupant's head, the contact switch 334 closes and the motion of the headrest stops.

Although a system based on ultrasonics is generally illustrated and described above and represents the best mode of practicing at least one of the inventions disclosed herein, it will be appreciated by those skilled in the art that other technologies employing electromagnetic energy such as optical, infrared, radar, capacitance etc. could also be used. Also, although the use of reflected energy is disclosed, any modification of the energy by the occupant's head is contemplated including absorption, capacitance change, phase change, transmission and reemission. Such modification can be used to determine the presence of the occupant's head adjacent the headrest and/or the distance between the occupant's head and the headrest.

When a vehicle approaches the target vehicle, the target vehicle containing the headrest and control system of at least one of the inventions disclosed herein, the time period between transmission and reception of ultrasonic waves, for example, shortens indicating that an object is approaching the target vehicle. By monitoring the distance between the target vehicle and the approaching vehicle, the approach velocity of the approaching vehicle can the calculated and a decision made by the circuitry in control module 444 that an impact above a threshold velocity is about to occur. The control module 444 then sends signals to servo motors 375 and 374 to move the headrest to where it contacts the occupant in time to support the occupant's head and neck and reduce or eliminate a potential whiplash injury as explained in more detailed below.

The seat also contains two switch assemblies 388 and 389 for controlling the position of the seat 4 and headrest 356. The headrest control switches 389 permit the occupant to adjust the position of the headrest in the event that the calculated position is uncomfortably close to or far from the occupant's head. A woman with a large hairdo might find that the headrest automatically adjusts so as to contact her hairdo. This might be annoying to the woman who could then position the headrest further from her head. For those vehicles which have a seat memory system for associating the seat position with a particular occupant, the position of the headrest relative to the occupant's head can also be recorded. Later, when the occupant enters the vehicle, and the seat automatically adjusts to the occupant's recorded in memory preference, the headrest will similarly automatically adjust. In U.S. Pat. No. 5,822,437, a method of passively recognizing a particular occupant is disclosed.

Thus, an automatic adjustment results which moves the headrest to each specific occupant's desired and memorized headrest position. The identification of the specific individual occupant for which memory look-up or the like would occur can be by height sensors, weight sensors (for example placed in a seat), or by pattern recognition means, or a combination of these and other means, as disclosed herein and in the above-referenced patent applications and granted patents.

One advantage of this system is that it moves the headrest toward the occupant's head until it senses a resistance characteristic of the occupant's head. Thus, the system will not be fooled by a high coat collar 445 or hat 446, as illustrated in FIG. 123, or other article of clothing or by a large hairdo 447 as illustrated in FIG. 122. The headrest continues to be moved until it contacts something relatively rigid as determined by the contact switch 334.

A key advantage of this system is that there is no permanent damage to the system when it deploys during an accident. After the event it will reset without an expensive repair. In fact, it can be designed to reset automatically.

An ultrasonic sensor in the headrest has previously been proposed in a U.S. patent to locate the occupant for the out-of-position occupant problem. In that system, no mention is made as to how to find the head. In the headrest location system described herein, the headrest can be moved up and down in response to the instant control systems to find the location of the back of the occupant's head. Once it has been found the same sensor is used to monitor the location of the person's head. Naturally, other methods of finding the location of the head of an occupant are possible including in particular an electromagnetic based system such as a camera, capacitance sensor or electric field sensor.

An improvement to the system described above results when pattern recognition technology is added. FIG. 124 is view similar to FIG. 121 showing an alternate design of a head sensor using three transducers 353, 354 and 355 which can be used with a pattern recognition system. Transducer 353 can perform both as a transmitter and receiver while transducers 354,355 can perform only as receivers. Transducers 354,355 can be placed on either side of and above transducer 353. Using this system and an artificial neural network, or other pattern recognition system, as part of the electronic control module 444, or elsewhere, an accurate determination of the location of an occupant's head can, in most cases, be accomplished even when the occupant has a large hairdo or hat. In this case, the system can be trained for a wide variety of different cases prior to installation into the vehicle. This training is accomplished by placing a large variety of different occupants onto the driver's seat in a variety of different positions and recording digitized data from transducers 353, 354 and 355 along with data representing the actual location of the occupant's head. The different occupants include examples of large and small people, men and women, with many hair, hat, and clothing styles. Since each of these occupants is placed at a variety of different positions on the seat, the total data set, called the "training set", can consist of at least one thousand, and typically more than 100,000, cases. This training set is then used to train the neural network, or other similar trainable pattern recognition technology, so that the resulting network can locate the occupant's head in the presence of the types of obstructions discussed above whatever an occupant occupies the driver's seat.

FIG. 125 is a schematic view of an artificial neural network of the type used to recognize an occupant's head and is similar to that presented in FIG. 19B above.

The process of locating the head of an occupant can be programmed to begin when an event occurs such as the closing of a vehicle door or the shifting of the transmission out of the PARK position. The ultrasonic transmitting/receiving transducer 353, for example, transmits a train of ultrasonic waves toward the head of the occupant. Waves reflected from the occupant's head are received by transducers 353, 354 and 355. An electronic circuit containing an analog to digital converter converts the received analog signal to a digital signal which is fed into the input nodes numbered 1, 2, 3 . . . n, shown on FIG. 125. The neural network algorithm compares the pattern of values on nodes 1 through N with patterns for which it has been trained, as discussed above. Each of the input nodes is connected to each of the second layer nodes, called the hidden layer, either electrically as in the case of a neural computer or through mathematical functions containing multiplying coefficients called weights, described in more detail elsewhere herein. The weights are determined during the training phase while creating the neural network as described in detail in the above text references. At each hidden layer node a summation occurs of the values from each of the input layer nodes, which have been operated on by functions containing the weights, to create a node value. Although an example using ultrasound has been described, the substitution of other sensors such as optical, radar or capacitors will now be obvious to those skilled in the art.

The hidden layer nodes are in like manner connected to the output layer nodes, which in this example is only a single node representing the longitudinal distance to the back of the occupant's head. During the training phase, the distance to the occupant's head for a large variety of patterns is taught to the system. These patterns include cases where the occupant is wearing a hat, has a high collar, or a large hairdo, as discussed above, where a measurement of the distance to the back of the occupant's head cannot be directly measured. When the neural network recognizes a pattern similar to one for which it has been trained, it then knows the distance to the occupant's head. The details of this process are described in the above listed referenced texts and will not be presented in detail here. The neural network pattern recognition system described herein is one of a variety of pattern recognition technologies which are based on training. The neural network is presented herein as one example of the class of technologies referred to as pattern recognition technologies. Ultrasonics is one of many technologies including optical, infrared, capacitive, radar, electric field or other electromagnetic based technologies. Although the reflection of waves was illustrated, any modification of the waves by the head of the occupant is anticipated including absorption, capacitance change, phase change, transmission and reemission. Additionally, the radiation emitted from the occupant's head can be used directly without the use of transmitted radiation. Naturally, combinations of the above technologies can be used.

A time step, such as one tenth of a millisecond, is chosen as the period at which the analog to digital converter (ADC) averages the output from the ultrasonic receivers and feeds data to the input nodes. For one preferred embodiment of at least one of the inventions disclosed herein, a total of one hundred input nodes is typically used representing ten milliseconds of received data. The input to each input node is a preprocessed combination of the data from the three receivers. In another implementation, separate input nodes would be used for each transducer. Alternately, the input data to the nodes can be the result of a preprocessing algorithm which combines the data taking into account the phase relationships of the three return signals to obtain a map or image of the surface of the head using the principles of phased array radar. Although a system using one transmitter and three receivers is discussed herein, where one transducer functions as both a transmitter and receiver, even greater resolution can be obtained if all three receivers also act as transmitters.

In the example above, one hundred input nodes, twelve hidden layer nodes and one output layer node are typically used. In this example received data from only three receivers were considered. If data from additional receivers is also available the number of input layer nodes could increase depending on the preprocessing algorithm used. If the same neural network is to be used for sensing rear impacts, one or more additional output nodes might be used, one for each decision. The theory for determining the complexity of a neural network for a particular application has been the subject of many technical papers as well as in the texts referenced above and will not be presented in detail here. Determining the requisite complexity for the example presented here can be accomplished by those skilled in the art of neural network design and is discussed briefly below.

The pattern recognition system described above defines a method of determining the probable location of the rear of the head of an occupant and, will therefore determine, if used in conjunction with the anticipatory rear impact sensor, where to position a deployable occupant protection device in a rear collision, and comprises the steps of:

(a) obtaining an ultrasonic, analog signal from transducers mounted in the headrest;
(b) converting the analog signal into a digital time series;
(c) entering the digital time series data into a pattern recognition system such as a neural network;
(d) performing a mathematical operation on the time series data to determine if the pattern as represented by the time series data is nearly the same as one for which the system has been trained; and
(e) calculating the probable location of the occupant's head if the pattern is recognizable.

The particular neural network described and illustrated above contains a single series of hidden layer nodes. In some network designs, more than one hidden layer is used although only rarely will more than two such layers appear. There are of course many other variations of the neural network architecture illustrated above, as well as other pattern recognition systems, which appear in the literature.

The implementation of neural networks can take at least two forms, an algorithm programmed on a digital microprocessor or in a neural computer. Neural computer chips are now available.

In the particular implementation described above, the neural network is typically trained using data from 1000 or more than 100,000 different combinations of people, clothes, wigs etc. There are, of course, other situations which have not been tested. As these are discovered, additional training will improve the performance of the pattern recognition head locator.

Once a pattern recognition system is implemented in a vehicle, the same system can be used for many other pattern recognition functions as described herein and in the above referenced patents and patent applications. For example, in the current assignee's U.S. Pat. No. 5,829,782 referenced above, the use of neural networks as a preferred pattern recognition technology is disclosed for use in identifying a rear facing child seat located on the front passenger seat of an automobile. This same patent application also discloses many other applications of pattern recognition technologies for use in conjunction with monitoring the interior of an automobile passenger compartment.

As described in the above referenced patents to Dellanno and Dellanno et al., whiplash injuries typically occur when there is either no head support or when only the head of the occupant is supported during a rear impact. To minimize these injuries, both the head and neck should be supported. In Dellanno, the head and neck are supported through a pivoting headrest which first contacts the head of the occupant and then rotates to simultaneously support both the head and the neck. The force exerted by the head and neck onto the pivoting headrest is distributed based on the relative masses of the head and neck. Dellanno assumes that the ratio of these masses is substantially the same for all occupants and that the distances between centers of mass of the head and neck is approximately also proportional for all occupants. To the extent that this is not true, a torque will be applied to the headrest and cause a corresponding torque to be applied to the head and neck of the occupant. Ideally, the head and neck would be supported with just the required force to counteract the inertial force of each item. Obviously this can only approximately be accomplished with the Dellanno pivoting headrest especially when one considers that no attempt has been made to locate the headrest relative to the occupant and the proper headrest position will vary from occupant to occupant. Dellanno also assumes that the head and neck will impact and in fact bounce off of the headrest. This in fact can increase the whiplash injuries since the change in velocity of the occupant's head will be greater that if the headrest absorbed the kinetic energy and the head did not rebound. A far more significant improvement to eliminating whiplash injuries can be accomplished by eliminating this head impact and the resulting rebound as is accomplished in the present invention.

Automobile engineers attempt to design vehicle structures so that in an impact the vehicle is accelerated at an approximately constant acceleration. It can be shown that this results in the most efficient use of the vehicle structure in absorbing the crash energy. It also minimizes the damage to the vehicle in a crash and thus the cost of repair. Let us assume, therefore, that in a particular rear impact that the vehicle accelerates at a constant 15 g acceleration. Let us also assume that the vehicle seat back is rigidly attached to the vehicle structure at least during the early part of the crash, so that up until shortly after the occupant's head has impacted the headrest the seat back also is accelerating at a constant 15 g's. Finally let us assume that the occupant's head is initially displaced 4 inches from the headrest and that during impact the head compresses the headrest 1 inch. When the occupant's head impacts the headrest it must now make up for the difference in velocity between the headrest and the head during the period that it is compressing the headrest 1 inch. It can be demonstrated that this requires an acceleration of approximately 75 g's or five times the acceleration which the head would experience if it were in contact with the headrest at the time that the rear impact occurs.

The Dellanno headrest, as shown for example in FIG. 3 of U.S. Pat. No. 5,290,091, is a worthwhile addition to solving the whiplash problem after the headrest has been positioned against the head and neck of the occupant. The added value of the Dellanno design over simpler designs, especially considering the inertial effects of having to rapidly rotate the headrest while the crash is taking place, is probably not justified. FIG. 126 illustrates a headrest design which accomplishes the objectives of the Dellanno headrest in a far simpler structure and at less potential injury to the occupant.

In FIG. 126, a seat with a movable headrest similar to the one illustrated in FIG. 121 is shown with a headrest designated 450 designed to provide support to both the head and neck which eliminates the shortcomings of the Dellanno headrest. The ultrasonic transducer 353, which includes both a transmitter and receiver, has been moved to an upper portion of the seat back, not the headrest, to facilitate the operation of the support system as described below. The construction of the headrest is illustrated in a cutaway view shown in FIG. 126A which is an enlarged view of the headrest of FIG. 126.

In FIG. 126A, the headrest is constructed of a support or frame 452 which is attached to rods 379 and 380 and extends along the sides and across the back of the headrest. Support 452 may be made of a somewhat rigid material. This support 452 helps control the motion of a pre-inflated bag 453 as it deforms under the force from the head of the occupant to where it contacts and provides support to the occupant's neck. Relatively low density open cell foam 454 surrounds the support 452 giving shape to the remainder of the headrest. As shown in FIG. 126A, the open call foam 454 can also have channels or openings 455 extending in a direction generally from a top of the headrest 450 to a bottom of the headrest 450, although such channels are not required. The direction of the channels or openings 455 facilitates the desired movement of the fluid in the bag 453 and constrains the fluid flow upon impact of the occupant's head against the headrest 450, i.e., a generally vertical movement in the case of the illustrated headrest 450. The open call foam 454 is covered by a thin membrane, possibly made from plastic, or the bag 453 (also referred to as an airbag herein which is appropriate when the fluid in the bag 453 is air-although the fluid within bag 453 may be other than air), and by a decorative cover 456 made of any suitable, acceptable material. The bag 453 is sealed surrounding the support 452 and plastic or rubber foam 454 such that any flow of fluid such as air into or out of the bag 453 is through a hole in the bag 453 adjacent to a vent hole 451 in the supporting structure, i.e., the cover 456. Elastic stretch seams 457 can be placed in the sides, bottom and/or across the front of the headrest cover to permit the headrest surface to deform to the contour of, and to properly support, the occupant's head and neck. A contact switch 334 is placed just inside cover 456 and functions as described above.

Instead of channels, the properties of the foam can be selected to provide the desired flow of gas, e.g., the design, shape, positioning and construction of the foam can be controlled and determined during manufacture to obtain the desired flow properties.

FIG. 127A and FIG. 127B illustrate the operation of the headrest 450. In anticipation of a rear impact (or any other type of impact), as determined by the proximity sensors described above or any other anticipatory crash sensor system, headrest 450 is moved from its position as shown in FIG. 127A to its position as shown in FIG. 127B. This movement is enabled by control of the displacement mechanism, such as those described above with reference to FIG. 121, as effected through the control module 444. The forward movement of the headrest 450 should continue until the headrest 450 contacts or impacts with the occupant's head as determined by a contact switch 334. When headrest 450 contacts or impacts the head 33 of the occupant 30, it exerts sufficient pressure against head 33 to cause air (the fluid in the bag 453 for the purposes of this explanation) to flow from the upper portion 458 to the lower portion 459 of headrest 450, which causes this lower portion to expand as the upper portion contracts. This initial flow of air takes place as the foam 454 compresses under the force of contact between the head and upper portion 458 of headrest 450. The initial shape of headrest 450 is created by the shape of the foam 454; however once the occupants head 33 begins to exert pressure on the upper portion 458 the air is compressed and begins to flow to the lower portion 459 causing it to expand until it contacts the neck 460 of the occupant 30. (If the occupant's head were to exert pressure on the lower portion 459 or once the pressure on the upper portion 458 were removed, air would flow from the lower portion 459 to the upper portion 458.) In this manner, by the flow of air, the pressure is equalized on the head and neck of the occupant 30 thereby preventing the whiplash type motions described in the Dellanno patents, as well as numerous technical papers on the subject. The headrest of at least one of the inventions disclosed herein acts very much like a pre-inflated airbag providing force where force is needed to counteract the accelerations of the occupant. It accomplishes this force balancing without the need to rotate a heavy object such as the headrest in the Dellanno patent which by itself could introduce injuries to the occupant.

In addition to use as a headrest, the structure described above can be used in other applications for cushioning an occupant of a vehicle, i.e., for cushioning another part of the occupant's body in an impact. The cushioning arrangement would thus comprise a frame or support coupled to the vehicle and a fluid-containing bag attached to the frame or other support. A deformable cover would also be preferred. The bag, including the cell foam and vent hole as described above, would allow movement of the fluid within the bag to thereby alter the shape of the bag, upon contact with the part of the occupant's body, and enable the bag to conform to the part of the occupant's body. This would effectively cushion the occupant's body during an impact. Further, the cushioning arrangement could be coupled to the anticipatory crash sensor through a control unit (i.e., control module 444) and displacement mechanism in a similar manner as headrest 450, to thereby enable movement of the cushioning arrangement against the part of the occupant's body just prior to or coincident with the crash.

A headrest using a pre-inflated airbag type structure composed of many small airbags is disclosed in FIG. 9 of U.S. Pat. No. 5,098,124 to Breed et al. The headrest disclosed here differs primarily through the use of a single pre-inflated fluid-containing bag, fluid-filled bag or airbag which when impacted by the head of the occupant, deforms by displacing the surface of the headrest outwardly to capture and support the neck of the occupant. The use of an airbag to prevent whiplash injuries is common for accidents involving frontal impacts and driver and passenger side airbags. Whiplash injuries have not become an issue in frontal impacts involving airbags, therefore, the ability of airbags to prevent whiplash injuries in frontal impacts is proven. The use of airbags to prevent whiplash injuries in rear impacts is therefore appropriate and, if a pre-inflated airbag as described herein is used, results in a simple low-cost and effective headrest design. Naturally, other airbag designs are possible although the pre-inflated design as described herein is preferred.

This pre-inflated airbag headrest has another feature which further improves its performance. The vent hole 451 is provided to permit some of the air in the headrest to escape in a controlled manner thereby dampening the motion of the head and neck much in the same way that a driver side airbag has vent holes to dissipate the energy of the impacting driver during a crash. An appropriate regulation device may also be associated with the vent hole 451 of the headrest 450 to regulate the escaping air. Without the vent hole, there is risk that the occupant's head and neck will rebound off of the headrest, as is also a problem in the Dellanno patents. This can happen especially when, due to pre-crash braking or an initial frontal impact such as occurs in a multiple car accident, the occupant is sufficiently out of position that the headrest cannot reach his or her head before the rear impact. Without this feature the acceleration on the head will necessarily be greater and therefore the opportunity for injury to the neck is increased. The size of this hole is determined experimentally or by mathematical analysis and computer simulation. If it is too large, too much air will escape and the headrest will bottom out on the support. If it is too small, the head will rebound off of the headrest thereby increasing the chance of whiplash injury. Naturally, a region of controlled porosity could be substituted for hole 451.

Finally, a side benefit of at least one of the inventions disclosed herein is that it can be used to determine the presence of an occupant on the front passenger seat. This information can then be used to suppress deployment of an airbag if the seat is unoccupied.

FIG. 128A is a side view of an occupant seated in the driver seat of an automobile having an integral seat and headrest and an inflatable pressure controlled bladder with the bladder in the normal, uninflated condition. FIG. 128B is a view as in FIG. 128A with the bladder expanded in the head contact position as would happen in anticipation of, e.g., a rear crash. The seat containing the bladder system of this embodiment of the invention is shown generally at 465. The seat 465 contains an integral bladder 466 arranged within the cover of the seat 465, a fluid-containing chamber 467 connected to the bladder 466 and a small igniter assembly 468, which contains a small amount, such as about 5 grams, of a propellant such as boron potassium nitrate. Upon receiving a signal that a crash is imminent, igniter assembly 468 is ignited and supplies a small quantity of hot propellant gas into chamber 467. The gas (the fluid in a preferred embodiment) in chamber 467 then expands due to the introduction of the high temperature gas and causes the bladder 466 to expand to the condition shown in FIG. 128B. Bladder 466 expands in such a manner (through its design, construction and/or positioning and/or through the design and construction of the seat 465) as to conform to the shape of the occupant's head 33 and neck 460. As soon as the expanding headrest portion 469 of the seat 465 contacts the head 33 and neck 460 of the occupant (as may be determined by a contact sensor in the seat 465), pressure begins to increase in the bladder 466 causing a control valve 470 to open and release gas into the passenger compartment to thereby prevent the occupant from being displaced toward the front of the vehicle.

Control valve 470 is situated in a flow line between the bladder 466 and an opening in the rear of the seat 465 in the illustrated embodiment, but may be directly connected to the bladder 466. The flow line may be directed to another location, e.g., the exterior of the vehicle, through appropriate conduits. Control valve 470 can be controlled by an appropriate control device, such as the central diagnostic module, and the amount of gas released coordinated with or based on the severity of the crash or any other parameter of the crash or deployment of the airbag.

In the examples of FIGS. 128A and 128B, a small pyrotechnic element is utilized as the igniter assembly 468, however, the system itself is automatically resetable. Thus, after the impact, the system returns to its pre-inflated position and the only part that needs to be replaced is the igniter assembly 468. The cost of restoring the system after an accident is therefore small. The igniter assembly 468 may be positioned so that it can be readily accessed from the rear of the seat, e.g., by removing a panel in the rear of the seat. The igniter assembly 468 may be coupled directly or indirectly to a crash sensor, possibly through a central diagnostic module of the vehicle. The crash sensor is preferably an anticipatory crash sensor arranged so as to detect rear impacts because whiplash injuries are mostly caused during rear impacts.

In operation, the crash sensor, such as the anticipatory crash sensor of FIG. 120, detects the impending crash into the rear of the vehicle and generates a signal or causes a signal to be generated indicative of the fact that the igniter assembly 468 should be activated to inflate the bladder 466. The igniter assembly 468 is then activated generating heated gas which is directed into chamber 467. The gas in chamber 467 expands and passes through one or more conduits into the bladder 466 causing the bladder 466 to expand to the condition shown in FIG. 128B. The expanding bladder 466 will fill in the space between the occupant and the headrest and seat as shown in FIG. 128B. The bladder 466 may be designed to have more expansion capability in the head and neck areas as those surfaces will initially be further from the body of the driver. The inflated bladder 466 will thus reduce the risk of whiplash injuries to the driver and other occupants in seats where it is installed.

The control valve 470 is designed or controlled to ensure that the bladder 466 expands sufficiently to provide whiplash protection without exerting a forward force of the driver. For example, the pressure in the bladder 466 may be measured during inflation and once it reaches an optimum level, the control (or pressure release) valve 470 may be activated. In the alternative, during the design phase, the time it takes for the bladder 466 to inflate to the optimum level may be computed and then the control valve 470 designed to activated after this predetermined time.

Instead of a control valve, it is also possible to use a variable outflow port or vent as described in the current assignee's U.S. Pat. No. 5,748,473.

After inflation and the crash, the igniter assembly 468 can be removed and replaced with compatible igniter assembly so that the vehicle is ready for subsequent use.

As shown in FIGS. 128A and 128B, the bladder 466 is integral with the seat 465 and the headrest of the seat is formed with the backrest as a combined seat back portion. If the headrest is formed separate from the backrest, then the bladder 466 can be formed integral with the headrest and if necessary, integral with the backrest to achieve the whiplash protection sought by the invention.

FIG. 129A is a side view of an occupant seated in the driver seat of an automobile having an integral seat and a pivotable or rotatable headrest and bladder with the headrest in the normal position. FIG. 129B is a view as in FIG. 129A with the headrest pivoted in the head contact position as would happen in anticipation of, e.g., a rear crash. In contrast to the embodiment of FIGS. 128A and 128B, this embodiment is purely passive in that no pyrotechnics are used.

In this embodiment, upon receiving a signal that a crash is imminent, electronic circuitry, not shown, activates solenoid 471 causing headrest portion 474 to rotate about pivot 473 (an axis, pin, etc) toward the occupant. The system is shown generally at 475 and comprises a seat back portion 472 and headrest portion 474. In FIG. 129B, the headrest portion 474 has rotated until it contacts the occupant and then a bladder or airbag 476 within headrest portion 464 changes shape or deforms to conform to the head 33 and neck 460 of the occupant thereby supporting both the head and neck and preventing a whiplash injury. The control of the rotation of the headrest portion 474 can be accomplished either by a contact switch or force measurement using a switch or force sensor in the headrest or a force or torque sensor at the solenoid 471 or, alternately, by measuring the pressure within the airbag 476. Solenoid 471 can be replaced by another linear actuator such as an air cylinder with an appropriate source of air pressure.

The electronic circuitry, not shown, may be controlled by the central diagnostic module or upon receiving a signal from the crash sensor. Airbag 476 is shown arranged within the headrest portion 464, i.e., it is within the periphery of the surface layer of the headrest portion 474 and seat 475.

In operation, the crash sensor detects the impending crash, e.g., into the rear of the vehicle, and generates a signal or causes a signal to be generated resulting in pivotal movement of the headrest portion 474. The headrest portion 474 is moved (pivoted) preferably until a point at which the front of the headrest portion 474 touches the back of the driver's head. This can all occur prior to the actual crash. Thereafter, upon the crash, the driver will be forced backwards against the pivoted headrest portion 474. Gas will flow from the upper part of the headrest portion 474 and the seat back and thereby distribute the load between the head, neck and body.

As shown in FIGS. 129A and 129B, the headrest portion of the seat is formed with the backrest as a combined seat back portion. If the headrest is formed separate from the backrest, then the airbag 476 can be formed integral with the headrest and if necessary, integral with the backrest to achieve the whiplash protection sought by the invention. In this case, the pivot 473 might be formed in the backrest or between the backrest and headrest.

Although shown for use with a driver, the same systems could be used for passengers in the vehicle as well, i.e., it could be used for the front-seat passenger(s) and any rear-seated passengers. Also, although whiplash injuries are most problematic in rear impacts, the same system could be used for side impacts as well as front impacts and rollovers with varying degrees of usefulness.

Thus, disclosed herein is a seat for a vehicle for protecting an occupant of the seat in a crash which comprises a headrest portion, an expandable bladder arranged at least partially in the headrest portion, the bladder being arranged to conform to the shape of a neck and head of the occupant upon expansion, and an igniter for causing expansion of the bladder upon receiving a signal that protection for the occupant is desired. The bladder may also be arranged at least partially in the backrest portion of the seat. A fluid-containing chamber is coupled to the igniter and in flow communication with the bladder whereby the igniter causes fluid in the chamber to expand and flow into the bladder to expand the bladder. A control valve is associated with the bladder for enabling the release of fluid from the bladder. The bladder is preferably arranged in an interior of the headrest portion, i.e., such that its expansion is wholly within the outer surface layer of the headrest portion of the seat. A vehicle including this system can also include a crash sensor system for determining that a crash requiring protection for the occupant is desired. The crash sensor system generates a signal and directing the signal to the igniter. The crash sensor system may be arranged to detect a rear impact.

Another seat for a vehicle for protecting an occupant of the seat in a crash disclosed above comprises a backrest including a backrest portion and a headrest portion and an airbag arranged at least partially in the headrest portion. The headrest portion is pivotable with respect to the backrest portion toward the occupant. To this end, a pivot structure is provided for enabling pivotal movement of the headrest portion relative to the backrest portion. The pivot structure may be a solenoid arranged to move an arm about a pivot axis, which arm is coupled to the headrest portion. The airbag is arranged in an interior of the headrest portion of the backrest. A vehicle including this system can also include a crash sensor system for determining that a crash requiring protection for the occupant is desired. The headrest portion is pivoted into contact with the occupant upon a determination by the crash sensor system that a crash requiring protection for the occupant is desired. The crash sensor system may be arranged to detect a rear impact.

Thus there is disclosed and illustrated herein a passive rear impact protection system which requires no action by the occupant and yet protects the occupant from whiplash injuries caused by rear impacts. Although several preferred embodiments are illustrated and described above there are possible combinations using other geometry, material, and different dimensions of the components that can perform the same function. Therefore, at least one of the inventions disclosed herein is not limited to the above embodiments and should be determine by the following claims. In particular, although the particular rear impact occupant protection system described in detail above requires all of the improvements described herein to meet the goals and objectives of at least one of the inventions disclosed herein, some of these improvements may not be used in some applications.

Also disclosed herein is a headrest for a seat which comprises a frame attachable to the seat and a fluid-containing bag attached to the frame. The bag is structured and arranged to allow movement of the fluid within the bag to thereby alter the shape of the bag and enable the bag to conform to the head and neck of an occupant. A deformable cover may substantially surround the bag such that the bag is within the seat, i.e., an outer surface of the bag is not exposed to the atmosphere. The cover is elastically deformable in response to changes in pressure in the bag. The frame may be made of a rigid material. The bag can contain cell foam having openings (open cell foam), which in a static state, determines the shape of the bag. The fluid in the bag may be air, i.e., an airbag. To provide the elastic deformation of the cover, the cover may include stretch seams at one or more locations. Preferably, the stretch seams should be placed on the side(s) of the headrest which will contour to the shape of the occupant's head and neck upon impact. The bag may include a constraining mechanism for constraining flow of fluid from an upper portion of the headrest to a lower portion of the headrest. The constraining mechanism may comprise open cell foam possibly with channels extending in a direction from a top of the headrest to a bottom of the headrest. In the alternative, the properties of the foam may be controlled to get the desired flow rate and possibly flow direction. The constraining mechanism is structured and arranged such that when the upper portion contracts, the lower portion expands. Also, the constraining mechanism may be designed so that when the upper portion expands, the lower portion contracts. The cover and bag are structured and arranged such that when an occupant impacts the headrest, fluid within the bag flows substantially within the bag to change the shape of the bag so as to approximately conform to the head and neck of the occupant thereby providing a force on the head and neck of the occupant to substantially accelerate both the head and neck at substantially the same acceleration in order to minimize whiplash injuries. The bag preferably includes a flow restriction which permits a controlled flow of fluid out of the bag upon impact of an object with the headrest to thereby dampen the impact of the object with the headrest.

An inventive seat comprises a seat frame, a bottom cushion, a back cushion cooperating to support an occupant and a headrest attached to the seat frame. The headrest is as in any of the embodiments described immediately above.

An inventive cushioning arrangement for protecting an occupant in a crash comprises a frame coupled to the vehicle and a fluid-containing bag attached to the frame. The bag is structured and arranged to allow movement of the fluid within the bag to thereby alter the shape of the bag and enable the bag to conform to a portion of the occupant engaging the cushioning arrangement. The cushioning arrangement should be arranged relative to the occupant such that the bag impacts the occupant during the crash. As used here (and often elsewhere in this application), "impact" does not necessarily imply direct contact between the occupant and the bag but rather may be considered the exertion of pressure against the bag caused by contact of the occupant with the outer surface of the cushioning arrangement which is transmitted to the bag. The cushioning arrangement can also include a deformable cover substantially surrounding the bag. The cover is elastically deformable in response to changes in pressure in the bag. The frame may be coupled to a seat of the vehicle and extends upward from a top of the seat such that the cushioning arrangement constitutes a headrest. In the alternative, the cushioning arrangement can be used anywhere in a vehicle in a position in which the occupant will potentially impact it during the crash. The bag and headrest may be as in any of the embodiments described above.

An inventive protection system for protecting an occupant in a crash comprises an anticipatory crash sensor for determining that a crash involving the vehicle is about to occur, and a movable cushioning arrangement coupled to the anticipatory crash sensor. The cushioning arrangement is movable toward a likely position of the occupant, preferably in actual contact with the occupant, upon a determination by the anticipatory crash sensor that a crash involving the vehicle is about to occur. The cushioning arrangement comprises a frame coupled to the vehicle, and a fluid-containing bag attached to the frame. The bag is structured and arranged to allow movement of the fluid within the bag to thereby alter the shape of the bag and enable the bag to conform to the occupant. The cushioning arrangement and its parts may be as described in any of the embodiments above. The anticipatory crash sensor may be arranged to determine that the crash involving the vehicle is a rear impact. In this case, it could comprise a transmitter/receiver arrangement mounted at the rear of the vehicle. To provide for movement of the cushioning arrangement, a displacement mechanism is provided, e.g., a system of servo-motors, screws and support rods, and a control unit is coupled to the anticipatory crash sensor and the displacement mechanism. The control unit controls the displacement mechanism to move the cushioning arrangement based on the determination by the anticipatory crash sensor that a crash involving the vehicle is about to occur.

One disclosed method for protecting an occupant in an impact comprises the steps of determining that a crash involving the vehicle is about to occur, and moving a cushioning arrangement into contact with the occupant upon a determination that a crash involving the vehicle is about to occur. The cushioning arrangement comprises a frame coupled to the vehicle and a fluid-containing bag attached directly or indirectly to the frame. The bag is structured and arranged to allow movement of the fluid within the bag to thereby alter the shape of the bag and enable the bag to conform to the occupant. The cushioning arrangement may be as in any of the embodiments described above. The step of moving the cushioning arrangement into contact with the occupant may comprise the steps of moving the cushioning arrangement toward the occupant, detecting when the cushioning arrangement comes into contact with the occupant and then ceasing movement of the cushioning arrangement. The step of detecting when the cushioning arrangement comes into contact with the occupant may comprise the step of arranging a contact switch in connection with the cushioning arrangement.

Also disclosed herein is a headrest and headrest positioning system which reduce whiplash injuries from rear impacts by properly positioning the headrest behind the occupant's head either continuously, or just prior to and in anticipation of, the vehicle impact and then properly supports both the head and neck. Sensors determine the location of the occupant's head and motors move the headrest both up and down and forward and back as needed. In one implementation, the headrest is continuously adjusted to maintain a proper orientation of the headrest to the rear of the occupant's head. In another implementation, an anticipatory crash sensor, such as described in commonly owned U.S. Pat. No. 6,343,810, is used to predict that a rear impact is about to occur, in which event, the headrest is moved proximate to the occupant.

Also disclosed herein is an apparatus for determining the location of the head of the occupant in the presence of objects which obscure the head. Such an apparatus comprises a transmitter for illuminating a selective portion of the occupant and the head-obscuring objects in the vicinity of the head, a sensor system for receiving illumination reflected from or modified by the occupant and the head-obscuring objects and generating a signal representative of the distance from the sensor system to the illuminated portion of the occupant and the head-obscuring objects, a selective portion changing system for changing the illuminated portion of the occupant and the head-obscuring objects which is illuminated by the transmitter and a processor. The processor is designed to sequentially operate the selective portion changing system so as to illuminate different portions of the occupant and the head-obscuring objects, and a pattern recognition system for determining the location of the head from the signals representative of the distance from the sensor system to the different selective portions of the occupant and the head-obscuring objects. The pattern recognition system may comprise a neural network. In some embodiments of the invention, the head-obscuring objects comprise items from the class containing clothing and hair. The pattern recognition system may be arranged to determine the location of the approximate longitudinal location of the head from the headrest. If one or more airbags is mounted within the vehicle, the head location system may be designed to determine the location of the head relative to the airbag. The transmitter may comprise an ultrasonic transmitter arranged in the headrest and the sensor system may also be arranged in the headrest, possibly vertically spaced from the transmitter. In the alternative, the transmitter and sensor system may comprise a single transducer. The selective portion changing system may comprise a control module coupled to the transmitter and the sensor system and servomotors for adjusting the position of the headrest.

Illumination as used herein is any form of radiation which is introduced into a volume of which contains the head of an occupant and includes, but it is not limited to, electromagnetic radiation from below one kHz to above ultraviolet optical radiation ($10^{16}$ Hz) and ultrasonic radiation. Thus, any system, such as a capacitive system, which uses a varying electromagnetic field, or equivalently electromagnetic waves, is meant to be included by the term illumination as used herein. By reflected radiation, it is meant the radiation that is sensed by the device that comes from the volume occupied by the head, or other part, of an occupant and indicates the presence of that part of the occupant. Examples of such systems are ultrasonic transmitters and receivers placed in the headrest of the vehicle seat, capacitive sensors placed in the headrest or other appropriate location (or a combination of locations such as one plate of the capacitor being placed in the vehicle seat and the other in the headliner), radar, far or near frequency infrared, visible light, ultraviolet, etc.

At least one of the inventions disclosed herein discloses the use of anticipation of an impact into the rear of the subject vehicle and the positioning of a safety device where it can assist in protecting the occupant from injury such as whiplash caused by the rear impact. Naturally other actions can also be taken such as accelerating the vehicle if the automatic cruise control or other exterior monitoring systems confirms that such an action is safe. Additionally the driver can be warned, the seatbelts can be tightened and the occupants back and perhaps his or her neck and head can be pulled against the seat and headrest. If the rear impact is forecasted to be particularly severe, the frontal airbags can also be deployed in the attempt to hold the occupant against the seat and prevent the rebound into the instrument panel or steering wheel for example. Some or perhaps all of the deployed devices can be resetable so that they return to their pre crash state after the accident.

Since many rear impacts are not directly from the rear, other actions can be taken such as causing the headrest to partially wrap around the head of the occupant or the deployment of side curtain airbags can be initiated.

14.11 Combined with SDM and Other Systems

Figure 72:
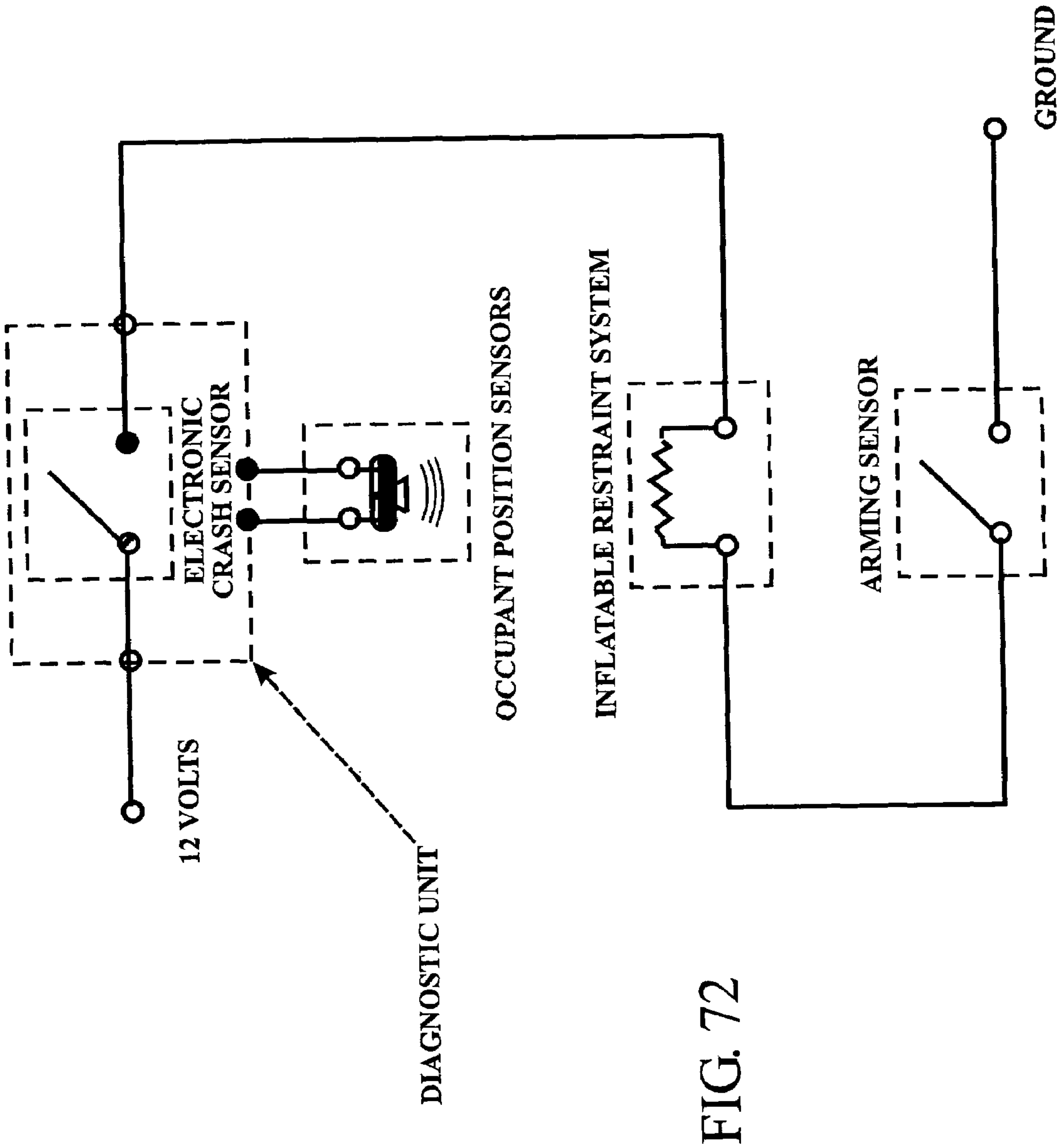
FIG. 72 is a circuit schematic illustrating the use of the vehicle interior monitoring sensor used as an occupant position sensor in conjunction with the remainder of the inflatable restraint system.

The occupant position sensor in any of its various forms is integrated into the airbag system circuitry as shown schematically in FIG. 72. In this example, the occupant position sensors are used as an input to a smart electronic sensor and diagnostic system. The electronic sensor determines whether one or more of the airbags should be deployed based on the vehicle acceleration crash pulse, or crush zone mounted crash sensors, or a combination thereof, and the occupant position sensor determines whether the occupant is too close to any of the airbags and therefore that the deployment should not take place. In FIG. 72, the electronic crash sensor located within the sensor and diagnostic unit determines whether the crash is of such severity as to require deployment of one or more of the airbags. The occupant position sensors determine the location of the vehicle occupants relative to the airbags and provide this information to the sensor and diagnostic unit that then determines whether it is safe to deploy each airbag and/or whether the deployment parameters should be adjusted. The arming sensor, if one is present, also determines whether there is a vehicle crash occurring. In such a case, if the sensor and diagnostic unit and the arming sensor both determine that the vehicle is undergoing a crash requiring one or more airbags and the position sensors determine that the occupants are safely away from the airbag(s), the airbag(s), or inflatable restraint system, is deployed.

The above applications illustrate the wide range of opportunities, which become available if the identity and location of various objects and occupants, and some of their parts, within the vehicle were known. Once the system of at least one of the inventions disclosed herein is operational, integration with the airbag electronic sensor and diagnostics system (SDM) is likely since an interface with the SDM is necessary. This sharing of resources will result in a significant cost saving to the auto manufacturer. For the same reasons, the vehicle interior monitoring system (VIMS) can include the side impact sensor and diagnostic system.

Figure 72A:
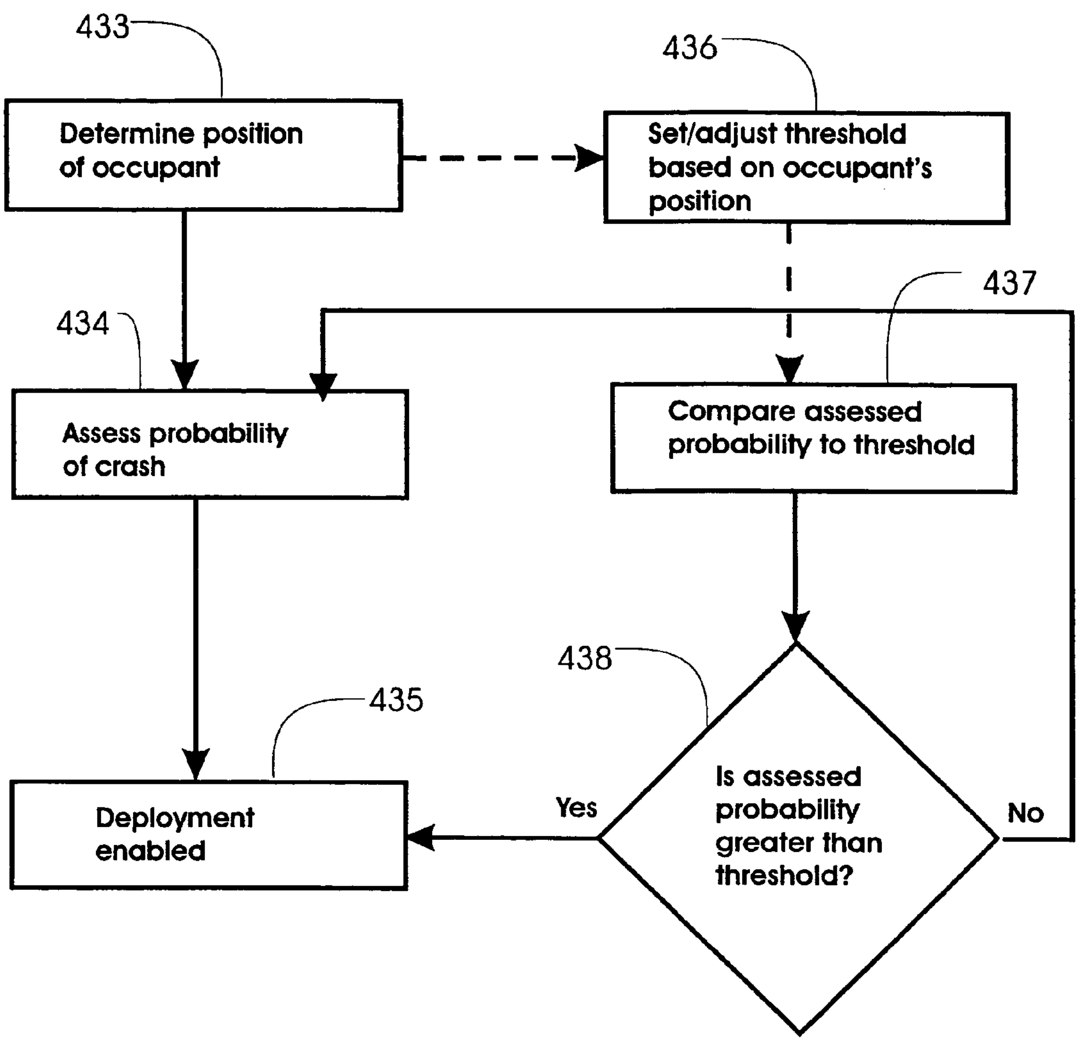

FIG. 72A shows a flowchart of the manner in which an airbag or other occupant restraint or protection device may be controlled based on the position of an occupant. The position of the occupant is determined at 433 by any one of a variety of different occupant sensing systems including a system designed to receive waves, energy or radiation from a space in a passenger compartment of the vehicle occupied by the occupant, and which also optionally transmit such waves, energy or radiation. A camera or other device for obtaining images, two or three-dimensional, of a passenger compartment of the vehicle occupied by the occupant and analyzing the images may be used. The image device may include a focusing system which focuses the images onto optical arrays and analyzes the focused images. A device which moves a beam of radiation through a passenger compartment of the vehicle occupied by the occupant may also be used, e.g., a scanning type of system. An electric field sensor operative in a seat occupied by the occupant and a capacitance sensor operative in the seat occupied by the occupant may also be used.

The probability of a crash is assessed at 434, e.g., by a crash sensor. Deployment of the airbag is then enabled at 435 in consideration of the determined position of the occupant and the assessed probability that a crash is occurring. A sensor algorithm may be used to receive the input from the crash sensor and occupant position determining system and direct or control deployment of the airbag based thereon. More particularly, in another embodiment, the assessed probability is analyzed, e.g., by the sensor algorithm, relative to a predetermined threshold at 437 whereby a determination is made at 438 if the assessed probability is greater than the threshold. If not, the probability of the crash is again assessed until the probability of a crash is greater than the threshold.

Optionally, the threshold is set or adjusted at 436 based on the determined position of the occupant.

Deployment of the airbag can entail disabling deployment of the airbag when the determined position is too close to the airbag, determining the rate at which the airbag is inflated based on the determined position of the occupant and/or determining the time in which the airbag is deployed based on the determined position of the occupant.

Disclosed above is an airbag system for inflation and deployment of an air bag in front of the passenger during a collision which comprises an air bag, an inflator connected to the air bag and structured and arranged to inflate the air bag with a gas, a passenger sensor system mounted at least partially adjacent to or on the interior roof of the vehicle, and a microprocessor electrically connected to the sensor system and to the inflator. The sensor system continuously senses the position of the passenger and generates electrical output indicative of the position of the passenger. The microprocessor compares and performs an analysis of the electrical output from the sensor system and activates the inflator to inflate and deploy the air bag when the analysis indicates that the vehicle is involved in a collision and that deployment of the air bag would likely reduce a risk of serious injury to the passenger which would exist absent deployment of the air bag and likely would not present an increased risk of injury to the passenger resulting from deployment of the air bag.

The sensor system might be designed to continuously sense position of the passenger relative to the air bag. The sensor system may comprise an array of passenger proximity sensors, each sensing distance from a passenger to the proximity sensor. In this case, the microprocessor determines the passenger's position by determining each of the distances and then triangulating the distances from the passenger to each of the proximity sensors. The microprocessor can include memory in which the positions of the passenger over some interval of time are stored. The sensor system may be particularly sensitive to the position of the head of the passenger.

14.12 Exterior Monitoring

Figure 73:
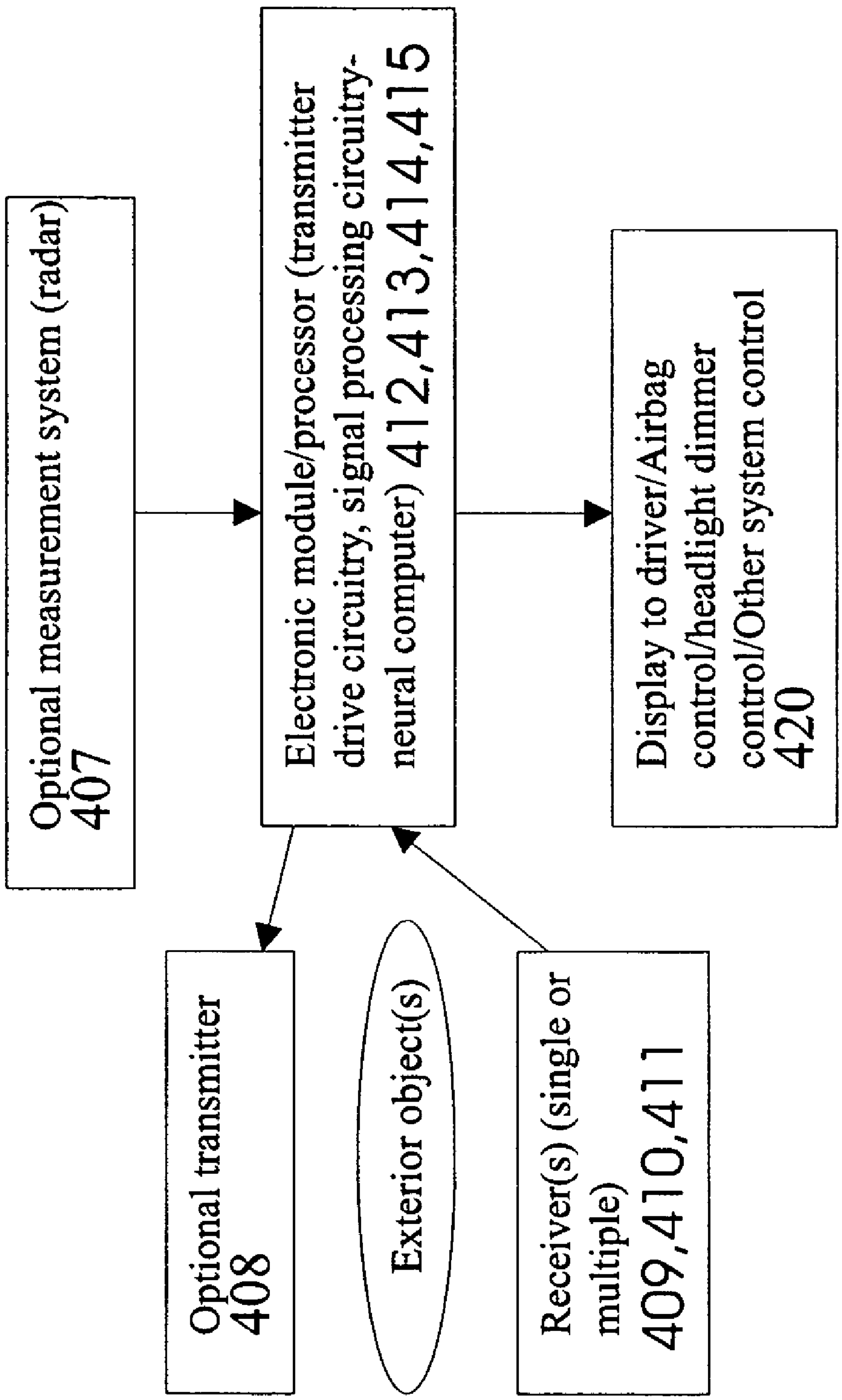
FIG. 73 is a schematic illustration of the exterior monitoring system in accordance with the invention.

Referring now to FIGS. 69 and 73, the same system can also be used for the detection of objects in the blind spots and other areas surrounding the vehicle and the image displayed for the operator to see or a warning system activated, if the operator attempts to change lanes, for example. In this case, the mounting location must be chosen to provide a good view along the side of the vehicle in order to pick up vehicles which are about to pass the subject vehicle 710. Each of the locations 408, 409 and 410 provide sufficient field of view for this application although the space immediately adjacent to the vehicle could be missed. Alternate locations include mounting onto the outside rear view mirror assembly or the addition of a unit in the rear window or C-Pillar, in which case, the contents of areas other than the side of the vehicle would be monitored. Using several receivers in various locations as disclosed above would provide for a monitoring system which monitors all of the areas around the vehicle. The mirror location, however, does leave the device vulnerable to being covered with ice, snow and dirt.

In many cases, neural networks are used to identify objects exterior of the vehicle and then an icon can be displayed on a heads-up display, for example, which provides control over the brightness of the image and permits the driver to more easily recognize the object.

In both cases of the anticipatory sensor and blind spot detector, the infrared transmitter and imager array system provides mainly image information to permit recognition of the object in the vicinity of vehicle 710, whether the object is alongside the vehicle, in a blind spot of the driver, in front of the vehicle or behind the vehicle, the position of the object being detected being dependent on the position and orientation of the receiver(s). To complete the process, distance information is also require as well as velocity information, which can in general be obtained by differentiating the position data or by Doppler analysis. This can be accomplished by any one of the several methods discussed above, such as with a pulsed laser radar system, stereo cameras, focusing system, structured light as well as with a radar system.

Radar systems, which may not be acceptable for use in the interior of the vehicle, are now commonly used in sensing applications exterior to the vehicle, police radar being one well-known example. Miniature radar systems are now available which are inexpensive and fit within the available space. Such systems are disclosed in the McEwan patents described above. Another advantage of radar in this application is that it is easy to get a transmitter with a desirable divergence angle so that the device does not have to be aimed. One particularly advantageous mode of practicing the invention for these cases, therefore, is to use radar and a second advantageous mode is the pulsed laser radar system, along with an imager array, although the use of two such arrays or the acoustical systems are also good choices. The acoustical system has the disadvantage of being slower than the laser radar device and must be mounted outside of the vehicle where it may be affected by the accumulation of deposits onto the active surface. If a radar scanner is not available it is difficult to get an image of objects approaching the vehicle so that the can be identified. Note that the ultimate solution to monitoring of the exterior of the vehicle may lay with SWIR, MWIR and LWIR if the proper frequencies are chosen that are not heavily attenuated by fog, snow and other atmospheric systems. The QWIP system discussed above or equivalent would be a candidate if the cooling requirement can be eliminated or the cost of cooling the imaging chip reduced. Finally, terahertz frequencies (approximately 0.1-5 THz) are beginning to show promise for this application. They can be generated using laser type devices and yet have almost the fog penetration ability of mm wave radar.

Another innovation involves the use of multiple frequencies for interrogating the environment surrounding a vehicle and in particular the space in front of the vehicle. Different frequencies interact differently with different materials. An example given by some to show that all such systems have failure modes is the case of a box that in one case contains a refrigerator while in another case a box of the same size that is empty. It is difficult to imagine how such boxes can reside on a roadway in front of a traveling vehicle but perhaps it fell off of a truck. Using optics it would be difficult if not impossible to make the distinction, however, some frequencies will penetrate a cardboard box exposing the refrigerator. One might ask, what happens if the box is made of metal? So there will always be rare cases where a distinction cannot be made. Nevertheless, a calculation can be made of the cost and benefits to be derived by fielding such a system that might occasionally make a mistake or, better, defaults to no system when it is in doubt.

In a preferred implementation, transmitter 408 is an infrared transmitter and receivers 409, 410 and 411 are CMOS transducers that receive the reflected infrared waves from vehicle 406. In the implementation shown in FIG. 69, an exterior airbag 416 is shown which deploys in the event that a side impact is about to occur as described in U.S. Pat. No. 6,343,810.

Referring now to FIG. 73, a schematic of the use of one or more receivers 409, 410, 411 to affect another system in the vehicle is shown. The general exterior monitoring system, or blind spot monitoring system if the environment exterior of the vehicle is not viewable by the driver in the normal course of driving the vehicle, includes one or more receivers 409, 410, 411 positioned at various locations on the vehicle for the purpose of receiving waves from the exterior environment. Instead of waves, and to the extent different than waves, the receivers 409, 410, 411 could be designed to receiver energy or radiation.

The waves received by receivers 409, 410, 411 contain information about the exterior objects in the environment, such waves either having been generated by or emanating from the exterior objects or reflected from the exterior objects such as is the case when the optional transmitter 408 is used. The electronic module/processor 412 contains the necessary circuitry 413,414 and a trained pattern recognition system (e.g., neural computer 415) to drive the transmitter 408 when present and process the received waves to provide a classification, identification and/or location of the exterior object. The classification, identification and/or location is then used to show an image on a display 420 viewable to the driver. Also, the classification, identification or location of the objects could be used for airbag control, i.e., control of the deployment of the exterior airbag 416 (or any other airbags for that matter), for the control of the headlight dimmers (as discussed elsewhere herein with reference to 74 or in general, for any other system whose operation might be changed based on the presence of exterior objects.

Figure 75:
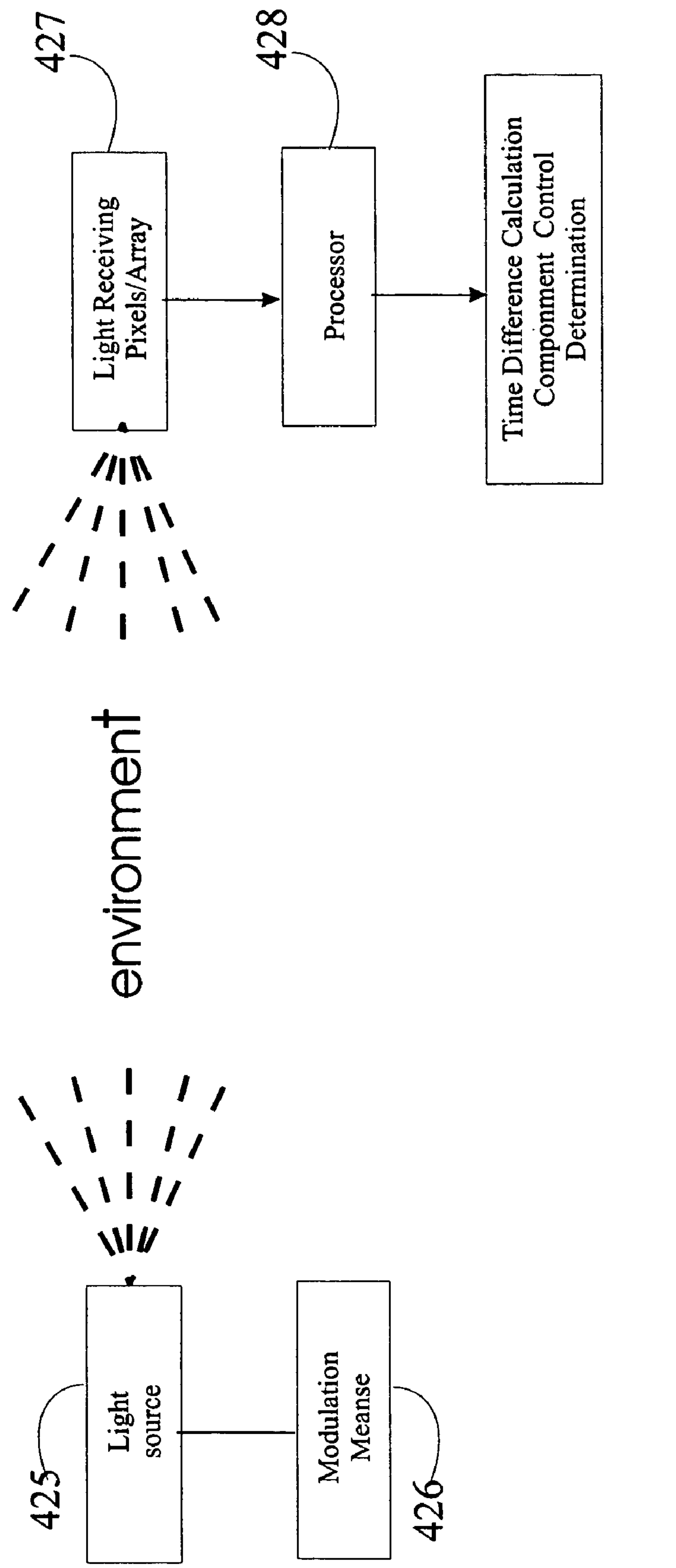
FIG. 75 is a schematic illustration of the position measuring in accordance with the invention.

FIG. 75 shows the components for measuring the position of an object in an environment of or about the vehicle. A light source 425 directs modulated light into the environment and at least one light-receiving pixel or an array of pixels 427 receives the modulated light after reflection by any objects in the environment. A processor 428 determines the distance between any objects from which the modulated light is reflected and the light source based on the reception of the modulated light by the pixel(s) 427. To provide the modulated light, a device or component for modulating a frequency of the light 426 are provided. Also, a device for providing a correlation pattern in a form of code division modulation of the light can be used. The pixel may be a photo diode such as a PIN or avalanche diode.

The processor 428 includes appropriate circuitry to determine the distance between any objects from which any pulse of light is reflected and the light source 425. For example, the processor 428 can determine this distance based on a difference in time between the emission of a pulse of light by the light source 425 and the reception of light by the pixel 427.

Figure 74:
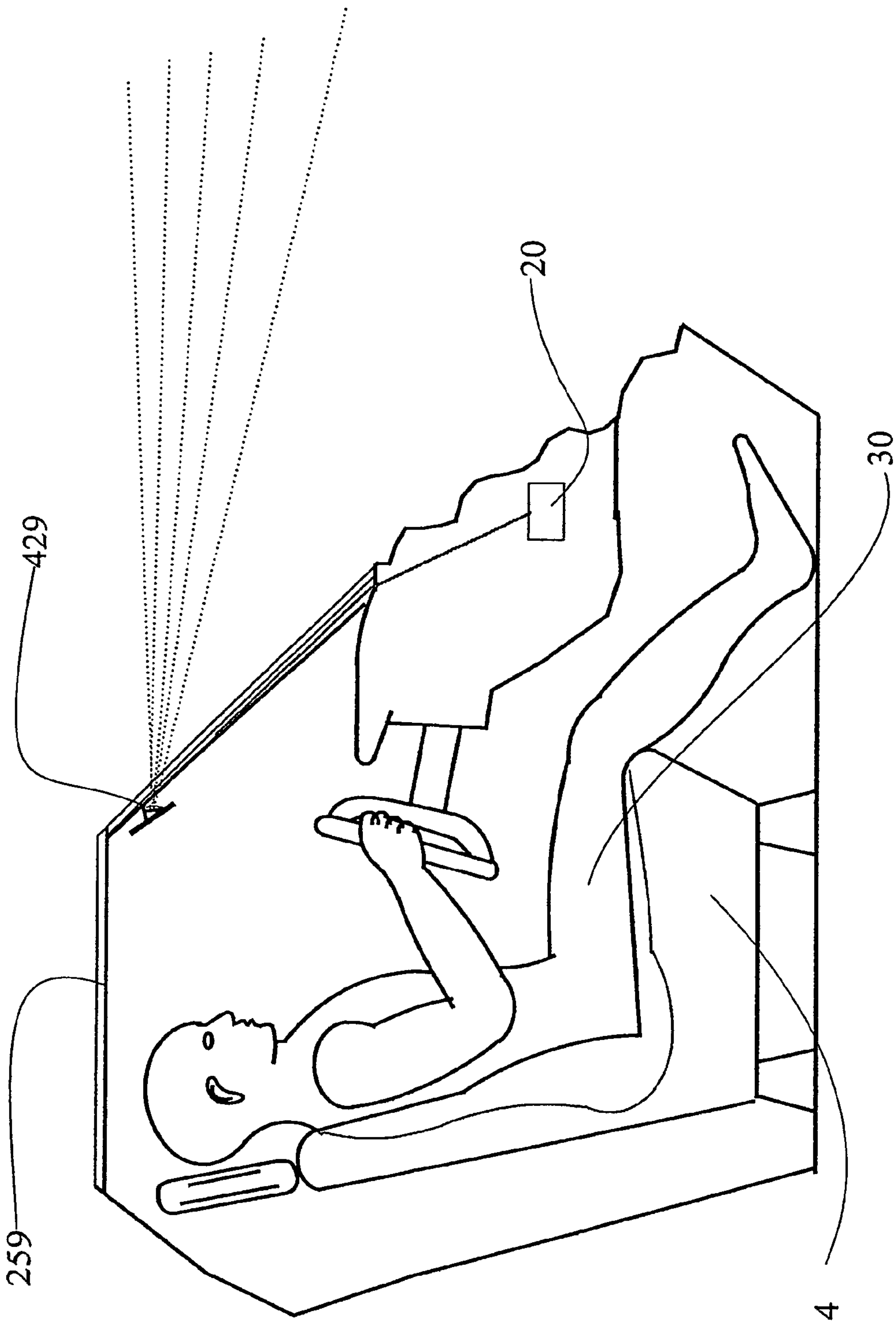
FIG. 74 is a side planar view, with certain portions removed or cut away, of a portion of the passenger compartment illustrating a sensor for sensing the headlights of an oncoming vehicle and/or the taillights of a leading vehicle used in conjunction with an automatic headlight dimming system.

FIG. 74 illustrates the exterior monitoring system for use in detecting the headlights of an oncoming vehicle or the taillights of a vehicle in front of vehicle 259. In this embodiment, the imager array 429 is designed to be sensitive to visible light and a separate source of illumination is not used. Once again for some applications, the key to this technology is the use of trained pattern recognition algorithms and particularly the artificial neural network. Here, as in the other cases above and in the patents and patent applications referenced above, the pattern recognition system is trained to recognize the pattern of the headlights of an oncoming vehicle or the tail lights of a vehicle in front of vehicle 259 and to then dim the headlights when either of these conditions is sensed. It is also trained to not dim the lights for other reflections such as reflections off of a sign post or the roadway. One problem is to differentiate taillights where dimming is desired from distant headlights where dimming is not desired. Three techniques are used: (i) measurement of the spacing of the light sources, (ii) determination of the location of the light sources relative to the vehicle, and (iii) use of a red filter where the brightness of the light source through the filter is compared with the brightness of the unfiltered light. In the case of the taillight, the brightness of the red filtered and unfiltered light is nearly the same while there is a significant difference for the headlight case. In this situation, either two CCD arrays are used, one with a filter, or a filter which can be removed either electrically, such as with a liquid crystal, or mechanically.

The environment surrounding the vehicle can be determined using an interior mounted camera that looks out of the vehicle. The status of the sun (day or night), the presence of rain, fog, snow, etc can thus be determined.

Naturally the information provided by the exterior monitoring system can be combined with the interior monitoring system in order to optimize both systems for the protection of the occupants.

14.13 Monitoring of Other Vehicles such as Cargo Containers, Truck Trailers and Railroad Cars 14.13.1 Monitoring the Interior Contents of a Shipping Container, Trailer, Boat, Shed, Etc.

Commercial systems are now available from companies such as Skybitz Inc. 45365 Vintage Park Plaza, Suite 210, Dulles, Va. 20166-6700, which will monitor the location of an asset anywhere on the surface of the earth. Each monitored asset contains a low cost GPS receiver and a satellite communication system. The system can be installed onto a truck, trailer, container, or other asset and it well periodically communicate with a low earth orbit (LEO) or a geostationary satellite providing the satellite with its location as determined by the GPS receiver or a similar system such as the Skybitz Global Locating System (GLS). The entire system operates off of a battery, for example, and if the system transmits information to the satellite once per day, the battery can last many years before requiring replacement. Thus, the system can monitor the location of a trailer, for example, once per day, which is sufficient if trailer is stationary. The interrogation rate can be automatically increased if the trailer begins moving. Such a system can last for 2 to 10 years without requiring maintenance depending on design, usage and the environment. Even longer periods are possible if power is periodically or occasionally available to recharge the battery such as by vibration energy harvesting, solar cells, capacitive coupling, inductive coupling, RF or vehicle power. In some cases an ultracapacitor as discussed above can be used in place of a battery.

The Skybitz system by itself only provides information as to the location of a container and not information about its contents, environment, and/or other properties. At least one of the inventions disclosed herein disclosed here is intended to provide this additional information, which can be coded typically into a few bytes and sent to the satellite along with the container location information and identification. First consider monitoring of the interior contents of a container. From here on, the terms "shipping container" or "container" will be used as a generic cargo holder and will include all cargo holders including standard and non-standard containers, boats, trucks, trailers, sheds, warehouses, storage facilities, tanks, buildings or any other such object that has space and can hold cargo. Most of these "containers" are also vehicles as defined above.

One method of monitoring the space inside such a container is to use ultrasound such as disclosed in U.S. Pat. Nos. 5,653,462, 5,829,782, USRE37260 (a reissue of U.S. Pat. No. 5,943,295), U.S. Pat. Nos. 5,901,978, 6,116,639, 6,186,537, 6,234,520, 6,254,127, 6,270,117, 6,283,503, 6,341,798, 6,397,136 and RE 37,260 for monitoring the interior of a vehicle. Also, reference is made to U.S. Patents U.S. Pat. No. 6,279,946, which discusses various ways to use an ultrasonic transducer while compensating for thermal gradients. Reference is also made to U.S. Pat. Nos. 5,653,462, 5,694,320, 5,822,707, 5,829,782, 5,835,613, 5,485,000, 5,488,802, 5,901,978, 6,309,139, 6,078,854, 6,081,757, 6,088,640, 6,116,639, 6,134,492, 6,141,432, 6,168,198, 6,186,537, 6,234,519, 6,234,520, 6,224,701, 6,253,134, 6,254,127, 6,270,116, 6,279,946, 6,283,503, 6,324,453, 6,325,414, 6,330,501, 6,331,014, RE37260 6,393,133, 6,039,7136, 6,412,813, 6,422,595, 6,452,870, 6,442,504, 6,445,988, 6,442,465, which disclose inventions that may be incorporated into the invention(s) disclosed herein.

Consider now a standard shipping container that is used for shipping cargo by boat, trailer, or railroad. Such containers are nominally 8'w×8'h×20' or 40' long outside dimensions, however, a container 48' in length is also sometimes used. The inside dimensions are frequently around 4" less than the outside dimensions. In a simple interior container monitoring system, one or more ultrasonic transducers can be mounted on an interior part of the container adjacent the container's ceiling in a protective housing. Periodically, the ultrasonic transducers can emit a few cycles of ultrasound and receive reflected echoes of this ultrasound from walls and contents of the trailer. In some cases, especially for long containers, one or more transducers, typically at one end of the container, can send to one or more transducers located at, for example, the opposite end. Usually, however, the transmitters and receivers are located near each other. Due to the long distance that the ultrasound waves must travel especially in the 48 foot container, it is frequently desirable to repeat the send and receive sequence several times and to add or average the results. This has the effect of improving the signal to noise ratio. Note that the system disclosed herein and in the parent patents and applications is able to achieve such long sensing distances due to the principles disclosed herein. Competitive systems that are now beginning to enter the market have much shorter sensing distances and thus a key invention herein is the ability to achieve sensing distances in excess of 20 feet.

Note that in many cases several transducers are used for monitoring the vehicle such as a container that typically point in slightly different directions. Naturally this need not be the case and a movable mounting is also contemplated where the motion is accomplished by any convenient method such as a magnet, motor, etc.

Referring to FIG. 130, a container 480 is shown including an interior sensor system 481 arranged to obtain information about contents in the interior of the container 480. The interior sensor system includes a wave transmitter 482 mounted at one end of the container 480 and which operatively transmits waves into the interior of the container 480 and a wave receiver 483 mounted adjacent the wave transmitter 482 and which operatively receives waves from the interior of the container 480. As shown, the transmitter 482 and receiver 483 are adjacent one another but such a positioning is not intended to limit the invention. The transmitter 482 and receiver 483 can be formed as a single transducer or may be spaced apart from one another. Multiple pairs of transmitter/receivers can also be provided, for example transmitter 482' and receiver 483' are located at an opposite end of the container 480 proximate the doors 484.

The interior sensor system 481 includes a processor coupled to the receiver 483, and optionally the transmitter 482, and which is resident on the container 480, for example, in the housing of the receiver 483 or in the housing of a communication system 485. The processor is programmed to compare waves received by each receiver 483, 483' at different times and analyze either the received waves individually or the received waves in comparison to or in relation to other received waves for the purpose of providing information about the contents in the interior of the container 480. The processor can employ pattern recognition techniques and as discussed more fully below, be designed to compensate for thermal gradients in the interior of the container 480. Information about the contents of the container 480 may comprise the presence or motion of objects in the interior. The processor may be associated with a memory unit which can store data on the location of the container 480 and the analysis of the data from the interior sensor system 481.

The container 480 also includes a location determining system 486 which monitors the location of the container 480. To this end, the location determining system can be any asset locator in the prior art, which typically include a GPS receiver, transmitter and appropriate electronic hardware and software to enable the position of the container 480 to be determined using GPS technology or other satellite or ground-based technology including those using the cell phone system or similar location based systems.

The communication system 485 is coupled to both the interior sensor system 481 and the location determining system 486 and transmits the information about the contents in the interior of the container 480 (obtained from the interior sensor system 481) and the location of the container 480 (obtained from the location determining system 486). This transmission may be to a remote facility wherein the information about the container 480 is stored, processed, counted, reviewed and/or monitored and/or retransmitted to another location, perhaps by way of the Internet.

The container 480 also includes a door status sensor 487 arranged to detect when one or both doors 484 is/are opened or closed after having been opened. The door status sensor 487 may be an ultrasonic sensor which is positioned a fixed distance from the doors 484 and registers changes in the position of the doors 484. Alternately, other door status systems can be used such as those based on switches, magnetic sensors or other technologies. The door status sensor 487 can be programmed to associate an increase in the distance between the sensor 487 and each of the doors 484 and a subsequent decrease in the distance between the sensor 487 and that door 484 as an opening and subsequent closing of that door 484. In the alternative, a latching device can be provided to detect latching of each door 484 upon its closure. The door status sensor 487 is coupled to the interior sensor system 481, or at least to the transmitters 482,482' so that the transmitters 482,482' can be designed to transmit waves into the interior of the container 480 only when the door status sensor 487 detects when at least one door 484 is closed after having been opened. For other purposes, the ultrasonic sensors may be activated on opening of the door(s) in order to monitor the movement of objects into or out of the container, which might in turn be used to activate an RFID or bar code reading system or other object identification system.

When the ultrasonic transducers are first installed into the container 480 and the doors 484 closed, an initial pulse transmission can be initiated and the received signal stored to provide a vector of data that is representative of an empty container. To initiate the pulse transmission, an initiation device or function is provided in the interior sensor system 481, e.g., the door status sensor 487. At a subsequent time when contents have been added to the container (as possibly reflected in the opening and closing of the doors 484 as detected by the door status sensor 487), the ultrasonic transducers can be commanded to again issue a few cycles of ultrasound and record the reflections. If the second pattern is subtracted from the first pattern, or otherwise compared, in the processor the existence of additional contents in the container 480 will cause the signal to change, which thus causes the differential signal to change and the added contents detected. Vector as used herein with ultrasonic systems is a linear array of data values obtained by rectifying, taking the envelope and digitizing the returned signal as received by the transducer or other digital representation comprising at least a part of the returned signal.

When a container 480 is exposed to sunlight on its exterior top, a stable thermal gradient can occur inside the container 480 where the top of the container 480 near the ceiling is at a significantly higher temperature than the bottom of the container 480. This thermal gradient changes the density of the gas inside the container causing it to act as a lens to ultrasound that diffracts or bends the ultrasonic waves and can significantly affect the signals sensed by the receiver portions 483, 483' of the transducers. Thus, the vector of sensed data when the container is at a single uniform temperature will look significantly different from the vector of sensed data acquired within the same container when thermal gradients are present.

It is even possible for currents of heated air to occur within a container 480 if a side of the container is exposed to sunlight. Since these thermal gradients can substantially affect the vector, the system must be examined under a large variety of different thermal environments. This generally requires that the electronics be designed to mask somewhat the effects of the thermal gradients on the magnitude of the sensed waves while maintaining the positions of these waves in time. This can be accomplished as described in detail in the above-referenced patents and patent applications through the use, for example, of a logarithmic compression circuit. There are other methods of minimizing the effect on the reflected wave magnitudes that will accomplish substantially the same result some of which are disclosed elsewhere herein.

When the complicating aspects of thermal gradients are taken into account, in many cases a great deal of data must be taken with a large number of different occupancy situations to create a database of perhaps 10,000 to one million vectors each representing the different occupancy state of the container in a variety of thermal environments. This data can then be used to train a pattern recognition system such as a neural network, modular or combination neural network, cellular neural network, support vector machine, fuzzy logic system, Kalman filter system, sensor fusion system, data fusion system or other classification system. Since all containers of the type transported by ships, for example, are of standard sizes, only a few of these training exercises need to be conducted, typically one for each different geometry container. The process of adapting an ultrasonic occupancy monitoring system to a container or other space is described in considerable detail for automobile interior monitoring in the above-referenced patents and patent applications, and elsewhere herein, and therefore this process need not be repeated here.

Other kinds of interior monitoring systems can be used to determine and characterize the contents of a space such as a container. One example uses a scanner and photocell 488, as in a laser radar system, and can be mounted near the floor of the container 480 and operated to scan the space above the floor in a plane located, for example, 10 cm above the floor. Since the distance to a reflecting wall of the container 480 can be determined and recorded for each angular position of the scanner, the distance to any occupying item will show up as a reflection from an object closer to the scanner and therefore a shadow graph of the contents of the container 10 cm above the floor can be obtained and used to partially categorize the contents of the container 480. Categorization of the contents of the container 480 may involve the use of pattern recognition technologies. Naturally, other locations of such a scanning system are possible.

In both of these examples, relatively little can be said about the contents of the container other then that something is present or that the container is empty. Frequently this is all that is required. A more sophisticated system can make use of one or more imagers (for example cameras) 489 mounted near the ceiling of the container, for example. Such imagers can be provided with a strobe flash and then commanded to make an image of the trailer interior at appropriate times. The output from such an imager 489 can also be analyzed by a pattern recognition system such as a neural network or equivalent, to reduce the information to a few bytes that can be sent to a central location via an LEO or geostationary satellite, for example. As with the above ultrasonic example, one image can be subtracted from the empty container image and if anything remains then that is a representation of the contents that have been placed in the container. Also, various images can be subtracted to determine the changes in container contents when the doors are opened and material is added or removed or to determine changes in position of the contents. Various derivatives of this information can be extracted and sent by the telematics system to the appropriate location for monitoring or other purposes.

Each of the systems mentioned above can also be used to determine whether there is motion of objects within the container relative to the container. Motion of objects within the container 480 would be reflected as differences between the waves received by the transducers (indicative of differences in distances between the transducer and the objects in the container) or images (indicative of differences between the position of objects in the images). Such motion can also aid in image segmentation which in turn can aid in the object identification process. This is particularly valuable if the container is occupied by life forms such as humans.

In the system of FIG. 130, wires (not shown) are used to connect the various sensors and devices. It is contemplated that all of the units in the monitoring system can be coupled together wirelessly, using for example the Bluetooth, WI-FI or other protocol.

If an inertial device 490 is also incorporated, such as the MEMSIC dual axis accelerometer, which provides information as to the accelerations of the container 480, then this relative motion can be determined by the processor and it can be ascertained whether this relative motion is caused by acceleration of the container 480, which may indicate loose cargo, and/or whether the motion is caused by the sensed occupying item. In latter case, a conclusion can perhaps be reached that container is occupied by a life form such as an animal or human. Additionally, it may be desirable to place sensors on an item of cargo itself since damage to the cargo could occur from excessive acceleration, shock, temperature, vibration, etc. regardless of whether the same stimulus was experienced by the entire container. A loose item of cargo, for example, may be impacting the monitored item of cargo and damaging it. Relative motion can also be sensed in some cases from outside of the container through the use of accelerometers, microphones or MIR (Micropower Impulse Radar). Note that all such sensors regardless of where they are placed are contemplated herein and are part of the present inventions.

Chemical sensors 491 based on surface acoustic wave (SAW) or other technology can in many cases be designed to sense the presence of certain vapors in the atmosphere and can do so at very low power. A properly designed SAW or equivalent sensing device, for example, can measure acceleration, angular rate, strain, temperature, pressure, carbon dioxide concentration, humidity, hydrocarbon concentration, and the presence or concentration of many other chemicals. A separate SAW or similar device may be needed for each chemical species (or in some cases each class of chemicals) where detection is desired. The devices, however, can be quite small and can be designed to use very little power. Such a system of SAW or equivalent devices can be used to measure the existence of certain chemical vapors in the atmosphere of the container much like a low power electronic nose. In some cases, it can be used to determine whether a carbon dioxide source such as a human is in the container. Such chemical sensing devices can also be designed, for example, to monitor for many other chemicals including some narcotics, hydrocarbons, mercury vapor, and other hazardous chemicals including some representative vapors of explosives or some weapons of mass destruction. With additional research, SAW or similar devices can also be designed or augmented to sense the presence of radioactive materials, and perhaps some biological materials such as smallpox or anthrax. In many cases, such SAW devices do not now exist, however, researchers believe that given the proper motivation that such devices can be created. Thus, although heretofore not appreciated, SAW or equivalent based systems can monitor a great many dangerous and hazardous materials that may be either legally or illegally occupying space within a container, for example. In particular, the existence of spills or leakages from the cargo can be detected in time to perhaps save damage to other cargo either within the container or in an adjacent container. Although SAW devices have in particular been described, other low power devices using battery or RF power can also be used where necessary. Note, the use of any of the afore mentioned SAW devices in connection within or on a vehicle for any purpose other than tire pressure and temperature monitoring or torque monitoring is new and contemplated by the inventions disclosed herein. Naturally only a small number of examples are presented of the general application of the SAW, or RFID, technology to vehicles.

Other sensors that can be designed to operate under very low power levels include microphones 492 and light sensors 493 or sensors sensitive to other frequencies in the electromagnetic spectrum as the need arises. The light sensors 493 could be designed to cause activation of the interior sensor system 481 when the container is being switched from a dark condition (normally closed) to a light situation (when the door or other aperture is opened). A flashlight could also activate the light sensor 493.

Instead of one or more batteries providing power to the interior sensor system 481, the communication system 485 and the location determining system 486, solar power can be used. In this case, one or more solar panels 494 are attached to the upper wall of the container 480 (see FIG. 1) and electrically coupled to the various power-requiring components of the monitoring system. A battery can thus be eliminated. In the alternative, since the solar panel(s) 494 will not always be exposed to sunlight, a rechargeable battery can be provided which is charged by the solar panel 494 when the solar panels are exposed to sunlight. A battery could also be provided in the event that the solar panel 494 does not receive sufficient light to power the components of the monitoring system. In a similar manner, power can temporarily be supplied by a vehicle such as a tractor either by a direct connection to the tractor power or though capacitive, inductive or RF coupling power transmission systems. As above an ultracapacitor can be used instead of a battery and energy harvesting can be used if there is a source of energy such as light or vibration in the environment.

In some cases, a container is thought to be empty when in fact it is being surreptitiously used for purposes beyond the desires of the container owner or law enforcement authorities. The various transducers that can be used to monitor interior of a container as described above, plus others, can also be used to allow the trailer or container owner to periodically monitor the use of his property.

14.13.2 Monitoring the Entire Asset

Immediately above, monitoring of the interior of the container is described. If the container is idle, there may not the need to frequently monitor the status of the container interior or exterior until some event happens. Thus, all monitoring systems on the container can be placed in the sleep mode until some event such as a motion or vibration of the container takes place. Other wakeup events could include the opening of the doors, the sensing of light or a change in the interior temperature of the container above a reference level, for example. When any of these chosen events occurs, the system can be instructed to change the monitoring rate and to immediately transmit a signal to a satellite or another communication system, or respond to a satellite-initiated signal for some LEO-based, or geocentric systems, for example. Such an event may signal to the container owner that a robbery was in progress either of the interior contents of the container or of the entire container. It also might signal that the contents of the container are in danger of being destroyed through temperature or excessive motion or that the container is being misappropriated for some unauthorized use.

FIG. 131 shows a flowchart of the manner in which container 480 may be monitored by personnel or a computer program at a remote facility for the purpose of detecting unauthorized entry into the container and possible theft of the contents of the container 480. Initially, the wakeup sensor 495 detects motion, sound, light or vibration including motion of the doors 484, or any other change of the condition of the container 480 from a stationary or expected position. The wakeup sensor 495 can be designed to provide a signal indicative of motion only after a fixed time delay, i.e., a period of “sleep”. In this manner, the wakeup sensor would not be activated repeatedly in traffic stop and go situations.

The wakeup sensor 495 initiates the interior sensor system 481 to perform the analysis of the contents in the interior of the container, e.g., send waves into the interior, receive waves and then process the received waves. If motion in the interior of the container is not detected at 496, then the interior sensor system 481 may be designed to continue to monitor the interior of the container, for example, by periodically re-sending waves into the interior of the container. If motion is detected at 496, then a signal is sent at 497 to a monitoring facility via the communication system 485 and which includes the location of the container 480 obtained from the location determining system 486 or by the ID for a permanently fixed container or other asset, structure or storage facility. In this manner, if the motion is determined to deviate from the expected handling of the container 480, appropriate law enforcement personnel can be summoned to investigate.

When it is known and expected that the container should be in motion, monitoring of this motion can still be important. An unexpected vibration could signal the start of a failure of the chassis tire, for example, or failure of the attachment to the chassis or the attachment of the chassis to the tractor. Similarly, an unexpected tilt angle of the container may signify a dangerous situation that could lead to a rollover accident and an unexpected shock could indicate an accident has occurred. Various sensors that can be used to monitor the motion of the container include gyroscopes, accelerometers and tilt sensors. An IMU (Inertial Measurement Unit) containing for example three accelerometers and three gyroscopes can be used.

In some cases, the container or the chassis can be provided with weight sensors that measure the total weight of the cargo as well as the distribution of weight. By monitoring changes in the weight distribution as the vehicle is traveling, an indication can result that the contents within the trailer are shifting which could cause damage to the cargo. An alternate method is to put weight sensors in the floor or as a mat on the floor of the vehicle. The mat design can use the bladder principles described above for weighing b vehicle occupants using, in most cases, multiple chambers. Strain gages can also be configured to measure the weight of container contents. An alternate approach is to use inertial sensors such as accelerometers and gyroscopes to measure the motion of the vehicle as it travels. If the characteristics of the input accelerations (linear and angular) are known from a map, for example, or by measuring them on the chassis then the inertial properties of the container can be determined and thus the load that the container contains. This is an alternate method of determining the contents of a container. If several (usually 3) accelerometers and several (usually 3) gyroscopes are used together in a single package then this is known as an inertial measurement unit. If a source of position is also known such as from a GPS system then the errors inherent in the IMU can be corrected using a Kalman filter.

Other container and chassis monitoring can include the attachment of a trailer to a tractor, the attachment of electrical and/or communication connections, and the status of the doors to the container. If the doors are opened when this is not expected, this could be an indication of a criminal activity underway. Several types of security seals are available including reusable seals that indicate when the door is open or closed or if it was ever opened during transit, or single use seals that are destroyed during the process of opening the container.

Another application of monitoring the entire asset would be to incorporate a diagnostic module into the asset. Frequently, the asset may have operating parts, e.g., if it is a refrigerated and contains a refrigeration unit. To this end, sensors can be installed on the asset and monitored using pattern recognition techniques as disclosed in U.S. Pat. Nos. 5,809,437 and 6,175,787. As such, various sensors would be placed on the container 480 and used to determine problems with the container 480 which might cause it to operate abnormally, e.g., if the refrigeration unit were about to fail because of a refrigerant leak. In this case, the information about the expected failure of the refrigeration unit could be transmitted to a facility and maintenance of the refrigeration unit could be scheduled.

It can also be desirable to detect unauthorized entry into container, which could be by cutting with a torch, or motorized saw, grinding, or blasting through the wall, ceiling, or floor of the container. This event can be detected by one or more of the following methods:

1. A light sensor which measures any part of the visible or infrared part of the spectrum and is calibrated to the ambient light inside the container when the door is closed and which then triggers when light is detected above ambient levels and door is closed.
2. A vibration sensor attached to wall of container which triggers on vibrations of an amplitude and/or frequency signature indicative of forced entry into the container. The duration of signal would also be a factor to consider. The algorithm could be derived from observations and tests or it could use a pattern recognition approach such as Neural Networks.
3. An infrared or carbon dioxide sensor could be used to detect human presence, although a carbon dioxide sensor would probably require a prolonged exposure.
4. Various motion sensors as discussed above can also be used, but would need to be resistant to triggering on motion typical of cargo transport. Thus a trained pattern recognition algorithm might be necessary.
5. The Interior of the container can be flooded with waves (ultrasonic or electromagnetic) and the return signature evaluated by a pattern recognition system such as a neural network trained to recognize changes consistent with the removal of cargo or the presence of a person or people. Alternately the mere fact that the pattern was changing could be indicative of human presence.

As discussed above and below, information from entry/person detector could be sent to communication network to notify interested parties of current status. Additionally, an audible alarm may be sounded and a photo could also be taken to identify the intruder. Additionally, motion sensors such as an accelerometer on a wall or floor of a vehicle such as a container or an ultrasonic or optical based motion detector such as used to turn on residential lights and the like, can also be used to detect intrusion into a vehicle and thus are contemplated herein. Such sensors can be mounted at any of the preferred locations disclosed herein or elsewhere in or on the vehicle. If a container, for example, is closed, a photocell connected to a pattern recognition system such as a neural network, for example can be trained to be sensitive to very minute changes in light such as would occur when an intruder opens a door or cuts a hole in a wall, ceiling or the floor of a vehicle even on a dark night. Even if there are holes in the vehicle that allow light to enter, the rate of change of this illumination can be detected and used as an indication of an intrusion.

It is noteworthy that systems based on the disclosure above can be configured to monitor construction machinery to prevent theft or at least to notify others that a theft is in progress.

14.13.3 Recording

In many cases it is desirable to obtain and record additional information about the cargo container and its contents. As mentioned above, the weight of the container with its contents and the distribution and changes in this weight distribution could be valuable for a safety authority investigating an accident, for highway authorities monitoring gross vehicle weight, for container owners who charge by the used capacity, and others. The environment that the container and its contents have been subjected to could also be significant information. Such things as whether the container was flooded, exposed to a spill or leakage of a hazardous material, exposed to excessive heat or cold, shocks, vibration etc. can be important historical factors for the container affecting its useful life, establishing liability for damages etc. For example, a continuous monitoring of container interior temperature could be significant for perishable cargo and for establishing liability.

With reference to FIG. 132A, in some cases, the individual cargo items 498 can be tagged with RFID or SAW tags 499 and the presence of this cargo in the container 480 could be valuable information to the owner of the cargo. One or more sensors on the container that periodically read RFID tags could be required, such as one or more RFID interrogators 500 which periodically sends a signal which will causes the RFID tags 499 to generate a responsive signal. The responsive signal generated by the RFID tags 499 will contain information about the cargo item on which the RFID tag 499 is placed. Multiple interrogators or at least multiple antennas may be required depending on the size of the container. The RFID can be based on a SAW thus providing greater range for a passive system or it can also be provided with an internal battery or ultracapacitor for even greater range. Naturally energy harvesting can also be used if appropriate.

Similarly, for certain types of cargo, a barcode system might acceptable, or another optically readable identification code. The cargo items would have to be placed so that the identification codes are readable, i.e., when a beam of light is directed over the identification codes, a pattern of light is generated which contains information about the cargo item. As shown in FIG. 132B, the cargo items in this case are boxes having an equal height so that a space remains between the top of the boxes 501 and the ceiling of the container 480. One or more optical scanners 502, including a light transmitter and receiver, are arranged on the ceiling of the container and can be arranged to scan the upper surfaces of the boxes 503, possibly by moving the length of the container 480, or through a plurality of such sensors. During such a scan, patterns of light are reflected from the barcodes 501 on the upper surfaces of the boxes 503 and received by the optical scanner 502. The patterns of light contain information about the cargo items in the boxes 503. Receivers can be arranged at multiple locations along the ceiling. Other arrangements to ensure that a light beam traverses a barcode 501 and is received by a receiver can also be applied in accordance with the invention. As discussed above, other tag technologies can be used if appropriate such as those based of magnetic wires.

The ability to read barcodes and RFID tags provides the capability of the more closely tracking of packages for such organizations as UPS, Federal Express, the U.S. Postal Service and their customers. Now, in some cases, the company can ascertain that a given package is in fact on a particular truck or cargo transporter and also know the exact location of the transporter.

Frequently, a trailer or container has certain hardware such as racks for automotive parts, for example, that are required to stay with the container. During unloading of the cargo these racks, or other sub-containers, could be removed from the container and not returned. If the container system knows to check for the existence of these racks, then this error can be eliminated. Frequently, the racks are of greater value then the cargo they transport. Using RFID tags and a simple interrogator mounted on the ceiling of the container perhaps near the entrance, enables monitoring of parts that are taken in or are removed from the container and associated with the location of container. By this method, pilferage of valuable or dangerous cargo can at least be tracked.

Containers constructed in accordance with the invention will frequently have a direct method of transmitting information to a satellite. Typically, the contents of the container are more valuable than the truck or chassis for the case of when the container is not a trailer. If the tractor, train, plane or ship that is transporting the container is experiencing difficulties, then this information can be transmitted to the satellite system and thus to the container, carrier, or cargo owner or agent for attention. Information indicating a problem with carrier (railroad, tractor, plane, boat) may be sensed and reported onto a bus such as CAN bus which can be attached either wirelessly or by wires to the container. Alternately, sensors on the container can determine through vibrations etc. that the carrier may be experiencing problems. The reporting of problems with the vehicle can come from dedicated sensors or from a general diagnostic system such as described in U.S. Pat. Nos. 5,809,437 and 6,175,787, and herein. Whatever the source of the diagnostic information, especially when valuable or dangerous cargo is involved, this information in coded form can be transmitted to a ground station, LEO or geostationary satellite as discussed above. Other information that can be recorded by container includes the identification of the boat, railroad car, or tractor and operator or driver.

The experiences of the container can be recorded over time as a container history record to help in life cycle analysis to determine when a container needs refurbishing, for example. This history in coded form could reside on a memory that is resident on the container or preferably the information can be stored on a computer file associated with that container in a database. The mere knowledge of where a container has been, for example, may aid law enforcement authorities to determine which containers are most likely to contain illegal contraband.

The pertinent information relative to a container can be stored on a tag that is associated and physically connected to the container. This tag may be of the type that can be interrogated remotely to retrieve its contents. Such a tag, for example, could contain information as to when and where the container was most recently opened and the contents of the container. Thus, as containers enter a port, their tags can each be interrogated to determine their expected contents and also to give a warning for those containers that should be inspected more thoroughly. In most cases, the tag information will not reside on the container but in fact will be on a computer file accessible by those who have an authorization to interrogate the file. Thus, the container need only have a unique identification number that cannot easily be destroyed, changed or otherwise tampered with. These can be visual and painted on the outside of the container or an RFID, barcode or other object identification system can be used. Again, the tags can be based on passive SAW technology to give greater range or could contain a battery or ultracapacitor for even greater range. The tag can be in a sleep mode until receiving a wakeup call to further conserve battery power.

FIG. 133 shows a flow chart of the manner in which multiple assets may be monitored using a data processing and storage facility 510, each asset having a unique identification code. The location of each asset is determined at 511, along with one or more properties or characteristics of the contents of each asset at 512, one or more properties of the environment of each asset at 513, and/or the opening and/or closing of the doors of each asset at 514. This information is transmitted to the data processing and storage facility 510 as represented by 515 with the identification code. Information about the implement being used to transport the asset and the individual(s) or company or companies involved in the transport of the asset can also be transmitted to the facility as represented by 516. This latter information could be entered by an input device attached to the asset.

The data processing and storage facility 510 is connected to the Internet at 517 to enable shippers 518 to check the location and progress of the asset, the contents of the asset, the environment of the asset, whether the doors are being opened and closed impermissibly and the individual and companies handling the asset. The same information, or a subset of this information, can also be accessed by law enforcement personnel at 519 and maritime/port authorities at 520. Different entities can be authorized to access different items of information or subsets of the total information available relating to each asset.

For anti-theft purposes, the shipper enters the manifest of the asset using an input device 521 so that the manifest can be compared to the contents of the asset (at 522). A determination is made at 523 as to whether there are any differences between the current contents of the asset and the manifest. For example, the manifest might indicate the presence of contents whereas the information transmitted by the asset reveals that it does not contain any objects. When such a discrepancy is revealed, the shipment can be intercepted at 524 to ascertain the whereabouts of the cargo. The history of the travels of the asset would also be present in the data facility 510 so that it can be readily ascertained where the cargo disappeared. If no discrepancy is revealed, the asset is allowed to proceed at 525.

14.13.4 Exterior Monitoring Near a Vehicle

Having the ability to transmit coded information to a satellite, or other telematics system, using a low cost device having a battery that lasts for many years opens up many other, previously impractical opportunities. Many of these opportunities are discussed above and below and all are teachings of at least one of the inventions disclosed herein. In this section, opportunities related to monitoring the environment in the vicinity of the container will be discussed. Many types of sensors can be used for the purpose of exterior monitoring including ultrasound, imagers such as cameras both with and without illumination including visual, infrared or ultraviolet imagers, radar, scanners including laser radar and phased array radar, other types of sensors which sense other parts of the electromagnetic spectrum, capacitive sensors, electric or magnetic field sensors, and chemical sensors among others.

Cameras either with or without a source of illumination can be used to record people approaching the container and perhaps stealing the contents of the container. At the appropriate frequencies, (tetra Hertz, for example) the presence of concealed weapons can be ascertained as described in *Alien Vision: Exploring the Electromagnetic Spectrum With Imaging Technology* (SPIE Monograph Vol. PM 104) by Austin Richards. Infrared sensors can be used to detect the presence of animal life including humans in the vicinity of container. Radio frequency sensors can sense the presence of authorized personnel having a keyless entry type transmitter or a SAW, RFID or similar device of the proper design. In this way, the container can be locked as a safe, for example, and only permit an authorized person carrying the proper identification to open the container or other storage facility.

A pattern recognition system can be trained to identify facial or iris patterns, for example, of authorized personnel or ascertain the identity of authorized personnel to prevent theft of the container. Such a pattern recognition system can operate on the images obtained by the cameras. That is, if the pattern recognition system is a neural network, it would be trained to identify or ascertain the identity of authorized personnel based on images of such personnel during a training phase and thus operationally only allow such personnel to open the container, enter the container and/or handle the container.

Naturally a wide variety of smart cards, biometric identification systems (such as fingerprints, voice prints and Iris scans) can be used for the same purpose. When an unauthorized person approaches the container, his or her picture can be taken and in particular, if sensors determine that someone is attempting to force entry into the container, that person's picture can be relayed via the communication system to the proper authorities. Cameras with a proper pattern recognition system can also be used to identify if an approaching person is wearing a disguise such as a ski mask or is otherwise acting in a suspicious manner. This determination can provide a critical timely warning and in some cases permit an alarm to be sounded or otherwise notify the proper authorities.

Capacitance sensors or magnetic sensors can be used to ascertain that the container is properly attached to a trailer. An RFID or barcode scanner on the container can be used to record the identification of the tractor, trailer, or other element of the transportation system. These are just a small sampling of the additional sensors that can be used with the container or even mounted on a tractor or chassis to monitor the container. With the teachings of at least one of the inventions disclosed herein, the output of any of these sensors can now be transmitted to a remote facility using a variety of telematics methods including communication via a low power link to a satellite, such as provided by the Skybitz Corporation as described above and others.

Thus, as mentioned above, many new opportunities now exist for applying a wide variety of sensors to a cargo container or other object as discussed above and below. Through a communication system such as a LEO or geostationary or other satellite system, critical information about the environment of container or changes in that environment can be transmitted to the container owner, law enforcement authorities, container contents owner etc. Furthermore, the system is generally low cost and does not require connection to an external source of power. The system generally uses low power from a battery that can last for years without maintenance, 14.13.5 Analysis Many of the sensor systems described above output data that can best be analyzed using pattern recognition systems such as neural networks, cellular neural networks, fuzzy logic, sensor fusion, modular neural networks, combination neural networks, support vector machines, neural fuzzy systems or other classifiers that convert the pattern data into an output indicative of the class of the object or event being sensed. One interesting method, for example, is the ZISC® chip system of Silicon Recognition Inc., Petaluna, Calif. A general requirement for the low power satellite monitoring system is that the amount of data routinely sent to the satellite be kept to a minimum. For most transmissions, this information will involve the location of the container, for example, plus a few additional bytes of status information determined by the mission of the particular container and its contents. Thus, the pattern recognition algorithms must convert typically a complex image or other data to a few bytes representative of the class of the monitored item or event.

In some instances, the container must send considerably more data and at a more frequent interval than normal. This will generally happen only during an exceptional situation or event and when the added battery drain of this activity is justified. In this case, the system will signal the satellite that an exception situation exists and to prepare to receive additional information.

Many of the sensors on the container and inside the container may also require significant energy and thus should be used sparingly. For example, if the container is known to be empty and the doors closed, there is no need to monitor the interior of the container unless the doors have been reopened. Similarly, if the container is stationary and doors are closed, then continuously monitoring the interior of the container to determine the presence of cargo is unnecessary. Thus, each of the sensors can have a program duty cycle that depends on exterior or other events. Naturally, in some applications either solar power or other source of power may be available either intermittently to charge the battery or continuously.

If the vehicle such as a container is stationary then usually the monitoring can take place infrequently and the battery is conserved. When the vehicle is in motion then energy is frequently available to charge the battery and thus more frequent monitoring can take place as the battery is charged. The technique in known as "energy harvesting" and involves, for example, the use of a piezoelectric material that is compressed, bent or otherwise flexed thereby creating an electric current that can be used to charge the battery. Other methods include the use of a magnet and coil where the magnet moves relative to the coil under forces caused by the motion of the vehicle.

Since the duty cycle of the sensor system may vary considerably, and since any of the sensors can fail, be sabotaged or otherwise be rendered incapable of performing its intended function either from time, exposure, or intentionally, it is expected that some or all of the sensors will be equipped with a diagnostic capability. The communication system will generally interrogate each sensor or merely expect a transmission from each sensor and if that interrogation or transmission fails or a diagnostic error occurs, this fact will be communicated to the appropriate facility. If, for example, someone attempts to cover the lens of a camera so that a theft would not be detected, the mere fact that the lens was covered could be reported, alerting authorities that something unusual was occurring.

14.13.6 Safety

As mentioned previously, there are times when the value of the contents of a container can exceed the value of the tractor, chassis and container itself. Additionally, there are times when the contents of the container can be easily damaged if subjected to unreasonable vibrations, angles, accelerations and shocks. For these situations, an inertial measurement unit (IMU) can be used in conjunction with the container to monitor the accelerations experienced by the container (or the cargo) and to issue a warning if those accelerations are deemed excessive either in magnitude, duration, or frequency or where the integrations of these accelerations indicate an excessive velocity, angular velocity or angular displacement. Note that for some applications in order to minimize the power expended at the sensor installation, the IMU correction calculations based on the GPS can be done at an off sensor location such as the receiving station of the satellite information.

If the vehicle operates on a road that has previously been accurately mapped, to an accuracy of perhaps a few centimeters, then the analysis system can know the input from the road to the vehicle tires and thus to the chassis of the trailer. The IMU can also calculate the velocity of the trailer. By monitoring the motion of the container when subjected to a known stimulus, the road, the inertial properties of the container and chassis system can be estimated. If these inertial properties are known than a safe operating speed limit can be determined such that the probability of rollover, for example, is kept within reasonable bounds. If the driver exceeds that velocity, then a warning can be issued. Similarly, in some cases, the traction of the trailer wheels on the roadway can be estimated based on the tendency of a trailer to skid sideways. This also can be the basis of issuing a warning to the driver and to notify the contents owner especially if the vehicle is being operated in an unsafe manner for the road or weather conditions. Since the information system can also know the weather conditions in the area where the vehicle is operating, this added information can aid in the safe driving and safe speed limit determination. In some cases, the vibrations caused by a failing tire can also be determined. For those cases where radio frequency tire monitors are present, the container can also monitor the tire pressure and determine when a dangerous situation exists. Finally, the vehicle system can input to the overall system when the road is covered with ice or when it encounters a pothole.

Thus, there are many safety related aspects to having sensors mounted on a container and where those sensors can communicate periodically with a LEO or other satellite, or other communication system, and thereafter to the Internet or directly to the appropriate facility. Some of these rely on an accurate IMU. Although low cost IMUs are generally not very accurate, when they are combined using a Kalman filter with the GPS system, which is on the container as part of the tracking system, the accuracy of the IMU can be greatly improved, approaching that of military grade systems.

14.13.7 Other Remote Monitoring

The discussion above has concentrated on containers that contain cargo where presumably this cargo is shipped from one company or organization to another. This cargo could be automotive parts, animals, furniture, weapons, bulk commodities, machinery, fruits, vegetables, TV sets, or any other commonly shipped product. What has been described above is a monitoring system for tracking this cargo and making measurements to inform the interested parties (owners, law enforcement personnel etc.) of the status of the container, its contents, and the environment. This becomes practical when a satellite system exists such as the Skybitz, for example, LEO or geostationary satellite system coupled with a low cost low power small GPS receiver and communication device capable of sending information periodically to the satellite. Once the satellite has received the position information from the container, for example, this information can be relayed to a computer system wherein the exact location of the container can be ascertained. Additionally, if the container has an RFID reader, the location of all packages having an RFID tag that are located within the container can also be ascertained.

The accuracy of this determination is currently now approximately 20 meters. However, as now disclosed for the first time, the ionosphere caused errors in GPS signals received by container receiver can be determined from a variety of differential GPS systems and that information can be coupled with the information from the container to determine a precise location of the container to perhaps as accurate as a few centimeters. This calculation can be done at any facility that has access to the relevant DGPS corrections and the container location. It need not be done onboard the container. Using accurate digital maps the location of the container on the earth can be extremely precisely determined. This principle can now be used for other location determining purposes. The data processing facility that receives the information from the asset via satellites can also know the DGPS corrections at the asset location and thus can relay to the vehicle its precise location.

Although the discussion above has centered on cargo transportation as an illustrative example, at least one of the inventions disclosed herein is not limited thereto and in fact can be used with any asset whether movable or fixed where monitoring for any of a variety of reasons is desired. These reasons include environmental monitoring, for example, where asset damage can occur if the temperature, humidity, or other atmospheric phenomena exceeds a certain level. Such a device then could transmit to the telecommunications system when this exception situation occurred. It still could transmit to the system periodically, perhaps once a day, just to indicate that all is OK and that an exceptional situation did not occur.

Another example could be the monitoring of a vacation home during the months when the home is not occupied. Of course, any home could be so monitored even when the occupants leave the home unattended for a party, for example. The monitoring system could determine whether the house is on fire, being burglarized, or whether temperature is dropping to the point that pipes could freeze due to a furnace or power failure. Such a system could be less expensive to install and maintain by a homeowner, for example, than systems supplied by ADT, for example. Naturally, the monitoring of a real estate location could also be applied to industrial, governmental and any other similar sites. Any of the sensors including electromagnetic, cameras, ultrasound, capacitive, chemical, moisture, radiation, biological, temperature, pressure, radiation, etc. could be attached to such a system which would not require any other electrical connection either to a power source or to a communication source such as a telephone line which is currently require by ADT, for example. In fact, most currently installed security and fire systems require both a phone and a power connection. Naturally, if a power source is available it can be used to recharge the batteries or as primary power.

Of particular importance, this system and techniques can be applied to general aviation and the marine community for the monitoring of flight and boat routings. For general aviation, this or a similar system can be used for monitoring the unauthorized approach of planes or boats to public utilities, government buildings, bridges or any other structure and thereby warn of possible terrorist activities.

Portable versions of this system can also be used to monitor living objects such as pets, children, animals, cars, and trucks, or any other asset. What is disclosed herein therefore is a truly general asset monitoring system where the type of monitoring is only limited by requirement that the sensors operate under low power and the device does not require connections to a power source, other than the internal battery, or a wired source of communication. The communication link is generally expected to be via a transmitter and a LEO, geostationary or other satellite, however, it need not be the case and communication can be by cell phone, an ad hoc peer-to-peer network, IEEE 801.11, Bluetooth, or any other wireless system. Thus, using the teachings of at least one of the inventions disclosed herein, any asset can be monitored by any of a large variety of sensors and the information communicated wireless to another location which can be a central station, a peer-to-peer network, a link to the owners location, or, preferably, to the Internet.

Additional areas where the principles of the invention can be used for monitoring other objects include the monitoring of electric fields around wires to know when the wires have failed or been cut, the monitoring of vibrations in train rails to know that a train is coming and to enable tracking of the path of trains, the monitoring of vibrations in a road to know that a vehicle is passing, the monitoring of temperature and/or humidity of a road to signal freezing conditions so that a warning could be posted to passing motorists about the conditions of the road, the monitoring of vibrations or flow in a oil pipe to know if the flow of oil has stopped or being diverted so that a determination may be made if the oil is being stolen, the monitoring of infrared or low power (MIR) radar signal monitoring for perimeter security, the monitoring of animals and/or traffic to warn animals that a vehicle is approaching to eliminate car to animal accidents and the monitoring of fluid levels in tanks or reservoirs. It is also possible to monitor grain levels in storage bins, pressure in tanks, chemicals in water or air that could signal a terrorist attack, a pollution spill or the like, carbon monoxide in a garage or tunnel, temperature or vibration of remote equipment as a diagnostic of pending system failure, smoke and fire detectors and radiation. In each case, one or more sensors is provided designed to perform the appropriate, desired sensing, measuring or detecting function and a communications unit is coupled to the sensor(s) to enable transmission of the information obtained by the sensor (s). A processor can be provided to control the sensing function, i.e., to enable only periodic sensing or sensing conditioned on external or internal events. For each of these and many other applications, a signal can be sent to a satellite or other telematics system to send important information to a need-to-know person, monitoring computer program, the Internet etc.

Three other applications of at least one of the inventions disclosed herein need particular mention. Periodically, a boat or barge impacts with the structure of a bridge resulting in the collapse of a road, railroad or highway and usually multiple fatalities. Usually such an event can be sensed prior to the collapse of the structure by monitoring the accelerations, vibrations, displacement, or stresses in the structural members. When such an event is sensed, a message can be sent to a satellite and/or forwarded to the Internet, and thus to the authorities and to a warning sign or signal that has been placed at a location preceding entry onto the bridge. Alternately, the sensing device can send a signal directly to the relevant sign either in addition or instead of to a satellite.

Sometimes the movement of a potentially hazardous cargo in itself is not significantly unless multiple such movements follow a pattern. For example, the shipment of moderate amounts of explosives forwarded to a single location could signify an attack by terrorists. By comparing the motion of containers of hazardous materials and searching for patterns, perhaps using neural networks, fuzzy logic and the like, such concentrations of hazardous material can be forecasted prior to the occurrence of a disastrous event. This information can be gleaned from the total picture of movements of containers throughout a local, state or national area. Similarly, the movement of fuel oil and fertilizer by itself is usually not noteworthy but in combination using different vehicles can signal a potential terrorist attack.

Many automobile owners subscribe to a telematics service such as OnStar®. The majority of these owners when queried say that they subscribe so that if they have an accident and the airbag deploys, the EMS personnel will be promptly alerted. This is the most commonly desired feature by such owners. A second highly desired feature relates to car theft. If a vehicle is stolen, the telematics services can track that vehicle and inform the authorities as to its whereabouts. A third highly desired feature is a method for calling for assistance in any emergency such as the vehicle becomes stalled, is hijacked, runs off the road into a snow bank or other similar event. The biggest negative feature of the telematics services such as OnStarg is the high monthly cost of the service. See also section 9.2.

The invention described here can provide the three above-mentioned highly desired services without requiring a high monthly fee. A simple device that communicates to a satellite or other telematics system can be provided, as described above, that operates either on its own battery and/or by connecting to the cigarette lighter or similar power source. The device can be provided with a microphone and neural network algorithm that has been trained to recognize the noise signature of an airbag deployment or the information that a crash transpired can be obtained from an accelerometer. Thus, if the vehicle is in an accident, the EMS authorities can be immediately notified of the crash along with the precise location of the vehicle. Similarly, if the vehicle is stolen, its exact whereabouts can be determined through an Internet connection, for example. Finally, a discrete button placed in the vehicle can send a panic signal to the authorities via a telematics system. Thus, instead of a high monthly charge, the vehicle owner would only be charged for each individual transmission, which can be as low as $0.20 or a small surcharge can be added to the price of the device to cover such costs through averaging over many users. Such a system can be readily retrofitted to existing vehicles providing most of advantages of the OnStar® system, for example, at a very small fraction of its cost. The system can reside in a “sleep” mode for many years until some event wakes it up. In the sleep mode, only a few microamperes of current are drawn and the battery can last the life of the vehicle. A wake-up can be achieved when the airbag fires and the microphone emits a current. Similarly, a piezo-generator can be used to wake up the system based on the movement of a mass or diaphragm displacing a piezoelectric device which then outputs some electrical energy that can be sensed by the system electronics. Similarly, the system can be caused to wake up by a clock or the reception of a proper code from an antenna. Such a generator can also be used to charge the system battery extending its useful life. Such an OnStar®-like system can be manufactured for approximately $100, depending on production volume and features.

The invention described above can be used in any of its forms to monitor fluids. For example, sensors can be provided to monitor fuel or oil reservoirs, tanks or pipelines and spills. Sensors can be arranged in, on, within, in connection with or proximate a reservoir, tank or pipeline and powered in the manner discussed above, and coupled to a communication system as discussed above. When a property of characteristic of the environment is detected by the sensor, for example, detection of a fluid where none is supposed to be (which could be indicative of a spill), the sensor can trigger a communication system to transmit information about the detection of the fluid to a remote site which could send response personnel, i.e., clean-up personnel. The sensors can be designed to detect any variables which could provide meaningful information, such as a flow sensor which could detect variations in flow, or a chemical sensor which could detect the presence of a harmful chemical, biological agent or a radiation sensor which could detect the presence of radioactivity. Appropriate action could be taken in response to the detection of chemicals or radioactivity.

Remote water monitoring is also contemplated in the invention since water supplies are potentially subject to sabotage, e.g., by the placement of harmful chemicals or biological agents in the water supply. In this case, sensors would be arranged in, on, within, in connection with or proximate water reservoirs, tanks or pipelines and powered in the manner discussed above, and coupled to a communication system as discussed above. Information provided by the sensors is periodically communicated to a remote site at which it is monitored. If a sensor detects the presence of a harmful chemical or agent, appropriate action can be taken to stop the flow of water from the reservoir to municipal systems.

Even the pollution of the ocean and other large bodies of water especially in the vicinity of a shore can now be monitored for oil spills and other occurrences.

Similarly, remote air monitoring is contemplated within the scope of the invention. Sensors are arranged at sites to monitor the air and detect, for example, the presence of radioactivity and bacteria. The sensors can send the information to a communication system which transmits the information to a remote site for monitoring. Detection of aberrations in the information from the sensors can lead to initiation of an appropriate response, e.g., evacuation in the event of radioactivity detection.

The monitoring of forests for fires is also a possibility with the present invention, although satellite imaging systems are the preferred approach.

An additional application is the monitoring of borders such as the on between the United States and Mexico. Sensors can be placed periodically along such a border at least partially in the ground that are sensitive to vibrations, infrared radiation, sound or other disturbances. Such sensor systems can also contain a pattern recognition system that is trained to recognize characteristic signals indicating the passing of a person or vehicle. When such a disturbance occurs, the system can “wake-up” and receive and analyze the signal and if it is recognized, a transmission to a communication system can occur. Since the transmission would also contain either a location or an identification number of the device, the authorities would know where the border infraction was occurring.

Above, the discussion of the invention has included the use of a location determining signal such as from a GPS or other location determining system such as the use of time of arrival calculations from receptions from a plurality of cell phone antennas. If the device is located in a fixed place where it is unlikely to move, then the location of that place need only be determined once when the sensor system is put in place. The identification number of the device can then be associated with the device location in a database, for example. Thereafter, just the transmission of the device ID can be used to positively identify the device as well as its location. Even for movable cargo containers, for example, if the container has not moved since the last transmission, there is no need to expend energy receiving and processing the GPS or other location determining signals. If the device merely responds with its identification number, the receiving facility knows its location. The GPS processing circuitry can be reactivated if sensors on the asset determine that the asset has moved.

Once the satellite or other communication system has received a message from the sensor system of at least one of the inventions disclosed herein, it can either store the information into a database or, more commonly, it can retransmit or make available the data usually on the Internet where subscribers can retrieve the data and use it for their own purposes. Since such sensor systems are novel to at least one of the inventions disclosed herein, the transmission of the data via the Internet and the business model of providing such data to subscribing customers either on an as-needed bases or on a push basis where the customer receives an alert is also novel. Thus, for example, a customer may receive an urgent automatically-generated e-mail message or even a pop-up message on a particular screen that there is a problem with a particular asset that needs immediate attention. The customer can be a subscriber, a law enforcement facility, or an emergency services facility, among others.

An additional dimension exists with the use of the Skybitz system, for example, where the asset mounted device has further wireless communications with other devices in or on the asset. The fact that certain tagged items within or on the assets can be verified if a local area network exists between the Skybitz device and other objects. Perhaps it is desired to check that a particular piece of test equipment is located within an asset. Further perhaps it is desired to determine that the piece of equipment is operating or operating within certain parameter ranges, or has a particular temperature etc. Perhaps it is desired to determine whether a particular set of keys are in a key box wherein the keys are fitted with an RFID tag and the box with a reader and method of communicating with the Skybitz device. The possibilities are endless for determining the presence or operating parameters of a component of occupying item of a remote asset and to periodically communicate this information to an internet site, for example, using a low power asset monitoring system such as the Skybitz system.

The Skybitz or similar system can be used with cell phones to provide a location determination in satisfaction to US Federal regulations. The advantage of this use of Skybitz is that it is available world wide and does not require special equipment at the cell phone station. This also permits an owner of a cell phone to determine its whereabouts for cases where it was lost or stolen. Naturally a similar system can be added to PDAs or other CD players, radios, or any other electronic device that a human may carry. Even non electronic devices such as car keys could be outfitted with a Skybitz type device. It is unlikely that such a device would have a 10 year life but many of them have batteries that are periodically charged and the others could have a very low duty cycle such that they last up to one year without replacement of the battery and then inform the owner that the battery is low. This information process could even involve the sending of an email message to the owner's email stating the location of the device and the fact that the battery needs replacement.

14.14 Control of Other Assets from a Cell Phone, PDA or Vehicle

A cell phone, PDA or the like can be endowed with software-controlled radio, or similar, capabilities that can then communicate with many different devices. Such a system could replace the keys to an automobile, for example, and permit the pressing of certain keys to unlock and operate a vehicle. The required code can be sent to the cell phone, PDA or similar device over the Internet so that the operation of the vehicle, for example, can be enabled from a distance. A similar system can be used to open building doors, open garage doors etc. Similarly, the device can be resident in a vehicle and programmed via the Internet to permit the unlocking and/or opening of garage doors etc. Naturally, once the function is initiated, any electrically operated device can be controlled from the cell phone, PDA or vehicle. The latter vehicle-operated case will be discussed in the next section.

In the simplest form, the device can send a code in a similar manner as is now done with a garage door opener or automotive key fob. In more sophisticated cases where there is a significant security concern, the device can send an encrypted message to the garage door, for example, which can then send a return message that requires a follow-up message from the device that only that device is capable of providing. Each message sent from the door would be different but would require a distinct reply. This could be based on the theory of public key encryption or a similar system. In this manner, even if a recording device is placed clandestinely which records a sequence; since each sequence would be different such recording would be of no value.

The message to unlock the garage door, for example, could also be sent via a Skybitz satellite or equivalent to the Internet and the door could also be Internet-enabled and perform the desired unlocking and/or opening function. The location of the transmitting item can also be recorded in this manner providing asset location information. This in turn can aid in the location of a stolen vehicle, for example, or other stolen asset.

14.14.1 Garage Door Opener and Similar

Referring now to FIG. 188, a schematic of a house 850 includes a garage door opener 851 for opening and closing a garage door 852, an actuating mechanism 853 for opening and closing a front door 854 of the house 850, an air-conditioning/heating unit 855 controlled by a thermostat 856, a light control module 857 for controlling lights in the house 850 and an actuating mechanism 858 for controlling opening and closing of a window treatment 859 (although only one mechanism 858 is shown, each window can include a similar mechanism). A computer 861 is also situated in the house 850. The house 850 also includes a control unit 860 having a receiver 866 capable of receiving and transmitting wireless commands and signals from and to a remote device such as a PDA 862, a cell phone 863 and a device such as a fob which may be situated in a vehicle 864. Control unit 860 is spaced apart from the various actuating systems 851, 853, 856, 857, 858 and may be placed in a central location in the house 850. The PDA 862, cell phone 863 and fob in the vehicle 864 each include a wireless transmission device 865 which is capable of communicating with the receiver 866 in the control unit 860. The control unit 860 can be situated in locations and structures other than a house and used to control devices therein and is connected to the various actuating systems 851, 853, 856, 857, 858 wirelessly or by wires 869. Other actuating systems in the house 850 can also be coupled to the control unit 860, such as a mechanism which changes the reflectivity of windows, an automatic cooking device such as an oven which stores food in a refrigerated manner and is capable of heating the food upon receiving a command signal, or a pool heater for heating water in a pool.

When the control unit 860 with the receiver 866 is located in the house 850, and the receiver 866 has been designed to receive information in the form of one or more signals (possibly coded signals) transmitted from the transmission device 865 arranged on or in connection with such a PDA 862, cell phone 863, or vehicle 864, the receiver 866 provides the information to a processor 867 in the control unit 860 which processes the information to generate one or more of a plurality of different control commands for controlling the various systems in the house 850. As such, the control unit 860 can control or operate the garage door opener 851, for example, by merely closing a switch or it can be programmed to wirelessly emit the proper sequence to cause the garage door opener 851 to perform the garage door opening or other function. In this manner, for example, the transmission device 865 in a vehicle 864 can easily transmit one or more different commands to control many functions and mechanisms in the house 850 such as to open the garage door 852 via garage door opener 851, turn on the lights via light control module 857, control the ac/heating unit 855 via turning up or down the thermostat 856, etc. Each different desired action could be enabled by the transmission of a different, unique signal by the transmission device 865. It could even begin the process of synchronizing the vehicle resident computer with the residence computer 861, begin the transmission of a movie that was acquired from a local kiosk etc.

The processor in the control unit 860 can be connected with each mechanism, e.g., the garage door opener 851, actuating mechanism 853, thermostat 856, light control module 857 and actuating mechanism 858, by a wire or wirelessly. In some embodiments therefore, a separate receiving device (in control unit 860) is placed in the residence, or other location, and then taught or wired to perform functions such as opening the garage door.

The above-described system differs from the Johnson Controls Homelink® system where the vehicle is programmed with the garage door opening code directly.

14.14.2 Controlling Other Functions

The system described above can also perform other functions such as enabling payment for goods and services such as the dispensing of gas and the payment for fast food. This is in contrast to the RFID system used for toll collection such as EZ-Pass in that the device is more than just a transponder and in fact the initiation of the transaction can optionally be automatic or at the will of the operator.

Other functions include the downloading of maps, traffic, weather or other information from the internet or other information providing system. Any such functions can be provided from a vehicle, cell phone, PDA or other device.

Although several preferred embodiments are illustrated and described above, there are possible combinations using other signals and sensors for the components and different forms of the neural network implementation or different pattern recognition technologies that perform the same functions which can be utilized in accordance with the invention. Also, although the neural network and modular neural networks have been described as an example of one means of pattern recognition, other pattern recognition means exist and still others are being developed which can be used to identify potential component failures by comparing the operation of a component over time with patterns characteristic of normal and abnormal component operation. In addition, with the pattern recognition system described above, the input data to the system may be data which has been pre-processed rather than the raw signal data either through a process called "feature extraction" or by various mathematical transformations. Also, any of the apparatus and methods disclosed herein may be used for diagnosing the state of operation or a plurality of discrete components.

Although several preferred embodiments are illustrated and described above, there are possible combinations using other geometries, sensors, materials and different dimensions for the components that perform the same functions. At least one of the inventions disclosed herein is not limited to the above embodiments and should be determined by the following claims. There are also numerous additional applications in addition to those described above. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

Appendix 1

Analysis of Neural Network Training and Data Preprocessing Methods—An Example

1. Introduction

The Artificial Neural Network that forms the "brains" of the Occupant Spatial Sensor needs to be trained to recognize airbag enable and disable patterns. The most important part of this training is the data that is collected in the vehicle, which provides the patterns corresponding to these respective configurations. Manipulation of this data (such as filtering) is appropriate if this enhances the information contained in the data. Important too, are the basic network architecture and training methods applied, as these two determine the learning and generalization capabilities of the neural network. The ultimate test for all methods and filters is their effect on the network performance against real world situations.

The Occupant Spatial Sensor (OSS) uses an artificial neural network (ANN) to recognize patterns that it has been trained to identify as either airbag enable or airbag disable conditions. The pattern is obtained from four ultrasonic transducers that cover the front passenger seating area. This pattern consists of the ultrasonic echoes from the objects in the passenger seat area. The signal from each of the four transducers consists of the electrical image of the return echoes, which is processed by the electronics. The electronic processing comprises amplification (logarithmic compression), rectification, and demodulation (band pass filtering), followed by discretization (sampling) and digitization of the signal. The only software processing required, before this signal can be fed into the artificial neural network, is normalization (i.e. mapping the input to numbers between 0 and 1). Although this is a fair amount of processing, the resulting signal is still considered "raw", because all information is treated equally.

It is possible to apply one or more software preprocessing filters to the raw signal before it is fed into the artificial neural network. The purpose of such filters is to enhance the useful information going into the ANN, in order to increase the system performance. This document describes several preprocessing filters that were applied to the ANN training of a particular vehicle.

2. Data Description

The performance of the artificial neural network is dependent on the data that is used to train the network. The amount of data and the distribution of the data within the realm of possibilities are known to have a large effect on the ability of the network to recognize patterns and to generalize. Data for the OSS is made up of vectors. Each vector is a combination of the useful parts of the signals collected from four ultrasonic transducers. A typical vector could comprise on the order of 100 data points, each representing the (time displaced) echo level as recorded by the ultrasonic transducers.

Three different sets of data are collected. The first set, the training data, contains the patterns that the ANN is being trained on to recognize as either an airbag deploy or non-deploy scenario. The second set is the independent test data. This set is used during the network training to direct the optimization of the network weights. The third set is the validation (or real world) data. This set is used to quantify the success rate (or performance) of the finalized artificial neural network.

FIG. 84 shows the main characteristics of these three data sets, as collected for the vehicle. Three numbers characterize the sets. The number of configurations characterizes how many different subjects and objects were used. The number of setups is the product of the number of configurations and the number of vehicle interior variations (seat position and recline, roof and window state, etc.) performed for each configuration. The total number of vectors is then made up of the product of the number of setups and the number of patterns collected while the subject or object moves within the passenger volume.

1.1 Training Data Set Characteristics

The training data set can be split up in various ways into subsets that show the distribution of the data. FIG. 85 shows the distribution of the training set amongst three classes of passenger seat occupancy: Empty Seat, Human Occupant, and Child Seat. All human occupants, for this example, were adults of various sizes. No children were part of the training data set other then those seated in Forward Facing Child Seats. FIG. 86 shows a further breakup of the Child Seats into Forward Facing Child Seats, Rearward Facing Child Seats, Rearward Facing Infant Seats, and out-of-position Forward Facing Child Seats. FIG. 87 shows a different type of distribution; one based on the environmental conditions inside the vehicle.

1.2 Independent Test Data Characteristics

The independent test data is created using the same configurations, subjects, objects, and conditions as used for the training data set. Its makeup and distributions are therefore the same as those of the training data set.

1.3 Validation Data Characteristics

The distribution of the validation data set into its main subsets is shown in FIG. 88. This distribution is close to that of the training data set. However, the human occupants comprised both children (12% of total) as well as adults (27% of total). FIG. 89 shows the distribution of human subjects. Contrary to the training and independent test data sets, data was collected on children ages 3 and 6 that were not seated in a child restraint of any kind. FIG. 90 shows the distribution of the child seats used. On the other hand, no data was collected on Forward Facing Child Seats that were out-of-position. The child and infant seats used in this data set are different from those used in the training and independent test data sets. The validation data was collected with varying environmental conditions as shown in FIG. 91.

3. Network Training

The baseline network consisted of a four layer back-propagation network with 117 input layer nodes, 20 and 7 nodes respectively in the two hidden layers, and 1 output layer node. The input layer is made up of inputs from four ultrasonic transducers. These were located in the vehicle on the rear quarter panel (A), the A-pillar (B), and the over-head console (C, H). FIG. 92 shows the number of points, taken from each of these channels that make up one vector.

The artificial neural network is implemented using the ISR Software. The method used for training the decision mathematical model was back-propagation with Extended Delta-Bar-Delta learning rule and sigmoid transfer function. The Extended DBD paradigm uses past values of the gradient to infer the local curvature of the error surface. This leads to a learning rule in which every connection has a different learning rate and a different momentum term, both of which are automatically calculated.

The network was trained using the above-described training and independent test data sets. An optimum (against the independent test set) was found after 3,675,000 training cycles. Each training cycle uses 30 vectors (known as the epoch), randomly chosen from the 650,000 available training set vectors. FIG. 93 shows the performance of the baseline network.

The network performance has been further analyzed by investigating the success rates against subsets of the independent test set. The success rate against the airbag enable conditions at 94.6% is virtually equal to that against the airbag disable conditions at 94.4%. FIG. 94 shows the success rates for the various occupancy subsets. FIG. 95 shows the success rates for the environmental conditions subsets. Although the distribution of this data was not entirely balanced throughout the matrix, it can be concluded that the system performance is not significantly degraded by heat sources.

3.1 Normalization

Normalization is used to scale the real world data range into a range acceptable for the network training. The ISR software requires the use of a scaling factor to bring the input data into a range of 0 to 1, inclusive. Several normalization methods have been explored for their effect on the system performance.

Figure 96:
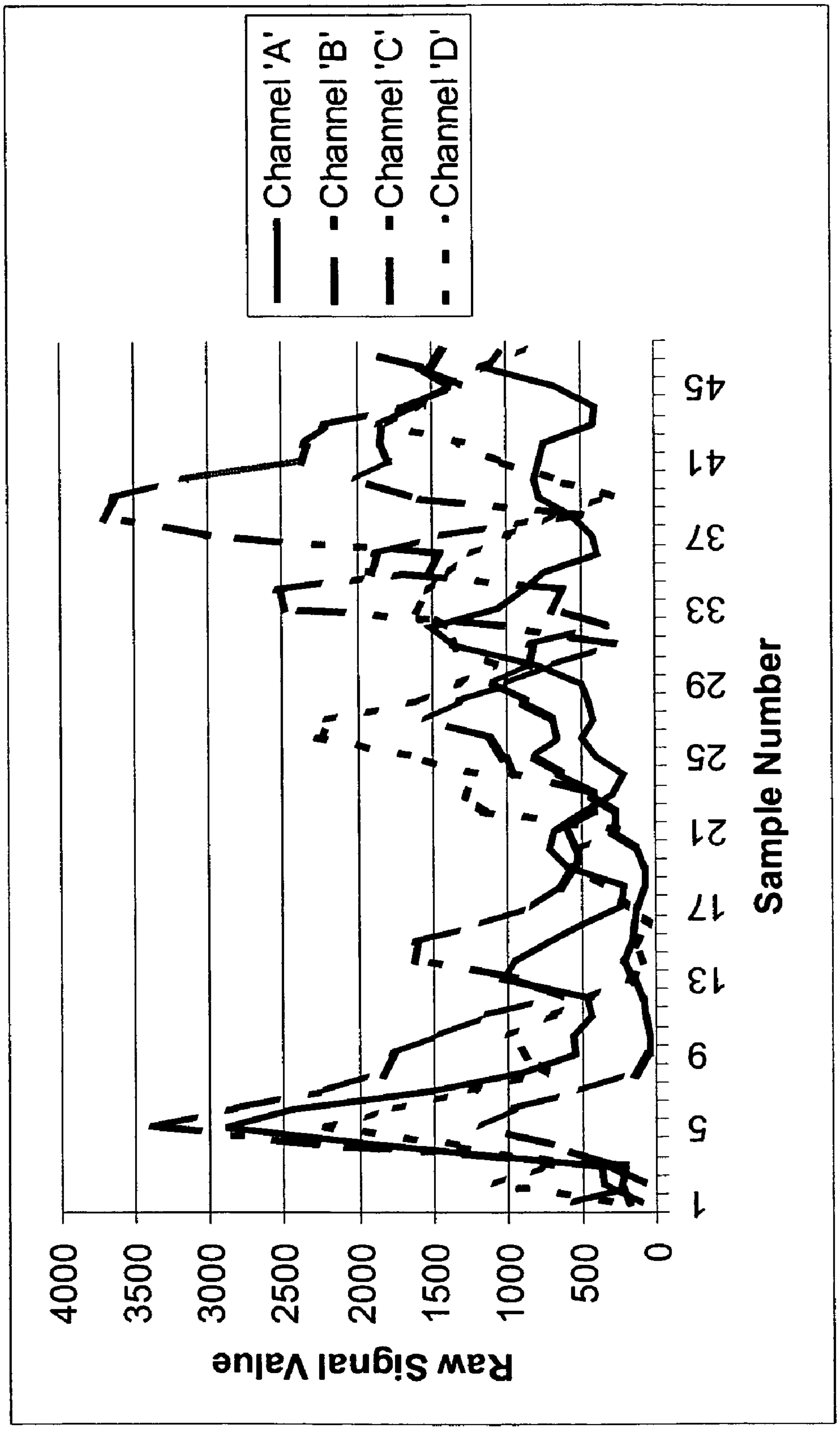
FIG. 96 is a chart of four typical raw signals which are combined to constitute a vector.

The real world data consists of 12 bit, digitized signals with values between 0 and 4095. FIG. 96 shows a typical raw signal. A raw vector consists of combined sections of four signals.

Three methods of normalization of the individual vectors have been investigated:

a. Normalization using the highest and lowest value of the entire vector (baseline).

b. Normalization of the transducer channels that make up the vector, individually. This method uses the highest and lowest values of each channel.

c. Normalization with a fixed range ([0,4095]).

The results of the normalization study are summarized in FIG. 97.

A higher performance results from normalizing across the entire vector versus normalizing per channel. This can be explained from the fact that the baseline method retains the information contained in the relative strength of the signal from one transducer compared to another. This information is lost when using the second method.

Normalization using a fixed range retains the information contained in the relative strength of one vector compared to the next. From this it could be expected that the performance of the network trained with fixed range normalization would increase over that of the baseline method. However, without normalization, the input range is, as a rule, not from zero to the maximum value (see FIG. 97). The absolute value of the data at the input layer affects the network weight adjustment (see equations [1] and [2]). During network training, vectors with a smaller input range will affect the weights calculated for each processing element (neuron) differently than vectors that do span the full range.

$$\Delta w_{ij}[s] = lcoef \cdot e_j^{[s]} \cdot x_l^{[s-1]}$$

$$e_j^{[s]} = x_j^{[s]} \cdot (1.0 - x_j^{[s]}) \cdot \Delta_k (e_k^{[s+1]} \cdot w_{kj}^{[s+1]})$$

$\Delta w_{ij}^{[s]}$ is the change in the network weights; lcoef is the learning coefficient; $e_j^{[s]}$] is the local er j in layer s; $x_l^{[s]}$] is the current output state of neuron j in layer s.

Variations in the highest and lowest values in the input layer, therefore, have a negative effect on the training of the network. This is reflected in a lower performance against the validation data set.

A secondary effect of normalization is that it increases the resolution of the signal by stretching it out over the full range of 0 to 1, inclusive. As the network predominantly learns from higher peaks in the signal, this results in better generalization capabilities and therefore in a higher performance.

It must be concluded that the effects of the fixed range of input values and the increased resolution resulting from the baseline normalization method have a stronger effect on the network training than retaining the information contained in the relative vector strength.

3.2 Low Threshold Filters

Not all information contained in the raw signals can be considered useful for network training. Low amplitude echoes are received back from objects on the outskirts of the ultrasonic field that should not be included in the training data. Moreover, low amplitude noise, from various sources, is contained within the signal. This noise shows up strongest where the signal is weak. By using a low threshold filter, the signal to noise ratio of the vectors can be improved before they are used for network training.

Three cutoff levels were used: 5%, 10%, and 20% of the signal maximum value (4095). The method used, brings the values below the threshold up to the threshold level. Subsequent vector normalization (baseline method) stretches the signal to the full range of [0,1].

The results of the low threshold filter study are summarized in FIG. 98.

The performance of the networks trained with 5% and 10% threshold filter is similar to that of the baseline network. A small performance degradation is observed for the network trained with a 20% threshold filter. From this it is concluded that the noise level is sufficiently low to not affect the network training. At the same time it can be concluded that the lower 10% of the signal can be discarded without affecting the network performance. This allows the definition of demarcation lines on the outskirts of the ultrasonic field where the signal is equal to 10% of the maximum field strength 4. Network Types The baseline network is a back-propagation type network. Back-propagation is a general-purpose network paradigm that has been successfully used for prediction, classification, system modeling, and filtering as well as many other general types of problems. Back propagation learns by calculating an error between desired and actual output and propagating this error information back to each node in the network. This back-propagated error is used to drive the learning at each node. Some of the advantages of a back-propagation network are that it attempts to minimize the global error and that it can provide a very compact distributed representation of complex data sets. Some of the disadvantages are its slow learning and the irregular boundaries and unexpected classification regions due to the distributed nature of the network and the use of a transfer functions that is unbounded. Some of these disadvantages can be overcome by using a modified back-propagation method such as the Extended Delta-Bar-Delta paradigm. The EDBD algorithm automatically calculates the learning rate and momentum for each connection in the network, which facilitates optimization of the network training.

Many other network architectures exist that have different characteristics than the baseline network. One of these is the Logicon Projection Network. This type of network combines the advantages of closed boundary networks with those of open boundary networks (to which the back-propagation network belongs). Closed boundary networks are fast learning because they can immediately place prototypes at the input data points and match all input data to these prototypes. Open boundary networks, on the other hand, have the capability to minimize the output error through gradient decent.

5. Conclusions

The baseline artificial neural network trained to a success rate of 92.7% against the validation data set. This network has a four-layer back-propagation architecture and uses the Extended Delta-Bar-Delta learning rule and sigmoid transfer function. Pre-processing comprised vector normalization while post-processing comprised a "five consistent decision" filter.

The objects and subjects used for the independent test data were the same as those used for the training data. This may have negatively affected the network's classification generalization abilities.

The spatial distribution of the independent test data was as wide as that of the training data. This has resulted in a network that can generalize across a large spatial volume. A higher performance across a smaller volume, located immediately around the peak of the normal distribution, combined with a lower performance on the outskirts of the distribution curve, might be preferable.

To achieve this, the distribution of the independent test set needs to be a reflection of the normal distribution for the system (a.k.a. native population).

Modifying the pre-processing method or applying additional pre-processing methods did not show a significant improvement of the performance over that of the baseline network. The baseline normalization method gave the best results as it improves the learning by keeping the input values in a fixed range and increases the signal resolution. The lower threshold study showed that the network learns from the larger peaks in the echo pattern. Pre-processing techniques should be aimed at increasing the signal resolution to bring out these peaks.

A further study could be performed to investigate combining a lower threshold with fixed range normalization, using a range less than full scale. This would force each vector to include at least one point at the lower threshold value and one value in saturation, effectively forcing each vector into a fixed range that can be mapped between 0 and 1, inclusive. This would have the positive effects associated with the baseline normalization, while retaining the information contained in the relative vector strength. Raw vectors points that, as a result of the scaling, would fall outside the range of 0 to 1 would then be mapped to 0 and 1 respectively.

Post-processing should be used to enhance the network recognition ability with a memory function. The possibilities for such are currently frustrated by the necessity of one network performing both object classification as well as spatial locating functions. Performing the spatial locating function requires flexibility to rapidly update the system status. Object classification, on the other hand, benefits from decision rigidity to nullify the effect of an occasional pattern that is incorrectly classified by the network.

Appendix 2

| Process for training an OPS system DOOP network for a specific vehicle | |
|---|---|
| 1. | Define customer requirements and deliverables |
| 1.1. | Number of zones |
| 1.2. | Number of outputs |
| 1.3. | At risk zone definition |
| 1.4. | Decision definition i.e. empty seat at risk, safe seating, or not critical and undetermined |
| 1.5. | Determine speed of DOOP decision |
| 2. | Develop programming timing (PERT) chart for the program |
| 3. | Determine viable locations for the transducer mounts |
| 3.1. | Manufacturability |
| 3.2. | Repeatability |
| 3.3. | Exposure (not able to damage during vehicle life) |
| 4. | Evaluate location of mount logistics |
| 4.1. | Field dimensions |
| 4.2. | Multipath reflections |
| 4.3. | Transducer Aim |
| 4.4. | Obstructions/Unwanted data |
| 4.5. | Objective of view |
| 4.6. | Primary DOOP transducers requirements |
| 5. | Develop documentation logs for the program (vehicle books) |
| 6. | Determine vehicle training variables |
| 6.1. | Seat track stops |
| 6.2. | Steering wheel stops |
| 6.3. | Seat back angles |
| 6.4. | DOOP transducer blockage during crash |
| 6.5. | Etc . . . |
| 7. | Determine and mark at risk zone in vehicle |
| 8. | Evaluate location physical impediments |
| 8.1. | Room to mount/hide transducers |
| 8.2. | Sufficient hard mounting surfaces |
| 8.3. | Obstructions |
| 9. | Develop matrix for training, independent, validation, and DOOP data sets |
| 10. | Determine necessary equipment needed for data collection |
| 10.1. | Child/booster/infant seats |
| 10.2. | Maps/razors/makeup |
| 10.3. | Etc . . . |
| 11. | Schedule sled tests for initial and final DOOP networks |
| 12. | Design test buck for DOOP |
| 13. | Design test dummy for DOOP testing |
| 14. | Purchase any necessary variables |
| 14.1. | Child/booster/infant seats |
| 14.2. | Maps/razors/makeup |
| 14.3. | Etc . . . |

Appendix 2-continued

| Process for training an OPS system DOOP network for a specific vehicle | |
|---|---|
| 15. | Develop automated controls of vehicle accessories |
| 15.1. | Automatic seat control for variable empty seat |
| 15.2. | Automatic seat back angle control for variable empty seat |
| 15.3. | Automatic window control for variable empty seat |
| 15.4. | Etc . . . |
| 16. | Acquire equipment to build automated controls |
| 17. | Build & install automated controls of vehicle variables |
| 18. | Install data collection aides |
| 18.1. | Thermometers |
| 18.2. | Seat track gauge |
| 18.3. | Seat angle gauge |
| 18.4. | Etc . . . |
| 19. | Install switched and fused wiring for: |
| 19.1. | Transducer pairs |
| 19.2. | Lasers |
| 19.3. | Decision Indicator Lights |
| 19.4. | System box |
| 19.5. | Monitor |
| 19.6. | Power automated control items |
| 19.7. | Thermometers, potentiometers |
| 19.8. | DOOP occupant ranging device |
| 19.9. | DOOP ranging indicator |
| 19.10. | Etc . . . |
| 20. | Write DOOP operating software for OPS system box |
| 21. | Validate DOOP operating software for OPS |
| 22. | Build OPS system control box for the vehicle with special DOOP operating software |
| 23. | Validate & document system control box |
| 24. | Write vehicle specific DOOP data collection software (pollbin) |
| 25. | Write vehicle specific DOOP data evaluation program (picgraph) |
| 26. | Evaluate DOOP data collection software |
| 27. | Evaluate DOOP data evaluation software |
| 28. | Load DOOP data collection software on OPS system box and validate |
| 29. | Load DOOP data evaluation software on OPS system box and validate |
| 30. | Train technicians on DOOP data collection techniques and use of data collection software |
| 31. | Design prototype mounts based on known transducer variables |
| 32. | Prototype mounts |
| 33. | Pre-build mounts |
| 33.1. | Install transducers in mounts |
| 33.2. | Optimize to eliminate crosstalk |
| 33.3. | Obtain desired field |
| 33.4. | Validate performance of DOOP requirements for mounts |
| 34. | Document mounts |
| 34.1. | Polar plots of fields |
| 34.2. | Drawings with all mount dimensions |
| 34.3. | Drawings of transducer location in the mount |
| 35. | Install mounts in the vehicle |
| 36. | Map fields in the vehicle using ATI designed apparatus and specification |
| 37. | Map performance in the vehicle of the DOOP transducer assembly |
| 38. | Determine sensor volume |
| 39. | Document vehicle mounted transducers and fields |
| 39.1. | Mapping per ATI specification |
| 39.2. | Photographs of all fields |
| 39.3. | Drawing and dimensions of installed mounts |
| 39.4. | Document sensor volume |
| 39.5. | Drawing and dimensions of aim & field |
| 40. | Using data collection software and OPS system box collect initial 16 sheets of training, independent, and validation data |
| 41. | Determine initial conditions for training the ANN |
| 41.1. | Normalization method |
| 41.2. | Training via back propagation or ? |
| 41.3. | Weights |
| 41.4. | Etc . . . |
| 42. | Pre-process data |
| 43. | Train an ANN on above data |
| 44. | Develop post processing strategy if necessary |
| 45. | Develop post processing software |
| 46. | Evaluate ANN with validation data and in vehicle analysis |
| 47. | Perform sled tests to confirm initial DOOP results |
| 48. | Document DOOP testing results and performance |
| 49. | Rework mounts and repeat steps 31 through 48 if necessary |
| 50. | Meet with customer and review program |
| 51. | Develop strategy for customer directed outputs |
| 51.1. | Develop strategy for final ANN multiple decision networks if necessary |
| 51.2. | Develop strategy for final ANN multiple layer networks if necessary |
| 51.3. | Develop strategy for DOOP layer/network |
| 52. | Design daily calibration jig |
| 53. | Build daily calibration jig |
| 54. | Develop daily calibration test |
| 55. | Document daily calibration test procedure & jig |
| 56. | Collect daily calibration tests |
| 57. | Document daily calibration test results |
| 58. | Rework vehicle data collection markings for customer directed outputs |
| 58.1. | Multiple zone identifiers for data collection |
| 59. | Schedule subjects for all data sets |
| 60. | Train subjects for data collection procedures |
| 61. | Using DOOP data collection software and OPS system box collect initial 16 sheets of training, independent, and validation data |
| 62. | Collect total amount of vectors deemed necessary by program directives, amount will vary as outputs and complexity of ANN varies |
| 63. | Determine initial conditions for training the ANN |
| 63.1. | Normalization method |
| 63.2. | Training via back propagation or ? |
| 63.3. | Weights |
| 63.4. | Etc . . . |
| 64. | Pre-process data |
| 65. | Train an ANN on above data |
| 66. | Develop post processing strategy |
| 66.1. | Weighting |
| 66.2. | Averaging |
| 66.3. | Etc . . . |
| 67. | Develop post processing software |
| 68. | Evaluate ANN with validation data |
| 69. | Perform in vehicle hole searching and analysis |
| 70. | Perform in vehicle non sled mounted DOOP tests |
| 71. | Determines need for further training or processing |
| 72. | Repeat steps 58 through 71 if necessary |
| 73. | Perform sled tests to confirm initial DOOP results |
| 74. | Document DOOP testing results and performance |
| 75. | Repeat steps 58 through 74 if necessary |
| 76. | Write summary performance report |
| 77. | Presentation of vehicle to the customer |
| 78. | Delivered an OPS equipped vehicle to the customer |

The invention claimed is:

1. An arrangement for wirelessly controlling systems in a vehicle, comprising;

a movable device including a transmitter arranged to transmit different control signals based on user activation;

at least one control unit arranged on or in connection with the vehicle, each of said at least one control unit including a receiver arranged to communicate with said transmitter and a processor coupled to said receiver and arranged to generate one of a plurality of different command signals based on control signals transmitted by said transmitter and received by said receiver; and a plurality of systems each arranged on or in connection with the vehicle, all of said systems being coupled to said at least one control unit, each of said systems being responsive to command signals generated by said processor to perform a function relating to or affecting the vehicle, each of said systems being controlled by said movable device by causing said transmitter of said movable device to transmit a specific control signal which, when received by said receiver, causes said processor to generate a unique command signal to which only said system is responsive, said transmitter being arranged to transmit the control signals to a transmission network coupled to the Internet, said movable device being programmable via the Internet to enable the transmission of the specific control signals by said transmitter to cause said processor to generate the unique command signals and provide for responses by said systems, wherein said movable device is arranged to receive and respond to the return signal sent by said at least one control unit by transmitting a follow-up message via said transmitter, said follow-up message being a message of a type which only said movable device is arranged to provide to thereby ensure secure communications between said movable device and said at least one control unit, said receiver being coupled to the Internet such that said transmitter and said receiver are coupled to one another via the Internet;

said at least one control unit being arranged to send a return signal in response to reception of a signal by said receiver which was transmitted by said transmitter to thereby provide bi-directional signal transmission between said transmitter and said at least one control unit.

2. The arrangement of claim 1, wherein one of the functions being performed by said systems is to control locking and unlocking of a door of the vehicle.

3. The arrangement of claim 1, wherein said systems are all spaced apart from one another and from said at least one control unit.

4. The arrangement of claim 3, wherein said systems are wirelessly coupled to said at least one control unit.

5. The arrangement of claim 1, wherein said transmitter is arranged to send one of a plurality of different coded signals to said at least one control unit, each of said coded signals being arranged to cause said processor to generate one or more specific command signals for controlling said systems.

6. The arrangement of claim 1, wherein each of said systems is distanced from said at least one control unit and wirelessly coupled thereto.

7. The arrangement of claim 1, wherein said movable device is a cell phone or a PDA.

8. The arrangement of claim 1, wherein said transmitter is programmed to transmit different control signals to control said systems.

9. The arrangement of claim 1, wherein said transmitter is arranged to transmit coded signals to said at least one control unit.

10. The arrangement of claim 1, wherein said transmitter is arranged to transmit the control signals to a satellite for retransmission from the satellite to the transmission network coupled to the Internet.

11. The arrangement of claim 1, wherein said transmitter is arranged to transmit the control signals directly to a ground-based communication device coupled to the Internet.

12. The arrangement of claim 1, wherein said at least one control unit consists of a single control unit, all of said plurality of systems being coupled to said single control unit.

13. An arrangement for wirelessly controlling and managing systems in an asset from a vehicle using a transmission network, comprising;

a garage door opener, a thermostat, and a light control module;

a movable device including a transmitter arranged to transmit different control signals based on user activation;

at least one control unit arranged on or in connection with the asset, each of said at least one control unit including a receiver arranged to communicate with said transmitter and a processor coupled to said receiver and arranged to generate one of a plurality of different command signals based on control signals transmitted by said transmitter and received by said receiver; and a plurality of systems each arranged on or in connection with the asset, all of said systems being coupled to said at least one control unit, each of said systems being responsive to command signals generated by said processor to perform a function relating to or affecting the asset, one of said systems being a computer, each of said systems being controlled by said movable device by causing said transmitter of said movable device to transmit a specific control signal which, when received by said receiver, causes said processor to generate a unique command signal to which only said system is responsive, said transmitter being arranged to transmit the control signals to the transmission network coupled to the Internet, said receiver being coupled to the Internet such that said transmitter and said receiver are coupled to one another via the Internet, said movable device being resident in a vehicle having a computer and programmable via the Internet to permit control of said systems, said movable device being arranged to enable synchronization of the vehicle computer with the computer in the asset.

14. The arrangement of claim 13, wherein the asset is a house.

15. The arrangement of claim 14, wherein said systems include a garage door opener, a thermostat and a light control module.

16. The arrangement of claim 14, wherein said movable device is a cell phone or a PDA.

17. A method for wirelessly controlling systems arranged on or in connection with a vehicle, comprising:

providing a transmitter on a movable device which is arranged to transmit different control signals based on user activation;

arranging at least one control unit on or in connection with the vehicle, each of the at least one control unit including a receiver arranged to communicate with the transmitter and a processor coupled to the receiver and arranged to generate one of a plurality of different command signals based on control signals transmitted by the transmitter and received by the receiver; and coupling the processor in the at least one control unit to all of the systems, each of the systems being responsive to different command signals generated by the processor in order to perform a function relating to or affecting the vehicle;

controlling the systems by means of the movable device by transmitting a specific control signal via the transmitter of the movable device;

transmitting the control signals to a transmission network coupled to the Internet;

coupling the receiver to the Internet such that the transmitter and the receiver are coupled to one another via the Internet;

receiving the control signal at the receiver and causing the processor to generate a unique command signal based on the received control signal; and directing the command signal to one of the systems, which is determined by the at least one control unit based on the control signal received by the receiver, with only the determined system being responsive to the command signal to perform a function relating to or affecting the vehicle;

programming the movable device via the Internet to enable the transmission of the specific control signals via the transmitter to cause the processor to generate the unique command signals and provide for responses by the systems; and transmitting a return signal from the at least one control unit in response to reception of a signal transmitted by the transmitter by the receiver to thereby provide bi-directional signal transmission between the transmitter and the at least one control unit, and causing the moveable device to receive and respond to the return signal sent by the at least one control unit by transmitting a follow-up message via the transmitter, the follow-up message being a message of a type which only the movable device is arranged to provide to thereby ensure secure communications between the movable device and the at least one control unit.

18. The method of claim 17, wherein one of the functions being performed by said systems is to control locking and unlocking of a door of the vehicle.

19. The method of claim 17, further comprising: arranging the systems apart from the at least one control unit; and wirelessly coupling the systems to the at least one control unit.

20. The method of claim 17, wherein the transmitter is arranged to send one of a plurality of different coded signals to the at least one control unit, each of the coded signals being arranged to cause the processor to generate one or more specific command signals for controlling the systems.

21. The method of claim 17, further comprising programming the transmitter to transmit different control signals for controlling the systems to the at least one control unit.

22. The method of claim 17, further comprising: arranging the transmitter to transmit the control signals to a satellite for re-transmission from the satellite to the transmission network coupled to the Internet.

23. The method of claim 17, further comprising transmitting control signals directly to a ground-based communication device coupled to the Internet.

24. The method of claim 17, wherein the at least one control unit consists of a single control unit, all of the systems being coupled to the single control unit.

* * * * *

UNITED STATES PATENT AND TRADEMARK OFFICE

CERTIFICATE OF CORRECTION

PATENT NO. : 7,663,502 B2
APPLICATION NO. : 10/940881
DATED : February 16, 2010
INVENTOR(S) : David S. Breed It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 509 days.

Signed and Sealed this

Twenty-eighth Day of December, 2010

David J. Kappos

*Director of the United States Patent and Trademark Office*